US009081501B2

(12) United States Patent
Asaad et al.

(10) Patent No.: US 9,081,501 B2

(45) Date of Patent: *Jul. 14, 2015

(54) MULTI-PETASCALE HIGHLY EFFICIENT PARALLEL SUPERCOMPUTER

(75) Inventors: Sameh Asaad, Yorktown Heights, NY (US); Ralph E. Bellofatto, Yorktown Heights, NY (US); Michael A. Blocksome, Rochester, MN (US); Matthias A. Blumrich, Yorktown Heights, NY (US); Peter Boyle, Yorktown Heights, NY (US); Jose R. Brunheroto, Yorktown Heights, NY (US); Dong Chen, Yorktown Heights, NY (US); Chen-Yong Cher, Yorktown Heights, NY (US); George L. Chiu, Yorktown Heights, NY (US); Norman Christ, Yorktown Heights, NY (US); Paul W. Coteus, Yorktown Heights, NY (US); Kristan D. Davis, Rochester, MN (US); Gabor J. Dozsa, Yorktown Heights, NY (US); Alexandre E. Eichenberger, Yorktown Heights, NY (US); Noel A. Eisley, Yorktown Heights, NY (US); Matthew R. Ellavsky, Rochester, MN (US); Kahn C. Evans, Rochester, MN (US); Bruce M. Fleischer, Yorktown Heights, NY (US); Thomas W. Fox, Yorktown Heights, NY (US); Alan Gara, Yorktown Heights, NY (US); Mark E. Giampapa, Yorktown Heights, NY (US); Thomas M. Gooding, Rochester, MN (US); Michael K. Gschwind, Yorktown Heights, NY (US); John A. Gunnels, Yorktown Heights, NY (US); Shawn A. Hall, Yorktown Heights, NY (US); Rudolf A. Haring, Yorktown Heights, NY (US); Philip Heidelberger, Yorktown Heights, NY (US); Todd A. Inglett, Rochester, MN (US); Brant L. Knudson, Rochester, MN (US); Gerard V. Kopcsay, Yorktown Heights, NY (US); Sameer Kumar, Yorktown Heights, NY (US); Amith R. Mamidala, Yorktown Heights, NY (US); James A. Marcella, Rochester, MN (US); Mark G. Megerian, Rochester, MN (US); Douglas R. Miller, Rochester, MN (US); Samuel J. Miller, Rochester, MN (US); Adam J. Muff, Rochester, MN (US); Michael B. Mundy, Rochester, MN (US); John K. O'Brien, Yorktown Heights, NY (US); Kathryn M. O'Brien, Yorktown Heights, NY (US); Martin Ohmacht, Yorktown Heights, NY (US); Jeffrey J. Parker, Rochester, MN (US); Ruth J. Poole, Rochester, MN (US); Joseph D. Ratterman, Rochester, MN (US); Valentina Salapura, Yorktown Heights, NY (US); David L. Satterfield, Tewksbury, MA (US); Robert M. Senger, Yorktown Heights, NY (US); Brian Smith, Rochester, MN (US); Burkhard Steinmacher-Burow, Boeblingen (DE); William M. Stockdell, Rochester, MN (US); Craig B. Stunkel, Yorktown Heights, NY (US); Krishnan Sugavanam, Yorktown Heights, NY (US); Yutaka Sugawara, Yorktown Heights, NY (US); Todd E. Takken, Yorktown Heights, NY (US); Barry M. Trager, Yorktown Heights, NY (US); James L. Van Oosten, Rochester, MN (US); Charles D. Wait, Rochester, MN (US); Robert E. Walkup, Yorktown Heights, NY (US); Alfred T. Watson, Rochester, MN (US); Robert W. Wisniewski, Yorktown Heights, NY (US); Peng Wu, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1083 days.

This patent is subject to a terminal disclaimer.

(21) Appl. No.: 13/004,007

(22) Filed: Jan. 10, 2011

(65) Prior Publication Data

US 2011/0219208 A1 Sep. 8, 2011

Related U.S. Application Data

(60) Provisional application No. 61/293,611, filed on Jan. 8, 2010, provisional application No. 61/295,669, filed on Jan. 15, 2010, provisional application No. 61/299,911, filed on Jan. 29, 2010.

(51) Int. Cl.

| | |
|---|---|
| ***G06F 15/173*** | (2006.01) |
| ***G06F 9/06*** | (2006.01) |
| ***G06F 15/76*** | (2006.01) |

(52) U.S. Cl.

CPC . *G06F 9/06* (2013.01); *G06F 15/76* (2013.01)

(58) Field of Classification Search

CPC .................... G06F 15/17337; G06F 15/17381

USPC ......................... 712/11, 12, 29; 711/142, 143

See application file for complete search history.

(56) References Cited

U.S. PATENT DOCUMENTS

| | | | | |
|---|---|---|---|---|
| 5,463,759 | A * | 10/1995 | Ghosh et al. | 711/134 |
| 6,047,363 | A * | 4/2000 | Lewchuk | 711/213 |
| 2004/0103218 | A1 * | 5/2004 | Blumrich et al. | 709/249 |
| 2006/0136605 | A1 * | 6/2006 | Olukotun | 710/1 |
| 2007/0143550 | A1 * | 6/2007 | Rajwar et al. | 711/146 |
| 2008/0126750 | A1 * | 5/2008 | Sistla | 712/30 |
| 2008/0285458 | A1 * | 11/2008 | Lysne | 370/238 |
| 2009/0006808 | A1 * | 1/2009 | Blumrich et al. | 712/12 |

OTHER PUBLICATIONS

Ajima, "TOFU: A 6D Mesh/Torus Interconnect for Exascale Computers", Nov. 9, IEEE Computer, vol. 42, Issue 11, p. 36-40.*

* cited by examiner

*Primary Examiner* — Andrew Caldwell
*Assistant Examiner* — Yuqing Xiao
(74) *Attorney, Agent, or Firm* — Scully, Scott, Murphy & Presser, P.C.; Daniel P. Morris, Esq.

(57) ABSTRACT

A Multi-Petascale Highly Efficient Parallel Supercomputer of 100 petaOPS-scale computing, at decreased cost, power and footprint, and that allows for a maximum packaging density of processing nodes from an interconnect point of view. The Supercomputer exploits technological advances in VLSI that enables a computing model where many processors can be integrated into a single Application Specific Integrated Circuit (ASIC). Each ASIC computing node comprises a system-on-chip ASIC utilizing four or more processors integrated into one die, with each having full access to all system resources and enabling adaptive partitioning of the processors to functions such as compute or messaging I/O on an application by application basis, and preferably, enable adaptive partitioning of functions in accordance with various algorithmic phases within an application, or if I/O or other processors are underutilized, then can participate in computation or communication nodes are interconnected by a five dimensional torus network with DMA that optimally maximize the throughput of packet communications between nodes and minimize latency.

41 Claims, 254 Drawing Sheets

| Page Size (1402) | log2 (page size) (1404) | Bits used in TLB Matching (1406) | EPN bits (1408) | Exclusion range bits (LSB) (1410) |
|---|---|---|---|---|
| (*) 4KB = 2^12 byte | 12 | 52=64-12 | 0:51 | No unused bits |
| (*) 64KB = 2^16 byte | 16 | 48=64-16 | 0:47 | 48:51 |
| (*) 1MB = 1024 KB = 2^20 byte | 20 | 44=64-20 | 0:43 | 44:51 |
| (*) 16MB = 2^24 byte | 24 | 40=64-24 | 0:39 | 40:51 |
| (*) 1GB = 2^30 byte | 30 | 34=64-30 | 0:33 | 34:51 |

* = page sizes supported by the A2 processor core

FIG. 2-1-4

TOTAL TIME = A1 + P1 + P2 CYCLES

MSYNC GENERATION TAGS OF L2 QUEUE ENTRIES ARE DECODED INTO SINGLE BITS AND OR'D TO YIELD A BIT VECTOR OF MSYNCS STILL IN FLIGHT

HIGH LEVEL CONNECTIVITY OF GLOBAL GENERATION COUNTER MODULE

OPERATIONS RELATING TO MEMORY CONSISTENCY

65102

| WORD (8 BYTE) NUMBER | BYTE NUMBER | FUNCTION | |
|---|---|---|---|
| 0 | 0 - 3 | PREFETCH ONLY | 65411 |
| | 4 - 7 | SET MESSAGE INTERRUPT | 65412 |
| 1 | 8 - 15 | INJECTION PAYLOAD STARTING ADDRESS | 65413 |
| 2 | 16 - 23 | MESSAGE LENGTH | 65414 |
| 3 | 24 - 31 | TORUS INJECTION FIFO MAP | 65415 |
| 4 - 7 | 32 - 63 | PACKET HEADER | 65410 |

FIG. 5-1-8

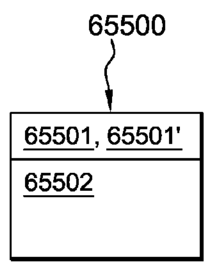

| Ref. | BYTE NUMBER | FUNCTION |
|---|---|---|
| 65510 | 0 | DATA PACKET TYPE 0x55 |
| 65511 | 1 | HINT BITS FOR DIMENSIONS A-D |
| 65512 | 2 | BIT 0-1,HINT BITS FOR E DIMENSION<br>BIT 2, ROUTE TO I/O NODE<br>BIT 3-4, RETURN FORM I/O NODE, "01" USE TORUS PORT 6,"10" USE TORUS PORT 7, "11" USE I/O PORT<br>BIT 5, DYNAMIC<br>BIT 6, DEPOSIT<br>BIT 7, INTERRUPT |
| 65513 | 3 | BIT 0-2,VIRTUAL CHANNEL (0 DYNAMIC, 1 DETERMINISTIC (ESCAPE), 2 HIGH PRIORITY, 3 SYSTEM, 4 USER COMMWORLD, 5 USER SUBCOMMUNICATOR, 6 SYSTEM COLLECTIVE<br>BIT 3-4, ZONE ROUTING ID<br>BIT 5, STAY ON BUBBLE<br>BIT 6-7, RESERVED |
| 65514 | 4-7 | BIT 0-1,RESERVED<br>BIT 2-7, A DESTINATION ADDRESS<br>BIT 8-13, B DESTINATION ADDRESS<br>BIT 14-19, C DESTINATION ADDRESS<br>BIT 20-25, D DESTINATION ADDRESS<br>BIT 26-31, E DESTINATION ADDRESS |
| 65515 | 8 | BIT 0-1,MESSAGE UNIT PACKET TYPE ("00" FIFO, "01" PUT, "10" GET, "11" PACED-GET)<br>BIT 2, RESERVED<br>BIT 3-7, SIZE |
| 65516 | 9 | BIT 0-2, RESERVED<br>BIT 3-7, DUPLICATED SIZE |
| 65516 | 10 | LINK SEQUENCE NUMBER |
| 65516 | 11 | HEADER 8 BIT CRC |

| | BYTE NUMBER | FUNCTION |
|---|---|---|
| 65520 | 0 | DATA PACKET TYPE 0x5A |
| 65521 | 1 | BIT 0-3, COLLECTIVE OP CODE<br>"0000"=AND<br>"0001"=OR,<br>"0010"=NOR,<br>"0100"=UNSIGNED ADD, "0101"=UNSIGNED MIN, "0110"=UNSIGNED MAX,<br>"1000"=SIGNED ADD,<br>"1001"=SIGNED MIN,<br>"1010"=SIGNED MAX,<br>"1100"=FLOATING POINT ADD, "1101"= FLOATING POINT MIN, "1110"= FLOATING POINT MAX.<br>BIT 4-7, COLLECTIVE WORD LENGTH EXPONENT (N) |
| 65522 | 2 | BIT 0-3,COLLECTIVE CLASS ROUTE<br>BIT 4-6, RESERVED<br>BIT 7, INTERRUPT |
| 65523 | 3 | BIT 0-2,VIRTUAL CHANNEL (0 DYNAMIC,1 DETERMINISTIC (ESCAPE), 2 HIGH PRIORITY, 3 SYSTEM, 4 USER COMMONWORLD, 5 USER SUBCOMMUNICATOR, 6 SYSTEM COLLECTIVE)<br>BIT 3-4, COLLECTIVE TYPE ("00" BROADCAST, "11" REDUCE, "10" ALL-REDUCE, "01") RESERVED/POSSIBLE POINT-POINT OVER COLLECTIVE ROUTE<br>BIT 5-7, RESERVED |
| 65524 | 4-7 | BIT 0-1,RESERVED<br>BIT 2-7, A DESTINATION ADDRESS<br>BIT 8-13, B DESTINATION ADDRESS<br>BIT14-19, C DESTINATION ADDRESS<br>BIT20-25, D DESTINATION ADDRESS<br>BIT 26-31, E DESTINATION ADDRESS |
| 65525 | 8 | BIT 0-1, MESSAGE UNIT PACKET TYPE("00" FIFO, "01" PUT, "10" GET, "11" PACED-GET)<br>BIT 2, RESERVED<br>BIT 3 -7, SIZE |
| 65526 | | |

| BYTE NUMBER | MEMORY FIFO (65530) | DIRECT PUT (65540) | REMOTE GET (65550) |
|---|---|---|---|
| 12-13 | BIT 0-9, REC. FIFO ID<br>BIT 10, UNUSED / UNCHANGED BY THE HARDWARE<br>BIT 11-15, PUT OFFSET (MSB 5 BITS) | BIT 0-9, REC. PAYLOAD BASE ADDRESS ID<br>BIT 11-15, PUT OFFSET (MSB 5 BITS) | BIT 0-9, REMOTE GET INJECTION FIFO ID<br>BIT 10, UNUSED / UNCHANGED BY THE HARDWARE<br>BIT 11-15, UNUSED / UNCHANGED BY HARDWARE |
| 14-17 | PUT OFFSET (LSB 32 BITS) INITIAL VALUE OF PUT OFFSET IS SPECIFIED HERE BY SOFTWARE AND UPDATED FOR EACH PACKET BY THE HARDWARE | PUT OFFSET (LSB 32 BITS) INITIAL VALUE OF PUT OFFSET IS SPECIFIED HERE BY SOFTWARE AND UPDATED FOR EACH PACKET BY THE HARDWARE (65541) | UNUSED UNCHANGED BY THE HARDWARE |
| 18-19 | UNUSED / UNCHANGED BY THE HARDWARE | BIT 0-5, UNUSED<br>BIT 6-15, REC. COUNTER ID (SET BY SOFTWARE) | UNUSED / UNCHANGED BY THE HARDWARE |
| 20-21 | UNUSED / UNCHANGED BY THE HARDWARE | VALID BYTES IN PACKET PAYLOAD (FILLED IN BY HARDWARE) | UNUSED / UNCHANGED BY THE HARDWARE |
| 22-23 | UNUSED / UNCHANGED BY THE HARDWARE | UNUSED | UNUSED / UNCHANGED BY THE HARDWARE |
| 24-31 | UNUSED / UNCHANGED BY THE HARDWARE | COUNTER OFFSET (LSB 37 BITS) SET BY SOFTWARE (65542) | UNUSED / UNCHANGED BY THE HARDWARE |

| | |
|---|---|
| imFIFO START ADDRESS: | |
| imFIFO SIZE-MINUS-ONE: | |
| imFIFO HEAD POINTER: | |
| imFIFO TAIL POINTER: | |
| imFIFO DESCRIPTOR COUNTER: | |
| imFIFO FREE SPACE: | |

FIG. 5-1-11

| Byte Number | Function | Comment |
|---|---|---|
| 0 | Data Packet Type: 0 x 55 | Set by software |
| 1 | Hint bits for dimensions A-D | A-, A+, B-, B+, C-, C+, D-, D+ |
| 2 | Bit 0-1, hint bits for E dimension<br>Bit 2, Route I/O node<br>Bit 3-4, return from I/O node, "01" use torus port 6, "10" use torus port 7, "11" use I/O port<br>Bit 5, dynamic<br>Bit 6, deposit<br>Bit 7, Interrupt | The interrupt bit is set by the message unit, depending on a bit in the descriptor. It is only set for the last packet of a message (else 0) |
| 3 | Bit 0-2 virtual channel (0 dynamic, 1 deterministic (escape). 2 high priority, 3 system, 4 user commworld, 5 user subcommunicator, 6 system collective<br>Bit 3-4, zone routing id<br>Bit 5, stay on bubble<br>Bit 6-7 Reserve | Note class routes must be defined so that user commworld and system collective do not share links they actually share one physical VC |
| 4-7 | Bit 0-1 Reserve<br>Bit 2-7, A destination address<br>Bit 8-13, B destination address<br>Bit 14-19, C destination address<br>Bit 20-25, D destination address<br>Bit 26-31, E destination address | |
| 8 | Bit 0-1. message unit packet type ("00" FIFO, "01" put, "10" get, "11" paced-get)<br>Bit 2, Reserved<br>Bit 3-7, Size | Size 0 to 16: number of 32 byte data payload chunks added to header |
| 9<br><br>10<br>11 | Bit 0-2, Reserved<br>Bit 3-7, Duplicated size<br>Link sequence number<br>Header 8 bit CRC | On Injection:<br>Bits 0-4: alignment (se by MU)<br>Bits 5-13: valid bytes in payload (0 means 512, Set by MU)<br>Bits 16-23: number of 4 byte words to skip for injection checksum (set by software) |
| 12-31 | Header Unit header | |
| 32-543 | Payload Bytes | 0 to 16 payload chunks 32 bytes each |

| BITS | NAME | DESCRIPTION | RESET |
|---|---|---|---|
| 0 | inj_t0_unit_stop | injection fifo torus 0 unit stop | 0 |
| 1 | inj_t1_unit_stop | injection fifo torus 1 unit stop | 0 |
| 2 | inj_t2_unit_stop | injection fifo torus 2 unit stop | 0 |
| 3 | inj_t3_unit_stop | injection fifo torus 3 unit stop | 0 |
| 4 | inj_t4_unit_stop | injection fifo torus 4 unit stop | 0 |
| 5 | inj_t5_unit_stop | injection fifo torus 5 unit stop | 0 |
| 6 | inj_t6_unit_stop | injection fifo torus 6 unit stop | 0 |
| 7 | inj_t7_unit_stop | injection fifo torus 7 unit stop | 0 |
| 8 | inj_t8_unit_stop | injection fifo torus 8 unit stop | 0 |
| 9 | inj_t9_unit_stop | injection fifo torus 9 unit stop | 0 |
| 10 | inj_l0_unit_stop | injection fifo local 0 unit stop | 0 |
| 11 | inj_l1_unit_stop | injection fifo local 1 unit stop | 0 |
| 12 | inj_hp_unit_stop | injection fifo torus high priority unit stop | 0 |
| 13 | inj_io_unit_stop | injection fifo torus system I/O unit stop | 0 |
| 14 | inj_c0_unit_stop | injection fifo collective 0 (user) unit stop | 0 |
| 15 | inj_c1_unit_stop | injection fifo collective 1 (system) unit stop | 0 |
| 16 | rcp_t0_unit_stop | reception fifo torus 0 unit stop | 0 |
| 17 | rcp_t1_unit_stop | reception fifo torus 1 unit stop | 0 |
| 18 | rcp_t2_unit_stop | reception fifo torus 2 unit stop | 0 |
| 19 | rcp_t3_unit_stop | reception fifo torus 3 unit stop | 0 |
| 20 | rcp_t4_unit_stop | reception fifo torus 4 unit stop | 0 |
| 21 | rcp_t5_unit_stop | reception fifo torus 5 unit stop | 0 |
| 22 | rcp_t6_unit_stop | reception fifo torus 6 unit stop | 0 |
| 23 | rcp_t7_unit_stop | reception fifo torus 7 unit stop | 0 |
| 24 | rcp_t8_unit_stop | reception fifo torus 8 unit stop | 0 |
| 25 | rcp_t9_unit_stop | reception fifo torus 9 unit stop | 0 |
| 26 | rcp_l0_unit_stop | reception fifo local 0 unit stop | 0 |
| 27 | rcp_l1_unit_stop | reception fifo local 1 unit stop | 0 |
| 28 | rcp_hp_unit_stop | reception fifo torus high priority unit stop | 0 |
| 29 | rcp_io_unit_stop | reception fifo torus system I/O unit stop | 0 |
| 30 | rcp_c0_unit_stop | reception fifo collective 0 (user) unit stop | 0 |
| 31 | rcp_c1_unit_stop | reception fifo collective 1 (user) unit stop | 0 |
| 32:63 | value | control | 00000000 |

| BITS | NAME | DESCRIPTION | RESET |
|---|---|---|---|
| 0 | dcrs out | Reset all DCR registers except this one | 1 |
| 1 | inj t0 | Reset Injection fifo torus 0 | 1 |
| 2 | inj t1 | Reset Injection fifo tours 1 | 1 |
| 3 | inj t2 | Reset Injection fifo torus 2 | 1 |
| 4 | inj t3 | Reset Injection fifo torus 3 | 1 |
| 5 | inj t4 | Reset Injection fifo torus 4 | 1 |
| 6 | inj t5 | Reset Injection fifo torus 5 | 1 |
| 7 | inj t6 | Reset Injection fifo torus 6 | 1 |
| 8 | inj t7 | Reset injection fifo torus 7 | 1 |
| 9 | inj t8 | Reset injection fifo torus 8 | 1 |
| 10 | inj t9 | Reset Injection fifo torus 9 | 1 |
| 11 | inj l0 | Reset Injection fifo local 0 | 1 |
| 12 | inj l1 | Reset Injection fifo local 1 | 1 |
| 13 | inj hp | Reset Injection fifo torus high priority | 1 |
| 14 | inj io | Reset Injection fifo torus system I/O | 1 |
| 15 | inj c0 | Reset Injection fifo collective 0 | 1 |
| 16 | inj c1 | Reset Injection fifo collective 1 | 1 |
| 17 | rcp t0 | Reset reception fifo torus 0 | 1 |
| 18 | rcp t1 | Reset reception fifo torus 1 | 1 |
| 19 | rcp t2 | Reset reception fifo torus 2 | 1 |
| 20 | rcp t3 | Reset reception fifo torus 3 | 1 |
| 21 | rcp t4 | Reset reception fifo torus 4 | 1 |
| 22 | rcp t5 | Reset reception fifo torus 5 | 1 |
| 23 | rcp t6 | Reset reception fifo torus 6 | 1 |
| 24 | rcp t7 | Reset reception fifo torus 7 | 1 |
| 25 | rcp t8 | Reset reception fifo torus 8 | 1 |
| 26 | rcp t9 | Reset reception fifo torus 9 | 1 |
| 27 | rcp l0 | Reset reception fifo local 0 | 1 |
| 28 | rcp l1 | Reset reception fifo local 1 | 1 |
| 29 | rcp hp | Reset reception fifo torus high priority | 1 |
| 30 | rcp io | Reset reception fifo torus system I/O | 1 |
| 31 | rcp c0 | Reset reception fifo collective 0 | 1 |
| 32 | rcp c1 | Reset reception fifo collective 1 | 1 |
| 32:63 | Reserved | Write data is ignored. Read data will be zero | 00000000 |

| BITS | NAME | DESCRIPTION | RESET |
|---|---|---|---|
| 0 | re_link_stop | receiver link stop, shutoff incoming link from SerDes ports | 0 |
| 1 | se_link_stop | sender link stop, shutoff outgoing link, sending IDLEs to SerDes | 0 |
| 2 | re_unit_stop | receiver unit stop | 0 |
| 3 | se_unit_stop | sender unit stop | 0 |
| 4 | se_retrans_stop | sender retransmission stop | 0 |
| 5 | se_drop_pkt_usr | sender drop user packets | 0 |
| 6 | se_drop_pkt_sys | sender drop system packets | 0 |
| 7 | re_disable_hdrchk | receiver disable complex header checker | 0 |
| 8:63 | value | control 0 for unit stop, drop packets, etc. | 00000000000000 |

FIG. 5-4-5C

PROCESSING UNIT COMPONENTS AND CONNECTIVITY

The root node coordinate for the x dimension is 2

The root node coordinate for the y dimension is 2

In logical tree B, the packets change dimension at the same nodes as the tree on the entire plane In logical tree A, the packets change from X to Y at the edge of the sub rectangle

RECEIVER LOGIC BLOCKS

NETWORK SENDER LOGIC BLOCK DIAGRAM

| BYTE NUMBER | FUNCTION |
|---|---|
| 0 | DATA PACKET TYPE: 0x5A |
| 1 | BIT 0-3, COLLECTIVE OP CODE<br>"0000"=AND, "0001"=OR, "0010"=XOR,<br>"0100"=UNSIGNED ADD, "0101"=UNSIGNED MIN, "0110"=UNSIGNED MAX,<br>"1000"=SIGNED ADD, "1001"=SIGNED MIN, "1010"=SIGNED MAX,<br>"1100"=FLOATING POINT ADD, "1101"=FLOATING POINT MIN, "1110"=FLOATING POINT MAX<br>BIT 4-7, COLLECTIVE WORD LENGTH |
| 2 | BIT 0-3, COLLECTIVE CLASS ROUTE<br>BIT 4-6, RESERVED<br>BIT 7, INTERRUPT |
| 3 | BIT 0-2, VIRTUAL CHANNEL (0 DYNAMIC, 1 DETERMINISTIC, 2 HIGH PRIORITY, 3 SYSTEM, 4 USER COLLECTIVE Comm_World, 5 USER COLLECTIVE SUB-COMMUNICATOR, 6 SYSTEM COLLECTIVE)<br>BIT 3-4, COLLECTIVE TYPE ("00" BROADCAST, "11" REDUCE, "10" ALL-REDUCE, "01" RESERVED)<br>BIT 5-7, RESERVED |
| 4-7 | BIT 0-1, RESERVED<br>BIT 2-7, A DESTINATION ADDRESS<br>BIT 8-13, B DESTINATION ADDRESS<br>BIT 14-19, C DESTINATION ADDRESS<br>BIT 20-25, D DESTINATION ADDRESS<br>BIT 26-31, E DESTINATION ADDRESS |
| 8 | BIT 0-1, MESSAGE UNIT PACKET TYPE ("00" FIFO, "01" PUT, "10" GET, "11" PACED-GET)<br>BIT 2, RESERVED<br>BIT 3-7, SIZE |
| 9 | BIT 0-2, RESERVED<br>BIT 3-7, DUPLICATED SIZE |
| 10 | LINK SEQUENCE NUMBER |
| 11 | HEADER 8 BIT CRC |
| 12-31 | MESSAGING UNIT HEADER FIELDS |
| | DATA PAYLOAD, IN MULTIPLES OF 32 BYTES FROM 0 BYTES (HEADER ONLY PACKET) 32 BYTES, 64 BYTES, ETC, UP TO 512 BYTES. |

NETWORK COLLECTIVE DATA PACKET FORMAT

FIG. 6-8-6

| BYTE NUMBER | FUNCTION |
|---|---|
| 0 | DATA PACKET TYPE: 0x55 |
| 1 | HINT BITS FOR DIMENSIONS A-D |
| 2 | BIT 0-1, HINT BITS FOR E DIMENSION<br>BIT2, ROUTE TO I/O NODE<br>BIT 3-4, RETURN FORM I/O NODE, "01" USE TORUS PORT 6, "10" USE TORUS PORT 7, "11" USE I/O PORT<br>BIT 5, DYNAMIC<br>BIT 6, DEPOSIT<br>BIT 7, INTERRUPT |
| 3 | BIT 0-2, VIRTUAL CHANNEL (0 DYNAMIC, 1 DETERMINISTIC, 2 HIGH PRIORITY, 3 SYSTEM, 4 USER COLLECTIVE Comm_World, 5 USER COLLECTIVE SUB-COMMUNICATOR, 6 SYSTEM COLLECTIVE<br>BIT 3-4, ZONE ROUTING ID<br>BIT 5, STAY ON BUBBLE<br>BIT 6-7, RESERVED |
| 4-7 | BIT 0-1, RESERVED<br>BIT 2-7, A DESTINATION ADDRESS<br>BIT 8-13, B DESTINATION ADDRESS<br>BIT 14-19, C DESTINATION ADDRESS<br>BIT 20-25, D DESTINATION ADDRESS<br>BIT 26-31, E DESTINATION ADDRESS |
| 8 | BIT 0-1, MESSAGE UNIT PACKET TYPE ("00" FIFO, "01" PUT, "10" GET)<br>BIT 2, RESERVED<br>BIT 3-7, SIZE |
| 9 | BIT 0-2, RESERVED<br>BIT 3-7, DUPLICATED SIZE |
| 10 | LINK SEQUENCE NUMBER |
| 11 | HEADER 8 BIT CRC |
| 12-31 | MESSAGING UNIT HEADER FIELDS |
| | DATA PAYLOAD, IN MULTIPLES OF 32 BYTES FROM 0 BYTES (HEADER ONLY PACKET) 32 BYTES, 64 BYTES, ETC, UP TO 512 BYTES |

NETWORK DATA PACKET FORMAT FOR POINT TO POINT PACKETS

FIG. 6-8-7

CENTRAL GLOBAL BARRIER LOGIC

COLLECTIVE OR GLOBAL BARRIER CLASS MAP, 2-D EXAMPLE

PROCESSOR CHIP WITH CLOCK STOP TIMER AND ABILITY TO READ OR SET INTERNAL STATE

STATE EXTRACTION FROM SYSTEM USING REDUCIBLE OPERATION

94500

HISTORY TABLE

| BLOCK NAME | VOLTAGE | FREQUENCY | TIME STAMP | SWITCH FACTORS | AGING SENSOR READING | THERMAL SENSOR READING |
|---|---|---|---|---|---|---|
| CORE 0 | 0.8V | 1.2Ghz | JAN 2ND 2009, 13:30:01 | 0.35 | 0.73V | 75° CELSIUS |
| CORE 1 | 0.85V | 1.6Ghz | JAN 2ND 2009, 13:30:02 | 0.17 | 0.74V | 85° CELSIUS |

| BREAK-EVEN CONDITIONS | STATIC TURN - OFF LIST (ORDERED LEFT TO RIGHT) |
|---|---|
| IF (COUNT[CORE 2] > COUNT[CORE 1] - 100 AND COUNT[CORE1] <= COUNT[CORE 3]) | TURN OFF CORE1, CORE 2, CORE 3 |
| IF (COUNT[CORE 2] <= COUNT[CORE 1] - 100 AND COUNT[CORE1] > COUNT[CORE 3]) | TURN OFF CORE 2, CORE 3, CORE 1 |
| IF (COUNT[CORE 2] > COUNT[CORE 1] - 100 AND COUNT[CORE1] > COUNT[CORE 3]) | TURN OFF CORE 3, CORE 1, CORE 2 |
| IF (COUNT[CORE 2] > COUNT[CORE 1] - 100 AND COUNT[CORE1] <= COUNT[CORE 3]) | TURN OFF CORE 1, CORE 3, CORE 2 |
| IF (COUNT[CORE 2] <=COUNT[CORE 1] - 100 AND COUNT[CORE1] <= COUNT[CORE 3]) | TURN OFF CORE 2, CORE 1, CORE 3 |
| IF (COUNT[CORE 2] > COUNT[CORE 1] - 100 AND COUNT[CORE1] > COUNT[CORE 3]) | TURN OFF CORE 3, CORE 2, CORE 1 |

FIG. 7-4-4

MULTI-PETASCALE HIGHLY EFFICIENT PARALLEL SUPERCOMPUTER

CROSS-REFERENCE TO RELATED APPLICATIONS

The present disclosure claims priority from U.S. Provisional Patent Application Ser. No. 61/293,611, filed on Jan. 8, 2010, and additionally claims priority from U.S. Provisional Application Ser. No. 61/295,669, filed Jan. 15, 2010, and additionally claims priority from U.S. Provisional Application Ser. No. 61/299,911, filed Jan. 29, 2010 the entire contents and disclosure of each of which is expressly incorporated by reference herein as if fully set forth herein.

The present invention further relates to following commonly-owned, co-pending U.S. patent applications, the entire contents and disclosure of each of which is expressly incorporated by reference herein as if fully set forth herein. U.S. Pat. No. 8,275,954, for "USING DMA FOR COPYING PERFORMANCE COUNTER DATA TO MEMORY"; U.S. Pat. No. 8,275,964 for "HARDWARE SUPPORT FOR COLLECTING PERFORMANCE COUNTERS DIRECTLY TO MEMORY"; U.S. patent application Ser. No. 12/684,190 for "HARDWARE ENABLED PERFORMANCE COUNTERS WITH SUPPORT FOR OPERATING SYSTEM CONTEXT SWITCHING"; U.S. Pat. No. 8,468,275, for "HARDWARE SUPPORT FOR SOFTWARE CONTROLLED FAST RECONFIGURATION OF PERFORMANCE COUNTERS"; U.S. Pat. No. 8,347,001, for "HARDWARE SUPPORT FOR SOFTWARE CONTROLLED FAST MULTIPLEXING OF PERFORMANCE COUNTERS"; U.S. patent application Ser. No. 12/697,799, for "CONDITIONAL LOAD AND STORE IN A SHARED CACHE"; U.S. Pat. No. 8,595,389, for "DISTRIBUTED PERFORMANCE COUNTERS"; U.S. Pat. No. 8,103,910, for "LOCAL ROLLBACK FOR FAULT-TOLERANCE IN PARALLEL COMPUTING SYSTEMS"; U.S. Pat. No. 8,447,960, for "PROCESSOR WAKE ON PIN"; U.S. Pat. No. 8,268,389, for "PRECAST THERMAL INTERFACE ADHESIVE FOR EASY AND REPEATED, SEPARATION AND REMATING"; U.S. Pat. No. 8,359,404, for "ZONE ROUTING IN A TORUS NETWORK"; U.S. patent application Ser. No. 12/684,852, for "PROCESSOR WAKEUP UNIT"; U.S. Pat. No. 8,429,377, for "TLB EXCLUSION RANGE"; U.S. Pat. No. 8,356,122, for "DISTRIBUTED TRACE USING CENTRAL PERFORMANCE COUNTER MEMORY"; U.S. patent application Ser. No. 13/008,602, for "PARTIAL CACHE LINE SPECULATION SUPPORT"; U.S. Pat. No. 8,473,683, for "ORDERING OF GUARDED AND UNGUARDED STORES FOR NO-SYNC I/O"; U.S. Pat. No. 8,458,267, for "DISTRIBUTED PARALLEL MESSAGING FOR MULTIPROCESSOR SYSTEMS"; U.S. Pat. No. 8,086,766, for "SUPPORT FOR NON-LOCKING PARALLEL RECEPTION OF PACKETS BELONGING TO THE SAME MESSAGE"; U.S. Pat. No. 8,571,834, for "OPCODE COUNTING FOR PERFORMANCE MEASUREMENT"; U.S. patent application Ser. No. 12/684,776, for "MULTI-INPUT AND BINARY REPRODUCIBLE, HIGH BANDWIDTH FLOATING POINT ADDER IN A COLLECTIVE NETWORK"; U.S. Pat. No. 8,533,399, for "CACHE DIRECTORY LOOK-UP REUSE"; U.S. Pat. No. 8,621,478, for "MEMORY SPECULATION IN A MULTI LEVEL CACHE SYSTEM"; U.S. patent application Ser. No. 13/008,583, for "METHOD AND APPARATUS FOR CONTROLLING MEMORY SPECULATION BY LOWER LEVEL CACHE"; U.S. patent application Ser. No. 12/984,308, for "MINIMAL FIRST LEVEL CACHE SUPPORT FOR MEMORY SPECULATION MANAGED BY LOWER LEVEL CACHE"; U.S. patent application Ser. No. 12/984,329, for "PHYSICAL ADDRESS ALIASING TO SUPPORT MULTI-VERSIONING IN A SPECULATION-UNAWARE CACHE"; U.S. Pat. No. 8,255,633, for "LIST BASED PREFETCH"; U.S. Pat. No. 8,347,039, for "PROGRAMMABLE STREAM PREFETCH WITH RESOURCE OPTIMIZATION"; U.S. patent application Ser. No. 13/004,005, for "FLASH MEMORY FOR CHECKPOINT STORAGE"; U.S. Pat. No. 8,359,367, for "NETWORK SUPPORT FOR SYSTEM INITIATED CHECKPOINTS"; U.S. Pat. No. 8,327,077, for "TWO DIFFERENT PREFETCH COMPLEMENTARY ENGINES OPERATING SIMULTANEOUSLY"; U.S. Pat. No. 8,364,844, for "DEADLOCK-FREE CLASS ROUTES FOR COLLECTIVE COMMUNICATIONS EMBEDDED IN A MULTI-DIMENSIONAL TORUS NETWORK"; U.S. Pat. No. 8,549,363, for "IMPROVING RELIABILITY AND PERFORMANCE OF A SYSTEM-ON-A-CHIP BY PREDICTIVE WEAR-OUT BASED ACTIVATION OF FUNCTIONAL COMPONENTS"; U.S. Pat. No. 8,571,847, for "A SYSTEM AND METHOD FOR IMPROVING THE EFFICIENCY OF STATIC CORE TURN OFF IN SYSTEM ON CHIP (SoC) WITH VARIATION"; U.S. patent application Ser. No. 12/697,043, for "IMPLEMENTING ASYNCHRONOUS COLLECTIVE OPERATIONS IN A MULTI-NODE PROCESSING SYSTEM"; U.S. patent application Ser. No. 13/008,546, for "MULTIFUNCTIONING CACHE"; U.S. patent application Ser. No. 12/697,175 for "I/O ROUTING IN A MULTIDIMENSIONAL TORUS NETWORK"; U.S. Pat. No. 8,370,551 for ARBITRATION IN CROSSBAR FOR LOW LATENCY; U.S. Pat. No. 8,312,193 for EAGER PROTOCOL ON A CACHE PIPELINE DATAFLOW; U.S. Pat. No. 8,521,990 for EMBEDDED GLOBAL BARRIER AND COLLECTIVE IN A TORUS NETWORK; U.S. Pat. No. 8,412,974 for GLOBAL SYNCHRONIZATION OF PARALLEL PROCESSORS USING CLOCK PULSE WIDTH MODULATION; U.S. patent application Ser. No. 12/796,411 for IMPLEMENTATION OF MSYNC; U.S. patent application Ser. No. 12/796,389 for NON-STANDARD FLAVORS OF MSYNC; U.S. patent application Ser. No. 12/696,817 for HEAP/STACK GUARD PAGES USING A WAKEUP UNIT; U.S. Pat. No. 8,527,740 for MECHANISM OF SUPPORTING SUB-COMMUNICATOR COLLECTIVES WITH O(64) COUNTERS AS OPPOSED TO ONE COUNTER FOR EACH SUB-COMMUNICATOR; and U.S. Pat. No. 8,595,554 for REPRODUCIBILITY IN BGQ.

STATEMENT OF GOVERNMENT INTEREST

This invention was made with Government support under subcontract number B554331 awarded by the Department of Energy. The Government has certain rights in this invention.

BACKGROUND

The present invention relates generally relates to the formation of a 100 petaflop scale, low power, and massively parallel supercomputer.

This invention relates generally to the field of high performance computing (HPC) or supercomputer systems and architectures of the type such as described in the IBM Journal of Research and Development, Special Double Issue on Blue Gene, Vol. 49, Numbers 2/3, March/May 2005; and, IBM Journal of Research and Development, Vol. 52, 49, Numbers 1 and 2, January/March 2008, pp. 199-219.

Massively parallel computing structures (also referred to as "supercomputers") interconnect large numbers of compute nodes, generally, in the form of very regular structures, such as mesh, torus, and tree configurations. The conventional approach for the most cost/effective scalable computers has been to use standard processors configured in uni-processors or symmetric multiprocessor (SMP) configurations, wherein the SMPs are interconnected with a network to support message passing communications. Today, these supercomputing machines exhibit computing performance achieving 1-3 petaflops (see http://www.top500.org/June 2009). However, there are two long standing problems in the computer industry with the current cluster of SMPs approach to building supercomputers: (1) the increasing distance, measured in clock cycles, between the processors and the memory (the memory wall problem) and (2) the high power density of parallel computers built of mainstream uni-processors or symmetric multi-processors (SMPs').

In the first problem, the distance to memory problem (as measured by both latency and bandwidth metrics) is a key issue facing computer architects, as it addresses the problem of microprocessors increasing in performance at a rate far beyond the rate at which memory speeds increase and communication bandwidth increases per year. While memory hierarchy (caches) and latency hiding techniques provide excellent solutions, these methods necessitate the applications programmer to utilize very regular program and memory reference patterns to attain good efficiency (i.e., minimizing instruction pipeline bubbles and maximizing memory locality).

In the second problem, high power density relates to the high cost of facility requirements (power, cooling and floor space) for such peta-scale computers.

It would be highly desirable to provide a supercomputing architecture that will reduce latency to memory, as measured in processor cycles, exploit locality of node processors, and optimize massively parallel computing at ~100 petaOPS-scale at decreased cost, power, and footprint.

It would be highly desirable to provide a supercomputing architecture that exploits technological advances in VLSI that enables a computing model where many processors can be integrated into a single ASIC.

It would be highly desirable to provide a supercomputing architecture that comprises a unique interconnection of processing nodes for optimally achieving various levels of scalability.

It would be highly desirable to provide a supercomputing architecture that comprises a unique interconnection of processing nodes for efficiently and reliably computing global reductions, distribute data, synchronize, and share limited resources.

SUMMARY

A novel massively parallel supercomputer capable of achieving 107 petaflop with up to 8,388,608 cores, or 524,288 nodes, or 512 racks is provided. It is based upon System-On-a-Chip technology, where each processing node comprises a single Application Specific Integrated Circuit (ASIC). The ASIC nodes are interconnected by a five-dimensional torus networks that optimally maximize packet communications throughput and minimize latency. The 5-D network includes a DMA (direct memory access) network interface.

In one aspect, there is provided a new class of massively-parallel, distributed-memory scalable computer architectures for achieving 100 peta-OPS scale computing and beyond, at decreased cost, power and footprint.

In a further aspect, there is provided a new class of massively-parallel, distributed-memory scalable computer architectures for achieving 100 peta-OPS scale computing and beyond that allows for a maximum packaging density of processing nodes from an interconnect point of view.

In a further aspect, there is provided an unprecedented-scale supercomputing architecture that exploits technological advances in VLSI that enables a computing model where many processors can be integrated into a single ASIC. Preferably, simple processing cores are utilized that have been optimized for minimum power consumption and capable of achieving superior price/performance to those obtainable current architectures, while having system attributes of reliability, availability, and serviceability expected of large servers. Particularly, each computing node comprises a system-on-chip ASIC utilizing four or more processors integrated into one die, with each having full access to all system resources. Many processors on a single die enables adaptive partitioning of the processors to functions such as compute or messaging I/O on an application by application basis, and preferably, enable adaptive partitioning of functions in accordance with various algorithmic phases within an application, or if I/O or other processors are underutilized, then can participate in computation or communication.

In a further aspect, there is provided an ultra-scale supercomputing architecture that incorporates a plurality of network interconnect paradigms. Preferably, these paradigms include a five dimensional torus with DMA. The architecture allows parallel processing message-passing.

In a further aspect, there is provided in an highly scalable computer architecture, key synergies that allow new and novel techniques and algorithms to be executed in the massively parallel processing arts.

In a further aspect, there is provided I/O nodes for filesystem I/O wherein I/O communications and host communications are carried out. The application can perform I/O and external interactions without unbalancing the performance of the 5-D torus nodes.

Moreover, these techniques also provide for partitioning of the massively parallel supercomputer into a flexibly configurable number of smaller, independent parallel computers, each of which retain all of the features of the larger machine. Given the tremendous scale of this supercomputer, these partitioning techniques also provide the ability to transparently remove, or map around, any failed racks or parts of racks referred to herein as "midplanes," so they can be serviced without interfering with the remaining components of the system.

In a further aspect, there is added serviceability such as Ethernet addressing via physical location, and JTAG interfacing to Ethernet.

According to yet another aspect of the invention, there is provided a scalable, massively parallel supercomputer comprising: a plurality of processing nodes interconnected in n-dimensions, each node including one or more processing elements for performing computation or communication activity as required when performing parallel algorithm operations; and, the n-dimensional network meets the bandwidth and latency requirements of a parallel algorithm for optimizing parallel algorithm processing performance.

In one embodiment, the node architecture is based upon System-On-a-Chip (SOC) Technology wherein the basic building block is a complete processing "node" comprising a single Application Specific Integrated Circuit (ASIC). When aggregated, each of these processing nodes is termed a 'Cell', allowing one to define this new class of massively parallel machine constructed from a plurality of identical cells as a "Cellular" computer. Each node preferably comprises a plurality (e.g., four or more) of processing elements each of which includes a central processing unit (CPU), a plurality of floating point processors, and a plurality of network interfaces.

The SOC ASIC design of the nodes permits optimal balance of computational performance, packaging density, low cost, and power and cooling requirements. In conjunction with novel packaging technologies, it further enables scalability to unprecedented levels The system-on-a-chip level integration allows for low latency to all levels of memory including a local main store associated with each node, thereby overcoming the memory wall performance bottleneck increasingly affecting traditional supercomputer systems. Within each node, each of multiple processing elements may be used individually or simultaneously to work on any combination of computation or communication as required by the particular algorithm being solved or executed at any point in time.

At least three modes of operation are supported. In the full virtual node mode, each of the processing cores will perform its own MPI (message passing interface) process independently. Each core is running four thread/process, and it uses a sixteenth of the memory (L2 and SDRAM) of the node, while coherence among the 64 processes within the node and across the nodes is maintained by MPI. In the full SMP, one MPI task with 64 threads (4 threads per core) is running, using the whole node memory capacity. The third mode called the mixed mode. Here 2, 4, 8, 16, and 32 processes are running 32, 16, 8, 4, and 2 threads, respectively.

Because of the torus' DMA feature, internode communications can overlap with computations running concurrently on the nodes.

With respect to the Torus network, it is configured, in one embodiment, as a 5-dimensional design supporting hypercube communication and partitioning. A 4-Dimensional design allows a direct mapping of computational simulations of many physical phenomena to the Torus network. However, higher dimensionality, 5 or 6-dimensional Toroids, which allow shorter and lower latency paths at the expense of more chip-to-chip connections and significantly higher cabling costs have been implemented in the past.

Further independent networks include an external Network (such as a 10 Gigabit Ethernet) that provides attachment of input/output nodes to external server and host computers; and a Control Network (a combination of 1 Gb Ethernet and a IEEE 1149.1 Joint Test Access Group (JTAG) network) that provides complete low-level debug, diagnostic and configuration capabilities for all nodes in the entire machine, and which is under control of a remote independent host machine, called the "Service Node". Preferably, use of the Control Network operates with or without the cooperation of any software executing on the nodes of the parallel machine. Nodes may be debugged or inspected transparently to any software they may be executing. The Control Network provides the ability to address all nodes simultaneously or any subset of nodes in the machine. This level of diagnostics and debug is an enabling technology for massive levels of scalability for both the hardware and software.

Novel packaging technologies are employed for the supercomputing system that enables unprecedented levels of scalability, permitting multiple networks and multiple processor configurations. In one embodiment, there is provided multi-node "Node Cards" including a plurality of Compute Nodes, plus optionally one or two I/O Node where the external I/O Network is enabled. In this way, the ratio of computation to external input/output may be flexibly selected by populating "midplane" units with the desired number of I/O nodes. The packaging technology permits sub-network partitionability, enabling simultaneous work on multiple independent problems. Thus, smaller development, test and debug partitions may be generated that do not interfere with other partitions.

Connections between midplanes and racks are selected to be operable based on partitioning. Segmentation creates isolated partitions; each partition owning the full bandwidths of all interconnects, providing predictable and repeatable performance. This enables fine-grained application performance tuning and load balancing that remains valid on any partition of the same size and shape. In the case where extremely subtle errors or problems are encountered, this partitioning architecture allows precise repeatability of a large scale parallel application. Partitionability, as enabled by the present invention, provides the ability to segment so that a network configuration may be devised to avoid, or map around, non-working racks or midplanes in the supercomputing machine so that they may be serviced while the remaining components continue operation.

BRIEF DESCRIPTION OF THE FIGURES

The objects, features and advantages of the present invention will become apparent to one skilled in the art, in view of the following detailed description taken in combination with the attached drawings, in which:

FIG. 2-1-1 is an overview of a memory management unit (MMU) utilized by the BlueGene parallel computing system;

FIG. 2-1-2 is a flow diagram of address translation in the IBM BlueGene parallel computing system;

FIG. 2-1-3 is a page table search logic device;

FIG. 2-1-4 is a table of page sizes and their corresponding EPN and exclusion range bits available in the BlueGene parallel computing system;

FIG. 2-1-5 is an example of prior art TLB page entries;

FIG. 2-1-6 is an example of optimized TLB page entries;

FIG. 2-1-7 is an overall architecture of a parallel computing environment using a system and method for optimizing page entries in a TLB;

FIG. 2-1-8 is an overview of the A2 processor core organization;

FIG. 3-0 illustrates in more detail a processing unit (PU) components and connectivity;

FIG. 3-1-1 illustrates a system diagram of a list prefetch engine in one embodiment;

FIG. 3-1-2 illustrates a flow chart illustrating method steps performed by the list prefetch engine in one embodiment;

FIG. 3-2-1 illustrates a flow chart illustrating method steps performed by a stream prefetch engine in one embodiment;

FIG. 3-2-2 illustrates a system diagram of a stream prefetch engine in one embodiment;

FIG. 3-3-1 illustrates a flow chart including method steps for processing load commands from a processor when data being requested may have been or be in a process of being prefetched in a parallel computing system;

FIG. 3-3-2 illustrates a system diagram for prefetching data in a parallel computing system in one embodiment;

FIG. 3-3-3 illustrates a state machine that operates the look-up engine in one embodiment.

FIG. 3-4-2 depicts, in greater detail, a processing unit (PU) including at least one processor core, a floating point unit and an optional pre-fetch cache and a communication path between processor and a memory in the system shown in FIG. 1;

FIG. 3-4-3 illustrates further details of the cross-bar interconnect including arbitration device implementing one or more state machines for arbitrating read and write requests received at the crossbar 60 from each of the PU's, for routing to/from the L2 cache slices according to one embodiment;

FIG. 3-4-4 depicts the first step processing performed at arbitration device 22100, and performed by arbitration logic at each slave arbitration slice;

FIG. 3-4-5 depicts the second step processing 22250 performed at arbitration device 100 and performed by arbitration logic at each master arbitration slice;

FIG. 3-4-6 illustrates a signal timing diagram for signals processed routed within of arbitration device 22100 of FIG. 3-4-3 using one priority control signal;

FIG. 3-4-7 illustrates a signal timing diagram for signals processed routed within of arbitration device 22100 of FIG. 3-4-3 using two priority control signals;

FIG. 3-5-1 is a diagram illustrating communications between master devices and slave devices via a cross bar switch;

FIG. 3-5-2 is a flow diagram illustrating a cross bar functionality in one embodiment;

FIG. 3-5-3 illustrates functions of an arbitration slice for a slave device in one embodiment;

FIG. 3-5-4 illustrates functions of an arbitration slice for a master device in one embodiment;

FIG. 3-5-5 shows an example of cycle time taken for communicating between a master and a slave arbitration device;

FIG. 3-5-6 shows an example of cycle time spent for communicating between a master and a slave using eager scheduling;

FIG. 4-0 illustrates in more detail a L2-cache and DDR Controller components and connectivity according to one embodiment;

FIG. 4-1-1 illustrates a parallel computing system in one embodiment;

FIG. 4-1-2 illustrates a parallel computing system in a further embodiment;

FIG. 4-1-3 illustrates a messaging unit in one embodiment;

FIG. 4-1-4 illustrates a flow chart including method steps for processing store instructions in one embodiment;

FIG. 4-1-5 illustrates another flow chart including method steps for processing store instructions in one embodiment;

FIG. 4-2-2 shows the control portion of an L2 slice;

FIG. 4-2-3A shows a producer thread and a consumer thread;

FIG. 4-2-3B show the threads of FIG. 4-2-3A with an MSYNC instruction added;

FIG. 4-2-4 shows what happens in the system in response to the instructions of FIG. 4-2-3A;

FIG. 4-2-5 shows conceptually the operation of an OR reduce tree for communicating generation usage from devices requesting memory accesses;

FIG. 4-2-5A shows more about the OR tree of FIG. 4-2-5;

FIG. 4-2-5B shows creation of a vector within a unit processing memory access requests;

FIG. 4-2-6 shows a central msync unit;

FIG. 4-2-7 is a flowchart relating to use of a generation counter and a reclaim pointer;

FIG. 4-2-8 is a flow chart relating to update of a reclaim pointer;

FIG. 4-2-9 is a conceptual diagram showing operation of a memory synchronization interface unit;

FIG. 4-2-10 is a conceptual diagram showing a detector from the memory synchronization interface;

FIG. 4-2-11 shows flowcharts relating to how data producer and consumer threads communicate via the memory synchronization interface to determine when data is ready for exchange between threads;

FIG. 4-2-12 shows a Venn diagram with different levels of msync;

FIG. 4-2-13 shows a delay circuit;

FIG. 4-2-14 shows some circuitry within the UP;

FIG. 4-2-15 illustrates ordering constraints in threads running in parallel;

FIG. 4-3-2 is a block diagram of one embodiment of logic external to a processing core for enforcing single load-reserve reservations for four threads;

FIG. 4-3-3 is a block diagram of another embodiment of logic external to a processing core for enforcing single load-reserve reservations for four threads;

FIG. 4-3-4 is a block diagram of one embodiment of storage for load-reserve reservations at a shared memory (or a cache for the shared memory);

FIG. 4-3-5 illustrates logic to reduce dynamic power consumption by forcing a bus of signals to the zero state when a group of valid signals is all zero;

FIG. 4-3-6 is a block diagram of another embodiment of storage for load-reserve reservations at a shared memory (or cache for the shared memory), where thread IDs are stored in order to allow the storage to be shared;

FIG. 4-4-2 shows a map of a cache slice;

FIG. 4-4-3 is a conceptual diagram showing different address representations at different points in a communications pathway;

FIG. 4-4-4 shows a four piece "physical" address space used by the L1D cache;

FIG. 4-4-5 is a conceptual diagram of operations in a TLB;

FIG. 4-4-6 shows address formatting used by the switch to locate the slice;

FIG. 4-4-7 shows an address format;

FIG. 4-4-8 shows a switch for switching between addressing modes;

FIG. 4-4-9 shows a flowchart of a method for using the embodiment of FIG. 4-4-8;

FIG. 4-4-10 is a flowchart showing handling of a race condition;

FIG. 4-5-1 shows an overview of the system within which a cache within a cache may be implemented;

FIG. 4-5-3 is a schematic of the control unit of an L2 slice;

FIG. 4-5-4 shows a request queue and retaining data associated with a previous memory access request;

FIG. 4-5-5 shows interaction between the directory pipe and directory SRAM;

FIG. 4-6-1 illustrates a portion of a parallel computing environment 35100 employing the system and method for performing various store-operate instructions in one embodiment;

FIGS. 4-6-2A and 4-6-2B illustrate a system diagram for implementing "StoreOperateCoherenceOnZero" instruction in one embodiment;

FIGS. 4-6-3A and 4-6-3B illustrate a system diagram for implementing "StoreOperateCoherenceOnPredecessor" instruction in one embodiment;

FIGS. 4-6-4A and 4-6-4B illustrate a system diagram for implementing "StoreOperateCoherenceThroughZero" instruction in one embodiment;

FIG. 4-6-5 illustrates an exemplary instruction in one embodiment;

FIG. 4-6-6 illustrates a system diagram for implementing "StoreOperateCoherenceOnZero" instruction in another embodiment;

FIG. 4-7-1A shows some software running in a distributed fashion on the nodechip;

FIG. 4-7-1B shows a timing diagram with respect to TM type speculative execution;

FIG. 4-7-1B-2 shows a timing diagram with respect to TLS type speculative execution;

FIG. 4-7-1C shows a timing diagram with respect to Rollback execution;

FIG. 4-7-2 shows an overview of the L2 cache with thread management circuitry;

FIG. 4-7-2B shows address formatting used by the switch to locate the slice;

FIG. 4-7-3 shows features of an embodiment of the control section of a cache slice according to a further embodiment;

FIG. 4-7-3C shows structure of the directory SRAM;

FIG. 4-7-3D shows more about encoding for the reader set aspect of the directory;

FIG. 4-7-3E shows merging line versions and functioning of the current flag from the basic SRAM;

FIG. 4-7-3F shows an overview of conflict checking for TM and TLS;

FIG. 4-7-3G illustrates an example of some aspects of conflict checking;

FIG. 4-7-3H is a flowchart relating to Write after Write ("WAW") and Read after Write ("RAW") conflict checking;

FIG. 4-7-3I-1 is a flowchart showing one aspect of Write after Read ("WAR") conflict checking;

FIG. 4-7-3I-2 is a flowchart showing another aspect of WAR conflict checking;

FIG. 4-7-4 shows a schematic of global thread management;

FIG. 4-7-4A shows more detail of operation of the L2 central unit;

FIG. 4-7-4B shows registers in a state table;

FIG. 4-7-4C shows allocation of ID's;

FIG. 4-7-4D shows an ID space and action of an allocation pointer;

FIG. 4-7-4E shows a format for a conflict register;

FIG. 4-7-5 is a flowchart of the life cycle of a speculation ID;

FIG. 4-7-6 shows some steps regarding committing and invalidating IDs;

FIG. 4-7-7 is a flowchart of operations relating to a transactional memory model;

FIG. 4-7-8 is a flowchart showing assigning domains to different speculative modes;

FIG. 4-7-9 is a flowchart showing operations relating to memory consistency;

FIG. 4-7-10 is flowchart showing operations relating to commit race window handling;

FIG. 4-7-11 is a flowchart showing operations relating to committed state for TM;

FIG. 4-7-11A is a flow chart showing operations relating to committed state for TLS;

FIG. 4-7-12 shows an aspect of version aggregation;

FIG. 4-8-6 shows operation of a cache data array access pipe with respect to atomicity related functions;

FIG. 4-8-7 shows interaction between code sections embodying some different approaches to atomicity;

FIG. 4-8-8 is a flowchart relating to queuing atomic instructions;

FIG. 5-0 illustrates in more detail a Network Interface and DMA components and connectivity according to one embodiment;

FIG. 5-1-2 is a top level architecture of the Messaging Unit 65100 interfacing with the Network Interface Unit 150 according to one embodiment;

FIG. 5-1-3 is a high level schematic of the injection side 65100A of the Messaging Unit 65100 employing multiple parallel operating DMA engines for network packet injection;

FIG. 5-1-3A is a detailed high level schematic of the injection side 65100A of the Messaging Unit 65100, depicting injection side methodology according to one embodiment;

FIG. 5-1-4 is a block diagram describing a method that is performed on each injection memory FIFO (imFIFO) 65099, which is a circular buffer in the associated memory system to store descriptors, for processing the descriptors for injection operations;

FIG. 5-1-5A shows an injection memory FIFO 65099 having empty slots 65103 for receiving message descriptors;

FIG. 5-1-5B shows that a processor has written a single message descriptor 65102 into an empty slot 103 in an injection memory FIFO 65099 and FIG. 5-1-5C shows updating a new tail pointer for MU injection message processing;

FIGS. 5-1-5D and 5-1-5E show adding a new descriptor to a non-empty imFIFO, e.g., imFIFO 65099';

FIG. 5-1-6 is a high level schematic of the Messaging Unit for the reception side according to one embodiment;

FIG. 5-1-6A depicts operation of the MU device 65100B-1 for processing received memory FIFO packets according to one embodiment;

FIG. 5-1-6B depicts operation of the MU device 65100B-2 for processing received direct put packets according to one embodiment;

FIG. 5-1-6C depicts operation of the MU device 65100B-3 for processing received remote get packets according to one embodiment;

FIG. 5-1-7 depicts a methodology 65300 for describing the operation of an rME for packet reception according to one embodiment;

FIG. 5-1-8 depicts an example layout of a message descriptor 65102.

FIG. 5-1-9 depicts a layout of a packet header 65500 communicated in the system of the present invention including first header portions 65501 depicted in FIG. 5-1-9A and alternate first header portion 65501' depicted in FIG. 5-1-9B;

FIG. 5-1-10 depicts exemplary configuration of remaining bytes of the each network packet or collective packet header of FIGS. 5-1-9A, 5-1-9B;

FIG. 5-1-11 depicts an example ICSRAM structure and contents therein according to one embodiment;

FIG. 5-1-12 depicts an algorithm for arbitrating requests for processing packets to be injected by iMEs according to one embodiment;

FIG. 5-1-13 depicts a flowchart showing implementation of byte alignment according to one embodiment;

FIGS. 5-1-14A to 5-1-14D depict a packet payload storage 16 Byte alignment example according to one embodiment;

FIG. 5-1-15 illustrates interrupt signals that can be generated from the MU for receipt at the processor cores at a compute node;

Figures 0, 1:
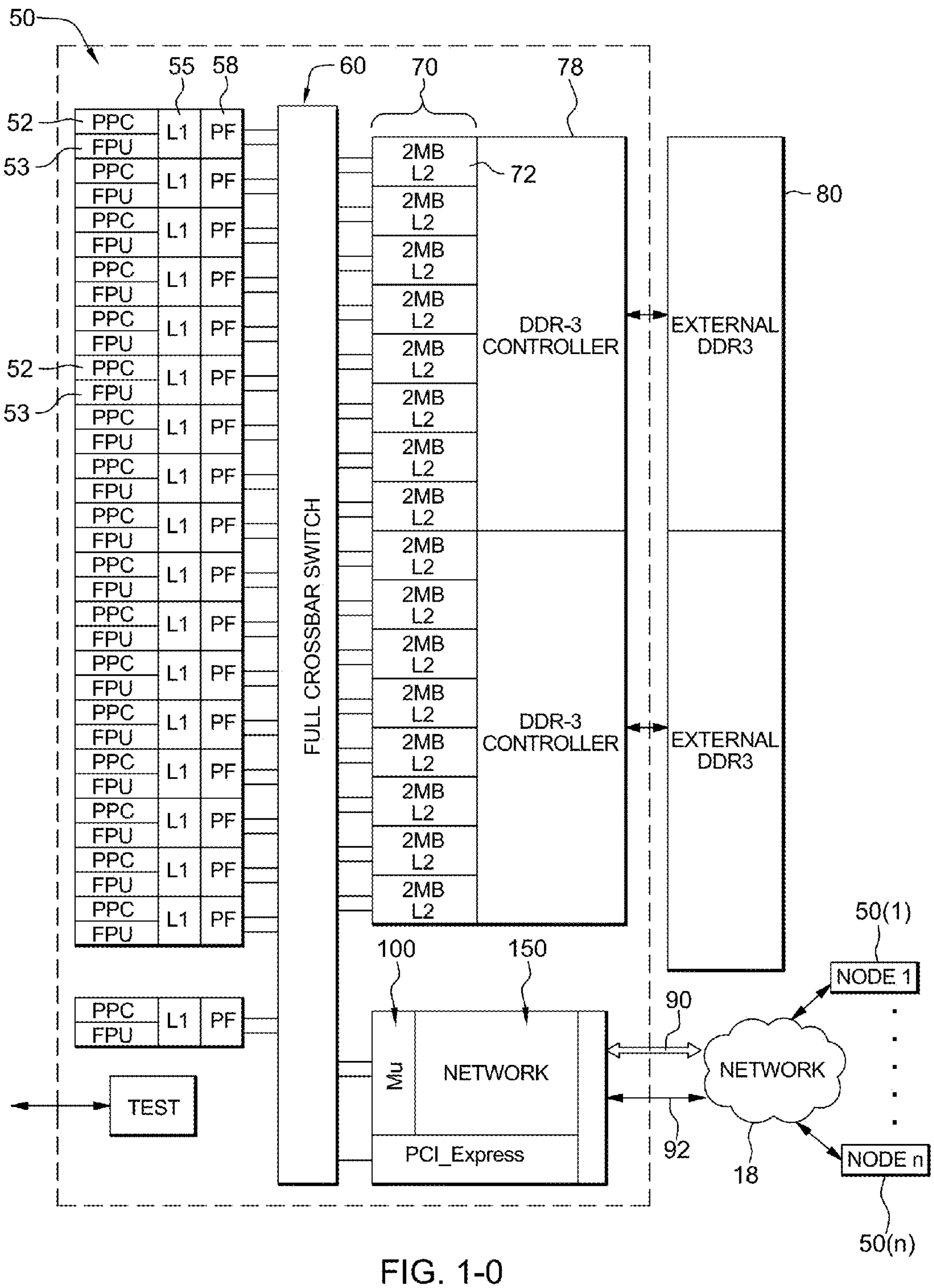
FIG. 1-0 illustrates a hardware configuration of a basic node of this present massively parallel supercomputer architecture; and, FIG. 2-0 illustrates in more detail a processing core.
Figures 0, 2:
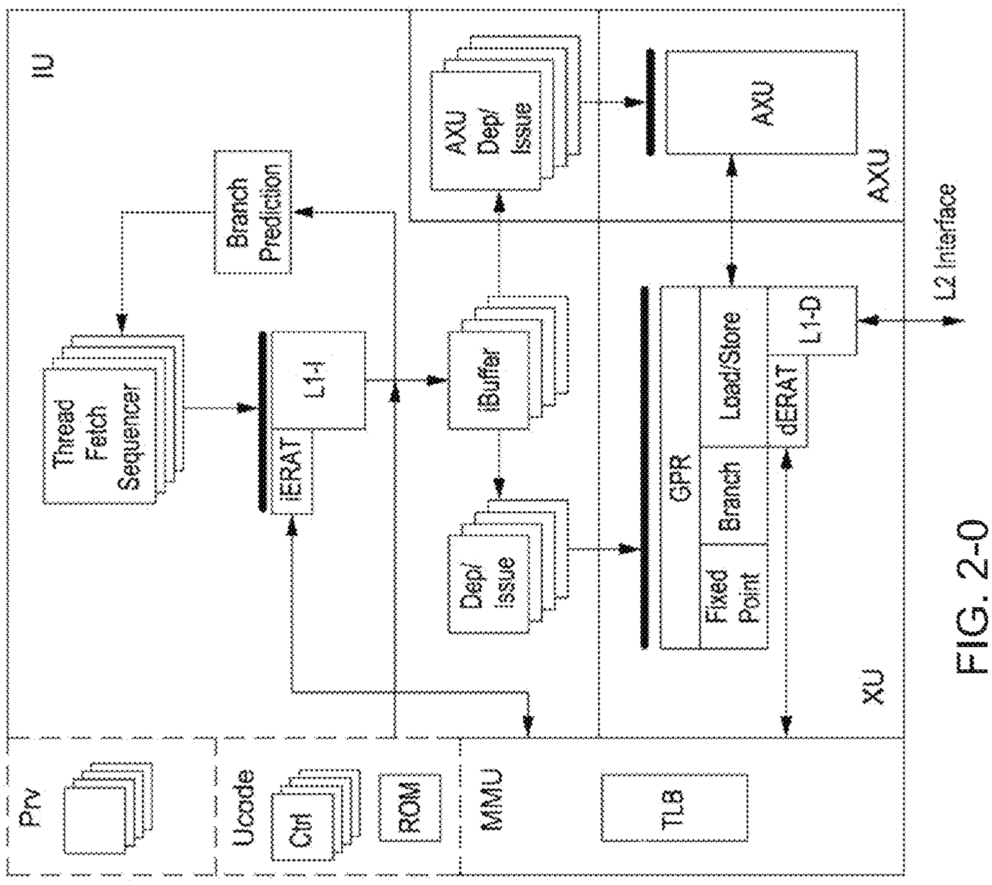
Figures 1, 2:
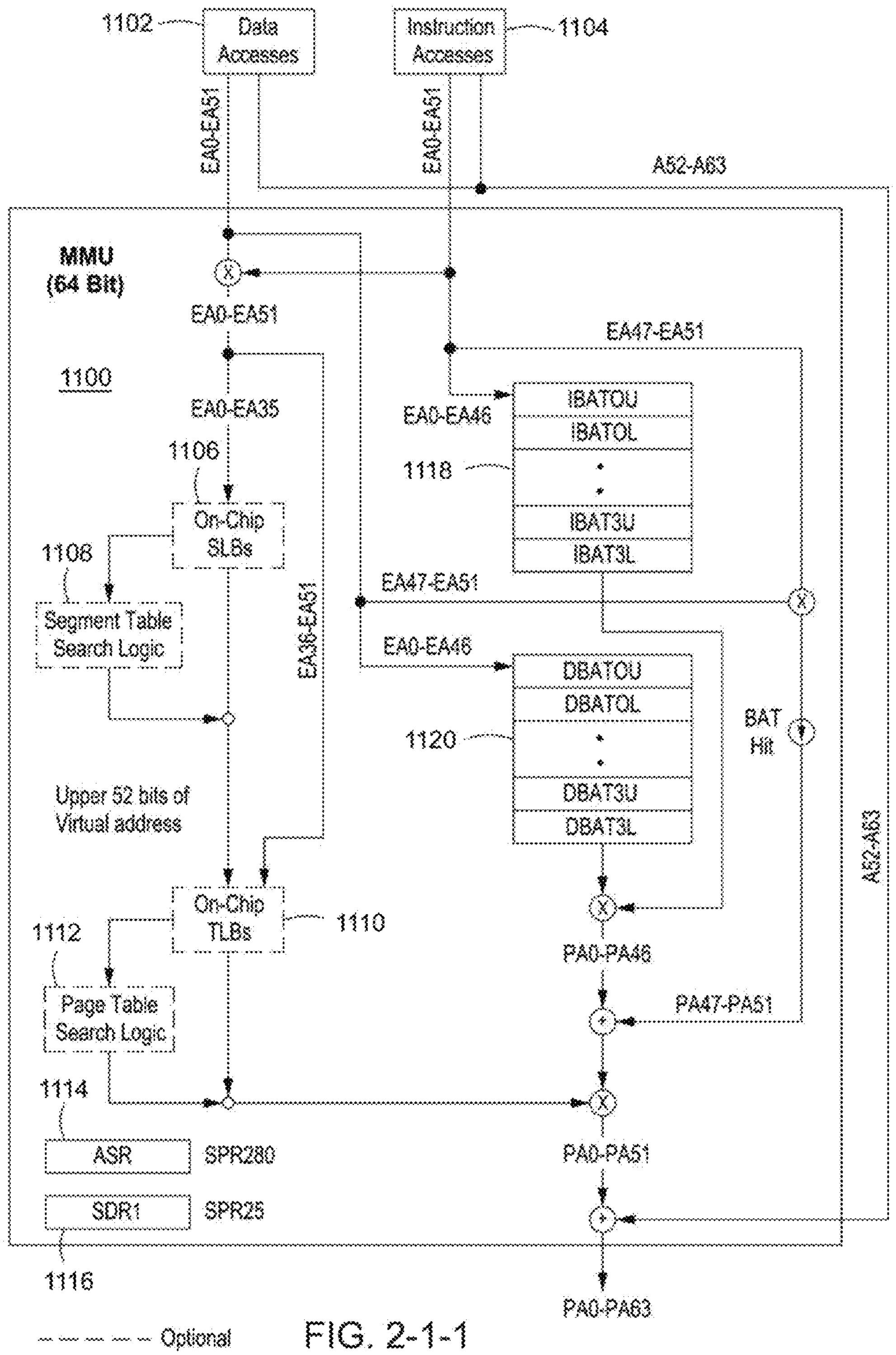
Figures 1, 2:
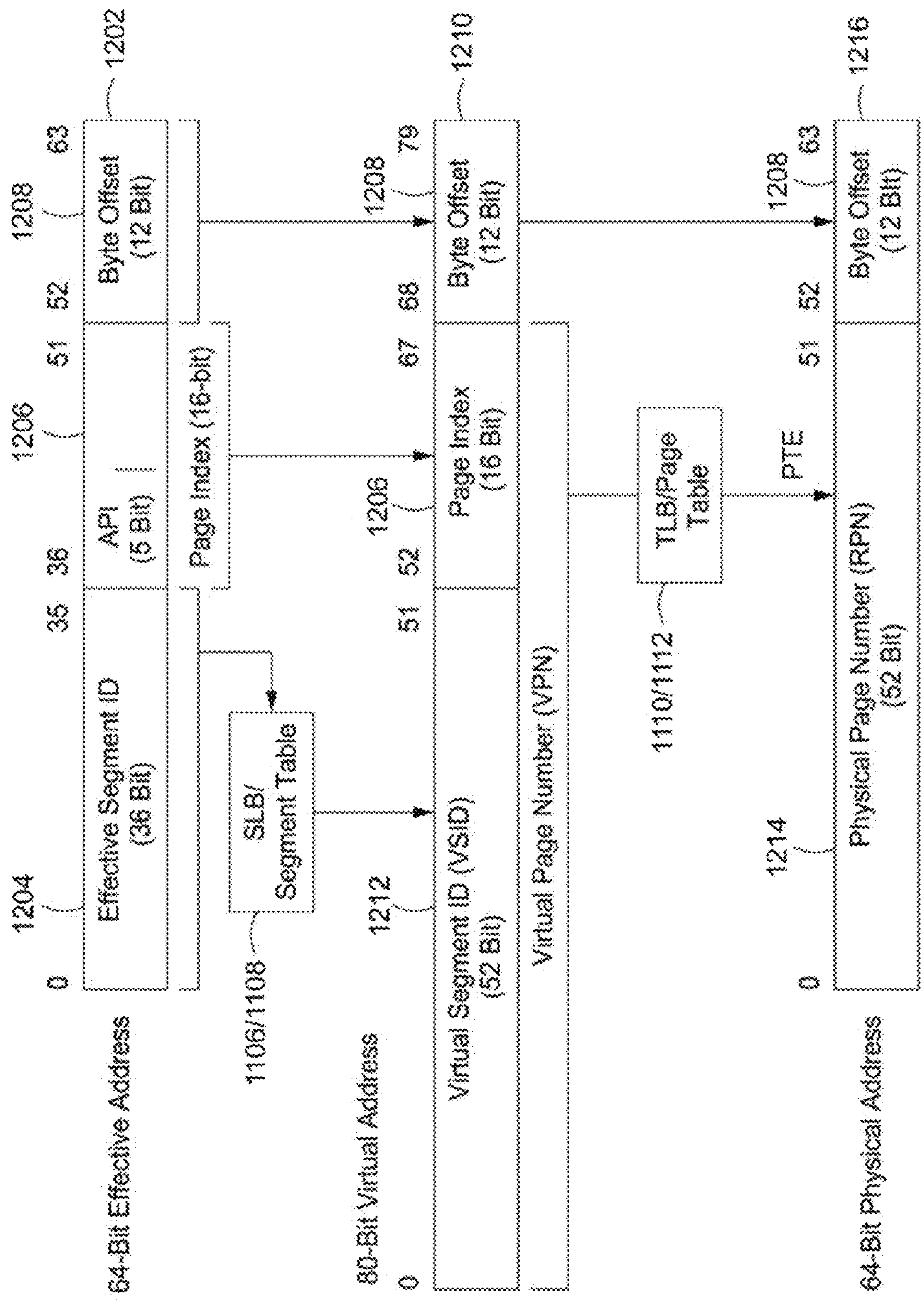
Figures 1, 2, 3:
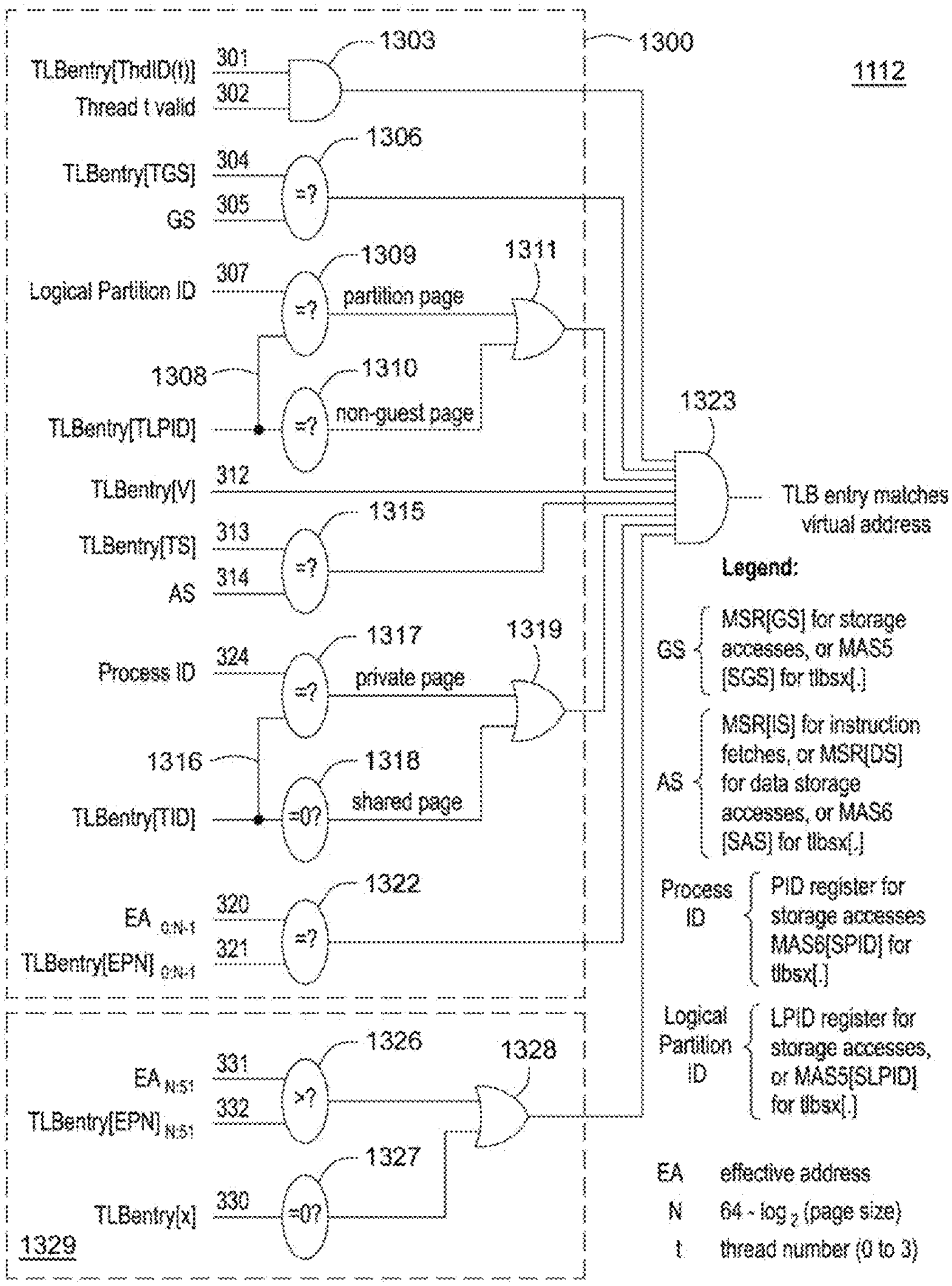
Figures 1, 2, 5:
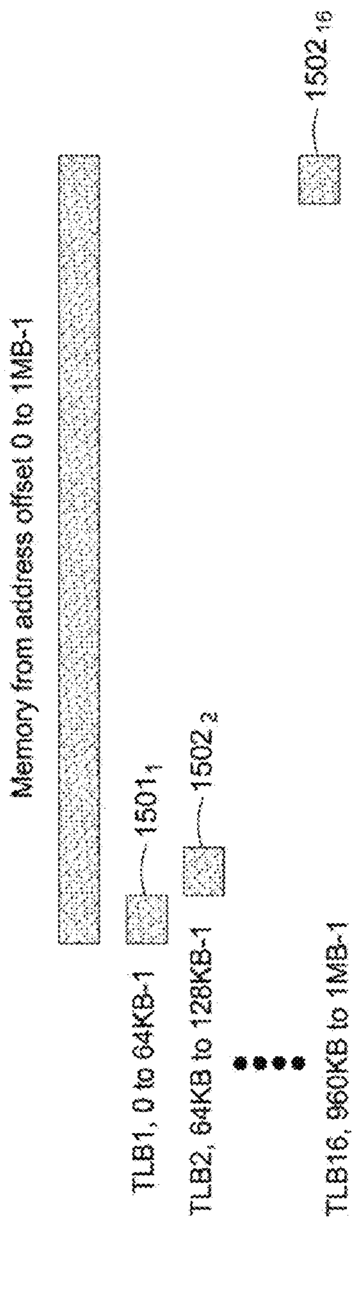
Figures 1, 2, 6:
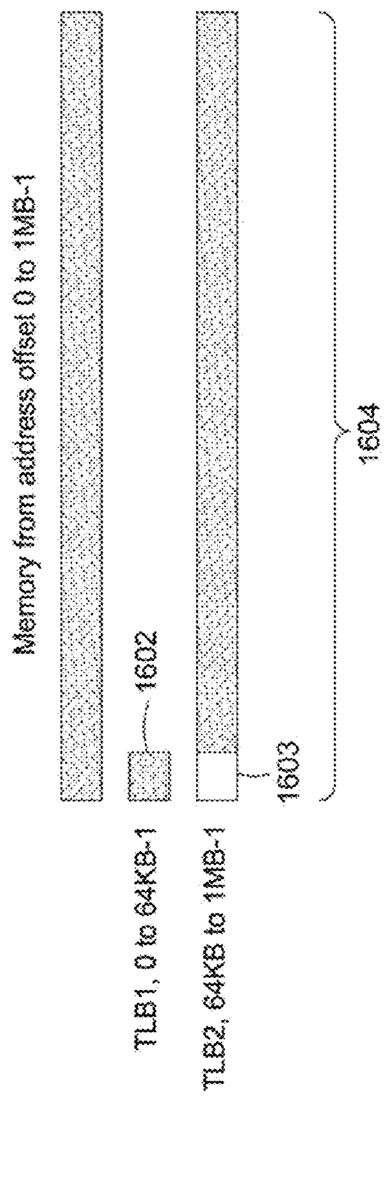
Figures 1, 2, 7:
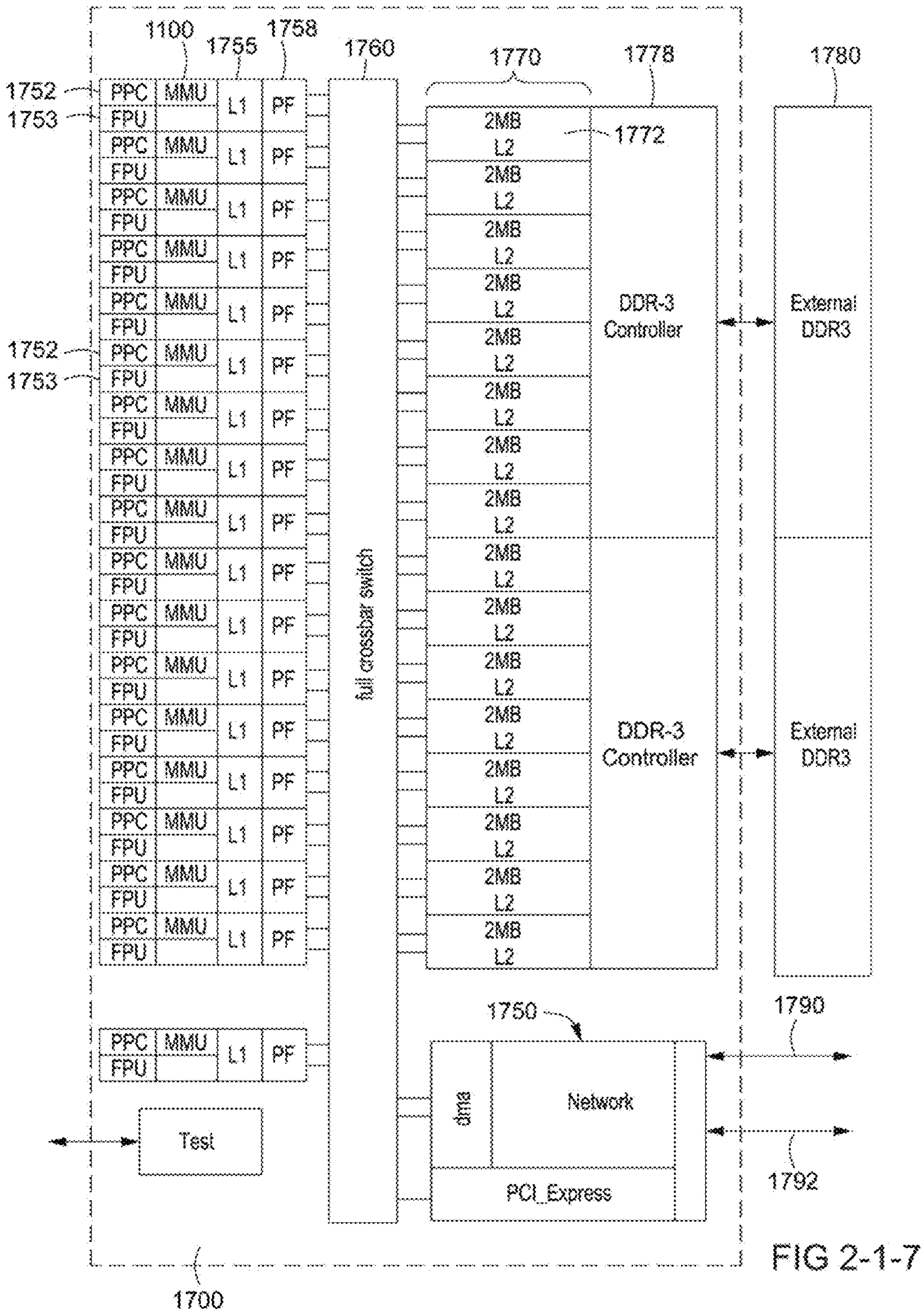
Figures 1, 2, 8:
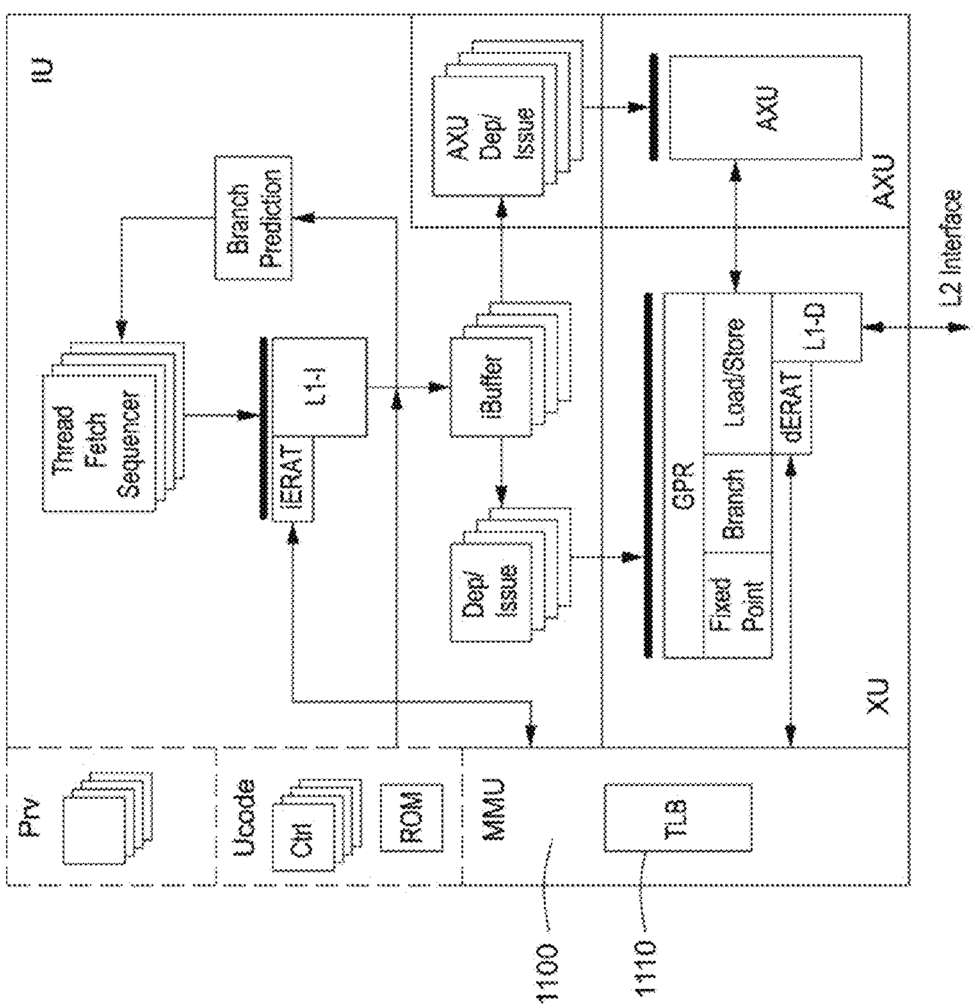
Figures 0, 3:
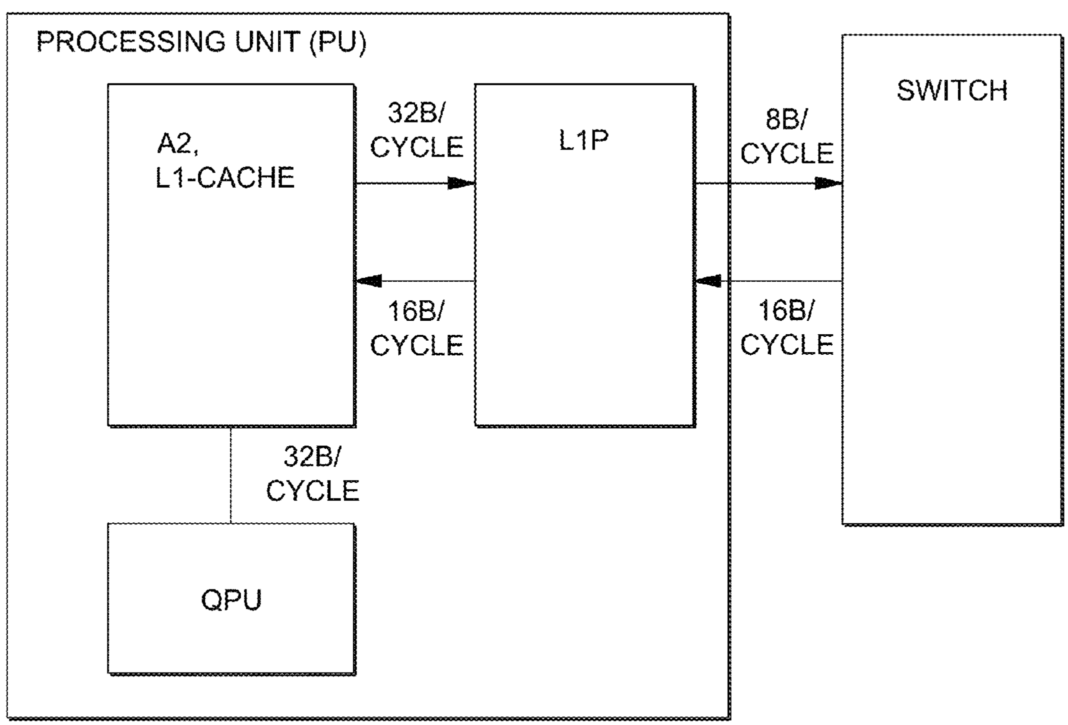
Figures 1, 3:
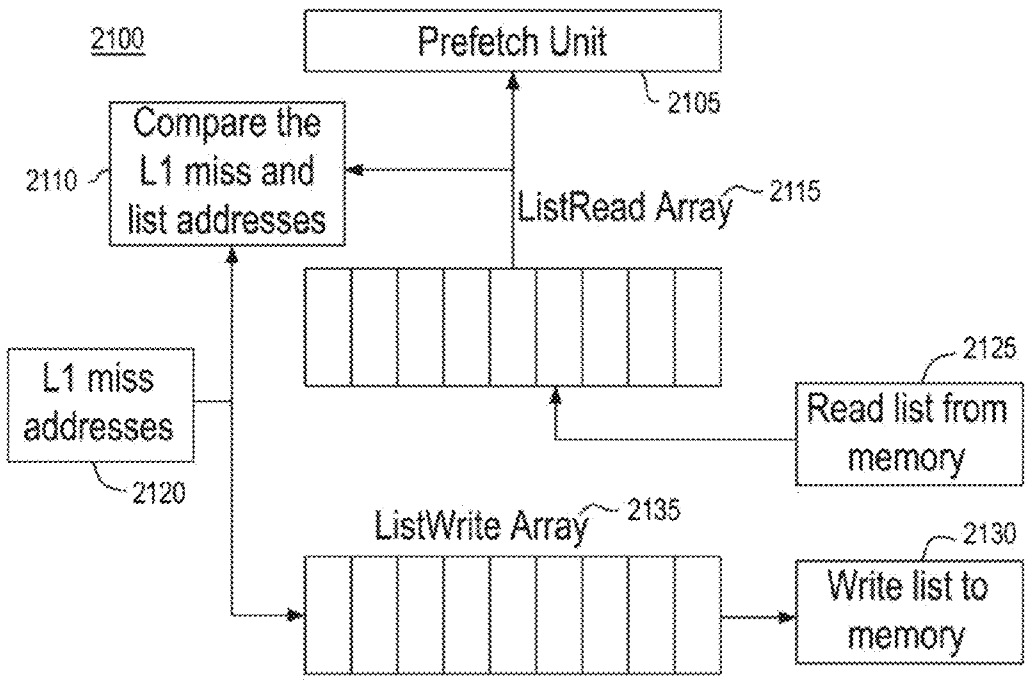
Figures 1, 2, 3:
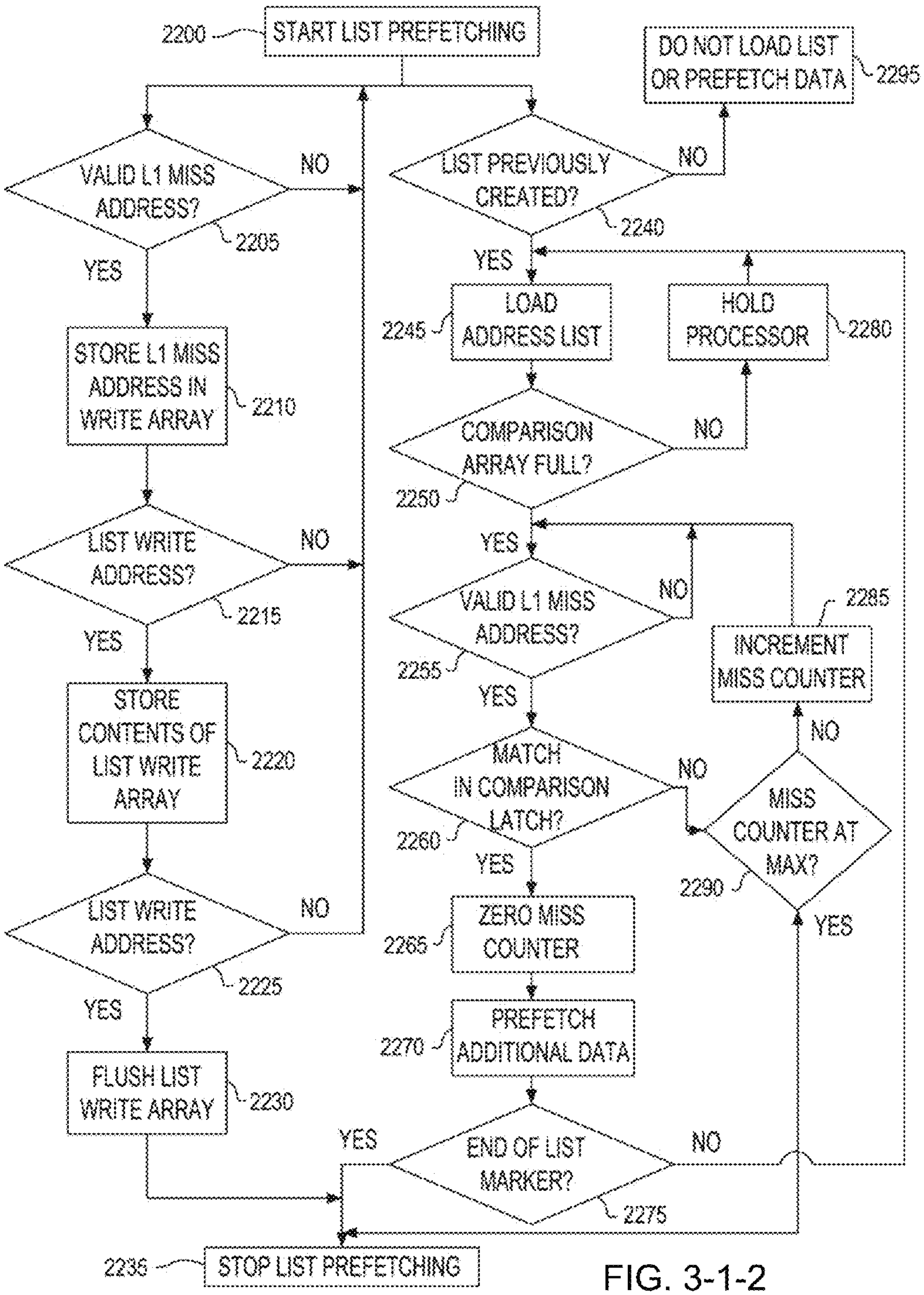
Figures 1, 2, 3:
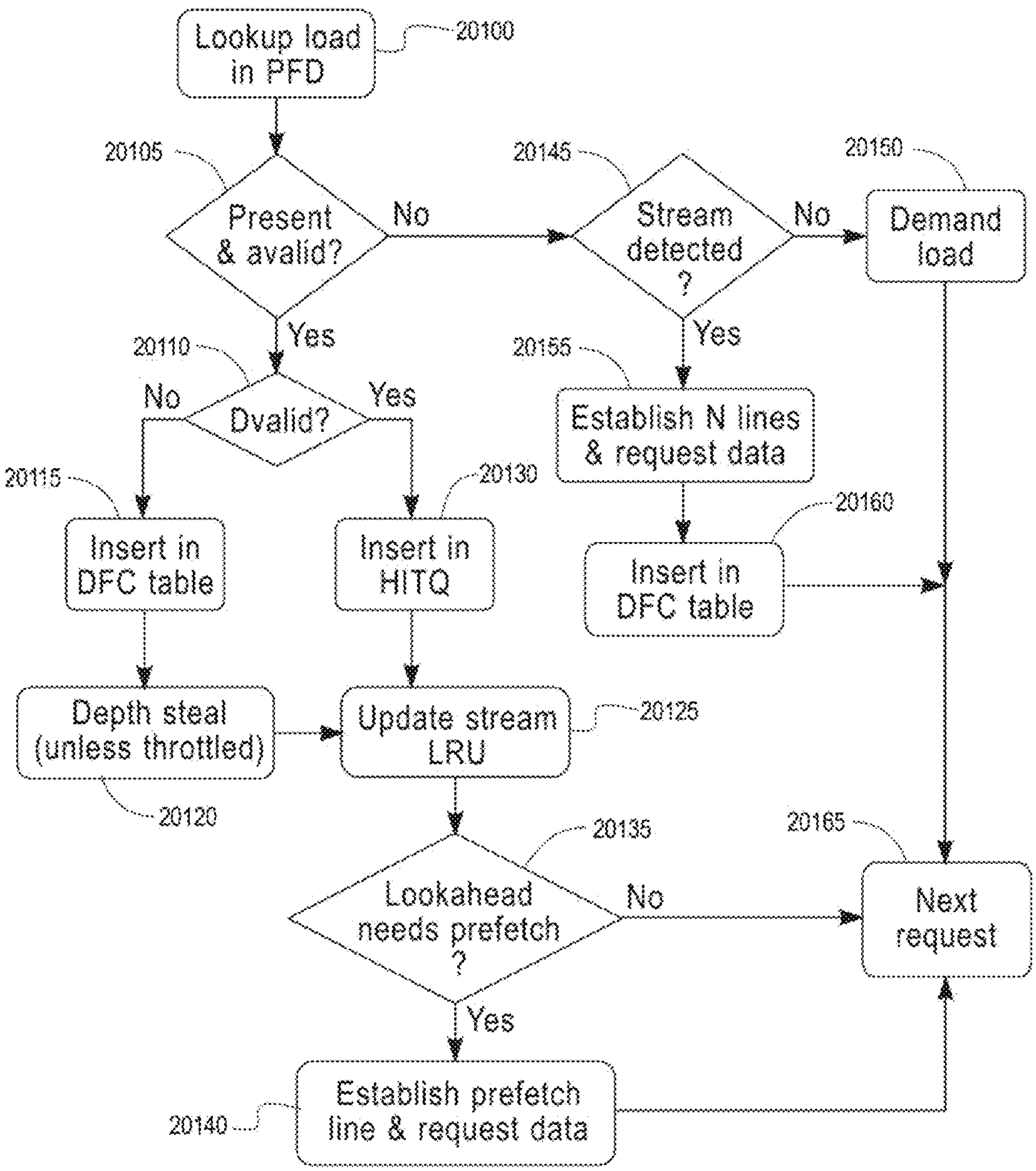
Figures 2, 3:
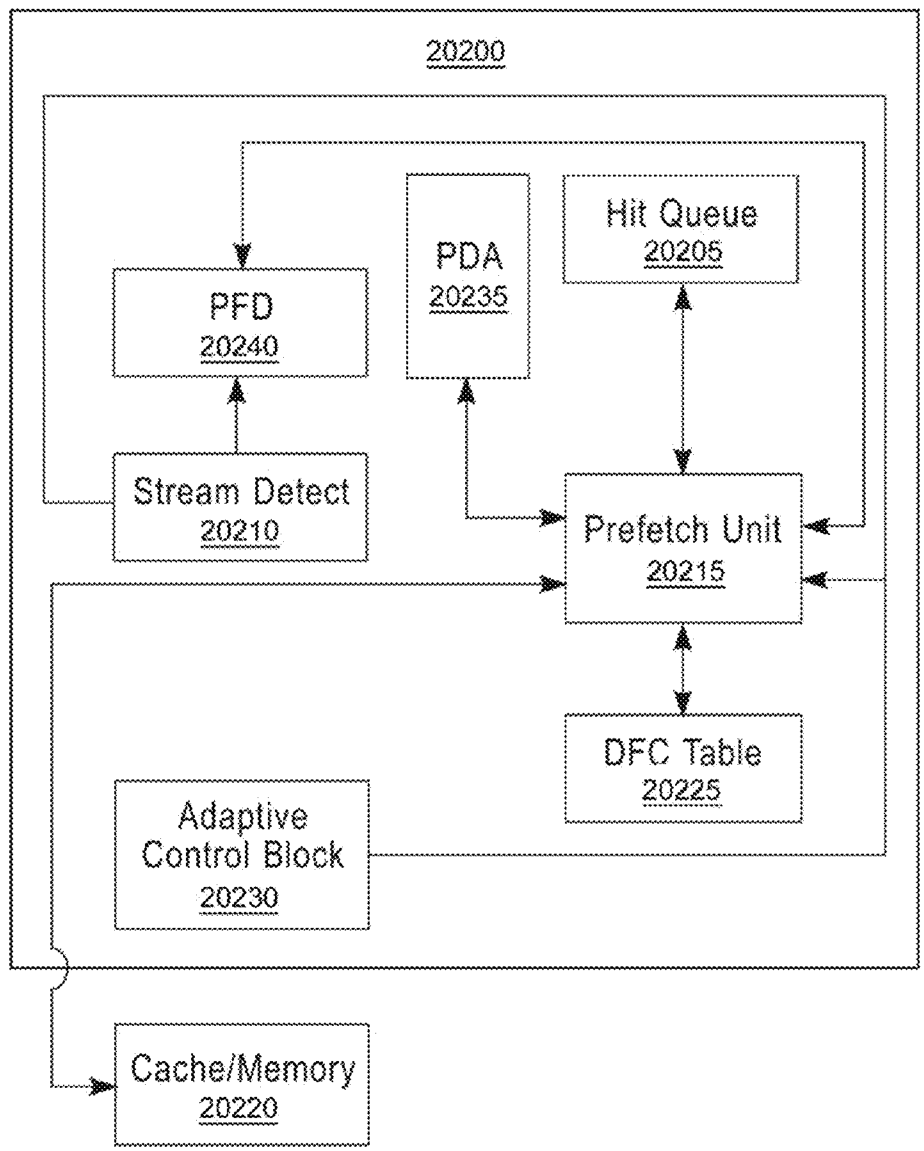
Figures 1, 3:
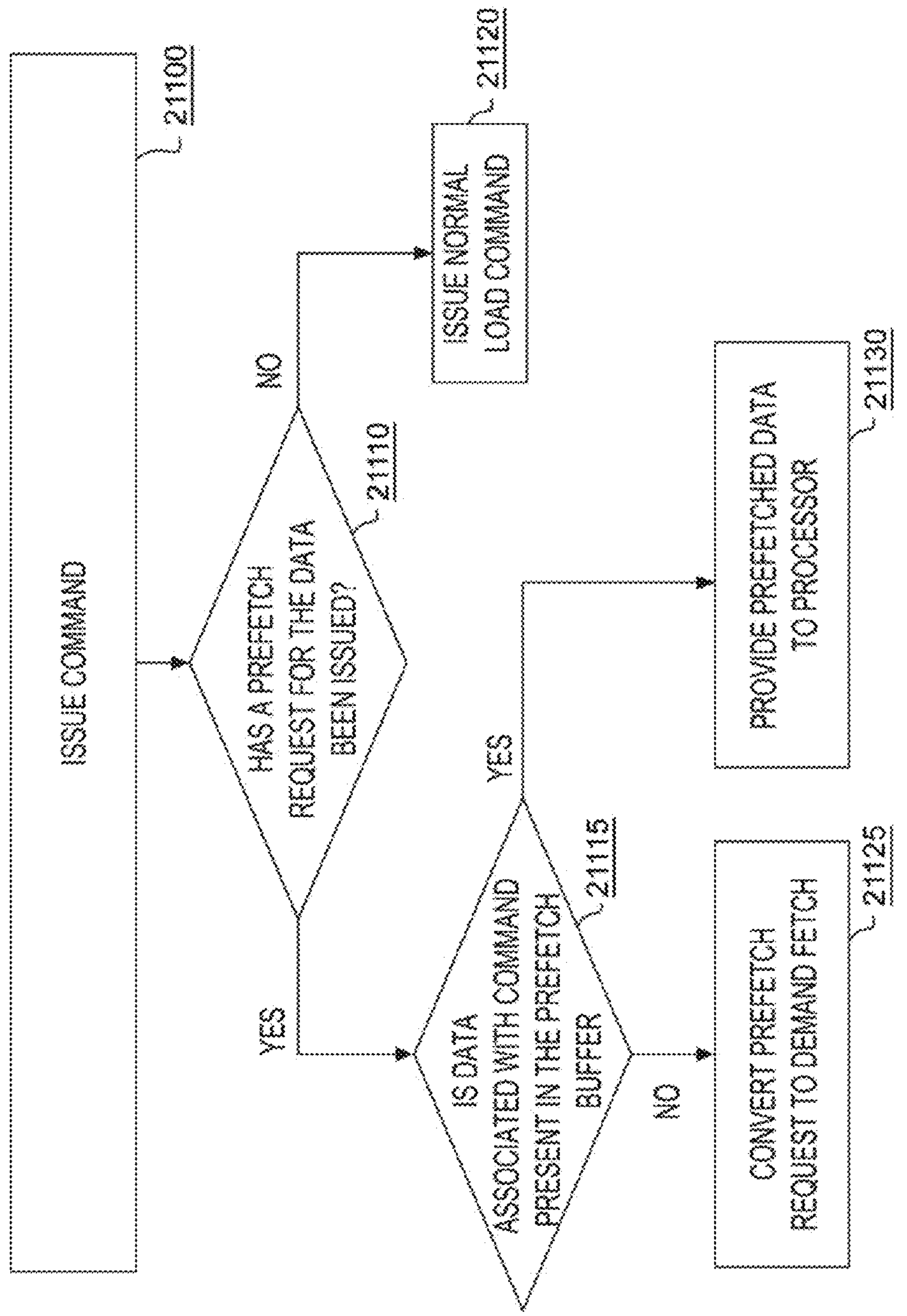
Figures 2, 3:
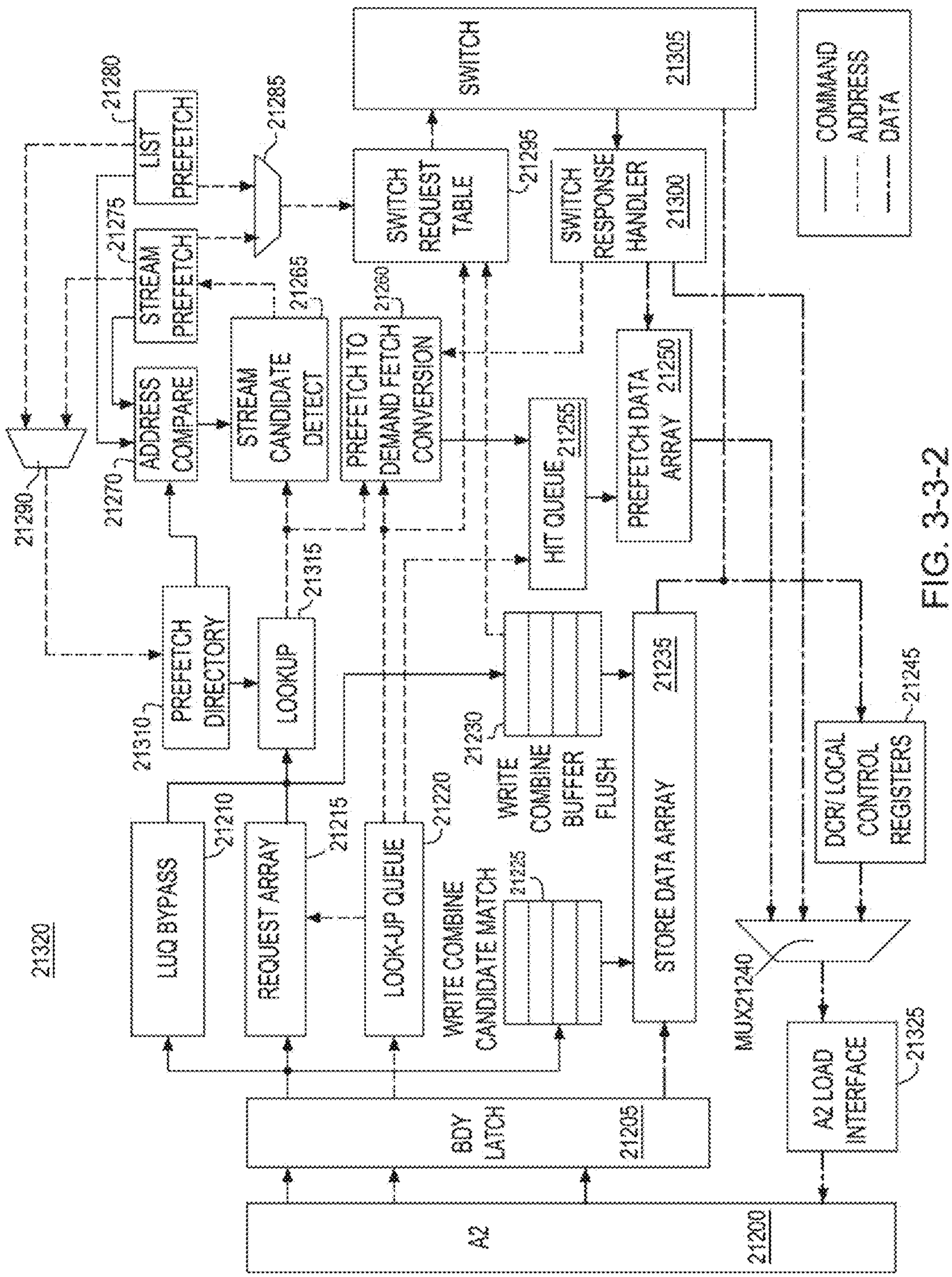
Figure 3:
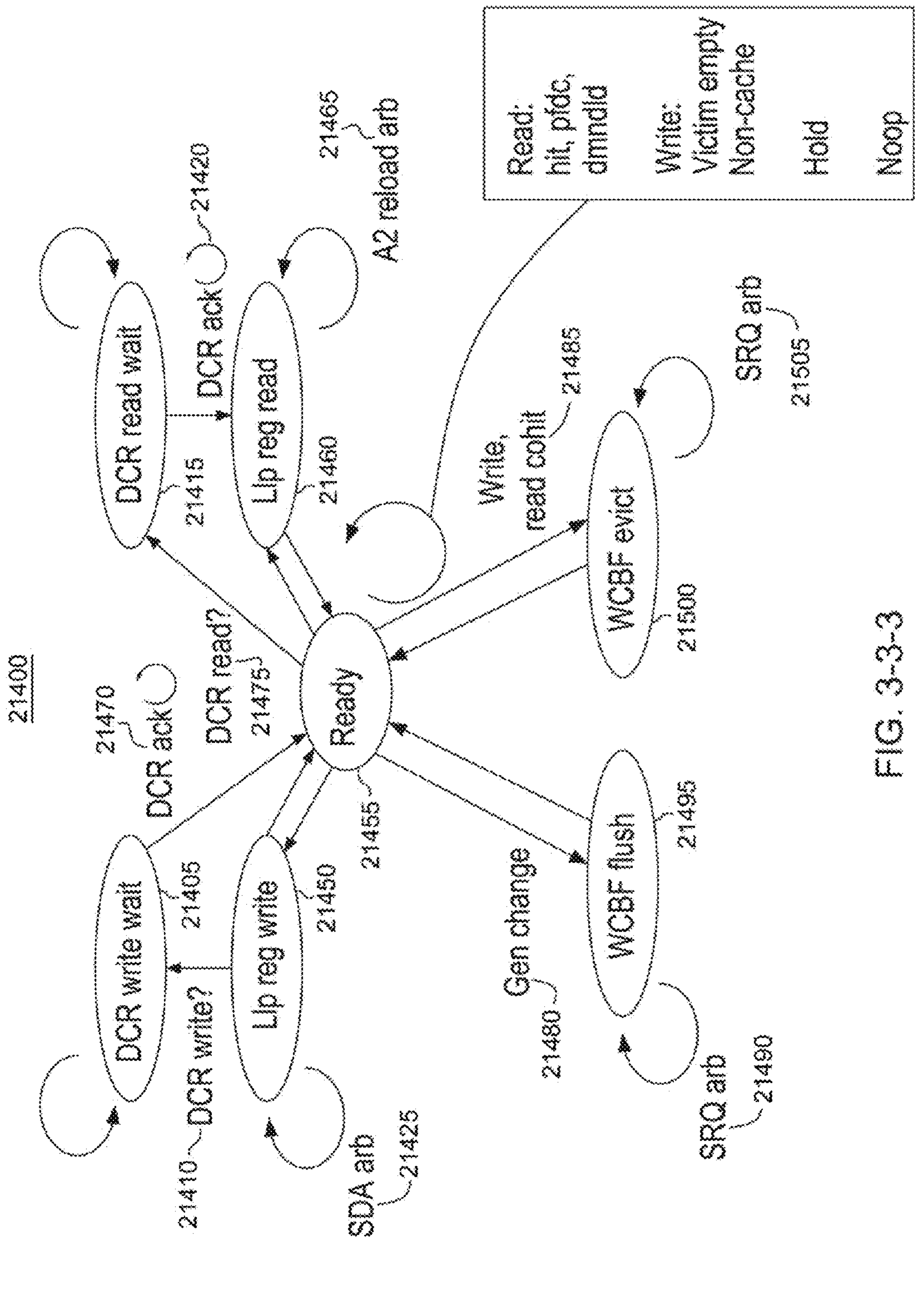
Figures 2, 3, 4:
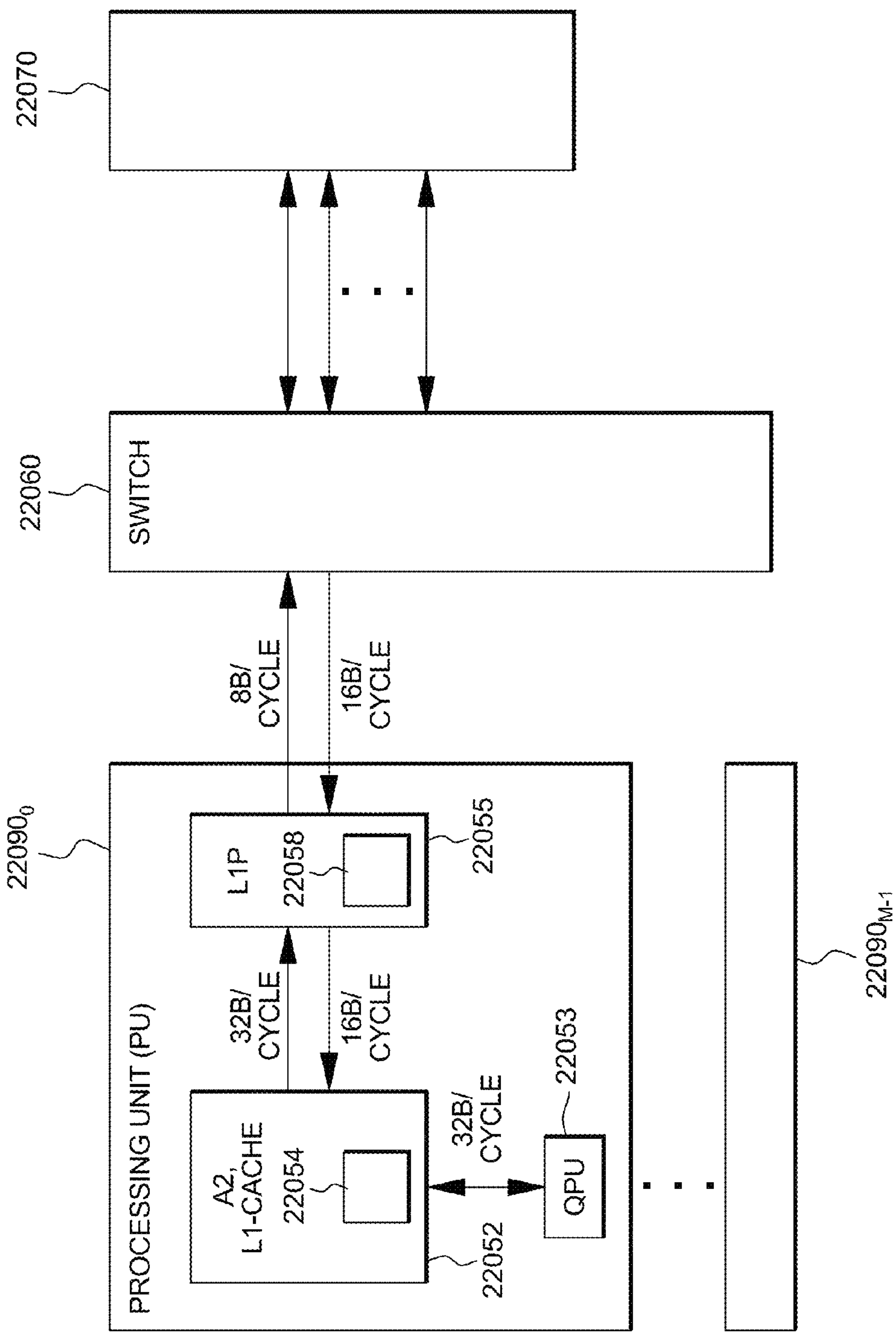
Figures 3, 4:
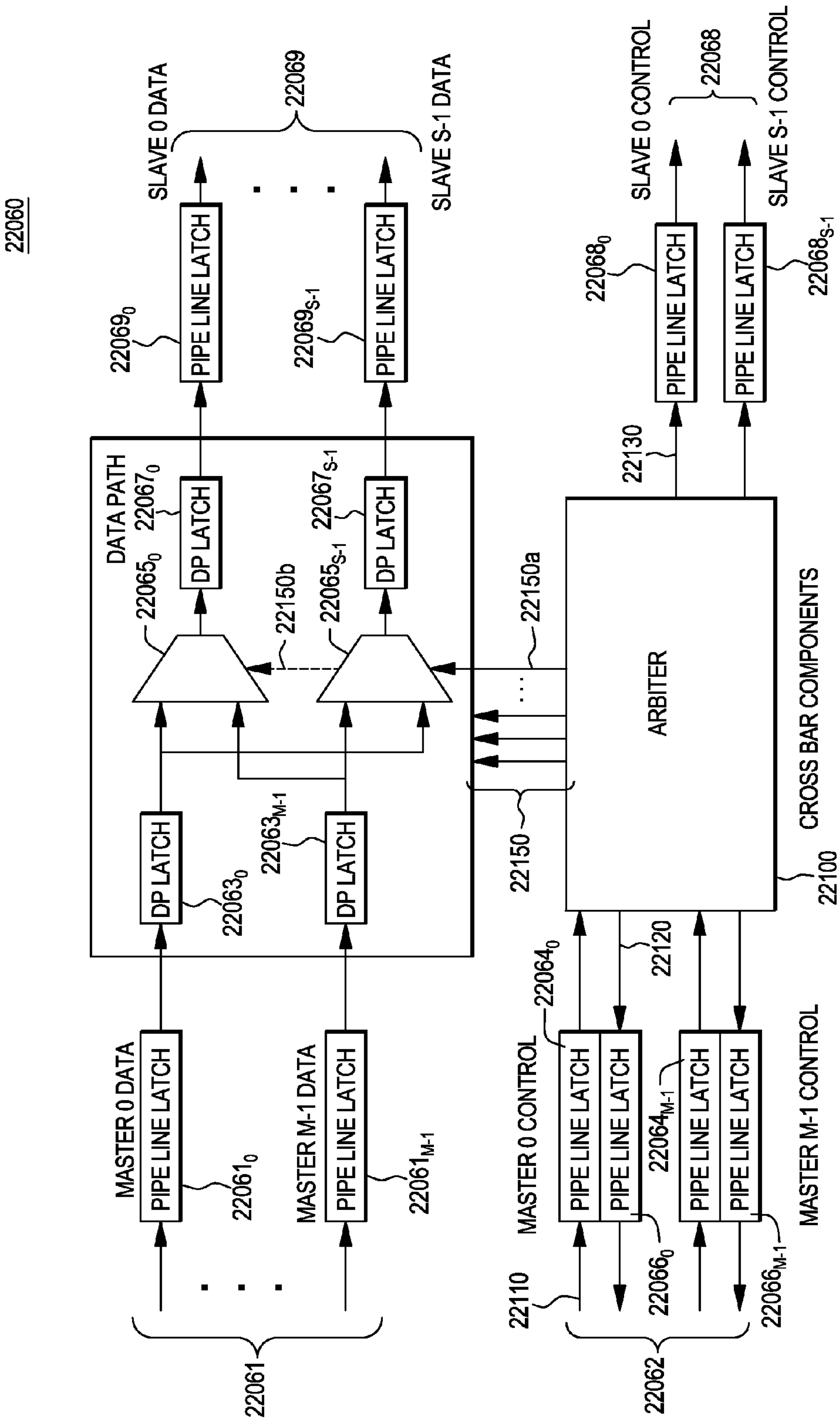
Figures 3, 4:
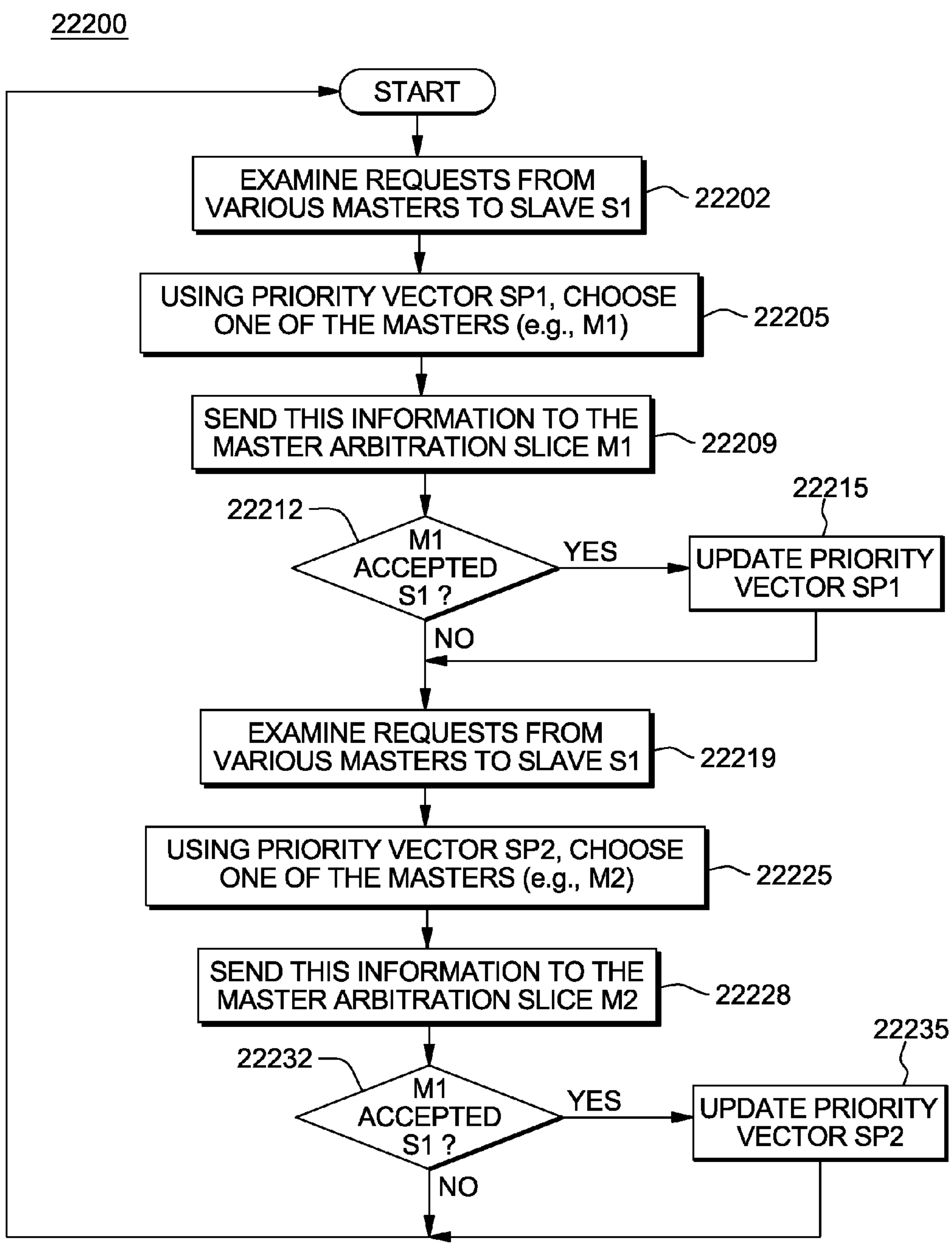
Figures 3, 4, 5:
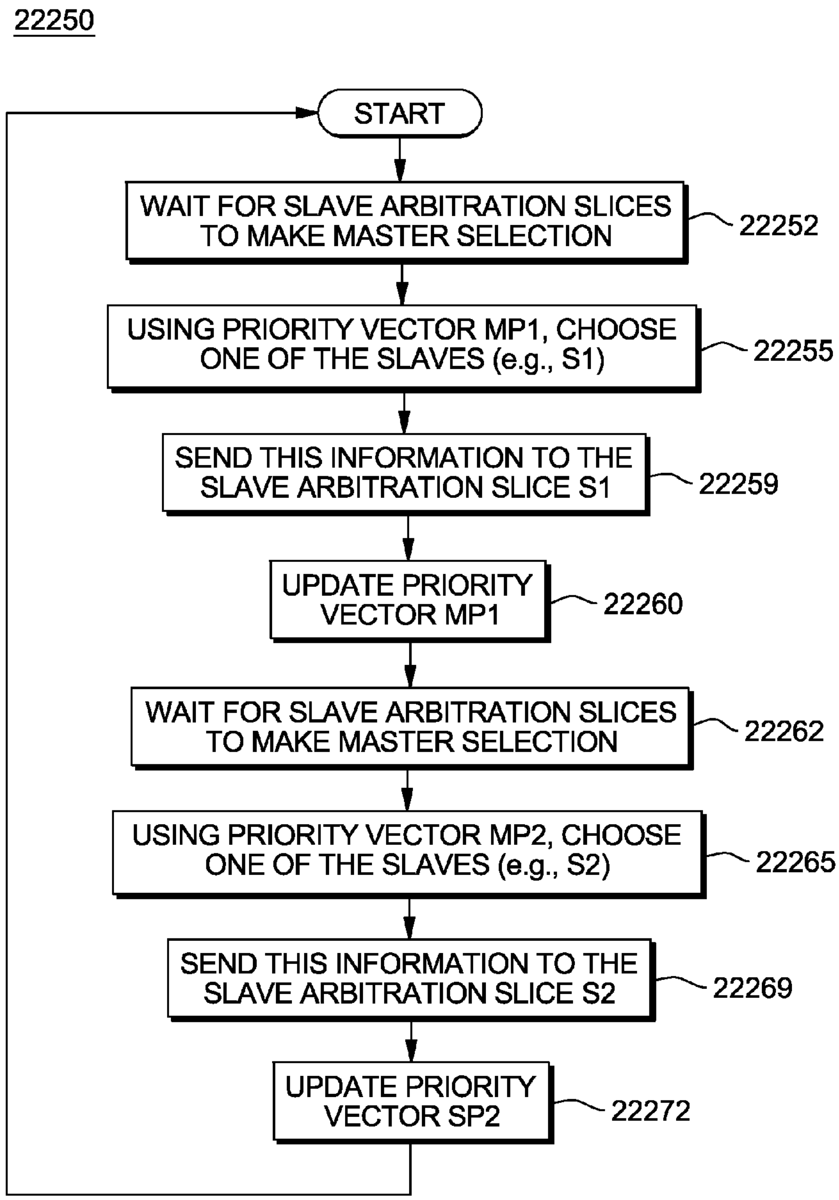
Figures 3, 4, 6:
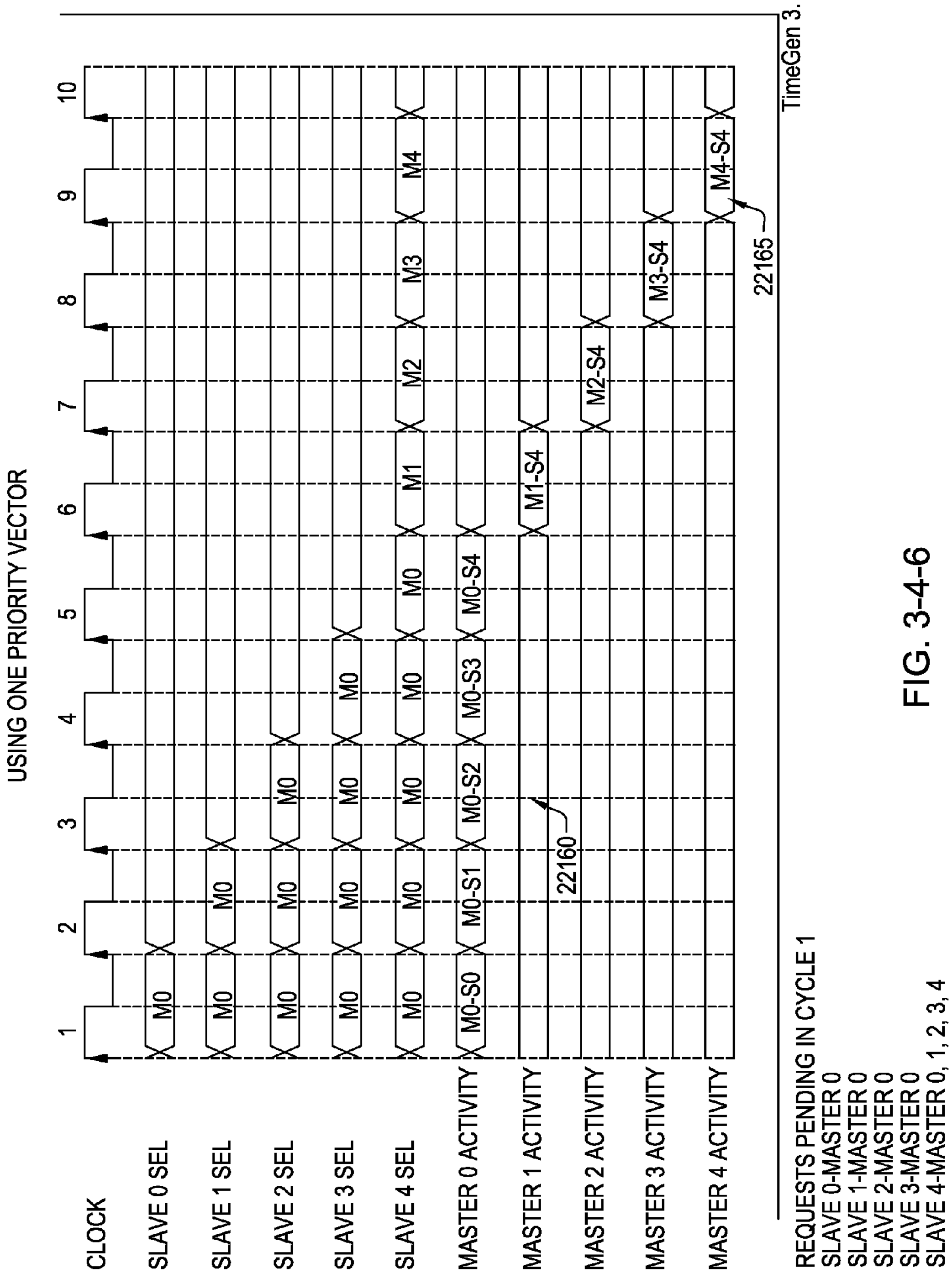
Figures 3, 4, 7:
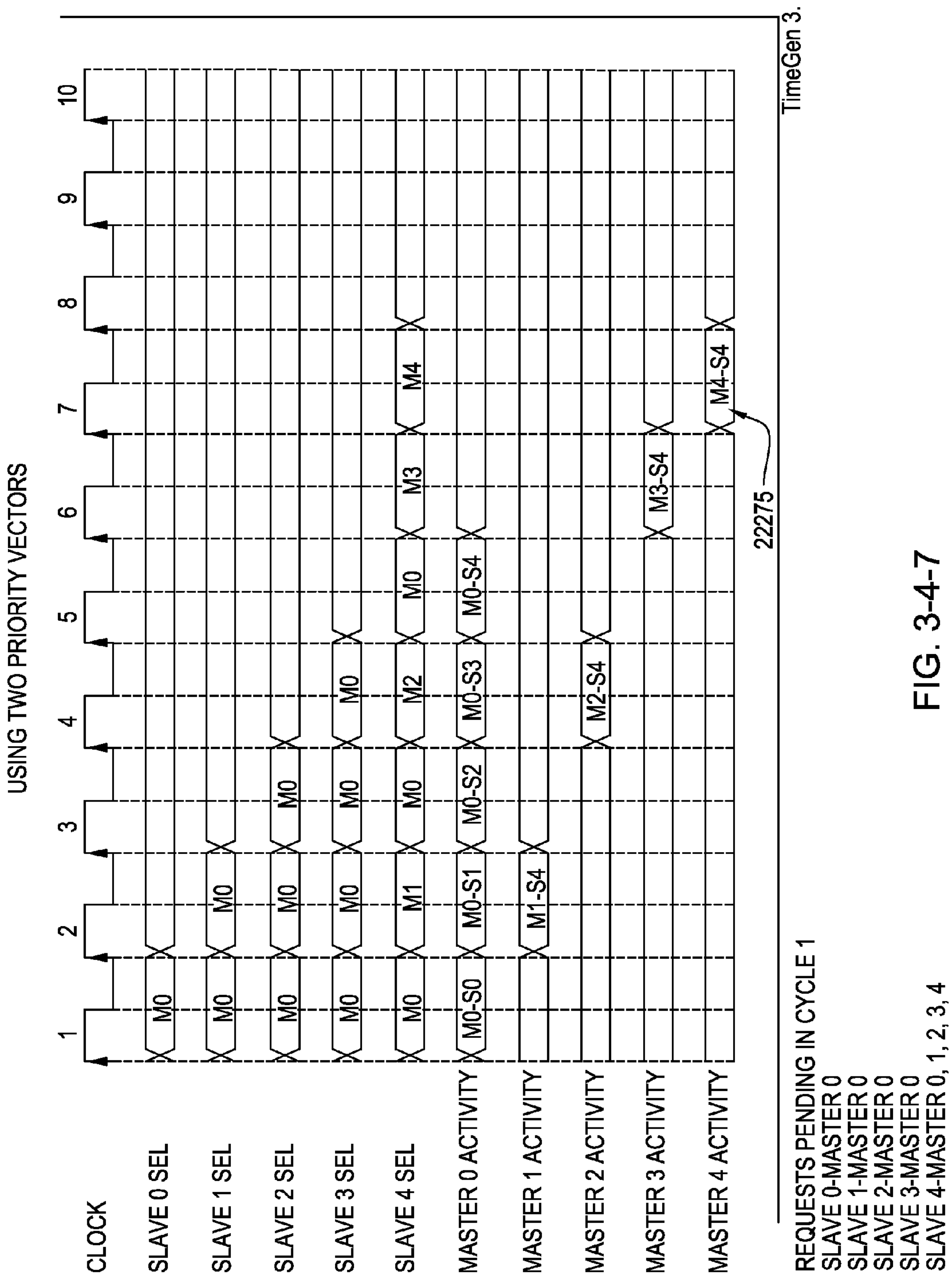
Figures 1, 3, 4, 5:
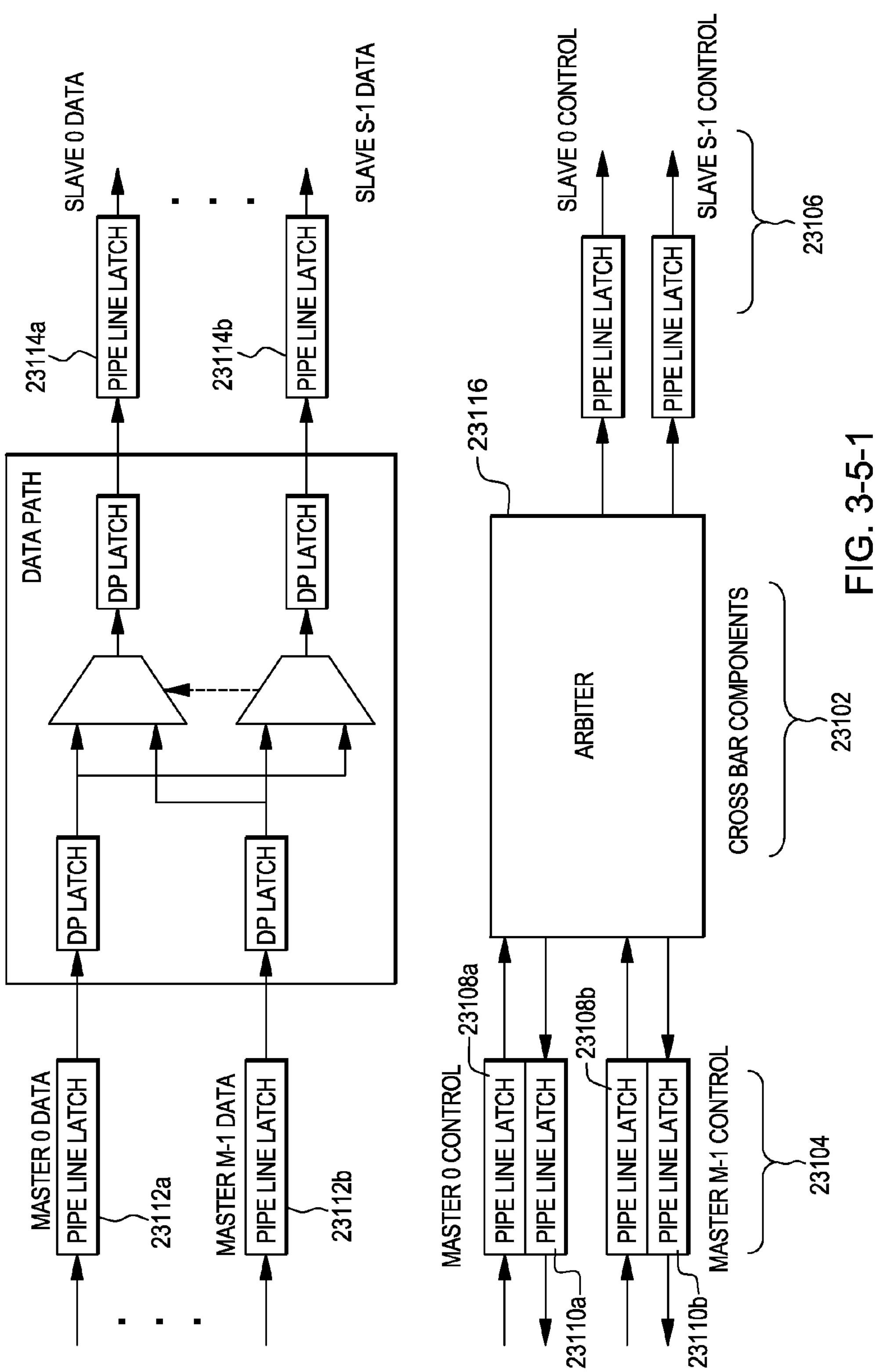
Figures 2, 3, 4, 5:
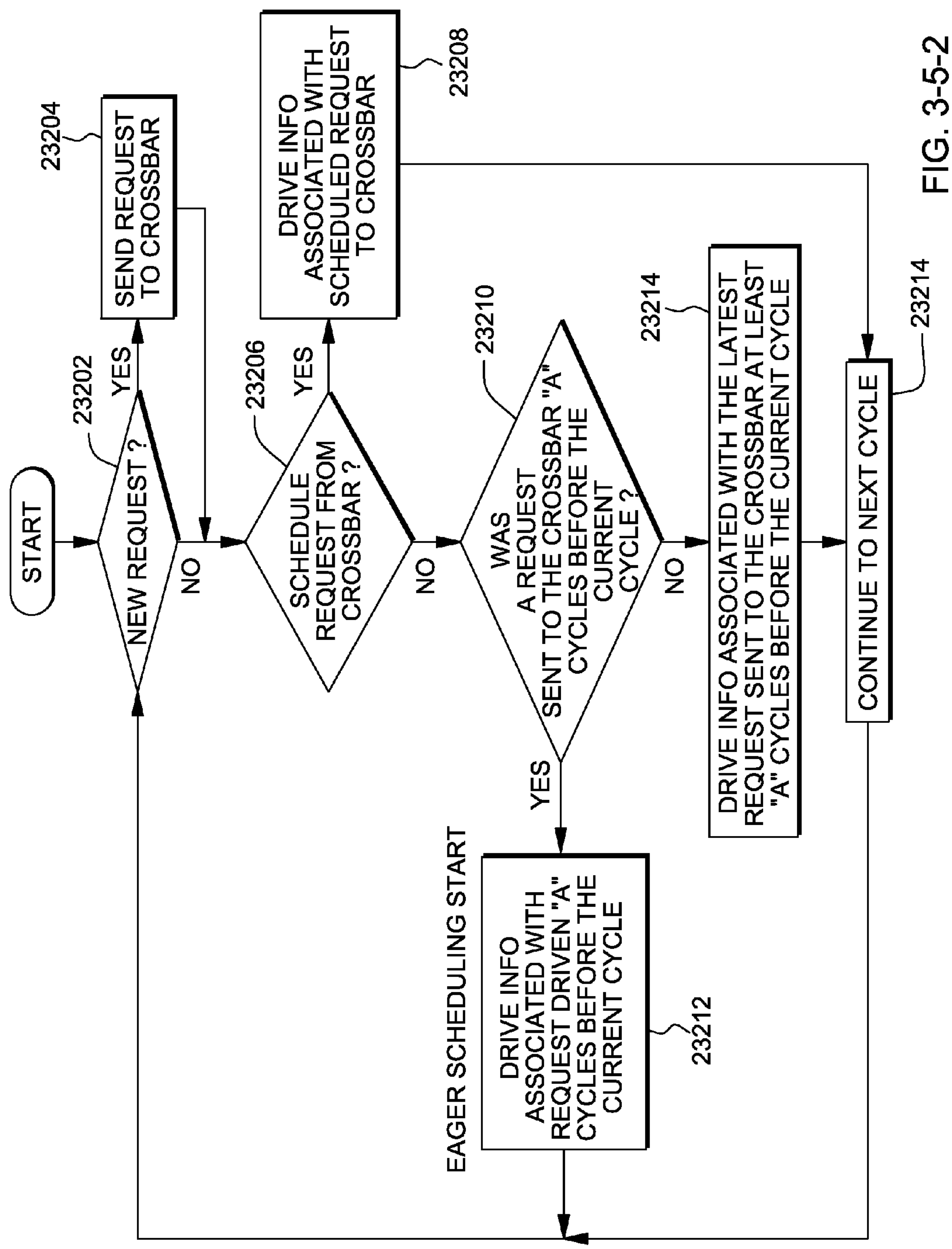
Figures 3, 4, 5:
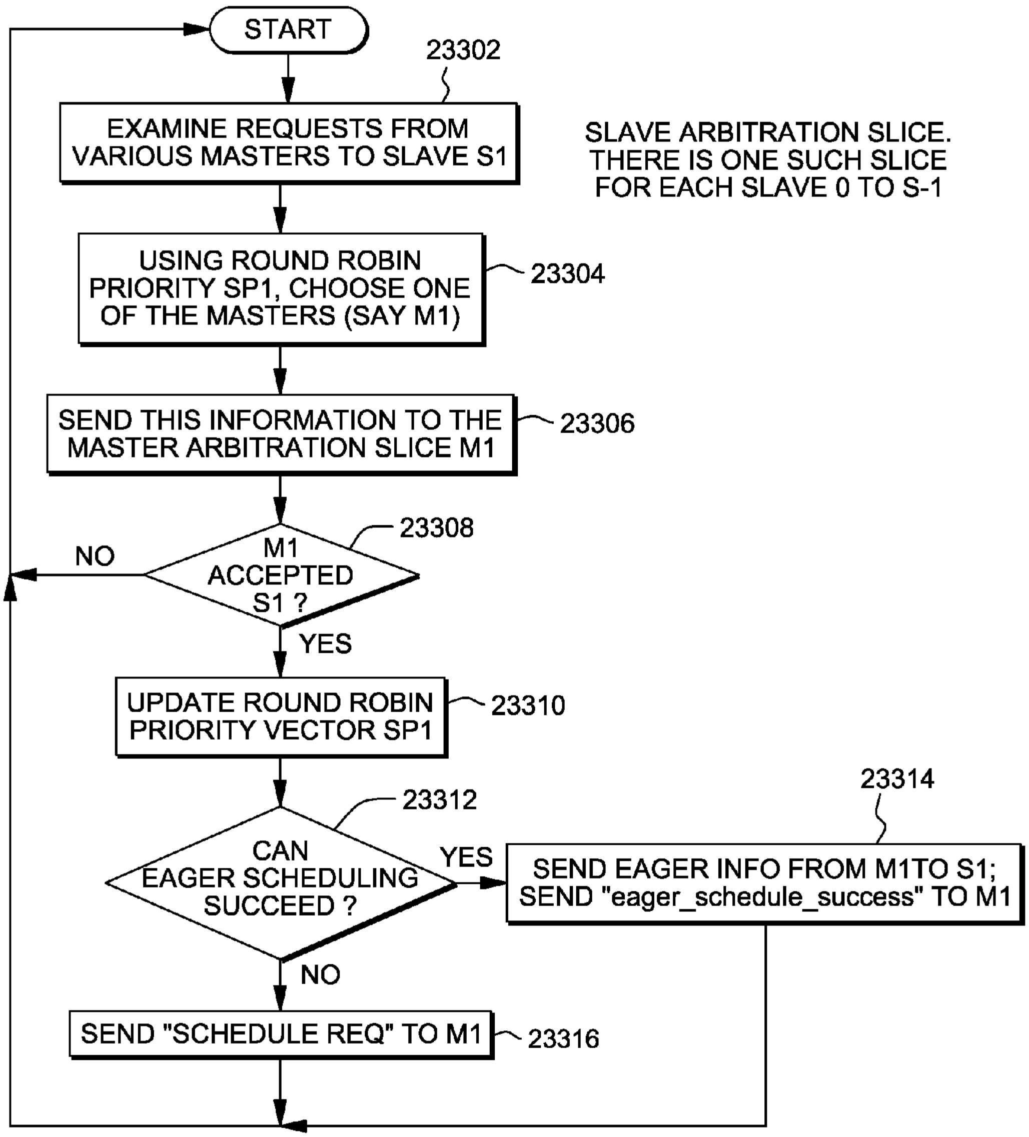
Figures 3, 4, 5:
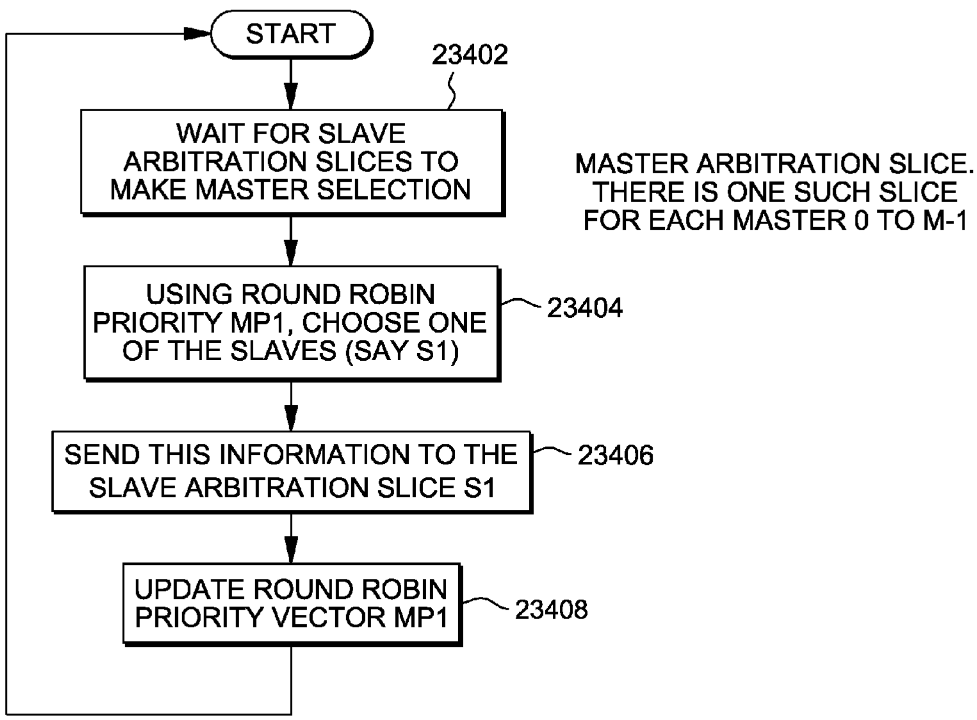
Figures 3, 4, 5:
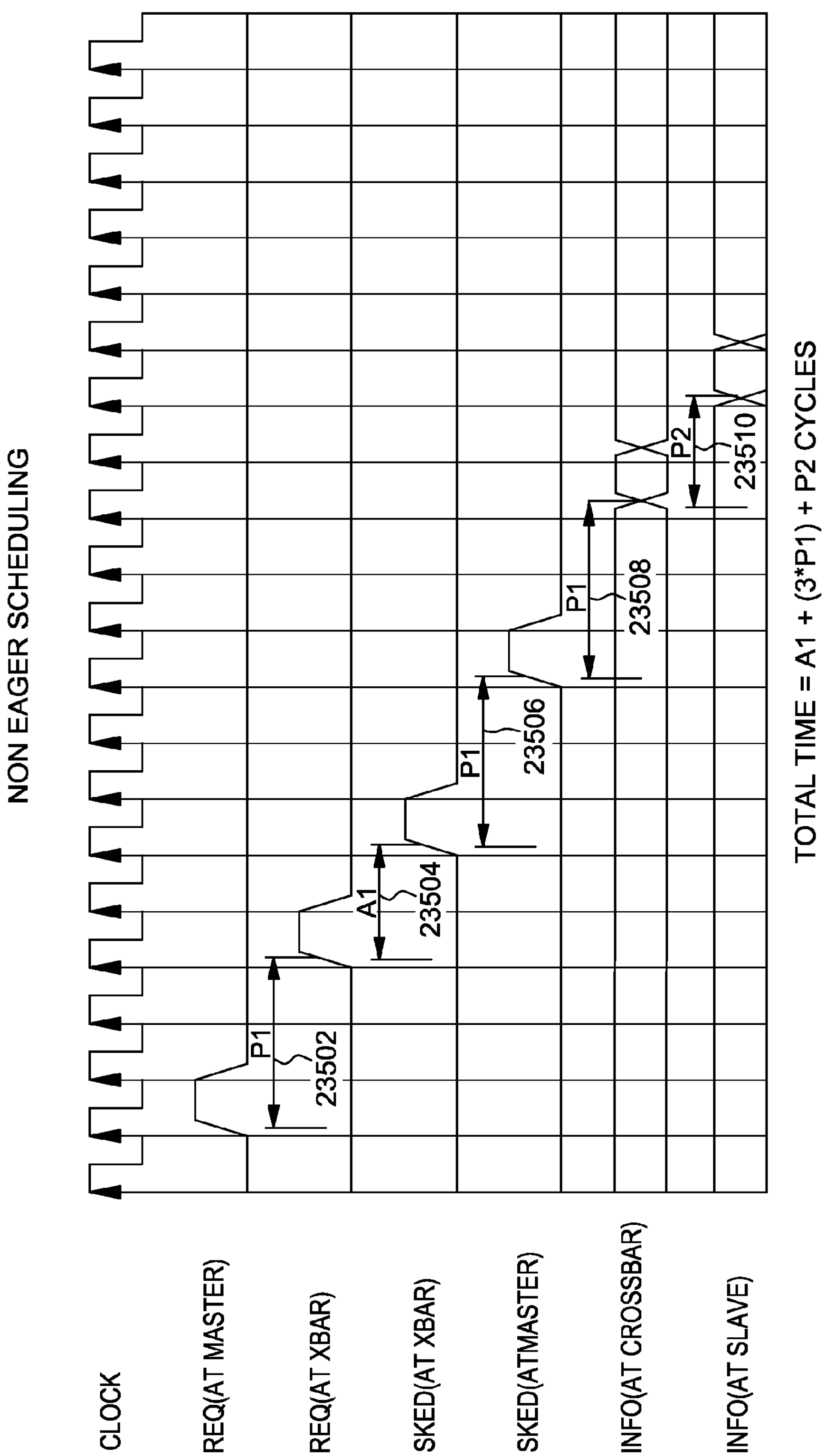
Figures 3, 4, 5, 6:
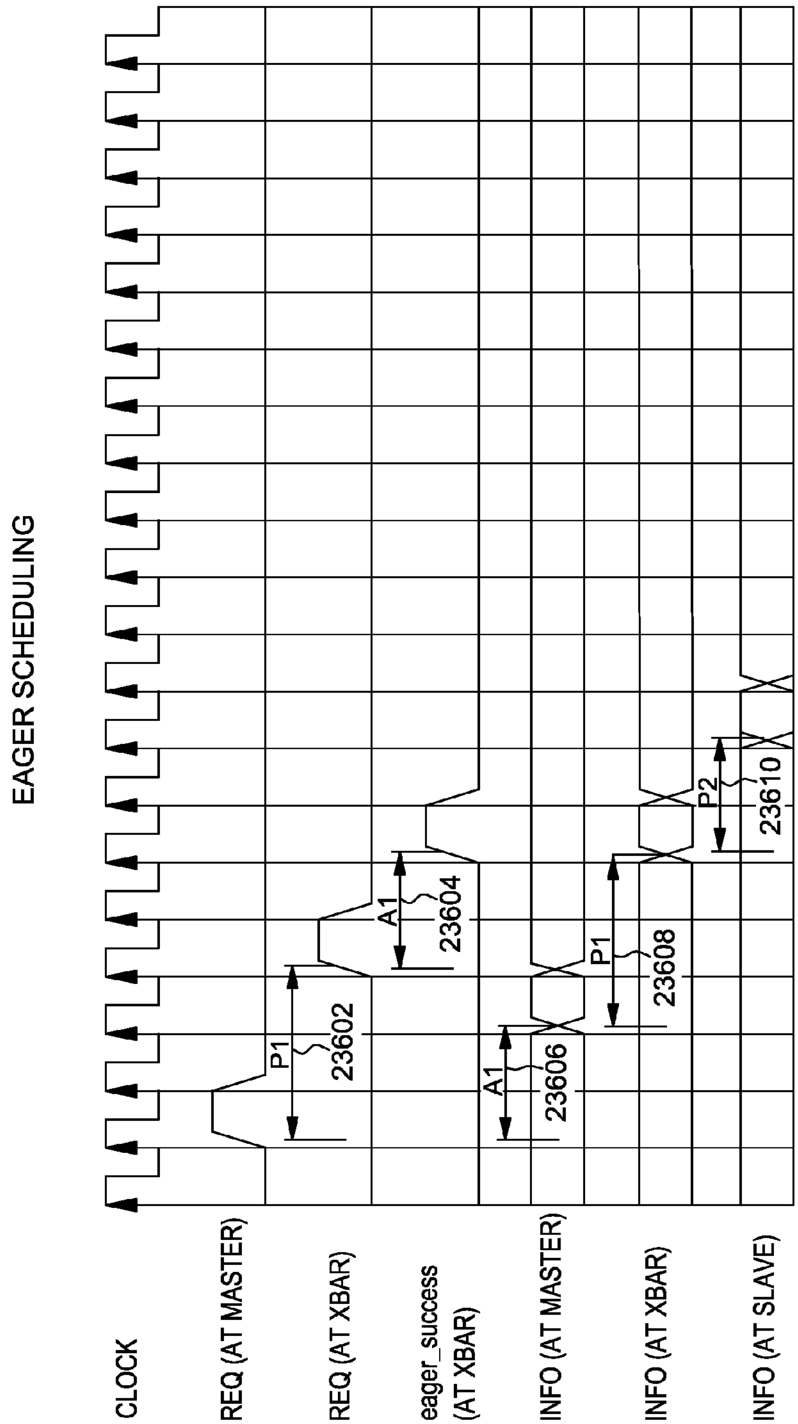
Figures 0, 4:
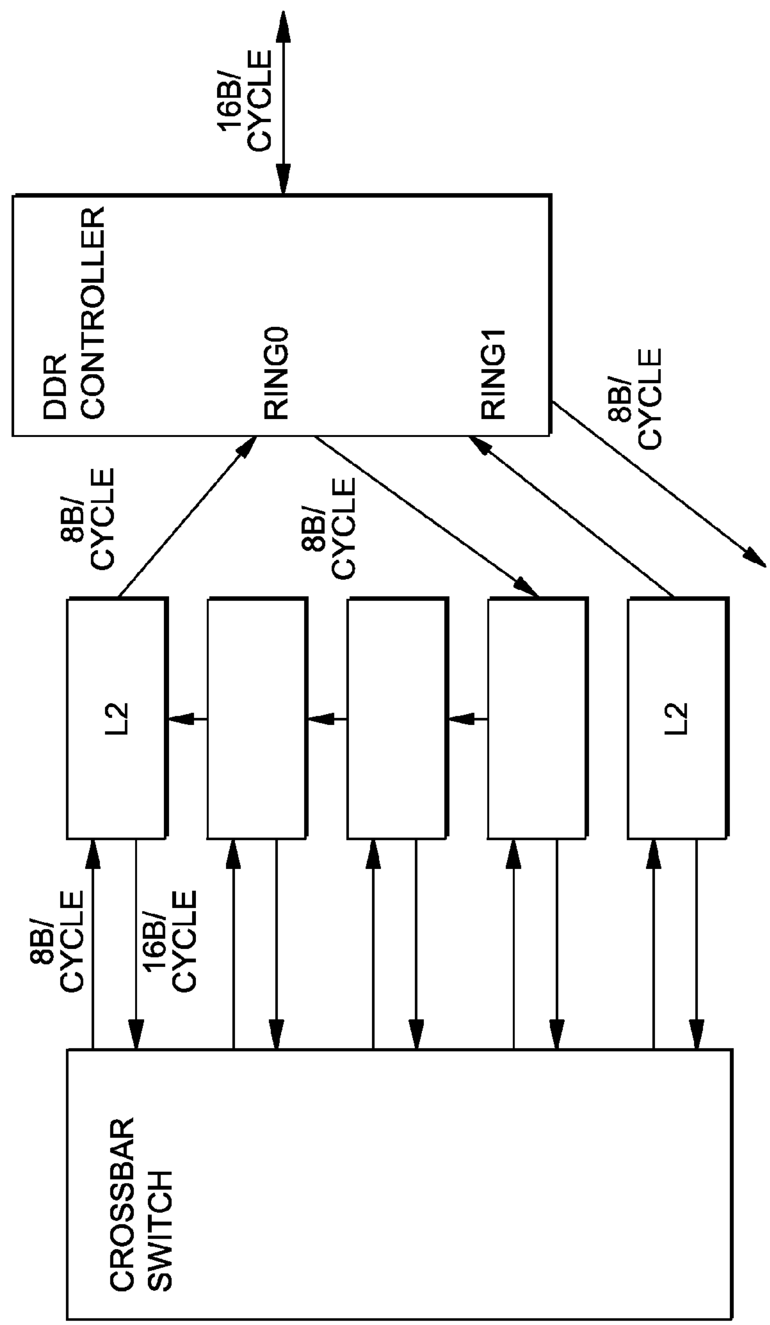
Figures 1, 4:
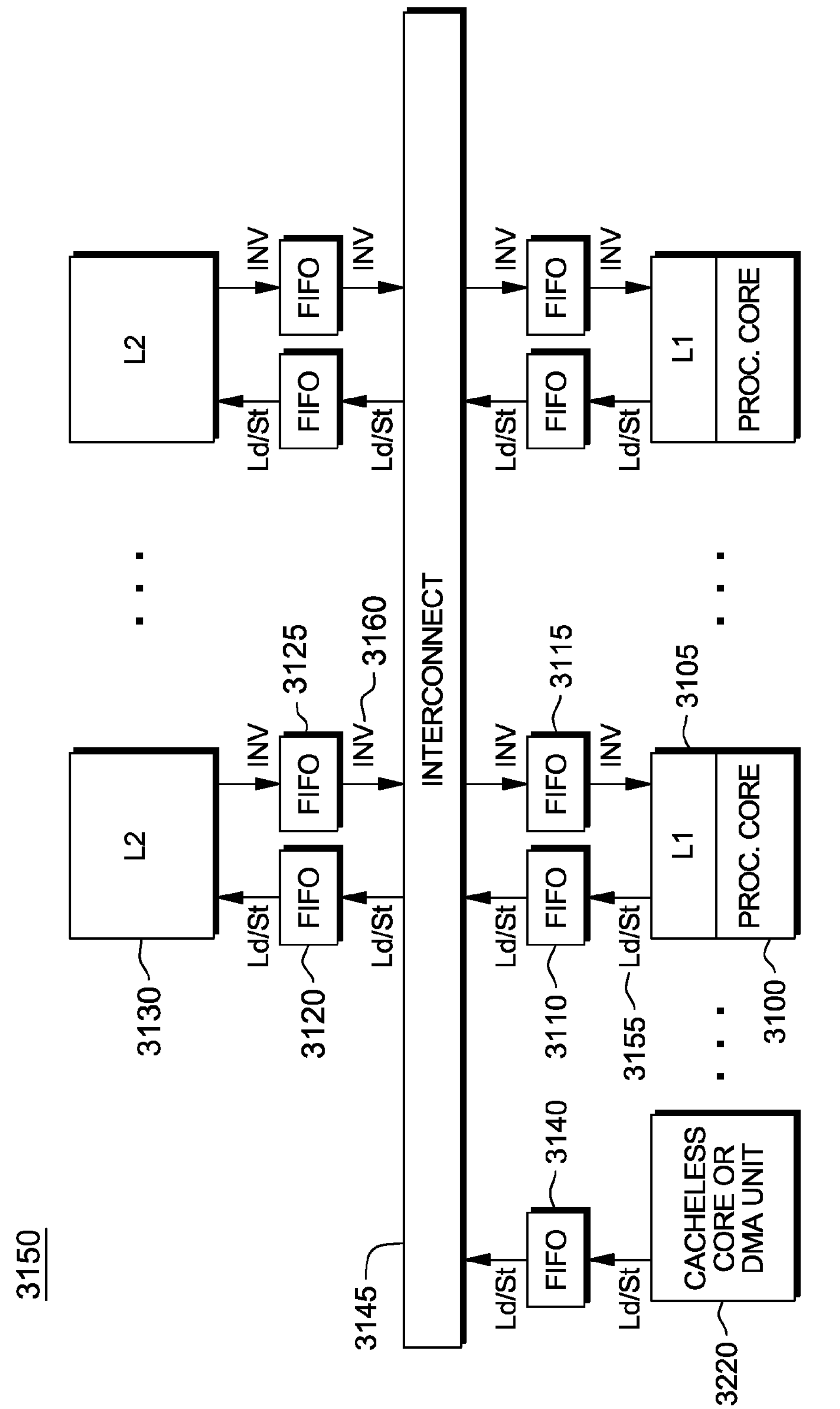
Figures 1, 2, 4:
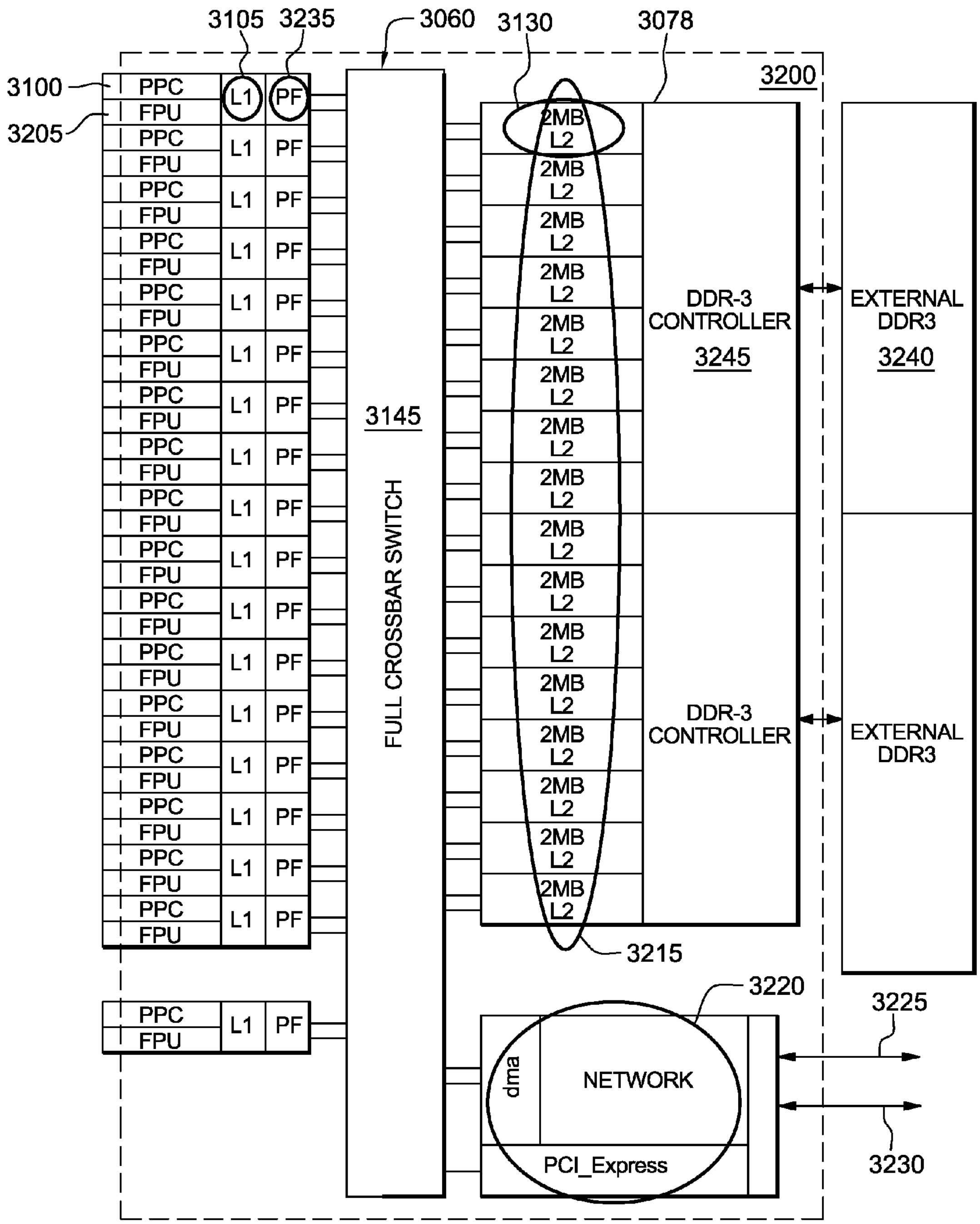
Figures 1, 3, 4:
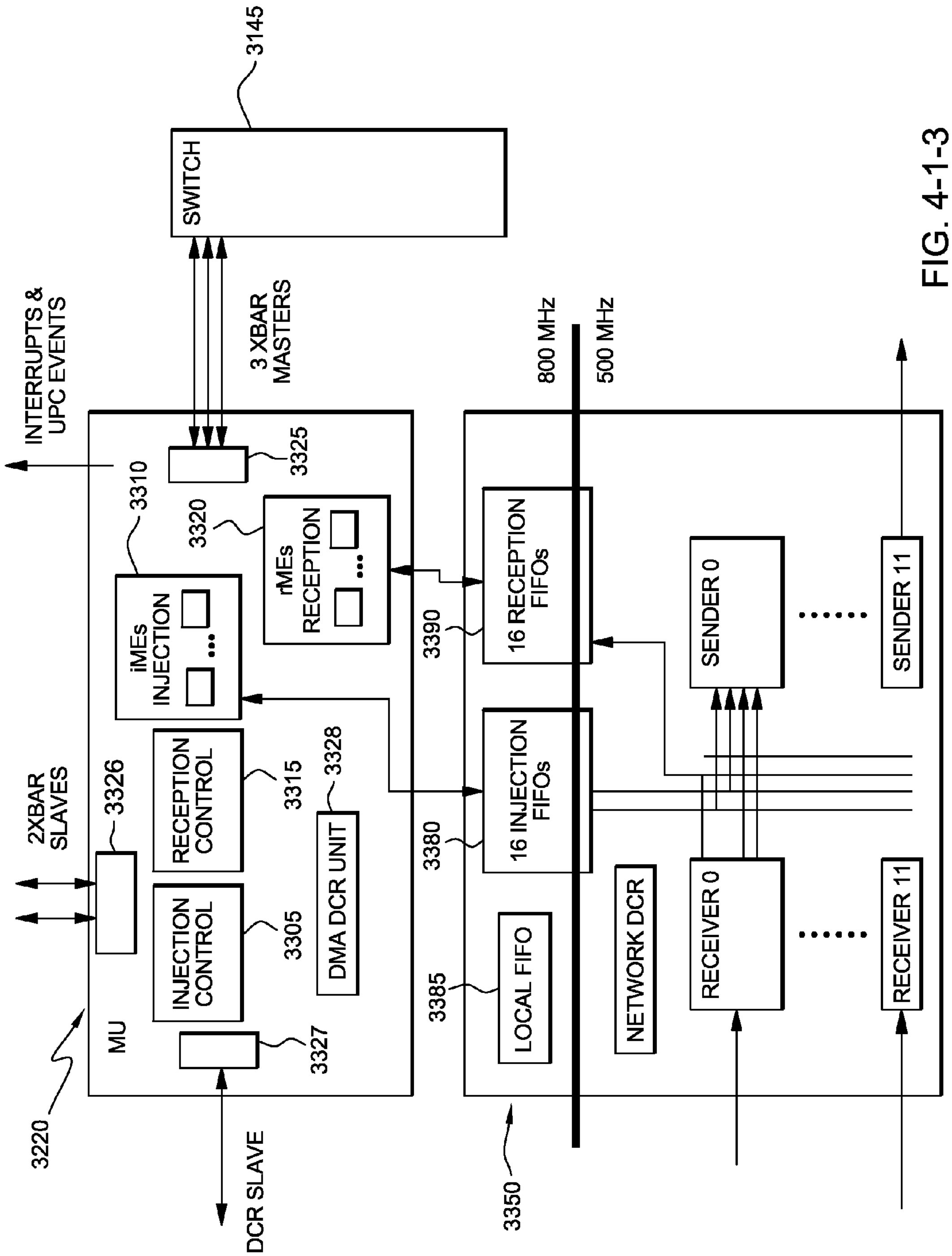
Figures 1, 4:
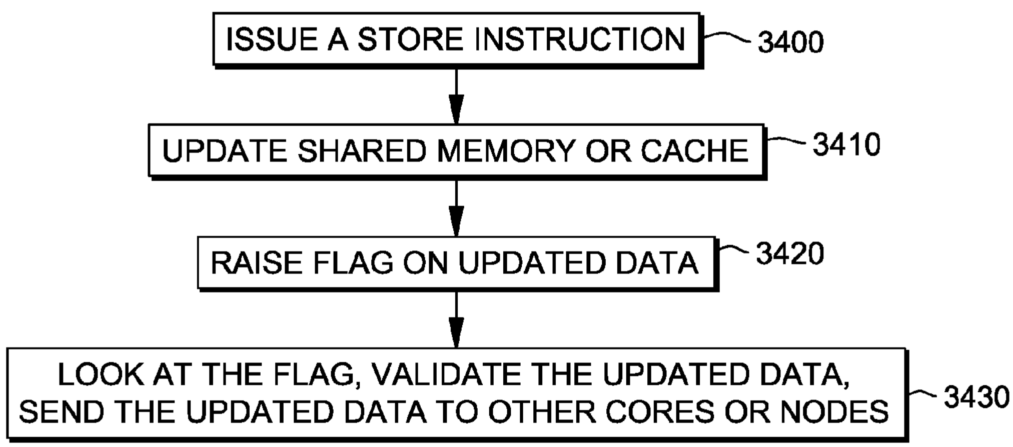
Figures 1, 4, 5:
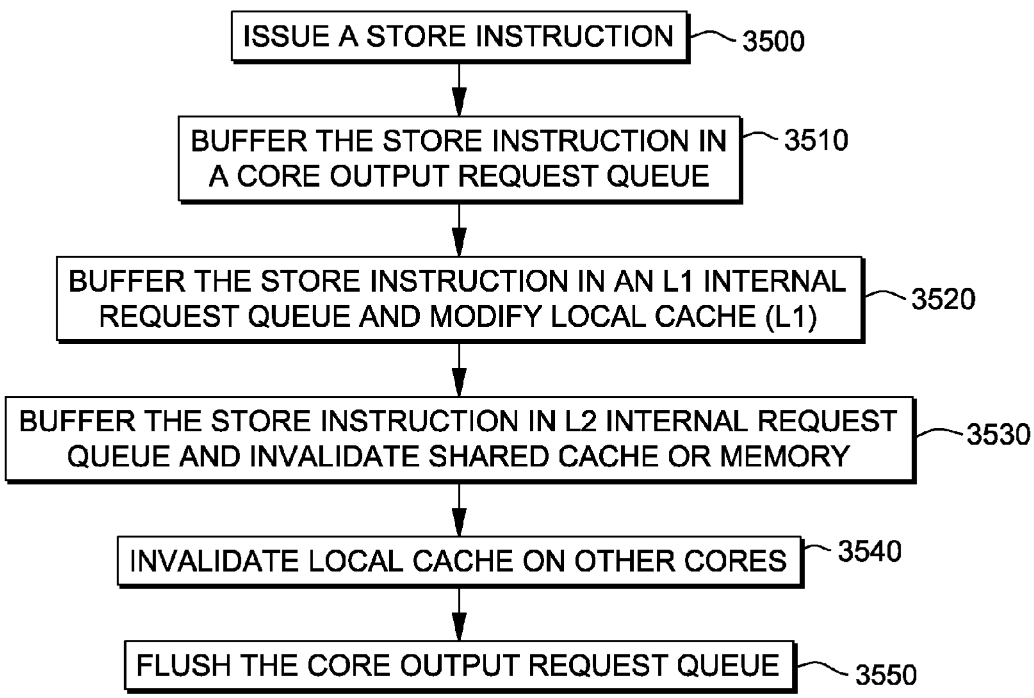
Figures 2, 4:
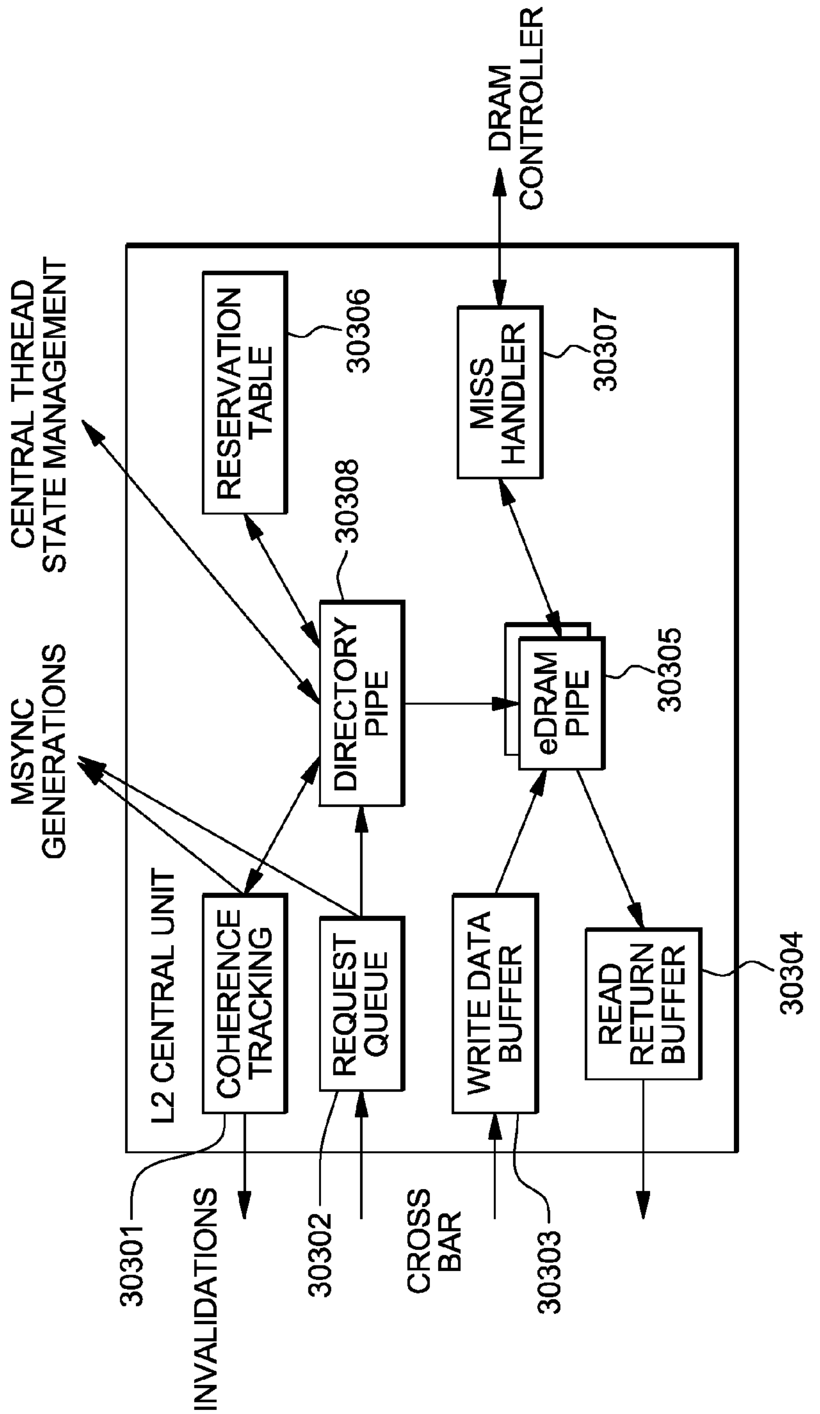
Figures 2, 3A, 4:
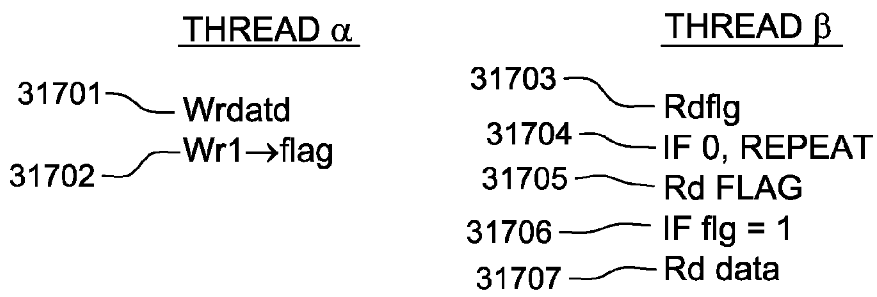
Figures 2, 3B, 4:
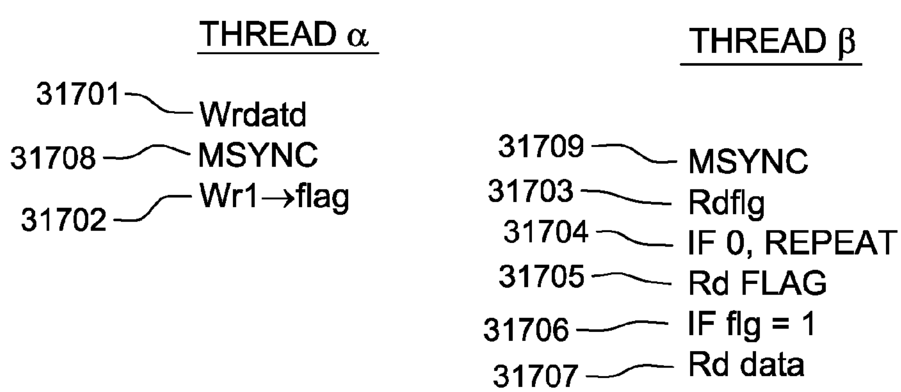
Figures 2, 4:
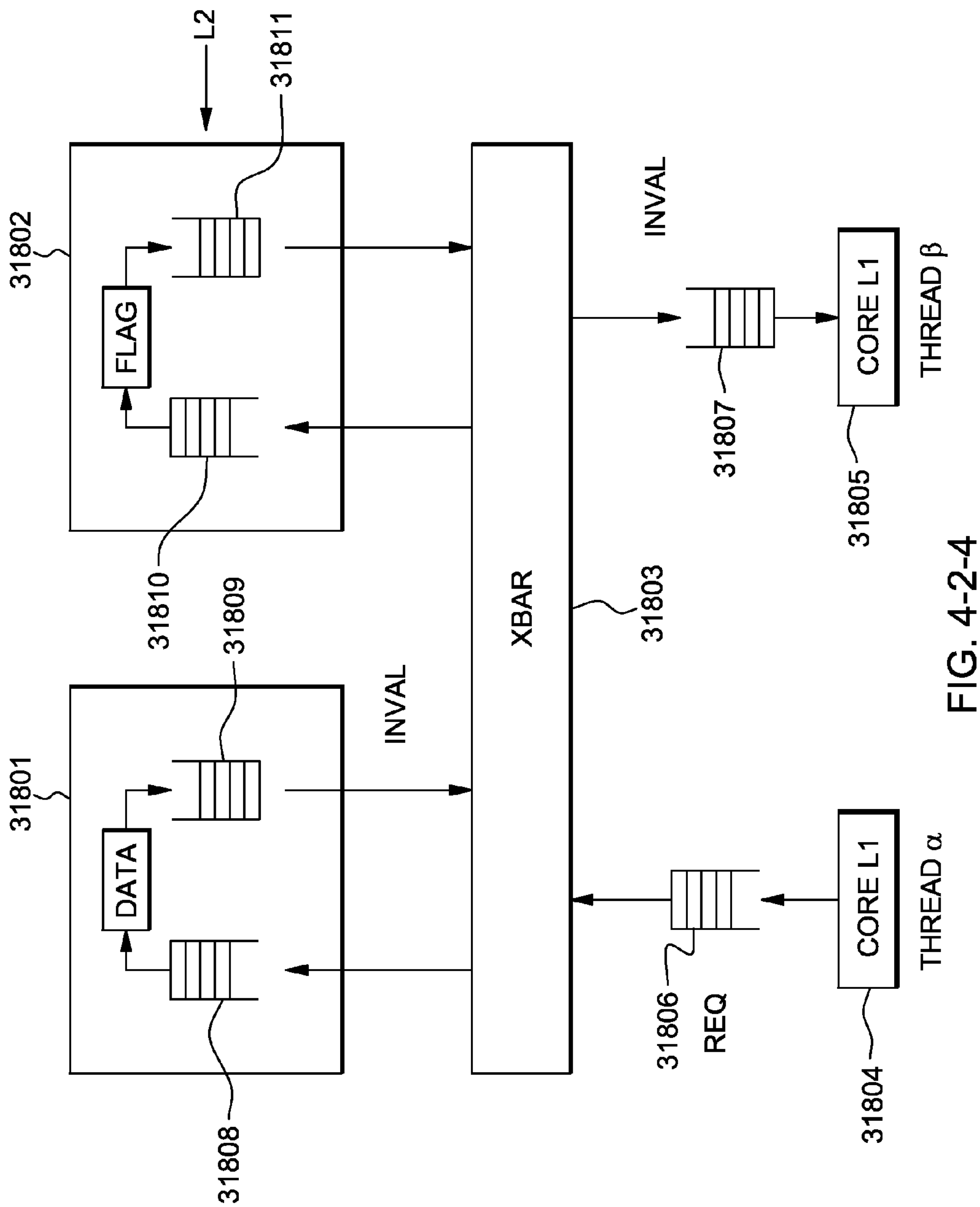
Figures 2, 4, 5:
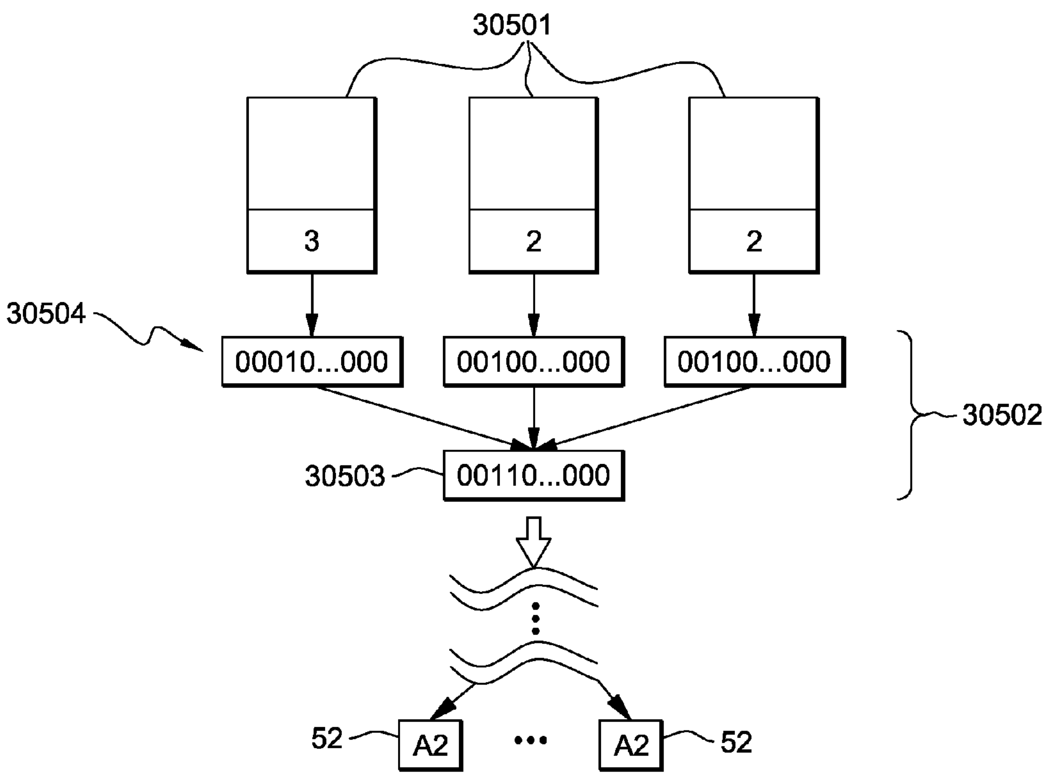
Figures 2, 4, 5A:
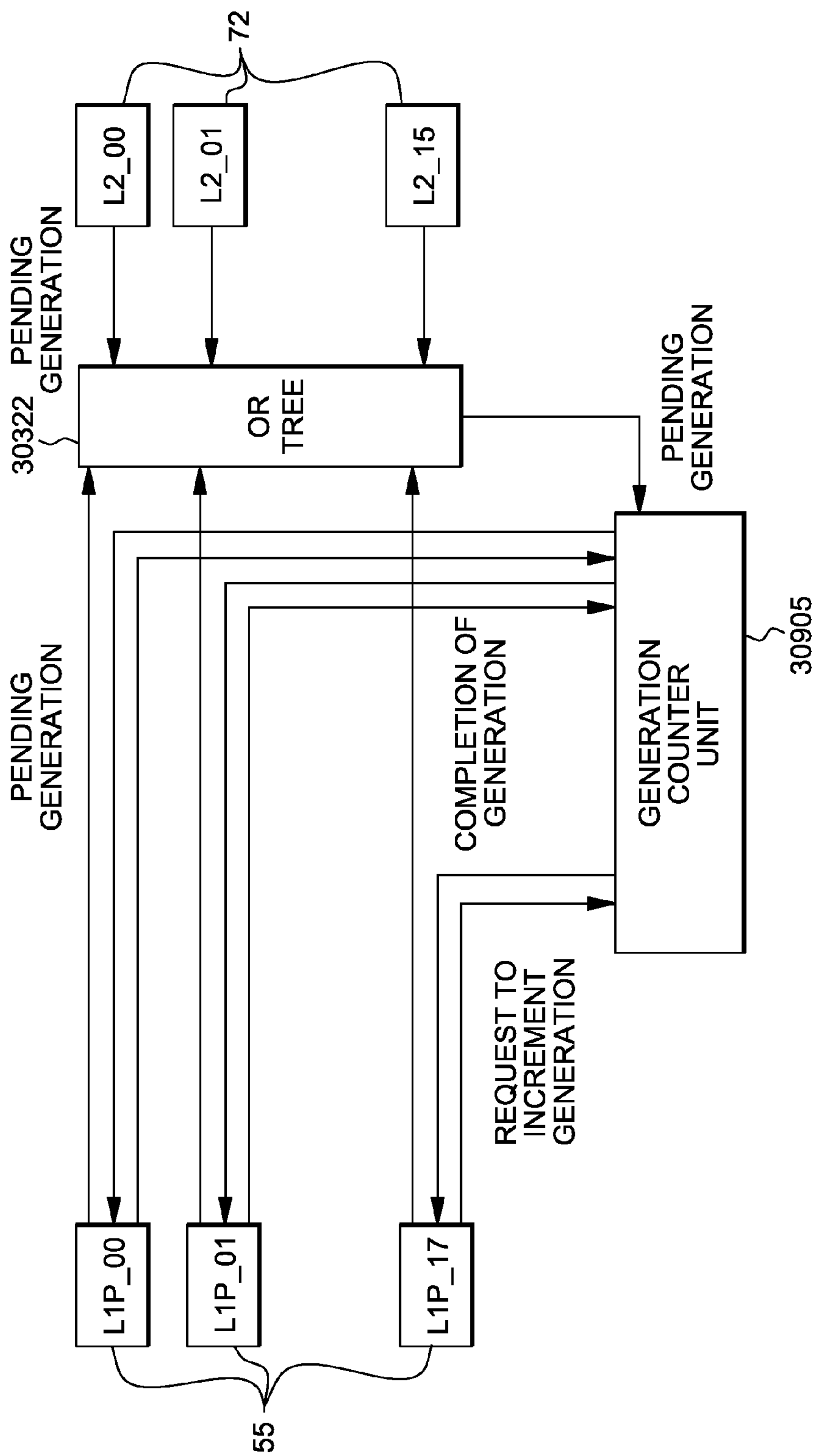
Figures 2, 4, 5B:
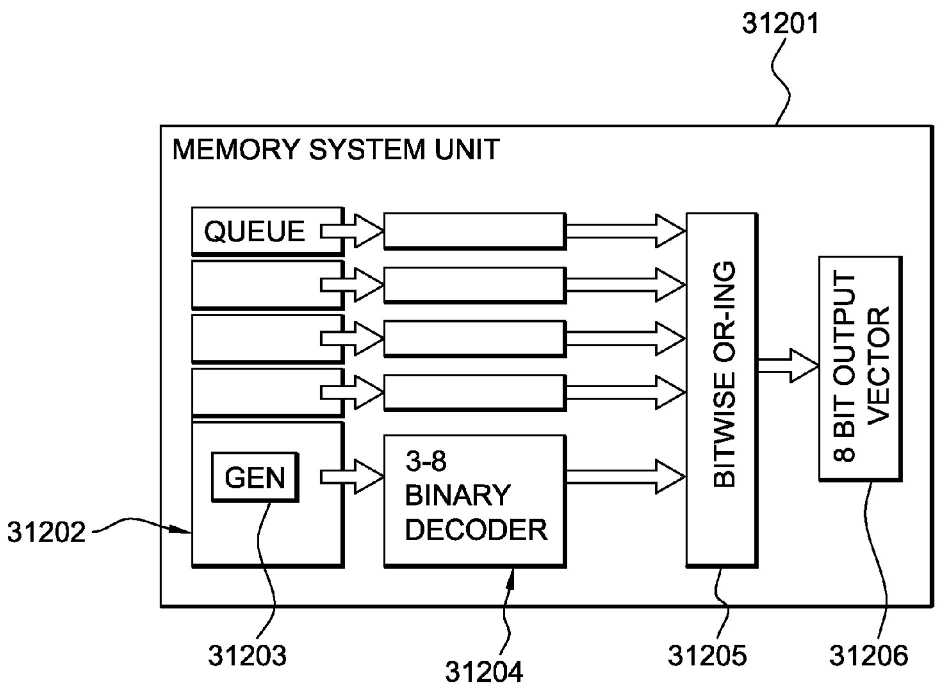
Figures 2, 4, 6:
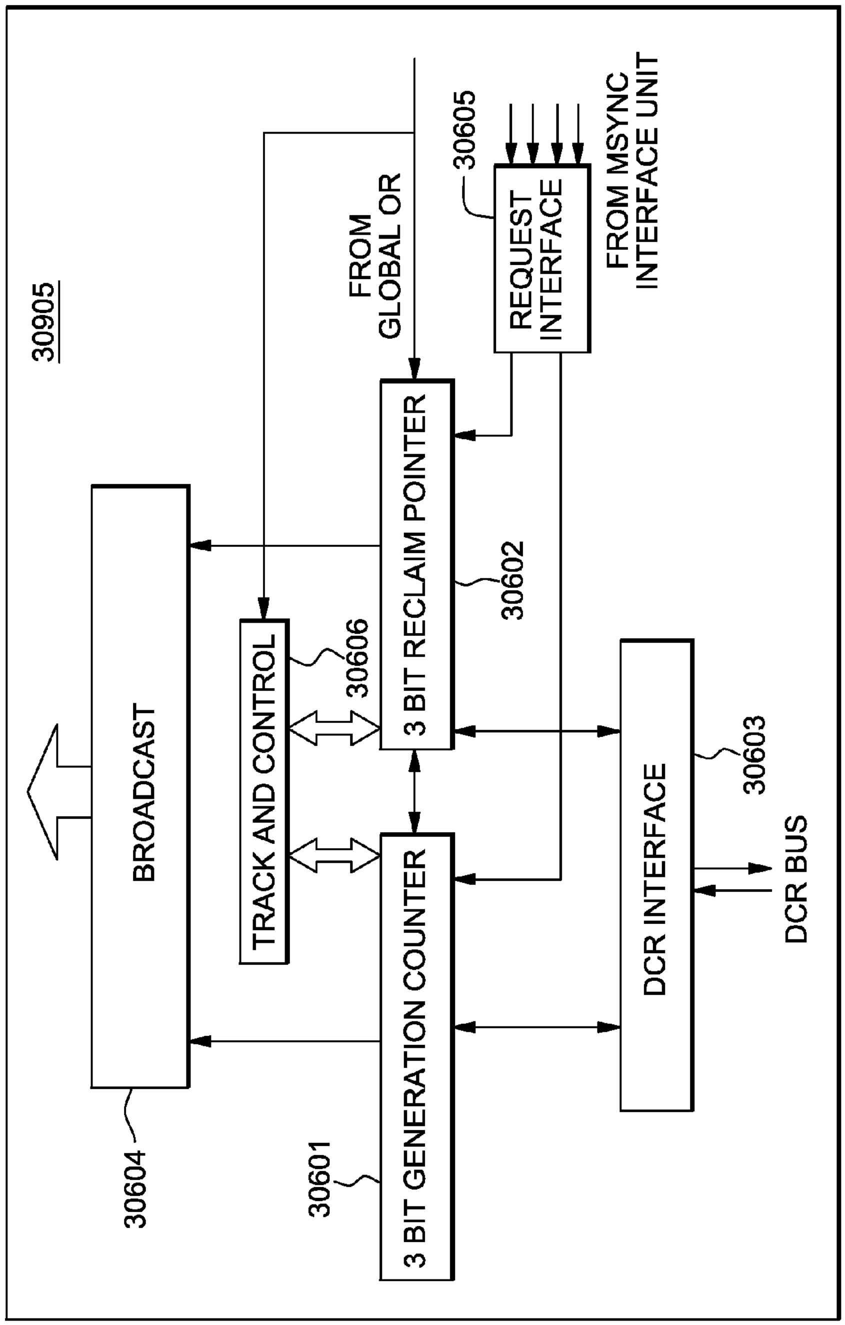
Figures 2, 4, 7:
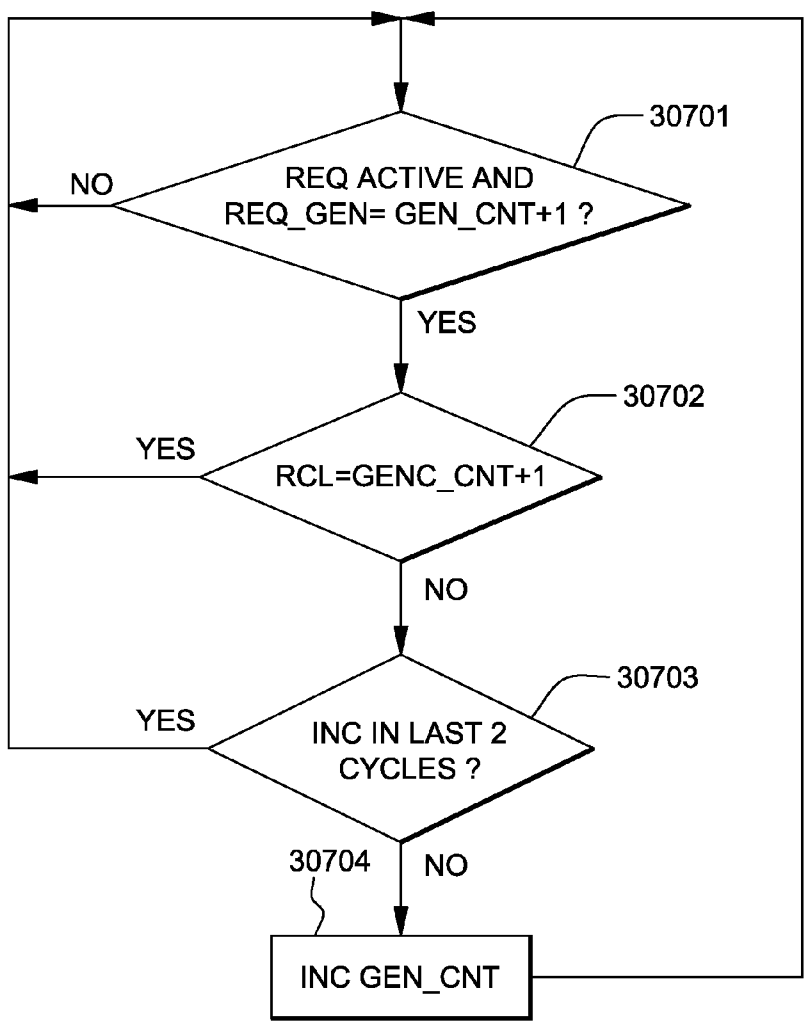
Figures 2, 4, 8:
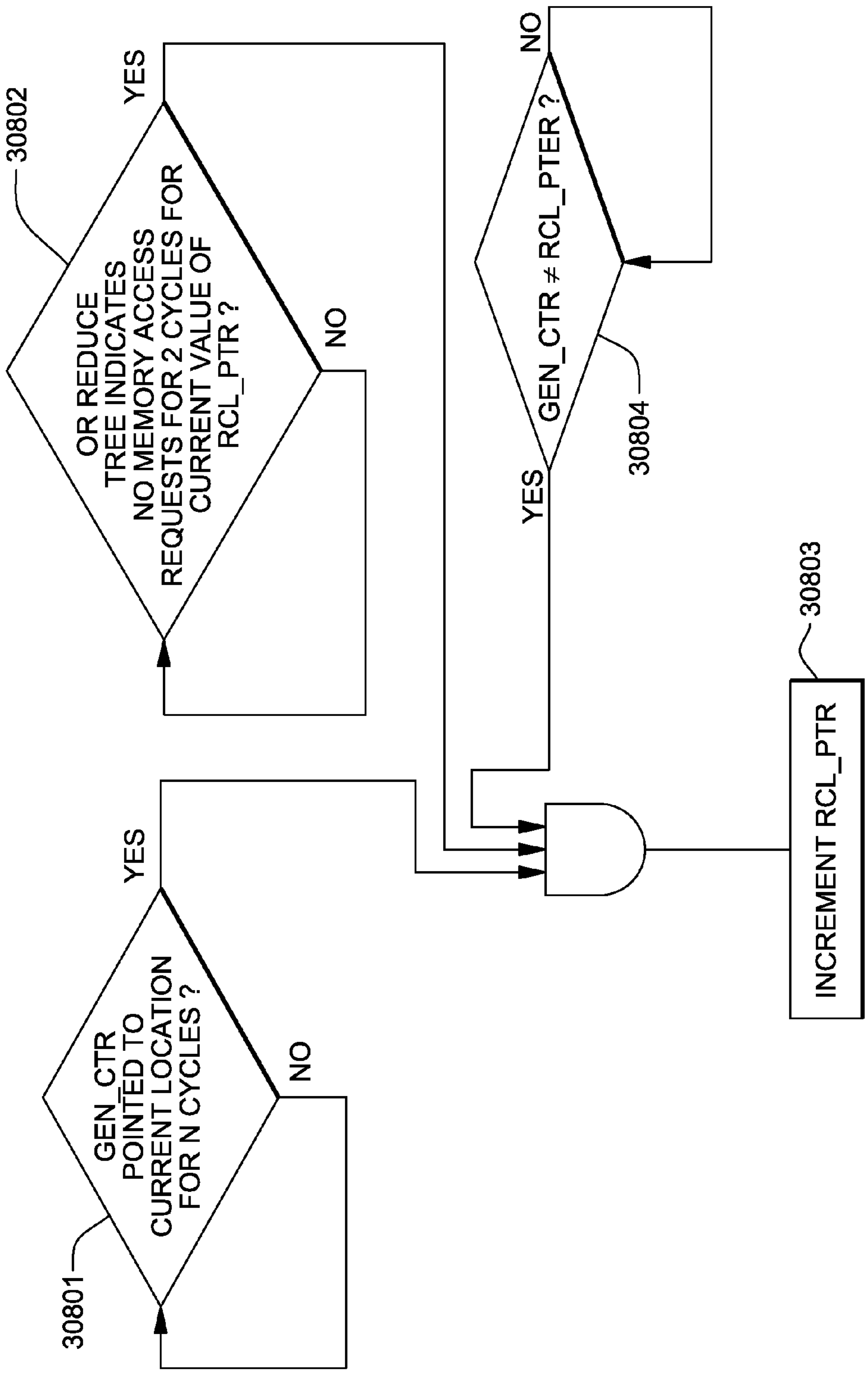
Figures 2, 4, 9:
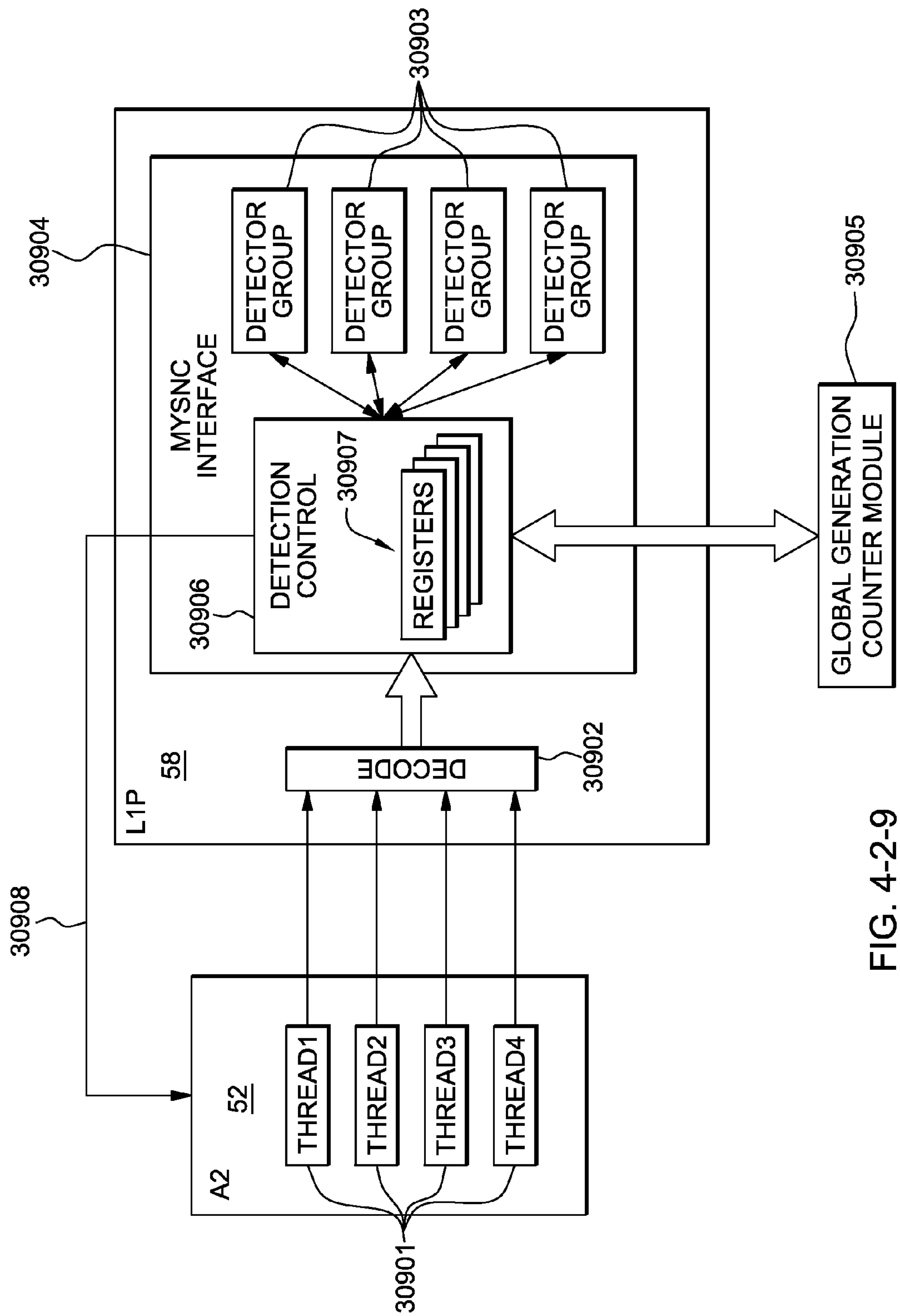
Figures 2, 4, 10:
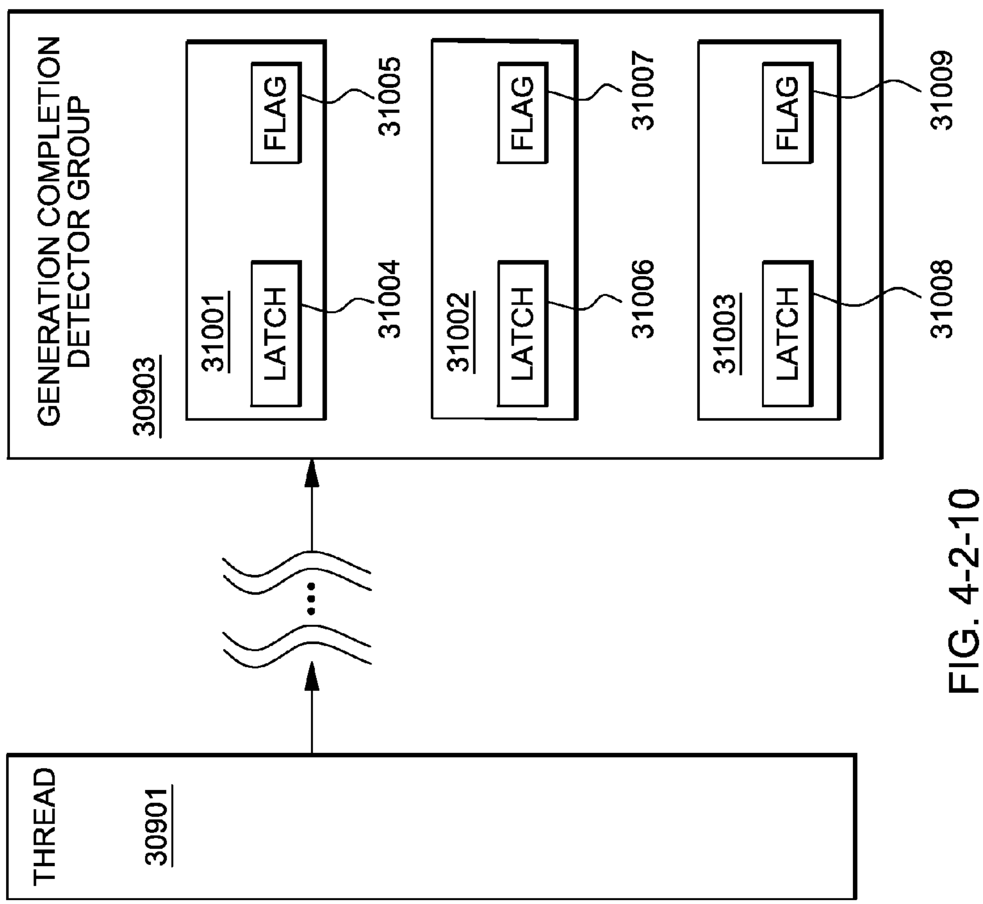
Figures 2, 4, 11:
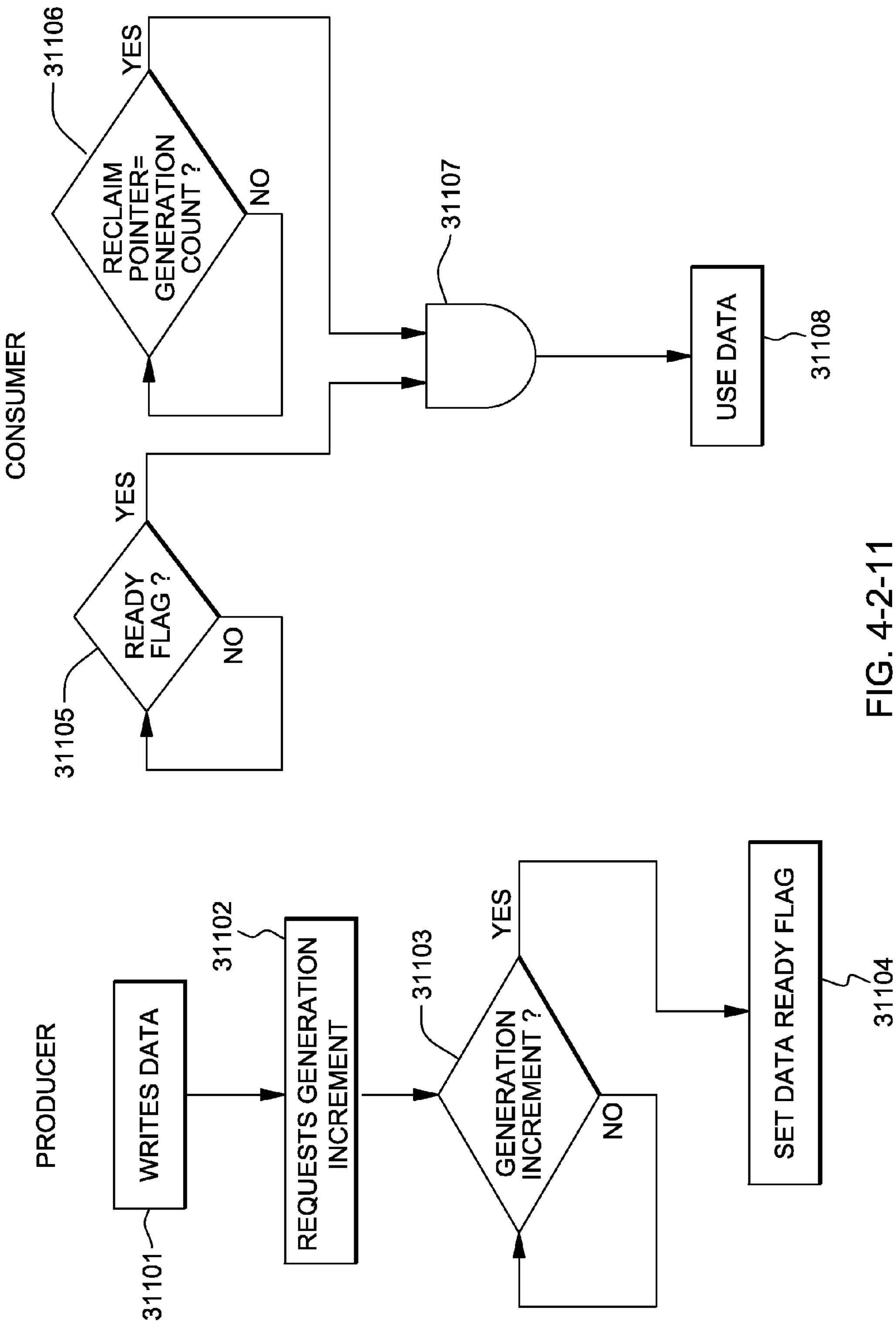
Figures 2, 4, 12:
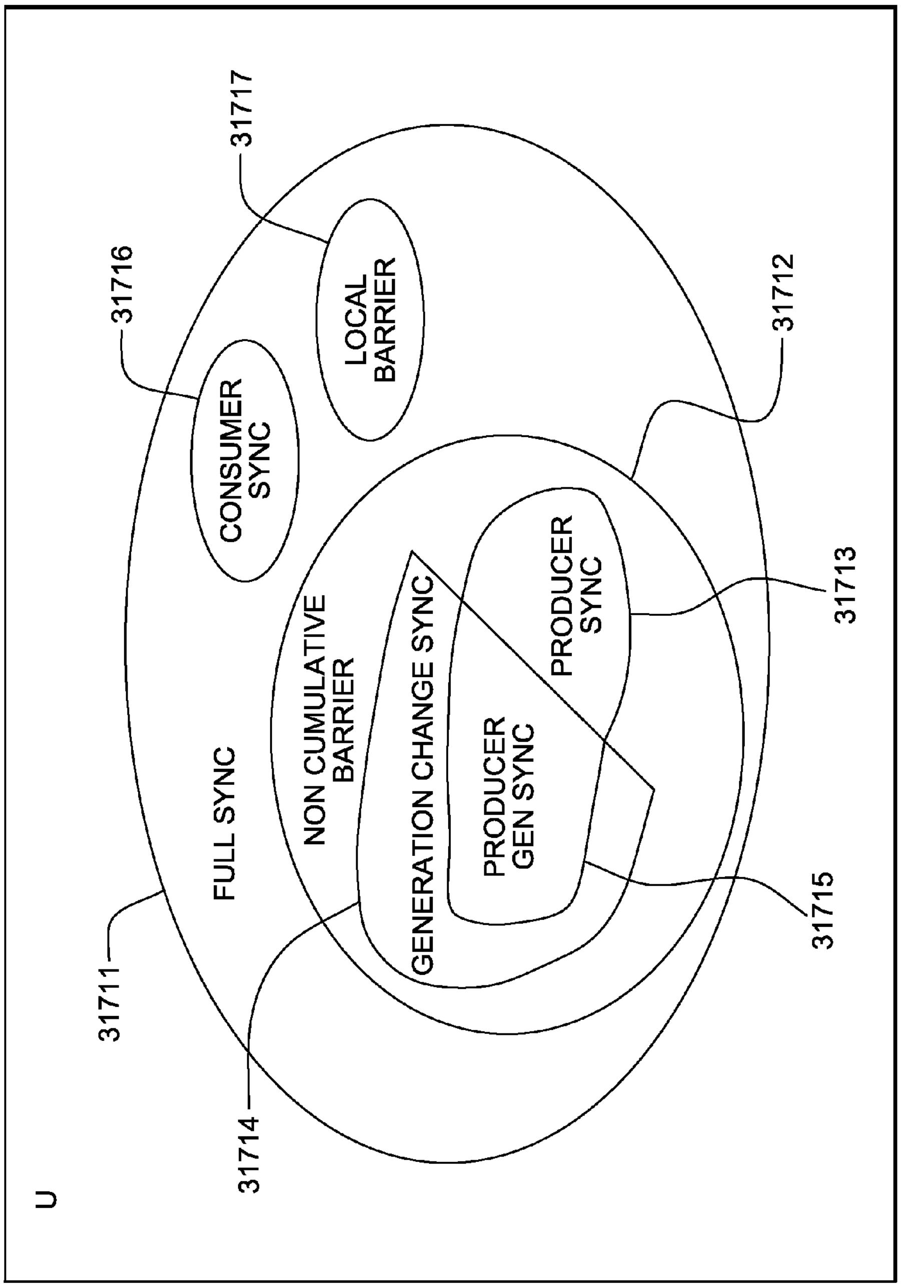
Figures 2, 4, 13:
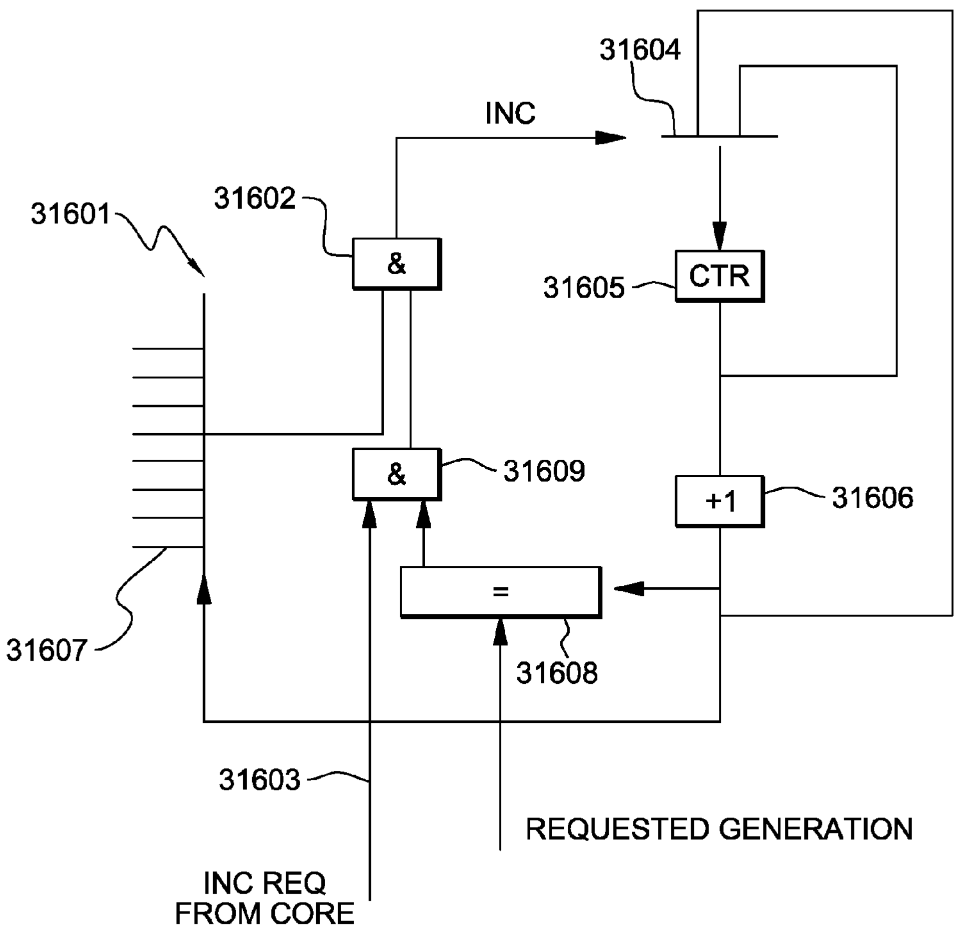
Figures 2, 4, 14:
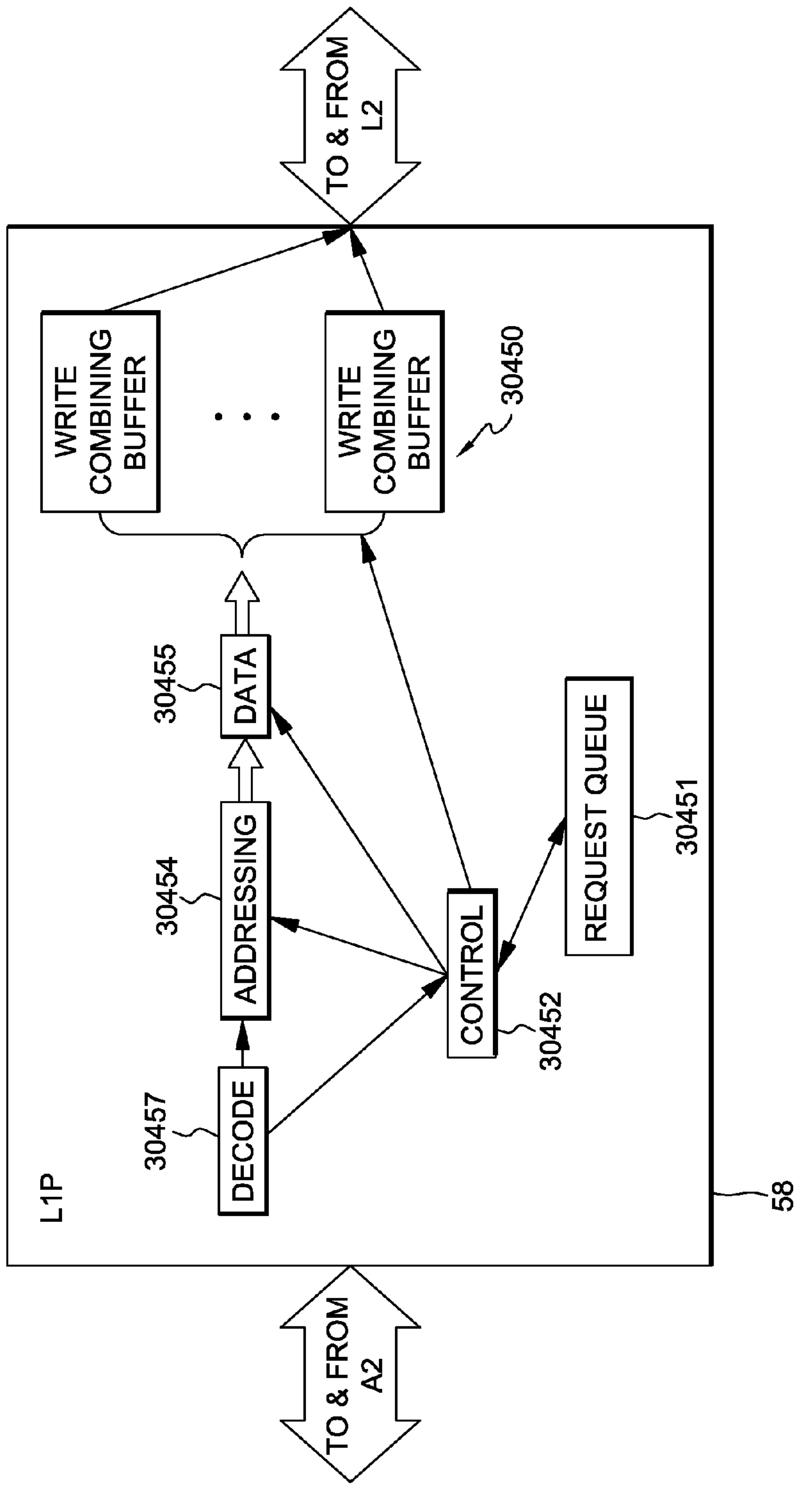
Figures 2, 4, 15:
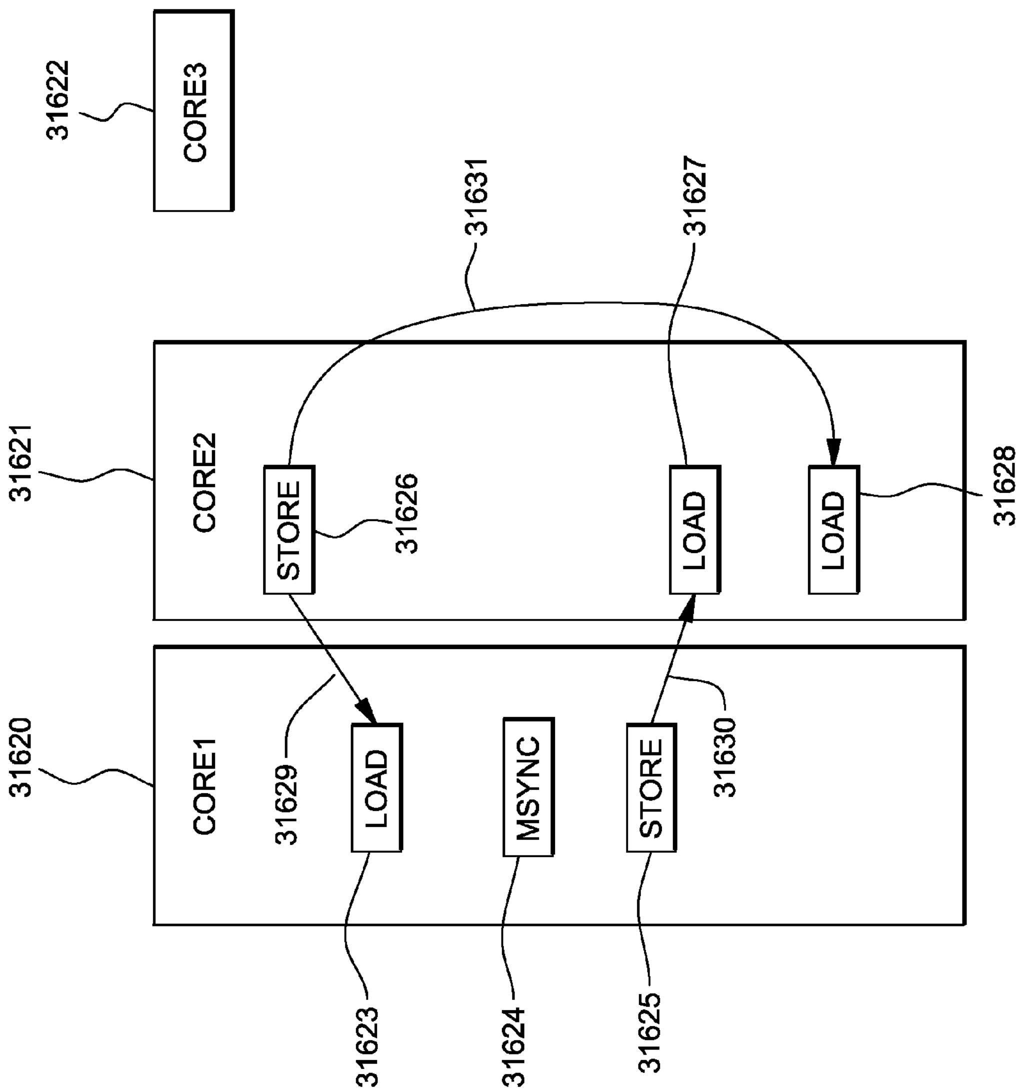
Figures 2, 3, 4:
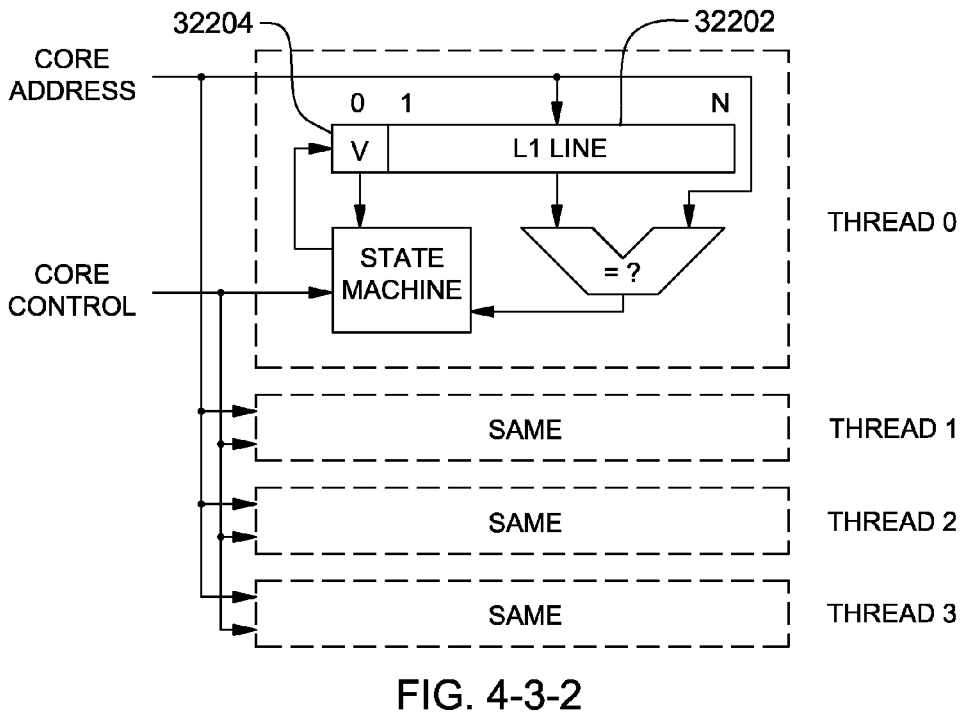
Figures 3, 4:
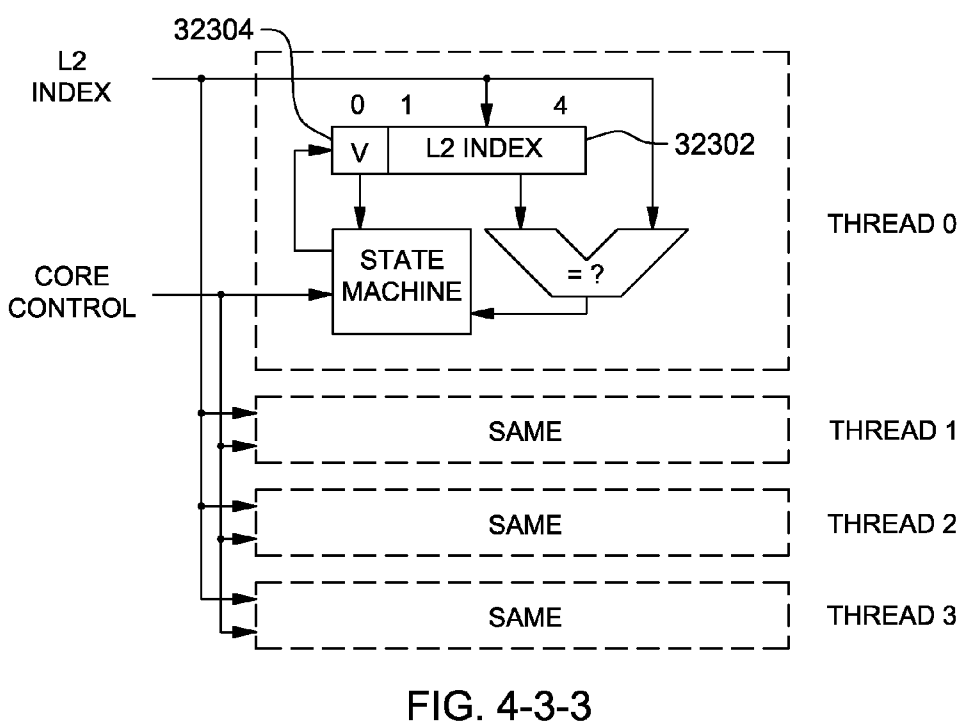
Figures 3, 4:
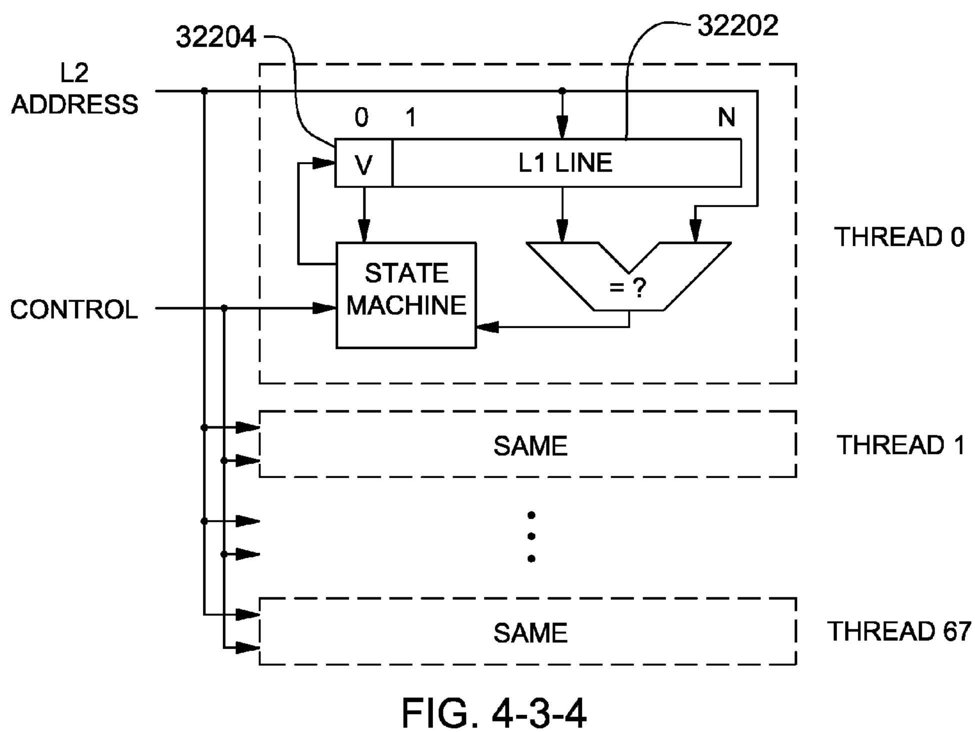
Figures 3, 4, 5:
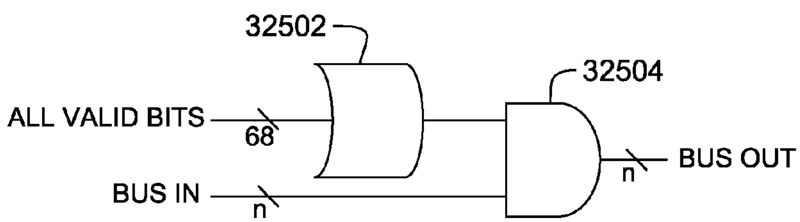
Figures 3, 4, 6:
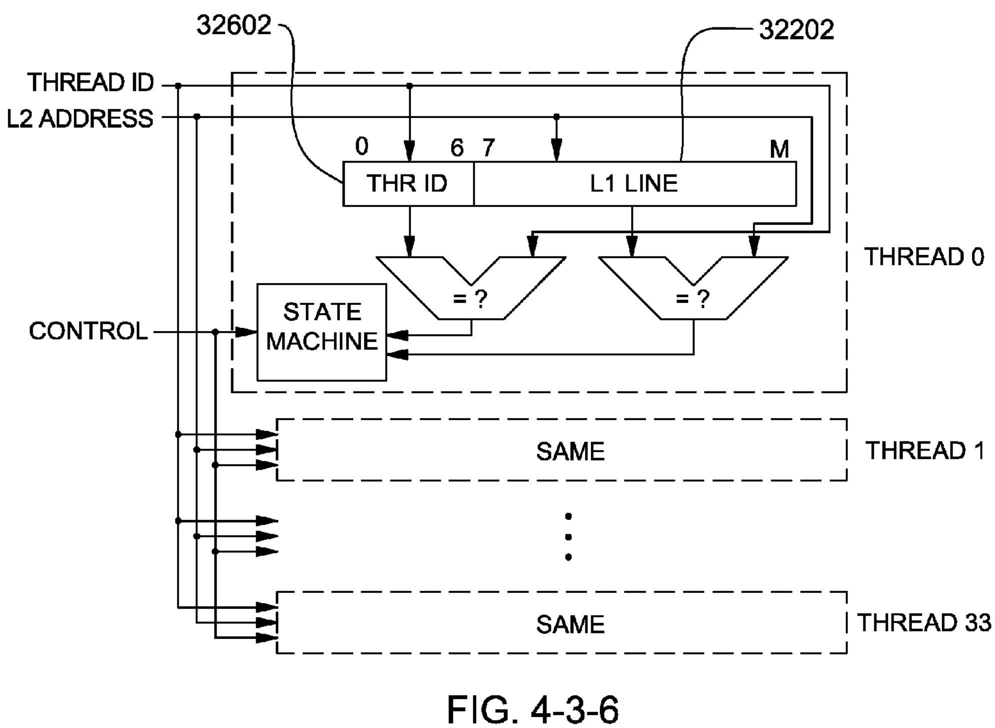
Figures 2, 4:
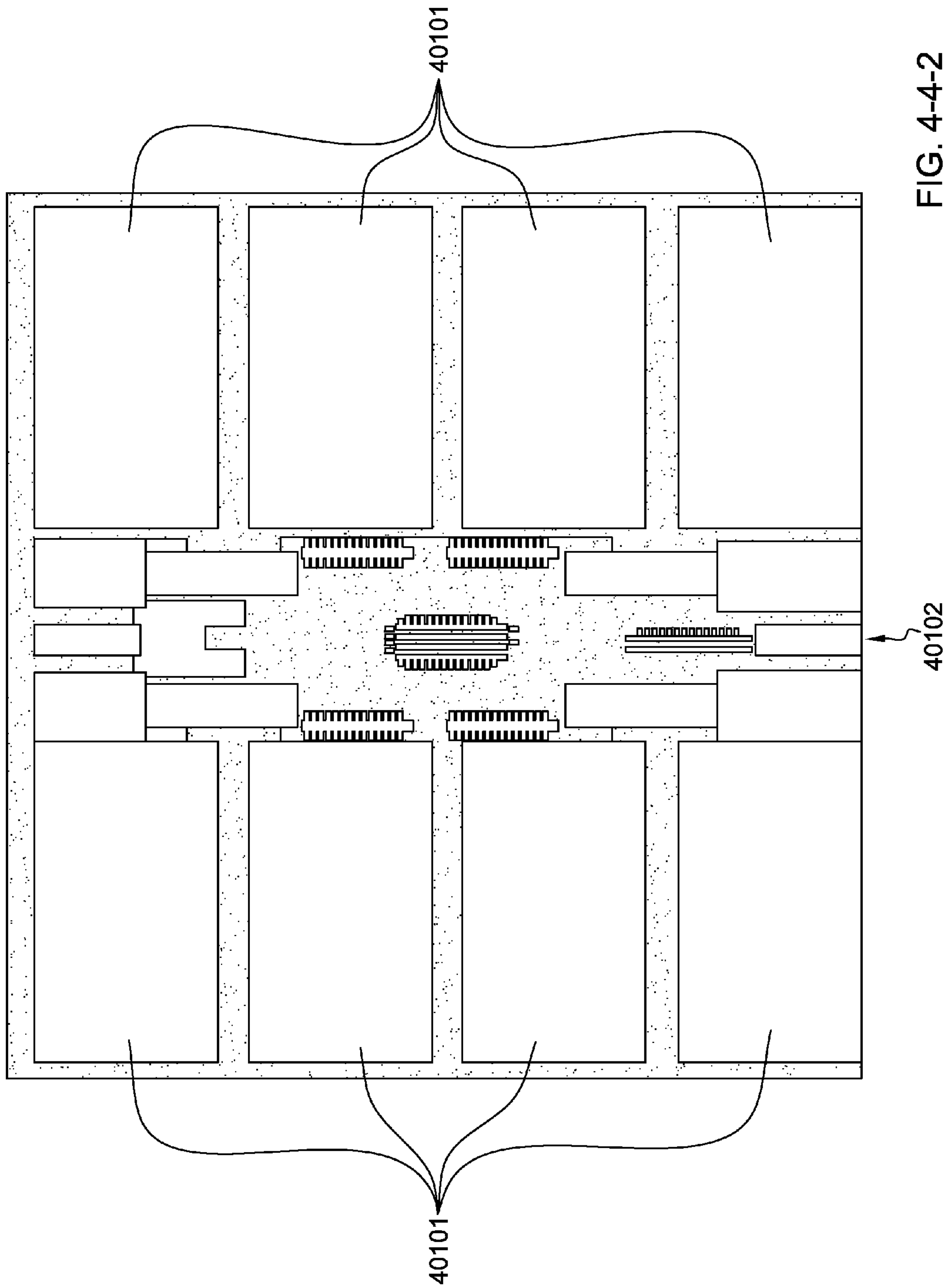
Figures 3, 4:
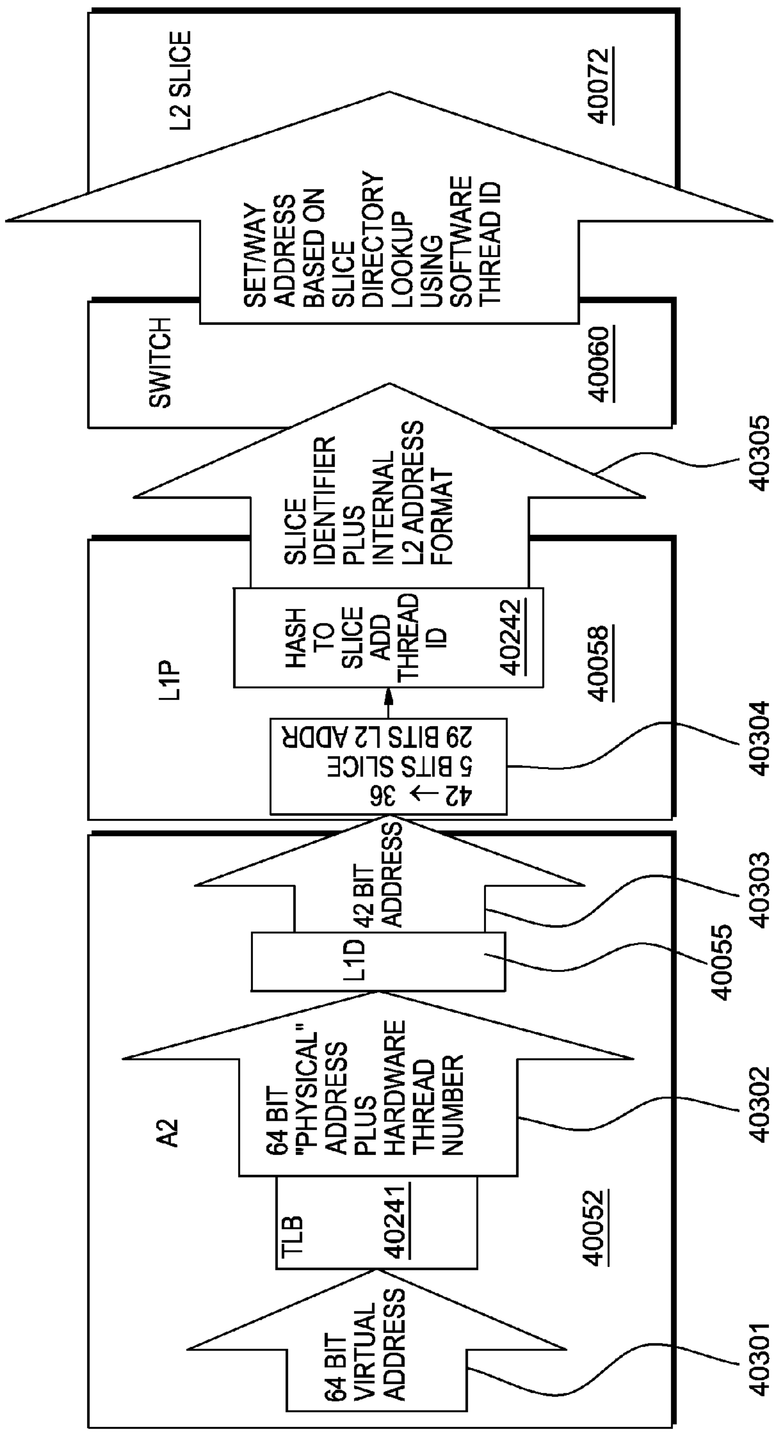
Figure 4:
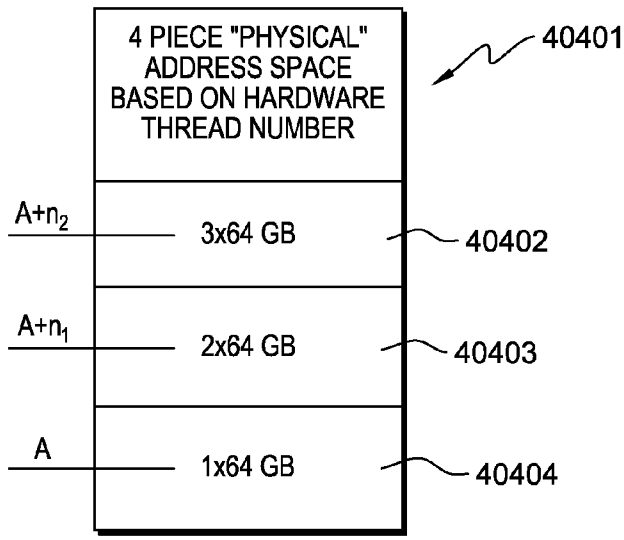
Figures 4, 5:
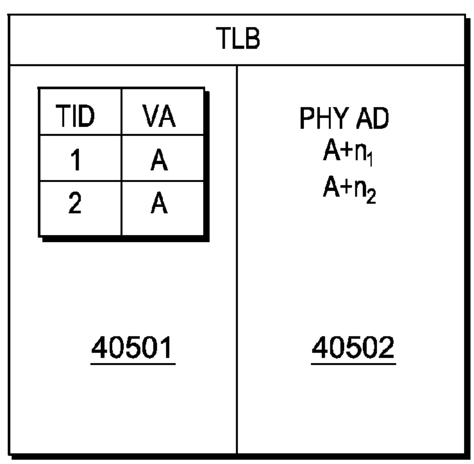
Figures 4, 6:
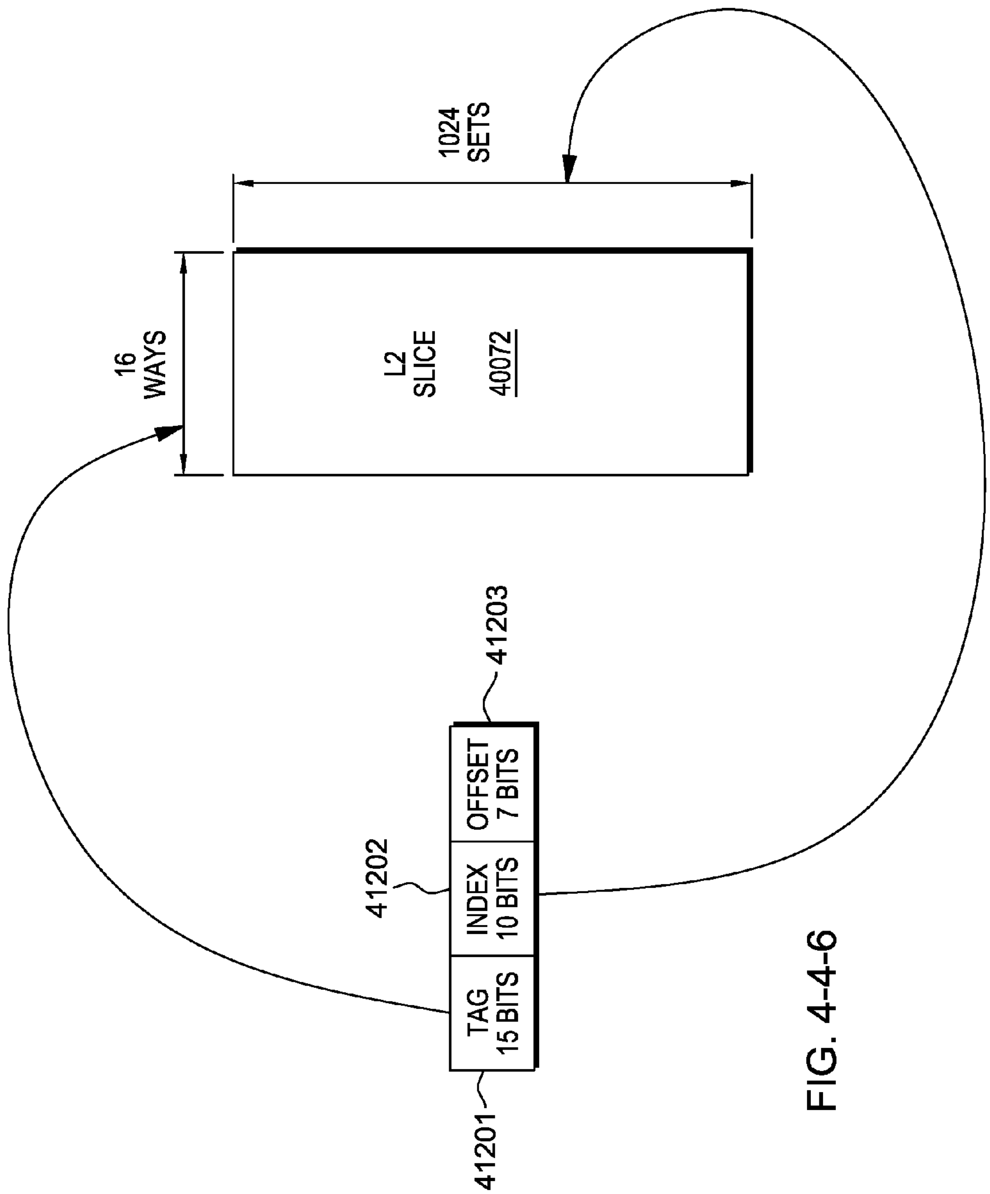
Figures 4, 7:
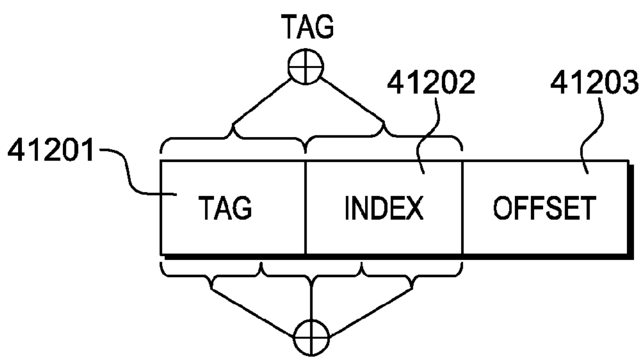
Figures 4, 8:
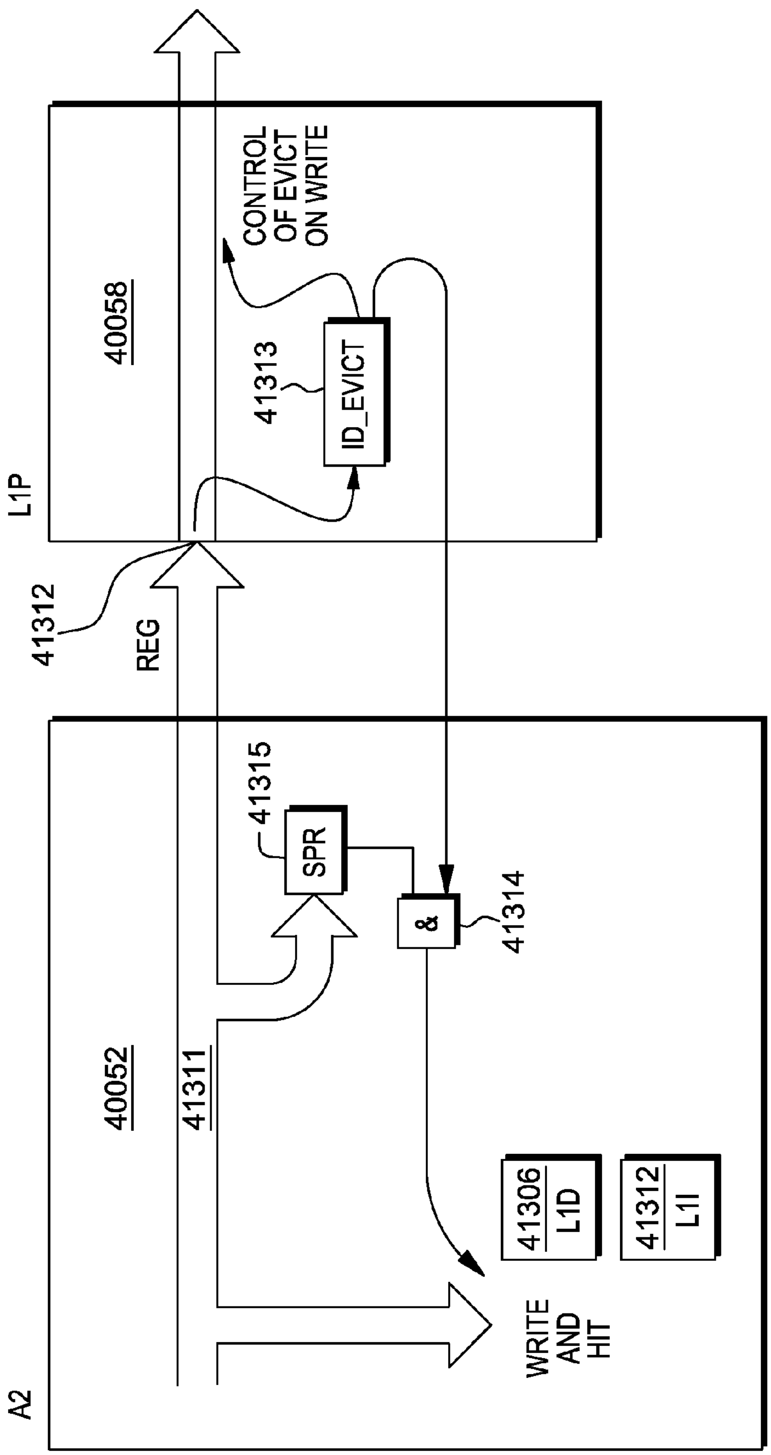
Figures 4, 9:
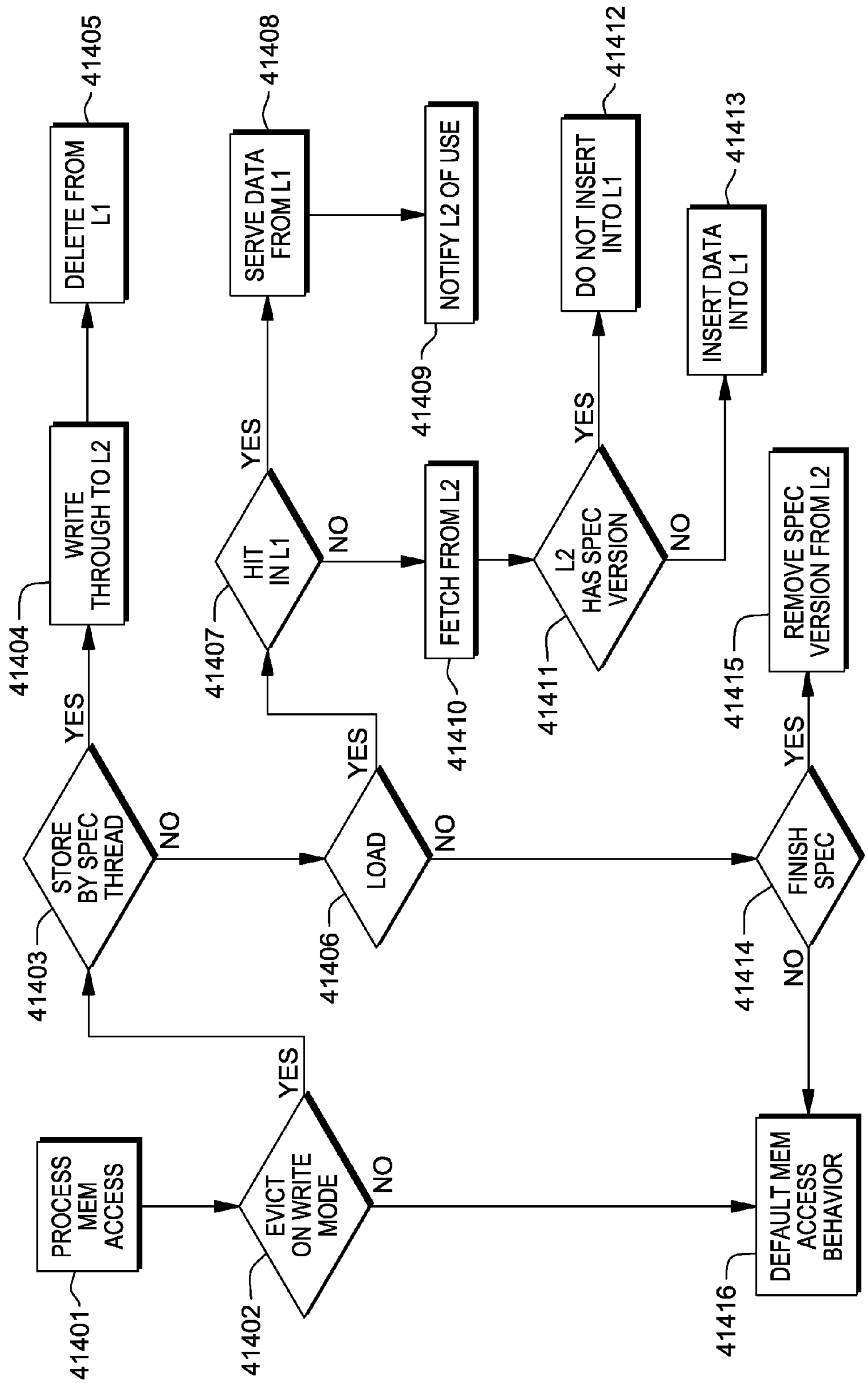
Figures 4, 10:
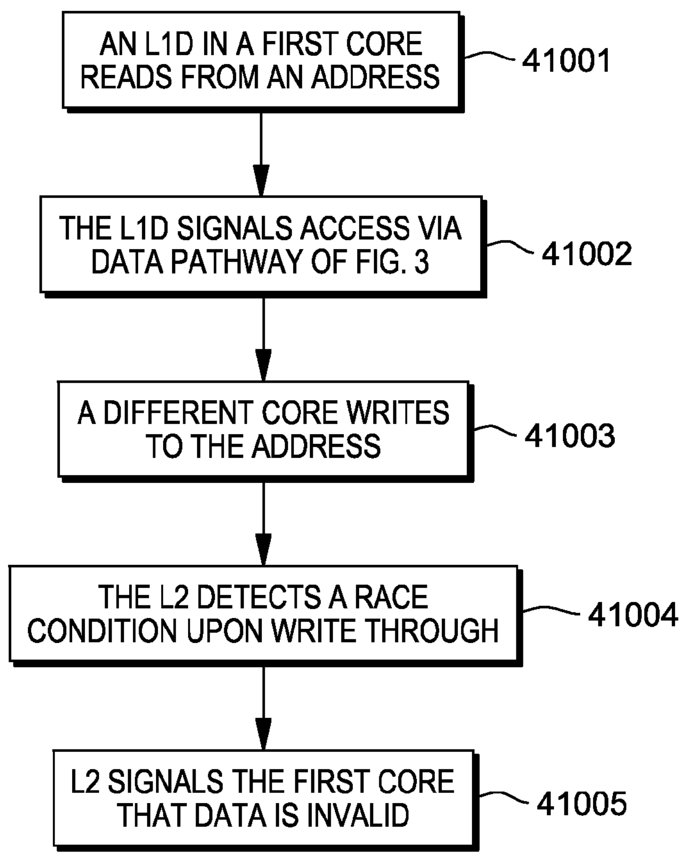
Figures 1, 4, 5:
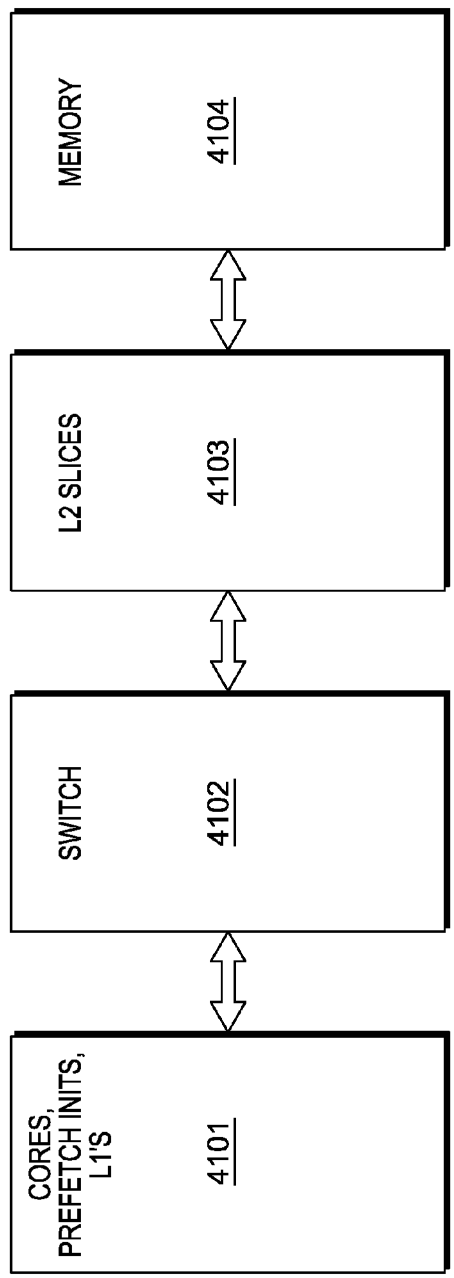
Figures 3, 4, 5:
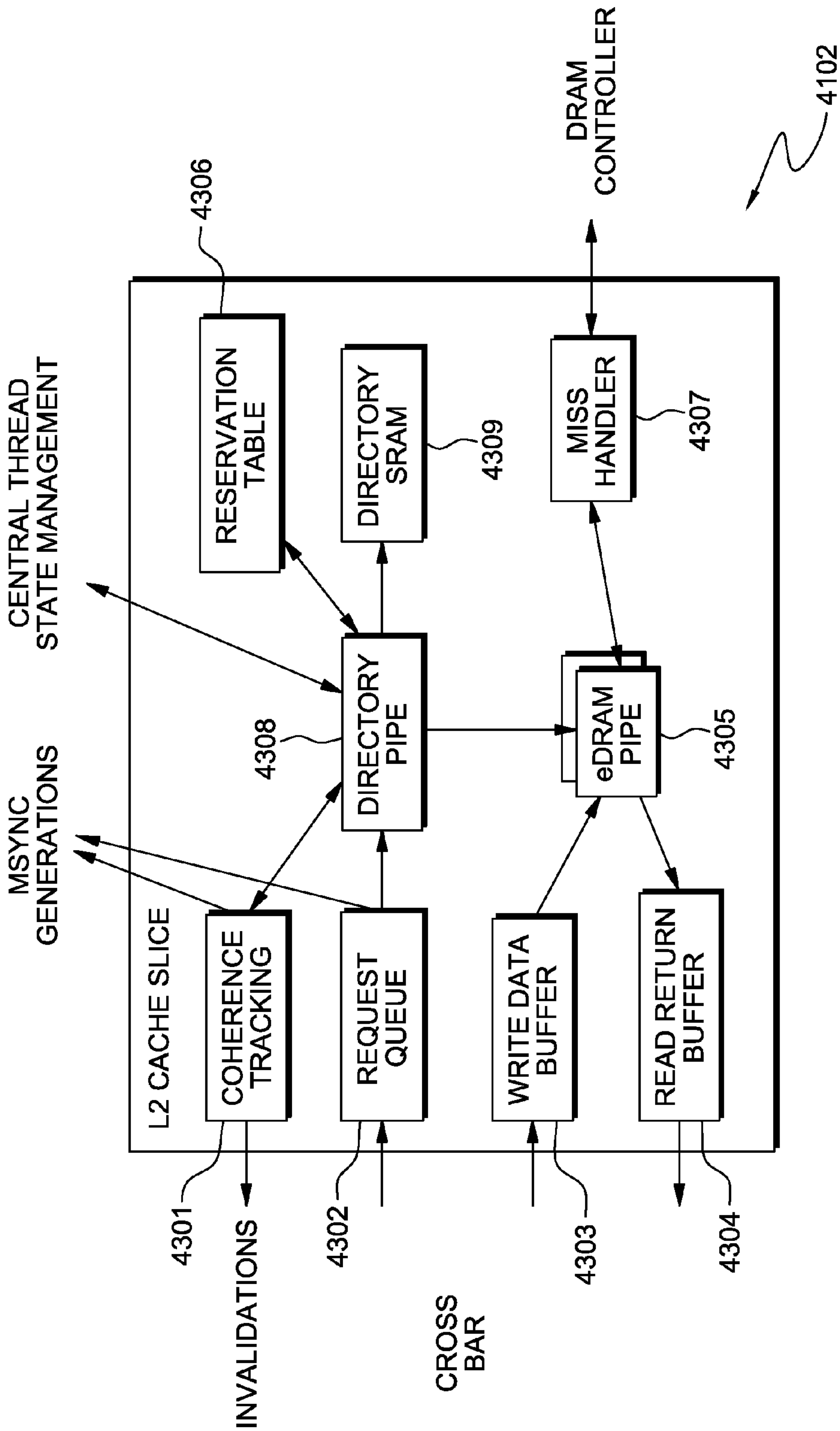
Figures 4, 5:
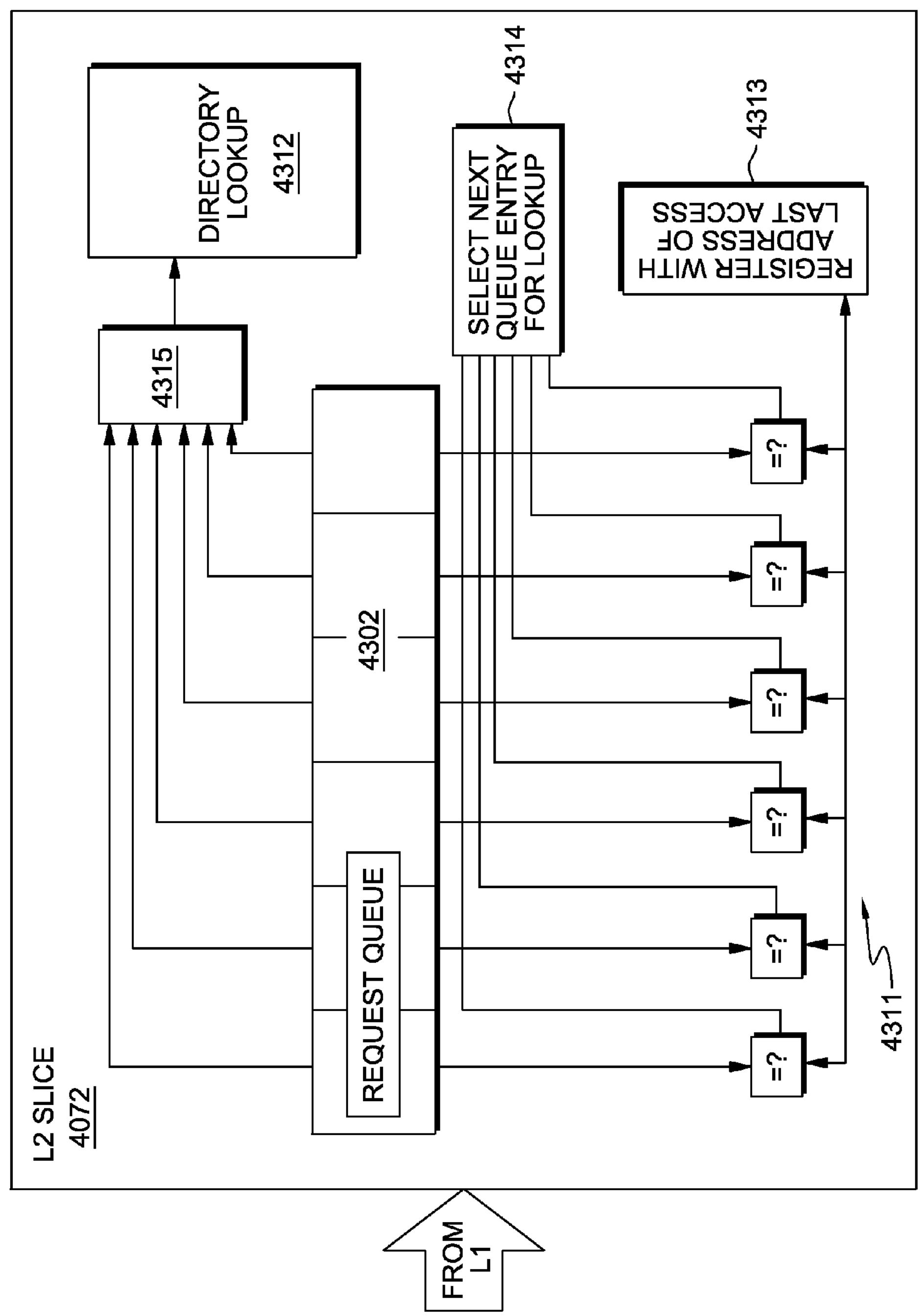
Figures 4, 5:
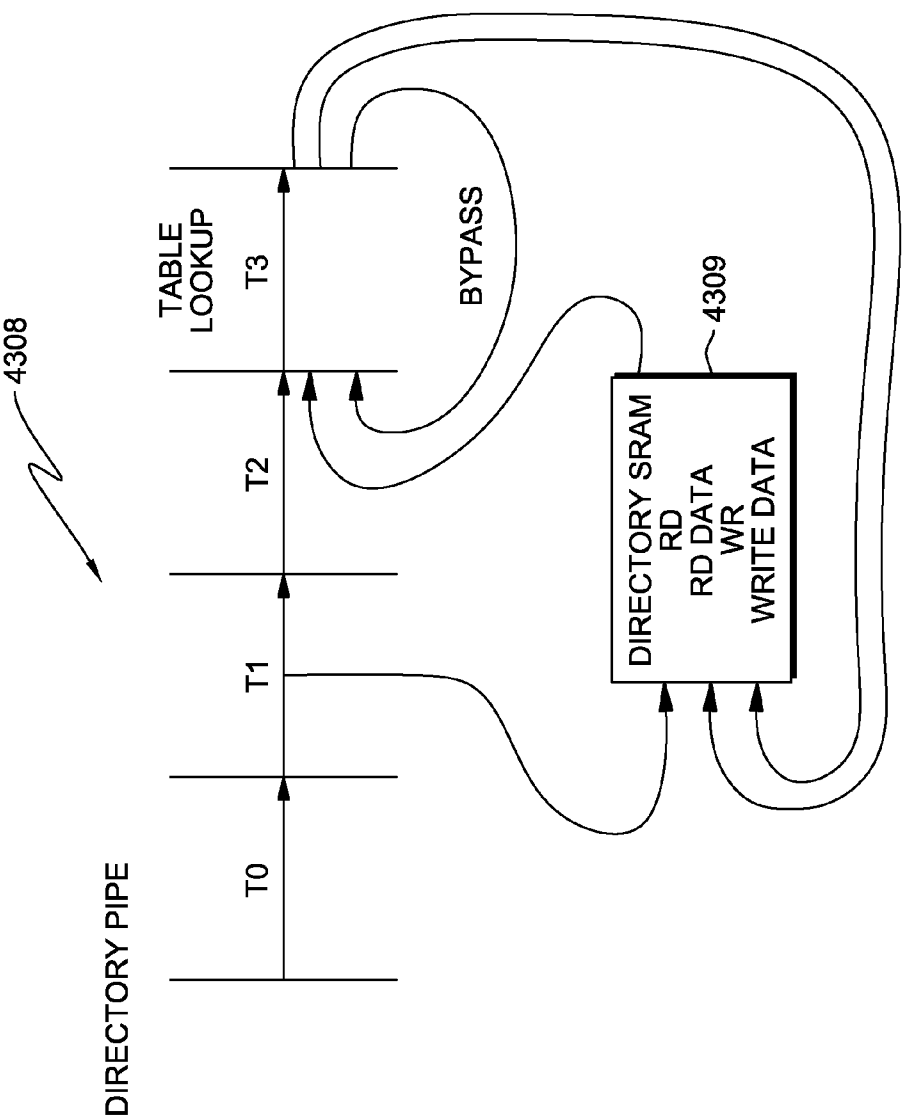
Figures 1, 4, 5, 6:
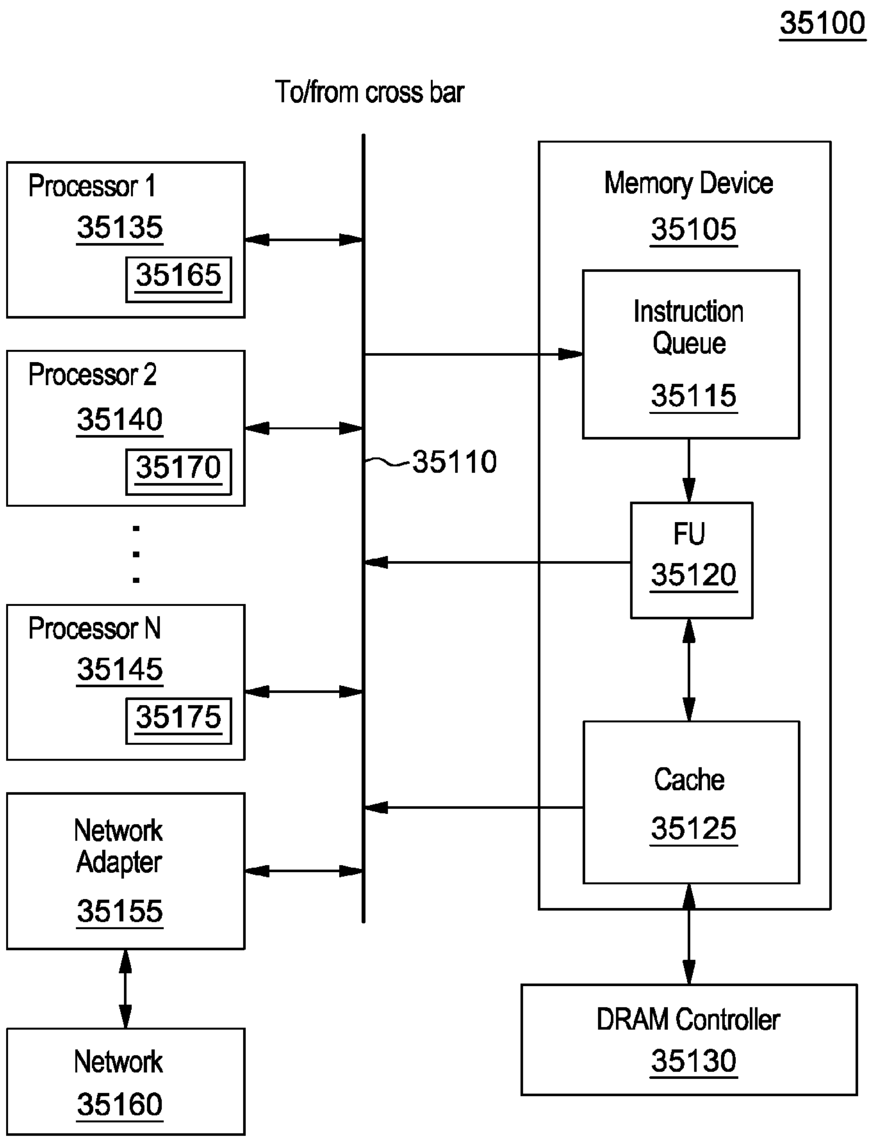
Figures 2A, 4, 5, 6:
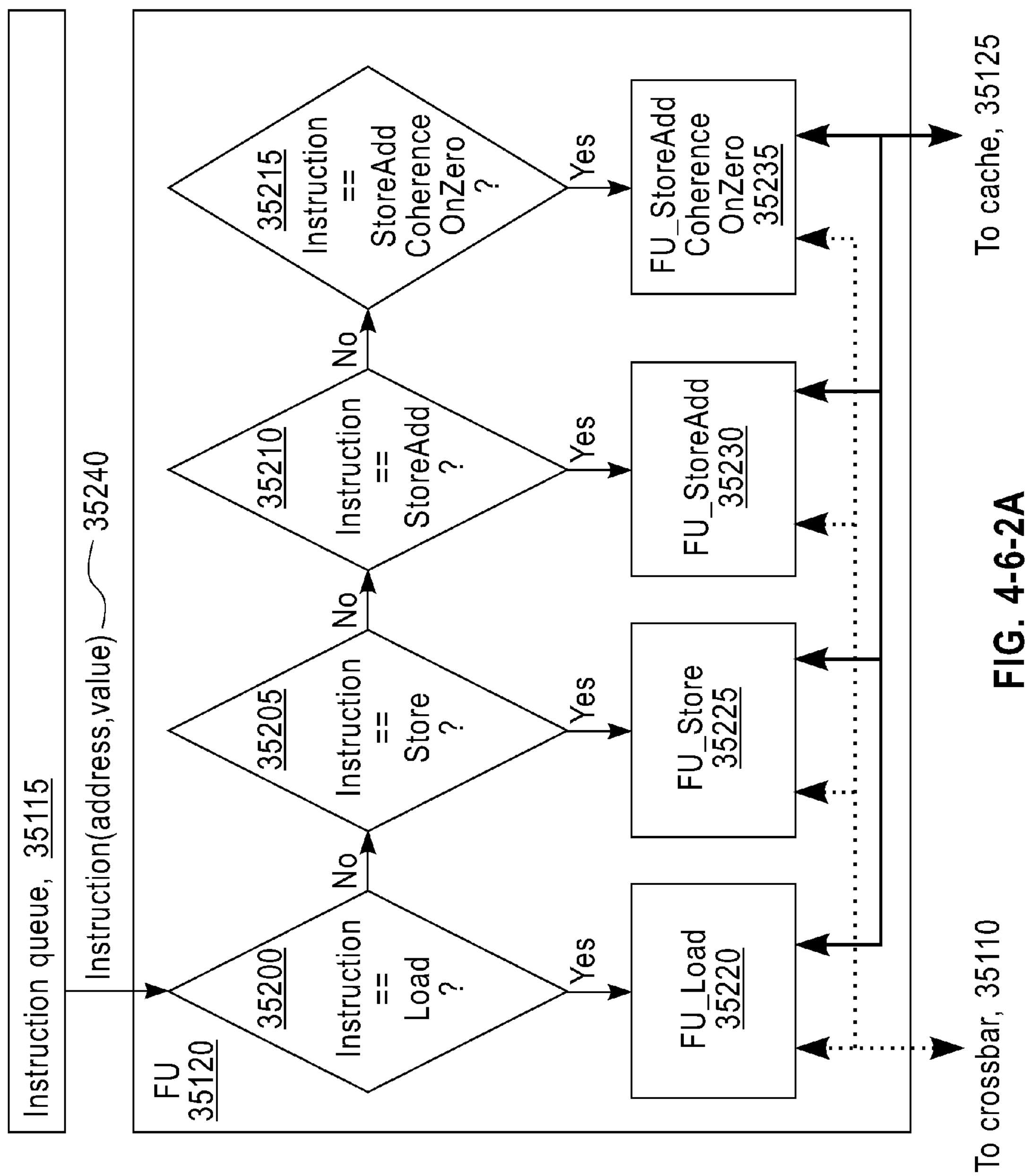
Figures 2B, 4, 5, 6:
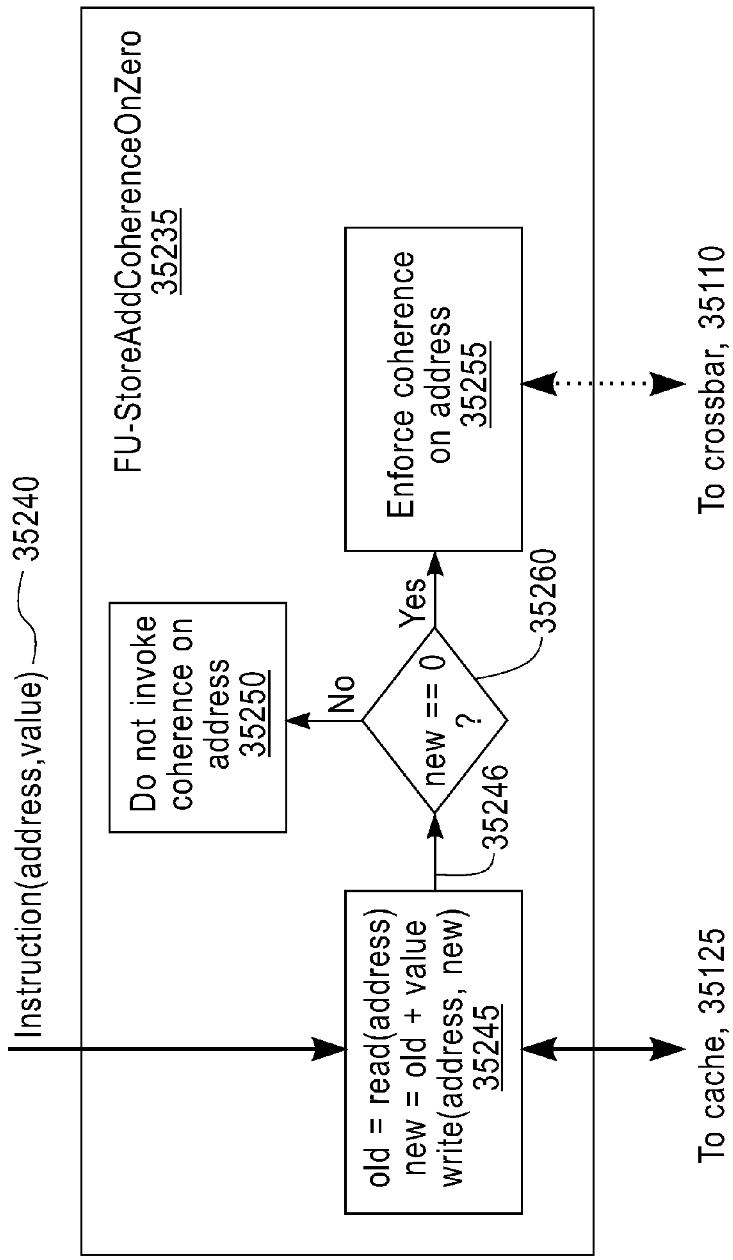
Figures 3A, 4, 5, 6:
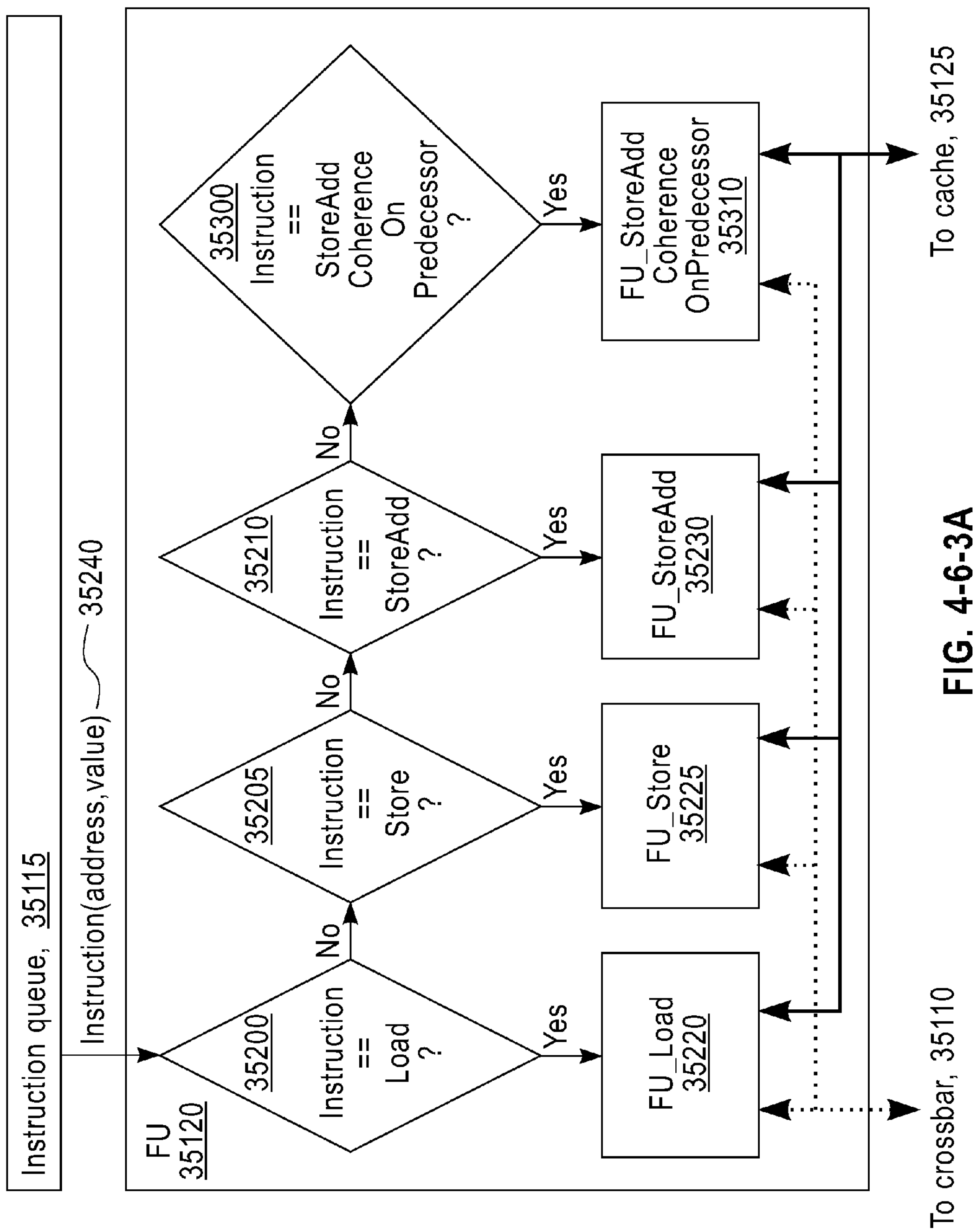
Figures 3B, 4, 5, 6:
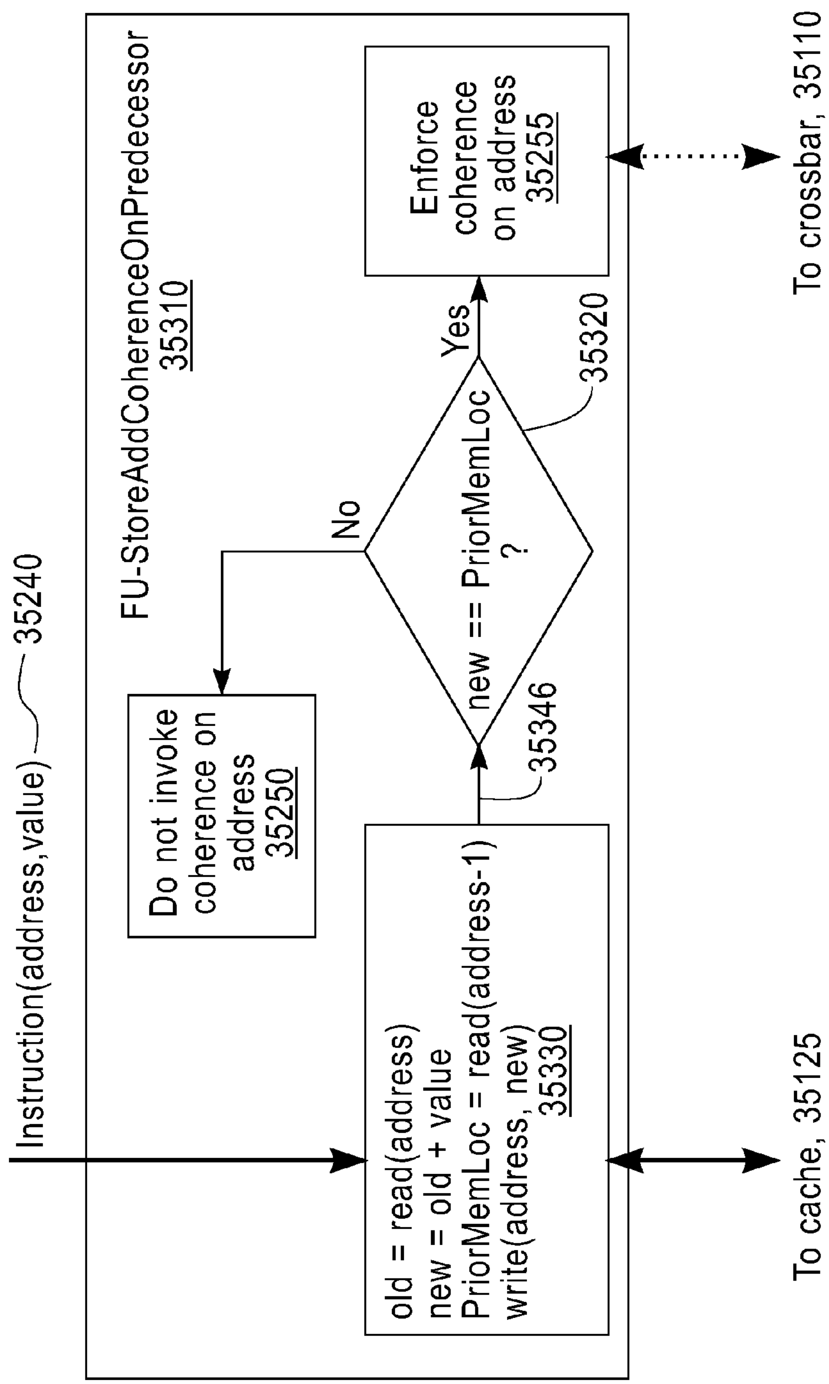
Figures 4, 4A, 5, 6:
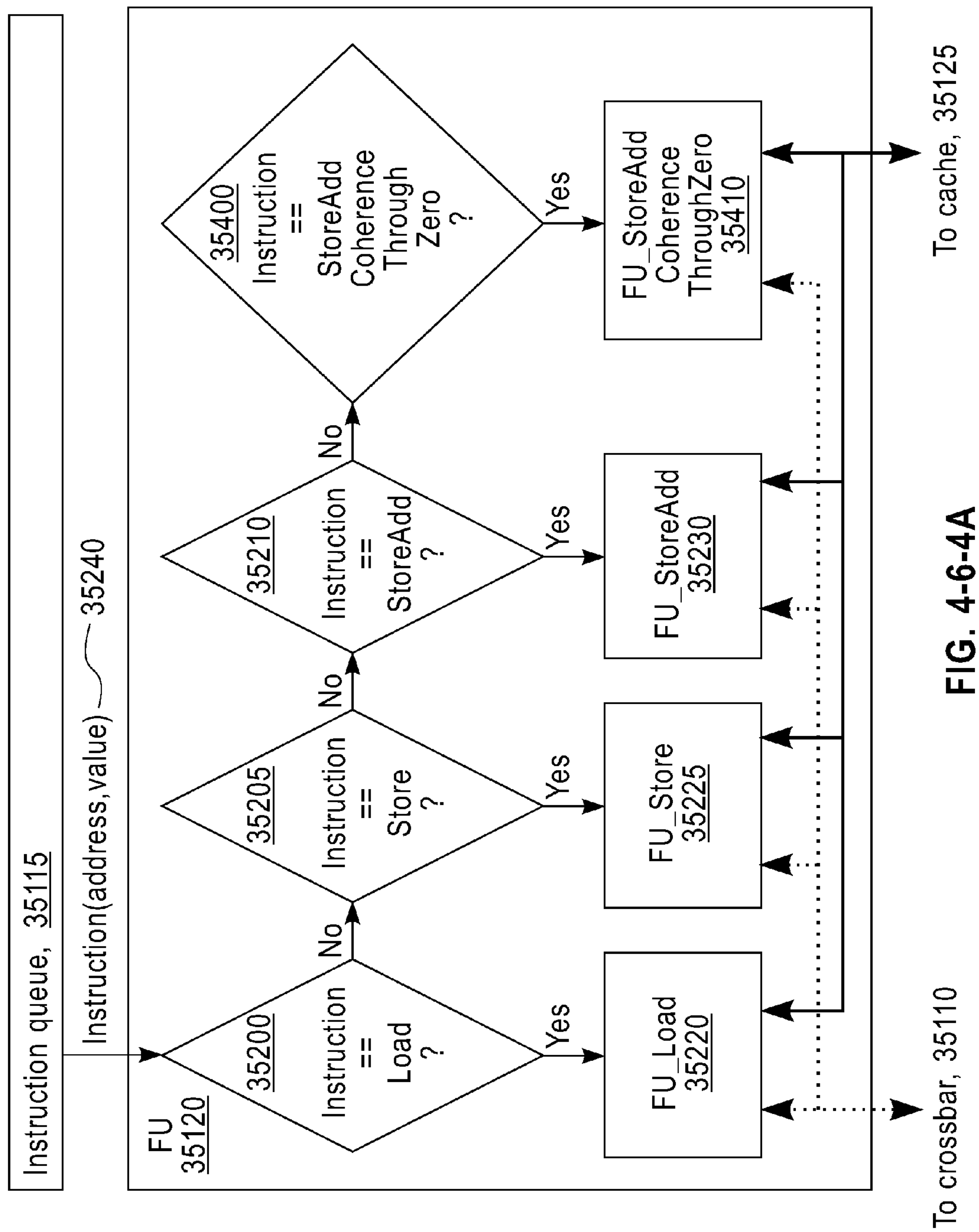
Figures 4, 4B, 5, 6:
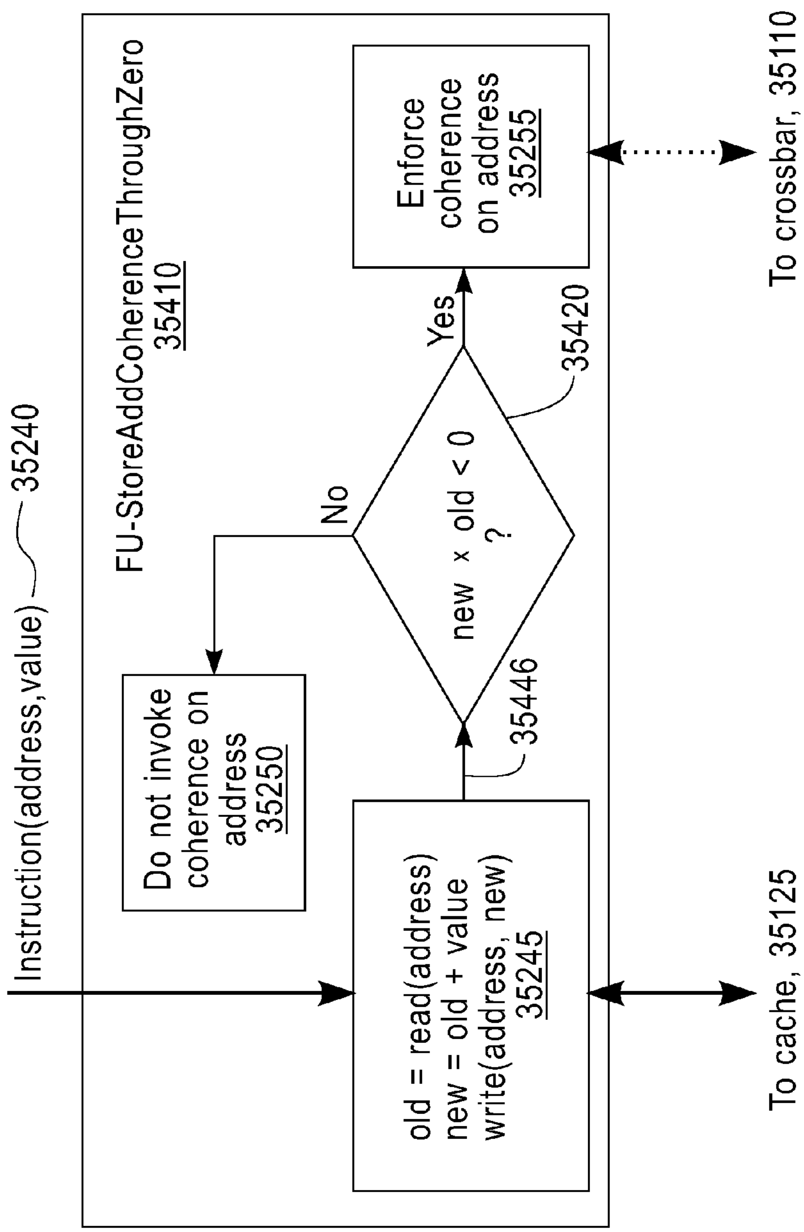
Figures 4, 5, 6:
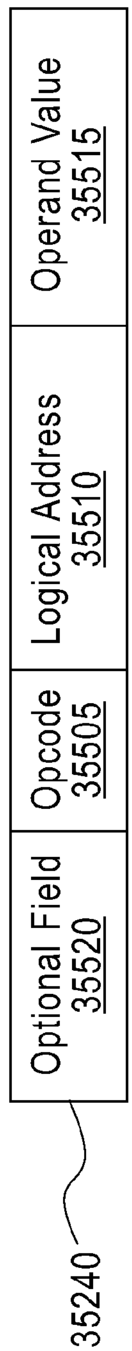
Figures 4, 5, 6:
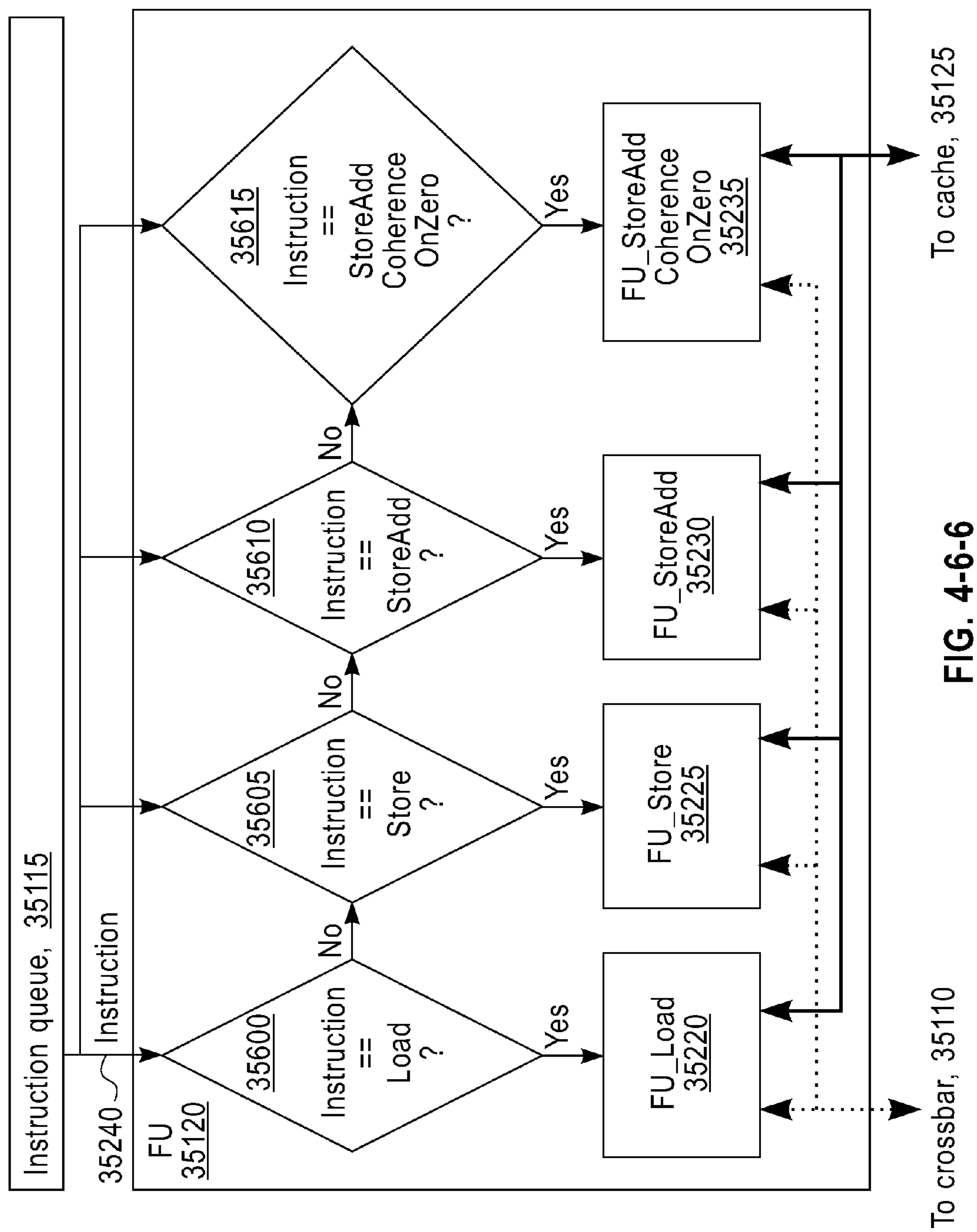
Figures 1A, 4, 5, 6, 7:
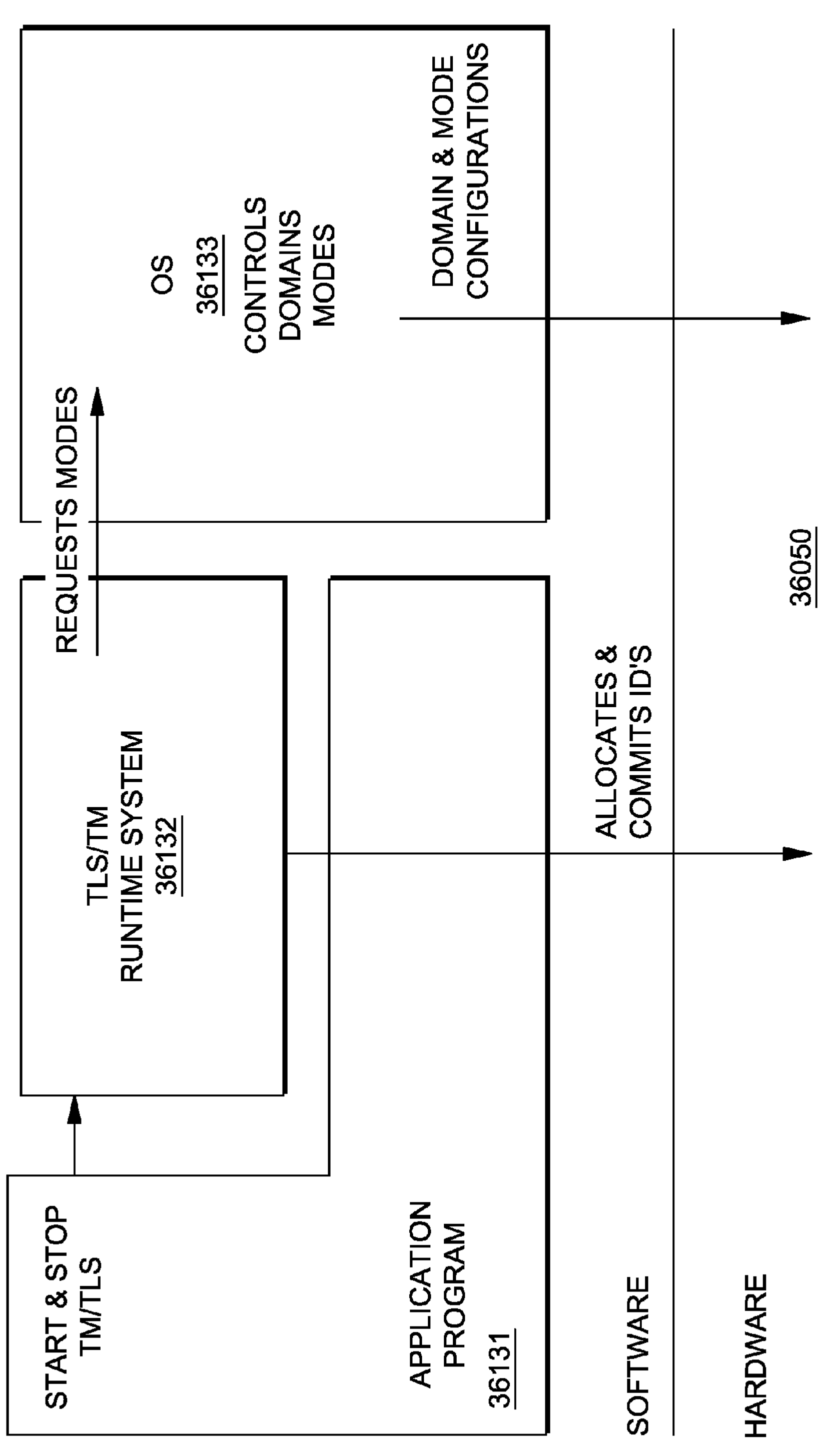
Figures 1B, 4, 5, 6, 7:
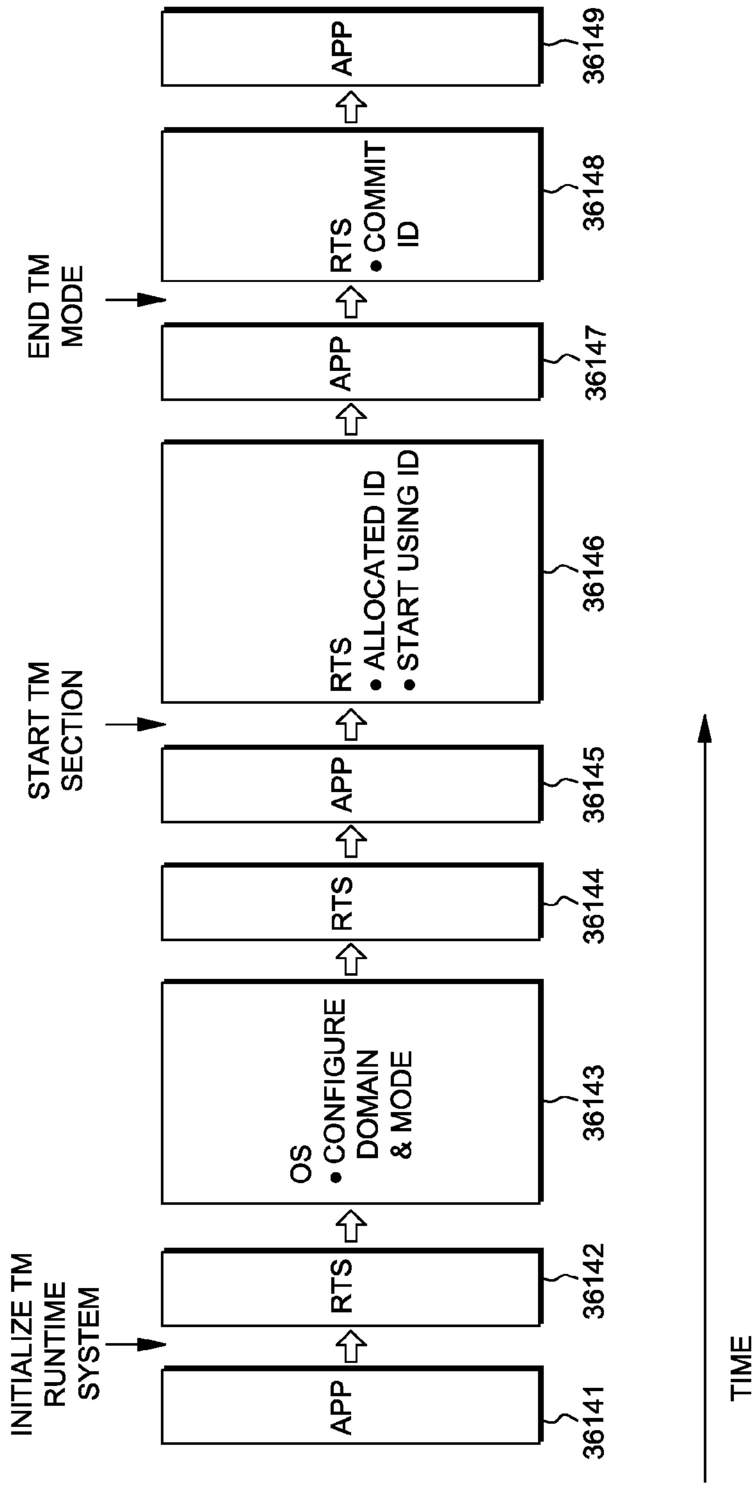
Figures 1, 1B, 2, 4, 5, 6, 7:
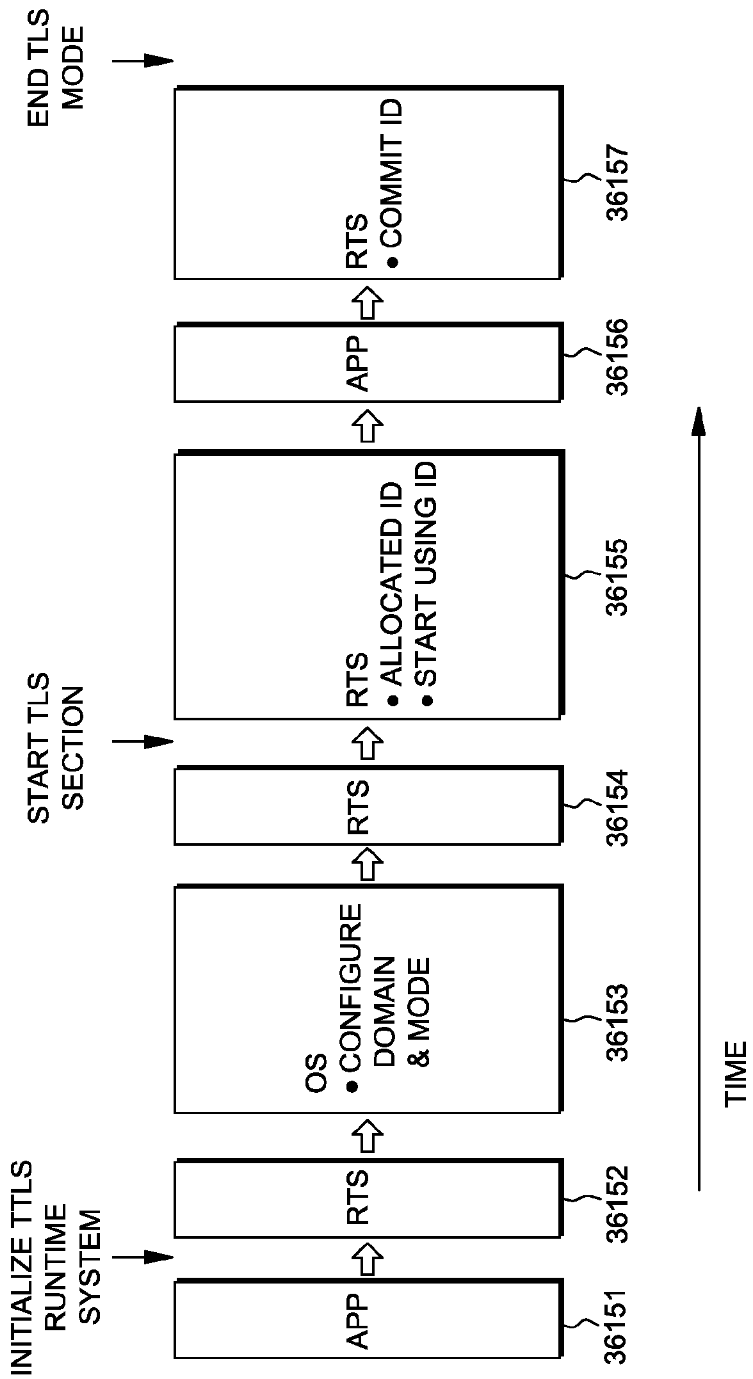
Figures 1C, 4, 5, 6, 7:
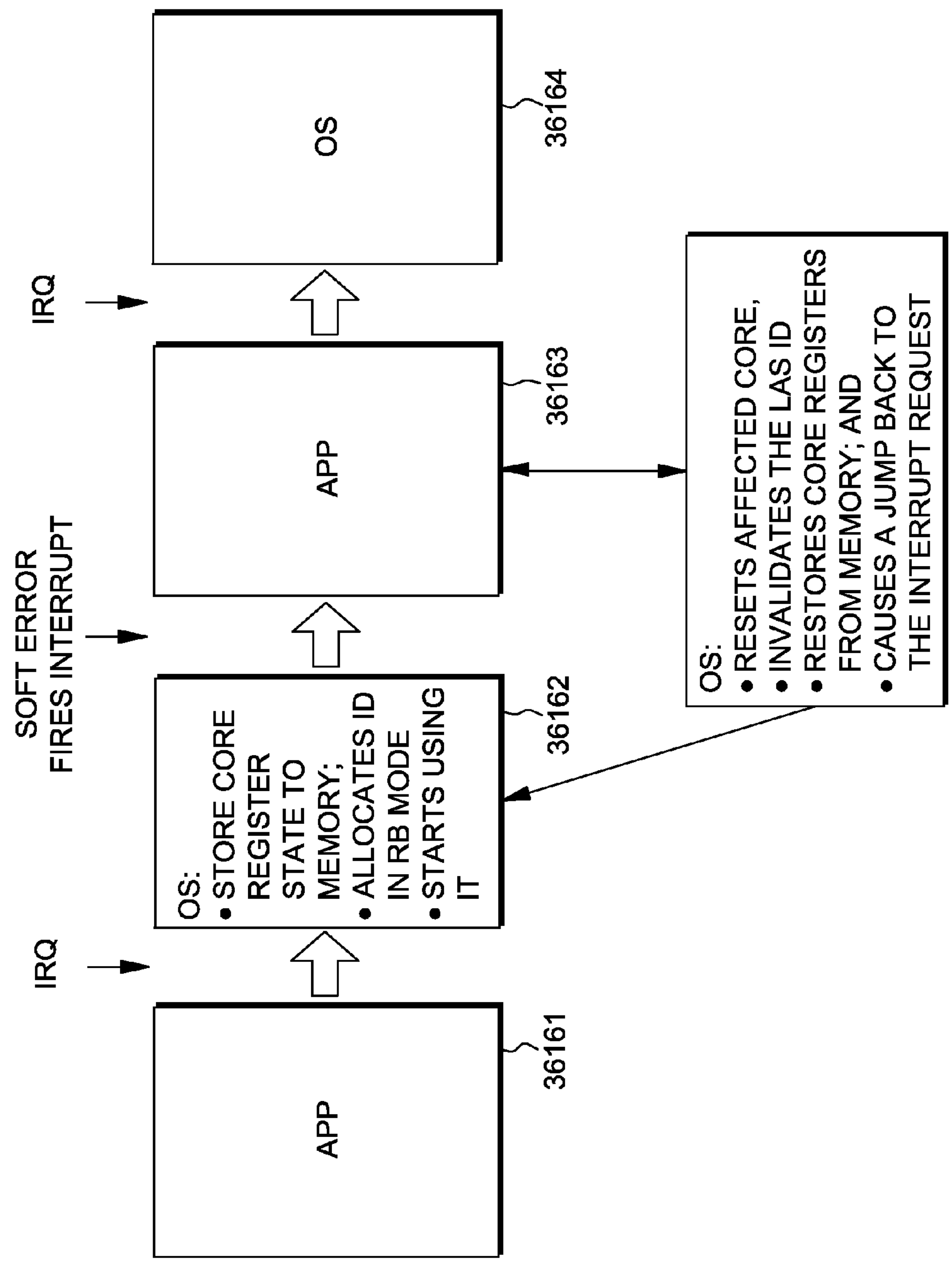
Figures 2, 4, 5, 6, 7:
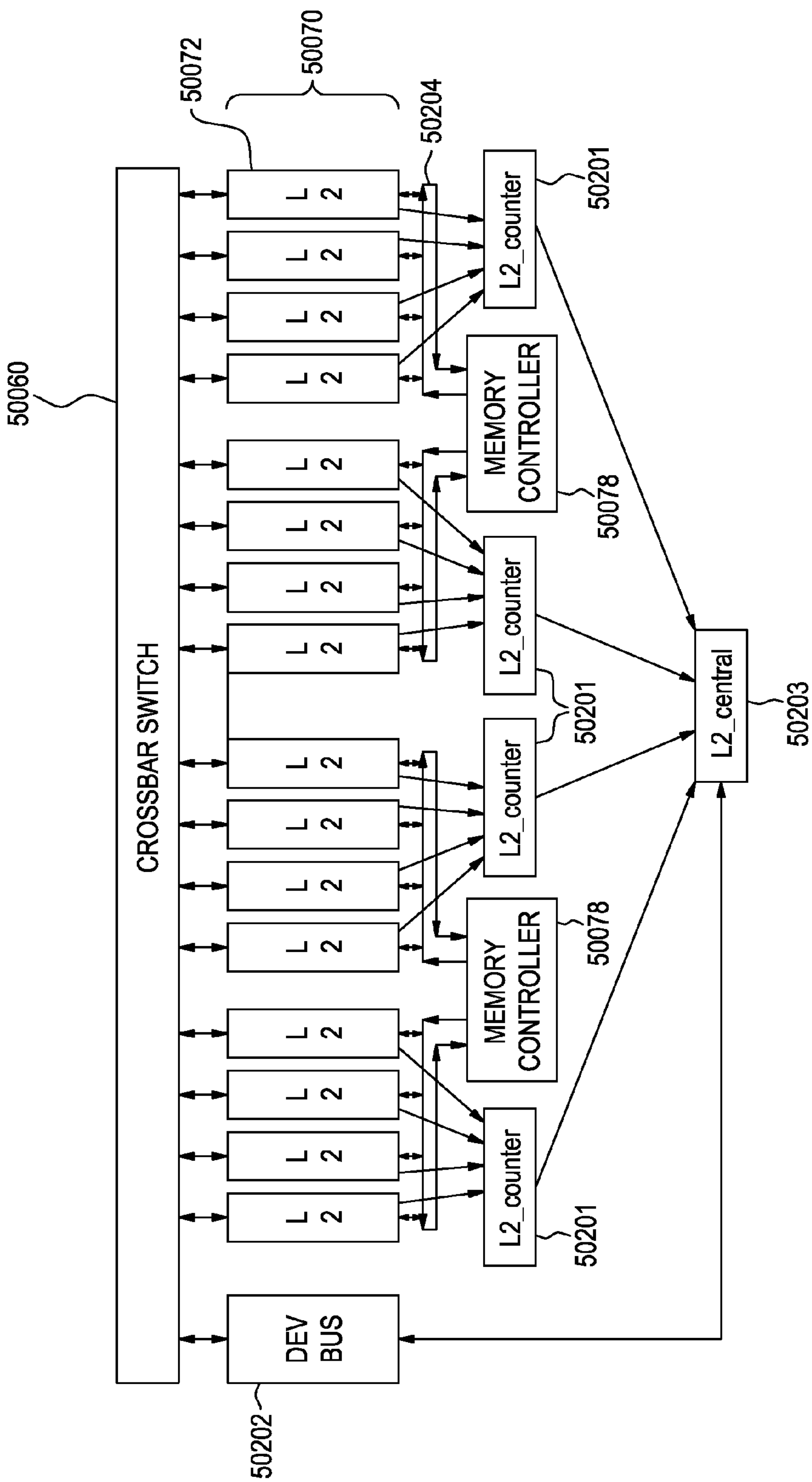
Figures 2B, 4, 5, 6, 7:
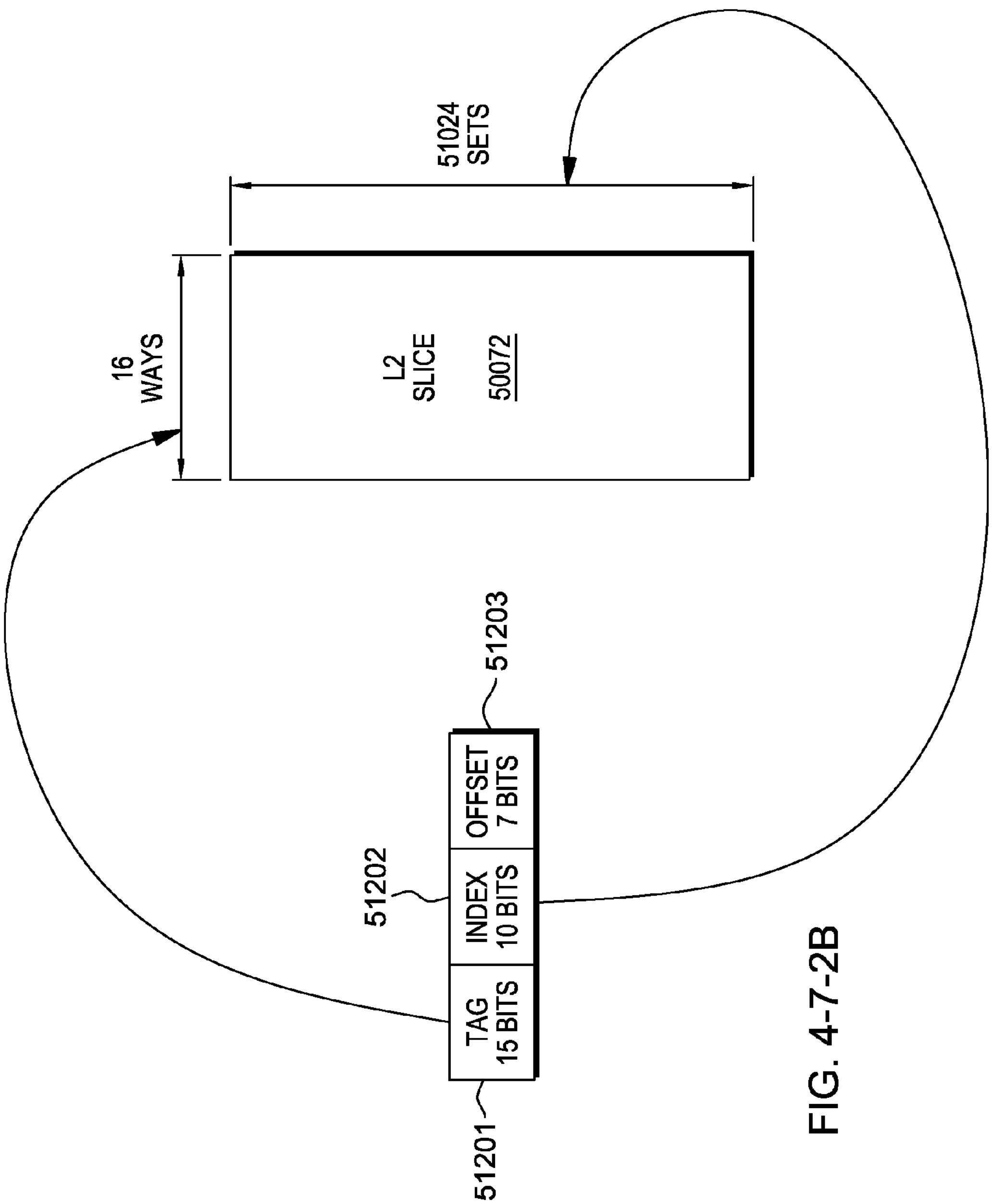
Figures 3, 4, 5, 6, 7:
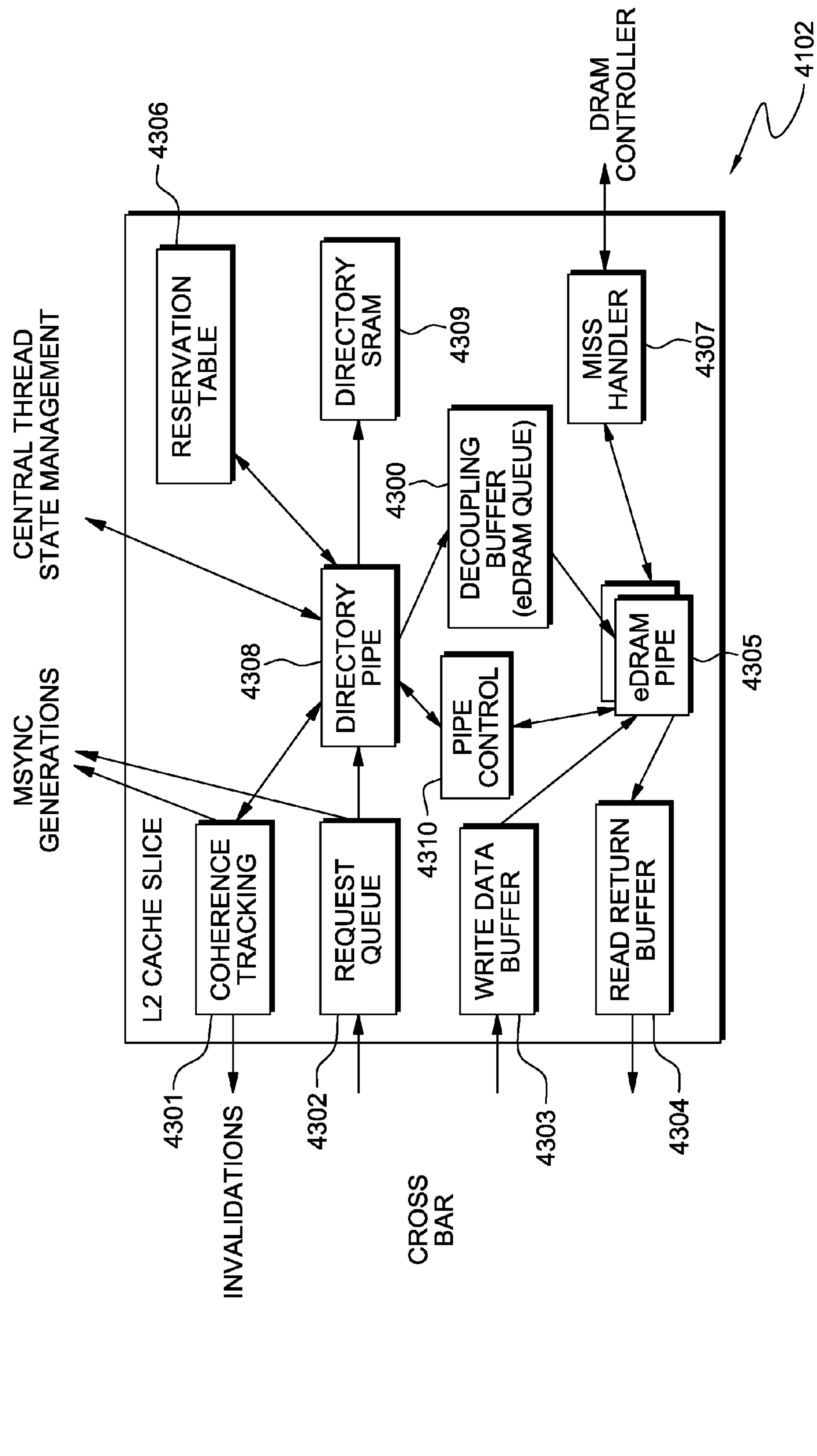
Figures 3C, 4, 5, 6, 7:
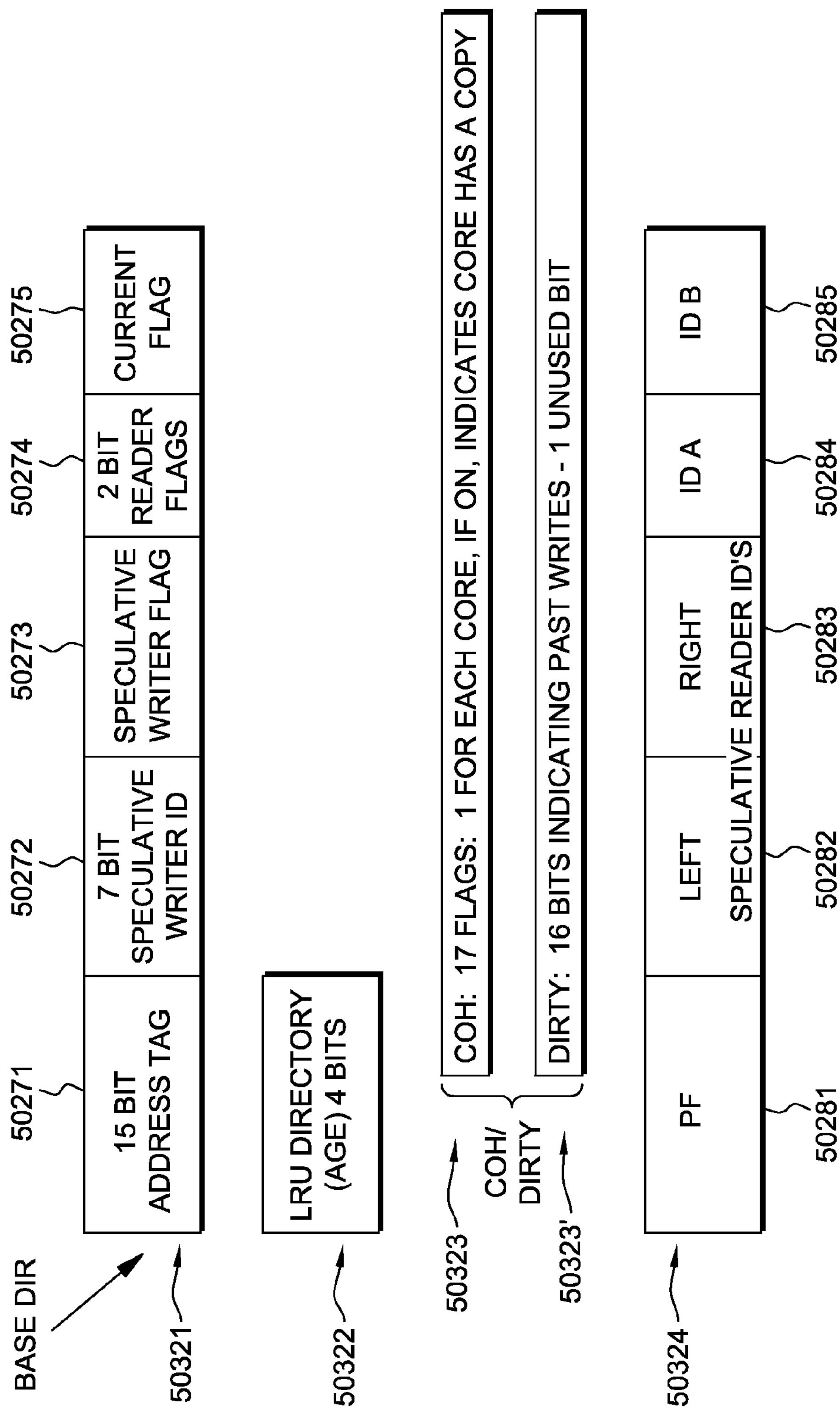
Figures 3D, 4, 5, 6, 7:
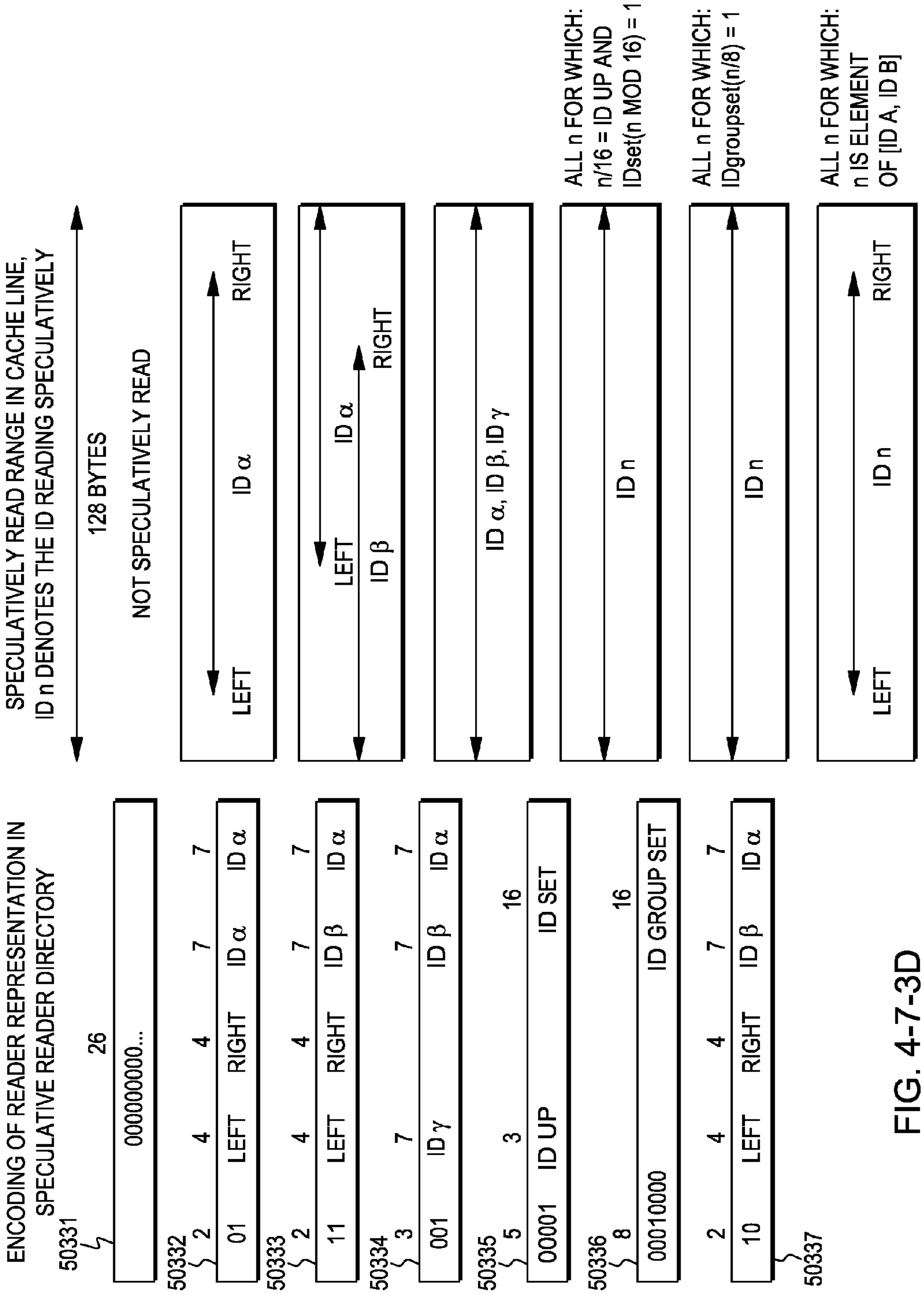
Figures 3E, 4, 5, 6, 7:
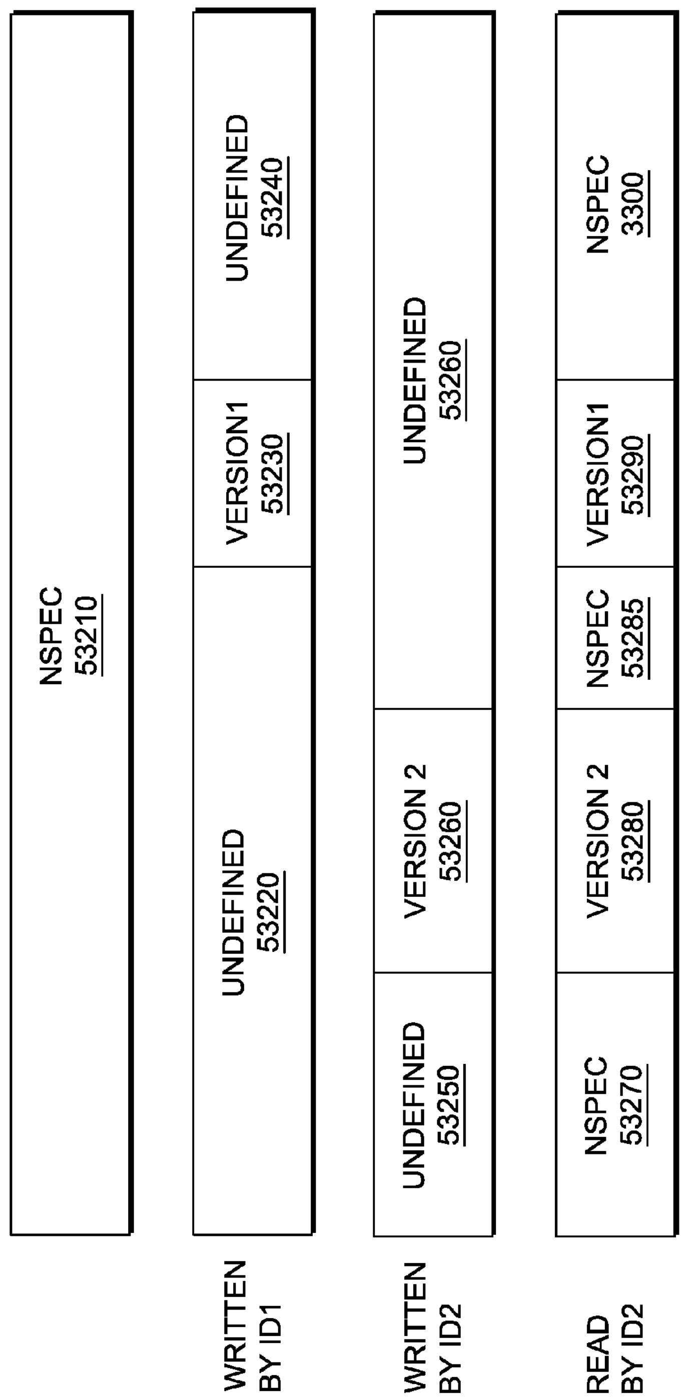
Figures 3F, 4, 5, 6, 7:
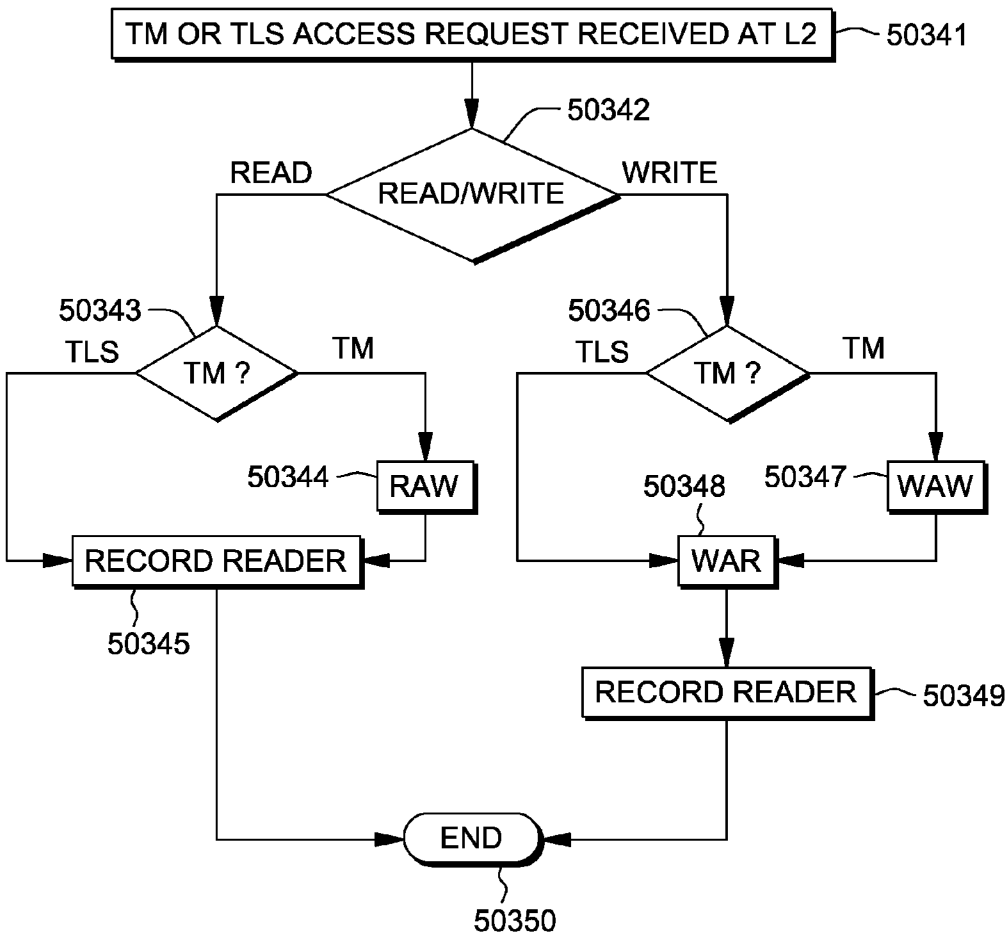
Figures 3G, 4, 5, 6, 7:
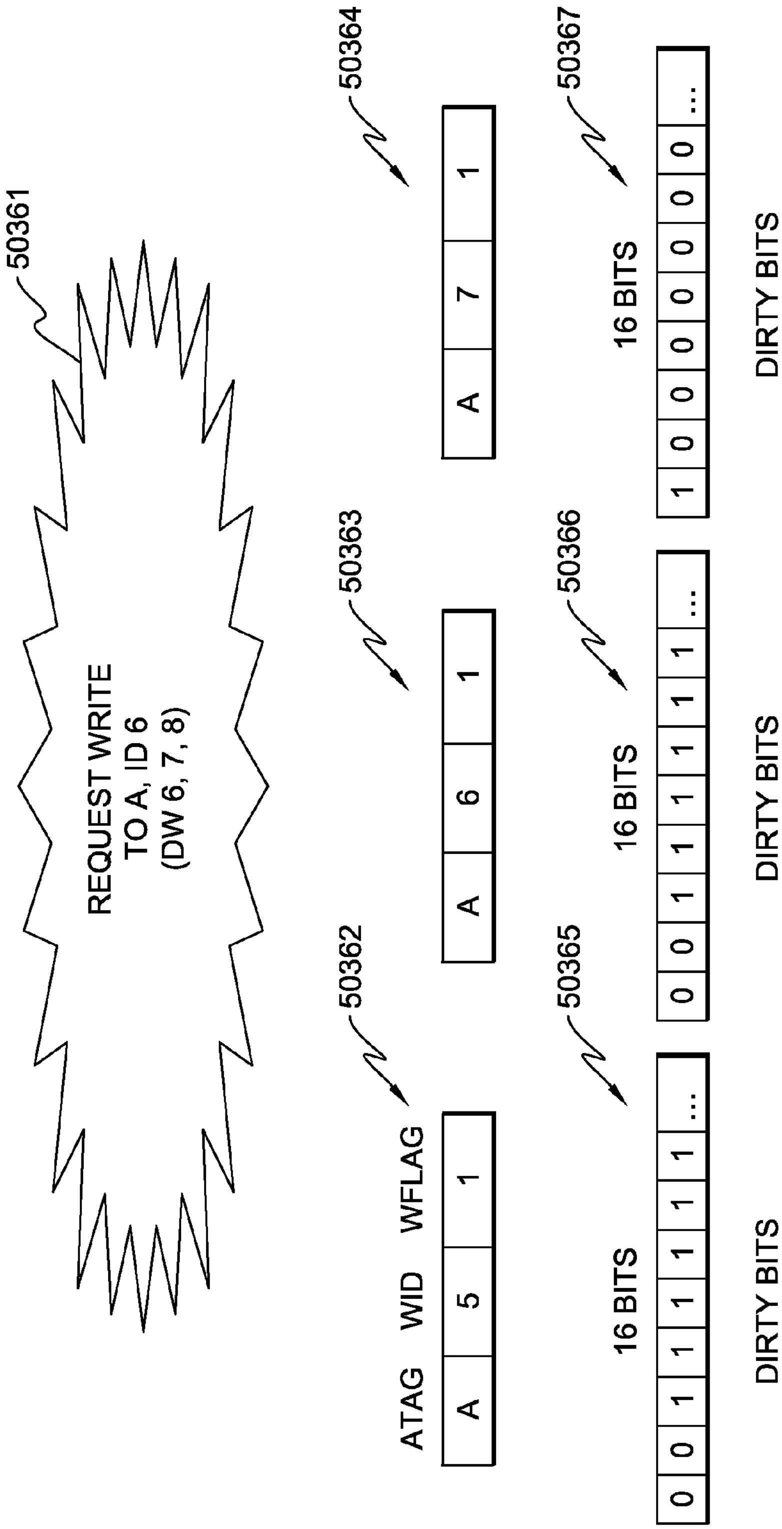
Figures 3H, 4, 5, 6, 7:
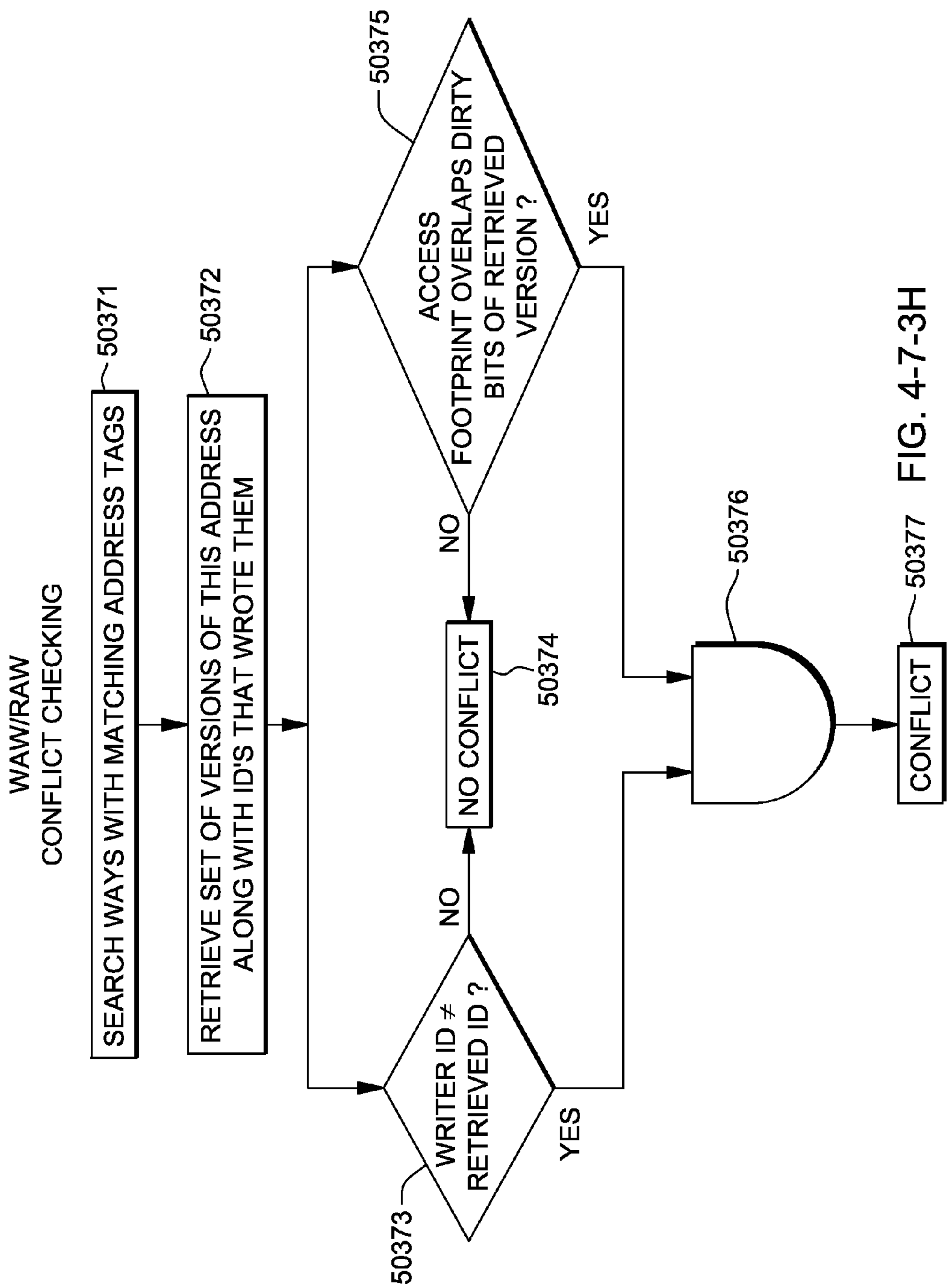
Figures 1, 3I, 4, 5, 6, 7:
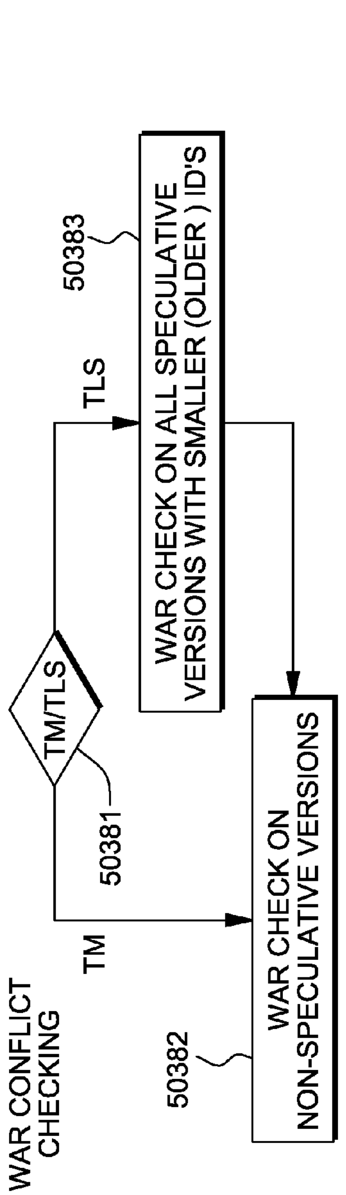
Figures 2, 3I, 4, 5, 6, 7:
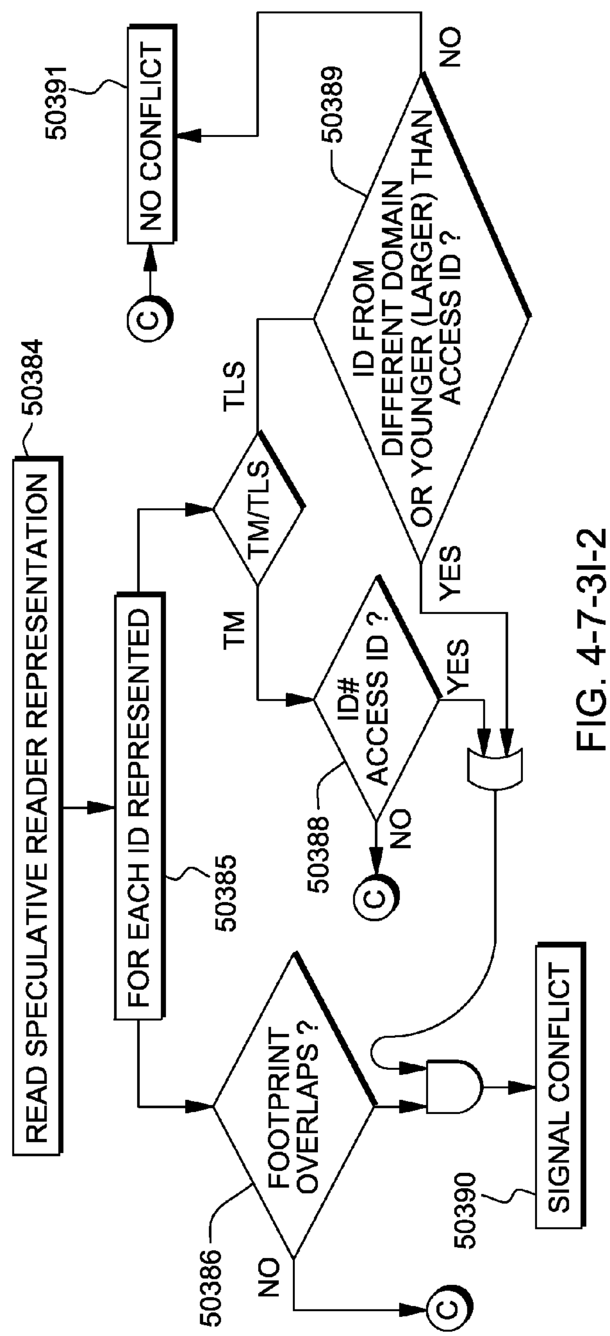
Figures 4, 5, 6, 7:
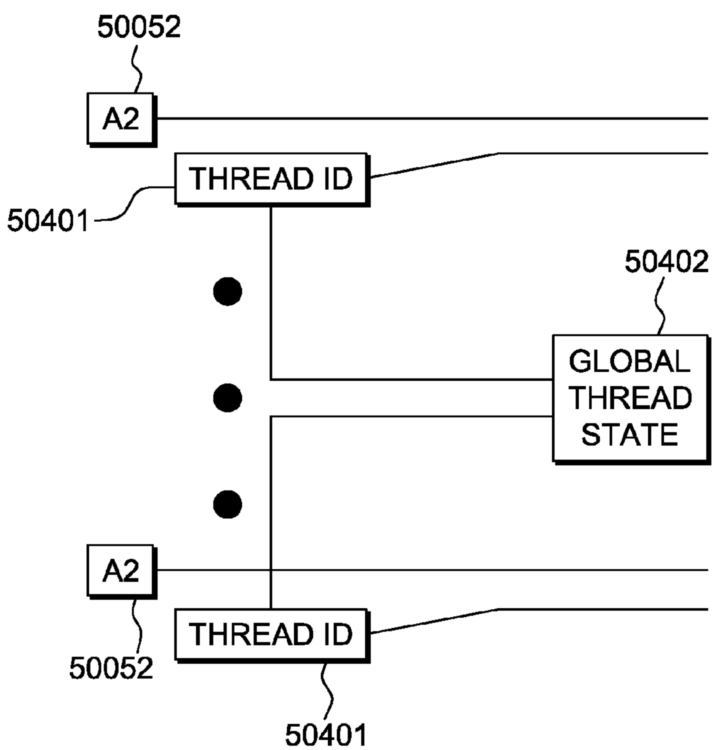
Figures 4, 4A, 5, 6, 7:
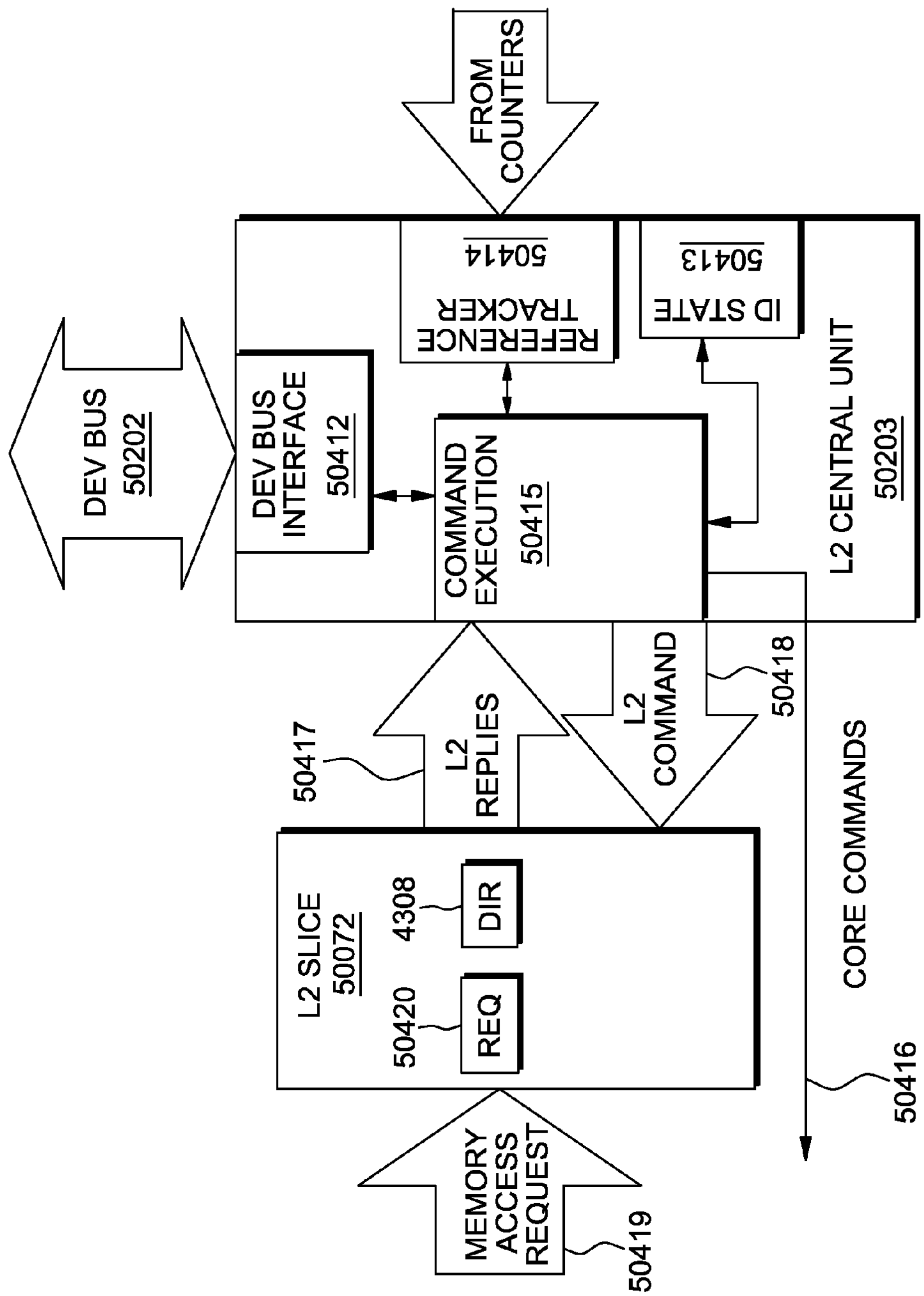
Figures 4, 4B, 5, 6, 7:
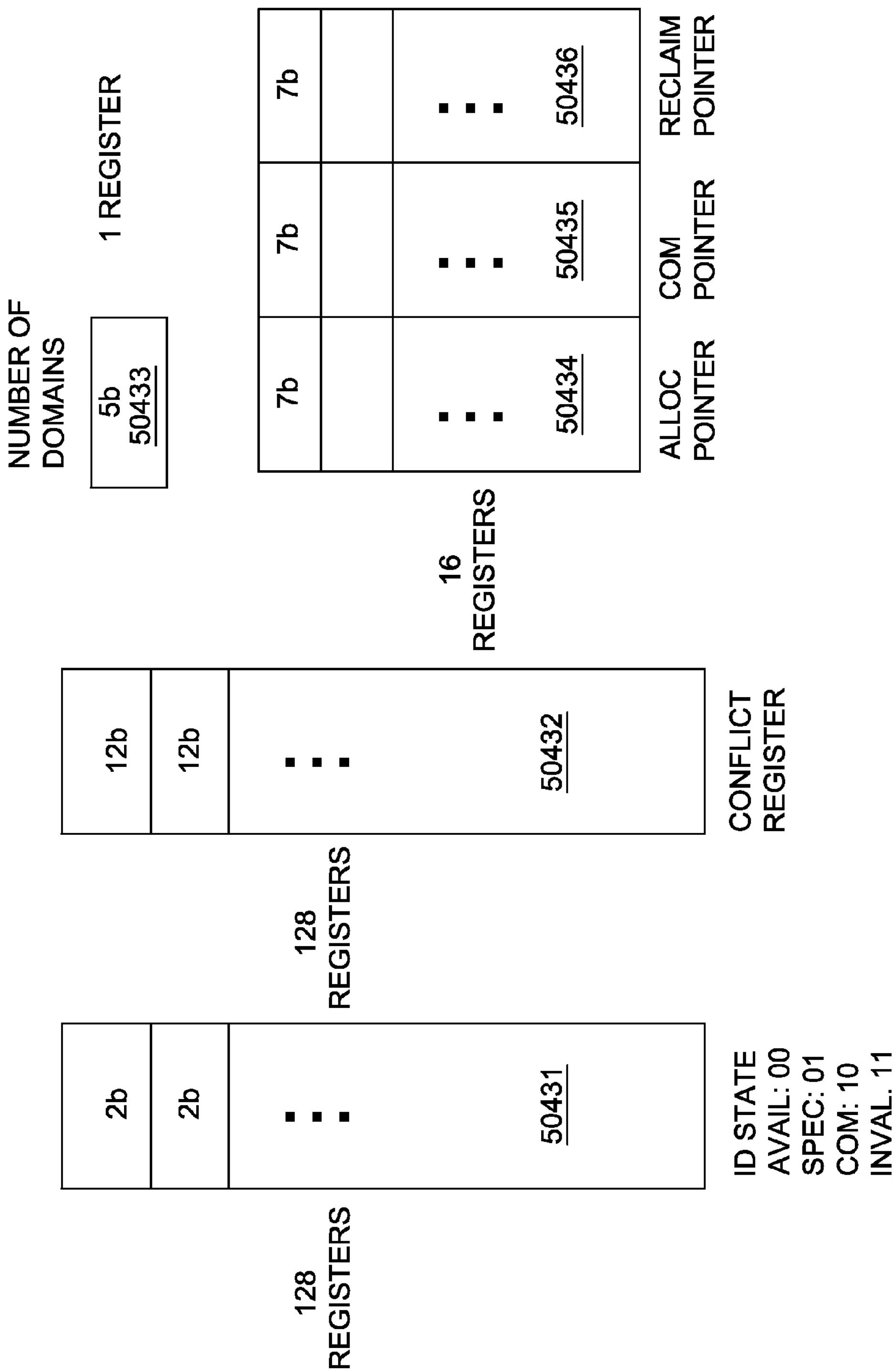
Figures 4, 4C, 5, 6, 7:
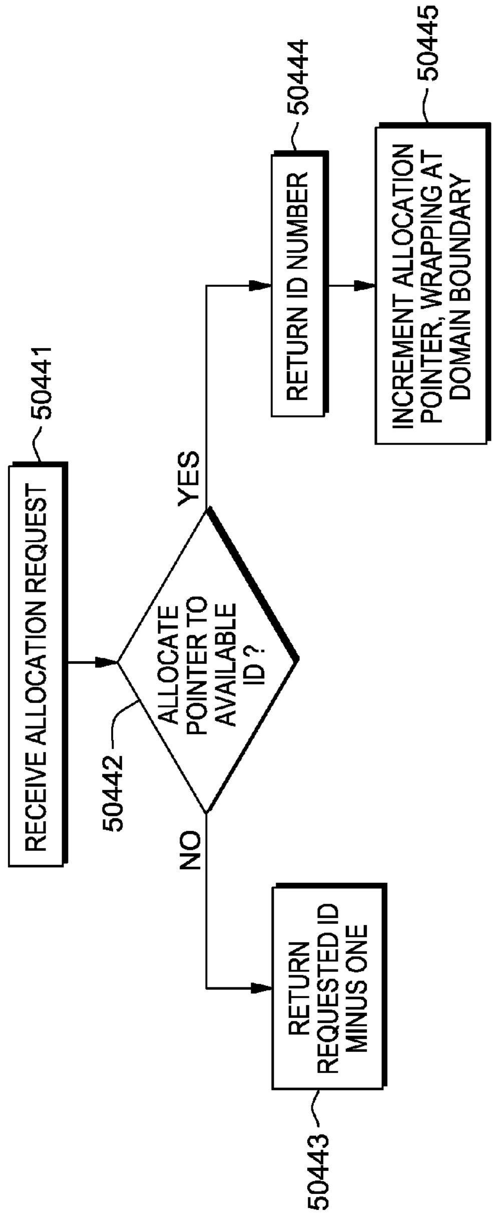
Figures 4, 4D, 5, 6, 7:
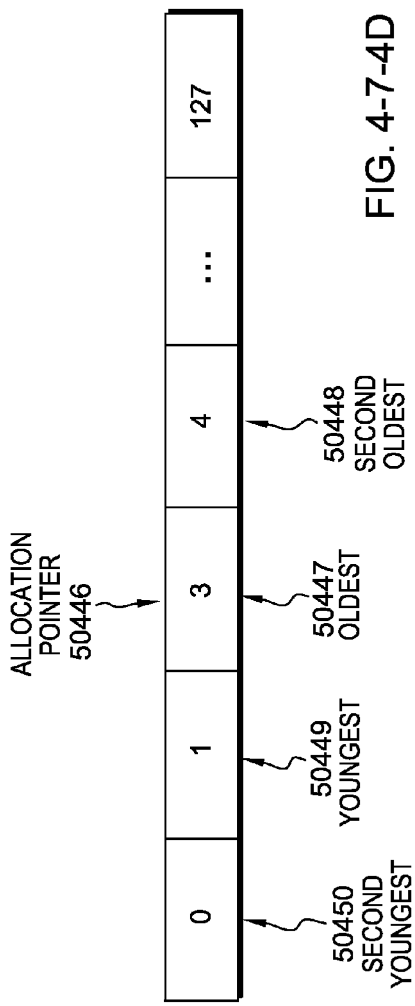
Figures 4, 4E, 5, 6, 7:
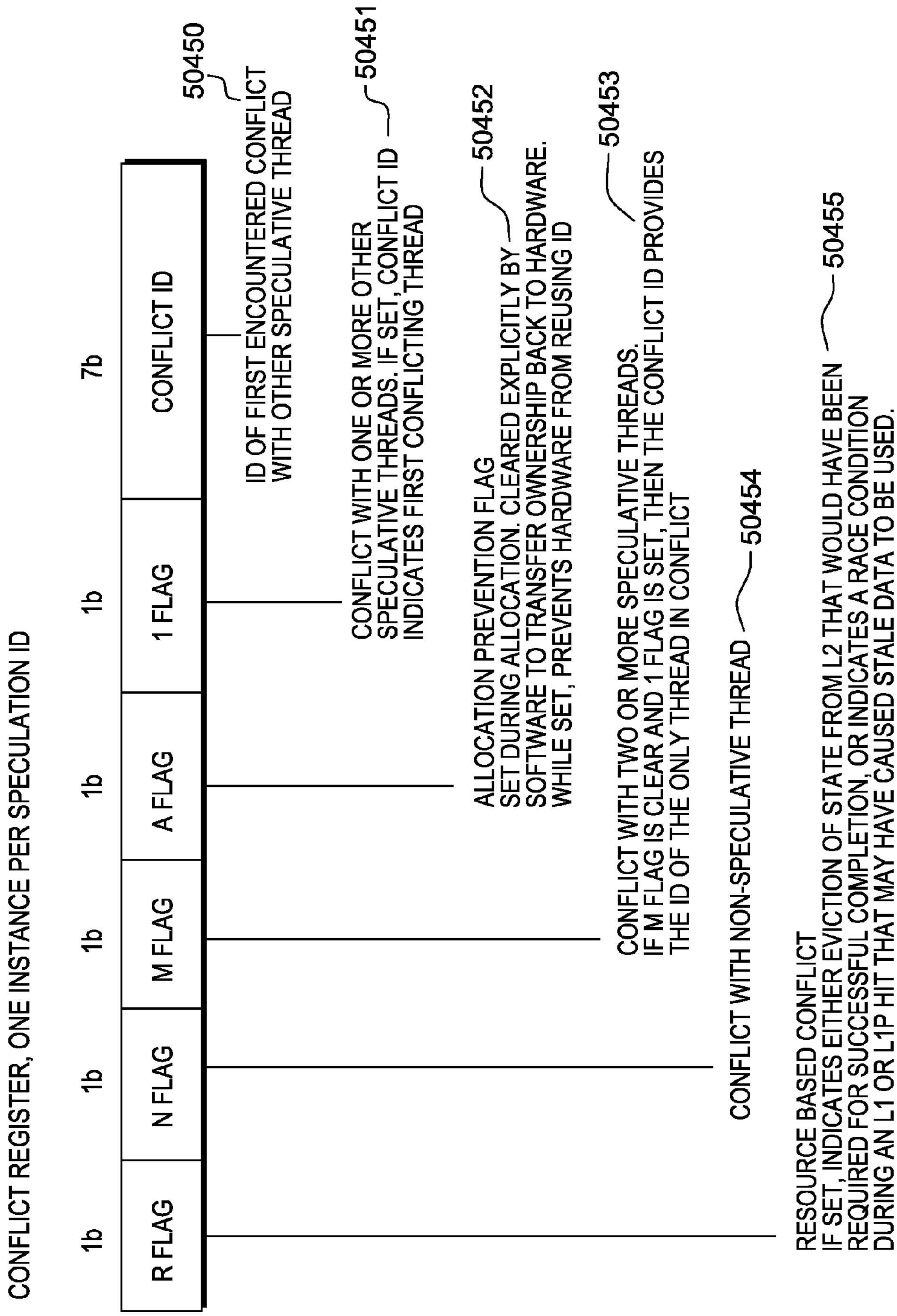
Figures 4, 5, 6, 7:
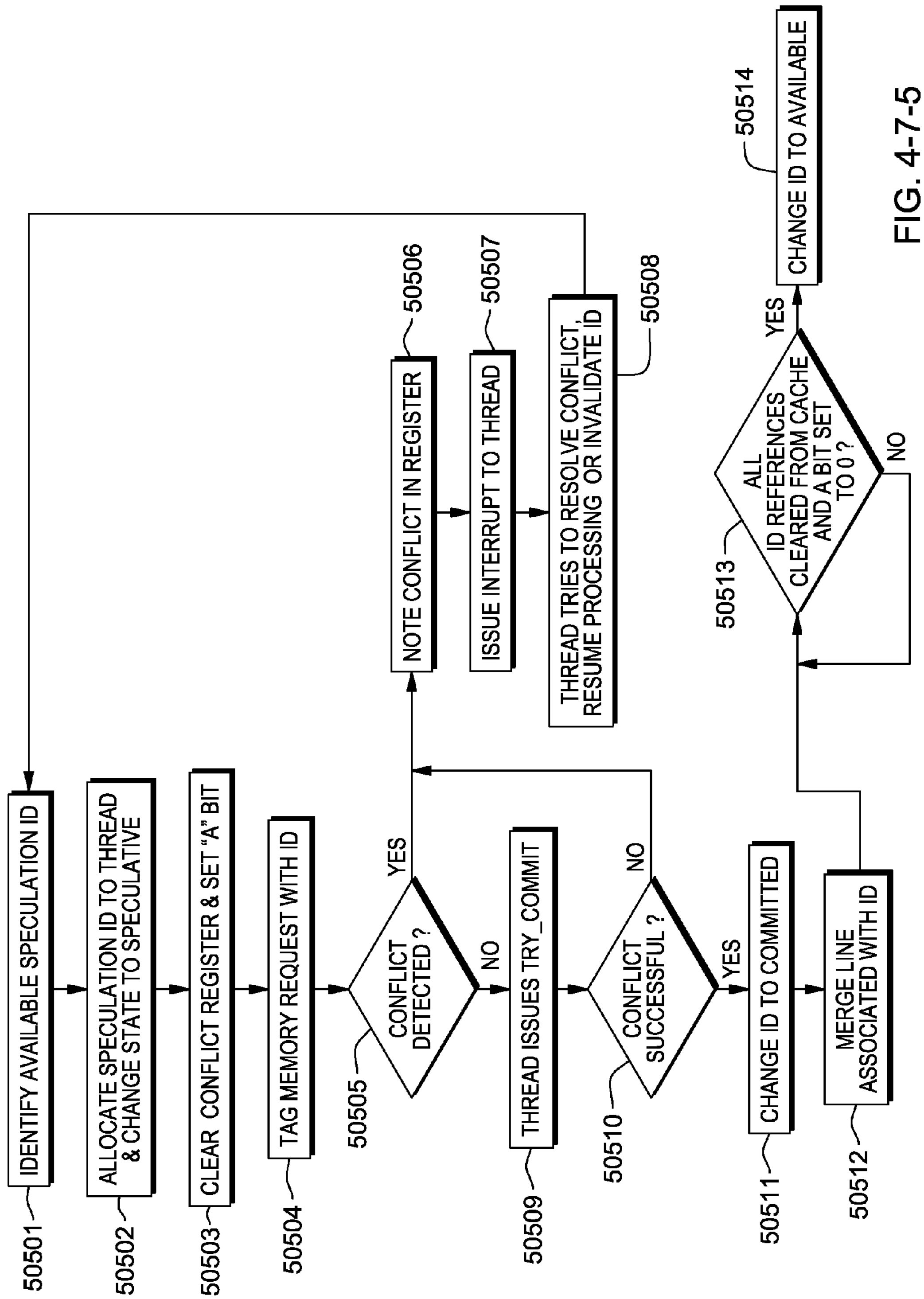
Figures 4, 5, 6, 7:
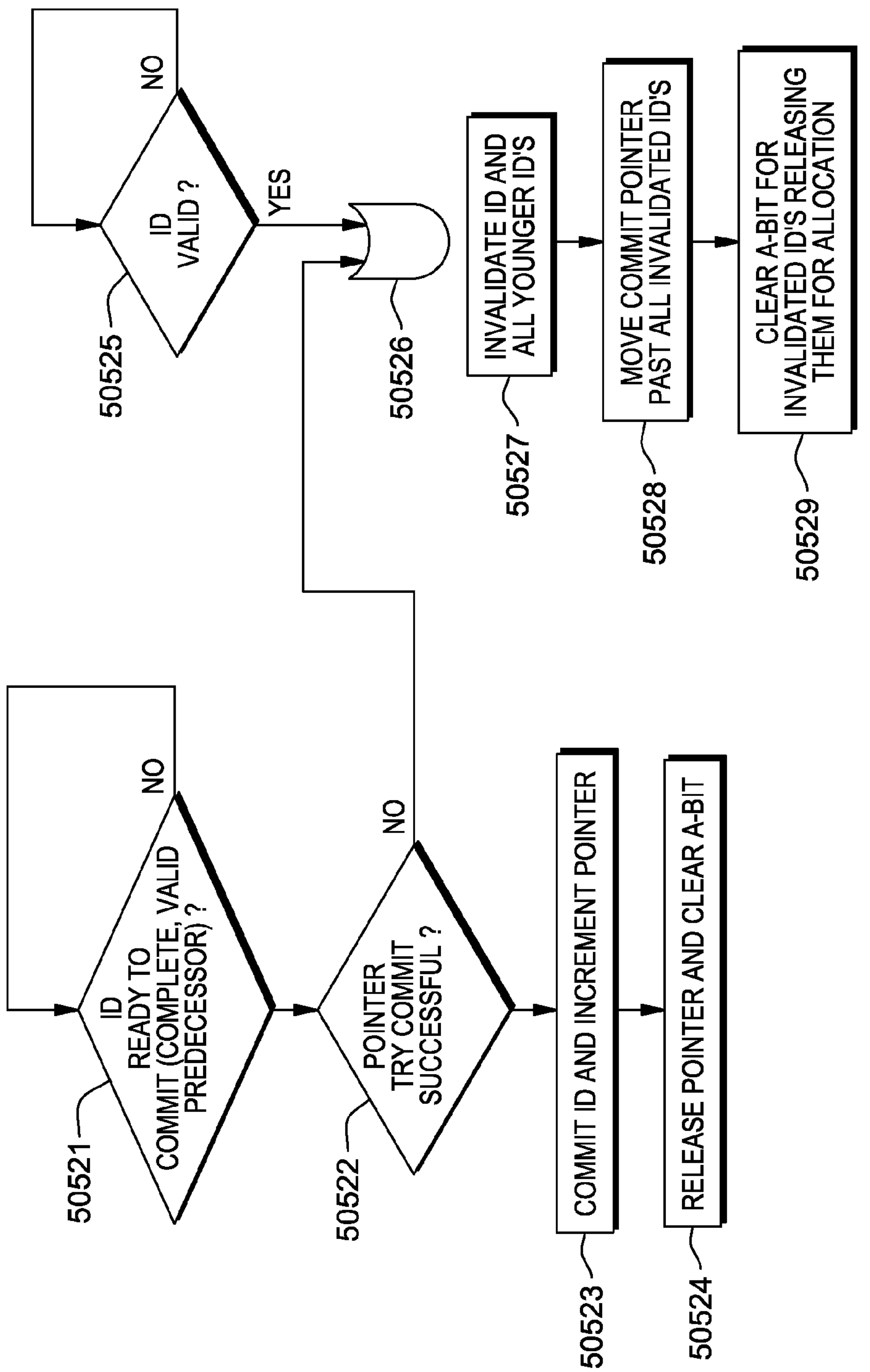
Figures 4, 5, 6, 7:
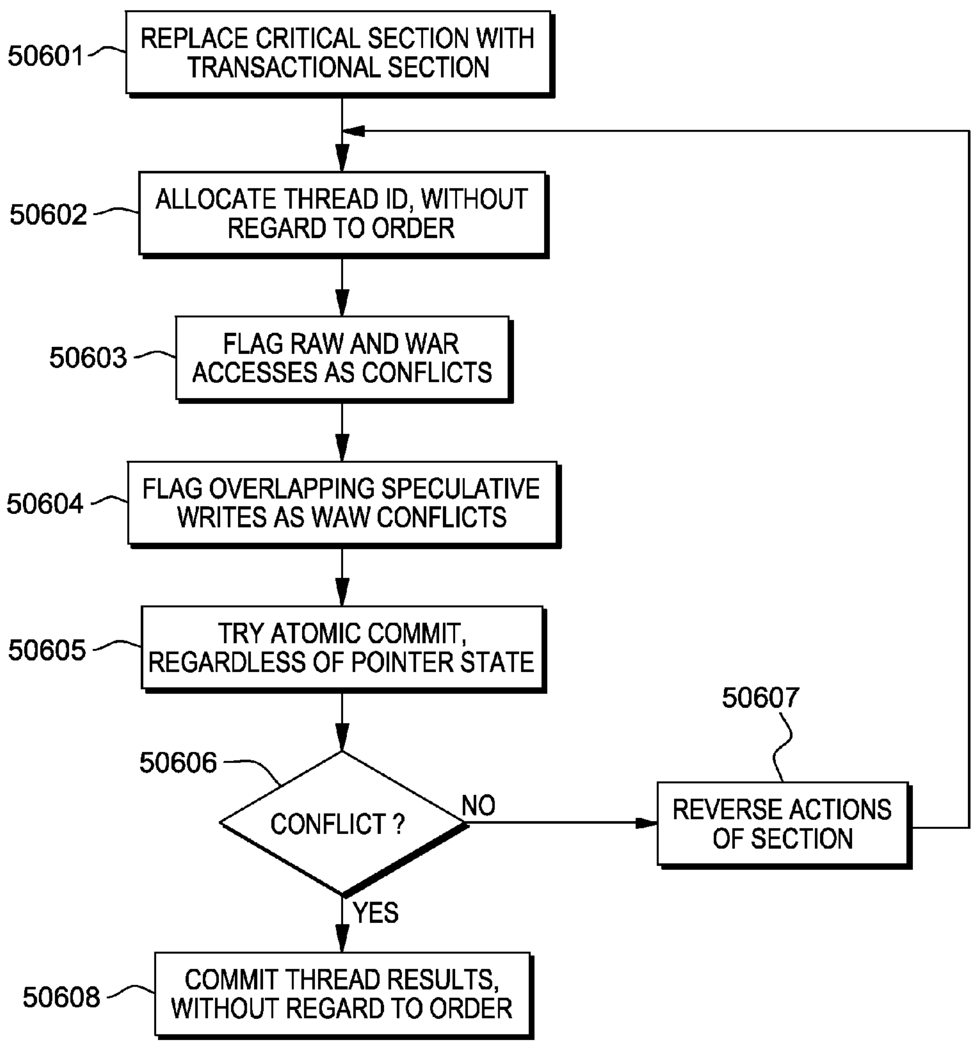
Figures 4, 5, 6, 7, 8:
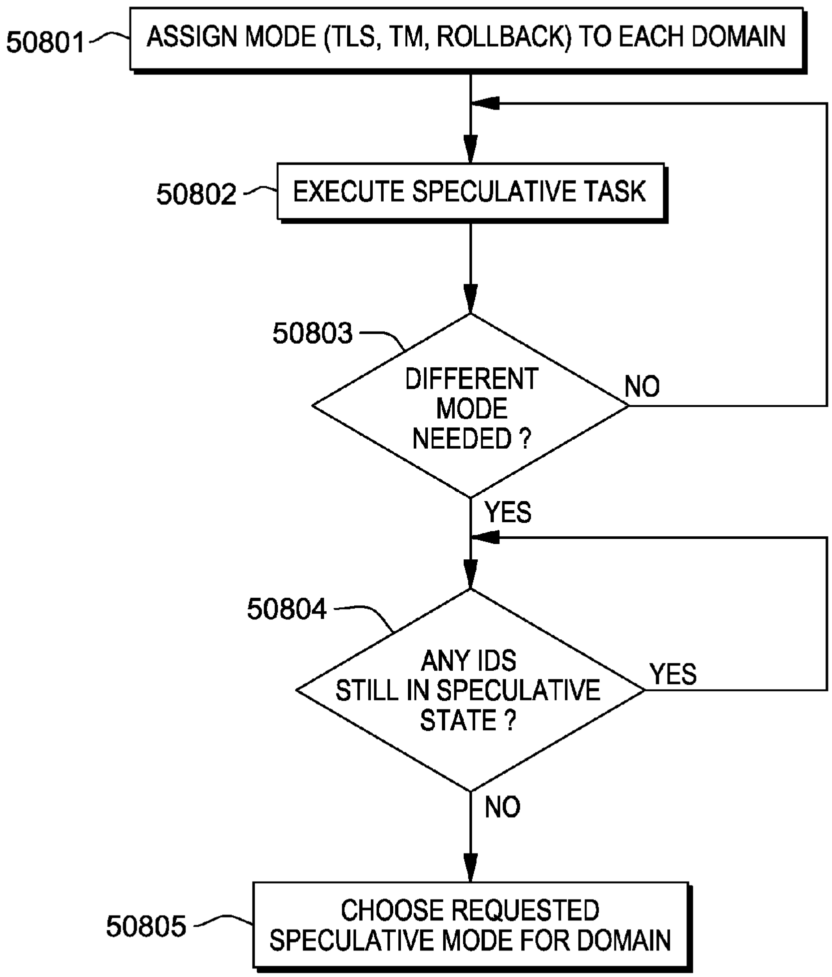
Figures 4, 5, 6, 7, 9:
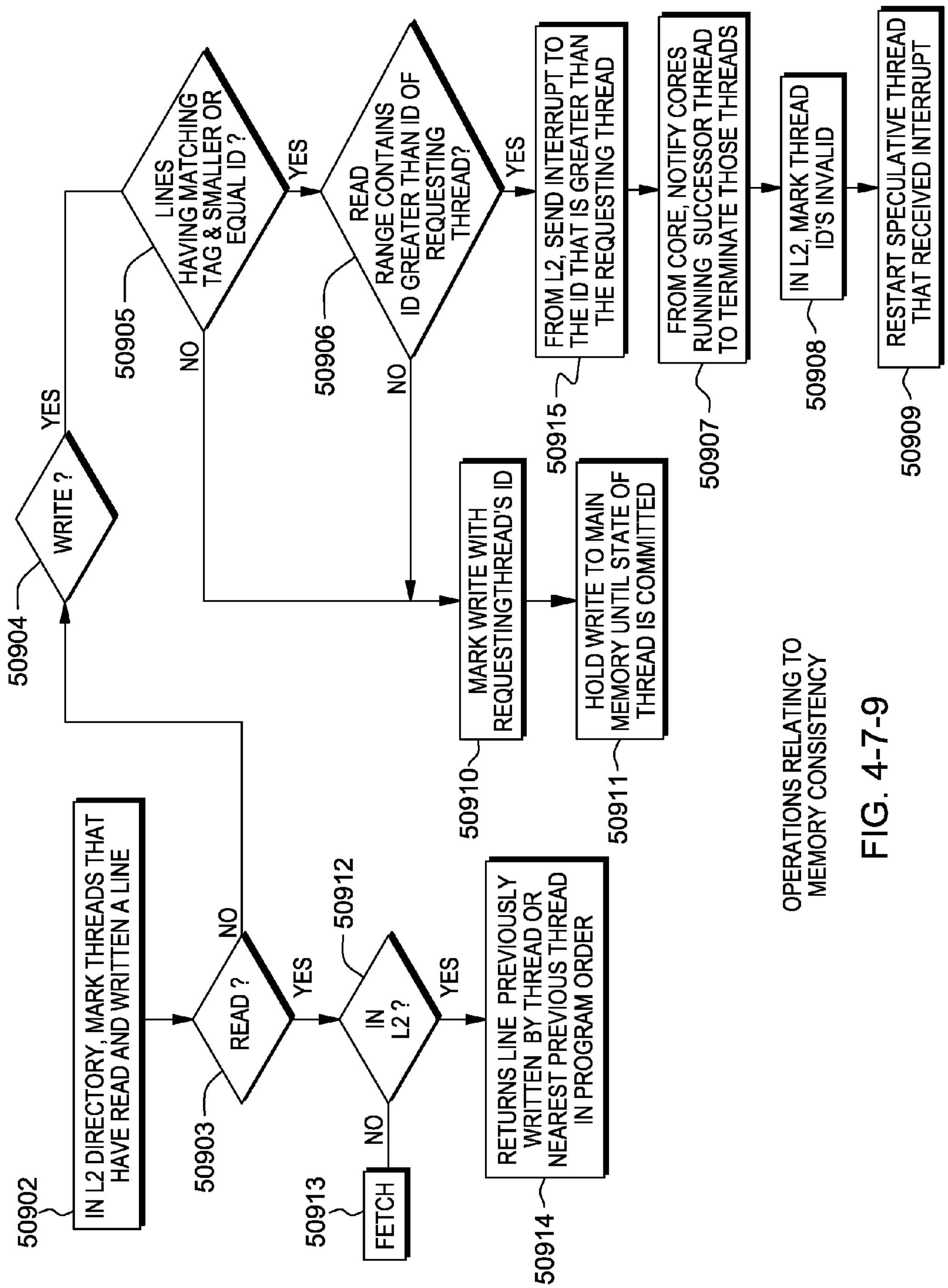
Figures 4, 5, 6, 7, 10:
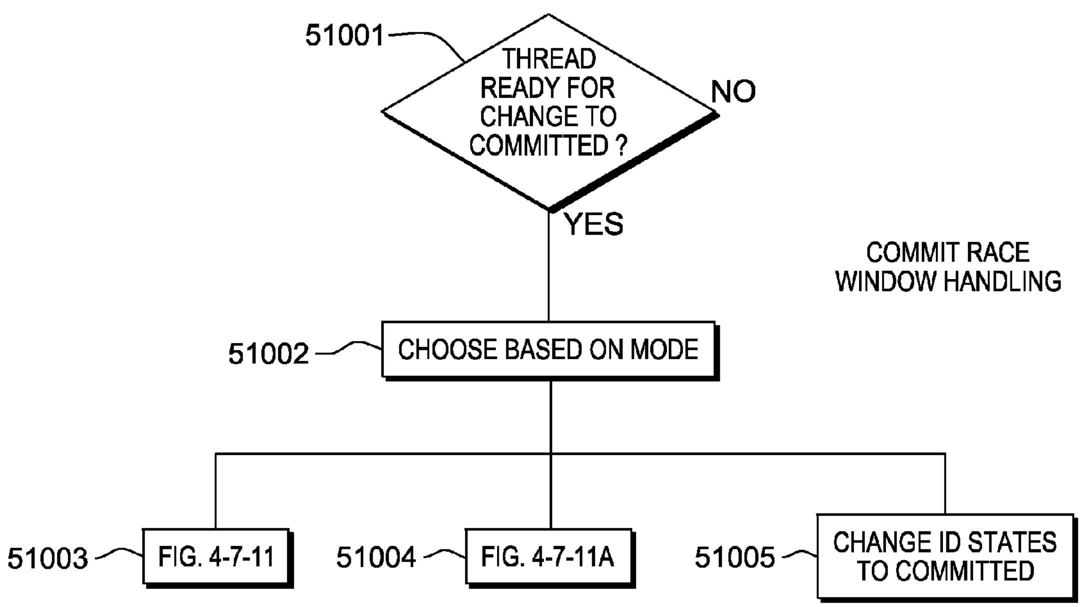
Figures 4, 5, 6, 7, 11:
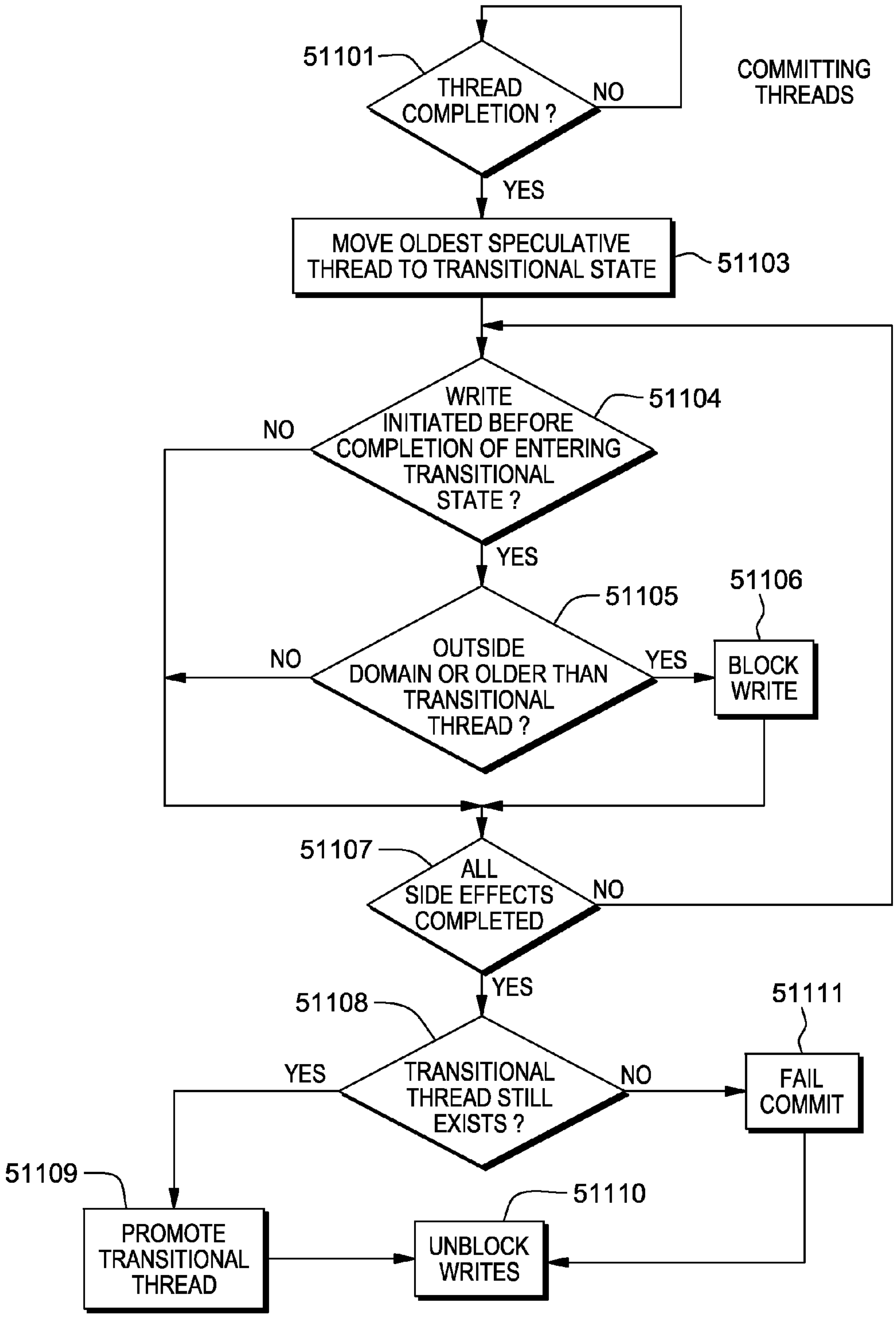
Figures 4, 5, 6, 7, 11A:
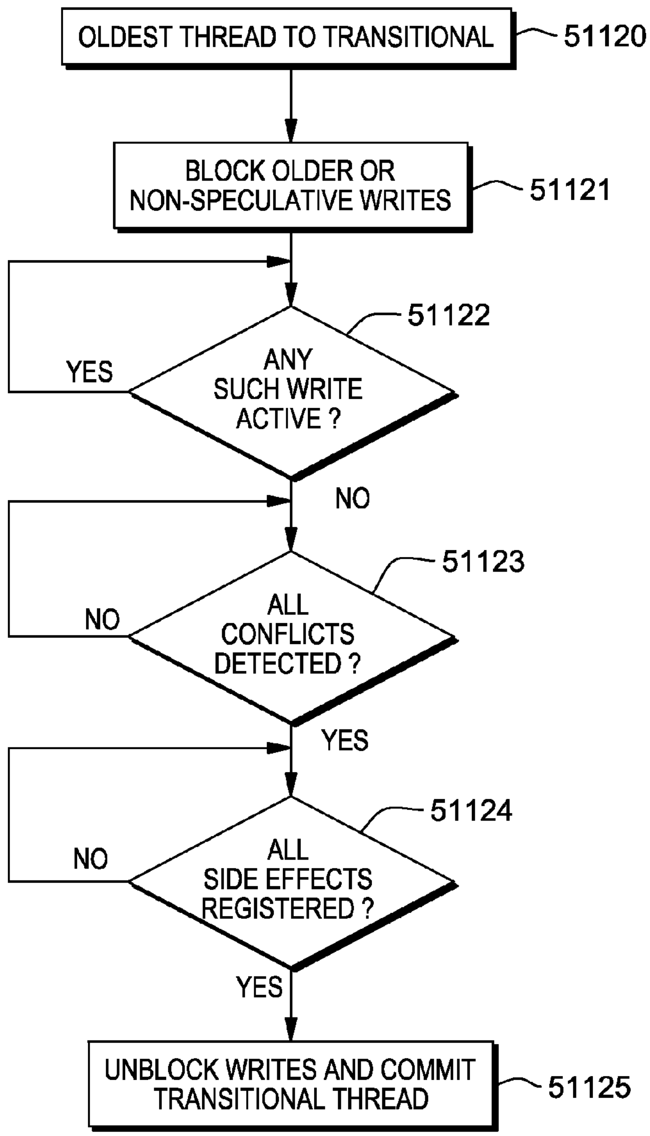
Figures 4, 5, 6, 7, 12:
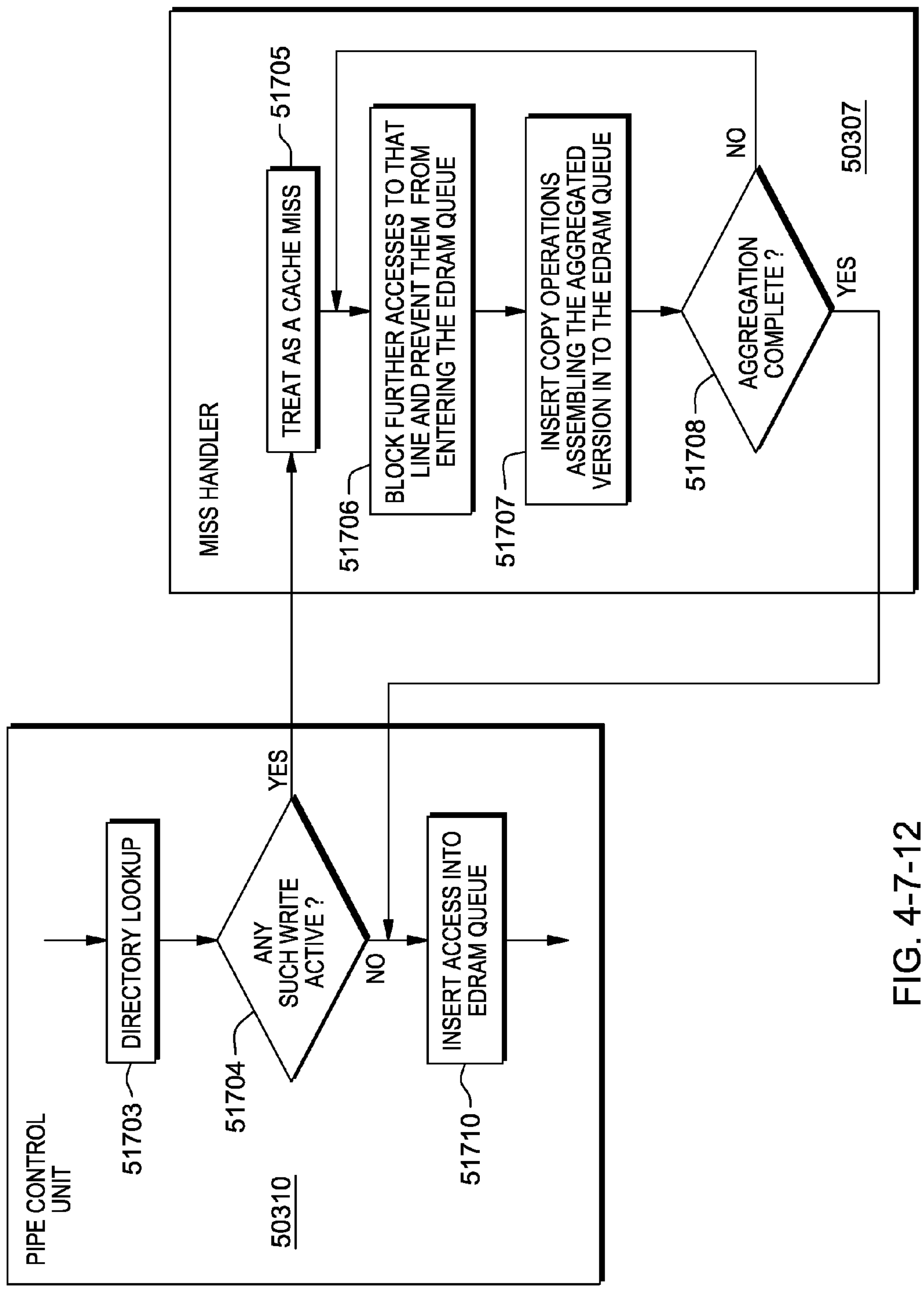
Figures 4, 5, 6, 7, 8:
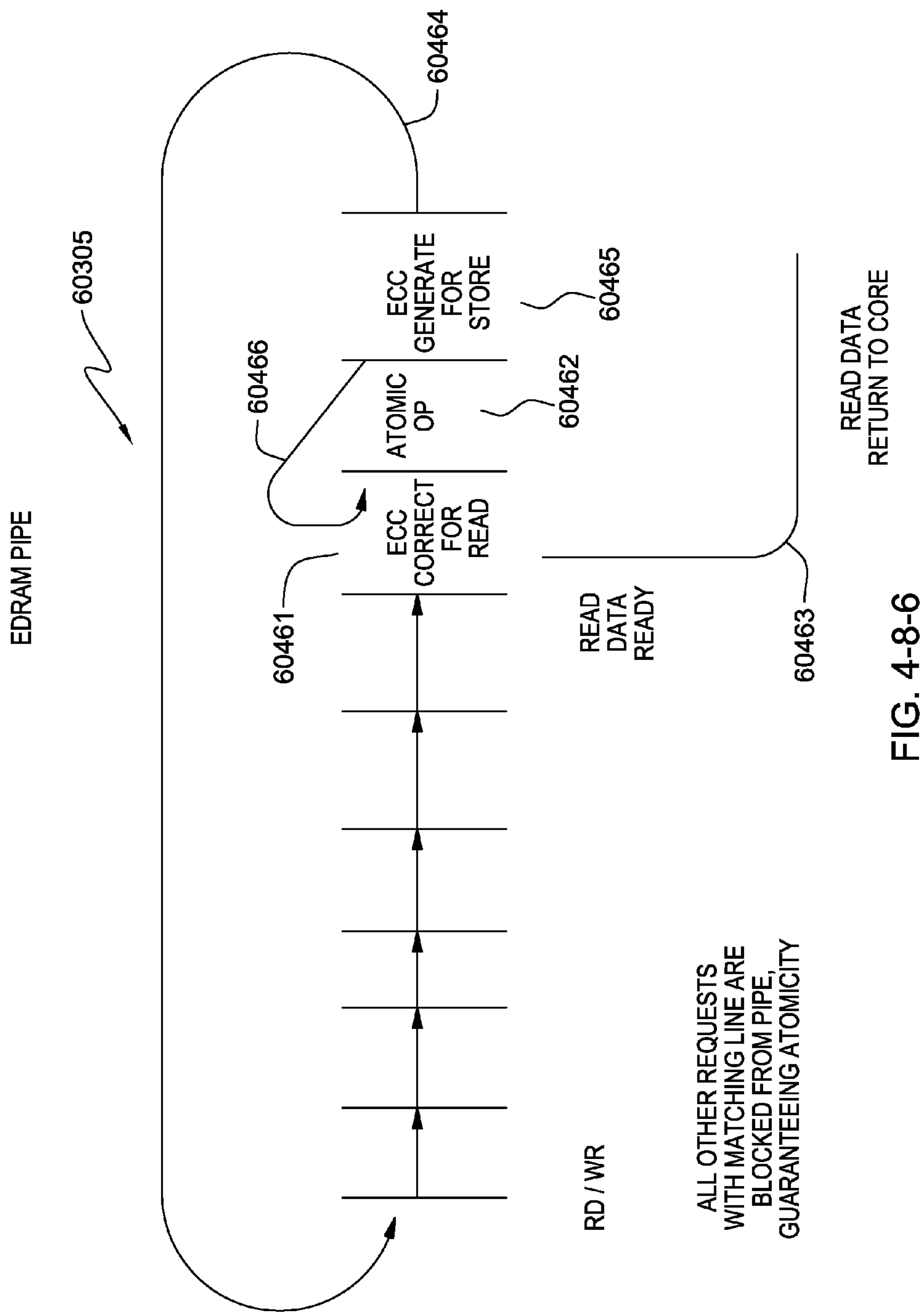
Figures 4, 5, 6, 7, 8:
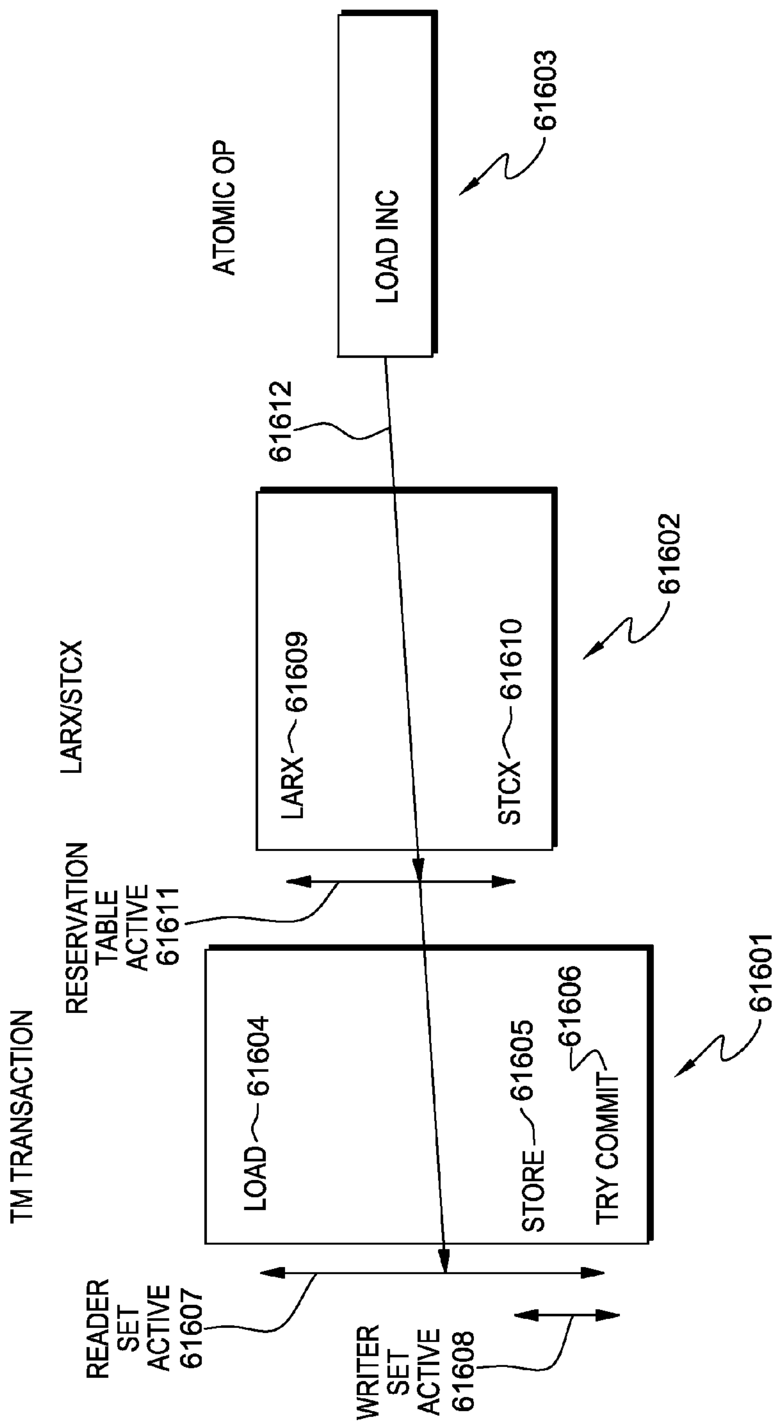
Figures 4, 5, 6, 7, 8:
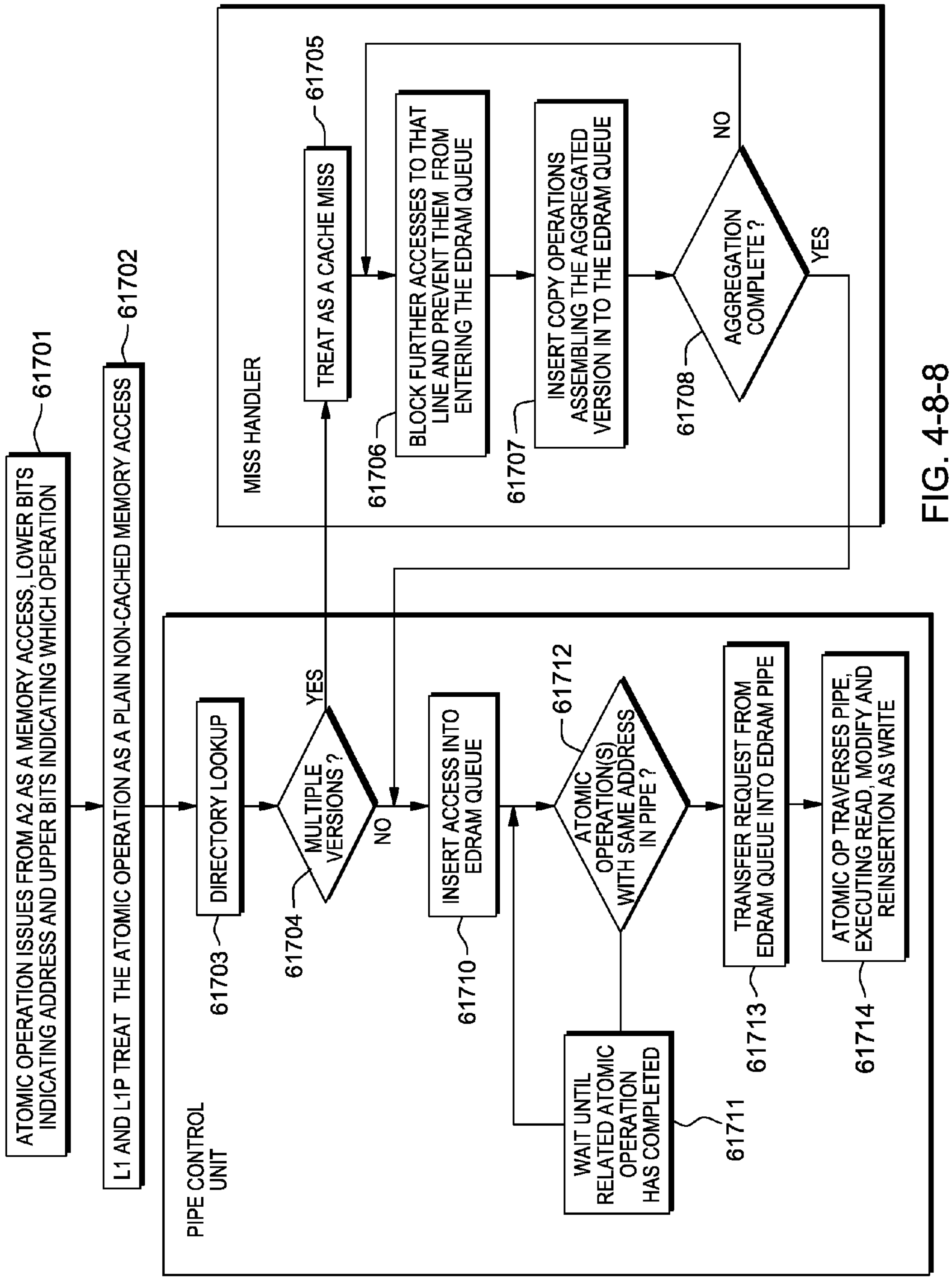

FIGS. 5-2-6A and 5-2-6B provide a flow chart describing the method 66200 that every DMA (rME) performs in parallel for a general case (i.e. this flow chart holds for any number of DMAs);

FIG. 5-2-7 illustrates conceptually a reception memory FIFO 66199 or like memory storage area showing a plurality of slots for storing packets;

FIGS. 5-2-7A to 5-2-7N depict process steps of an example scenario for parallel DMA handling of received packets belonging to the same rmFIFO;

FIG. 5-3-1 is an example of an asymmetrical torus;

FIG. 5-3-3A depicts an injection FIFO comprising a network logic device for routing data packets, a hint bit calculator, and data arrays;

FIG. 5-3-4 is an example of a data packet;

FIG. 5-3-5 is an expanded view of bytes within the data packet;

FIG. 5-3-6 is a flowchart of a method for calculating hint bits;

FIG. 5-4-1A shows in greater detail a network configuration including an inter-connection of separate network chips forming a multi-level switch interconnecting plural computing nodes of a network in one embodiment;

FIG. 5-4-1B shows in greater detail an example network configuration wherein a compute node comprises a processor(s), memory, network interface however, in the network configuration, may further include a router device, e.g., either on the same physical chip, or, on another chip;

FIG. 5-4-3 depicts the system elements interfaced with a control unit involved for checkpointing at one node 50 of a multi processor system, FIGS. 5-4-4A and 5-4-4B depict an example flow diagram depicting a method for checkpoint support in the multiprocessor system;

FIGS. 5-4-5A to 5-4-5C depicts respective control registers, each said registers having associated a predetermined address, and associated for user and system use, having a bits set to stop/start operation of particular units involved with system and user messaging in the multiprocessor system;

FIG. 5-4-6 depicts a backdoor access mechanism including an example network DCR register shown coupled over conductor or data bus to a device, such as, an injection FIFO;

FIG. 5-4-7 illustrates in greater detail a receiver block provided in the network logic unit of FIG. 5-1-2;

FIG. 5-4-8 illustrates in greater detail a sender block provided in the network logic unit, where both the user and system packets share a hardware resource such as a single retransmission FIFO for transmitting packets when there are link errors;

FIG. 5-4-9 illustrates in greater detail an alternative implementation of a sender block provided in the network logic unit, where the user and system packets have independent hardware logic units such as a user retransmission FIFO and a system retransmission FIFO;

FIG. 5-4-10 is an example physical layout of a compute card having a front side and a back side, the nodechip integrated on the front side and including a centrally located compact non-volatile memory storage device situated on the back side for storing checkpoint data resulting from checkpoint operation;

FIG. 5-5-1 illustrates a system diagram of a cache memory device, e.g., an L2 (Level 2) cache memory device according to one embodiment;

FIG. 5-5-2 illustrates local rollback intervals within the L2 cache memory device according to one embodiment;

FIG. 5-5-3 illustrates a flow chart including method steps for performing a rollback within the L2 cache memory device according to one embodiment;

FIG. 5-5-4 illustrates a flow chart detailing a method step described in FIG. 5-5-3 according to a further embodiment;

FIG. 5-5-5 illustrates a flow chart or method step detailing a method step described in FIG. 5-5-3 according to a further embodiment;

FIG. 5-5-6 illustrates a flow chart detailing a method step described in FIG. 5-5-3 according to a further embodiment;

FIG. 5-5-15 illustrates a transactional memory mode in one embodiment;

FIG. 5-6-1 illustrates an architectural diagram showing using DMA for copying performance counter data to memory;

FIG. 5-6-2 is a flow diagram illustrating a method for using DMA for copying performance counter data to memory;

FIG. 5-6-3 is a flow diagram illustrating a method for using DMA for copying performance counter data to memory in another aspect;

FIG. 5-7-1 is a diagram illustrating a hardware unit with a series of control registers that support collecting of hardware counter data to memory in one embodiment;

FIG. 5-7-2 is a diagram illustrating a hardware unit with a series of control registers that support collecting of hardware counter data to memory in another embodiment;

FIG. 5-7-3 is a flow diagram illustrating a hardware support method for collecting hardware performance counter data in one embodiment;

FIG. 5-7-4 is a flow diagram illustrating a hardware support method for collecting hardware performance counter data in another embodiment;

FIG. 5-8-1 illustrates an architectural diagram showing hardware enabled performance counters with support for operating system context switching in one embodiment;

FIG. 5-8-2 is a flow diagram illustrating a method for hardware enabled performance counters with support for operating system context switching in one embodiment;

FIG. 5-8-3 is a flow diagram illustrating hardware enabled performance counters with support for operating system context switching using a register setting in one embodiment;

FIG. 5-9-1 shows a hardware device that supports performance counter reconfiguration in one embodiment;

FIG. 5-9-2 is a flow diagram illustrating a hardware support method that supports software controlled reconfiguration of performance counters in one embodiment;

FIG. 5-9-3 is a flow diagram illustrating the software programming the registers;

FIG. 5-10-1 shows a hardware device that supports performance counter reconfiguration and counter copy in one embodiment;

FIG. 5-10-2 is a flow diagram illustrating a method for hardware that supports reconfiguration and copy of hardware performance counters in one embodiment;

FIG. 5-10-3 shows a hardware device that supports performance counter reconfiguration, counter copy and OS context switching in another embodiment;

FIG. 5-10-4 is a flow diagram illustrating a method for hardware that supports counter reconfiguration, counter copy, and OS context switching of hardware performance counters;

FIG. 5-11-1 is a high level diagram illustrating performance counter structure on a single chip that includes several processor modules and L2 slice modules in one embodiment;

FIG. 5-11-2 illustrates a structure of the UPC_P unit in one embodiment;

FIG. 5-11-3 shows a structure of the UPC_P counter unit in one embodiment;

FIG. 5-11-4 illustrates an example structure of a UPC_L2 module in one embodiment;

FIG. 5-11-5 illustrates an example structure of the UPC_C in one embodiment;

FIGS. 5-11-6, 5-11-7 and 5-11-8 are flow high-level overview diagrams that illustrate a method for distributed performance counters in one embodiment;

FIG. 5-11-12 illustrates a method for distributed trace using central performance counter memory in one embodiment;

FIG. 5-12-1 illustrates a flow chart including method steps for adding a plurality of floating point numbers in one embodiment;

FIG. 5-12-2 illustrates a system diagram of a collective logic device in one embodiment;

FIG. 5-12-3 illustrates a system diagram of an arbiter in one embodiment;

FIG. 5-12-4 illustrates 5-Dimensional torus network in one embodiment;

FIG. 5-13-2 shows in more detail one of the processing units of the system of FIG. 1;

FIG. 5-13-3 illustrates the counting and grouping of program instructions in accordance with an embodiment;

FIG. 5-13-4 shows a circuit that may be used to count operating instructions and flop instructions in an embodiment;

FIG. 6-0 illustrates an embodiment comprising miscellaneous memory-mapped devices;

FIG. 6-1-1 is a schematic block diagram of a system and method for monitoring and managing resources on a computer according to an embodiment;

FIG. 6-1-2 is a flow chart illustrating a method according to the embodiment of the invention shown in FIG. 6-1-1;

FIG. 6-1-3 is a schematic block diagram of a system for enhancing performance of computer resources according to an embodiment;

FIG. 6-1-4 is a schematic block diagram of a system for enhancing performance of computer resources according to an embodiment;

FIG. 6-1-5 is a schematic block diagram of a system for enhancing performance of a computer according to an embodiment;

FIG. 6-2-1 is a schematic block diagram of a system for enhancing barrier collective synchronization in message passing interface (MPI) applications with multiple processes running on a compute node; and FIG. 6-2-2 is a flow chart of a method according to the embodiment of the invention depicted in FIG. 6-2-1;

FIG. 6-3-1 is a schematic block diagram of a system and method for enhancing performance of a computer according to an embodiment;

FIG. 6-3-2 is a flow chart illustrating a method according to the embodiment of the invention shown in FIG. 6-3-1;

FIG. 6-3-3 is a schematic block diagram of a system for enhancing performance of a computer according to another embodiment;

FIG. 6-4-1 is a schematic block diagram of a system for enhancing performance of computer resources according to a further embodiment;

FIG. 6-4-2 is a schematic block diagram of a guard page of a stack according to an embodiment;

FIG. 6-4-3 is a flow chart illustrating a method according to the embodiment shown in FIGS. 6-4-1 and 6-4-2;

FIG. 6-4-4 is a schematic block diagram of a computer system including components shown in FIG. 6-4-1;

FIG. 6-4-5 is a flowchart according to an embodiment directed to configuring a plurality of WAC registers;

FIG. 6-4-6 is a flowchart according to an embodiment directed to moving a guard page;

FIG. 6-4-7 is a flowchart according to an embodiment directed to detecting access of the memory device;

FIG. 6-4-8 is a schematic block diagram of a method according to an embodiment;

FIG. 6-5-1 is an example of a tree network overlayed onto a multi-dimensional torus parallel computing environment;

FIG. 6-5-2 is one example of a logical tree network whose subrectangle forms the entire XY plane;

FIG. 6-5-3 shows two non overlapping sub-rectangles, A and B, and their corresponding tree networks;

FIG. 6-5-4 is one embodiment of a collective logic device;

FIG. 6-5-5 is one embodiment of an arbiter;

FIG. 6-5-6 is one embodiment of a network header for collective packets;

FIG. 6-6-3 illustrates a set of components used to implement collective communications in a multi-node processing system;

FIG. 6-6-4 illustrates a procedure, in accordance with an embodiment, for a one-sided asynchronous reduce operation when there is only one task per node;

FIG. 6-6-5 shows a procedure, in accordance with another embodiment, for a one-sided asynchronous reduce operation when there is more than one task per node;

FIG. 6-7-1 depicts a unit cell of a three-dimensional compute torus implemented in a massively parallel supercomputer with I/O links attaching it to a one-dimensional I/O torus;

FIG. 6-7-2 shows a packet header with toio and ioreturn bits in accordance with an embodiment;

FIG. 6-8-1 depicts a unit cell of a three-dimensional torus implemented in a massively parallel supercomputer;

FIG. 6-8-3 is a block diagram showing a messaging unit and associated network logic that may be used in an embodiment;

FIG. 6-8-4 is a logic block diagram of one of the receivers shown in FIG. 6-8-3;

FIG. 6-8-5 is a logic block diagram of one of the senders shown in FIG. 6-8-3;

FIG. 6-8-6 shows the format of a collective data packet;

FIG. 6-8-7 illustrates the format of a point-to-point data packet;

FIG. 6-8-8 is a diagram of the central collective logic block of FIG. 6-8-3;

FIG. 6-8-9 depicts an arbitration process that may be used in an embodiment;

FIG. 6-8-10 illustrates a GLOBAL_BARRIER PACKET type in accordance with an embodiment;

FIG. 6-8-11 shows global collective logic that is used in one embodiment;

FIG. 6-8-12 illustrates global barrier logic that may be used in an embodiment;

FIG. 6-8-13 shows an example of a collective network embedded in a 2-D torus network;

FIG. 7-0 shows an intra-rack clock fanout designed for a 96 rack system according to one embodiment;

FIG. 7-1-1 illustrates a system diagram of a clock generation circuit in one embodiment;

FIGS. 7-1-2A to 7-1-2C illustrate pulse width modified clock signals in one embodiment;

FIG. 7-1-3 illustrates oversampling a pulse width modified clock signal in one embodiment;

FIG. 7-1-4 illustrates detecting of a global synchronization signal in one embodiment;

FIG. 7-1-5 illustrates a system diagram for detecting a pulse width modification and outputting a global synchronization signal in one embodiment;

FIG. 7-1-6 illustrates a flow chart for generating a pulse width modified clock signal in one embodiment;

FIG. 7-2-1 shows a multiprocessor system with reproducibility.

FIG. 7-2-2 shows a processor chip with a clock stop timer and the ability for an external host computer via Ethernet to read or set the internal state of the processor chip;

FIG. 7-2-3 shows a flowchart to record the chronologically exact hardware behavior of a multiprocessor system;

FIG. 7-2-4 shows a timing diagram relating to reproducibility;

FIG. 7-2-5 shows a multiprocessor system with a user interface;

FIG. 7-3-1 symbolically illustrates an exemplary depiction of a general overview flowchart of a process to prolong processor operational lifetime;

FIG. 7-3-2 symbolically illustrates an exemplary depiction of a flow diagram implementing the process of FIG. 7-3-1;

FIG. 7-3-3 symbolically illustrates an exemplary depiction of a flow diagram implementing the process of FIG. 7-3-1;

FIG. 7-3-4 symbolically illustrates a functional block diagram of an exemplary embodiment of a structure of a system configured to implement the process of FIG. 7-3-1;

FIG. 7-3-5 symbolically illustrates an exemplary depiction of a history table;

FIG. 7-3-6 symbolically illustrates an exemplary embodiment of a ring oscillator used, in one embodiment, as the aging sensor;

FIG. 7-4-1 symbolically illustrates three exemplary scenarios of some the effects some selective core turn-off has on temperature and static power;

FIG. 7-4-3 symbolically illustrates an exemplary depiction of a general overview flowchart of a process for turning off processor cores;

FIG. 7-4-4 symbolically shows an exemplary structure of the look-up table exemplarily referred to in FIG. 7-4-3;

FIG. 7-4-5 illustrates a functional block diagram of an exemplary embodiment of a processor configured to implement the process of FIG. 7-4-3;

FIG. 7-4-6 symbolically illustrates the steps of an exemplary process for generating a static turn-off list; and FIG. 7-4-7 symbolically illustrates the steps of an exemplary process for injecting variation patterns into a static turn-off list.

DETAILED DESCRIPTION

The present invention is directed to a next-generation massively parallel supercomputer, hereinafter referred to as "BluGene" or "BluGene/Q". The previous two generations were detailed in the IBM Journal of Research and Development, Special Double Issue on Blue Gene, Vol. 49, Numbers 2/3, March/May 2005; and, IBM Journal of Research and Development, Vol. 52, 49, Numbers 1 and 2, January/March 2008, pp. 199-219, the whole contents and disclosures of which are incorporated by reference as if fully set forth herein. The system uses a proven Blue Gene architecture, exceeding by over 15× the performance of the prior generation Blue Gene/P per dual-midplane rack. Besides performance, there are addition several novel enhancements which will be described herein below.

FIG. 1-0 depicts a schematic of a single network compute node 50 in a parallel computing system having a plurality of like nodes each node employing a Messaging Unit 100 according to one embodiment. The computing node 50 for example may be one node in a parallel computing system architecture such as a BluGene®/Q massively parallel computing system comprising 1024 compute nodes 50(1), . . . 50(*n*), each node including multiple processor cores and each node connectable to a network such as a torus network, or a collective.

A compute node of this present massively parallel supercomputer architecture and in which the present invention may be employed is illustrated in FIG. 1-0. The compute nodechip 50 is a single chip ASIC ("Nodechip") based on low power processing core architecture, though the architecture can use any low power cores, and may comprise one or more semiconductor chips. In the embodiment depicted, the node employs PowerPC® A2 at 1600 MHz, and support a 4-way multi-threaded 64b PowerPC implementation. Although not shown, each A2 core has its own execution unit (XU), instruction unit (IU), and quad floating point unit (QPU or FPU) connected via an AXU (Auxiliary eXecution Unit). The QPU is an implementation of a quad-wide fused multiply-add SIMD QPX floating point instruction set architecture, producing, for example, eight (8) double precision operations per cycle, for a total of 128 floating point operations per cycle per compute chip. QPX is an extension of the scalar PowerPC floating point architecture. It includes multiple, e.g., thirty-two, 32B-wide floating point registers per thread.

More particularly, the basic nodechip 50 of the massively parallel supercomputer architecture illustrated in FIG. 1-0 includes multiple symmetric multiprocessing (SMP) cores 52, each core being 4-way hardware threaded supporting transactional memory and thread level speculation, and, including the Quad Floating Point Unit (FPU) 53 on each core. In one example implementation, there is provided sixteen or seventeen processor cores 52, plus one redundant or back-up processor core, each core operating at a frequency target of 1.6 GHz providing, for example, a 563 GB/s bisection bandwidth to shared L2 cache 70 via an interconnect device 60, such as a full crossbar or SerDes switches. In one example embodiment, there is provided 32 MB of shared L2 cache 70, each of sixteen cores core having associated 2 MB of L2 cache 72 in the example embodiment. There is further provided external DDR SDRAM (e.g., Double Data Rate synchronous dynamic random access) memory 80, as a lower level in the memory hierarchy in communication with the L2. In one embodiment, the compute node employs or is provided with 8-16 GB memory/node. Further, in one embodiment, the node includes 42.6 GB/s DDR3 bandwidth (1.333 GHz DDR3) (2 channels each with chip kill protection).

Each FPU 53 associated with a core 52 provides a 32B wide data path to the L1-cache 55 of the A2, allowing it to load or store 32B per cycle from or into the L1-cache 55. Each core 52 is directly connected to a private prefetch unit (level-1 prefetch, L1P) 58, which accepts, decodes and dispatches all requests sent out by the A2. The store interface from the A2 core 52 to the L1P 55 is 32B wide, in one example embodiment, and the load interface is 16B wide, both operating at processor frequency. The L1P 55 implements a fully associative, 32 entry prefetch buffer, each entry holding an L2 line of 128B size, in one embodiment. The L1P provides two prefetching schemes for the private prefetch unit 58: a sequential prefetcher, as well as a list prefetcher.

As shown in FIG. 1-0, the shared L2 70 may be sliced into 16 units, each connecting to a slave port of the crossbar switch device (XBAR) switch 60. Every physical address is mapped to one slice using a selection of programmable address bits or a XOR-based hash across all address bits. The L2-cache slices, the L1Ps and the L1-D caches of the A2s are hardware-coherent. A group of four slices may be connected via a ring to one of the two DDR3 SDRAM controllers 78.

Network packet I/O functionality at the node is provided and data throughput increased by implementing MU 100. Each MU at a node includes multiple parallel operating DMA engines, each in communication with the XBAR switch, and a Network Interface unit 150. In one embodiment, the Network interface unit of the compute node includes, in a non-limiting example: 10 intra-rack and inter-rack interprocessor links 90, each operating at 2.0 GB/s, that, in one embodiment, may be configurable as a 5-D torus, for example); and, one I/O link 92 interfaced with the Network interface Unit 150 at 2.0 GB/s (i.e., a 2 GB/s I/O link (to an I/O subsystem)) is additionally provided.

The system is expandable to 512 compute racks, each with 1024 compute node ASICs (BQC) containing 16 PowerPC A2 processor cores at 1600 MHz. Each A2 core has associated a quad-wide fused multiply-add SIMD floating point unit, producing 8 double precision operations per cycle, for a total of 128 floating point operations per cycle per compute chip. Cabled as a single system, the multiple racks can be partitioned into smaller systems by programming switch chips, termed the BG/Q Link ASICs (BQL), which source and terminate the optical cables between midplanes. Each compute rack consists of 2 sets of 512 compute nodes. Each set is packaged around a doubled-sided backplane, or midplane, which supports a five-dimensional torus of size 4×4×4×4×2 which is the communication network for the compute nodes which are packaged on 16 node boards. This tori network can be extended in 4 dimensions through link chips on the node boards, which redrive the signals optically with an architecture limit of 64 to any torus dimension. The signaling rate is 10 Gb/s, 8/10 encoded), over ~20 meter multi-mode optical cables at 850 nm. As an example, a 96-rack system is connected as a 16×16×16×12×2 torus, with the last x2 dimension contained wholly on the midplane. For reliability reasons, small torus dimensions of 8 or less may be run as a mesh rather than a torus with minor impact to the aggregate messaging rate.

The Blue Gene/Q platform includes four kinds of nodes: compute nodes (CN), I/O nodes (ION), login nodes (LN), and service nodes (SN). The CN and ION share the same Blue Gene/Q compute ASIC.

Microprocessor Core and Quad Floating Point Unit of CN and ION

The basic node of this present massively parallel supercomputer architecture is illustrated in FIG. 1-0. As shown in FIG. 1-0, each includes 16+1 (symmetric multiprocessing) cores (SMP), each core being 4-way hardware threaded supporting transactional memory and thread level speculation, and, including a Quad floating point unit on each core (204.8 GF peak node). The core operating frequency target is 1.6 GHz and a 563 GB/s bisection bandwidth to shared L2 cache (32 MB of shared L2 cache in the embodiment depicted). There is further provided 42.6 GB/s DDR3 bandwidth (1.333 GHz DDR3) (2 channels each with chip kill protection); 10 intra-rack interprocessor links each at 2.0 GB/s (i.e., 10*2 GB/s intra-rack & inter-rack (e.g., configurable as a 5-D torus in one embodiment); one I/O link at 2.0 GB/s (2 GB/s I/O link (to I/O subsystem)); and, 8-16 GB memory/node. The ASIC may consume up to about 30 watts chip power.

The node here is based on a low power A2 PowerPC cores, though the architecture can use any low power cores. The A2 is a 4-way multi-threaded 64b PowerPC implementation. Each A2 core has its own execution unit (XU), instruction unit (IU), and quad floating point unit (QPU) connected via the AXU (Auxiliary eXecution Unit) (FIG. 2-0). The QPU is an implementation of the 4-way SIMD QPX floating point instruction set architecture. QPX is an extension of the scalar PowerPC floating point architecture. It defines 32 32B-wide floating point registers per thread instead of the traditional 32 scalar 8B-wide floating point registers. Each register contains 4 slots, each slot storing an 8B double precision floating point number. The leftmost slot corresponds to the traditional scalar floating point register. The standard PowerPC floating point instructions operate on the left-most slot to preserve the scalar semantics as well as in many cases also on the other three slots. Programs that are assuming only the traditional FPU ignore the results generated by the additional three slots. QPX defines, in addition to the traditional instructions new load, store, arithmetic instructions, rounding, conversion, compare and select instructions that operate on all 4 slots in parallel and deliver 4 double precision floating point results concurrently. The load and store instructions move 32B from and to main memory with a single instruction. The arithmetic instructions include addition, subtraction, multiplication, various forms of multiply-add as well as reciprocal estimates and reciprocal square root estimates.

FIG. 2-0 depicts one configuration of an A2 core according to one embodiment. The A2 processor core is designed for excellent power efficiency and small footprint that is embedded 64 bit PowerPC compliant. The core provides for four (4) simultaneous multithreading (SMT) threads to achieve a high level of utilization on shared resources. In one aspect the design point is 1.6 GHz clock frequency @ 0.74V. An AXU port allows for unique BGQ style floating point computation, preferably configured to provide one AXU (FPU) and one other instruction issue per cycle. The core is adapted to perform in-order execution.

Compute ASIC Node

The compute chip implements 18 PowerPC compliant A2 cores and 18 attached QPU floating point units. In one embodiment, seventeen (17) cores are functional. The 18th "redundant" core is in the design to improve chip yield. Of the 17 functional units, 16 will be used for computation leaving one to be reserved for system function.

I/O Node

Besides the 1024 compute nodes per rack, there are associated I/O nodes. These I/O nodes are in separate racks, and are connected to the compute nodes through an 11th port (an I/O port such as shown in FIG. 1-0). The I/O nodes are themselves connected in a 5D torus with an architectural limit. I/O nodes include an associated PCIe 2.0 adapter card, and can exist either with compute nodes in a common midplane, or as separate I/O racks connected optically to the compute racks; the difference being the extent of the torus connecting the nodes. The SN and I/ONs are accessed through an Ethernet control network. For this installation the storage nodes are connected through a large IB (InfiniBand) switch to I/O nodes.

Memory Hierarchy—L1 and L1P

The QPU has a 32B wide data path to the L1-cache of the A2, allowing it to load or store 32B per cycle from or into the L1-cache. Each core is directly connected to a private prefetch unit (level-1 prefetch, L1P), which accepts, decodes and dispatches all requests sent out by the A2. The store interface from the A2 to the L1P is 32B wide and the load interface is 16B wide, both operating at processor frequency. The L1P implements a fully associative, 32 entry prefetch buffer. Each entry can hold an L2 line of 128B size. The L1P provides two prefetching schemes: a sequential prefetcher as used in previous Blue Gene architecture generations, as well as a novel list prefetcher. The list prefetcher tracks and records memory requests, sent out by the core, and writes the sequence as a list to a predefined memory region. It can replay this list to initiate prefetches for repeated sequences of similar access patterns. The sequences do not have to be identical, as the list processing is tolerant to a limited number of additional or missing accesses. This automated learning mechanism allows a near perfect prefetch behavior for a set of important codes that show the required access behavior, as well as perfect prefetch behavior for codes that allow precomputation of the access list.

A system, method and computer program product is provided for improving a performance of a parallel computing system, e.g., by prefetching data or instructions according to a list including a sequence of prior cache miss addresses.

In one embodiment, a parallel computing system operates at least an algorithm for prefetching data and/or instructions. According to the algorithm, with software (e.g., a compiler) cooperation, memory access patterns can be recorded and/or reused by at least one list prefetch engine (e.g., a software or hardware module prefetching data or instructions according to a list including a sequence of prior cache miss address(es)). In one embodiment, there are at least four list prefetch engines. A list prefetch engine allows iterative application software (e.g., "while" loop, etc.) to make an efficient use of general, but repetitive, memory access patterns. The recording of patterns of physical memory access by hardware (e.g., a list prefetch engine 2100 in FIG. 3-1-1) enables virtual memory transactions to be ignored and recorded in terms of their corresponding physical memory addresses.

A list describes an arbitrary sequence (i.e., a sequence not necessarily arranged in an increasing, consecutive order) of prior cache miss addresses (i.e., addresses that caused cache misses before). In one embodiment, address lists which are recorded from L1 (level one) cache misses and later loaded and used to drive the list prefetch engine may include, for example, 29-bit, 128-byte addresses identifying L2 (level-two) cache lines in which an L1 cache miss occurred. Two additional bits are used to identify, for example, the 64-byte, L1 cache lines which were missed. In this embodiment, these 31 bits plus an unused bit compose the basic 4-byte record out of which these lists are composed.

FIG. 3-1-1 illustrates a system diagram of a list prefetch engine 2100 in one embodiment. The list prefetch engine 2100 includes, but is not limited to: a prefetch unit 2105, a comparator 2110, a first array referred to herein as "ListWrite array" 2135, a second array referred to herein as "ListRead array" 2115, a first module 2120, a read module 2125 and a write module 2130. In one embodiment, there may be a plurality of list prefetch engines. A particular list prefetch engine operates on a single list at a time. A list ends with "EOL" (End of List). In a further embodiment, there may be provided a micro-controller (not shown) that requests a first segment (e.g., 64-byte segment) of a list from a memory device (not shown). This segment is stored in the ListRead array 2115.

In one embodiment, a general approach to efficiently prefetching data being requested by a L1 (level-one) cache is to prefetch data and/or instructions following a memorized list of earlier access requests. Prefetching data according to a list works well for repetitive portions of code which do not contain data-dependent branches and which repeatedly make the same, possibly complex, pattern of memory accesses. Since this list prefetching (i.e., prefetching data whose addresses appear in a list) can be understood at an application level, a recording of such a list and its use in subsequent iterations may be initiated by compiler directives placed in code at strategic spots. For example, "start_list" (i.e., a directive for starting a list prefetch engine) and "stop_list" (i.e., a directive for stopping a list prefetch engine) directives may locate those strategic spots of the code where first memorizing, and then later prefetching, a list of L1 cache misses may be advantageous.

In one embodiment, a directive called start_list causes a processor core to issue a memory mapped command (e.g., input/output command) to the parallel computing system. The command may include, but not limited to:

- A pointer to a location of a list in a memory device.
- A maximum length of the list.
- An address range described in the list. The address range pertains to appropriate memory accesses.
- The number of a thread issuing the start_list directive. (For example, each thread can have its own list prefetch engine. Thus, the thread number can determine which list prefetch engine is being started. Each cache miss may also come with a thread number so the parallel computing system can tell which list prefetch engine is supposed to respond.)
- TLB user bits and masks that identify the list.

The first module 2120 receives a current cache miss address (i.e., an address which currently causes a cache miss) and evaluates whether the current cache miss address is valid. A valid cache miss address refers to a cache miss address belonging to a class of cache miss addresses for which a list prefetching is intended In one embodiment, the first module 2120 evaluates whether the current cache miss address is valid or not, e.g., by checking a valid bit attached on the current cache miss address. The list prefetch engine 2100 stores the current cache miss address in the ListWrite array 2135 and/or the history FIFO. In one embodiment, the write module 2130 writes the contents of the array 2135 to a memory device when the array 2135 becomes full. In another embodiment, as the ListWrite Array 2135 is filled, e.g., by continuing L1 cache misses, the write module 2130 continually writes the contents of the array 2135 to a memory device and forms a new list that will be used on a next iteration (e.g., a second iteration of a "for" loop, etc.).

In one embodiment, the write module 2130 stores the contents of the array 2135 in a compressed form (e.g., collapsing a sequence of adjacent addresses into a start address and the number of addresses in the sequence) in a memory device (not shown). In one embodiment, the array 2135 stores a cache miss address in each element of the array. In another embodiment, the array 2135 stores a pointer pointing to a list of one or more addresses. In one embodiment, there is provided a software entity (not shown) for tracing a mapping between a list and a software routine (e.g., a function, loop, etc.). In one embodiment, cache miss addresses, which fall within an allowed address range, carry a proper pattern of translation lookaside buffer (TLB) user bits and are generated, e.g., by an appropriate thread. These cache miss addresses are stored sequentially in the ListWrite array 2135.

In one embodiment, a processor core may allow for possible list miss-matches where a sequence of load commands deviates sufficiently from a stored list that the list prefetch engine 2100 uses. Then, the list prefetch engine 2100 abandons the stored list but continues to record an altered list for a later use.

In one embodiment, each list prefetch engine includes a history FIFO (not shown). This history FIFO can be implemented, e.g., by a 4-entry deep, 4 byte-wide set of latches, and can include at least four most recent L2 cache lines which appeared as L1 cache misses. This history FIFO can store L2 cache line addresses corresponding to prior L1 cache misses that happened most recently. When a new L1 cache miss, appropriate for a list prefetch engine, is determined as being valid, e.g., based on a valid bit associated with the new L1 cache miss, an address (e.g., 64-byte address) that caused the L1 cache miss is compared with the at least four addresses in the history FIFO. If there is a match between the L1 cache miss address and one of the at least four addresses, an appropriate bit in a corresponding address field (e.g., 32-bit address field) is set to indicate the half portion of the L2 cache line that was missed, e.g., the 64-byte portion of the 128-byte cache line was missed. If a next L1cache miss address matches none of the at least four addresses in the history FIFO, an address at a head of the history FIFO is written out, e.g., to the ListWrite array 2135, and this next address is added to a tail of the history FIFO.

When an address is removed from one entry of the history FIFO, it is written into the ListWrite array 2135. In one embodiment, this ListWrite array 2135 is an array, e.g., 8-deep, 16-byte wide array, which is used by all or some of list prefetch engines. An arbiter (not shown) assigns a specific entry (e.g., a 16-btye entry in the history FIFO) to a specific list prefetch engine. When this specific entry is full, it is scheduled to be written to memory and a new entry assigned to the specific list prefetch engine.

The depth of this ListWrite array 2135 may be sufficient to allow for a time period for which a memory device takes to respond to this writing request (i.e., a request to write an address in an entry in the history FIFO to the ListWrite array 2135), providing sufficient additional space that a continued stream of L1 cache miss addresses will not overflow this ListWrite array 2135. In one embodiment, if 20 clock cycles are required for a 16-byte word of the list to be accepted to the history FIFO and addresses can be provided at the rate at which L2 cache data is being supplied (one L1 cache miss corresponds to 128 bytes of data loaded in 8 clock cycles), then the parallel computing system may need to have a space to hold 20/8≈3 addresses or an additional 12 bytes. According to this embodiment, the ListWrite array 2135 may be composed of at least four, 4-byte wide and 3-word deep register arrays. Thus, in this embodiment, a depth of 8 may be adequate for the ListWrite array 2135 to support a combination of at least four list prefetch engines with various degrees of activity. In one embodiment, the ListWrite array 2135 stores a sequence of valid cache miss addresses.

The list prefetch engine 2100 stores the current cache miss address in the array 2135. The list prefetch engine 2100 also provides the current cache miss address to the comparator 2110. In one embodiment, the engine 2100 provides the current miss address to the comparator 2110 when it stores the current miss address in the array 2135. In one embodiment, the comparator 2110 compares the current cache miss address and a list address (i.e., an address in a list; e.g., an element in the array 2135). If the comparator 2110 does not find a match between the current miss address and the list address, the comparator 2110 compares the current cache miss address with the next list addresses (e.g., the next eight addresses listed in a list; the next eight elements in the array 2135) held in the ListRead Array 2115 and selects the earliest matching address in these addresses (i.e., the list address and the next list addresses). The earliest matching address refers to a prior cache miss address whose index in the array 2115 is the smallest and which matches with the current cache miss address. An ability to match a next address in the list with the current cache miss address is a fault tolerant feature permitting addresses in the list which do not reoccur as L1 cache misses in a current running of a loop to be skipped over.

In one embodiment, the comparator 2110 compares addresses in the list and the current cache miss address in an order. For example, the comparator 2110 compares the current cache miss address and the first address in the list. Then, the comparator may compare the current cache miss address and the second address in the list. In one embodiment, the comparator 2110 synchronizes an address in the list which the comparator 2110 matches with the current cache miss address with later addresses in the list for which data is being prefetched. For example, the list prefetch engine 2100 finds a match between a second element in the array 2115, then the list prefetch engine 2100 prefetches data whose addresses are stored in the second element and subsequent elements of the array 2115. This separation between the address in the list which matches the current cache miss address and the address in the list being prefetched is called the prefetch depth and in one embodiment this depth can be set, e.g., by software (e.g., a compiler). In one embodiment, the comparator 2110 includes a fault-tolerant feature. For example, when the comparator 2110 detects a valid cache miss address that does not match any list address with which it is compared, that cache miss address is dropped and the comparator 2110 waits for next valid address. In another embodiment, a series of mismatches between the cache miss address and the list address (i.e., addresses in a list) may cause the list prefetch engine to be aborted. However, a construction of a new list in the ListWrite array 2135 will continue. In one embodiment, loads (i.e., load commands) from a processor core may be stalled until a list has been read from a memory device and the list prefetch engine 2100 is ready to compare (2110) subsequent L1 cache misses with at least or at most eight addresses of the list.

In one embodiment, lists needed for a comparison (2110) by at least four list prefetch engines are loaded (under a command of individual list prefetch engines) into a register array, e.g., an array of 24 depth and 16-bytes width. These registers are loaded according to a clock frequency with data coming from the memory (not shown). Thus, each list prefetch engine can access at least 24 four-byte list entries from this register array. In one embodiment, a list prefetch engine may load these list entries into its own set of, for example, 8, 4-byte comparison latches. L1 cache miss addresses issued by a processor core can then be compared with addresses (e.g., at least or at most eight addresses) in the list. In this embodiment, when a list prefetch engine consumes 16 of the at least 24 four-byte addresses and issues a load request for data (e.g., the next 64-byte data in the list), a reservoir of the 8, 4-byte addresses may remain, permitting a single skip-by-eight (i.e., skipping eight 4-byte addresses) and subsequent reload of the 8, 4-byte comparison latches without requiring a stall of the processor core.

In one embodiment, L1 cache misses associated with a single thread may require data to be prefetched at a bandwidth of the memory system, e.g., one 32-byte word every two clock cycles. In one embodiment, if the parallel computing system requires, for example, 100 clock cycles for a read command to the memory system to produce valid data, the ListRead array 2115 may have sufficient storage so that 100 clock cycles can pass between an availability of space to store data in the ListRead array 2115 and a consumption of the remaining addresses in the list. In this embodiment, in order to conserve area in the ListReady array 2115, only 64-byte segments of the list may be requested by the list prefetch engine 2100. Since each L1 cache miss leads to a fetching of data (e.g., 128-byte data), the parallel computing system may consume addresses in an active list at a rate of one address every particular clock cycles (e.g., 8 clock cycles). Recognizing a size of an address, e.g., as 4 bytes, the parallel computing system may calculate that a particular lag (e.g., 100 clock cycle lag) between a request and data in the list may require, for example, 100/8*4 or a reserve of 50 bytes to be provided in the ListRead array 2115. Thus, a total storage provided in the ListRead array 2115 may be, for example, 50+64≈114 bytes. Then, a total storage (e.g., 32+96=128 bytes) of the ListRead array 2115 may be close to a maximum requirement.

The prefetch unit 2105 prefetches data and/or instruction(s) according to a list if the comparator 2110 finds a match between the current cache miss address and an address on the list. The prefetch unit 2105 may prefetch all or some of the data stored in addresses in the list. In one embodiment, the prefetch unit 2105 prefetches data and/or instruction(s) up to a programmable depth (i.e., a particular number of instructions or particular amount of data to be prefetched; this particular number or particular amount can be programmed, e.g., by software).

In one embodiment, addresses held in the comparator 2110 determine prefetch addresses which occur later in the list and which are sent to the prefetch unit 2105 (with an appropriate arbitration between the at least four list prefetch engines). Those addresses (which have not yet been matched) are sent off for prefetching up to a programmable prefetch depth (e.g., a depth of 8). If an address matching (e.g., an address comparison between an L1 cache miss address and an address in a list) proceeds with a sufficient speed that a list address not yet prefetched matches the L1 cache miss address, this list address may trigger a demand to load data in the list address and no prefetch of the data is required. Instead, a demand load of the data to be returned directly to a processor core may be issued. The address matching may be done in parallel or in sequential, e.g., by the comparator 2110.

In one embodiment, the parallel computing system can estimate the largest prefetch depth that might be needed to ensure that prefetched data will be available when a corresponding address in the list turns up as an L1 cache miss address (i.e., an address that caused an L1 cache miss). Assuming that a single thread running in a processor core is consuming data as fast as the memory system can provide to it (e.g., a new 128-byte prefetch operation every 8 clock cycles) and that a prefetch request requires, for example, 100 clock cycles to be processed, the parallel computing system may need to have, for example, 100/8≈12 prefetch active commands; that is, a depth of 12, which may be reasonably close to the largest available depth (e.g., a depth of 8).

In one embodiment, the read module 2125 stores a pointer pointing to a list including addresses whose data may be prefetched in each element. The ListRead array 2115 stores an address whose data may be prefetched in each element. The read module 2125 loads a plurality of list elements from a memory device to the ListRead array 2115. A list loaded by the read module 2125 includes, but is not limited to: a new list (i.e., a list that is newly created by the list prefetch engine 2100), an old list (i.e., a list that has been used by the list prefetch engine 2100). Contents of the ListRead array 2115 are presented as prefetch addresses to a prefetch unit 2105 to be prefetched. This presence may continue until a pre-determined or post-determined prefetching depth is reached. In one embodiment, the list prefetch engine 2100 may discard a list whose data has been prefetched. In one embodiment, a processor (not shown) may stall until the ListRead array 2115 is fully or partially filled.

In one embodiment, there is provided a counter device in the prefetching control (not shown) which counts the number of elements in the ListRead array 2115 between that most recently matched by the comparator 2110 and the latest address sent to the prefetch unit 2105. As a value of the counter device decrements, i.e., the number of matches increments, while the matching operates with the ListRead array 2115, prefetching from later addresses in the ListRead array 2115 may be initiated to maintain a preset prefetching depth for the list.

In one embodiment, the list prefetch engine 2100 may be implemented in hardware or reconfigurable hardware, e.g., FPGA (Field Programmable Gate Array) or CPLD (Complex Programmable Logic Device), using a hardware description language (Verilog, VHDL, Handel-C, or System C). In another embodiment, the list prefetch engine 2100 may be implemented in a semiconductor chip, e.g., ASIC (Application-Specific Integrated Circuit), using a semi-custom design methodology, i.e., designing a chip using standard cells and a hardware description language. In one embodiment, the list prefetch engine 2100 may be implemented in a processor (e.g., IBM® PowerPC® processor, etc.) as a hardware unit(s). In another embodiment, the list prefetch engine 2100 may be implemented in software (e.g., a compiler or operating system), e.g., by a programming language (e.g., Java®, C/C++, .Net, Assembly language(s), Pearl, etc.).

FIG. 3-1-2 illustrates a flow chart illustrating method steps performed by the list prefetch engine 2100 in one embodiment. At step 2200, a parallel computing system operates at least one list prefetch engine (e.g., a list prefetch engine 2100). At step 2205, a list prefetch engine 2100 receives a cache miss address and evaluates whether the cache miss address is valid or not, e.g., by checking a valid bit of the cache miss address. If the cache miss address is not valid, the control goes to step 2205 to receive a next cache miss address. Otherwise, at step 2210, the list prefetch engine 2100 stores the cache miss address in the ListWrite array 2135.

At step 2215, the list prefetch engine evaluates whether the ListWrite array 2135 is full or not, e.g., by checking an empty bit (i.e., a bit indicating that a corresponding slot is available) of each slot of the array 2135. If the ListWrite array 2135 is not full, the control goes to step 2205 to receive a next cache miss address. Otherwise, at step 2220, the list prefetch engine stores contents of the array 2135 in a memory device.

At step 2225, the parallel computing system evaluates whether the list prefetch engine needs to stop. Such a command to stop would be issued when running list control software (not shown) issues a stop list command (i.e., a command for stopping the list prefetch engine 2100). If such a stop command has not been issued, the control goes to step 2205 to receive a next cache miss address. Otherwise, at step 2230, the prefetch engine flushes contents of the ListWrite array 2135. This flushing may set empty bits (e.g., a bit indicating that an element in an array is available to store a new value) of elements in the ListWrite array 2135 to high ("1") to indicate that those elements are available to store new values. Then, at step 2235, the parallel computing system stops this list prefetch engine (i.e., a prefetch engine performing the steps 2200-2230).

While operating steps 2205-2230, the prefetch engine 2100 may concurrently operate steps 2240-2290. At step 2240, the list prefetch engine 2100 determines whether the current list has been created by a previous use of a list prefetch engine or some other means. In one embodiment, this is determined by a "load list" command bit set by software when the list engine prefetch 2200 is started. If this "load list" command bit is not set to high ("1"), then no list is loaded to the ListRead array 2115 and the list prefetch engine 2100 only records a list of the L1 cache misses to the history FIFO or the ListWrite array 2135 and does no prefetching.

If the list assigned to this list prefetch engine 2100 has not been created, the control goes to step 2295 to not load a list into the ListRead array 2115 and to not prefetch data. If the list has been created, e.g., a list prefetch engine or other means, the control goes to step 2245. At step 2245, the read module 2125 begins to load the list from a memory system.

At step 2250, a state of the ListRead array 2115 is checked. If the ListRead array 2115 is full, then the control goes to step 2255 for an analysis of the next cache miss address. If the ListRead array 2115 is not full, a corresponding processor core is held at step 280 and the read module 2125 continues loading prior cache miss addresses into the ListRead array 2115 at step 2245.

At step 2255, the list prefetch engine evaluates whether the received cache miss address is valid, e.g., by checking a valid bit of the cache miss address. If the cache miss address is not valid, the control repeats the step 2255 to receive a next cache miss address and to evaluate whether the next cache miss address is valid. A valid cache miss address refers to a cache miss address belonging to a class of cache miss addresses for which a list prefetching is intended Otherwise, at step 2260, the comparator 2110 compares the valid cache miss address and address(es) in list in the ListRead array 2115. In one embodiment, the ListRead array 2115 stores a list of prior cache miss addresses. If the comparator 2110 finds a match between the valid cache miss address and an address in a list in the ListRead array, the list prefetch engine resets a value of a counter device which counts the number of mismatches between the valid cache miss address and addresses in list(s) in the ListRead array 2115.

Otherwise, at step 2290, the list prefetch engine compares the value of the counter device to a threshold value. If the value of the counter device is greater than the threshold value, the control goes to step 2290 to let the parallel computing system stop the list prefetch engine 2100. Otherwise, at step 2285, the list prefetch engine 2100 increments the value of the counter device and the control goes back to the step 2255.

At step 2270, the list prefetch engine prefetches data whose addresses are described in the list which included the matched address. The list prefetch engine prefetches data stored in all or some of the addresses in the list. The prefetched data whose addresses may be described later in the list, e.g., subsequently following the match address. At step 2275, the list prefetch engine evaluates whether the list prefetch engine reaches "EOL" (End of List) of the list. In other words, the list prefetch engine 2100 evaluates whether the prefetch engine 2100 has prefetched all the data whose addresses are listed in the list. If the prefetch engine does not reach the "EOL," the control goes back to step 2245 to load addresses (in the list) whose data have not been prefetched yet into the ListRead array 2115. Otherwise, the control goes to step 2235. At step 2235, the parallel computing system stops operating the list prefetch engine 2100.

In one embodiment, the parallel computing system allows the list prefetch engine to memorize an arbitrary sequence of prior cache miss addresses for one iteration of programming code and subsequently exploit these addresses by prefetching data stored in this sequence of addresses. This data prefetching is synchronized with an appearance of earlier cache miss addresses during a next iteration of the programming code.

In a further embodiment, the method illustrated in FIG. 3-1-2 may be extended to include the following variations when implementing the method steps in FIG. 3-1-2:

The list prefetch engine can prefetch data through a use of a sliding window (e.g., a fixed number of elements in the ListRead array 2135) that tracks the latest cache miss addresses thereby allowing to prefetch data stored in a fixed number of cache miss addresses in the sliding window. This usage of the sliding window achieves a maximum performance, e.g., by efficiently utilizing a prefetch buffer which is a scarce resource. The sliding window also provides a degree of tolerance in that a match in the list is not necessary as long as the next L1 cache miss address is within a range of a width of the sliding window.

A list of addresses can be stored in a memory device in a compressed form to reduce an amount of storage needed by the list.

Lists are indexed and can be explicitly controlled by software (user or compiler) to be invoked.

Lists can optionally be simultaneously saved while a current list is being utilized for prefetching. This feature allows an additional tolerance to actual memory references, e.g., by effectively refreshing at least one list on each invocation.

Lists can be paused through software to avoid loading a sequence of addresses that are known not relevant (e.g., the sequence of addresses are unlikely be re-accessed by a processor unit). For example, data dependent branches such as occur during a table lookup may be carried out while list prefetching is paused.

In one embodiment, prefetching initiated by an address in a list is for a full L2 (Level-two) cache line. In one embodiment, the size of the list may be minimized or optimized by including only a single 64-byte address which lies in a given 128-byte cache line. In this embodiment, this optimization is accomplished, e.g., by comparing each L1 cache miss with previous four L1 cache misses and adding a L1 cache miss address to a list only if it identifies a 128-byte cache line different from those previous four addresses. In this embodiment, in order to enhance a usage of the prefetch data array, a list may identify, in addition to an address of the 128-byte cache line to be prefetched, those 64-byte portions of the 128-byte cache line which corresponded to L1 cache misses. This identification may allow prefetched data to be marked as available for replacement as soon as portions of the prefetched data that will be needed have been hit.

There is provided a system, method and computer program product for prefetching of data or instructions in a plurality of streams while adaptively adjusting prefetching depths of each stream.

Further the adaptation algorithm may constrain that the total depth of all prefetched streams is predetermined and consistent with the available storage resources in a stream prefetch engine.

In one embodiment, a stream prefetch engine (e.g., a stream prefetch engine 20200 in FIG. 3-2-2) increments a prefetching depth of a stream when a load request for the stream has a corresponding address in a prefetch directory (e.g., a PFD 20240 in FIG. 3-2-2) but the stream prefetch engine has not received corresponding data from a memory device. Upon incrementing the prefetching depth of the stream, the stream prefetch engine decrements a prefetching depth of a victim stream (e.g., a least recently used stream).

In one embodiment, a parallel computing system operates at least one prefetch algorithm as follows:

Stream prefetching: a plurality of concurrent data or instruction streams (e.g., 16 data streams) of consecutive addresses can be simultaneously prefetched with a support up to a prefetching depth (e.g., eight cache lines can be prefetched per stream) with a fully adaptive depth selection. An adaptive depth selection refers to an ability to change a prefetching depth adaptively. A stream refers to sequential data or instructions. An MPEG (Moving Picture Experts Group) movie file or a MP3 music file is an example of a stream.

- Data and/or instruction streams can be automatically identified or implied using instructions, or established for any cache miss, e.g., by detecting sequential addresses that cause cache misses.
- Stream underflow triggers a prefetching depth increase when the adaptation is enabled. A stream underflow refers to a hit on a cache line that is currently being fetched via a switch or from a memory device. An adaptation refers to changing the prefetching depth.

A sum of all prefetch depths for all streams may be constrained not to exceed the capacity of a prefetch data array. Prefetching depth increases are performed at the expense of a victim stream: a depth of a least recently used stream is decremented to increment a prefetching depth of other stream(s). Hot streams (e.g., fastest streams) may end up with having the largest prefetching depth, e.g., a depth of 8. A prefetch data array refers to an array that stores prefetched data and/or instructions.

Stream replacements and victim streams are selected, for example, using a least recently used algorithm. A victim stream refers to a stream whose depth is decremented. A least recently used algorithm refers to an algorithm discarding the least recently used items first.

In one embodiment, there are provided rules for adaptively adjusting the prefetching depth. These rules may govern a performance of the stream prefetch engine (e.g., a stream prefetch engine 20200 in FIG. 3-2-2) when dealing with varying stream counts and avoid pathological thrashing of many streams. A thrashing refers to a computer activity that makes little or no progress because a storage resource (e.g., a prefetch data array 20235 in FIG. 3-2-2) becomes exhausted or limited to perform operations.

Rule 1: a stream may increase its prefetching depth in response to a prefetch to a demand fetch conversion event that is an indicative of bandwidth starvation. A demand fetch conversion event refers to a hit on a line that has been established in a prefetch directory but not yet had data returned from a switch or a memory device. The prefetch directory is described in detail below in conjunction with FIG. 3-2-2.

Rule 2: this depth increase is performed at an expense of a victim stream whenever a sum of all prefetching depths equals a maximum capacity of the stream prefetch engine. In one embodiment, the victim stream selected is the least recently used stream with non-zero prefetching depth. In this way, less active or inactive streams may have their depths taken by more competitive hot streams, similar to stale data being evicted from a cache. This selection of a victim stream has at least two consequences: First, that victim's allowed depth is decreased by one. Second, when an additional prefetching is performed for the stream whose depth has been increased, it is possible that all or some prefetch registers may be allocated to active streams including the victim stream since the decrease in the depth of the victim stream does not imply that the actual data footprint of that stream in the prefetch data array may correspondingly shrink. Prefetch registers refer to registers working with the stream prefetch engine. Excess data resident in the prefetch data array for the victim stream may eventually be replaced by new cache lines of more competitive hot streams. This replacement is not necessarily immediate, but may eventually occur.

In one embodiment, there is provided a free depth counter which is non-zero when a sum of all prefetching depths is less than the capacity of the stream prefetch engine. In one embodiment, this counter has value 32 on reset, and per-stream depth registers are reset to zero. These per-stream depth registers store a prefetching depth for each active stream. Thus, the contents of the per-stream depth registers are changed as a prefetching depth of a stream is changed. When a stream is invalidated, its depth is returned to the free depth counter.

FIG. 3-2-2 illustrates a system diagram of a stream prefetch engine 20200 in one embodiment. The stream prefetch engine 20200 includes, but is not limited to, a first table 20240 called prefetch directory, an array or buffer 20235 called prefetch data array, a queue 20205 call hit queue, a stream detect engine 20210, a prefetch unit 20215, a second table 20225 called DFC (Demand Fetch Conversion) table, a third table 20230 called adaptive control block. These tables 20240, 20225 and 20230 may be implemented as any data structure including, but is not limited to, an array, buffer, list, queue, vector, etc. The stream prefetch engine 20200 is capable of maintaining a plurality of active streams of varying prefetching depths. An active stream refers to a stream being processed by a processor core. A prefetching depth refers to the number of instructions or an amount of data to be prefetched ahead (e.g., 10 clock cycles before the instructions or data are needed by a processor core). The stream prefetch engine 20200 dynamically adapts prefetching depths of streams being prefetched, e.g., according to method steps illustrated in FIG. 3-2-2. These method steps in FIG. 3-2-2 are described in detail below.

The prefetch directory (PFD) 20240 stores tag information (e.g., valid bits) and meta data associated with each cache line stored in the prefetch data array (PDA) 20235. The prefetch data array 20235 stores cache lines (e.g., L2 (Level two) cache lines and/or L1 (Level one) cache lines) prefetched, e.g., by the stream prefetch unit 20200. In one embodiment, the stream prefetch engine 20200 supports diverse memory latencies and a large number (e.g., 1 million) of active threads run in the parallel computing system. In one embodiment, the stream prefetching makes use of the prefetch data array 20235 which holds up to, for example, 32 128-byte level-two cache lines.

In one embodiment, an entry of the PFD 20240 includes, but is not limited to, an address valid (AVALID) bit(s), a data valid (DVALID) bit, a prefetching depth (DEPTH) of a stream, a stream ID (Identification) of the stream, etc. An address valid bit indicates whether the PFD 20240 has a valid cache line address corresponding to a memory address requested in a load request issued by the processor. A valid cache line address refers to a valid address of a cache line. A load request refers to an instruction to move data from a memory device to a register in a processor. When an address is entered as valid into the PFD 20240, corresponding data may be requested from a memory device but may be not immediately received. The data valid bit indicates whether the stream prefetch engine 20200 has received data corresponding to a AVALID bit from a memory device 20220. In other words, DVALID bit is set to low ("0") to indicate pending data, i.e., the data that has been requested to the memory device 20220 but has not been received by the prefetch unit 20215. When the prefetch unit 20215 establishes an entry in the prefetch directory 20240 with setting the AVALID bit to high ("1") to indicate the entry has a valid cache line address corresponding to a memory address requested in a load request, the prefetch unit 20215 may also request corresponding data (e.g., L1 or L2 cache line corresponding to the memory address) from a memory device 20220 (e.g., L1 cache memory device, L2 cache memory device, a main memory device, etc.) and set corresponding DVALID bit to low. When a AVALID bit is set to high and a corresponding DVALID bit is set to low, the prefetch unit 20215 places a corresponding load request associated with these AVALID and DVALID bits in the DFC table 20225 to wait until the corresponding data that is requested by the prefetch unit 20215 comes from the memory device 20220. Once the corresponding data arrives from the memory device 20220, the stream prefetch engine 20200 stores the data in the PDA 20235 and sets the DVALID bit to high in a corresponding entry in the PFD 20240. Then, the load request, for which there exists a valid cache line in the PDA 20235 and a valid cache line address in the PFD 20240, are forwarded to the hit queue 20205, e.g., by the prefetch unit 20215. In other words, once the DVALID bit and the AVALID bit are set to high in an entry in the PFD 20240, a load request associated with the entry is forwarded to the hit queue 20205.

A valid address means that a request for the data for this address has been sent to a memory device, and that the address has not subsequently been invalidated by a cache coherence protocol. Consequently, a load request to that address may either be serviced as an immediate hit, for example, to the PDA 20235 when the data has already been returned by the memory device (DVALID=1), or may be serviced as a demand fetch conversion (i.e., obtaining the data from a memory device) with the load request placed in the DFC table 20225 when the data is still in flight from the memory device (DVALID=0).

Valid data means that an entry in the PDA 20235 corresponding to the valid address in the PFD 20240 is also valid. This entry may be invalid when the data is initially requested from a memory device and may become valid when the data has been returned by the memory device.

In one embodiment, the stream fetch engine 20200 is triggered by hits in the prefetch directory 20240. As a prefetching depth can vary from a stream to another stream, a stream ID field (e.g., 4-bit field) is held in the prefetch directory 20240 for each cache line. This stream ID identifies a stream for which this cache line was prefetched and is used to select an appropriate prefetching depth.

A prefetch address is computed, e.g., by selecting the first cache line within the prefetching depth that is not resident (but is a valid address) in the prefetch directory 20240. A prefetch address is an address of data to be prefetched. As this address is dynamically selected from a current state of the prefetch directory 20240, duplicate entries are avoided, e.g., by comparing this address and addresses that stored in the prefetch directory 20240. Some tolerance to evictions from the prefetch directory 20240 is gained.

An actual data prefetching, e.g., guided by the prefetching depth, is managed as follows: When a stream is detected, e.g., by detecting subsequent cache line misses, a sequence of "N" prefetch requests is issued in "N" or more clock cycles, where "N" is a predetermined integer between 1 and 8. Subsequent hits to this stream (whether or not the data is already present in the prefetch data array 20235) initiate a single prefetch request, provided that an actual prefetching depth of this stream is less than its allowed depth. Increases in this allowed depth (caused by hits to cache lines being prefetched but not yet resident in the prefetch data array 20235) can be exploited by this one-hit/one-prefetch policy because the prefetch line length is twice the L1 cacheline length: two hits will occur to the same prefetch line for sequential accesses. This allows two prefetch lines to be prefetched for every prefetch line consumed and depth can be extended. One-hit/one-prefetch policy refers to a policy initiating a prefetch of data or instruction in a stream per a hit in that stream.

The prefetch unit 20215 stores in a demand fetch conversion (DFC) table 20225 a load request for which a corresponding cache line has an AVALID bit set to high but a DVALID bit not (yet) set to high. Once a valid cache line returns from the memory device 20220, the prefetch unit 20215 places the load request into the hit queue 20205. In one embodiment, a switch (not shown) provides the data to the prefetch unit 20215 after the switch retrieves the data from the memory device. This (i.e., receiving data from the memory device or the switch and placing the load request in the hit queue 20205) is known as demand fetch conversion (DFC). The DFC table 20225 is sized to match a total number of outstanding load requests supported by a processor core associated with the stream prefetch engine 20200.

In one embodiment, the demand fetch conversion (DFC) table 20225 includes, but is not limited to, an array of, for example, 16 entries×13 bits representing at least 14 hypothetically possible prefetch to demand fetch conversions. A returning prefetch from the switch is compared against this array. These entries may arbitrate for access to the hit queue, waiting for free clock cycles. These entries wait until the cache line is completely entered before requesting an access to the hit queue.

In one embodiment, the prefetch unit 20215 is tied quite closely to the prefetch directory 20240 on which the prefetch unit 20215 operates and is implemented as part of the prefetch directory 20240. The prefetch unit 20215 generates prefetch addresses for a data or instruction stream prefetch. If a stream ID of a hit in the prefetch directory 20240 indicates a data or instruction stream, the prefetch unit 20275 processes address and data vectors representing "hit", e.g., by following steps 110-140 in FIG. 3-2-2.

When either a hit or DFC occurs, the next "N" cache line addresses may be also matched in the PFD 20240 where "N" is a number described in the DEPTH field of a cache line that matched with the memory address. A hit refers to finding a match between a memory address requested in a load request and a valid cache line address in the PFD 20240. If a cache line within the prefetching depth of a stream is not present in the PDA 20235, the prefetch unit 20215 prefetches the cache line from a cache memory device (e.g., a cache memory 20220). Before prefetching the cache line, the prefetch unit 20215 may establish a corresponding cache line address in the PFD 20240 with AVALID bit set to high. Then, the prefetch unit 20215 requests data load from the cache memory device 20220. Data load refers to reading the cache line from the cache memory device 20220. When prefetching the cache line, the prefetch unit 20215 assigns to the prefetched cache line a same stream ID which is inherited from a cache line whose address was hit. The prefetch unit 20215 looks up a current prefetching depth of that stream ID in the adaptive control block 20230 and inserts this prefetching depth in a corresponding entry in the PFD 20240 which is associated with the prefetched cache line. The adaptive control block 20230 is described in detail below.

The stream detect engine 20210 memorizes a plurality of memory addresses that caused cache misses before. In one embodiment, the stream detect engine 20210 memories the latest sixteen memory addresses that causes load misses. Load misses refer to cache misses caused by load requests. If a load request demands an access to a memory address which resides in a next cache line of a cache line that caused a prior cache miss, the stream detect engine 20210 detects a new stream and establishes a stream. Establishing a stream refers to prefetching data or instruction in the stream according to a prefetching depth of the stream. Prefetching data or instructions in a stream according to a prefetch depth refers to fetching a certain number of instructions or a certain amount of data in the stream within the prefetching data before they are needed. For example, if the stream detect engine 20210 is informed a load from "M1" memory address is a missed address, it will memorise the corresponding cacheline "C1". Later, if a processor core issues a load request reading data in "M1+N" memory address and "M1+N" address corresponds to a cache line "C1+1" which is subsequent to the cache line "C1", the stream detect engine 20210 detects a stream which includes the cache line "C1", the cache line "C1+1", a cache line "C1+2", etc. Then, the prefetch unit 20215 fetches "C1+1" and prefetches subsequent cache lines (e.g., the cache line "C1+2", a cache line "C1+3," etc.) of the stream detected by the stream detect engine 20210 according to a prefetching depth of the stream. In one embodiment, the stream detect engine establishes a new stream whenever a load miss occurs. The number of cache lines established in the PFD 20240 by the stream detect engine 20210 is programmable.

In one embodiment, the stream prefetch engine 20200 operates three modes where a stream is initiated on each of the following events:

Automatic stream detection (e.g., a step 20145 in FIG. 3-2-1); This mode is described in detail below in conjunction with FIG. 3-2-1.

User DCBT (Data Cache Block Touch) instruction that misses in the stream prefetch engine 20200. This DCBT instruction refers to an instruction that may move a cache line from a lower level cache memory device (e.g., L1 cache memory device) into a higher level cache memory (e.g., L2 cache memory device). This instruction may allow the stream prefetch engine 20200 to interpret the instruction as a hint to establish a stream in the stream prefetch engine 20200. Optimistic mode where a stream is established for any load miss.

Each of these modes can be enabled/disabled independently via MMIO registers. The optimistic mode and DCBT instruction share hardware logic (not shown) with the stream detect engine 20210. In order for a use of the DCBT instruction, which is only effective to a L2 cache memory device and does not unnecessarily fill a load queue (i.e., a queue storing load requests) in a processor core, the stream prefetch engine 20200 may trigger an immediate return of dummy data allowing the DCBT instruction to be retired without incurring latency associated with a normal extraction of data from a cache memory device as this DCBT instruction only affects a L2 cache memory operation and the data may not be held in a L1 cache memory device by the processor core. A load queue refers to a queue for storing load requests.

In one embodiment, the stream detect engine 20210 is performed by comparing all cache misses to a table of at least 16 expected 128-byte cache line addresses. A hit in this table triggers a number n of cache lines to be established in the prefetch directory 20240 on the following n clock cycles. A miss in this table causes a new entry to be established with a round-robin victim selection (i.e., selecting a cache line to be replaced in the table with a round-robin fashion).

In one embodiment, a prefetching depth does not represent an allocation of prefetched cache lines to a stream. The stream prefetch engine 20200 allows elasticity (i.e., flexibility within certain limits) that can cause this depth to differ (e.g., by up to 8) between streams. For example, when a processor core 20200 aggressively issues load requests, the processor core can catch up with a stream, e.g., by hitting prefetched cache lines whose data has not yet been returned by the switch. These prefetch-to-demand fetch conversion cases may be treated as normal hits by the stream detect engine 20210 and additional cache lines are established and fetched. A prefetch-to-demand fetch conversion case refers to a case in which a hit on a line that has been established in the prefetch directory 20240 but not yet had data returned from a switch or a memory device. Thus, the number of prefetch lines used by a stream in the prefetch directory 20240 can exceed the prefetching depth of a stream. However, the stream prefetch engine 20200 will have the number of cache lines for each stream equal to that stream's prefetching depth once all pending requests are satisfied and the elasticity removed.

The adaptive control block 20230 includes at least two data structures: 1. Depth table storing a prefetching depth of each stream which are registered in the PFD 20240 with its stream ID; 2. LRU (Least Recently Used) table identifying the least recently used streams among the registered streams, e.g., by employing a known LRU replacement algorithm. The known LRU replacement algorithm may update the LRU table whenever a hit in an entry in the PFD 20240 and/or DFC (Demand Fetch Conversion) occurs. In one embodiment, when a DFC occurs, the stream prefetch engine 20200 increments a prefetching depth of a stream associated with the DFC.

This increment allows a deep prefetch (e.g., prefetching data or instructions in a stream according to a prefetching depth of 8) to occur when only one or two streams are being prefetched, e.g., according to a prefetching depth of up to 8. Prefetching data or instructions according to a prefetching depth of a stream refers to fetching data or instructions in the stream within the prefetching depth ahead. For example, if a prefetching depth of a stream which comprises data stored in "K" cache line address, "K+1" cache line address, "K+2" cache line address, . . . , and "K+1000" cache line address is a depth of 2 and the stream detect engine 20200 detects this stream when a processor core requests data in "K1+1" cache line address, then the stream prefetch engine 20200 fetches data stored in "K+1" cache line address and "K1+2" cache line address. In one embodiment, an increment of a prefetching depth is only made in response to an indicator that loads from a memory device for this stream are exceeding the rate enabled by a current prefetching depth of the stream. For example, although the stream prefetch engine 20200 prefetches data or instructions, the stream may face demand fetch conversions because the stream prefetch engine 20200 fails to prefetch enough data or instructions ahead. Then, the stream prefetch engine 20200 increases the prefetching depth of the stream to fetch data or instruction further ahead for the stream. A load refers to reading data and/or instructions from a memory device. However, by only doing this increase in response to an indicator of data starvation, the stream prefetch engine 20200 avoids unnecessary deep prefetch. For example, when only hits (e.g., a match between an address in a current load request and an address in the PFD 20240) are taken, a prefetching depth of a stream associated with the current cache miss address is not increased. Unless PFD 20240 has a AVALID bit set to high and a corresponding DVALID bit set to low, the prefetch unit 20125 may not increase a prefetching depth of a corresponding stream. Because depth is stolen in competition with other active streams, the stream prefetch engine 20200 can also automatically adapt to optimally support concurrent data or instruction streams (e.g., 16 concurrent streams) with a small storage capability (e.g., a storage capacity storing only 32 cache lines) and a shallow prefetching depth (e.g., a depth of 2) for each stream.

As a capacity of the PDA 20235 is limited, it is essential that active streams do not try to exceed the capacity (e.g., 32 L2 cache lines) of the PDA 20235 to prevent thrashing and substantial performance degradation. This capacity of the PDA 20235 is also called a capacity of the stream prefetch engine 20200. The stream prefetch engine adaptation algorithm 20200 constrains a total depth of all streams across all the streams to remain as a predetermined value.

When incrementing a prefetching depth of a stream, the stream prefetch engine 20200 decrements a prefetching depth of a victim stream. A victim stream refers to a stream which is least recently used and has non-zero prefetching depth. Whenever a current active stream needs to acquire one more unit of its prefetching depth (e.g., a depth of 1), the victim stream releases one unit of its prefetching depth, thus ensuring the constraint is satisfied by forcing streams to compete for their prefetching depth increments. The constraint includes, but is not limited to: fixing a total depth of all streams.

In one embodiment, there is provided a victim queue (not shown) implemented, e.g., by a collection of registers. When a stream of a given stream ID is hit, that stream ID is inserted at a head of the victim queue and a matching entry is eliminated from the victim queue. The victim queue may list streams, e.g., by a reverse time order of an activity. A tail of this victim queue may thus include the least recently used stream. A stream ID may be used when a stream is detected and a new stream reinserted in the prefetch directory 20240. Stale data is removed from the prefetch directory 20240 and corresponding cache lines are freed.

The stream prefetch engine 20200 may identify the least recently used stream with a non-zero depth as a victim stream for decrementing a depth. An empty bit in addition to stream-ID is maintained in a LRU (Least Recently Used) queue (e.g., 16×5 bit register array). The empty bit is set to 0 when a stream ID is hit and placed at a head of the queue. If decrementing a prefetching depth of a victim stream results in a prefetching depth of the victim stream becoming zero, the empty bit of the victim stream is set to 1. A stream ID of a decremented-to-zero-depth stream is distributed to the victim queue. One or more comparator(s) matches this stream ID and sets the empty bit appropriately. A decremented-to-zero-depth stream refers to a stream whose depth is decremented to zero.

In one embodiment, a free depth register is provided for storing depths of invalidated streams. This register stores a sum of all depth allocations matching the capacity of the prefetch data array 20235, ensuring a correct book keeping.

In one embodiment, the stream prefetch engine 2100 may require elapsing a programmable number of clock cycles between adaptation events (e.g., the increment and/or the decrement) to rate control such adaptation events. For example, this elapsing gives a tunable rate control over the adaptation events.

In one embodiment, the Depth table does not represent an allocation of a space for each stream in the PDA 20235. As the prefetch unit 20215 changes a prefetching depth of a stream, a current prefetching depth of the stream may not immediately reflect this change. Rather, if the prefetch unit 20215 recently increased a prefetching depth of a stream, the PFD 20240 may reflect this increase after the PFD 20240 receives a request for this increase and prefetched data of the stream is grown. Similarly, if the prefetch unit 20215 decreases a prefetching depth of a stream, the PFD 20240 may include too much data (i.e., data beyond the prefetching depth) for that stream. Then, when a processor core issues subsequent load requests for this stream, the prefetch unit 20215 may not trigger further prefetches and at a later time an amount of the prefetched data may represent a shrunk depth. In one embodiment, the Depth table includes a prefetching depth for each stream. An additional counter is implemented as the free depth register for spare prefetching depth. This free depth register can semantically be thought of as a dummy stream and is essentially treated as a preferred victim for purposes of depth stealing. In one embodiment, invalidated stream IDs return their depths to this free depth register. This return may require a full adder to be implemented in the free depth register.

If a look-up address hits in the prefetch directory 20240, a prefetch is generated for the lowest address that is within a prefetching depth of a stream ID associated with the look-up address and which misses, for example, an eight-bit lookahead vector over the next 8 cache line addresses identifying which of these are already present in PFD 20240. A look-up address refers to an address associated with a request or command. A condition called underflow occurs when the look-up address is present with a valid address (and hence has been requested from a memory device) but corresponding data has not yet become valid. This underflow condition triggers a hit stream to increment its depth and decrement a depth of a current depth of a victim stream. A hit stream refers to a stream whose address is found in the prefetch directory 20240. As multiple hits can occur for each prefetched cache line, depths of hit streams can grow dynamically. The stream prefetch engine 20200 keeps a capacity of foot prints of all or some streams fixed, avoiding many pathological performance conditions that the dynamic growing could introduce. In one embodiment, the stream prefetch engine 20200 performs a less aggressive prefetch, e.g., by stealing depths from less active streams.

Due to outstanding load requests issued from a processor core, there is elasticity between issued requests, and those queued, pending or returned. Thus, even with the algorithm described above, a capacity of the stream prefetch engine 20200 can be exceeded by additional 4, 6 or 12 requests. The prefetching depths may be viewed as a “drive to” target depths whose sum is constrained not to exceed the capacity of a cache memory device when the processor core has no outstanding loads tying up slots of the cache memory. While the PFD 20240 does not immediately or automatically include precisely the number of cache lines for each stream corresponding to the depth of each stream, the stream prefetch engine 20200 makes its decisions about when to prefetch to try to get closer to a prefetching depth (drives towards it).

FIG. 3-2-1 illustrates a flow chart illustrating method steps performed by a stream prefetch engine (e.g., a stream prefetch engine 20200 in FIG. 3-2-2) in a parallel computing system in one embodiment. A stream prefetch engine refers to a hardware or software module for performing fetching of data in a plurality of streams before the data is needed. The parallel computing system includes a plurality of computing nodes. A computing node includes at least one processor and at least one memory device. At step 20100, a processor issues a load request (e.g., a load instruction). The stream prefetch engine 20200 receives the issued load request. At step 20105, the stream prefetch engine searches the PFD 20240 to find a cache line address corresponding to a first memory address in the issued load request. In one embodiment, the PFD 20240 stores a plurality of memory addresses whose data have been prefetched, or requested to be prefetched, by the stream prefetch engine 20200. In this embodiment, the stream prefetch engine 20200 evaluates whether the first address in the issued load request is present and valid in the PFD 20240. To determine whether a memory address in the PFD 20240 is valid or not, the stream prefetch engine 20200 may check an address valid bit of that memory address.

If the first memory address is present and valid in the PFD 20240 or there is a valid cache line address corresponding to the first memory address in the PFD 20240, at step 20110, the stream prefetch engine 20200 evaluates whether there exists valid data (e.g., valid L2 cache line) corresponding to the first memory address in the PDA 20235. In other words, if there is a valid cache line address corresponding to the first memory address in the PFD 20240, the stream prefetch engine 20200 evaluates whether the corresponding data is valid yet. If the data is not valid, then the corresponding data is pending, i.e., corresponding data is requested to the memory device 20220 but has not been received by the stream prefetch engine 20200. At step 20105, if the first memory address is not present or not valid in the PFD 20240, the control goes to step 20145. At step 20110, to evaluate whether there already exists the valid data in the PDA 20235, the stream prefetch engine 20200 may check a data valid bit associated with the first memory address or the valid cache line address in the PFD 20240.

If there is no valid data corresponding to the first memory address in the PDA 20235, at step 20115, the stream prefetch engine 20200 inserts the issued load request to the DFC table 20225 and awaits a return of the data from the memory device 20200. Then, the control goes to step 20120. In other words, if the data is pending, at step 20115, the stream prefetch engine 20200 inserts the issued load request to the DFC table 20225, the stream prefetch engine 20200 awaits the data to be returned by the memory device (since the address was valid, the data has already been requested but not returned) and the control goes to step 20120. Otherwise, the control goes to step 20130. At step 20120, the stream prefetch engine 20200 increments a prefetching depth of a first stream that the first memory address belongs to. While incrementing the prefetching depth of the first stream, at step 20125, the stream prefetch engine 20200 determines a victim stream among streams registered in the PFD 20240 and decrements a prefetching depth of the victim stream. The registered streams refers to streams whose stream IDs are stored in the PFD 20240. To determine the victim stream, the stream prefetch engine 20200 searches the least recently used stream having non-zero prefetching depth among the registered streams. The stream prefetch engine 20200 sets the least recently used stream having non-zero prefetching depth as the victim stream in a purpose of a reallocation of a prefetching depth of the victim stream.

In one embodiment, a total prefetching depth of the registered streams is a predetermined value. The parallel computing system operating the stream prefetch engine 20200 can change or program the predetermined value representing the total prefetching depth.

Returning to FIG. 3-2-1, at step 20135, the stream prefetch engine 20200 evaluates whether prefetching of additional data (e.g., subsequent cache lines) is needed for the first stream. For example, the stream prefetch engine 20200 perform parallel address comparisons to check whether all memory addresses or cache line addresses within a prefetching depth of the first stream are present in the PFD 20240. If all the memory addresses or cache line addresses within the prefetching depth of the first stream are present, i.e., all the cache line addresses within the prefetching depth of the first stream are present and valid in the PFD 20240, then the control goes to step 20165. Otherwise, the control goes to step 20140.

At step 20140, the stream prefetch engine 20200 prefetches the additional data. Upon determining that prefetching of additional data is necessary, the stream prefetch engine 20200 may select the nearest address to the first address that is not present but is a valid address in the PFD 20240 within a prefetching depth of a stream corresponding to the first address and starts to prefetch data from the nearest address. The stream prefetch engine 20200 may also prefetch subsequent data stored in subsequent addresses of the nearest address. The stream prefetch engine 20200 may fetch at least one cache line corresponding to a second memory address (i.e., a memory address or cache line address not being present in the PFD 20240) within the prefetching depth of the first stream. Then, the control goes to step 20165.

At step 20145, the stream prefetch engine 20200 attempts to detect a stream (e.g., the first stream that the first memory address belongs to). In one embodiment, the stream prefetch engine 20200 stores a plurality of third memory addresses that caused load misses before. A load miss refers to a cache miss caused by a load request. The stream prefetch engine 20200 increments the third memory addresses. The stream prefetch engine 20200 compares the incremented third memory addresses and the first memory address. The stream prefetch engine 20200 identifies the first stream if there is a match between an incremented third memory address and the first memory address.

If the stream prefetch engine 20200 succeeds to detect a stream (e.g., the first stream), at step 20155, the stream prefetch engine 20200 starts to prefetch data and/or instructions in the stream (e.g., the first stream) according to a prefetching depth of the stream. Otherwise, the control goes to step 20150. At step 20150, the stream prefetch engine 20200 returns prefetched data and/or instructions to a processor core. The stream prefetch engine 20200 stores the prefetched data and/or instructions, e.g., in PDA 20235, before returning the prefetched data and/or instructions to the processor core. At step 20160, the stream prefetch engine 20200 inserts the issued load request to the DFC table 20225. At step 20165, the stream prefetch engine receives a new load request issued from a processor core.

In one embodiment, the stream prefetch engine 20200 adaptively changes prefetching depths of streams. In a further embodiment, the stream prefetch engine 20200 sets a minimum prefetching depth (e.g., a depth of zero) and/or a maximum prefetching depth (e.g., a depth of eight) that a stream can have. The stream prefetch engine 20200 increments a prefetching depth of a stream associated with a load request when a memory address in the load request is valid (e.g., its address valid bit has been set to high in the PFD 20240) but data (e.g., L2 cache line stored in the PDA 20235) corresponding to the memory address is not yet valid (e.g., its data valid bit is still set to low ("0") in the PFD 20240). In other words, the stream prefetch engine 20200 increments the prefetching depth of the stream associated with the load request when there is no valid cache line data present in the PDA 20235 corresponding to the valid memory address in the PFD (due to the data being in flight from the cache memory). To increment the prefetching depth of the stream, the stream prefetch engine 20200 decrements a prefetching depth of the least recently used stream having non-zero prefetching depth. For example, the stream prefetch engine 20200 first attempts to decrement a prefetching depth of the least recently used stream. If the least recently used stream already has zero prefetching depth (i.e., a depth of zero), the stream prefetch engine 20200 attempts to decrement a prefetching depth of a second least recently used stream, and so on. In one embodiment, as described above, the adaptive control block 20230 includes the LRU table that traces least recently used streams according to hits on streams.

In one embodiment, the stream prefetch engine 20200 may be implemented in hardware or reconfigurable hardware, e.g., FPGA (Field Programmable Gate Array) or CPLD (Complex Programmable Logic deviceDevice), using a hardware description language (Verilog, VHDL, Handel-C, or System C). In another embodiment, the stream prefetch engine 20200 may be implemented in a semiconductor chip, e.g., ASIC (Application-Specific Integrated Circuit), using a semi-custom design methodology, i.e., designing a chip using standard cells and a hardware description language. In one embodiment, the stream prefetch engine 20200 may be implemented in a processor (e.g., IBM® PowerPC® processor, etc.) as a hardware unit(s). In another embodiment, the stream prefetch engine 20200 may be implemented in software (e.g., a compiler or operating system), e.g., by a programming language (e.g., Java®, C/C++, .Net, Assembly language(s), Pearl, etc.).

In one embodiment, the stream prefetch engine 20200 operates with at least four threads per processor core and a maximum prefetching depth of eight (e.g., eight L2 (level two) cache lines). In one embodiment, the prefetch data array 20235 may store 128 cache lines. In this embodiment, the prefetch data array stores 32 cache lines and, by adapting the prefetching depth according to a system load, the stream prefetch engine 20200 can support the same dynamic range of memory accesses. By adaptively changing the capacity of the PDA 20235, the prefetch data array 20235 whose capacity is 32 cache lines can also operate as an array with 128 cache lines.

In one embodiment, an adaptive prefetching is necessary to both support efficient low stream count (e.g., a single stream) and efficient high stream count (e.g., 16 streams) prefetching with the stream prefetch engine 20200. An adaptive prefetching is a technique adaptively adjusting prefetching depth per a stream as described in the steps 20120-20125 in FIG. 3-2-1.

In one embodiment, the stream prefetch engine 20200 counts the number of active streams and then divides the PFD 20240 and/or the PDA 20235 equally among these active streams. These active streams may have an equal prefetching depth.

In one embodiment, a total depth of all active streams is predetermined and not exceeding a PDA capacity of the stream prefetch engine 20100 to avoid thrashing. An adaptive variation of a prefetching depth allows a deep prefetch (i.e., a depth of eight) for low numbers of streams (i.e., two streams), while a shallow prefetch (i.e., a depth of 2) is used for large numbers of streams (i.e., 16 streams) to maintain the usage of PDA 20235 optimal under a wide variety of load requests.

There is provided a system, method and computer program product for improving a performance of a parallel computing system, e.g., by operating at least two different prefetch engines associated with a processor core.

FIG. 3-3-1 illustrates a flow chart for responding to commands issued by a processor when prefetched data may be available because of an operation of one or more different prefetch engines in one embodiment. A parallel computing system may include a plurality of computing nodes. A computing node may include, without limitation, at least one processor and/or at least one memory device. At step 21100, a processor (e.g., IBM® PowerPC®, A2 core 21200 in FIG. 3-3-2, etc.) in a computing node in the parallel computing system issues a command. A command includes, without limitation, an instruction (e.g., Load from and/or Store to a memory device, etc.) and/or a prefetching request (i.e., a request for prefetching of data or instruction(s) from a memory device). A command also refers to a request, vice versa. A command and a request are interchangeably used in this disclosure. A command or request includes, without limitation, instruction codes, addresses, pointers, bits, flags, etc.

At step 21110, a look-up engine (e.g., a look-up engine 21315 in FIG. 3-3-2) evaluates whether a prefetch request has been issued for first data (e.g., numerical data, string data, instructions, etc.) associated with the command. The prefetch request (i.e., a request for prefetching data) may be issued by a prefetch engine (e.g., a stream prefetch engine 21275 or a list prefetch engine 21280 in FIG. 3-3-2). In one embodiment, to make the determination, the look-up engine compares a first address in the command and second addresses for which prefetch requests have been issued or that have been prefetched. Thus, the look-up engine may include at least one comparator. The parallel computing system may further include an array or table (e.g., a prefetch directory 21310 in FIG. 3-3-2) for storing the addresses for which prefetch requests have been previously issued by the one or more simultaneously operating prefetch engines. The stream prefetch engine 21275 and the list prefetch engine 21280 are described in detail below.

At step 21110, if the look-up engine determines that a prefetch request has not been issued for the first data, e.g., the first data address is not found in the prefetch directory 21310, at step 21120, then a normal load command is issued to a memory system.

At step 21110, if the look-up engine determines that a prefetch request has been issued for the first data, then the look-up engine determines whether the first data is present in a prefetch data array (e.g., a prefetch data array 21250 in FIG. 3-3-2), e.g., by examining a data present bit (e.g., a bit indicating whether data is present in the prefetch data array) in step 21115. If the first data has already been prefetched and is resident in the prefetch data array, at step 21130, then the first data is passed directly to the processor, e.g., by a prefetch system 21320 in FIG. 3-3-2. If the first data has not yet been received and is not yet in the prefetch data array, at step 21125, then the prefetch request is converted to a demand load command (i.e., a command requesting data from a memory system) so that when the first data is returned from the memory system it may be transferred directly to the processor rather than being stored in the prefetch data array awaiting a later processor request for that data.

The look-up engine also provides the command including an address of the first data to two at least two different prefetch engines simultaneously. These two different prefetch engines include, without limitation, at least one stream prefetch engine (e.g., a stream prefetch engine 21275 in FIG. 3-3-2) and one or more list prefetch engine, e.g., at least four list prefetch engines (e.g., a list prefetch engine 21280 in FIG. 3-3-2). A stream prefetch engine uses the first data address to initiate a possible prefetch command for second data (e.g., numerical data, string data, instructions, etc.) associated with the command. For example, the stream prefetch engine fetches ahead (e.g., 10 clock cycles before when data or an instruction is expected to be needed) one or more 128 byte L2 cache lines of data and/or instruction according to a prefetching depth. A prefetching depth refers to a specific amount of data or a specific number of instructions to be prefetched in a data or instruction stream.

In one embodiment, the stream prefetch engine adaptively changes the prefetching depth according to a speed of each stream. For example, if a speed of a data or instruction stream is faster than speeds of other data or instruction streams (i.e., that faster stream includes data which is requested by the processor but is not yet resident in the prefetch data directory), the stream prefetch engine runs the step 21115 to convert a prefetch request for the faster stream to a demand load command described above. The stream prefetch engine increases a prefetching depth of the fastest data or instruction stream. In one embodiment, there is provided a register array for specifying a prefetching depth of each stream. This register array is preloaded by software at the start of running the prefetch system (e.g., the prefetch system 21320 in FIG. 3-3-2) and then the contents of this register array vary as faster and slower streams are identified. For example, if a first data stream includes an address which is requested by a processor and corresponding data is found to be resident in the prefetch data array and a second data stream includes an address for which prefetched data which has not yet arrived in the prefetch data array. The stream prefetch engines reduces a prefetching depth of the first stream, e.g., by decrementing a prefetching depth of a first stream in the register array. The stream prefetch engine increases a prefetching depth of the second stream, e.g., by incrementing a prefetching depth of a second stream in the register array. If a speed of a data or instruction stream is slower than speeds of other data or instruction streams, the stream prefetch engine decreases a prefetching depth of the slowest data or instruction stream. In another embodiment, the stream prefetch engine increases a prefetching depth of a stream when the command has a valid address of a cache line but there is no valid data corresponding to the cache line. To increase a prefetching depth of a stream, the stream prefetch engine steals and decreases a prefetching depth of a least recently used stream having a non-zero prefetching depth. In one embodiment, the stream prefetch engine prefetches at least sixteen data or instruction streams. In another embodiment, the stream prefetch engine prefetches at most or at least sixteen data or instruction streams. A detail of the stream prefetch engines is described in connection with FIGS. 3-2-1 and 3-2-1. In an embodiment described in FIG. 3-3-1, the stream prefetch engine prefetches second data associated with the command according to a prefetching depth. For example, when a prefetching depth of a stream is set to two, a cache line miss occurs at a cache line address "L1" and another cache line miss subsequently occurs at a cache line address "L1+1," the stream prefetch engine prefetch cache lines addressed at "L1+2" and "L1+3."

The list prefetch engine(s) prefetch(es) third data associated with the command. In one embodiment, the list prefetch engine(s) prefetch(es) the third data (e.g., numerical data, string data, instructions, etc.) according to a list describing a sequence of addresses that caused cache misses. The list prefetch engine(s) prefetches data or instruction(s) in a list associated with the command. In one embodiment, there is provided a module for matching between a command and a list. A match would be found if an address requested in the command and an address listed in the list are same. If there is a match, the list prefetch engine(s) prefetches data or instruction(s) in the list up to a predetermined depth ahead of where the match has been found. A detail of the list prefetch engine(s) is described in described in connection with FIGS. 3-1-1 and 3-1-2.

The third data prefetched by the list prefetch engine or the second data prefetched by the stream prefetch engine may include data that may subsequently be requested by the processor. In other words, even if one of the engines (the stream prefetch engine and the list prefetch engine) fails to prefetch this subsequent data, the other engine succeeds to prefetch this subsequent data based on the first data that both prefetch engines use to initiate further data prefetches. This is possible because the stream prefetch engine is optimized for data located in consecutive memory locations (e.g., streaming movie) and the list prefetch engine is optimized for a block of randomly located data that is repetitively accessed (e.g., loop). The second data and the third data may include different set of data and/or instruction(s).

In one embodiment, the second data and the third data are stored in an array or buffer without a distinction. In other words, data prefetched by the stream prefetch engine and data prefetched by the list prefetch engine are stored together without a distinction (e.g., a tag, a flag, a label, etc.) in an array or buffer.

In one embodiment, each of the list prefetch engine(s) and the stream prefetch engine(s) can be turned off and/or turned on separately. In one embodiment, the stream prefetch engine(s) and/or list prefetch engine(s) prefetch data and/or instruction(s) that have not been prefetched before and/or have not listed in the prefetch directory 21310.

In one embodiment, the parallel computing system operates the list prefetch engine occasionally (e.g., when a user bit(s) are set). A user bit(s) identify a viable address to be used, e.g., by a list prefetch engine. The parallel computing system operates the stream prefetch engine all the time.

In one embodiment, if the look-up engine determines that the first data has not been prefetched, at step 21110, the parallel computing system immediately issues the load command for this first data to a memory system. However, it also provides an address of this first data to the stream prefetch engine and/or at least one list prefetch engine which use this address to determine further data to be prefetched. The prefetched data may be consumed by the processor core 21200 in subsequent clock cycles. A method to determine and/or identify whether the further data needs to be prefetched is described herein above. Upon determining and/or identifying the further data to be prefetched, the stream prefetch engine may establish a new stream and prefetch data in the new stream or prefetch additional data in an existing stream. At the same time, upon determining and/or identifying the further data to be prefetched, the list prefetch engine may recognize a match between the address of this first data and an earlier L1 cache miss address (i.e., an address caused a prior L1 cache miss) in a list and prefetch data from the subsequent cache miss addresses in the list separated by a predetermined "list prefetch depth", e.g., a particular number of instructions and/or a particular amount of data to be prefetched by the list prefetch engine.

A parallel computing system which has at least one stream and at least one list prefetch engine may run more efficiently if both types of prefetch engines are provided. In one embodiment, the parallel computing system allows these two different prefetch engines (i.e., list prefetch engines and stream prefetch engines) to run simultaneously without serious interference. The parallel computing system can operate the list prefetch engine, which may require a user intervention, without spoiling benefits for the stream prefetch engine.

In one embodiment, the stream prefetch engine 21275 and/or the list prefetch engine 21280 is implemented in hardware or reconfigurable hardware, e.g., FPGA (Field Programmable Gate Array) or CPLD (Complex Programmable Logic deviceDevice), using a hardware description language (Verilog, VHDL, Handel-C, or System C). In another embodiment, the stream prefetch engine 21275 and/or the list prefetch engine 21280 is implemented in a semiconductor chip, e.g., ASIC (Application-Specific Integrated Circuit), using a semi-custom design methodology, i.e., designing a chip using standard cells and a hardware description language. In one embodiment, the stream prefetch engine 21275 and/or the list prefetch engine 21280 is implemented in a processor (e.g., IBM® PowerPC® processor, etc.) as a hardware unit(s). In another embodiment, the stream prefetch engine 21275 and/or the list prefetch engine 21280 is/are implemented in software (e.g., a compiler or operating system), e.g., by a programming language (e.g., Java®, C/C++, .Net, Assembly language(s), Pearl, etc.). When the stream prefetch engine 21275 is implemented in a compiler, the compiler adapts the prefetching depth of each data or instruction stream.

FIG. 3-3-2 illustrates a system diagram of a prefetch system for improving performance of a parallel computing system in one embodiment. The prefetch system 21320 includes, but is not limited to: a plurality of processor cores (e.g., A2 core 21200, IBM® PowerPC®), at least one boundary register (e.g., a latch 21205), a bypass engine 21210, a request array 21215, a look-up queue 21220, at least two write-combine buffers (e.g., a write-combine buffers 21225 and 21230), a store data array 21235, a prefetch directory 21310, a look-up engine 21315, a multiplexer 21290, an address compare engine 21270, a stream prefetch engine 21275, a list prefetch engine 21280, a multiplexer 21285, a stream detect engine 21265, a fetch conversion engine 21260, a hit queue 21255, a prefetch data array 21250, a switch request table 21295, a switch response handler 21300, a switch 21305, at least one local control register 21245, a multiplexer 21240, an interface logic 21325.

The prefetch system 21320 is a module that provides an interface between the processor core 21200 and the rest of the parallel computing system. Specifically, the prefetch system 21320 provides an interface to the switch 21305 and an interface to a computing node's DCR (Device Control Ring) and local control registers special to the prefetch system 21320. The system 21320 performs performance critical tasks including, without limitations, identifying and prefetching memory access patterns, managing a cache memory device for data resulting from this identifying and prefetching. In addition, the system 21320 performs write combining (e.g., combining four or more write commands into a single write command) to enable multiple writes to be presented as a single write to the switch 21305, while maintaining coherency between the write combine arrays.

The processor core 210200 issue at least one command including, without limitation, an instruction requesting data. The at least one register 21205 buffers the issued command, at least one address in the command and/or the data in the commands. The bypass engine 21210 allows a command to bypass the look-up queue 21220 when the look-up queue 21220 is empty.

The look-up queue 21220 receives the commands from the register 21205 and also outputs the earliest issued command among the issued commands to one or more of: the request array 21215, the stream detect engine 21260, the switch request table 21295 and the hit queue 21255. In one embodiment, the queue 21220 is implemented in as a FIFO (First In First Out) queue. The request array 21215 receives at least one address from the register 21205 associated with the command. In one embodiment, the addresses in the request array 21215 are indexed to the corresponding command in the look-up queue 21220. The look-up engine 21315 receives the ordered commands from the bypass engine 21210 or the request array 21215 and compares an address in the issued commands with addresses in the prefetch directory 21310. The prefetch directory 21310 stores addresses of data and/or instructions for which prefetch commands have been issued by one of the prefetch engines (e.g., a stream prefetch 21275 and a list prefetch engine 21280).

The address compare engine 21270 receives addresses that have been prefetched from the at least one prefetch engine (e.g., the stream prefetch engine 21275 and/or the list prefetch engine 21280) and prevents the same data from being prefetched twice by the at least one prefetch engine. The address compare engine 21270 allows a processor core to request data not present in the prefetch directory 21310. The stream detect engine 21265 receives address(es) in the issued commands from the look-up engine 21315 and detects at least one stream to be used in the stream prefetch engine 21275. For example, if the addresses in the issued commands are "L1" and "L1+1," the stream prefetch engine may prefetch cache lines addressed at "L1+2" and "L1+3."

In one embodiment, the stream detect engine 21265 stores at least one address that caused a cache miss. The stream detect engine 21265 detects a stream, e.g., by incrementing the stored address and comparing the incremented address with an address in the issued command. In one embodiment, the stream detect engine 21265 can detect at least sixteen streams. In another embodiment, the stream detect engine can detect at most sixteen streams. The stream detect engine 21265 provides detected stream(s) to the stream prefetch engine 21275. The stream prefetch engine 21275 issues a request for prefetching data and/instructions in the detected stream according to a prefetching depth of the detected stream.

The list prefetch engine 21280 issues a request for prefetching data and/or instruction(s) in a list that includes a sequence of address that caused cache misses. The multiplexer 21285 forwards the prefetch request issued by the list prefetch engine 21280 or the prefetch request issued by the stream prefetch engine 21275 to the switch request table 21295. The multiplexer 21290 forwards the prefetch request issued by the list prefetch engine 21280 or the prefetch request issued by the stream prefetch engine 21275 to the prefetch directory 21310. A prefetch request may include memory address(es) where data and/or instruction(s) are prefetched. The prefetch directory 21310 stores the prefetch request(s) and/or the memory address(es).

The switch request table 21295 receives the commands from the look-up queue 21220 and the forwarded prefetch request from the multiplexer 21285. The switch request table 21295 stores the commands and/or the forwarded request. The switch 21305 retrieves the commands and/or the forwarded request from the table 21295, and transmits data and/instructions demanded in the commands and/or the forwarded request to the switch response handler 21300. Upon receiving the data and/or instruction(s) from the switch 21305, the switch response handler 21300 immediately delivers the data to the processor core 21200, e.g., via the multiplexer 21240 and the interface logic 21325. At the same time, if the returned data or instruction(s) is the result of a prefetch request the switch response handler 21300 delivers the data or instruction(s) from the switch 21305 to the prefetch conversion engine 21260 and delivers the data and/or instruction(s) to the prefetch data array 21250.

The prefetch conversion engine 21260 receives the commands from the look-up queue 21220 and/or information bits accompanying data or instructions returned from the switch response handler 21300. The conversion engine 21260 converts prefetch requests to demand fetch commands if the processor requests data that were the target of a prefetch request issued earlier by one of the prefetch units but has not yet been fulfilled. The conversion engine 21260 will then identify this prefetch request when it returns from the switch 21305 through the switch response handler 21300 as a command that was converted from a prefetch request to a demand load command. This returning prefetch data from the switch response handler 21300 is then routed to the hit queue 21255 so that it is quickly passed through the prefetch data array 21250 on the processor core 21200. The hit queue 21255 may also receive the earliest command (i.e., the earliest issued command by the processor core 21200) from the look-up queue 21220 if that command requests data that is already present in the prefetch data array 21250. In one embodiment, when issuing a command, the processor core 21200 attaches generation bits (i.e., bits representing a generation or age of a command) to the command. Values of the generation bits may increase as the number of commands issued increases. For example, the first issued command may have "0" in the generation bits. The second issued command may be "1" in the generation bits. The hit queue 21255 outputs instructions and/or data that have been prefetched to the prefetch data array 21250.

The prefetch data array 21250 stores the instructions and/or data that have been prefetched. In one embodiment, the prefetch data array 21250 is a buffer between the processor core 21200 and a local cache memory device (not shown) and stores data and/or instructions prefetched by the stream prefetch engine 21275 and/or list prefetch engine 21280. The switch 21305 may be an interface between the local cache memory device and the prefetch system 21320.

In one embodiment, the prefetch system 21320 combines multiple candidate writing commands into, for example, four writing commands when there is no conflict between the four writing commands. For example, the prefetch system 21320 combines multiple "store" instructions, which could be instructions to various individual bytes in the same 32 byte word, into a single store instruction for that 32 byte word. Then, the prefetch system 21320 stores these coalesced single writing commands to at least two arrays called write-combine buffers 21225 and 21230. These at least two write-combine buffers are synchronized with each other. In one embodiment, a first write-combine buffer 21225 called write-combine candidate match array may store candidate writing commands that can be combined or concatenated immediately as they are issued by the processor core 21200. The first write-combine buffer 21225 receives these candidate writing commands from the register 21205. A second write-combine buffer 21230 called write-combine buffer flush receives candidate writing commands that can be combined from the bypass engine 21210 and/or the request array 21215 and/or stores the single writing commands that combine a plurality of writing commands when these (uncombined) writing commands reach the tail of the look-up queue 21220. When these write-combine arrays become full or need to be flushed to make the contents of a memory system be up-to-date, these candidate writing commands and/or single writing commands are stored in an array 21235 called store data array. In one embodiment, the array 21235 may also store the data from the register 21205 that is associated with these single writing commands.

The switch 21305 can retrieve the candidate writing commands and/or single writing commands from the array 21235. The prefetch system 21320 also transfers the candidate writing commands and/or single writing commands from the array 21235 to local control registers 21245 or a device command ring (DCR), i.e., a register storing control or status information of the processor core. The local control register 21245 controls a variety of functions being performed by the prefetch system 21320. This local control register 21245 as well as the DCR can also be read by the processor core 21200 with the returned read data entering the multiplexer 21240. The multiplexer 21240 receives, as inputs, control bits from the local control register 21245, the data and/or instructions from the switch response handler 21300 and/or the prefetched data and/or instructions from the prefetch data array 21250. Then, the multiplexer 21240 forwards one of the inputs to the interface logic 21325. The interface logic 21325 delivers the forwarded input to the processor core 21200. All of the control bits as well as I/O commands (i.e., an instruction for performing input/output operations between a processor and peripheral devices) are memory mapped and can be accessed either using memory load and store instructions which are passed through the switch 21305 or are addressed to the DCR or local control registers 21245.

Look-Up Engine

FIG. 3-3-3 illustrates a state machine 21400 that operates the look-up engine 21315 in one embodiment. In one embodiment, inputs from the look-up queue 21220 are latched in a register (not shown). This register holds its previous value if a "hold" bit is asserted by the state machine 21400 and preserved for use when the state machine 21400 reenters a new request processing state. Inputs to the state machine 400 includes, without limitation, a request ID, a valid bit, a request type, a request thread, a user defining the request, a tag, a store index, etc.

By default, the look-up engine 21315 is in a ready state 21455 (i.e., a state ready for performing an operation). Upon receiving a request (e.g., a register write command), the look-up engine 21315 goes to a register write state 21450 (i.e., a state for updating a register in the prefetch system 21320). In the register write state 21450, the look-up engine 21315 stays in the state 21450 until receiving an SDA arbitration input 21425 (i.e., an input indicating that the write data from the SDA has been granted access to the local control registers 21245). Upon completing the register update, the look-up engine 21315 goes back to the ready state 21455. Upon receiving a DCR write request (i.e., a request to write in the DCR) from the processor core 21200, the look-up engine 21315 goes from the register write state 21450 to a DCR write wait state 21405 (i.e., a state for performing a write to DCR). Upon receiving a DCR acknowledgement from the DCR, the look-up engine 21315 goes from the DCR write wait state 21405 to the ready state 21455.

The look-up engine 21315 goes from the ready state 21455 to a DCR read wait 21415 (i.e., a state for preparing to read contents of the DCR) upon receiving a DCR ready request (i.e., a request for checking a readiness of the DCR). The look-up engine 21315 stays in the DCR read wait state 21415 until the look-up engine 21315 receives the DCR acknowledgement 21420 from the DCR. Upon receiving the DCR acknowledgement, the look-up engine 21315 goes from the DCR read wait state 21415 to a register read state 21460. The look-up engine 21315 stays in the register read state 21415 until a processor core reload arbitration signal 21465 (i.e., a signal indicating that the DCR read data has been accepted by the interface 21325) is asserted.

The look-up engine 21315 goes from the ready state 21455 to the register read state 415 upon receiving a register read request (i.e., a request for reading contents of a register). The look-up engine 21315 comes back to ready state 21455 from the register read state 21415 upon completing a register read. The look-up engine 21315 stays in the ready state 21455 upon receiving one or more of: a hit signal (i.e., a signal indicating a "hit" in an entry in the prefetch directory 21310), a prefetch to demand fetch conversion signal (i.e., a signal for converting a prefetch request to a demand to a switch or a memory device), a demand load signal (i.e., a signal for loading data or instructions from a switch or a memory device), a victim empty signal (i.e., a signal indicating that there is no victim stream to be selected by the stream prefetch engine 21275), a load command for data that must not be put in cache (a non-cache signal), a hold signal (i.e., a signal for holding current data), a noop signal (i.e., a signal indicating no operation).

The look-up engine 21315 goes to the ready state 21455 to a WCBF evict state 21500 (i.e., a state evicting an entry from the WCBF array 21230) upon receiving a WCBF evict request (i.e., a request for evicting the WCBF entry). The look-up engine 21315 goes back to the ready state 21455 from the WCBF evict state 21500 upon completing an eviction in the WCBF array 21230. The look-up engine 21315 stays in the WCBF evict state 21500 while a switch request queue (SRQ) arbitration signal 21505 is asserted.

The look-up engine 21315 goes from the ready state 21455 to a WCBF flush state 21495 upon receiving a WCBF flush request (i.e., a request for flushing the WCBF array 21230). The look-up engine 21315 goes back to the ready state 21455 from the WCBF flush state 21495 upon a completion of flushing the WCBF array 21230. The look-up engine 21315 stays in the ready state 21455 while a generation change signal (i.e., a signal indicating a generation change of data in an entry of the WCBF array 21230) is asserted.

In one embodiment, most state transitions in the state machine 21400 are done in a single cycle. Whenever a state transition is scheduled, a hold signal is asserted to prevent further advance of the look-up queue 21220 and to ensure that a register at a boundary of the look-up queue 21220 retains its value. This state transition is created, for example, by a read triggering two write combine array evictions for coherency maintenance. Generation change triggers a complete flush of the WCBF array 21230 over multiple clock cycles.

The look-up engine 21315 outputs the following signals going to the hit queue 21255, SRT (Switch Request Table) 21295, demand fetch conversion engine 21260, and look-up queue 21220: critical word, a tag (bits attached by the processor core 21200 to allow it to identify a returning load command) indicating thread ID, 5-bit store index, a request index, a directory index indicating the location of prefetch data for the case of a prefetch hit, etc.

In one embodiment, a READ combinational logic (i.e., a combinational logic performing a memory read) returns a residency of a current address and next consecutive addresses. A STORE combinational logic (i.e., a combinational logic performing a memory write) returns a residency of a current address and next consecutive addresses and deasserts an address valid bit for any cache lines matching this current address.

Hit Queue

In one exemplary embodiment, the hit queue 21255 is implemented, e.g., by 12 entry×12-bit register array holds pending hits (hits for prefetched data) for a presentation to the interface 21245 of the processor core. Read and write pointers are maintained in one or two clock cycle domain. Each entry of the hit queue includes, without limitation, a critical word, a directory index and a processor core tag.

Prefetch Data Array

In one embodiment, the prefetch data array 21250 is implemented, e.g., by a dual ported 32×128-byte SRAM operating in one or two clock cycle domain. A read port is driven, e.g., by the hit queue and the write port is driven, e.g., by switch response handler 21300.

Prefetch Directory

The prefetch directory 21310 includes, without limitation, a 32×48-bit register array storing information related to the prefetch data array 21250. It is accessed by the look-up engine 21315 and written by the prefetch engines 21275 and 21280. The prefetch directory 21310 operates in one or two clock cycle domain and is timing and performance critical. There is provided a combinatorial logic associated with this prefetch directory 21310 including a replication count of address comparators.

Each prefetch directory entry includes, without limitation, an address, an address valid bit, a stream ID, data representing a prefetching depth. In one embodiment, the prefetch directory 21310 is a data structure and may be accessed for a number of different purposes.

Look-Up and Stream Comparators

In one embodiment, at least two 32-bit addresses associated with commands are analyzed in the address compare engine 21270 as a particular address (e.g., $35^{th}$ bit to $3^{rd}$ bit) and their increments. A parallel comparison is performed on both of these numbers for each prefetch directory entry. The comparators evaluate both carry and result of the particular address (e.g., $2^{nd}$ bit to $0^{th}$ bit)+0, 1, . . . , or 7. The comparison bits (e.g., $35^{th}$ bit to $3^{rd}$ bit in the particular address) with or without a carry and the first three bits (e.g., $2^{nd}$ bit to 0th bit in the particular address) are combined to produce a match for lines N, N+1 to N+7 in the hit queue 21255. This match is used by look-up engine 21315 for both read, and write coherency and for deciding which line to prefetch for the stream prefetch engine 21275. If a write signal is asserted by the look-up engine 21315, a matching address is invalidated and subsequent read look-ups (i.e., look-up operations in the hit queue 21255 for a read command) cannot be matched. A line in the hit queue 21255 will become unlocked for reuse once any pending hits, or pending data return if the line was in-flight, have been fulfilled.

LIST Prefetch Comparators

In one embodiment, address compare engine 21270 includes, for example, 32×35-bit comparators returning "hit" (i.e., a signal indicating that there exists prefetched data in the prefetch data array 21250 or the prefetch directory 21310) and "hit index" (i.e., a signal representing an index of data being "hit") to the list prefetch engine 21280 in one or two clock cycle period(s). These "hit" and "hit index" are used to decide whether to service or discard a prefetch request from the list prefetch engine 21280. The prefetch system 21230 does not establish the same cache line twice. The prefetch system 320 discards prefetched data or instruction(s) if it collides with an address in a write combine array (e.g., array 21225 or 21230).

Automatic Stream Detection, Manual Stream Touch

All or some of the read commands that cause a miss when looked up in the prefetch directory 21310 are snooped by the stream detect engine 21265. The stream detect engine 21265 includes, without limitation, a table of expected next aligned addresses based on previous misses to prefetchable addresses. If a confirmation (i.e., a stream is detected, e.g., by finding a match between an address in the table and an address forwarded by the look-up engine) is obtained (e.g., by a demand fetch issued on a same cycle), the look-up queue 21220 is stalled on a next clock cycle and a cache line is established in the prefetch data array 21250 starting from an (aligned) address to the aligned address. The new stream establishment logic is shared with at least 16 memory mapped registers, one for each stream that triggers a sequence of four cache lines to be established in the prefetch data array 21250 with a corresponding stream ID, starting with the aligned address written to the register.

When a new stream is established the following steps occur

The look-up queue 21220 is held.

A victim stream ID is selected.

The current depth for this victim stream ID is returned to the "free pool" and its depth is reset to zero.

A register whose value can be set by software determines an initial prefetch depth for the new streams.

"N" cache lines are established on at least "N" clock cycles and a prefetching depth for this new stream is incremented up to "N", e.g., by adaptively stealing a depth from a victim stream.

Prefetch-to-Demand-Fetch Conversion Engine

In one embodiment, the demand fetch conversion engine 21260 includes, without limitation, an array of, for example, 16 entries×13 bits representing at least 14 hypothetically possible prefetch to demand fetch conversions (i.e., a process converting a prefetch request to a demand for data to be returned immediately to the processor core 21200). The information bits of returning prefetch data from the switch 21305 is compared against this array. If this comparison determines that this prefetch data has been converted to demand fetch data (i.e., data provided from the switch 21305 or a memory system), these entries will arbitrate for access to the hit queue 21255, waiting for free clock cycles. These entries wait until the cache line is completely entered before requesting an access to the hit queue 21255. Each entry in the array in the engine 21260 includes, without limitation, a demand pending bit indicating a conversion from a prefetch request to a demand load command when set, a tag for the prefetch, an index identifying the target location in the prefetch data array 21250 for the prefetch and a critical word associated with the demand.

ECC and Parity

In one embodiment, data paths and/or prefetch data array 21250 will be ECC protected, i.e., errors in the data paths and/or prefetch data array may be corrected by ECC (Error Correction Code). In one embodiment, the data paths will be ECC protected, e.g., at the level of 8-byte granularity. Sub 8-byte data in the data paths will by parity protected at a byte level, i.e., errors in the data paths may be identified by a parity bit. Parity bit and/or interrupts may be used for the register array 21215 which stores request information (e.g., addresses and status bits). In one embodiment, a parity bit is implemented on narrower register arrays (e.g., an index FIFO, etc.). There can be a plurality of latches in this module that may affect a program function. Unwinding logical decisions made by the prefetch system 21320 based on detected soft errors in addresses and request information may impair latency and performance. Parity bit implementation on the bulk of these decisions is possible. An error refers to a signal or datum with a mistake.

FIG. 3-4-2 depicts, in greater detail, a plurality of processing unit (PU)$\mathbf{22090}_0, \ldots, \mathbf{22090}_{M-1}$, one of which, PU $\mathbf{22090}_0$ shown including at least one processor core 22052, such as the A2 core, the quad floating point unit (QPU) and an optional L1P pre-fetch cache 22055. The PU$\mathbf{22090}_0$, in one embodiment, includes a 32B wide data path to an associated L1-cache 22054, allowing it to load or store 32B per cycle from or into the L1-cache. In a non-limiting embodiment, each core 22052 is directly connected to an optional private prefetch unit (level-1 prefetch, L1P) 22058, which accepts, decodes and dispatches all requests sent out by the A2 processor core. In one embodiment, a store interface from the A2 to the L1P is 32B wide and the load interface is 16B wide, both operating at processor frequency, for example. The L1P implements a fully associative, 32 entry prefetch buffer, each entry holding cache lines of 128B size, for example. Each PU is connected with the L2 cache 22070 via a master port (a Master device) of full crossbar switch 22060. In one example embodiment, the shared L2 cache is 32 MB sliced into 16 units, with each 2 MB unit connecting to a slave port of the switch (a Slave device). Every physical address issued via a processor core is mapped to one slice using a selection of programmable address bits or a XOR-based hash across all issued address bits. The L2-cache slices, and the L1 caches of the A2s are hardware-coherent. A group of four slices may be connected via a ring to one of the two DDR3 SDRAM controllers 78 (FIG. 1-0).

As shown in FIG. 3-4-2, each PU's $\mathbf{22090}_0 \ldots, \mathbf{22090}_{M-1}$, where M is the number of processors cores, and ranges from 0 to 17, for example, connects to the central low latency, high bandwidth crossbar switch 22060 via a plurality of master ports including master data ports 22061 and corresponding master control ports 22062. The central crossbar 22060 routes requests received from up to M processor cores via associated pipeline latches $\mathbf{22061}_0 \ldots, \mathbf{22061}_{M-1}$ where they are input to respective data path latch devices $\mathbf{22063}_0 \ldots, \mathbf{22063}_{M-1}$ in the crossbar 22060 to write data from the master ports to the slave ports 69 via data path latch devices $\mathbf{22067}_0 \ldots, \mathbf{22067}_{S-1}$ in the crossbar 22060 and respective pipeline latch devices $\mathbf{22069}_0 \ldots, \mathbf{22069}_{S-1}$, where S is the number of L2 cache slices, and may comprise an integer number up to 15, in an example embodiment. Similarly, central crossbar 22060 routes return data read from memory 22070 via associated pipeline latches and data path latches back to the master ports. A write data path of each master and slave port is 16B wide, in example embodiment. A read data return port is 32B wide, in an example embodiment.

As further shown in FIG. 3-4-3, the cross-bar includes arbitration device 22100 implementing one or more state machines for arbitrating read and write requests received at the crossbar 22060 from each of the PU's, for routing to/from the L2 cache slices 22070.

In the multiprocessor system on a chip 22050, the "M" processors (e.g., 0 to M−1) are connected to the centralized crossbar switch 22060 through one or more pipe line latch stages. Similarly, "S" cache slices (e.g., 0 to S−1) are also connected to the crossbar switch 22060 through one or more pipeline stages. Any master "M" intending to communicate with a slave "S", sends a request 22110 to the crossbar indicating its need to communicate with the slave "S". The arbitrations device 22100 arbitrates among the multiple requests competing for the same slave "S".

Processor core connects to the arbitration device 22100 via a plurality of Master data ports 22061 and Master control ports 22062. At a Master control port 22062, a respective processor signal 22110 requests routing of data latched at a corresponding Master data port 22061 to a Slave device associated with a cache slice. Processor request signals 22110 are received and latched at the corresponding Master control pipeline latch devices $\mathbf{22064}_0 \ldots, \mathbf{22064}_{M-1}$ for routing to the arbiter every clock cycle. Arbitration device issues arbitration grant signals 22120 to the respective requesting processor core 52 from the arbiter 22100. Grant signals 22120 are latched corresponding Master control pipeline latch devices $\mathbf{22066}_0 \ldots, \mathbf{22066}_{M-1}$ prior to transfer back to the processor. The arbitration device 22100 further generates corresponding Slave control signals 22130 that are communicated to slave ports 22068 via respective Slave control pipeline latch devices $\mathbf{22068}_0 \ldots, \mathbf{22068}_{S-1}$, in an example embodiment. Slave control port signals inform the slaves of the arrival of the data through a respective slave data port $\mathbf{22069}_0 \ldots, \mathbf{22069}_{S-1}$ in accordance with the arbitration scheme issued at that clock cycle. In accordance with arbitration grants selecting a Master Port 22061 and Slave Port 22069 combination in accordance with an arbitration scheme implemented, the arbitration device 22100 generates, in every clock cycle, multiplexor control signals 22150 for receipt at a respective multiplexor devices $\mathbf{22065}_0 \ldots, \mathbf{22065}_{S-1}$ to control, e.g., select by turning on, a respective multiplexor. A selected multiplexor enables forwarding of data from master data path latch device $\mathbf{22063}_0 \ldots, \mathbf{22063}_{S-1}$ associated with a selected Master Port to the selected Slave Port 22069 via a corresponding connected slave data path latch device $\mathbf{22067}_0 \ldots, \mathbf{22067}_{S-1}$. In FIG. 3-4-2, for example, two multiplexor control signals 22150*a* and 22150*b* are shown issued simultaneously for controlling routing of data via multiplexor devices $\mathbf{22065}_0$ and $\mathbf{22065}_{S-1}$.

In one example embodiment, the arbitrations device 22100 arbitrates among the multiple requests competing for the same slave "S" using a two step mechanism: 1): There are "S" slave arbitration slices. Each slave arbitration slice includes arbitration logic that receives all the pending requests of various Masters to access it. It then uses a round robin mechanism that uses a single round robin priority vector, e.g., bits, to select one Master as the winner of the arbitration. This is done independently by each of the S slave arbitration slices in a clock cycle; 2): There are "M" Master arbitration slices. It is possible that multiple Slave arbitration slices have chosen the same Master in the previous step. Each master arbitration slice uses a round robin mechanism to choose one such slave. This is done independently by each of the "M" master arbitration slices. Though FIG. 3-4-4 depicts processing at a single arbitration unit 22100, it is understood that both Master arbitration slice and Slave arbitrations slice state machine logic may be distributed within the crossbar switch.

This method ensures fairness, as shown in the signal timing diagram of arbitration device signals of FIG. 3-4-6 and depicted in Table 1 below. For example, assuming that Masters 1 through 4 have chosen to access Slave 4. Assuming also that master 0 has pending requests to slaves 0 through 4. It is possible that each of the Slaves 0 through 4 choose master 0 (e.g., in cycle 1). Now Master 0 chooses one of the slaves. Masters 1 through 4 find that no slave has chosen them and hence they do not participate in the arbitration process. Master 0 using a round robin mechanism chooses slave 0 in cycle 1. Slaves 1 through 4, implementing a single round robin priority vector, continue to choose master 0 in cycle 2. Master 0 chooses slave 1 in cycle 2, slave 2 in cycle 3, slave 3 in cycle 4 and slave 4 in cycle 5. Only after slave 4 is chosen in cycle 5, will Slave 4 choose another master using the round robin mechanism. Even though requests were pending from Masters 1 through 4 to slave 4, slave 4 implementing a single round robin priority vector, continued to choose master 0 for cycles 1 through 5. The following describes the cycle and choice and winner via this mechanism using round robin priority:

TABLE 1

| Cycle | Choice of Slave 4 | Winner |
|---|---|---|
| 1 | Master 0 | Master 0 to Slave 0 |
| 2 | Master 0 | Master 0 to Slave 1 |
| 3 | Master 0 | Master 0 to Slave 2 |
| 4 | Master 0 | Master 0 to Slave 3 |
| 5 | Master 0 | Master 0 to Slave 4 (slave 4 wins) |
| 6 | Master 1 | Master 1 to Slave 4 (slave 4 wins) |
| 7 | Master 2 | Master 2 to Slave 4 (slave 4 wins) |
| 8 | Master 3 | Master 3 to Slave 4 (slave 4 wins) |
| 9 | Master 4 | Master 4 to Slave 4 (slave 4 wins) |

In this example, it takes at least 5 clock cycles 22160 before the request for Master 1 had even been granted to a slave due to the round robin scheme implemented. However, all transactions to slave 4 are scheduled by cycle 9.

This throughput performance through crossbar 22060 may be improved in a further embodiment: rather than each slave using a single round robin priority vector, each slave uses two or more round robin priority vectors. The slave cycles the use of these priority vectors every clock cycle. Thus, in the above example, slave 4 having chosen Master 0 in cycle 1, will choose Master 1 in cycle 2 using a different round robin priority vector. In cycle 2, Master 1 would choose slave 4 as it is the only slave requesting it.

TABLE 2

| Cycle | Chosen by slave 4 | Winner |
|---|---|---|
| 1 | Master 0 | Master 0 to Slave 0 |
| 2 | Master 1 | Master 0 to Slave 1; Master 1 to Slave 4 (slave 4 wins) |
| 3 | Master 0 | Master 0 to Slave 2 |
| 4 | Master 2 | Master 0 to Slave 3; Master 2 to Slave 4 (slave 4 wins) |
| 5 | Master 0 | Master 0 to Slave 4 (slave 4 wins) |
| 6 | Master 3 | Master 3 to Slave 4 (slave 4 wins) |
| 7 | Master 4 | Master 4 to Slave 4 (slave 4 wins) |

FIG. 3-4-4 depicts the first step processing 22200 performed by the arbiter 22100. The process 22200 is performed by each slave arbitration slice, i.e., arbitration logic executed at each slice (for each Slave 0 to S−1). At 22202, each Slave arbitration slice receives all the pending requests of various Masters requesting access to it, e.g., Slave S1, for example. Using a priority vector SP1, the Slave S1 arbitration slice chooses one of the masters (e.g., M1) at 22205. The Slave arbitration slice then sends this information to the master arbitration slice M1 at 22209. Then, as a result of the arbitration scheme implemented the chosen Master, e.g., Master 1, a determination is made as to whether the M1 has accepted the Slave S1 at 22212 or other slaves at that clock cycle. If at 22212 it is determined that the M1 has accepted the Slave (e.g., Slave 1), then the priority vector SP1 is updated at step 22215 and the process proceeds to 22219. Otherwise, if it is determined that the M1 has not accepted the Slave (e.g., Slave 1) the process continues directly to step 22219. Then, in the subsequent cycle, as shown at 22219, the Slave arbitration slice examines requests from various Masters to Slave S1 and, at 22225, uses a second priority vector SP2 to choose one of the Masters (e.g., M2). Continuing, at 22228, this information is transmitted to the Master arbitration slice, e.g., for Master M2. Then, at 22232, a further determination is made as to whether the Master arbitration for M2 has accepted the Slave S1. If the Master arbitration for M2 has accepted the Slave S1, then at 22235, the priority vector is updated to SP2 and the process returns to 22202 for continuing arbitration for that Slave slice.

In a similar vein, each Master can have two or more priority vectors and can cycle among their use every clock cycle to further increase performance. FIG. 3-4-5 depicts the second step processing performed by the arbiter 22100. The process 22250 is performed by each master arbitration slice, i.e., arbitration logic executed at each slice (for each Master 0 to M−1). Each Master arbitration slice waits until a Slave arbitration slice has selected it (Slave arbitration has selected a Master) at 22252. Then, at 22255 using a priority vector MP1, Master arbitration slice chooses one of the slaves (e.g., S1). This information is sent to the corresponding Slave arbitration slice S1 at 22259. Then, priority vector MP1 is updated at 22260. Then, in the subsequent cycle, at 22262, the Master arbitration slice waits again for the slave arbitration slices to make a master selection. Using a priority vector MP2, the Master arbitration slice at 22265 chooses one of the slaves (e.g., S2). Then, the Master arbitration slice transmits this information to the slave arbitration slice S2 at 22269. Finally, the priority vector MP2 is updated at 22272 and the process returns to 22252 for continuing arbitration for that Master slice.

In one example embodiment, the priority vector used by the slave, e.g., SP1, is M bits long (0 to M−1), as the slave arbitration has to choose one of M masters. Hence, only one bit would be set per cycle as the lowest priority bit, in the example. For example, if a bit 5 of the priority vector is set, then the Master 5 has the lowest priority and the Master 6 would have the highest priority, Master 7 has the second highest priority, etc. The order from highest priority to lowest priority is 6, 7, 8 . . . M−1, 0, 1, 2, 3, 4, 5 in this example priority vector. Further, for example, the Masters arbitration slices 7, 8 and 9 request the slave and Master 7 wins. The priority vector SP1 would be updated so that bit 7 would be set—resulting in priority order from highest to lowest as 8, 9, 10, . . . M−1, 0, 1, 2, 3, 4, 5, 6, 7 in the updated vector. A similar bit vector scheme is further used by the Master arbitration logic devices in determining priority values of slaves to be selected for access within a clock cycle.

The usage of multiple priority vectors both by the masters and slaves and cycling among them result in increased performance. For example, as a result of implementing processes at the arbitration Slave and Master arbitration slices of the example depicted in FIG. 3-4-7, it is seen that all transactions to slave S4 are scheduled by the seventh clock cycle 22275, thus improving performance as compared to the case of FIG. 3-4-6.

A method and system are described that reduce latency between masters (e.g., processors) and slaves (e.g., devices having memory/cache—L2 slices) communicating with one another through a central cross bar switch.

FIG. 3-5-1 is a diagram illustrating communications between masters and slaves via a cross bar switch. In a multiprocessor system on a chip (e.g., in integrated circuit such as an application specific integrated circuit (ASIC)), "M" processors (e.g., 0 to M−1) are connected to a centralized crossbar switch 23102 through one or more pipe line latch stages 23104. Similarly, "S" slave devices, for example, cache slices (e.g., 0 to S−1) are also connected to the crossbar switch through one or more pipeline stages 23106.

Any master "m" desiring to communicate with a slave "s" goes through the following steps:

- Sends a request (e.g., "req_r1") to the crossbar indicating its need to communicate with the slave "s", for example, via a pipe line latch 23108*a;*
- The cross bar 23102 receives requests from a plurality of masters, for example, all the M masters. If more than one master wants to communicate with the same slave, the cross bar 23102 arbitrates among the multiple requests competing for the same slave "s";
- Once the cross bar 23102 has determined that a slot is available for transferring the information from "m" to "s", it sends a "schedule" command (e.g., "sked_r1" to the master "m"), for example, via a pipe line latch 23110*a;*
- The master "m" now sends the information (say "info r1") associated with the request (for example, if it wants to store, then store address and data) to the crossbar switch, for example, via a pipe line latch 23112*a;*
- The cross bar switch now sends this information ("info_r1") to the slave "s", for example, via a pipe line latch 23114*a*.

The latency expected for communicating among the masters, the cross bar 23102, and the slaves are shown in FIG. 3-5-5. Let us assume that there are p1 pipeline stages between a master and the crossbar switch and p2 pipeline stages between the crossbar switch and a slave. Following is a typical latency calculation for a request assuming that there is no contention for the slave. A master sending a request ("req_r1") to the cross bar may take p1 cycles, for example, as shown at 23502. Crossbar arbitrating multiples requests from multiple masters may take A1 cycles, for example, as shown at 23504. Cross bar sending a schedule command (e.g., "sked_r1") may take p1 cycles, for example, as shown at 23506. Master sending the information to the crossbar (e.g., "info_r1") may take p1 cycles, for example, as shown at 23508. Crossbar sending the information (e.g., "info_r1") to the slave may take p2 cycles, for example, as shown at 23510. The number of cycles spent in sending information from a master to a slave totals to 3*(p1)+A+p2 cycles in this example.

Referring back to FIG. 3-5-1, the method and system in one embodiment of the present disclosure reduce the latency or number of cycles it takes in communicating between a master and a slave. In one aspect, this is accomplished without buffering information, for example, to keep the area or needed resources such as buffering devices to a minimum. A master, for example, master "m" sends a request ("req_r1") to the cross bar 23102 indicating its intention to communicate with slave "s", for example, via a pipe line latch 23108*b*. The master "eagerly" sends the information (e.g., "info_r1") to be transferred to the slave "A" cycles after sending the request, for example, via pipe line latch 23112*b* unless there is information to be sent in response to a "schedule" command. The master continues to drive the information to be transferred to the slave unless there is a "schedule" command or "A" or more cycles have elapsed after a later request (e.g., "req_r2") has been issued.

The cross bar switch 23102 arbitrates among the multiple requests competing for the same slave "s". In one embodiment, the cross bar switch 102 may include an arbiter logic 23116, which makes decisions as to which master can talk to which slave. The cross bar switch 23102 may include an arbiter for each master and each slave slice, for instance, a slave arbitration slice for each slave 0 to S−1, and a master arbitration slice for each master 0 to M−1. Once it has determined that a slot is available for transferring the information from "m" to "s", the crossbar 23102 sends the information ("info_r1") to the slave "s", for example, via a pipe line latch 23114*b*. The crossbar 23102 also sends an acknowledgement back to the master "m" that the "eager" scheduling has succeeded, for example, via a pipe line latch 23110*b*.

Eager scheduling latency is shown in FIG. 3-5-6 which illustrates the cycles incurred in communicating between a master and a slave with the above-described eager scheduling protocol. A master sending a request ("req_r1") to the cross bar may take p1 cycles as shown at 23602. Arbitration by the crossbar may take A cycles, for example, as shown at 23604. The crossbar sending the information ("info_r1") to the slave may take p2 cycles. Thus, it takes a total of 1*(p1)+A+p2 cycles to send information or data from a master to a slave. Compared with the non-eager scheduling shown in FIG. 3-5-5, eager scheduling has reduced the latency by 2*p1 cycles. Eager scheduling protocol sends the information only after waiting the number of cycles the crossbar takes to arbitrate, for example, shown at 23606. Thus, the cycle time taken for sending the information (e.g., shown at 23606 and 23608) overlaps with the time the spent in transferring the request and the time spent by the crossbar in arbitrating (e.g., shown at 23602 and 23604).

FIG. 3-5-2 is a flow diagram illustrating a core or processor to crossbar scheduling in one embodiment of the present disclosure. At 23202, a master device, for example, a processor or a core, determines whether there is a new request to send to the cross bar switch. If there is no new request, the logic flow continues at 23206. If there is a new request, then at 23204, request is sent to the cross bar switch. The logic flow then continues to 23206.

At 23206, the master device checks whether a request to schedule information has been received from the cross bar switch. If there is no request to schedule information, the logic flows to 23210. If a request to schedule the information has been received, the master sends the information associated with this request to schedule to the cross bar switch at 23208. The logic flow then continues to 23210.

At 23210, it is determined whether a request was sent to the crossbar "arbitration delay" cycles before the current cycle. If so, at 23212, the master device "eagerly" sends the information or data associated with the request that was sent "arbitration delay" cycles before the current cycle. The logic then continues to 23202 where it is again determined whether there is a new request to send information to the cross bar switch.

At 23214, if no request was sent to the crossbar "arbitration delay" cycles before the current cycle, then the master device drives or sends to the cross bar switch the information associated with the latest request that was sent at least "arbitration cycles" before the current cycle. At 23216, the master device proceeds to the next cycle and the logic returns to continue at 23202.

The master continues to drive the information associated with the latest request sent at least "A" cycles before. So as long as no new requests are sent to the switch by that master, eager scheduling success is possible even in later cycles than the one indicated in FIG. 3-5-6.

As an implementation example, each of the slave arbitration slices may maintain M counters (counter 0 to counter M−1). Counter[m][s] signals the number of pending requests from master "m" to slave "s". When a master "m" sends a request to a slave "s", counter[m][s] is incremented by that slave. When a request to that master gets scheduled (eager or non eager), the counter gets decremented. Each of the master arbitration slices also maintains the identifier of the slave that is last sent by the master. When a request to a master "m" gets scheduled to slave s, the identifier of the slave that is last sent by that master is matched with "s". If there is a match, then eager scheduling is possible. Other implementations are possible to perform the eager scheduling described herein, and the present invention is not limited to one specific implementation.

FIG. 3-5-3 is a flow diagram illustrating functionality of the cross bar switch in one embodiment of the present disclosure. A cross bar switch may include an arbiter logic, e.g., shown in FIG. 3-5-1 at 23116, which makes decisions as to which master can talk to which slave. The cross bar switch may include an arbiter which performs distributed arbitration. For instance, there may be arbitration logic for each slave, for instance, a slave arbitration slice for each slave 0 to S−1. Similarly, there may be arbitration logic for each master, for instance, a master arbitration slice for each master 0 to M−1. FIG. 3-5-3 illustrates functions of an arbitration slice for one slave device, for example, slave s1.

At 23302, an arbiter, for example, a slave arbitration slice for s1 examines one or more requests from one or more masters to slave s1. At 23304, a master is selected. For instance, if there is more than one master desiring to talk to slave s1, the slave arbitration slice for s1 may use a predetermined protocol or rule to select one master. If there is only one master requesting to talk to this slave device, arbitrating for a master is not needed. Rather, that one master is selected. The predetermined protocol or rule may to use round robin priority selection method. Other protocols or rules may be employed for selecting a master from a plurality of masters.

At 23306, the slave arbitration slice sends the information that it selected a master, for example, master ml to the master arbitration slice responsible for master ml. At 23308, it is determined whether the selected master accepted the slave arbitration slice's decision. It may be that this master has received selections or other requests to talk from more than one slave. In such cases the master may not accept the slave arbitration slice's decision to talk to it. If the selected master does not accept, for example, for that reason or other reasons, the logic flow returns to 23302 where the slave arbitration slice examines more requests.

At 23308, if the selected master has accepted the slave arbitration slice's decision to talk to it, then the priority vector of may be updated to indicate that this master has been selected, for example, so that in the next selection process, this master does not get the highest priority of selection and another master may be selected.

Once the slot between the selected master and this slave has been made available or established for example according to the previous steps for communication, it is determined at 23310 whether the eager scheduling can succeed. That is, the slave arbitration slice determines whether the information or data is available from this master that it can send to the slave device. The information or data may be available at the cross bar switch, if the selected master has sent the information "eagerly" after waiting for an arbitration delay period even without an acknowledgment from the cross bar switch to send the information.

If at 23312, it is determined that the information can be sent to the slave, the information from the selected master is sent to the slave at 23314. The arbitration slice sends a notification to the master arbitration slice that the eager scheduling succeeded. The master arbitration slice then sends the eager scheduling success notice to the selected master. The logic returns to 23302 to continue to the next request.

If at 23312, it is determined that the information is not available to send to the slave currently, slave arbitration slice sends a notification or request to schedule the information or data to the master at 23316, for example, via the master's arbitration slice at the cross bar switch. The logic returns to 23302 to continue to the next request.

FIG. 3-5-4 illustrates functions of an arbitration slice for one master device in one embodiment of the present disclosure. As explained above, the cross bar switch may include an arbitration slice for each master device, for example, master 0 to master M−1 on an integrated chip. At 23402, an arbitration slice for a master device waits for slave arbitration slices to select a master. At 23404, the arbitration slice may use a predetermine protocol or rule such as a round robin selection protocol or others to select a slave among the slaves that have selected this master to communicate with. If only one slave has selected this master currently, the master arbitration slice need not arbitrate for a slave, rather the master arbitration slice may accept that slave.

At 23406, the master arbitration slice notifies the slave selected for communication. This establishes the communication or slot between the master and the slave. At 23408, a priority vector or the like may be updated to indicate that this slave has been selected, for example, so that this slave does not get the highest priority for selection in the next round of selections. Rather, other slaves a given a chance to communicate with this master in the next round.

Processing Unit

The complex consisting of A2, QPU and L1P is called processing unit (PU, see FIG. 3-0). Each PU connects to the central low latency, high bandwidth crossbar switch via a master port. The central crossbar routes requests and write data from the master ports to the slave ports and read return data back to the masters. The write data path of each master and slave port is 16B wide. The read data return port is 32B wide.

FIG. 2-1-1 is an overview of a memory management unit 1100 (MMU) utilized by in a multiprocessor system, such as IBM's BlueGene parallel computing system. Further details about the MMU 1100 are provided in IBM's "PowerPC RISC Microprocessor Family Programming Environments Manual v2.0" (hereinafter "PEM v2.0") published Jun. 10, 2003 which is incorporated by reference in its entirety. The MMU 1100 receives data access requests from the processor (not shown) through data accesses 1102 and receives instruction access requests from the processor (not shown) through instruction accesses 1104. The MMU 1100 maps effective memory addresses to physical memory addresses to facilitate retrieval of the data from the physical memory. The physical memory may include cache memory, such as L1 cache, L2 cache, or L3 cache if available, as well as external main memory, e.g., DDR3 SDRAM.

The MMU 1100 comprises an SLB 1106, an SLB search logic device 1108, a TLB 1110, a TLB search logic device 1112, an Address Space Register (ASR) 1114, an SDR1 1116, a block address translation (BAT) array 1118, and a data block address translation (DBAT) array 1120. The SDR1 1116 specifies the page table base address for virtual-to-physical address translation. Block address translation and data block address translation are one possible implementation for translating an effective address to a physical address and are discussed in further detail in PEM v2.0 and U.S. Pat. No. 5,907,866.

Another implementation for translating an effective address into a physical address is through the use of an on-chip SLB, such as SLB 1106, and an on-chip TLB, such as TLB 1110. Prior art SLBs and TLBs are discussed in U.S. Pat. No. 6,901,540 and U.S. Publication No. 20090019252, both of which are incorporated by reference in their entirety. In one embodiment, the SLB 1106 is coupled to the SLB search logic device 108 and the TLB 1110 is coupled to the TLB search logic device 1112. In one embodiment, the SLB 1106 and the SLB search logic device 108 function to translate an effective address (EA) into a virtual address. The function of the SLB is further discussed in U.S. Publication No. 20090019252. In the PowerPC™ reference architecture, a 64 bit effective address is translated into an 80 bit virtual address. In the A2 implementation, a 64 bit effective address is translated into an 88 bit virtual address.

In one embodiment of the A2 architecture, both the instruction cache and the data cache maintain separate "shadow" TLBs called ERATs (effective to real address translation tables). The ERATs contain only direct (IND=0) type entries. The instruction I-ERAT contains 16 entries, while the data D-ERAT contains 32 entries. These ERAT arrays minimize TLB 1110 contention between instruction fetch and data load/store operations. The instruction fetch and data access mechanisms only access the main unified TLB 1110 when a miss occurs in the respective ERAT. Hardware manages the replacement and invalidation of both the I-ERAT and D-ERAT; no system software action is required in MMU mode. In ERAT-only mode, an attempt to access an address for which no ERAT entry exists causes an Instruction (for fetches) or Data (for load/store accesses) TLB Miss exception.

The purpose of the ERAT arrays is to reduce the latency of the address translation operation, and to avoid contention for the TLB 1110 between instruction fetches and data accesses. The instruction ERAT (I-ERAT) contains sixteen entries, while the data ERAT (D-ERAT) contains thirty-two entries, and all entries are shared between the four A2 processing threads. There is no latency associated with accessing the ERAT arrays, and instruction execution continues in a pipelined fashion as long as the requested address is found in the ERAT. If the requested address is not found in the ERAT, the instruction fetch or data storage access is automatically stalled while the address is looked up in the TLB 1110. If the address is found in the TLB 1110, the penalty associated with the miss in the I-ERAT shadow array is 12 cycles, and the penalty associated with a miss in the D-ERAT shadow array is 19 cycles. If the address is also a miss in the TLB 1110, then an Instruction or Data TLB Miss exception is reported.

When operating in MMU mode, the on-demand replacement of entries in the ERATs is managed by hardware in a least-recently-used (LRU) fashion. Upon an ERAT miss which leads to a TLB 1110 hit, the hardware will automatically cast-out the oldest entry in the ERAT and replace it with the new translation. The TLB 1110 and the ERAT can both be used to translate an effective or virtual address to a physical address. The TLB 1110 and the ERAT may be generalized as "lookup tables".

The TLB 1110 and TLB search logic device 1112 function together to translate virtual addresses supplied from the SLB 1106 into physical addresses. A prior art TLB search logic device 1112 is shown in FIG. 2-1-3. A TLB search logic device 1112 according to one embodiment of the invention is shown in FIG. 2-1-4. The TLB search logic device 1112 facilitates the optimization of page entries in the TLB 1110 as discussed in further detail below.

Referring to FIG. 2-1-2, the TLB search logic device 1112 controls page identification and address translation, and contains page protection and storage attributes. The Valid (V), Effective Page Number (EPN), Translation Guest Space identifier (TGS), Translation Logical Partition identifier (TLPID), Translation Space identifier (TS), Translation ID (TID), and Page Size (SIZE) fields of a particular TLB entry identify the page associated with that TLB entry. In addition, the indirect (IND) bit of a TLB entry identifies it as a direct virtual to real translation entry (IND=0), or an indirect (IND=1) hardware page table pointer entry that requires additional processing. All comparisons using these fields should match to validate an entry for subsequent translation and access control processing. Failure to locate a matching TLB page entry based on the criteria for instruction fetches causes a TLB miss exception which results in issuance of an Instruction TLB error interrupt. Failure to locate a matching TLB page entry based on this criteria for data storage accesses causes a TLB miss exception which may result in issuance of a data TLB error interrupt, depending on the type of data storage access. Certain cache management instructions do not result in an interrupt if they cause an exception; these instructions may result in a no-op.

Page identification begins with the expansion of the effective address into a virtual address. The effective address is a 64-bit address calculated by a load, store, or cache management instruction, or as part of an instruction fetch. In one embodiment of a system employing the A2 processor, the virtual address is formed by prepending the effective address with a 1-bit 'guest space identifier', an 8-bit 'logical partition identifier', a 1-bit 'address space identifier' and a 14-bit'process identifier'. The resulting 88-bit value forms the virtual address, which is then compared to the virtual addresses contained in the TLB page table entries. For instruction fetches, cache management operations, and for non-external PID storage accesses, these parameters are obtained as follows. The guest space identifier is provided by Machine State Register MACHINE STATE REGISTER

[GS]. The logical partition identifier is provided by the Logical Partition ID (LPID) register. The process identifier is included in the Process ID (PID) register. The address space identifier is provided by MACHINE STATE REGISTER[IS] for instruction fetches, and by MACHINE STATE REGISTER[DS] for data storage accesses and cache management operations, including instruction cache management operations.

For external PID type load and store accesses, these parameters are obtained from the External PID Load Context (EPLC) or External PID Store Context (EPSC) registers. The guest space identifier is provided by EPL/SC[EGS] field. The logical partition identifier is provided by the EPL/SC[ELPID] field. The process identifier is provided by the EPL/SC[EPID] field, and the address space identifier is provided by EPL/SC [EAS].

The address space identifier bit differentiates between two distinct virtual address spaces, one generally associated with interrupt-handling and other system-level code and/or data, and the other generally associated with application-level code and/or data. Typically, user mode programs will run with MACHINE STATE REGISTER[IS,DS] both set to 1, allowing access to application-level code and data memory pages. Then, on an interrupt, MACHINE STATE REGISTER[IS, DS] are both automatically cleared to 0, so that the interrupt handler code and data areas may be accessed using system-level TLB entries (i.e., TLB entries with the TS field=0).

FIG. 2-1-2 is an overview of the translation of a 64 bit EA 1202 into an 80 bit VA 1210 as implemented in a system employing the PowerPC architecture. In one embodiment, the 64 bit EA 1202 comprises three individual segments: an 'effective segment ID' 1204, a 'page index' 1206, and a 'byte offset' 1208. The 'effective segment ID' 1204 is passed to the SLB search logic device 1108 which looks up a match in the SLB 1106 to produce a 52 bit virtual segment ID (VSID) 1212. The 'page index' 1206 and byte offset 1208 remain unchanged from the 64 bit EA 1202, and are passed through and appended to the 52 bit VSID 1212. In one embodiment, the 'page index' 1206 is 16 bits and the byte offset 1208 is 12 bits. The 'byte offset' 1208 is 12 bits and allows every byte within a page to be addressed. A 4 KB page requires a 12 bit page offset to address every byte within the page, i.e., $2^{12}$=4 KB. The VSID 1212 and the 'page index' 1206 are combined into a Virtual Page Number (VPN), which is used to select a particular page from a table entry within a TLB (TLB entries may be associated with more than one page). Thus, the VSID 1212 and the 'page index' 1206 is and the byte offset 208 are combined to form an 80 bit VA 1210. A virtual page number (VPN) is formed from the VSID 1212 and 'page index' 1206. In one embodiment of the PowerPC architecture, the VPN comprises 68 bits. The VPN is passed to the TLB search logic device 1112 which uses the VPN to look up a matching physical page number (RPN) 1214 in the TLB 1110. The RPN 1214 together with the 12 bit byte offset form a 64 bit physical address 1216.

FIG. 2-1-3 is a TLB logic device 1112 for matching a virtual address to a physical address. A match between a virtual address and the physical address is found by the TLB logic device 1112 when all of the inputs into 'AND' gate 1318 are true, i.e., all of the input bits are set to 1. Each virtual address that is supplied to the TLB 1110 is checked against every entry in the TLB 1110.

The TLB logic device 1112 comprises logic blocks 1302 and logic block 1329. Logic block 1300 comprises 'AND' gates 1303 and 1323, comparators 1306, 1309, 1310, 1315, 1317, 1318 and 1322, and 'OR' gates 1311 and 1319. 'AND' gate 1303 that receives input from TLBentry[ThdID(t)] (thread identifier) 1301 and 'thread t valid' 1302. TLBentry [ThdID(t)] 1301 identifies a hardware thread and in one implementation there are 4 thread ID bits per TLB entry. 'Thread t valid' 1304 indicates which thread is requesting a TLB lookup. The output of AND' gate 1303 is 1 when the input of 'thread t valid' 1302 is 1 and the value of 'thread identifier' is 1. 1301 The output of AND' gate 1303 is coupled to 'AND' gate 1323.

Comparator 1306 compares the values of inputs TLBentry [TGS] 1304 and 'GS' 1305. TLBentry[TGS] 1304 is a TLB guest state identifier and 'GS' 1305 is the current guest state of the processor. The output of comparator 1306 is only true, i.e., a bit value of 1, when both inputs are of equal value. The output of comparator 306 is coupled to 'AND' gate 1323.

Comparator 1309 determines if the value of the 'logical partition identifier' 1307 in the virtual address is equal to the value of the TLPID field 1308 of the TLB page entry. Comparator 1310 determines if the value of the TLPID field 1308 is equal to 0 (non-guest page). The outputs of comparators 1309 and 1310 are supplied to an 'OR' gate 1311. The output of 'OR' gate 1311 is supplied to 'AND' gate 1323. The 'AND' gate 1323 also directly receives an input from 'validity bit' TLBentry[V] 312. The output of 'AND' gate 1323 is only valid when the 'validity bit' 1312 is set to 1.

Comparator 1315 determines if the value of the 'address space' identifier 1314 is equal to the value of the 'TS' field 1313 of the TLB page entry. If the values match, then the output is 1. The output of the comparator 1315 is coupled to 'AND' gate 1323.

Comparator 1317 determines if the value of the 'Process ID' 1324 is equal to the 'TID' field 1316 of the TLB page entry indicating a private page, or comparator 1318 determines if the value of the TID field is 0, indicating a globally shared page. The output of comparators 1317 and 1318 are coupled to 'OR' gate 1319. The output of 'OR' gate 1319 is coupled to 'AND' gate 1323.

Comparator 1322 determines if the value in the 'effective page number' field 1320 is equal to the value stored in the 'EPN' field 13221 of the TLB page entry. The number of bits N in the 'effective page number' 1320 is calculated by subtracting $\log_2$ of the page size from the bit length of the address field. For example, if an address field is 64 bits long, and the page size is 4 KB, then the effective address field length is found according to equation 1:

$$EA=0 \text{ to } N-1, \text{ where } N=\text{Address Field Length}-\log_2(\text{page size}) \quad (1)$$

or by subtracting $\log_2(2^{12})$ or 12 from 64. Thus, only the first 52 bits, or bits 0 to 51 of the effective address are used in matching the 'effective address' 320 field to the 'EPN field' 1321. The output of comparator 1322 is coupled to 'AND' gate 1323.

Logic block 1329 comprises comparators 1326 and 1327 and 'OR' gate 1328. Comparator 1326 determines if the value of bits 'n:51' 1331 of the effective address (where n=64−$\log_2$(page size)) is greater than the value of bits n:51 of the 'EPN' field 1332 in the TLB entry. Normally, the LSB are not utilized in translating the EA to a physical address. When the value of bits n:51 of the effective address is greater than the value stored in the EPN field, the output of comparator 1326 is 1. Comparator 1327 determines if the TLB entry 'exclusion bit' 1330 is set to 1. If the 'exclusion bit' 1330 is set to 1, than the output of comparator 1327 is 1. The 'exclusion bit' 1330 functions as a signal to exclude a portion of the effective address range from the current TLB page. Applications or the operating system may then map subpages (pages smaller in size than the current page size) over the excluded region. In one example embodiment of an IBM BlueGene parallel computing system, the smallest page size is 4 KB and the largest page size is 1 GB. Other available page sizes within the IBM BlueGene parallel computing system include 64 KB, 16 MB, and 256 MB pages. As an example, a 64 KB page may have a 16 KB range excluded from the base of the page. In other implementations, the comparator may be used to excluded a memory range from the top of the page. In one embodiment, an application may map additional pages smaller in page size than the original page, i.e., smaller than 16 KB into the area defined by the excluded range. In the example above, up to four additional 4 KB pages may be mapped into the excluded 16 KB range. Note that in some embodiments, the entire area covered by the excluded range is not always available for overlapping additional pages. It is also understood that the combination of logic gates within the TLB search logic device 1112 may be replaced by any combination of gates that result in logically equivalent outcomes.

A page entry in the TLB 1110 is only matched to an EA when all of the inputs into the 'AND' gate 1323 are true, i.e., all the input bits are 1. Referring back to FIG. 2-1-2, the page table entry (PTE) 1212 matched to the EA by the TLB search logic device 1112 provides the physical address 1216 in memory where the data requested by the effective address is stored.

FIGS. 2-1-3 and 2-1-4 together illustrate how the TLB search logic device 1112 is used to optimize page entries in the TLB 1110. One of the limiting properties of prior art TLB search logic devices is that, for a given page size, the page start address must be aligned to the page size. This requires that larger pages are placed adjacent to another in a contiguous memory range or that the gaps between large pages are filled in with numerous smaller pages. This requires the use of more TLB page entries to define a large contiguous range of memory.

FIG. 2-1-4 is a table that provides which bits within a virtual address are used by the TLB search logic device 1112 to match the virtual address to a physical address and which 'exclusion range' bits are used to map a 'hole' or an exclusion range into an existing page. FIGS. 2-1-3 and 2-1-4 are based on the assumption that the processor core utilized is a PowerPC™ A2 core, the EA is 64 bits in length, and the smallest page size is 4 KB. Other processor cores may implement effective addresses of a different length and benefit from additional page sizes.

Referring now to FIG. -2-1-4, column 1402 of the table lists the available page sizes in the A2 core used in one implementation of the BlueGene parallel computing system. Column 1404 lists all the calculated values of $\log_2$ (page size). Column 1406 lists the number of bits, i.e. MSB, required by the TLB search logic device 1112 to match the virtual address to a physical address. Each entry in column 1406 is found by subtracting $\log_2$ (page size) from 64.

Column 1408 lists the 'effective page number' (EPN) bits associated with each page size. The values in column 1408 are based on the values calculated in column 1406. For example, the TLB search logic device 1112 requires all 52 bits (bits 0:51) of the EPN to look up the physical address of a 4 KB page in the TLB 1110. In contrast, the TLB search logic device 1112 requires only 34 bits (bits 0:33) of the EPN to look up the physical address of a 1 GB page in the TLB 1110. Recall that in one example embodiment, the EPN is formed by a total of 52 bits. Normally, all of the LSB (the bits after the EPN bits) are set to 0. Exclusion ranges may be carved out of large size pages in units of 4 KB, i.e., when TLBentry[X] bit 1330 is 1, the total memory excluded from the effective page is 4 KB*((value of Exclusion range bits 1440)+1). When the exclusion bit is set to 1 (X=1), even if the LSBs in the virtual page number are set to 0, a 4 KB page is still excluded from a large size page.

A 64 KB page only requires bits 0:47 within the EPN field to be set for the TLB search logic device 1112 to find a matching value in the TLB 1110. An exclusion range within the 64 KB page can be provided by setting LSBs 48:51 to any value except all '1's. Note that the only page size smaller than 64 KB is 4 KB. One or more 4 KB pages can be mapped by software into the excluded memory region covered by the 64 KB page when the TLBentry[X] (exclusion) bit is set to 1. When the TLB search logic device 1112 maps a virtual address to a physical address and the TLB exclusion bit is also set to 1, the TLB search logic device 1112 will return a physical address that maps to the 64 KB page outside the exclusion range. If the TLB exclusion bit is set to 0, the TLB search logic device 1112 will return a physical address that maps to the whole area of the 64 KB page.

An application or the operating system may access the non excluded region within a page when the 'exclusion bit' 1330 is set to 1. When this occurs, the TLB search logic device 1112 uses the MSB to map the virtual address to a physical address that corresponds to an area within the non excluded region of the page. When the 'exclusion bit' 1330 is set to 0, then the TLB search logic device 1112 uses the MSB to map the virtual address to a physical address that corresponds to a whole page.

In one embodiment of the invention, the size of the exclusion range is configurable to M×4 KB, where M=1 to (TLB entry page size in bytes/$2^{12}$)−1. The smallest possible exclusion range is 4 KB, and successively larger exclusion ranges are multiples of 4 KB. In another embodiment of the invention, such as in the A2 core, for simplicity, M is further restricted to $2^n$, where n=0 to $\log_2$(TLB entry page size)−13, i.e., the possible excluded ranges are 4 KB, 8 KB, 16 KB, up to (page size)/2. Additional TLB entries may be mapped into the exclusion range. Pages mapped into the exclusion range cannot overlap and pages mapped in the exclusion range must be collectively fully contained within the exclusion range. The pages mapped into the exclusion range are known as subpages.

Once a TLB page table entry has been deleted from the TLB 1110 by the operating system, the corresponding memory indicated by the TLB page table entry becomes available to store new or additional pages and subpages. TLB page table entries are generally deleted when their corresponding applications or processes are terminated by the operating system.

FIG. 2-1-5 is an example of how page table entries are created in a TLB 1110 in accordance with the prior art. For simplification purposes only, the example assumes that only two page sizes, 64 KB and 1 MB are allowable. Under the prior art, once a 64 KB page is created in a 1 MB page, only additional 64 KB page entries may be used to map the remaining virtual address in the 1 MB page until a contiguous 1 MB area of memory is filled. This requires a total of 16 page table entries, i.e., $\mathbf{1502}_1$, $\mathbf{1502}_2$ to $\mathbf{1502}_{16}$ in the TLB 1110.

FIG. 2-1-6 is an example of how page table entries are created in a TLB 1110 in accordance with the present invention. Different size pages may be used next to one another. For example, PTE 1602 is a 64 KB page table entry and PTE 604 is a 1 MB page table entry. In one embodiment, PTE 604 has a 64 KB 'exclusion range' 1603 excluded from the base corresponding to the area occupied by PTE 1602. The use of an exclusion range allows the 1 MB memory space to be covered by only 2 page table entries in the TLB 1110, whereas in FIG. 2-1-5 sixteen page table entries were required to cover the same range of memory. In one embodiment, when the 'exclusion bit' is set, the first 64 KB of the 1 MB page specified by PTE 1604 will not match the virtual address, i.e., this area is excluded. In other embodiments of the invention, the excluded range may begin at the top of the page.

Referring now to FIG. 2-1-7, there is shown the overall architecture of a multiprocessor compute node 1700 implemented in a parallel computing system in which the present invention may be implemented. In one embodiment, the multiprocessor system implements a BLUEGENE™ torus interconnection network, which is further described in the journal article 'Blue Gene/L torus interconnection network' N. R. Adiga, et al., IBM J. Res. & Dev. Vol. 49, 2005, the contents of which are incorporated by reference in its entirety. Although the BLUEGENE™/L torus architecture comprises a three-dimensional torus, it is understood that the present invention also functions in a five-dimensional torus, such as implemented in the BLUEGENE™/Q massively parallel computing system comprising compute node ASICs (BQC), each compute node including multiple processor cores.

In this embodiment, the compute node 1700 is a single chip ('nodechip') based on low power A2 PowerPC cores, though the architecture can use any low power cores, and may comprise one or more semiconductor chips. In the embodiment depicted, the node includes 16 PowerPC A2 cores running at 1600 MHz.

More particularly, the basic compute node 1700 of the massively parallel supercomputer architecture illustrated in FIG. 2-1-2 includes in one embodiment seventeen (16+1) symmetric multiprocessing (PPC) cores 1752, each core being 4-way hardware threaded and supporting transactional memory and thread level speculation, including a memory management unit (MMU) 1100 and Quad Floating Point Unit (FPU) 1753 on each core (204.8 GF peak node). In one implementation, the core operating frequency target is 1.6 GHz providing, for example, a 563 GB/s bisection bandwidth to shared L2 cache 1070 via a full crossbar switch 1060. In one embodiment, there is provided 32 MB of shared L2 cache 1070, each core having an associated 2 MB of L2 cache 1072. There is further provided external DDR SDRAM (i.e., Double Data Rate synchronous dynamic random access) memory 1780, as a lower level in the memory hierarchy in communication with the L2. In one embodiment, the node includes 42.6 GB/s DDR3 bandwidth (1.333 GHz DDR3) (2 channels each with chip kill protection).

Each MMU 1100 receives data accesses and instruction accesses from their associated processor cores 1752 and retrieves information requested by the core 1752 from memory such as the L1 cache 1755, L2 cache 1770, external DDR3 1780, etc.

Each FPU 1753 associated with a core 1752 has a 32B wide data path to the L1-cache 1755, allowing it to load or store 32B per cycle from or into the L1-cache 1755. Each core 1752 is directly connected to a prefetch unit (level-1 prefetch, L1P) 1758, which accepts, decodes and dispatches all requests sent out by the core 1752. The store interface from the core 1752 to the L1P 1755 is 32B wide and the load interface is 16B wide, both operating at the processor frequency. The L1P 1755 implements a fully associative, 32 entry prefetch buffer. Each entry can hold an L2 line of 328B size. The L1P provides two prefetching schemes for the prefetch unit 1758: a sequential prefetcher as used in previous BLUEGENE™ architecture generations, as well as a list prefetcher. The prefetch unit is further disclosed in U.S. patent application Ser. No. 11/767,717, which is incorporated by reference in its entirety.

As shown in FIG. 2-1-7, the 32 MB shared L2 is sliced into 16 units, each connecting to a slave port of the switch 1060. Every physical address is mapped to one slice using a selection of programmable address bits or a XOR-based hash across all address bits. The L2-cache slices, the L1Ps and the L1-D caches of the A2s are hardware-coherent. A group of 4 slices is connected via a ring to one of the two DDR3 SDRAM controllers 1778.

By implementing a direct memory access engine referred to herein as a Messaging Unit, 'MU' such as MU 1750, with each MU including a DMA engine and a Network Device 1750 in communication with the crossbar switch 1760, chip I/O functionality is provided. In one embodiment, the compute node further includes, in a non-limiting example: 10 intra-rack interprocessor links 1790, each operating at 2.0 GB/s, i.e., 10*2 GB/s intra-rack & inter-rack (e.g., configurable as a 5-D torus in one embodiment); and, one I/O link 1792 interfaced with the MU 1750 at 2.0 GB/s (2 GB/s I/O link (to I/O subsystem)) is additionally provided. The system node 1750 employs or is associated and interfaced with an 8-16 GB memory/node (not shown).

Although not shown, each A2 processor core 1752 has associated a quad-wide fused multiply-add SIMD floating point unit, producing 8 double precision operations per cycle, for a total of 328 floating point operations per cycle per compute node. A2 is a 4-way multi-threaded 64b PowerPC implementation. Each A2 processor core 1752 has its own execution unit (XU), instruction unit (IU), and quad floating point unit (QPU) connected via the AXU (Auxiliary eXecution Unit). The QPU is an implementation of the 4-way SIMD QPX floating point instruction set architecture. QPX is an extension of the scalar PowerPC floating point architecture. It defines 32 32B-wide floating point registers per thread instead of the traditional 32 scalar 8B-wide floating point registers.

FIG. 2-1-8 is an overview of the A2 processor core organization. The A2 core includes a concurrent-issue instruction fetch and decode unit with attached branch unit, together with a pipeline for complex integer, simple integer, and load/store operations. The A2 core also includes a memory management unit (MMU); separate instruction and data cache units; Pervasive and debug logic; and timer facilities.

The instruction unit of the A2 core fetches, decodes, and issues two instructions from different threads per cycle to any combination of the one execution pipeline and the AXU interface (see "Execution Unit" below, and Auxiliary Processor Unit (AXU) Port on page 49). The instruction unit includes a branch unit which provides dynamic branch prediction using a branch history table (BHT). This mechanism greatly improves the branch prediction accuracy and reduces the latency of taken branches, such that the target of a branch can usually be run immediately after the branch itself, with no penalty.

The A2 core contains a single execution pipeline. The pipeline consists of seven stages and can access the five-ported (three read, two write) GPR file. The pipeline handles all arithmetic, logical, branch, and system management instructions (such as interrupt and TLB management, move to/from system registers, and so on) as well as arithmetic, logical operations and all loads, stores and cache management operations. The pipelined multiply unit can perform 32-bit×32-bit multiply operations with single-cycle throughput and single-cycle latency. The width of the divider is 64 bits. Divide instructions dealing with 64 bit operands recirculate for 65 cycles, and operations with 32 bit operands recirculate for 32 cycles. No divide instructions are pipelined, they all require some recirculation. All misaligned operations are handled in hardware, with no penalty on any operation which is contained within an aligned 32-byte region. The load/store pipeline supports all operations to both big endian and little endian data regions.

The A2 core provides separate instruction and data cache controllers and arrays, which allow concurrent access and minimize pipeline stalls. The storage capacity of the cache arrays 16 KB each. Both cache controllers have 64-byte lines, with 4-way set-associativity I-cache and 8-way set-associativity D-cache. Both caches support parity checking on the tags and data in the memory arrays, to protect against soft errors. If a parity error is detected, the CPU will force a L1 miss and reload from the system bus. The A2 core can be configured to cause a machine check exception on a D-cache parity error. The PowerISA instruction set provides a rich set of cache management instructions for software-enforced coherency.

The ICC delivers up to four instructions per cycle to the instruction unit of the A2 core. The ICC also handles the execution of the PowerISA instruction cache management instructions for coherency.

The DCC handles all load and store data accesses, as well as the PowerISA data cache management instructions. All misaligned accesses are handled in hardware, with cacheable load accesses that are contained within a double quadword (32 bytes) being handled as a single request and with cacheable store or caching inhibited loads or store accesses that are contained within a quadword (16 bytes) being handled as a single request. Load and store accesses which cross these boundaries are broken into separate byte accesses by the hardware by the micro-code engine. When in 32 Byte store mode, all misaligned store or load accesses contained within a double quadword (32 bytes) are handled as a single request. This includes cacheable and caching inhibited stores and loads. The DCC interfaces to the AXU port to provide direct load/store access to the data cache for AXU load and store operations. Such AXU load and store instructions can access up to 32 bytes (a double quadword) in a single cycle for cacheable accesses and can access up to 16 bytes (a quadword) in a single cycle for caching inhibited accesses. The data cache always operates in a write-through manner. The DCC also supports cache line locking and "transient" data via way locking. The DCC provides for up to eight outstanding load misses, and the DCC can continue servicing subsequent load and store hits in an out-of-order fashion. Store-gathering is not performed within the A2 core.

The A2 Core supports a flat, 42-bit (4 TB) real (physical) address space. This 42-bit real address is generated by the MMU, as part of the translation process from the 64-bit effective address, which is calculated by the processor core as an instruction fetch or load/store address. Note: In 32-bit mode, the A2 core forces bits 0:31 of the calculated 64-bit effective address to zeroes. Therefore, to have a translation hit in 32-bit mode, software needs to set the effective address upper bits to zero in the ERATs and TLB. The MMU provides address translation, access protection, and storage attribute control for embedded applications. The MMU supports demand paged virtual memory and other management schemes that require precise control of logical to physical address mapping and flexible memory protection. Working with appropriate system level software, the MMU provides the following functions:

- Translation of the 88-bit virtual address 1-bit "guest state" (GS), 8-bit logical partition ID (LPID), 1-bit "address space" identifier (AS), 14-bit Process ID (PID), and 64-bit effective address) into the 42-bit real address (note the 1-bit "indirect entry" IND bit is not considered part of the virtual address)
- Page level read, write, and execute access control
- Storage attributes for cache policy, byte order (endianness), and speculative memory access
- Software control of page replacement strategy The translation lookaside buffer (TLB) is the primary hardware resource involved in the control of translation, protection, and storage attributes. It consists of 512 entries, each specifying the various attributes of a given page of the address space. The TLB is 4-way set associative. The TLB entries may be of type direct (IND=0), in which case the virtual address is translated immediately by a matching entry, or of type indirect (IND=1), in which case the hardware page table walker is invoked to fetch and install an entry from the hardware page table.

The TLB tag and data memory arrays are parity protected against soft errors; if a parity error is detected during an address translation, the TLB and ERAT caches treat the parity error like a miss and proceed to either reload the entry with correct parity (in the case of an ERAT miss, TLB hit) and set the parity error bit in the appropriate FIR register, or generate a TLB exception where software can take appropriate action (in the case of a TLB miss).

An operating system may choose to implement hardware page tables in memory that contain virtual to logical translation page table entries (PTEs) per Category E.PT. These PTEs are loaded into the TLB by the hardware page table walker logic after the logical address is converted to a real address via the LRAT per Category E.HV.LRAT. Software must install indirect (IND=1) type TLB entries for each page table that is to be traversed by the hardware walker. Alternately, software can manage the establishment and replacement of TLB entries by simply not using indirect entries (i.e. by using only direct IND=0 entries). This gives system software significant flexibility in implementing a custom page replacement strategy. For example, to reduce TLB thrashing or translation delays, software can reserve several TLB entries for globally accessible static mappings. The instruction set provides several instructions for managing TLB entries. These instructions are privileged and the processor must be in supervisor state in order for these instructions to be run.

The first step in the address translation process is to expand the effective address into a virtual address. This is done by taking the 64-bit effective address and prepending to it a 1-bit "guest state" (GS) identifier, an 8-bit logical partition ID (LPID), a 1-bit "address space" identifier (AS), and the 14-bit Process identifier (PID). The 1-bit "indirect entry" (IND) identifier is not considered part of the virtual address. The LPID value is provided by the LPIDR register, and the PID value is provided by the PID register.

The GS and AS identifiers are provided by the Machine State Register which contains separate bits for the instruction fetch address space (MACHINE STATE REGISTER[S]) and the data access address space (MACHINE STATE REGISTER[DS]). Together, the 64-bit effective address, and the other identifiers, form an 88-bit virtual address. This 88-bit virtual address is then translated into the 42-bit real address using the TLB.

The MMU divides the address space (whether effective, virtual, or real) into pages. Five direct (IND=0) page sizes (4 KB, 64 KB, 1 MB, 16 MB, 1 GB) are simultaneously supported, such that at any given time the TLB can contain entries for any combination of page sizes. The MMU also supports two indirect (IND=1) page sizes (1 MB and 256 MB) with associated sub-page sizes. In order for an address translation to occur, a valid direct entry for the page containing the virtual address must be in the TLB. An attempt to access an address for which no TLB direct exists results in a search for an indirect TLB entry to be used by the hardware page table walker. If neither a direct or indirect entry exists, an Instruction (for fetches) or Data (for load/store accesses) TLB Miss exception occurs.

To improve performance, both the instruction cache and the data cache maintain separate "shadow" TLBs called ERATs. The ERATs contain only direct (IND=0) type entries. The instruction I-ERAT contains 16 entries, while the data D-ERAT contains 32 entries. These ERAT arrays minimize TLB contention between instruction fetch and data load/store operations. The instruction fetch and data access mechanisms only access the main unified TLB when a miss occurs in the respective ERAT. Hardware manages the replacement and invalidation of both the I-ERAT and D-ERAT; no system software action is required in MMU mode. In ERAT-only mode, an attempt to access an address for which no ERAT entry exists causes an Instruction (for fetches) or Data (for load/store accesses) TLB Miss exception.

Each TLB entry provides separate user state and supervisor state read, write, and execute permission controls for the memory page associated with the entry. If software attempts to access a page for which it does not have the necessary permission, an Instruction (for fetches) or Data (for load/store accesses) Storage exception will occur.

Each TLB entry also provides a collection of storage attributes for the associated page. These attributes control cache policy (such as cachability and write-through as opposed to copy-back behavior), byte order (big endian as opposed to little endian), and enabling of speculative access for the page. In addition, a set of four, user-definable storage attributes are provided. These attributes can be used to control various system level behaviors.

L2 Cache

The 32 MB shared L2 (FIG. 4-0) is sliced into 16 units, each connecting to a slave port of the switch. Every physical address is mapped to one slice using a selection of programmable address bits or a XOR-based hash across all address bits. The L2-cache slices, the L1Ps and the L1-D caches of the A2s are hardware-coherent. A group of 4 slices is connected via a ring to one of the two DDR3 SDRAM controllers. Each of the four rings is 16B wide and clocked at half processor frequency. The SDRAM controllers drive each a 16B wide SDRAM port at 1333 or 1600 Mb/s/pin. The SDRAM interface uses an ECC across 64B with chip-kill correct capability as will be explained in greater detail herein below. Both the chip-kill capability and direct soldered DRAMs and enhanced error correction codes, are used to achieve ultra reliability targets.

The BGQ Compute ASIC incorporates support for thread-level speculative execution (TLS). This support utilizes the L2 cache to handle multiple versions of data and detect memory reference patterns from any core that violates sequential consistency. The L2 cache design tracks all loads to cache a cache line and checks all stores against these loads. This BGQ compute ASIC has up to 32 MB of speculative execution state storage in L2 cache. The design supports for the following speculative execution mechanisms. If a core is idle and the system is running in a speculative mode, the target design provides a low latency mechanism for the idle core to obtain a speculative work item and to cancel that work and invalidate its internal state and obtain another available speculative work item if sequential consistency is violated. Invalidating internal state is extremely efficient: updating a bit in a table that indicates that the thread ID is now in the "Invalid" state. Threads can have one of four states: Primary non-speculative; Speculative, valid and in progress; Speculative, pending completion of older dependencies before committing; and Invalid, failed.

In one embodiment, there is allowed out of order issuance of store instructions and process the store instructions in a parallel computing system without using an msync instruction as is done in the art.

FIG. 4-1-1 illustrates a computing node 3150 of a parallel computing system (e.g., IBM® Blue Gene® L/P/Q, etc.) in one embodiment. The computing node 3150 includes, but is not limited to: a plurality of processor cores (e.g., a processor core 3100), a plurality of local cache memory devices (e.g., L1 (Level 1) cache memory device 3105) associated with the processor cores, a plurality of first request queues (not shown) located at output ports of the processor cores, a plurality of second request queues (e.g., FIFOs (First In First Out queues) 3110 and 3115) associated with the local cache memory devices, a plurality of shared cache memory devices (e.g., L2 (Level 2) cache memory device 3130), a plurality of third request queues (e.g., FIFOs 3120 and 3125) associated with the shared cache memory devices, a messaging unit (MU) 3220 that includes DMA capability, at least one fourth request queue (e.g., FIFO 3140) associated with the messaging unit 3220, and a switch 3145 connecting the FIFOs. A processor core may be a single processor unit such as IBM® PowerPC® or Intel® Pentium. There may be at least one local cache memory device per a processor core. In a further embodiment, a processor core may include at least one local cache memory device. A request queue includes load instructions (i.e., instructions for loading a content of a memory location to a register) and store instructions and other requests (e.g., prefetch request). A request queue may be implemented as an FIFO (First In First Out) queue. Alternatively, a request queue is implemented as a memory buffer operating (i.e., inputting and outputting) out-of-order (i.e., operating regardless of an order). In a further embodiment, a local cache memory device (e.g., L1 cache memory device 3105) includes at least two second request queues (e.g., FIFOs 3110 and 3115). An FIFO (First In First Out) is a storage device that holds requests (e.g., load instructions and/store instructions) and coherence management operation (e.g., an operation for invalidating speculative and/or invalid data stored in a local cache memory device associated with that FIFO). A shared cache memory device may include third request queues (e.g., FIFOs 3120 and 3125). In a further embodiment, the messaging unit (MU) 3220 is a processing core that does not include a local cache memory device. The messaging unit 3220 is described in detail below in conjunction with FIGS. 4-1-2-4-1-3. In one embodiment, the switch 3145 implemented as a crossbar switch. The switch may be implemented as an optical and reconfigurable crossbar switch. In one embodiment, the switch is unbuffered, i.e., the switch cannot store requests (e.g., load and store instructions) or invalidations (i.e., operations or instructions for invalidating of requests or data) but transfer these requests and invalidations in a predetermined amount of cycles between processor cores. In an alternative embodiment, the switch 3145 includes at least one internal buffer that may hold the requests and coherence management operations (e.g., an operation invalidating a request and/or data). The buffered switch 3145 can hold the requests and operations for a period time (e.g., 1,000 clock cycles) even without a limit of how long the switch 3145 can hold the requests and operations.

In FIG. 4-1-1, an arrow labeled Ld/St (Load/Store) (e.g., an arrow 3155) is a request from a processor core to the at least one shared cache memory device (e.g., L2 cache memory device 3130). The request includes, but is not limited to: a load instruction, a store instruction, a prefetch request, an atomic update (e.g., an operation for updating registers), cache line locking, etc. An arrow labeled Inv (e.g., an arrow 3160) is a coherence management operation that invalidates data in the at least one local cache memory device (e.g., L1 cache memory device 3105). The coherence management operation includes, but is not limited to: an ownership notification (i.e., a notification claiming an ownership of a datum held in the at least one local cache memory device), a flush request (i.e., a request draining a queue), etc.

FIG. 4-1-4 illustrates a flow chart describing method steps for processing at least one store instruction in one embodiment. The computing node 3150 allows out-of-order issuances of store instructions by processing cores and/or guarantees in-order processing the issued store instructions, e.g., by running method steps 3400-3430 in FIG. 4-1-4. At step 3400, a processor core of a computing node issues a store instruction. At step 3410, the processor core updates the shared cache memory device 3215 according to the issued store instruction. For example, the processor core overwrites data in a certain cache line of the shared cache memory device 3215 which corresponds to a memory address or location included in the store instruction. At step 3420, processor core sets a flag bit on data in the shared cache memory device 3215 updated by the store instruction. In this embodiment, the flag bit indicates whether corresponding data is valid or not. In a further embodiment, a position of flag bit in data is predetermined. At step 3430, the MU 3220 looks at the flag bit based on a memory location or address specified in the store instruction, validates the updated data if determined that the flag bit on the updated data is set, and sends the updated data to other processor cores or other computing nodes that the MU does not belong to. In one embodiment, the MU 3220 monitors load instructions and store instructions issued by processor cores, e.g., by accessing an instruction queue.

In one embodiment, a processor core issued the store instruction is a producer (i.e., a component producing or generating data). That processor core hands off the produced or generated data to, e.g., a register in, the MU 3220 (FIGS. 4-1-1-4-1-3) which is another processor core having no local cache memory device. Thus, in this embodiment, the MU 3220 is a consumer (i.e., a component receiving data from the producer).

In one embodiment, other processor cores access the updated data upon seeing the flag bit set, e.g., by accessing the updated data by using a load instruction specifying a memory location of the updated data. The store instruction may be a guarded store instruction or an unguarded store instruction. The guarded store instruction is not processed speculatively and/or run when its operation is guaranteed safe. The unguarded store instruction is processed speculatively and/or assumes no side effect (e.g., speculatively overwriting data in a memory location does not affect a true output) in accessing the shared cache memory device 3215. The parallel computing system run the method steps 3400-3430 without an assistance of a synchronization instruction (e.g., mysnc instruction).

FIG. 4-1-5 illustrates a flow chart for processing at least one store instruction in a parallel computing system in one embodiment. The parallel computing system may include a plurality of computing nodes. A computing node may include a plurality of processor cores and at least one shared cache memory device. The computing node allows out-of-order issuances of store instructions by processing cores and/or guarantees in-order processing of the issued store instructions, e.g., by running method steps 3500-3550 in FIG. 4-1-5. A first processor core (e.g., a processor core 3100 in FIGS. 4-1-1-4-1-2) may include at least one local cache memory device. At step 3500, a processor core issues a store instruction. At step 3510, a first request queue associated with the processor core receives and stores the issued store instruction. In one embodiment, the first request queue is located at an output port of the first processor core. At step 3520, a second request queue, associated with at least one local cache memory device of the first processor core, receives and stores the issued store instruction from the first processor core. In one embodiment, the second request queue is an internal queue or buffer of the at least one local cache memory device 3105. The first processor core updates data in its local cache memory device 3105 (i.e., the at least one local cache memory device of the first processor core) according to the store instruction. At step 3530, a third request queue, associated with the shared cache memory device, receives and stores the store instruction from the first processor core, the first request queue or the second request queue. In one embodiment, the third request queue is an internal queue or buffer of the shared cache memory device 3215.

At step 3540 in FIG. 4-1-5, the first processor core invalidates data, e.g., by unsetting a valid bit associated with that data, in the shared cache memory device 3215 associated with the store instruction. The first processor core may also invalidate data, e.g., by unsetting a valid bit associated with that data, in other local cache memory device(s) of other processor core(s) associated with the store instruction. At step 3550, the first processor core flushes the first request queue. The first processor does not flush other request queues. Thus, the parallel computing system allows the other request queues (i.e., request queues not flushed) to hold invalid requests (e.g., invalid store or load instruction). In this embodiment described in FIG. 4-1-5, the processor cores and MU 3220 do not use a synchronization instruction (e.g., msync instruction issued by a processor core) to process store instructions. The synchronization instruction may flush all the queues.

In a further embodiment, a fourth request queue, associated with the MU 3220, also receives and stores the issued store instruction. The first processor may not flush this fourth request queue when flushing the first request queue. The synchronization instruction issued by a processor core may flush this fourth request queue when flushing all other request queues.

In a further embodiment, the first, second, third and forth request queues concurrently receive the issued store instruction from the first processor core. Alternatively, the first, second, third and fourth request queues receive the issued store instruction in a sequential order.

In a further embodiment, some of the method steps described in FIG. 4-1-5 runs concurrently. The method steps described in FIG. 4-1-5 does not need to run sequentially as depicted in FIG. 4-1-5.

In one embodiment, the method steps in FIGS. 4-1-4 and 4-1-5 are implemented in hardware or reconfigurable hardware, e.g., FPGA (Field Programmable Gate Array) or CPLD (Complex Programmable Logic Device), using a hardware description language (Verilog, VHDL, Handel-C, or System C). In another embodiment, the method steps in FIGS. 4-1-4 and 4-1-5 are implemented in a semiconductor chip, e.g., ASIC (Application-Specific Integrated Circuit), using a semi-custom design methodology, i.e., designing a chip using standard cells and a hardware description language. Thus, the hardware, reconfigurable hardware or the semiconductor chip operates the method steps described in FIGS. 4-1-4 and 4-1-5.

Generally, in field of synchronizing memory accesses in a multi-processor, parallel computing system parallel computing, application programs are split into "threads" that can run "speculatively" in parallel. The terms "speculative," "speculatively," "execution" and "speculative execution" as used herein are terms of art that do not imply mental steps or manual operation. Instead, they refer to computer processors running segments of code automatically. Some segments of code are known as "threads." If the execution of code is "speculative," this means that the thread is run in the computer as a sort of gamble. The gamble is that any given thread will be able to do something meaningful without altering data after some other thread altering the same data in a way that would make results from the given thread invalid. All of the operations are undertaken within the hardware on an automated basis.

There is further provided an instruction set and supporting hardware for a multiprocessor system that support speculative execution by improving synchronization of memory accesses.

Advantageously, a multiprocessor system will include a special msync unit for supporting memory synchronization requests. This unit will have a mechanism for keeping track of generations of requests and for delaying requests that exceed a maximum count of generations in flight.

Advantageously, also various different levels or methods of memory synchronization will be supported responsive to the msync unit.

The following description mentions a number of instruction and function names such as "msync," "hwsync," "lwsync," and "eieio;" "TLBsync," "Mbar," "full sync," "non-cumulative barrier," "producer sync," "generation change sync," "producer generation change sync," "consumer sync," and "local barrier," These names are arbitrary and for convenience of understanding. An instruction might equally well be given any name as a matter of preference without altering the nature of the instruction or without taking the instruction or the hardware supporting it outside of the scope of the claims.

Generally implementing an instruction will involve creating specific computer hardware that will cause the instruction to run when computer code requests that instruction. The field of Application Specific Integrated Circuits ("ASIC"s) is a well-developed field that allows implementation of computer functions responsive to a formal specification. Accordingly, no specific implementation will be discussed here. Instead the functions of instructions and units will be discussed.

As described herein, the use of the letter "B" represents a Byte quantity, e.g., 2B, 8.0B, 32B, and 64B represent Byte units. Recitations "GB" represent Gigabyte quantities. Throughout this disclosure a particular embodiment of a multi-processor system will be discussed. This embodiment includes various numerical values for numbers of components, bandwidths of interfaces, memory sizes and the like. These numerical values are not intended to be limiting, but only examples. One of ordinary skill in the art might devise other examples as a matter of design choice.

FIG. 1-0 shows an overall architecture of a multiprocessor computing node 50, a parallel computing system in which the present invention may be implemented. While this example is given as the environment in which the invention of the present application was developed, the invention is not restricted to this environment and might be ported to other environments by the skilled artisan as a matter of design choice.

The compute node 50 is a single chip ("nodechip") is based on low power A2 PowerPC cores, though any compatible core might be used. While the commercial embodiment is built around the PowerPC architecture, the invention is not limited to that architecture. In the embodiment depicted, the node includes 17 cores 52, each core being 4-way hardware threaded. There is a shared L2 cache 70 accessible via a full crossbar switch 60, the L2 including 16 slices 72. There is further provided external memory 80, in communication with the L2 via DDR-3 controllers 78—DDR being an acronym for Double Data Rate.

A messaging unit ("MU") 100 includes a direct memory access ("DMA") engine, a network interface 150, a Peripheral Component Interconnect Express ("PCIe") unit. The MU is coupled to interprocessor links 90 and i/o link 92.

Each FPU 53 associated with a core 52 has a data path to the L1-data cache 55. Each core 52 is directly connected to a supplementary processing agglomeration 58, which includes a private prefetch unit. For convenience, this agglomeration 58 will be referred to herein as "UP"—meaning level 1 prefetch—or "prefetch unit;" but many additional functions are lumped together in this so-called prefetch unit, such as write combining. These additional functions could be illustrated as separate modules, but as a matter of drawing and nomenclature convenience the additional functions and the prefetch unit will be illustrated herein as being part of the agglomeration labeled "UP." This is a matter of drawing organization, not of substance. Some of the additional processing power of this L1P group is shown in FIGS. 4-2-9 and 4-2-15. The L1P group also accepts, decodes and dispatches all requests sent out by the core 52.

In this embodiment, the L2 Cache units provide the bulk of the memory system caching. Main memory may be accessed through two on-chip DDR-3 SDRAM memory controllers 78, each of which services eight L2 slices.

To reduce main memory accesses, the L2 advantageously serves as the point of coherence for all processors within a nodechip. This function includes generating L1 invalidations when necessary. Because the L2 cache is inclusive of the L1s, it can remember which processors could possibly have a valid copy of every line, and can multicast selective invalidations to such processors. In the current embodiment the prefetch units and data caches can be considered part of a memory access pathway.

FIG. 4-2-2 shows features of the control portion of an L2 slice. Broadly, this unit includes coherence tracking at 30301, a request queue at 30302, a write data buffer at 30303, a read return buffer at 30304, a directory pipe 30308, EDRAM pipes 30305, a reservation table 30306, and a DRAM controller. The functions of these elements are explained in more detail in US provisional patent application Ser. No. 61/299,911 filed Jan. 29, 2010, which is incorporated herein by reference.

The units 30301 and 30302 have outputs relevant to memory synchronization, as will be discussed further below with reference to FIG. 4-2-5B.

FIG. 4-2-3A shows a simple example of a producer thread α and a consumer thread β. In this example, α seeks to do a double word write 31701. After the write is finished, it sets a 1 bit flag 31702, also known as a guard location. In parallel, β reads the flag 31703. If the flag is zero, it keeps reading 31704. If the flag is not zero, it again reads the flag 31705. If the flag is one, it reads data written by α.

FIG. 4-2-4 shows conceptually where delays in the system can cause problems with this exchange. Thread α is running on a first core/L1 group 31804. Thread β is running on a second core/L1 group 31805. Both of these groups will have a copy of the data and flag relating to the thread in their L1D caches. When a does the data write, it queues a memory access request at 31806, which passes through the crossbar switch 31803 and is hashed to a first slice 31801 of the L2, where it is also queued at 31808 and eventually stored.

The L2, as point of coherence, detects that the copy of the data resident in the L1D for thread β is invalid. Slice 31801 therefore queues an invalidation signal to the queue 31089 and then, via the crossbar switch, to the queue 31807 of core/L1 group 310805.

When α writes the flag, this again passes through queue 31806 to the crossbar switch 31803, but this time the write is hashed to the queue 31810 of a second slice 31802 of the L2. This flag is then stored in the slice and queued at 31811 to go to through the crossbar 31803 to queue 31807 and then to the core/L1 group 31805. In parallel, thread β, is repeatedly scanning the flag in its own L1D.

Traditionally, multiprocessor systems have used consistency models called "sequential consistency" or "strong consistency". Pursuant to this type of model, if unit 31804 first writes data and then writes the flag, this implies that if the flag has changed, then the data has also changed. It is not possible for the flag to be changed before the data. The data change must be visible to the other threads before the flag changes. This sequential model has the disadvantage that threads are kept waiting, sometimes unnecessarily, slowing processing.

To speed processing, PowerPC architecture uses a "weakly consistent" memory model. In that model, there is no guarantee whatsoever what memory access request will first result in a change visible to all threads. It is possible that β will see the flag changing, and still not have received the invalidation message from slice 31801, so β may still have old data in its L1D.

To prevent this unfortunate result, the PowerPC programmer can insert msync instructions 31708 and 31709 as shown in FIG. 4-2-3B. This will force a full sync, or strong consistency, on these two threads, with respect to this particular data exchange. In PowerPC architecture, if a core executes an msync, it means that all the writes that have happened before the msync are visible to all the other cores before any of the memory operations that happened after the msync will be seen. In other words, at the point of time when the msync completes, all the threads will see the new write data. Then the flag change is allowed to happen. In other words, until the invalidation goes back to group 31805, the flag cannot be set.

In accordance with the embodiment disclosed herein, to support concurrent memory synchronization instructions, requests are tagged with a global "generation" number. The generation number is provided by a central generation counter. A core executing a memory synchronization requests the central unit to increment the generation counter and then waits until all memory operations of the previously current generation and all earlier generations have completed.

A core's memory synchronization request is complete when all requests that were in flight when the request began have completed. In order to determine this, the L1P monitors a reclaim pointer that will be discussed further below. Once it sees the reclaim pointer moving past the generation that was active at the point of the start of the memory synchronization request, then the memory synchronization request is complete.

FIG. 4-2-5A shows a view of the memory synchronization central unit. In the current embodiment, the memory synchronization generation counter unit 30905 is a discrete unit placed relatively centrally in the chip 50, close to the crossbar switch 60. It has a central location as it needs short distances to a lot of units. L1P units request generation increments, indicate generations in flight, and receive indications of generations completed. The L2's provide indications of generations in flight. The OR-tree 30322 receives indications of generations in flight from all units queuing memory access requests, Tree 30322 is a distributed structure. Its parts are scattered across the entire chip, coupled with the units that are queuing the memory access requests. The components of the OR reduce tree are a few OR gates at every fork of the tree. These gates are not inside any unit. Another view of the OR reduce tree is discussed with respect to FIG. 4-2-5, below.

A number of units within the nodechip queue memory access requests, these include:

L1P
L2
DMA
PCIe

Every such unit can contain some aspect of a memory access request in flight that might be impacted by a memory synchronization request. FIG. 4-2-5B shows an abstracted view of one of these units at 31201, a generic unit that issues or processes memory requests via a queue. Each such unit includes a queue 31202 for receiving and storing memory requests. Each position in the queue includes bits 31203 for storing a tag that is a three bit generation number. Each of the sets of three bits is coupled to a three-to-eight binary decoder 31204. The outputs of the binary decoders are OR-ed bitwise at 31205 to yield the eight bit output vector 31206, which then feeds the OR-reduce tree of FIG. 4-2-5. A clear bit in the output vector means that no request associated with that generation is in flight. Core queues are flushed prior to the start of the memory synchronization request and therefore do not need to be tagged with generations. The L1D need not queue requests and therefore may not need to have the unit of FIG. 4-2-5B.

The global OR tree 30502 per FIG. 4-2-5 receives—from all units 30501 issuing and queuing memory requests—an eight bit wide vector 30504, per FIG. 4-2-5BB at 31206. Each bit of the vector indicates for one of the eight generations whether this unit is currently holding any request associated with that generation. The numbers 3, 2, and 2 in units 30501 indicate that a particular generation number is in flight in the respective unit. This generation number is shown as a bit within vectors 30502. While the present embodiment has 8 bit vectors, more or less bits might be used by the designer as needed for particular applications. FIG. 4-2-5 actually shows these vectors as having more than eight bits, based on the ellipsis and trailing zeroes. This is an alternative embodiment. The Global OR tree reduces each bit of the vector individually, creating one resulting eight bit wide vector 30503, each bit of which indicates if any request of the associated generation is in flight anywhere in the node. This result is sent to the global generation counter 30905 and thence broadcasted to all core units 52, as shown in FIG. 4-2-5 and also at 30604 of FIG. 4-2-6. FIG. 4-2-5 is a simplified figure. The actual OR gates are not shown and there would, in the preferred embodiment, be many more than three units contributing to the OR reduce tree.

Because the memory subsystem has paths—especially the crossbar—through which requests pass without contributing to the global OR reduce tree of FIG. 4-2-5, the memory synchronization exit condition is a bit more involved. All such paths have a limited, fixed delay after which requests are handed over to a unit 30501 that contributes to the global OR. Compensating for such delays can be done in several alternative ways. For instance, if the crossbar has a delay of six cycles, the central unit can wait six cycles after disappearance of a bit from the OR reduce tree, before concluding that the generation is no longer in flight. Alternatively, the L1P might keep the bit for that generation turned on during the anticipated delay.

Memory access requests tagged with a generation number may be of many types, including:

A store request; including compound operations and "atomic" operations such as store-add requests A load request, including compound and "atomic" operations such as load-and-increment requests An L1 data cache ("L1D") cache invalidate request created in response to any request above An Instruction Cache Block Invalidate instruction from a core 52 ("ICBI", a PowerPC instruction);

An L1 Instruction Cache ("L1I") cache invalidate request created in response to a ICBI request A Data Cache Block Invalidate instruction from a core 52 ("DCBI", a PowerPC instruction);

An L1I cache invalidate request created in response to a DCBI request

Memory Synchronization Unit

The memory synchronization unit 30905 shown in FIG. 4-2-6 allows grouping of memory accesses into generations and enables ordering by providing feedback when a generation of accesses has completed. The following functions are implemented in FIG. 4-2-6:

A 3 bit counter 30601 that defines the current generation for memory accesses;

A 3 bit reclaim pointer 30602 that points to the oldest generation in flight;

Privileged DCR access 30603 to all registers defining the current status of the generation counter unit. The DCR bus is a maintenance bus that allows the cores to monitor status of other units. In the current embodiment, the cores do not access the broadcast bus 604. Instead they monitor the counter 30601 and the pointer 30602 via the DCR bus;

A broadcast interface 30604 that provides the value of the current generation counter and the reclaim pointer to all memory request generating units. This allows threads to tag all memory accesses with a current generation, whether or not a memory synchronization instruction appears in the code of that thread;

A request interface 30605 for all synchronization operation requesting units;

A track and control unit 30606, for controlling increments to 30601 and 30602.

In the current embodiment, the generation counter is used to determine whether a requested generation change is complete, while the reclaim pointer is used to infer what generation has completed.

The module 30905 of FIG. 4-2-6 broadcasts via 30604 a signal defining the current generation number to all memory synchronization interface units, which in turn tag their accesses with that number. Each memory subsystem unit that may hold such tagged requests flags per FIG. 4-2-5B for each generation whether it holds requests for that particular generation or not.

For a synchronization operation, a unit can request an increment of the current generation and wait for previous generations to complete.

The central generation counter uses a single counter 30601 to determine the next generation. As this counter is narrow, for instance 3 bits wide, it wraps frequently, causing the reuse of generation numbers. To prevent using a number that is still in flight, there is a second, reclaiming counter 30602 of identical width that points to the oldest generation in flight. This counter is controlled by a track and control unit 30606 implemented within the memory synchronization unit. Signals from the msync interface unit, discussed with reference to FIGS. 4-2-9 and 4-2-10 below, are received at 30605. These include requests for generation change.

FIG. 4-2-7 illustrates conditions under which the generation counter may be incremented and is part of the function of the track and control unit 30606. At 30701 it is tested whether a request to increment is active and the request specifies the current value of the generation counter plus one. If not, the unit must wait at 307011. If so, the unit tests at 30702 whether the reclaim pointer is equal to the current generation pointer plus one. If so, again the unit must wait and retest in accordance with 30701. If not, it is tested at 30703 whether the generation counter has been incremented in the last two cycles, if so, the unit must wait at 30701. If not, the generation counter may be incremented at 30704.

The generation counter can only advance if doing so would not cause it to point to the same generation as the reclaim pointer per in the next cycle. If the generation counter is stalled by this condition, it can still receive incoming memory synchronization requests from other cores and process them all at once by broadcasting the identical grant to all of them, causing them all to wait for the same generations to clear. For instance, all requests for generation change from the hardware threads can be OR'd together to create a single generation change request.

The generation counter (gen_cnt) 601 and the reclaim pointer (rcl_ptr) 30602 both start at zero after reset. When a unit requests to advance to a new generation, it indicates the desired generation. There is no request explicit acknowledge sent back to the requestor, the requestor unit determines at whether its request has been processed based on the global current generation 30601, 30602. As the requested generation can be at most the gen_cnt+1, requests for any other generation at are assumed to have already been completed.

If the requested generation is equal to gen_cnt+1 and equal to rcl_ptr at, an increment is requested because the next generation value is still in use. The gen_cnt will be incremented as soon as the rcl_ptr increments.

If the requested generation is not equal to gen_cnt+1, it is assumed completed and is ignored.

If the requested generation is equal to gen_cnt+1 and not equal to rcl_ptr, gen_cnt is incremented at; but gen_cnt is incremented at most every 2 cycles, allowing units tracking the broadcast to see increments even in the presence of single cycle upset events.

Per FIG. 4-2-8, which is implemented in box 30606, the reclaim counter is advanced at 30803 if Per 30804 it is not identical to the generation counter;

per 30801, the gen_cnt has pointed to its current location for at least n cycles. The variable n is defined by the generation counter broadcast and OR-reduction turn-around latency plus 2 cycles to remove the influence of transient errors on this path; and Per 30803, the OR reduce tree has indicated for at least 2 cycles that no memory access requests are in flight for the generation rcl_ptr points to. In other words, in the present embodiment, the incrementation of the reclaim pointer is an indication to the other units that the requested generation has completed. Normally, this is a requirement for a "full sync" as described below and also a requirement for the PPC msync.

Levels of Synchronization

The PowerPC architecture defines three levels of synchronization:

heavy-weight sync, also called hwsync, or msync, lwsync (lightweight sync) and eieio (also called mbar, memory barrier).

Generally it has been found that programmers overuse the heavyweight sync in their zealousness to prevent memory inconsistencies. This results in unnecessary slowing of processing. For instance, if a program contains one data producer and many data consumers, the producer is the bottleneck. Having the producer wait to synchronize aggravates this. Analogously, if a program contains many producers and only one consumer, then the consumer can be the bottleneck and forcing it to wait should be avoided where possible.

In implementing memory synchronization, it has been found advantageous to offer several levels of synchronization programmable by memory mapped I/O. These levels can be chosen by the programmer in accordance with anticipated work distribution. Generally, these levels will be most commonly used by the operating system to distribute workload. It will be up to the programmer choosing the level of synchronization to verify that different threads using the same data have compatible synchronization levels.

Seven levels or "flavors" of synchronization operations are discussed herein. These flavors can be implemented as alternatives to the msync/hwsync, lwsync, and mbar/eieio instructions of the PowerPC architecture. In this case, program instances of these categories of Power PC instruction can all be mapped to the strongest sync, the msync, with the alternative levels then being available by memory-mapped i/o. The scope of restrictions imposed by these different flavors is illustrated conceptually in the Venn diagram of FIG. 4-2-12. While seven flavors of synchronization are disclosed herein, one of ordinary skill in the art might choose to implement more or less flavors as a matter of design choice. In the present embodiment, these flavors are implemented as a store to a configuration address that defines how the next msync is supposed to be interpreted.

The seven flavors disclosed herein are:

Full Sync 31711

The full sync provides sufficient synchronization to satisfy the requirements of all PowerPC msync, hwsync/lwsync and mbar instructions. It causes the generation counter to be incremented regardless of the generation of the requestor's last access. The requestor waits until all requests complete that were issued before its generation increment request. This sync has sufficient strength to implement the PowerPC synchronizing instructions.

Non-Cumulative Barrier 31712

This sync ensures that the generation of the last access of the requestor has completed before the requestor can proceed. This sync is not strong enough to provide cumulative ordering as required by the PowerPC synchronizing instructions. The last load issued by this processor may have received a value written by a store request of another core from the subsequent generation. Thus this sync does not guarantee that the value it saw prior to the store is visible to all cores after this sync operation. More about the distinction between non-cumulative barrier and full sync is illustrated by FIG. 4-2-15. In this figure there are three core processors 31620, 31621, and 31623. The first processor 31620 is running a program that includes three sequential instructions: a load 31623, an msync 31624, and a store 31625. The second processor 31621 is running a second set of sequential instructions: a store 31626, a load 31627, and a load 31628. It is desired for a) the store 31626 to precede the load 31623 per arrow 31629;

b) the store 31625 to precede the load 31627 per arrow 31630, and c) the store 31626 to precede the load 31628 per arrow 31631.

The full sync, which corresponds to the PowerPC msync instruction, will guarantee the correctness of order of all three arrows 31629, 31630, and 31631. The non-cumulative barrier will only guarantee the correctness of arrows 31629 and 31630. If, on the other hand, the program does not require the order shown by arrow 31631, then the non-cumulative barrier will speed processing without compromising data integrity.

Producer Sync 31713

This sync ensures that the generation of the last store access before the sync instruction of the requestor has completed before the requestor can proceed. This sync is sufficient to separate the data location updates from the guard location update for the producer in a producer/consumer queue. This type of sync is useful where the consumer is the bottleneck and where there are instructions that can be carried out between the memory access and the msync that do not require synchronization. It is also not strong enough to provide cumulative ordering as required by the PowerPC synchronizing instructions.

Generation Change Sync 31714

This sync ensures only that the requests following the sync are in a different generation than the last request issued by the requestor. This type of sync is normally requested by the consumer and puts the burden of synchronization on the producer. This guarantees that load and stores are completed. This might be particularly useful in the case of atomic operations as defined in co-pending application 61/299,911 filed Jan. 29, 2010, which is incorporated herein by reference, and where it is desired to verify that all data is consumed.

Producer Generation Change Sync 31715

This sync is designed to slow the producer the least. This sync ensures only that the requests following the sync are in a different generation from the last store request issued by the requestor. This can be used to separate the data location updates from the guard location update for the producer in a producer/consumer queue. However, the consumer has to ensure that the data location updates have completed after it sees the guard location change. This type does not require the producer to wait until all the invalidations are finished. The term "guard location" here refers to the type of data shown in the flag of FIGS. 4-2-3A and 4-2-3B. Accordingly, this type might be useful for the types of threads illustrated in those figures. In this case the consumer has to know that the flag being set does not mean that the data is ready. If the flag has been stored with generation X, the data has been stored with x−1 or earlier. The consumer just has to make sure that the current generation −1 has completed.

Consumer Sync 31716

This request is run by the consumer thread. This sync ensures that all requests belonging to the current generation minus one have completed before the requestor can proceed. This sync can be used by the consumer in conjunction with a producer generation change sync by the producer in a producer/consumer queue.

Local Barrier 31717

This sync is local to a core/L1 group and only ensures that all its preceding memory accesses have been sent to the switch.

FIG. 4-2-11 shows how the threads of FIG. 4-2-3B can use the generation counter and reclaim pointer to achieve synchronization without a full sync. At 31101, thread α—the producer—writes data. At 31102 thread α requests a generation increment pursuant to a producer generation change sync. At 31103 thread α monitors the generation counter until it increments. When the generation increments, it sets the data ready flag.

At 31105 thread β—the consumer—tests whether the ready flag is set. At 31106, thread β also tests, in accordance with a consumer sync, whether the reclaim pointer has reached the generation of the current synchronization request. When both conditions are met at 31107, then thread β can use the data at 31108.

In addition to the standard addressing and data functions 30454, 30455, when the L1P 58 shown in FIG. 4-2-14—sees any of these synchronization requests at the interface from the core 52, it immediately stops write combining—responsive to the decode function 30457 and the control unit 30452—for all currently open write combining buffers 30450 and enqueues the request in its request queue 30451. During the lookup phase of the request, synchronizing requests will advantageously request an increment of the generation counter and wait until the last generation completes, executing a Full Sync. The L1P will then resume the lookup and notify the core 52 of its completion.

To invoke the synchronizing behavior of synchronization types other than full sync, at least two implementation options are possible:

1. Synchronization Caused by Load and Store Operations to Predefined Addresses

Synchronization levels are controlled by memory-mapped I/O accesses. As store operations can bypass load operations, synchronization operations that require preceding loads to have completed are implemented as load operations to memory mapped I/O space, followed by a conditional branch that depends on the load return value. Simple use of load return may be sufficient. If the sync does not depend on the completion of preceding loads, it can be implemented as store to memory mapped I/O space. Some implementation issues of one embodiment are as follows. A write access to this location is mapped to a sync request which is sent to the memory synchronization unit. The write request stalls the further processing of requests until the sync completes. A load request to the location causes the same type of requests, but only the full and the consumer request stall. All other load requests return the completion status as value back, a 0 for sync not yet complete, a 1 for sync complete. This implementation does not take advantage all of the built in PowerPC constraints of a core implementing PowerPC architecture. Accordingly, more programmer attention to order of memory access requests is needed.

2. Configuring the Semantics of the Next Synchronizations Instruction, e.g. the PowerPC Msync, Via Storing to a Memory Mapped Configuration Register.

In this implementation, before every memory synchronization instruction, a store is executed that deposits a value that selects a synchronization behavior into a memory mapped register. The next executed memory synchronization instruction invokes the selected behavior and restores the configuration back to the Full Sync behavior. This reactivation of the strongest synchronization type guarantees correct execution if applications or subroutines that do not program the configuration register are executed.

Memory Synchronization Interface Unit

FIG. 4-2-9 illustrates operation of the memory synchronization interface unit 30904 associated with a prefetch unit group 58 of each processor 52. This unit mediates between the OR reduce end-point, the global generation counter unit and the synchronization requesting unit. The memory synchronization interface unit 30904 includes a control unit 30906 that collects and aggregates requests from one or more clients 30901 (e.g., 4 thread memory synchronization controls of the L1P via decoder 30902) and requests generation increments from the global generation counter unit 30905 illustrated in FIG. 6 and receives current counts from that unit as well. The control unit 30906 includes a respective set of registers 30907 for each hardware thread. These registers may store information such as

- configuration for a current memory synchronization instruction issued by a core 52,
- when the currently operating memory synchronization instruction started,
- whether data has been sent to the central unit, and
- whether a generation change has been received.

The register storing configuration will sometimes be referred to herein as "configuration register." This control unit 30906 notifies the core 52 via 30908 when the msync is completed. The core issuing the msync drains all loads and stored, stops taking loads and stores and stops the issuing thread until the msync completion indication is received.

This control unit also exchanges information with the global generation counter module 30905. This information includes a generation count. In the present embodiment, there is only one input per L1P to the generation counter, so the L1P aggregates requests for increment from all hardware threads of the processor 52. Also, in the present embodiment, the OR reduce tree is coupled to the reclaim pointer, so the memory synchronization interface unit gets information from the OR reduce tree indirectly via the reclaim pointer.

The control unit also tracks the changes of the global generation (gen_cnt) and determines whether a request of a client has completed. Generation completion is detected by using the reclaim pointer that is fed to observer latches in the L1P. The core waits for the L1P to handle the msyncs. Each hardware thread may be waiting for a different generation to complete. Therefore each one stores what the generation for that current memory synchronization instruction was. Each then waits individually for its respective generation to complete.

For each client 30901, the unit implements a group 30903 of three generation completion detectors shown at 31001, 31002, 31003, per FIG. 4-2-10. Each detector implements a 3 bit latch 31004, 31006, 31008 that stores a generation to track, which will sometimes be the current generation, gen_cnt, and sometimes be the prior generation, last_gen. Each detector also implements a flag 31005, 31007, 31009 that indicates if the generation tracked has still requests in flight (ginfl_flag). The detectors can have additional flags, for instance to show that multiple generations have completed.

For each store request generated by a client, the first 31001 of the three detectors sets its ginfl_flag 31005 and updates the last_gen_latch 31004 with the current generation. This detector is updated for every store, and therefore reflects whether the last store has completed or not. This is sufficient, since prior stores will have generations less than or equal to the generation of the current store. Also, since the core is waiting for memory synchronization, it will not be making more stores until the completion indication is received.

For each memory access request, regardless whether load or store, the second detector 31002 is set correspondingly. This detector is updated for every load and every store, and therefore its flag indicates whether the last memory access request has completed.

If a client requests a full sync, the third detector 31003 is primed with the current generation, and for a consumer sync the third detector is primed with the current generation-1. Again, this detector is updated for every full or consumer sync.

Since the reclaim pointer cannot advance without everything in that generation having completed and because the reclaim pointer cannot pass the generation counter, the reclaim pointer is an indication of whether a generation has completed. If the rcl_ptr 30602 moves past the generation stored in last gen, no requests for the generation are in flight anymore and the ginfl_flag is cleared.

Full Sync

This sync completes if the ginfl_flag 31009 of the third detector 31003 is cleared. Until completion, it requests a generation change to the value stored in the third detector plus one.

Non-Cumulative Barrier

This sync completes if the ginfl_flag 31007 of the second detector 31002 is cleared. Until completion, it requests a generation change to the value that is held in the second detector plus one.

Producer Sync

This sync completes if the ginfl_flag 31005 of the first detector 31001 is cleared. Until completion, it requests a generation change to the value held in the first detector plus one.

Generation Change Sync

This sync completes if either the ginfl_flag 31007 of the second detector 31002 is cleared or the if the last_gen 31006 of the second detector is different from gen_cnt 30601. If it does not complete immediately, it requests a generation change to the value stored in the second detector plus one. The purpose of the operation is to advance the current generation (value of gen_cnt) to at least one higher than the generation of the last load or store. The generation of the last load or store is stored in the last_gen register of the second detector.

1) If the current generation equals the one of the last load/store, the current generation is advanced (exception is 3) below).
2) If the current generation is not equal to the one of the last load/store, it must have incremented at least once since the last load/store and that is sufficient;
3) There is a case when the generation counter has wrapped and now points again at the generation value of the last load/store. This case is distinguished from 1) by the cleared ginfl_flag (when we have wrapped, the original generation is no longer in flight). In this case, we are done as well, as we have incremented at least 8 times since the last load/store (wrap every 8 increments)

Producer Generation Change Sync

This sync completes if either the ginfl_flag 31005 of the first detector 31001 is cleared or if the last_gen 31004 of the first detector is different from gen_cnt 30601. If it does not complete immediately, it requests a generation change to of the value stored in the first detector plus one. This operates similarly to the generation change sync except that it uses the generation of the last store, rather than load or store.

Consumer Sync

This sync completes if the ginfl_flag 31009 of the third detector 31003 is cleared. Until completion, it requests a generation change to of the value stored in the third detector plus one.

Local Barrier

This sync is executed by the L1P, it does not involve generation tracking.

From the above discussion, it can be seen that a memory synchronization instruction actually implicates a set of sub-tasks. For a comprehensive memory synchronization scheme, those sub-tasks might include one or more of the following:

Requesting a generation change between memory access requests;

Checking a given one of a group of possible generation indications in accordance with a desired level of synchronization strength;

Waiting for a change in the given one before allowing a next memory access request; and Waiting for some other event.

In implementing the various levels of synchronization herein, sub-sets of this set of sub-tasks can be viewed as partial synchronization tasks to be allocated between threads in an effort to improve throughput of the system. Therefore address formats of instructions specifying a synchronization level effectively act as parameters to offload sub-tasks from or to the thread containing the synchronization instruction. If a particular sub-task implicated by the memory synchronization instruction is not performed by the thread containing the memory synchronization instruction, then the implication is that some other thread will pick up that part of the memory synchronization function. While particular levels of synchronization are specified herein, the general concept of distributing synchronization sub-tasks between threads is not limited to any particular instruction type or set of levels.

Physical Design

The Global OR tree needs attention to layout and pipelining, as its latency affects the performance of the sync operations.

In the current embodiment, the cycle time is 1.25 ns. In that time, a signal will travel 2 mm through a wire. Where a wire is longer than 2 mm, the delay will exceed one clock cycle, potentially causing unpredictable behavior in the transmission of signals. To prevent this, a latch should be placed at each position on each wire that corresponds to 1.25 ns, in other words approximately every 2 mm. This means that every transmission distance delay of 4 ns will be increased to 5 ns, but the circuit behavior will be more predictable. In the case of the msync unit, some of the wires are expected to be on the order of 10 mm meaning that they should have on the order of five latches.

Due to quantum mechanical effects, it is advisable to protect latches holding generation information with Error Correcting Codes ("ECC") (4b per 3b counter data). All operations may include ECC correction and ECC regeneration logic.

The global broadcast and generation change interfaces may be protected by parity. In the case of a single cycle upset, the request or counter value transmitted is ignored, which does not affect correctness of the logic.

Software Interface

The Msync unit will implement the ordering semantics of the PPC hwsync, lwsync and mbar instruction by mapping these operations to the full sync.

FIG. 4-2-13 shows a mechanism for delaying incrementation if too many generations are in flight. At 31601, the outputs of the OR reduce tree are multiplexed, to yield a positive result if all possible generations are in flight. A counter 31605 holds the current generation, which is incremented at 31606. A comparator 31609 compares the current generation plus one to the requested generation. A comparison result is ANDed at 31609 with an increment request from the core. A result from the AND at 31609 is ANDed at 31602 with an output of multiplexer 31601.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The word "comprising", "comprise", or "comprises" as used herein should not be viewed as excluding additional elements. The singular article "a" or "an" as used herein should not be viewed as excluding a plurality of elements. Unless the word "or" is expressly limited to mean only a single item exclusive from other items in reference to a list of at least two items, then the use of "or" in such a list is to be interpreted as including (a) any single item in the list, (b) all of the items in the list, or (c) any combination of the items in the list. Ordinal terms in the claims, such as "first" and "second" are used for distinguishing elements and do not necessarily imply order of operation.

There is further provided a system and method for managing the loading and storing of data conditionally in memories of multi-processor systems.

A conventional multi-processor computer system includes multiple processing units (a.k.a. processors or processor cores) all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer memory blocks that might be accessed by a processor in order to speed up processing by reducing access latency introduced by having to load needed data and instructions from system memory. In some multiprocessor systems, the cache hierarchy includes at least two levels. The level one (L1), or upper-level cache is usually a private cache associated with a particular processor core and cannot be directly accessed by other cores in the system. Typically, in response to a memory access instruction such as a load or store instruction, the processor core first accesses the upper-level cache. If the requested memory block is not found in the upper-level cache or the memory access request cannot be serviced in the upper-level cache (e.g., the L1 cache is a store-though cache), the processor core then accesses lower-level caches (e.g., level two (L2) or level three (L3) caches) to service the memory access to the requested memory block. The lowest level cache (e.g., L2 or L3) is often shared among multiple processor cores.

A coherent view of the contents of memory is maintained in the presence of potentially multiple copies of individual memory blocks distributed throughout the computer system through the implementation of a coherency protocol. The coherency protocol, entails maintaining state information associated with each cached copy of the memory block and communicating at least some memory access requests between processing units to make the memory access requests visible to other processing units.

In order to synchronize access to a particular granule (e.g., cache line) of memory between multiple processing units and threads of execution, load-reserve and store-conditional instruction pairs are often employed. For example, load-reserve and store-conditional instructions referred to as LWARX and STWCX have been implemented. Execution of a LWARX (Load Word And Reserve Indexed) instruction by a processor loads a specified cache line into the cache memory of the processor and typically sets a reservation flag and address register signifying the processor has interest in atomically updating the cache line through execution of a subsequent STWCX (Store Word Conditional Indexed) instruction targeting the reserved cache line. The cache then monitors the storage subsystem for operations signifying that another processor has modified the cache line, and if one is detected, resets the reservation flag to signify the cancellation of the reservation. When the processor executes a subsequent STWCX targeting the cache line reserved through execution of the LWARX instruction, the cache memory only performs the cache line update requested by the STWCX if the reservation for the cache line is still pending. Thus, updates to shared memory can be synchronized without the use of an atomic update primitive that strictly enforces atomicity.

Individual processors usually provide minimal support for load-reserve and store-conditional. The processors basically hand off responsibility for consistency and completion to the external memory system. For example, a processor core may treat load-reserve like a cache-inhibited load, but invalidate the target line if it hits in the L1 cache. The returning data goes to the target register, but not to the L1 cache. Similarly, a processor core may treat store-conditional as a cache-inhibited store and also invalidate the target line in the L1 cache if it exists. The store-conditional instruction stalls until success or failure is indicated by the external memory system, and the condition code is set before execution continues. The external memory system is expected to maintain load-reserve reservations for each thread, and no special internal consistency action is taken by the processor core when multiple threads attempt to use the same lock.

In a traditional, bus-based multiprocessor system, the point of memory system coherence is the bus itself. That is, coherency between the individual caches of the processors is resolved by the bus during memory accesses, because the accesses are effectively serialized. As a result, the shared main memory of the system is unaware of the existence of multiple processors. In such a system, support for load-reserve and store-conditional is implemented within the processors or in external logic associated with the processors, and conflicts between reservations and other memory accesses are resolved during bus accesses.

As the number of processors in a multiprocessor system increases, a shared bus interconnect becomes a performance bottleneck. Therefore, large-scale multiprocessors use some sort of interconnection network to connect processors to shared memory (or a cache for shared memory). Furthermore, an interconnection network encourages the use of multiple shared memory or cache slices in order to take advantage of parallelism and increase overall memory bandwidth. FIG. 1-0 shows the architecture of such a system, consisting of eighteen processors 52, a crossbar switch interconnection network 60, and a shared L2 cache consisting of sixteen slices 72. In such a system, it may be difficult to maintain memory consistency in the network, and it may be necessary to move the point of coherence to the shared memory (or shared memory cache when one is present). That is, the shared memory is responsible for maintaining a consistent order between the servicing of requests coming from the multiple processors and responses returning to them.

It is desirable to implement synchronization based on load-reserve and store-conditional in such a large-scale multiprocessor, but it is no longer efficient to do so at the individual processors. What is needed is a mechanism to implement such synchronization at the point of coherence, which is the shared memory. Furthermore, the implementation must accommodate the individual slices of the shared memory. A unified mechanism is needed to insure proper consistency of lock reservations across all the processors of the multiprocessor system.

In the embodiment described above, each A2 processor core has four independent hardware threads sharing a single L1 cache with a 64-byte line size. Every memory line is stored in a particular L2 cache slice, depending on the address mapping. That is, the sixteen L2 slices effectively comprise a single L2 cache, which is the point of shared memory coherence for the compute node. Those skilled in the art will recognize that the invention applies to different multiprocessor configurations including a single L2 cache (i.e. one slice), a main memory with no L2 cache, and a main memory consisting of multiple slices.

Each L2 slice has some number of reservation registers to support load-reserve/store-conditional locks. One embodiment that would accommodate unique lock addresses from every thread simultaneously is to provide 68 reservation registers in each slice, because it is possible for all 68 threads to simultaneously use lock addresses that fall into the same L2 slice. Each reservation register would contain an N-bit address (specifying a unique 64-byte L1 line) and a valid bit, as shown in FIG. 4-3-4. Note that the logic shown in FIG. 4-3-4 is implemented in each slice of the L2 cache. The number of address bits stored in each reservation register is determined by the size of the main memory, the granularity of lock addresses, and the number of L2 slices. For example, a byte address in a 64 GB main memory requires 36 bits. If memory addresses are reserved as locks at an 8-byte granularity, then a lock address is 33 bits in size. If there are 16 L2 slices, then 4 address bits are implied by the memory reference steering logic that determines a unique L2 slice for each address. Therefore, each reservation register would have to accommodate a total of 29 address bits (i.e. N equals 29 in FIG. 4-3-4).

When a load-reserve occurs, the reservation register corresponding to the ID (i.e. the unique thread number) of the thread that issued the load-reserve is checked to determine if the thread has already made a reservation. If so, the reservation address is updated with the load-reserve address. If not, the load-reserve address is installed in the register and the valid bit is set. In both cases, the load-reserve continues as an ordinary load and returns data.

When a store-conditional occurs, the reservation register corresponding to the ID of the requesting thread is checked to determine if the thread has a valid reservation for the lock address. If so, then the store-conditional is considered a success, a store-conditional success indication is returned to the requesting processor core, and the store-conditional is converted to an ordinary store (updating the memory and causing the necessary invalidations to other processor cores by the normal coherence mechanism). In addition, if the store-conditional address matches any other reservation registers, then they are invalidated. If the thread issuing the store-conditional has no valid reservation or the address does not match, then the store-conditional is considered a failure, a store-conditional failure indication is returned to the requesting processor core, and the store-conditional is dropped (i.e. the memory update and associated invalidations to other cores and other reservation registers does not occur).

Every ordinary store to the shared memory searches all valid reservation address registers and simply invalidates those with a matching address. The necessary back-invalidations to processor cores will be generated by the normal coherence mechanism.

In general, a thread is not allowed to have more than one load-reserve reservation at a time. If the processor does not track reservations, then this restriction must be enforced by additional logic outside the processor. Otherwise, a thread could issue load-reserve requests to more than one L2 slice and establish multiple reservations. FIG. 4-3-22 shows one embodiment of logic that can enforce the single-reservation constraint on behalf of the processor. There are four lock reservation registers, one for each thread (assuming a processor that implements four threads). Each register stores a reservation address 32202 for its associated thread and a valid bit 32204. When a thread executes load-reserve, the memory address is stored in the appropriate register and the valid bit is set. If the thread executes another load-reserve, the register is simply overwritten. In both cases, the load-reserve continues on to the L2 as described above.

When the thread executes store-conditional, the address will be matched against the appropriate register. If it matches and the register is valid, then the store-conditional protocol continues as described above. If not, then the store-conditional is considered a failure, the core is notified, and only a special notification is sent to the L2 slice holding the reservation in order to cancel that reservation. This embodiment allows the processor to continue execution past the store-conditional very quickly. However, a failed store-conditional requires the message to be sent to the L2 in order to invalidate the reservation there. The memory system must guarantee that this invalidation message acts on the reservation before any subsequent store-conditional from the same processor is allowed to succeed.

Another embodiment, shown in FIG. 4-3-3, is to store an L2 slice index (4 bits for 16 slices), represented at 32302, together with a valid bit, represented at 32304. In this case, an exact store-conditional address match can only be performed at an L2 slice, requiring a roundtrip message before execution on the processor continues past the store-conditional. However, the L2 slice index of the store-conditional address is matched to the stored index and a mismatch avoids the roundtrip for some (perhaps common) cases, where the address falls into a different L2 slice than the reservation. In the case of a mismatch, the store-conditional is guaranteed to be a failure and the special failure notification is sent to the L2 slice holding the reservation (as indicated by the stored index) in order to cancel the reservation.

A similar tradeoff exists for load-reserve followed by load-reserve, but the performance of both storage strategies is the same. That is, the reservation resulting from the earlier load-reserve address must be invalidated at L2, which can be done with a special invalidate message. Then the new reservation is established as described previously. Again, the memory system must insure that no subsequent store-conditional can succeed before that invalidate message has had its effect.

When a load-reserve reservation is invalidated due to a store-conditional by some other thread or an ordinary store, all L2 reservation registers storing that address are invalidated. While this guarantees correctness, performance could be improved by invalidating matching lock reservation registers near the processors (FIGS. 4-3-2 and 4-3-3) as well. This is simply a matter of having the reservation logic of FIG. 4-3-2 (or FIG. 4-3-3) snoop L1 invalidations, but it does require another datapath (invalidates) to be compared (by way of the Core Address in FIG. 4-3-2 or the L2 Index in FIG. 4-3-3).

As described above, the L2 cache slices store the reservation addresses of all valid load-reserve locks. Because every thread could have a reservation and they could all fall into the same L2 slice, one embodiment, shown in FIG. 4-3-4, provides 68 lock reservation registers, each with a valid bit.

It is desirable to compare the address of a store-conditional or store to all lock reservation addresses simultaneously for the purpose of rapid invalidation. Therefore, a conventional storage array such as a static RAM or register array is preferably not used. Rather, discrete registers that can operate in parallel are needed. The resulting structure has on the order of N*68 latches and requires a 68-way fanout for the address and control buses. Furthermore, it is replicated in all sixteen L2 slices.

Because load-reserve reservations are relatively sparse in many codes, one way to address the power inefficiency of the large reservation register structure is to use clock-gated latches. Another way, as illustrated in FIG. 4-3-5, is to block the large buses behind AND gates 32504 that are only enabled when at least one of the reservation registers contains a valid address (the uncommon case), as determined by an OR 32502 of all the valid bits. Such logic will save power by preventing the large output bus (Bus Out) from switching when there are no valid reservations.

Although the reservation register structure in the L2 caches described thus far will accommodate any possible locking code, it would be very unusual for 68 threads to all want a unique lock since locking is done when memory is shared. A far more likely, yet still remote, possibility is that 34 pairs of threads want unique locks (one per pair) and they all happen to fall into the same L2 slice. In this case, the number of registers could be halved, but a single valid bit no longer suffices because the registers must be shared. Therefore, each register would, as represented in FIG. 4-3-6, store a 7-bit thread ID 32602 and the registers would no longer be dedicated to specific threads. Whenever a new load-reserve reservation is established, an allocation policy is used to choose one of the 34 registers, and the ID of the requesting thread is stored in the chosen register along with the address tag.

With this embodiment, a store-conditional match is successful only if both the address and thread ID are the same. However, an address-only match is sufficient for the purpose of invalidation. This design uses on the order of 34*M latches and requires a 34-way fanout for the address, thread ID, and control buses. Again, the buses could be shielded behind AND gates, using the structure shown in FIG. 4-3-5, to save switching power.

Because this design cannot accommodate all possible lock scenarios, a register selection policy is needed in order to cover the cases where there are no available lock registers to allocate. One embodiment is to simply drop new requests when no registers are available. However, this can lead to deadlock in the pathological case where all the registers are reserved by a subset of the threads executing load-reserve, but never released by store-conditional. Another embodiment is to implement a replacement policy such as round-robin, random, or LRU. Because, in some embodiments, it is very likely that all 34 registers in a single slice may be used, a policy that has preference for unused registers and then falls back to simple round-robin replacement will, in many cases provided excellent results.

Given the low probability of having many locks within a single L2 slice, the structure can be further reduced in size at the risk of a higher livelock probability. For instance, even with only 17 registers per slice, there would still be a total of 272 reservation registers in the entire L2 cache; far more than needed, especially if address scrambling is used to spread the lock addresses around the L2 cache slices sufficiently.

With a reduced number of reservation registers, the thread ID storage could be modified in order to allow sharing and accommodate the more common case of multiple thread IDs per register (since locks are usually shared). One embodiment is to replace the 7-bit thread ID with a 68-bit vector specifying which threads share the reservation. This approach does not mitigate the livelock risk when the number of total registers is exhausted.

Another compression strategy, which may be better in some cases, is to replace the 7-bit thread ID with a 5-bit processor ID (assuming 17 processors) and a 4-bit thread vector (assuming 4 threads per processor). In this case, a single reservation register can be used by all four threads of a processor to share a single lock. With this strategy, seventeen reservation registers would be sufficient to accommodate all 68 threads reserving the same lock address. Similarly, groups of threads using the same lock would be able to utilize the reservation registers more efficiently if they shared a processor (or processors), reducing the probability of livelock. At the cost of some more storage, the processor ID can be replaced by a 4-bit index specifying a particular pair of processors and the thread vector could be extended to 8 bits. As will be obvious to those skilled in the art, there is an entire spectrum of choices between the full vector and the single index.

As an example, one embodiment for the 17-processor multiprocessor is 17 reservation registers per L2 slice, each storing an L1 line address together with a 5-bit core ID and a 4-bit thread vector. This results in bus fanouts of 17.

While the embodiment herein disclosed describes a multiprocessor with the reservation registers implemented in a sliced, shared memory cache, it should be obvious that the invention can be applied to many types of shared memories, including a shared memory with no cache, a sliced shared memory with no cache, and a single, shared memory cache.

The disclosure further relates to managing speculation with respect to cache memory in a multiprocessor system with multiple threads, some of which may execute speculatively.

In a multiprocessor system with generic cores, it becomes easier to design new generations and expand the system. Advantageously, speculation management can be moved downstream from the core and first level cache. In such a case, it is desirable to devise schemes of accessing the first level cache without explicitly keeping track of speculation.

There may be more than one modes of keeping the first level cache speculation blind. Advantageously, the system will have a mechanism for switching between such modes.

One such mode is to evict writes from the first level cache, while writing through to a downstream cache. The embodiments described herein show this first level cache as being the physically first in a data path from a core processor; however, the mechanisms disclose here might be applied to other situations. The terms "first" and "second," when applied to the claims herein are for convenience of drafting only and are not intended to be limiting to the case of L1 and L2 caches.

As described herein, the use of the letter "B"—other than as part of a figure number—represents a Byte quantity, while "GB" represents Gigabyte quantities. Throughout this disclosure a particular embodiment of a multi-processor system will be discussed. This discussion includes various numerical values for numbers of components, bandwidths of interfaces, memory sizes and the like. These numerical values are not intended to be limiting, but only examples. One of ordinary skill in the art might devise other examples as a matter of design choice.

The term "thread" is used herein. A thread can be either a hardware thread or a software thread. A hardware thread within a core processor includes a set of registers and logic for executing a software thread. The software thread is a segment of computer program code. Within a core, a hardware thread will have a thread number. For instance, in the A2, there are four threads, numbered zero through three. Throughout a multiprocessor system, such as the nodechip 50 of FIG. 1-0, software threads can be referred to using speculation identification numbers ("IDs"). In the present embodiment, there are 128 possible IDs for identifying software threads.

These threads can be the subject of "speculative execution," meaning that a thread or threads can be started as a sort of wager or gamble, without knowledge of whether the thread can complete successfully. A given thread cannot complete successfully if some other thread modifies the data that the given thread is using in such a way as to invalidate the given thread's results. The terms "speculative," "speculatively," "execute," and "execution" are terms of art in this context. These terms do not imply that any mental step or manual operation is occurring. All operations or steps described herein are to be understood as occurring in an automated fashion under control of computer hardware or software.

If speculation fails, the results must be invalidated and the thread must be re-run or some other workaround found.

Three modes of speculative execution are to be supported: Speculative Execution (SE) (also referred to as Thread Level Speculation ("TLS")), Transactional Memory ("TM"), and Rollback.

SE is used to parallelize programs that have been written as sequential program. When the programmer writes this sequential program, she may insert commands to delimit sections to be executed concurrently. The compiler can recognize these sections and attempt to run them speculatively in parallel, detecting and correcting violations of sequential semantics.

When referring to threads in the context of Speculative Execution, the terms older/younger or earlier/later refer to their relative program order (not the time they actually run on the hardware).

In Speculative Execution, successive sections of sequential code are assigned to hardware threads to run simultaneously. Each thread has the illusion of performing its task in program order. It sees its own writes and writes that occurred earlier in the program. It does not see writes that take place later in program order even if (because of the concurrent execution) these writes have actually taken place earlier in time.

To sustain the illusion, the L2 gives threads private storage as needed, accessible by software thread ID. It lets threads read their own writes and writes from threads earlier in program order, but isolates their reads from threads later in program order. Thus, the L2 might have several different data values for a single address. Each occupies an L2 way, and the L2 directory records, in addition to the usual directory information, a history of which thread IDs are associated with reads and writes of a line. A speculative write is not to be written out to main memory.

One situation that will break the program-order illusion is if a thread earlier in program order writes to an address that a thread later in program order has already read. The later thread should have read that data, but did not. The solution is to kill the later software thread and invalidate all the lines it has written in L2, and to repeat this for all younger threads. On the other hand, without such interference a thread can complete successfully, and its writes can move to external main memory when the line is cast out or flushed.

Not all threads need to be speculative. The running thread earliest in program order can be non-speculative and run conventionally; in particular its writes can go to external main memory. The threads later in program order are speculative and are subject to be killed. When the non-speculative thread completes, the next-oldest thread can be committed and it then starts to run non-speculatively.

The following sections describe the implementation of the speculation model in the context of addressing.

When a sequential program is decomposed into speculative tasks, the memory subsystem needs to be able to associate all memory requests with the corresponding task. This is done by assigning a unique ID at the start of a speculative task to the thread executing the task and attaching the ID as tag to all its requests sent to the memory subsystem.

As the number of dynamic tasks can be very large, it may not be practical to guarantee uniqueness of IDs across the entire program run. It is sufficient to guarantee uniqueness for all IDs concurrently present in the memory system. More about the use of speculation ID's, including how they are allocated, committed, and invalidated, appears in the incorporated applications.

Transactions as defined for TM occur in response to a specific programmer request within a parallel program. Generally the programmer will put instructions in a program delimiting sections in which TM is desired. This may be done by marking the sections as requiring atomic execution. According to the PowerPC architecture: "An access is single-copy atomic, or simply "atomic", if it is always performed in its entirety with no visible fragmentation."

To enable a TM runtime system to use the TM supporting hardware, it needs to allocate a fraction of the hardware resources, particularly the speculation IDs that allow hardware to distinguish concurrently executed transactions, from the kernel (operating system), which acts as a manager of the hardware resources. The kernel configures the hardware to group IDs into sets called domains, configures each domain for its intended use, TLS, TM or Rollback, and assigns the domains to runtime system instances.

At the start of each transaction, the runtime system executes a function that allocates an ID from its domain, and programs it into a register that starts marking memory access as to be treated as speculative, i.e., revocable if necessary.

When the transaction section ends, the program will make another call that ultimately signals the hardware to do conflict checking and reporting. Based on the outcome of the check, all speculative accesses of the preceding section can be made permanent or removed from the system.

The PowerPC architecture defines an instruction pair known as larx/stcx. This instruction type can be viewed as a special case of TM. The larx/stcx pair will delimit a memory access request to a single address and set up a program section that ends with a request to check whether the instruction pair accessed the memory location without interfering access from another thread. If an access interfered, the memory modifying component of the pair is nullified and the thread is notified of the conflict More about a special implementation of larx/stcx instructions using reservation registers is to be found in co-pending application Ser. No. 12/697,799 filed Jan. 29, 2010, which is incorporated herein by reference. This special implementation uses an alternative approach to TM to implement these instructions. In any case, TM is a broader concept than larx/stcx. A TM section can delimit multiple loads and stores to multiple memory locations in any sequence, requesting a check on their success or failure and a reversal of their effects upon failure.

Rollback occurs in response to "soft errors", temporary changes in state of a logic circuit. Normally these errors occur in response to cosmic rays or alpha particles from solder balls. The memory changes caused by a programs section executed speculatively in rollback mode can be reverted and the core can, after a register state restore, replay the failed section.

Referring now to FIG. 1-0, there is shown an overall architecture of a multiprocessor computing node 50 implemented in a parallel computing system in which the present embodiment may be implemented. The compute node 50 is a single chip ("nodechip") based on PowerPC cores, though the architecture can use any cores, and may comprise one or more semiconductor chips.

More particularly, the basic nodechip 50 of the multiprocessor system illustrated in FIG. 1-0 includes (sixteen or seventeen) 16+1 symmetric multiprocessing (SMP) cores 52, each core being 4-way hardware threaded supporting transactional memory and thread level speculation, and, including a Quad Floating Point Unit (FPU) 53 associated with each core. The 16 cores 52 do the computational work for application programs.

The 17$^{th}$ core is configurable to carry out system tasks, such as

- reacting to network interface service interrupts, distributing network packets to other cores;
- taking timer interrupts
- reacting to correctable error interrupts,
- taking statistics
- initiating preventive measures
- monitoring environmental status (temperature), throttle system accordingly.

In other words, it offloads all the administrative tasks from the other cores to reduce the context switching overhead for these.

In one embodiment, there is provided 32 MB of shared L2 cache 70, accessible via crossbar switch 60. There is further provided external Double Data Rate Synchronous Dynamic Random Access Memory ("DDR SDRAM") 80, as a lower level in the memory hierarchy in communication with the L2. Herein, "low" and "high" with respect to memory will be taken to refer to a data flow from a processor to a main memory, with the processor being upstream or "high" and the main memory being downstream or "low."

Each FPU 53 associated with a core 52 has a data path to the L1-cache 55 of the CORE, allowing it to load or store from or into the L1-cache 55. The terms "L1" and "L1D" will both be used herein to refer to the L1 data cache.

Each core 52 is directly connected to a supplementary processing agglomeration 58, which includes a private prefetch unit. For convenience, this agglomeration 58 will be referred to herein as "L1P"—meaning level 1 prefetch—or "prefetch unit;" but many additional functions are lumped together in this so-called prefetch unit, such as write combining. These additional functions could be illustrated as separate modules, but as a matter of drawing and nomenclature convenience the additional functions and the prefetch unit will be grouped together. This is a matter of drawing organization, not of substance. Some of the additional processing power of this L1P group is shown in FIGS. 4-4-3,4-4-4 and 4-4-9. The L1P group also accepts, decodes and dispatches all requests sent out by the core 52.

By implementing a direct memory access ("DMA") engine referred to herein as a Messaging Unit ("MU") such as MU 100, with each MU including a DMA engine and Network Card interface in communication with the XBAR switch, chip I/O functionality is provided. In one embodiment, the compute node further includes: intra-rack interprocessor links 90 which may be configurable as a 5-D torus; and, one I/O link 92 interfaced with the interfaced with the MU. The system node employs or is associated and interfaced with a 8-16 GB memory/node, also referred to herein as "main memory."

The term "multiprocessor system" is used herein. With respect to the present embodiment this term can refer to a nodechip or it can refer to a plurality of nodechips linked together. In the present embodiment, however, the management of speculation is conducted independently for each nodechip. This might not be true for other embodiments, without taking those embodiments outside the scope of the claims.

The compute nodechip implements a direct memory access engine DMA to offload the network interface. It transfers blocks via three switch master ports between the L2-cache slices 70 (FIG. 1-0). It is controlled by the cores via memory mapped I/O access through an additional switch slave port. There are 16 individual slices, each of which is assigned to store a distinct subset of the physical memory lines. The actual physical memory addresses assigned to each cache slice are configurable, but static. The L2 has a line size such as 128 bytes. In the commercial embodiment this will be twice the width of an L1 line. L2 slices are set-associative, organized as 1024 sets, each with 16 ways. The L2 data store may be composed of embedded DRAM and the tag store may be composed of static RAM.

The L2 has ports, for instance a 256b wide read data port, a 128b wide write data port, and a request port. Ports may be shared by all processors through the crossbar switch 60.

In this embodiment, the L2 Cache units provide the bulk of the memory system caching on the BQC chip. Main memory may be accessed through two on-chip DDR-3 SDRAM memory controllers 78, each of which services eight L2 slices.

The L2 slices may operate as set-associative caches while also supporting additional functions, such as memory speculation for Speculative Execution (SE), which includes different modes such as: Thread Level Speculations ("TLS"), Transactional Memory ("TM") and local memory rollback, as well as atomic memory transactions.

The L2 serves as the point of coherence for all processors. This function includes generating L1 invalidations when necessary. Because the L2 cache is inclusive of the L1s, it can remember which processors could possibly have a valid copy of every line, and slices can multicast selective invalidations to such processors.

FIG. 4-4-2 shows a cache slice. It includes arrays of data storage 40101, and a central control portion 40102.

FIG. 4-4-3 shows various address versions across a memory pathway in the nodechip 50. One embodiment of the core 40052 uses a 64 bit virtual address 40301 in accordance with the PowerPC architecture. In the TLB 40241, that address is converted to a 42 bit "physical" address 40302 that actually corresponds to 64 times the architected maximum main memory size 80, so it includes extra bits that can be used for thread identification information. The address portion used to address a location within main memory will have the canonical format of FIG. 4-4-6, prior to hashing, with a tag 41201 that matches the address tag field of a way, an index 41202 that corresponds to a set, and an offset 41203 that corresponds to a location within a line. The addressing varieties shown, with respect to the commercial embodiment, are intended to be used for the data pathway of the cores. The instruction pathway is not shown here. The "physical"

address is used in the L1D 40055. After arriving at the L1P, the address is stripped down to 36 bits for addressing of main memory at 40304.

Address scrambling per FIG. 4-4-7 tries to distribute memory accesses across L2-cache slices and within L2-cache slices across sets (congruence classes). Assuming a 64 GB main memory address space, a physical address dispatched to the L2 has 36 bits, numbered from 0 (MSb) to 35 (LSb) (a(0 to 35)).

The L2 stores data in 128B wide lines, and each of these lines is located in a single L2-slice and is referenced there via a single directory entry. As a consequence, the address bits 29 to 35 only reference parts of an L2 line and do not participate in L2 slice or set selection.

To evenly distribute accesses across L2-slices for sequential lines as well as larger strides, the remaining address bits 0-28 are hashed to determine the target slice. To allow flexible configurations, individual address bits can be selected to determine the slice as well as an XOR hash on an address can be used: The following hashing is used at 40242 in the present embodiment:

L2 slice:=('0000' & a(0)) xor a(1 to 4) xor a(5 to 8) xor a(9 to 12) xor a(13 to 16) xor a(17 to 20) xor a(21 to 24) xor a(25 to 28)

For each of the slices, 25 address bits are a sufficient reference to distinguish L2 cache lines mapped to that slice.

Each L2 slice holds 2 MB of data or 16K cache lines. At 16-way associativity, the slice has to provide 1024 sets, addressed via 10 address bits. The different ways are used to store different addresses mapping to the same set as well as for speculative results associated with different threads or combinations of threads.

Again, even distribution across set indices for unit and non-unit strides is achieved via hashing, to wit:

Set index:=("00000" & a(0 to 4)) xor a(5 to 14) xor a(15 to 24).

To uniquely identify a line within the set, using a(0 to 14) is sufficient as a tag.

Thereafter, the switch provides addressing to the L2 slice in accordance with an address that includes the set and way and offset within a line, as shown in FIG. 4-4-6. Each line has 16 ways.

FIG. 4-4-5 shows the role of the Translation Lookaside Buffer ("TLB"). The role of this unit is explained in further detail herein. FIG. 4-4-4 shows a four piece address space also described in more detail herein.

Long and Short Running Speculation

The L2 accommodates two types of L1 cache management in response to speculative threads. One is for long running speculation and the other is for short running speculation. The differences between the mode support for long and short running speculation is described in the following two subsections.

For long running transactions mode, the L1 cache needs to be invalidated to make all first accesses to a memory location visible to the L2 as an L1-load-miss. A thread can still cache all data in its L1 and serve subsequent loads from the L1 without notifying the L2 for these. This mode will use address aliasing as shown in FIG. 4-4-3, with the four part address space in the L1P, as shown in FIG. 4-4-4, and as further described in detail herein.

To reduce overhead in short running speculation mode, the embodiment herein eliminates the requirement to invalidate L1. The invalidation of the L1 allowed tracking of all read locations by guaranteeing at least one L1 miss per accessed cache line. For small transactions, the equivalent is achieved by making all load addresses within the transaction visible to the L2, regardless of L1 hit or miss, i.e. by operating the L1 in "read/write through" mode. In addition, data modified by a speculative thread is in this mode evicted from the L1 cache, serving all loads of speculatively modified data from L2 directly. In this case, the L1 does not have to use a four piece mock space as shown in FIG. 4-4-4, since no speculative writes are made to the L1. Instead, it can use a single physical addressing space that corresponds to the addresses of the main memory.

FIG. 4-4-8 shows a switch for choosing between these addressing modes. The processor 40052 chooses—responsive to computer program code produced by a programmer—whether to evict on write for short running speculation or do address aliasing for long-running speculation per FIGS. 4-4-3, 4-4-4 and 4-4-5.

In the case of switching between memory access modes here, a register 41312 at the entry of the L1P receives an address field from the processor 40052, as if the processor 40052 were requesting a main memory access, i.e., a memory mapped input/output operation (MMIO). The L1P diverts a bit called ID_evict 41313 from the register and forwards it both back to the processor 40052 and also to control the L1 caches.

A special purpose register SPR 41315 also takes some data from the path 41311, which is then AND-ed at 41314 to create a signal that informs the L1D 41306, i.e. the data cache whether write on evict is to be enabled. The instruction cache, L1I 41312 is not involved.

FIG. 4-4-9 is a flowchart describing operations of the short running speculation embodiment. At 41401, memory access is requested. This access is to be processed responsive to the switching mechanism of FIG. 4-4-8. This switch determines whether the memory access is to be in accordance with a mode called "evict on write" or not per 41402.

At 41403, it is determined whether current memory access is responsive to a store by a speculative thread. If so, there will be a write through from L1 to L2 at 41404, but the line will be deleted from the L1 at 41405.

If access is not a store by a speculative thread, there is a test as to whether the access is a load at 41406. If so, the system must determine at 41407 whether there is a hit in the L1. If so, data is served from L1 at 41408 and L2 is notified of the use of the data at 41409.

If there is not a hit, then data must be fetched from L2 at 41410. If L2 has a speculative version per 41411, the data should not be inserted into L1 per 41412. If L2 does not have a speculative version, then the data can be inserted into L1 per 41413.

If the access is not a load, then the system must test whether speculation is finished at 41414. If so, the speculative status should be removed from L2 at 41415.

If speculation is not finished, and none of the other conditions are met, then default memory access behavior occurs at 41416.

A programmer will have to determine whether or not to activate evict on write in response to application specific programming considerations. For instance, if data is to be used frequently, the addressing mechanism of FIG. 4-4-3 will likely be advantageous.

If many small sections of code without frequent data accesses are to be executed in parallel, the mechanism of short running speculation will likely be advantageous.

L1/L1P Hit Race Condition

FIG. 4-4-10 shows a simplified explanation of a race condition. When the L1P prefetches data, this data is not flagged by the L2 as read by the speculative thread. The same is true for any data residing in L1 when entering a transaction in TM.

In case of a hit in L1P or L1 for TM at 41001, a notification for this address is sent to L2 41002, flagging the line as speculatively accessed. If a write from another core at 41003 to that address reaches the L2 before the L1/L1P hit notification and the write caused invalidate request has not reached the L1 or L1P before the L1/L1P hit, the core could have used stale data and while flagging new data to be read in the L2. The L2 sees the L1/L1P hit arriving after the write at 41004 and cannot deduce directly from the ordering if a race occurred. However, in this case a use notification arrives at the L2 with the coherence bits of the L2 denoting that the core did not have a valid copy of the line, thus indicating a potential violation. To retain functional correctness, the L2 invalidates the affected speculation ID in this case at 41005.

Coherence

A thread starting a long-running speculation always begins with an invalidated L1, so it will not retain stale data from a previous thread's execution. Within a speculative domain, L1 invalidations become unnecessary in some cases:

- A thread later in program order writes to an address read by a thread earlier in program order. It would be unnecessary to invalidate the earlier thread's L1 copy, as this new data will not be visible to that thread.
- A thread earlier in program order writes to an address read by a thread later in program order. Here there are two cases. If the later thread has not read the address yet, it is not yet in the later thread's L1 (all threads start with invalidated L1's), so the read progresses correctly. If the later thread has already read the address, invalidation is unnecessary because the speculation rules require the thread to be killed.

A thread using short running speculation evicts the line it writes to from its L1 due to the proposed evict on speculative write. This line is evicted from other L1 caches as well based on the usual coherence rules. Starting from this point on, until the speculation is deemed either to be successful or its changes have been reverted, L1 misses for this line will be served from the L2 without entering the L1 and therefore no incoherent L1 copy can occur.

Between speculative domains, the usual multiprocessor coherence rules apply. To support speculation, the L2 routinely records thread IDs associated with reads; on a write, the L2 sends invalidations to all processors outside the domain that are marked as having read that address.

Access Size Signaling from the L1/L1p to the L2

Memory write accesses footprints are always precisely delivered to L2 as both L1 as well as L1P operate in write-through.

For reads however, the data requested from the L2 does not always match its actual use by a thread inside the core. However, both the L1 as well as the L1P provide methods to separate the actual use of the data from the amount of data requested from the L2.

The L1 can be configured such that it provides on a read miss not only the 64B line that it is requesting to be delivered, but also the section inside the line that is actually requested by the load instruction triggering the miss. It can also send requests to the L1P for each L1 hit that indicate which section of the line is actually read on each hit. This capability is activated and used for short running speculation. In long running speculation, L1 load hits are not reported and the L2 has to assume that the entire 64B section requested has been actually used by the requesting thread.

The L1P can be configured independently from that to separate L1P prefetch requests from actual L1P data use (L1P hits). If activated, L1P prefetches only return data and do not add IDs to speculative reader sets. L1P read hits return data to the core immediately and send to the L2 a request that informs the L2 about the actual use of the thread.

This disclosure arose in the course of development of a new generation of the IBM® BluGene® system. This new generation included several concepts, such as managing speculation in the L2 cache, improving energy efficiency, and using generic cores that conform to the PowerPC architecture usable in other systems such as PCs; however, the invention need not be limited to this context.

An addressing scheme can allow generic cores to be used for a new generation of parallel processing system, thus reducing research, development and production costs. Also creating a system in which prefetch units and L1D caches are shared by hardware threads within a core is energy and floor plan efficient.

FIG. 4-4-5 shows the role of the Translation Look-aside Buffers (TLB) 40241 in the address mapping process. The goal of the mapping process is to isolate each thread's view of the memory state inside the L1D. This is necessary to avoid making speculative memory changes of one thread visible in the L1D to another thread. It is achieved by assigning for a given virtual address different physical addresses to each thread. These addresses differ only in the upper address bits that are not used to distinguish locations within the smaller implemented main memory space. The left column 40501 shows a table with a column representing the virtual address matching component of the TLB. It matches the hardware thread ID (TID) of the thread executing the memory access and a column directed to the virtual address, in other words the 64 bit address used by the core. In this case, both thread ID 1 and thread ID 2 are seeking to access a virtual address, A. The right column 40502 shows the translation part of the TLB, a "physical address," in other words an address to the four piece address space shown in FIG. 4-4-4. In this case, the hardware thread with ID 1 is accessing a "physical address" that includes the main memory address A', corresponding to the virtual address A, plus an offset, $n_1$, indicating the first hardware thread. The hardware thread with ID 2 is accessing the "physical address" that includes the main memory address A' plus an offset, $n_2$, indicating the second hardware thread. Not only does the TLB keep track of a main memory address A', which is provided by a thread, but it also keeps track of a thread number $(0, n_1, n_2, n_3)$. This table happens to show two threads accessing the same main memory address A' at the same time, but that need not be the case. The hardware thread number—as opposed to the thread ID—combined with the address A', will be treated by the L1P as addresses of a four piece "address space" as shown in FIG. 4-4-4. This is not to say that the L1P is actually maintaining 256 GB of memory, which would be four times the main memory size. This address space is the conceptual result of the addressing scheme. The L1P acts as if it can address that much data in terms of addressing format, but in fact it targets considerably less cache lines than would be necessary to store that much data.

This address space will have at least four pieces, 40401, 40402, 40403, and 40404, because the embodiment of the core has four hardware threads. If the core had a different number of hardware threads, there could be a different number of pieces of the address space of the L1P. This address space allows each hardware thread to act as if it is running independently of every other thread and has an entire main memory to itself. The hardware thread number indicates to the L1P, which of the pieces is to be accessed.

When a line has been established by a speculative thread or a transaction, the rules for enforcing consistency change. When running purely non-speculative, only write accesses change the memory state; in the absence of writes the memory state can be safely assumed to be constant. When a speculatively running thread commits, the memory state as observed by other threads may also change. The memory subsystem does not have the set of memory locations that have been altered by the speculative thread instantly available at the time of commit, thus consistency has to be ensured by means other than sending invalidates for each affected address. This can be accomplished by taking appropriate action when memory writes occur.

Access Size Signaling from the L1/L1p to the L2

Memory write accesses footprints are always precisely delivered to L2 as both L1 as well as L1P operate in write-through.

For reads however, the data requested from the L2 does not always match its actual use by a thread inside the core. However, both the L1 as well as the L1P provide methods to separate the actual use of the data from the amount of data requested from the L2.

The L1 can be configured such that it provides on a read miss not only the 64B line that it is requesting to be delivered, but also the section inside the line that is actually requested by the load instruction triggering the miss. It can also send requests to the L1P for each L1 hit that indicate which section of the line is actually read on each hit. This capability is activated and used for short running speculation. In long running speculation, L1 load hits are not reported and the L2 has to assume that the entire 64B section requested has been actually used by the requesting thread.

The L1P can be configured independently from that to separate L1P prefetch requests from actual L1P data use (L1P hits). If activated, L1P prefetches only return data and do not add IDs to speculative reader sets. L1P read hits return data to the core immediately and send to the L2 a request that informs the L2 about the actual use of the thread.

The inventor here has discovered, that, surprisingly, given the extraordinary size of this type of supercomputer system, the caches, originally sources of efficiency and power reduction, have become significant power consumers—so that they themselves must be scrutinized to see how they can be improved.

The architecture of the current version of IBM® Blue Gene® supercomputer includes coordinating speculative execution at the level of the L2 cache, with results of speculative execution being stored by hashing a physical main memory address to a specific cache set—and using a software thread identification number along with upper address bits to direct memory accesses to corresponding ways of the set. The directory lookup for the cache becomes the conflict checking mechanism for speculative execution.

In a cache that has 16 ways, each memory access request for a given cache line, requires searching all 16 ways of the selected set along with elaborate conflict checking. When multiplied by the thousands of caches in the system, these lookups become energy inefficient—especially in the case where several sequential, or nearly sequential, lookups access the same line.

Thus the new generation of supercomputer gave rise to an environment where directory lookup becomes a significant component of the energy efficiency of the system. Accordingly, it would be desirable to save results of lookups in case they are needed by subsequent memory access requests.

The following document relates to write piggybacking in the context of DRAM controllers:

Shao, J. and Davis, B. T. 2007, "A Burst Scheduling Access Reordering Mechanism," In Proceedings of the 2007 IEEE 13th international Symposium on High Performance Computer Architecture (February 10-14, 2007). HPCA. IEEE Computer Society, Washington, D.C., 285-294. DOI=http://dx.doi.org/10.1109/HPCA.2007.346206

This article is incorporated by reference herein.

It would be desirable to reduce directory SRAM accesses to reduce power and increase throughput in accordance with one or both of the following methods:

1. On hit, store cache address and selected way in a register
   a. Match subsequent incoming requests and addresses of line evictions against the register
   b. If encountering a matching request and no eviction has been encountered yet, use way from register without directory SRAM look-up
2. Reorder requests pending in the request queue such that same set accesses will execute in subsequent cycles
3. Reuse directory SRAM look-up information for subsequent access using bypass These methods are especially effective if the memory access request generating unit can provide a hint whether this location might be accessed soon or if the access request type implies that other cores will access this location soon, e.g., atomic operation requests for barriers.

Throughout this disclosure a particular embodiment of a multi-processor system will be discussed. This discussion may include various numerical values. These numerical values are not intended to be limiting, but only examples. One of ordinary skill in the art might devise other examples as a matter of design choice.

The present invention arose in the context of the IBM® Blue Gene® project, which is further described in the applications incorporated by reference above. FIG. 4-5-1 is a schematic diagram of an overall architecture of a multiprocessor system in accordance with this project, and in which the invention may be implemented. At 4101, there are a plurality of processors operating in parallel along with associated prefetch units and L1 caches. At 4102, there is a switch. At 4103, there are a plurality of L2 slices. At 4104, there is a main memory unit. It is envisioned, for the preferred embodiment, that the L2 cache should be the point of coherence.

FIG. 4-4-2 shows a cache slice. It includes arrays of data storage 40101, and a central control portion 40102.

FIG. 4-5-3 shows features of an embodiment of the control section 4102 of a cache slice 72.

Coherence tracking unit 4301 issues invalidations, when necessary. These invalidations are issued centrally, while in the prior generation of the Blue Gene® project, invalidations were achieved by snooping.

The request queue 4302 buffers incoming read and write requests. In this embodiment, it is 16 entries deep, though other request buffers might have more or less entries. The addresses of incoming requests are matched against all pending requests to determine ordering restrictions. The queue presents the requests to the directory pipeline 4308 based on ordering requirements.

The write data buffer 4303 stores data associated with write requests. This buffer passes the data to the eDRAM pipeline 4305 in case of a write hit or after a write miss resolution.

The directory pipeline 4308 accepts requests from the request queue 4302, retrieves the corresponding directory set from the directory SRAM 4309, matches and updates the tag information, writes the data back to the SRAM and signals the outcome of the request (hit, miss, conflict detected, etc.).

The L2 implements four parallel eDRAM pipelines 4305 that operate independently. They may be referred to as eDRAM bank 0 to eDRAM bank 3. The eDRAM pipeline controls the eDRAM access and the dataflow from and to this macro. If writing only subcomponents of a doubleword or for load-and-increment or store-add operations, it is responsible to schedule the necessary RMW cycles and provide the dataflow for insertion and increment.

The read return buffer 4304 buffers read data from eDRAM or the memory controller 78 and is responsible for scheduling the data return using the switch 60. In this embodiment it has a 32B wide data interface to the switch. It is used only as a staging buffer to compensate for backpressure from the switch. It is not serving as a cache.

The miss handler 4307 takes over processing of misses determined by the directory. It provides the interface to the DRAM controller and implements a data buffer for write and read return data from the memory controller.

The reservation table 4306 registers and invalidates reservation requests.

In the current embodiment of the multi-processor, the bus between the L1 to the L2 is narrower than the cache line width by a factor of 8. Therefore each write of an entire L2 line, for instance, will require 8 separate transmissions to the L2 and therefore 8 separate lookups. Since there are 16 ways, that means a total of 128 way data retrievals and matches. Each lookup potentially involves all this conflict checking that was just discussed, which can be very energy-consuming and resource intensive.

Therefore it can be anticipated that—at least in this case—an access will need to be retained. A prefetch unit can annotate its request indicating that it is going to access the same line again to inform the L2 slice of this anticipated requirement.

Certain instruction types, such as atomic operations for barriers, might result in an ability to anticipate sequential memory access requests using the same data.

One way of retaining a lookup would be to have a special purpose register in the L2 slice that would retain an identification of the way in which the requested address was found. Alternatively, more registers might be used if it were desired to retain more accesses.

Another embodiment for retaining a lookup would be to actually retain data associated with a previous lookup to be used again.

An example of the former embodiment of retaining lookup information is shown in FIG. 4-5-4. The L2 slice 4072 includes a request queue 4302. At 4311, a cascade of modules tests whether pending memory access requests will require data associated with the address of a previous request, the address being stored at 4313. These tests might look for memory mapped flags from the L1 or for some other identification. A result of the cascade 4311 is used to create a control input at 4314 for selection of the next queue entry for lookup at 4315, which becomes an input for the directory look up module 4312. These mechanisms can be used for reordering, analogously to the Shao article above, i.e., selecting a matching request first. Such reordering, together with the storing of previous lookup results, can achieve additional efficiencies.

FIG. 4-5-5 shows more about the interaction between the directory pipe 4308 and the directory SRAM 4309. The vertical lines in the pipe represent time intervals during which data passes through a cascade of registers in the directory pipe. In a first time interval T1, a read is signaled to the directory SRAM. In a second time interval T2, data is read from the directory SRAM. In a third time interval, T3, the directory matching phase may alter directory data and a table lookup informs writes WR and WR DATA to the directory SRAM provide it via the Write and Write Data ports to the directory SRAM. In general, table lookup will govern the behavior of the directory SRAM to control cache accesses responsive to speculative execution. Only one table lookup is shown at T3, but more might be implemented. More detail about the lookup is to be found in the applications incorporated by reference herein, but, since coherence is primarily implemented in this lookup, it is an elaborate process. In particular, in the current embodiment, speculative results from different concurrent processes may be stored in different ways of the same set of the cache. Records of memory access requests and line evictions during concurrent speculative execution will be retained this directory. Moreover, information from cache lines, such as whether a line is shared by several cores, may be retained in the directory. Conflict checking will include checking these records and identifying an appropriate way to be used by a memory access request. Retaining lookup information can reduce use of this conflict checking mechanism.

A traditional store-operate instruction reads from, modifies, and writes to a memory location as an atomic operation. The atomic property allows the store-operate instruction to be used as a synchronization primitive across multiple threads. For example, the store- and instruction atomically reads data in a memory location, performs a bitwise logical- and operation of data (i.e., data described with the store-add instruction) and the read data, and writes the result of the logical- and operation into the memory location. The term store-operate instruction also includes the fetch-and-operate instruction (i.e., an instructions that returns a data value from a memory location and then modifies the data value in the memory location). An example of a traditional fetch-and-operate instruction is the fetch-and-increment instruction (i.e., an instruction that returns a data value from a memory location and then increments the value at that location).

In a multi-threaded environment, the use of store-operate instructions may improve application performance (e.g., better throughput, etc.). Because atomic operations are performed within a memory unit, the memory unit can satisfy a very high rate of store-operate instructions, even if the instructions are to a single memory location. For example, a memory system of IBM® Blue Gene®/Q computer can perform a store-operate instruction every 4 processor cycles. Since a store-operate instruction modifies the data value at a memory location, it traditionally invokes a memory coherence operation to other memory devices. For example, on the IBM® Blue Gene®/Q computer, a store-operate instruction can invoke a memory coherence operation on up to 15 level-1 (L1) caches (i.e., local caches). A high rate (e.g., every 4 processor cycles) of traditional store-operate instructions thus causes a high rate (e.g., every 4 processor cycles) of memory coherence operations which can significantly occupy computer resources and thus reduce application performance.

The present disclosure further describes a method, system and computer program product for performing various store-operate instructions in a parallel computing system that reduces the number of cache coherence operations and thus increases application performance.

In one embodiment, there are provided various store-operate instructions available to a computing device to reduce the number of memory coherence operations in a parallel computing environment that includes a plurality of processors, at least one cache memory and at least one main memory. These various provided store-operate instructions are variations of a traditional store-operate instruction that atomically modify the data (e.g., bytes, bits, etc.) at a (cache or main) memory location. These various provided store-operate instructions include, but are not limited to: StoreOperateCoherenceOnValue instruction, StoreOperateCoherenceThroughZero instruction and StoreOperateCoherenceOnPredecessor instruction. In one embodiment, the term store-operate instruction(s) also includes the fetch-and-operate instruction(s). These various provided fetch-and-operate instructions thus also include, but are not limited to: FetchAndOperateCoherenceOnValue instruction, FetchAndOperateCoherenceThroughZero instruction and FetchAndOperateCoherenceOnPredecessor instruction.

In one aspect, a StoreOperateCoherenceOnValue instruction is provided that improves application performance in a parallel computing environment (e.g., IBM® Blue Gene® computing devices L/P, etc. such as described in herein incorporated US Provisional Application Ser. No. 61/295,669), by reducing the number of cache coherence operations invoked by a functional unit (e.g., a functional unit 35120 in FIG. 4-6-1). The StoreOperateCoherenceOnValue instruction invokes a cache coherence operation only when the result of a store-operate instruction is a particular value or set of values. The particular value may be given by the instruction issued from a processor in the parallel computing environment. The StoreOperateCoherenceThroughZero instruction invokes a cache coherence operation only when data (e.g., a numerical value) in a (cache or main) memory location described in the StoreAddCoherenceThroughZero instruction changes from a positive value to a negative value, or vice versa. The StoreOperateCoherenceOnPredecessor instruction invokes a cache coherence operation only when the result of a StoreOperateCoherenceOnPredecessor instruction is equal to data (e.g., a numerical value) stored in a preceding memory location of a logical memory address described in the StoreOperateCoherenceOnPredecessor instruction. These instructions are described in detail in conjunction with FIGS. 4-6-2A-4-6-4B.

The FetchAndOperateCoherenceOnValue instruction invokes a cache coherence operation only when a result of the fetch-and-operate instruction is a particular value or set of values. The particular value may be given by the instruction issued from a processor in the parallel computing environment. The FetchAndOperateCoherenceThroughZero instruction invokes a cache coherence operation only when data (e.g., a numerical value) in a (cache or main) memory location described in the fetch-and-operate instruction changes from a positive value to a negative value, or vice versa. The FetchAndOperateCoherenceOnPredecessor instruction invokes a cache coherence operation only when the result of a fetch-and-operate instruction (i.e., the read data value in a memory location described in the fetch-and-operate instruction) is equal to particular data (e.g., a particular numerical value) stored in a preceding memory location of a logical memory address described in the fetch-and-operate instruction.

FIG. 4-6-1 illustrates a portion of a parallel computing environment 35100 employing the system and method of the present invention in one embodiment. The parallel computing environment may include a plurality of processors (Processor 1 (35135), Processor 2 (35140), . . . , and Processor N (35145)). In one embodiment, these processors are heterogeneous (e.g., a processor is IBM® PowerPC®, another processor is Intel® Core). In another embodiment, these processors are homogeneous (i.e., identical each other). A processor may include at least one local cache memory device. For example, a processor 1 (35135) includes a local cache memory device 35165. A processor 2 (35140) includes a local cache memory device 35170.

A processor N (35145) includes a local cache memory device 35175. In one embodiment, the term processor may also refer to a DMA engine or a network adaptor 35155 or similar equivalent units or devices. One or more of these processors may issue load or store instructions. These load or store instructions are transferred from the issuing processors, e.g., through a cross bar switch 35110, to an instruction queue 35115 in a memory or cache unit 35105. A functional unit (FU) 35120 fetches these instructions from the instruction queue 35115, and runs these instructions. To run one or more of these instructions, the FU 35120 may retrieve data stored in a cache memory 35125 or in a main memory (not shown) via a main memory controller 35130. Upon completing the running of the instructions, the FU 35120 may transfer outputs of the run instructions to the issuing processor or network adaptor via the network 35110 and/or store outputs in the cache memory 35125 or in the main memory (not shown) via the main memory controller 35130. The main memory controller 35130 is a traditional memory controller that manages data flow between the main memory device and other components (e.g., the cache memory device 35125, etc.) in the parallel computing environment 35100.

FIGS. 4-6-2A-4-6-2B illustrates operations of the FU 35120 to run the StoreOperateCoherenceOnValue instruction in one embodiment. The FU 35120 fetches an instruction 35240 from the instruction queue 35115. FIG. 4-6-5 illustrates composition of the instruction 35240 in one embodiment. The instruction 35240 includes an Opcode 35505 specifying what is to be performed by the FU 35120 (e.g., reading data from a memory location, storing data to a memory location, store-add, store, max or other store-operate instruction, fetch-and-increment, fetch-and-decrement or other fetch-and-operate instruction, etc.). The Opcode 35505 may include further information e.g., the width of an operand value 35515. The instruction 35240 also includes a logical address 35510 specifying a memory location from which data is to be read and/or stored. In the case of a store instruction, the instruction 35240 includes the operand value 35515 to be stored to the memory location. Similarly, in the case of a store-operate instruction, the instruction 35240 includes the operand value 35515 to be used in an operation with an existing memory value with an output value to be stored to the memory location. Similarly, in the case of a fetch-and-operate instructions, the instruction 35240 may include an operand value 35515 to be used in an operation with the existing memory value with an output value to be stored to the memory location. Alternatively, the operand value 35515 may correspond to a unique identification number of a register. The instruction 35240 may also include an optional field 35520 whose value is used by a store-operate or fetch-and-operate instruction to determine if a cache coherence operation should be invoked. In one embodiment, the instruction 35240, including the optional field 35520 and the Opcode 35505 and the logical address 35510, but excluding the operand value 35515, has a width of 32 bits or 64 bits or other widths. The operand value 35515 typically has widths of 1 byte, 4 byte, 8 byte, 16 byte, 32 byte, 64 byte, 128 byte or other widths.

In one embodiment, the instruction 35240 specifies at least one condition under which a cache coherence operation is invoked. For example, the condition may specifies a particular value, e.g., zero.

Upon fetching the instruction 35240 from the instruction queue 35115, the FU 35120 evaluates 35200 whether the instruction 35240 is a load instruction, e.g., by checking whether the Opcode 35505 of the instruction 35240 indicates that the instruction 35240 is a load instruction. If the instruction 35240 is a load instruction, the FU 35120 reads 35220 data stored in a (cache or main) memory location corresponding to the logical address 35510 of the instruction 35240, and uses the crossbar 35110 to return the data to the issuing processor. Otherwise, the FU 35120 evaluates 35205 whether the instruction 35240 is a store instruction, e.g., by checking whether the Opcode 35505 of the instruction 35240 indicates that the instruction 35240 is a store instruction. If the instruction 35240 is a store instruction, the FU 35120 transfers 35225 the operand value 35515 of the instruction 35240) to a (cache or main) memory location corresponding to the logical address 35510 of the instruction 35240. Because a store instruction changes the value at a memory location, the FU 35120 invokes 35225, e.g. via cross bar 35110, a cache coherence operation on other memory devices such as L1 caches 35165—35175 in processors—35135-35145. Otherwise, the FU 35120 evaluates 35210 whether the instruction 35240 is a store-operate or fetch-and-operate instruction, e.g., by checking whether the Opcode 35505 of the instruction 35240 indicates that the instruction 35240 is a store-operate or fetch-and-operate instruction.

If the instruction 35240 is a store-operate instruction, the FU 120 reads 35230 data stored in a (cache or main) memory location corresponding to the logical address 35510 of the instruction 35240, modifies 35230 the read data with the operand value 35515 of the instruction, and writes 35230 the result of the modification to the (cache or main) memory location corresponding to the logical address 35510 of the instruction. Alternatively, the FU modifies 35230 the read data with data stored in a register (e.g., accumulator) corresponding to the operand value 35515, and writes 35230 the result to the memory location. Because a store-operate instruction changes the value at a memory location, the FU 35120 invokes 35225, e.g. via cross bar 35110, a cache coherence operation on other memory devices such as L1 caches 35165-35175 in processors—35135-35145.

If the instruction 35240 is a fetch-and-operate instruction, the FU 35120 reads 35230 data stored in a (cache or main) memory location corresponding to the logical address 35510 of the instruction 35240 and return, via the crossbar 35110, the data to the issuing processor. The FU then modifies 35230 the data, e.g., with an operand value 35515 of the instruction 35240, and writes 35230 the result of the modification to the (cache or main) memory location. Alternatively, the FU modifies 35230 the data stored in the (cache or main) memory location, e.g., with data stored in a register (e.g., accumulator) corresponding to the operand value 35515, and writes the result to the memory location. Because a fetch-and-operate instruction changes the value at a memory location, the FU 35120 invokes 35225, e.g. via cross bar 35110, a cache coherence operation on other memory devices such as L1 caches 35165-35175 in processors 35135-35145.

Otherwise, the FU 35120 evaluates 35215 whether the instruction 35240 is a StoreOperateCoherenceOnValue instruction or FetchAndOperateCoherenceOnValue instruction, e.g., by checking whether the Opcode 35505 of the instruction 35240 indicates that the instruction 35240 is a StoreOperateCoherenceOnValue instruction. If the instruction 35240 is a StoreOperateCoherenceOnValue instruction, the FU 35120 performs operations 35235 which is shown in detail in FIG. 4-6-2B. The StoreOperateCoherenceOnValue instruction 35235 includes the Store Operate operation 35230 described above. The StoreOperateCoherenceOnValue instruction 35235 invokes a cache coherence operation on other memory devices when the condition specified in the StoreOperateCoherenceOnValue instruction is satisfied. As shown in FIG. 4-6-2B, upon receiving from the instruction queue 35115 the StoreOperateCoherenceOnValue instruction, the FU 120 performs the store-operate operation described in the StoreOperateCoherenceOnValue instruction. The FU 35120 evaluates 35260 whether the result 35246 of the store-operate operation is a particular value. In one embodiment, the particular value is implicit in the Opcode 35505, for example, a value zero. In one embodiment, as shown in FIG. 4-6-5, the instruction may include an optional field 35520 that specifies this particular value. The FU 35240 compares the result 35246 to the particular value implicit in the Opcode 35505 or explicit in the optional field 35520 in the instruction 35240. If the result is the particular value, the FU 35120 invokes 35255, e.g. via cross bar 35110, a cache coherence operation on other memory devices such as L1 caches 35165-35175 in processors 35135-35145. Otherwise, if the result 35246 is not the particular value, the FU 35120 does not invoke 35250 a cache coherence operation on other memory devices.

If the instruction 35240 is a FetchAndOperateCoherenceOnValue instruction, the FU 35120 performs operations 35235 which is shown in detail in FIG. 4-6-2B. The FetchAndOperateCoherenceOnValue instruction 35235 includes the FetchAndOperate operation 35230 described above. The FetchandOperateCoherenceOnValue instruction 35235 invokes a cache coherence operation on other memory devices only if a condition specified in the FetchandOperateCoherenceOnValue instruction 35235 is satisfied. As shown in FIG. 4-6-2B, upon receiving from the instruction queue 35115 the FetchAndOperateCoherenceOnValue instruction 35240, the FU 35120 performs a fetch-and-operate operation described in the FetchAndOperateCoherenceOnValue instruction. The FU 35120 evaluates 35260 whether the result 35246 of the fetch-and-operate operation is a particular value. In one embodiment, the particular value is implicit in the Opcode 35505, for example, a numerical value zero. In one embodiment, as shown in FIG. 4-6-5, the instruction may include an optional field 35520 that includes this particular value. The FU 35240 compares the result value 35246 to the particular value implicit in the Opcode 35505 or explicit in the optional field 35520 in the instruction 35240. If the result value 34246 is the particular value, the FU 35120 invokes 35255 e.g. via cross bar 35110, a cache coherence operation on other memory devices, e.g., L1 caches 35165-35175 in processors 35135-35145. Otherwise, if the result is not the particular value, the FU 35120 does not invoke 35250 the cache coherence operation on other memory devices.

In one embodiment, the StoreOperateCoherenceOnValue 35240 instruction described above is a StoreAddInvalidateCoherenceOnZero instruction. The value in a memory location at the logical address 35510 is considered to be an integer value. The operand value 35515 is also considered to be an integer value. The StoreAddInvalidateCoherenceOnZero instruction adds the operand value to the previous memory value and stores the result of the addition as a new memory value in the memory location at the logical address 35510. In one embodiment, a network adapter 35155 may use the StoreAddInvalidateCoherenceOnZero instruction. In this embodiment, the network adaptor 35155 interfaces the parallel computing environment 35100 to a network 35160 which may deliver a message as out-of-order packets. A complete reception of a message can be recognized by initializing a counter to the number of bytes in the message and then having the network adaptor decrement the counter by the number of bytes in each arriving packet. The memory device 35105 is of a size that allows any location in a (cache) memory device to serve as such a counter for each message. Applications on the processors 35135-35145 poll the counter of each message to determine if a message has completely arrived. On reception of each packet, the network adaptor can issue a StoreAddInvalidateCoherenceOnZero instruction 35240 to the memory device 35105. The Opcode 35505 specifies the StoreAddInvalidateCoherenceOnZero instruction. The logical address 35510 is that of the counter. The operand value 35515 is a negative value of the number of received bytes in the packet. In this embodiment, only when the counter reaches the value 0, the memory device 35105 invokes a cache coherence operation to the level-1 (L1) caches of the processors 35135-35145. This improves the performance of the application, since the application demands the complete arrival of each message and is uninterested in a message for which all packets have not yet arrived and only invokes the cache coherence operation only when all packets of the message arrives at the network adapter 35155. By contrast, the application performance on the processors 35135-35145 may be decreased if the network adaptor 35155 issues a traditional Store-Add instruction, since then each of the processors 35135-35145 would then receive and serve an unnecessary cache coherence operation upon the arrival of each packet.

In one embodiment, the FetchAndOperateCoherenceOnZero instruction 35240 described above is a FetchAndDecrementCoherenceOnZero instruction. The value in a memory location at the logical address 35510 is considered to be an integer value. There is no accompanying operand value 35515. The FetchAndIncrementCoherenceOnZero instruction returns the previous value of the memory location and then increments the value at the memory location. In one embodiment, the processors 35135-35145 may use the FetchAndIncrementCoherenceOnZero instruction to implement a barrier (i.e., a point where all participating threads must arrive, and only then can the each thread proceed with its execution). The barrier uses a memory location in the memory device 30105 (e.g., a shared cache memory device) as a counter. The counter is initialized with the number of threads to participate in the barrier. Each thread, upon arrival at the barrier issues a FetchAndDecrementCoherenceOnZero instruction 35240 to the memory device 35105. The Opcode 35505 specifies the FetchAndDecrementCoherenceOnZero instruction. The memory location of the logical address 35510 stores a value of the counter. The value "1" is returned by the FetchAndDecrementCoherenceOnZero instruction to the last thread arriving at the barrier and the value "0" is stored to the memory location and a cache coherence operation is invoked. Given this value "1", the last thread knows all threads have arrived at the barrier and thus the last thread can exit the barrier. For the other earlier threads to arrive at the barrier, the value "1" is not returned by the FetchAndDecrementCoherenceOnZero. So, each of these threads polls the counter for the value 0 indicating that all threads have arrived. Only when the counter reaches the value "0," the FetchAndDecrementCoherenceOnZero instruction causes the memory device 35105 to invoke a cache coherence operation to the level-1 (L1) caches 35165-35175 of the processors 35135-35145. This FetchAndDecrementCoherenceOnZero instruction thus helps reduce computer resource usage in a barrier and thus helps improve the application performance. The polling mainly uses the L1-cache (local cache memory device in a processor; local cache memory devices 35165-35175) of each processor 35135-35145. By contrast, the barrier performance may be decreased if the barrier used a traditional Fetch-And-Decrement instruction, since then each of the processors 35135-35145 would then receive and serve an unnecessary cache coherence operation on the arrival of each thread into the barrier and thus would cause polling to communicate more with the memory device 35105 and communicate less with local cache memory devices.

FIGS. 4-6-3A-4-6-3B illustrate operations of the FU 35120 to run a StoreOperateCoherenceOnPredecessor instruction or FetchAndOperateCoherenceOnPredecessor instruction in one embodiment. FIGS. 4-6-3A-4-6-3B are similar to FIGS. 4-6-2A-4-6-2B except that the FU evaluates 35300 whether the instruction 35240 is the StoreOperateCoherenceOnPredecessor instruction or FetchAndOperateCoherenceOnPredecessor instruction, e.g., by checking whether the Opcode 35505 of the instruction 35240 indicates that the instruction 35240 is a StoreOperateCoherenceOnPredecessor instruction. If the instruction 35240 is a StoreOperateCoherenceOnPredecessor instruction, the FU 35120 performs operations 35310 which is shown in detail in FIG. 4-6-3B. The StoreOperateCoherenceOnPredecessor instruction 35310 is similar to the StoreOperateCoherenceOnValue operation 35235 described above, except that the StoreOperateCoherenceOnPredecessor instruction 35310 uses a different criterion to determine whether or not to invoke a cache coherence operation on other memory devices. As shown in FIG. 4-6-3B, upon receiving from the instruction queue 35115 the StoreOperateCoherenceOnPredecessor instruction, the FU 35120 performs the store-operate operation described in the StoreOperateCoherenceOnPredecessor instruction. The FU 35120 evaluates 35320 whether the result 35346 of the store-operate operation is equal to the value stored in the preceding memory location (i.e., logical address-1). If equal, the FU 35120 invokes 35255, e.g. via cross bar 35110, a cache coherence operation on other memory devices (e.g., local cache memories in processors 35135-35145). Otherwise, if the result 35346 is not equal to the value in the preceding memory location, the FU 35120 does not invoke 35250 a cache coherence operation on other memory devices.

If the instruction 35240 is a FetchAndOperateCoherenceOnPredecessor instruction, the FU 35120 performs operations 35310 which is shown in detail in FIG. 4-6-3B. The FetchAndOperateCoherenceOnPredecessor instruction 35310 is similar to FetchAndOperateCoherenceOnValue operation 35235 described above, except that the FetchAndOperateCoherenceOnPredecessor operation 35310 uses a different criterion to determine whether or not to invoke a cache coherence operation on other memory devices. As shown in FIG. 4-6-3B, upon receiving from the instruction queue 35115 the FetchAndOperateCoherenceOnPredecessor instruction, the FU 35120 performs the fetch-and-operate operation described in the FetchAndOperateCoherenceOnPredecessor instruction. The FU 35120 evaluates 35320 whether the result 35346 of the fetch-and-operate operation is equal to the value stored in the preceding memory location. If equal, the FU 35120 invokes 35255, e.g. via cross bar 35110, a cache coherence operation on other memory devices (e.g., L1 cache memories in processors 35135-35145). Otherwise, if the result 35346 is not equal to the value in the preceding memory location, the FU 35120 does not invoke 35250 a cache coherence operation on other memory devices.

FIGS. 4-6-4A-4-6-4B illustrate operations of the FU 35120 to run a StoreOperateCoherenceThroughZero instruction or FetchAndOperateCoherenceThroughZero instruction in one embodiment. FIGS. 4-6-4A-4-6-4B are similar to FIGS. 4-6-2A-4-6-2B except that the FU evaluates 35400 whether the instruction 35240 is the StoreOperateCoherenceThroughZero instruction or FetchAndOperateCoherenceThroughZero instruction, e.g., by checking whether the Opcode 35505 of the instruction 35240 indicates that the instruction 35240 is a StoreOperateCoherenceThroughZero instruction. If the instruction 35240 is a StoreOperateCoherenceThroughZero instruction, the FU 35120 performs operations 35410 which is shown in detail in FIG. 4-6-4B. The StoreOperateCoherenceThroughZero operation 35410 is similar to the StoreOperateCoherenceOnValue operation 35235 described above, except that the StoreOperateCoherenceThroughZero operation 35410 uses a different criterion to determine whether or not to invoke a cache coherence operation on other memory devices. As shown in FIG. 4-6-4B, upon receiving from the instruction queue 35115 the StoreOperateCoherenceThroughZero instruction, the FU 35120 performs the store-operate operation described in the StoreOperateCoherenceThroughZero instruction. The FU 35120 evaluates 35420 whether a sign (e.g., positive (+) or negative (−)) of the result 35446 of the store-operate is an opposite to a sign of an original value in the memory location corresponding to the logical address 35510. If opposite, the FU 35120 invokes 35255, e.g. via cross bar 35110, a cache coherence operation on other memory devices (e.g., L1 caches 35165-35175 in processors 35135-35145). Otherwise, if the result 35446 does not have the opposite sign of the original value in the memory location, the FU 35130 does not invoke 35250 a cache coherence operation on other memory devices.

If the instruction 35240 is a FetchAndOperateCoherenceThroughZero instruction, the FU 35120 performs operations 35410 which is shown in detail in FIG. 4-6-4B. The FetchAndOperateCoherenceThroughZero operation 35410 is similar to the FetchAndOperateCoherenceOnValue operation 35235 described above, except that the FetchAndOperateCoherenceThroughZero operation 35410 uses a different criterion to determine whether or not to invoke a cache coherence operation on other memory devices. As shown in FIG. 4-6-4B, upon receiving from the instruction queue 35115 the FetchAndOperateCoherenceThroughZero instruction, the FU 35120 performs the fetch-and-operate operation described in the FetchAndOperateCoherenceThroughZero instruction. The FU 35120 evaluates 35420 whether a sign of the result 35446 of the fetch-and-operate operation is opposite to the sign of an original value in the memory location. If opposite, the FU 35120 invokes 35255, e.g. via cross bar 35110, a cache coherence operation on other memory devices (e.g., in processors 35135-35145). Otherwise, if the result 35446 does not have the opposite sign of the original value in the memory location, the FU 35120 does not invoke 35250 a cache coherence operation on other memory devices.

In one embodiment, the store-operate operation described in the StoreOperateCoherenceOnValue or StoreOperateCoherenceOnPredecessor or StoreOperateCoherenceThroughZero includes one or more of the following traditional operations that include, but are not limited to: StoreAdd, StoreMin and StoreMax, each with variations for signed integers, unsigned integers or floating point numbers, Bitwise StoreAnd, Bitwise StoreOr, Bitwise StoreXor, etc.

In one embodiment, the Fetch-And-Operate operation described in the FetchAndOperateCoherenceOnValue or FetchAndOperateCoherenceOnPredecessor or FetchAndOperateCoherenceThroughZero includes one or more of the following traditional operations that include, but are not limited to: FetchAndIncrement, FetchAndDecrement, FetchAndClear, etc.

In one embodiment, the width of the memory location operated by the StoreOperateCoherenceOnValue or StoreOperateCoherenceOnPredecessor or StoreOperateCoherenceThroughZero or FetchAndOperateCoherenceOnValue or FetchAndOperateCoherenceOnPredecessor or FetchAndOperateCoherenceThroughZero includes, but is not limited to: 1 byte, 2 byte, 4 byte, 8 byte, 16 byte, and 32byte, etc.

In one embodiment, the FU 35120 performs the evaluations 35200-35215, 35300 and 35400 sequentially. In another embodiment, the FU 35120 performs the evaluations 35200-35215, 35300 and 35400 concurrently, i.e., in parallel. For example, FIG. 4-6-6 illustrates the FU 35120 performing these evaluations in parallel. The FU 35120 fetches the instruction 35240 from the instruction 35115. The FU 35120 provides the same fetched instruction 35240 to comparators 35600-35615 (i.e., comparators that compares the Opcode 35505 of the instruction 35240 to a particular instruction set). In one embodiment, a comparator implements an evaluation step (e.g., the evaluation 35200 shown in FIG. 4-6-2A). For example, a comparator 35600 compares the Opcode 35505 of the instruction 35240 to a predetermined Opcode corresponding to a load instruction. In one embodiment, there are provided at least six comparators, each of which implements one of these evaluations 35200-35215, 35300 and 35400. The FU 35120 operates these comparators in parallel. When a comparator finds a match between the Opcode 35505 of the instruction 35240 and a predetermined Opcode in an instruction set (e.g., a predetermined Opcode of StoreOperateCoherenceOnValue instruction), the FU performs the corresponding operation (e.g., the operation 35235). In one embodiment, per an instruction, only a single comparator finds a match between the Opcode of that instruction and a predetermined Opcode in an instruction set.

In one embodiment, threads or processors concurrently may issue one of these instructions (e.g., StoreOperateCoherenceOnValue instruction, StoreOperateCoherenceThroughZero instruction, StoreOperateCoherenceOnPredecessor instruction, FetchAndOperateCoherenceOnValue instruction, FetchAndOperateCoherenceThroughZero instruction, FetchAndOperateCoherenceOnPredecessor instruction) to a same (cache or main) memory location. Then, the FU 35120 may run these concurrently issued instructions every few processor clock cycles, e.g., in parallel or sequentially. In one embodiment, these instructions (e.g., StoreOperateCoherenceOnValue instruction, StoreOperateCoherenceThroughZero instruction, StoreOperateCoherenceOnPredecessor instruction, FetchAndOperateCoherenceOnValue instruction, FetchAndOperateCoherenceThroughZero instruction, FetchAndOperateCoherenceOnPredecessor instruction) are atomic instructions that atomically implement operations on cache lines.

In one embodiment, the FU 35120 is implemented in hardware or reconfigurable hardware, e.g., FPGA (Field Programmable Gate Array) or CPLD (Complex Programmable Logic Device), e.g., by using a hardware description language (Verilog, VHDL, Handel-C, or System C). In another embodiment, the FU 35120 is implemented in a semiconductor chip, e.g., ASIC (Application-Specific Integrated Circuit), e.g., by using a semi-custom design methodology, i.e., designing a chip using standard cells and a hardware description language.

It would be desirable to allow for multiple modes of speculative execution concurrently in a multiprocessor system.

In one embodiment, a computer method includes carrying out operations in a multiprocessor system. The operations include:

running at least one program thread within at least one processor of the system;

recognizing a need for speculative execution in the thread;

allocating a speculation ID to the thread;

managing a pool of speculation IDs in accordance with a plurality of domains, such that IDs are allocated independently for each domain; and allocating a mode of speculative execution to each domain In another embodiment, the operations include allocating at least one identification number to a thread executing speculatively;

maintaining directory based speculation control responsive to the identification number;

counting instances of use of the identification number being active in the multiprocessor system; and preventing the identification number from being allocated to a new thread until the counting indicates no instances of use of that ID being active in the system.

In yet another embodiment, a multiprocessor system includes:

a plurality of processors adapted to run threads of program code in parallel in accordance with speculative execution; and facilities adapted to enable a first thread to operate in accordance with a first mode of speculative execution and a second thread to operate in accordance with a second mode of speculative execution, the first and second modes of speculative execution being different from one another and concurrent.

It would be desirable to prevent speculative memory accesses from going to main memory to improve efficiency of a multiprocessor system.

In one embodiment, a method for managing memory accesses in a multiprocessor system includes carrying out operations within the system. The operations include:

running threads in parallel in a plurality of parallel processors;

holding speculative writes in a cache memory; and allowing non-speculative writes to go to main memory.

In another embodiment, a cache memory for use in a multiprocessor system includes:

a central unit adapted to maintain at least one central state indication with respect to speculative execution in the processors; and communications facilities adapted to communicate with processors of the system regarding status of speculative execution responsive to the central state indication.

Yet another embodiment is a cache control system for use in a multiprocessor system including a plurality of processors configured for running threads in accordance with speculative execution, a plurality of caches, a main memory.

This cache control system includes a central unit which includes:

a central state recording device adapted to record states of speculative threads; and memory access controls, responsive to the state recording device, adapted to prevent threads that are not committed from writing to main memory.

The term "thread" is used herein. A thread can be either a hardware thread or a software thread. A hardware thread within a core processor includes a set of registers and logic for executing a software thread. The software thread is a segment of computer program code. Within a core, a hardware thread will have a thread number. For instance, in the A2, there are four threads, numbered zero through three. Throughout a multiprocessor system, such as the nodechip 50 of FIG. 1-0, 68 software threads can be executed concurrently in the present embodiment.

These threads can be the subject of "speculative execution," meaning that a thread or threads can be started as a sort of wager or gamble, without knowledge of whether the thread can complete successfully. A given thread cannot complete successfully if some other thread modifies the data that the given thread is using in such a way as to invalidate the given thread's results. The terms "speculative," "speculatively," "execute," and "execution" are terms of art in this context. These terms do not imply that any mental step or manual operation is occurring. All operations or steps described herein are to be understood as occurring in an automated fashion under control of computer hardware or software.

Speculation Model

This section describes the underlying speculation ID based memory speculation model, focusing on its most complex usage mode, speculative execution (SE), also referred to as thread level speculation (TLS). When referring to threads, the terms older/younger or earlier/later refer to their relative program order (not the time they actually run on the hardware).

Multithreading Model

In Speculative Execution, successive sections of sequential code are assigned to hardware threads to run simultaneously. Each thread has the illusion of performing its task in program order. It sees its own writes and writes that occurred earlier in the program. It does not see writes that take place later in program order even if, because of the concurrent execution, these writes have actually taken place earlier in time.

To sustain the illusion, the memory subsystem, in particular in the preferred embodiment the L2-cache, gives threads private storage as needed. It lets threads read their own writes and writes from threads earlier in program order, but isolates their reads from threads later in program order. Thus, the L2 might have several different data values for a single address. Each occupies an L2 way, and the L2 directory records, in addition to the usual directory information, a history of which threads have read or written the line. A speculative write is not to be written out to main memory.

One situation will break the program-order illusion—if a thread earlier in program order writes to an address that a thread later in program order has already read. The later thread should have read that data, but did not. A solution is to kill the later thread and invalidate all the lines it has written in L2, and to repeat this for all younger threads. On the other hand, without this interference a thread can complete successfully, and its writes can move to external main memory when the line is cast out or flushed.

Not all threads need to be speculative. The running thread earliest in program order can execute as non-speculative and runs conventionally; in particular its writes can go to external main memory. The threads later in program order are speculative and are subject to being killed. When the non-speculative thread completes, the next-oldest thread can be committed and it then starts to run non-speculatively.

The following sections describe a hardware implementation embodiment for a speculation model.

Speculation IDs

Speculation IDs constitute a mechanism for the memory subsystem to associate memory requests with a corresponding task, when a sequential program is decomposed into speculative tasks. This is done by assigning an ID at the start of a speculative task to the software thread executing the task and attaching the ID as tag to all requests sent to the memory subsystem by that thread. In SE, a speculation ID should be attached to a single task at a time.

As the number of dynamic tasks can be very large, it is not practical to guarantee uniqueness of IDs across the entire program run. It is sufficient to guarantee uniqueness for all IDs assigned to TLS tasks concurrently present in the memory system.

The BG/Q memory subsystem embodiment implements a set of 128 such speculation IDs, encoded as 7 bit values. On start of a speculative task, a thread requests an ID currently not in use from a central unit, the L2 CENTRAL unit. The thread then uses this ID by storing its value in a core-local register that tags the ID on all requests sent to the L2-cache.

After a thread has terminated, the changes associated with its ID are either committed, i.e., merged with the persistent main memory state, or they are invalidated, i.e., removed from the memory subsystem, and the ID is reclaimed for further allocation. But before a new thread can use the ID, no valid lines with that thread ID may remain in the L2. It is not necessary for the L2 to identify and mark these lines immediately because the pool of usable IDs is large. Therefore, cleanup is gradual.

Life Cycle of a Speculation ID

FIG. 4-7-5 illustrates the life cycle of a speculation ID. When a speculation ID is in the available state at 50501, it is unused and ready to be allocated. When a thread requests an ID allocation from L2 CENTRAL, the ID selected by L2 CENTRAL changes state to speculative at 50502, its conflict register is cleared and its A-bit is set at 50503.

The thread starts using the ID with tagged memory requests at 50504. Such tagging may be implemented by the runtime system programming a register to activate the tagging. The application may signal the runtime system to do so, especially in the case of TM. If a conflict occurs at 50505, the conflict is noted in the conflict register of FIG. 4-7-4E at 50506 and the thread is notified via an interrupt at 50507. The thread can try to resolve the conflict and resume processing or invalidate its ID at 50508. If no conflict occurs until the end of the task per 50505, the thread can try to commit its ID by issuing a try_commit, a table of functions appears below, request to L2 CENTRAL at 50509. If the commit is successful at 50510, the ID changes to the committed state at 50511. Otherwise, a conflict must have occurred and the thread has to take actions similar to a conflict notification during the speculative task execution.

After the ID state change from speculative to committed or invalid, the L2 slices start to merge or invalidate lines associated with the ID at 50512. More about merging lines will be described with reference to FIGS. 4-7-3E and 4-7-12 below. The ID does not switch to available until at 50514 all references to the ID have been cleared from the cache and software has explicitly cleared the A-bit per 50513.

In addition to the SE use of speculation, the proposed system can support two further uses of memory speculation: Transactional Memory ("TM"), and Rollback. These uses are referred to in the following as modes.

TM occurs in response to a specific programmer request. Generally the programmer will put instructions in a program delimiting sections in which TM is desired. This may be done by marking the sections as requiring atomic execution. According to the PowerPC architecture: "An access is single-copy atomic, or simply "atomic", if it is always performed in its entirety with no visible fragmentation". Alternatively, the programmer may put in a request to the runtime system for a domain to be allocated to TM execution This request will be conveyed by the runtime system via the operating system to the hardware, so that modes and IDs can be allocated. When the section ends, the program will make another call that ultimately signals the hardware to do conflict checking and reporting. Reporting means in this context: provide conflict details in the conflict register and issue an interrupt to the affected thread. The PowerPC architecture has an instruction type known as larx/stcx. This instruction type can be implemented as a special case of TM. The larx/stcx pair will delimit a memory access request to a single address and set up a program section that ends with a request to check whether the memory access request was successful or not. More about a special implementation of larx/stcx instructions using reservation registers is to be found in co-pending application Ser. No. 12/697,799 filed Jan. 29, 2010, which is incorporated herein by reference. This special implementation uses an alternative approach to TM to implement these instructions. In any case, TM is a broader concept than larx/stcx. A TM section can delimit multiple loads and stores to multiple memory locations in any sequence, requesting a check on their success or failure and a reversal of their effects upon failure. TM is generally used for only a subset of an application program, with program sections before and after executing in speculative mode.

Rollback occurs in response to "soft errors," normally these errors occur in response to cosmic rays or alpha particles from solder balls.

Referring back to FIG. 1-0, there is shown an overall architecture of a multiprocessor computing node 50 implemented in a parallel computing system in which the present embodiment may be implemented. The compute node 50 is a single chip ("nodechip") based on PowerPC cores, though the architecture can use any cores, and may comprise one or more semiconductor chips.

More particularly, the basic nodechip 50 of the multiprocessor system illustrated in FIG. 1-0 includes (sixteen or seventeen) 16+1 symmetric multiprocessing (SMP) cores 52, each core being 4-way hardware threaded supporting transactional memory and thread level speculation, and, including a Quad Floating Point Unit (FPU) 53 associated with each core. The 16 cores 52 do the computational work for application programs.

The $17^{th}$ core is configurable to carry out system tasks, such as

- reacting to network interface service interrupts, distributing network packets to other cores;
- taking timer interrupts
- reacting to correctable error interrupts,
- taking statistics
- initiating preventive measures
- monitoring environmental status (temperature), throttle system accordingly.

In other words, it offloads all the administrative tasks from the other cores to reduce the context switching overhead for these.

In one embodiment, there is provided 32 MB of shared L2 cache 70, accessible via crossbar switch 60. There is further provided external Double Data Rate Synchronous Dynamic Random Access Memory ("DDR SDRAM") 80, as a lower level in the memory hierarchy in communication with the L2.

Each FPU 53 associated with a core 52 has a data path to the L1-cache 55 of the CORE, allowing it to load or store from or into the L1-cache 55. The terms "L1" and "L1D" will both be used herein to refer to the L1 data cache.

Each core 52 is directly connected to a supplementary processing agglomeration 58, which includes a private prefetch unit. For convenience, this agglomeration 58 will be referred to herein as "UP"—meaning level 1 prefetch—or "prefetch unit;" but many additional functions are lumped together in this so-called prefetch unit, such as write combining. These additional functions could be illustrated as separate modules, but as a matter of drawing and nomenclature convenience the additional functions and the prefetch unit will be illustrated herein as being part of the agglomeration labeled "UP." This is a matter of drawing organization, not of substance. Some of the additional processing power of this L1P group includes write combining. The L1P group also accepts, decodes and dispatches all requests sent out by the core 52.

By implementing a direct memory access ("DMA") engine referred to herein as a Messaging Unit ("MU") such as MU 100, with each MU including a DMA engine and Network Card interface in communication with the XBAR switch, chip I/O functionality is provided. In one embodiment, the compute node further includes: intra-rack interprocessor links 90 which may be configurable as a 5-D torus; and, one I/O link 92 interfaced with the interfaced with the MU The system node employs or is associated and interfaced with a 8-16 GB memory/node, also referred to herein as "main memory."

The term "multiprocessor system" is used herein. With respect to the present embodiment this term can refer to a nodechip or it can refer to a plurality of nodechips linked together. In the present embodiment, however, the management of speculation is conducted independently for each nodechip. This might not be true for other embodiments, without taking those embodiments outside the scope of the claims.

The compute nodechip implements a direct memory access engine DMA to offload the network interface. It transfers blocks via three switch master ports between the L2-cache slices 70 (FIG. 1-0). It is controlled by the cores via memory mapped I/O access through an additional switch slave port. There are 16 individual slices, each of which is assigned to store a distinct subset of the physical memory lines. The actual physical memory addresses assigned to each cache slice is configurable, but static. The L2 will have a line size such as 128 bytes. In the commercial embodiment this will be twice the width of an L1 line. L2 slices are set-associative, organized as 1024 sets, each with 16 ways. The L2 data store may be composed of embedded DRAM and the tag store may be composed of static RAM.

The L2 will have ports, for instance a 256b wide read data port, a 128b wide write data port, and a request port. Ports may be shared by all processors through the crossbar switch 60.

FIG. 4-7-1A shows some software running in a distributed fashion, distributed over the cores of node 36050. An application program is shown at 36131. If the application program requests TLS or TM, a runtime system 36132 will be invoked. This runtime system is particularly to manage TM and TLS execution and can request domains of IDs from the operating system 36133. The runtime system can also request allocation of and commits of IDs. The runtime system includes a subroutine that can be called by threads and that maintains a data structure for keeping track of calls for speculative execution from threads. The operating system configures domains and modes of execution. "Domains" in this context are numerical groups of IDs that can be assigned to a mode of speculation. In the present embodiment, an L2 central unit will perform functions such as defining the domains, defining the modes for the domains, allocating speculative ids, trying to commit them, sending interrupts to the cores in case of conflicts, and retrieving conflict information. FIG. 4-7-4 shows schematically a number of CORE processors 50052. Thread IDs 50401 are assigned centrally and a global thread state 50402 is maintained.

FIG. 4-7-1B shows a timing diagram explaining how TM execution might work on this system. At 36141 the program starts executing. At the end of block 36141, a call for TM is made. In 36142 the run time system receives this request and conveys it to the operating system. At 36143, the operating system confirms the availability of the mode. The operating system can accept, reject, or put on hold any requests for a mode. The confirmation is made to the runtime system at 36144. The confirmation is received at the application program at 36145. If there had been a refusal, the program would have had to adopt a different strategy, such as serialization or waiting for the domain with the desired mode to become available. Because the request was accepted, parallel sections can start running at the end of 36145. The runtime system gets speculative IDs from the hardware at 146 and transmits them to the application program at 36147, which then uses them to tag memory accesses. The program knows when to finish speculation at the end of 36147. Then the run time system asks for the ID to commit at 36148. Any conflict information can be transmitted back to the application program at 36149, which then may try again or adopt other strategies. If there is a conflict and an interrupt is raised by the L2 central, the L2 will send the interrupt to the hardware thread that was using the ID. This hardware thread then has to figure out, based on the state the runtime system is in and the state the L2 central provides indicating a conflict, what to do in order to resolve the conflict. For example, it might execute the transactional memory section again which causes the software to jump back to the start of the transaction.

If the hardware determines that no conflict has occurred, the speculative results of the associated thread can be made persistent.

In response to a conflict, trying again may make sense where another thread completed successfully, which may allow the current thread to succeed. If both threads restart, there can be a "lifelock," where both keep failing over and over. In this case, the runtime system may have to adopt other strategies like getting one thread to wait, choosing one transaction to survive and killing others, or other strategies, all of which are known in the art.

FIG. 4-7-1B-2 shows a timing diagram for TLS mode. In this diagram, an application program is running at 36151. A TLS runtime system intervenes at 36152. The runtime system requests the operating system to configure a domain in TLS mode at 36153. The operating system returns control to the runtime system at 36152. The runtime system then allocates at least one ID and starts using that ID at 36155. The application program then runs at 36156, with the runtime system tagging memory access requests with the ID. When the TLS section completes, the runtime system commits the ID at 36157 and TLS mode ends.

FIG. 4-7-1C shows a timing diagram for rollback mode. More about the implementation of rollback is to be found in the co-pending application Ser. No. 12/696,780, which is incorporated herein by reference. In the case of rollback, an application program is running at 36161 without knowing that any speculative execution is contemplated. The operating system requests an interrupt immediately after 36161. At the time of this interrupt, it stores a snapshot at 36162 of the core register state to memory; allocates an ID in rollback mode; and starts using that ID in accessing memory. In the case of a soft error, during the subsequent running of the application program 36163, the operating system receives an interrupt indicating an invalid state of the processor, resets the affected core, invalidates the last speculation ID, restores core registers from memory, and jumps back to the point where the snapshot was taken. If no soft error occurs, the operating system at the end of 36163 will receive another interrupt and take another snapshot at 36164.

Once an ID is committed, the actions taken by the thread under that ID become irreversible.

In the current embodiment, a hardware thread can only use one speculation ID at a time and that ID can only be configured to one domain of IDs. This means that if TM or TLS is invoked, which will assign an ID to the thread, then rollback cannot be used. In this case, the only way of recovering from a soft error might be to go back to system states that are stored to disk on a more infrequent basis. It might be expected in a typical embodiment that a rollback snapshot might be taken on the order of once every millisecond, while system state might be stored to disk only once every hour or two. Therefore rollback allows for much less work to be lost as a result of a soft error. Soft errors increase in frequency as chip density increases. Executing in TLS or TM mode therefore entails a certain risk.

Generally, recovery from failure of any kind of speculative execution in the current embodiment relates to undoing changes made by a thread. If a soft error occurred that did not relate to a change that the thread made, then it may nevertheless be necessary to go back to the snapshot on the disk.

As shown in FIG. 1-0, a 32 MB shared L2 (see also FIG. 4-7-2) is sliced into 16 units 50070, each connecting to a slave port of the switch 50060. The L2 slice macro area shown in FIG. 4-4-2 is dominated by arrays. The 8 256 KB eDRAM macros 40101 are stacked in two columns, each 4 macros tall. In the center 40102, the directory Static Random Access Memories ("SRAMs") and the control logic are placed.

FIG. 4-7-2 shows more features of the L2. In FIG. 4-7-2, reference numerals repeated from FIG. 1-0 refer to the same elements as in the earlier figure. Added to this diagram with respect to FIG. 4-7-2 are L2 counters 50201, Device Bus ("DEV BUS") 50202, and L2 CENTRAL. 50203. Groups of 4 slices are connected via a ring, e.g. 50204, to one of the two DDR3 SDRAM controllers 50078.

FIG. 4-4-3 shows various address versions across a memory pathway in the nodechip 50. One embodiment of the core 40052, uses a 64 bit virtual address as part of instructions in accordance with the PowerPC architecture. In the TLB 40241, that address is converted to a 42 bit "physical" address that actually corresponds to 64 times the size of the main memory 80, so it includes extra bits for thread identification information. The term "physical" is used loosely herein to contrast with the more elaborate addressing including memory mapped i/o that is used in the PowerPC core 50052. The address portion will have the canonical format of FIG. 4-7-2B, prior to hashing, with a tag 51201 that corresponds to a way, an index 51202 that corresponds to a set, and an offset 51203 that corresponds to a location within a line. The addressing varieties shown here, with respect to the commercial embodiment, are intended to be used for the data pathway of the cores. The instruction pathway is not shown here. After arriving at the L1P, the address is converted to 36 bits.

Address scrambling tries to distribute memory accesses across L2-cache slices and within L2-cache slices across sets (congruence classes). Assuming a 64 GB main memory address space, a physical address dispatched to the L2 has 36 bits, numbered from 0 (MSb) to 35 (LSb) (a(0 to 35)).

The L2 stores data in 128B wide lines, and each of these lines is located in a single L2-slice and is referenced there via a single directory entry. As a consequence, the address bits 29 to 35 only reference parts of an L2 line and do not participate in L2 or set selection.

To evenly distribute accesses across L2-slices for sequential lines as well as larger strides, the remaining address bits are hashed to determine the target slice. To allow flexible configurations, individual address bits can be selected to determine the slice as well as an XOR hash on an address can be used: The following hashing is used in the present embodiment:

L2 slice:=('0000' & a(0)) xor a(1 to 4) xor a(5 to 8) xor a(9 to 12) xor a(13 to 16) xor a(17 to 20) xor a(21 to 24) xor a(25 to 28)

For each of the slices, 25 address bits are a sufficient reference to distinguish L2 cache lines mapped to that slice.

Each L2 slice holds 2 MB of data or 16K cache lines. At 16-way associativity, the slice has to provide 1024 sets, addressed via 10 address bits. The different ways are used to store different addresses mapping to the same set as well as for speculative results associated with different threads or combinations of threads.

Again, even distribution across set indices for unit and non-unit strides is achieved via hashing, to wit:

Set index:=("00000" & a(0 to 4)) xor a(5 to 14) xor a(15 to 24).

To uniquely identify a line within the set, using a(0 to 14) is sufficient as a tag.

Thereafter, the switch provides addressing to the L2 slice in accordance with an address that includes the set and way and offset within a line, as shown in FIG. 4-7-2B. Each line has 16 ways.

L2 as Point of Coherence

In this embodiment, the L2 Cache provides the bulk of the memory system caching on the BQC chip. To reduce main memory accesses, the L2 caches serve as the point of coherence for all processors. This function includes generating L1 invalidations when necessary. Because the L2 caches are inclusive of the L1s, they can remember which processors could possibly have a valid copy of every line. Memory consistency is enforced by the L2 slices by means of multicasting selective L1 invalidations, made possible by the fact that the L1s operate in write-through mode and the L2s are inclusive of the L1s.

Per the article on "Cache Coherence" in Wikipedia, there are several ways of monitoring speculative execution to see if some resource conflict is occurring, e.g.

- Directory-based coherence: In a directory-based system, the data being shared is placed in a common directory that maintains the coherence between caches. The directory acts as a filter through which the processor must ask permission to load an entry from the primary memory to its cache. When an entry is changed the directory either updates or invalidates the other caches with that entry.
- Snooping is the process where the individual caches monitor address lines for accesses to memory locations that they have cached. When a write operation is observed to a location that a cache has a copy of, the cache controller invalidates its own copy of the snooped memory location.
- Snarfing is where a cache controller watches both address and data in an attempt to update its own copy of a memory location when a second master modifies a location in main memory. When a write operation is observed to a location that a cache has a copy of, the cache controller updates its own copy of the snarfed memory location with the new data.

The prior version of the IBM® BluGene® processor used snoop filtering to maintain cache coherence. In this regard, the following patent is incorporated by reference: U.S. Pat. No. 7,386,685, issued 10 Jun. 2008.

The embodiment discussed herein uses directory based coherence.

FIG. 4-7-3 shows features of an embodiment of the control section 4102 of a cache slice 72.

Coherence tracking unit 4301 issues invalidations, when necessary.

The request queue 4302 buffers incoming read and write requests. In this embodiment, it is 16 entries deep, though other request buffers might have more or less entries. The addresses of incoming requests are matched against all pending requests to determine ordering restrictions. The queue presents the requests to the directory pipeline 4308 based on ordering requirements.

The write data buffer 4303 stores data associated with write requests. This embodiment has a 16B wide data interface to the switch 60 and stores 16 16B wide entries. Other sizes might be devised by the skilled artisan as a matter of design choice. This buffer passes the data to the eDRAM pipeline 4305 in case of a write hit or after a write miss resolution. The eDRAMs are shown at 40101 in FIG. 4-4-2.

The directory pipeline 4308 accepts requests from the request queue 4302, retrieves the corresponding directory set from the directory SRAM 4309, matches and updates the tag information, writes the data back to the SRAM and signals the outcome of the request (hit, miss, conflict detected, etc.). Operations illustrated at FIGS. 4-7-3F, 4-7-3G, 4-7-3H, 4-7-3I-1, and 4-7-3I-2 are conducted within the directory pipeline 4308.

In parallel,

- each request is also matched against the entries in the miss queue at 4307 and double misses are signaled
- each larx, stcx and other store are handed off to the reservation table 4306 to track pending reservations and resolve conflicts;
- back-to-back load-and-increments to the same location are detected and merged into one directory access and are controlling back-to-back increment operations inside the eDRAM pipeline 4305.

The L2 implements two eDRAM pipelines 43055 that operate independently. They may be referred to as eDRAM bank 0 and eDRAM bank 1. The eDRAM pipeline controls the eDRAM access and the dataflow from and to this macro. If writing only subcomponents of a doubleword or for load-and-increment or store-add operations, it is responsible to schedule the necessary Read Modify Write ("RMW") cycles and provide the dataflow for insertion and increment.

The read return buffer 4304 buffers read data from eDRAM or the memory controller 50078 (FIG. 4-7-2) and is responsible for scheduling the data return using the switch 50060. In this embodiment it has a 32B wide data interface to the switch. It is used only as a staging buffer to compensate for backpressure from the switch. It is not serving as a cache.

The miss handler 4307 takes over processing of misses determined by the directory. It provides the interface to the DRAM controller and implements a data buffer for write and read return data from the memory controller, The reservation table 4306 registers reservation requests, decides whether a STWCX can proceed to update L2 state and invalidates reservations based on incoming stores.

Also shown in FIG. 4-7-3 are a pipeline control unit 4310 and EDRAM queue decoupling buffer 4300.

The L2 implements a multitude of decoupling buffers for different purposes.

- The Request queue is an intelligent decoupling buffer (with reordering logic), allowing to receive requests from the switches even if the directory pipe is blocked
- The write data buffer accepts write data from the switch even if the eDRAM pipe is blocked or the target location in the eDRAM is not yet known
- The Coherence tracking implements two buffers: One decoupling the directory lookup sending to it requests from the internal coherence SRAM lookup pipe. And one decoupling the SRAM lookup results from the interface to the switch.
- The miss handler implements one from the DRAM controller to the eDRAM and one from the eDRAM to the DRAM controller
- There are more, almost every little subcomponent that can block for any reason is connected via a decoupling buffer to the unit feeding requests to it FIG. 4-5-4. The L2 slice 4072 includes a request queue 4302. At 4311, a cascade of modules tests whether pending memory access requests will require data associated with the address of a previous request, the address being stored at 4313. These tests might look for memory mapped flags from the L1 or for some other identification. A result of the cascade 4311 is used to create a control input at 4314 for selection of the next queue entry for lookup at 4315, which becomes an input for the directory look up module 4312.

FIG. 4-5-5 shows more about the interaction between the directory pipe 4308 and the directory SRAM 4309. The vertical lines in the pipe represent time intervals during which data passes through a cascade of registers in the directory pipe. In a first time interval T1, a read is signaled to the directory SRAM. In a second time interval T2, data is read from the directory SRAM. In a third time interval, T3, a table lookup informs writes WR and WR DATA to the directory SRAM. In general, table lookup will govern the behavior of the directory SRAM to control cache accesses responsive to speculative execution. Only one table lookup is shown at T3, but more might be implemented. More about the contents of the directory SRAM is shown in FIG. 4-7-3C and 4-7-3D, discussed further below. More about the action of the table lookup will be disclosed with respect to aspects of conflict checking and version aggregation.

The L2 central unit 50203 is illustrated in FIG. 4-7-4A. It is accessed by the cores via its interface 50412 to the device bus—DEV BUS 50202. The DEV Bus interface is a queue of requests presented for execution. The state table that keeps track of the state of thread ID's is shown at 50413. More about the contents of this block will be discussed below, with respect to FIG. 4-7-4B.

The L2 counter units 50201 of FIG. 4-7-2 track the number of ID references—directory entries that store an ID—in a group of four slices. These counters periodically—in the current implementation every 4 cycles—send a summary of the counters to the L2 central unit. The summaries indicate which ID has zero references and which have one or more references. The "reference tracking unit" 50414 in the L2 CENTRAL UNIT 50203 aggregates the summaries of all four counter sets and determines which IDs have zero references in all counter sets. IDs that have been committed or invalidated and that have zero references in the directory can be reused for a new speculation task.

A command execution unit 50415 coordinates operations with respect to speculation ID's. Operations associated with FIGS. 4-7-4C, 4-7-5, 4-7-6, 4-7-8, 4-7-9, 4-7-10, 4-7-11, and 4-7-11A are conducted in unit 50415. It decodes requests received from the DEV BUS. If the command is an ID allocation, the command execution unit goes to the ID state table 50413 and looks up an ID that is available, changes the state to speculative and returns the value back via the DEV BUS. It sends commands at 50416 to the core 52, such as when threads need to be invalidated and switching between evict on write and address aliasing. The command execution unit also sends out responses to commands to the L2 via the dedicated interfaces. An example of such a command might be to update the state of a thread.

The L2 slices 50072 communicate to the central unit at 50417 typically in the form of replies to commands, though sometimes the communications are not replies, and receive commands from the central unit at 50418. Other examples of what might be transmitted via the bus labeled "L2 replies" include signals from the slices indicating if a conflict has happened. In this case, a signal can go out via a dedicated broadcast bus to the cores indicating the conflict to other devices, that an ID has changed state and that an interrupt should be generated.

The L2 slices receive memory access requests at 50419 from the L1D at a request interface 50420. The request interface forwards the request to the directory pipe 4308 as shown in more detail in FIG. 4-7-3.

Support for such functionalities includes additional bookkeeping and storage functionality for multiple versions of the same physical memory line.

FIG. 4-7-4B shows various registers of the ID STATE table 50413. All of these registers can be read by the operating system.

These registers include 128 two bit registers 50431, each for storing the state of a respective one of the 128 possible thread IDs. The possible states are:

| STATE | ENCODING |
|---|---|
| AVAILABLE | 00 |
| SPECULATIVE | 01 |
| COMMITTED | 10 |
| INVALID | 11 |

By querying the table on every use of an ID, the effect of instantaneous ID commit or invalidation can be achieved by changing the state associated with the ID to committed or invalid. This makes it possible to change a thread's state without having to find and update all the thread's lines in the L2 directory; also it saves directory bits.

Another set of 128 registers 50432 is for encoding conflicts associated with IDs. More detail of these registers is shown at FIG. 4-7-4E. There is a register of this type for each speculation ID. This register contains the following fields:

Rflag 50455, one bit indicating a resource based conflict. If this flag is set, it indicates either an eviction from L2 that would have been required for successful completion, or indicates a race condition during an L1 or L1P hit that may have caused stale data to be used;

Nflag 50454, one bit indicating conflict with a non-speculative thread;

Mflag 50453, one bit indicating multiple conflicts, i.e. conflict with two or more speculative threads. If M flag is clear and 1 flag is set, then the Conflict ID provides the ID of the only thread in conflict;

Aflag 50452, one bit which is the allocation prevention flag. This is set during allocation. It is cleared explicitly by software to transfer ownership of the ID back to hardware. While set, it prevents hardware from reusing a speculation ID;

1 flag 50451, one bit indicating conflict with one or more other speculative threads. If set, conflict ID indicates the first conflicting thread;

Conflict ID 50450, seven bits indicating the ID of the first encountered conflict with other speculative threads.

Another register 50433 has 5 bits and is for indicating how many domains have been created.

A set of 16 registers 50434 indicates an allocation pointer for each domain. A second set of 16 registers 50435 indicates a commit pointer for each domain. A third set of 16 registers 50436 indicates a reclaim pointer for each domain. These three pointer registers are seven bits each.

FIG. 4-7-7C shows a flowchart for an ID allocation routine. At 50441 a request for allocating an ID is received. At 5042, a determination is made whether the ID is available. If the ID is not available, the routine returns the previous ID at 50443. If the ID is available, the routine returns the ID at 50444 and increments the allocation pointer at 50445, wrapping at domain boundaries.

FIG. 4-7-4D shows a conceptual diagram of allocation of IDs within a domain. In this particular example, only one domain of 127 IDs is shown. An allocation pointer is shown at 50446 pointing at speculation ID 3. Order of the IDs is of special relevance for TLS. Accordingly, the allocation pointer points at the oldest speculation ID 50447, with the next oldest being at 50448. The point where the allocation pointer is pointing is also the wrap point for ordering, so the youngest and second youngest are shown at 50449 and 50450.

ID Ordering for Speculative Execution

The numeric value of the speculation ID is used in Speculative Execution to establish a younger/older relationship between speculative tasks. IDs are allocated in ascending order and a larger ID generally means that the ID designates accesses of a younger task.

To implement in-order allocation, the L2 CENTRAL at 50413 maintains an allocation pointer 50434. A function ptr_try_allocate tries to allocate the ID the pointer points to and, if successful, increments the pointer. More about this function can be found in a table of functions listed below.

As the set of IDs is limited, the allocation pointer 50434 (FIG. 4-7-4B) will wrap at some point from the largest ID to the smallest ID. Following this, the ID ordering is no longer dependent on the ID values alone. To handle this case, in addition to serving for ID allocation, the allocation pointer also serves as pointer to the wrap point of the currently active ID space. The ID the allocation pointer points to will be the youngest ID for the next allocation. Until then, if it is still active, it is the oldest ID of the ID space. The (allocation pointer−1) ID is the ID most recently allocated and thus the youngest. So the ID order is defined as:

Alloc_pointer+0: oldest ID

Alloc_pointer+1: second oldest ID

. . .

Alloc_pointer−2: second youngest ID

Alloc_pointer−1: youngest ID

The allocation pointer is a 7b wide register. It stores the value of the ID that is to be allocated next. If an allocation is requested and the ID it points to is available, the ID state is changed to speculative, the ID value is returned to the core and the pointer content is incremented.

The notation means: if the allocation pointer is, e.g., 10, then ID 0 is the oldest, 11 second oldest, . . . , 8 second youngest and 9 youngest ID.

Aside from allocating IDs in order for Speculative Execution, the IDs must also be committed in order. L2 CENTRAL provides a commit pointer 50435 that provides an atomic increment function and can be used to track what ID to commit next, but the use of this pointer is not mandatory.

Per FIG. 4-7-6, when an ID is ready to commit at 50521, i.e., its predecessor has completed execution and did not get invalidated, a ptr_try_commit can be executed 50522. In case of success, the ID the pointer points to gets committed and the pointer gets incremented at 50523. At that point, the ID can be released by clearing the A-bit at 50524.

If the commit fails or the ID was already invalid before the commit attempt at 50525, the ID the commit pointer points to needs to be invalidated along with all younger IDs currently in use at 50527. Then the commit pointer must be moved past all invalidated IDs by directly writing to the commit pointer register 50528. Then, the A-bit for all invalidated IDs the commit pointer moved past can be cleared and thus released for reallocation at 50529. The failed speculative task then needs to be restarted.

Speculation ID Reclaim

To support ID cleanup, the L2 cache maintains a Use Counter within units 50201 for each thread ID. Every time a line is established in L2, the use counter corresponding to the ID of the thread establishing the line is incremented. The use counter also counts the occurrences of IDs in the speculative reader set. Therefore, each use counter indicates the number of occurrences of its associated ID in the L2.

At intervals programmable via DCR the L2 examines one directory set for lines whose thread IDs are invalid or committed. For each such line, the L2 removes the thread ID in the directory, marks the cache line invalid or merges it with the non-speculative state respectively, and decrements the use counter associated with that thread ID. Once the use counter reaches zero, the ID can be reclaimed, provided that its A bit has been cleared. The state of the ID will switch to available at that point. This is a type of lazy cleanup. More about lazy evaluation can be found the in Wikipedia article entitled "Lazy Evaluation."

Domains

Parallel programs are likely to have known independent sections that can run concurrently. Each of these parallel sections might, during the annotation run, be decomposed into speculative threads. It is convenient and efficient to organize these sections into independent families of threads, with one committed thread for each section. The L2 allows for this by using up to the four most significant bits of the thread ID to indicate a speculation domain. The user can partition the thread space into one, two, four, eight or sixteen domains. All domains operate independently with respect to allocating, checking, promoting, and killing threads. Threads in different domains can communicate if both are non-speculative; no speculative threads can communicate outside their domain, for reasons detailed below.

Per FIG. 4-7-4B, each domain requires its own allocation 50434 and commit pointers 50435, which wrap within the subset of thread IDs allocated to that domain.

Transactional Memory

The L2's speculation mechanisms also support a transactional-memory (TM) programming model, per FIG. 4-7-7. In a transactional model, the programmer replaces critical sections with transactional sections at 50601, which can manipulate shared data without locking.

The implementation of TM uses the hardware resources for speculation. A difference between TLS and TM is that TM IDs are not ordered. As a consequence, IDs can be allocated at 50602 and committed in any order 50608. The L2 CENTRAL provides a function that allows allocation of any available ID from a pool (try_alloc_avail) and a function that allows an ID to be atomically committed regardless of any pointer state (try_commit) 50605. More about these functions appears in a table presented below.

The lack of ordering means also that the mechanism to forward data from older threads to younger threads cannot be used and both RAW as well as WAR accesses must be flagged as conflicts at 50603. Two IDs that have speculatively written to the same location cannot both commit, as the order of merging the IDs is not tracked. Consequently, overlapping speculative writes are flagged as WAW conflicts 50604.

A transaction succeeds 50608 if, while the section executes, no other thread accesses to any of the addresses it has accessed, except if both threads are only reading per 50606. If the transaction does not succeed, hardware reverses its actions 50607: its writes are invalidated without reaching external main memory. The program generally loops on a return code and reruns failing transactions.

Mode Switching

Each of the three uses of the speculation facilities

1. TLS
2. TM
3. Rollback Mode require slightly different behavior from the underlying hardware. This is achieved by assigning to each domain of speculation IDs one of the three modes. The assignment of modes to domains can be changed at run time. For example, a program may choose TLS at some point of execution, while at a different point transactions supported by TM are executed. During the remaining execution, rollback mode should be used.

FIG. 4-7-8 shows starting with one of the three modes at 50801. Then a speculative task is executed at 50802. If a different mode is needed at 50803, it cannot be changed if any of the IDs of the domain is still in the speculative state per 50804. If the current mode is TLS, the mode can in addition not be changed while any ID is still in the committed state, as lines may contain multiple committed versions that rely on the TLS mode to merge their versions in the correct order. Once the IDs are committed, the domain can be chosen at 50805.

Memory Consistency

This section describes the basic mechanisms used to enforce memory consistency, both in terms of program order due to speculation and memory visibility due to shared memory multiprocessing, as it relates to speculation.

The L2 maintains the illusion that speculative threads run in sequential program order, even if they do not. Per FIG. 4-7-9, to do this, the L2 may need to store unique copies of the same memory line with distinct thread IDs. This is necessary to prevent a speculative thread from writing memory out of program order.

At the L2 at 50902, the directory is marked to reflect which threads have read and written a line when necessary. Not every thread ID needs to be recorded, as explained with respect to the reader set directory, see e.g. FIG. 4-7-3D.

On a read at 50903, the L2 returns the line that was previously written by the thread that issued the read or else by the nearest previous thread in program order 50914; if the address is not in L2 50912, the line is fetched 50913 from external main memory.

On a write 50904, the L2 directory is checked for illusion-breaking reads—reads by threads later in program order. More about this type of conflict checking is explained with reference to FIGS. 4-7-3C through 4-7-3I-2. That is, it checks all lines in the matching set that have a matching tag and an ID smaller or equal 50905 to see if their read range contains IDs that are greater than the ID of the requesting thread 50906. If any such line exists, then the oldest of those threads and all threads younger than it are killed 50915, 50907, 50908, 50909. If no such lines exist, the write is marked with the requesting thread's ID 50910. The line cannot be written to external main memory if the thread ID is speculative 50911.

To kill a thread (and all younger threads), the L2 sends an interrupt 50915 to the corresponding core. The core receiving the interrupt has to notify the cores running its successor threads to terminate these threads, too per 50907. It then has to mark the corresponding hread IDs invalid 50908 and restart its current speculative thread 50909.

Commit Race Window Handling

Per FIG. 4-7-10, when a speculative TLS or TM ID's status is changed to committed state per 51001, the system has to ensure that a condition that leads to an invalidation has not occurred before the change to committed state has reached every L2 slice. As there is a latency from the point of detection of a condition that warrants an invalidation until this information reaches the commit logic, as well as there is a latency from the point of initiating the commit until it takes effect in all L2 slices, it is possible to have a race condition between commit and invalidation.

To close this window, the commit process is managed in TLS, TM mode, and rollback mode 51003, 51004, 51005. Rollback mode requires equivalent treatment to transition IDs to the invalid state.

Transition to Committed State

To avoid the race, the L2 gives special handling to the period between the end of a committed thread and the promotion of the next. Per 51003 and FIG. 4-7-11, for TLS, after a committed thread completes at 51101, the L2 keeps it in committed state 51102 and moves the oldest speculative thread to transitional state 51103. L2_central has a register that points to the ID currently in transitional state (currently committing). The state register of the ID points during this time to the speculative state. Newly arriving writes 51104 that can affect the fate of the transitional thread—writes from outside the domain and writes by threads older than the transitional thread 51105—are blocked when detected 51106 inside the L2. After all side effects, e.g. conflicts, from writes initiated before entering the transitional state have completed 51107—if none of them cause the transitional thread to be killed 51008—the transitional thread is promoted 51009 and the blocked writes are allowed to resume 51010. If side effects cause the transitional thread to fail, at 51111, the thread is invalidated, a signal sent to the core, and the writes are also unblocked at 51110.

In the case of TM, first the thread to be committed is set to a transitional state at 51120. Then accesses from other speculative threads or non-speculative writes are blocked at 51121. If any such speculative access or non-speculative write are active, then the system has to wait at 51122. Otherwise conflicts must be checked for at 51123. If none are present, then all side effects must be registered at 51124, before the thread may be committed and writes resumed at 51125.

Thread ID Counters

A direct implementation of the thread ID use counters would require each of the 16 L2's to maintain 128 counters (one per thread ID), each 16 bits (to handle the worst case where all 16 ways in all 1024 sets have a read and a write by that thread). These counters would then be ORd to detect when a count reached zero.

Instead, groups of L2's manipulate a common group-wide-shared set of counters 50201. The architecture assigns one counter set to each set of 4 L2-slices. The counter size is increased by 2 bits to handle directories for 4 caches, but the number of counters is reduced 4-fold. The counters become more complex because they now need to simultaneously handle combinations of multiple decrements and increments.

As a second optimization, the number of counters is reduced a further 50% by sharing counters among two thread IDs. A nonzero count means that at least one of the two IDs is still in use. When the count is zero, both IDs can potentially be reclaimed; until then, none can be reclaimed. The counter size remains the same, since the 4 L2's still can have at most 4*16*1024*3 references total.

A drawback of sharing counters is that IDs take longer to be reused—none of the two IDs can be reused until both have a zero count. To mitigate this, the number of available IDs is made large (128) so free IDs will be available even if several generations of threads have not yet fully cleared.

After a thread count has reached zero, the thread table is notified that those threads are now available for reuse.

Conflict Handling

Conflict Recording

To detect conflicts, the L2 must record all speculative reads and writes to any memory location.

Speculative writes are recorded by allocating in the directory a new way of the selected set and marking it with the writer ID. The set contains 16 dirty bits that distinguish which double word of the 128B line has been written by the speculation ID. If a sub-double word write is requested, the L2 treats this as a speculative read of a double word, insertion of the write data into that word followed by full a double word write.

FIG. 4-7-3C shows the formats of 4 directory SRAMs included at 4309, to wit:

- a base directory 50321;
- a least recently used directory 50322;
- a COH/dirty directory 50323 and 50323'; and
- a speculative reader directory 50324, which will be described in more detail with respect to FIG. 4-7-3D.

In the base directory, 50321, there are 15 bits that represent the upper 15b address bits of the line stored at 50271. Then there is a seven bit speculative writer ID field 50272 that indicates which speculation ID wrote to this line and a flag 50273 that indicates whether the line was speculatively written. Then there is a two bit speculative read flag field 50274 indicating whether to invoke the speculative reader directory 50324, and a one bit "current" flag 50275. The current flag 50275 indicates whether the current line is assembled from more than one way or not. The core 52 does not know about the fields 50272-50275. These fields are set by the L2 directory pipeline.

If the speculative writer flag is checked, then the way has been written speculatively, not taken from main memory and the writer ID field will say what the writer ID was. If the flag is clear, the writer ID field is irrelevant.

The LRU directory indicates "age", a relative ordering number with respect to last access. This directory is for allocating ways in accordance with the Least Recently Used algorithm.

The COH/dirty directory has two uses, and accordingly two possible formats. In the first format, 50323, known as "COH," there are 17 bits, one for each core of the system. This format indicates, when the writer flag is not set, whether the corresponding core has a copy of this line of the cache. In the second format, 50323', there are 16 bits. These bits indicate, if the writer flag is set in the base directory, which part of the line has been modified speculatively. The line has 128 bytes, but they are recorded at 50323' in groups of 8 bytes, so only 16 bits are used, one for each group of eight bytes.

Speculative reads are recorded for each way from which data is retrieved while processing a request. As multiple speculative reads from different IDs for different sections of the line need to be recorded, the L2 uses a dynamic encoding that provides a superset representation of the read accesses.

In FIG. 4-7-3C, the speculative reader directory 50324 has fields PF for parameters 50281, left boundary 50282, right boundary 50283, a first speculative ID 50284, and a second ID 50285. The speculative reader directory is invoked in response to flags in field 50274.

FIG. 4-7-3D relates to an embodiment of use of the reader set directory. The left column of FIG. 4-7-3D illustrates seven possible formats of the reader set directory, while the right column indicates what the result in the cache line would be for that format. Formats 50331, 50336, and 50337 can be used for TLS, while formats 50331-50336 can be used for TM.

Format 50331 indicates that no speculative reading has occurred.

If only a single TLS or TM ID has read the line, the L2 records the ID along with the left and right boundary of the line section so far accessed by the thread. Boundaries are always rounded to the next double word boundary. Format 50332 uses two bit code "01" to indicate that a single seven bit ID, α, has read in a range delimited by four bit parameters denoted "left" and "right".

If two IDs in TM have accessed the line, the IDs along with the gap between the two accessed regions are recorded. Format 50333 uses two bit code "11" to indicate that a first seven bit ID denoted "α" has read from a boundary denoted with four bits symbolized by the word "left" to the end of the line; while a seven bit second ID, denoted "β" has read from the beginning of the line to a boundary denoted by four bits symbolized by the word "right."

Format 50334 uses three bit code "001" to indicate that three seven bit IDs, denoted "α," "β," and "γ," have read the entire line. In fact, when the entire line is indicated in this figure, it might be that less than the entire line has been read, but the encoding of this embodiment does not keep track at the sub-line granularity for more than two speculative IDs. One of ordinary skill in the art might devise other encodings as a matter of design choice.

Format 50335 uses five bit code "00001" to indicate that several IDs have read the entire line. The range of IDs is indicated by the three bit field denoted "ID up". This range includes the sixteen IDs that share the same upper three bits. Which of the sixteen IDs have read the line is indicated by respective flags in the sixteen bit field denoted "ID set."

If two or more TLS IDs have accessed the line, the youngest and the oldest ID along with the left and right boundary of the aggregation of all accesses are recorded.

Format 50336 uses the eight bit code "00010000" to indicate that a group of IDs has read the entire line. This group is defined by a 16 bit field denoted "IDgroupset."

Format 50337 uses the two bit code "10" to indicate that two seven bit IDs, denoted "α" and "β" have read a range delimited by boundaries indicated by the four bit fields denoted "left" and "right."

When doing WAR conflict checking, per FIG. 4-7-3I-1 and FIG. 4-7-3I-2 below, the formats of FIG. 4-7-3D are used.

Rollback ID reads are not recorded.

If more than two TM IDs, a mix of TM and TLS IDs or TLS IDs from different domains have been recorded, only the 64 byte access resolution for the aggregate of all accesses is recorded.

FIG. 4-7-3E shows assembly of a cache line, as called for in element 50512 of FIG. 4-7-5. In one way, there is unspecified data NSPEC at 53210. In another way, ID1 has written version 1 of the data at 53230, leaving undefined data at 53220 and 53240. In another way, ID2 has written version 2 of data 53260 leaving undefined areas 53250 and 53260. Ultimately, these three ways can be combined into an assembled way, having some NSPEC fields 53270, 53285, and 53300, version 1 at 53280 and Version 2 at 53290. This assembled way will be signaled in the directory, because it will have the current flag, 50275, set. This is version aggregation is required whenever a data item needs to read from a speculative version, e.g., speculative loads or atomic RMW operations.

FIG. 4-7-12 shows a flow of version aggregation, per 50512. At 51703, the procedure starts in the pipe control unit 50310 with a directory lookup at 51703. If there are multiple versions of the line, further explained with reference to FIG. 4-7-3E and 4-7-3G, this will be treated as a cache miss and referred to the miss handler 4307. The miss handler will treat the multiple versions as a cache miss per 51705 and block further accesses to the EDRAM pipe at 51706. Insert copy operations will then be begun at 51707 to aggregate the versions into the EDRAM queue. When aggregation is complete at 51708, the final version is inserted into the EDRAM queue at 51710, otherwise 51706-51708 repeat.

In summary, then, the current bit 50275 of FIG. 4-7-3C indicates whether data for this way contains only the speculatively written fields as written by the speculative writer indicated in the spec id writer field (current flag=0) or if the other parts of the line have been filled in with data from the non-speculative version or—if applicable—older TLS versions for the address (current flag=1). If the line is read using the ID that matches the spec writer ID field and the flag is set, no extra work is necessary and the data can be returned to the requestor (line has been made current recently). If the flag is clear in that case, the missing parts for the line need to be filled in from the other aforementioned versions. Once the line has been completed, the current flag is set and the line data is returned to the requestor.

Conflict Detection

For each request the L2 generates a read and write access memory footprint that describes what section of the 128B line is read and/or written. The footprints are dependent on the type of request, the size info of the request as well as on the atomic operation code.

For example, an atomic load-increment-bounded from address A has a read footprint of the double word at A as well as the double word at A+8, and it has a write footprint of the double word at address A. The footprint is used matching the request against recorded speculative reads and writes of the line.

Conflict detection is handled differently for the three modes.

Per FIG. 4-7-3F, due to the out-of-order commit and missing order of the IDs in TM, all RAW, WAR and WAW conflicts with other IDs are flagged as conflicts. With respect to FIG. 4-7-3H, for WAW and RAW conflicts, the read and write footprints are matched against the 16b dirty set of all speculative versions and conflicts with the recorded writer IDs are signaled for each overlap.

With respect to FIG. 4-7-3I-2, for WAR conflicts, the left and the right boundary of the write footprint are matched against the recorded reader boundaries and a conflict is reported for each reader ID with an overlap.

Per FIG. 4-7-3F, in TLS mode, the ordering of the ID and the forwarding of data from older to younger threads requires only WAR conflicts to be flagged. WAR conflicts are processed as outlined for TM.

In Rollback mode, any access to a line that has a rollback version signals a conflict and commits the rollback ID unless the access was executed with the ID of the existing rollback version.

With respect to FIG. 4-7-3I-2, if TLS accesses encounter recorded IDs outside their domain and if TM accesses encounter recorded IDs that are non-TM IDs, all RAW, WAR and WAW cases are checked and conflicts are reported.

FIG. 4-7-3F shows an overview of conflict checking, which occurs 4308 of FIG. 4-7-3. At 50341 of FIG. 4-7-3F a memory access request is received that is either TLS or TM. At 50342, it is determined whether the access is a read or a write or both. It should be noted that both types can exist in the same instruction. In the case of a read, it is then tested whether the access is TM at 50343. If it is TLS, no further checks are required before recording the read at 50345. If it is TM, a Read After Write ("RAW") check must be performed at

50344 before recording the read at 50345. In the case of a write, it is also tested whether the access is TLS or TM at 50346. If it is a TLS access, then control passes to the Write After Read ("WAR") check 50348. WAW is not necessarily a conflict for TLS, because the ID ordering can resolve conflicting writes. If it is a TM access then control passes to the Write After Write ("WAW") check 50347 before passing to the WAR check 50348. Thereafter the write can be recorded at 50349.

FIG. 4-7-3G shows an aspect of conflict checking. First, a write request comes in at 50361. This is a request from the thread with ID 6 for a double word write across the 8 byte groups 6, 7, and 8 of address A. In the base directory 50321, three ways are found that have speculative data written in them for address A. These ways are shown at 50362, 50363, 50364. Way 50362 was written for address A, by the thread with speculative ID number 5. The corresponding portion of the "dirty directory" 50323 is shown at 50365 indicates that this ID wrote at double words 6, 7 and 8. This means there is a potential conflict between ID's 5 and 6. Way 50363 was written for address A by the thread with speculative ID number 6. This is not a conflict, because the speculative ID number matches that of the current write request. As a result the corresponding bits from the "dirty directory" at 50366 are irrelevant. Way 50364 was written for address A by the thread with speculative ID number 7; however the corresponding bits from the "dirty directory" at 50367 indicate that only double word 0 was written. As a result, there is no conflict between speculative IDs numbered 6 and 7 for this write.

FIG. 4-7-3H shows the flow of WAW and RAW conflict checking. At 50371, ways with matching address tags are searched to retrieve at 50372 a set that has been written, along with the ID's that have written them. Then two checks are performed. The first at 50373 is whether the writer ID is not equal to the access ID. The second at 50375 is whether the access footprint overlaps the dirty bits of the retrieved version. In order for a conflict to be found at 50377, both tests must come up in the affirmative per 50376.

FIG. 4-7-3I-1 shows a first aspect of WAR conflict checking. There is a difference between the way this checking is done for TM and TLS, so the routine checks which are present at 50381. For TM, WAR is only done on non-speculative versions at 50382. For TLS, WAR is done both on non-speculative versions at 50382 and also on speculative versions with younger, i.e. larger IDs at 50383. More about ID order is described with respect to FIG. 4-7-4E.

FIG. 4-7-3I-2 shows a second aspect of WAR conflict checking. This aspect is done for the situations found in both 50382 and 50383. First the reader representation is read at 50384. More about the reader representation is described with respect to FIG. 4-7-3D. The remaining parts of the procedure are performed with respect to all IDs represented in the reader representation per 50385. At 50386, it is checked whether the footprints overlap. If they do not, then there is no conflict 50391. If they do, then there is also additional checking, which may be performed simultaneously. At 50387, accesses are split into TM or TLS. For TM, there is a conflict if the reading ID is not the ID currently requesting access at 50388. For TLS, there is a conflict if the reading ID was from a different domain or younger than the ID requesting access. If both relevant conditions for the type of speculative execution are met, then a conflict is signaled at 50390.

TLS/TM/Rollback Management

The TLS/TM/Rollback capabilities of the memory subsystem are controlled via a memory-mapped I/O interface.

Global Speculation ID Management:

The management of the ID state is done at the L2 CENTRAL unit. L2 CENTRAL also controls how the ID state is split into domains and what attributes apply to each domain. The L2 CENTRAL is accessed via MMIO by the cores. All accesses to the L2 CENTRAL are performed with cache inhibited 8B wide, aligned accesses.

The following functions are defined in the preferred embodiment:

| Name | number of instances | Access | Function |
|---|---|---|---|
| NumDomains | 1 | RD | Returns current number of domains |
| | | WR | Set number of domains. Only values 1, 2, 4, 8, 16 are valid. Clears all domain pointers. Not permitted to be changed if not all IDs are in available state |
| IdState | 1 | RD only | Returns vector of 128 bit pairs indicating the state of all 128 IDs<br>00b: Available<br>01b: Speculative<br>10b: Committed<br>11b: Invalid |
| TryAllocAvail | 1 | RD only | Allocates an available ID from the set of IDs specified by groupmask. Returns ID on success, −1 otherwise. On success, changes state of ID to speculative, clears conflict register and sets A bit in conflict register. Groupmask is a 16b bit set, bit i = 1 indicating to include IDs 8*I to 8*i + 7 into the set of selectable IDs |
| Per domain: | | | |
| DomainMode | 16 | RD/WR | Bit 61:63: mode<br>000b: long running TLS<br>001b: short running TLS<br>011b: short running TM<br>100b: rollback mode<br>Bit 60: invalidate on conflict,<br>Bit 59: interrupt on conflict,<br>Bit 58: interrupt on commit,<br>Bit 57: interrupt on invalidate<br>Bit 56: 0: commit to id 00; 1: commit to id 01 |
| AllocPtr | 16 | RD/WR | Read and write allocation pointer. Allocation pointer is used to define ID wrap point for TLS and next ID to allocate using TryPtrAlloc. Should never be changed if domain is TLS and any ID in domain is not available |
| CommitPtr | 16 | RD/WR | Read and write commit pointer. The commit pointer is used in PtrTryCommit and has no function otherwise. When using PtrTryCommit in TLS, use this function to step over invalidated IDs. |
| ReclaimPtr | 16 | RD/WR | Read and write reclaim pointer. The reclaim pointer is an approximation on which IDs could be reclaimed assuming their A bits were clear. The reclaim pointer value has no effect on any function of the L2 CENTRAL. |

-continued

| Name | number of instances | Access | Function |
|---|---|---|---|
| PtrTryAlloc | 0x104+ domain*0x10 | RD only | Same function as TryAllocAvail, but set of selectable IDs limited to ID pointed to by allocation pointer. On success, increments additionally the allocation pointer. |
| PtrForceCommit | 16 | N/A | Reserved, not implemented |
| PtrTryCommit | 16 | RD only | Same function as TryCommit, but targets ID pointed to by commit pointer. Additionally, increments commit pointer on success. |
| Per ID: | | | |
| IdState | 128 | RD/WR | Read or set state of ID: 00b: Available 01b: Speculative 10b: Committed 11b: Invalid This function should be used to invalidate IDs for TLS/TM and to commit IDs for Rollback. These changes are not allowed while a TryCommit is in flight that may change this ID. |
| Conflict | 128 | RD/WR | Read or write conflict register: bit 57:63 conflicting ID, qualified by 1C bit bit 56: 1C bit, at least one ID is in conflict with this ID. Qualifies bits 57:63. Cleared if ID in 57:63 is invalidated bit 55: A bit, if set, ID can not be reclaimed bit 56: M bit, more than one ID with this ID in conflict bit 53: N bit, conflict with non-speculative access bit 52: R bit, invalidate due to resource conflict The conflict register is cleared on allocation of ID, except for the A bit. The A bit is set on allocation. The A bit must be cleared explicitly by software to enable reclaim of this ID. An ID can only be committed if the 1C, M, N and R bits are clear. |
| ConflictSC | 128 | WR only | Write data is interpreted as mask, each bit set in the mask clears the corresponding bit in the conflict register, all other bits are left unchanged. |
| TryCommit | 128 | RD only | Tries to commit an ID for TLS/TM and to invalidate an ID for Rollback. Guarantees atomicity using a two-phase transaction. Succeeds if ID is speculative and 1C, M, N and R bit of conflict registers are clear at the end of the first phase. Returns ID on success, −1 on fail. |

Processor Local Configuration:

For each thread, a speculation ID register 50401 in FIG. 4-7-4 implemented next to the core provides a speculation ID to be attached to memory accesses of this thread.

When starting a transaction or speculative thread, the thread ID provided by the ID allocate function of the Global speculation ID management has to be written into the thread ID register of FIG. 4-7-4. this register. All subsequent memory accesses for which the TLB attribute U0 is set are tagged with this ID. Accesses for which U0 is not set are tagged as non-speculative accesses. The PowerPC architecture specifies 4 TLB attributes bits U0 to U3 that can be used for implementation specific purposes by a system architect. See PPC spec 2.06 on http//www.power.org/resources/downloads/PowerISA_V2.0613 V2_PUBLIC.pdf, page 947.

In the latest IBM® Blue Gene® architecture, the point of coherence is a directory lookup mechanism in a cache memory. It would be desirable to guarantee a hierarchy of atomicity options within that architecture.

In one embodiment, a multiprocessor system includes a plurality of processors, a conflict checking mechanism, and an instruction implementation mechanism. The processors are adapted to carry out speculative execution in parallel. The conflict checking mechanism is adapted to detect and protect results of speculative execution responsive to memory access requests from the processors. The instruction implementation mechanism cooperates with the processors and conflict checking mechanism adapted to implement an atomic operation that includes load, modify, and store with respect to a single memory location in an uninterruptible fashion.

In another embodiment, a system includes a plurality of processors and at least one cache memory. The processors are adapted to issue atomicity related operations. The operations include at least one atomic operation and at least one other type of operation. The atomic operation includes sub-operations including a read, a modify, and a write. The other type of operation includes at least one atomicity related operation. The cache memory includes an cache data array access pipeline and a controller. The controller is adapted to prevent the other types operations from entering the cache data array access pipeline, responsive to an atomic operation in the pipeline, when those other types of operation compete with the atomic operation in the pipeline for a memory resource.

In yet another embodiment, a multiprocessor system includes a plurality of processors, a central conflict checking mechanism, and a prioritizer. The processors are adapted to implement parallel speculative execution of program threads and to implement a plurality of atomicity related techniques. The central conflict checking mechanism resolves conflicts between the threads. The prioritizer prioritizes at least one atomicity related technique over at least one other atomicity related technique.

In a further embodiment, a computer method includes issuing an atomic operation, recognizing the atomic operation, and blocking other operations. The atomic operation is issued from one of the processors in a multi-processor system and defines sub-operations that include reading, modifying, and storing with respect to a memory resource. A directory based conflict checking mechanism recognizes the atomic operation. Other operations seeking to access the memory resource are blocked until the atomic operation has completed.

Three modes of speculative execution are supported in the current embodiment: Thread Level Speculation (“TLS”), Transactional Memory (“TM”), and Rollback.

TM occurs in response to a specific programmer request. Generally the programmer will put instructions in a program delimiting sections in which TM is desired. This may be done by marking the sections as requiring atomic execution. “An access is single-copy atomic, or simply "atomic", if it is always performed in its entirety with no visible fragmentation." IBM® Power ISA™ Version 2.06, Jan. 30, 2009. In a transactional model, the programmer replaces critical sections with transactional sections at 61601 (FIG. 4-8-7), which can manipulate shared data without locking. When the section ends, the program will make another call that ultimately signals the hardware to do conflict checking and reporting.

Normally TLS occurs when a programmer has not specifically requested parallel operation. Sometimes a compiler will ask for TLS execution in response to a sequential program. When the programmer writes this sequential program, she may insert commands delimiting sections. The compiler can recognize these sections and attempt to run them in parallel.

Rollback occurs in response to "soft errors," normally these errors occur in response to cosmic rays or alpha particles from solder balls. Rollback is discussed in more detail in co-pending application Ser. No. 12/696,780, which is incorporated herein by reference.

The present invention arose in the context of the IBM® Blue Gene® project, which is further described in the applications incorporated by reference above. FIG. 4-5-1 is a schematic diagram of an overall architecture of a multiprocessor system in accordance with this project, and in which the invention may be implemented. At 4101, there are a plurality of processors operating in parallel along with associated prefetch units and L1 caches. At 4102, there is a switch. At 4103, there are a plurality of L2 slices. At 4104, there is a main memory unit. It is envisioned, for the present embodiment, that the L2 cache should be the point of coherence.

FIG. 4-7-1A shows some software running in a distributed fashion, distributed over the cores of node 50.

The application program 36131 can also request various operation types, for instance as specified in a standard such as the PowerPC architecture. These operation types might include larx/stcx pairs or atomic operations, to be discussed further below.

FIG. 1B shows a timing diagram explaining how TM execution might work on this system.

FIG. 4-4-2 shows a cache slice.

FIG. 4-5-3 shows features of an embodiment of the control section 4102 of a cache slice 72.

As described above, FIG. 4-5-4 shows an example of retaining lookup information.

As described above, FIG. 4-5-5 shows more about the interaction between the directory pipe 4308 and the directory SRAM 4309.

As described above, FIG. 4-7-3C shows the formats of 4 directory SRAMs included at 4309.

In FIG. 4-7-3 the operation of the pipe control unit 4310 and the EDRAM queue decoupling buffer 4300 will be described more below with reference to FIG. 4-8-6.

The L2 implements a multitude of decoupling buffers for different purposes.

- The Request queue is an intelligent decoupling buffer (with reordering logic), allowing to receive requests from the switches even if the directory pipe is blocked
- The write data buffer accepts write data from the switch even if the eDRAM pipe is blocked or the target location in the eDRAM is not yet known
- The Coherence tracking implements two buffers: One decoupling the directory lookup sending to it requests from the internal coherence SRAM lookup pipe. And one decoupling the SRAM lookup results from the interface to the switch.
- The miss handler implements one from the DRAM controller to the eDRAM and one from the eDRAM to the DRAM controller
- There are more, almost every little subcomponent that can block for any reason is connected via a decoupling buffer to the unit feeding requests to it The L2 caches may operate as set-associative caches while also supporting additional functions, such as memory speculation for Speculative Execution (SE), Transactional Memory (TM) and local memory rollback, as well as atomic memory transactions. Support for such functionalities includes additional bookkeeping and storage functionality for multiple versions of the same physical memory line.

To reduce main memory accesses, the L2 cache may serve as the point of coherence for all processors. In performing this function, an L2 central unit will have responsibilities such as defining domains of speculation IDs, assigning modes of speculation execution to domains, allocating speculative IDS to threads, trying to commit the IDs, sending interrupts to the cores in case of conflicts, and retrieving conflict information. This function includes generating L1 invalidations when necessary. Because the L2 caches are inclusive of the L1s, they can remember which processors could possibly have a valid copy of every line, and they can multicast selective invalidations to such processors. The L2 caches are advantageously a synchronization point, so they coordinate synchronization instructions from the PowerPC architecture, such as larx/stcx.

Larx/Stcx

The larx and stcx. instructions used to perform a read-modify-write operation to storage. If the store is performed, the use of the larx and stcx instruction pair ensures that no other processor or mechanism has modified the target memory location between the time the larx instruction is executed and the time the stcx. instruction completes.

The lwarx (Load Word and Reserve Indexed) instruction loads the word from the location in storage specified by the effective address into a target register. In addition, a reservation on the memory location is created for use by a subsequent stwcx. instruction.

The stwcx (Store Word Conditional Indexed) instruction is used in conjunction with a preceding lwarx instruction to emulate a read-modify-write operation on a specified memory location.

The L2 caches will handle lwarx/stwcx reservations and ensure their consistency. They are a natural location for this responsibility because software locking is dependent on consistency, which is managed by the L2 caches.

The A2 core basically hands responsibility for lwarx/stwcx consistency and completion off to the external memory system. Unlike the 450 core, it does not maintain an internal reservation and it avoids complex cache management through simple invalidation. Lwarx is treated like a cache-inhibited load, but invalidates the target line if it hits in the L1 cache. Similarly, stwcx is treated as a cache-inhibited store and also invalidates the target line in L1 if it exists.

The L2 cache is expected to maintain reservations for each thread, and no special internal consistency action is taken by the core when multiple threads attempt to use the same lock. To support this, a thread is blocked from issuing any L2 accesses while a lwarx from that thread is outstanding, and it is blocked completely while a stwcx is outstanding. The L2 cache will support lwarx/stwcx as described in the next several paragraphs.

Each L2 slice has 17 reservation registers. Each reservation register consists of a 25-bit address register and an 9-bit thread ID register that identifies which thread has reserved the stored address and indicates whether the register is valid (i.e. in use).

When a lwarx occurs, the valid reservation thread ID registers are searched to determine if the thread has already made a reservation. If so, the existing reservation is cleared. In parallel, the registers are searched for matching addresses. If found, the thread ID is tried to be added to the thread identifier. If either no address is found or the thread ID could not be added to reservation registers with matching addresses, a new reservation is established. If a register is available, it is used, otherwise a random existing reservation is evict and a new reservation is established in its place. The larx continues as an ordinary load and returns data.

Every store searches the valid reservation address registers. All matching registers are simply invalidated. The necessary back-invalidations to cores will be generated by the normal coherence mechanism.

When a stcx occurs, the valid reservation registers 4306 are searched for entries with both a matching address and a matching thread ID. If both of these conditions are met, then the stcx is considered a success. Stcx success is returned to the requesting core and the stcx is converted to an ordinary store (causing the necessary invalidations to other cores by the normal coherence mechanism). If either condition is not met, then the stcx is considered a failure. Stcx fail is returned to the requesting core and the stcx is dropped. In addition, for every stcx any pending reservation for the requesting thread is invalidated.

To allow more than 17 reservations per slice, the actual thread ID field is encoded by the core ID and a vector of 4 bits, each representing a thread of the indicated core. If a reservation is established, first a check for matching address and core number n any register is made. If a register has both matching address and matching core, the corresponding thread bit is activated. Only if all bits are clear, the entire register is assumed invalidated and available for reallocation without eviction.

Atomic Operations

The L2 supports multiple atomic operations on 8B entities. These operations are sometimes of the type that perform read, modify, and write back atomically—in other words that combine several frequently used instructions and guarantee that they can perform successfully. The operation is selected based on address bits as defined in the memory map and the type of access. These operations will typically require RAW, WAW, and WAR checking. The directory lookup phase will be somewhat different from other instructions, because both read and write are contemplated.

FIG. 4-8-6 shows aspects of the L2 cache data array access pipeline, implemented as EDRAM pipeline 60305 in the preferred embodiment, pertinent to atomic operations. In this pipeline, data is typically ready after five cycles. At 60461, some read data is ready. Error correcting codes (ECC) are used to make sure that the read data is error free. Then read data can be sent to the core at 60463. If it is one of these read/modify/write atomic operations, the data modification is performed at 60462, followed by a write back to eDRAM at 60465, which feeds back to the beginning of the pipeline per 60464, while other matching requests are blocked from the pipeline, guaranteeing atomicity. Sometimes, two such compound instructions will be carried out sequentially. In such a case, any number of them can be linked using a feedback at 60466. To assemble a line, several iterations of this pipeline structure may be undertaken. More about assembling lines can be found in the provisional applications incorporated by reference above. Thus atomic operations, which reserve the EDRAM pipeline, can achieve performance results that a sequence of operations cannot while guaranteeing atomicity.

It is possible to feed two atomic operations to two different addresses together through the EDRAM pipe: read a, read b, then write a and b.

FIG. 4-8-7 shows a comparison between approaches to atomicity. At 61601 a thread executing pursuant to a TM model is shown. At 61602 a block of code protected by a larx/stcx pair is shown. At 61603 an atomic operation is shown.

Thread 61601 includes three parts, a first part 61604 that involves at least one load instruction;

a second part 61605 that involves at least one store instruction; and a third part 61606 where the system tries to commit the thread.

Arrow 61607 indicates that the reader set directory is active for that part. Arrow 61608 indicates that the writer set directory is active for that part.

Code block 61602 is delimited by a larx instruction 61609 and a stcx instruction 61610. Arrow 61611 indicates that the reservation table 4306 is active. When the stcx instruction executes, if there has been any read or write conflict, the whole block 61602 fails.

Atomic operation 61603 is one of the types indicated in table below, for instance "load increment." The arrows at 61612 show the arrival of the atomic operation during the periods of time delimited by double arrows at 61607 and 61611. The atomic operation is guaranteed to complete due to the block on the EDRAM pipe for the relevant memory accesses. Accordingly, if there is a concurrent use by a TM thread 61601 and/or by a block of code protected by LARX/STCX 61602, and if those uses access the same memory location as the atomic operation 61603, a conflict will be signaled and results of the code blocks 61601 and 61602 will be invalidated. A uninterruptible, persistent atomic operation will be given priority over a reversible operation, e.g. TM transaction, or an interruptible operation, e.g., a LARX/STCX pair.

As between blocks 61601 and 61602, which is successful and which invalidates will depend on the order of operations, if they compete for the same memory resource. For instance, in the absence of 61603, if the stcx instruction 61610 completes before the commit attempt 61606, the larx/stcx box will succeed while the TM thread will fail. Alternatively, also in the absence of 61603, if the commit attempt 61606 completes before the stcx instruction 61610, then the larx/stcx block will fail. The TM thread can actually function a bit like multiple larx/stcx pairs together.

FIG. 4-8-8 shows some issues relating to queuing operations. At 61701, an atomic operation issues from a processor. It takes the form of a memory access with the lower bits indicating an address of a memory location and the upper bits indicating which operation is desired. At 61702, the L1D and L1P treat this operation as an ordinary memory access to an address that is not cached. At 61703, in the pipe control unit of the L2 cache slice, the operation is recognized as an atomic operation responsive to a directory lookup. The directory lookup also determines whether there are multiple versions of the data accessed by the atomic operation. At 61704, if there are multiple versions, control is transferred to the miss handler.

At 61705, the miss handler treats the existence of multiple versions as a cache miss. It blocks further accesses to that set and prevents them from entering the queue, by directing them to the EDRAM decoupling buffer. With respect to the set, the EDRAM pipe is then made to carry out copy/insert operations at 61707 until the aggregation is complete at 61708. This version aggregation loop is used for ordinary memory accesses to cache lines that have multiple versions.

Once the aggregation is complete, or if there are not multiple versions, control passes to 61710 where the current access is inserted into the EDRAM queue. If there is already an atomic operation relating to this line of the cache at 61711, then, at 61711, the current operation must wait in the EDRAM decoupling buffer. Non atomic operations will similarly have to be decoupled if they seek to access a cache line that is currently being accessed by an atomic operation in the EDRAM queue. If there are no atomic operations relating to this line in the queue, then control passes to 61713 where the current operation is transferred to the EDRAM queue. Then, at 61714, the atomic operation traverses the EDRAM queue twice, once for the read and modify and once for the write. During this traversal, other operations seeking to access the same line may not enter the EDRAM pipe, and will be decoupled into the decoupling buffer.

The following atomic operations are examples that are supported in the preferred embodiment, though others might be implemented. These operations are implemented in addition to the memory mapped i/o operations in the PowerPC architecture.

| Opcode | Load/ Store | Operation | Function | Comment |
|---|---|---|---|---|
| 000 | Load | Load | Load the current value | |
| 001 | Load | Load Clear | Fetch current value and store zero | |
| 010 | Load | Load Increment | Fetch current value and increment storage | 0xFFFF FFFF FFFF FFFF rolls over to 0. So when sw uses the counter as unsigned, +2ˆ64 − 1 rolls over to 0. Thanks to two's complement, sw can use the counter as signed or unsigned. When using as signed, +2ˆ63 − 1 rolls over to −2ˆ63. |
| 011 | Load | Load Decrement | Fetch current value and decrement storage | 0 rolls over to to 0xFFFF FFFF FFFF FFFF. So when sw uses the counter as unsigned, 0 rolls over to +2ˆ64 − 1. Thanks to two's complement, sw can use the counter as signed or unsigned. When using as signed, −2ˆ63 rolls over to 2ˆ63 − 1. |
| 100 | Load | Load Increment Bounded | The counter is the address given and the boundary is the SUBSEQUENT address. If counter and boundary values differ, increment counter and return old value, else return 0x8000 0000 0000 0000. if (*ptrCounter==*(ptrCounter+1)){ return 0x8000 0000 0000 0000; // +2ˆ63 unsigned // −2ˆ63 signed } else { oldValue = *ptrCounter; ++*ptrCounter; return oldValue; } | The 8B counter and its 8B boundary efficiently support producer/consumer queue/stack/deque with multiple producers and multiple consumers. The counter and boundary pair must be within a 32 Byte line. Rollover and signed/nusigned software use are as for 'load increment' instruction. On boundary, 0x8000 0000 0000 0000 is returned. So unsigned use is also restricted to the upper value 2ˆ63 − 1, instead of the optimal 2ˆ64 − 1. This factor 2 loss is not expected to be a problem in practice. |
| 101 | Load | Load Decrement Bounded | The counter is the address given and the boundary is the PREVIOUS address. If counter and boundary values differ, decrement counter and return old value, else return 0x8000 0000 0000 0000. if (*ptrCounter==*(ptrCounter-1)){ return 0x8000 0000 0000 0000; | Comments as for 'Load Increment Bounded' |

-continued

| Opcode | Load/ Store | Operation | Function | Comment |
| --- | --- | --- | --- | --- |
| | | | // +2^63 unsigned<br>// −2^63 signed<br>} else {<br>oldValue = *ptrCounter;<br>--*ptrCounter;<br>return oldValue;<br>} | |
| 110 | Load | Load Increment if equal | The counter is the address given and the compare value is the SUBSEQUENT address.<br>If counter and boundary values are equal, increment counter and return old value, else return 0x8000 0000 0000 0000.<br>if<br>(*ptrCounter!=*(ptrCounter+1)){<br>return 0x8000 0000 0000 0000;<br>// +2^63 unsigned<br>// −2^63 signed<br>} else {<br>oldValue = *ptrCounter;<br>++*ptrCounter;<br>return oldValue;<br>} | The 8B counter and its 8B compare value efficiently support trylock operations for mutex locks.<br>The counter and boundary pair must be within a 32 Byte line.<br>Rollover and signed/nusigned software use are as for 'load increment' instruction.<br>On mismatch, 0x8000 0000 0000 0000 is returned.<br>So unsigned use is also restricted to the upper value 2^63 − 1, instead of the optimal 2^64 − 1. This factor 2 loss is not expected to be a problem in practice. |
| 000 | Store | Store | Store the given value | |
| 001 | Store | StoreTwin | Store 8B value to 8B address given and to the SUBSEQUENT 8B address, if these two locations previously had the equal values. | Used for fast deque implementations<br>The address pair must be within a 32 Byte line. |
| 010 | Store | Store Add | Add store value to storage | 0xFFFF FFFF FFFF FFFF and earlier rolls over to 0 and beyond. Vice versa in the other direction.<br>So when sw uses the counter as unsigned, +2^64 − 1 and earlier rolls over to 0 and beyond.<br>Thanks to two's complement, sw can use the counter and 'store value' as signed or unsigned. When using as signed, and adding a positive store value, then '+2^63 − 1 and earlier rolls over to −2^63 and beyond. Vice versa, when adding a negative store value. |
| 011 | Store | Store Add/Coherence on Zero | As Store Add, but do not keep L1-caches coherent unless storage value reaches zero | |
| 100 | Store | Store Or | Logical OR value to storage | |
| 101 | Store | Store Xor | Logical XOR value to storage | |
| 110 | Store | Store Max Unsigned | Store Max of value and storage, values are interpreted as unsigned binary | |
| 111 | Store | Store Max Sign/Value | Store Max of value and storage, values are interpreted as 1b sign and 63b absolute value<br>If the encoding of either operand represents a NaN, the operand is assumed to be positive for comparison purposes. | Allows Max of floating point numbers |

For example load increment acts similarly to a load. This instruction provides a destination address to be loaded and incremented. In other words, the load gets a special modification that tells the memory subsystem not to simply load the value, but also increment it and write the incremented data back to the same location. This instruction is useful in various contexts. For instance if there is a workload to be distributed to multiple threads, and it is not known how many threads will share the workload or which one is ready, then the workload can be divided into chunks. A function can associate a respective integer value to each of these chunks. Threads can use load-increment to get a workload by number and process it.

Each of these operations acts like a modification of main memory. If any of the core/L1 units has a copy of the modified value, it will get a notification that the memory value has changed—and it evicts and invalidates its local copy. The next time the core/L1 unit needs the value, it has to fetch it from the 12. This process happens each time the location is modified in the 12.

A common pattern is that some of the core/L1 units will be programmed to act when a memory location modified by atomic operations reaches a specific value. When polling for the value, repeated L1 misses, fetches from L2 followed by L1 invalidations due to atomic operations occur.

Store_add_coherence_on_zero reduces the events of the local cache being invalidated and a new copy gotten from the 12 cache. With this atomic operation, L1 cache lines will be left incoherent and not invalidated unless the modified value reaches zero The threads waiting for zero can then keep checking whatever their local value its L1 cache is even if that local value is inaccurate, until the value is actually zero. This means that one thread might modify the value as far as the L2 is concerned, without generating a miss for other threads.

In general, the operations in the above table, called "atomic" have an effect that the regular load and store does not have. They load, read, modify and write back in one atomic operation, even within the context of speculation. This type of operation works in the context of speculation, because of the loop back in the EDRAM pipeline. It executes conflict checking equivalent to a sequence of a load and a store. Before the atomic operation is loading, it does the version aggregation discussed further in the provisional applications incorporated by reference above.

In a further aspect, a device and method for copying performance counter data are provided. The device, in one aspect, may include at least one processor core, a memory, and a plurality of hardware performance counters operable to collect counts of selected hardware-related activities. A direct memory access unit includes a DMA controller operable to copy data between the memory and the plurality of hardware performance counters. An interconnecting path connects the processor core, the memory, the plurality of hardware performance counters, and the direct memory access unit.

A method of copying performance counter data, in one aspect, may include establishing a path between a direct memory access unit to a plurality of hardware performance counter units, the path further connecting to a memory device. The method may also include initiating a direct memory access unit to copy data between the plurality of hardware performance counter units and the memory device.

Multicore chips are those computer chips with more than a single core. The extra cores may be used to offload the work of setting up a transfer of data between the performance counters and memory without perturbing the data being generated from the running application. A direct memory access (DMA) mechanism allows software to specify a range of memory to be copied from and to, and hardware to copy all of the memory in the specified range. Many chip multiprocessors (CMP) and systems on a chip (SoC) integrate a DMA unit. The DMA engine is typically used to facilitate data transfer between network devices and the memory, or between I/O devices and memory, or between memory and memory.

Many chip architectures include a performance monitoring unit (PMU). This unit contains a number of performance counters that count a number of events in the chip. The performance counters are typically programmable to select particular events to count. This unit can count events from some or all of the processors and from other components in the system, such as the memory system, or the network system.

If software wants to use the values from performance counters, it has to read performance counters. Counters are read out using a software program which reads the memory area where performance counters are mapped by reading counters sequentially. For a system with large number of counters or with large counter access latency, executing the code to get these counter values has a substantial impact on program performance.

The mechanism of the present disclosure combines hardware and software that allows for efficient, non-obtrusive movement of hardware performance counter data between the registers that hold that data and a set of memory locations. To be able to utilize a hardware DMA unit available on the chip for copying performance counters into the memory, the hardware DMA unit is connected via paths to the hardware performance counters and registers. The DMA is initialized to perform data copy in the same way it is initialized to perform the copy of any other memory area, by specifying the starting source address, the starting destination address, and the data size of data to be copied. By offloading data copy from a processor to the DMA engine, the data transfer may occur without disturbing the core on which the measured computation or operation (i.e., monitoring and gathering performance counter data) is occurring.

A register/memory location provides the start memory location of the first destination memory address. For example, the software, or an operating system, or the like pre-allocates memory area to provide space for writing and storing the performance counter data. Additional register and/or memory location provides the start memory location of the first source memory address. This source address corresponds to the memory address of the first performance counter to be copied. Additional register and/or memory location provides the size of data to be copied, or number of performance counters to be copied.

On a multicore chip, for example, the software running on an extra core, i.e., one not dedicated to gather performance data, may decide which of the performance counters to copy, utilize the DMA engine by setting up the copy, initiate the copy, and then proceed to perform other operations or work.

FIG. 5-6-1 illustrates an architectural diagram showing using DMA for copying performance counter data to memory. DMA unit 71106, performance counter unit 71102, and L2 cache or another type of memory device 71108 are connected on the same interconnect 71110. A performance counter unit 71102 may be built into a microprocessor and includes a plurality of hardware performance counters 71104, which are registers used to store the counts of hardware-related activities within a computer. Examples of activities of which the counters 71104 may store counts may include, but are not limited to, cache misses, translation lookaside buffer (TLB) misses, the number of instructions completed, number of floating point instructions executed, processor cycles, input/output (I/O) requests, and other hardware-related activities and events. A memory device 71108, which may be an L2 cache or other memory, stores various data related to the running of the computer system and its applications.

Both the performance counter unit 71102 and the memory 71108 are accessible from the DMA unit 71106. An operating system or software may allocate an area in memory 71108 for storing the counter data of the performance counters 71104. The operating system or software may decide which performance counter data to copy, whether the data is to be copied from the performance counters 71104 to the memory 71108 or the memory 71108 to the performance counters 71104, and may prepare a packet for DMA and inject the packet into the DMA unit 71106, which initiates memory-to-memory copy, i.e., between the counters 71104 and memory 71108. In one aspect, the control packet for DMA may contain a packet type identification, which specifies that this is a memory-to-memory transfer, a starting source address of data to be copied, size in bytes of data to be copied, and a destination address where the data are to be copied. The source addresses may map to the performance counter device 71102, and destination address may map to the memory device 71108 for data transfer from the performance counters to the memory.

In another aspect, data transfer can be performed in both directions, not only from the performance counter unit to the memory, but also from the memory to the performance counter unit. Such a transfer may be used for restoring the value of the counter unit, for example.

Multiple cores 71112 may be running different processes, and in one aspect, the software that prepares the DMA packet and initiates the DMA data transfer may be running on a core that is separate from the process running on another core that is gathering the hardware performance monitoring data. In this way, the core running a measure computation, i.e., that gathers the hardware performance monitoring data, need not be disturbed or interrupted to perform the copying to and from the memory 71108.

FIG. 5-6-2 is a flow diagram illustrating a method for using DMA for copying performance counter data to memory. At 71202, software sets up a DMA packet that specifies at least which performance counters are involved in copying, the memory location in memory device that is involved in copying. At 71204, the software injects the DMA packet into the DMA unit, which invokes the DMA unit to perform the specified copy. At 71206, the software is free to perform its other tasks. At 71208, asynchronous to the software performing other tasks, the DMA unit performs the instructed copy between the performance counters and the memory as directed in the DMA packet. In one embodiment, the software that prepares and injects the DMA packet runs on one core on a microprocessor, and is a separate process from the process that may be gathering the measurement data for the performance counters, which may be running on a different core.

FIG. 5-6-3 is a flow diagram illustrating a method for using DMA for copying performance counter data to memory in another aspect. At 71302, destination address and source address are specified. The operating system or another software may specify the destination address and source address, for example, in a DMA packet. At 71304, data size and number of counters are specified. Again, the operating system or another software may specify the data size and number of counters to copy in the DMA packet. At 71306, a DMA device checks the address range specified in the packet and if not correct, an error signal is generated at 71308. The DMA device then waits for next packet. If the address range is correct at 71306, the DMA device starts copying the counter data at 71310. At 71312, the DMA device performs a store to the specified memory address. At 71314, the destination address is incremented by the length of counter data copied. At 71316, if not all counters have been copied, the control returns to 71312 to perform the next copy. If all counters have been copied, the control returns to 71302.

A device and method for hardware supported performance counter data collection are provided. The device, in one aspect, may include a plurality of performance counters operable to collect one or more counts of one or more selected activities. A first storage element may be operable to store an address of a memory location, and a second storage element may be operable to store a value indicating whether the hardware should begin copying. A state machine is operable to detect the value in the second storage element and trigger hardware copying of data in selected one or more of the plurality of performance counters to the memory location whose address is stored in the first storage element.

The present disclosure, in one aspect, describes hardware support to facilitate transferring the performance counter data between the hardware performance counters and memory. One or more hardware capability and configurations are disclosed that allow software to specify a memory location and have the hardware engine copy the counters without the software getting involved. In another aspect, the software may specify a sequence of memory locations and have the hardware perform a sequence of copies from the hardware performance counter registers to the sequence of memory locations specified by software. In this manner, the hardware need not interrupt the software.

The mechanism of the present disclosure combines hardware and software capabilities to allow for efficient movement of hardware performance counter data between the registers that hold that data and a set of memory locations. The following description of the embodiments uses the term "hardware" interchangeably with the state machine and associated registers used for controlling the automatic copying of the performance counter data to memory. Further, the term "software" may refer to the hypervisor, operating system, or another tool that either of those layers has provided direct access to. For example the operating system could set up a mapping, allowing a tool with the correct permission, to interact directly with the hardware state machine.

A direct memory engine (DMA) may be used to copy the values of performance monitoring counters from the performance monitoring unit directly to the memory without intervention of software. The software may specify the starting address of the memory where the counters are to be copied, and a number of counters to be copied.

After initialization of the DMA engine in the performance monitoring unit by software, other functions are performed by hardware. Events are monitored and counted, and an element such as a timer keeps track of time. After a time interval expires, or another triggering event, the DMA engine starts copying counter values to the predestined memory locations. For each performance counter, the destination memory address is calculated, and a set of signals for writing the counter value into the memory is generated. After all counters are copied to memory, the timer (or another triggering event) may be reset.

FIG. 5-7-1 is a diagram illustrating a hardware unit with a series of control registers. The hardware unit 72101 includes hardware performance counters 72102, which may be implemented as registers, and collect information on various activities and events occurring on the processor.

The device 72101 may be built into a microprocessor and includes a plurality of hardware performance counters 72102, which are registers used to store the counts of hardware-related activities within a computer. Examples of activities of which the counters 72102 may store counts may include, but are not limited to, cache misses, translation lookaside buffer (TLB) misses, the number of instructions completed, number of floating point instructions executed, processor cycles, input/output (I/O) requests, and other hardware-related activities and events.

Other examples may include, but are not limited to, events related to the network activity, like number of packets sent or received in each of networks links, errors when sending or receiving the packets to the network ports, or errors in the network protocol, events related to the memory activity, for example, number of cache misses for any or all cache level L1, L2, L3, or the like, or number of memory requests issued to each of the memory banks for on-chip memory, or number of cache invalidates, or any memory coherency related events. Yet more examples may include, but are not limited to, events related to one particular processor's activity in a chip multi-processor systems, for example, instructions issued and completed, integer and floating-point, for the processor 0, or for any other processor, the same type of counter events but belonging to different processors, for example, the number of integer instructions issued in all N processors. Those are some of the examples activities and events the performance counters may collect.

A register or a memory location 72104 may specify the frequency at which the hardware state machine should copy the hardware performance counter registers 72102 to memory. Software, such as the operating system, or a performance tool the operating system has enabled to directly access the hardware state machine control registers, may set this register to frequency at which it wants the hardware performance counter registers 72102 sampled.

Another register or memory location 72109 may provide the start memory location of the first memory address 72108. For example, the software program running in address space A, may have allocated memory to provide space to write the data. A segmentation fault may be generated if the specific memory location is not mapped writable into the user address space A, that interacted with the hardware state machine 72122 to set up the automatic copying.

Yet another register or memory location 72110 may indicate the length of the memory region to be written to. For each counter to be copied, hardware calculates the destination address, which is saved in the register 72106.

For the hardware to automatically and directly perform copy of data from the performance counters 72102 to store in the memory area 72114, the software may set a time interval in the register 72104. The time interval value is copied into the timer 72120 that counts down, which upon reaching zero, triggers a state machine 72122 to invoke copying of the data to the address of memory specified in register 72106. For each new value to be stored, the current address in register 72106 is calculated. When the interval timer reaches zero, the hardware may perform the copying automatically without involving the software.

In addition, or instead of using the time interval register 72104 and timer 72120, an external signal 72130 generated outside of the performance monitoring unit may be used to start direct copying. For example, this signal may be an interrupt signal generated by a processor, or by some other component in the system.

Optionally, a register or memory location 72128 may contain a bit mask indicating which of the hardware performance counter registers 72102 should be copied to memory. This allows software to choose a subset of the registers of critical registers. Copying and storing only a selected set of hardware performance counters may be more efficient in terms of the amount of the memory consumed to gather the desired data.

In one aspect, hardware may be responsible for ensuring that memory address is valid. In this embodiment, state machine 72122 checks for each address if it is within the memory area specified by the starting address, as specified in 72109, and length value, as specified in 72110. In the case the address is beyond that boundary, an interrupt signal for segmentation fault may be generated for the operating system.

In another aspect, software may be responsible to keep track of the available memory and to provide sufficient memory for copying performance counters. In this embodiment, for each counter to be copied, hardware calculates the next address without making any address boundary checks.

Another register or memory location 72112 may store a value that specifies the number of times to write the above specified hardware performance counters to memory 72114. This register may be decremented every time a DMA engine starts its copying all, or selected counters to the memory. After this register reached zero, the counters are no more copied until the next re-programming by software. Alternatively or additionally, the value may include an on or off bit which indicates whether the hardware should collect data or not.

The memory location for writing and collecting the counter data may be a pre-allocated block 72108 at the memory 72114 such as L2 cache or another with a starting address (e.g., specified in 72109) and a predetermined length (e.g., specified in 72110). In one embodiment, the block 72108 may be written once until the upper boundary is reached, after which an interrupt signal may be initialized, and further copying is stopped. In another embodiment, memory block 72108 is arranged as a circular buffer, and it is continuously overwritten each time the block is filled. In this embodiment, another register 72118 or memory location may be used to store an indication as to whether the hardware should wrap back to the beginning of the area, or stop when it reaches the end of the memory region or block specified by software. Memory device 72114 that stores the performance counter data may be an L2 cache, L3 cache, or memory.

FIG. 5-7-2 is a diagram illustrating a hardware unit with a series of control registers that support collecting of hardware counter data to memory in another embodiment of the present disclosure. The performance counter unit 72201 includes a plurality of performance counters 72202 collecting processor or hardware related activities and events.

A time interval register 72204 may store a value that specifies the frequency of copying to be performed, for example, a time value that specifies to perform a copy every certain time interval. The value may be specified in seconds, milliseconds, instruction cycles, or others. A software entity such as an operating system or another application may write the value in the register 72204. The time interval value 72204 is set in the timer 72220 for the timer 72220 to being counting the time. Upon expiration of the time, the timer 72220 notifies the state machine 72222 to trigger the copying.

The state machine 72222 reads the address value of 72206 and begins copying the data of the performance counters specified in the counter list register 72224 to the memory location 72208 of the memory 72214 specified in the address register 72206. When the copying is done, the timer 72220 is reset with the value specified in the time interval 72204, and the timer 72220 begins to count again.

The register 72224 or another memory location stores the list of performance counters, whose data should be copied to memory 72214. For example, each bit stored in the register 72224 may correspond to one of the performance counters. If a bit is set, for example, the associated performance counter should be copied. If a bit is not set, for example, the associated performance counter should not be copied.

The memory location for writing and collecting the counter data may be a set of distinct memory blocks specified by set of addresses and lengths. Another set of registers or memory locations 72209 may provide the set of start memory locations of the memory blocks 72208. Yet another set of registers or memory locations 72210 may indicate the lengths of the set of memory blocks 72208 to be written to. The starting addresses 72209 and lengths 72210 may be organized as a list of available memory locations.

A hardware mechanism, such as a finite state machine 72224 in the performance counter unit 72201 may point from memory region to memory region as each one gets filled up. The state machine may use current pointer register or memory location 72216 to indicate where in the multiple specified memory regions the hardware is currently copying to, or which of the pairs of start address 72209 and length 72210 it is currently using from the performance counter unit 72201.

The state machine 72222 uses the current address and length registers, as specified in 72216, to calculate the destination address 72206. The value in 72216 stays unchanged until the state machine identifies that the memory block is full. This condition is identified by comparing the destination address 72206 to the sum of the start address 72209 and the memory block length 72210. Once a memory block is full, the state machine 72222 increments the current register 72216 to select a different pair of start register 72209 and length register 72210.

Another register or memory location 72218 may be used to store an indication as to whether the hardware should wrap back to the beginning of the area, or stop when it reaches the end of the memory region or block specified by software.

Another register or memory location 72212 may store a value that specifies the number of times to write the above specified hardware performance counters to memory 72214. Each time the state machine 72222 initiates copying and/or storing, the value of the number of writes 72212 is decremented. If the number reaches zero, the copying is not performed. Further copying from the performance counters 72202 to memory 72214 may be re-established after an intervention by software.

In another aspect, an external interrupt 72230 or another signal may trigger the state machine 72222 or another hardware component to start the copying. The external signal 72230 may be generated outside of the performance monitoring unit 72201 to start direct copying. For example, this signal may be an interrupt signal generated by a processor, or by some other component in the system.

FIG. 5-7-3 is a flow diagram illustrating a hardware support method for collecting hardware performance counter data in one embodiment of the present disclosure. At 72302, a software thread writes time interval value into a designated register. At 72304, a hardware thread reads the value and transfers the value into a timer register. At 72306, the timer register counts down the time interval value, and when the timer count reaches zero, notifies a state machine. Any other method of detecting expiration of the timer value may be utilized. At 72308, the state machine triggers copying of all or selected performance counter register values to specified address in memory. At 72310, hardware thread copies the data to memory. At 72312, the hardware thread checks whether more copying should be performed, for example, by checking a value in another register. If more copying is to be done, then the processing returns to 72304.

FIG. 5-7-4 is a flow diagram illustrating a hardware support method for collecting hardware performance counter data in another embodiment of the present disclosure. At 72404, a state machine or another like hardware waits, for example, for a signal to start performing copies of the performance counters. The signal may be an external interrupt initiated by another device or component, or another notification. The state machine need not be idle while waiting. For example, the state machine may be performing other tasks while waiting. At 72406, the state machine receives an interrupt or another signal. At 72408, the state machine or another hardware triggers copying of hardware performance counter data to memory. At 72410, performance counter data is copied to memory. At 72412, it is determined whether there is more copying to be done. If there is more copying to be done, the step proceeds to 72404. If all copies are done, method stops.

While the above description referred to a timer element that detects the time expiration for triggering the state machine for, it should be understood that other devices, elements, or methods may be utilized for triggering the state machine. For instance, an interrupt generated by another element or device may trigger the state machine to begin copying the performance counter data.

As shown with respect to FIG. 5-8-1, there is further provided the ability for software-initiated automatic saving and restoring of the data associated with the performance monitoring unit including the entire set of control registers and associated counter values. Automatic refers to the fact that the hardware goes through each of the control registers and data values of the hardware performance counter information and stores them all into memory rather than requiring the operating system or other such software (for example, one skilled in the art would understand how to apply the mechanisms described herein to a hypervisor environment) to read out the values individually and store the values itself.

While there are many operations that need to occur as part of a context switch, this disclosure focuses the description on those that pertain to the hardware performance counter infrastructure. In preparation for performing a context switch, the operating system, which knows of the characteristics and capabilities of the computer, will have set aside memory associated with each process commensurate with the number of hardware performance control registers and data values.

One embodiment of the hardware implementation to perform the automatic saving and restoring of data may utilize two control registers associated with the infrastructure, i.e., the hardware performance counter unit. One register, R1 (for convenience of naming), 73107, is designated to hold the memory address that data is to be copied to or from. Another register, for example, a second register R2, 73104, indicates whether and how the hardware should perform the automatic copying process. The value of second register is normally a zero. When the operating system wishes to initiate a copy of the hardware performance information to memory it writes a value in the register to indicate this mode. When the operating system wishes to initiate a copy of the hardware performance values from memory it writes another value in the register that indicates this mode. For example, when the operating system wishes to initiate a copy of the hardware performance information to memory it may write a "1" to the register, and when the operating system wishes to initiate a copy of the hardware performance values from memory it may write a "2" to the register. Any other values to indications may be utilized. This may be an asynchronous operation, i.e., the hardware and the operating system may operate or function asynchronously. An asynchronous operation allows the operating system to continue performing other tasks associated with the context switch while the hardware automatically stores the data associated with the performance monitoring unit and sets an indication when finished that the operating system can check to ensure the process was complete. Alternatively, in another embodiment, the operation may be performed synchronously by setting a third register. For example, R3, 73108 can be set to "1" indicating that the hardware should not return control to the operating system after the write to R2 until the copying operation has completed.

FIG. 5-8-1 illustrates an architectural diagram showing hardware enabled performance counters with support for operating system context switching in one embodiment of the present disclosure. A performance counter unit 73102 may be built into a microprocessor, or in a multiprocessor system, and includes a plurality of hardware performance counters 73112, which are registers used to store the counts of hardware-related activities within a computer. Examples of activities of which the counters 73118 may store counts may include, but are not limited to, cache misses, translation lookaside buffer (TLB) misses, the number of instructions completed, number of floating point instructions executed, processor cycles, input/output (I/O) requests, and other hardware-related activities and events.

A memory device 73114, which may be an L2 cache or other memory, stores various data related to the running of the computer system and its applications. A register 73106 stores an address location in memory 73114 for storing the hardware performance counter information associated with the switched out process. For example, when the operating system determines it needs to switch out a given process A, it looks up in its data structures the previously allocated memory addresses (e.g., in 73114) for process A's hardware performance counter information and writes the beginning value of that address range into a register 73106. A register 73107 stores an address location in memory 73114 for loading the hardware performance counter information associated with the switched in process. For example, when the operating system determines it needs to switch in a given process B, it looks up in its data structures the previously allocated memory addresses (e.g., in 73114) for process B's hardware performance counter information and writes the beginning value of that address range into a register 73107.

Context switch register 73104 stores a value that indicates the mode of copying, for example, whether the hardware should start copying, and if so, whether the copying should be from the performance counters 73112 to memory 73114, or from the memory 73114 to the performance counters 73112, for example, depending on whether the process is being context switched in or out. Table 1 for examples shows possible values that may be stored by or written into the context switch 73102 as an indication for copying. Any other values may be used.

TABLE 1

| Value | Meaning of the value |
|---|---|
| 0 | No copying needed |
| 1 | Copy the current values from the performance counters to the memory location indicated in the context address current register, and then copy values from the memory location indicated in the context address new to the performance counters |
| 2 | Copy from the performance counters to the memory location indicated in the context address register |
| 3 | Copy from the memory location indicated in context address register to the performance counters |

The operating system for example writes those values into the register 73104, according to which the hardware performs its copying.

A control state machine 73110 starts the context switch operation of the performance counter information when the register 73104 holds values that indicate that the hardware should start copying. If the value in the register 73104 is 1 or 2, the circuitry of the performance counter unit 73102 stores the current context (i.e., the information in the performance counters 73112) of the counters 73112 to the memory area 73114 specified in the context address register 73106. This actual data copying can be performed by a simple direct memory access engine (DMA), not shown in the picture, which generates all bus signals necessary to store data to the memory. Alternatively, this functionality can be embedded in the state machine 73110. All performance counters and their configurations are saved to the memory starting at the address specified in the register 73106. The actual arrangement of counter values and configuration values in the memory addresses can be different for different implementations, and does not change the scope of this invention.

If the value in the register 73104 is 3, or is 1 and the copy-out step described above is completed, the copy-in step starts. The new context (i.e., hardware performance counter information associated with the process being switched in) is loaded from the memory area 73114 indicated in the context address 73107. In addition, the values of performance counters are copied from the memory back to the performance counters 73112. The exact arrangement of counter values and configurations values does not change the scope of this invention.

When the copying is finished, the state machine 73110 sets the context switch register to a value (e.g., "0") that indicates that the copying is completed. In another embodiment, the performance counters may generate an interrupt to signal the completion of copying. The interrupt may be used to notify the operating system that the copying has completed. In one embodiment, the hardware clears the context switch register 73104. In another embodiment, the operating system resets the context switch register value 73104 (e.g., "0") to indicate no copying.

The state machine 73110 copies the memory address stored in the context address register 73107 to the context address register 73106. Thus, the new context address is free to be used in the future for the next context switch, and the current context will be copied back to its previous memory location.

In another embodiment of the implementation, the second context address register 73107 may not be needed. That is, the operating system may use one context address register 73106 for indicating the memory address to copy to or to copy from, for context switching out or context switching in, respectively. Thus, for example, register 73106 may be also used for indicating a memory address from where to context switch in the hardware performance counter information associated with a process being context switched in, when the operating system is context switching back in a process that was context switched out previously.

Additional number of registers or the like, or different configurations for hardware performance counter unit may be used to accomplish the automatic saving of storing and restoring of contexts by the hardware, for example, while the operating system may be performing other operations or tasks, and/or, so that the operating system or the software or the like need not individually read the counters and associated controls.

FIG. 5-8-2 is a flow diagram illustrating a method for hardware enabled performance counters with support for operating system context switching in one embodiment of the present disclosure. While the method shown in FIG. 5-8-2 illustrates a specific steps for invoke the automatic copying mechanisms using several registers, it should be understood that other implementation of the method and any number of registers or the like may be used for the operating system or the like to invoke an automatic copying of the counters to memory and memory to counters by the hardware, for instance, so that the operating system or the like does not have to individually read the counters and associated controls.

Referring to FIG. 5-8-2, at 73202 when the operating system determines it needs to switch out a given process A, it looks up in its data structures the previously allocated memory addresses for process A's hardware performance counter information and writes the beginning value of that range into a register, e.g., register R1. At 73204, the operating system or the like then writes a value in another register, e.g., register R2 to indicate that copying from the performance counters to the memory should begin. For instance, the operating system or the like writes "1" to R2. At 73206, the hardware identifies that the value in register R2 or the like indicates data copy-out command, and based on the value performs copying. For example, writing values 1 or 2 in the register R2 generates a signal "start copying data" which causes the state machine to enter the state "copy data". In this state, for example, data are stored to the memory starting at the specified memory location, and respecting the implemented bus protocol. This step may include driving bus control signals to specify store operation, driving address lines with destination address and driving data lines with data values to be stored. The exact memory writing protocol of the particular implementation may be followed, i.e., how many cycles these bus signals need to be driven, and if there is an acknowledgement signal from the memory that writing succeeded. The exact bus protocol and organization does not change the scope of this invention. The data store operation is performed for all values which need to be copied.

The operating system or the like may proceed in performing other operations while the hardware copies that data from the hardware performance control and data registers. At 73208, after the hardware finishes copying, the hardware resets the value at register R1, for example, to "0" to indicate that the copying is done. At 73208, prior to completing the context switch, the operating system or the like checks the value of register R2 to make sure it is "0" or another value, which indicates that the hardware has finished the copy.

For context switching back in process B, the operating system or the like may perform the similar procedure. For example, the operating system writes the beginning of the range of addresses used for storing hardware performance counter information associated with process B into register R1 (or another such designated memory location), writes a value (e.g., "3") into register R2 to indicate to the hardware to start copying from the memory location specified in register R1 to the hardware performance counters. The operating system or the like may proceed with other context restoring operation. Prior to returning control to the process, the operating system verifies that the hardware finished its copying function, for example, by checking the value in R2 (in this example, checking for "0" value). In this way, the copying of the hardware performance counter information with the other operations needed when performing a context switch can be performed in parallel, or substantially in parallel.

In another embodiment, rather than having the operating system check a register to determine whether the hardware completed its copying, another register, R3, may be used to indicate to the hardware whether and when the control to the operating system should be returned. For instance, if this register is set to a predetermined value, e.g., "1", the hardware will not return control to the operating system until the copy is complete. For example, this register, or a bit in another control register, is labeled "interrupt enabled", and it specifies that an interrupt signal should be raised when data copy is complete. Operating system performs operations which are part of context switching in parallel. Once this interrupt is received, operating system is informed that all data copying of the performance counters is completed.

FIG. 5-8-3 is a flow diagram illustrating hardware enabled performance counters with support for operating system context switching using a register setting in one embodiment of the present disclosure. At 73302, if the register value is not zero, the method may proceed to 73304. At 73304, if the register value is one or three, configuration registers and counter values are copied to memory at 73306. At 73308 if all configuration registers and counter values have been copied, the method may proceed to 73310. At 73310, if the register value is one, the method proceeds to 73312, otherwise the method proceeds to 73314. Also at 73304 if the register value was not one and not three, then the method proceeds to 73312. At 73312, values from the memory are copied into configuration registers and counter values. At 73314, new configuration address is copied into the current configuration address. At 73316, the register value is set to zero.

The above described examples used the register values as being set to "0", "1", and "2" in explaining the different modes indicated in the register value. It should be understood, however, that any other values may be used to indicate the different modes of copying.

There is further provided hardware support to facilitate the efficient hardware switching and storing of counters. Particularly, in one aspect, the hardware support of the present disclosure allows specification of a set of groups of hardware performance counters, and the ability to switch between those groups without software intervention.

In one embodiment, hardware and software is combined that allows for the ability to set up a series of different configurations of hardware performance counter groups. The hardware may automatically switch between the different configurations at a predefined interval. For the hardware to automatically switch between the different configurations, the software may set an interval timer that counts down, which upon reaching zero, switches to the next configuration in the stored set of configurations. For example, the software may set up the set of configurations that it wants the hardware to switch between and also set a count of the number of hardware configurations it has set up. When the interval timer reaches zero, the hardware may update the currently collected set of hardware counters automatically without involving the software and set up a new group of hardware performance counters to start being collected.

In another aspect, another configuration switching trigger may be utilized instead of a timer element. For example, an interrupt or an external interrupt from another device may be set up to periodically or at a predetermined time or event, to trigger the hardware performance counter reconfiguration or switching.

In one embodiment, a register or memory location specifies the number of times to perform the configuration switch. In another embodiment, rather than a count, an on/off binary value may indicate whether hardware should continue switching configurations or not.

Yet in another embodiment, the user may set a register or memory location to indicate that when the hardware switches groups, it should clear performance counters. In still yet another embodiment, a mask register or memory location may be used to indicate which counters should be cleared.

FIG. 5-9-1 shows a hardware device 74102 that supports performance counter reconfiguration in one embodiment of the present disclosure. The device 74102 may be built into a microprocessor and includes a plurality of hardware performance counters 74118, which are registers or the like used to store the counts of hardware-related activities within a computer. Examples of activities of which the counters 74118 may store counts may include, but are not limited to, cache misses, translation lookaside buffer (TLB) misses, the number of instructions completed, number of floating point instructions executed, processor cycles, input/output (I/O) requests, and other hardware-related activities and events.

A plurality of configuration registers 74110, 74112 may each include a set of configurations that specify what activities and/or events the counters 74118 should count. For example, configuration 1 register 74110 may specify counter events related to the network activity, like the number of packets sent or received in each of networks links, the errors when sending or receiving the packets to the network ports, or the errors in the network protocol. Similarly, configuration 2 register 74112 may specify a different set of configurations, for example, counter events related to the memory activity, for instance, the number of cache misses for any or all cache level L1, L2, L3, or the like, or the number of memory requests issued to each of the memory banks for on-chip memory, or the number of cache invalidates, or any memory coherency related events. Yet another counter configuration can include counter events related to one particular processor's activity in a chip multiprocessor systems, for example, instructions issued or instructions completed, integer and floating-point instructions, for the processor 0, or for any other processor. Yet another counter configuration may include the same type of counter events but belonging to different processors, for example, the number of integer instructions issued in all N processors. Any other counter configurations are possible. In one aspect, software may set up those configuration registers to include desired set of configurations by writing to those registers.

Initially, the state machine may be set to select a configuration (e.g., 74110 or 74112), for example, using a multiplexer or the like at 74114. A multiplexer or the like at 74116 then selects from the activities and/or events 74120, 74122, 74134, 74126, 74128, etc., the activities and/or events specified in the selected configuration (e.g., 74110 or 74112) received from the multiplexer 74114. Those selected activities and/or events are then sent to the counters 74118. The counters 74118 accumulate the counts for the selected activities and/or events.

A time interval component 74104 may be a register or the like that stores a data value. In another aspect, the time interval component 74104 may be a memory location or the like. Software such as an operating system or another program may set the data value in the time interval 74104. A timer 74106 may be another register that counts down from the value specified in the time interval register 74104. In response to the count down value reaching zero, the timer 74106 notifies a control state machine 74108. For instance, when the timer reaches zero, this condition is recognized, and a control signal connected to the state machine 74108 becomes active. Then the timer 74106 may be reset to the time interval value to start a new period for collecting data associated with the next configuration of hardware performance counters.

In response to receiving a notification from the timer 74106, the control state machine 74108 selects the next configuration register, e.g., configuration 1 register 74110 or configuration 2 register 74112 to reconfigure activities tracked by the performance counters 74118. The selection may be done using a multiplexer 74114, for example, that selects between the configuration registers 74110 and 74112. It should be noted that while two configuration registers are shown in this example, any number of configuration registers may be implemented in the present disclosure. Activities and/or events (e.g., as shown at 74120, 74122, 74124, 74126, 74128, etc.) are selected by the multiplexer 74116 based on the configuration selected at the multiplexer 74114. Each counter at 74118 accumulates counts for the selected activities and/or events.

In another embodiment, there may be a register or memory location labeled "switch" 74130 for indicating the number of times to perform the configuration switch. In yet another embodiment, the indication to switch may be provided by an on/off binary value. In the embodiment with a number of possible switching between the configurations, the initial value may be specified by software. Each time the state machine 74108 initiates state switching, the value of the remaining switching is decremented. Once the number of the allowed configuration switching reaches zero, all further configuration change conditions are ignored. Further switching between the configurations may be re-established after intervention by software, for instance, if the software re-initializes the switch value.

In addition, a register or memory location "clear" 74132 may be provided to indicate whether to clear the counters when the configuration switch occurs. In one embodiment, this register has only one bit, to indicate if all counter values have to be cleared when the configuration is switched. In another embodiment, this counter has a number of bits M+1, where M is the number of performance counters 74118. These register or memory values may be a mask register or memory location for indicating which of M counters should be cleared. In this embodiment, when configuration switching condition is identified, the state machine 74108 clears the counters and selects different counter events by setting appropriate control signals for the multiplexer 74116. If the clear mask is used, only the selected counters will be cleared. This may be implemented, for example, by AND-ing the clear mask register bits 74132 and "clear registers" signal generated by the state machine 74108 and feeding them to the performance counters 74118.

In addition, or instead of using the time interval register 74104 and timer 74106, an external signal 74140 generated outside of the performance monitoring unit may be used to start reconfiguration. For example, this signal may be an interrupt signal generated by a processor, or by some other component in the system. In response to receiving this external signal, the state machine 74108 may start reconfiguration in the same way as described above.

FIG. 5-9-2 is a flow diagram illustrating a hardware support method that supports software controlled reconfiguration of performance counters in one embodiment of the present disclosure. At 74202, a timer element reads a value from a time interval register or the like. The software, for example, may have set or written the value into the time interval register. Examples of the software may include, but are not limited to, an operating system, another system program, or an application program, or the like. The value indicates the time interval for switching performance counter configuration. The value may be in units of clock cycles, milliseconds, seconds, or others. At 74204, the timer element detects the expiration of the time specified by the value. For instance, the timer element may have counted down from the value and when the value reaches zero, the timer elements detects that the value has expired. Any other methods may be utilized by the timer element to detect the expiration of the time interval, e.g., the timer element may count up from zero until it reaches the value.

At 74206, in response to detecting that the time interval set in the time interval register has passed, the timer element signals or otherwise notifies the state machine controlling the configuration register selection. At 74208, the state machine selects the next configuration, for example, stored in a register. For example, the performance counters may have been providing counts for activities specified in configuration register A. After the state machine 74108 selects the next configuration, for example, configuration register B, the performance counters start counting the activities specified in configuration register B, thus reconfiguring the performance counters. Once the state machine switches configuration, the timer elements again starts counting the time. For example, the timer element may again read the value from the timer interval register and for instance, start counting down from that number until it reaches zero. In the present disclosure, any number of configurations, for example, each stored in a register can be supported.

As described above, the desired time intervals for multiplexing (i.e., reconfiguring) are programmable. Further, the counter configurations are also programmable. For example, the software may set the desired configurations in the configuration registers. FIG. 5-9-3 is a flow diagram illustrating the software programming the registers. At 74212, the software may set the time interval value in a register, for example, from which register the time may read the value to start counting down. At 74214, the software may set the configurations for performance counters, for instance, in different configuration registers. At 74216, the software may set a register value that indicates whether the state machine should be switching configurations. The value may be an on/off bit value, which the timer element reads to determine whether to signal the state machine. In another aspect, this value may be a number which indicates how many times the switching of the reconfiguration should occur. In addition, the software may set or program other parameters such as whether to clear the performance counters when switching or a select counter to clear. The steps shown in FIG. 5-9-3 may be performed at any time and in any order.

There is further provided, in one aspect, hardware support to facilitate the efficient counter reconfiguration, OS switching and storing of hardware performance counters. Particularly, in one aspect, the hardware support of the present disclosure allows specification of a set of groups of hardware performance counters, and the ability to switch between those groups without software intervention. Hardware switching may be performed, for example, for reconfiguring the performance counters, for instance, to be able to collect information related to different sets of events and activities occurring on a processor or system. Hardware switching also may be performed, for example, as a result of operating system context switching that occurs between the processes or threads. The hardware performance counter data may be stored directly to memory and/or restored directly from memory, for example, without software intervention, for instance, upon reconfiguration of the performance counters, operating system context switching, and/or at a predetermined interval or time.

The description of the embodiments herein uses the term "hardware" interchangeably with the state machine and associated registers used for controlling the automatic copying of the performance counter data to memory. Further, the term "software" may refer to the hypervisor, operating system, or another tool that either of those layers has provided direct access of the hardware to. For example, the operating system could set up a mapping, allowing a tool with the correct permission to interact directly with the hardware state machine.

In one aspect, hardware and software may be combined to allow for the ability to set up a series of different configurations of hardware performance counter groups. The hardware then may automatically switch between the different configurations. For the hardware to automatically switch between the different configurations, the software may set an interval timer that counts down, which upon reaching zero, switches to the next configuration in the stored set of configurations. For example, the software may set up a set of configurations that it wants the hardware to switch between and also set a count of the number of hardware configurations it has set up. In response to the interval timer reaching zero, the hardware may change the currently collected set of hardware performance counter data automatically without involving the software and set up a new group of hardware performance counters to start being collected. The hardware may automatically copy the current value in the counters to the pre-determined area in the memory. In another aspect, the hardware may switch between configurations in response to receiving a signal from another device, or receiving an external interrupt or others. In addition, the hardware may store the performance counter data directly in memory automatically.

In one embodiment, a register or memory location specifies the number of times to perform the configuration switch. In another embodiment, rather than a count, an on/off binary value may indicate whether hardware should continue switching configurations or not. Yet in another embodiment, the user may set a register or memory location to indicate that when the hardware switches groups, it should clear performance counters. In still yet another embodiment, a mask register or memory location may be used to indicate which counters should be cleared.

FIG. 5-10-1 shows a hardware device 6102 that supports performance counter switching in one embodiment of the present disclosure. The device 6102 may be built into a microprocessor and includes a plurality of hardware performance counters 6118, which are registers or the like used to store the counts of hardware-related activities within a computer. Examples of activities of which the counters 6118 may store counts may include, but are not limited to, cache misses, translation lookaside buffer (TLB) misses, the number of instructions completed, number of floating point instructions executed, processor cycles, input/output (I/O) requests, and network related activities, other hardware-related activities and events.

A plurality of configuration registers 6110, 6112, 6113 may each include a set of configurations that specify what activities and/or events the counters 6118 should count. For example, configuration 1 register 6110 may specify counter events related to the network activity, like the number of packets sent or received in each of networks links, the errors when sending or receiving the packets to the network ports, or the errors in the network protocol. Similarly, configuration 2 register 6112 may specify a different set of configurations, for example, counter events related to the memory activity, for instance, the number of cache misses for any or all cache level L1, L2, L3, or the like, or the number of memory requests issued to each of the memory banks for on-chip memory, or the number of cache invalidates, or any memory coherency related events. Yet another counter configuration can include counter events related to one particular process activity in a chip multiprocessor systems, for example, instructions issued or instructions completed, integer and floating-point instructions, for the process 0, or for any other process. Yet another counter configuration may include the same type of counter events but belonging to different processes, for example, the number of integer instructions issued in all N processes. Any other counter configurations are possible. In one aspect, software may set up those configuration registers to include desired set of configurations by writing to those registers.

Initially, the state machine 6108 may be set to select a configuration (e.g., 6110, 6112, . . . , or 6113), for example, using a multiplexer or the like at 114. A multiplexer or the like at 6116 then selects from the activities and/or events 6120, 6122, 6124, 6126, 6128, etc., the activities and/or events specified in the selected configuration (e.g., 6110 or 6112) received from the multiplexer 6114. Those selected activities and/or events are then sent to the counters 61118. The counters 6118 accumulate the counts for the selected activities and/or events.

A time interval component 6104 may be a register or the like that stores a data value. In another aspect, the time interval component 6104 may be a memory location or the like. Software such as an operating system or another program may set the data value in the time interval 6104. A timer 6106 may be another register that counts down from the value specified in the time interval register 6104. In response to the count down value reaching zero, the timer 6106 notifies a control state machine 6108. For instance, when the timer reaches zero, this condition is recognized, and a control signal connected to the state machine 6108 becomes active. Then the timer 6106 may be reset to the time interval value to start a new period for collecting data associated with the next configuration of hardware performance counters.

In another aspect, an external interrupt or another signal 6170 may trigger the state machine 6108 to begin reconfiguring the hardware performance counters 6118.

In response to receiving a notification from the timer 6106 or another signal, the control state machine 6108 selects the next configuration register, e.g., configuration 1 register 6110 or configuration 2 register 6112 to reconfigure activities tracked by the performance counters 6118. The selection may be done using a multiplexer 6114, for example, that selects between the configuration registers 6110, 6112, 6113. It should be noted that while three configuration registers are shown in this example, any number of configuration registers may be implemented in the present disclosure. Activities and/or events (e.g., as shown at 6120, 6122, 6124, 6126, 6128, etc.) are selected by the multiplexer 6116 based on the configuration selected at the multiplexer 6114. Each counter at 6118 accumulates counts for the selected activities and/or events.

In another embodiment, there may be a register or memory location labeled "switch" 6130 for indicating the number of times to perform the configuration switch. In yet another embodiment, the indication to switch may be provided by an on/off binary value. In the embodiment with a number of possible switching between the configurations, the initial value may be specified by software. Each time the state machine 6108 initiates state switching, the value of the remaining switching is decremented. Once the number of the allowed configuration switching reaches zero, all further configuration change conditions are ignored. Further switching between the configurations may be re-established after intervention by software, for instance, if the software re-initializes the switch value.

In addition, a register or memory location "clear" 6132 may be provided to indicate whether to clear the counters when the configuration switch occurs. In one embodiment, this register has only one bit, to indicate if all counter values have to be cleared when the configuration is switched. In another embodiment, this counter has a number of bits M+1, where M is the number of performance counters 6118. These register or memory values may be a mask register or memory location for indicating which of M counters should be cleared. In this embodiment, when configuration switching condition is identified, the state machine 6108 clears the counters and selects different counter events by setting appropriate control signals for the multiplexer 6116. If the clear mask is used, only the selected counters may be cleared. This may be implemented, for example, by AND-ing the clear mask register bits 6132 and "clear registers" signal generated by the state machine 6108 and feeding them to the performance counters 6118.

In addition, or instead of using the time interval register 6104 and timer 6106, an external signal 6170 generated outside of the performance monitoring unit may be used to start reconfiguration. For example, this signal may be an interrupt signal generated by a processor, or by some other component in the system. In response to receiving this external signal, the state machine 6108 may start reconfiguration in the same way as described above.

In addition, the software may specify a memory location 6136 and have the hardware engine copy the counters without the software getting involved. In another aspect, the software may specify a sequence of memory locations and have the hardware perform a sequence of copies from the hardware performance counter registers to the sequence of memory locations specified by software.

The hardware may be used to copy the values of performance monitoring counters 6118 from the performance monitoring unit 6102 directly to the memory area 6136 without intervention of software. The software may specify the starting address 6109 of the memory where the counters are to be copied, and a number of counters to be copied.

In hardware, events are monitored and counted, and an element such as a timer 6106 keeps track of time. After a time interval expires, or another triggering event, the hardware may start copying counter values to the predetermined memory locations. For each performance counter, the destination memory address 6148 may be calculated, and a set of signals for writing the counter value into the memory may be generated. After the specified counters are copied to memory, the timer (or another triggering event or element) may be reset.

Referring to FIG. 5-10-1, a register or a memory location 140 may specify how many times the hardware state machine should copy the hardware performance counter registers 6118 to memory. Software, such as the operating system, or a performance tool the operating system enabled to directly access the hardware state machine control registers, may set this register to frequency at which it wants the hardware performance counter registers 6118 sampled.

In another aspect, instead of a separate register or memory location 6140, the register at 6130 that specifies the number of configuration switches may be also used for specifying the number of memory copies. In this case, the number of reconfigurations and copying to memory may coincide.

Another register or memory location 6109 may provide the start memory location of the first memory address 6148. For example, the software program running in address space A, may have allocated memory to provide space to write the data. A segmentation fault may be generated if the specific memory location is not mapped writable into the user address space A that interacted with the hardware state machine 6108 to set up the automatic copying.

Yet another register or memory location 6138 may indicate the length of the memory region to be written to. For each counter to be copied, hardware calculates the destination address, which is saved in the register 6148.

For the hardware to automatically and directly perform copy of data from the performance counters 6108 to store in the memory area 6134, the software may set a time interval in the register 6104. The time interval value may be copied into the timer 6106 that counts down, which upon reaching zero, triggers a state machine 6108 to invoke copying of the data to the address of memory specified in register 6148. For each new value to be stored, the current address in register 6148 is calculated. When the interval timer reaches zero, the hardware may perform the copying automatically without involving the software. The time interval register 6104 and the timer 6106 may be utilized by the performance counter unit for both counter reconfiguration and counter copy to memory, or there may be two sets of time interval registers and timers, one used for directly copying the performance counter data to memory, the other used for counter reconfiguration. In this manner, the reconfiguration of the hardware performance counters and copying of hardware performance counter data may occur independently or asynchronously.

In addition, or instead of using the time interval register 6104 and timer 6106, an external signal 6170 generated outside of the performance monitoring unit may be used to start direct copying. For example, this signal may be an interrupt signal generated by a processor or by some other component in the system.

Optionally, a register or memory location 6146 may contain a bit mask indicating which of the hardware performance counter registers 6118 should be copied to memory. This allows software to choose a subset of the registers. Copying and storing only a selected set of hardware performance counters may be more efficient in terms of the amount of the memory consumed to gather the desired data.

The software is responsible for pre-allocating a region of memory sufficiently large to hold the intended data. In one aspect, if the software does not pass a large enough buffer in, a segmentation fault will occur when the hardware attempts to write the first piece of data beyond the buffer provided by the user (assuming the addressed location is unmapped memory).

Another register or memory location 6140 may store a value that specifies the number of times to write the above specified hardware performance counters to memory 6134. This register may be decremented every time the hardware state machine starts copying all, or a subset of counters to the memory. Once this register reaches zero, the counters are no longer copied until the next re-programming by software. Alternatively or additionally, the value may include an on or off bit which indicates whether the hardware should collect data or not.

The memory location for writing and collecting the counter data may be a pre-allocated block 6136 at the memory 6134 such as L2 cache or another with a starting address (e.g., specified in 6109) and a predetermined length (e.g., specified in 6138). In one embodiment, the block 6136 may be written once until the upper boundary is reached, after which an interrupt signal may be initialized, and further copying is stopped. In another embodiment, memory block 6136 is arranged as a circular buffer, and it is continuously overwritten each time the block is filled. In this embodiment, another register 6144 or memory location may be used to store an indication as to whether the hardware should wrap back to the beginning of the area, or stop when it reaches the end of the memory region or block specified by software. Memory device 6134 that stores the performance counter data may be an L2 cache, L3 cache, or memory.

The memory location for writing and collecting the counter data may be a set of distinct memory blocks specified by set of addresses and lengths. For example, the element shown at 6109 may be a set of registers or memory locations that specify the set of start memory locations of the memory blocks 6134. Similarly, the element shown at 6138 may be another set of registers or memory locations that indicate the lengths of the set of memory blocks to be written to. The starting addresses 6109 and lengths 6138 may be organized as a list of available memory locations. A hardware mechanism, such as a finite state machine 6108 in the performance counter unit 6102 may point from memory region to memory region as each one gets filled up. The state machine may use current pointer register or memory location 6142 to indicate where in the multiple specified memory regions the hardware is currently copying to, or which of the pairs of start address 6109 and length 6138 it is currently using from the performance counter unit 6102.

FIG. 5-10-2 is a flow diagram illustrating a method for reconfiguring and data copying of hardware performance counters in one embodiment of the present disclosure. At 6202, software sets up all or some configuration registers in the performance counter unit 6102. Software, which may be a user-level application or an operating system, may set up several counter configurations, and one or more starting memory addresses and lengths where performance counter data will be copied. In one aspect, software also writes time interval value into a designated register, and at 6204, hardware transfers the value into a timer register. In another aspect an interrupt triggers the transfer of data or reconfiguration.

At 6206, the timer register counts down the time interval value, and when the timer count reaches zero, notifies a state machine. Any other method of detecting expiration of the timer value may be utilized. At 6208, the state machine triggers copying of all or selected performance counter register values to specified address in memory. At 6210, hardware copies performance counters to the memory.

At 6212, hardware checks if the configuration of performance counters needs to be changed, by checking a value in another register. If the configuration does not need to be changed, the processing returns to 6204. At 6214, a state machine changes the configuration of the performance counter data.

FIG. 5-10-3 shows a hardware device that supports performance counter reconfiguration and copying, and OS context switching in one embodiment of the present disclosure. The hardware device shown in FIG. 5-10-3 may include all the elements shown and described with respect to FIG. 5-10-1. Further, the device may include automatic hardware support capabilities for operating system context switching. Automatic refers to the fact that the hardware goes through each of the control registers and data values of the hardware performance counter information and stores them all into memory rather than requiring the operating system or other such software (for example, one skilled in the art would understand how to apply the mechanisms described herein to a hypervisor environment) to read out the values individually and store the values itself.

While there are many operations that need to occur as part of a context switch, this disclosure focuses the description on those that pertain to the hardware performance counter infrastructure. In preparation for performing a context switch, the operating system, which knows of the characteristics and capabilities of the computer, will have set aside memory associated with each process commensurate with the number of hardware performance control registers and data values.

One embodiment of the hardware implementation to perform the automatic saving and restoring of data may utilize two control registers associated with the infrastructure, i.e., the hardware performance counter unit. One register, R1 (for convenience of naming), 6156, is designated to hold the memory address that data is to be copied to or from. Another register, for example, a second register R2, 6160, indicates whether and how the hardware should perform the automatic copying process. The value of second register may be normally a zero. When the operating system wishes to initiate a copy of the hardware performance information to memory it writes a value in the register to indicate this mode. When the operating system wishes to initiate a copy of the hardware performance values from memory it writes another value in the register that indicates this mode. For example, when the operating system wishes to initiate a copy of the hardware performance information to memory it may write a "1" to the register, and when the operating system wishes to initiate a copy of the hardware performance values from memory it may write a "2" to the register. Any other values for such indications may be utilized. This may be an asynchronous operation, i.e., the hardware and the operating system may operate or function asynchronously. An asynchronous operation allows the operating system to continue performing other tasks associated with the context switch while the hardware automatically stores the data associated with the performance monitoring unit and sets an indication when finished that the operating system can check to ensure the process was complete. Alternatively, in another embodiment, the operation may be performed synchronously by setting a third register. For example, R3, 6158, can be set to "1" indicating that the hardware should not return control to the operating system after the write to R2 until the copying operation has completed.

Referring to FIG. 5-10-3, a performance counter unit 6102 may be built into a microprocessor, or in a multiprocessor system, and includes a plurality of hardware performance counters 6118, which are registers used to store the counts of hardware-related activities within a computer as described above.

A memory device 6134, which may be an L2 cache or other memory, stores various data related to the running of the computer system and its applications. A register 6109 stores an address location in memory 6134 for storing the hardware performance counter information associated with the switched out process. For example, when the operating system determines it needs to switch out a given process A, it looks up in its data structures the previously allocated memory addresses (e.g., in 6162) for process A's hardware performance counter information and writes the beginning value of that address range into a register 6106. A register 6156 stores an address location in memory 6134 for loading the hardware performance counter information associated with the switched in process. For example, when the operating system determines it needs to switch in a given process B, it looks up in its data structures the previously allocated memory addresses (e.g., in 6164) for process B's hardware performance counter information and writes the beginning value of that address range into a register 6156.

Context switch register 6160 stores a value that indicates the mode of copying, for example, whether the hardware should start copying, and if so, whether the copying should be from the performance counters 6118 to memory 6134, or from the memory 6134 to the performance counters 6118, for example, depending on whether the process is being context switched in or out. Table 1 for examples shows possible values that may be stored by or written into the context switch 6160 as an indication for copying. Any other values may be used.

TABLE 1

| Value | Meaning of the value |
|---|---|
| 0 | No copying needed |
| 1 | Copy the current values from the performance counters to the memory location indicated in the context address current register, and then copy values from the memory location indicated in the context address new to the performance counters |
| 2 | Copy from the performance counters to the memory location indicated in the context address register |
| 3 | Copy from the memory location indicated in context address register to the performance counters |

The operating system for example writes those values into the register 6160, according to which the hardware performs its copying.

A control state machine 6108 starts the context switch operation of the performance counter information when the signal 6170 is active, or when the timer 6106 indicates that the hardware should start copying. If the value in the register 6160 is 1 or 2, the circuitry of the performance counter unit 6102 stores the current context (i.e., the information in the performance counters 6118) of the counters 6118 to the memory area 6134 specified in the current address register 6148. All performance counters and their configurations are saved to the memory starting at the address specified in the register 6109. The actual arrangement of counter values and configuration values in the memory addresses can be different for different implementations, and does not change the scope of this invention.

If the value in the register 6160 is 3, or it is 1 and the copy-out step described above is completed, the copy-in step starts. The new context (i.e., hardware performance counter information associated with the process being switched in) is loaded from the memory area 6164 indicated in the context address 6156. In addition, the values of performance counters are copied from the memory back to the performance counters 6118. The exact arrangement of counter values and configurations values does not change the scope of this invention.

When the copying is finished, the state machine 6108 may set the context switch register to a value (e.g., "0") that indicates that the copying is completed. In another embodiment, the performance counters may generate an interrupt to signal the completion of copying. The interrupt may be used to notify the operating system that the copying has completed. In one embodiment, the hardware clears the context switch register 6160. In another embodiment, the operating system resets the context switch register value 6160 (e.g., "0") to indicate no copying.

The state machine 6108 copies the memory address stored in the context address register 6156 to the current address register 6148. Thus, the new context address register 6156 is free to be used for the next context switch.

In another embodiment of the implementation, the second context address register 6156 may not be needed. That is, the operating system may use one context address register 6109 for indicating the memory address to copy to or to copy from, for context switching out or context switching in, respectively. Thus, for example, register 6148 may be also used for indicating a memory address from where to context switch in the hardware performance counter information associated with a process being context switched in, when the operating system is context switching back in a process that was context switched out previously.

Additional number of registers or the like, or different configurations for hardware performance counter unit may be used to accomplish the automatic saving of storing and restoring of contexts by the hardware, for example, while the operating system may be performing other operations or tasks, and/or, so that the operating system or the software or the like need not individually read the counters and associated controls.

FIG. 5-10-4 is a flow diagram illustrating a method for reconfiguring, data copying, and context switching of hardware performance counters in one embodiment of the present disclosure. While the method shown in FIG. 5-10-4 illustrates specific steps for invoking the automatic copying mechanisms using several registers, it should be understood that other implementation of the method and any number of registers or the like may be used for the operating system or the like to invoke an automatic copying of the counters to memory and memory to counters by the hardware, for instance, so that the operating system or the like does not have to individually read the counters and associated controls.

At 6402, software sets up all or some configuration registers in the performance counter unit or module 6102. Software, which may be a user-level application or an operating system, may set up several counter configurations, and one or more starting memory addresses and lengths where performance counter data will be copied. Software also writes time interval value into a designated register, and the information needed for switching out a given process A, and switching in the process B: allocated memory addresses for process A's hardware performance counter information, and writes the beginning value of that range into a register, e.g., register R1.

At 6404, condition is checked if operating system switch needs to be performed. This can be initiated by receiving an external signal to start operating system switch, or the operating system or the like may write in another register (e.g., register R2) to indicate that copying from and to performance counters to the memory should begin. For instance, the operating system or the like writes "1" to R2.

At 6406, if no OS switch needs to be performed, hardware transfers the value into a timer register. At 6408, the timer register counts down the time interval value, and when the timer count reaches zero, notifies a state machine. Any other method of detecting expiration of the timer value may be utilized. At 6410, the state machine triggers copying of all or selected performance counter register values to specified address in memory. At 6412, hardware copies performance counters to the memory.

At 6414, hardware checks if the configuration of performance counters needs to be changed, by checking a value in another register. If the configuration does not need to be changed, the processing returns to 6404. At 6416, a state machine changes the configuration of the performance counter data, and loops back to 6404.

Going back to 6404, operating system may indicate, for example, by storing a value, to begin context switching of the performance counter data, and the control transfers to 6418. At 6418, a state machine begins context switching the performance counter data, and copies the current context—all or some performance counter values, and all or some configuration registers into the memory. At 6420, after values associated with process A are copied out, the values associated with process B are copied into the performance counters and configuration registers from the memory. For instance, the state machine copies data from another specified memory location into the performance counters. After the hardware finishes copying, the hardware resets the value at register R2, for example, to "0" to indicate that the copying is done, which indicates that the hardware has finished the copy. Finally, at 6416, the new configuration consistent with the process B is performed.

At 6414, the software may specify reconfiguring of the performance counters, for example, periodically or every time interval, and the hardware, for instance, the state machine, may switch configuration of the performance counters at the specified periods. The specifying of reconfiguring and the hardware reconfiguring may occur while the operating system thread is in one context in one aspect. In another aspect, the reconfiguration of the performance counters may occur asynchronously to the context switching mechanism.

At 6418, the software may also specify copying of performance counters directly to memory, for instance, periodically or at every specified time interval. For example, the software may write a value in a register that automatically triggers the state machine (hardware) to automatically perform direct copying of the hardware performance counter data to memory without further software intervention. In one aspect, the specifying of copying the performance counter data directly to memory and the hardware automatically performing the copying may occur while an operating system thread is in context. In another aspect, this step may occur asynchronously to the context switching mechanism.

In one aspect, the storage needed for majority of performance count data is centralized, thereby achieving an area reduction. For instance, only a small number of least-significant bits are kept in the local units, thus saving area. This allows each processor to keep a large number of performance counters (e.g., 24 local counters per processor) at low resolution (e.g., 14 bits). To attain higher resolution counts, the local counter unit periodically transfer its counter values (counts) to a central unit. The central unit aggregates the counts into a higher resolution count (e.g., 64 bits). The local counters count a number of events, e.g., up to the local counter capacity. Before the local counter overflow occurs, it transfers its count to the central unit. Thus, no counts are lost in the local counters. The count values may be stored in a memory device such as a single central Static Random Access Memory (SRAM), which provides high bit density. Using this approach, it becomes possible to have multiples of performance counters supported per processor, while still providing for very large (e.g. 64 bit) counter values.

In another aspect, the memory or central SRAM may be used in multiple modes: a distributed mode, where each core or processor on a chip provides a relatively small number of counts (e.g., 24 per processor), as well as a detailed mode, where a single core or processor can provide a much larger number of counts (e.g., 7116).

In yet another aspect, multiple performance counter data counts from multiple performance counters residing in multiple processing modules (e.g., cores and cache modules) may be collected via a single daisy chain bus in a predetermined number of cycles. The predetermined number of cycles depends on the number of performance counters per processing module, the number of processing modules residing on the daisy chain bus, and the number of bits that can be transferred at one time on the daisy chain. In the description herein, the example configuration of the chip supports 24 local counters in each of its 17 cores, 16 local counters in each of its 16 L2 cache units or modules. The daisy chain bus supports 96 bits of data. Other configurations are possible, and the present invention is not limited only to that configuration.

In still yet another aspect, the performance counter modules and monitoring of performance data may be programmed by user software. Counters of the present disclosure may be configured through memory access bus. The hardware modules of the present disclosure are configured as not privileged such that user program may access the counter data and configure the modules. Thus, with the methodology and hardware set up of the present disclosure, it is not necessary to perform kernel-level operations such as system calls when configuring and gathering performance counts, which can be costly. Rather, the counters are under direct user control.

Still yet in another aspect, the performance counters and associated modules are physically placed near the cores or processing units to minimize overhead and data travel distance and to provide low-latency control and configuration of the counters by the unit to which the counters are associated.

FIG. 5-11-1 is a high level diagram illustrating performance counter structure of the present disclosure in one embodiment. It depicts a single chip that includes several processor modules, as well as several L2 slice modules. The processor modules each have an associated counter logic unit, referred to as the UPC_P. The UPC_P gathers and aggregates event information from the processor to which it is attached. Similarly, the UPC_L2 module performs the equivalent function for the L2 Slice. In the figure, the UPC_P and UPC_L2 modules are all attached to a single daisy-chain bus structure. Each UPC_P/L2 module periodically sends count information to the UPC_C unit via this bus.

A processing node may have multiple processors or cores and associated L1 cache units, L2 cache units, a messaging or network unit, and I/O interfaces such as PCI Express. The performance counters of the present disclosure allow the gathering of performance data from such functions of a processing node and may present the performance data to software. A processing node 7100 also referred to as a chip herein such as an application-specific integrated circuit (ASIC) may include (but not limited to) a plurality of cores (7102*a*, 7102*b*, 7102*n*) with associated L1 cache prefetchers (L1P). The processing node may also include (but not limited to) a plurality of L2 cache units (7104*a*, 7104*b*, 7104*n*), a messaging/network unit 7110, PCIe 7111 and Devbus 7112, connecting to a centralized counter unit referred to herein as UPC_C (7114). A core (e.g., 7102*a*, 7102*b*, 7102*n*), also referred to herein as a PU (processing unit) may include a performance monitoring unit or a performance counter (7106*a*, 7106*b*, 7106*n*) referred to herein as UPC_P. UPC_P resides in the PU complex and gathers performance data from the associated core (e.g., 7102*a*, 7102*b*, 7102*n*). Similarly, an L2 cache unit (e.g., 7104*a*, 7104*b*, 7104*n*) may include a performance monitoring unit or a performance counter (e.g., 7108*a*, 7108*b*, 7108*n*) referred to herein as UPC_L2. UPC_L2 resides in the L2 module and gathers performance data from it. The terminology UPC (universal performance counter) is used in this disclosure synonymously or interchangeable with general performance counter functions.

UPC_C 7114 may be a single, centralized unit within the processing node 7100, and may be responsible for coordinating and maintaining count data from the UPC_P (7106*a*, 7106*b*, 7106*n*) and UPC_L2 (7108*a*, 7108*b*, 7108*nn*) units. The UPC_C unit 7114 (also referred to as the UPC_C module) may be connected to the UPC_P (7104*a*, 7104*b*, 7104*n*) and UPC_L2 (7108*a*, 7108*b*, 7108*n*) via a daisy chain bus 7130, with the start 7116 and end 7118 of the daisy chain beginning and terminating at the UPC_C 7114. The performance counter modules (i.e., UPC_P, UPC_L2 and UPC_C) of the present disclosure may operate in different modes, and depending on the operating mode, the UPC_C 7114 may inject packet framing information at the start of the daisy chain 7116, enabling the UPC_P (7104*a*, 7104*b*, 7104*n*) and/or UPC_L2 (7108*a*, 7108*b*, 7108*n*) modules or units to place data on the daisy chain bus 7130 at the correct time slot. In a similar manner, messaging/network unit 7110, PCIe 7111 and Devbus 7112 may be connected via another daisy chain bus 7140 to the UPC_C 7114.

The performance counter functionality of the present disclosure may be divided into two types of units, a central unit (UPC_C), and a group of local units. Each of the local units performs a similar function, but may have slight differences to enable it to handle, for example, a different number of counters or different event multiplexing within the local unit. For gathering performance data from the core and associated L1, a processor-local UPC unit (UPC_P) is instantiated within each processor complex. That is, a UPC_P is added to the processing logic. Similarly, there may be a UPC unit associated with each L2 slice (UPC_L2). Each UPC_L2 and UPC_P unit may include a small number of counters. For example, the UPC_P may include 24 14 bit counters, while the UPC_L2 counters may instantiate 16 10 bit counters. The UPC ring (shown as solid line from 7116 to 7118) may be connected such that each UPC_P (7104*a*, 7104*b*, 7104*n*) or UPC_L2 unit (7108*a*, 7108*b*, 7108*n*) may be connected to its nearest neighbor. In one aspect, the daisy chain may be implemented using only registers in the UPC units, without extra pipeline latches.

Although not shown or described, a person of ordinary skill in the art will appreciate that a processing node may include other units and/or elements. The processing node 7100 may be an application-specific integrated circuit (ASIC), or a general-purpose processing node.

The UPC of the present disclosure may operate in different modes, as described below. However, the UPC is not limited to only those modes of operation.

Mode 0 (Distributed Count Mode)

In this operating mode (also referred to as distributed count mode), counts from multiple performance counters residing in each core or processing unit and L2 unit may be captured. For example, in an example implementation of a chip that includes 17 cores each with 24 performance counters, and 16 L2 units each with 16 performance counters, 24 counts from 17 UPC_P units and 16 counts from 16 UPC_L2 units may be simultaneously captured. Local UPC_P and UPC_L2 counters are periodically transferred to a corresponding 64 bit counter residing in the central UPC unit (UPC_C), over a 96 bit daisy chain bus. Partitioning the performance counter logic into local and central units allows for logic reduction, but still maintains 64 bit fidelity of event counts. Each UPC_P or UPC_L2 module places its local counter data on the daisy chain (4 counters at a time), or passes 96 bit data from its neighbor. The design guarantees that all local counters will be transferred to the central unit before they can overflow locally (by guaranteeing a slot on the daisy chain at regular intervals). With a 14 bit local UPC_P counter, each counter is transferred to the central unit at least every 1024 cycles to prevent overflow of the local counters. In order to cover corner cases and minimize the latency of updating the UPC_C counters, each counter is transferred to the central unit every 400 cycles. For Network, DevBus and PCIe, a local UPC unit similar to UPC_L2 and UPC_P may be used for these modules.

Mode 1 (Detailed Count Mode)

In this mode, the UPC_C assists a single UPC_P or UPC_L2 unit in capturing performance data. More events can be captured in the mode from a single processor (or core) or L2 than can be captured in distributed count mode. However, only one UPC_P or UPC_L2 may be examined at a time.

The UPC_P and UPC_L2 modules may be connected to the UPC_C unit via a 96 bit daisy chain, using a packet based protocol. Each UPC operating mode may use a different protocol. For example, in Mode 0 or distributed mode, each UPC_P and/or UPC_L2 places its data on the daisy chain bus at a specific time (e.g., cycle or cycles). In this mode, the UPC_C transmits framing information on the upper bits (bits 64:95) of the daisy chain. Each UPC_P and/or UPC_L2 module uses this information to place its data on the daisy chain at the correct time. The UPC_P and UPC_L2 send their counter data in a packet on bits 0:63 of the performance daisy chain. Bits 64:95 are generated by the UPC_C module, and passed unchanged by the UPC_P and/or UPC_L2 module. Table 1-2 defines example packets sent by UPC_P. Table 1-3 defines example packets sent by UPC_L2. Table 1-4 shows framing information injected by the UPC_C. The packet formats and framing information may be pre-programmed or hard-coded in the logic of the processing.

TABLE 1-2

UPC_P Daisy Chain Packet Format

| Cycle | Bit 0:15 | Bits 16:31 | Bits 32:47 | Bits 48:63 | Bits 64:95 |
|---|---|---|---|---|---|
| 0 | Counter 0 | Counter 1 | Counter 2 | Counter 3 | Passed Unchanged |
| 1 | Don't Care | Don't Care | Don't Care | Don't Care | Passed Unchanged |
| 2 | Counter 4 | Counter 5 | Counter 6 | Counter 7 | Passed Unchanged |
| 3 | Don't Care | Don't Care | Don't Care | Don't Care | Passed Unchanged |
| 4 | Counter 8 | Counter 9 | Counter 10 | Counter 11 | Passed Unchanged |
| 5 | Don't Care | Don't Care | Don't Care | Don't Care | Passed Unchanged |
| 6 | Counter 12 | Counter 13 | Counter 14 | Counter 15 | Passed Unchanged |
| 7 | Don't Care | Don't Care | Don't Care | Don't Care | Passed Unchanged |
| 8 | Counter 16 | Counter 17 | Counter 18 | Counter 19 | Passed Unchanged |
| 9 | Don't Care | Don't Care | Don't Care | Don't Care | Passed Unchanged |
| 10 | Counter 20 | Counter 21 | Counter 22 | Counter 23 | Passed Unchanged |
| 11 | Don't Care | Don't Care | Don't Care | Don't Care | Passed Unchanged |
| 12 | Don't Care | Don't Care | Don't Care | Don't Care | Passed Unchanged |
| 13 | Don't Care | Don't Care | Don't Care | Don't Care | Passed Unchanged |
| 14 | Don't Care | Don't Care | Don't Care | Don't Care | Passed Unchanged |
| 15 | Don't Care | Don't Care | Don't Care | Don't Care | Passed Unchanged |

Table 1-2 defines example packets sent by an UPC_P. Each UPC_P may follow this format. Thus, the next UPC_P may send packets on the next 16 cycles, i.e., 16-31. The next UPC_P may send packets on the next 16 cycles, i.e., 32-47, and so forth. Table 1-5 shows an example of cycle to performance counter unit mappings.

Similar to UPC_P, the UPC_L2 may place data from its counters (e.g., 16 counters) on the daisy chain in an 8-flit packet, on daisy chain bits 0:63. This is shown in Table 1-3.

Table 1-3. UPC_L2 Daisy Chain Packet Format

TABLE 1-3

UPC_L2 Daisy Chain Packet Format

| Cycle | Bit 0:15 | Bits 16:31 | Bits 32:47 | Bits 48:63 | Bits 64:95 |
|---|---|---|---|---|---|
| 0 | Counter 0 | Counter 1 | Counter 2 | Counter 3 | Passed Unchanged |
| 1 | Don't Care | Don't Care | Don't Care | Don't Care | Passed Unchanged |
| 2 | Counter 4 | Counter 5 | Counter 6 | Counter 7 | Passed Unchanged |
| 3 | Don't Care | Don't Care | Don't Care | Don't Care | Passed Unchanged |
| 4 | Counter 8 | Counter 9 | Counter 10 | Counter 11 | Passed Unchanged |
| 5 | Don't Care | Don't Care | Don't Care | Don't Care | Passed Unchanged |
| 6 | Counter 12 | Counter 13 | Counter 14 | Counter 15 | Passed Unchanged |
| 7 | Don't Care | Don't Care | Don't Care | Don't Care | Passed Unchanged |

Table 1-4 shows the framing information transmitted by the UPC_C in Mode 0.

TABLE 1-4

UPC_C Daisy Chain Packet Format, bits 64:95

| Bits | Function |
|---|---|
| 64:72 | Daisy Chain Cycle Count (0-399) |
| 73 | '0' -- unused |
| 74:81 | counter_arm_q(0 to 7) – counter address (four counters at a time) for overflow indication |
| 82:85 | counter_arm_q(8 to 11) – mask bit for each adder slice, e.g. 4 counters per sram location |
| 86:93 | (others => '0') |
| 94 | upc_pu_ctl_q(0) – turns on run bit in upc_p |
| 95 | upc_pu_ctl_q(1) – clock gate for ring |

In this example format of both the UPC_P and UPC_L2 packet formats, every other flit contains no data. Flit refers to one cycle worth of information. The UPC_C uses these "dead" cycles to service memory-mapped I/O (MMIO) requests to the Static Random Access Memory (SRAM) counters or the like.

The UPC_L2 and UPC_P modules monitor the framing information produced by the UPC_C. The UPC_C transmits a repeating cycle count, ranging from 0 to 399 decimal. Each UPC_P and UPC_L2 compares this count to a value based on its logical unit number, and injects its packet onto the daisy chain when the cycle count matches the value for the given unit. The values compared by each unit are shown in Table 1-5.

TABLE 1-5

Cycle each unit places data on daisy chain, Mode 0

| UPC_P ID | Cycle Injected (decimal) | Cycle Injected (hex) | UPC_L2 ID | Cycle Injected (decimal) | Cycle Injected (hex) |
|---|---|---|---|---|---|
| PU_0 | 0 | 9'h000 | L2_0 | 272 | 9'h110 |
| PU_1 | 16 | 9'h010 | L2_1 | 280 | 9'h118 |
| PU_2 | 32 | 9'h020 | L2_2 | 288 | 9'h120 |
| PU_3 | 48 | 9'h030 | L2_3 | 296 | 9'h128 |
| PU_4 | 64 | 9'h040 | L2_4 | 304 | 9'h130 |
| PU_5 | 80 | 9'h050 | L2_5 | 312 | 9'h138 |
| PU_6 | 96 | 9'h060 | L2_6 | 320 | 9'h140 |
| PU_7 | 112 | 9'h070 | L2_7 | 328 | 9'h148 |

TABLE 1-5-continued

| Cycle each unit places data on daisy chain, Mode 0 | | | | | |
|---|---|---|---|---|---|
| UPC_P ID | Cycle Injected (decimal) | Cycle Injected (hex) | UPC_L2 ID | Cycle Injected (decimal) | Cycle Injected (hex) |
| PU_8 | 128 | 9'h080 | L2_8 | 336 | 9'h150 |
| PU_9 | 144 | 9'h090 | L2_9 | 344 | 9'h158 |
| PU_10 | 160 | 9'h0A0 | L2_10 | 352 | 9'h160 |
| PU_11 | 176 | 9'h0B0 | L2_11 | 360 | 9'h168 |
| PU_12 | 192 | 9'h0C0 | L2_12 | 368 | 9'h170 |
| PU_13 | 208 | 9'h0D0 | L2_13 | 376 | 9'h178 |
| PU_14 | 224 | 9'h0E0 | L2_14 | 384 | 9'h180 |
| PU_15 | 240 | 9'h0F0 | L2_15 | 392 | 9'h188 |
| PU_16 | 256 | 9'h100 | | | |

Mode 0 Support for Simultaneous Counter Stop/Start

In Mode 0 (also referred to as distributed count mode), each UPC_P and UPC_L2 may contribute counter data. It may be desirable to have the local units start and stop counting on the same cycle. To accommodate this, the UPC_C sends a counter start/stop bit on the daisy chain. Each unit can be programmed to use this signal to enable or disable their local counters. Since each unit is on a different position on the daisy chain, each unit delays a different number of cycles, depending on their position in the daisy chain, before responding to the counter start/stop command from the UPC_C. This delay value may be hard coded into each UPC_P/UPC_L2 instantiation.

Mode 1 UPC_P, UPC_L2 Daisy Chain Protocol

As described above, Mode 1 (also referred to as detailed count mode) may be used to allow more counters per processor or L2 than what the local counters provide. In this mode, a given UPC_P or UPC_L2 is selected for ownership of the daisy chain. The selected UPC_P or UPC_L2 sends 92 bits of real time performance event data to the UPC_C for counting. In addition, the local counters are transferred to the UPC_C as in Mode 0. One daisy chain wire can be used to transmit information from all the performance counters in the processor, e.g., all 24 performance counters. The majority of the remaining wires can be used to transfer events to the UPC_C for counting. The local counters may be used in this mode to count any event presented to it. Also, all local counters may by used for instruction decoding. In Mode 1 92 events may be selected for counting by the UPC_C unit. 1 bit of the daisy chain is used to periodically transfer the local counters to the UPC_C, while 92 bits are used to transfer events. The three remaining bits are used to send control information and power gating signals to the local units. The UPC_C sends a rotating count from 0-399 on daisy chain bits 64:72, identically to Mode 0. The UPC_P or UPC_L2 that is selected for Mode 1 places it's local counters on bits 0:63 in a similar fashion as Mode 0, e,g. when the local unit decodes a certain value of the ring counter.

Examples of the data sent by the UPC_P are shown in Table 1-6. UPC_L2 may function similarly, for example, with 32 different types of events being supplied. The specified bits may be turned on to indicate the selected events for which the count is being transmitted. Daisy chain bus bits 92-95 specify control information such as the packet start signal on a given cycle.

TABLE 1-6

| UPC_P Mode 1 Daisy Chain Packet Definition | |
|---|---|
| Bit Field | Function |
| 0:7 | UPC_P Mode 1 Event Group 0 (8 events) |
| 8:15 | UPC_P Mode 1 Event Group 1 (8 events) |
| 16:23 | UPC_P Mode 1 Event Group 2 (8 events) |
| 24:31 | UPC_P Mode 1 Event Group 3 (8 events) |
| 32:39 | UPC_P Mode 1 Event Group 4 (8 events) |
| 40:47 | UPC_P Mode 1 Event Group 5 (8 events) |
| 48:55 | UPC_P Mode 1 Event Group 6 (8 events) |
| 56:63 | UPC_P Mode 1 Event Group 7 (8 events) |
| 64:70 | UPC_P Mode 1 Event Group 8 (7 events) |
| 71:77 | UPC_P Mode 1 Event Group 9 (7 events) |
| 78:84 | UPC_P Mode 1 Event Group 10 (7 events) |
| 85:91 | UPC_P Mode 1 Event Group 11 (7 events) |
| 92:95 | Local Counter Data |

FIG. 5-11-2 illustrates a structure of the UPC_P unit or module in one embodiment of the present disclosure. The UPC_P module may be tightly coupled to the core 7220 which may also include L1 prefetcher module or functionality. It gathers performance and trace data from the core 7220 and presents it to the UPC_C via the daisy chain bus 252 for further processing.

The UPC_P module may use the x1 and x2 clocks. It may expect the x1 and x2 clocks to be phase-aligned, removing the need for synchronization of x1 signals into the x2 domain.

UPC_P Modes

As described above, the UPC_P module 200 may operate in distributed count mode or detailed count mode. In distributed count mode (Mode 0), a UPC_P module 200 may monitor performance events, for example 24 performance events from its 24 performance counters. The daisy chain bus is time multiplexed so that each UPC_P module sends its information to the UPC_C in turn. In this mode, the user may count 24 events per core, for example.

In Mode 1 (detailed count mode), one UPC_P module may be selected for ownership of the daisy chain bus. Data may be combined from the various inputs (core performance bus, core trace bus, L1P events), formatted and sent to the UPC_C unit each cycle. As shown in FIG. 5-11-3 the UPC_C unit 300 may decode the information provided on the daisy chain bus into as many as 116 (92 wires for raw events and 24 for local counters) separate events to be counted from the selected core or processor complex. For the raw events, the UPC_C module manages the low order bits of the count data, similar to the way that the UPC_P module manages its local counts.

Edge/Level/Polarity module 7224 may convert level signals emanating from the core's Performance bus 7226 into single cycle pulses suitable for counting. Each performance bit has a configurable polarity invert, and edge filter enable bit, available via a configuration register.

Widen module 7232 converts signals from one clock domain into another. For example, the core's Performance 7226, Trace 7228, and Trigger 7230 busses all may run at clkx1 rate, and are transitioned to the clkx2 domain before being processed by the UPC_P. Widen module 7232 performs that conversion, translating each clkx1clock domain signal into 2 clkx2 signals (even and odd). This module is optional, and may be used if the rate at which events are output are different (e.g., faster or slower) than the rate at which events are accumulated at the performance counters.

QPU Decode module 7234 and execution unit (XU) Decode module 7236 take the incoming opcode stream from the trace bus, and decode it into groups of instructions. In one aspect, this module resides in the clkx2 domain, and there may be two opcodes (even and odd) of each type (XU and QPU) to be decoded per clkx2 cycle. To accomplish this, two QPU and two XU decode units may be instantiated. This applies to implementations where the core 7220 operates at twice the speed, i.e., outputs 2 events, per operating cycle of the performance counters, as explained above. The 2 events saved by the widen module 7232 may be processed at the two QPU and two XU decode units. The decoded instruction stream is then sent to the counter blocks for selection and counting.

Registers module 7238 implements the interface to the MMIO bus. This module may include the global MMIO configuration registers and provide the support logic (readback muxes, partial address decode) for registers located in the UPC_P Counter units. User software may program the performance counter functions of the present disclosure via the MMIO bus.

Thread Combine module 7240 may combine identical events from each thread, counts them, and present a value for accumulation by a single counter. Thread Combine module 7240 may conserve counters when aggregate information across all threads is needed. Rather than using four counters (or number of counters for each thread), and summing in software, summing across all threads may be done in hardware using this module. Counters may be selected to support thread combining.

The Mode 1 Compress module 7242 may combine event inputs from the core's event bus 7226, the local counters 7224*a* . . . 7224*n*, and the L1 cache prefetch (L1P) event bus 7246, 7248, and place them on the appropriate daisy chain lines for transmission to the UPC_C, using a predetermined packet format, for example, shown in Table 1-6. This module 7242 may divide the 96 bit bus into 12 Event groups, with Event Group 0-7 containing 8 events, and Event Groups 8-11 containing 7 events, for a total of 92 events. Some event group bits can be sourced by several events. Not all events may connect to all event groups. Each event group may have a single multiplexer (mux) control, spanning the bits in the event group.

There may be 24 UPC_P Counter units in each UPC_P module. To minimize muxing, not all counters are connected to all events. Similarly, all counters may be used to count opcodes, but this is not required. Counters may be used to capture a given core's performance event or L1P event.

Referring to FIG. 5-11-2, a core or processor (7220) may provide performance and trace data via busses. Performance (Event) Bus 7226 may provide information about the internal operation of the core. The bus may be 24 bits wide. The data may include performance data from the core units such as execution unit (XU), instruction unit (IU), floating point unit (FPU), memory management unit (MMU). The core unit may multiplex (mux) the performance events for each unit internally before presenting the data on the 24 bit performance interface. Software may specify the desired performance event to monitor, i.e., program the multiplexing, for example, using a device control register (DCR) or the like. The core 7220 may output the appropriate data on the performance bus 7226 according to the software programmed multiplexing.

Trace (Debug) Bus 7228 may be used to collect the opcode of all committed instructions.

MMIO interface 7250 to allow configuration and interrogation of the UPC_P module by the local core unit (7220).

UPC_P Outputs

The UPC_P 7200 may include two output interfaces. A UPC_P daisy chain bus 7252, used for transfer of UPC_P data to the UPC_C, and a MMIO bus 7250, used for reading/writing of configuration and count information from the UPC_P.

UPC_L2 Module

FIG. 5-11-5 illustrates an example structure of a UPC_L2 module in one embodiment. The UPC_L2 module 7400 is coupled to the L2 slice 7402; the coupling may be tight. UPC_L2 module 7400 gathers performance data from the L2 slice 7402 and presents it to the UPC_C for further processing. Each UPC_L2 7400 may have 16 dedicated counters (e.g., 7408*a*, 7408*b*, 7408*n*), each capable of selecting one of two events from the L2 (7402). For L2 with 32 possible events that can be monitored, either L2 events 0-15 or L2 events 16-31 can be counted at any given time. There may be a single select bit that determines whether events 0:15 or events 16:31 are counted. The counters (e.g., 7408*a*, 7408*b*, 7408*n*) may be configured through MMIO memory access bus to enable selecting of appropriate events for counting.

UPC_L2 Modes

The UPC_L2 module 7400 may operate in distributed count mode (Mode 0) or detailed count mode (Mode 1). In Mode 0, each UPC_L2 module may monitor 16 performance events, on its 16 performance counters. The daisy chain bus is time multiplexed so that each UPC_L2 module sends its information to the UPC_C in turn. In this mode, the user may count 16 events per L2 slice. In Mode 1, one UPC_L2 module is selected for ownership of the daisy chain bus. In this mode, all 32 events supported by the L2 slice may be counted.

UPC_C Module

Referring back to FIG. 5-11-1, a UPC_C module 7114 may gather information from the PU, L2, and Network Units, and maintain 64 bit counts for each performance event. The UPC_C may contain, for example, a 256D×264W SRAM, used for storing count and trace information.

The UPC_C module may operate in different modes. In Mode 0, each UPC_P and UPC_L2 contribute 24 and 16 performance events, respectively. In this way, a coarse view of the entire ASIC may be provided. In this mode, the UPC_C Module 7114 sends framing information to the UPC_P and UPC_L2 modules to the UPC_C. This information is used by the UPC_P and UPC_L2 to globally synchronize counter starting/stopping, and to indicate when each UPC_P or UPC_L2 should place its data on the daisy chain.

In Mode 1, one UPC_L2 module or UPC_P unit is selected for ownership of the daisy chain bus. All 32 events supported by a selected L2 slice may be counted, and up to 116 events can be counted from a selected PU. A set of 92 counters local to the UPC_C, and organized into Central Counter Groups, is used to capture the additional data from the selected UPC_P or UPC_L2.

The UPC_P/L2 Counter unit 142 gathers performance data from the UPC_P and UPC_L2 units, while the Network/DMA/IO Counter unit 7144 gathers event data from the rest of the ASIC, e.g., input/output (I/O) events, network events, direct memory access (DMA) events, etc.

UPC_P/L2 Counter Unit 7142 is responsible for gathering data from each UPC_P and UPC_L2 unit, and accumulating in it in the appropriate SRAM location. The SRAM is divided into 32 counter groups of 16 counters each. In Mode 0, each counter group is assigned to a particular UPC_P or UPC_L2 unit. The UPC_P unit has 24 counters, and uses two counter groups per UPC_P unit. The last 8 entries in the second counter group is unused by the UPC_P.

The UPC_L2 unit has 16 counters, and fits within a single counter group. For every count data, there may exist an associated location in SRAM for storing the count data.

Software may read or write any counter from SRAM at any time. In one aspect, data is written in 64 bit quantities, and addresses a single counter from a single counter group.

In addition to reading and writing counters, software may cause selected counters of an arbitrary counter group to be added to a second counter group, with the results stored in a third counter group. This may be accomplished by writing to special registers in the UPC_P/L2 Counter Unit 7142.

FIG. 5-11-5 illustrates an example structure of the UPC_C Central Unit 7600 in one embodiment of the present disclosure. In Mode 0, the state machine 7602 sends a rotating count on the daisy chain bus upper bits, as previously described. The state machine 7602 fetches from SRAM 7604 or the like, the first location from counter group 0, and waits for the count value associated with Counter 0 to appear on the incoming daisy chain. When the data arrives, it is passed through a 64 bit adder, and stored back to the location from which the SRAM was read. The state machine 7602 then increments the expected count and fetches the next SRAM location. The fetching of data, receiving the current count, adding the current count to the fetched data and writing back to the memory from where the data was fetched is shown by the route drawn in bold line in FIG. 5-11-5. This process repeats for each incoming packet on the daisy chain bus. Thus, previous count stored in the appropriate location in memory 7604 is read, e.g., and held in holding registers 7606, then added with the incoming count, and written back to the memory 7604, e.g., SRAM. The current count data may be also accessed via registers 7608, allowing software accessibility.

Concurrently with writing the result to memory, the result is checked for a near-overflow. If this condition has occurred, a packet is sent over the daisy chain bus, indicating the SRAM address at which the event occurred, as well as which of the 4 counters in the SRAM has reached near-overflow (each 256 bit SRAM location stores 4 64-bit counters). Note that any combination of the 4 counters in a single SRAM address can reach near-overflow on a given cycle. Because of this, the counter identifier is sent as separate bits (one bit for each counter in a single SRAM address) on the daisy chain. The UPC_P monitors the daisy chain for overflow packets coming from the UPC_C. If the UPC_P detects a near-overflow packet associated with one or more of its counters, it sets an interrupt arming bit for the identified counters. This enables the UPC_P to issue an interrupt to its local processor on the next overflow of the local counter. In this way, interrupts can be delivered to the local processor very quickly after the actual event that caused overflow, typically within a few cycles.

Upon startup the UPC_C sends an enable signal along the daisy chain. A UPC_P/L2 unit 7600 may use this signal to synchronize the starting and stopping of their local counters. It may also optionally send a reset signal to the UPC_P and UPC_L2, directing them to reset their local counts upon being enabled. The 96 bit daisy chain provides adequate bandwidth to support both detailed count mode and distributed count mode operation.

For operating in detailed count mode, the entire daisy chain bandwidth can be dedicated to a single processor or L2. This greatly increases the amount of information that can be sent from a single UPC_P or UPC_L2, allowing the counting of more events. The UPC_P module receives information from three sources: core unit opcodes received via the trace bus, performance events from the core unit, and events from the L1P. In Mode 1, the bandwidth of the daisy chain is allocated to a single UPC_P or UPC_L2, and used to send more information. Global resources in the UPC_C (The Mode 1 Counter unit) assist in counting performance events, providing a larger overall count capability.

The UPC_P module may contain decode units that provide roughly 50 groups of instructions that can be counted. These decode units may operate on 4 16 bit instructions simultaneously. In one aspect, instead of transferring raw opcode information, which may consume available bandwidth, the UPC_P local counters may be used to collect opcode information. The local counters are periodically transmitted to the UPC_C for aggregation with the SRAM counter, as in Mode 0. However, extra data may be sent to the UPC_C in the Mode 1 daisy chain packet. This information may include event information from the core unit and associated L1 prefetcher. Multiplexers in the UPC_P can select the events to be sent to the UPC_C. This approach may use 1 bit on the daisy chain.

The UPC_C may have 92 local counters, each associated with an event in the Mode 1 daisy chain packet. These counters are combined in SRAM with the local counters in the UPC_P or L2. They are organized into 8-counter central counter groups. In total there may be 116 counters in mode 1, (24 counters for instruction decoding, and 92 for event counting).

The daisy chain input feeds events from the UPC_P or UPC_L2 into the Mode 1 Counter Unit for accumulation, while UPC_P counter information is sent directly to SRAM for accumulation. The protocol for merging the low order bits into the SRAM may be similar to Mode 0.

Each counter in the Mode 1 Counter Unit may correspond to a given event transmitted in the Mode 1 daisy chain packet.

The UPC counters may be started and stopped with fairly low overhead. The UPC_P modules map the controls to start and stop counters into MMIO user space for low-latency access that does not require kernel intervention. In addition, a method to globally start and stop counters synchronously with a single command via the UPC_C may be provided. For local use, each UPC_P unit can act as a separate counter unit (with lower resolution), controlled via local MMIO transactions. For example, the UPC_P Counter Data Registers may provide MMIO access to the local counter values. The UPC_P Counter Control Register may provide local configuration and control of each UPC_P counter.

All events may increment the counter by a value of 1 or more.

Software may communicate with the UPC_C via local Devbus access. In addition, UPC_C Counter Data Registers may give software access to each counter on an individual basis. UPC_C Counter Control Registers may allow software to enable each local counter independently. The UPC units provide the ability to count and report various events via MMIO operations to registers residing in the UPC units, which software may utilize via Performance Application Programming Interface (PAPI) Application Program Interface (API).

A UPC_C Accumulate Control Register may allow software to add counter groups to each other, and place the result in a third counter group. This register may be useful for temporarily storing the added counts, for instance, in case the added counts should not count toward the performance data. An example of such counts would be when a processor executes instructions based on anticipated future execution flow, that is, the execution is speculative. If the anticipated future execution flow results in incorrect or unnecessary execution, the performance counts resulting from those executions should not be counted.

FIGS. 5-11-6, 5-11-7 and 5-11-8 are flow high-level overview diagrams that illustrate a method for distributed performance counters in one embodiment of the present disclosure. Before the steps taken in those figures, a set up of the performance counters may take place. For instance, initial values of counters may be loaded, operating mode (e.g., distributed mode (Mode 0), detailed mode (Mode 1), or trace mode (Mode 2) may be programmed, and events may be selected for counting. Additionally, during the operations of the local and central performance counters of the present disclosure, one or more of those parameters may be reprogrammed, for instance, to change the mode of operation and others. The set up and reprogramming may have been performed by user software writing into appropriate registers as described above.

FIG. 5-11-6 is a flow diagram illustrating central performance counter unit sending the data on the daisy chain bus. At 7502, a central performance counter unit (e.g., UPC_C described above), for example, its UPC_C sender module or functionality is enabled to begin sending information, for example, framing and near-overflow information where applicable, for example, by software. At 7504, the central performance counter unit sends framing information on a daisy chain connection. The framing information may be placed on upper bits of the connection, e.g., upper 32 bits of a 96 bit bus connection. The framing information may include clock cycle count for indicating to the local performance counter modules (e.g., UPC_P and UPC_L2 described above), which of the local performance counter modules should transfer their data. An example format of the framing information is shown in Table 1-4 above. Other format may be used for controlling the data transfer from the local performance counters. In addition, if it is determined that a near-overflow indication should be sent, the UPC_C also sends the indication. Determination of the near-overflow is made, for instance, by the UPC_C's receiving functionality that checks whether the overflow is about to occur in the SRAM location after aggregating the received data with the SRAM data as will be described below.

FIG. 5-11-7 is a flow diagram illustrating functions of a local performance counter module (e.g., UPC_P and UPC_L2) receiving and sending data on the daisy chain bus. At 7702, a local performance counter module (e.g., UPC_P or UPC_L2) monitors (or reads) the framing information produced by the central performance counter unit (e.g., UPC_C). At 7704, the local performance counter module compares a value in the framing information to a predetermined value assigned or associated with the local performance counter module. If the values match at 7706, the local performance counter module places its counter data onto the daisy chain 7708. For example, as described above, the UPC_C may transmit a repeating cycle count, ranging from 0 to 399 decimal. Each UPC_P and UPC_L2 compares this count to a value based on its logical unit number, and injects its packet onto the daisy chain when the cycle count matches the value for the given unit. Example values compared by each unit are shown in Table 1-5. Other values may be used for this functionality. If, on the other hand, there is no match at 7706, the module returns to 7702. At 7710, the local counter data is cleared. In one aspect, UPC_P may clear only the upper bit of the performance counter, leaving the lower bits intact.

At the same time or substantially the same time, the local performance counter module also monitors for near-overflow interrupt from the UPC_C at 7712. If there is an interrupt, the local performance counter module may retrieve the information associated with the interrupt from the daisy chain bus and determine whether the interrupt is for any one of its performance counters. For example, the SRAM location specified on the daisy chain associated with the interrupt is checked to determine whether that location is where the data of its performance counters are stored. If the interrupt is for any one of its performance counters, the local performance counter module arms the counter to handle the near-overflow. If a subsequent overflow of the counter in UPC_P or UPC_L2 occurs, the UPC_P or UPC_L2 may optionally freeze the bits in the specified performance counter, as well as generate an interrupt.

FIG. 5-11-8 is a flow diagram illustrating the UPC_C receiving the data on the daisy chain bus. At 7802, the central performance counter module (e.g., UPC_C) reads the previously stored count data (e.g., in SRAM) associated with the performance counter whose count data is incoming on the daisy chain bus. At 7804, the central performance counter module receives the incoming counter data (e.g., the data injected by the local performance counters), and at 7806, adds the counter data to the corresponding appropriate count read from the SRAM. At 7808, the aggregated count data is stored in its appropriate addressable memory, e.g., SRAM. At 7810, the central performance counter module also may check whether an overflow is about to occur in the received counter data and notifies or flags to send a near-overflow interrupt and associated information on the daisy chain bus, specifying the appropriate performance counter module for example, by its storage location or address in the memory (SRAM). At 7812, the central performance counter module updates the framing information, for example, increments the cycle count, and sends the updated framing information on the daisy chain to repeat the processing at 7802. Interrupt handling is described, for example, in U.S. Patent Publication No. 2008/0046700 filed Aug. 21, 2006 and entitled "Method and Apparatus for Efficient Performance Monitoring of a Large Number of Simultaneous Events", which is incorporate herein in its entirety by reference thereto.

Miscellaneous Memory-Mapped Devices

All other devices accessed by the core or requiring direct memory access are connected via the device bus unit (DEVBUS) to the crossbar switch. The PCI express interface unit uses this path to enable PCIe devices to DMA data into main memory via the L2-caches. The DEVBUS switches requests from its slave port also to the boot eDRAM, an on-chip memory used for boot, RAS messaging and control-system background communication. Other units accessible via DEVBUS include the universal performance counter unit (UPC), the interrupt controller (BIC), the test controller/interface (TESTINT) as well as the global L2 state controller (L2-central). FIG. 6-0 illustrates in more detail memory mapped devices according to one embodiment.

Generally, hardware performance counters are extra logic added to the central processing unit (CPU) to track low-level operations or events within the processor. For example, there are counter events that are associated with the cache hierarchy that indicate how many misses have occurred at L1, L2, and the like. Other counter events indicate the number of instructions completed, number of floating point instructions executed, translation lookaside buffer (TLB) misses, and others. A typical computing system provides a small number of counters dedicated to collecting and/or recording performance events for each processor in the system. These counters consume significant logic area, and cause high-power dissipation. As such, only a few counters are typically provided. Current computer architecture allows many processors or cores to be incorporated into a single chip. Having only a handful of performance counters per processor does not provide the ability to count several events simultaneously from each processor.

Thus, in a further embodiment, there is provided a distributed trace device, that, in one aspect, may include a plurality of processing cores, a central storage unit having at least memory, and a daisy chain connection connecting the central storage unit and the plurality of processing cores and forming a daisy chain ring layout. At least one of the plurality of processing cores places trace data on the daisy chain connection for transmitting the trace data to the central storage unit. The central storage unit detects the trace data and stores the trace data in the memory.

Further, there is provided a method for distributed trace using central memory, that, in one aspect, may include connecting a plurality of processing cores and a central storage unit having at least memory using a daisy chain connection, the plurality of processing cores and the central storage unit being formed in a daisy chain ring layout. The method also may include enabling at least one of the plurality of processing cores to place trace data on the daisy chain connection for transmitting the trace data to the central storage unit. The method further may include enabling the central storage unit to detect the trace data and store the trace data in the memory.

Further, a method for distributed trace using central performance counter memory, in one aspect, may include placing trace data on a daisy chain bus connecting the processing core and a plurality of second processing cores to a central storage unit on an integrated chip. The method further may include reading the trace data from the daisy chain bus and storing the trace data in memory.

A centralized memory is used to store trace information from a processing core, for instance, in an integrated chip having a plurality of cores. Briefly, trace refers to signals or information associated with activities or internal operations of a processing core. Trace may be analyzed to determine the behavior or operations of the processing core from which the trace was obtained. In addition to a plurality of cores, each of the cores also referred to as local core, the integrated chip may include a centralized storage for storing the trace data and/or performance count data.

Each processor or core may keep a number of performance counters (e.g., 24 local counters per processor) at low resolution (e.g., 14 bits) local to it, and periodically transfer these counter values (counts) to a central unit. The central unit aggregates the counts into a higher resolution count (e.g., 64 bits). The local counters count a number of events, e.g., up to the local counter capacity, and before the counter overflow occurs, transfer the counts to the central unit. Thus, no counts are lost in the local counters.

The count values may be stored in a memory device such as a single central Static Random Access Memory (SRAM), which provides high bit density. The count values may be stored in a single central Static Random Access Memory (SRAM), which provides high bit density. Using this approach, it becomes possible to have multiples of performance counters supported per processor.

This local-central count storage device structure may be utilized to capture trace data from a single processing core (also interchangeably referred to herein as a processor or a core) residing in an integrated chip. In this way, for example, 1536 cycles of 44 bit trace information may be captured into an SRAM, for example, 256×256 bit SRAM. Capture may be controlled via trigger bits supplied by the processing core.

FIG. 5-11-1 is a high level diagram illustrating performance counter structure of the present disclosure in one embodiment, which may be used to gather trace data. The structure illustrated in FIG. 1 is shown as an example only. Different structures are possible and the method and system disclosed herein is not only limited to the particular structural configuration shown. Generally, a processing node may have multiple processors or cores and associated L1 cache units, L2 cache units, a messaging or network unit, and PCIe/Devbus. Performance counters allow the gathering of performance data from such functions of a processing node and may present the performance data to software. Referring to FIG. 5-11-1, a processing node 7100 also referred to as an integrated chip herein such as an application-specific integrated circuit (ASIC) may include (but not limited to) a plurality of cores (7102*a*, 7102*b*, 7102*n*). The plurality of cores (7102*a*, 7102*b*, 7102*n*) may also have associated L1 cache prefetchers (L1P). The processing node may also include (but not limited to) a plurality of L2 cache units (7104*a*, 7104*b*, 7104*n*), a messaging/network unit 7110, PCIe 7111, and Devbus 7112, connecting to a centralized counter unit referred to herein as UPC_C (7114). In the figure, the UPC_P and UPC_L2 modules are all attached to a single daisy-chain bus structure 7130. Each UPC_P/L2 module may sends information to the UPC_C unit via this bus 7130. Although shown in FIG. 5-11-1, not all components are needed or need to be utilized for performing the distributed trace functionality of the present disclosure. For example, L2 cache units (7104*a*, 7104*b*, 7104*n*) need not be involved in gathering the core trace information.

A core (e.g., 7102*a*, 7102*b*, 7102*n*), which may be also referred to herein as a PU (processing unit) may include a performance monitoring unit or a performance counter (7106*a*, 7106*b*, 7106*n*) referred to herein as UPC_P. UPC_P resides in the PU complex (e.g., 7102*a*, 7102*b*, 7102*n*) and gathers performance data of the associated core (e.g., 7102*a*, 7102*b*, 7102*n*). The UPC_P may be configured to collect trace data from the associated PU.

Similarly, an L2 cache unit (e.g., 7104*a*, 7104*b*, 7104*n*) may include a performance monitoring unit or a performance counter (e.g., 7108*a*, 7108*b*, 7108*n*) referred to herein as UPC_L2. UPC_L2 resides in the L2 and gathers performance data from it. The terminology UPC (universal performance counter) is used in this disclosure synonymously or interchangeable with general performance counter functions.

UPC_C 7114 may be a single, centralized unit within the processing node 7100, and may be responsible for coordinating and maintaining count data from the UPC_P (7106*a*, 7106*b*, 7106*n*) and UPC_L2 (7108*a*, 7108*b*, 7108*n*) units. The UPC_C unit 7114 (also referred to as the UPC_C module) may be connected to the UPC_P (7104*a*, 7104*b*, 7104*n*) and UPC_L2 (7108*a*, 7108*b*, 7108*n*) via a daisy chain bus 7130, with the start 7116 and end 7118 of the daisy chain beginning and terminating at the UPC_C 7114. In a similar manner, messaging/network unit 7110, PCIe 7111 and Devbus 7112 may be connected via another daisy chain bus 7140 to the UPC_C 7114.

The performance counter modules (i.e., UPC_P, UPC_L2 and UPC_C) of the present disclosure may operate in different modes, and depending on the operating mode, the UPC_C 7114 may inject packet framing information at the start of the daisy chain 7116, enabling the UPC_P (7104*a*, 7104*b*, 7104*n*) and/or UPC_L2 (7108*a*, 7108*b*, 108*n*) modules or units to place data on the daisy chain bus at the correct time slot. In distributed trace mode, UPC_C 114 functions as a central trace buffer.

As mentioned above, the performance counter functionality of the present disclosure may be divided into two types of units, a central unit (UPC_C), and a group of local units. Each of the local units performs a similar function, but may have slight differences to enable it to handle, for example, a different number of counters or different event multiplexing within the local unit. For gathering performance data from the core and associated L1, a processor-local UPC unit (UPC_P) is instantiated within each processor complex. That is, a UPC_P is added to the processing logic. Similarly, there may be a UPC unit associated with each L2 slice (UPC_L2). Each UPC_L2 and UPC_P unit may include a small number of counters. For example, the UPC_P may include 24 14 bit counters, while the UPC_L2 counters may instantiate 16 10 bit counters. The UPC ring (shown as solid line from 7116 to 7118) may be connected such that each UPC_P (7104*a*, 7104*b*, 7104*n*) or UPC_L2 unit (7108*a*, 7108*b*, 7108*n*) may be connected to its nearest neighbor. In one aspect, the daisy chain may be implemented using only registers in the UPC units, without extra pipeline latches.

For collecting trace information from a single core (e.g., 7102*a*, 7102*b*, 7102*n*), the UPC_C 114 may continuously record the data coming in on the connection, e.g., a daisy chain bus, shown at 7118. In response to detecting one or more trigger bits on the daisy chain bus, the UPC_C 7114 continues to read the data (trace information) on the connection (e.g., the daisy chain bus) and records the data for a programmed number of cycles to the SRAM 7120. Thus, trace information before and after the detection of the trigger bits may be seen and recorded.

The UPC_P and UPC_L2 modules may be connected to the UPC_C unit via a 96 bit daisy chain, using a packet based protocol. In trace mode, the trace data from the core is captured into the central SRAM located in the UPC_C 7114. Bit fields 0:87 may be used for the trace data (e.g., 44 bits per cycle), and bit fields 88:95 may be used for trigger data (e.g., 4 bits per cycle).

FIG. 5-11-2 illustrates a structure of the UPC_P unit or module in one embodiment of the present disclosure. The UPC_P module 7200 may be tightly coupled to the core 7220 which may also include L1 prefetcher module or functionality. It may gather trace data from the core 7220 and present it to the UPC_C via the daisy chain bus 7252 for further processing.

The UPC_P module may use the x1 and x2 clocks. It may expect the x1 and x2 clocks to be phase-aligned, removing the need for synchronization of x1 signals into the x2 domain. In one aspect, x1 clock may operate twice as fast as x2 clock.

Bits of trace information may be captured from the processing core 220 and sent across the connection connecting to the UPC_C, for example, the daisy chain bus shown at 7252. For instance, one-half of the 88 bit trace bus from the core (44 bits) may be captured, replicated as the bits pass from different clock domains, and sent across the connection. In addition, 4 of the 16 trigger signals supplied by the core 7200 may be selected at 7254 for transmission to the UPC_C. The UPC_C then may store 1024 clock cycles of trace information into the UPC_C SRAM. The stored trace information may be used for post-processing by software.

Edge/Level/Polarity module 7224 may convert level signals emanating from the core's Performance bus 7226 into single cycle pulses suitable for counting. Each performance bit has a configurable polarity invert, and edge filter enable bit, available via a configuration register.

Widen module 7232 converts clock signals. For example, the core's Performance 7226, Trace 7228, and Trigger 7230 busses all may run at clkx1 rate, and are transitioned to the clkx2 domain before being processed. Widen module 7232 performs that conversion, translating each clkx1clock domain signal into 2 clkx2 signals (even and odd). This module is optional, and may be used if the rate at which events are output are different (e.g., faster) than the rate at which events are accumulated at the performance counters.

QPU Decode module 7234 and execution unit (XU) Decode module 7236 take the incoming opcode stream from the trace bus, and decode it into groups of instructions. In one aspect, this module resides in the clkx2 domain, and there may be two opcodes (even and odd) of each type (XU and QPU) to be decoded per clkx2 cycle. To accomplish this, two QPU and two XU decode units may be instantiated. This applies to implementations where the core 220 operates at twice the speed, i.e., outputs 2 events, per operating cycle of the performance counters, as explained above. The 2 events saved by the widen module 7232 may be processed at the two QPU and two XU decode units. The decoded instruction stream is then sent to the counter blocks for selection and counting.

Registers module 7238 implements the interface to the MMIO bus. This module may include the global MMIO configuration registers and provide the support logic (readback muxes, partial address decode) for registers located in the UPC_P Counter units. User software may program the performance counter functions of the present disclosure via the MMIO bus.

Thread Combine module 7240 may combine identical events from each thread, count them, and present a value for accumulation by a single counter. Thread Combine module 7240 may conserve counters when aggregate information across all threads is needed. Rather than using four counters (or number of counters for each thread), and summing in software, summing across all threads may be done in hardware using this module. Counters may be selected to support thread combining.

The Compress module 7242 may combine event inputs from the core's event bus 7226, the local counters 7224*a* . . . 7224*n*, and the L1 cache prefetch (L1P) event bus 7246, 7248, and place them on the appropriate daisy chain lines for transmission to the UPC_C, using a predetermined packet format.

There may be 24 UPC_P Counter units in each UPC_P module. To minimize muxing, not all counters need be connected to all events. All counters can be used to count opcodes. One counter may be used to capture a given core's performance event or L1P event.

Referring to FIG. 5-11-2, a core or processor (220) may provide performance and trace data via busses. Performance (Event) Bus 7226 may provide information about the internal operation of the core. The bus may be 24 bits wide. The data may include performance data from the core units such as execution unit (XU), instruction unit (IU), floating point unit (FPU), memory management unit (MMU). The core unit may multiplex (mux) the performance events for each unit internally before presenting the data on the 24 bit performance interface. Software may specify the desired performance event to monitor, i.e., program the multiplexing, for example, using a device control register (DCR) or the like. The software may similarly program for distributed trace. The core 7220 may output the appropriate data on the performance bus 7226 according to the software programmed multiplexing.

Trace (Debug) bus 7228 may be used to send data to the UPC_C for capture into SRAM. In this way, the SRAM is used as a trace buffer. In one aspect, the core whose trace information is being sent over the connection (e.g., the daisy chain bus) to the UPC_C may be configured to output trace data appropriate for the events being counted.

Trigger bus 7230 from the core may be used to stop and start the capture of trace data in the UPC_C SRAM. The user may send, for example, 4 to 16 possible trigger events presented by the core to the UPC for SRAM start/stop control.

MMIO interface 7250 may allow configuration and interrogation of the UPC_P module by the local core unit (7220).

The UPC_P 7200 may include two output interfaces. A UPC_P daisy chain bus 7252, used for transfer of UPC_P data to the UPC_C, and a MMIO bus 7250, used for reading/writing of configuration and count information from the UPC_P.

Referring back to FIG. 5-11-1, a UPC_C module 7114 may gather information from the PU, L2, and Network Units, and maintain 64 bit counts for each performance event. The UPC_C may contain, for example, a 256D×264W SRAM, used for storing count and trace information.

The UPC_C module may operate in different modes. In trace mode, the UPC_C acts as a trace buffer, and can trace a predetermined number of cycles of a predetermined number of bit trace information from a core. For instance, the UPC_C may trace 1536 cycles of 44 bit trace information from a single core.

The UPC_P/L2 Counter unit 7142 gathers performance data from the UPC_P and/or UPC_L2 units, while the Network/DMA/IO Counter unit 7144 gathers event data from the rest of the ASIC, e.g., input/output (I/O) events, network events, direct memory access (DMA) events, etc.

UPC_P/L2 Counter Unit 7142 may accumulate the trace data received from a UPC_P in the appropriate SRAM location. The SRAM is divided into a predetermined number of counter groups of predetermined counters each, for example, 32 counter groups of 16 counters each. For every count data or trace data, there may exist an associated location in SRAM for storing the count data.

Software may read or write any counter from SRAM at any time. In one aspect, data is written in 64 bit quantities, and addresses a single counter from a single counter group.

FIG. 5-11-5 illustrates an example structure of the UPC_C 7600 in one embodiment of the present disclosure. The SRAM 7604 is used to capture the trace data. For instance, 88 bits of trace data may be presented by the UPC_P/L2 Counter units to the UPC_C each cycle. In one embodiment, the SRAM may hold 3 88 bit words per SRAM entry, for example, for a total of 256×3×2=1536 cycles of 44 bit data. The UPC_C may gather multiple cycles of data from the daisy chain, and store them in a single SRAM address. The data may be stored in consecutive locations in SRAM in ascending bit order. Other dimensions of the SRAM 304 and order of storage may be possible. Most of the data in the SRAM 304 may be accessed via the UPC_C counter data registers (e.g., 7608). The remaining data (e.g., 8 bits residue per SRAM address in the above example configuration) may be accessible through dedicated Devbus registers.

The following illustrates the functionality of UPC_C in capturing and centrally storing trace data from one or more of the processor connected on the daisy chain bus in one embodiment of the present disclosure.

1) UPC_C is programmed with the number of cycles to capture after a trigger is detected.

2) UPC_C is enabled to capture data from the ring (e.g., daisy chain bus 7130 of FIG. 5-11-1). It starts writing data from the ring into the SRAM. For example, each SRAM address may hold 3 cycles of daisy chain data (88×3)=264. SRAM of the UPC_C may be 288 bits wide, so there may be a few bits to spare. In this example, 6 trigger bits (a predetermined number of bits) may be stored in the remaining 24 bits (6 bits of trigger per daisy chain cycle). That is 3 cycles of daisy chain per SRAM location.

3) UPC_C receives a trigger signal from ring (sent by UPC_P). UPC_C stores the address that UPC_C was writing to when the trigger occurred. This for example allows software to know where in the circular SRAM buffer the trigger happened.

4) UPC_C then continues to capture until the number of cycles in step 1 has expired. UPC_C then stops capture and may return to an idle state. Software may read a status register to see that capture is complete. The software may then reads out the SRAM contents to get the trace.

The following illustrates the functionality of UPC_P in distributed tracing of the present disclosure in one embodiment.

1) UPC_P is configured to send bits from a processor (or core), for example, either upper or lower 44 bits from processor, to UPC_C. (e.g., set mode 2, enable UPC_P, set up event muxes).

2) In an implementation where the processor operates at a faster (e.g., twice as fast) than the rest of the performance counter components, UPC_P takes two x1 cycles of 44 bit data and widens it to 88 bits at ½ processor rate.

3) UPC_P places this data, along with trigger data sourced from the processor, or from an MMIO store to a register residing in the UPC_P or UPC_L2, on the daisy chain. For example, 88 bits are used for data, and 6 bits of trigger are passed.

FIG. 5-11-12 is a flow diagram illustrating an overview method for distributed trace in one embodiment of the present disclosure. At 7902, the devices or units (for example, shown in FIG. 5-11-1) are configured to perform the tracing. For instance, the devices may have been running in different operating capabilities, for example, collecting the performance data. The configuring to run in trace mode or such operating capability may be done by the software writing into one of the registers, for example, via the MMIO bus of a selected processing core whose trace data is to be acquired. Configuring at 7902 starts the UPC_C to start capturing the trace data on the daisy chain bus.

At 7904, the central counter unit detects the stop trigger on the daisy chain bus. Depending on programming, the central counter unit may operate differently. For example, in one embodiment, in response to detecting the stop trigger signal on the daisy chain bus, the central counter unit may continue to read and store the trace data from the daisy chain bus for predetermined number cycles after the detecting of the stop trigger signal. In another embodiment, the central counter unit may stop reading and storing the trace data in response to detecting the stop trigger signal. Thus, the behavior of the central counter unit may be programmable. The programming may be done by the software, for instance, writing on an appropriate register associated with the central counter unit. In another embodiment, the programming may be done by the software, for instance, writing on an appropriate register associated with the local processing core, and the local processing core may pass this information to the central unit via the daisy chain bus.

The store trace data on the SRAM may be read or otherwise accessible to the user, for example, via the user software. In one aspect, the hardware devices of the present disclosure allow the user software to directly access its data. No kernel system call may be needed to access the trace data, thus reducing the overhead needed to run the kernel or system calls.

The trigger may be sent by the processing cores or by software. For example, software or user program may write to an MMIO location to send the trigger bits on the daisy chain bus to the UPC_C. Trigger bits may also be pulled from the processing core bus and sent out on the daisy chain bus. The core sending out the trace information continues to place its trace data on the daisy chain bus and the central counter unit continuously reads the data on the daisy chain bus and stores the data in memory.

System Packaging

Each compute rack contains 2 midplanes, and each midplane contains 512 16-way PowerPC A2 compute processors, each on a compute ASIC Midplanes are arranged vertically in the rack, one above the other, and are accessed from the front and rear of the rack. Each midplane has its own bulk power supply and line cord. These same racks also house I/O boards. Each passive compute midplane contains 16 node boards, each with 32 compute ASICs and 9 Blue Gene/Q Link ASICs, and a service card that provides clocks, a control buss, and power management. An I/O midplane may be formed with 16 I/O boards replacing the 16 node boards. An I/O board contains 8 compute ASICs, 8 link chips, and 8 PCI2 2.0 adapter card slots.

The midplane, the service card, the node (or I/O) boards, as well as the compute, and direct current assembly (DCA) cards that plug into the I/O and node boards are described here. The BQC chips are mounted singly, on small cards with up to 72 (36) associated SDRAM-DDR3 memory devices (in the preferred embodiment, 64 (32) chips of 2Gb SDRAM constitute a 16 (8) GB node, with the remaining 8 (4) SDRAM chips for chipkill implementation.) Each node board contains 32 of these cards connected in a 5 dimensional array of length 2 ($2^5=32$). The fifth dimension exists only on the node board, connecting pairs of processor chips. The other dimensions are used to electrically connect 16 node boards through a common midplane forming a 4 dimensional array of length 4; a midplane is thus $4^4 \times 2=512$ nodes. Working together, 128 link chips in a midplane extend the 4 midplane dimensions via optical cables, allowing midplanes to be connected together. The link chips can also be used to space partition the machine into sub-tori partitions; a partition is associated with at least one I/O node and only one user program is allowed to operate per partition. The 10 torus directions are referred to as the +/−a, +/−b, +/−c, +/−d, +/−e dimensions. The electrical signaling rate is 4Gb/s and a torus port is 4 bits wide per direction, for an aggregate bandwidth of 2 GB/s per port per direction. The 5-dimensional torus links are bidirectional. We have the raw aggregate link bandwidth of 2 GB/s* 2*10=40 GB/s. The raw hardware Bytes/s:FLOP/s is thus 40:204.8=0.195. The link chips double the electrical datarate to 8Gb/s, add a layer of encoding (8b/10b+parity), and drive directly the Tx and Rx optical modules at 10 GB/s. Each port has 2 fibers for send and 2 for receive. The Tx+Rx modules handle 12+12 fibers, or 4 uni-directional ports, per pair, including spare fibers. Hardware and software work together to seamlessly change from a failed optical fiber link, to a spare optical fiber link, without application fail.

The BQC ASIC contains a PCIe 2.0 port of width 8 (8 lanes). This port, which cannot be subdivided, can send and receive data at 4 GB/s (8/10 encoded to 5 GB/s). It shares pins with the fifth (+/−e) torus ports. Single node compute cards can become single node I/O cards by enabling this adapter card port. Supported adapter cards include IB-QDR and dual 10 Gb Ethernet. Compute nodes communicate to I/O nodes over an I/O port, also 2+2 GB/s. Two compute nodes, each with an I/O link to an I/O node, are needed to fully saturate the PCIe bus. The I/O port is extended optically, through a $9^{th}$ link chip on a node board, which allows compute nodes to communicate to I/O nodes on other racks. I/O nodes in their own racks communicate through their own 3 dimensional tori. This allows for fault tolerance in I/O nodes in that traffic may be re-directed to another I/O node, and flexibility in traffic routing in that I/O nodes associated with one partition may, software allowing, be used by compute nodes in a different partition.

A separate control host distributes at least a single 10Gb/s Ethernet link (or equivalent bandwidth) to an Ethernet switch which in turn distributes 1 Gb/s Ethernet to a service card on each midplane. The control systems on BG/Q and BG/P are similar. The midplane service card in turn distributes the system clock, provides other rack control function, and consolidates individual 1 Gb Ethernet connections to the node and I/O boards. On each node board and I/O board the service bus converts from 1Gb Ethernet to local busses (JTAG, I2C, SPI) through a pair of Field Programmable Gate Array (FPGA) function blocks codenamed iCon and Palimino. The local busses of iCon & Palimino connect to the Link and Compute ASICs, local power supplies, various sensors, for initialization, debug, monitoring, and other access functions.

Bulk power conversion is N+1 redundant. The input is 440V 3phase, with one power supply with one input line cord and thus one bulk power supply per midplane at 48V output. Following the 48V DC stage is a custom N+1 redundant regulator supplying up to 7 different voltages built directly into the node and I/O boards. Power is brought from the bulk supplies to the node and I/O boards via cables. Additionally DC-DC converters of modest power are present on the midplane service card, to maintain persistent power even in the event of a node card failure, and to centralize power sourcing of low current voltages. Each BG/Q circuit card contains an EEPROM with Vital product data (VPD).

From a full system perspective, the supercomputer as a whole is controlled by a Service Node, which is the external computer that controls power-up of the machine, partitioning, boot-up, program load, monitoring, and debug. The Service Node runs the Control System software. The Service Node communicates with the supercomputer via a dedicated, private 1 Gb/s Ethernet connection, which is distributed via an external Ethernet switch to the Service Cards that control each midplane (half rack). Via an Ethernet switch located on this Service Card, it is further distributed via the Midplane Card to each Node Card and Link Card. On each Service Card, Node Card and Link Card, a branch of this private Ethernet terminates on a programmable control device, implemented as an FPGA (or a connected set of FPGAs) .https://watgsa.ibm.com/%7Eswetz/shared/bgp/docs/Palomino.3.0/Palomino.html__ The FPGA(s) translate between the Ethernet packets and a variety of serial protocols to communicate with on-card devices: the SPI protocol for power supplies, the $I^2C$ protocol for thermal sensors and the JTAG protocol for Compute and Link chips.

On each card, the FPGA is therefore the center hub of a star configuration of these serial interfaces. For example, on a Node Card the star configuration comprises 34 JTAG ports (one for each compute or IO node) and a multitude of power supplies and thermal sensors.

Thus, from the perspective of the Control System software and the Service Node, each sensor, power supply or ASIC in the supercomputer system is independently addressable via a standard 1 Gb Ethernet network and IP packets. This mechanism allows the Service Node to have direct access to any device in the system, and is thereby an extremely powerful tool for booting, monitoring and diagnostics. Moreover, the Control System can partition the supercomputer into independent partitions for multiple users. As these control functions flow over an independent, private network that is inaccessible to the users, security is maintained.

In one embodiment, the computer utilizes a 5D torus interconnect network for various types of inter-processor communication. PCIe-2 and low cost switches and RAID systems are used to support locally attached disk storage and host (login nodes). A private 1 Gb Ethernet (coupled locally on card to a variety of serial protocols) is used for control, diagnostics, debug, and some aspects of initialization. Two types of high bandwidth, low latency networks make up the system "fabric".

System Interconnect—Five Dimensional Torus

The Blue Gene compute ASIC incorporates an integrated 5-D torus network router. There are 11 bidirectional 2 GB/s raw data rate links in the compute ASIC, 10 for the 5-D torus and 1 for the optional I/O link. A network messaging unit (MU) implements the prior generation Blue Gene style network DMA functions to allow asynchronous data transfers over the 5-D torus interconnect. MU is logically separated into injection and reception units.

The injection side MU maintains injection FIFO pointers, as well as other hardware resources for putting messages into the 5-D torus network. Injection FIFOs are allocated in main memory and each FIFO contains a number of message descriptors. Each descriptor is 64 bytes in length and includes a network header for routing, the base address and length of the message data to be sent, and other fields like type of packets, etc., for the reception MU at the remote node. A processor core prepares the message descriptors in injection FIFOs and then updates the corresponding injection FIFO pointers in the MU. The injection MU reads the descriptors and message data packetizes messages into network packets and then injects them into the 5-D torus network.

Three types of network packets are supported: (1) Memory FIFO packets; the reception MU writes packets including both network headers and data payload into pre-allocated reception FIFOs in main memory. The MU maintains pointers to each reception FIFO. The received packets are further processed by the cores; (2) Put packets; the reception MU writes the data payload of the network packets into main memory directly, at addresses specified in network headers. The MU updates a message byte count after each packet is received. Processor cores are not involved in data movement, and only have to check that the expected numbers of bytes are received by reading message byte counts; (3) Get packets; the data payload contains descriptors for the remote nodes. The MU on a remote node receives each get packet into one of its injection FIFOs, then processes the descriptors and sends data back to the source node.

MU resources are in memory mapped I/O address space and provide uniform access to all processor cores. In practice, the resources are likely grouped into smaller groups to give each core dedicated access. In one embodiment there is supported 544 injection FIFOs, or 32/core, and 288 reception FIFOs, or 16/core. The reception byte counts for put messages are implemented in L2 using the atomic counters described herein below. There is effectively unlimited number of counters subject to the limit of available memory for such atomic counters.

The MU interface is designed to deliver close to the peak 18 GB/s (send)+18 GB/s (receive) 5-D torus nearest neighbor data bandwidth, when the message data is fully contained in the 32 MB L2. This is basically 1.8 GB/s+1.8 GB/s maximum data payload bandwidth over 10 torus links. When the total message data size exceeds the 32 MB L2, the maximum network bandwidth is then limited by the sustainable external DDR memory bandwidth.

The Blue Gene/P DMA drives the 3-D torus network, but not the collective network. On Blue Gene/Q, because the collective and I/O networks are embedded in the 5-D torus with a uniform network packet format, the MU will drive all regular torus, collective and I/O network traffic with a unified programming interface.

There is provided an architecture of a distributed parallel messaging unit ("MU") for high throughput networks, wherein a messaging unit at one or more nodes of a network includes a plurality of messaging elements ("MEs"). In one embodiment, each ME operates in parallel and includes a DMA element for handling message transmission (injection) or message reception operations.

The top level architecture of the Messaging Unit 65100 interfacing with the Network Interface Unit 65150 is shown in FIG. 5-1-2. The Messaging Unit 65100 functional blocks involved with packet injection control as shown in FIG. 5-1-2 includes the following: an Injection control unit 65105 implementing logic for queuing and arbitrating the processors' requests to the control areas of the injection MU; and, a plurality of iMEs (injection messaging engine units) 65110 that read data from L2 cache or DDR memory and insert it in the network injection FIFOs 65180. In one embodiment, there are 16 iMEs 65110, one for each network injection FIFO 65180. The Messaging Unit 65100 functional blocks involved with packet reception control as shown in FIG. 5-1-2 include a Reception control unit 65115 implementing logic for queuing and arbitrating the requests to the control areas of the reception MU; and, a plurality of rMEs (reception messaging engine units) 65120 that read data from the network reception FIFOs 65190, and insert them into the associated memory system. In one embodiment, there are 16 rMEs 65120, one for each network reception FIFO 65190. A DCR control Unit 65128 is provided that includes DCR (control) registers for the MU 65100.

As shown in FIG. 5-1-2, the herein referred to Messaging Unit, "MU" such as MU 65100 implements plural direct memory access engines to offload the Network Interface Unit 65150. In one embodiment, it transfers blocks via three Xbar interface masters 65125 between the memory system and the network reception FIFOs 65190 and network injection FIFOs 65180 of the Network Interface Unit 65150. Further, in one embodiment, L2 cache controller accepts requests from the Xbar interface masters 65125 to access the memory system, and accesses either L2 cache 70 or the external memory 80 (FIG. 1-0) to satisfy the requests. The MU is additionally controlled by the cores via memory mapped I/O access through an additional switch slave port 65126.

In one embodiment, one function of the messaging unit 65100 is to ensure optimal data movement to, and from the network into the local memory system for the node by supporting injection and reception of message packets. As shown in FIG. 5-1-2, in the Network Interface Unit 65150 the network injection FIFOs 65180 and network reception FIFOs 65190 (sixteen for example) each comprise a network logic device for communicating signals used for controlling routing data packets, and a memory for storing multiple data arrays. Each network injection FIFOs 65180 is associated with and coupled to a respective network sender device 65185—(where n=1 to 16 for example), each for sending message packets to a node, and each network reception FIFOs 65190 is associated with and coupled to a respective network receiver device 65195$_n$ (where n=1 to 16 for example), each for receiving message packets from a node. A network DCR (device control register) 65182 is provided that is coupled to the network injection FIFOs 65180, network reception FIFOs 65190, and respective network receivers 65195, and network senders 65185. A complete description of the DCR architecture is available in IBM's Device Control Register Bus 3.5 Architecture Specifications Jan. 27, 2006, which is incorporated by reference in its entirety. The network logic device controls the flow of data into and out of the network injection FIFO 65180 and also functions to apply 'mask bits' supplied from the network DCR 65182. In one embodiment, the rMEs communicate with the network FIFOs in the Network Interface Unit 65150 and receives signals from the network reception FIFOs 65190 to indicate, for example, receipt of a packet. It generates all signals needed to read the packet from the network reception FIFOs 65190. This Network Interface Unit 65150 further provides signals from the network device that indicate whether or not there is space in the network injection FIFOs 65180 for transmitting a packet to the network and can also be configured to write data to the selected network injection FIFOs.

The MU 65100 further supports data prefetching into the L2 cache 70. On the injection side, the MU splits and packages messages into network packets, and sends packets to the network respecting the network protocol. On packet injection, the messaging unit distinguishes between packet injection and memory prefetching packets based on certain control bits in the message descriptor, e.g., such as a least significant bit of a byte of a descriptor 65102 shown in FIG. 5-1-8. A memory prefetch mode is supported in which the MU fetches a message into L2, but does not send it. On the reception side, it receives packets from a network, and writes them into the appropriate location in memory system, depending on control information stored in the packet. On packet reception, the messaging unit 65100 distinguishes between three different types of packets, and accordingly performs different operations. The types of packets supported are: memory FIFO packets, direct put packets, and remote get packets.

With respect to on-chip local memory copy operation, the MU copies content of an area in the associated memory system to another area in the memory system. For memory-to-memory on chip data transfer, a dedicated SRAM buffer, located in the network device, is used. Injection of remote get packets and the corresponding direct put packets, in one embodiment, can be "paced" by software to reduce contention within the network. In this software-controlled paced mode, a remote get for a long message is broken up into multiple remote gets, each for a sub-message. The sub-message remote get is allowed to enter the network if the number of packets belonging to the paced remote get active in the network is less than an allowed threshold. To reduce contention in the network, software executing in the cores in the same nodechip can control the pacing.

The MU 65100 further includes an interface to a crossbar switch (Xbar) 65060 in additional implementations. The MU 65100 includes three (3) Xbar interface masters 65125 to sustain network traffic and one Xbar interface slave 65126 for programming. The three (3) Xbar interface masters 65125 may be fixedly mapped to the iMEs 65110, such that for example, the iMEs are evenly distributed amongst the three ports to avoid congestion. A DCR slave interface unit 65127 providing control signals is also provided.

The handover between network device 65150 and MU 65100 is performed via buffer memory, e.g., 2-port SRAMs, for network injection/reception FIFOs. The MU 65100, in one embodiment, reads/writes one port using, for example, an 800 MHz clock (operates at one-half the speed of a processor core clock, e.g., at 1.6 GHz, for example), and the network reads/writes the second port with a 500 MHz clock, for example. The handovers are handled using the network injection/reception FIFOs and FIFOs' pointers (which are implemented using latches, for example).

As shown in FIG. 5-1-3 illustrating a more detailed schematic of the Messaging Unit 65100 of FIG. 5-1-2, multiple parallel operating DMA engines are employed for network packet injection, the Xbar interface masters 65125 run at a predetermined clock speed, and, in one embodiment, all signals are latch bound. The Xbar write width is 16 bytes, or about 12.8 GB/s peak write bandwidth per Xbar interface master in the example embodiment. In this embodiment, to sustain a 2*10 GB/s=20 GB/s 5-D torus nearest neighbor bandwidth, three (3) Xbar interface masters 65125 are provided. Further, in this embodiment, these three Xbar interface masters are coupled with iMEs via ports 65125*a*, 65125*b*, . . . , 65125*n*. To program MU internal registers for the reception and injection sides, one Xbar interface slave 65126 is used.

As further shown in FIG. 5-1-3, there are multiple iMEs (injection messaging engine units) 65110*a*, 65110*b*, . . . , 65110*n* in correspondence with the number of network injection FIFOs, however, other implementations are possible. In the embodiment of the MU injection side 65100A depicted, there are sixteen iMEs 65110 for each network injection FIFO. Each of the iMEs 65110*a*,65110*b*, . . . , 65110*n* includes a DMA element including an injection control state machine 65111, and injection control registers 65112. Each iMEs 65110*a*,65110*b*, . . . , 65110*n* initiates reads from the message control SRAM (MCSRAM) 65140 to obtain the packet header and other information, initiates data transfer from the memory system and, write back updated packet header into the message control SRAM 65140. The control registers 65112 each holds packet header information, e.g., a subset of packet header content, and other information about the packet currently being moved. The DMA injection control state machine 65111 initiates reads from the message control SRAM 65140 to obtain the packet header and other information, and then it initiates data transfer from the memory system to a network injection FIFO.

In an alternate embodiment, to reduce size of each control register 65112 at each node, only a small portion of packet information is stored in each iME that is necessary to generate requests to switch 65060. Without holding a full packet header, an iME may require less than 100 bits of storage. Namely, each iME 65110 holds pointer to the location in the memory system that holds message data, packet size, and miscellaneous attributes.

Header data is sent from the message control SRAM 65140 to the network injection FIFO directly; thus the iME alternatively does not hold packet headers in registers. The Network Interface Unit 65150 provides signals from the network device to indicate whether or not there is space available in the paired network injection FIFO. It also writes data to the selected network injection FIFOs.

As shown in FIG. 5-1-3A, the Xbar interface masters 65125 generate external connection to Xbar for reading data from the memory system and transfer received data to the correct iME/network interface. To reduce the size of the hardware implementation, in one embodiment, iMEs 65110 are grouped into clusters, e.g., clusters of four, and then it pairs (assigns) one or more clusters of iMEs to a single Xbar interface master. At most one iME per Xbar interface master can issue a read request on any cycle for up to three (3) simultaneous requests (in correspondence to the number of Xbar interface masters, e.g., three (3) Xbar interface masters). On the read data return side, one iME can receive return data on each master port. In this embodiment of MU injection side 65100A, it is understood that more than three iMEs can be actively processing at the same time, but on any given clock cycle three can be requesting or reading data from the Xbar 60, in the embodiment depicted. The injection control SRAM 65130 is also paired with one of the three master ports, so that it can fetch message descriptors from memory system, i.e., Injection memory FIFOs. In one embodiment, each iME has its own request and acknowledgement signal lines connected to the corresponding Xbar interface master. The request signal is from iME to Xbar interface master, and the acknowledgement signal is from Xbar interface master to iME. When an iME wants to read data from the memory system, it asserts the request signal. The Xbar interface master selects one of iMEs requesting to access the memory system (if any). When Xbar interface master accepts a request, it asserts the acknowledgement signal to the requesting iME. In this way iME knows when the request is accepted. The injection control SRAM has similar signals connected to a Xbar interface master (i.e. request and acknowledgement signals). The Xbar interface master treats the injection control SRAM in the same way as an iME.

FIG. 5-1-3 further shows internal injection control status registers 65112 implemented at each iME of the MU device that receive control status data from message control SRAM. These injection control status registers include, but are not limited to, registers for storing the following: control status data including pointer to a location in the associated memory system that holds message data, packet size, and miscellaneous attributes. Based on the control status data, iME will read message data via the Xbar interface master and store it in the network injection FIFO.

FIG. 5-1-3A depicts in greater detail those elements of the MU injection side 65100A for handling the transmission (packet injection) for the MU 65100. Messaging support including packet injection involves packaging messages into network packets and, sending packets respecting network protocol. The network protocol includes point-to-point and collective. In the point-to-point protocol, the packet is sent directly to a particular destination node. On the other hand, in the collective protocol, some operations (e.g. floating point addition) are performed on payload data across multiple packets, and then the resulting data is sent to a receiver node.

For packet injection, the Xbar interface slave 65126 programs injection control by accepting write and read request signals from processors to program SRAM, e.g., an injection control SRAM (ICSRAM) 65130 of the MU 65100 that is mapped to the processor memory space. In one embodiment, Xbar interface slave processes all requests from the processor in-order of arrival. The Xbar interface masters generate connection to the Xbar 60 for reading data from the memory system, and transfers received data to the selected iME element for injection, e.g., transmission into a network.

The ICSRAM 65130 particularly receives information about a buffer in the associated memory system that holds message descriptors, from a processor desirous of sending a message. The processor first writes a message descriptor to a buffer location in the associated memory system, referred to herein as injection memory FIFO (imFIFO) shown in FIG. 5-1-3A as imFIFO 65099. The imFIFO(s) 65099, implemented at the memory system in one embodiment shown in FIG. 5-1-5A, are implemented as circular buffers having slots 65103 for receiving message descriptors and having a start address 65098 (indicating the first address that this imFIFO 65099 can hold a descriptor), imFIFO size (from which the end address 65097 can be calculated), and including associated head and tail pointers to be specified to the MU. The head pointer points to the first descriptor stored in the FIFO, and the tail pointer points to the next free slot just after the last descriptor stored in the FIFO. In other words, the tail pointer points to the location where the next descriptor will be appended. FIG. 5-1-5A shows an example empty imFIFO 65099, where a tail pointer is the same as the head pointer (i.e., pointing to a same address); and FIG. 5-1-5B shows that a processor has written a message descriptor 65102 into the empty slot in an injection memory FIFO 65099 pointed to by the tail pointer. After storing the descriptor, the processor increments the tail pointer by the size of the descriptor so that the stored descriptor is included in the imFIFO, as shown in FIG. 5-1-5C. When the head and tail pointers reach the FIFO end address (=start pointer plus the FIFO size), they wrap around to the FIFO start address. Software accounts for this wrap condition when updating the head and tail pointers. In one embodiment, at each compute node, there are 17 "groups" of imFIFOs, for example, with 32 imFIFOs per group for a total of 544, in an example embodiment. In addition, these groups may be sub-grouped, e.g., 4 subgroups per group. This allows software to assign processors and threads to groups or subgroups. For example, in one embodiment, there are 544 imFIFOs to enable each thread on each core to have its own set of imFIFOs. Some imFIFOs may be used for remote gets and for local copy. It is noted that any processor can be assigned to any group.

Returning to FIG. 5-1-3, the message descriptor associated with the message to be injected is requested by the injection control state machine 65135 via one of the Xbar interface masters 65125. Once retrieved from memory system, the requested descriptor returns via the Xbar interface master and is sent to the message control SRAM 65140 for local storage. FIG. 5-1-8 depicts an example layout of a message descriptor 65102. Each message descriptor describes a single complete packet, or it can describe a large message via a message length (one or more packets) and may be 64 bytes in length, aligned on a 64 byte boundary. The first 32 bytes of the message descriptor includes, in one embodiment, information relevant to the message upon injection, such as the message length 65414, where its payload starts in the memory system (injection payload starting address 65413), and a bit-mask 65415 (e.g., 16 bits for the 16 network injection FIFO's in the embodiment described) indicating into which network injection FIFOs the message may be injected. That is, each imFIFO can use any of the network injection FIFOs, subject to a mask setting in the message descriptor such as specified in "Torus Injection FIFO Map" field 65415 specifying the mask, for example, as 16 least significant bits in this field that specifies a bitmap to decide which of the 16 network injection FIFOs can be used for sending the message. The second 32 bytes include the packet header 65410 whose content will be described in greater detail herein.

As further shown in FIG. 5-1-8, the message descriptor further includes a message interrupt bit 65412 to instruct the message unit to send an interrupt to the processor when the last (and only last) packet of the message has been received. For example, when the MU injection side sends the last packet of a message, it sets the interrupt bit (bit 7 in FIG. 5-1-9A, field 65512). When an rME receives a packet and sees this bit set in the header, it will raise an interrupt. Further, one bit e.g., a least significant bit, of Prefetch Only bits 65411, FIG. 5-1-8, when set, will cause the MU to fetch the data into L2 only. No message is sent if this bit is set. This capability to prefetch data is from the external memory into the L2. A bit in the descriptor indicates the message as prefetch only and the message is assigned to one of iMEs (any) for local copy. The message may be broken into packets, modified packet headers and byte count. Data is not written to any FIFO.

In a methodology 65200 implemented by the MU for sending message packets, ICSRAM holds information including the start address, size of the imFIFO buffer, a head address, a tail address, count of fetched descriptors, and free space remaining in the injection memory FIFO (i.e., start, size, head, tail, descriptor count and free space).

As shown in step 65204 of FIG. 5-1-4, the injection control state machine 65135 detects the state when an injection memory FIFO 65099 is non-empty, and initiates copying of the message specific information of the message descriptor 65102 to the message control SRAM block 65140. That is, the state machine logic 135 monitors all write accesses to the injection control SRAM. When it is written, the logic reads out start, size, head, and tail pointers from the SRAM and check if the imFIFO is non-empty. Specifically, an imFIFO is non-empty if the tail pointer is not equal to the head pointer. The message control SRAM block 65140 includes information (received from the imFIFO) used for injecting a message to the network including, for example, a message start address, message size in bytes, and first packet header. This message control SRAM block 65140 is not memory-mapped (it is used only by the MU itself).

The Message selection arbiter unit 65145 receives the message specific information from each of the message control SRAM 65140, and receives respective signals 65115 from each of the iME engines 65110*a*, 65110*b*, . . . , 65110*n*. Based on the status of each respective iME, Message selection arbiter unit 65145 determines if there is any message waiting to be sent, and pairs it to an available iME engine 65110*a*, 65110*b*, . . . , 65110*n*, for example, by issuing an iME engine selection control signal 65117. If there are multiple messages which could be sent, messages may be selected for processing in accordance with a pre-determined priority as specified, for example, in Bits 0-2 in virtual channel in field 65513 specified in the packet header of FIG. 5-1-9A. The priority is decided based on the virtual channel. Thus, for example, a system message may be selected first, then a message with high-priority, then a normal priority message is selected. If there are multiple messages that have the highest priority among the candidate messages, a message may be selected randomly, and assigned to the selected iME engine. In every clock cycle, one message can be selected and assigned.

Injection Operation

Returning to FIG. 5-1-3A, in operation, as indicated at 65201, a processor core 65052 writes to the memory system message data 65101 that is to be sent via the network. The message data can be large, and can require multiple network packets. The partition of a message into packets, and generation of correct headers for these packets is performed by the MU device 65100A.

Then, as indicated at 65203, once an imFIFO 65099 is updated with the message descriptor, the processor, via the Xbar interface slave 65126 in the messaging unit, updates the pointer located in the injection control SRAM (ICSRAM) 65130 to point to a new tail (address) of the next descriptor slot 65102 in the imFIFO 65099. That is, after a new descriptor is written to an empty imFIFO by a processor, e.g., imFIFO 65099, software executing on the cores of the same chip writes the descriptor to the location in the memory system pointed to by the tail pointer, and then the tail pointer is incremented for that imFIFO to point to the new tail address for receiving a next descriptor, and the "new tail" pointer address is written to ICSRAM 65130 as depicted in FIG. 5-1-11 showing ICSRAM contents 65575. Subsequently, the MU will recognize the new tail pointer and fetch the new descriptor. The start pointer address 65098 in FIG. 5-1-5A may be held in ICSRAM along with the size of the buffer. That is, in one embodiment, the end address 65097 is NOT stored in ICSRAM. ICSRAM does hold a "size minus 1" value of the imFIFO. MU logic calculates end addresses using the "size minus 1" value. In one embodiment, each descriptor is 64 bytes, for example, and the pointers in ICSRAM are managed in 64-byte units. It is understood that, in view of FIGS. 5-1-5D and 5-1-5E a new descriptor may be added to a non-empty imFIFO, e.g., imFIFO 65099'. The procedure is similar as the case shown in FIG. 5-1-5B and FIG. 5-1-5C, where, in the non-empty imFIFO depicted, a new message descriptor 65104 is being added to the tail address, and the tail pointer is incremented, and the new tail pointer address written to ICSRAM 65130.

As shown in the method depicting the processing at the injection side MU, as indicated at 65204 in FIG. 5-1-4, the injection control FSM 65135 waits for indication of receipt of a message descriptor for processing. Upon detecting that a new message descriptor is available in the injection control SRAM 65130, the FSM 65135 at 65205*a* will initiate fetching of the descriptor at the head of the imFIFO. At 65205*b*, the MU copies the message descriptor from the imFIFO 65099 to the message control SRAM 65140 via the Xbar interface master, e.g., port 0. This state machine 65135, in one embodiment, also calculates the remaining free space in that imFIFO whenever size, head, or tail pointers are changed, and updates the correct fields in the SRAM. If the available space in that imFIFO crosses an imFIFO threshold, the MU may generate an interrupt, if this interrupt is enabled. That is, when the available space (number of free slots to hold a new descriptors) in an imFIFO exceeds the threshold, the MU raises an interrupt. This threshold is specified by software on the cores via a register in DCR Unit. For example, suppose the threshold is 10, and an imFIFO is filled with the descriptors (i.e., no free slot to store a new descriptor). The MU will process the descriptors. Each time a descriptor has been processed, imFIFO will get one free slot to store a new descriptor. After 11 descriptors have been processed, for example, the imFIFO will have 11 free slots, exceeds the threshold of 10. As a result, MU will raise an interrupt for this imFIFO.

Next, the arbitration logic implemented in the message selection arbiter 65145 receives inputs from the message control SRAM 65140 and particularly, issues a request to process the available message descriptor, as indicated at 65209, FIG. 5-1-4. The message selection arbiter 65145 additionally receives inputs 65115 from the iMEs 65110*a*, . . . , 65110*n* to apprise the arbiter of the availability of iMEs. The message control SRAM 65140 requests of the arbiter 65145 an iME to process the available message descriptor. From pending messages and available iMEs, the arbiter logic implemented pairs an iME, e.g., iME 65110*b*, and a message at 65209.

FIG. 5-1-12 depicts a flowchart showing message selection arbiter logic 65600 implemented according to an example embodiment. A first step 65604 depicts the message selection arbiter 65145 waiting until at least one descriptor becomes available in message control SRAM. Then, at 65606, for each descriptor, the arbiter checks the Torus Injection FIFO Map field 65415 (FIG. 5-1-8) to find out which iME can be used for this descriptor. Then, at 65609, the arbiter checks availability of each iME and selects only the descriptors that specify at least one idle (available) iME in their FIFO map 65415. If there is no descriptor, then the method returns to 65604 to wait for a descriptor. Otherwise, at 65615, one descriptor is selected from among the selected ones. It is understood that various selection algorithms can be used (e.g., random, round-robin, etc.). Then, at 65618, for the selected descriptor, select one of the available iMEs specified in the FIFO map 65415. At 65620, the selected iME processes the selected descriptor.

In one embodiment, each imFIFO 65099 has assigned a priority bit, thus making it possible to assign a high priority to that user FIFO. The arbitration logic assigns available iMEs to the active messages with high priority first (system FIFOs have the highest priority, then user high priority FIFOs, then normal priority user FIFOs). From the message control SRAM 65140, the packet header (e.g., 32B), number of bytes, and data address are read out by the selected iME, as indicated at step 65210, FIG. 5-1-4. On the injection side, one iME can work on a given message at any time. However, multiple iMEs can work in parallel on different messages. Once a message and an iME are matched, only one packet of that message is processed by the iME. An active status bit for that message is set to zero during this time, to exclude this imFIFO from the arbitration process. To submit the next packet to the network, the arbitration steps are repeated. Thus, other messages wanting the same iME (and network injection FIFO) are enabled to be transmitted.

In one embodiment, as the message descriptor contains a bitmap indicating into which network injection FIFOs packets from the message may be injected (Torus injection FIFO map bits 65415 shown in FIG. 5-1-8), the iME first checks the network injection FIFO status so that it knows not to arbitrate for a packet if its paired network injection FIFO is full. If there is space available in the network injection FIFO, and that message can be paired to that particular iME, the message to inject is assigned to the iME.

Messages from injection memory FIFOs can be assigned to and processed by any iME and its paired network injection FIFO. One of the iMEs is selected for operation on a packet-per-packet basis for each message, and an iME copies a packet from the memory system to a network injection FIFO, when space in the network injection FIFO is available. At step 65210, the iME first requests the message control SRAM to read out the header and send it directly to the network injection FIFO paired to the particular iME, e.g., network injection FIFO 65180*b*, in the example provided. Then, as shown at 65211, FIGS. 5-1-3A and 5-1-4, the iME initiates data transfer of the appropriate number of bytes of the message from the memory system to the iME, e.g., iME 65110*b*, via an Xbar interface master. In one aspect, the iME issues read requests to copy the data in 32B, 64B, or 128B at a time. More particularly, as a message may be divided into one or more packets, each iME loads a portion of message corresponding to the packet it is sending. The packet size is determined by "Bit 3-7, Size" in field 65525, FIG. 5-1-9B. This 5-bit field specifies packet payload size in 32-byte units (e.g. 1=>32B, 2=>64B, . . . 16=>512B). The maximum allowed payload size is 512B. For example, the length of a message is 129 bytes, and the specified packet size is 64 bytes. In this case this message is sent using two 64B packets and one 32B packet (only 1B in the 32B payload is used). The first packet sends 1st to 64th bytes of the message, the second one sends $65^{th}$ to $128^{th}$ bytes, and the third one sends $129^{th}$ byte. Therefore, when an iME is assigned to send the second packet, it will request the master port to load $65^{th}$ to $128^{th}$ byte of the message. The iME may load unused bytes and discard them, due to some alignment requirements for accessing the memory system.

Data reads are issued as fast as the Xbar interface master allows. For each read, the iME calculates the new data address. In one embodiment, the iME uses a start address (e.g., specified as address 65413 in FIG. 5-1-8) and the payload size (65525 in FIG. 5-1-9B) to decide data address. Specifically, iME reads data block starting from the start address (65413) whose size is equal to payload size (65525). Each time a packet is processed, the start address (65413) is incremented by payload size (65525) so that the next iME gets the correct address to read payload data. After the last data read request is issued, the next address points to the first data "chunk" of the next packet. Each iME selects whether to issue a 32B, 64B, or 128B read to the Xbar interface master.

The selection of read request size is performed as follows: In the following examples, a "chunk" refers to a 32B block that starts from 32B-aligned address. Thus, for example, for a read request of 128B, the iME requests 128B block starting from address 128N (N: integer), when it needs at least the 2nd and 3rd chunks in the 128B block (i.e., It needs at least 2 consecutive chunks starting from address 128N+32. This also includes the cases that it needs first 3 chunks, last 3 chunks, or all the 4 chunks in the 128B block, for example.) For a read request of 64B, the iME requests 64B block starting from address 64N, e.g., when it needs both chunks included in the 64B block. For read request of 32B: the iME requests 32B block. For example, when the iME is to read 8 data chunks from addresses 32 to 271, it generates requests as follows:

1. iME requests 128B starting from address 0, and uses only the last 96B;
2. iME requests 128B starting from address 128, and uses all 128B;
3. iME requests 32B starting from address 256.

It is understood that read data can arrive out of order, but returns via the Xbar interface master that issued the read, e.g., the read data will be returned to the same master port requesting the read. However, the order between read data return may be different from the request order. For example, suppose a master port requested to read address 1, and then requested to read address 2. In this case the read data for address 2 can arrive earlier than that for address 1.

iMEs are mapped to use one of the three Xbar interface masters in one implementation. When data arrives at the Xbar interface master, the iME which initiated that read request updates its byte counter of data received, and also generates the correct address bits (write pointer) for the paired network injection FIFO, e.g., network injection FIFO 65180*b*. Once all data initiated by that iME are received and stored to the paired network injection FIFO, the iME informs the network injection FIFO that the packet is ready in the FIFO, as indicated at 65212. The message control SRAM 65140 updates several fields in the packet header each time it is read by an iME. It updates the byte count of the message (how many bytes from that message are left to be sent) and the new data offset for the next packet.

Thus, as further shown in FIG. 5-1-4, at step 65215, a decision is made by the iME control logic whether the whole message has been injected. If the whole message has not been sent, then the process resumes at step 65209 where the arbiter logic implemented pairs an iME to send the next one packet for the message descriptor being processed, and steps 65210-65215 are repeated, until such time the whole message is sent. The arbitration step is repeated for each packet.

Each time an iME 65110 starts injecting a new packet, the message descriptor information at the message control SRAM is updated. Once all packets from a message have been sent, the iME removes its entry from the message control SRAM (MCSRAM), advances its head pointer in the injection control SRAM 65130. Particularly, once the whole message is sent, as indicated at 65219, the iME accesses the injection control SRAM 65130 to increment the head pointer, which then triggers a recalculation of the free space in the imFIFO 65099. That is, as the pointers to injection memory FIFOs work from the head address, thus, when the message is finished, the head pointer is updated to the next slot in the FIFO. When the FIFO end address is reached, the head pointer will wrap around to the FIFO start address. If the updated head address pointer is not equal to the tail of the injection memory FIFO then there is a further message descriptor in that FIFO that could be processed, i.e., the imFIFO is not empty and one or more message descriptors remain to be fetched. Then, the ICSRAM will request the next descriptor read via the Xbar interface master, and the process returns to 65204. Otherwise, if the head pointer is equal to the tail, the FIFO is empty.

As mentioned, the injection side 65100A of the Messaging Unit supports any byte alignment for data reads. The correct data alignment is performed when data are read out of the network reception FIFOs, i.e., alignment logic for injection MU is located in the network device. The packet size will be the value specified in the descriptor, except for the last packet of a message. MU adjusts the size of the last packet of a message to the smallest size to hold the remaining part of the message data. For example, when user injects a 1025B message descriptor whose packet size is 16 chunks=512B, the MU will send this message using two 512B packets and one 32B packet. The 32B packet is the last packet and only 1B in the 32B payload is valid.

As additional examples: for a 10B message with a specified packet size=16 (512B), the MU will send one 32B packet, only 10B in the 32B data is valid. For a 0B message with a specified packet size=anything, the MU will send one 0B packet. For a 260B message with a specified packet size=8 (256B), the MU will send one 256B packet and one 32B packet. Only 4B in the last 32B packet data are valid.

In operation, the iMEs/rMEs further decide priority for payload read/write from/to the memory system based on the virtual channel (VC) of the message. Certain system VCs (e.g., "system" and "system collective") will receive the highest priority. Other VCs (e.g., high priority and usercommworld) will receive the next highest priority. Other VCs will receive the lower priority. Software executing at the processors sets a VC correctly to get desired priority.

It is further understood that each iME can be selectively enabled or disabled using a DCR register. An iME 65110 is enabled when the corresponding DCR (control signal), e.g., bit, is set to 1, and disabled when the DCR bit is set to 0, for example. If this DCR bit is 0, the iME will stay in the idle state until the bit is changed to 1. If this bit is cleared while the corresponding iME is processing a packet, the iME will continue to operate until it finishes processing the current packet. Then it will return to the idle state until the enable bit is set again. When an iME is disabled, messages are not processed by it. Therefore, if a message specifies only this iME in the FIFO map, this message will not be processed and the imFIFO will be blocked until the iME is enabled again.

Reception

FIG. 5-1-6 depicts a high level diagram of the MU reception side 65100B for handling the packet reception in the MU 100. Reception operation includes receiving packets from the network and writing them into the memory system. Packets are received at network reception FIFOs 65190_a_, 65190_b_, . . . , 65190_n_. In one embodiment, the network reception FIFOs are associated with torus network, collective, and local copy operations. In one implementation, n=16, however, other implementations are possible. The memory system includes a set of reception memory FIFOs (rmFIFOs), such as rmFIFO 65199 shown in FIG. 5-1-6A, which are circular buffers used for storing packets received from the network. In one embodiment, there are sixteen (16) rmFIFOs assigned to each processor core, however, other implementations are possible.

As shown in FIG. 5-1-6, reception side MU device 65100B includes multiple rMEs (reception messaging engine units) 65120_a_,65120_b_, . . . , 65120_n_. In one embodiment, n=16, however, other implementations are possible. Generally, at the MU reception side 65100B, there is an rME for each network reception FIFO. Each of the rMEs contains a DMA reception control state machine 65121, byte alignment logic 65122, and control/status registers (not shown). In the rMEs 65120_a_,65120_b_, . . . , 65120_n_, the DMA reception control state machine 65121 detects that a paired network reception FIFO is non-empty, and if it is idle, it obtains the packet header, initiates reads to an SRAM, controls data transfer to the memory system, including an update of counter data located in the memory system, and it generates an interrupt, if selected. The Byte alignment logic 65122 ensures that the data to be written to the memory system are aligned, in one embodiment, on a 32B boundary for memory FIFO packets, or on any byte alignment specified, e.g., for put packets.

In one embodiment, storing of data to Xbar interface master is via 16-byte unit and must be 16-byte aligned. The requestor rME can mask some bytes, i.e., it can specify which bytes in the 16-byte data are actually stored. The role of alignment logic is to place received data in the appropriate position in a 16-byte data line. For example: an rME needs to write 20-byte received data to memory system address 35 to 54. In this case 2 write requests are necessary: 1) The alignment logic builds the first 16-byte write data. The $1^{st}$ to $13^{th}$ received bytes are placed in byte 3 to 15 in the first 16-byte data. Then the rME tells the Xbar interface master to store the 16-byte data to address 32, but not to store the byte 0, 1, and 2 in the 16-byte data. As a result, byte 3 to 15 in the 16-byte data (i.e. $1^{st}$ to $13^{th}$ received bytes) will be written to address 35 to 47 correctly. Then the alignment logic builds the second 16-byte write data. The $14^{th}$ to $20^{th}$ received bytes are placed in byte 0 to 6 in the second 16-byte data. Then the rME tell the Xbar interface master to store the 16-byte data to address 48, but not to store byte 7 to 15 in the 16-byte data. As a result, the $14^{th}$ to $20^{th}$ received bytes will be written to address 48 to 54 correctly.

Although not shown, control registers and SRAMs are provided that store part of control information when needed for packet reception. These status registers and SRAMs may include, but are not limited to, the following registers and SRAMs: Reception control SRAM (Memory mapped); Status registers (Memory mapped); and remote put control SRAM (Memory mapped).

In operation, when one of the network reception FIFOs receives a packet, the network device generates a signal 65159 for receipt at the paired rME 65120 to inform the paired rME that a packet is available. In one aspect, the rME reads the packet header from the network reception FIFO, and parses the header to identify the type of the packet received. There are three different types of packets: memory FIFO packets, direct put packets, and remote get packets. The type of packet is specified by bits in the packet header, as described below, and determines how the packets are processed.

In one aspect, for direct put packets, data from direct put packets processed by the reception side MU device 65100B are put in specified locations in memory system. Information is provided in the packet to inform the rME of where in memory system the packet data is to be written. Upon receiving a remote get packet, the MU device 65100B initiates sending of data from the receiving node to some other node.

Other elements of the reception side MU device 65100B include the Xbar interface slave 65176 for management. It accepts write and read requests from a processor and updates SRAM values such as reception control SRAM (RCSRAM) 65160 or remote put control SRAM (R-put SRAM) 65170 values. Further, the Xbar interface slave 65176 reads SRAM and returns read data to the Xbar. In one embodiment, Xbar interface slave 65176 processes all requests in-order of arrival. More particularly, the Xbar interface master 65125 generates a connection to the Xbar 60 to write data to the memory system. Xbar interface master 65125 also includes an arbiter unit 65157 for arbitrating between multiple rMEs (reception messaging engine units) 65120*a*, 65120*b*, . . . 65120*n* to access the Xbar interface master. In one aspect, as multiple rMEs compete for a Xbar interface master to store data, the Xbar interface master decides which rME to select. Various algorithm can be used for selecting an rME. In one embodiment, the Xbar interface master selects an rME based on the priority. The priority is decided based on the virtual channel of the packet the rME is receiving. (e.g., "system" and "system collective" have the highest priority, "high priority" and "usercommworld" have the next highest priority, and the others have the lowest priority). If there are multiple rMEs that have the same priority, one of them may be selected randomly.

As in the MU injection side of FIG. 5-1-3, the MU reception side also uses the three Xbar interface masters. In one embodiment, a cluster of five or six rMEs may be paired to a single Xbar interface master (there can be two or more clusters of five or six rMEs). In this embodiment, at most one rME per Xbar interface master may write on any given cycle for up to three simultaneous write operations. Note that more than three rMEs can be active processing packets at the same time, but on any given cycle only three can be writing to the switch.

The reception control SRAM 65160 is written to include pointers (start, size, head and tail) for rmFIFOs, and further, is mapped in the processor's memory address space. The start pointer points to the FIFO start address. The size defines the FIFO end address (i.e. FIFO end=start+size). The head pointer points to the first valid data in the FIFO, and the tail pointer points to the location just after the last valid data in the FIFO. The tail pointer is incremented as new data is appended to the FIFO, and the head pointer is incremented as new data is consumed from the FIFO. The head and tail pointers need to be wrapped around to the FIFO start address when they reach the FIFO end address. A reception control state machine 65163 arbitrates access to reception control SRAM (RCSRAM) between multiple rMEs and processor requests, and it updates reception memory FIFO pointers stored at the RCSRAM. As will be described in further detail below, R-Put SRAM 65170 includes control information for put packets (base address for data, or for a counter). This R-Put SRAM is mapped in the memory address space. R-Put control FSM 65175 arbitrates access to R-put SRAM between multiple rMEs and processor requests. In one embodiment, the arbiter mechanism employed alternately grants an rME and the processor an access to the R-put SRAM. If there are multiple rMEs requesting for access, the arbiter selects one of them randomly. There is no priority difference among rMEs for this arbitration.

FIG. 5-1-7 depicts a methodology 65300 for describing the operation of an rME 65120*a*, 65120*b*, . . . 65120*n*. As shown in FIG. 5-1-7, at 65303, the rME is idle waiting for reception of a new packet in a network reception FIFO 65190*a*, 65190*b*, . . . , 65190*n*. Then, at 65305, having received a packet, the header is read and parsed by the respective rME to determine where the packet is to be stored. At 65307, the type of packet is determined so subsequent packet processing can proceed accordingly. Thus, for example, in the case of memory FIFO packets, processing proceeds at the rME at step 65310 et seq.; in the case of direct put packets, processing proceeds at the rME at step 65320 et seq.; and, for the case of remote get packets, processing proceeds at the rME at step 65330 et seq.

Figures 0, 5:
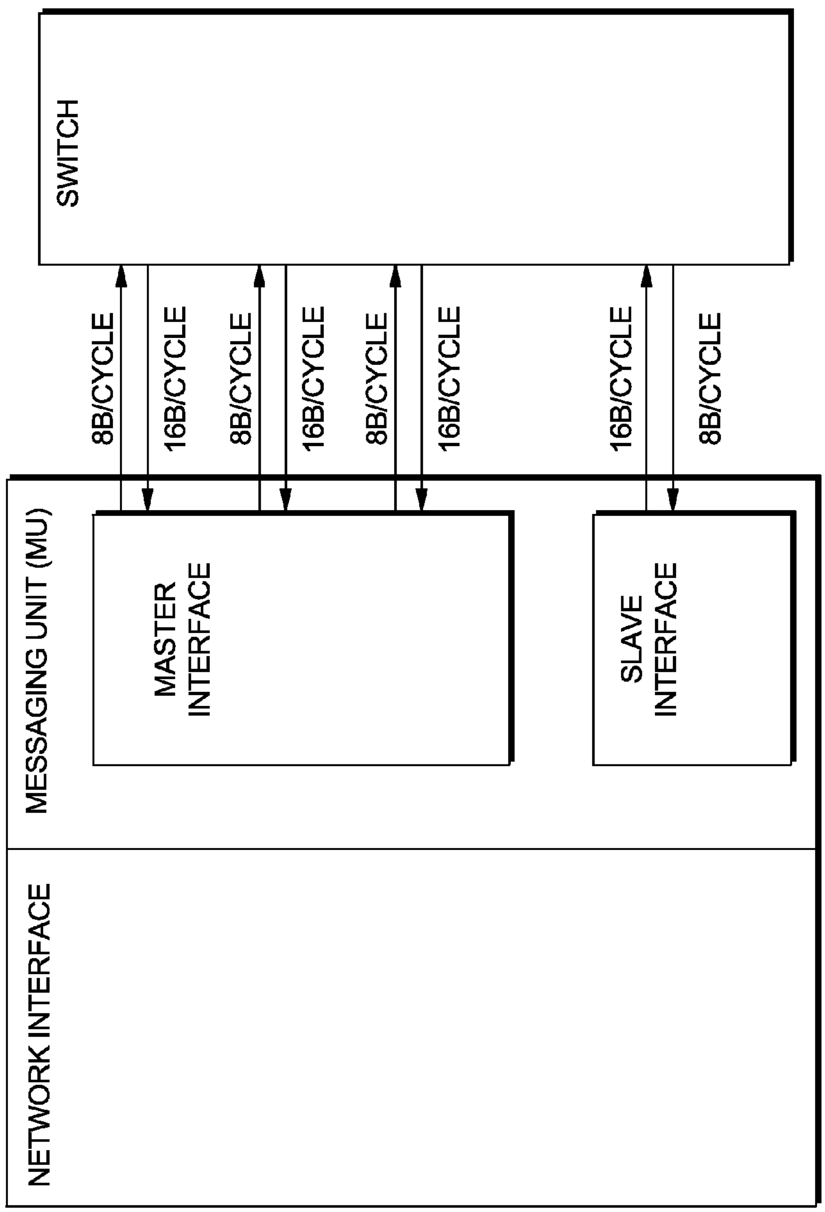
Figures 1, 2, 5:
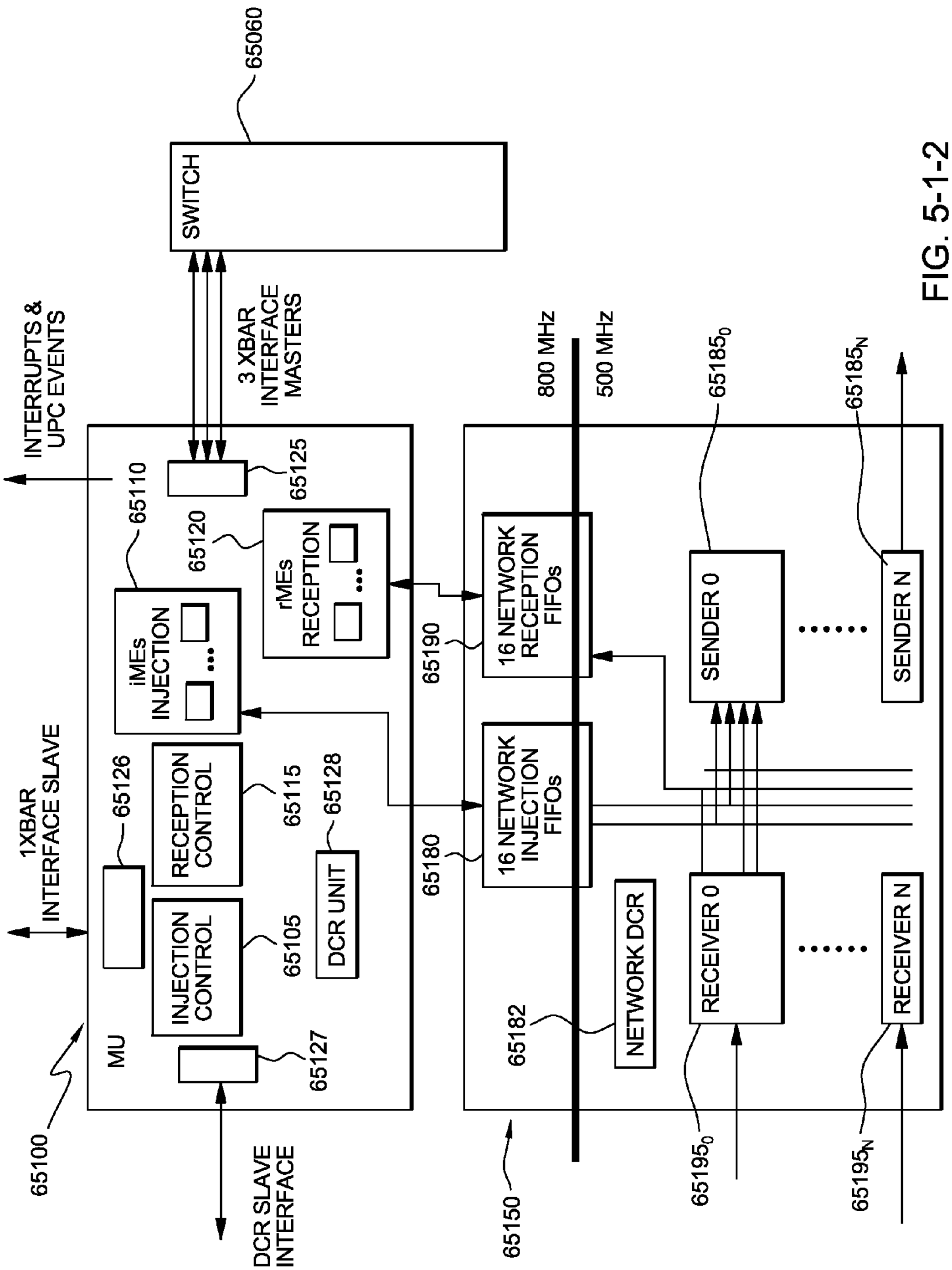
Figures 1, 3, 5:
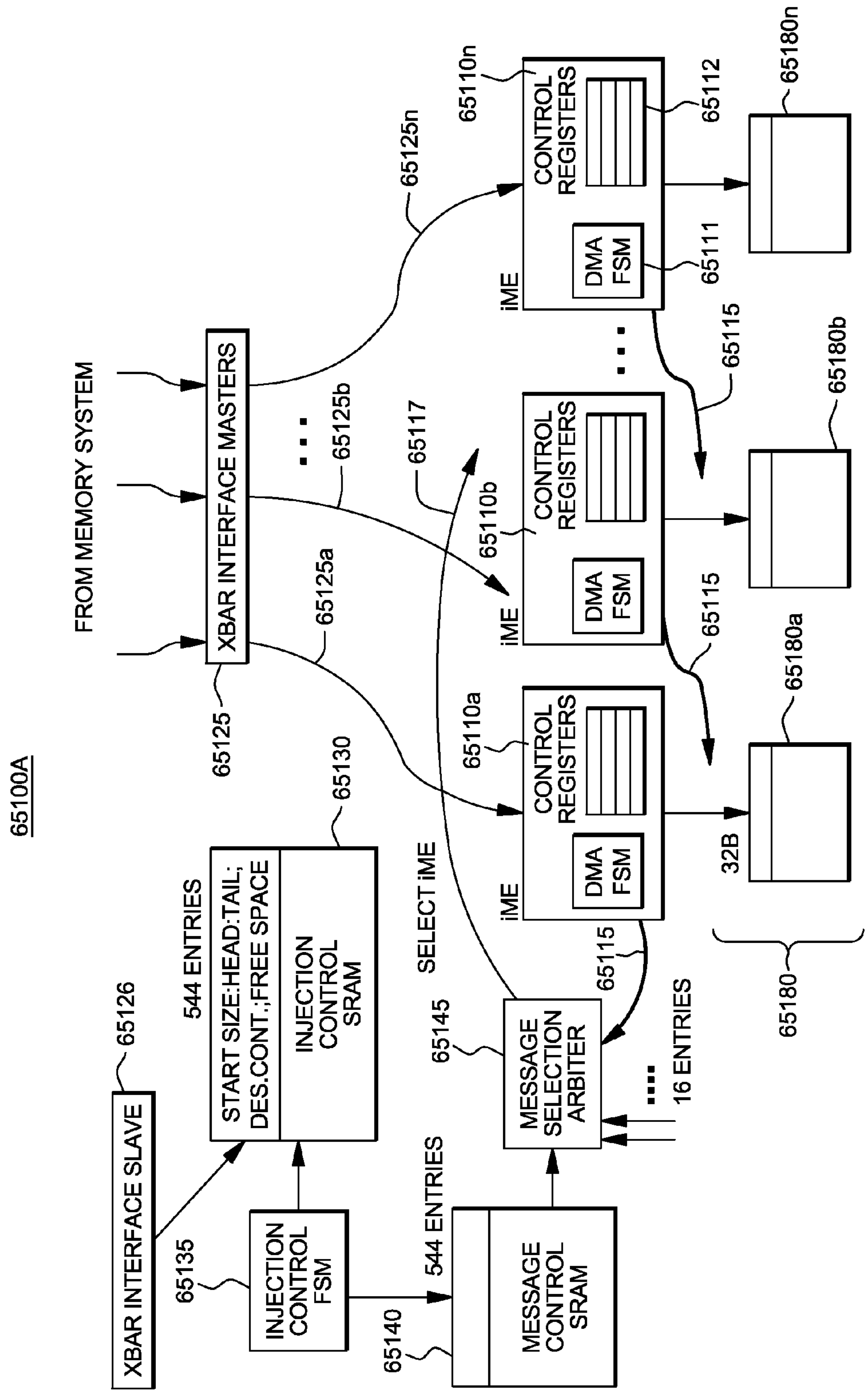
Figures 1, 3A, 5:
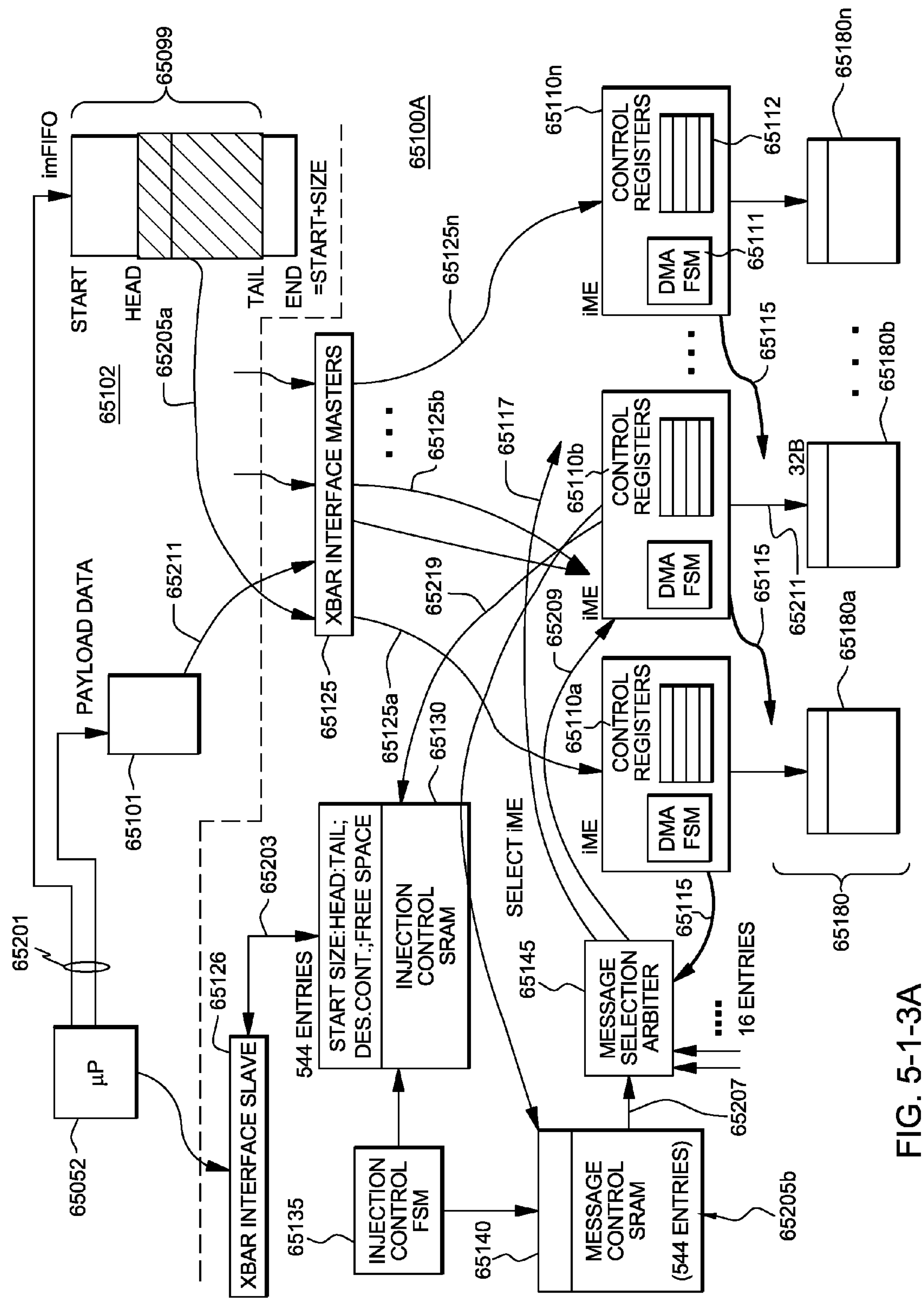
Figures 1, 4, 5:
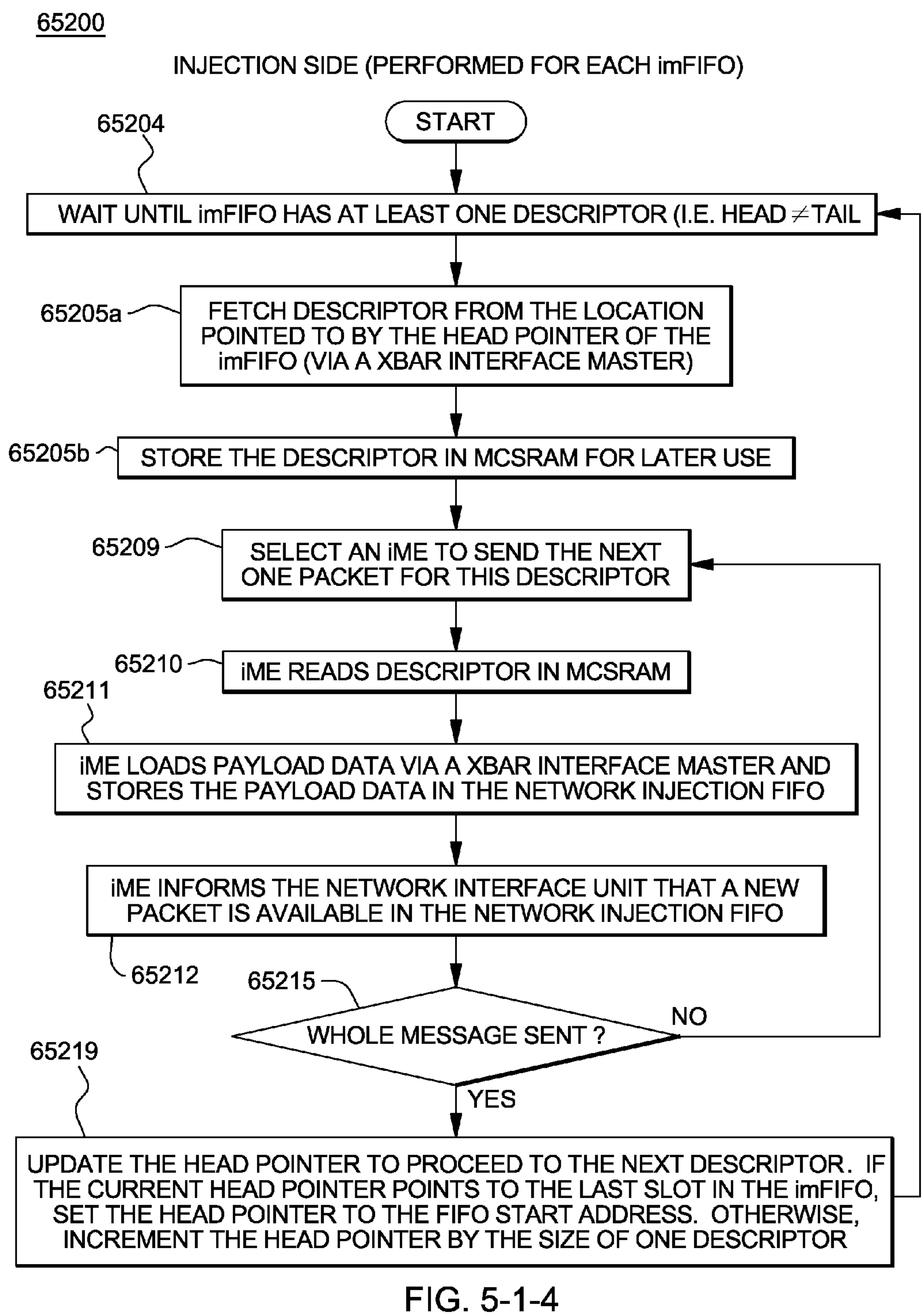
Figures 1, 5:
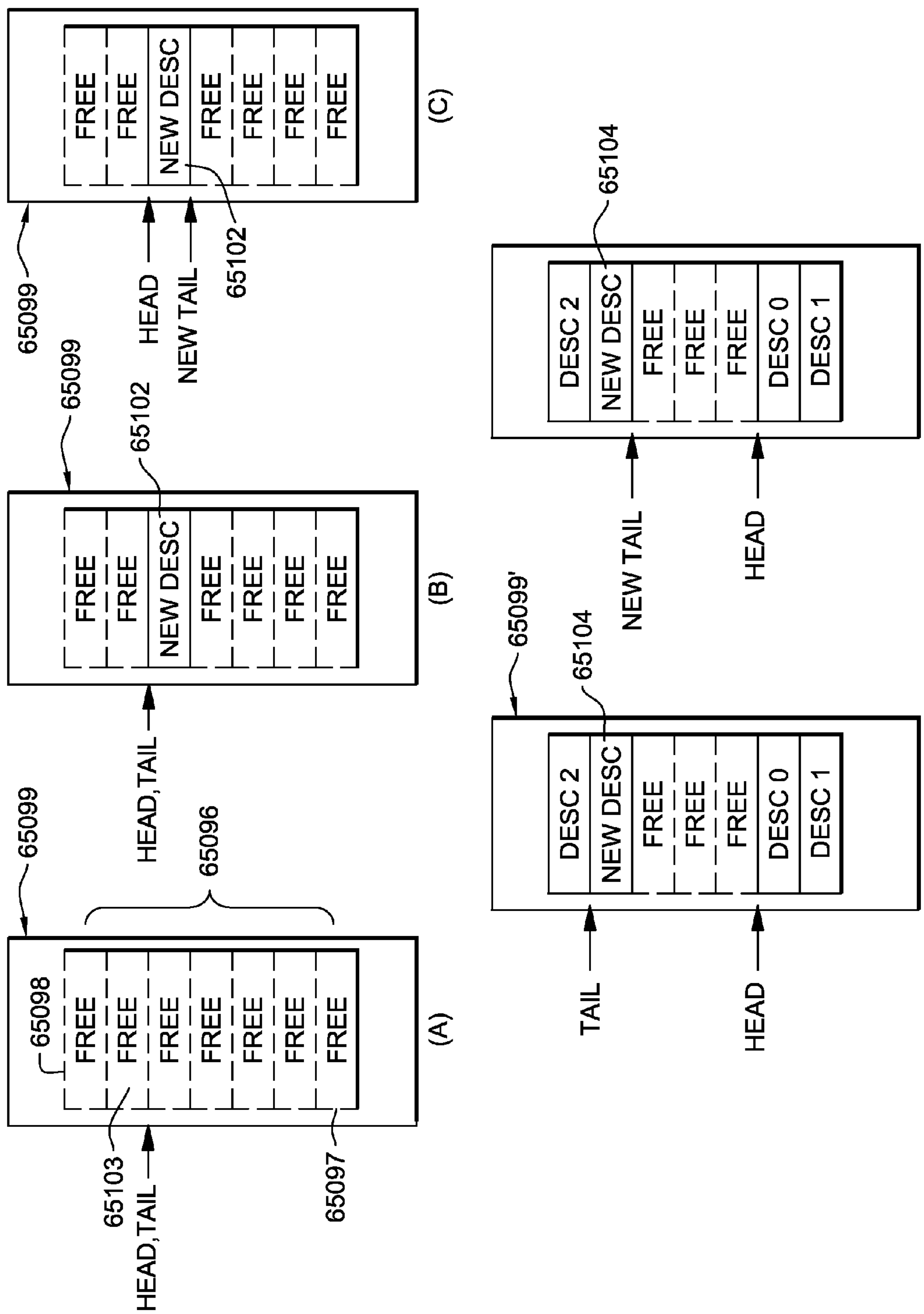
Figures 1, 5, 6:
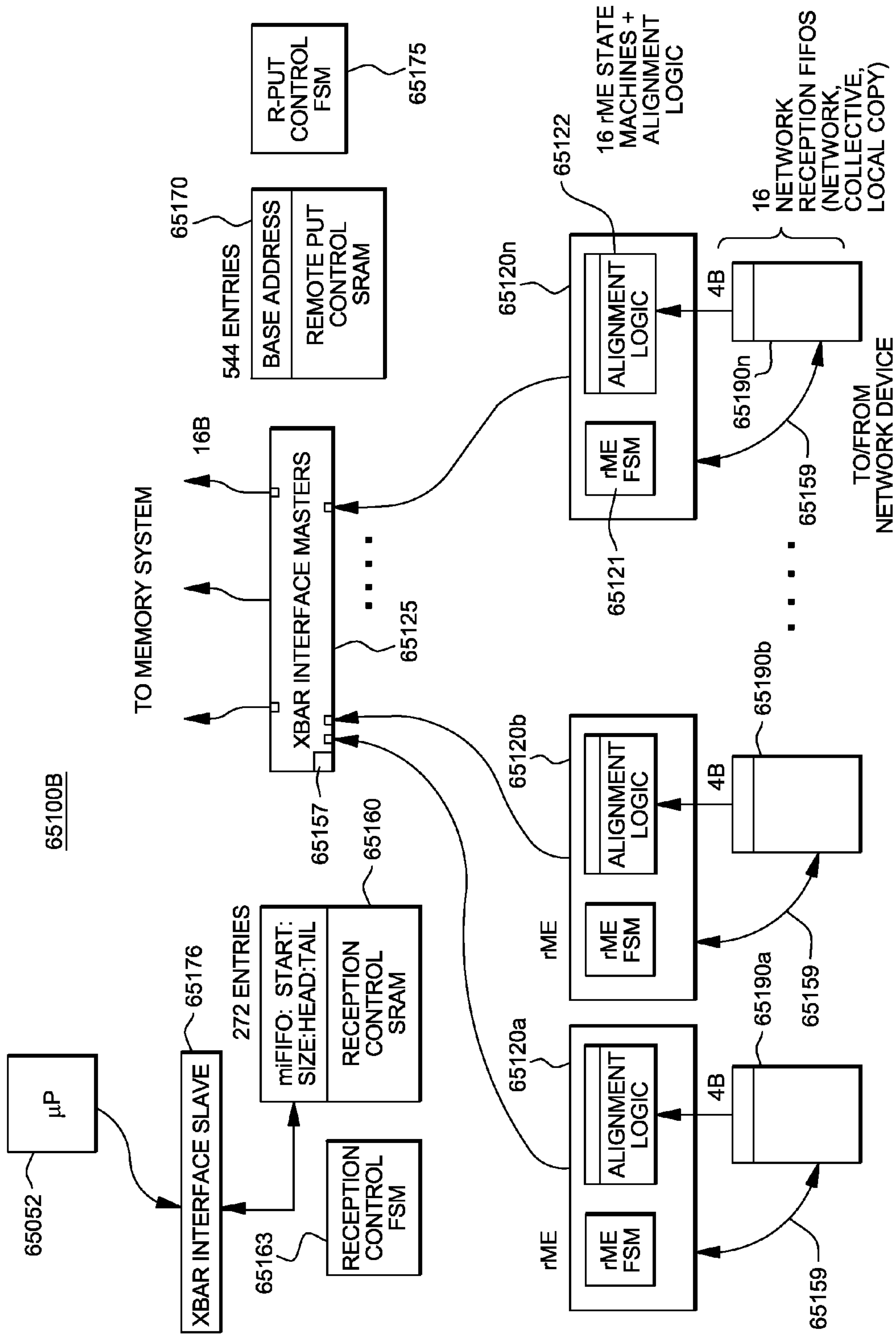
Figures 1, 5, 6A:
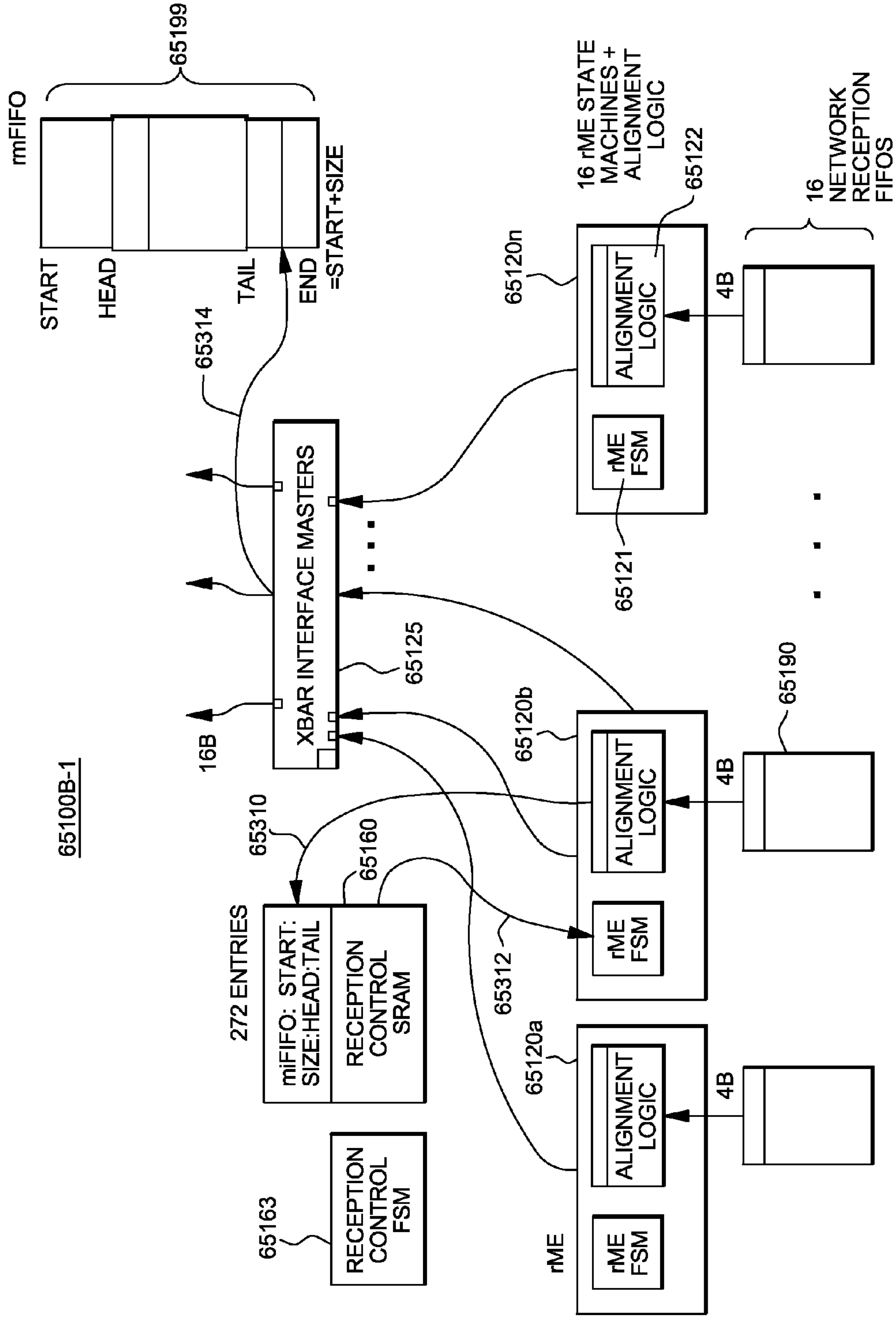

In the case of memory FIFO packet processing, in one embodiment, memory FIFO packets include a reception memory FIFO ID field in the packet header that specifies the destination rmFIFO in memory system. The rME of the MU device 65100B parses the received packet header to obtain the location of the destination rmFIFO. As shown in FIG. 5-1-6A depicting operation of the MU device 65100B-1 for processing received memory FIFO packets, these memory FIFO packets are to be copied into the rmFIFOs 65199 identified by the memory FIFO ID. Messages processed by an rME can be moved to any rmFIFO. Particularly, as shown in FIG. 5-1-6A and FIG. 5-1-7 at step 65310, the rME initiates a read of the reception control SRAM 65160 for that identified memory FIFO ID, and, based on that ID, a pointer to the tail of the corresponding rmFIFO in memory system (rmFIFO tail) is read from the reception control SRAM at 65310. Then, the rME writes the received packet, via one of the Xbar interface masters 65125, to the rmFIFO, e.g., in 16B write chunks. In one embodiment, the rME moves both the received packet header and the payload into the memory system location starting at the tail pointer. For example, as shown at 65312, the packet header of the received memory FIFO packet is written, via the Xbar interface master, to the location after the tail in the rmFIFO 65199 and, at 65314, the packet payload is read and stored in the rmFIFO after the header. Upon completing the copy of the packet to the memory system, the rME updates the tail pointer and can optionally raise an interrupt, if the interrupt is enabled for that rmFIFO and an interrupt bit in the packet header is set. In one embodiment, the tail is updated for number of bytes in the packets atomically. That is, as shown at 65318, the tail pointer of the rmFIFO is increased to include the new packet, and the new tail pointer is written to the RCSRAM 65160. When the tail pointer reaches the end of FIFO as a result of the increment, it will be wrapped around to the FIFO start. Thus, for memory FIFO packets, the rmFIFOs can be thought of as a simple producer-consumer queue: rMEs are the producers who move packets from network reception FIFOs into the memory system, and the processor cores are the consumers who use them. The consumer (processor core) advances a header pointer, and the producer (rME) advances a tail pointer.

In one embodiment, as described in greater detail herein, to allow simultaneous usage of the same rmFIFO by multiple rMEs, each rmFIFO has advance tail, committed tail, and two counters for advance tail ID and committed tail ID. The rME copies packets to the memory system location starting at the advance tail, and gets advance tail ID. After the packet is copied to the memory system, the rME checks the committed tail ID to determine if all previously received data for that rmFIFO are copied. If this is the case, the rME updates committed tail, and committed tail ID, otherwise it waits. An rME implements logic to ensure that all store requests for header and payload have been accepted by the Xbar before updating committed tail (and optionally issuing interrupt).

Figures 1, 5, 6B:
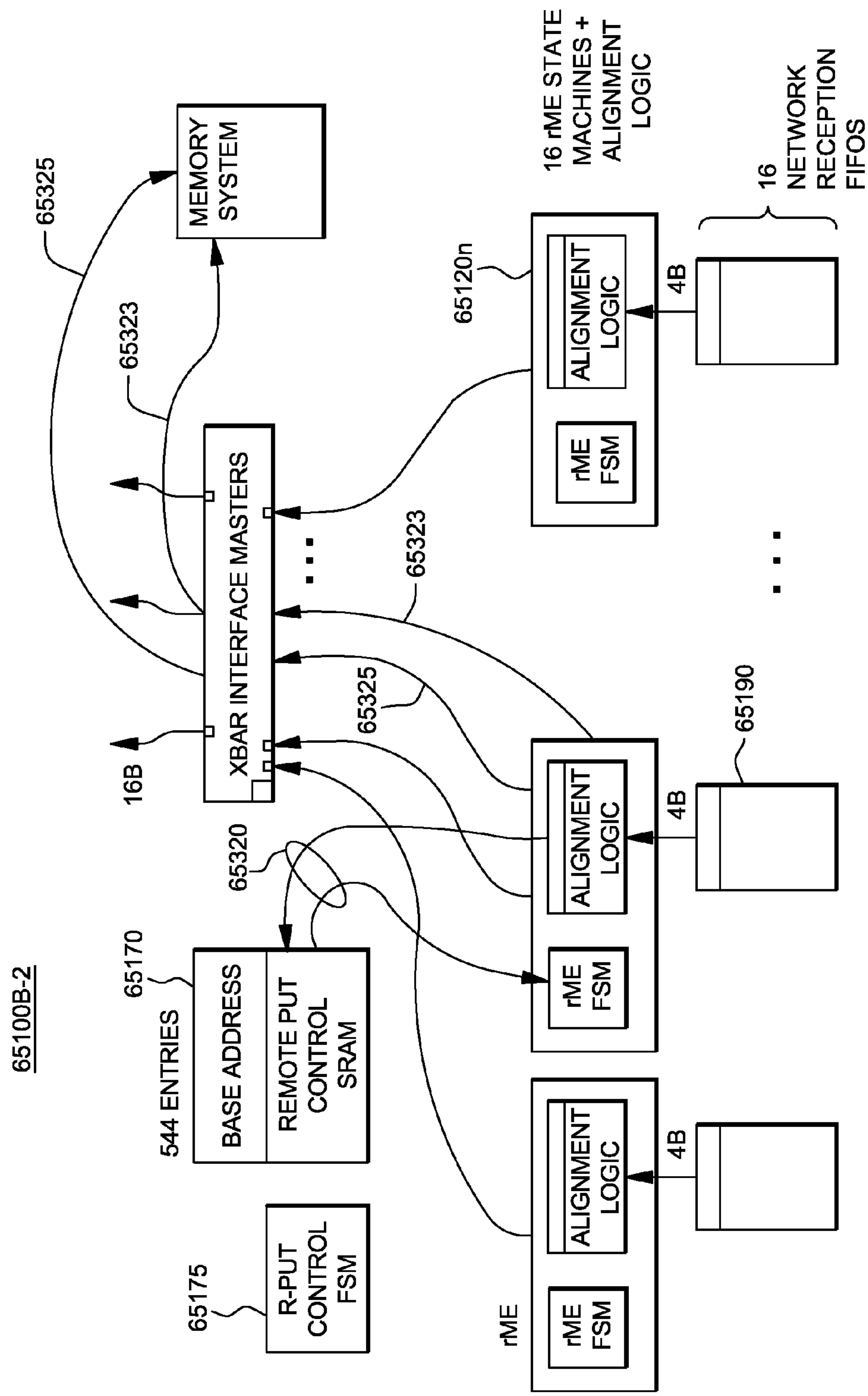

In the case of direct put packet processing, in one embodiment, the MU device 65100B further initiates putting data in specified location in the memory system. Direct put packets include in their headers a data ID field and a counter ID field—both used to index the R-put SRAM 65170; however, the header includes other information such as, for example, a number of valid bytes, a data offset value, and counter offset value. The rME of the MU device 65100B parses the header of the received direct put packet to obtain the data ID field and a counter ID field values. Particularly, as shown in FIG. 5-1-6B depicting operation of the MU device 65100B-2 for processing received direct put packets and, the method of FIG. 5-1-7 at step 65320, the rME initiates a read of the R-put SRAM 65170 and, based on data ID field and a counter ID field values, indexes and reads out a respective data base address and a counter base address. Thus, for example, a data base address is read from the R-put SRAM 65170, in one embodiment, and the rME calculates an address in the memory system where the packet data is to be stored. In one embodiment, the address for packet storage is calculated according to the following:

Base address+data offset=address for the packet

In one embodiment, the data offset is stored in the packet header field "Put Offset" 65541 as shown in FIG. 5-1-10. This is done on the injection side at the sender node. The offset value for the first packet is specified in the header field "Put Offset" 65541 in the descriptor. MU automatically updates this offset value during injection. For example, suppose offset value 10000 is specified in a message descriptor, and three 512-byte packets are sent for this message. The first packet header will have offset=10000, and the next packet header will have offset=10512, and the last packet header will have offset=11024. In this way each packet is given a correct displacement from the starting address of the message. Thus each packet is stored to the correct location.

Likewise, a counter base address is read from the R-put SRAM 65170, in one embodiment, and the rME calculates another address in the memory system where a counter is located. The value of the counter is to be updated by the rME. In one embodiment, the address for counter storage is calculated according to the following:

Base address+counter offset=address for the counter

In one embodiment, the counter offset value is stored in header field "Counter Offset" 65542, FIG. 5-1-10. This value is directly copied from the packet header field in the descriptor at the sender node. Unlike the data offset, all the packets from the same message will have the same counter offset. This means all the packets will correctly access the same counter address.

In one embodiment, the rME moves the packet payload from a network reception FIFO 65190 into the memory system location calculated for the packet. For example, as shown at 65323, the rME reads the packet payload and, via the Xbar interface master, writes the payload contents to the memory system specified at the calculated address, e.g., in 16B chunks or other byte sizes. Additionally, as shown at 65325, the rME atomically updates a byte counter in the memory system.

The alignment logic implemented at each rME supports any alignment of data for direct put packets. FIG. 5-1-13 depicts a flow chart of a method for performing data alignment for put packets. The alignment logic is necessary because of processing restrictions when rME stores data via Xbar interface master: 1) rME can store data in 16-byte unit and the destination is to be 16-byte aligned; 2) If rME wants to write a subset of a 16-byte chunk, it needs to set Byte Enable (BE) signals correctly. There are 16 bits of byte enable signals to control whether each byte in a 16-byte write data line is stored to the memory system. When rME wants to store all 16 bytes, it needs to assert all the 16 byte enable (BE) bits. Because of this, rME needs to place each received byte at a particular position in a 16-byte line. Thus, in one embodiment, a write data bus provides multiple bytes, and byte enable signals control which bytes on the bus are actually written to the memory system.

As shown in FIG. 5-1-13 depicting a flowchart showing byte alignment method 65700 according to an example embodiment, a first step 65704 includes an rME waiting for a new packet to be received and, upon arrival, rME provides number of valid bytes in the payload and destination address in the memory system. Then, the following variables are initialized including: N=number of valid bytes, A=destination address, and, R=A mod 16 (i.e. position in a 16B chunk), BUF(0 to 15): buffer to hold 16B write data line, each element is a byte, and BE(0 to 15): buffer to hold byte enable, (each element is a bit). Then, at 65709, a determination is made as to whether the whole payload data fits in one 16B write data line, e.g., by performing a check of whether R+N<16. If determined that the payload data could fit, then the process proceeds to 65710 where the rME performs storing the one 16B line; and, copying the N bytes payload data to BUF(R to R+N−1). Letting (Byte Enable) BE(R to R+N−1)=1 and others=0, the rME requests the Xbar interface master to store BUF to address A-R, with byte enable BE. Then the process returns to step 65704 to wait for the next packet. Otherwise, if it is determined at step 65709 that the payload data could not fit in one 16B write data line, then the process proceeds to 65715 to perform storing the first 16B line and copying a first 16-R payload bytes to BUF (R to 15) and letting BE (R to 15)=1 and others=0. Then, the rME requests Xbar interface master to store BUF to address A−R, with byte enable BE and letting A=A−R+16, and N=N+R−16. Then the process proceeds to step 65717 where a check is made to determine whether the next 16B line is the last line (i.e., N<16). If at 65717, it is determined that the next 16B line is the last line, then the rME performs storing the last 16B line and copying the last N bytes to BUF (0 to N−1); and letting BE(0 to N−1)=1 and others=0 prior to requesting Xbar interface master to store BUF to address A, with byte enable BE. Then the process returns to step 65704 to wait for the next packet arrived. Otherwise, if it is determined at step 65717 that the next 16B line is not the last line, then the process proceeds to 65725 where the rME performs: storing the next 16B line and copying the next 16 payload bytes to BUF (0 to 15) and letting BE(0 to 15)=1 (i.e. all bytes valid) before requesting the Xbar interface master to store BUF to address A, with byte enable BE, Let A=A+16, N=N−16. The process then returns to 65717 to make the check of whether the remaining data of the received packet payload does fit in the last line and perform the processing of 65725 if the last line is not being written. Only until the last line of the received packet payload is written to 16B line are steps 65717 and 65725 repeated.

Utilizing notation in FIG. 5-1-13, a packet payload storage alignment example is provided with respect to FIGS. 5-1-14A-5-1-14E. As shown in FIG. 5-1-14A, twenty (20) bytes of valid payload at network reception FIFO 65190 are to be stored by the rME device to address 30. A goal is thus to store bytes D0, . . . , D19 to address 30, . . . , 49. The rME logic implemented thus initializes variables N=number of valid bytes=20, A=destination address=30 and R=A mod 16=14. Given these values, it is judged whether the data can fit in one 16B line, i.e., is R+N<16. As the valid bytes will not fit in one line, the first 16B line is stored by copying the first 16−R=2 bytes (i.e. D0, D1) to BUF (R to 15), i.e., BUF (14 to 15) then assigning BE (14 to 15)=1 and others=0 as depicted in FIG. 5-1-14B.

Then, the rME requests the Xbar interface master to store BUF to address A-R=16 (16B-aligned) resulting in byte enable (BE)=000000000000011. As a result, D0 and D1 is stored to correct address 30 and 31 and the variables are re-calculated as: A=A-R+16=32, N=N+R−16=18. Then, a further check is performed to determine if the next 16B line is the last N<16 and in this example, the determination would be that the next line is not the last line. Thus, the next line is stored, e.g., by copying the next 16 bytes (D2, . . . , D17) to BUF(0 to 15) and letting BE(0 to 15)=1 as depicted in FIG. 5-1-14C. Then, the rME requests the Xbar interface master to store BUF to address 32, and byte enable (BE)=1111111111111111. As a result, D2, . . . , D17 are stored to correct address 32 to 47, and the variables are re-calculated as: A=A+16=48, N=N−16=2 resulting in N=2, A=48 and R=14. Then, continuing, a determination is made as to whether the next 16B line is the last, i.e., N<16. In this example, the next line is the last line. Thus, the rME initiates storing the last line and copying the last N=2 bytes (i.e. D18, D19) to BUF (0 to N−1) i.e. BUF (0 to 1) then letting BE(0 to 1)=1 and others=0 as depicted in FIG. 5-1-14D. Then, the rME requests the Xbar interface master to store BUF to address A=48 resulting in byte enable (BE)=1100000000000000. Thus, as a result, payload bytes D18 and D19 are stored to address 48 and 49. Now all valid data D0, . . . , D19 have been correctly stored to address 30 . . . 49.

Furthermore, an error correcting code (ECC) capability is provided and an ECC is calculated for each 16B data sent to the Xbar interface master and on byte enables.

In a further aspect of direct put packets, multiple rMEs can receive and process packets belonging to the same message in parallel. Multiple rMEs can also receive and process packets belonging to different messages in parallel.

Further, it is understood that a processor core at the compute node has previously performed operations including: the writing of data into the remote put control SRAM 65170; and, a polling of the specified byte counter in the memory system until it is updated to a value that indicates message completion.

In the case of remote get packet processing, in one embodiment, the MU device 65100B receives remote get packets that include, in their headers, an injection memory FIFO ID. The imFIFO ID is used to index the ICSRAM 65130. As shown in the MU reception side 65100B-3 of FIG. 5-1-6C and the flow method of FIG. 5-1-7, at 65330 the imFIFO ID indexes ICSRAM to read a tail pointer (address) to the corresponding imFIFO location. This tail pointer is the destination address for that packet. Payload of remote get packet includes one or more descriptors, and these descriptors are appended to the imFIFO by the MU. Then the appended descriptors are processed by the MU injection side. In operation, if multiple reception rMEs try to access the same imFIFO simultaneously, the MU detects conflict between rMEs. Each rME informs the ICSRAM which imFIFO (if any) it is working on. Based on this information, ICSRAM rejects rMEs requesting an imFIFO on which another rME is working.

Further, at 65333, via the Xbar interface master, the rME writes descriptors from the packet payload to the memory system location in the imFIFO pointed to by the corresponding tail pointer read from the ICSRAM. In one example, payload data at the network reception FIFO 65190 is written in 16B chunks or other byte denominations. Then, at 65335, the rME updates the imFIFO tail pointer in the injection control SRAM 65130 so that the imFIFO includes the stored descriptors. The Byte alignment logic 65122 implemented at the rME ensures that the data to be written to the memory system are aligned, in one embodiment, on a 32B boundary for memory FIFO packets. Further in one embodiment, error correction code is calculated for each 16B data sent to the Xbar and on byte enables.

Each rME can be selectively enabled or disabled using a DCR register. For example, an rME is enabled when the corresponding DCR bit is 1 at the DCR register, and disabled when it is 0. If this DCR bit is 0, the rME will stay in the idle state or another wait state until the bit is changed to 1. The software executing on a processor at the node sets a DCR bit. The DCR bits are physically connected to the rMEs via a "backdoor" access mechanism (not shown). Thus, the register value propagates to rME immediately when it is updated.

If this DCR bit is cleared while the corresponding rME is processing a packet, the rME will continue to operate until it reaches either the idle state or a wait state. Then it will stay in the idle or wait state until the enable bit is set again. When an rME is disabled, even if there are some available packets in the network reception FIFO, the rME will not receive packets from the network reception FIFO. Therefore, all messages received by the network reception FIFO will be blocked until the corresponding rME is enabled again.

When an rME can not store a received packet because the target imFIFO or rmFIFO is full, the rME will poll the FIFO until it has enough free space. More particularly, the rME accesses ICSRAM and when it finds the imFIFO is full, ICSRAM communicates to rME that it is full and can't accept the request. Then rME waits for a while to access the ICSRAM again. This process is repeated until the imFIFO becomes not-full and the rME's request is accepted by ICSRAM. The process is similar when rME accesses reception control SRAM but the rmFIFO is full.

In one aspect, a DCR interrupt will be issued to report the FIFO full condition to the processors on the chip. Upon receiving this interrupt, the software takes action to make free space for the imFIFO/rmFIFO. (e.g. increasing size, draining packets from rmFIFO, etc.). Software running on the processor on the chip manages the FIFO and makes enough space so that the rME can store the pending packet. Software can freeze rMEs by writing DCR bits to enable/disable rMEs so that it can safely update FIFO pointers.

Packet Header and Routing

In one embodiment, a packet size may range from 32 to 544 bytes, in increments of 32 bytes. In one example, the first 32 bytes constitute a packet header for an example network packet. As shown in FIG. 5-1-9, the packet header 65500 includes a first network header portion 65501 (e.g., 12 bytes) as shown in the example network header packet depicted as shown in FIG. 5-1-9A or a second network header portion 65501' as shown in the example network header packet depicted as shown in FIG. 5-1-9B. This header portion may be followed by a message unit header 65502 (e.g., 20 bytes) as shown in FIG. 5-1-9. The header is then followed by 0 to 16 payload "chunks", where each chunk contains 32B (bytes) for example. There are two types of network headers: point-to-point and collective. Many of the fields in these two headers are common as will be described herein below.

The first network header portion 65501 as shown in FIG. 5-1-9A, depicts a first field 65510 identifying the type of packet (e.g., point-to-point and collective packet) which is normally a value set by the software executing at a node. A second field 65511 provides a series of hint bits, e.g., 8 bits, with 1 bit representing a particular direction in which the packet is to be routed (2 bits/dimension), e.g., directions A−, A+, B−, B+, C−, C+, D−, D+ for a 4-D torus. The next field 65512 includes two further hint bits identifying the "E" dimension for packet routing in a 5-D Torus implementation. Packet header field 65512 further includes a bit indicating whether an interrupt bit has been set by the message unit, depending on a bit in the descriptor. In one embodiment, this bit is set for the last packet of a message (otherwise, it is set to 0, for example). Other bits indicated in Packet header field 65512 may include: a route to I/O node bit, return from I/O node, a "use torus" port bit(s), use I/O port bit(s), a dynamic bit, and, a deposit bit.

A further field 65513 includes class routes must be defined so that the packet could travel along appropriate links. For example, bits indicated in Packet header field 65513 may include: virtual channel bit (e.g., which bit may have a value to indicate one of the following classes: dynamic, deterministic (escape); high priority; system; user commworld; subcommincator, or, system collective); zone routing id bit(s); and, "stay on bubble" bit.

A further field 65514 includes destination addresses associated with the particular dimension A-E, for example. A further field 65515 includes a value indicating the number (e.g., 0 to 16) of 32 byte data payload chunks added to header, i.e., payload sizes, for each of the memory FIFO packets, put, get or paced-get packets. Other packet header fields indicated as header field 65516 include data bits to indicate the packet alignment (set by MU), a number of valid bytes in payload (e.g., the MU informs the network which is the valid data of those bytes, as set by MU), and, a number of 4B words, for example, that indicate amount of words to skip for injection checksum (set by software). That is, while message payload requests can be issued for 32B, 64B and 128B chunks, data comes back as 32B units via the Xbar interface master, and a message may start at a middle of one of those 32B units. The iME keeps track of this and writes, in the packet header, the alignment that is off-set within the first 32B chunk at which the message starts. Thus, this offset will indicate the portion of the chunk that is to be ignored, and the network device will only parse out the useful portion of the chunk for processing. In this manner, the logic implemented at the network logic can figure out which bytes out of the 32B are the correct ones for the new message. The MU knows how long the packet is (message size or length), and from the alignment and the valid bytes, instructs the Network Interface Unit where to start and end the data injection, i.e., from the 32 Byte payload chunk being transferred to network device for injection. For data reads, the alignment logic located in the network device supports any byte alignment.

As shown in FIG. 5-1-9B, a network header portion 65501' depicts a first field 65520 identifying a collective packet, which is normally a value set by the software executing at a node. A second field 65521 provides a series of bits including the collective Opcode indicating the collective operation to be performed. Such collective operations include, for example: and, or, xor, unsigned add, unsigned min, unsigned max, signed add, signed min, signed max, floating point add, floating point minimum, and floating point maximum. It is understood that, in one embodiment, a word length is 8 bytes for floating point operations. A collective word length, in one embodiment, is computed according to B=4*2^n bytes where n is the collective word length exponent. Thus additional bits indicate the collective word length exponent. For example, for floating point operations n=1 (B=8). In one embodiment, the Opcode and word length are ignored for broadcast operation. The next field 65522 includes further bits including an interrupt bit that set by the message unit, depending on a bit in the descriptor. It is only set for the last packet of a message (else 0). Packet header field 65523 further indicates class routes defined so that the packet could travel along appropriate links. These class routes specified, include, for example, virtual channel (VC) (having values indicating dynamic, deterministic (escape), high priority, system, user commworld, user subcommunicator, and, system collective. Further bits indicate collective type routes including (broadcast, reduce, all-reduce, and reserved/possible point-point over collective route). As in the network packet header a field 65524 includes destination addresses associated with the particular dimension A-E, for example, in a 5-D torus network configuration. In one embodiment, for collective operations, a destination address is used for reduction. A further payload size field 65525 includes a value indicating the number of 32 byte chunks added to header, e.g., payload sizes range from 0B to 512B (32B*16), for example, for each of the memory FIFO packets, put, get or paced-get packets. Another packet header fields indicated as header field 65526 include data bits to indicate the packet alignment (set by MU), a number of valid bytes in payload (e.g., 0 means 512, as set by MU), and, a number of 4 byte words, for example, that indicate amount of words to skip for injection checksum (set by software).

The payload size field specifies number of 32 bytes chunks. Thus payload size is 0B to 512B (32B*16).

Remaining bytes of the each network packet or collective packet header of FIGS. 5-1-9A, 5-1-9B are depicted in FIG. 5-1-10 for each of the memory FIFO, direct put and remote get packets. For the memory FIFO packet header 65530, there is provided a reception memory FIFO ID processed by the MU 65100B-1 as described herein in connection with FIG. 5-1-6A. In addition to rmFIFO ID, there is specified the Put Offset value. The Initial value of Put Offset is specified, in one embodiment, by software and updated for each packet by the hardware.

For the case of direct put packets, the direct put packet header 65540 includes bits specifying: a Rec. Payload Base Address ID, Put Offset and a reception Counter ID (e.g., set by software), a number of Valid Bytes in Packet Payload (specifying how many bytes in the payload are actually valid—for example, when the packet has 2 chunks (=32B*2=64B) payload but the number of valid bytes is 35, the first 35 bytes out of 64 bytes payload data is valid; thus, MU reception logic will store only first 35 bytes to the memory system.); and Counter Offset value (e.g., set by software), each such as processed by MU 65100B-2 as described herein in connection with FIG. 5-1-6B.

Figures 1, 5, 6C:
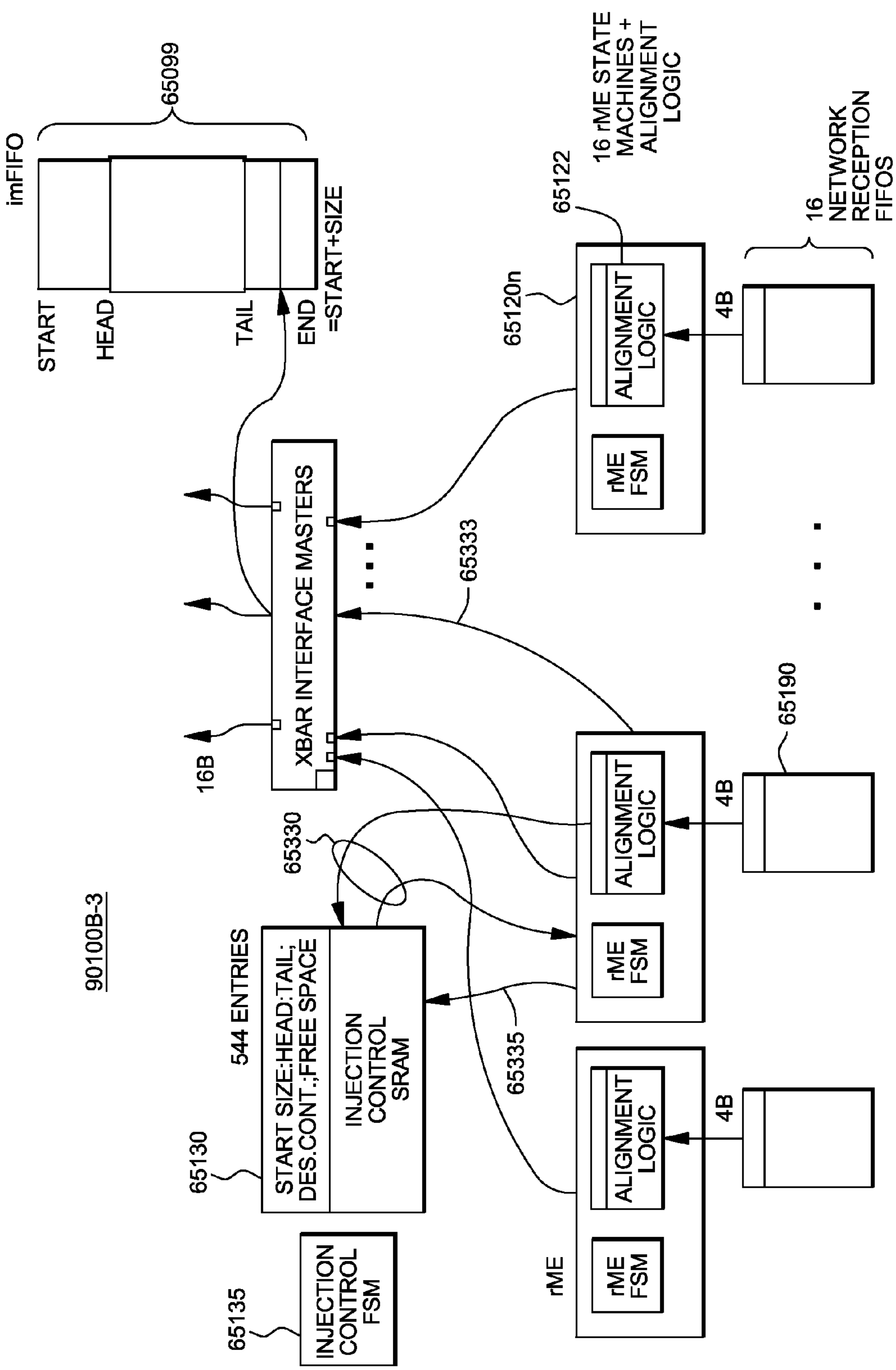
Figures 1, 5, 7:
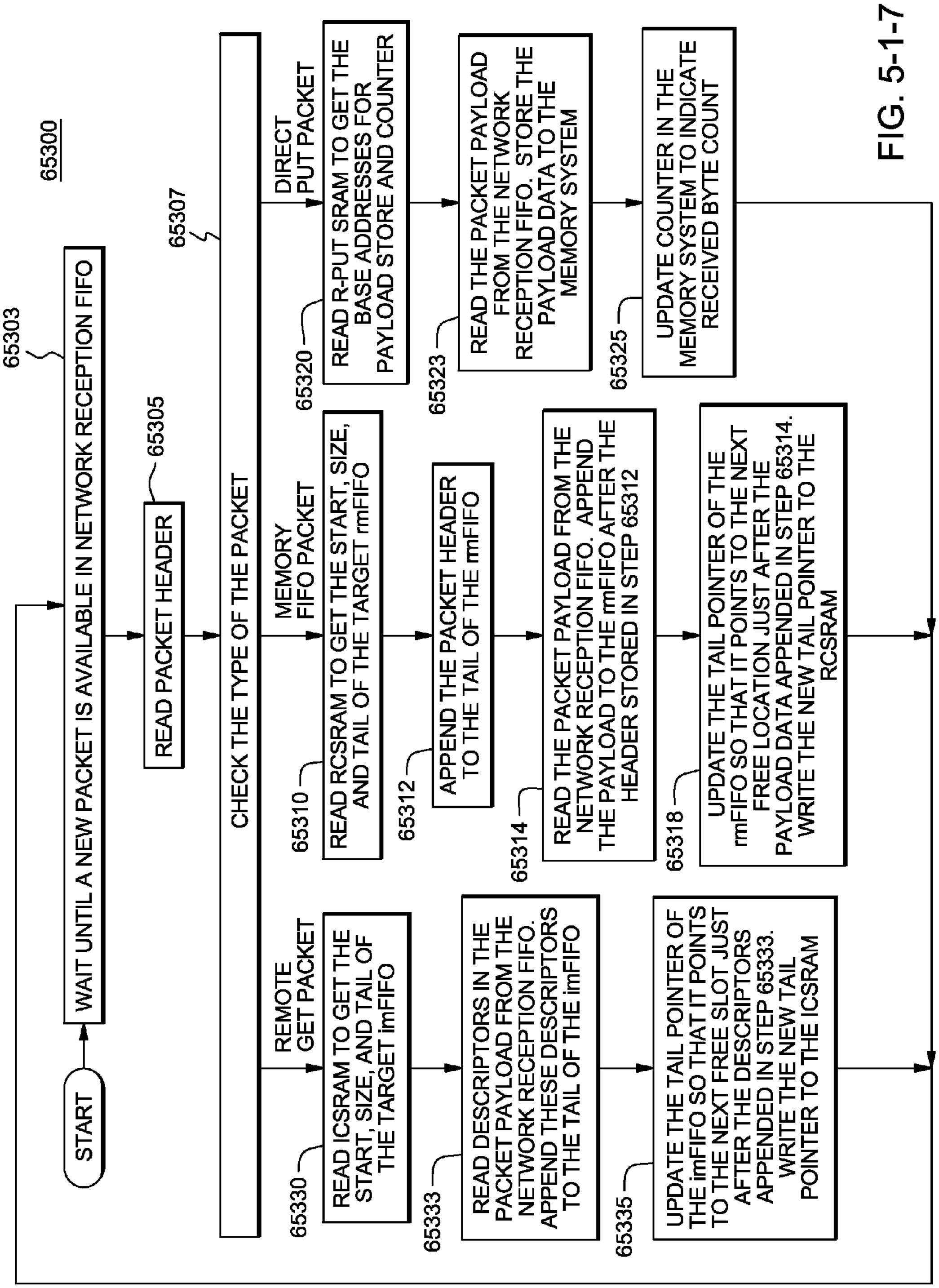
Figures 1, 5, 12:
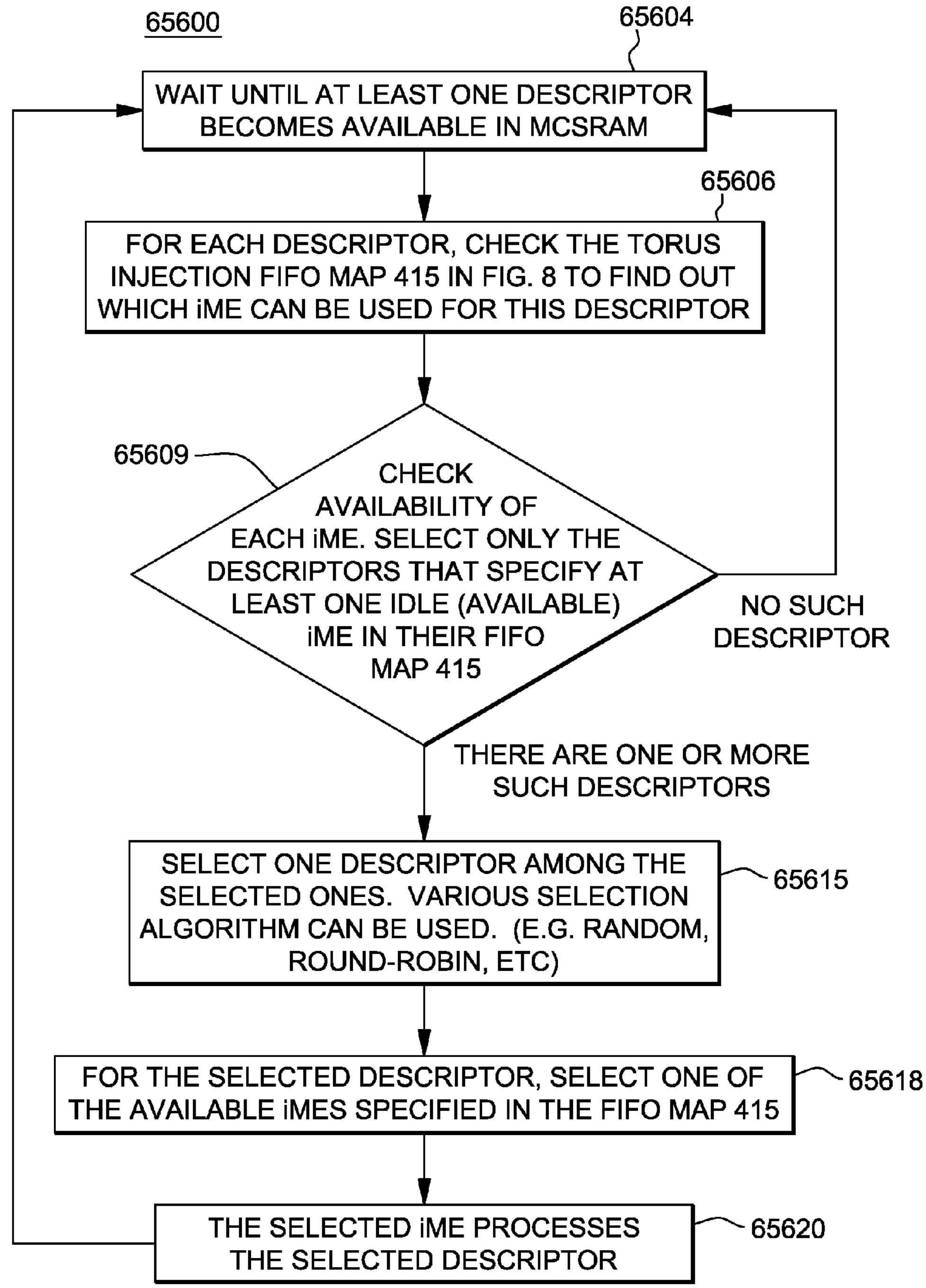
Figures 1, 5, 13:
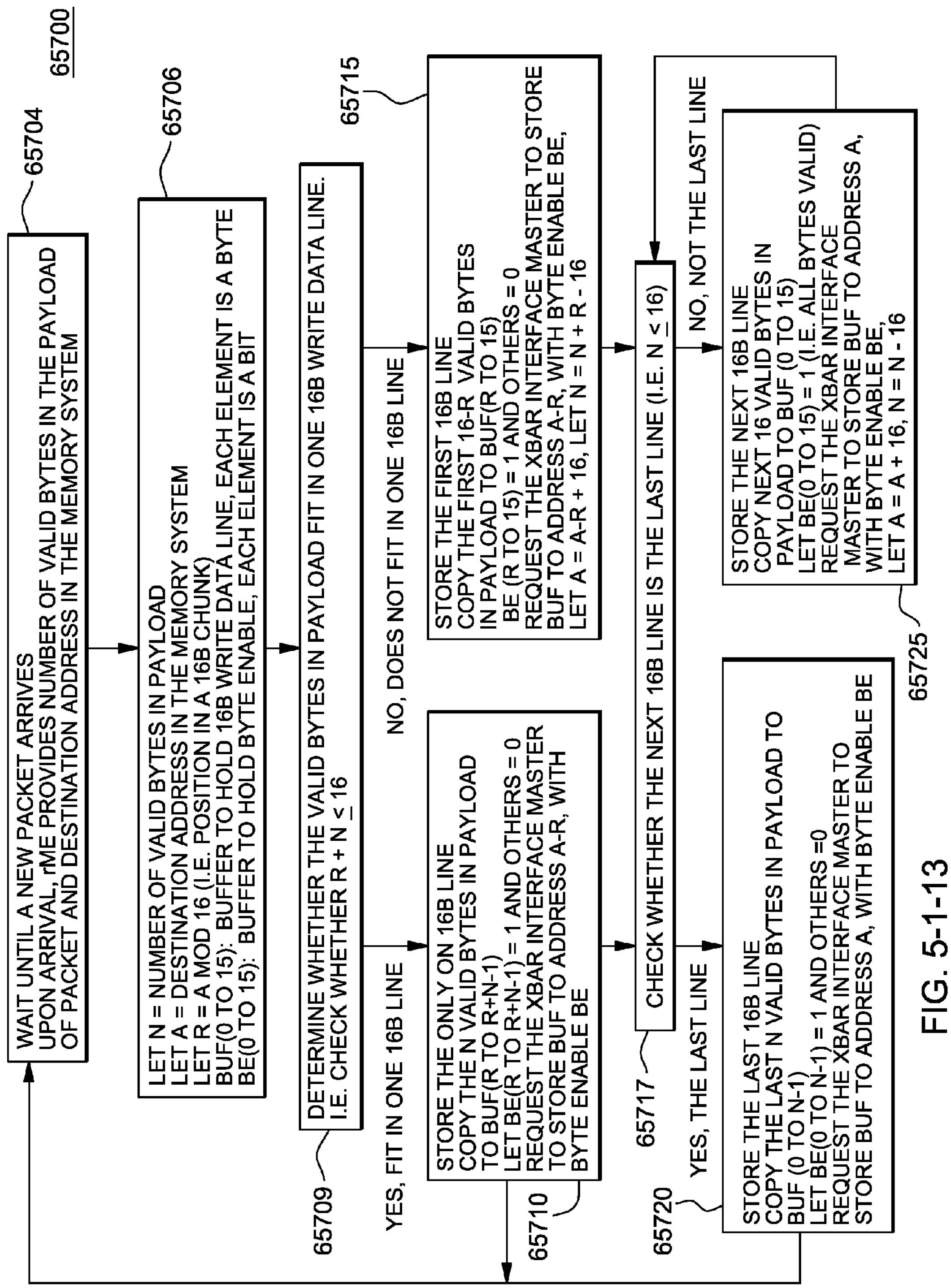
Figures 1, 5, 14A:
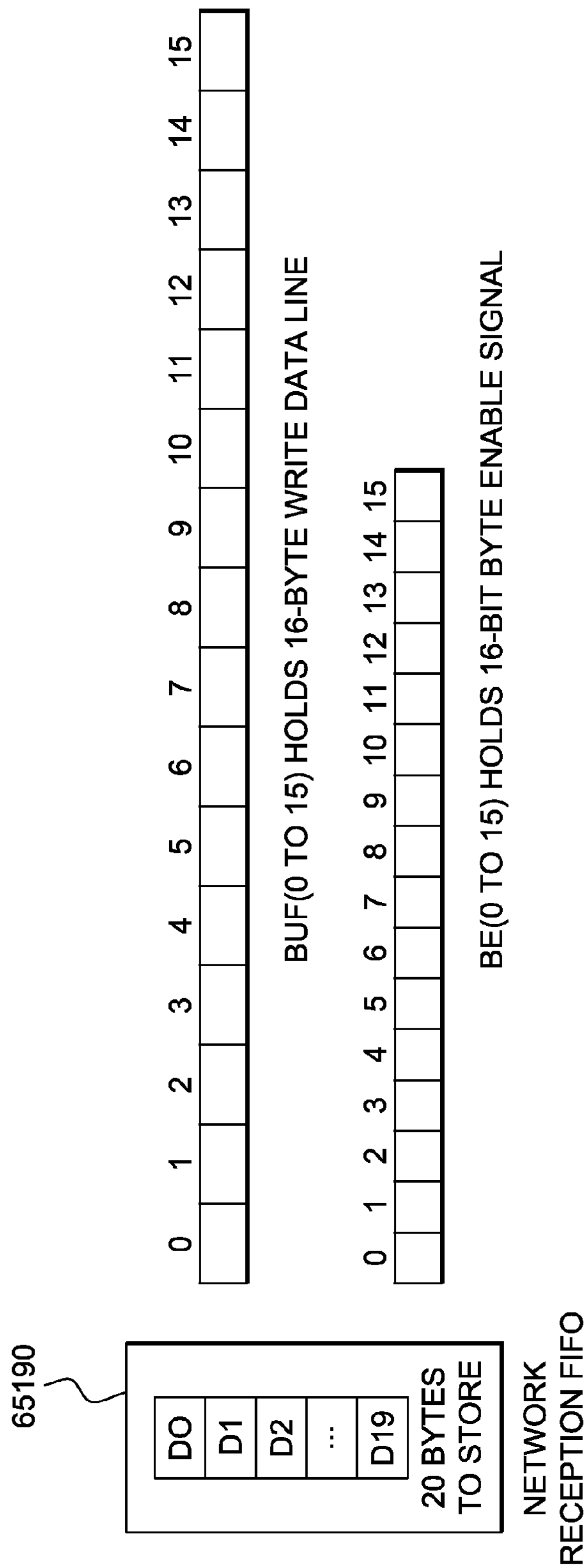
Figures 1, 5, 14B:
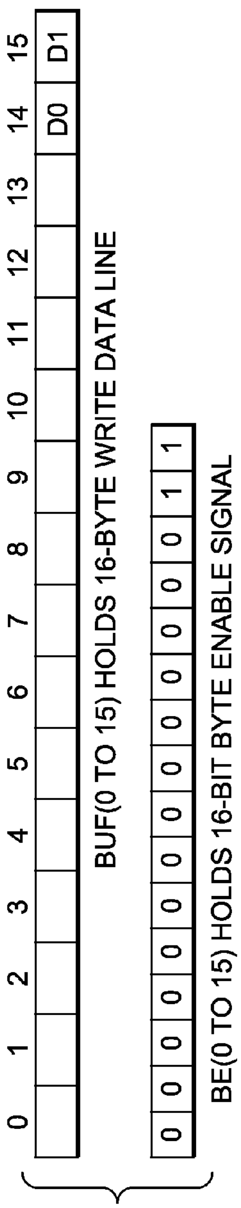
Figures 1, 5, 14C:
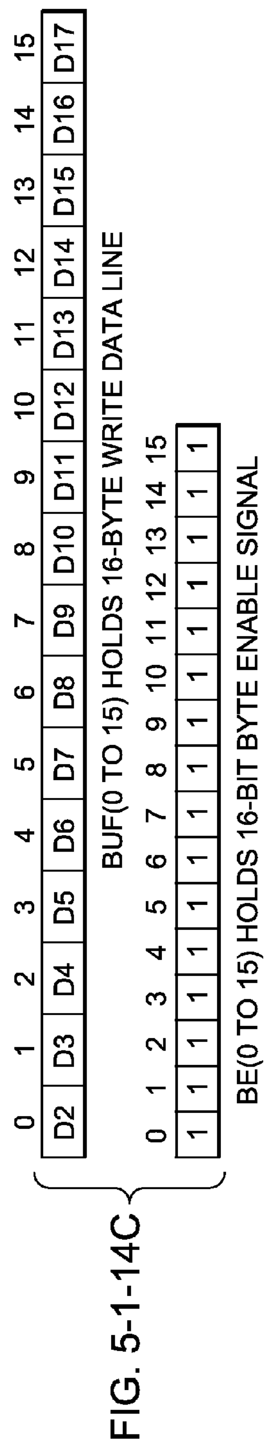
Figures 1, 5, 14D:
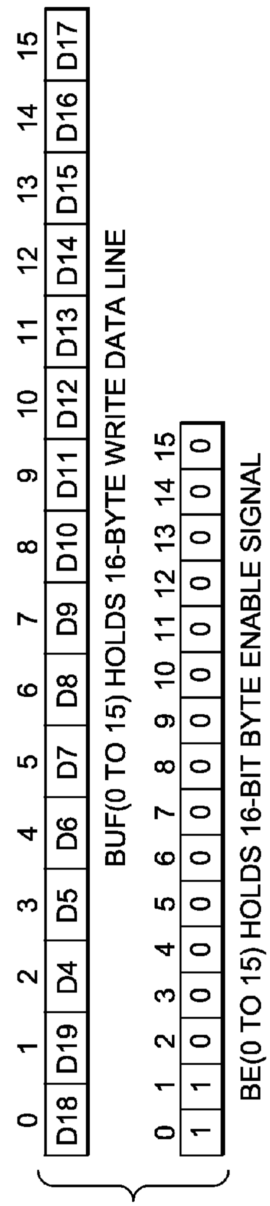
Figures 1, 5, 15:
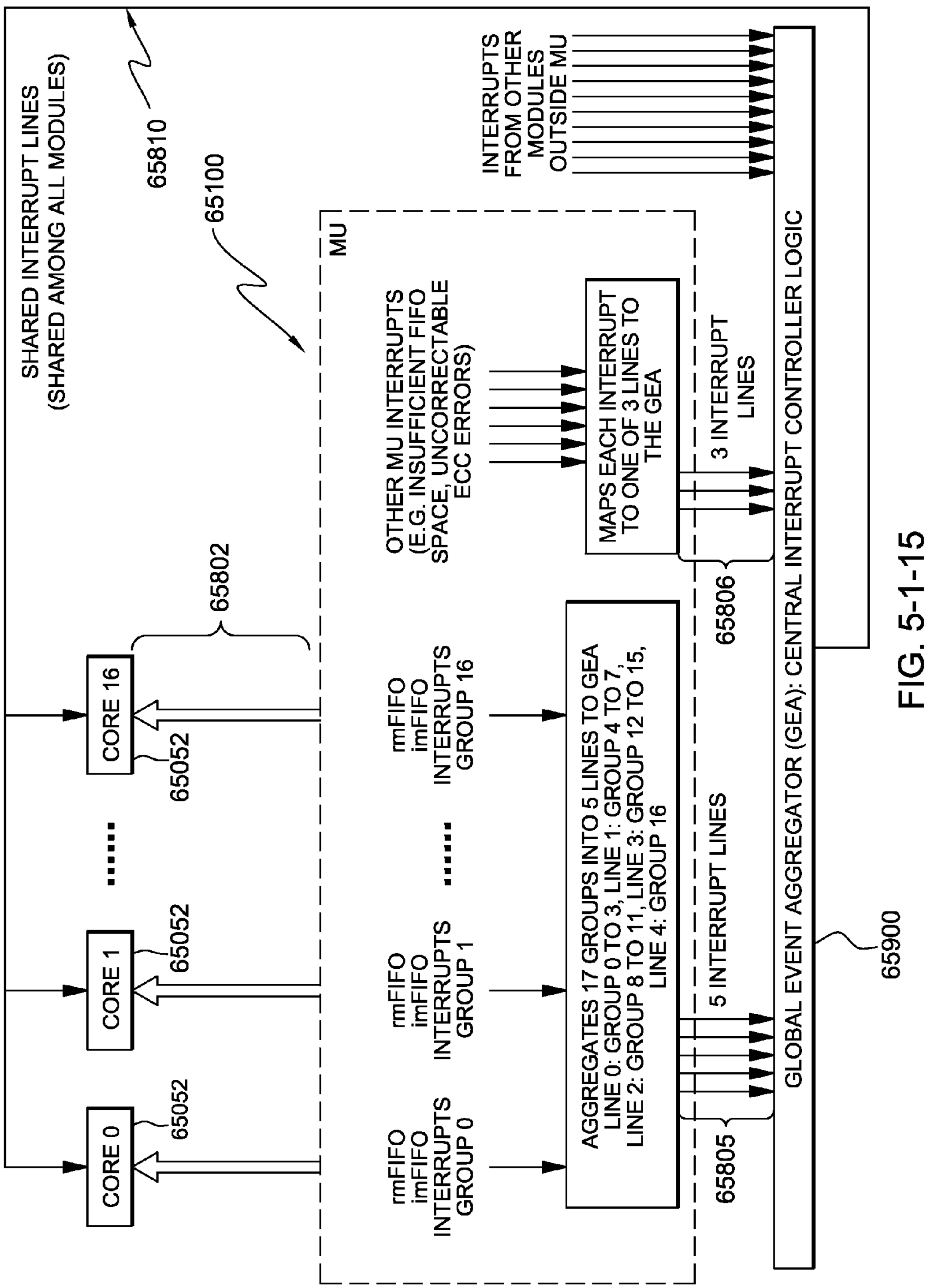
Figures 2, 5, 6A:
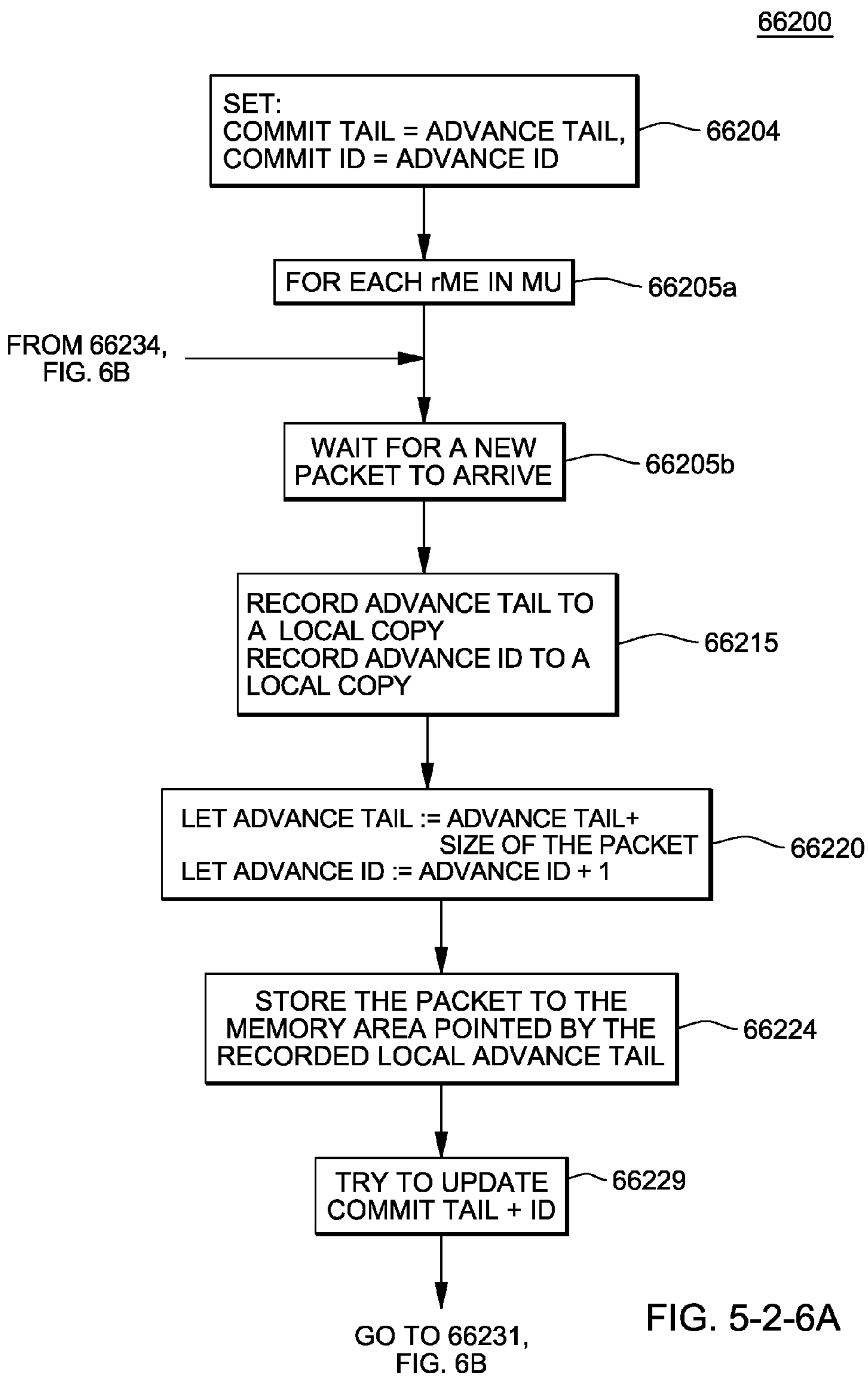
Figures 2, 5, 6B:
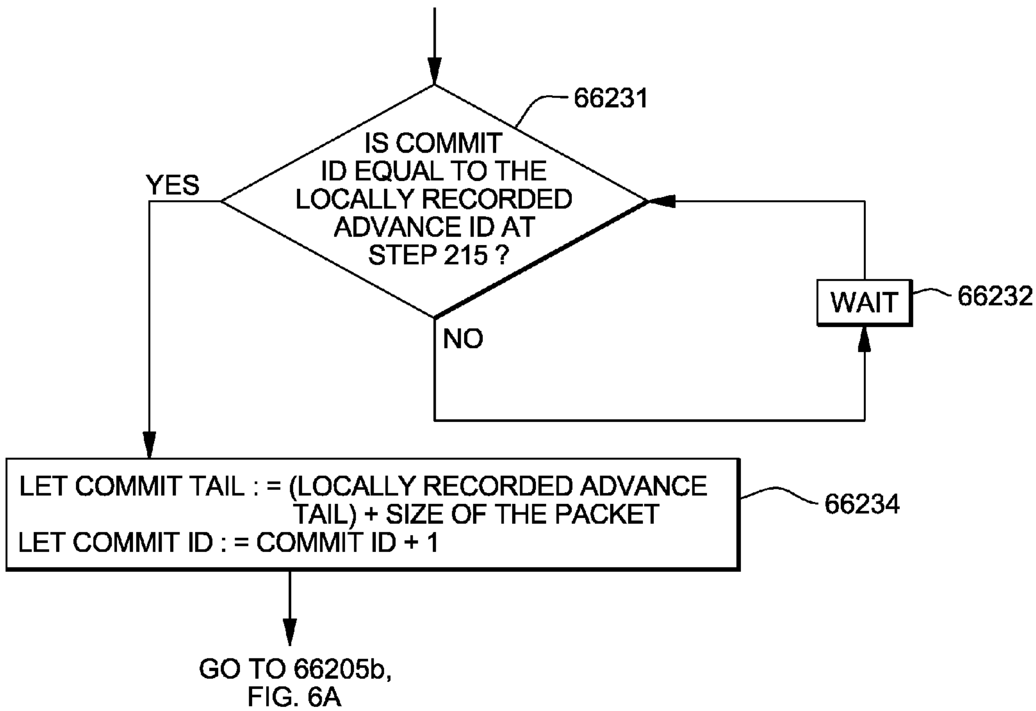
Figures 2, 5, 7:
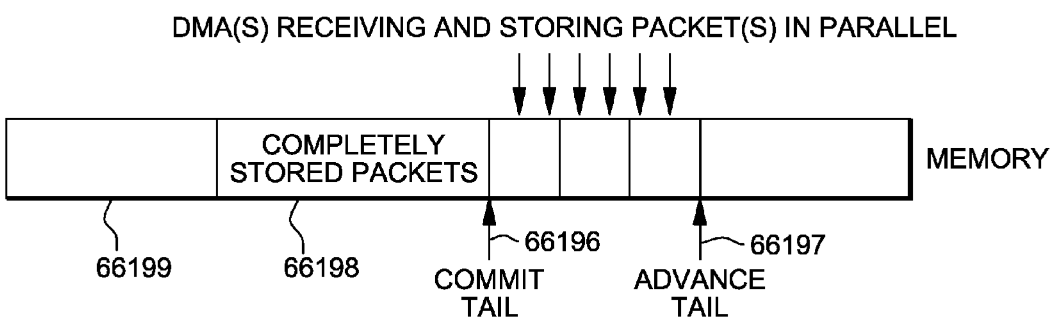

For the case of remote get packets, the remote get packet header 550 includes the Remote Get Injection FIFO ID such as processed by the MU 65100B-3 as described herein in connection with FIG. 5-1-6C.

Interrupt Control

Interrupts and, in one embodiment, interrupt masking for the MU 65100 provide additional functional flexibility. In one embodiment, interrupts may be grouped to target a particular processor on the chip, so that each processor can handle its own interrupt. Alternately, all interrupts can be configured to be directed to a single processor which acts as a "monitor" of the processors on the chip. The exact configuration can be programmed by software at the node in the way that it writes values into the configuration registers.

In one example, there are multiple interrupt signals 65802 that can be generated from the MU for receipt at the 17 processor cores shown in the compute node embodiment depicted in FIG. 5-1-15. In one embodiment, there are four interrupts being directed to each processor core 65052, with one interrupt corresponding to each thread, making for a total of 68 interrupts directed from the MU 65100 to the cores. A few aggregated interrupts are targeted to an interrupt controller (Global Event Aggregator or GEA) 65900. The signal interrupts are raised based on three conditions including, but not limited to: an interrupt signaling a packet arrival to a reception memory FIFO, a reception memory FIFO fullness crossing a threshold, or an injection memory FIFO free space crossing a threshold, e.g., injection memory FIFO threshold. In any of these cases, software at the processor core handles the situation appropriately.

For example, MU generated interrupts include: packet arrival interrupts that are raised by MU reception logic when a packet has been received. Using this interrupt, the software being run at the node can know when a message has been received. This interrupt is raised when the interrupt bit in the packet header is set to 1. The application software on the sender node can set this bit as follows: if the interrupt bit in the header in a message descriptor is 1, the MU will set the interrupt bit of the last packet of the message. As a result, this interrupt will be raised when the last packet of the message has been received.

MU generated interrupts further include: imFIFO threshold crossed interrupt that is raised when the free space of an imFIFO exceeds a threshold. The threshold can be specified by a control register in DCR. Using this interrupt, application software can know that an MU has processed descriptors in an imFIFO and there is space to inject new descriptors. This interrupt is not used for an imFIFO that is configured to receive remote get packets.

MU generated interrupts further include: remote get imFIFO threshold crossed interrupt. This interrupt may be raised when the free space of an imFIFO falls below the threshold (specified in DCR). Using this interrupt, the software can notice that MU is running out of free space in the FIFO. Software at the node might take some action to avoid FIFO full (e.g. increasing FIFO size). This interrupt is used only for an imFIFO that is configured to receive remote get packets.

MU generated interrupts further include an rmFIFO threshold crossed interrupt which is similar to the remote get FIFO threshold crossed interrupt; this interrupt to be raised when the free space of an rmFIFO fall below the threshold.

MU generated interrupts further include a remote get imFIFO insufficient space interrupt that is raised when the MU receives a remote get packet but there is no more room in the target imFIFO to store this packet. Software responds by taking some action to clear the FIFO.

MU generated interrupts further include an rmFIFO insufficient space interrupt which may be raised when the MU receives a memory FIFO packet but there is no room in the target rmFIFO to store this packet. Software running at the node may respond by taking some action to make free space. MU generated interrupts further include error interrupts that reports various errors and are not raised under normal operations.

In one example embodiment shown in FIG. 5-1-15, the interrupts may be coalesced, as follows: within the MU, there is provided, for example, 17 MU groups with each group divided into 4 subgroups. A subgroup consists of 4 reception memory FIFOs (16 FIFOs per group divided by 4) and 8 injection memory FIFOs (32 FIFOs per group divided by 4). Each of the 68 subgroups can generate one interrupt, i.e., the interrupt is raised if any of the three conditions above occurs for any FIFO in the subgroup. The group of four interrupt lines for the same processor core has paired an interrupt status register (not shown) located in the MU's memory mapped I/O space, thus, providing a total of 17 interrupt status registers, in the embodiment described herein. Each interrupt status register has 64 bits with the following assignments: 16 bits for packet arrived including one bit per reception memory FIFO coupled to that processor core; 16 bits for reception memory FIFO fullness crossed threshold with one bit per reception memory FIFO coupled to that processor core; and, 32 bits for injection memory FIFO free space crossed threshold with one bit per injection memory FIFO coupled to that processor core. For the 16 bits for packet arrival, these bits are set if a packet with interrupt enable bit set is received in the paired reception memory FIFO; for the 16 bits for reception memory FIFO fullness crossed threshold, these bits are used to signal if free space in a FIFO is less than some threshold, which is specified in a DCR register. There is one threshold register for all reception memory FIFOs. This check is performed before a packet is actually stored to FIFO. If the current available space minus the size of the new packet is less than the threshold, this interrupt will be issued. Therefore, if the software reads FIFO pointers just after an interrupt, the observed available FIFO space may not necessarily be less than the threshold. For the 32 bits for injection memory FIFO free space crossed threshold, the bits are used to signal if the free space in the FIFO is larger than the threshold which is specified in the injection threshold register mapped in the DCR address space. There is one threshold register for all injection memory FIFOs. If a paired imFIFO is configured to receive remote get packets, then these bits are used to indicate if the free space in the FIFO is smaller than the "remote get" threshold which is specified in a remote get threshold register mapped in the DCR address space (note that this is a separate threshold register, and this threshold value can be different from both thresholds used for the injection memory FIFOs not configured to receive remote get packets and reception memory FIFOs.)

In addition to these 68 direct interrupts 65802, there may be provided 5 more interrupt lines 65805 with the interrupt: groups 0 to 3 are connected to the first interrupt line, groups 4 to 7 to the second line, groups 8 to 11 to the third interrupt, groups 12 to 15 to the fourth interrupt, and the group 16 is connected to the fifth interrupt line. These five interrupts 805 are sent to a global event aggregator (GEA) 65900 where they can then be forwarded to any thread on any core.

The MU additionally, may include three DCR mask registers to control which of these 68 direct interrupts participate in raising the five interrupt lines connected to the GEA unit. The three (3) DCR registers, in one embodiment, may have 68 mask bits, and are organized as follows: 32 bits in the first mask register for cores 0 to 7, 32 bits in the second mask register for cores 8 to 15, and 4 mask bits for the 17th core in the third mask register.

In addition to these interrupts, there are additional more interrupt lines 65806 for fatal and nonfatal interrupts signaling more serious errors such as a reception memory FIFO becoming full, fatal errors (e.g., an ECC uncorrectable error), correctable error counts exceeding a threshold, or protection errors. All interrupts are level-based and are not pulsed.

Additionally, software can "mask" interrupts, i.e., program mask registers to raise an interrupt only for particular events, and to ignore other events. Thus, each interrupt can be masked in MU, i.e., software can control whether MU propagates a given interrupt to the processor core, or not. The MU can remember that an interrupt happened even when it is masked. Therefore, if the interrupt is unmasked afterward, the processor core will receive the interrupt.

As for packet arrival and threshold crossed interrupts, they can be masked on a per-FIFO basis. For example, software can mask a threshold crossed interrupt for imFIFO 0, 1, 2, but enable this interrupt for imFIFO 3, et seq.

In one embodiment, direct interrupts 65802 and shared interrupt lines 65810 are available for propagating interrupts from MU to the processor core. Using direct interrupts 65802, each processor core can directly receive packet arrival and threshold crossed interrupts generated at a subset of imFIFOs/rmFIFOs. For this purpose, there are logic paths directly connect between MU and cores.

For example, a processor core 0 can receive interrupts that happened on imFIFO 0-31 and rmFIFO 0-15. Similarly, core 1 can receive interrupts that happened on imFIFO 32-63 and rmFIFO 16-31. In this example scheme, a processor core N (N=0, . . . , 16) can receive interrupts that happened on imFIFO 32*N to 32*N+31 and rmFIFO 16*N to 16*N+15. Using this mechanism each core can monitor its own subset of imFIFOs/rmFIFOs which is useful when software manages imFIFOs/rmFIFOs using 17 cores in parallel. Since no central interrupt control mechanism is involved, direct interrupts are faster than GEA aggregated interrupts as these interrupt lines are dedicated for MU.

Software can identify the source of the interrupt quickly, speeding up interrupt handling. A processor core can ignore interrupts reported via this direct path, i.e., a direct interrupt can be masked using a control register.

As shown in FIG. 5-1-15, there is a central interrupt controller logic GEA 65900 outside of the MU device. In general GEA interrupts 65810 are delivered to the cores via this controller. Besides the above direct interrupt path, all the MU interrupts share connection to this interrupt controller. This controller delivers MU interrupts to the cores. Software is able to program how to deliver a given interrupt.

Using this controller, a processor core can receive arbitrary interrupts issued by the MU. For example, a core can listen to threshold crossed interrupts on all the imFIFOs and rmFIFOs. It is understood that a core can ignore interrupts coming from this interrupt controller.

Figures 2, 5, 7A:
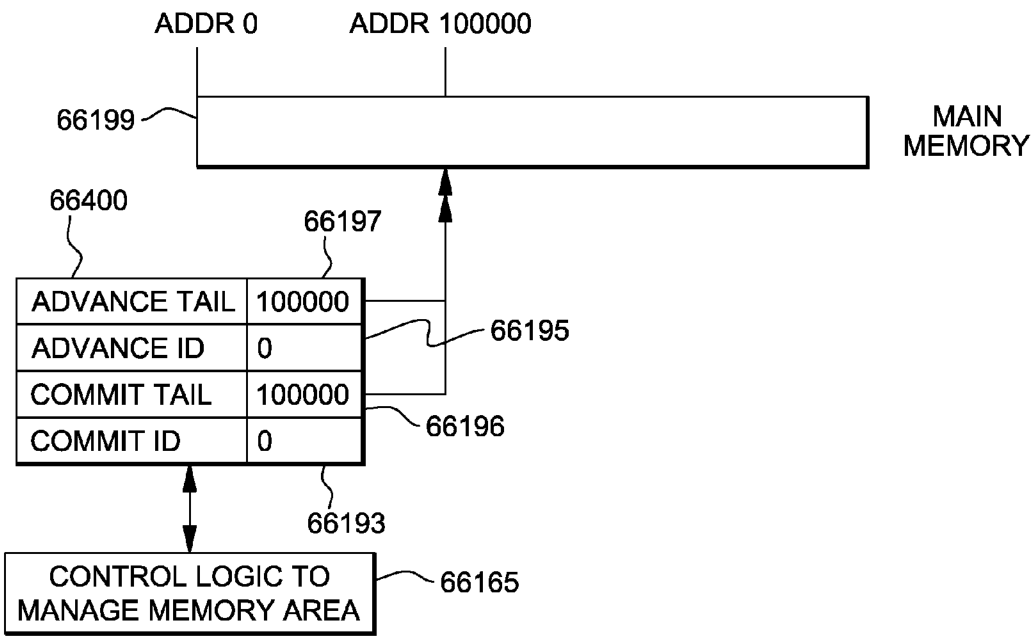

As shown in FIG. 5-2-7A, in one embodiment, to allow simultaneous usage of the same rmFIFO by multiple rMEs, each rmFIFO 66199 further has an associated advance tail 66197, committed tail 66196, and two counters: one advance tail ID counter 66195 associated with advance tail 66197; and, one committed tail ID counter 66193 associated with the committed tail 66196. An rME 65120*b* includes a DMA engine that copies packets to the memory buffer (e.g., FIFO) 66199 starting at a slot pointed to by an advance tail pointer 66197 in an SRAM memory, e.g., the RCSRAM 65160 (e.g. 5-1-6A) and obtains an advance tail ID. After the packet is copied to the memory, the rME 65120 checks the committed tail ID to determine if all previously received data for that rmFIFO have been copied. If determined that all previously received data for that rmFIFO have been copied, the rME atomically updates both committed tail and committed tail ID, otherwise it waits. A control logic device 66165 shown in FIG. 5-2-7A implements logic to manage the memory usage, e.g., manage respective FIFO pointers, to ensure that all store requests for header and payload have been accepted by the interconnect 65060 before atomically updating committed tail (and optionally issuing interrupt). For example, in one embodiment, each rME $\mathbf{65120}_a, \ldots, \mathbf{65120}_n$, ensures that all store requests for header and payload have been accepted by the interconnect 65060 before updating commit tail (and, optionally issuing an interrupt). In one embodiment, there are interconnect interface signals issued by the control logic device that tell MU that a store request has been accepted by the interconnect, i.e., an acknowledgement signal. This information is propagated to the respective rMEs. Thus, each rME is able to ensure that all interesting store requests have been accepted by the interconnect. An "optional" interrupt may be used by the software on the cores to track the FIFO free space and may be raised when the available space in an rmFIFO falls below a threshold (such as may be specified in a DCR register). For this interrupting, the control logic 66165 asserts some interrupt lines that are connected to cores (directly or via a GEA (Global Event Aggregator) engine).

In one embodiment, the control logic device 66165 processing may be external to both the L2 cache and MU 65100. Further, in one embodiment, the Reception control SRAM includes associated status and control registers that maintain and atomically update these advance tail ID counter, advance tail, committed tail ID counter, committed tail pointer values in addition to fields maintaining packet "start" address, "size minus one" and "head" fields.

When a MU wants to read from or write to main memory, it accesses L2 memory controller via the xbar master ports. If the access hits L2, the transaction completes within the L2 and hence no actual memory access is necessary. On the other hand, if it doesn't hit, L2 has to request the memory controller (e.g., DDR-3 Controller 78, FIG. 1-0) to read or write main memory.

FIG. 5-2-7 illustrates conceptually a reception memory FIFO 66199 or like memory storage area showing a plurality of slots including some completely filled packets 66198 and after the most recent slot pointed to by a commit tail address (commit tail) 66196 and further showing multiple DMA engines (e.g., each from respective rMEs) having placed or placing packets received after the last packet pointed to by the commit tail pointer (last committed packet) in respective locations. The advance tail address (advance tail) 66197 points to the address the next new packet will be stored.

When a DMA engine implemented in a rME wants to store a packet, it obtains from the RCSRAM 65160 the advance tail 66197 which points to the next memory area in that reception memory FIFO 66199 to store a packet (Advance tail address). Then, the advance tail is then moved (incremented) for next packet. The read of advance tail and the increment of advance tail both occur at the same time and cannot be intervened, i.e. they happen atomically. After the DMA at the rME has stored the packet, it requests an atomic update of the Commit tail pointer to indicate that the last address packets have been completely stored. The Commit tail may be referred to by software to know up to where there are completely stored packets in the memory area (e.g., software checks commit tail and the processor may read packets in the main memory up to the commit tail for further processing.) DMAs write commit tail in the same order as they get advance tail. Thus, the commit tail will have the last address correctly. To manage and guarantee this ordering between DMAs, advance ID and commit ID are used.

FIGS. 5-2-7A to 5-2-7N depict example scenario for parallel DMA handling of received packets belonging to the same rmFIFO. In an example operation, as shown in FIG. 5-2-7A, in an initial state, commit tail=advance tail (address 100000), and commit ID=advance ID. The following steps are performed for each rME $DMA_i$, I=0, 1, . . . , n), in each MU at a multiprocessor node or system any processing system having more than one DMA engine. The advance tail, advance ID, commit tail, and commit ID are shared among all DMAs.

Figures 2, 5, 7B:
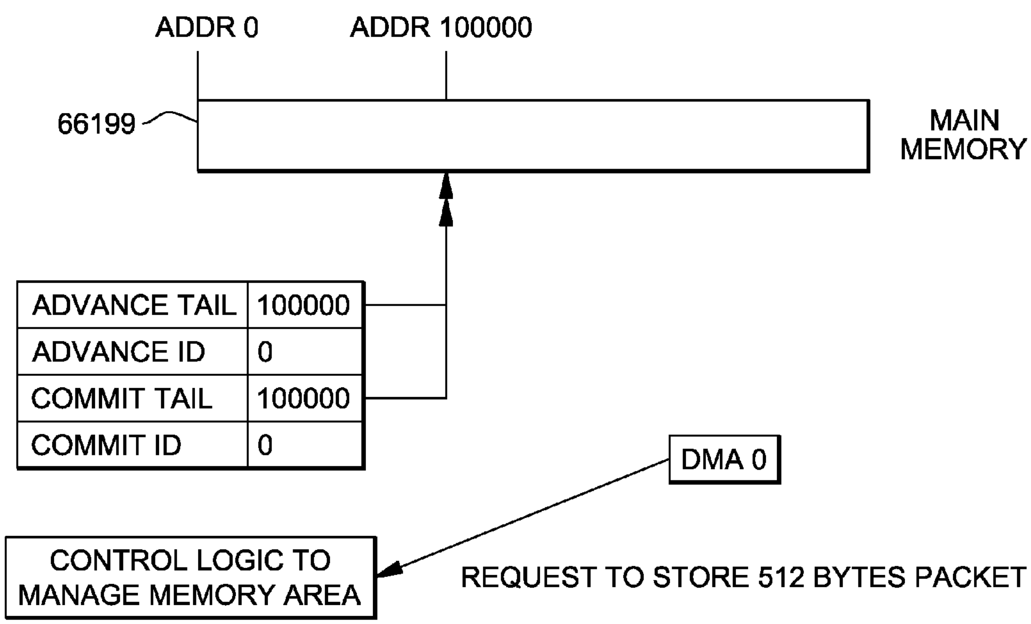
Figures 2, 5, 7C:
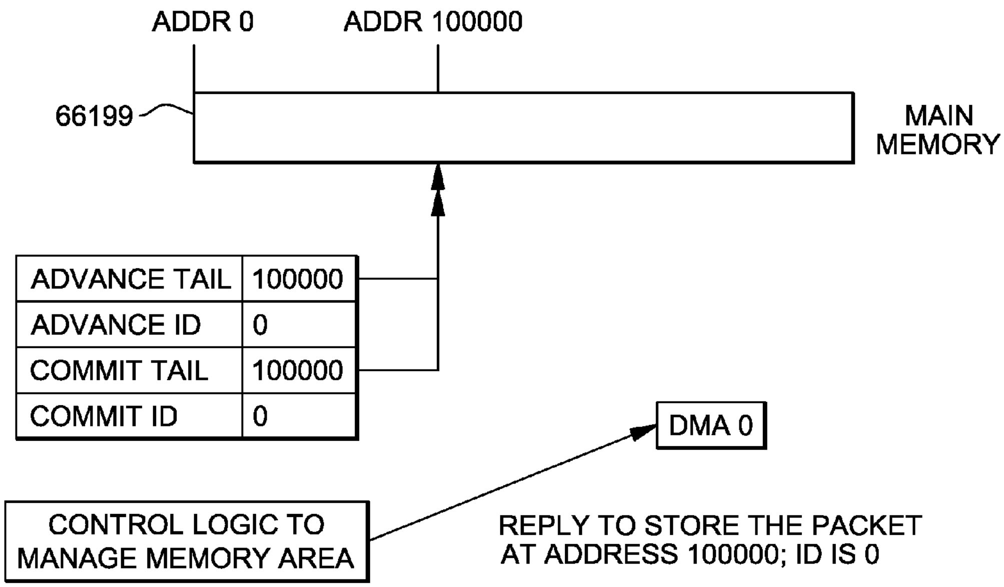
Figures 2, 5, 7D:
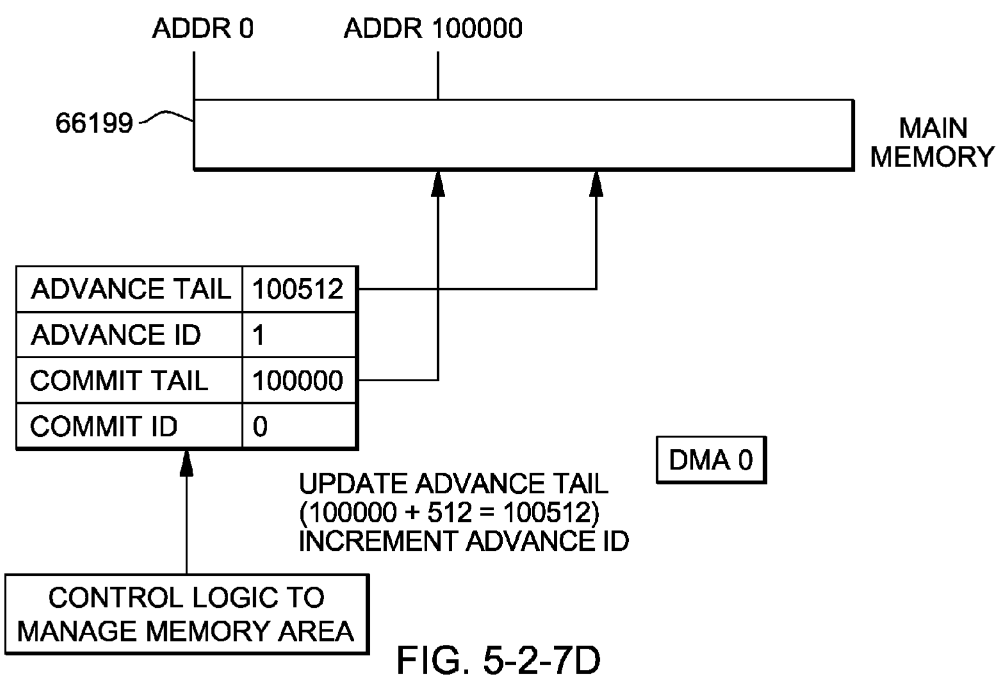
Figures 2, 5, 7E:
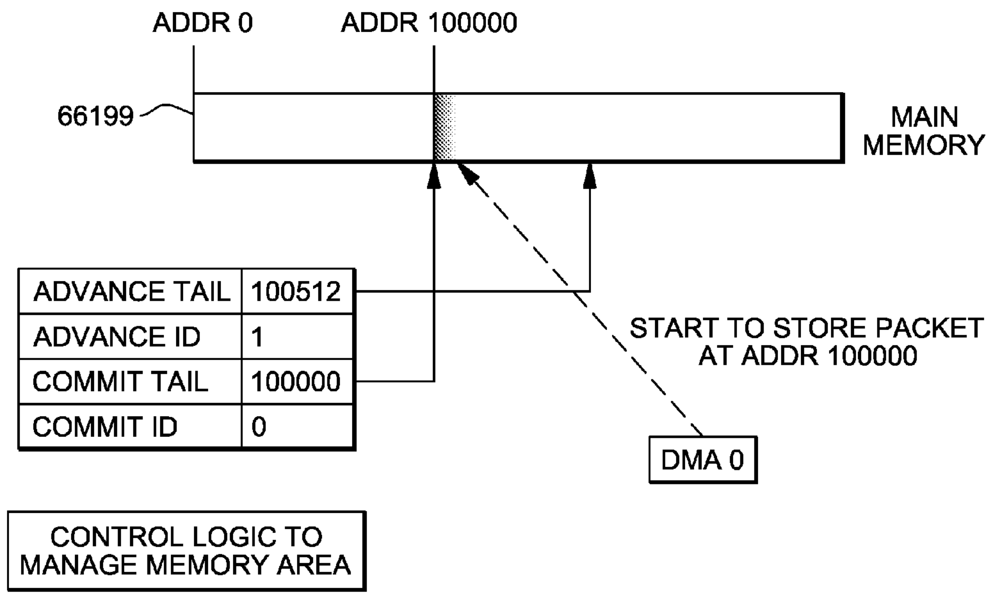

As exemplified in FIG. 5-2-7B, DMA0 first requests of the control logic 66165 managing the memory area, e.g., rmFIFO, to stores a 512B packet FIG. 5-2-7B, and in FIG. 5-2-7C, the control logic 66165 replies to the rME (DMA 0), to store the packet at the advance tail address, e.g., 100000. Further, the DMA0 is assigned an advance tail ID of "0", for example. As further shown in FIG. 5-2-7D, the control logic 66165 managing the memory area atomically updates the advance tail by the amount of bytes of the packet to be stored by DMA) (i.e., (100000+512=100512) and, as part of the same atomic operation, increments the advance tail ID (e.g. now assigned a value of "1"). FIG. 5-2-7E depicts the DMA0 initiating storing of the packet at address 100000.

Figures 2, 5, 7F:
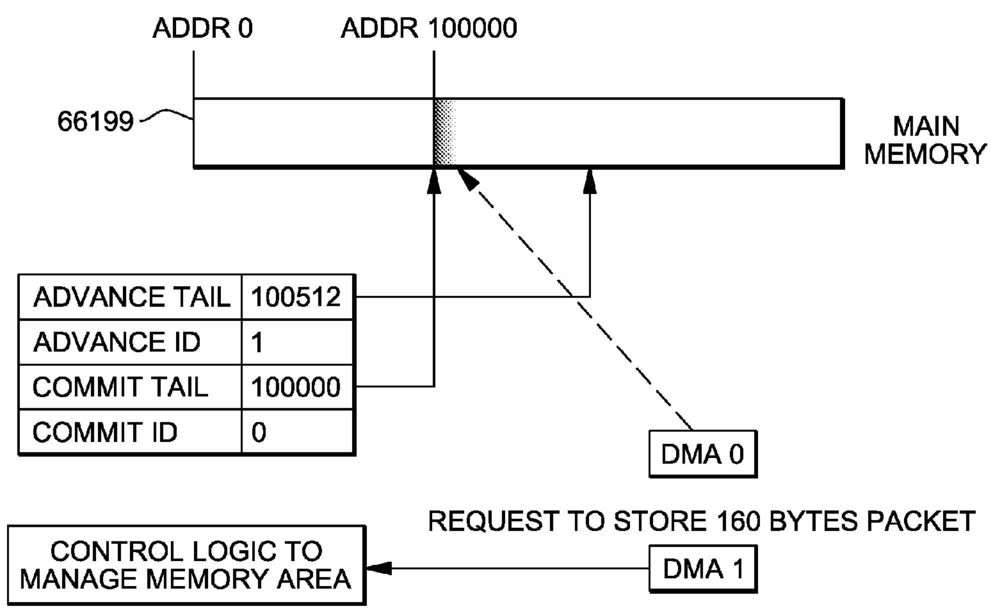
Figures 2, 5, 7G:
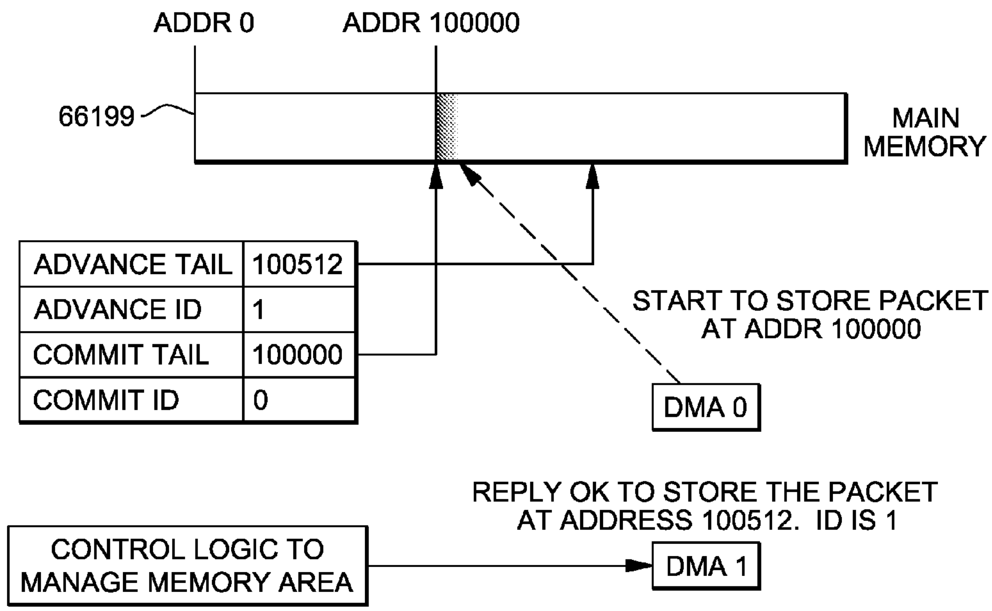
Figures 2, 5, 7H:
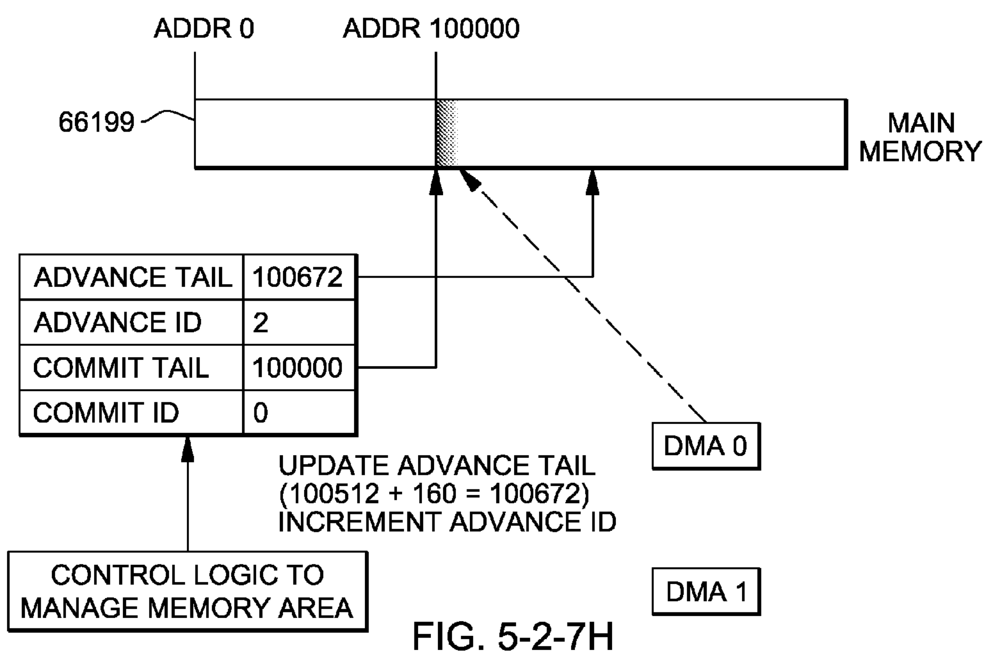
Figures 2, 5, 7I:
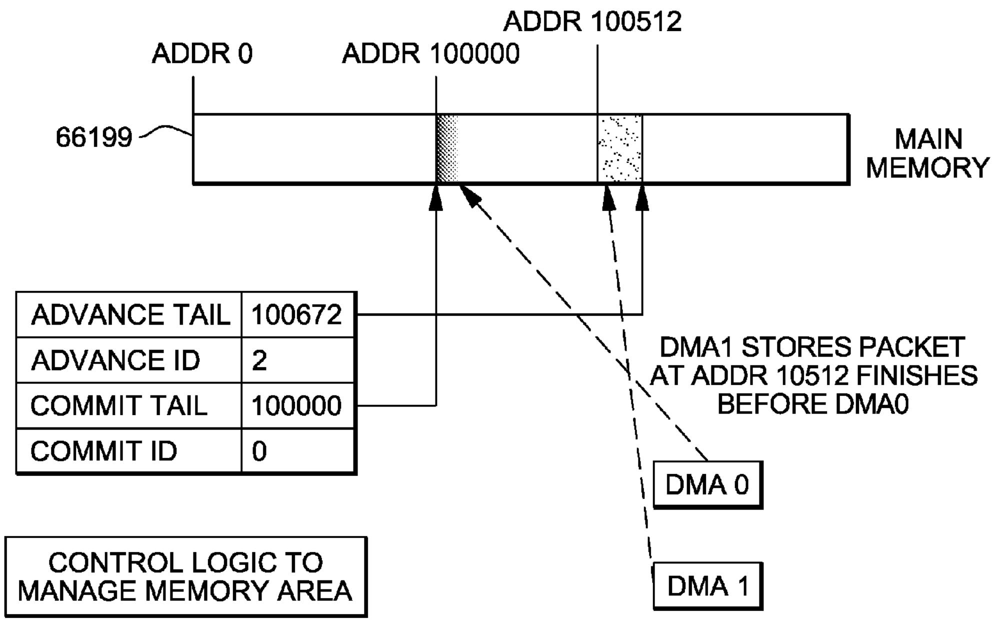
Figures 2, 5, 7J:
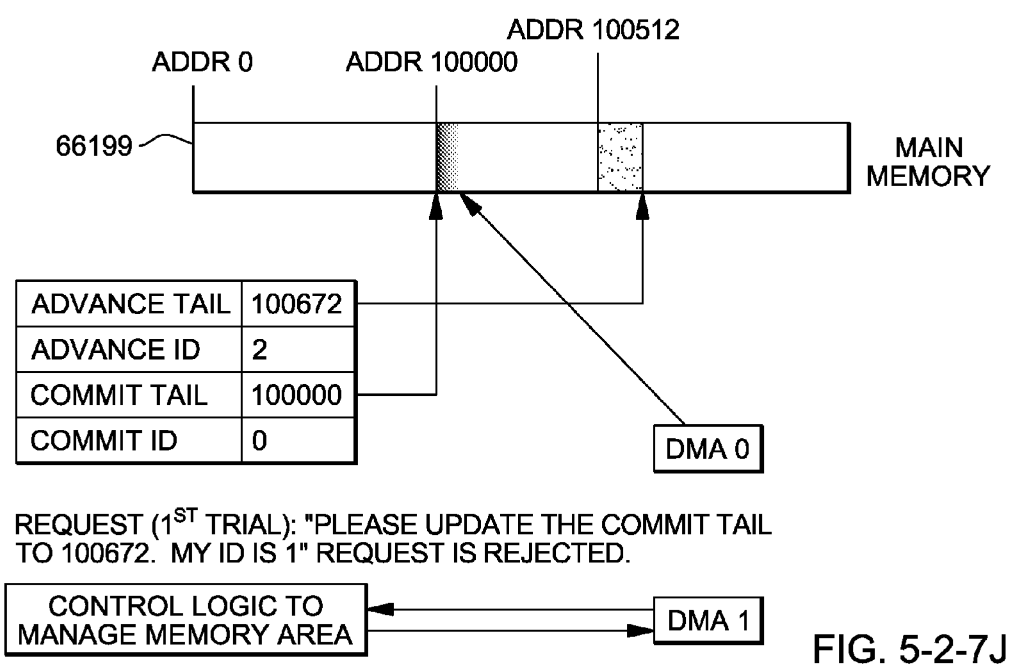

As exemplified in FIG. 5-2-7F, a second DMA element, DMA1, then requests of the control logic 66165 managing the memory area, e.g., rmFIFO, to store a 160B packet FIG. 5-2-7G, and the control logic 66165 replies to the rME (DMA 0), to store the packet at the advance tail address, e.g., 100512. Further, the DMA1 is assigned an advance tail ID of "1", for example. As further shown in FIG. 5-2-7H, the control logic 66165 managing the memory area atomically updates the advance tail by the amount of bytes of the packet to be stored by DMA) (i.e., (100512+160=100672) and, as part of the same atomic operation, increments the advance tail ID (e.g. now assigned a value of “2”). As shown in FIG. 5-2-7I, DMA1 starts storing the example 160B packet, with both the DMAs operating in parallel. The DMA1 completes storing the 160B packet before DMA0 and tries to update the commit tail before DMA0 by requesting the control logic to update the commit tail address to 100512+160=100672 and informing the control logic 66165 that the DMA1 ID is 1. The control logic 66165 detects that there is a pending DMA write before DMA1 (i.e., DMA0) and replies to DMA1 that commit ID is still 0 and that commit tail cannot be updated and has to wait and attempt subsequently as shown in FIG. 5-2-7J. Thus, as exemplified, the advance ID and commit ID for the DMAs are used by the control logic to detect this ordering violation. That is, in this detection, the control logic compares the current commit ID with the advance ID the requestor DMA has, i.e., a DMA (rME) obtains the advance ID when it gets advance tail. If there is a pending DMA before the requestor DMA, the commit ID does not match the requestor DMA’s advance ID.

Figures 2, 5, 7K:
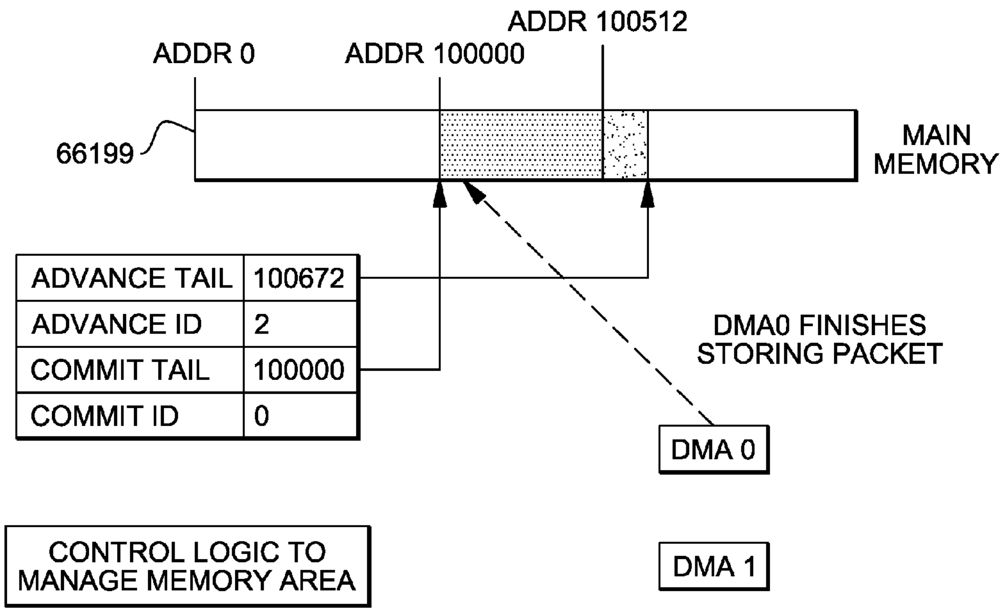
Figures 2, 5, 7L:
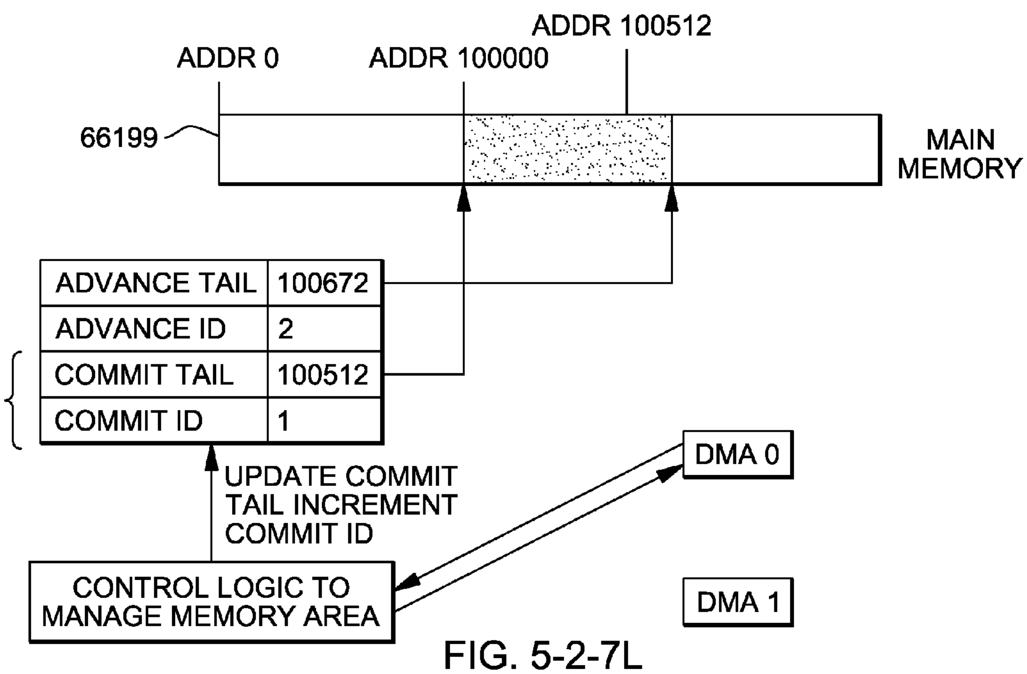
Figures 2, 5, 7M:
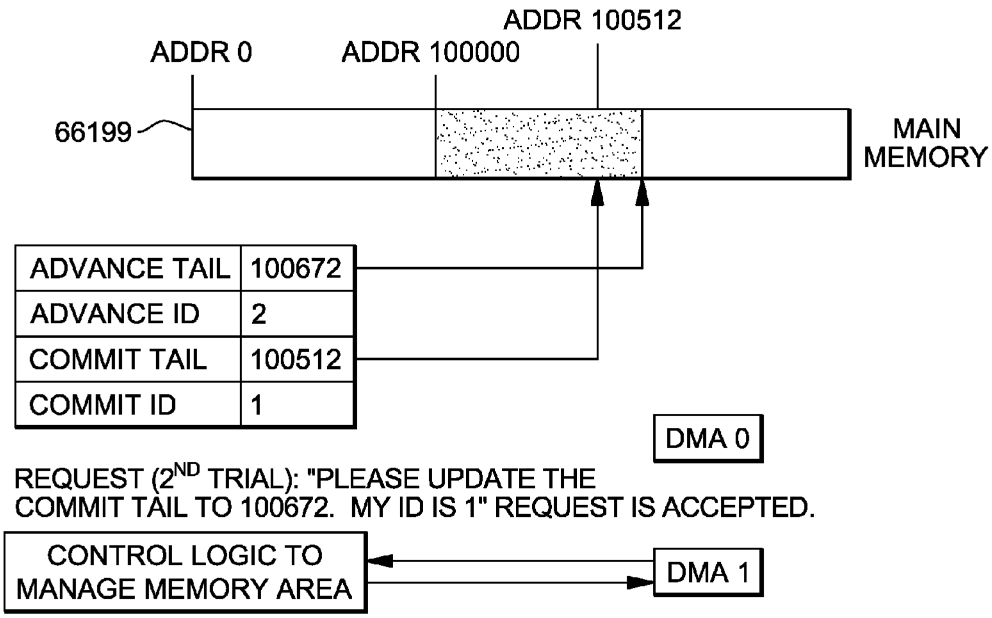
Figures 2, 5, 7N:
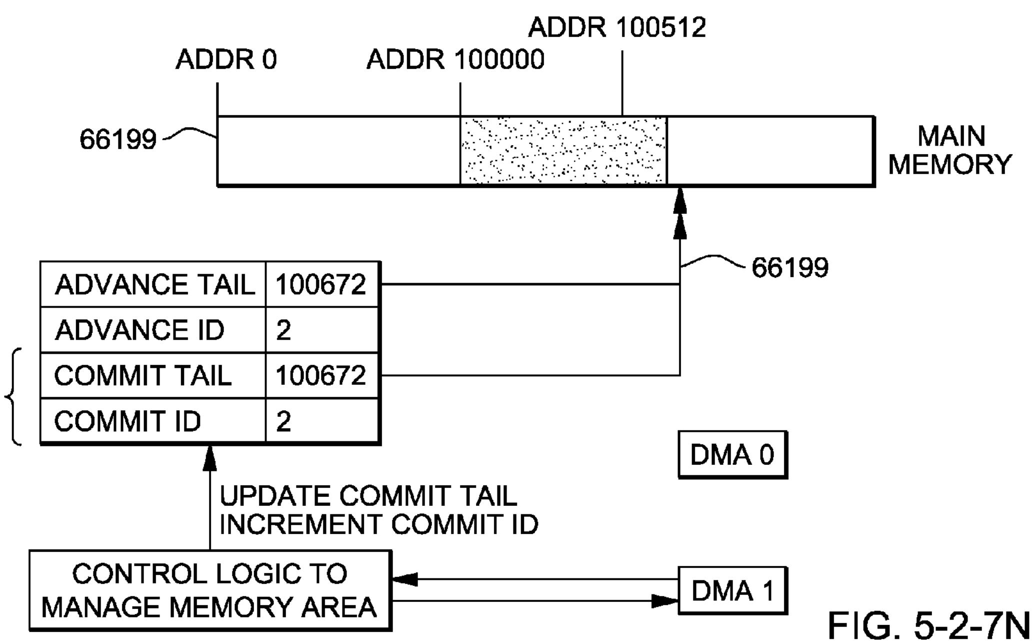
Figures 1, 3, 5:
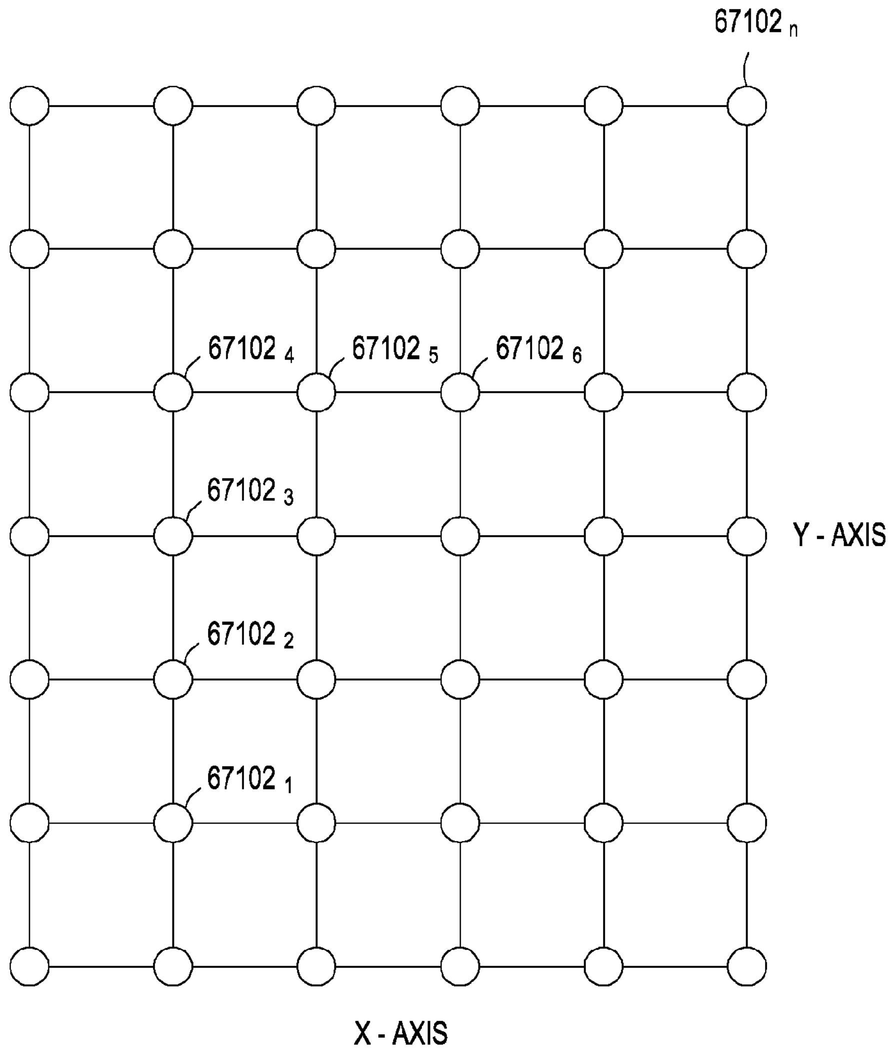
Figures 3, 3A, 5:
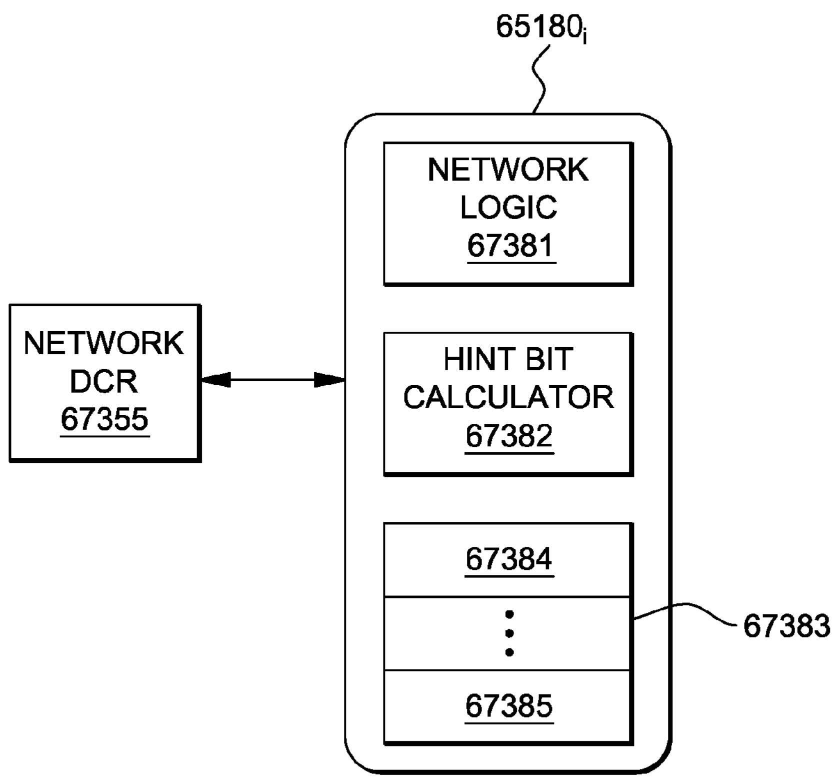
Figures 3, 5:
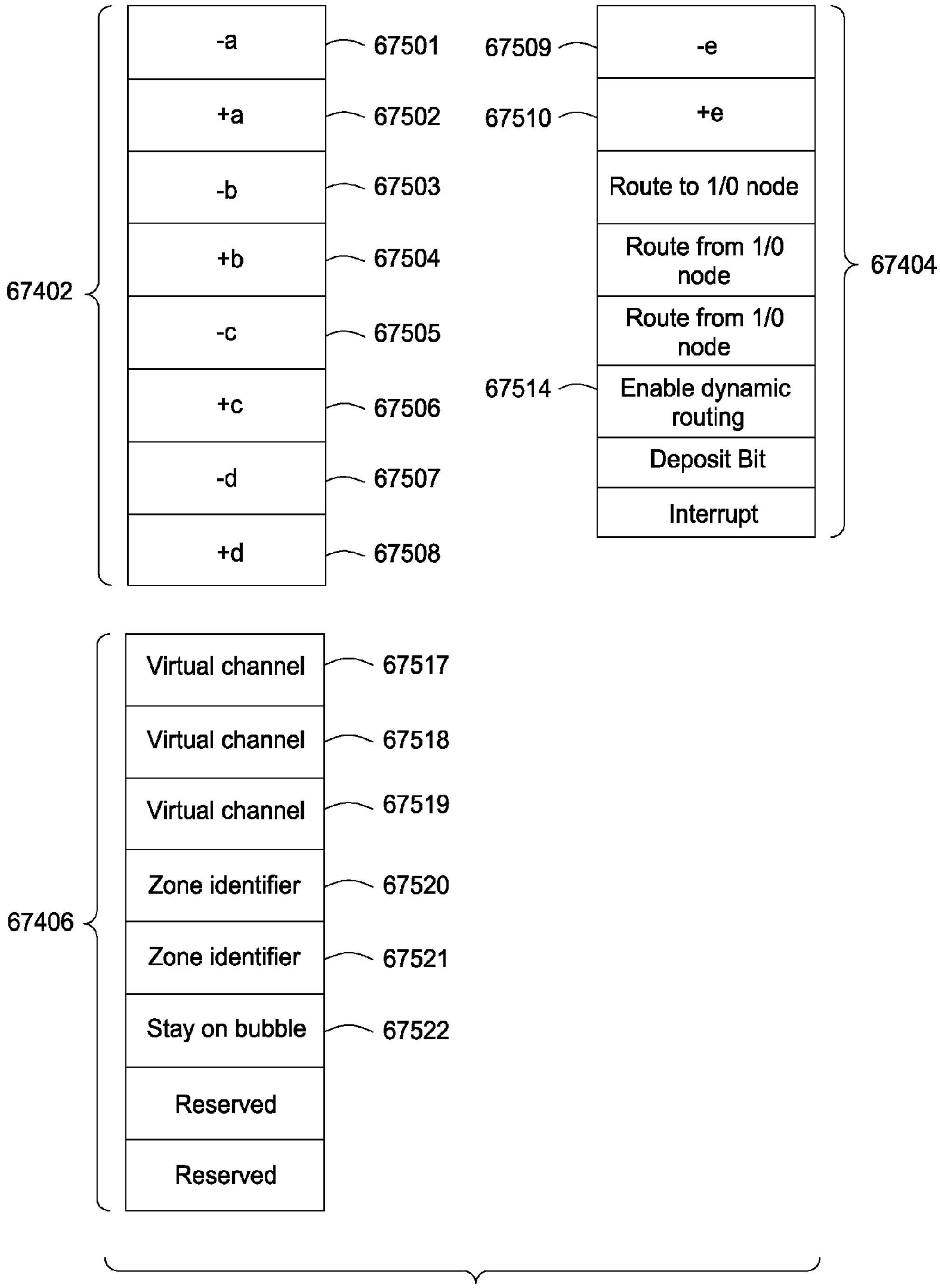
Figures 3, 5, 6:
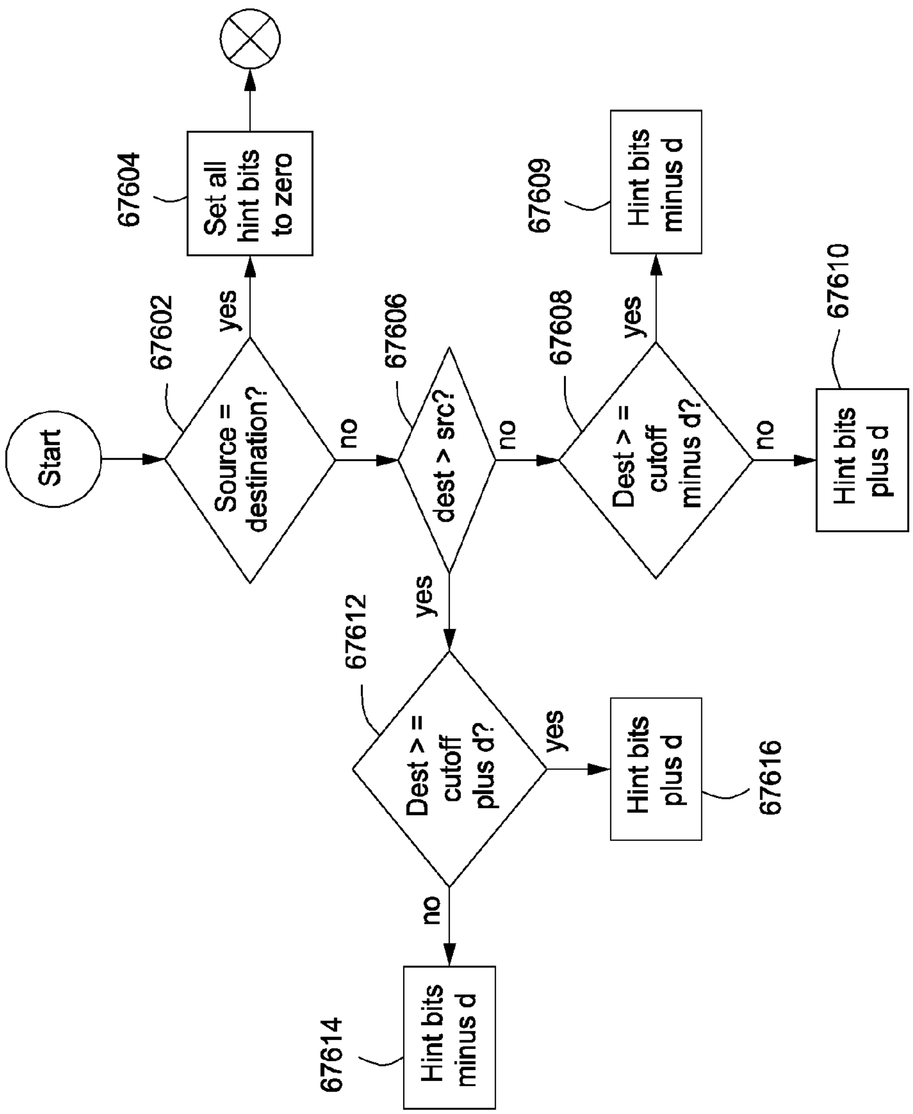
Figures 1A, 4, 5:
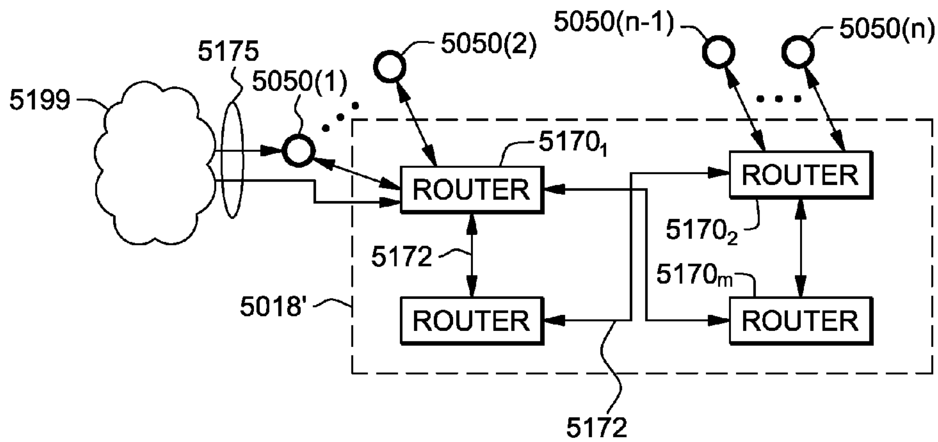
Figures 1B, 4, 5:
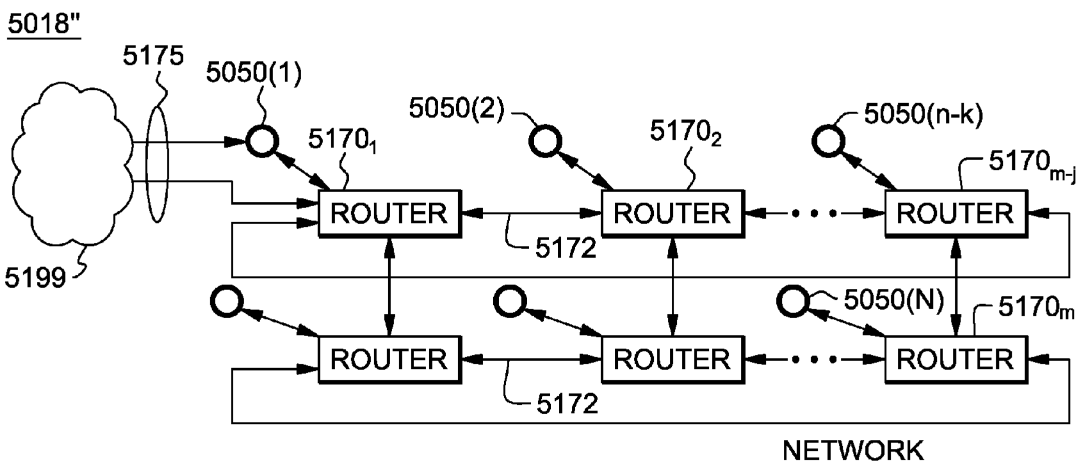
Figures 3, 4, 5:
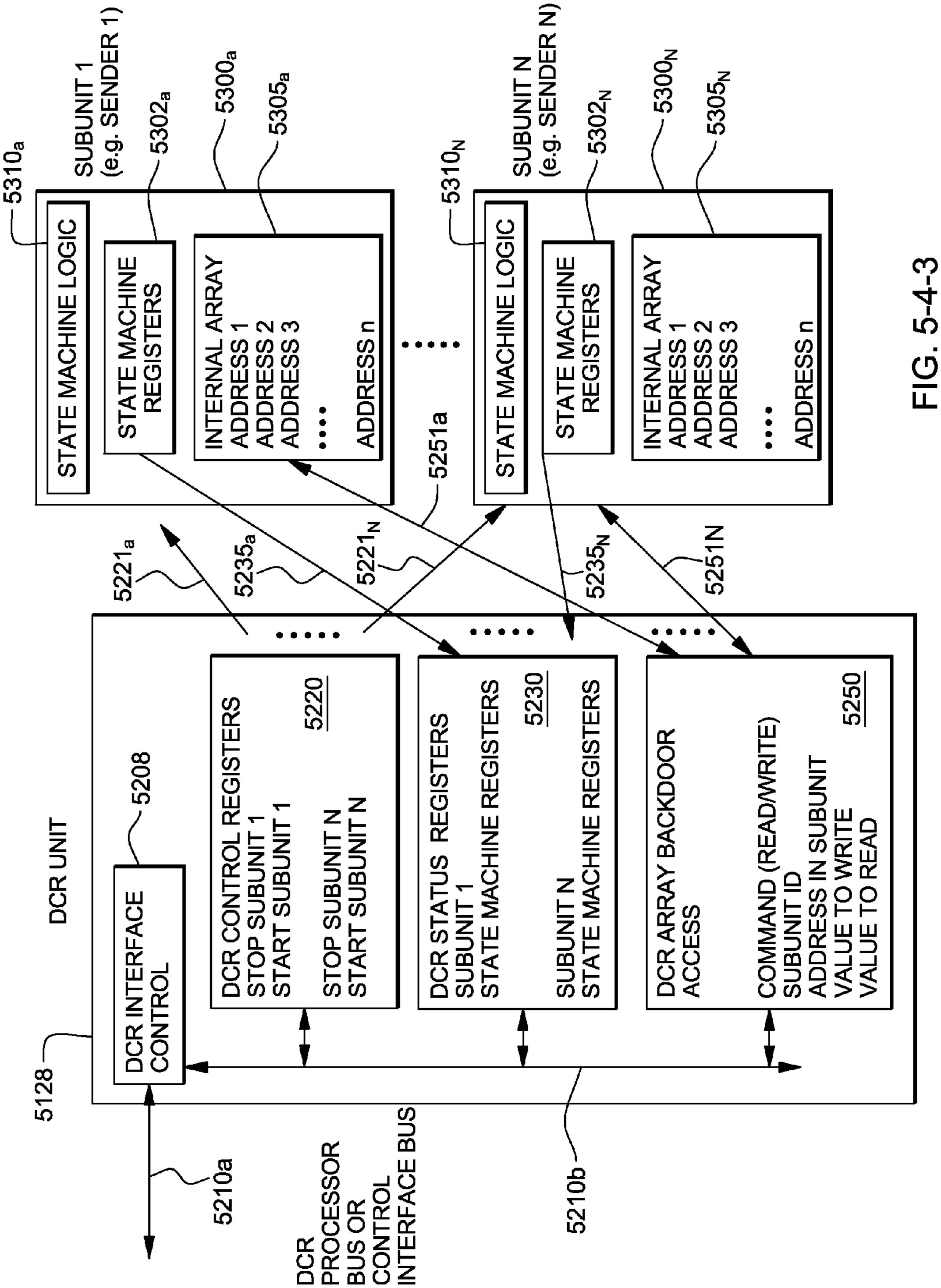
Figures 4, 4A, 5:
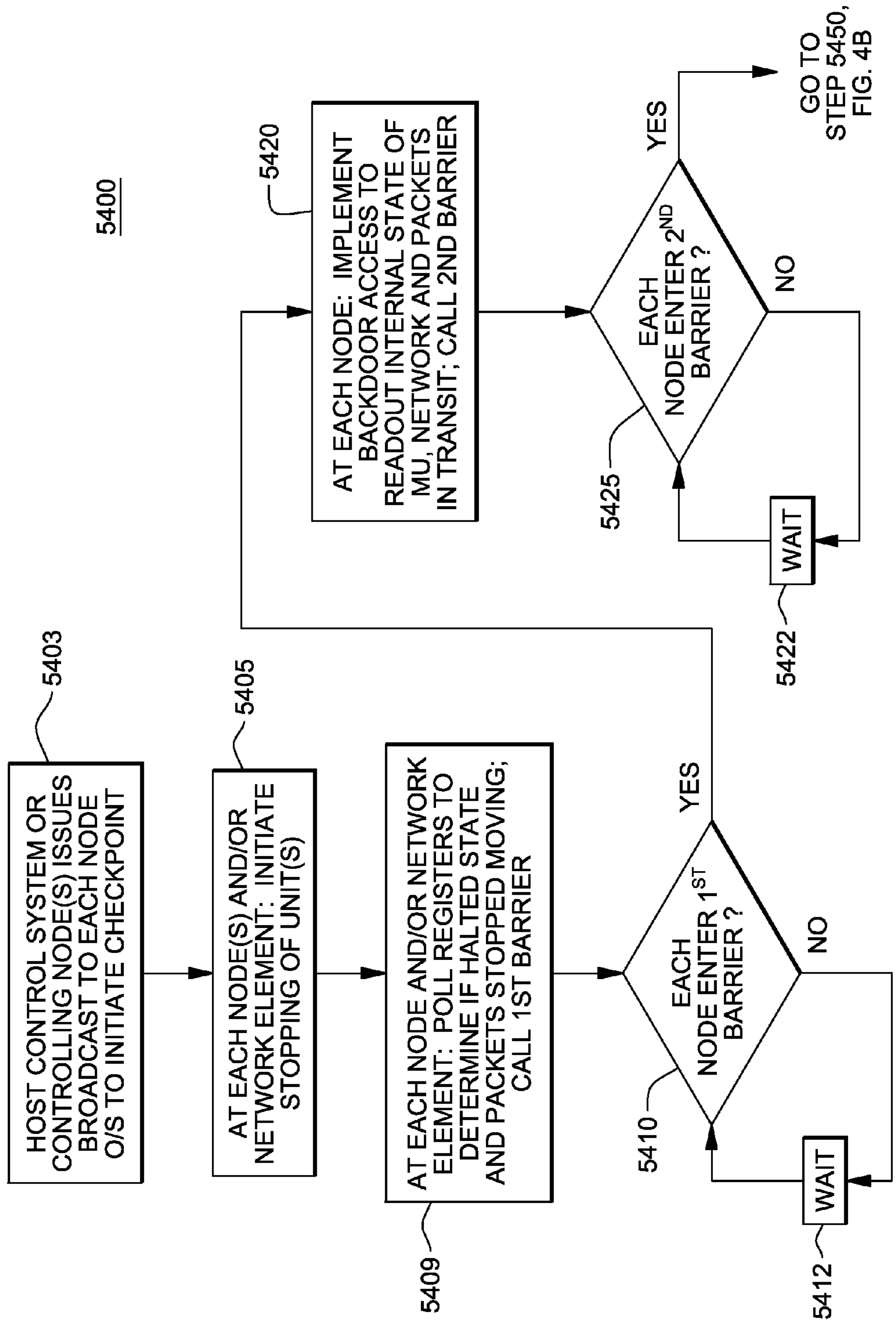
Figures 4, 4B, 5:
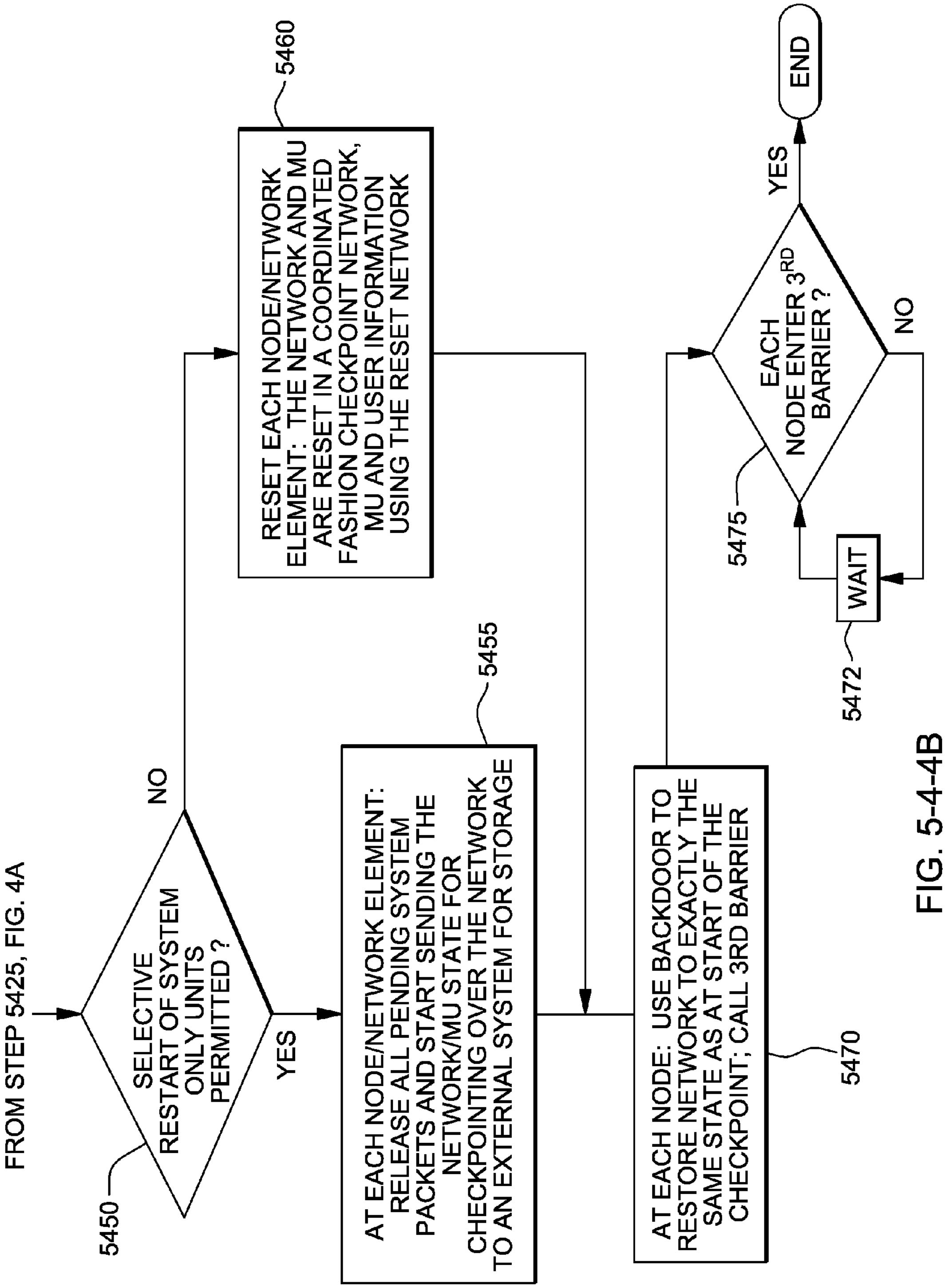
Figures 4, 5, 6:
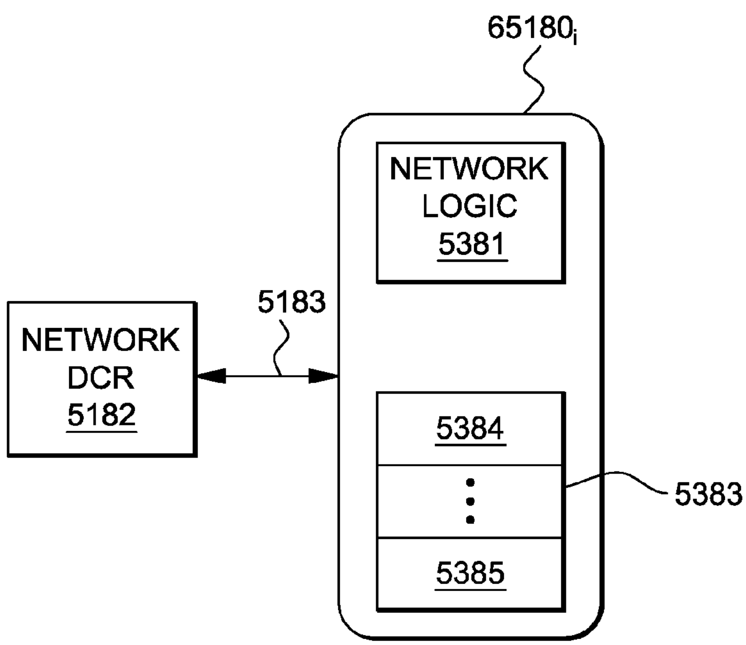
Figures 4, 5, 7:
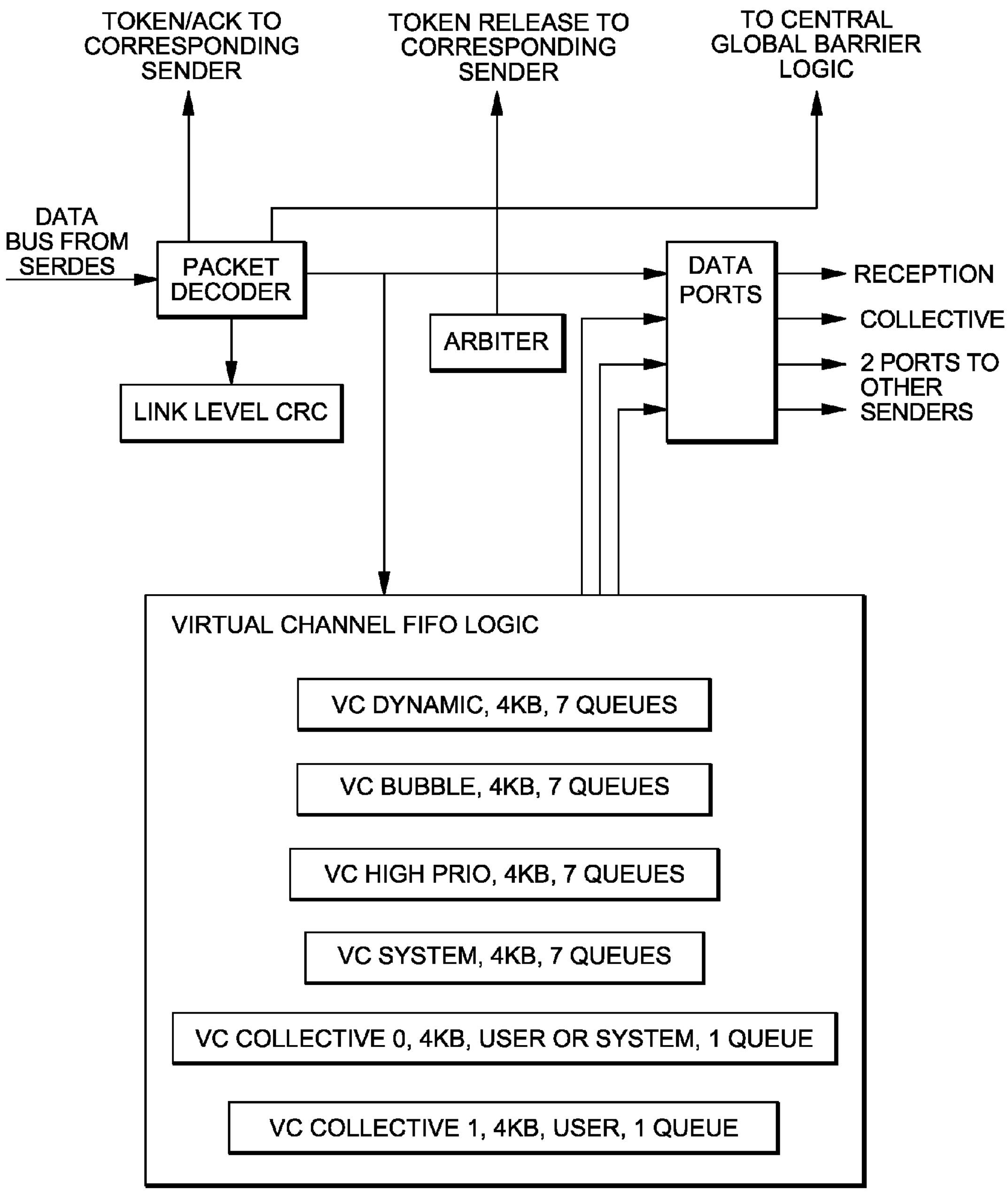
Figures 4, 5, 8:
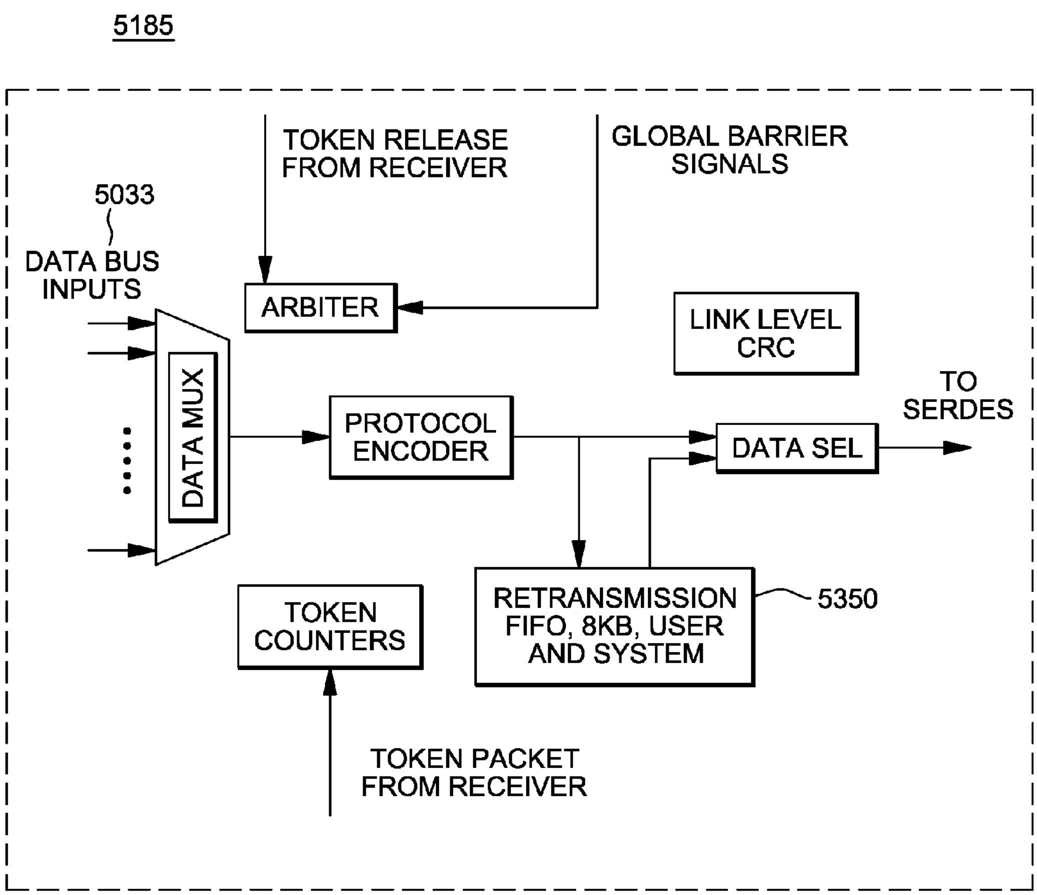
Figures 4, 5, 9:
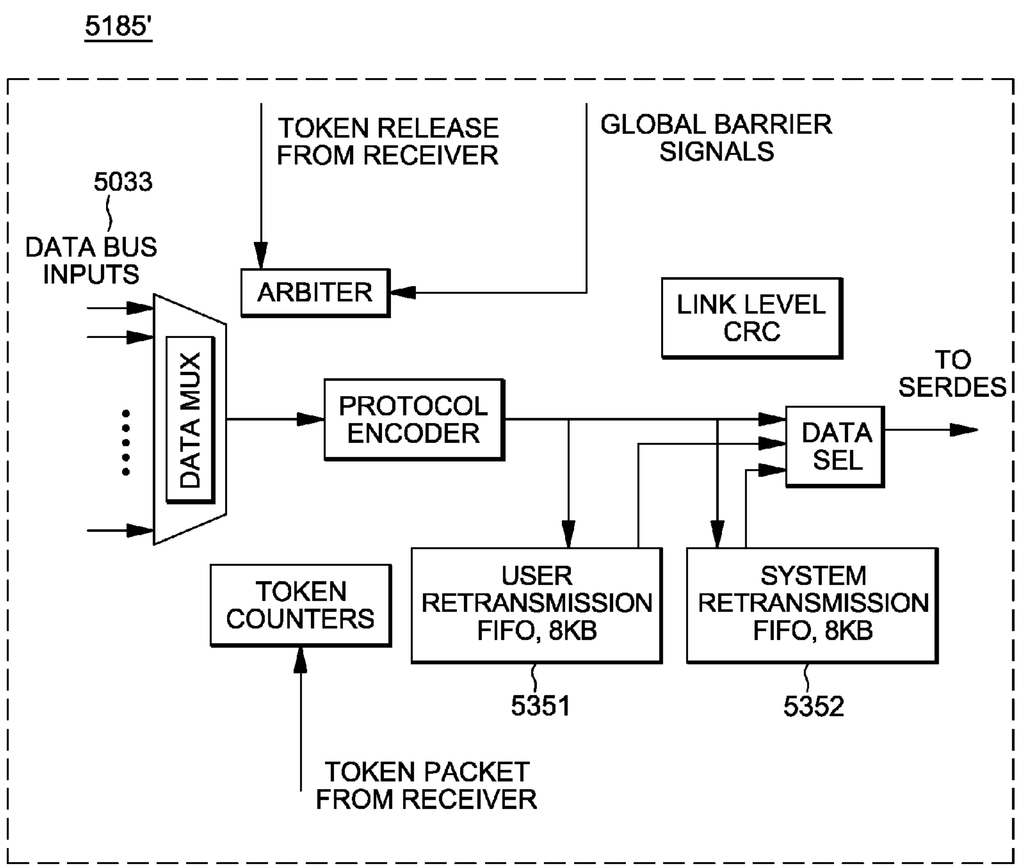
Figures 4, 5, 10:
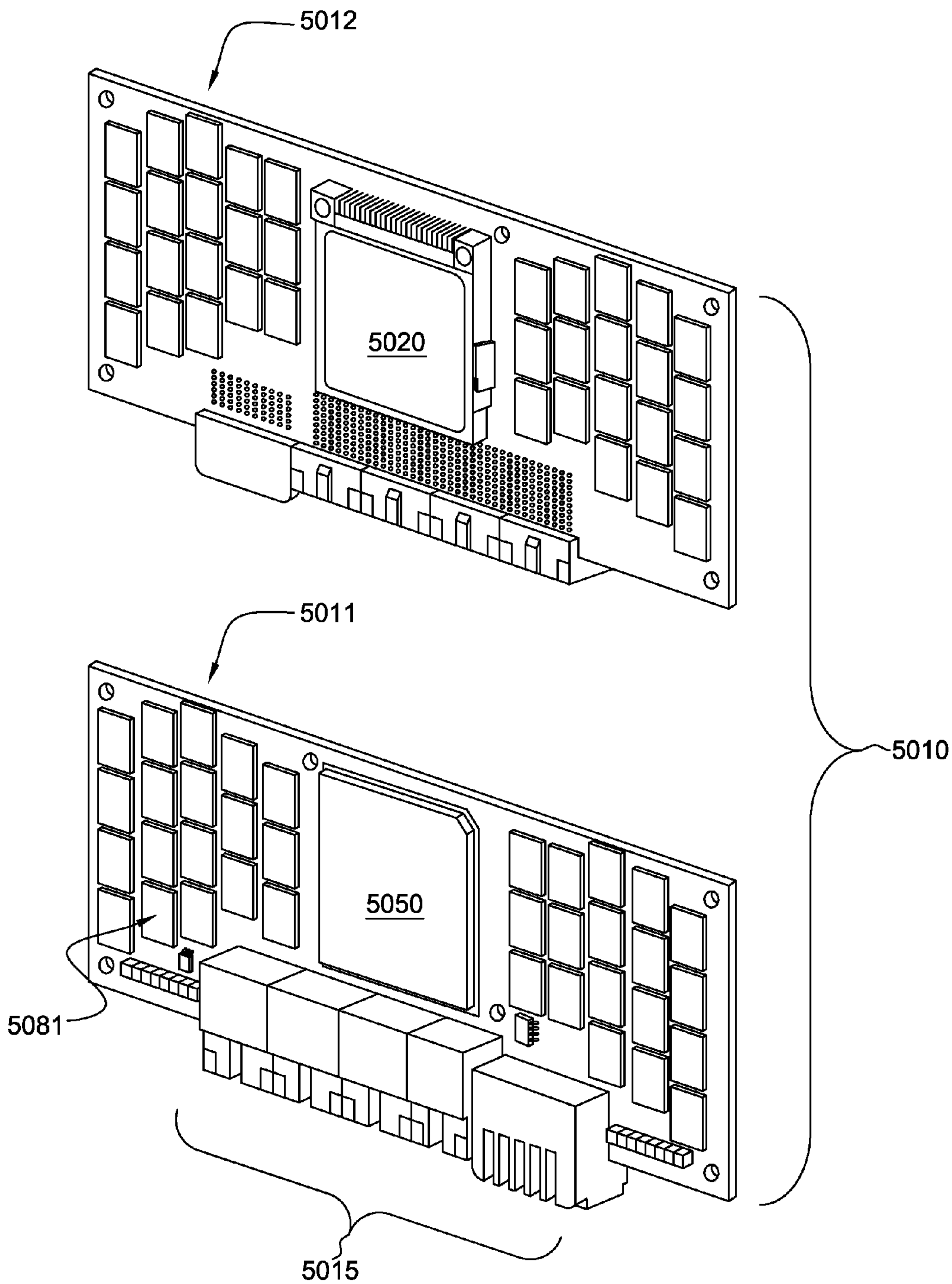
Figures 1, 5:
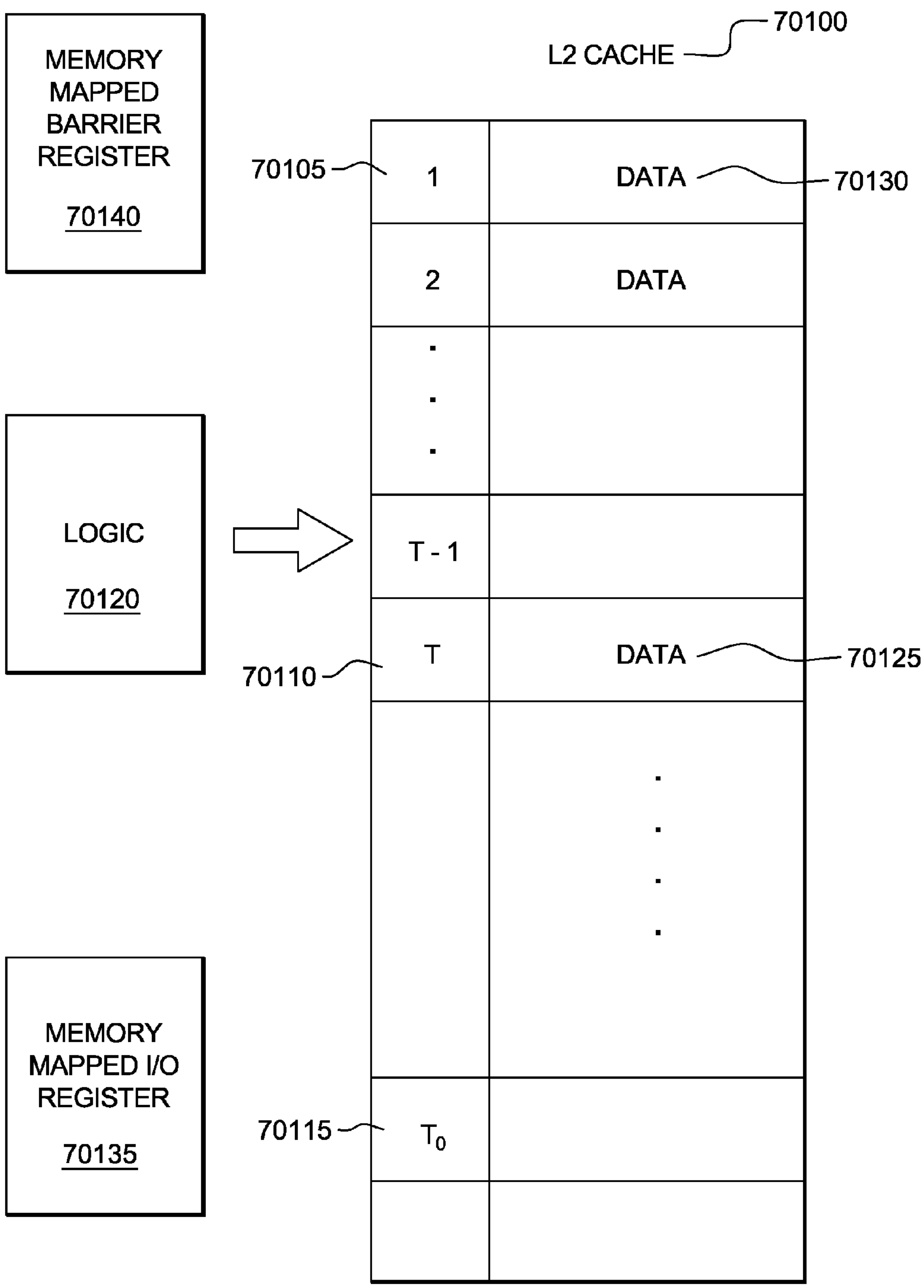
Figures 2, 5:
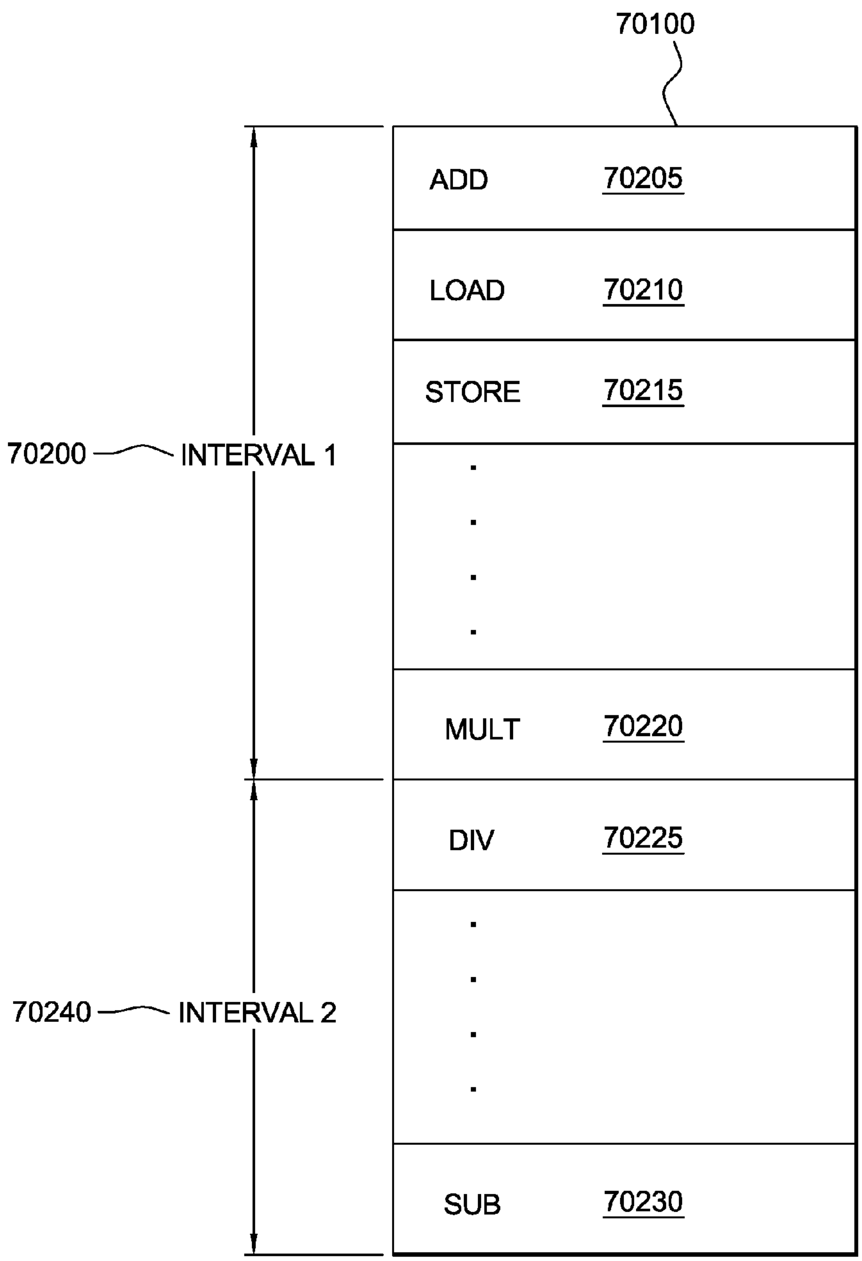
Figures 3, 5:
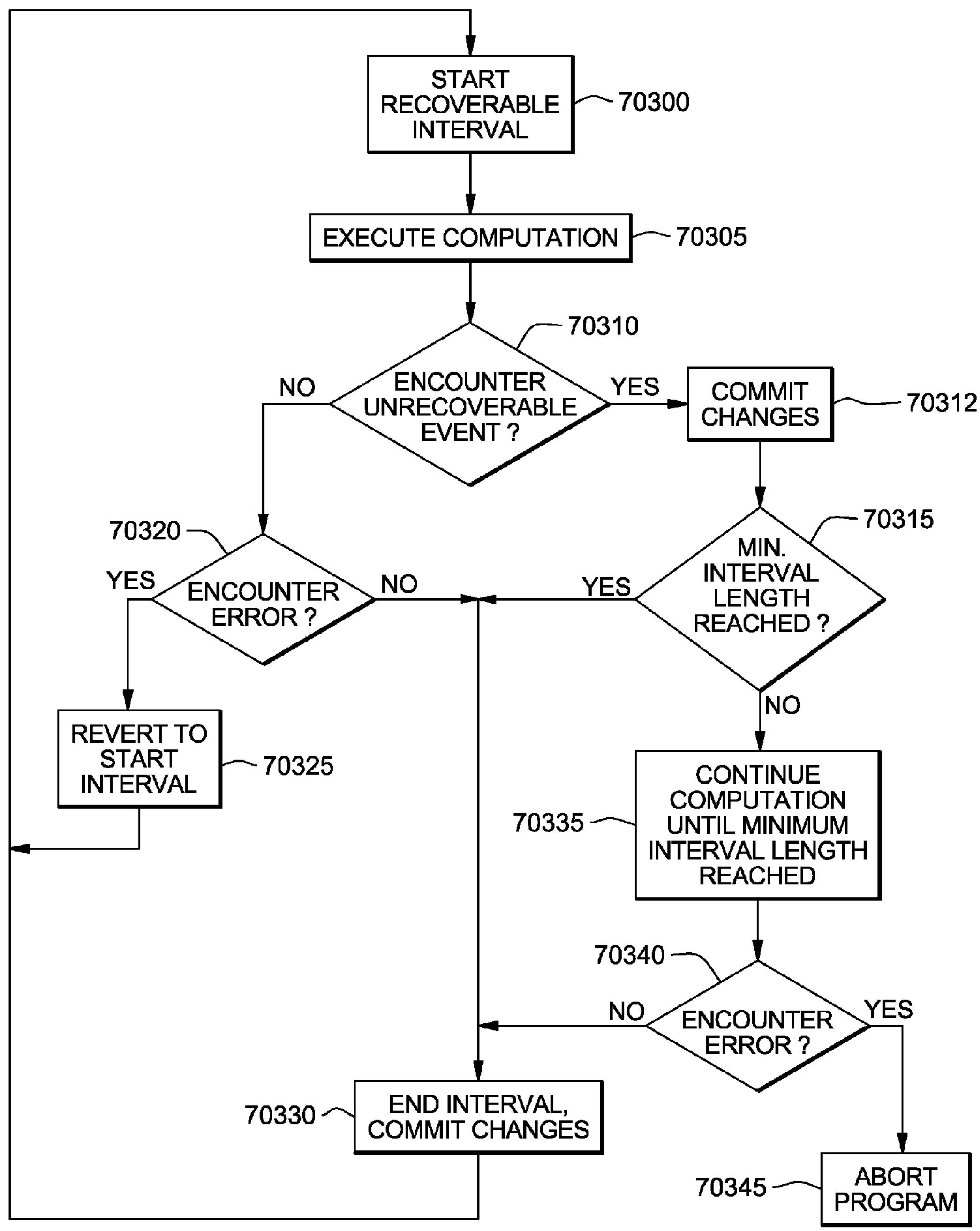
Figures 4, 5:
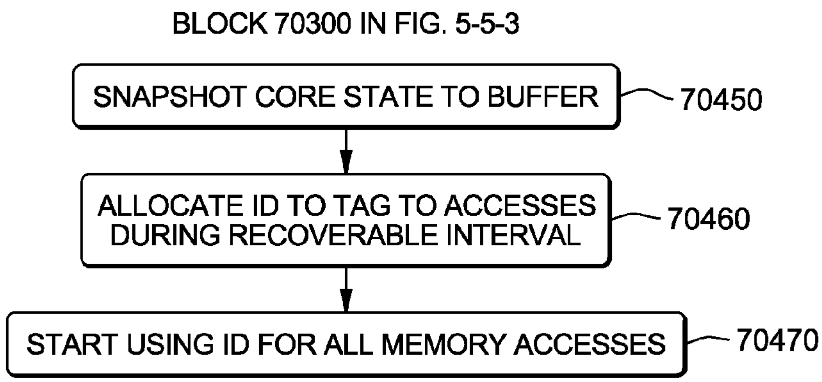
Figure 5:
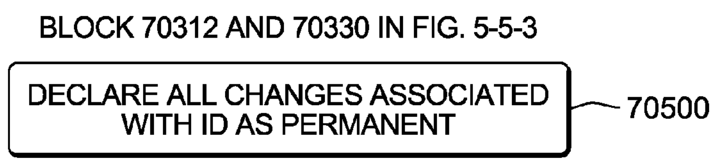
Figures 5, 6:
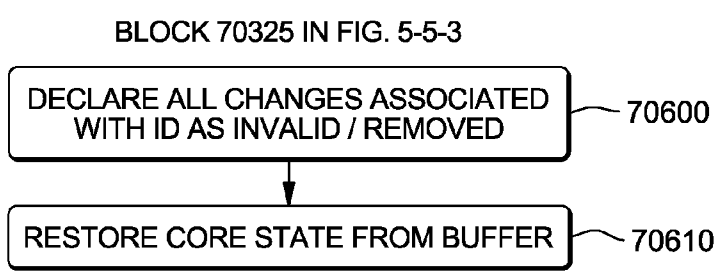
Figures 5, 15:
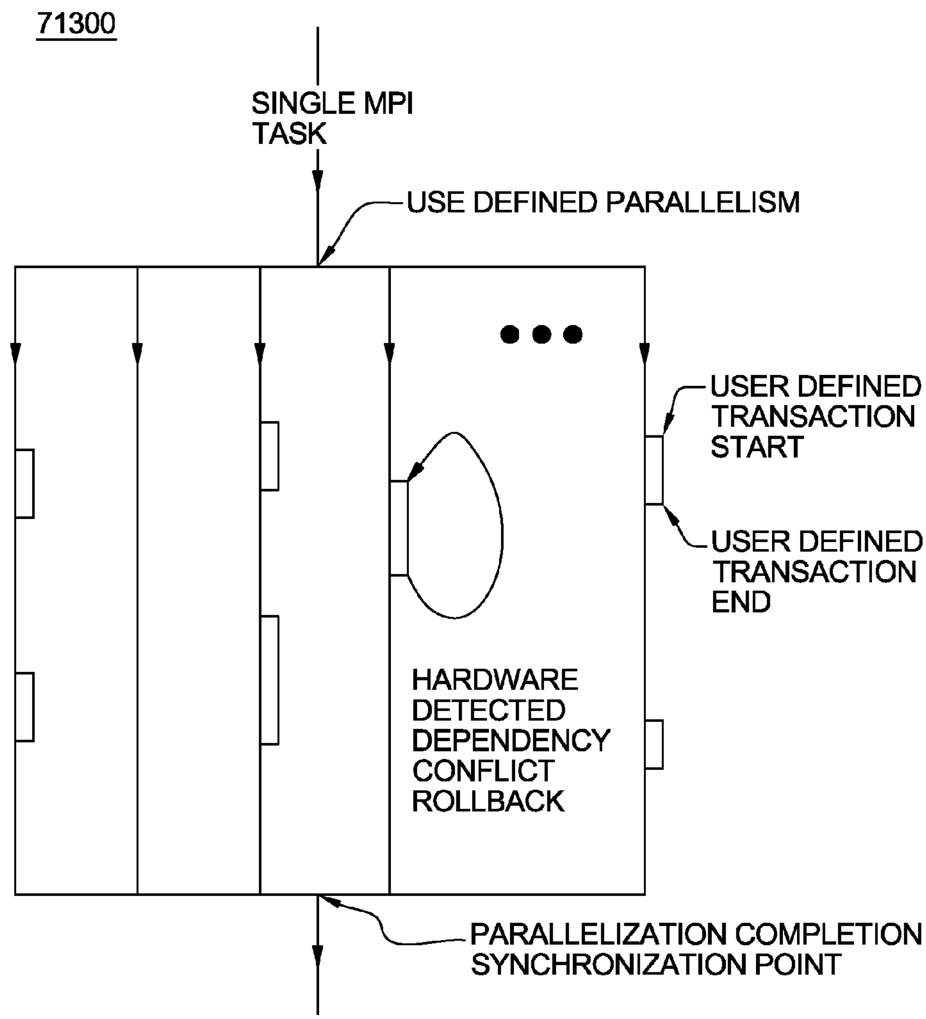
Figures 1, 5, 6:
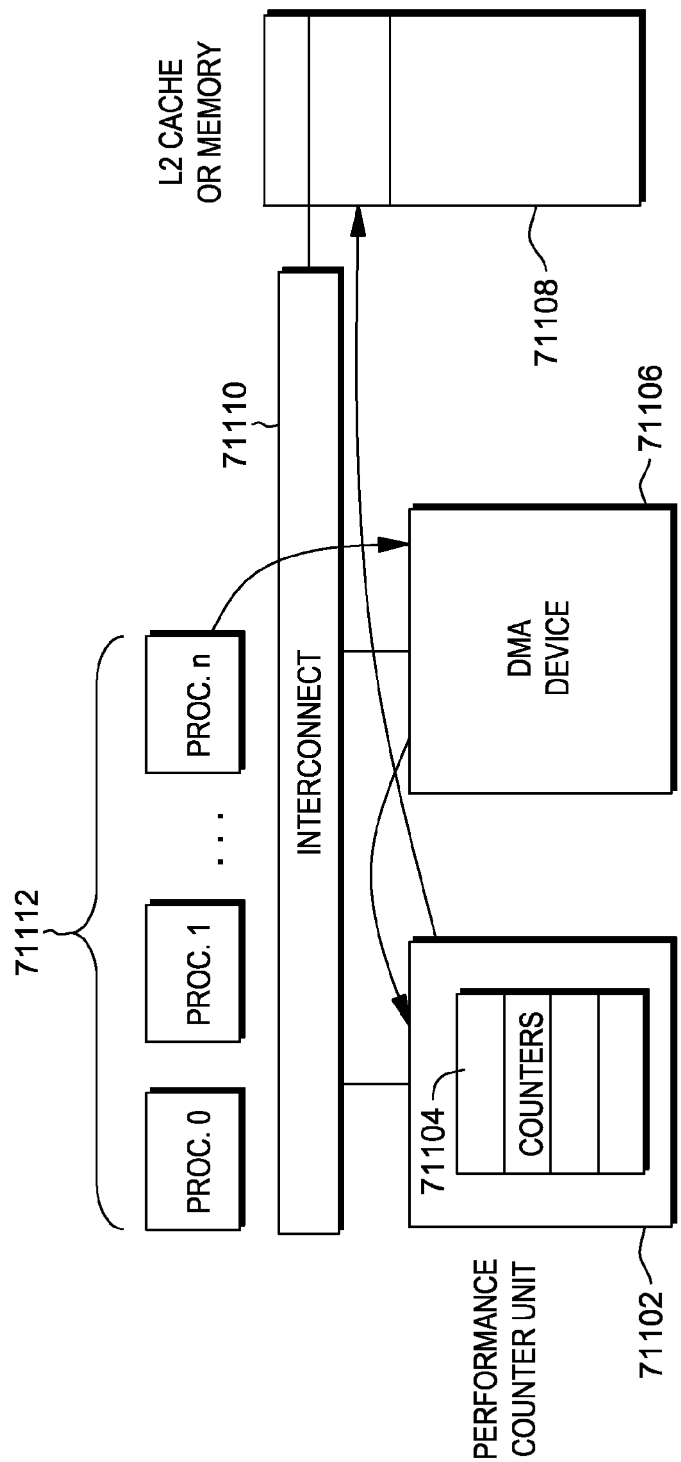
Figures 2, 5, 6:
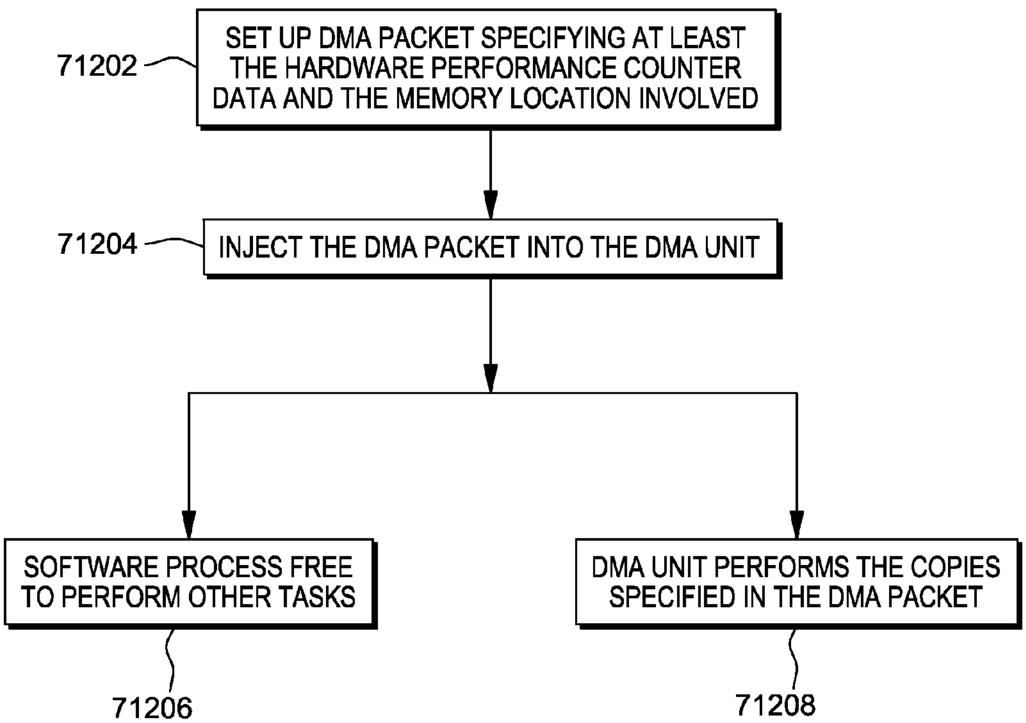
Figures 3, 5, 6:
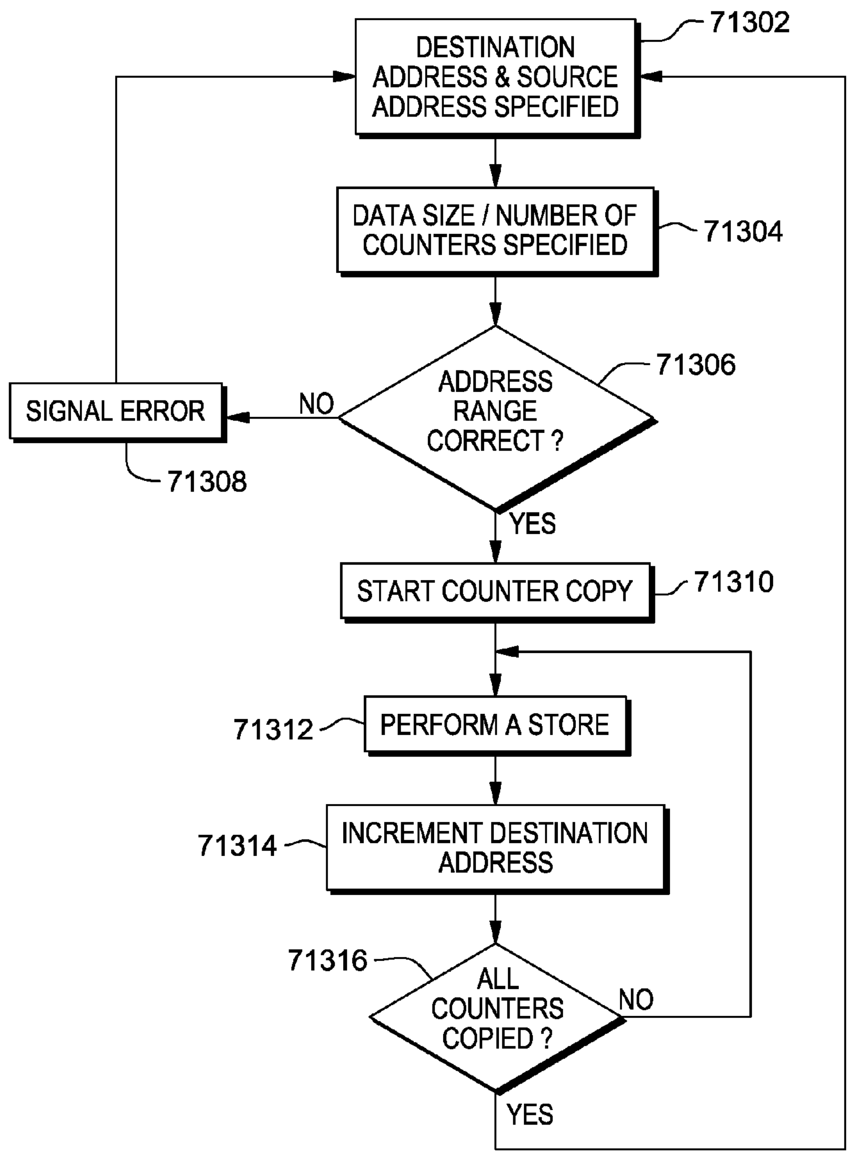
Figures 1, 5, 6, 7:
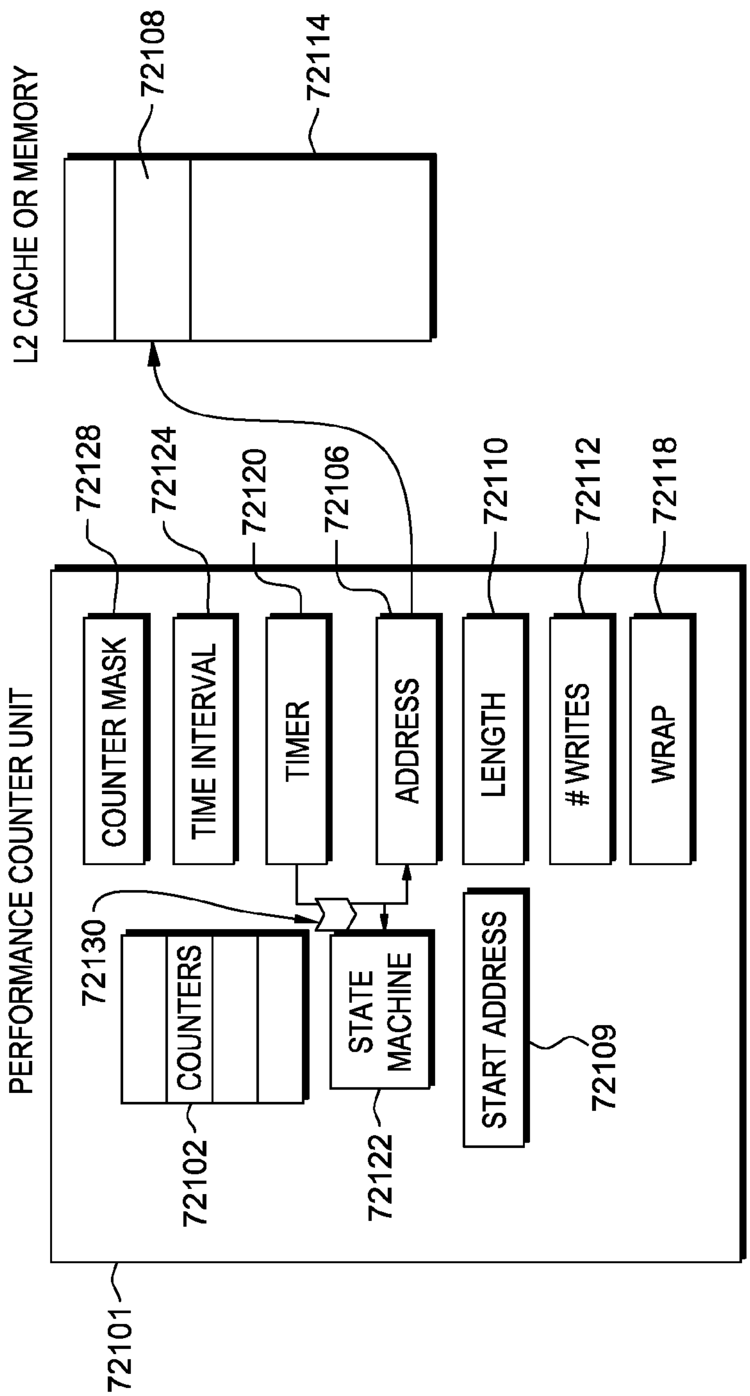
Figures 2, 5, 6, 7:
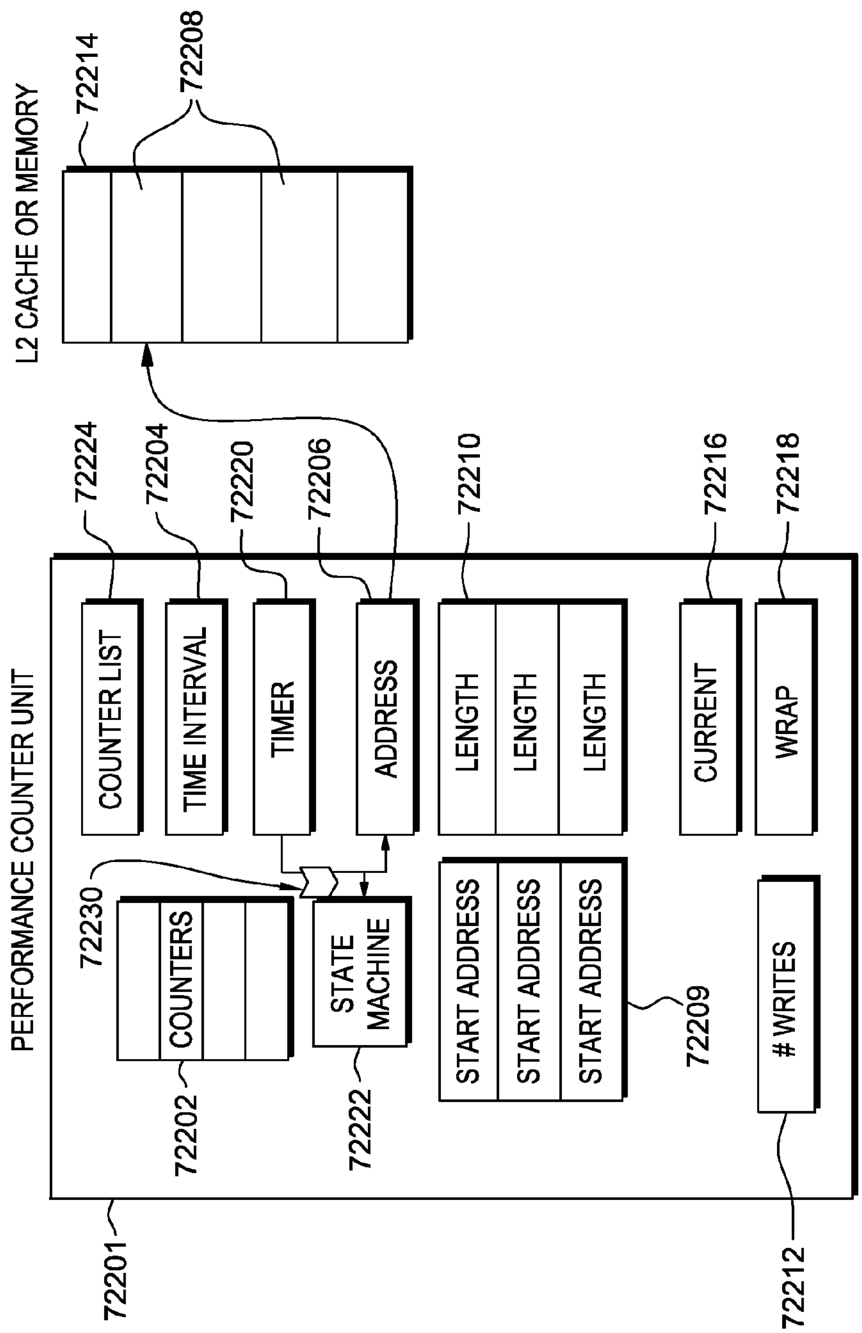
Figures 3, 5, 6, 7:
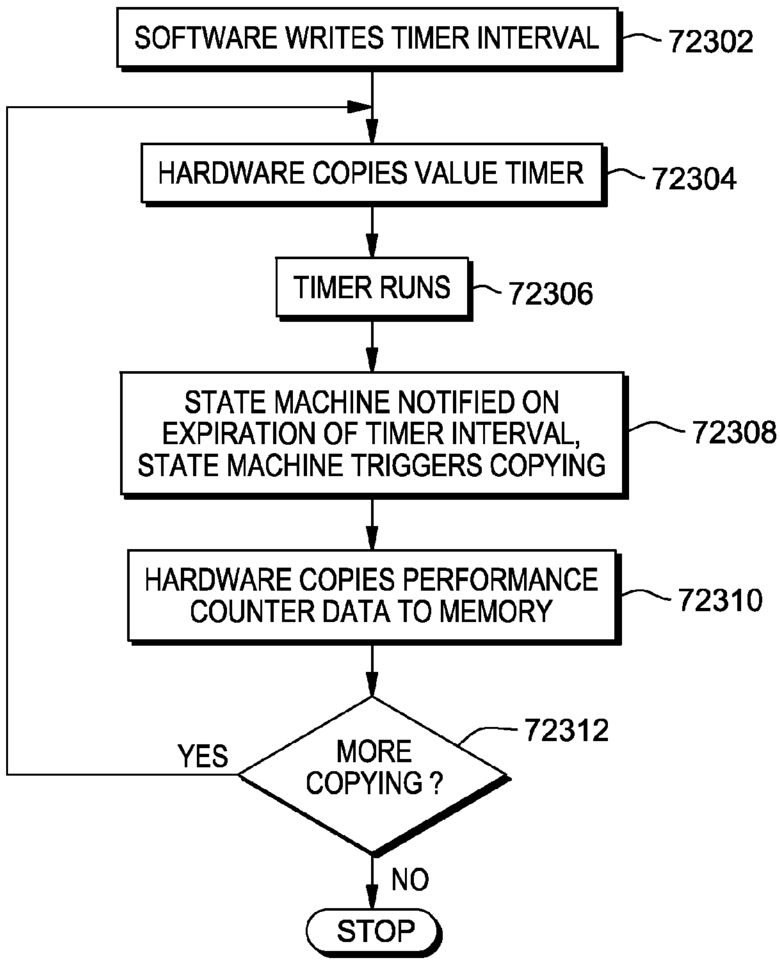
Figures 4, 5, 6, 7:
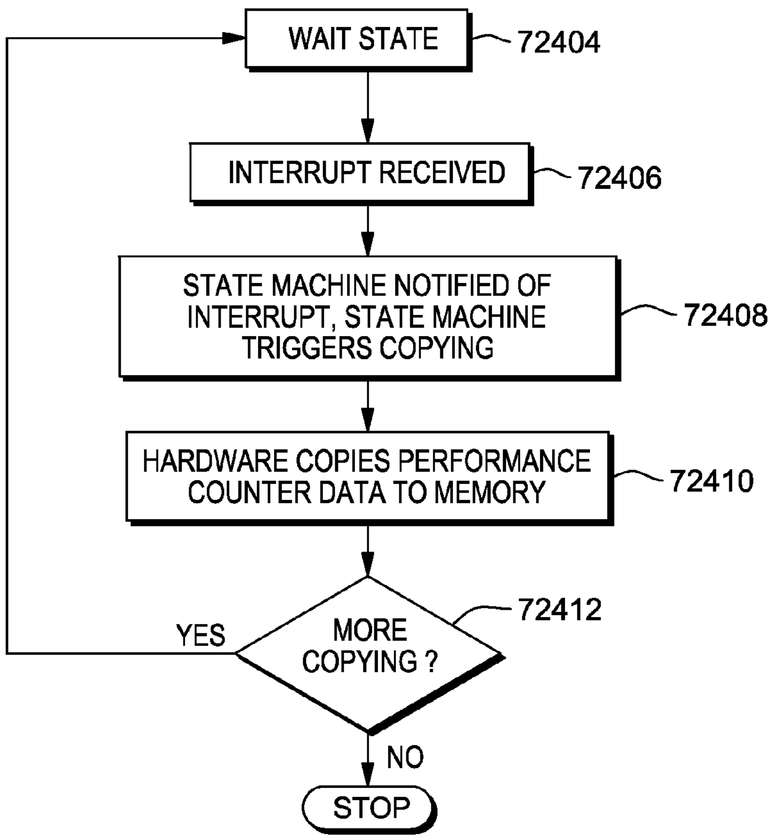
Figures 1, 5, 6, 7, 8:
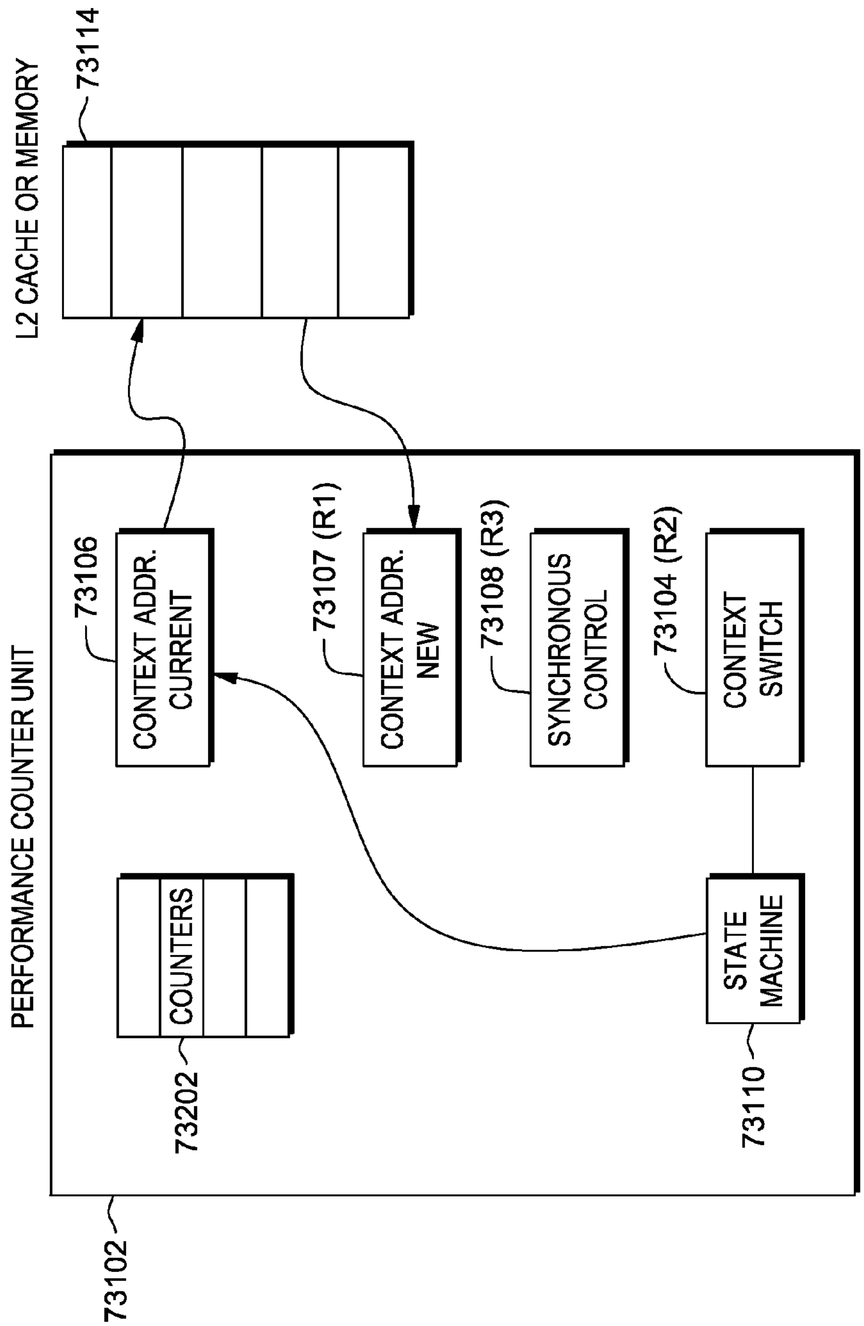
Figures 2, 5, 6, 7, 8:
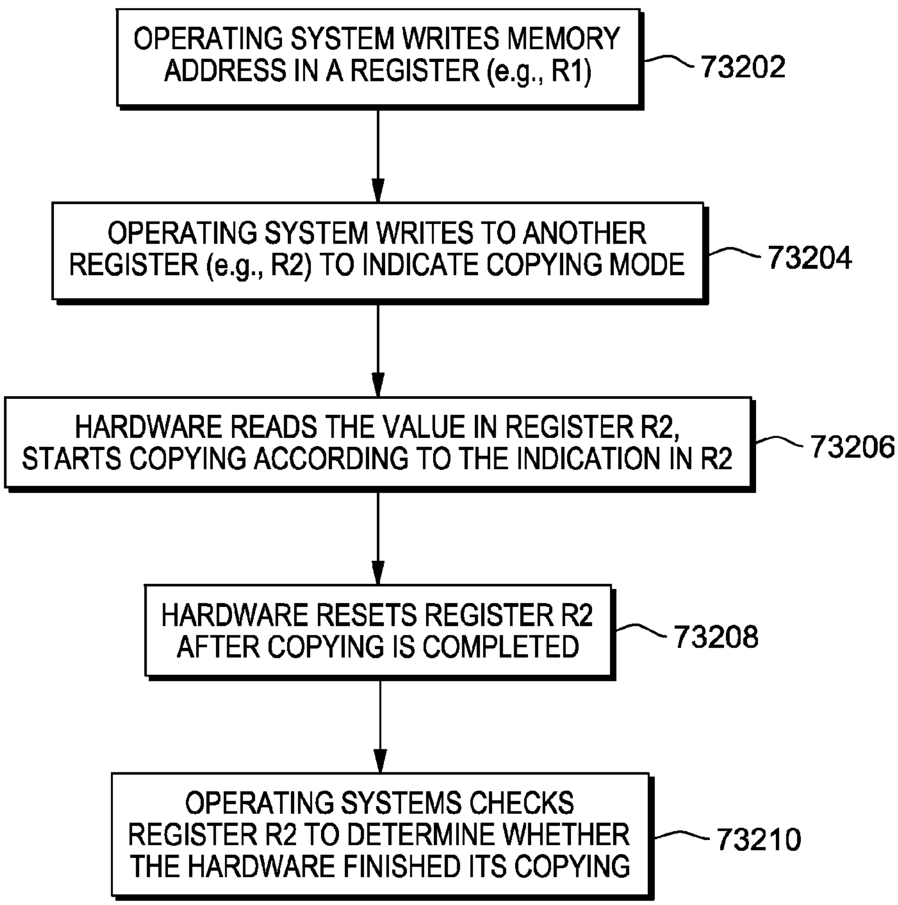
Figures 3, 5, 6, 7, 8:
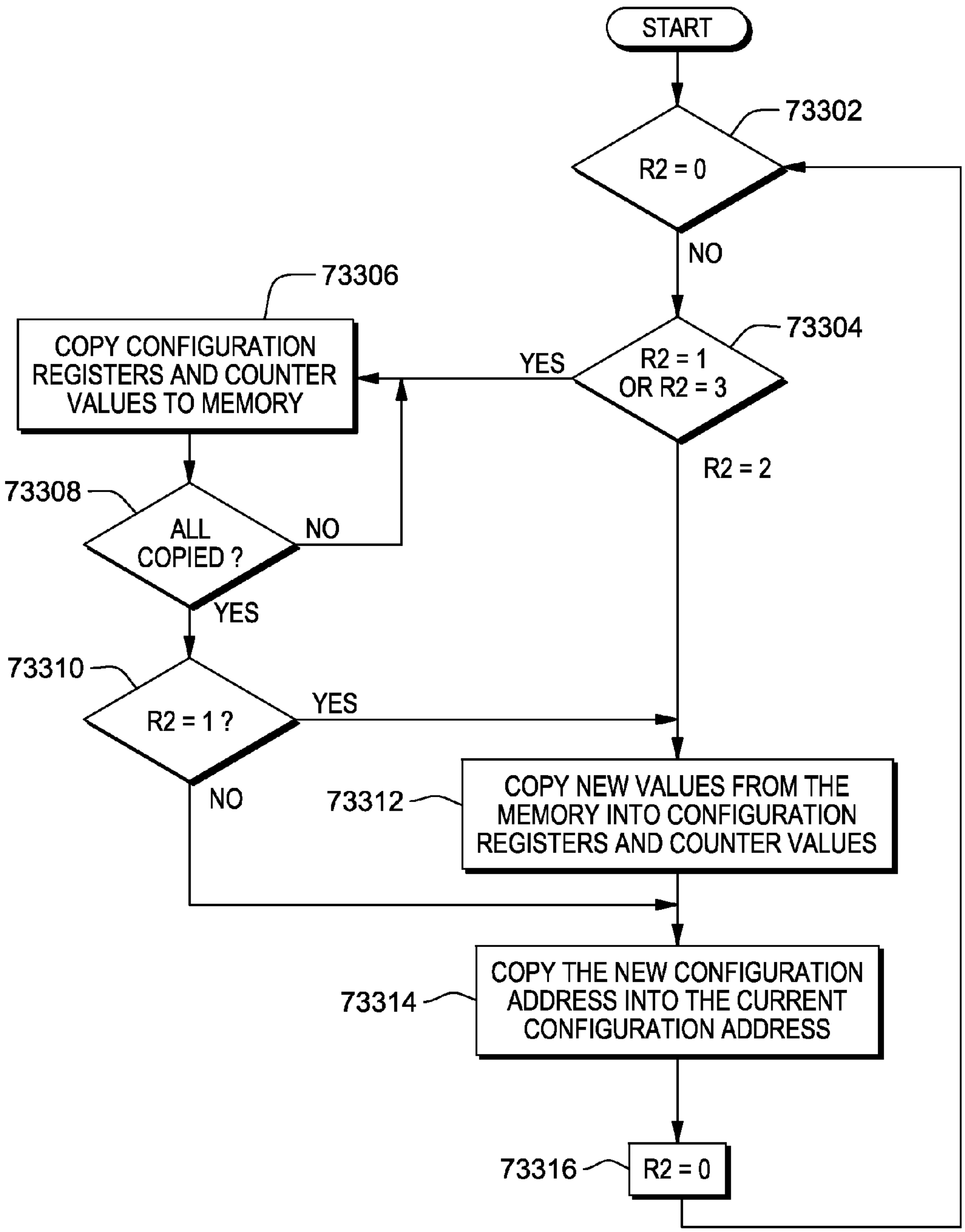
Figures 1, 5, 6, 7, 8, 9:
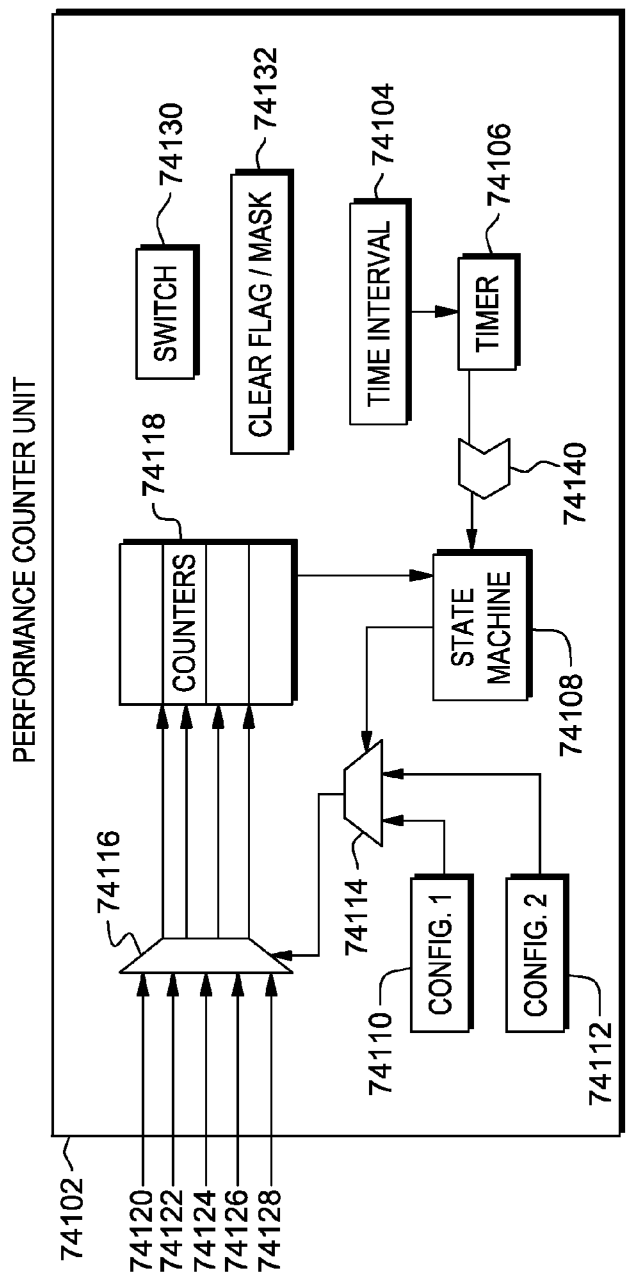
Figures 2, 5, 6, 7, 8, 9:
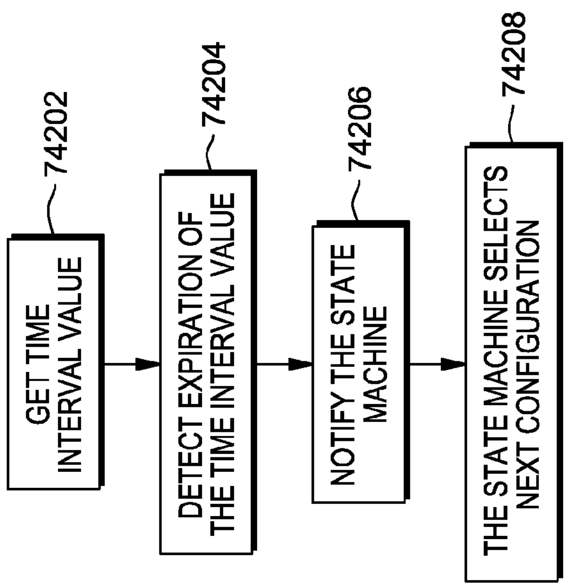
Figures 3, 5, 6, 7, 8, 9:
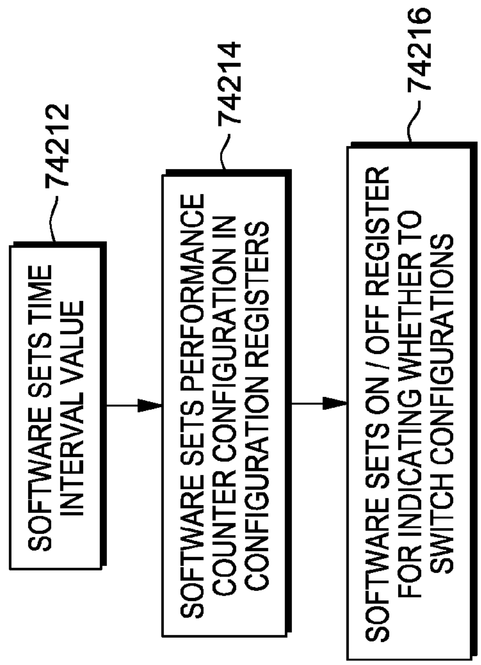
Figures 1, 5, 6, 7, 8, 9, 10:
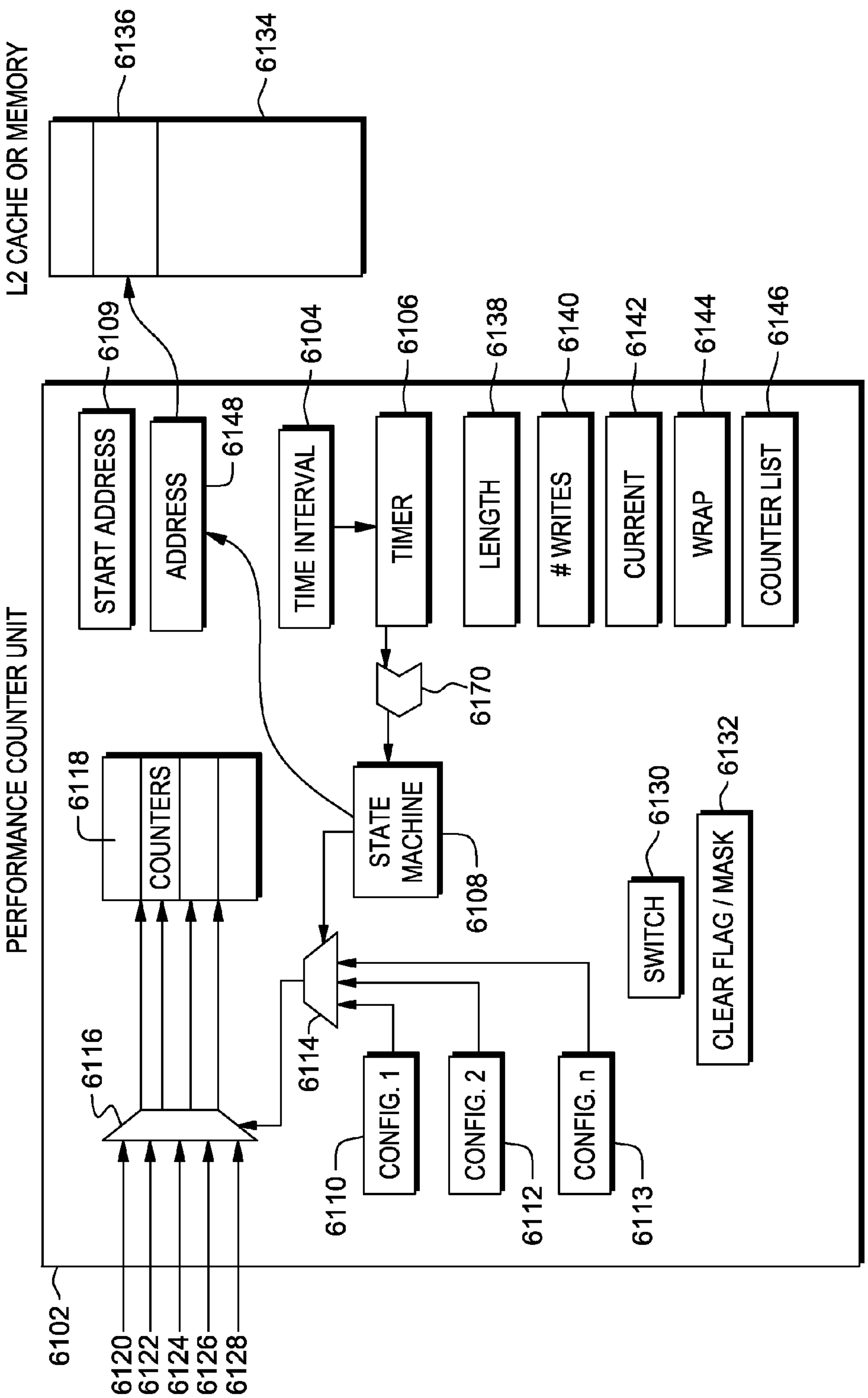
Figures 2, 5, 6, 7, 8, 9, 10:
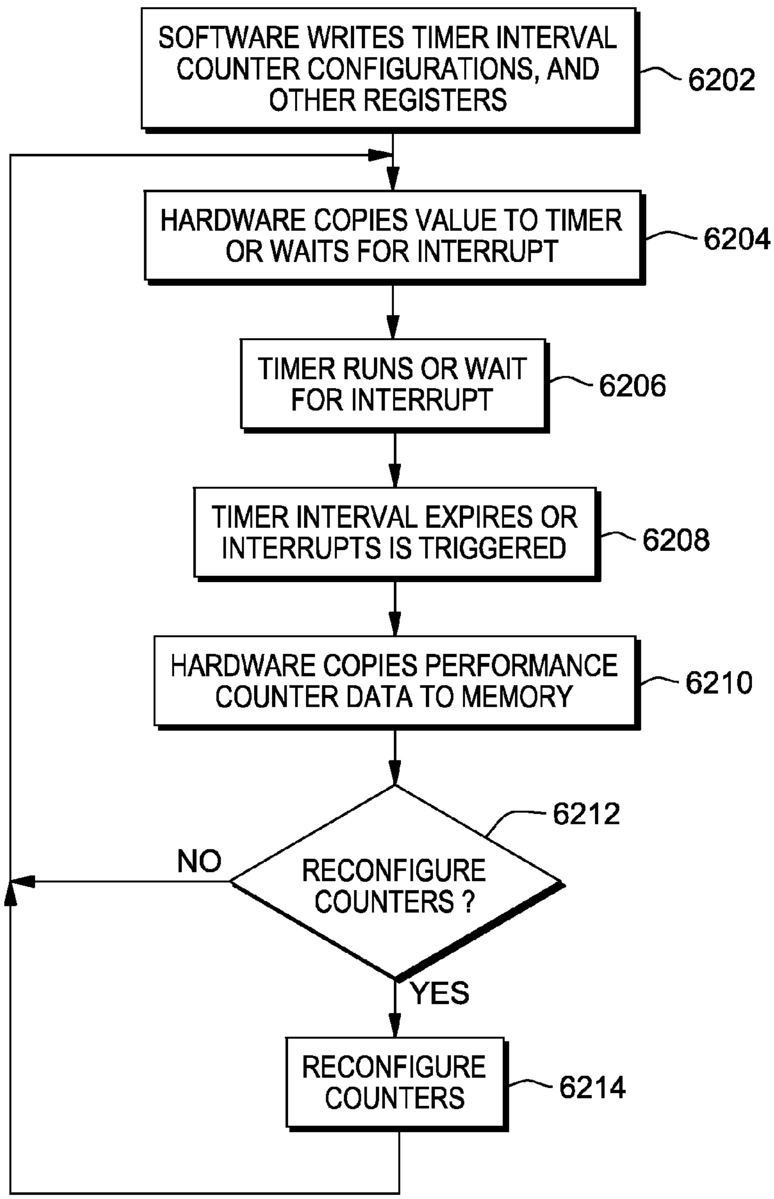
Figures 3, 5, 6, 7, 8, 9, 10:
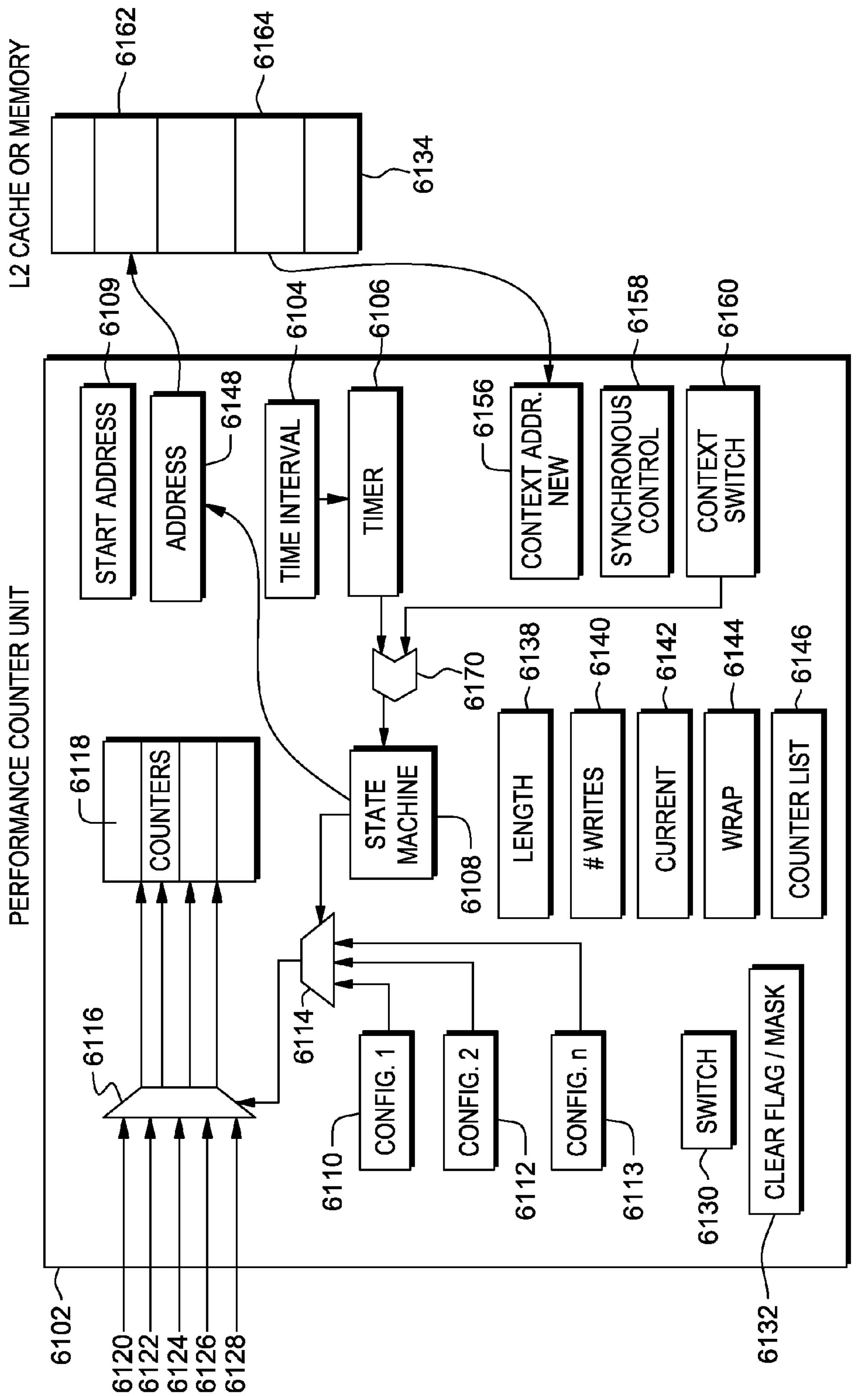
Figures 4, 5, 6, 7, 8, 9, 10:
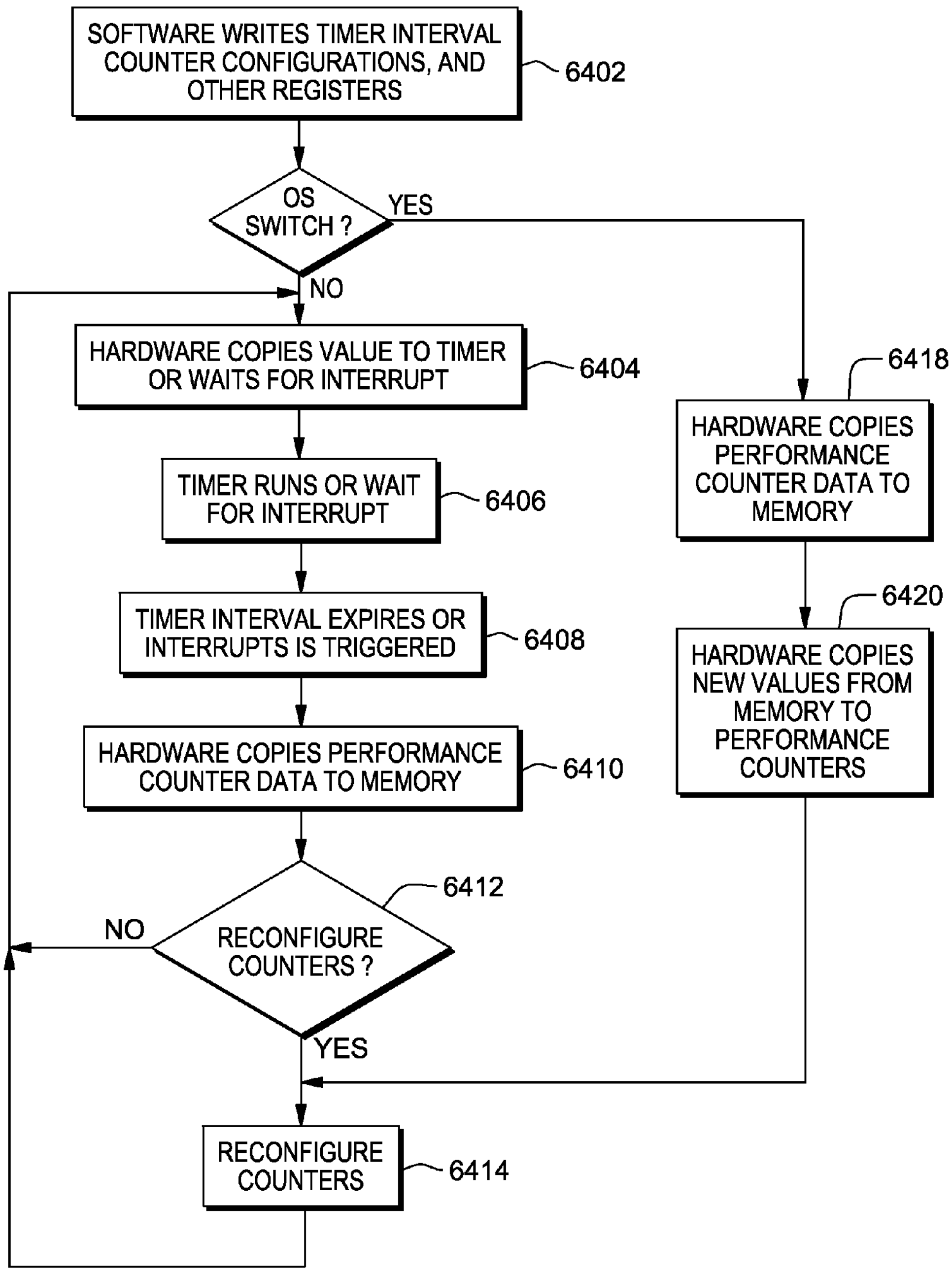
Figures 1, 5, 6, 7, 8, 9, 10, 11:
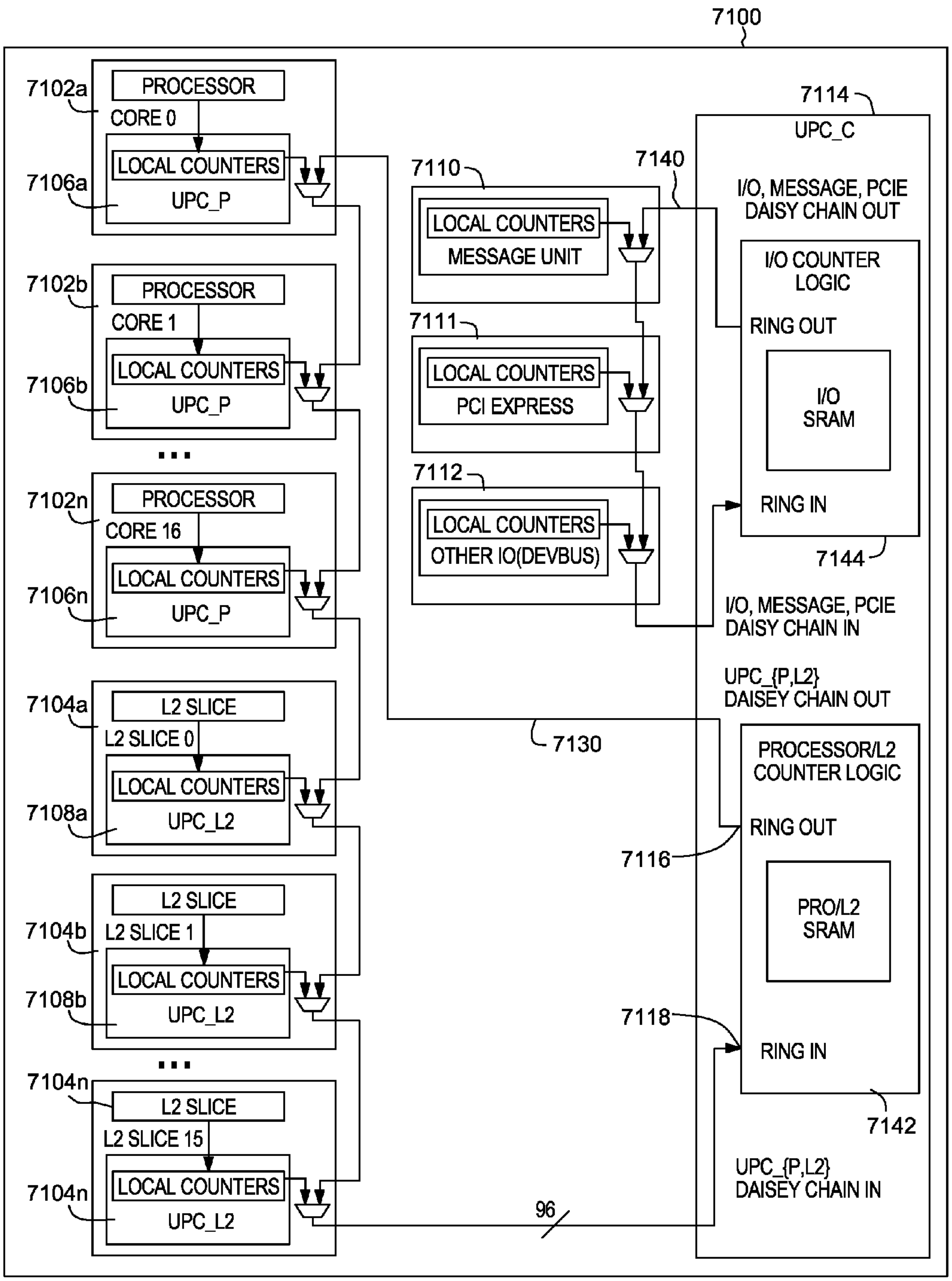
Figures 2, 5, 6, 7, 8, 9, 10, 11:
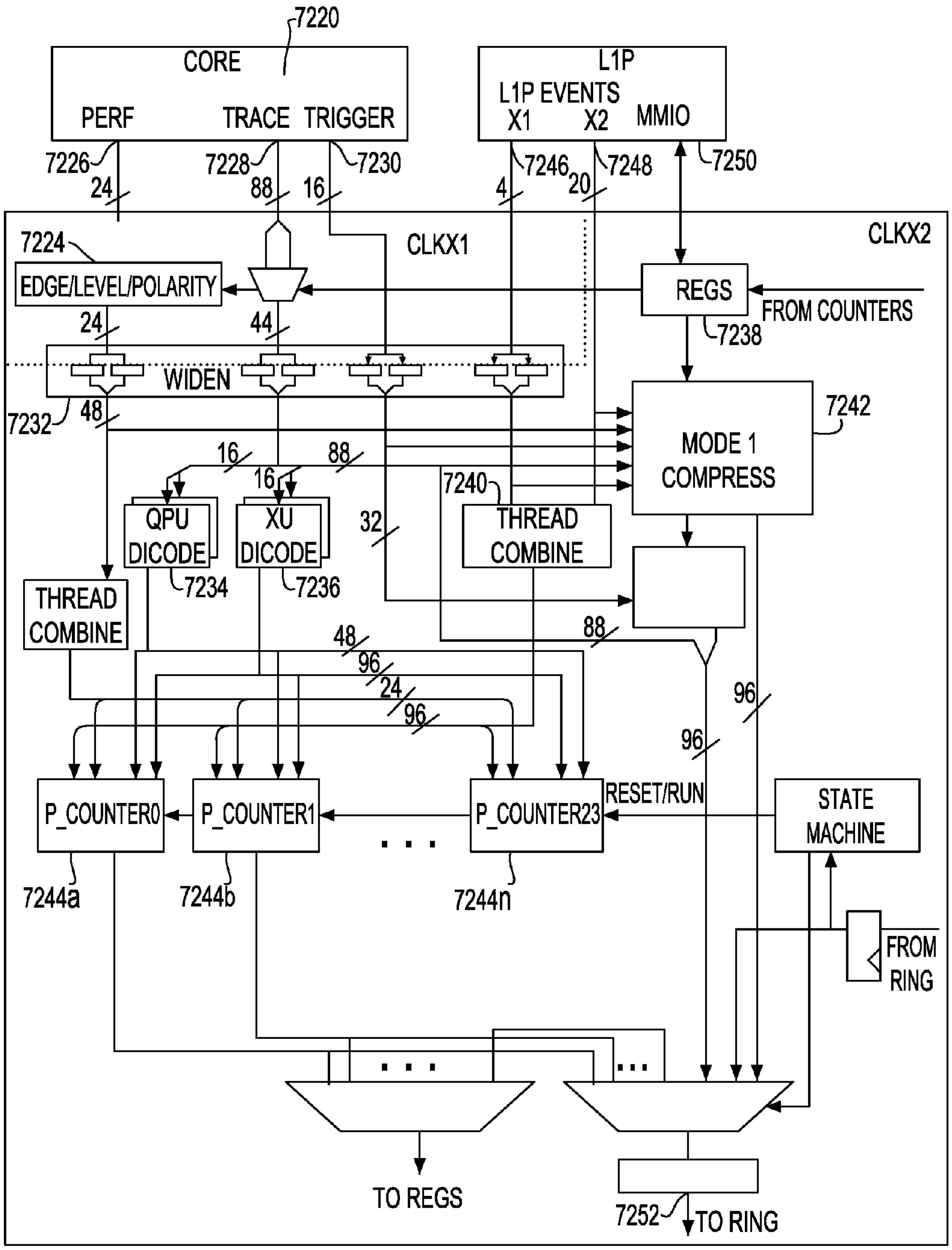
Figures 3, 5, 6, 7, 8, 9, 10, 11:
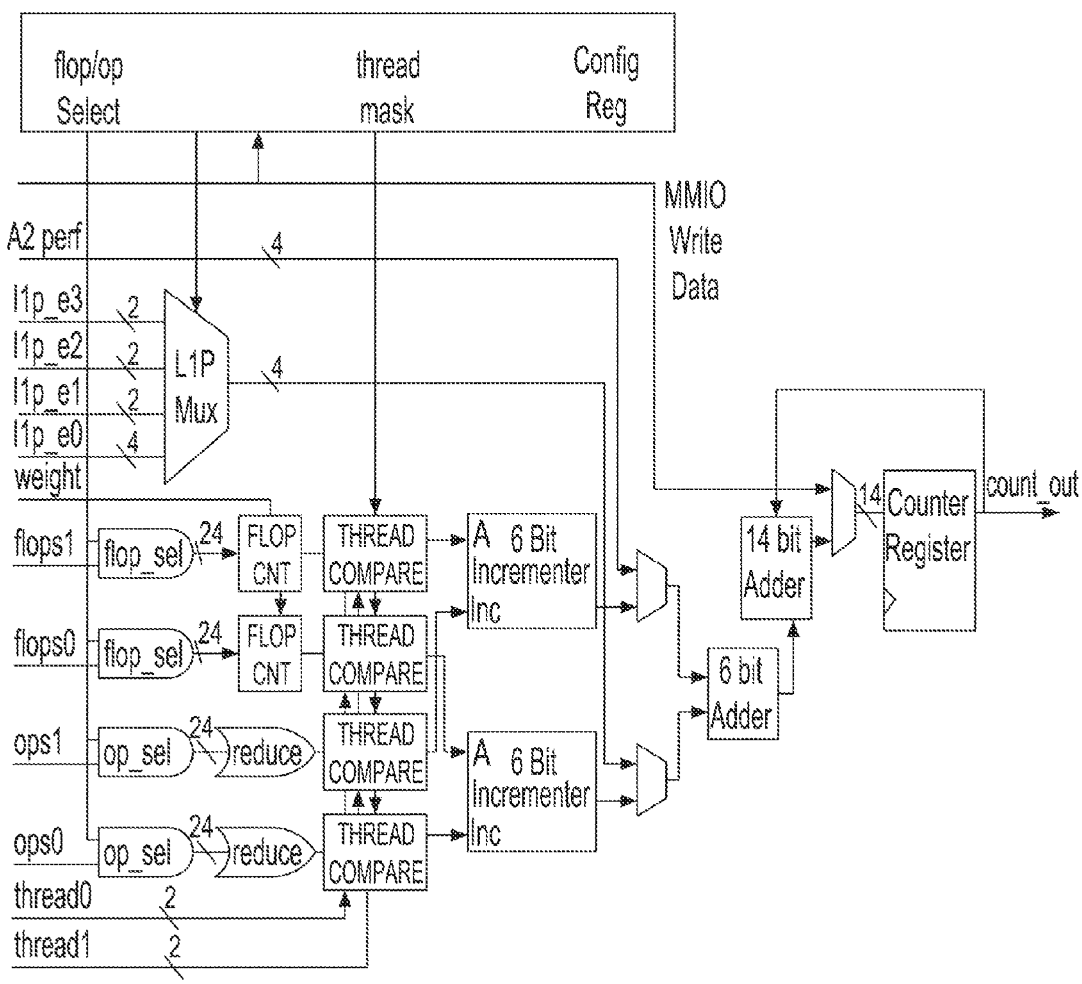
Figures 4, 5, 6, 7, 8, 9, 10, 11:
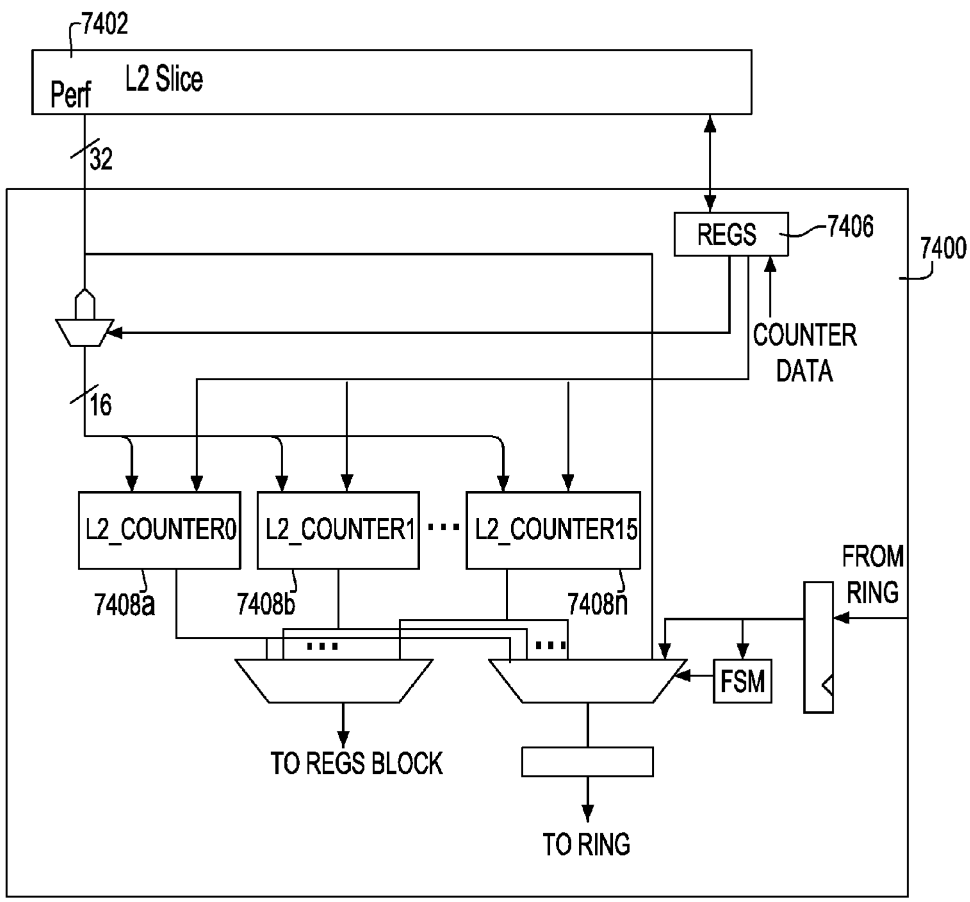
Figures 5, 6, 7, 8, 9, 10, 11:
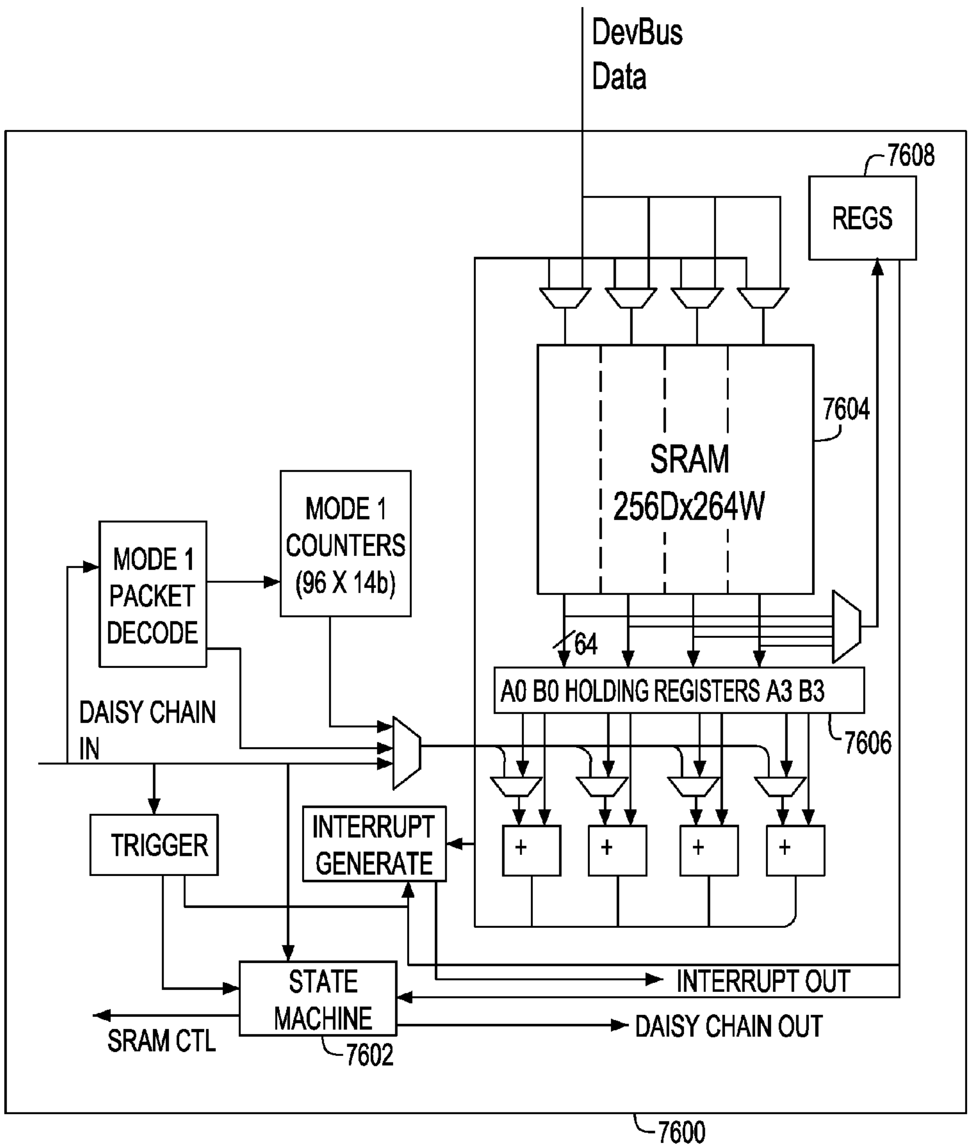
Figures 5, 6, 7, 8, 9, 10, 11:
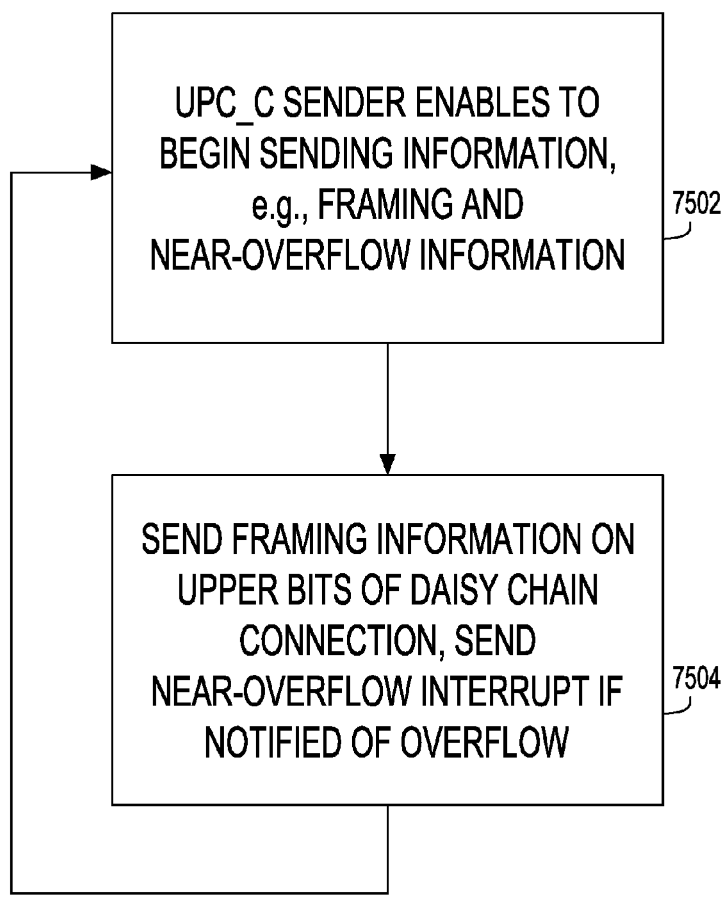
Figures 5, 6, 7, 8, 9, 10, 11:
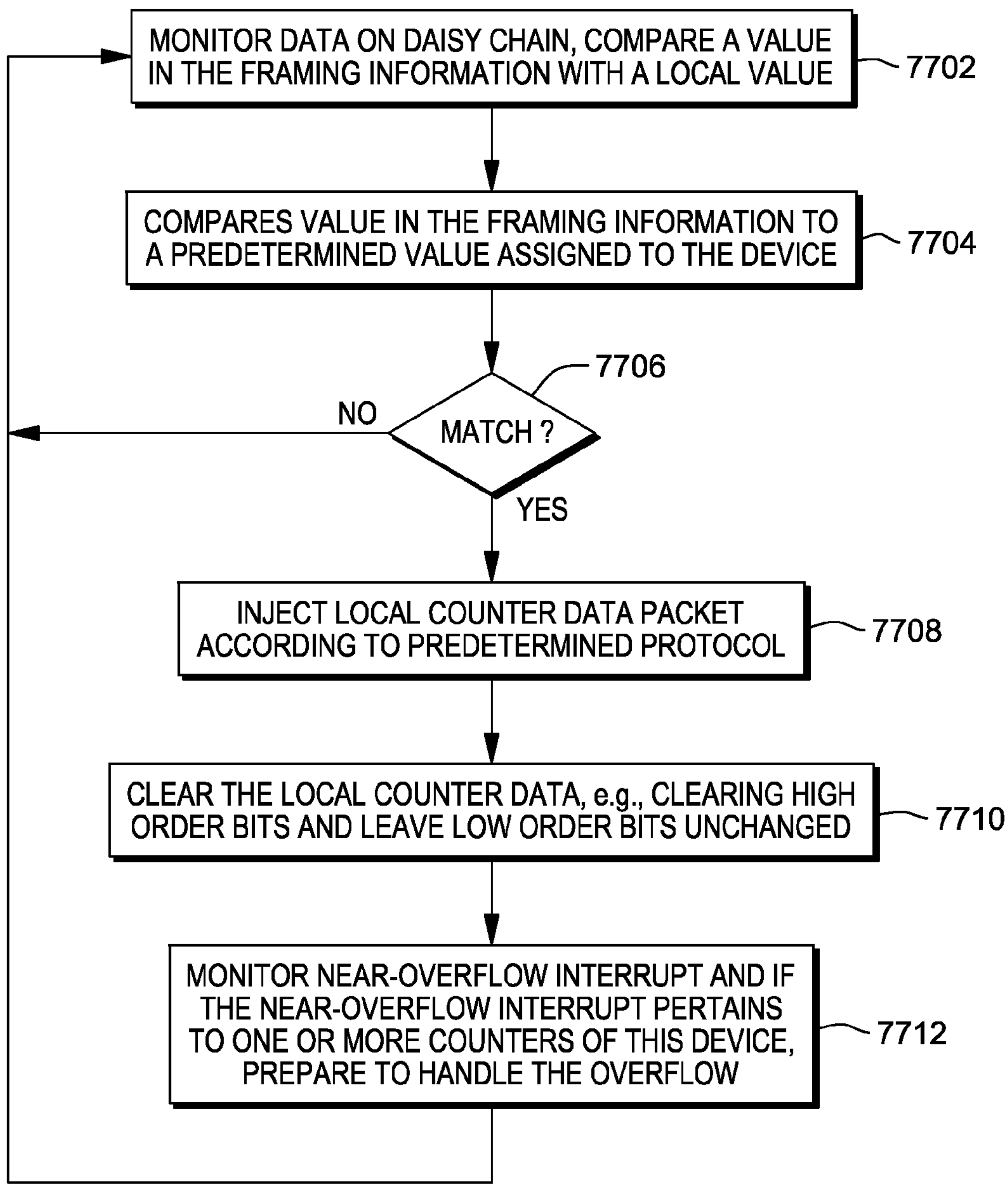
Figures 5, 6, 7, 8, 9, 10, 11:
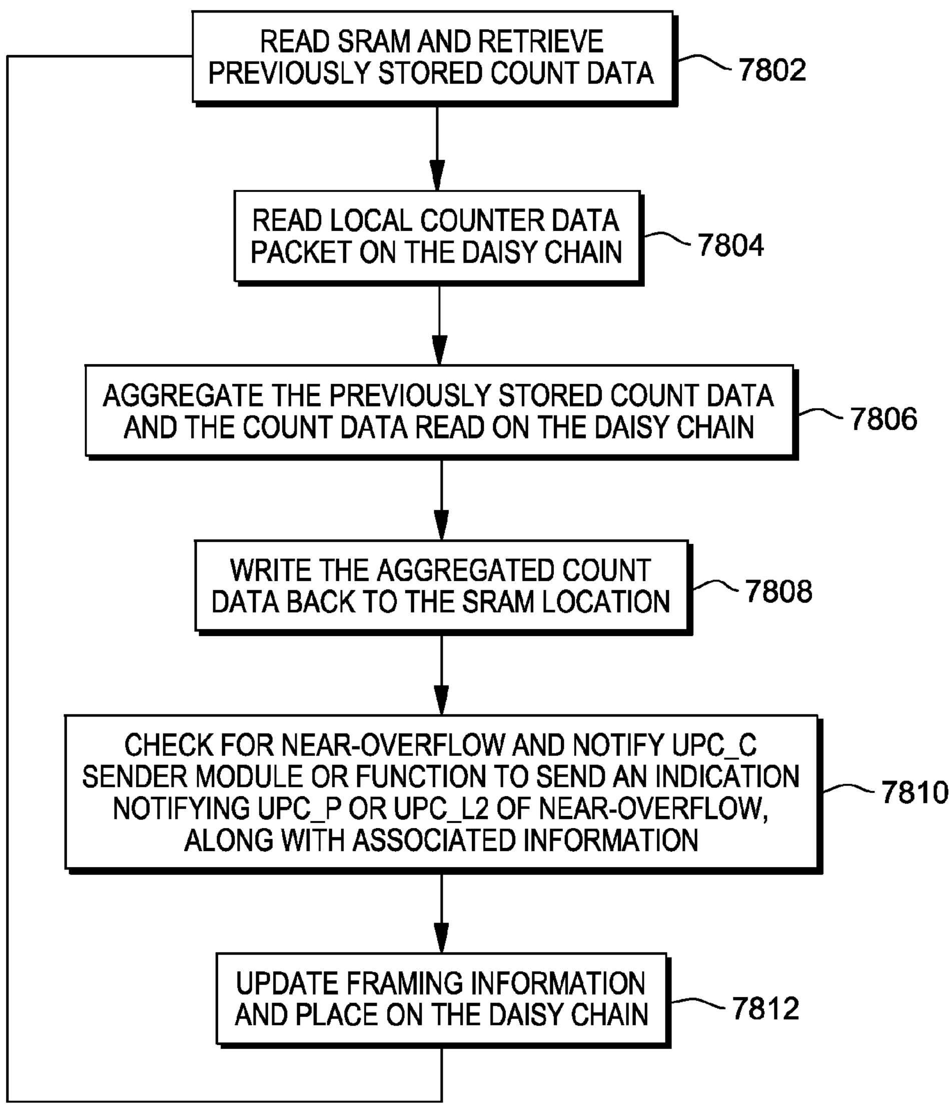
Figures 5, 6, 7, 8, 9, 10, 11, 12:
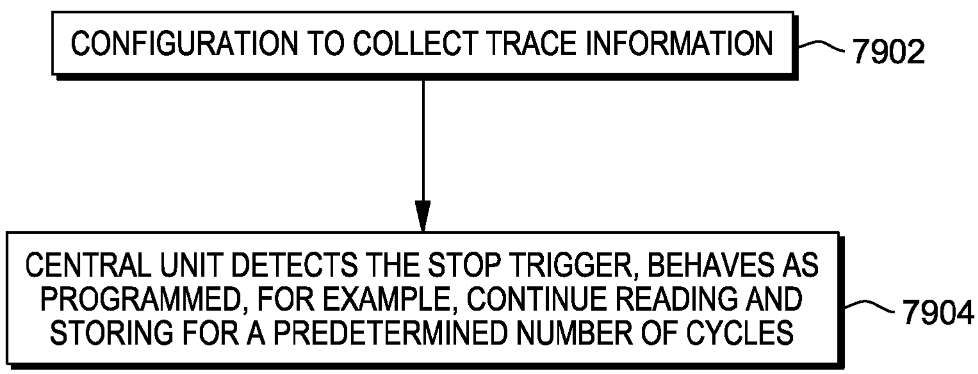
Figures 1, 5, 6, 7, 8, 9, 10, 11, 12:
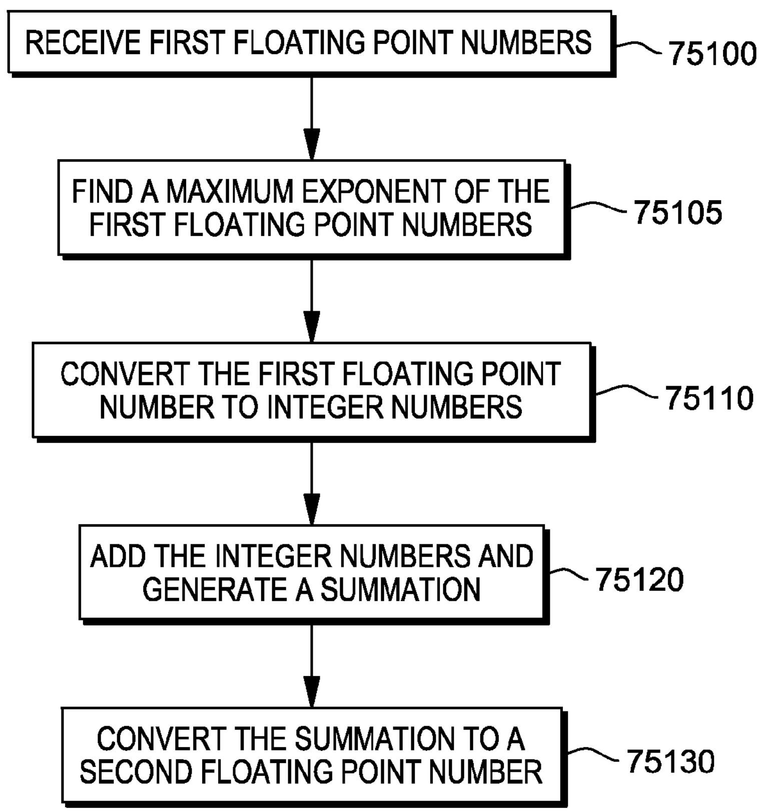
Figures 2, 5, 6, 7, 8, 9, 10, 11, 12:
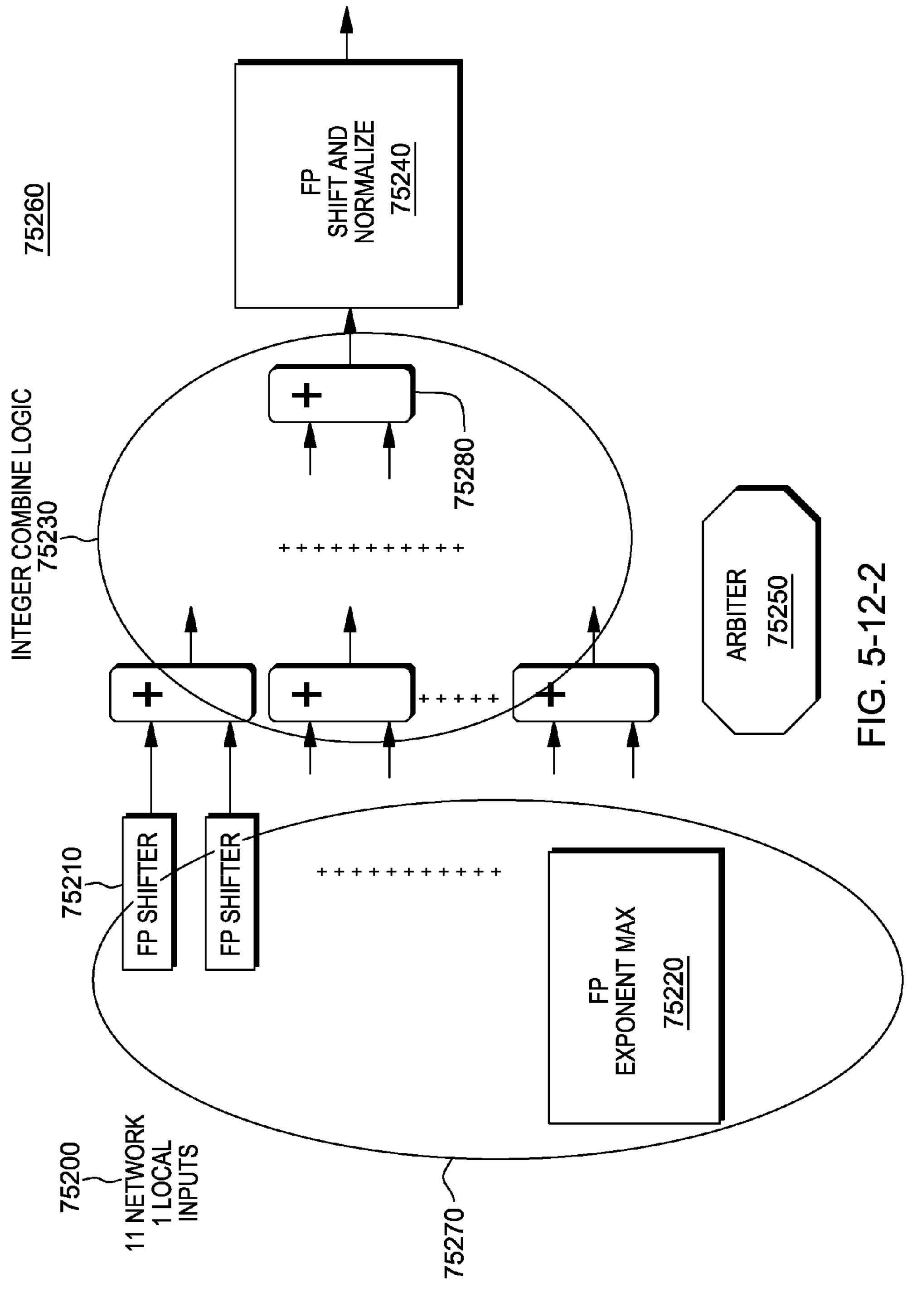
Figures 3, 5, 6, 7, 8, 9, 10, 11, 12:
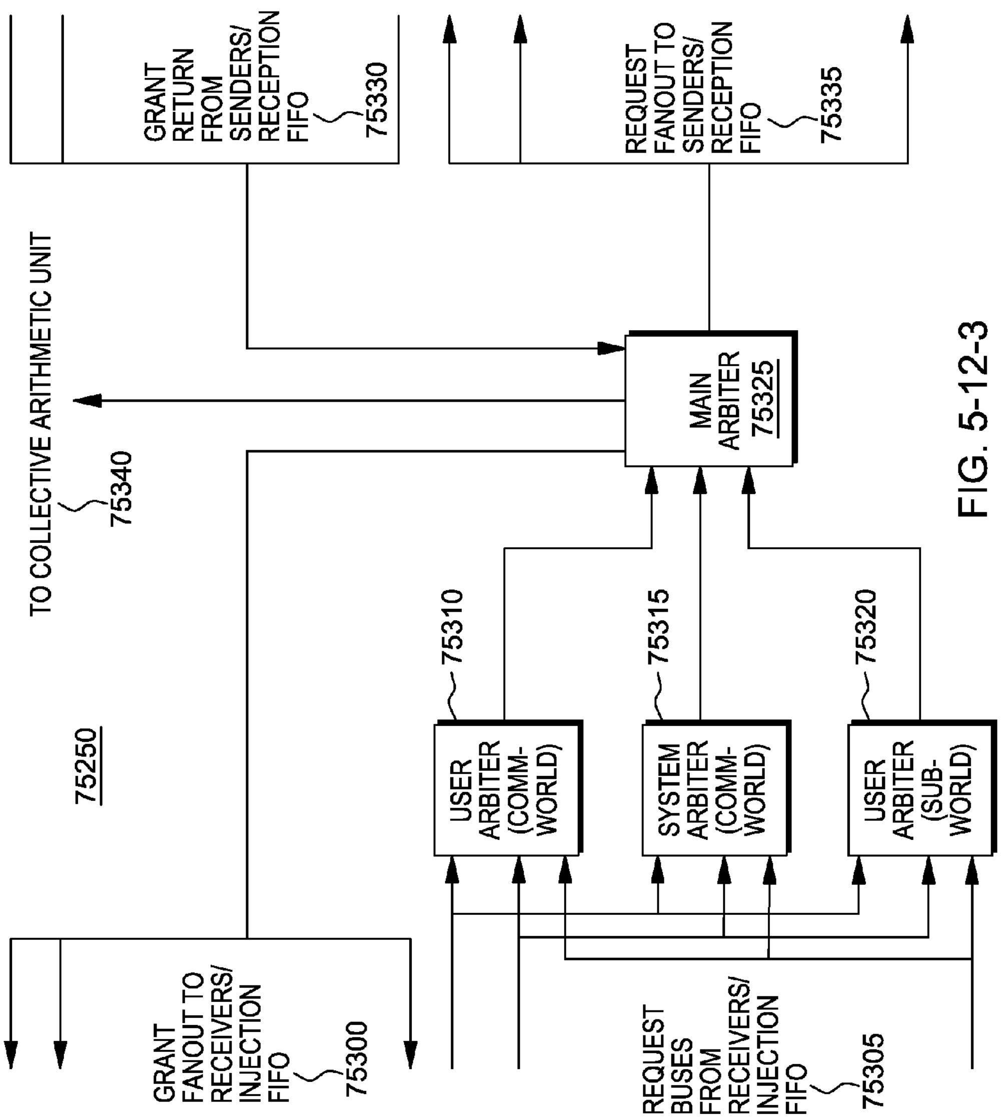
Figures 4, 5, 6, 7, 8, 9, 10, 11, 12:
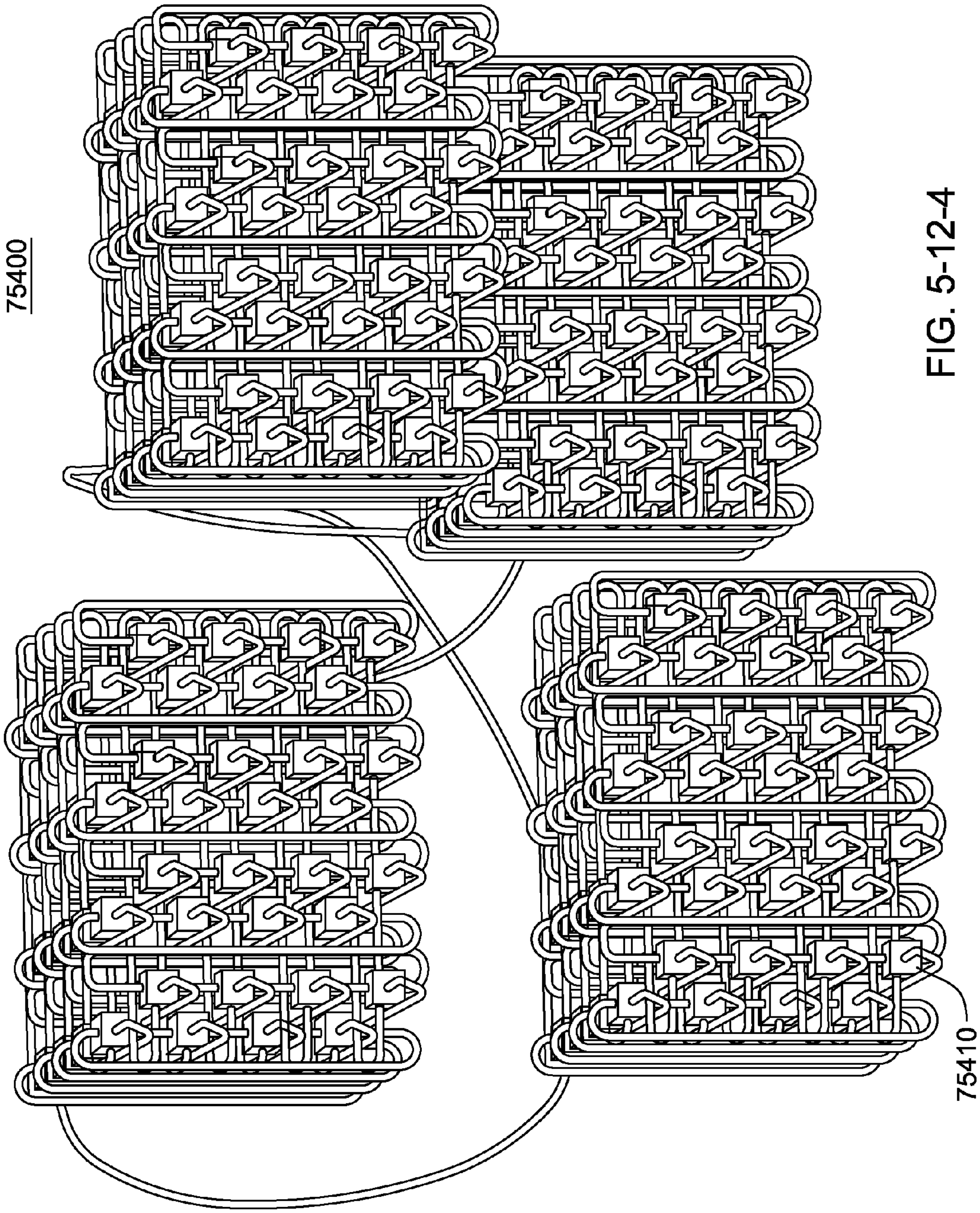
Figures 2, 5, 6, 7, 8, 9, 10, 11, 12, 13:
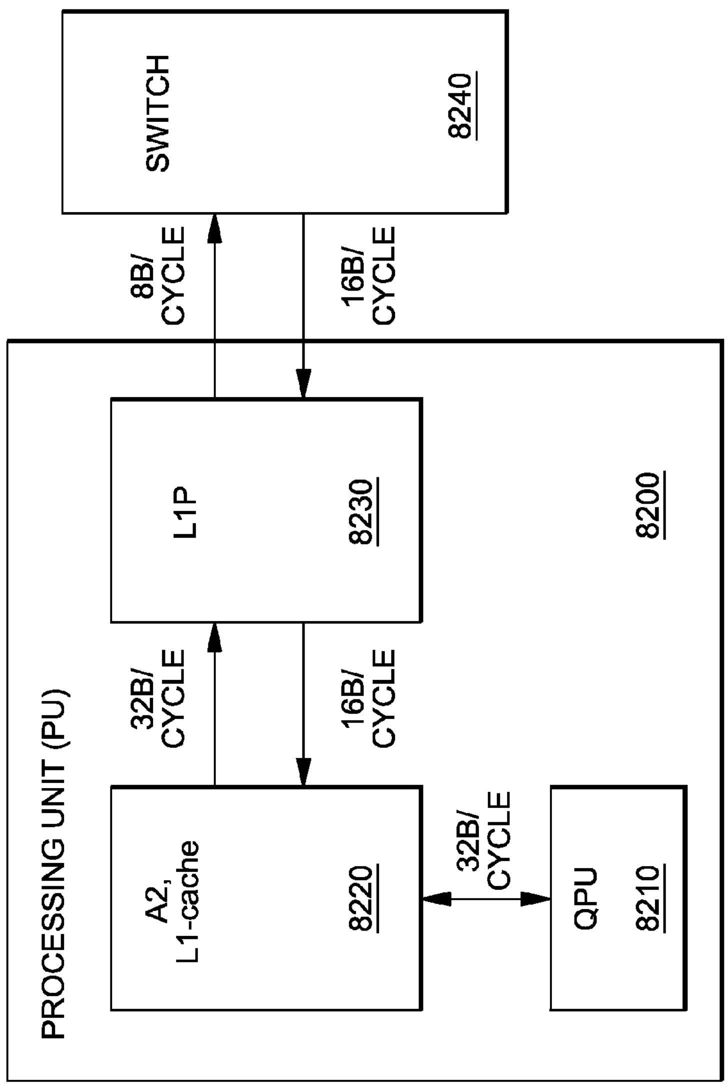
Figures 3, 5, 6, 7, 8, 9, 10, 11, 12, 13:
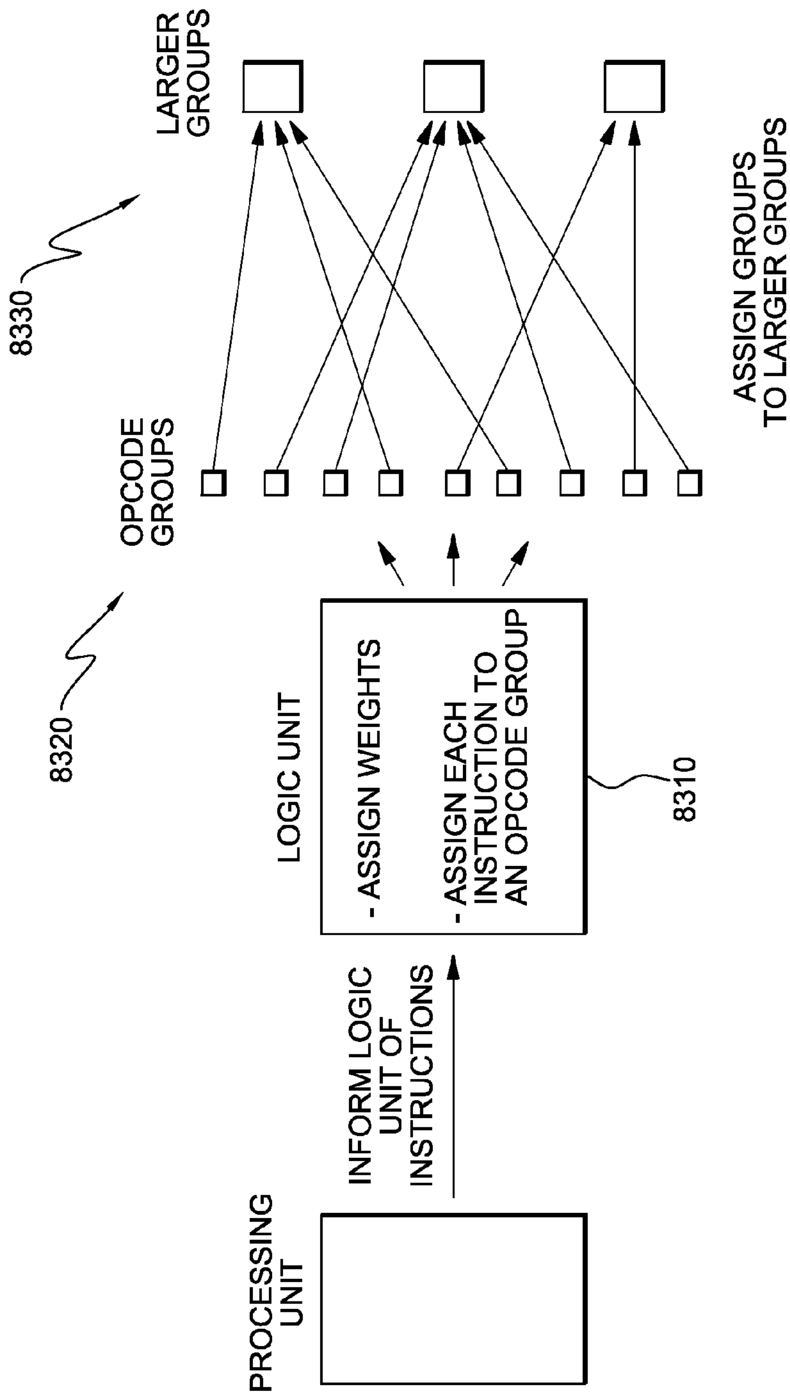
Figures 4, 5, 6, 7, 8, 9, 10, 11, 12, 13:
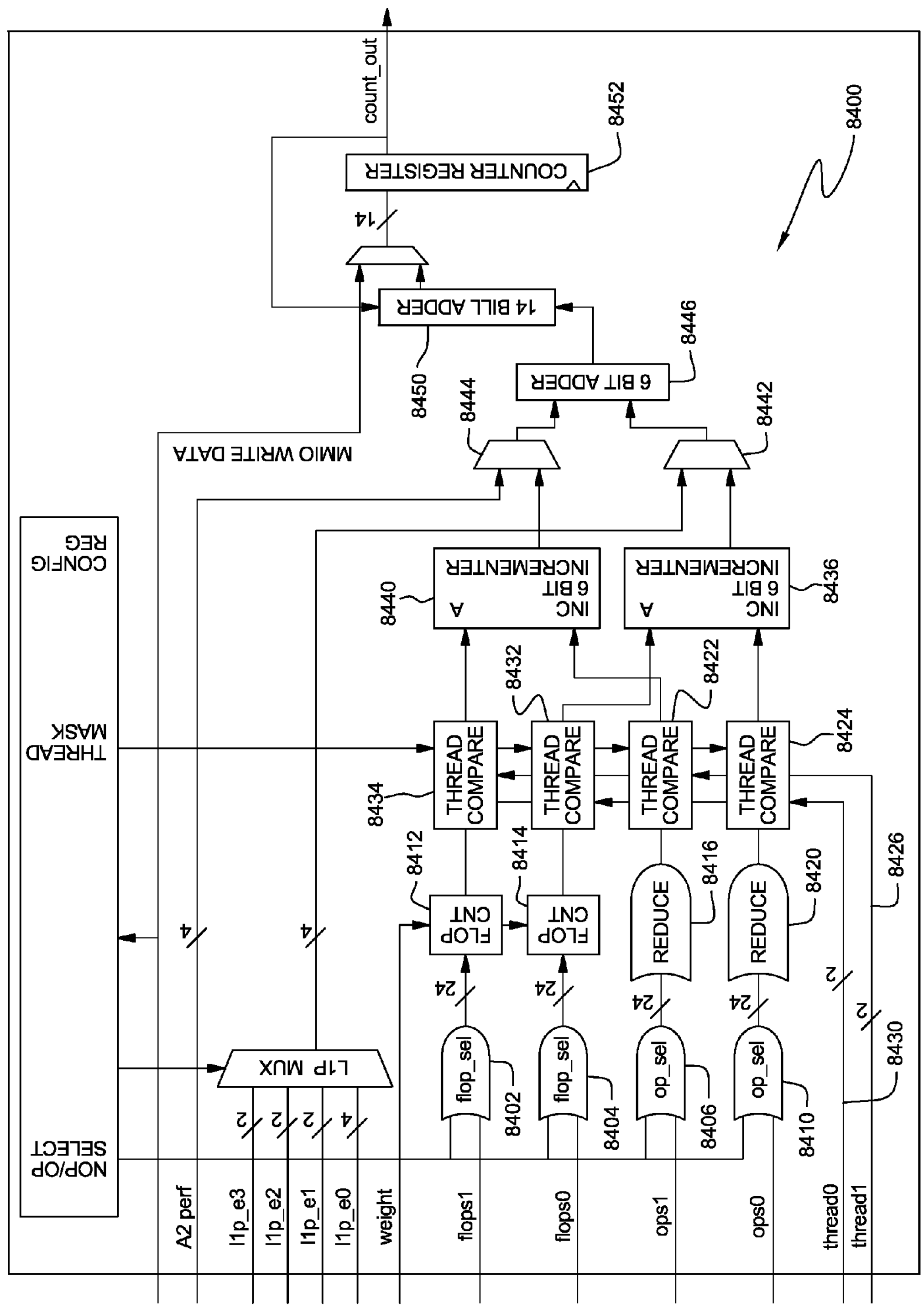
Figures 0, 6:
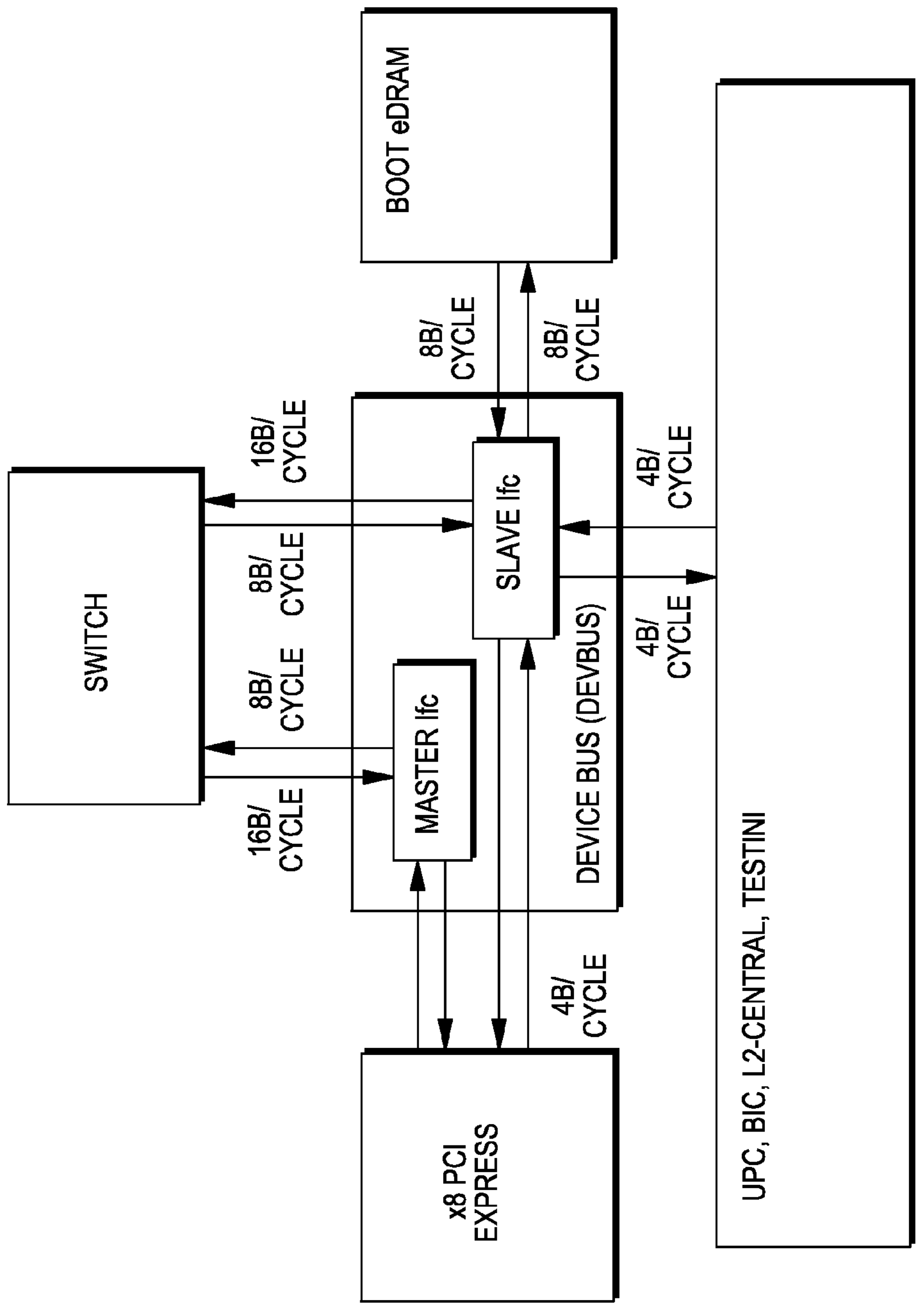
Figures 1, 6:
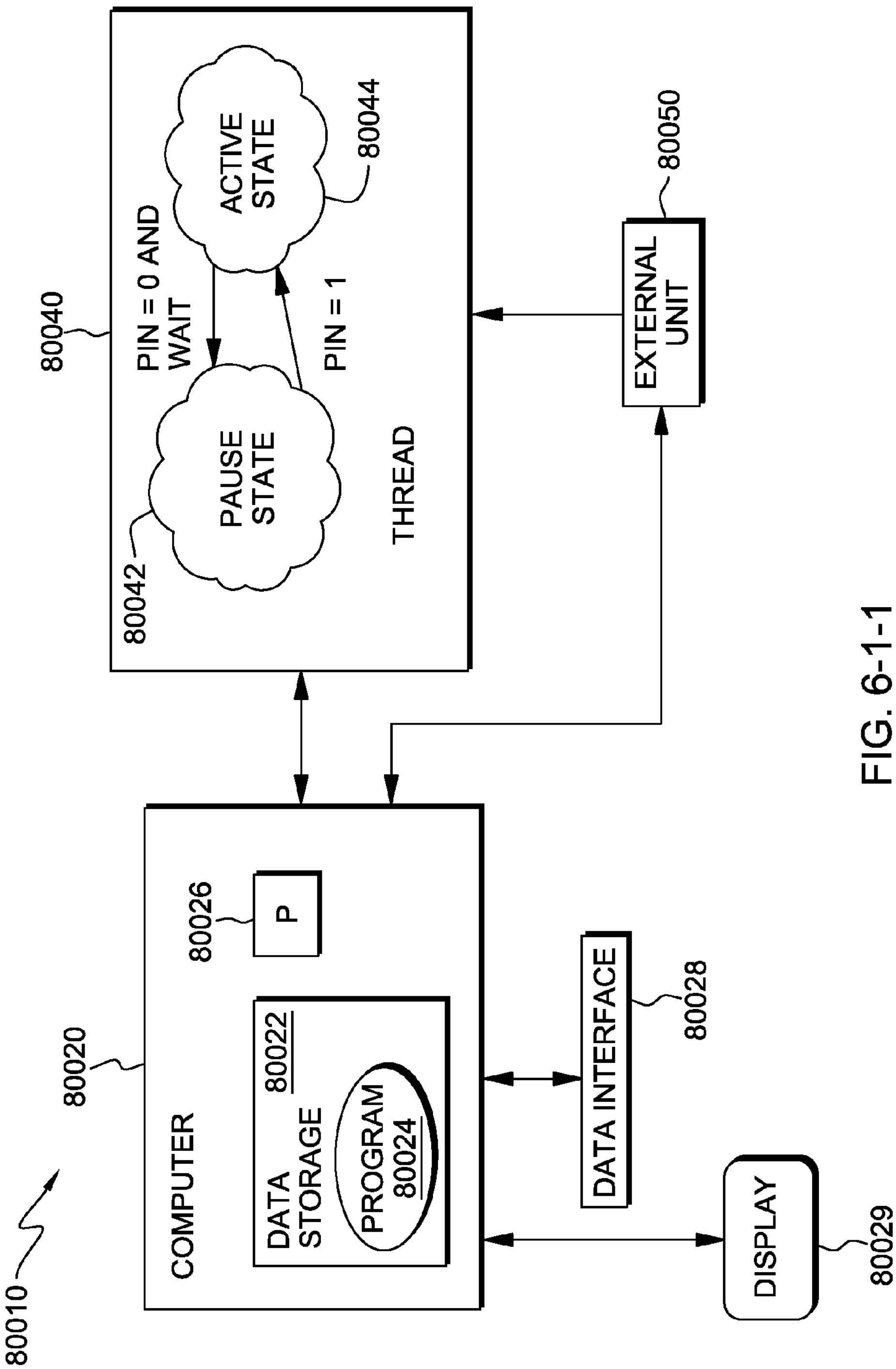
Figures 1, 2, 6:
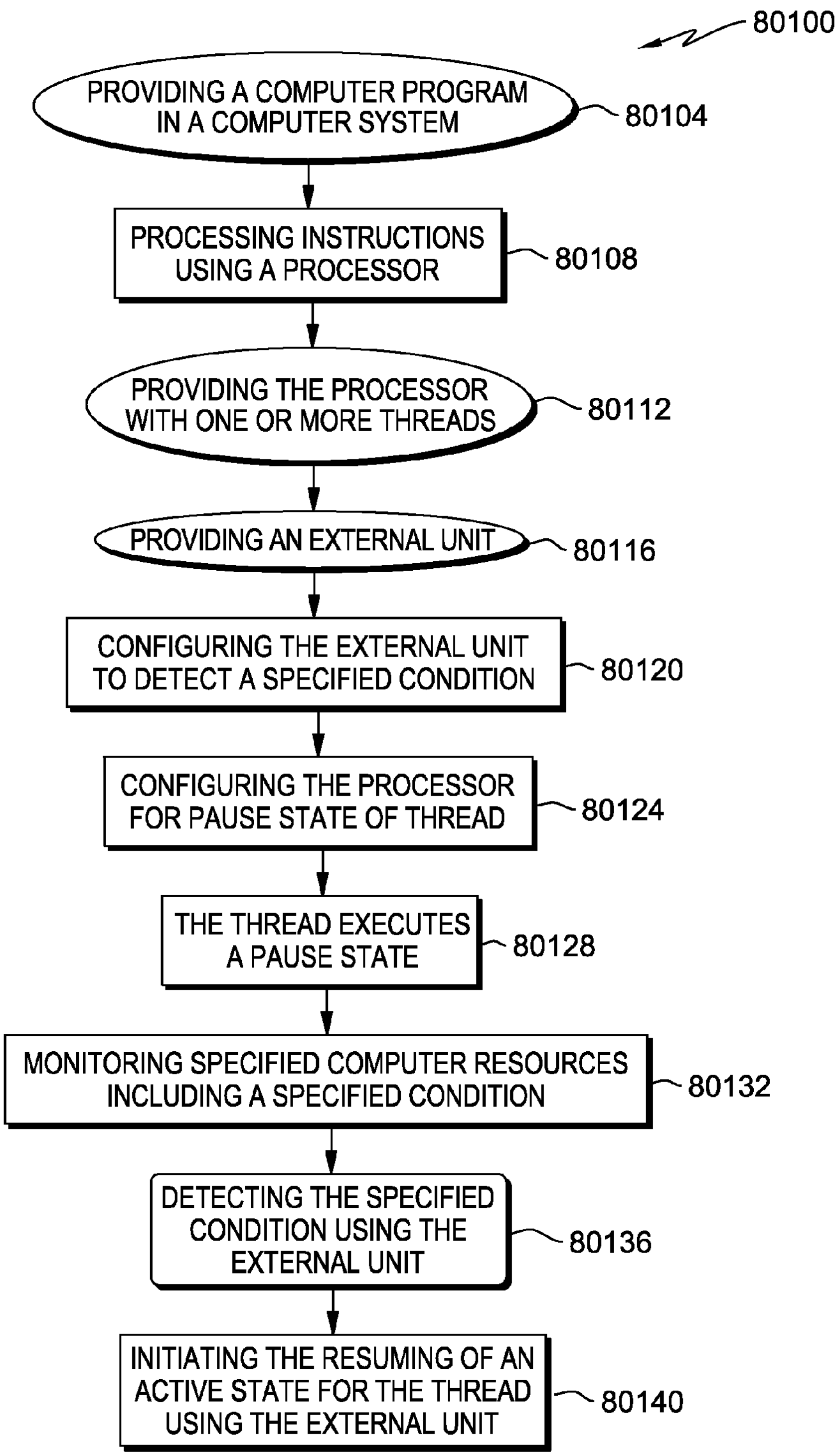
Figures 1, 3, 6:
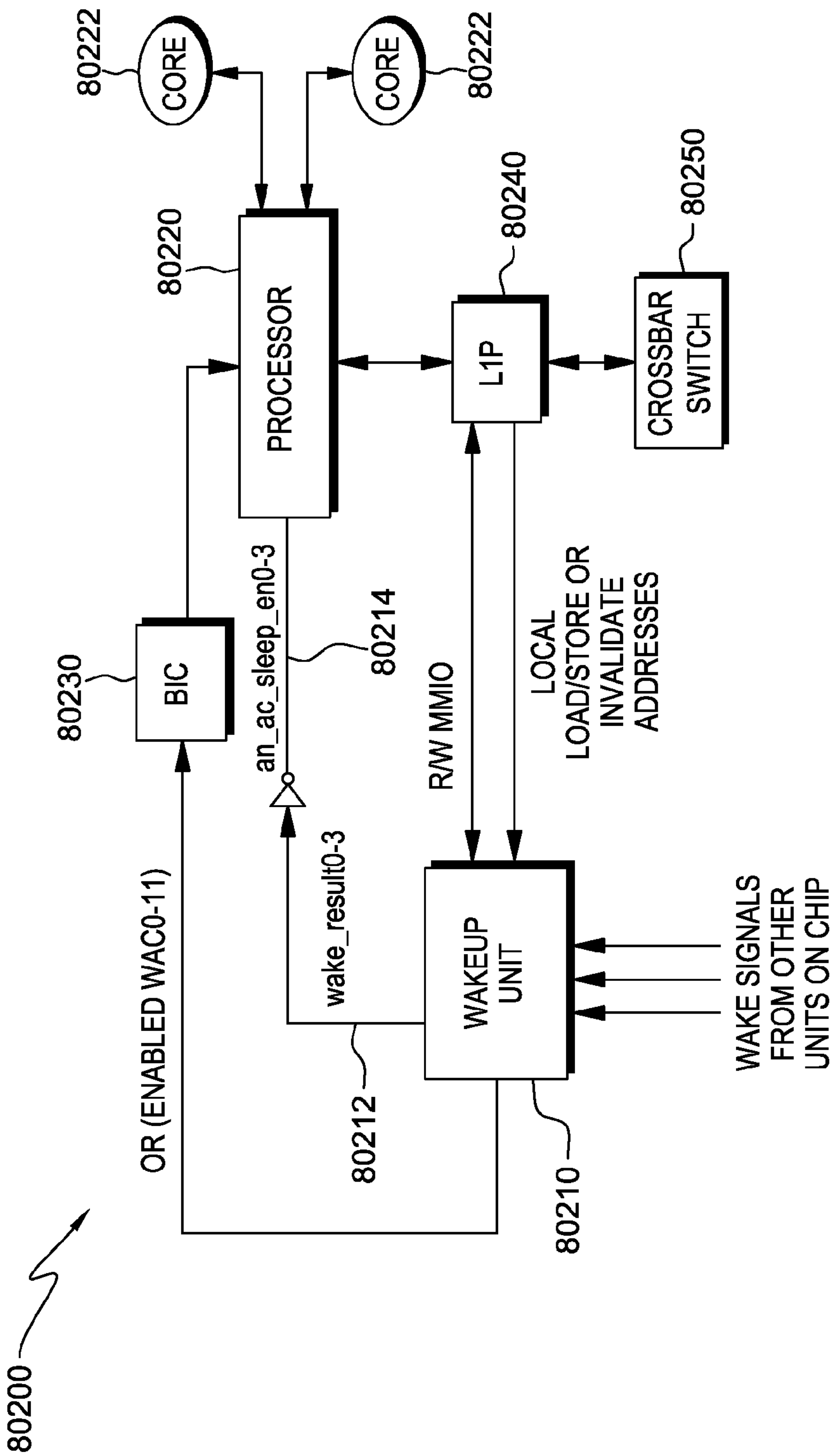
Figures 1, 4, 6:
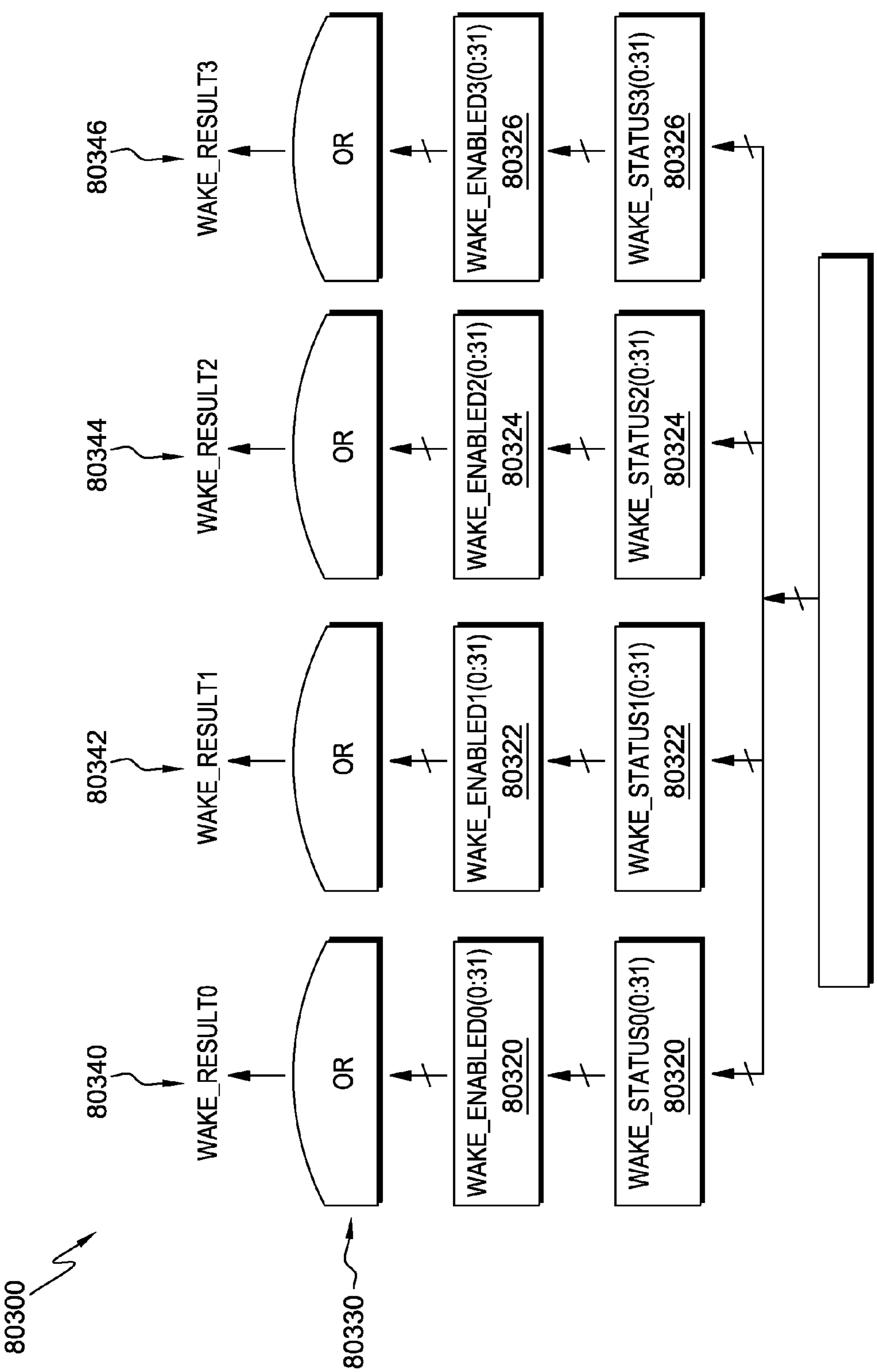
Figures 1, 5, 6:
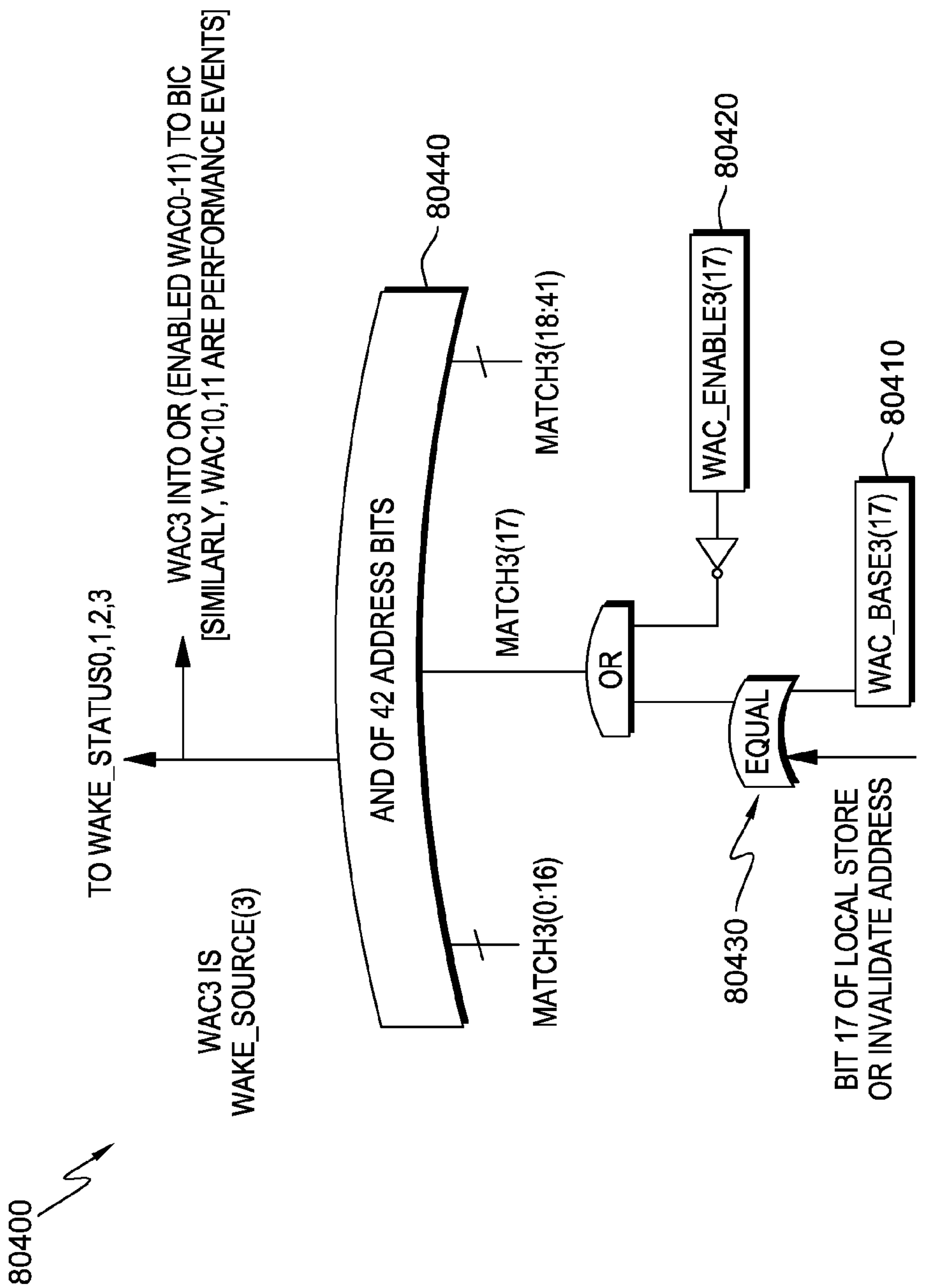
Figures 1, 2, 6:
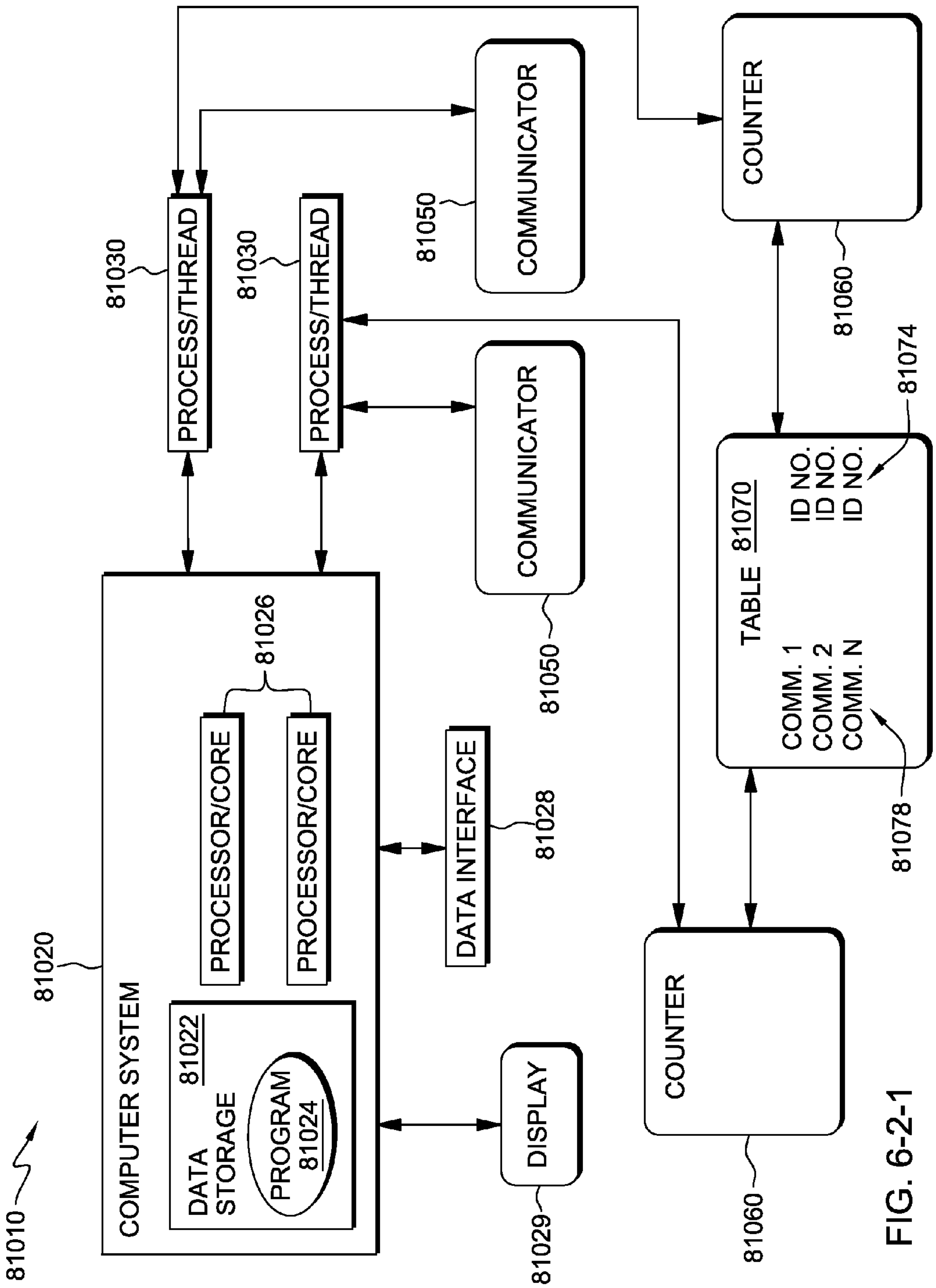
Figures 2, 6:
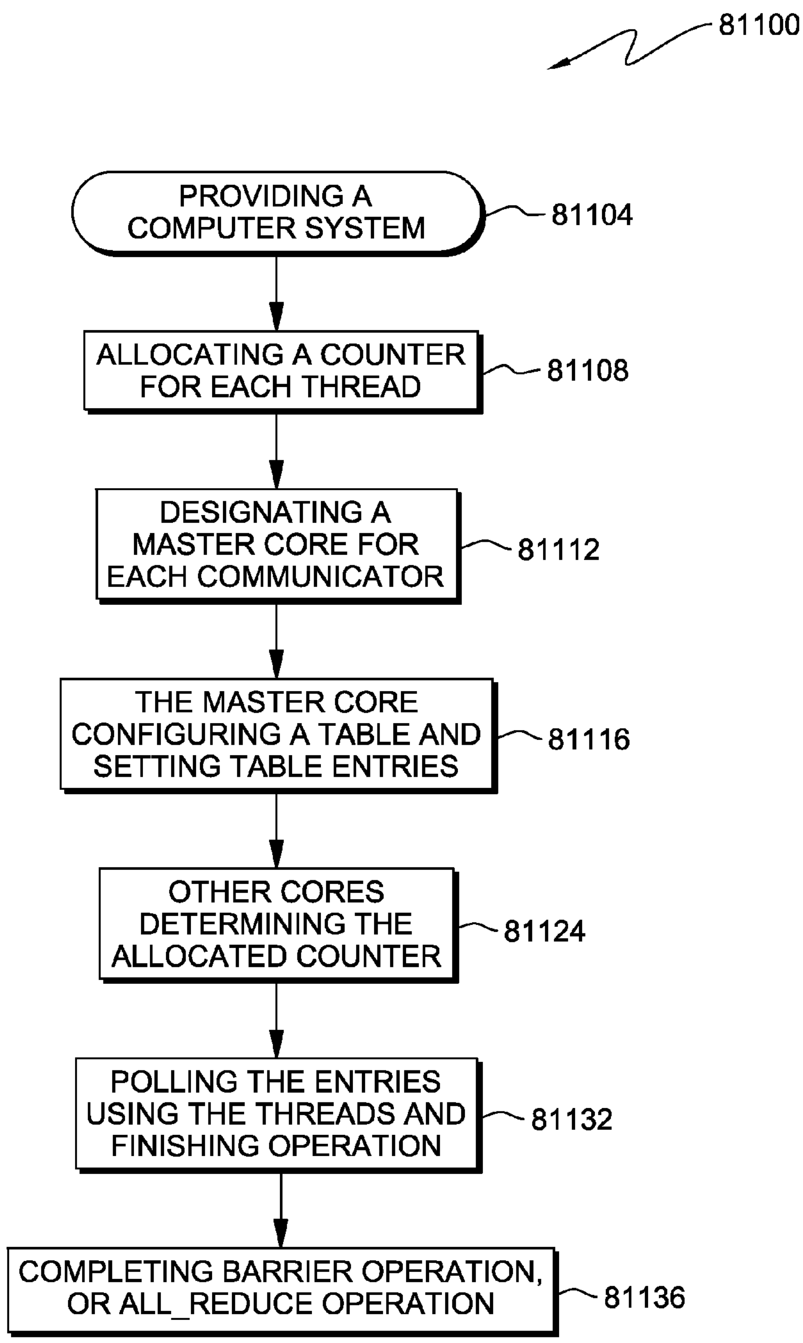
Figures 1, 3, 6:
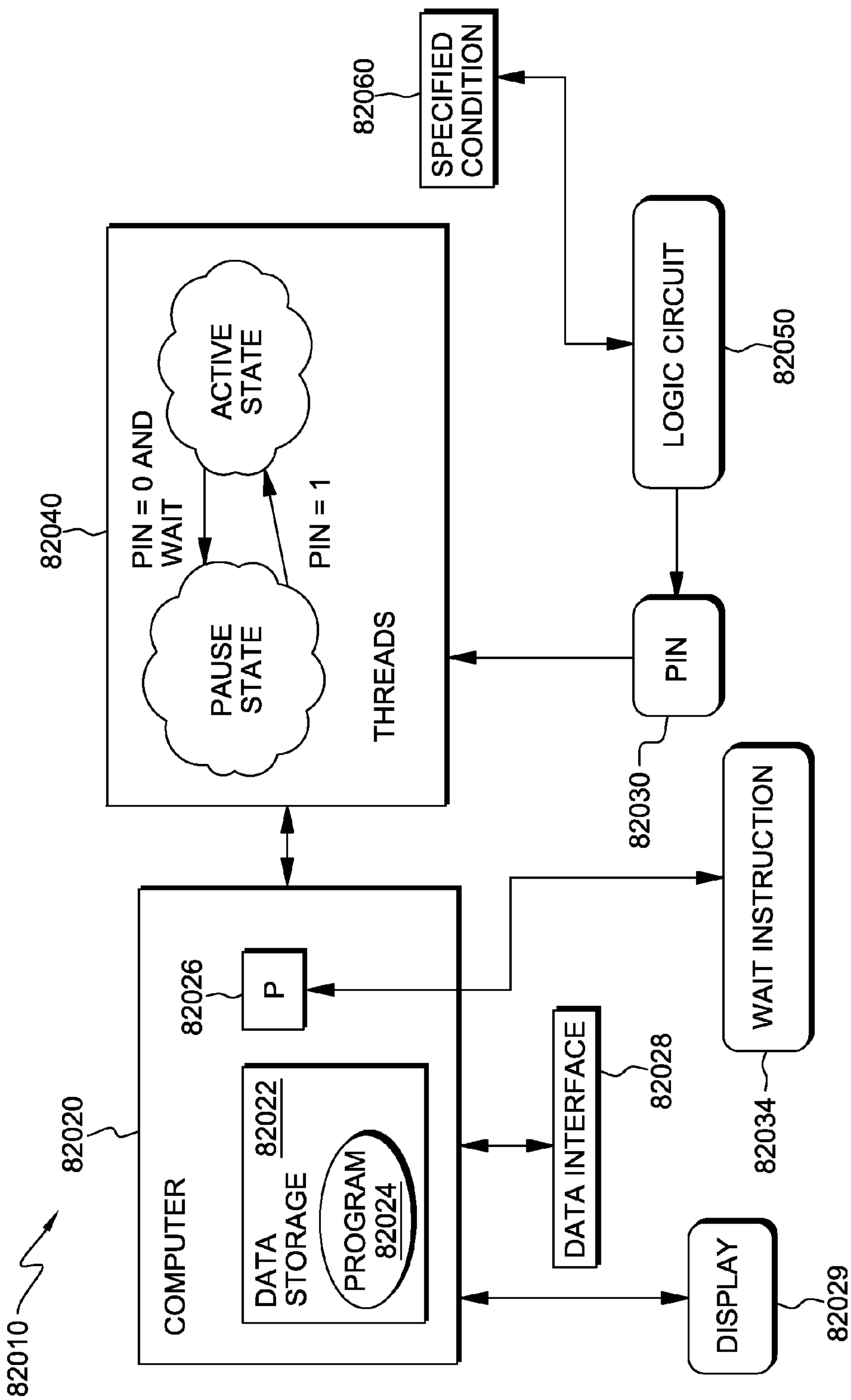
Figures 2, 3, 6:
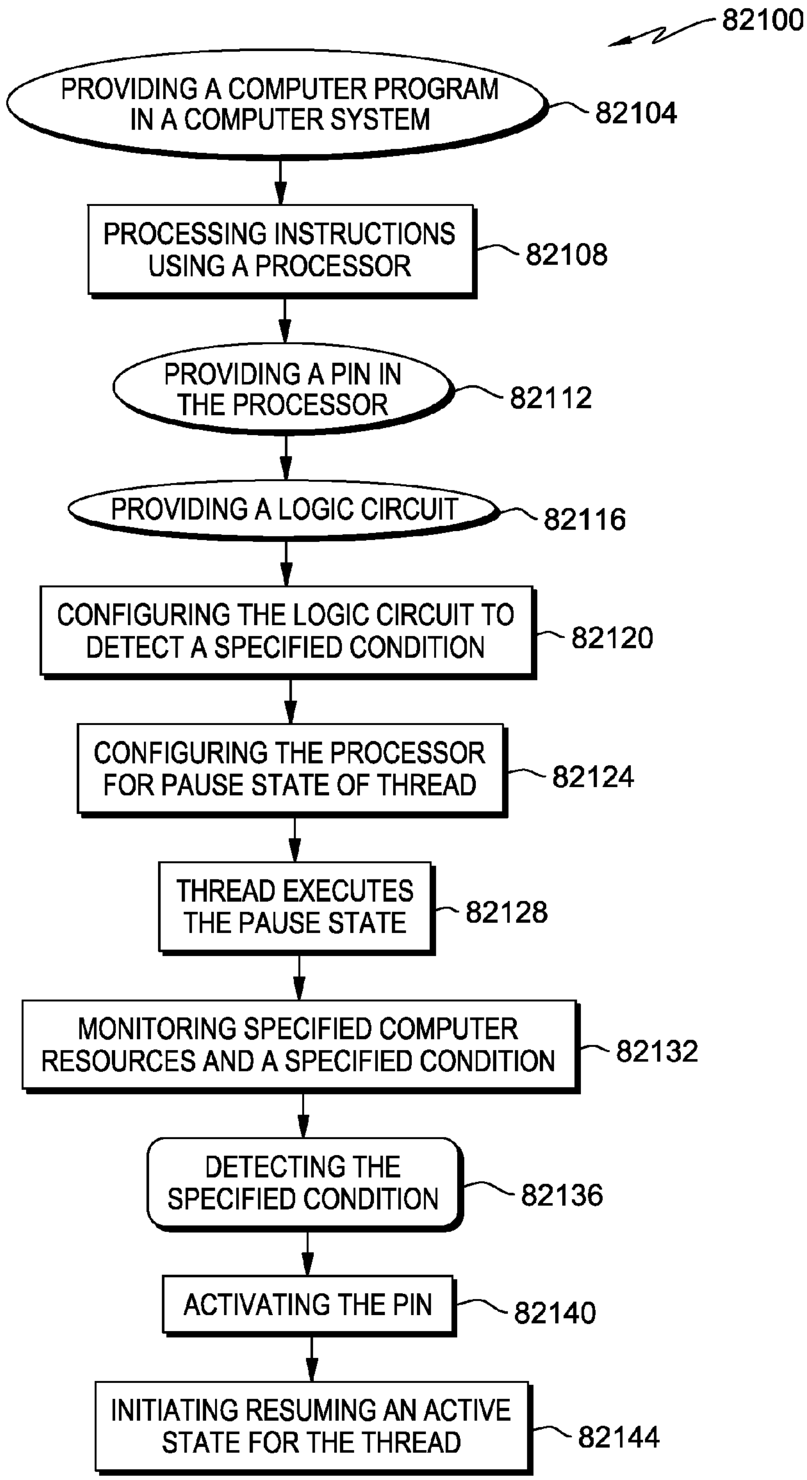
Figures 3, 6:
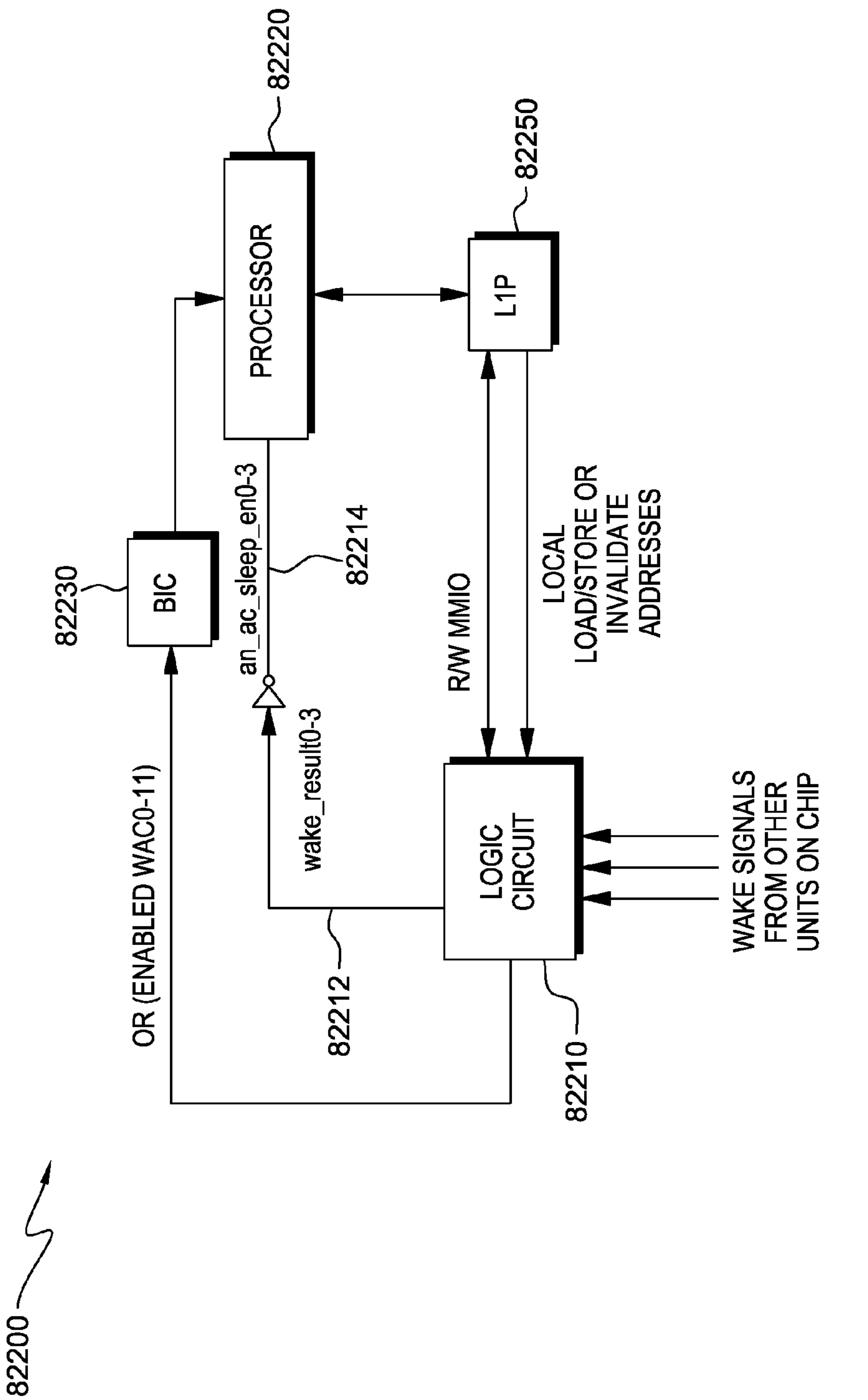
Figures 1, 4, 6:
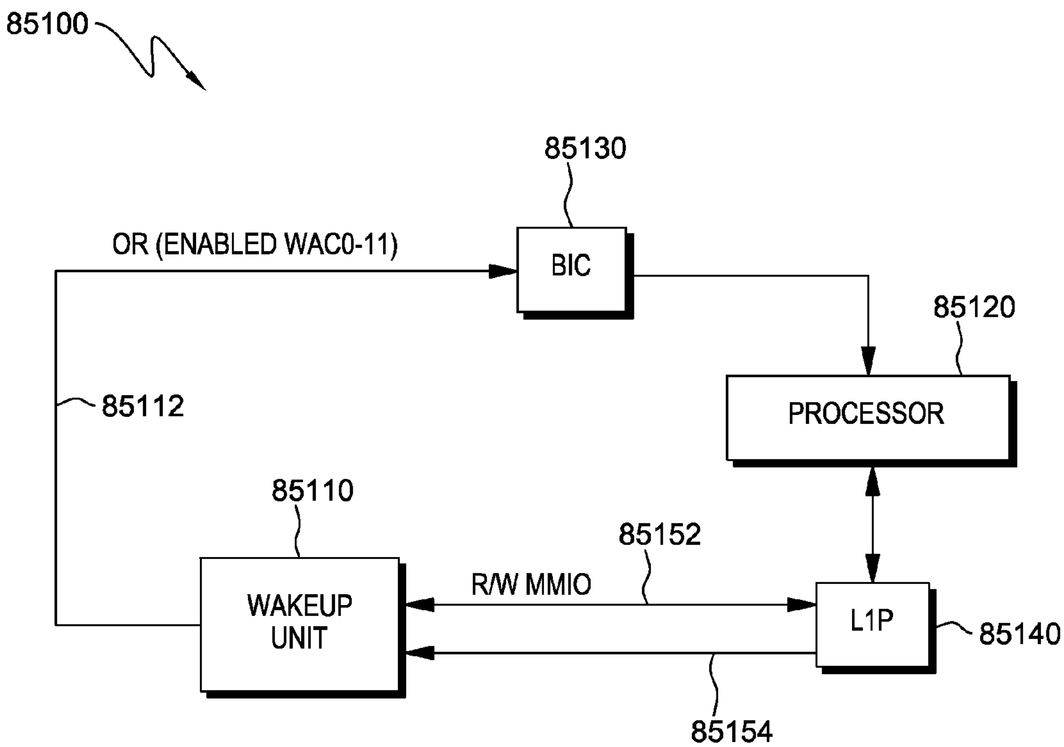
Figures 2, 4, 6:
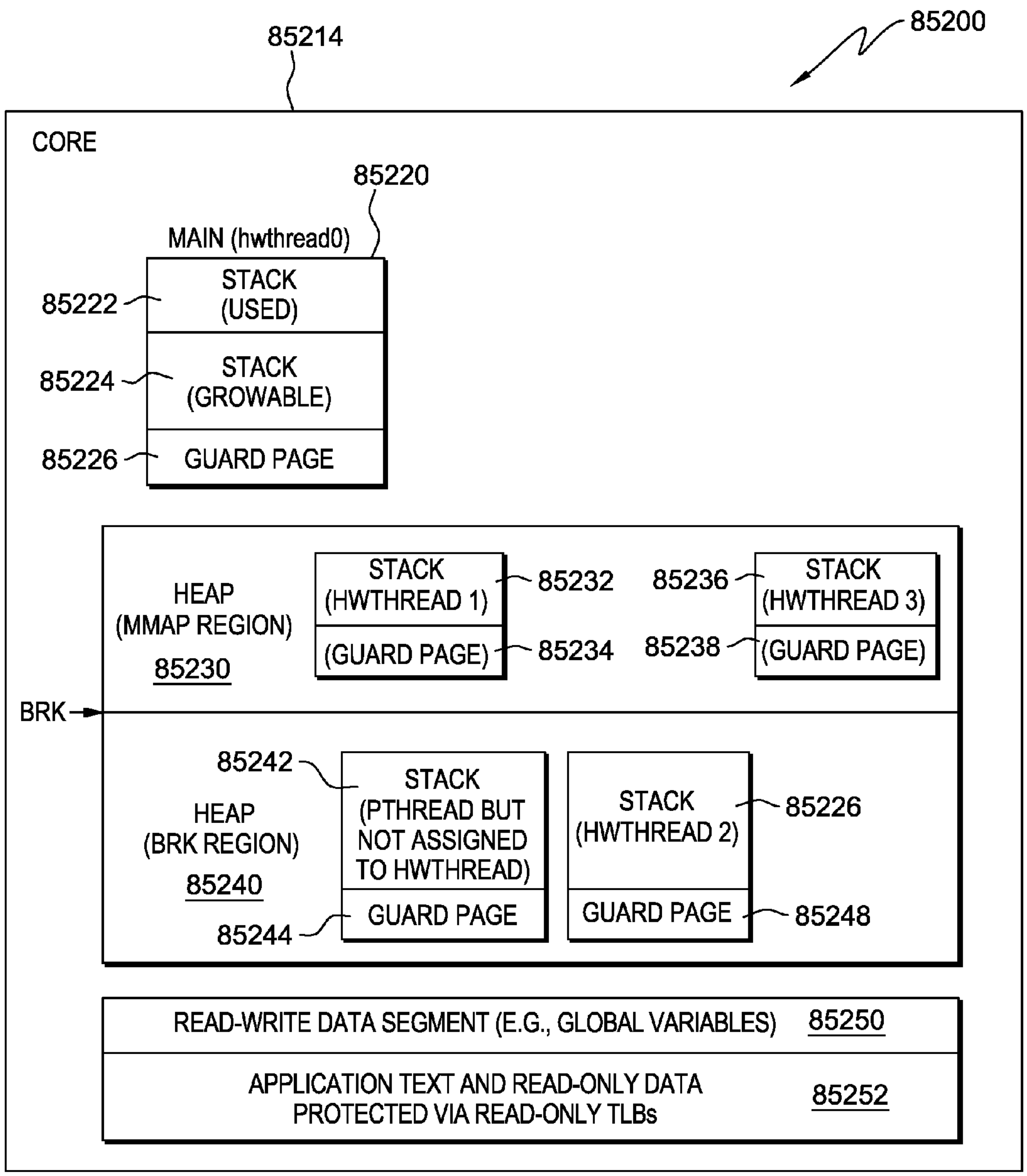
Figures 3, 4, 6:
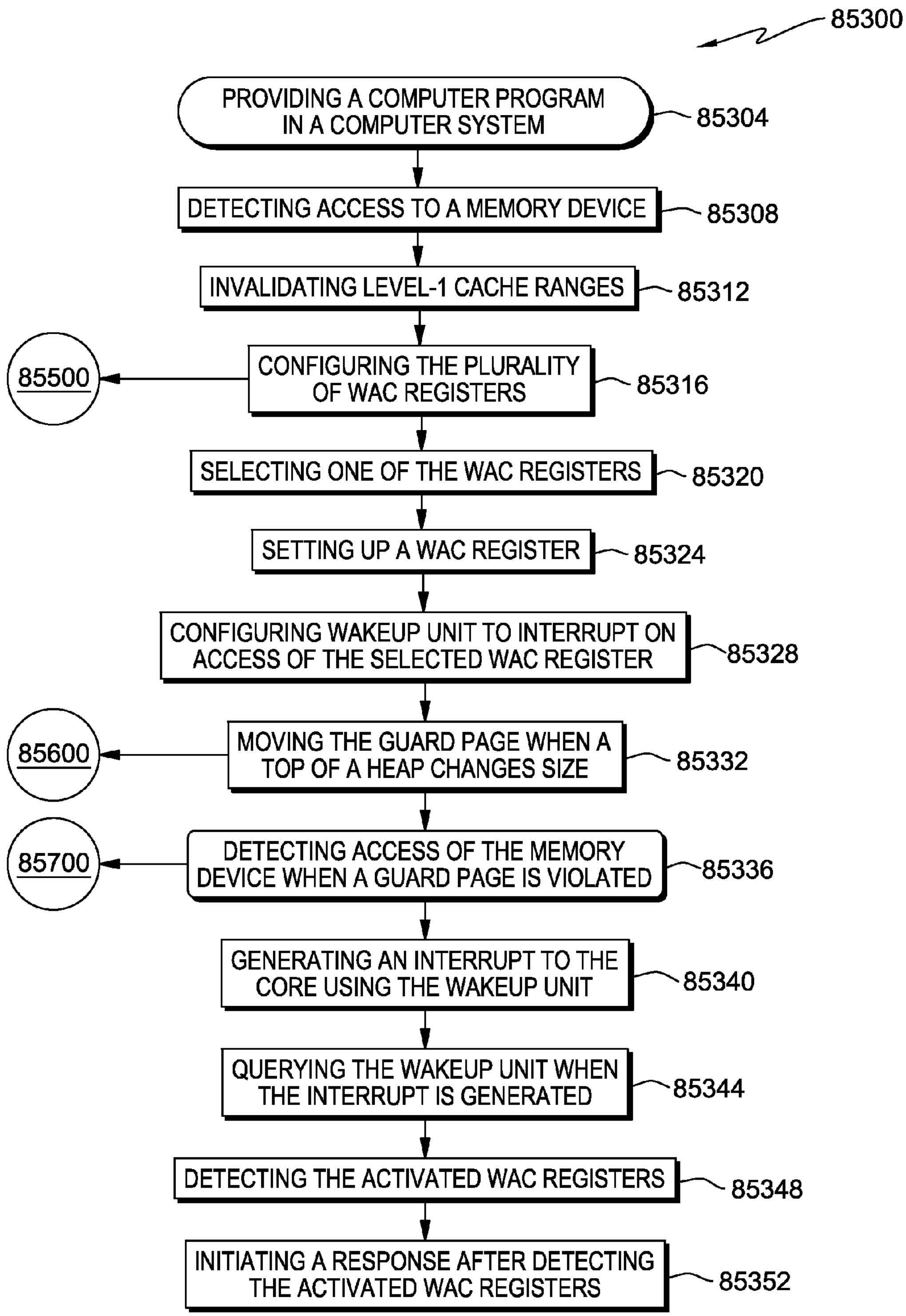
Figures 4, 6:
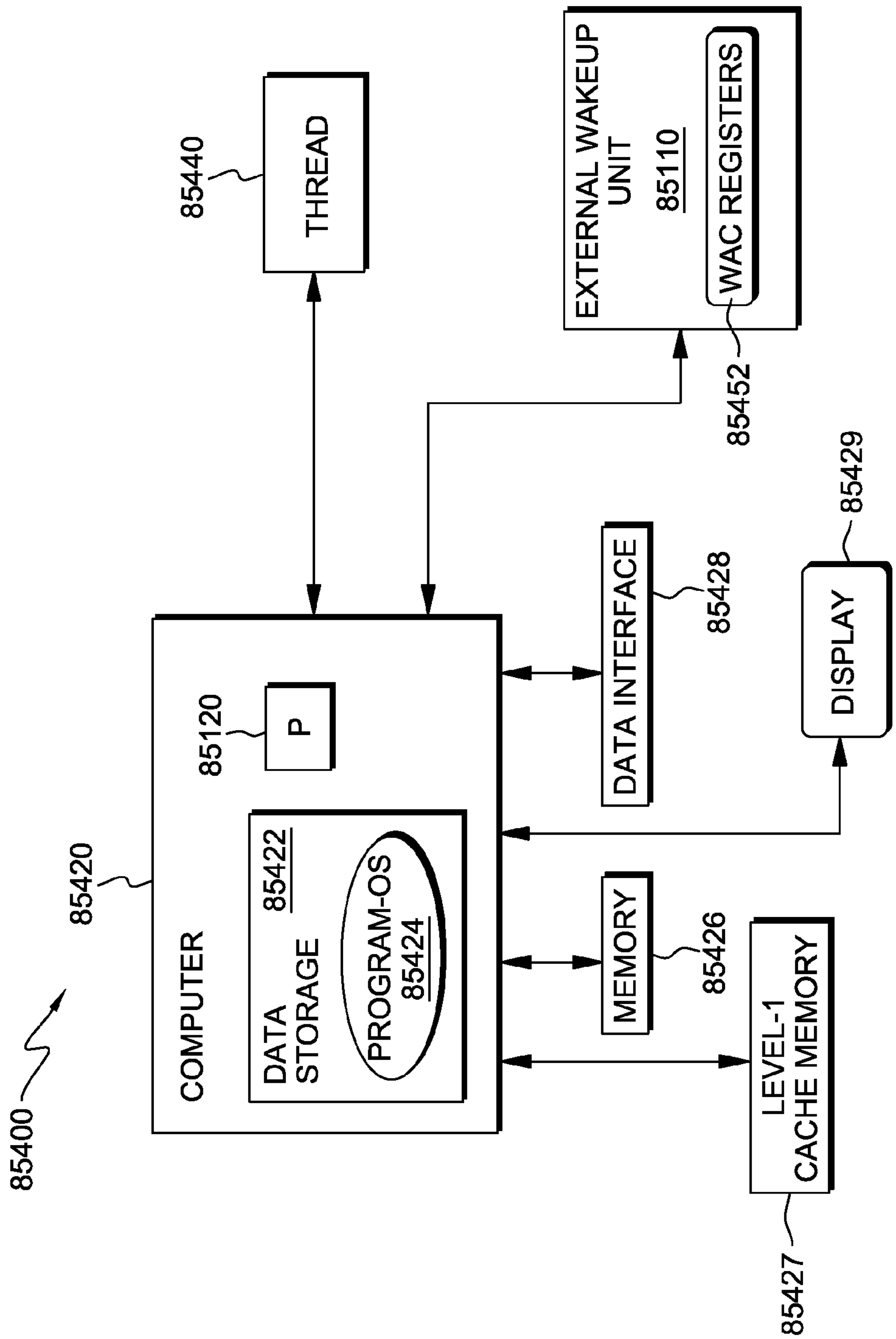
Figures 4, 5, 6:
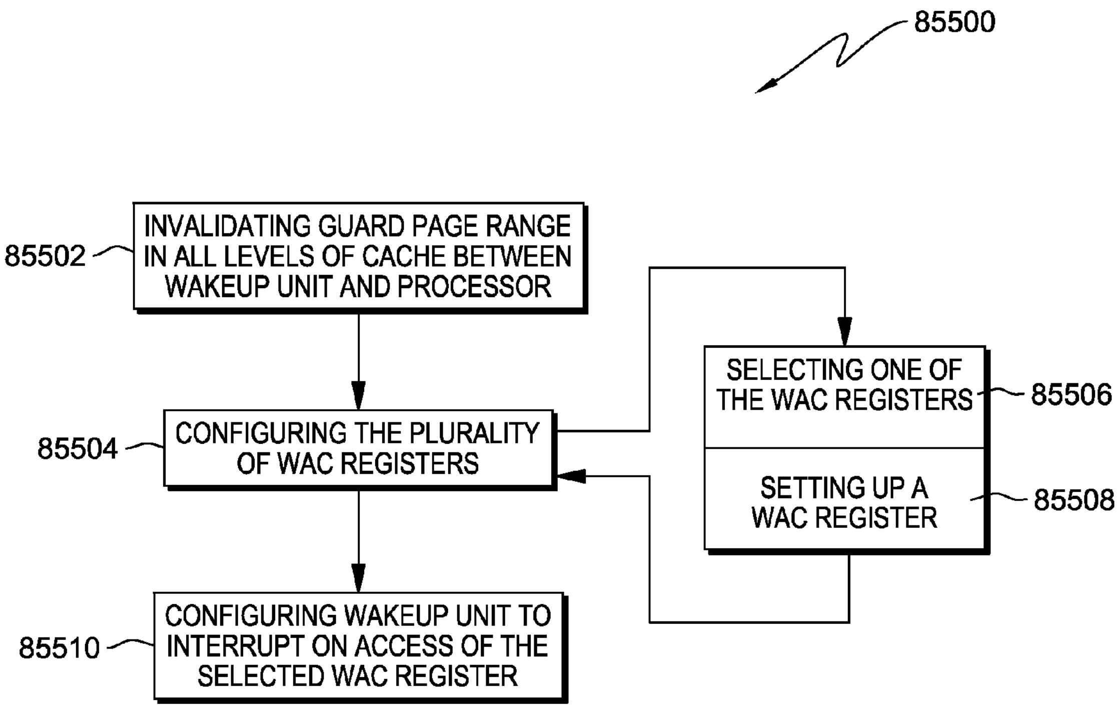
Figures 4, 6:
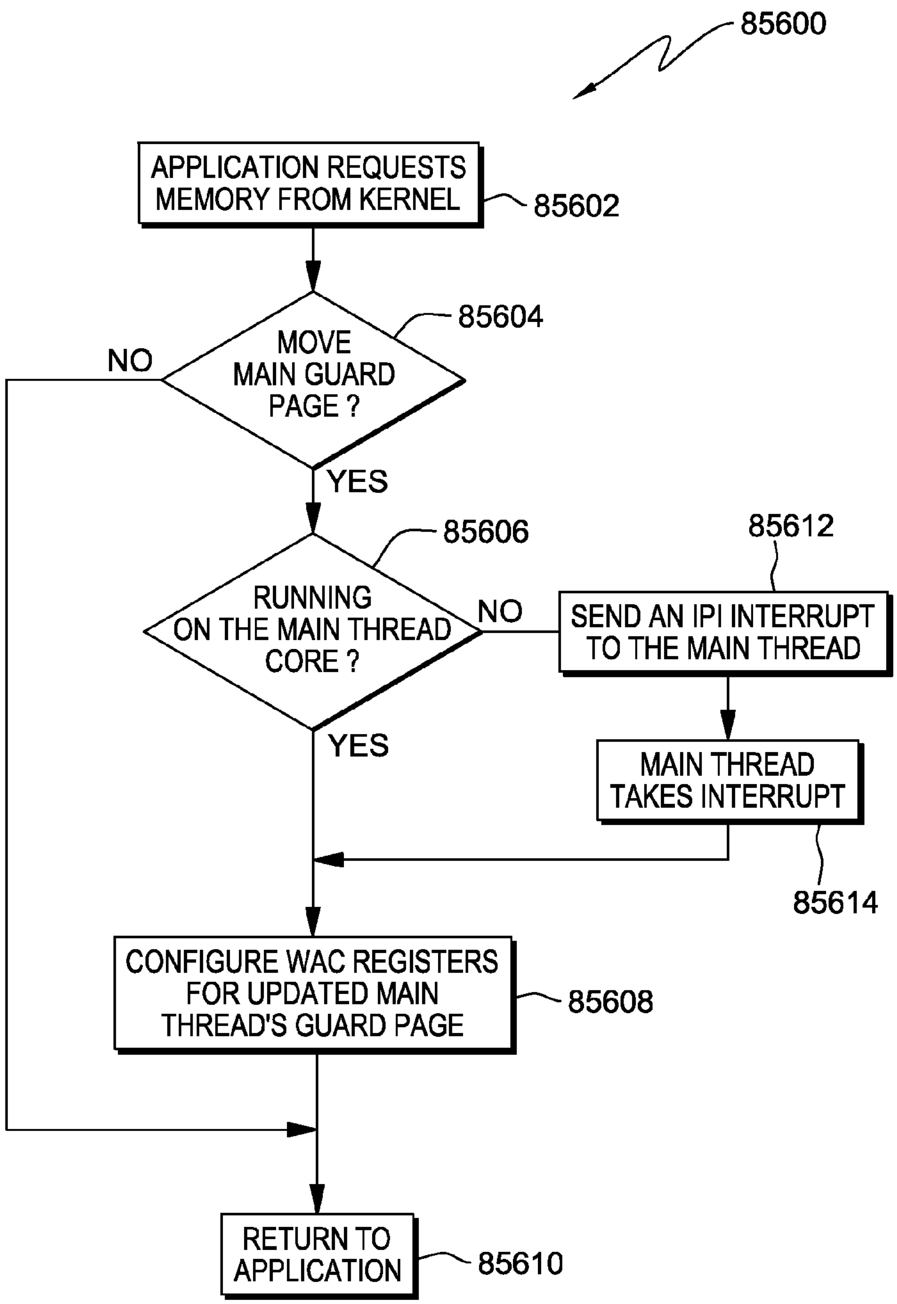
Figures 4, 6, 7:
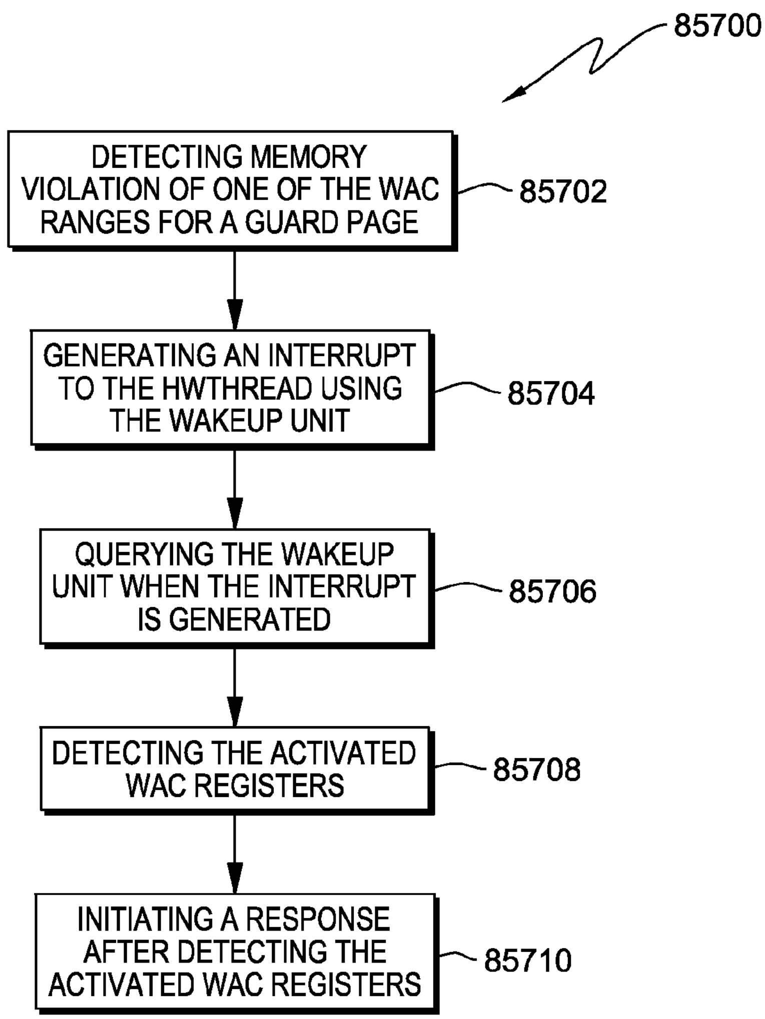
Figures 4, 6, 8:
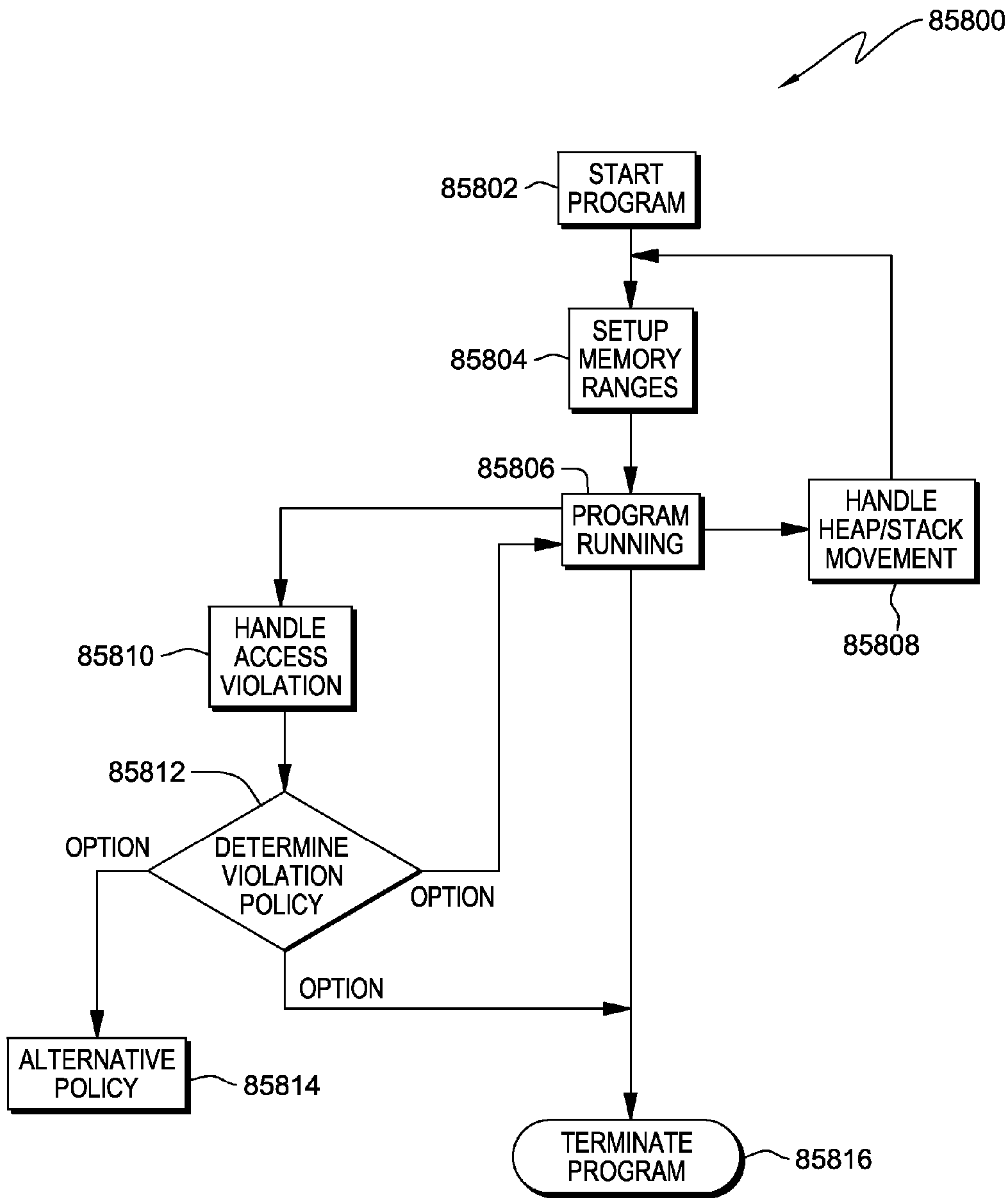
Figures 1, 5, 6:
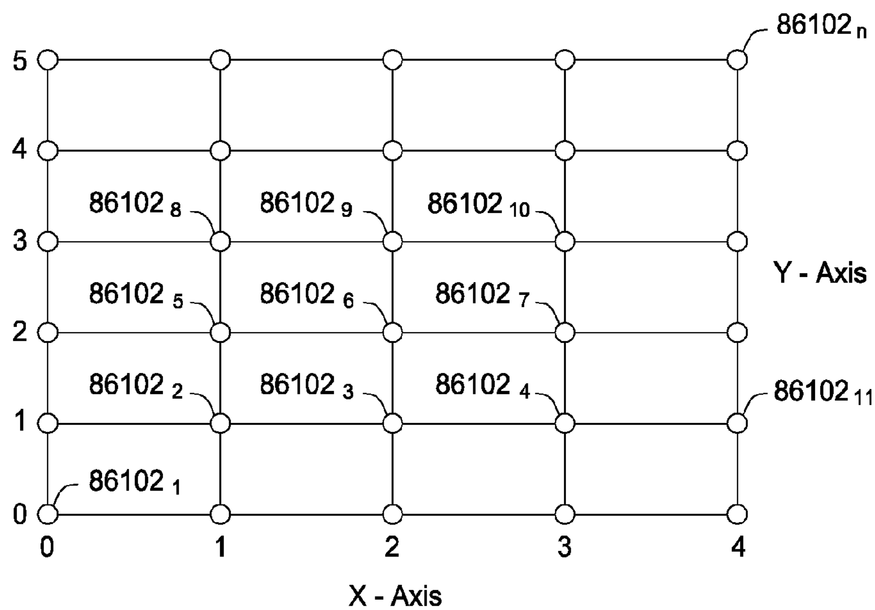
Figures 2, 5, 6:
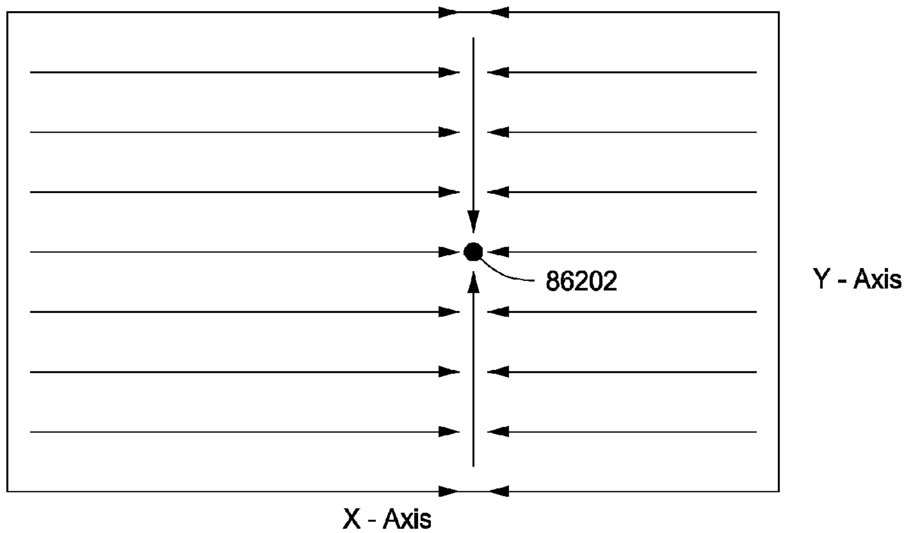
Figures 3, 5, 6:
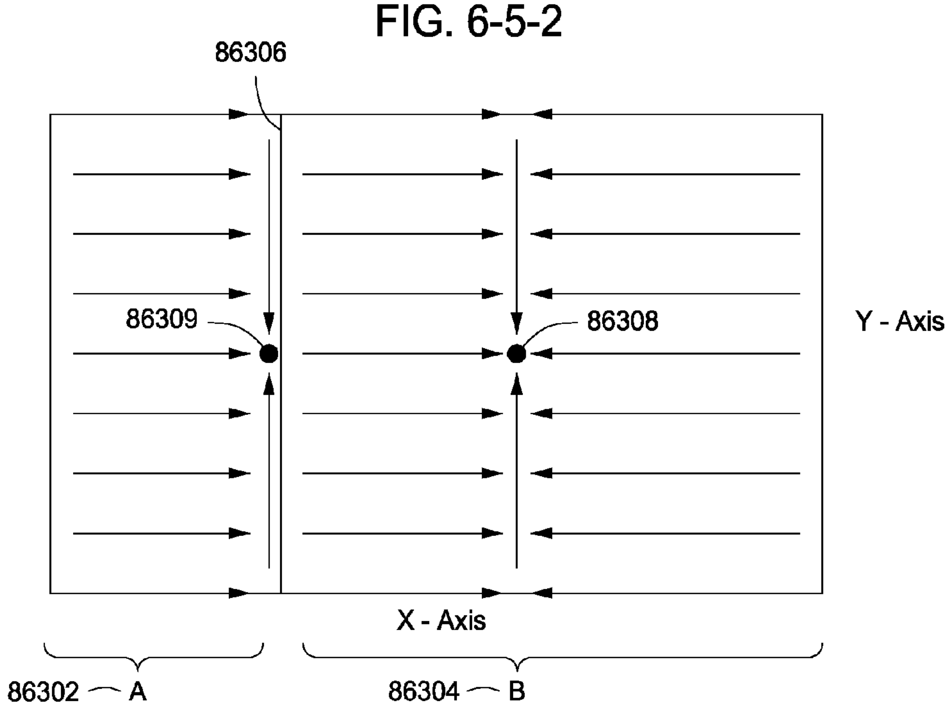
Figures 4, 5, 6:
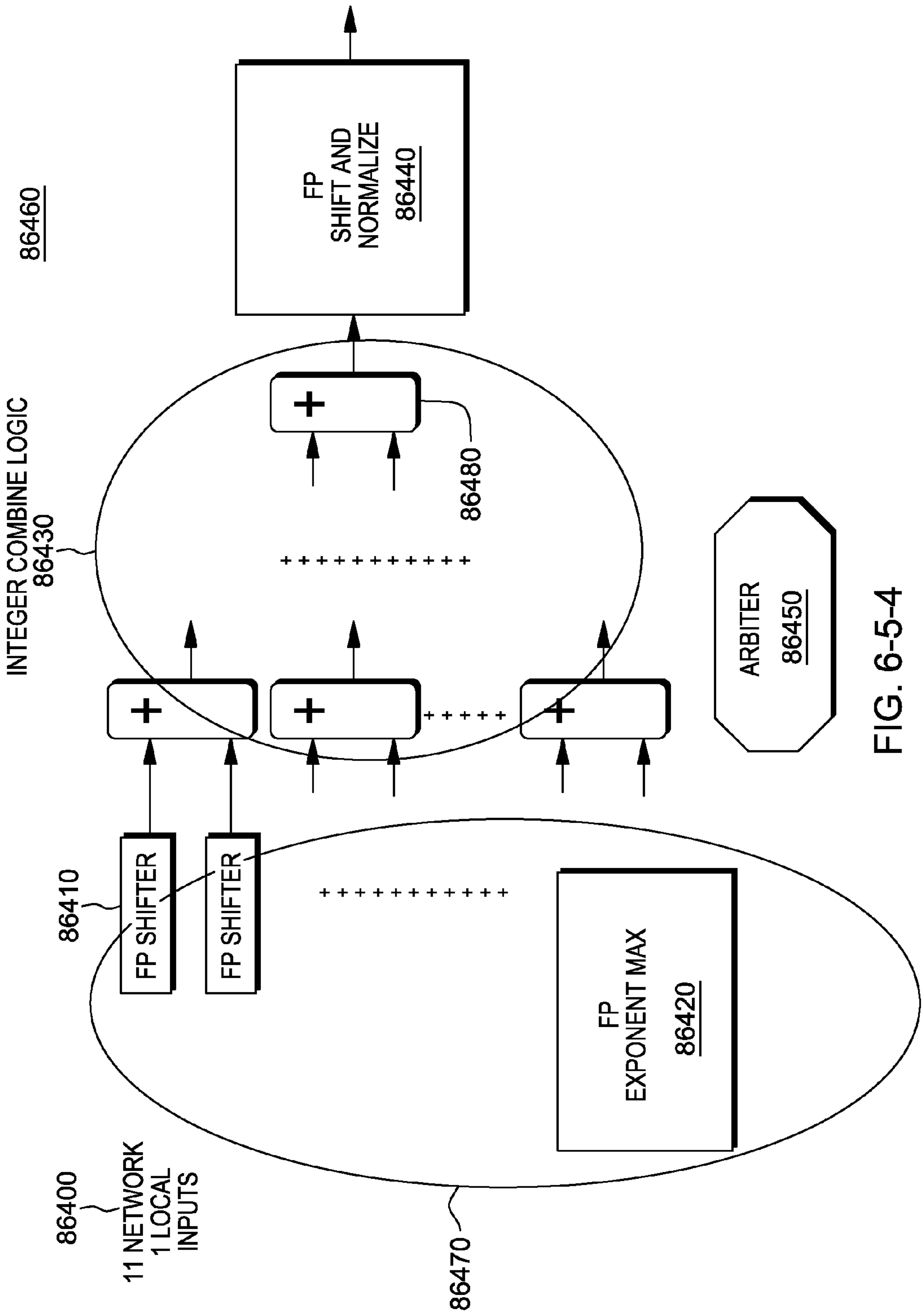
Figures 5, 6:
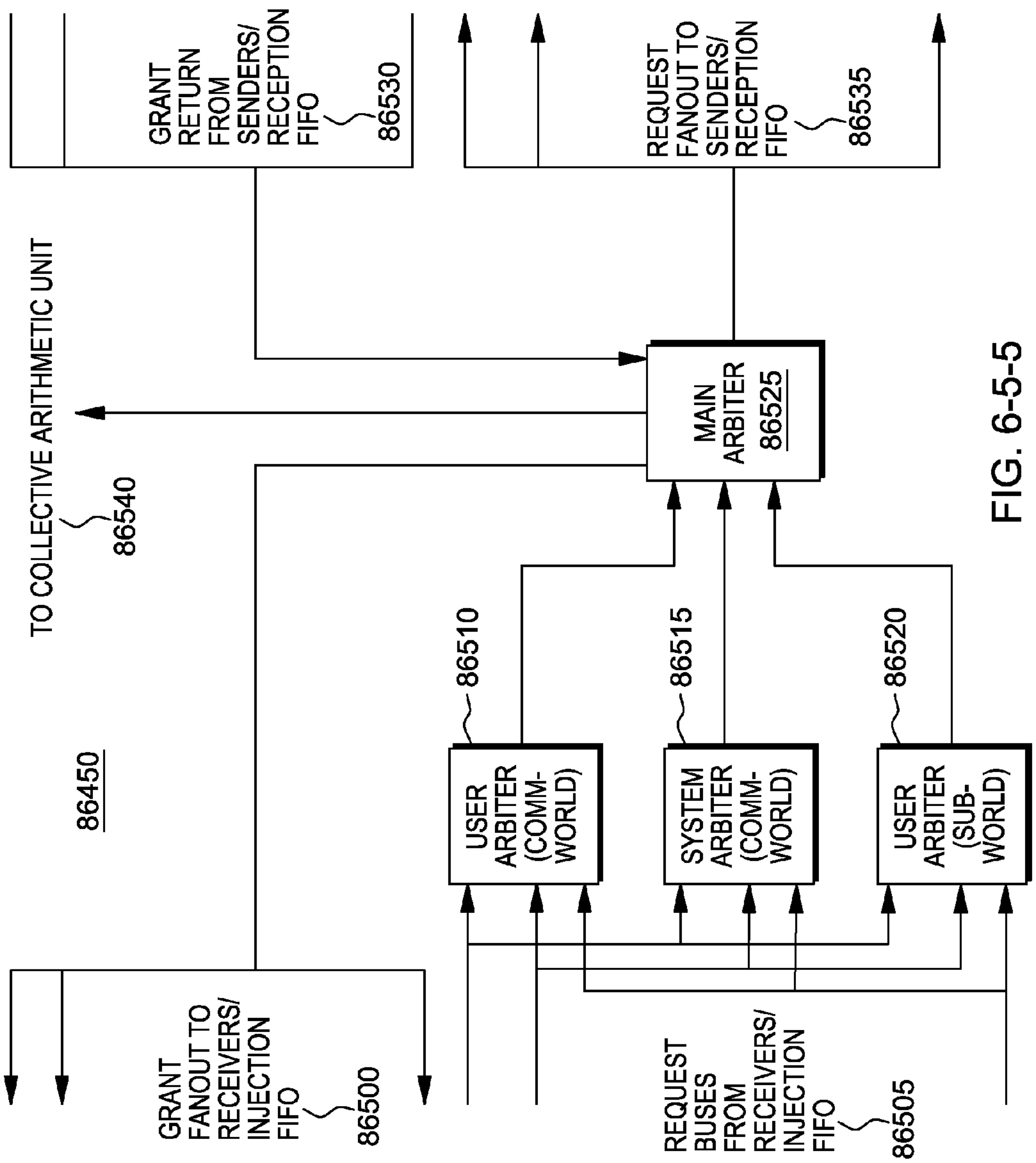
Figures 5, 6:
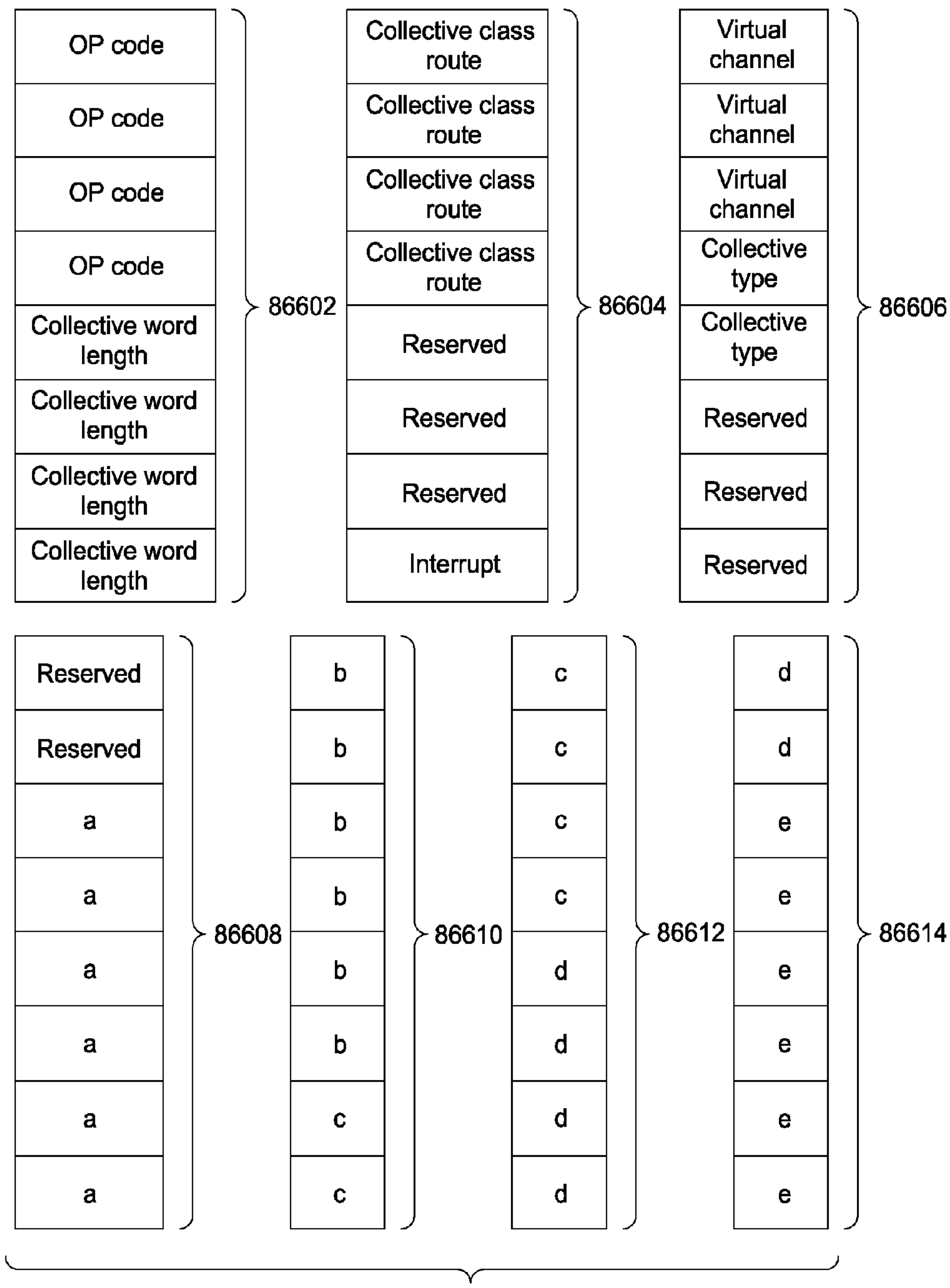
Figures 3, 6:
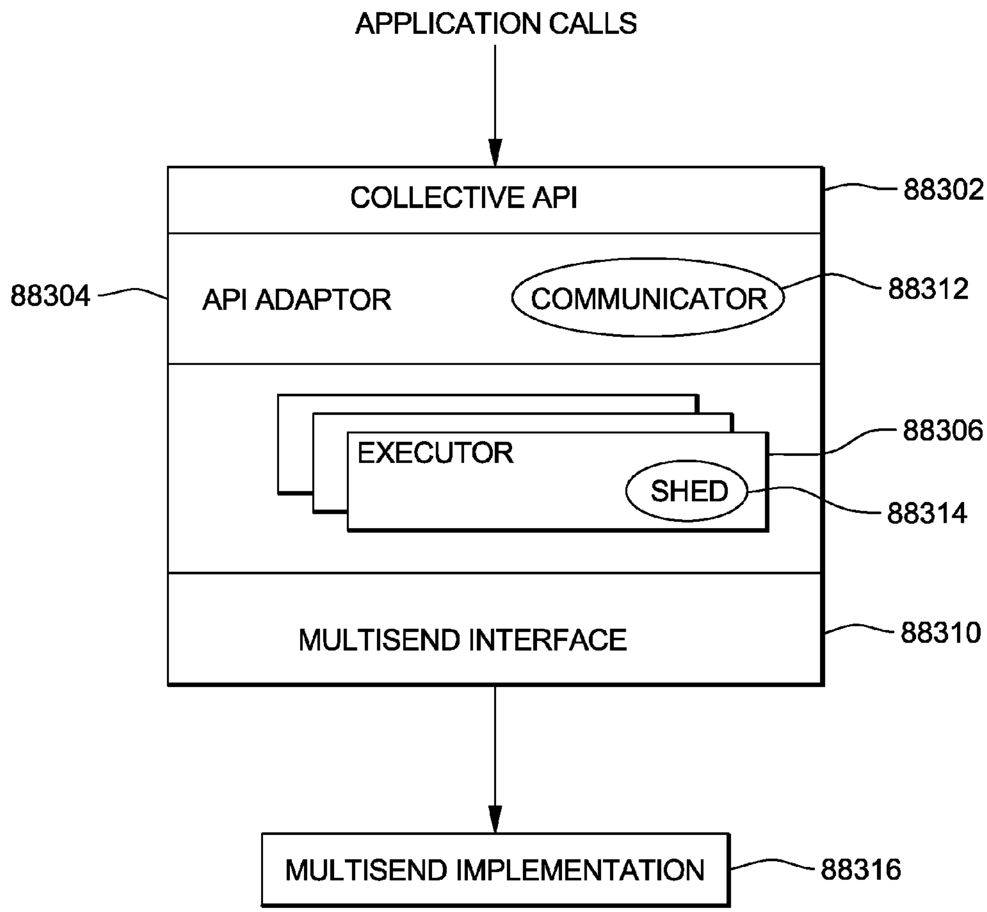
Figures 4, 6:
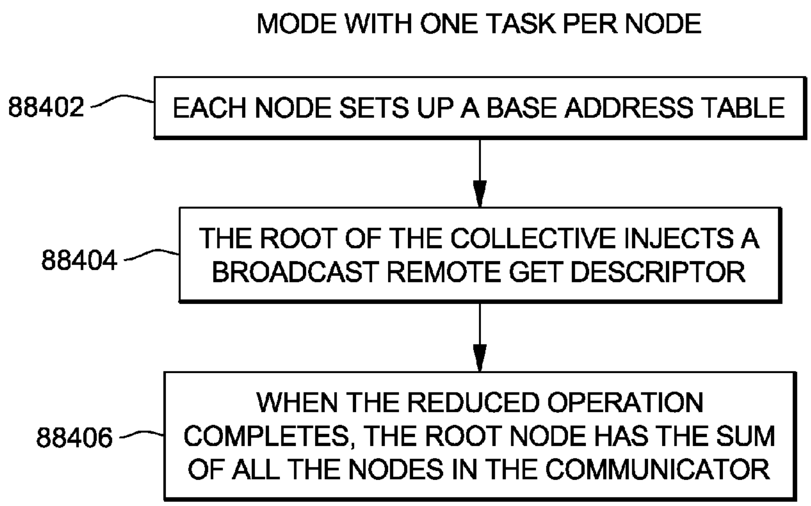
Figures 5, 6:
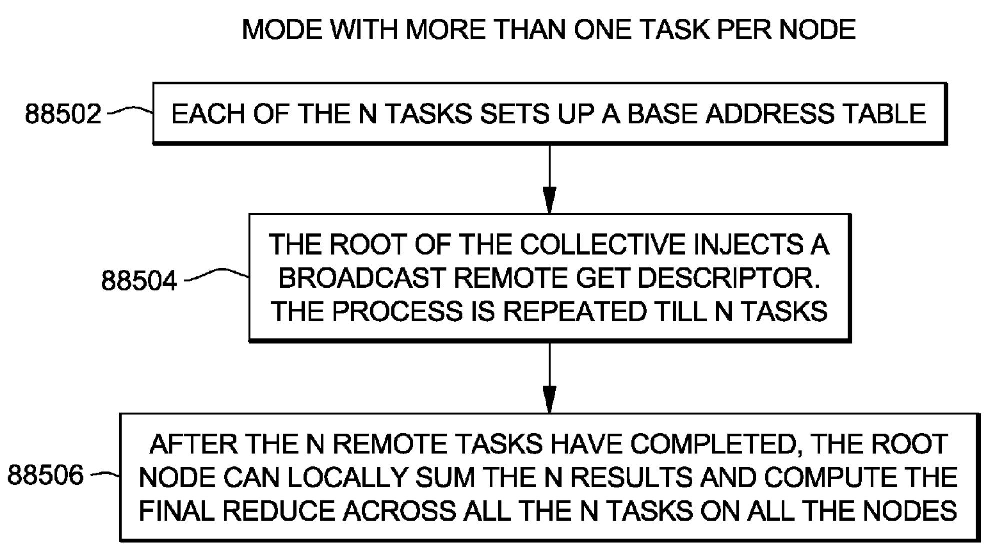
Figures 1, 6, 7:
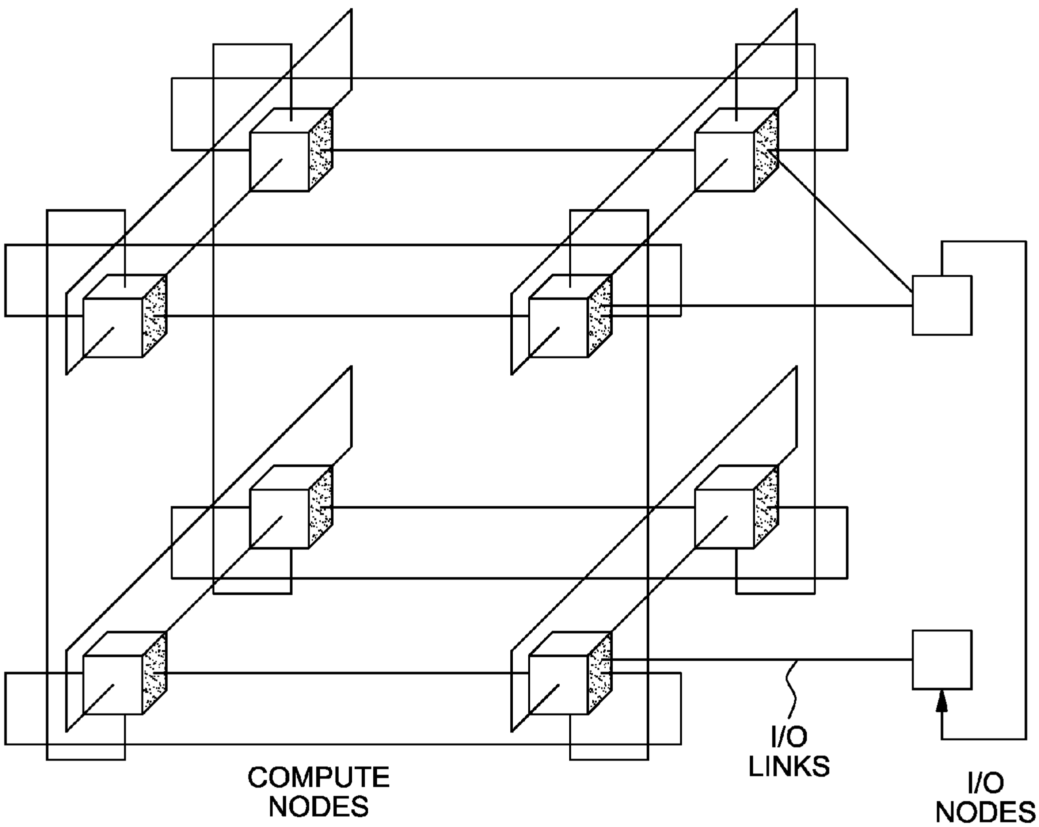
Figures 2, 6, 7:
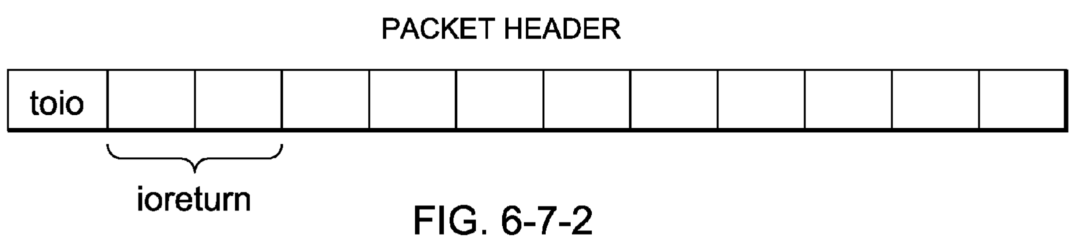
Figures 1, 6, 7, 8:
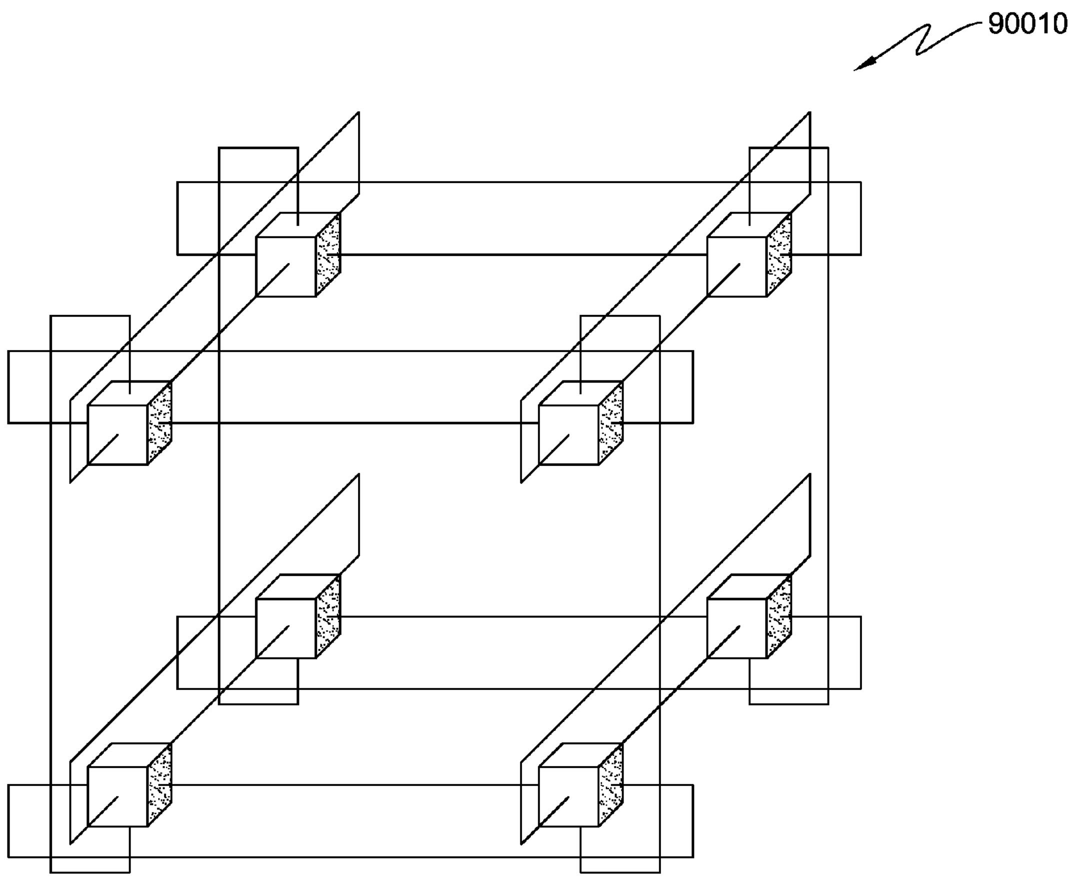
Figures 3, 6, 7, 8:
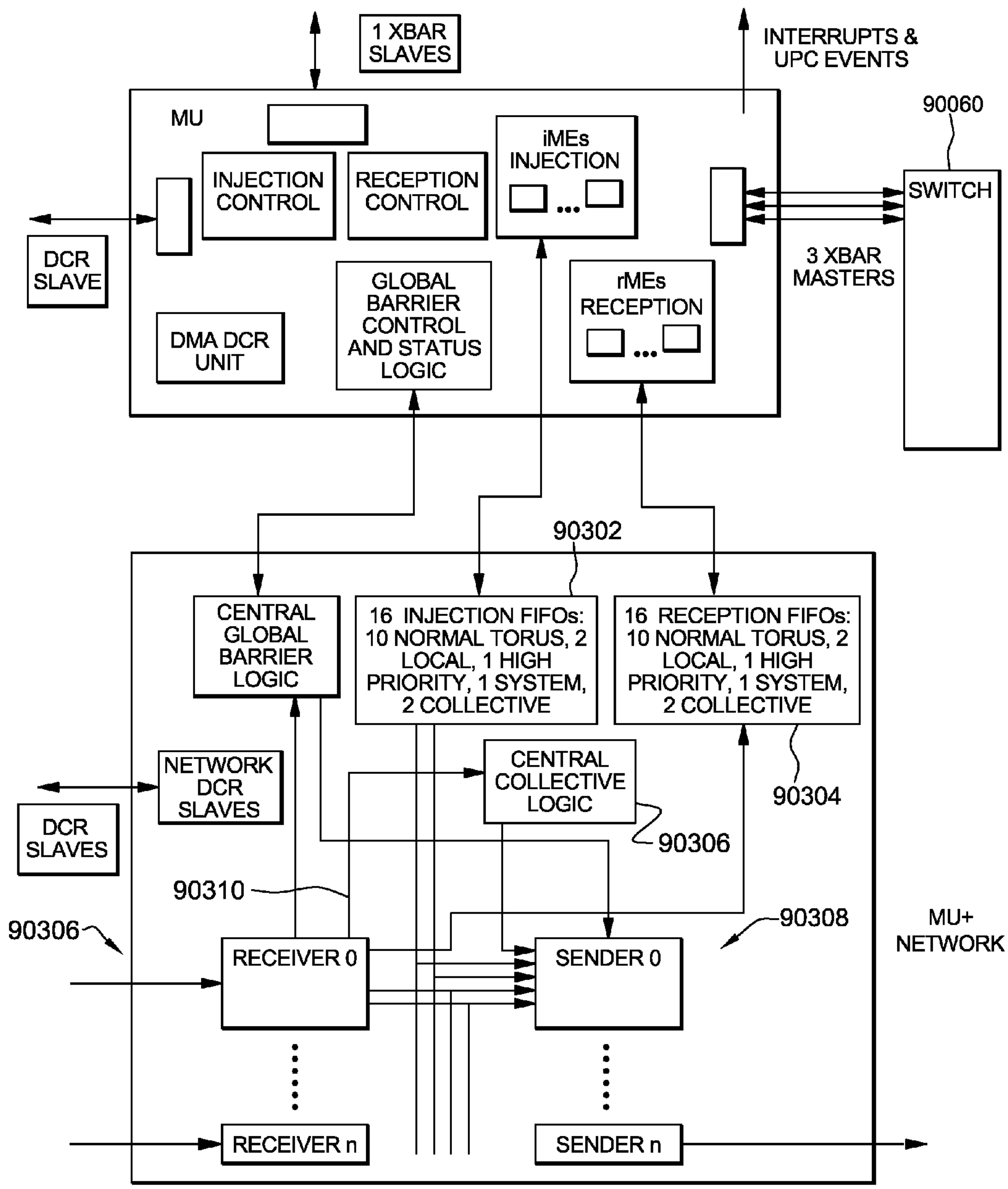
Figures 4, 6, 7, 8:
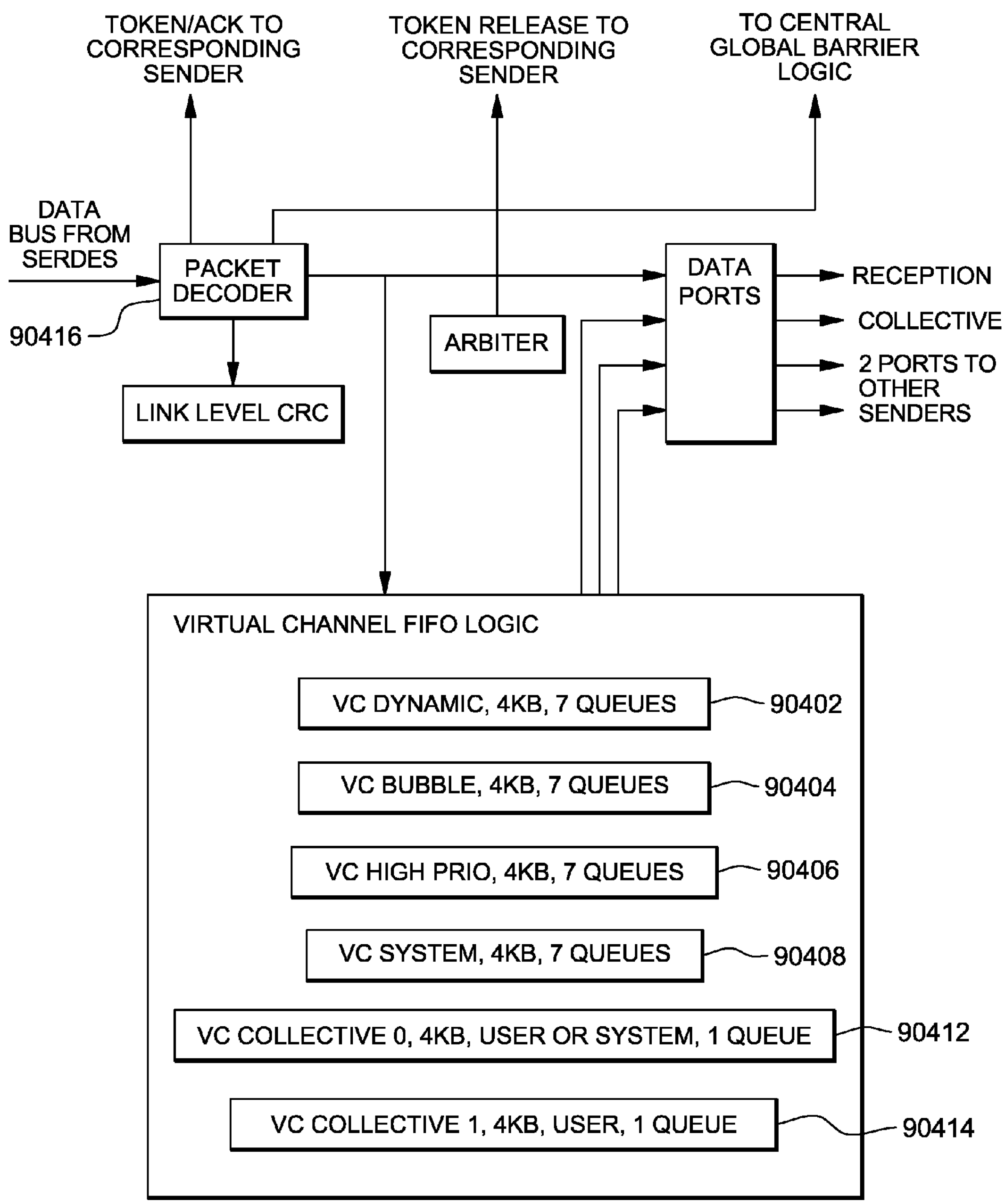
Figures 5, 6, 7, 8:
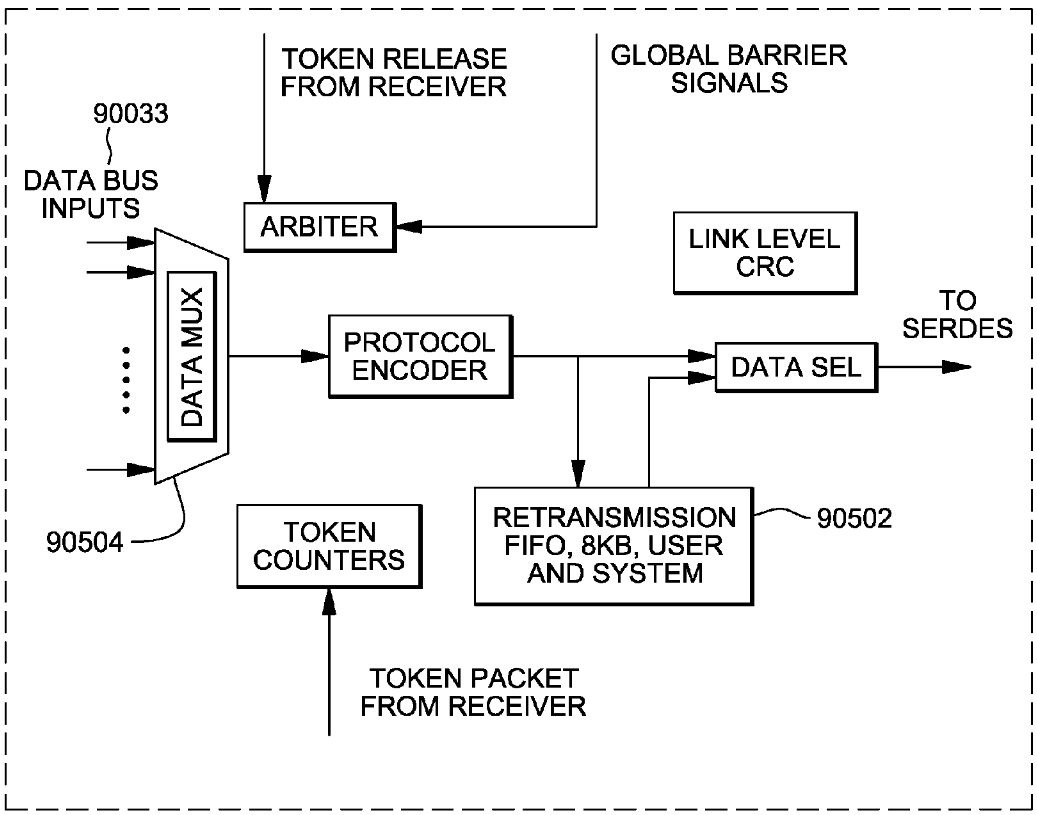
Figures 6, 7, 8:
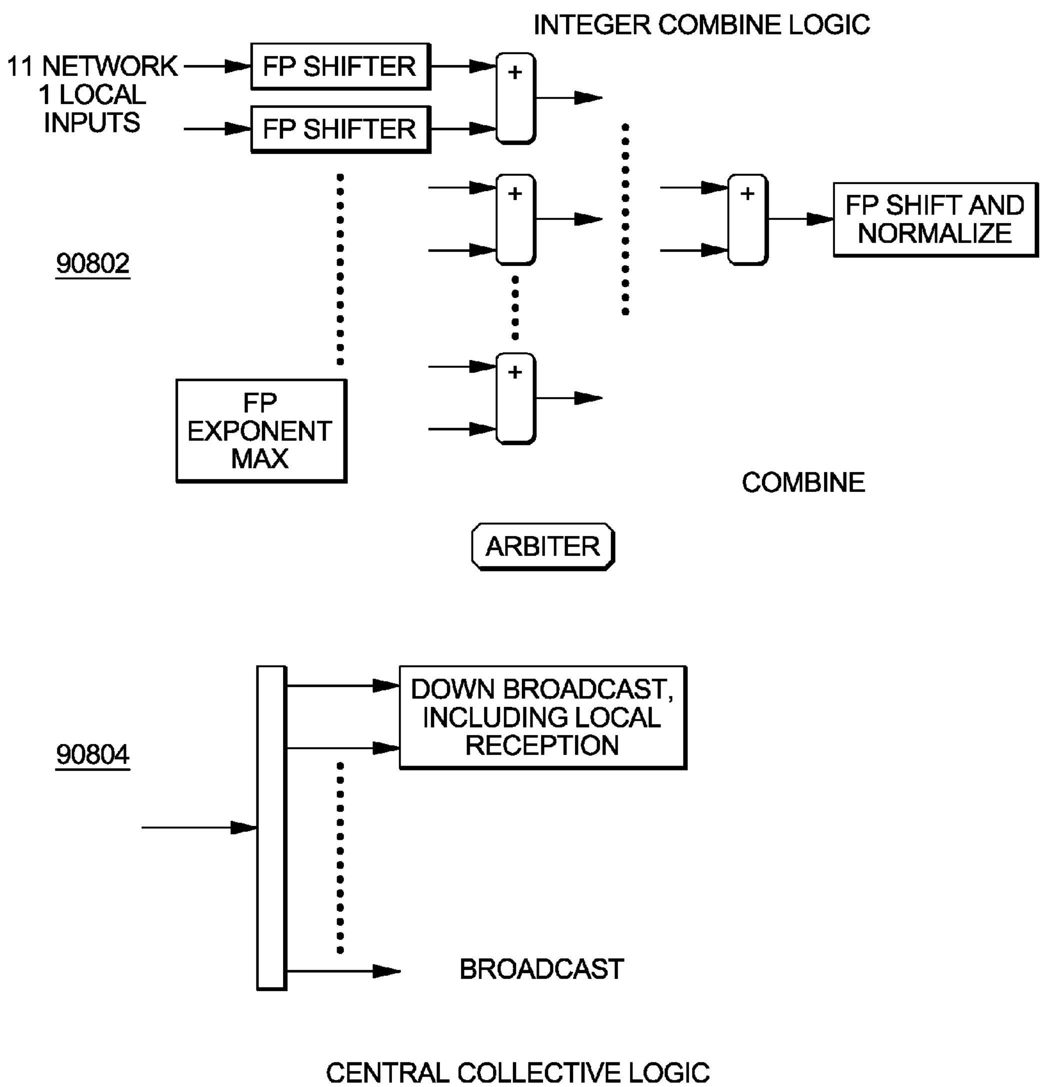
Figures 6, 7, 8, 9:
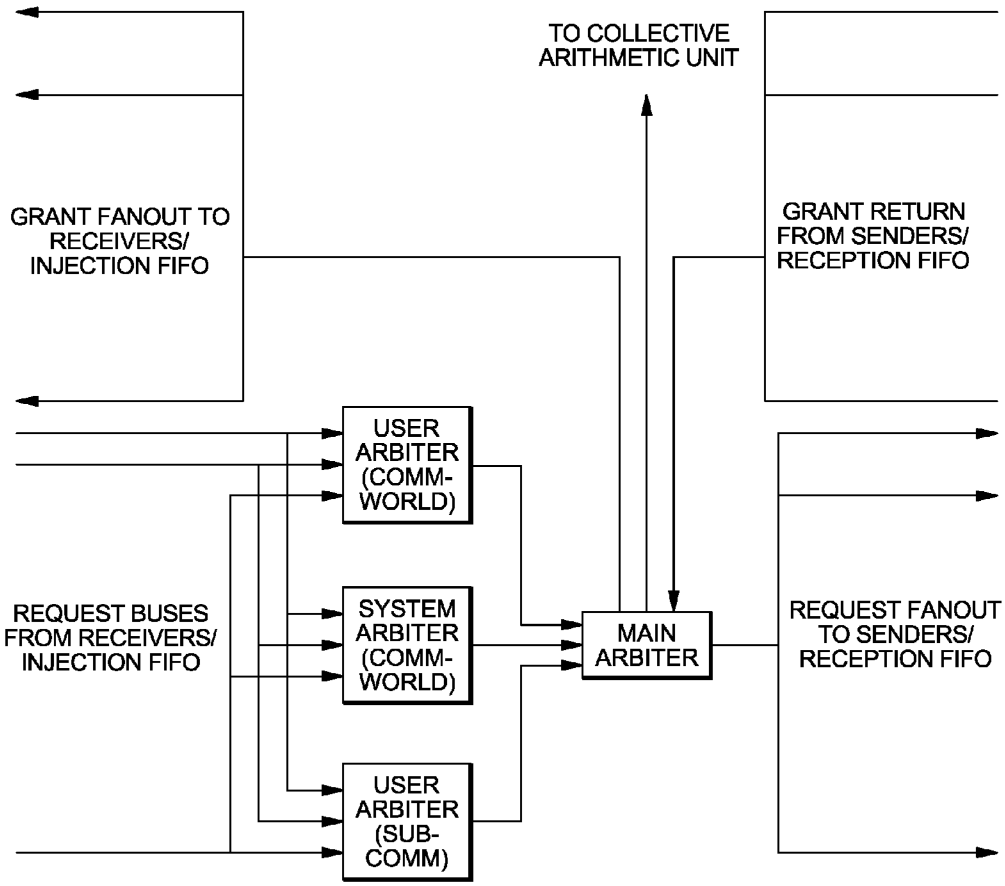
Figures 6, 7, 8, 10:
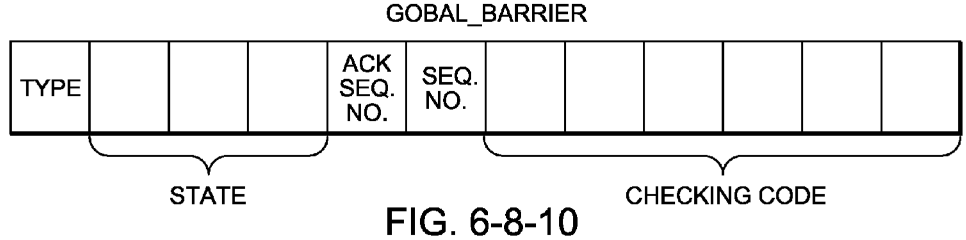
Figures 6, 7, 8, 11:
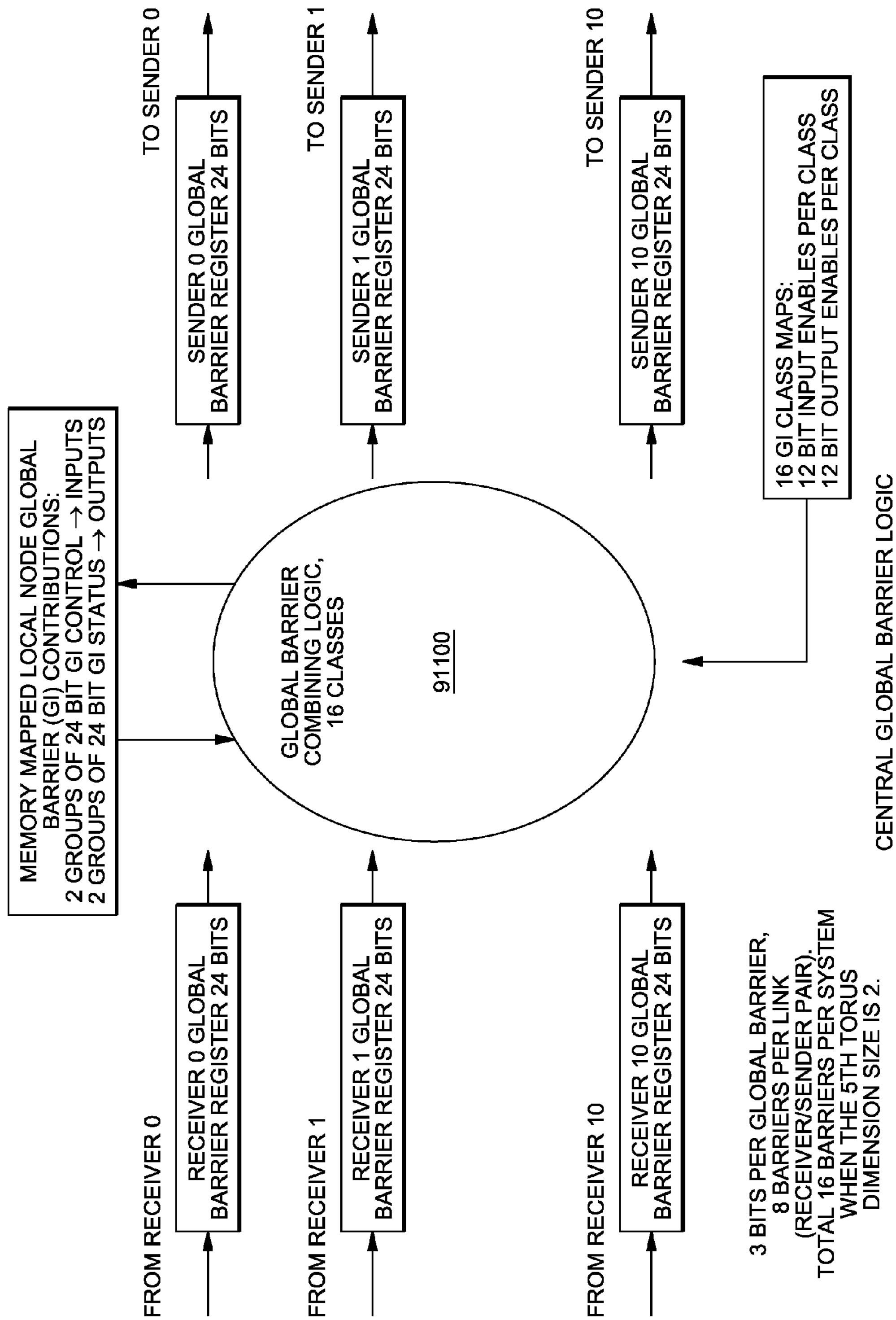
Figures 6, 7, 8, 12:
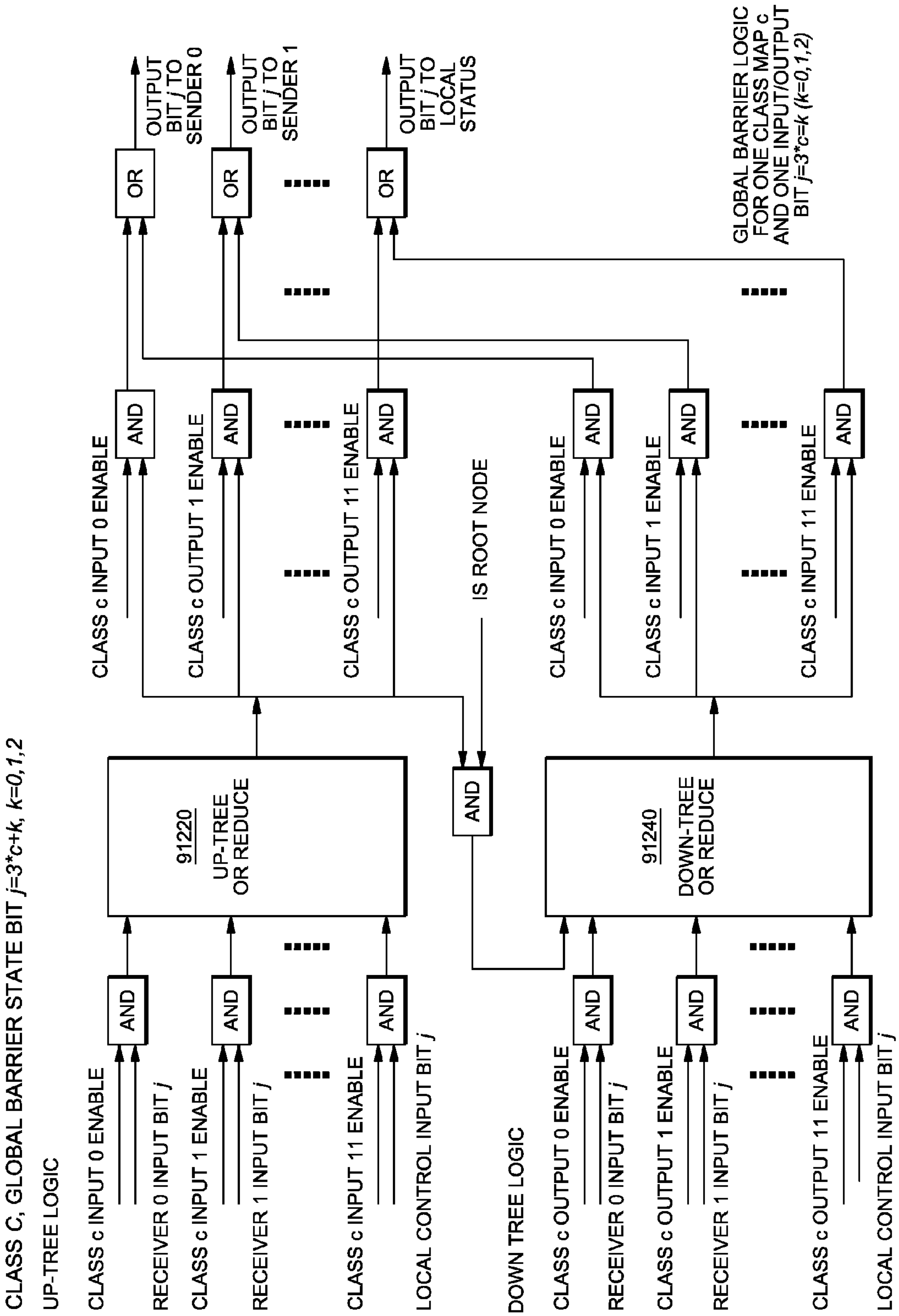
Figures 6, 7, 8, 13:
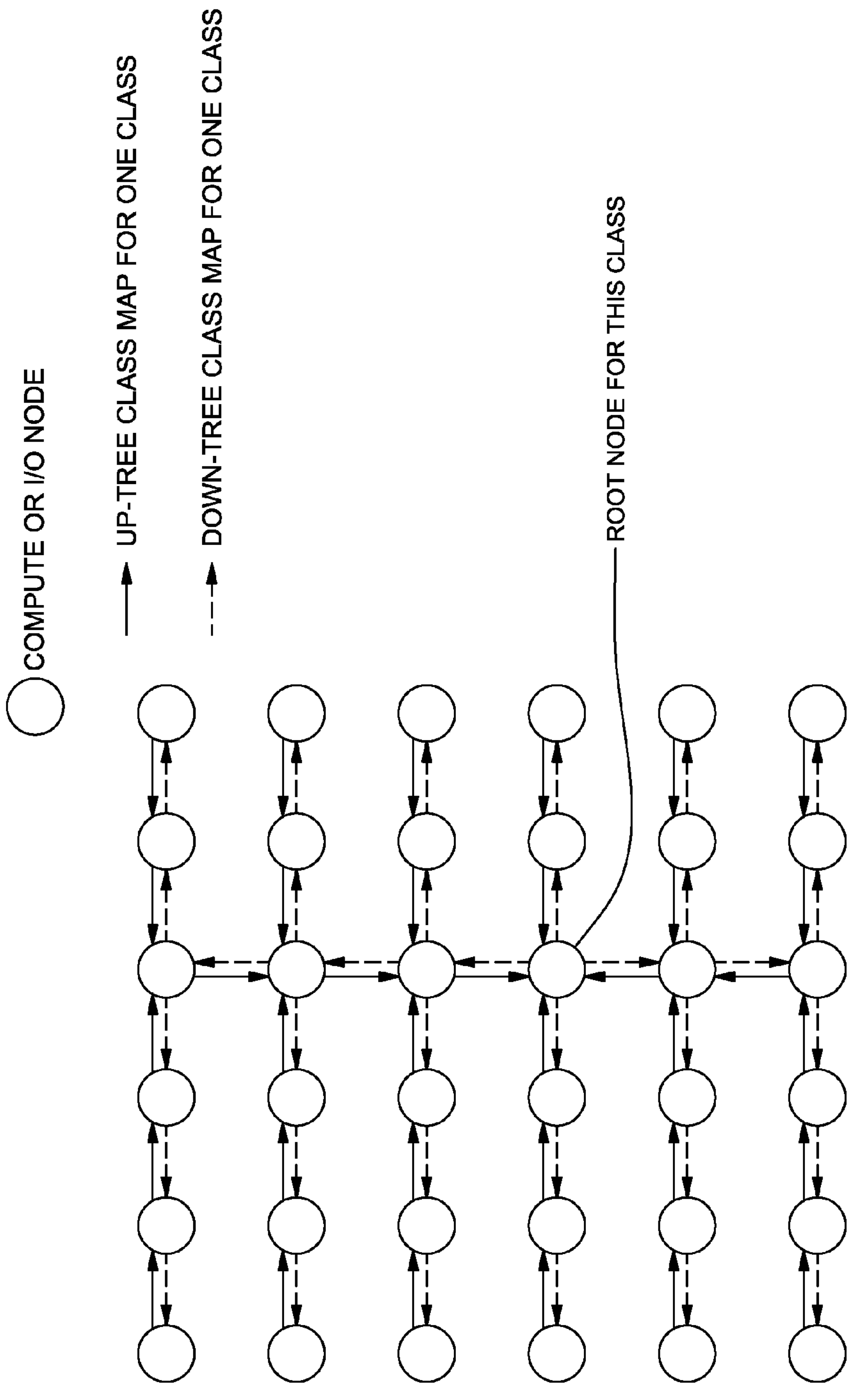

Continuing to FIG. 5-2-7K, it is shown that DMA0 has finished storing the packet and initiates atomic updating the commit tail address, e.g., to 100000+512=100512, for DMA) having ID is 0. FIG. 5-2-7L shows the updating of the commit tail and incrementing commit ID value. Then, as shown in FIG. 5-2-7M, the DMA1 tries to update the commit tail again. In this example, the request from DMA1, having a commit ID assigned a value of 1, is to update the commit tail to 100672. This time DMA 1’s request is accepted because there is no preceding DMA. Thus, the memory control logic 66165 replies to DMA1 that as the commit ID is 1 that DMA1 can now turn to update commit tail as shown in FIG. 5-2-7N. Finally commit tail points to the correct location (i.e., next to the area DMA1’s packet was stored).

It should be understood that the foregoing described algorithm holds for multiple DMA engine writes in any multiprocessing architecture. It holds even when all DMAs (e.g., DMA0 . . . 15) in respective rMEs configured to operate in parallel. In one embodiment, commit ID and advanced ID are 5 bit counters that roll-over to zero when they overflow. Further, in one embodiment, memory FIFOs are implemented as circular buffers with pointers (e.g. head and tail) that, when updated, must account for circular wrap conditions by using modular arithmetic, for example, to calculate the wrapped pointer address.

FIGS. 5-2-6A and 5-2-6B provide a flow chart describing the method 66200 that every DMA (rME) performs in parallel for a general case (i.e. this flow chart holds for any number of DMAs). In a first step 66204, there is performed setting of the “commit tail” address to the “advance tail” address and the setting of the “commit ID” equal to the “advance ID.” Then, as indicated at 66205*a* and 66205*b*, each ME in MU performs a wait operation, or idle, until a new packet belonging to a message arrives at a reception FIFO to be transferred to the memory.

Once a packet of a particular byte length has arrived at a particular DMA engine (e.g., at an rME), then in 66215, the globally maintained advance tail and advance ID are locally recorded by the DMA engine. Then, as indicated at 66220, the advance tail is set equal to the advance tail+size of the packet being stored in memory, and, at the same time (atomically) advance ID is incremented, i.e., advance ID=advance ID+1, in the embodiment described. The packet is then stored to the memory area pointed to by the locally recorded advance tail in the manner as described herein at 66224. At this point, an attempt is made to update the commit tail and commit tail ID at 66229. Proceeding next to 66231, FIG. 5-2-6B, a determination is made as to whether the commit ID is equal to the locally recorded advance ID from step 66215 as detected by the control memory logic 66165. If not, the DMA engine having just stored the packet in memory waits at 66232 until the control memory logic has determined that prior stores to that rmFIFO of other DMAs have completed such that the memory control logic has updated commit ID to become equal to the advance ID of the waiting DMA. Then, after the commit ID becomes equal to the advance ID, the commit tail for that DMA engine is atomically updated and set equal to the locally recorded advance tail recorded plus the size of the stored packet, and the commit ID is incremented (atomically with the tail update), i.e., set equal to commit ID+1. Then, the process proceeds back to step 66205*b*, FIG. 5-2-6A, where the reception FIFO waits for a new packet to arrive.

Thus, in a multiprocessing system comprising parallel operating distributed messaging units (MUs), each with multiple DMAs engines (messaging elements, MEs), packets destined for the same rmFIFO, or packets targeted to the same processor in a multiprocessor system could be received at different DMAs. To achieve high throughput, the packets can be processed in parallel on different DMAs.

FIG. 5-3-1 is an example of an asymmetrical torus. The shown example is a two-dimensional torus that is longer along one axis, e.g., the y-axis (+/−y-dimension) and shorter along another axis, e.g., the x-axis (+/−x-dimension). The size of the torus is defined as (Nx, Ny), where Nx is the number of nodes along the x-axis and Ny is the number of nodes along the y-axis; the total number of nodes in the torus is calculated as Nx*Ny. In the given example, there are six nodes along the x-axis and seven nodes along the y-axis, for a total of 42 nodes in the entire torus. The torus is asymmetrical because the number of nodes along the y-axis is greater than the number of nodes along the x-axis. It is understood that an asymmetrical torus is also possible within a three-dimensional torus having x, y, and z-dimensions, as well as within a five-dimensional torus having a, b, c, d, and e-dimensions.

The asymmetrical torus comprises nodes 67102$_1$ to 67102$_n$. These nodes are also known as ‘compute nodes’. Each node 67102 occupies a particular point within the torus and is interconnected, directly or indirectly, by a physical wire to every other node within the torus. For example, node 67102$_1$ is directly connected to node 67102$_2$ and indirectly connected to node 67102$_3$. Multiple connecting paths between nodes 67102 are often possible. A feature of the present invention is a system and method for selecting the ‘best’ or most efficient path between nodes 67102. In one embodiment, the best path is the path that reduces communication bottlenecks along the links between nodes 67102. A communication bottleneck occurs when a reception FIFO at a receiving node is full and unable to receive a data packet from a sending node. In another embodiment, the best path is the quickest path between nodes 67102 in terms of computational time. Often, the quickest path is also the same path that reduces communication bottlenecks along the links between nodes 67102.

As an example, assume node 67102$_1$ is a sending node and node 67102$_6$ is a receiving node. Nodes 67102$_1$ and 67102$_6$ are indirectly connected. There exists between these nodes a ‘best’ path for communicating data packets. In an asymmetrical torus, experiments conducted on the IBM BLUEGENE™ parallel computer system have revealed that the ‘best’ path is generally found by routing the data packets along the longest dimension first, then continually routing the data across the next longest path, until the data is finally routed across the shortest path to the destination node. In this example, the longest path between node $102_1$ and node $102_6$ is along the y-axis and the shortest path is along the x-axis. Therefore, in this example the 'best' path is found by communicating data along the y-axis from node $67102_1$ to node $67102_2$ to node $67102_3$ to node $67102_4$ and then along the x-axis from node $67102_4$ node $67102_5$ and finally to receiving node $67102_6$. Traversing the torus in this manner, i.e., by moving along the longest available path first, has been shown in experiments to increase the efficiency of communication between nodes in an asymmetrical torus by as much as 40%. These experiments are further discussed in "Optimization of All-to-all Communication on the Blue Gene/L Supercomputer" 37$^{th}$ International Conference on Parallel Processing, IEEE 2008, the contents of which are incorporated by reference in their entirety. In those experiments, packets were first injected into the network and sent to an intermediate node along the longest dimension, where it was received into the memory of the intermediate node. It was then re-injected into the network to the final destination. This requires additional software overhead and requires additional memory bandwidth on the intermediate nodes. The present invention is much more general than this, and requires no receiving and re-injecting of packets at intermediate nodes.

As shown in FIG. 5-3-3A, the injection FIFO 65180, (where i=1 to 16 for example, see FIG. 5-1-2) comprises a network logic device 67381 for routing data packets, a hint bit calculator 67382, and data arrays 67383. While only one data array 67383 is shown, it is understood that the injection FIFO 65180 contains a memory for storing multiple data arrays. The data array 67383 further includes data packets 67384 and 67385. The injection FIFO 65180 is coupled to the network DCR 67355. The network DCR is also coupled to the reception FIFO 67390, the receiver 67356, and the sender 67357. A complete description of the DCR architecture is available in IBM's Device Control Register Bus 3.5 Architecture Specifications Jan. 27, 2006, which is incorporated by reference in its entirety. The network logic device 67381 controls the flow of data into and out of the injection FIFO 65180. The network logic device 67381 also functions to apply 'mask bits' supplied from the network DCR 65182 (FIG. 5-1-2) to hint bits stored in the data packet 67384 as described in further detail below. The hint bit calculator functions to calculate the 'hint bits' that are stored in a data packet 67384 to be injected into the torus network.

The MU 65100 (FIG. 5-1-2) further includes an Interface to a cross-bar switch (XBAR) switch, or in additional implementations SerDes switches. In one embodiment, the MU 65100 operates at half the clock of the processor core, i.e., 800 MHz. In one embodiment, the Network Device 65150 operates at 500 MHz (e.g., 2 GB/s network). The MU 65100 includes three (3) XBAR masters 65125 to sustain network traffic and two (2) XBAR slaves 65126 for programming. A DCR slave interface unit 65127 for connecting the DMA DCR unit 65128 to one or more DCR slave registers (not shown) is also provided.

The handover between network device 65150 and MU 65100 is performed via 2-port SRAMs for network injection/reception FIFOs. The MU 65100 reads/writes one port using, for example, an 800 MHz clock, and the network reads/writes the second port with a 500 MHz clock. The only handovers are through the FIFOs and FIFOs' pointers (which are implemented using latches).

FIG. 5-3-4 is an example of a data packet 67384. There are 2 hint bits per dimension that specify the direction of a of a packet route in that dimension in the data packet header. A data packet routed over a 2-dimensional torus utilizes 4 hint bits. One hint bit represents the '+x' dimension and another hint bit represents the '−x' dimension; one hint bit represents the '+y' dimension and another hint bit represents the '−y' dimension. A data packet routed over a 3-dimensional torus utilizes 6 hint bits. One hint bit each represents the +/−x, +/−y and +/−z dimensions. A data packet routed over a 5-dimensional torus utilizes 10 hint bits. One hint bit each represents the +/−a, +/−b, +/−c, +/−d and +/−e dimensions.

The size of the data packet 67384 may range from 32 to 544 bytes, in increments of 32 bytes. The first 32 bytes of the data packet 67384 form the packet header. The first 12 bytes of the packet header form a network header (bytes 0 to 11); the next 20 bytes form a message unit header (bytes 12 to 31). The remaining bytes (bytes 32 to 543) in the data packet 67384 are the payload 'chunks'. In one embodiment, there are up to 16 payload 'chunks', each chunk containing 32 bytes.

Several bytes within the data packet 67384, i.e., byte 67402, byte 67404 and byte 67406 are shown in further detail in FIG. 5-3-5. In one embodiment of the invention, bytes 67402 and 67404 comprise hint bits for the +/−a, +/−b, +/−c, +/−d and +/−e dimensions. In addition, byte 404 comprises additional routing bits. Byte 67406 comprises bits for selecting a virtual channel (an escape route), i.e., bits 67517, 67518, 67519 for example, and zone identifier bits. In one embodiment, the zone identifier bits are set by the processor. Zone identifier bits are also known as 'selection bits'. The virtual channels prevent communication deadlocks. To prevent deadlocks, the network logic device 67381 may route the data packet on a link in direction of an escape link and an escape virtual channel when movement in the one or more allowable routing directions for the data packet within the network is unavailable. Once a data packet is routed onto the escape virtual channel, if the 'stay on bubble' bit 67522 is set to 1 to keep the data packet on the escape virtual channel towards its final destination. If the 'stay on bubble' bit 67522 is 0, the packet may change back to the dynamic virtual channel and continue to follow the dynamic routing rules as described in this patent application. Details of the escape virtual channel are further discussed in U.S. Pat. No. 7,305,487.

Referring now to FIG. 5-3-5, bytes 67402, 67404 and 67406 are described in greater detail. The data packet 67384 includes a virtual channel (VC), a destination address, 'hint' bits and other routing control information. In one embodiment utilizing a five-dimensional torus, the data packet 67384 has 10 hint bits stored in bytes 67402 and 67404, 1 hint bit for each direction (2 bits/dimension) indicating whether the network device is to route the data packet in that direction. Hint bit 67501 for the '−a' direction, hint bit 67502 for the '+a' direction, hint bit 67503 for the '−b' direction, hint bit 67504 for the '+b' direction, hint bit 67505 for the '−c' direction, hint bit 67506 for the '+c' direction, hint bit 67507 for the '−d' direction, hint bit 67508 for the '+d' direction, hint bit 67509 for the '−e' direction and hint bit 67510 for the '+e' direction. When the hint bits for a direction are set to 1, in one embodiment the data packet 67384 is allowed to be routed in that direction. For example, if hint bit 67501 is set to 1, then the data packet is allowed to move in the '−a' direction. It is illegal to set both the plus and minus hint bits for the same dimension. For example, if hint bit 67501 is set to 1 for the '−a' dimension, then hint bit 67502 for the '+a' dimension must be set to 0.

A point-to-point packet flows along the directions specified by the hint bits at each node until reaching its final destination. As described in U.S. Pat. No. 7,305,487 the hint bits get modified as the packet flows through the network. When a node reaches its destination in a dimension, the network logic device 67381 changes the hint bits for that dimension to 0, indicating that the packet has reached its destination in that dimension. When all the hint bits are 0, the packet has reached its final destination. An optimization of this permits the hint bit for a dimension to be set to 0 on the node just before it reaches its destination in that dimension. This is accomplished by having a DCR register containing the node's neighbor coordinate in each direction. As the packet is leaving the node on a link, if the data packet's destination in that direction's dimension equals the neighbor coordinate in that direction, the hint bit for that direction is set to 0.

The Injection FIFO 65180 stores data packets that are to be injected into the network interface by the network logic device 67381. The network logic device 67381 parses the data packet to determine in which direction the data packet should move towards its destination, i.e., in a five-dimensional torus the network logic device 67381 determines if the data packet should move along links in the 'a' 'b' 'c' 'd' or 'e' dimensions first by using the hint bits. With dynamic routing, a packet can move in any direction provided the hint bit for direction is set and the usual flow control tokens are available and the link is not otherwise busy. For example, if the '+a' and '+b' hint bits are set, then a packet could move in either the '+a' or '+b' directions provided tokens and links are available.

Dynamic routing, where the proper routing path is determined at every node, is enabled by setting the 'dynamic routing' bit in the data packet header 67514 to 1. To improve performance on asymmetric tori, 'zone' routing can be used to force dynamic packets down certain dimensions before others. In one embodiment, the data packet 67384 contains 2 zone identifier bits 67520 and 67521, which point to registers in the network DCR unit 65182 (FIG. 5-1-2) containing the zone masks. These masks are only used when dynamic routing is enabled. The mask bits are programmed into the network DCR 65182 registers by software. The zone identifier set by 'zone identifier' bits 67520 and 67521 are used to select an appropriate mask from the network DCR 65182. In one embodiment, there are five sets of masks for each zone identifier. In one embodiment, there is one corresponding mask bit for each hint bit. In another embodiment, there is half the number of mask bits as there are hint bits, but the mask bits are logically expanded so there is a one-to-one correlation between the mask bits and the hint bits. For example, in a five-dimensional torus if the mask bits are set to 10100, where 1 represents the 'a' dimension, 0 represents the 'b' dimension, 1 represents the 'c' dimension, 0 represents the 'd' dimension, and 0 represents the 'e' dimension, the bits for each dimension are duplicated so that 11 represents the 'a' dimension, 00 represents the 'b' dimension, 11 represents the 'c' dimension, 00 represents the 'd' dimension, and 00 represents the 'e' dimension. The duplication of bits logically expands 10100 to 1100110000 so there are ten corresponding mask bits for each of the ten hint bits.

In one embodiment, the mask also breaks down the torus into 'zones'. A zone includes all the allowable directions in which the data packet may move. For example, in a five dimensional torus, if the mask reveals that the data packet is only allowed to move along in the '+a' and '+e' dimensions, then the zone includes only the '+a' and '+e' dimensions and excludes all the other dimensions.

For selecting a direction or a dimension, the packet's hint bits are AND-ed with the appropriate zone mask to restrict the set of directions that may be chosen. For a given set of zone masks, the first mask is used until the destination in the first dimension is reached. For example, in a 2N×N×N×N×2 torus, where N is an integer such as 16, the masks may be selected in a manner that routes the packets along the 'a' dimension first, then either the 'b' 'c' or 'd' dimensions, and then the 'e' dimension. For random traffic patterns this tends to have packets moving from more busy links onto less busy links. If all the mask bits are set to 1, there is no ordering of dynamic directions. Regardless of the zone bits, a dynamic packet may move to the 'bubble' VC to prevent deadlocks between nodes. In addition, a 'stay on bubble' bit 67522 may be set; if a dynamic packet enters the bubble VC, this bit causes the packet to stay on the bubble VC until reaching its destination.

As an example, in a five-dimensional torus, there are two zone identifier bits and ten hint bits stored in a data packet. The zone identifier bits are used to select a mask from the network DCR 65182. As an example, assume the zone identifier bits 67520 and 67521 are set to '00'. In one embodiment, there are up to five masks associated with the zone identifier bits set to '00'. A mask is selected by identifying an 'operative zone', i.e., the smallest zone for which both the hint bits and the zone mask are non-zero. The operative zone can be found using equation 1 where in this example m='00', the set of zone masks corresponding to zone identifier bits '00';

$$\text{zone } k=\min\{j{:}h\&ze\_m(j)!=0 \quad (1)$$

Where j is a variable representing the zone masks for each of the dimensions in the torus, i.e., in a five-dimensional torus k=0 to 4, j varies between 0 and 4 h represents the hint bits and ze_m(j) represents the mask bits, and the '&' represents a bitwise 'AND' operation.

The following example illustrates how a network logic device 67381 implements equation 1 is used to select an appropriate mask from the network DCR registers. As an example, assume the hint bits are set as 'h'=1000100000 corresponding to moves along the '−a' and the '−c' dimensions. Assume that three possible masks associated with the zone identifiers bits 67520 and 67521 are stored in the network DCR unit as follows: ze_m(0)=0011001111 (b, d or e moves allowed); ze_m(1)=1100000000 (a moves allowed); and ze_m(2)=0000110000 (c moves allowed).

Network logic device 67381 further applies equation 1 to the hint bits and each individual zone, i.e., ze_m(0), ze_m(1), ze_m(2), reveals the operative zone is found when k=1 because h & ze_m(0)=0, but h& ze_m(1) !=0, i.e., when the hint bits and the mask are 'AND'ed together the result is the minimum value that does not equal zero. When j=0, h & ze_m(0)=0, i.e., 1000100000 & 0011001111=0. When j=1, h & ze_m(1)=1000100000 & 1100000000=1000000000. Thus in equation 1, the min j such that h & ze_m(j) !=0 is 1 and so k=1.

After all the moves along the links interconnecting nodes in the 'a' dimension are made, at the last node of the 'a' dimension, as described earlier the logic sets the hint bits for the 'a' dimension to '00' and the hint bits 'h'=0000100000, corresponding to moves along the 'c' dimension in the example described. The operative zone is found according to equation 1 when k=2 because 'h & ze_m(0)=0', and 'h & ze_m(1)=0', and 'h & ze_m(2) !=0'.

The network logic device 67381 then applies the selected mask to the hint bits to determine which direction to forward the data packet. In one embodiment, the mask bits are 'AND'ed with the hint bits to determine the direction of the data packet. Using the example where the mask bits are 1, 0, 1, 0, 0, indicating that moves in the dimensions 'a' or 'c' are allowed. Assume the hint bits are set as follows: hint bit 67501 is set to 1, hint bit 67502 is set to 0, hint bit 67503 is set to 0, hint bit 67504 is set to 0, hint bit 67505 is set to 1, hint bit 67506 is set to 0, hint bit 67507 is set to 0, hint bit 67508 is set to 0, hint bit 67509 is set to 0, and hint bit 67510 is set to 0. The first hint bit 67501, a 1 is 'AND'ed with the corresponding mask bit, also a 1 and the output is a 1. The second hint bit 67502, a 0 is 'AND'ed with the corresponding mask bit, a 1 and the output is a 0. Application of the mask bits to the hint bits reveals that movement is enabled along '−a'. The remaining hint bits are 'AND'ed together with their corresponding mask bits to reveal that movement is enabled along the '−c' dimension. In this example, the data packet will move along either the '−a' dimension or the '−c' dimension towards its final destination. If the data packet first reaches a destination along the '−a' dimension, then the data packet will continue along the '−c' dimension towards its destination on the '−c' dimension. Likewise, if the data packet reaches a destination along the '−c' dimension then the data packet will continue along the '−a' dimension towards its destination on the '−a' dimension.

As a data packet 67384 moves along towards its destination, the hint bits may change. A hint bit is set to 0 when there are no more moves left along a particular dimension. For example, if hint bit 67501 is set to 1, indicating the data packet is allowed to move along the '−a' direction, then hint bit 67501 is set to 0 once the data packet moves the maximum amount along the '−a' direction. During the process of routing, it is understood that the data packet may move from a sending node to one or more intermediate nodes before each arriving at the destination node. Each intermediate node that forwards the data packet towards the destination node also functions as a sending node.

In some embodiments, there are multiple longest dimensions and a node chooses between the multiple longest dimensions to selecting a routing direction for the data packet 384. For example, in a five dimensional torus, dimensions '+a' and '+e' may be equally long. Initially, the sending node chooses to between routing the data packet 67384 in a direction along the '+a' dimension or the '+e' dimension. A redetermination of which direction the data packet 67384 should travel is made at each intermediate node. At an intermediate node, if '+a' and '+e' are still the longest dimensions, then the intermediate node will decide whether to route the data packet 67384 in direction of the '+a' or '+e" dimensions. The data packet 67384 may continue in direction of the dimension initially chosen, or in direction of any of the other longest dimensions. Once the data packet 67384 has exhausted travel along all of the longest dimensions, a network logic device at an intermediate node sends the data packet in direction of the next longest dimension.

The hint bits are adjusted at each compute node 65100 (FIG. 5-1-2) as the data packet 67384 moves towards its final destination. In one embodiment, the hint bit is only set to 0 at the next to last node along a particular dimension. For example, if there are 32 nodes along the '+a' direction, and the data packet 67384 is travelling to its destination on the '+a' direction, then the hint bit for the '+a' direction is set to 0 at the 31st node. When the 32nd node is reached, the hint bit for the '+a' direction is already set to 0 and the data packet 67384 is routed along another dimension as determined by the hint bits, or received at that node if all the hint bits are zero.

In an alternative embodiment, the hint bits need not be explicitly stored in the packet, but the logical equivalence to the hint bits, or "implied" hint bits can be calculated by the network logic on each node as the packet moves through the network. For example, suppose the packet header contains not the hint bits and destination, but rather the number of remaining hops to make in each dimension and whether the plus or minus direction should be used in each direction (a direction indicator). Then, when a packet reaches a node, the implied hint for a direction is 1 if the number of remaining hops in that dimension is non-zero, and the direction indicator for that dimension is set. Each time the packet makes a move in a dimension, the remaining hop count is decremented is decremented by the network logic device 67381. When the remaining hop count is zero, the packet has reached its destination in that dimension, at which point the implied hint bit is zero.

Referring now to FIG. 5-3-5, a method for calculating the hint bits is described. The method may be employed by the hardware bit calculator or by a computer readable medium (software running on a processor device at a node). The method is implemented when the data packet 676384 is written to an Injection FIFO buffer 65180 and the hint bits have not yet been set within the data packet, i.e., all the hint bits are zero. This occurs when a new data packet originating from a sending node is placed into the Injection FIFO buffer 65180. A hint bit calculator in the network logic device 67381 reads the network DCR registers 65182, determines the shortest path to the receiving node and sets the hint bits accordingly. In one embodiment, the hint bit calculator calculates the shortest distance to the receiving node in accordance with the method described in the following pseudocode, which is also shown in further detail in FIG. 5-3-6:

```
If src[d] == dest[d] hint bits in dimension d are 0
if (dest[d] > src[d] )
{
if ( dest[d] <= cutoff_plus[d]) hint bits in dimension d is set to plus
else hint bits in dimension d = minus
}
if (dest[d] < src[d] )
{
if ( dest[d] >= cutoff_minus[d]) hint bits in dimension d is set to minus
else hint bits in dimension d = plus}
```

Where d is a selected dimension, e.g., '+/−x', '+/−y', '+/−z' or '+/−a', '+/−b', '+/−c', '+/−d', '+/−e'; and cutoff_plus[d] and cutoff_minus[d] are software controlled programmable cutoff registers that store values that represent the endpoints of the selected dimension. The hint bits are recalculated and rewritten to the data packet 67384 by the network logic device 67381 as the data packet 67384 moves towards its destination. Once the data packet 67384 reaches the receiving node, i.e., the final destination address, all the hint bits are set to 0, indicating that the data packet 384 should not be forwarded.

The method starts at block 67602. At block 67602, if a node along the source dimension is equal to a node along the dimension, then the data packet has already reached its destination on that particular dimension and the data packet does not need to be forwarded any further along that one dimension. If this situation is true, then at block 67604 all of the hint bits for that dimension are set to zero by the hint bit calculator and the method ends. If the node along the source dimension is not equal to the node along the destination dimension, then the method proceeds to step 67606. At step 67606, if the node along the destination dimension is greater than the node along the source dimension, e.g., the destination node is in a positive direction from the source node, then method moves to block 67612. If the node along the destination dimension is not greater than the source node, e.g., the destination node is in a negative direction from the source node, then method proceeds to block 67608.

At block 67608, a determination is made as to whether the destination dimension is greater than or equal to a value stored in the cutoff_minus register. The plus and minus cutoff registers are programmed in such a way that a packet will take the smallest number of hops in each dimension If the destination dimension is greater than or equal to the value stored in the cutoff_minus register, then the method proceeds to block 67609 and the hint bits are set so that the data packet 67384 is routed in a negative direction for that particular dimension. If the destination dimension is not greater than or equal to the value stored in the cutoff_plus register, then the method proceeds to block 67610 and the hint bits are set so the data packet 67384 is routed in a positive dimension for that particular dimension.

At block 67612, a determination is made as to whether the destination dimension is less than or equal to a value stored in the cutoff_plus register. If the destination dimension is less than or equal to the value stored in the cutoff_plus register, then the method proceeds to block 67616 and the hint bits are set so that the data packet is routed in a positive direction for that particular dimension. If the destination dimension is not less than or equal to the value stored in the cutoff_plus register, then the method proceeds to block 67614 and the hint are set so that the data packet 67384 is routed in a negative direction for that particular dimension.

The above method is repeated for each dimension to set the hint bits for that particular dimension, i.e., in a five-dimensional torus the method is implemented once for each of the 'a', 'b', 'c', 'd', and 'e' dimensions.

Network Support for System Initiated Checkpoint

In parallel computing system, such as BlueGene® (a trademark of International Business Machines Corporation, Armonk N.Y.), system messages are initiated by the operating system of a compute node. They could be messages communicated between the Operating System (OS) kernel on two different compute nodes, or they could be file I/O messages, e.g., such as when a compute node performs a "printf" function, which gets translated into one or more messages between the OS on a compute node OS and the OS on (one or more) I/O nodes of the parallel computing system. In highly parallel computing systems, a plurality of processing nodes may be interconnected to form a network, such as a Torus; or, alternately, may interface with an external communications network for transmitting or receiving messages, e.g., in the form of packets.

As known, a checkpoint refers to a designated place in a program at which normal processing is interrupted specifically to preserve the status information, e.g., to allow resumption of processing at a later time. Checkpointing, is the process of saving the status information. While checkpointing in high performance parallel computing systems is available, generally, in such parallel computing systems, checkpoints are initiated by a user application or program running on a compute node that implements an explicit start checkpointing command, typically when there is no on-going user messaging activity. That is, in prior art user-initiated checkpointing, user code is engineered to take checkpoints at proper times, e.g., when network is empty, no user packets in transit, or MPI call is finished.

In one aspect t is desirable to have the computing system initiate checkpoints, even in the presence of on-going messaging activity. Further, it must be ensured that all incomplete user messages at the time of the checkpoint be delivered in the correct order after the checkpoint. To further complicate matters, the system may need to use the same network as is used for transferring system messages.

In one aspect, a system and method for checkpointing in parallel, or distributed or multiprocessor-based computer systems is provided that enables system initiation of checkpointing, even in the presence of messaging, at arbitrary times and in a manner invisible to any running user program.

In this aspect, it is ensured that all incomplete user messages at the time of the checkpoint be delivered in the correct order after the checkpoint. Moreover, in some instances, the system may need to use the same network as is used for transferring system messages.

The system, method and computer program product supports checkpointing in a parallel computing system having multiple nodes configured as a network, and, wherein the system, method and computer program product in particular, obtains system initiated checkpoints, even in the presence of on-going user message activity in a network.

As there is provided a separation of network resources and DMA hardware resources used for sending the system messages and user messages, in one embodiment, all user and system messaging be stopped just prior to the start of the checkpoint. In another embodiment, only user messaging be stopped prior to the start of the checkpoint.

Thus, there is provided a system for checkpointing data in a parallel computing system having a plurality of computing nodes, each node having one or more processors and network interface devices for communicating over a network, the checkpointing system comprising: one or more network elements interconnecting the network interface devices of computing nodes via links to form a network; a control device to communicate control signals to each the computing node of the network for stopping receiving and sending message packets at a node, and to communicate further control signals to each the one or more network elements for stopping flow of message packets within the formed network; and, a control unit, at each computing node and at one or more the network elements, responsive to a first control signal to stop each of the network interface devices involved with processing of packets in the formed network, and, to stop a flow of packets communicated on links between nodes of the network; and, the control unit, at each node and the one or more network elements, responsive to second control signal to obtain, from each the plurality of network interface devices, data included in the packets currently being processed, and to obtain from the one or more network elements, current network state information, and, a memory storage device adapted to temporarily store the obtained packet data and the obtained network state information.

As described herein with respect to FIG. 5-1-2, the herein referred to Messaging Unit 65100 implements plural direct memory access engines to offload the network interface 65150. In one embodiment, it transfers blocks via three switch master ports 65125 between the L2-caches 70 (FIG. 1-0) and the reception FIFOs 65190 and transmission FIFOs 65180 of the network interface unit 65150. The MU is additionally controlled by the cores via memory mapped I/O access through an additional switch slave port 65126.

One function of the messaging unit 65100 is to ensure optimal data movement to, and from, the network into the local memory system for the node by supporting injection and reception of message packets. As shown in FIG. 5-1-2, in the network interface 65150 the injection FIFOs 65180 and reception FIFOs 65190 (sixteen for example) each comprise a network logic device for communicating signals used for controlling routing data packets, and a memory for storing multiple data arrays. Each injection FIFOs 65180 is associated with and coupled to a respective network sender device $65185_n$ (where n=1 to 16 for example), each for sending message packets to a node, and each network reception FIFOs 65190 is associated with and coupled to a respective network receiver device $65195_n$ (where n=1 to 16 for example), each for receiving message packets from a node. Each sender 65185 also accepts packets routing through the node from receivers 65195. A network DCR (device control register) 65182 is provided that is coupled to the injection FIFOs 65180, reception FIFOs 65190, and respective network receivers 65195, and network senders 65185. A complete description of the DCR architecture is available in IBM's Device Control Register Bus 3.5 Architecture Specifications Jan. 27, 2006, which is incorporated by reference in its entirety. The network logic device controls the flow of data into and out of the injection FIFO 65180 and also functions to apply 'mask bits', e.g., as supplied from the network DCR 65182. In one embodiment, the iME elements communicate with the network FIFOs in the Network interface unit 65150 and receives signals from the network reception FIFOs 65190 to indicate, for example, receipt of a packet. It generates all signals needed to read the packet from the network reception FIFOs 65190. This network interface unit 65150 further provides signals from the network device that indicate whether or not there is space in the network injection FIFOs 65180 for transmitting a packet to the network and can be configured to also write data to the selected network injection FIFOs.

The MU 65100 further supports data prefetching into the memory, and on-chip memory copy. On the injection side, the MU splits and packages messages into network packets, and sends packets to the network respecting the network protocol. On packet injection, the messaging unit distinguishes between packet injection, and memory prefetching packets based on certain control bits in its memory descriptor, e.g., such as a least significant bit of a byte of a descriptor 65102 shown in FIG. 5-1-8. A memory prefetch mode is supported in which the MU fetches a message into L2, but does not send it. On the reception side, it receives packets from a network, and writes them into the appropriate location in memory, depending on the network protocol. On packet reception, the messaging unit 65100 distinguishes between three different types of packets, and accordingly performs different operations. The types of packets supported are: memory FIFO packets, direct put packets, and remote get packets.

With respect to on-chip local memory copy operation, the MU copies content of an area in the local memory to another area in the memory. For memory-to-memory on chip data transfer, a dedicated SRAM buffer, located in the network device, is used.

FIG. 5-4-3 particularly, depicts the system elements involved for checkpointing at one node 50 of a multi processor system, such as shown in FIG. 1-0. While the processing described herein is with respect to a single node, it is understood that the description is applicable to each node of a multiprocessor system and may be implemented in parallel, at many nodes simultaneously. For example, FIG. 5-4-3 illustrates a detailed description of a DCR control Unit 5128 that includes DCR (control and status) registers for the MU 65100, and that may be distributed to include (control and status) registers 65182 for the network device (ND) 65150 shown in FIG. 5-1-2. In one embodiment, there may be several different DCR units including logic for controlling/describing different logic components (i.e., sub-units). In one implementation, the DCR units 5128 may be connected in a ring, i.e., processor read/write DCR commands are communicated along the ring—if the address of the command is within the range of this DCR unit, it performs the operation, otherwise it just passes through.

As shown in FIG. 5-4-3, DCR control Unit 5128 includes a DCR interface control device 5208 that interfaces with a DCR processor interface bus 5210*a*, 5210*b*. In operation, a processor at that node issues read/write commands over the DCR Processor Interface Bus 5210*a* which commands are received and decoded by DCR Interface Control logic implemented in the DCR interface control device 5208 that reads/writes the correct register, i.e., address within the DCR Unit 5128. In the embodiment depicted, the DCR unit 5128 includes control registers 5220 and corresponding logic, status registers 5230 and corresponding logic, and, further implements DCR Array "backdoor" access logic 5250. The DCR control device 5208 communicates with each of these elements via Interface Bus 5210*b*. Although these elements are shown in a single unit, as mentioned herein above, these DCR unit elements can be distributed throughout the node. The Control registers 5220 affect the various subunits in the MU 65100 or ND 65150. For example, Control registers may be programmed and used to issue respective stop/start signals 221*a*, . . . 221N over respective conductor lines, for initiating starting or stopping of corresponding particular subunit(s) i, e.g., subunit $5300_a, \ldots, 5300_N$ (where N is an integer number) in the MU 65100 or ND 65150. Likewise, DCR Status registers 5230 receive signals $5235_a, \ldots, 5235_N$ over respective conductor lines that reflect the status of each of the subunits, e.g., $5300_a, \ldots, 5300_N$, from each subunit's state machine $5302_a, \ldots, 5302_N$, respectively. Moreover, the array backdoor access logic 5250 of the DCR unit 5128 permits processors to read/write the internal arrays within each subunit, e.g., arrays $5305_a, \ldots, 5305_N$ corresponding to subunits $5300_a, \ldots, 5300_N$. Normally, these internal arrays $5305_a, \ldots, 5305_N$ within each subunit are modified by corresponding state machine control logic $5310_a, \ldots, 5310_N$ implemented at each respective subunit. Data from the internal arrays $5305_a, \ldots, 5305_N$ are provided to the array backdoor access logic 5250 unit along respective conductor lines $5251_a, \ldots, 5251_N$. For example, in one embodiment, if a processor issued command is a write, the "value to write" is written into the subunit id's "address in subunit", and, similarly, if the command is a read, the contents of "address in subunit" from the subunit id is returned in the value to read.

In one embodiment of a multiprocessor system node, such as described herein, there may be a clean separation of network and Messaging Unit (DMA) hardware resources used by system and user messages. In one example, users and systems are provided to have different virtual channels assigned, and different messaging sub-units such as network and MU injection memory FIFOs, reception FIFOs, and internal network FIFOs. FIG. 5-4-7 shows a receiver block in the network logic unit 65195 in FIG. 5-1-2. In one embodiment of the BlueGene/Q network design, each receiver has 6 virtual channels (VCs), each with 4 KB of buffer space to hold network packets. There are 3 user VCs (dynamic, deterministic, high-priority) and a system VC for point-to-point network packets. In addition, there are 2 collective VCs, one can be used for user or system collective packets, the other for user collective packets. In one embodiment of the checkpointing scheme of the present invention, when the network system VCs share resources with user VCs, for example, as shown in FIG. 5-4-8, both user and system packets share a single 8 KB retransmission FIFO 5350 for retransmitting packets when there are link errors. It is then desirable that all system messaging has stopped just prior to the start of the checkpoint. In one embodiment, the present invention supports a method for system initiated checkpoint as now described with respect to FIGS. 5-4-4A to 5-4-4B.

FIGS. 5-4-4A to 5-4-4B depict an example flow diagram depicting a method 5400 for checkpoint support in a multiprocessor system, such as shown in FIG. 1-0. As shown in FIG. 5-4-4A, a first step 5403 is a step for a host computing system e.g., a designated processor core at a node in the host control system, or a dedicated controlling node(s), to issue a broadcast signal to each node's O/S to initiate taking of the checkpoint amongst the nodes. The user program executing at the node is suspended. Then, as shown in FIG. 5-4-4A, at 5405, in response to receipt of the broadcast signal to the relevant system compute nodes, the O/S operating at each node will initiate stopping of all unit(s) involved with message passing operations, e.g., at the MU and network device and various sub-units thereof.

Thus, for example, at each node(s), the DCR control unit for the MU 65100 and network device 65150 is configured to issue respective stop/start signals 5221*a*, . . . 5221N over respective conductor lines, for initiating starting or stopping of corresponding particular subunit(s), e.g., subunit $\mathbf{5300}_a$, . . . , $\mathbf{5300}_N$. In an embodiment described herein, for checkpointing, the sub-units to be stopped may include all injection and reception sub-units of the MU (DMA) and network device. For example, in one example embodiment, there is a Start/stop DCR control signal, e.g., a set bit, associated with each of the iMEs 65110, rMEs 65120 (FIG. 5-1-2), injection control FSM (finite state machine), Input Control FSM, and all the state machines that control injection and reception of packets. Once stopped, new packets cannot be injected into the network or received from the network.

For example, each iME and rME can be selectively enabled or disabled using a DCR register. For example, an iME/rME is enabled when the corresponding DCR bit is 1 at the DCR register, and disabled when it is 0. If this DCR bit is 0, the rME will stay in the idle state or another wait state until the bit is changed to 1. The software executing on a processor at the node sets a DCR bit. The DCR bits are physically connected to the iME/rMEs via a "backdoor" access mechanism including separate read/write access ports to buffers arrays, registers, and state machines, etc. within the MU and Network Device. Thus, the register value propagates to iME/rME registers immediately when it is updated.

The control or DCR unit may thus be programmed to set a Start/stop DCR control bit provided as a respective stop/start signal 5221*a*, . . . , 5221N corresponding to the network injection FIFOs to enable stop of all network injection FIFOs. As there is a DCR control bit for each subunit, these bits get fed to the appropriate iME FSM logic which will, in one embodiment, complete any packet in progress and then prevent work on subsequent packets. Once stopped, new packets will not be injected into the network. Each network injection FIFO can be started/stopped independently.

As shown in FIG. 5-4-6 illustrating the referred to backdoor access mechanism, a network DCR register 5182 is shown coupled over conductor or data bus 5183 with one injection FIFO 65180, (where i=1 to 16 for example) that includes a network logic device 5381 used for the routing of data packets stored in data arrays 5383, and including controlling the flow of data into and out of the injection FIFO $\mathbf{65180}_i$, and, for accessing data within the register array for purposes of checkpointing via an internal DCR bus. While only one data array 5383 is shown, it is understood that each injection FIFO $\mathbf{65180}_i$ may contain multiple memory arrays for storing multiple network packets, e.g., for injecting packets 5384 and 5385.

Further, the control or DCR unit sets a Start/stop DCR control bit provided as a respective stop/start signal 5221*a*, . . . 5221N corresponding to network reception FIFOs to enable stop of all network reception FIFOs. Once stopped, new packets cannot be removed from the network reception FIFOs. Each FIFO can be started/stopped independently. That is, as there is a DCR control bit for each subunit, these bits get fed to the appropriate FSM logic which will, in one embodiment, complete any packet in progress and then prevent work on subsequent packets. It is understood that a network DCR register 5182 shown in FIG. 5-4-6 is likewise coupled to each reception FIFO for controlling the flow of data into and out of the reception FIFO $\mathbf{65190}_i$ (FIG. 5-1-2), and, for accessing data within the register array for purposes of checkpointing.

In an example embodiment, for the case of packet reception, if this DCR stop bit is set to logic 1, for example, while the corresponding rME is processing a packet, the rME will continue to operate until it reaches either the idle state or a wait state. Then it will stay in the state until the stop bit is removed, or set to logic 0, for example. When an rME is disabled (e.g., stop bit set to 1), even if there are some available packets in the network device's reception FIFO, the rME will not receive packets from the network FIFO. Therefore, all messages received by the network FIFO will be blocked until the corresponding rME is enabled again.

Further, the control or DCR unit sets a Start/stop DCR control bit provided as a respective stop/start signal 5221*a*, . . . 5221N corresponding to all network sender and receiver units such as sender units $\mathbf{65185}_0$-$\mathbf{65185}_N$ and receiver units $\mathbf{65195}_0$-$\mathbf{65195}_N$ shown in FIG. 5-1-2. FIG. 5-4-5A, particularly depicts DCR control registers 5501 at predetermined addresses, some associated for user and system use, having a bit set to stop operation of Sender Units, Receiver Units, Injection FIFOs, Rejection FIFOs. That is, a stop/start signal may be issued for stop/starting all network sender and receiver units. Each sender and receiver can be started/stopped independently. FIG. 5-4-5A and FIG. 5-4-5B depicts example (DCR) control registers 5501 that support Injection//Reception FIFO control at the network device (FIG. 5-4-5A) used in stopping packet processing, and, example control registers 5502 that support resetting Injection//Reception FIFOs at the network device (FIG. 5-4-5B). FIG. 5-4-5C depicts example (DCR) control registers 5503 that are used to stop/start state machines and arrays associated with each link's send (Network Sender units) and receive logic (Receiver units) at the network device 65150 for checkpointing.

In the system shown in FIG. 1-0, there may be employed a separate external host control network 18 that may include Ethernet and/or JTAG [(Joint Test Action Group) IEEE Std 1149.1-1990)] control network interfaces, that permits communication between the control host and computing nodes to implement a separate control host barrier. Alternately, a single node or designated processor at one of the nodes may be designated as a host for purposes of taking checkpoints.

That is, the system of the invention may have a separate control network, wherein each compute node signals a "barrier entered" message to the control network, and it waits until receiving a "barrier completed" message from the control system. The control system implemented may send such messages after receiving respective barrier entered messages from all participating nodes.

Thus, continuing in FIG. 5-4-4A, after initiating checkpoint at 5405, the control system then polls each node to determine whether they entered the first barrier. At each computing node, when all appropriate sub-units in that node have been stopped, and when all packets can no longer move in the network (message packet operations at each node cease), e.g., by checking state machines, at 5409, FIG. 5-4-4A, the node will enter the first barrier. When all nodes entered the barrier, the control system then broadcasts a barrier done message through the control network to each node. At 5410, the node determines whether all process nodes of the network subject to the checkpoint have entered the first barrier. If all process nodes subject to the checkpoint have not entered the first barrier, then, in one embodiment, the checkpoint process waits at 5412 until each of the remaining nodes being processed have reached the first barrier. For example, if there are retransmission FIFOs for link-level retries, it is determined when the retransmission FIFOs are empty. That is, as a packet is sent from one node to another, a copy is put into a retransmission FIFO. According to a protocol, a packet is removed from retransmission FIFO when acknowledgement comes back. If no acks come back for a predetermined timeout period, packets from the retransmission FIFO are retransmitted in the same order to the next node.

As mentioned, each node includes "state machine" registers (not shown) at the network and MU devices. These state machine registers include unit status information such as, but not limited to, FIFO active, FIFO currently in use (e.g., for remote get operation), and whether a message is being processed or not. These status registers can further be read (and written to) by system software at the host or controller node.

Thus, when it has been determined at the computer nodes forming a network (e.g., a Torus or collective) to be checkpointed that all user programs have been halted, and all packets have stopped moving according to the embodiment described herein, then, as shown at step 5420, FIG. 5-4-4A, each node of the network is commanded to store and read out the internal state of the network and MU, including all, packets in transit. This may be performed at each node using a "backdoor" read mechanism. That is, the "backdoor" access devices perform read/write to all internal MU and network registers and buffers for reading out from register/SRAM buffer contents/state machines/link level sequence numbers at known backdoor access address locations within the node, when performing the checkpoint and, eventually write the checkpoint data to external storage devices such as hard disks, tapes, and/or non-volatile memory. The backdoor read further provides access to all the FSM registers and the contents of all internal SRAMS, buffer contents and/or register arrays.

In one embodiment, these registers may include packets ECC or parity data, as well as network link level sequence numbers, VC tokens, state machine states (e.g., status of packets in network), etc., that can be read and written. In one embodiment, the checkpoint reads/writes are read by operating system software running on each node. Access to devices is performed over a DCR bus that permits access to internal SRAM or state machine registers and register arrays, and state machine logic, in the MU and network device, etc. as shown in FIGS. 5-1-2 and 5-4-3. In this manner, a snapshot of the entire network including MU and networked devices, is generated for storage.

Returning to FIG. 5-4-4A, at 5425, it is determined whether all checkpoint data and internal node state and system packet data for each node, has been read out and stored to the appropriate memory storage, e.g., external storage. For example, via the control network if implemented, or a supervising host node within the configured network, e.g., Torus, each compute node signals a "barrier entered" message (called the $2^{nd}$ barrier) once all checkpoint data has been read out and stored. If all process nodes subject to the checkpoint have not entered the $2^{nd}$ barrier, then, in one embodiment, the checkpoint process waits at 5422 until each of the remaining nodes being processed have entered the second barrier, upon which time checkpointing proceeds to step 5450 FIG. 5-4-4B.

Proceeding to step 5450, FIG. 5-4-4B, it is determined by the compute node architecture whether the computer nodes forming a network (e.g., a Torus or collective) to be checkpointed permits selective restarting of system only units as both system and users may employ separate dedicated resources (e.g., separate FIFOs, separate Virtual Channels). For example, FIG. 5-4-8 shows an implementation of a retransmission FIFO 5350 in the network sender 5185 logic where the retransmission network packet buffers are shared between user and system packets. In this architecture, it is not possible to reset the network resources related to user packets separately from system packets, and therefore the result of step 5450 is a "no" and the process proceeds to step 5460.

In another implementation of the network sender 5185' illustrated in FIG. 5-4-9, user packets and system packets have respective separated retransmission FIFOs 5351, 5352 respectively, that can be reset independently. There are also separate link level packet sequence numbers for user and system traffic. In this latter case, thus, it is possible to reset the logic related to user packets without disturbing the flow of system packets, thus the result of step 5450 is "yes". Then the logic is allowed to continue processing system only packets via backdoor DCR access to enable network logic to process system network packets. With a configuration of hardware, i.e., logic and supporting registers that support selective re-starting, then at 5455, the system may release all pending system packets and start sending the network/MU state for checkpointing over the network to an external system for storing to disk, for example, while the network continues running, obviating the need for a network reset. This is due to additional hardware engineered logic forming an independent system channel which means the checkpointed data of the user application as well as the network status for the user channels can be sent through the system channel over the same high speed torus or collective network without needing a reset of the network itself.

For restarting, there is performed setting the unit stop DCR bits to logic "0", for example, bits in DCR control register 5501 (e.g., FIG. 5-4-5A) and permitting the network logic to continue working on the next packet, if any. To perform the checkpoint may require sending messages over the network. Thus, in one embodiment, there is permitted only system packets, those involved in the checkpointing, to proceed. The user resources, still remain halted in the embodiment employing selective restarting.

Returning to FIG. 5-4-4B, if, at step 5450, it is determined that such a selective restart is not feasible, the network and MU are reset in a coordinated fashion at 5460 to remove all packets in network.

Thus, if selective re-start can not be performed, then the entire network is Reset which effectively rids the network of all packets (e.g., user and system packets) in network. After the network reset, only system packets will be utilized by the OS running on the compute node. Subsequently, the system using the network would send out information about the user code and program and MU/network status and writes that to disk, i.e., the necessary network, MU and user information is checkpointed (written out to external memory storage, e.g., disk) using the freshly reset network. The user code information including the network and MU status information is additionally checkpointed.

Then, all other user state, such as user program, main memory used by the user program, processor register contents and program control information, and other checkpointing items defining the state of the user program, are checkpointed. For example, as memory is the content of all user program memory, i.e., all the variables, stacks, heap is checkpointed. Registers include, for example, the core's fixed and floating point registers and program counter. The checkpoint data is written to stable storage such as disk or a flash memory, possibly by sending system packets to other compute or I/O nodes. This is so the user application is later restarted at the exactly same state it was in.

In one aspect, these contents and other checkpointing data are written to a checkpoint file, for example, at a memory buffer on the node, and subsequently written out in system packets to, for example, additional I/O nodes or control host computer, where they could be written to disk, attached hard-drive optical, magnetic, volatile or non-volatile memory storage devices, for example. In one embodiment the checkpointing may be performed in a non-volatile memory (e.g., flash memory, phase-change memory, etc) based system, i.e., with checkpoint data and internal node state data expediently stored in a non-volatile memory implemented on the computer node, e.g., before and/or in addition to being written out to I/O. The checkpointing data at a node could further be written to possibly other nodes where stored in local memory/flash memory.

Continuing, after user data is checkpointed, at 5470, FIG. 5-4-4B, the backdoor access devices are utilized, at each node, to restore the network and MU to their exact user states at the time of the start of the checkpoint. This entails writing all of the checkpointed data back to the proper registers in the units/sub-units using the read/write access. Then the user program, network and MU are restarted from the checkpoint. If an error occurs between checkpoints (e.g., ECC shows uncorrectable error, or a crash occurs), such that the application must be restarted from a previous checkpoint, the system can reload user memory and reset the network and MU state to be identical to that at the time of the checkpoint, and the units can be restarted.

After restoring the network state at each node, a call is made to a third barrier. The system thus ensures that all nodes have entered the barrier after each node's state has restored from a checkpoint (i.e., have read from stable storage and restored user application and network data and state. The system will wait until each node has entered the third data barrier such as shown at steps 5472, 5475 before resuming processing.

From the foregoing, the system and methodology can restart the user application at exactly the same state in which it was in at time of entering the checkpoint. With the addition of system checkpoints, in the manner as described herein checkpointing can be performed anytime while a user application is still running.

In an alternate embodiment, two external barriers could be implemented, for example, in a scenario where system checkpoint is taken and the hardware logic is engineered so as not to have to perform a network reset, i.e., system is unaffected while checkpointing user. That is, after first global barrier is entered upon halting all activity, the nodes may perform checkpoint read step using backdoor access feature, and write checkpoint data to storage array or remote disk via the hardware channel. Then, these nodes will not need to enter or call the second barrier after taking checkpoint due to the use of separate built in communication channel (such as a Virtual Channel). These nodes will then enter a next barrier (the third barrier as shown in FIG. 5-4-4B) after writing the checkpoint data.

The present invention can be embodied in a system in which there are compute nodes and separate networking hardware (switches or routers) that may be on different physical chips. For example, network configuration shown in FIG. 5-4-1A in greater detail, show an inter-connection of separate network chips, e.g., router and/or switch devices $\mathbf{5170}_1$, $\mathbf{5170}_2$, . . . , $\mathbf{5170}_m$, i.e., separate physical chips interconnected via communication links 5172. Each of the nodes 5050(1), . . . , 5050(*n*) connect with the separate network of network chips and links forming network, such as a multi-level switch 5018', e.g., a fat-tree. Such network chips may or may not include a processor that can be used to read and write the necessary network control state and packet data. If such a processor is not included on the network chip, then the necessary steps normally performed by a processor can instead be performed by the control system using appropriate control access such as over a separate JTAG or Ethernet network 5199 as shown in FIG. 5-4-1A. For example, control signals 5175 for conducting network checkpointing of such network elements (e.g., router and switches $\mathbf{5170}_1$, $\mathbf{5170}_2$, . . . , $\mathbf{5170}_m$) and nodes 5050(1), . . . , 5050(*n*) are communicated via control network 5199. Although a single control network connection is shown in FIG. 5-4-1A, it is understood that control signals 5175 are communicated with each network element in the network 5018'. In such an alternative network topology, the network 5018' shown in FIG. 5-4-1A, may comprise or include a cross-bar switch network, where there are both compute nodes 5050(1), . . . , 5050(*n*) and separate switch chips $\mathbf{5170}_k$, $\mathbf{5170}_2$, . . . , $\mathbf{5170}_m$—the switch chip including only network receivers, senders and associate routing logic, for example. There may additionally be some different control processors in the switch chip also. In this implementation, the system and method stop packets in both the compute node and the switch chips.

In the further embodiment of a network configuration 5018" shown in FIG. 5-4-1B, a 2D Torus configuration is shown, where a compute node 5050(1), . . . , 5050(*n*) comprises a processor(s), memory, network interface such as shown in FIG. 1-0. However, in the network configuration 5018', the compute node may further include a router device, e.g., on the same physical chip, or, the router (and/or switch) may reside physically on another chip. In the embodiment where the router (and/or switch) resides physically on another chip, the network includes an inter-connection of separate network elements, e.g., router and/or switch devices $\mathbf{5170}_i$, $\mathbf{5170}_2$, . . . , $\mathbf{5170}_m$, shown connecting one or more compute nodes 5050(1), . . . , 5050(*n*), on separate chips interconnected via communication links 5172 to form an example 2D Torus. Control signals 5175 from control network may be communicated to each of the nodes and network elements, with one signal being shown interfacing control network 5199 with one compute node 5050(1) for illustrative purposes. These signals enable packets in both the compute node and the switch chips to be stopped/started and checkpoint data read according to logic implemented in the system and method. It is understood that control signals 5175 may be communicated to each network element in the network 5018". Thus, in one embodiment, the information about packets and state is sent over the control network 5199 for storage over the control network by the control system. When the information about packets and state needs to be restored, it is sent back over the control network and put in the appropriate registers/SRAMS included in the network chip(s).

Further, the entire machine may be partitioned into subpartitions each running different user applications. If such subpartitions share network hardware resources in such a way that each subpartition has different, independent network input (receiver) and output (sender) ports, then the present invention can be embodied in a system in which the checkpointing of one subpartition only involves the physical ports corresponding to that subpartition. If such subpartitions do share network input and output ports, then the present invention may be embodied in a system in which the network can be stopped, checkpointed and restored, but only the user application running in the subpartition to be checkpointed is checkpointed while the applications in the other subpartitions continue to run.

Programs running on large parallel computer systems often save the state of long running calculations at predetermined intervals. This saved data is called a checkpoint. This process enables restarting the calculation from a saved checkpoint after a program interruption due to soft errors, hardware or software failures, machine maintenance or reconfiguration. Large parallel computers are often reconfigured, for example to allow multiple jobs on smaller partitions for software development, or larger partitions for extended production runs.

A typical checkpoint requires saving data from a relatively large fraction of the memory available on each processor. Writing these checkpoints can be a slow process for a highly parallel machine with limited I/O bandwidth to file servers. The optimum checkpoint interval for reliability and utilization depends on the problem data size, expected failure rate, and the time required to write the checkpoint to storage. Reducing the time required to write a checkpoint improves system performance and availability.

Thus, it is desired to provide a system and method for increasing the speed and efficiency of a checkpoint process performed at a computing node of a computing system, such as a massively parallel computing system.

In one aspect, there is provided a system and method for increasing the speed and efficiency of a checkpoint process performed at a computing node of a computing system by integrating a non-volatile memory device, e.g., flash memory cards, with a direct interface to the processor and memory that make up each parallel computing node.

This flash memory provides a local storage for checkpoints thus relieving the bottleneck due to I/O bandwidth limitations. Simple available interfaces from the processor such as ATA or UDMA that are supported by commodity flash cards provide sufficient bandwidth to the flash memory for writing checkpoints. For example, a multiple GB checkpoint can be written to local flash at 20 MB/s to 40 MB/s in a few minutes. All processors writing the same data through normal I/O channels could take more than 10× as long. An example implementation is shown in FIG. 5-4-10 that shows a compute card with a processor ASIC, DRAM memory and a flash memory card.

The flash memory size associated with each processor is ideally 2× to 4× the required checkpointmemory size to allow for multiple backups so that recovery is possible from any failures that occur during the checkpoint write itself. Also, the system is tolerant of a limited number of hard failures in the local flash storage, since checkpoint data from those few nodes can simply be written to the file system through the normal I/O channels using only a fraction of the total I/O bandwidth.

FIG. 5-4-10 shows an example physical layout of a compute card 5010 implemented in the multiprocessor system such as a BluGene® parallel computing system in which the nodechip 50 (FIG. 1-0) and an additional compact non-volatile memory card 5020 for storing checkpoint data resulting from checkpoint operation is implemented. In one embodiment, the non-volatile memory size associated with each processor is ideally at least two (2) times the required checkpoint memory size to allow for multiple backups so that recovery is possible from any failures that occur during a checkpoint write itself. FIG. 5-4-10 particularly shows a front side 5011 of compute card 5010 having the large processor ASIC, i.e., nodechip 5050, surrounded by the smaller size memory (DRAM) chips 5081. The blocks 5015 at the bottom of the compute card, represent connectors that attach this card to the next level of the packaging, i.e., a node board, that includes 32 of these compute cards. The node compute card 5010 in one embodiment shown in FIG. 5-4-10 further illustrates a back side 5012 of the card with additional memory chips 5081, and including a centrally located non-volatile memory device, e.g., a phase change memory device, a flash memory storage device such as a CompactFlash® card 5020 (CompactFlash® a registered trademark of SANDISK, Inc. California), directly below the nodechip 5050 disposed on the top side 5011 of the card. The flash signal interface (ATA/UDMA) is connected between the CompactFlash® connector (toward the top of the card) and the pins on the compute ASIC by wiring in the printed circuit board. A CompactFlash standard (CF+ and CompactFlash Specification Revision 4.1 dated Feb. 16, 2007) defined by a CompactFlash Association including a consortium of companies such as Sandisk, Lexar, Kingston Memory, etc., that includes a specification for conforming devices and interfaces to the CompactFlash® card 5020) is incorporated by reference as if fully set forth herein. It should be understood that other types of flash memory cards, such as SDHC (Secure Digital High Capacity) may also be implemented depending on capacity, bandwidth and physical space requirements.

In one embodiment, there is no cabling used in these interfaces. Network interfaces are wired through the compute card connectors to the node board, and some of these, including the I/O network connections are carried from the node board to other parts of the system, e.g., via optical fiber cables.

In one aspect, checkpointing data are written to a checkpoint file, for example, at a compact non-volatile memory buffer on the node, and subsequently written out in system packets to the I/O nodes where they could be written to disk, attached hard-drive optical, magnetic, volatile or non-volatile memory storage devices, for example.

As shown in FIG. 5-4-10, the checkpointing is performed in a non-volatile based system, i.e., the system-on-chip (SOC) compute nodechip, DRAM memory and a flash memory such as a pluggable CompactFlash (CF) memory card, with checkpoint data and internal node state data expediently stored in the flash memory 5020 implemented on the computer nodechip, e.g., before and/or in addition to being written out to I/O. The checkpointing data at a node could further be written to possibly other nodes and stored in local memory/flash memory at those nodes.

Data transferred to/from the flash memory may be further effected by interfaces to a processor such as ATA or UDMA ("Ultra DMA") that are supported by commodity flash cards that provide sufficient bandwidth to the flash memory for writing checkpoints. For example, the ATA/ATAPI-4 transfer modes support speeds at least from 16 MByte/s to 33 MByte/second. In the faster Ultra DMA modes and Parallel ATA up to 133 MByte/s transfer rate is supported.

From the foregoing, the system and methodology can restart the user application at exactly the same state in which it was in at time of entering the checkpoint. With the addition of system checkpoints, in the manner as described herein checkpointing can be performed anytime while a user application is still running.

In one example embodiment, a large parallel supercomputer system, that provides 5 gigabyte/s I/O bandwidth from a rack, where a rack includes 1024 compute nodes in an example embodiment, each with 16 gigabyte of memory, would require about 43 minutes to checkpoint 80% of memory. If this checkpoint instead were written locally at 40 megabyte/s to a non-volatile memory such as flash memory 5020 shown in FIG. 5-4-10, it would require under 5.5 minutes for about an 8× speedup. To minimize total processing time, the optimum interval between checkpoints varies as the square root of the product of checkpoint time and job run time.

Thus, for a 200 hour compute job the system without flash memory might use 12-16 checkpoints, depending on expected failure rate, adding a total time of 8.5 to 11.5 hours for backup. Using the same assumptions, the system with local flash memory could perform 35-47 checkpoints, adding only 3.1 to 4.2 hours. With no fails or restarts during the job, the improvement in throughput is modest, about 3%. However, for one or two fails and restarts, the throughput improvement increases to over 10%.

As mentioned, in one embodiment, the size of the flash memory associated with each processor core is, in one embodiment, two time (or greater) the required checkpoint memory size to allow for multiple backups so that recovery is possible from any failures that occur during the checkpoint write itself. Larger flash memory size is preferred to allow additional space for wear leveling and redundancy. Also, the system design is tolerant of a limited number of hard failures in the local flash storage, since checkpoint data from those few nodes can simply be written to the file system through the normal I/O network using only a small fraction of the total available I/O bandwidth. In addition, redundancy through data striping techniques similar to those used in RAID storage can be used to spread checkpoint data across multiple flash memory devices on nearby processor nodes via the internal networks, or on disk via the I/O network, to enable recovery from data loss on individual flash memory cards.

Thus a checkpoint storage medium provided with only modest reliability can be employed to improve the reliability and availability of a large parallel computing system. Furthermore, the flash memory cards is a more cost effective way of increasing system availability and throughput than increasing in IO bandwidth.

In sum, the incorporation of the flash memory device 5020 at the multiprocessor node provides a local storage for checkpoints thus relieving the bottleneck due to I/O bandwidth limitations associated with some memory access operations. Simple available interfaces to the processor such as ATA or UDMA ("Ultra DMA") that are supported by commodity flash cards provide sufficient bandwidth to the flash memory for writing checkpoints. For example, the ATA/ATAPI-4 transfer modes support speeds at least from 16 MByte/s to 33 MByte/second. In the faster Ultra DMA modes and Parallel ATA up to 133 MByte/s transfer rate is supported.

For example, a multiple gigabyte checkpoint can be written to local flash card at 5020 megabyte/s to 40 megabyte/s in only a few minutes. Writing the same data to disk storage from all processors using the normal I/O network could take more than ten (10) times as long.

Highly parallel computing systems, with tens to hundreds of thousands of nodes, are potentially subject to a reduced mean-time-to-failure (MTTF) due to a soft error on one of the nodes. This is particularly true in HPC (High Performance Computing) environments running scientific jobs. Such jobs are typically written in such a way that they query how many nodes (or processes) N are available at the beginning of the job and the job then assumes that there are N nodes available for the duration of the run. A failure on one node causes the job to crash. To improve availability such jobs typically perform periodic checkpoints by writing out the state of each node to a stable storage medium such as a disk drive. The state may include the memory contents of the job (or a subset thereof from which the entire memory image may be reconstructed) as well as program counters. If a failure occurs, the application can be rolled-back (restarted) from the previous checkpoint on a potentially different set of hardware with N nodes.

However, on machines with a large number of nodes and a large amount of memory per node, the time to perform such a checkpoint to disk may be large, due to limited I/O bandwidth from the HPC machine to disk drives. Furthermore, the soft error rate is expected to increase due to the large number of transistors on a chip and the shrinking size of such transistors as technology advances.

To cope with such software, processor cores and systems increasingly rely on mechanisms such as Error Corrrecting Codes (ECC) and instruction retry to turn otherwise non-recoverable soft errors into recoverable soft errors. However, not all soft errors can be recovered in such a manner, especially on very small, simple cores that are increasingly being used in large HPC systems such as BlueGene/Q (BG/Q).

Thus, in one aspect, there is provided an approach to recover from a large fraction of soft errors without resorting to complete checkpoints. If this can be accomplished effectively, the frequency of checkpoints can be reduced without sacrificing availability.

There is thus provided a technique for performing "local rollbacks" by utilizing a multi-versioned memory system such as that on BlueGene/Q. On BG/Q, the level 2 cache memory (L2) is multi-versioned to support both speculative running, a transactional memory model, as well as a rollback mode. Data in the L2 may thus be speculative. On BG/Q, the L2 is partitioned into multiple L2 slices, each of which acts independently. In speculative or transactional mode, data in the main memory is always valid, "committed" data and speculative data is not written back to the main memory. In rollback mode, speculative data may be written back to the main memory, at which point it cannot be distinguished from committed data. In this invention, we focus on the hardware capabilities of the L2 to support local rollbacks. That capability is somewhat different than the capability to support speculative running and transactional memory. This multi-versioned cache is used to improve reliability. Briefly, in addition to supporting common caching functionality, the L2 on BG/Q includes the following features for running in rollback mode. The same line (128 bytes) of data may exist multiple times in the cache. Each such line has a generation id tag and there is an ordering mechanism such that tags can be ordered from oldest to newest. There is a mechanism for requesting and managing new tags, and for "scrubbing" the L2 to clean it of old tags.

FIG. 5-5-15 illustrates a transactional memory mode in one embodiment. A user defines parallel work to be done. A user explicitly defines a start and end of transactions within parallel work that are to be treated as atomic. A compiler performs, without limitation, one or more of: Interpreting user program annotations to spawn multiple threads; Interpreting user program annotation for start of transaction and save state to memory on entry to transaction to enable rollback; At the end of transactional program annotation, testing for successful completion and optionally branch back to rollback pointer. A transactional memory 71300 supports detecting transaction failure and rollback. An L1 (Level 1) cache visibility for L1 cache hits as well as misses allowing for ultra low overhead to enter a transaction.

Local Rollback—the Case when there is No I/O

There is first described an embodiment in which there is no I/O into and out of the node, including messaging between nodes. Checkpoints to disk or stable storage are still taken periodically, but at a reduced frequency. There is a local rollback interval. If the end of the interval is reached without a soft error, the interval is successful and a new interval can be started. Under certain conditions to be described, if a soft error occurs during the local rollback interval, the application can be restarted from the beginning of the local interval and re-executed. This can be done without restoring the data from the previous complete checkpoint, which typically reads in data from disk. If the end of the interval is then reached, the interval is successful and the next interval can be started. If such conditions are met, we term the interval "rollbackable". If the conditions are not met, a restart from the previous complete checkpoint is performed. The efficiency of the method thus depends upon the overhead to set up the local rollback intervals, the soft error rate, and the fraction of intervals that are rollbackable.

In this approach, certain types of soft errors cannot be recovered via local rollback under any conditions. Examples of such errors are an uncorrectable ECC error in the main memory, as this error corrupts state that is not backed up by multi-versioning, or an unrecoverable soft error in the network logic, as this corrupts state that can not be reinstated by rerunning. If such a soft error occurs, the interval is not rollbackable. We categorize soft errors into two classes: potentially rollbackable, and unconditionally not rollbackable. In the description that follows, we assume the soft error is potentially rollbackable. Examples of such errors include a detected parity error on a register inside the processor core.

At the start of each interval, each thread on each core saves it's register state (including the program counter). Certain memory mapped registers outside the core, that do not support speculation and need to be restored on checkpoint restore, are also saved. A new speculation generation id tag T is allocated and associated with all memory requests run by the cores from hereon. This ID is recognized by the L2-cache to treat all data written with this ID to take precedence, i.e., to maintain semantics of these accesses overwriting all previously written data. At the start of the interval, the L2 does not contain any data with tag T and all the data in the L2 has tags less than T, or has no tag associated ($T_0$) and is considered nonspeculative. Reads and writes to the L2 by threads contain a tag, which will be T for this next interval.

When a thread reads a line that is not in the L2, that line is brought into the L2 and given the non-speculative tag $T_0$. Data from this version is returned to the thread. If the line is in the L2, the data returned to the thread is the version with the newest tag.

When a line is written to the L2, if a version of that line with tag T does not exist in the L2, a version with tag T is established. If some version of the line exists in the L2, this is done by copying the newest version of that line into a version with tag T. If a version does not exist in the L2, it is brought in from memory and given tag T. The write from the thread includes byte enables that indicate which bytes in the current write command are to be written. Those bytes with the byte enable high are then written to the version with tag T. If a version of the line with tag T already exists in the L2, that line is changed according to the byte enables.

At the end of an interval, if no soft error occurred, the data associated with the current tag T is committed by changing the state of the tag from speculative to committed. The L2 runs a continuous background scrub process that converts all occurrences of lines written with a tag that has committed status. It merges all committed version of the same address into a single version based on tag ordering and removes the versions it merged.

The L2 is managed as a set-associative cache with a certain number of lines per set. All versions of a line belong to the same set. When a new line, or new version of a line, is established in the L2, some line in that set may have to be written back to memory. In speculative mode, non-committed, or speculative, versions are never allowed to be written to the memory, In rollback mode, non-committed versions can be written to the memory, but an "overflow" bit in a control register in the L2 is set to 1 indicating that such a write has been done. At the start of an interval all the overflow bits are set to 0.

Now consider the running during a local rollback interval. If a detected soft error occurs, this will trigger an interrupt that is delivered to at least one thread on the node. Upon receiving such an interrupt, the thread issues a core-to-core interrupt to all the other threads in the system which instructs them to stop runninig the current interval. If at this time, all the L2 overflow bits are 0, then the main memory contents have not been corrupted by data generated during this interval and the interval is rollbackable. If one of the overflow bits is 1, then main memory has been corrupted by data in this interval, the interval is not rollbackable and running is restarted from the most previous complete checkpoint.

If the interval is rollbackable, the cores are properly re-initialized, all the lines in the L2 associated with tag T are invalidated, all of the memory mapped registers and thread registers are restored to their values at the start of the interval, and the running of the interval restarts. The L2 invalidates the lines associated with tag T by changing the state of the tag to invalid. The L2 background invalidation process removes occurrences of lines with invalid tags from the cache.

This can be done in such a way that is completely transparent to the application being run. In particular, at the beginning of the interval, the kernel running on the threads can, in coordinated fashion, set a timer interrupt to fire indicating the end of the next interval. Since interrupt handlers are run in kernel, not user mode, this is invisible to the application. When this interrupt fires, and no detectable soft-error has occurred during the interval, preparations for the next interval are made, and the interval timer is reset. Note that this can be done even if an interval contained an overflow event (since there was no soft error). The length of the interval should be set so that an L2 overflow is unlikely to occur during the interval. This depends on the size of the L2 and the characteristics of the application workload being run.

Local Rollback—the Case with I/O

An embodiment is now described in the more complicated case of when there is I/O, specifically messaging traffic between nodes. If all nodes participate in a barrier synchronization at the start of an interval, and if there is no messaging activity at all during the interval (either data injected into the network or received from the network) on every node, then if a rollbackable software error occurs during the interval on one or more nodes, then those nodes can re-run the interval and if successful, enter the barrier for the next interval. In such a case, the other nodes in the system are unaware that a rollback is being done somewhere else. If one such node has a soft error that is non-rollbackable, then all nodes may begin running from the previous full checkpoint. There are three problems with this approach:

1. The time to do the barrier may add significantly to the cost of initializing the interval.
2. Such intervals without any messaging activity may be rare, thereby reducing the fraction of rollbackable intervals.
3. Doing the barrier, in and of itself, may involve injecting messages into the network.

We therefore seek alternative conditions that do not require barriers and relax the assumption that no messaging activity occurs during the interval. This will reduce the overhead and increase the fraction of rollbackable intervals. In particular, an interval will be rollbackable if no data that was generated during the current interval is injected into the network (in addition to some other conditions to be described later). Thus an interval is rollbackable if the data injected into the network in the current interval were generated during previous intervals. Thus packets arriving during an interval can be considered valid. Furthermore, if a node does do a local rollback, it will never inject the same messages (packets) twice, (once during the failed interval and again during the re-running). In addition note that the local rollback intervals can proceed independently on each node, without coordination from other nodes, unless there is a non rollbackable interval, in which case the entire application may be restarted from the previous checkpoint.

We assume that network traffic is handled by a hardware Message Unit (MU), specifically the MU is responsible for putting messages, that are packetized, into the network and for receiving packets from the network and placing them in memory. Dong Chen, et al., "DISTRIBUTED PARALLEL MESSAGING UNIT FOR MULTIPROCESSOR SYSTEMS", U.S. Pat. No. 8,458,267, wholly incorporated by reference as if set forth herein, describes the MU in detail. Dong Chen, et al., "SUPPORT FOR NON-LOCKING PARALLEL RECEPTION OF PACKETS BELONGING TO THE SAME FIFO", U.S. Pat. No. 8,086,766, wholly incorporated by reference as if set forth herein, also describes the MU in detail. Specifically, there are message descriptors that are placed in Injection FIFOs. An Injection Fifo is a circular buffer in main memory. The MU maintains memory mapped registers that, among other things contain pointers to the start, head, tail and end of the FIFO. Cores inject messages by placing the descriptor in the memory location pointed to by the tail, and then updating the tail to the next slot in the FIFO. The MU recognizes non-empty Fifos, pulls the descriptor at the head of the FIFO, and injects packets into the network as indicated in the descriptor, which includes the length of the message, its starting address, its destination and other information having to do with what should be done with the message's packets upon reception at the destination. When all the packets from a message have been injected, the MU advances the head of the FIFO. Upon reception, if the message is a "direct put", the payload bytes of the packet are placed into memory starting at an address indicated in the packet. If the packets belong to a "memory FIFO" message, the packet is placed at the tail of a reception FIFO and then the MU updates the tail. Reception FIFOS are also circular buffers in memory and the MU again has memory mapped registers pointing to the start, head, tail and end of the FIFO. Threads read packets at the head of the FIFO (if non-empty) and then advance the head appropriately. The MU may also support "remote get" messages. The payload of such messages are message descriptors that are put into an injection FIFO. In such a way, one node can instruct another node to send data back to it, or to another node.

When the MU issues a read to an L2, it tags the read with a non-speculative tag. In rollback mode, the L2 still returns the most recent version of the data read. However, if that version was generated in the current interval, as determined by the tag, then a "rollback read conflict" bit is set in the L2. (These bits are initialized to 0 at the start of an interval.) If subsections (sublines) of an L2 line can be read, and if the L2 tracks writes on a subline basis, then the rollback read conflict bit is set when the MU reads the subline that a thread wrote in the current interval. For example, if the line is 128 bytes, there may be 8 subsections (sublines) each of length 16 bytes. When a line is written speculatively, it notes in the L2 directory for that line which sublines are changed. If a soft error occurs during the interval, if any rollback read conflict bit is set, then the interval cannot be rolled back.

When the MU issues a write to the L2, it tags the write with a non-speculative id. In rollback mode, both a non-speculative version of the line is written and if there are any speculative versions of the line, all such speculative versions are updated. During this update, the L2 has the ability to track which subsections of the line were speculatively modified. When a line is written speculatively, it notes which sublines are changed. If the non-speculative write modifies a subline that has been speclatively written, a "write conflict" bit in the L2 is set, and that interval is not rollbackable. This permits threads to see the latest MU effects on the memory system, so that if no soft error occurs in the interval, the speculative data can be promoted to non-speculative for the next interval. In addition, if a soft error occurs, it permits rollback to non-speculative state.

On BG/Q, the MU may issue atomic read-modify-write commands. For example, message byte counters, that are initialized by software, are kept in memory. After the payload of a direct put packet is written to memory, the MU issues an atomic read-modify-write command to the byte counter address to decrement the byte counter by the number of payload bytes in the packet. The L2 treats this as both a read and a write command, checking for both read and write conflicts, and updating versions.

In order for the interval to be rollbackable, certain other conditions may be satisfied. The MU cannot have started processing any descriptors that were injected into an injection FIFO during the interval. Violations of this "new descriptor injected" condition are easy to check in software by comparing the current MU injection FIFO head pointers with those at the beginning of the interval, and by tracking how many descriptors are injected during the interval. (On BG/Q, for each injection FIFO the MU maintains a count of the number of descriptors injected, which can assist in this calculation.)

In addition, during the interval, a thread may have received packets from a memory reception FIFO and advanced the FIFO's head pointer. Those packets will not be resent by another node, so in order for the rollback to be successful, it may be able to reset the FIFO's head pointer to what it was at the beginning of the interval so that packets in the FIFO can be "re-played". Since the FIFO is a circular buffer, and since the head may have been advanced during the interval, it is possible that a newly arrived packet has overwritten a packet in the FIFO that may be re-played during the local rollback. In such a case, the interval is not rollbackable. It is easy to design messaging software that identifies when such an over-write occurs. For example, if the head is changed by an "advance_head" macro/inline or function, advance_head can increment a counter representing the number of bytes in the FIFO between the old head and the new head. If that counter exceeds a "safe" value that was determined at the start of the interval, then a write to an appropriate memory location system that notes the FIFO overwrite condition occurred. Such a write may be invoked via a system call. The safe value could be calculated by reading the FIFOs head and tail pointers at the beginning of the interval and, knowing the size of the FIFO, determining how many bytes of packets can be processed before reaching the head.

On BG/Q barriers or global interrupts may be initiated by injecting descriptors into FIFOs, but via writing a memory mapped register that triggers barrier/interrupt logic inside the network. If during an interval, a thread initiates a barrier and a soft error occurs on that node, then the interval is not rollbackable. Software can easily track such new barrier/interrupt initiated occurrences, in a manner similar to the FIFO overwrite condition. Or, the hardware (with software cooperation) can set a special bit in the memory mapped barrier register whenever a write occurs; if that bit is initialized to 0 at the beginning of the interval, then if the bit is high, the interval cannot be rolled back.

We assume that the application uses a messaging software library that is consistent with with local rollbacks. Specifically, hooks in the messaging software support monitoring the reception FIFO overwrite condition, the injection FIFO new descriptor injected condition, and the new global interrupt/barrier initiated condition. In addition, if certain memory mapped I/O registers are written during an interval, such as when a FIFO is reconfigured by moving it, or resizing it, an interval cannot be rolled back. Software can be instrumented to track writes to such memory mapped I/O registers and to record appropriate change bits if the conditions to rollback an interval are violated. These have to be cleared at the start of an interval, and checked when soft errors occur.

Putting this together, at the beginning of an interval:

1. Threads set the L2 rollback read and write conflict and overflow bits to 0.
2. Threads save the injection MU FIFO tail pointers and reception FIFO head pointers, compute and save the safe value and set the reception FIFO overwrite bit to 0, set the new barrier/interrupt bit to 0, and set change bits to 0.
3. Threads save their internal register states
4. A new speculative id tag is generated and used for the duration of the interval.
5. Threads begin running their normal code.

If there is no detected soft error at the end of the interval, running of the next interval is initiated. If an unconditionally not rollbackable soft error occurs during the interval, running is re-started from the previous complete checkpoint. If a potentially rollbackable soft error occurs:

1. If the MU is not already stopped, the MU is stopped, thereby preventing new packets from entering the network or being received from the network. (Typically, when the MU is stopped, it continues processing any packets currently in progress and then stops.)
2. The rollbackable conditions are checked: the rollback read and write conflict bits, the injection FIFO new descriptor injected condition, the reception FIFO overwrite bits, the new barrier/interrupt initiated condition, and the change bits. If the interval is not rollbackable, running is re-started from the previous complete checkpoint. If the interval is rollbackable, proceed to step 3.
3. The cores are reinitialized, all the speculative versions associated with the ID of the last interval in the L2 are invalidated (without writing back the speculative L2 data to the memory), all of the memory mapped registers and thread registers are restored to their values at the start of the interval. The injection FIFO tail pointers are restored to their original values, the reception FIFO head pointers are restored to their original values. If the MU was not already stopped, restart the MU.
4. Running of the interval restarts.

Interrupts

The above discussion assumes that no real-time interrupts such as messages from the control system, or MU interrupts occur. ON BG/Q, a MU interrupt may occur if a packet with an interrupt bit set is placed in a memory FIFO, the amount of free space in a reception FIFO decreases below a threshold, or the amount of free space in an injection FIFO crosses a threshold. For normal injection FIFOS, the interrupt occurs if the amount of free space in the FIFO increases above a threshold, but for remote get injection FIFOs the interrupt occurs if the amount of free space in the FIFO decreases below a threshold.

A conservative approach would be to classify an interval as non rollbackable if any of these interrupts occurs, but we seek to increase the fraction of rollbackable intervals by appropriately handling these interrupts. First, external control system interrupts or remote get threshold interrupts are rare and may trigger very complicated software that is not easily rolled back. So if such an interrupt occurs, the interval will be marked not rollbackable.

For the other interrupts, we assume that the interrupt causes the messaging software to run some routine, e.g., called “advance”, that handles the condition.

For the reception FIFO interrupts, advance may pull packets from the FIFO and for an injection FIFO interrupt, advance may inject new descriptors into a previously full injection FIFO. Note that advance can also be called when such interrupts do not occur, e.g., it may be called when an MPI application calls MPI_Wait. Since the messaging software may correctly deal with asynchronous arrival of messages, it may be capable of processing messages whenever they arrive. In particular, suppose such an interrupt occurs during an interval, and software notes that it has occurred, and an otherwise rollbackable soft error occurs during the interval. Note that when the interval is restarted, there are at least as many packets in the reception FIFO as when the interrupt originally fired. If when the interval is restarted, the software sets the hardware interrupt registers to re-trigger the interrupt, this will cause advance to be called on one or more threads at, or near the beginning of the interval (if the interrupt is masked at the time). In either case, the packets in the reception FIFO will be processed and the condition causing the interrupt will eventually be cleared. If when the interval starts, advance is already in progress, having the interrupt bit high may simply cause advance to be run a second time.

Mode Changes

As alluded to above, the L2 can be configured to run in different modes, including speculative, transactional, rollback and normal. If there is a mode change during an interval, the interval is not rollbackable.

Multiple Tag Domains

In the above description, it assumes that there is a single “domain” of tags. Local rollback can be extended to the case when the L2 supports multiple domain tags. For example, suppose there are 128 tags that can be divided into up to 8 tag domains with 16 tags/domain. Reads and writes in different tag domains do not affect one another. For example, suppose there are 16 (application) cores per node with 4 different processes each running on a set of 4 cores. Each set of cores could comprise a different tag domain. If there is a shared memory region between the 4 processers, that could comprise a fifth tag domain. Reads and writes by the MU are non-speculative and may be seen by every domain. The checks for local rollback may be satisfied by each tag domain. In particular, if the overflow, read and write conflict bits are on a per domain basis, then an interval cannot be rolled back if any of the domains indicate a violation.

FIG. 5-5-1 illustrates a cache memory, e.g., L2 cache memory device (“L2 cache”) 70100, and a control logic device 70120 for controlling the L2 cache 70100 according to one embodiment. Under software control, a local rollback is performed, e.g., by the control logic device 70120. Local rollback refers to resetting processors, reinstating states of the processors as of the start of a last computation interval, and using the control logic device 120 to invalidate all or some memory state changes performed since the start of the last interval in the L2, and restarting the last computational interval. A computational interval (e.g., an interval 1 (70200) in FIG. 5-5-1) includes certain number of instructions. The length of the computational interval is set so that an L2 cache overflow is unlikely to occur during the interval. The length of the interval depends on a size of the L2 cache and characteristics of an application workload being run.

The L2 cache 70100 is multi-versioned to support both speculative running mode, a transactional memory mode, and a rollback mode. A speculative running mode computes instruction calculations ahead of their time as defined in a sequential program order. In such a speculative mode, data in the L2 cache 70100 may be speculative (i.e., assumed ahead or computed ahead and may subsequently be validated (approved), updated or invalidated). A transactional memory mode controls a concurrency or sharing of the L2 cache 70100, e.g., by enabling read and write operations to occur at simultaneously, and by allowing that intermediate state of the read and write operations are not visible to other threads or processes. A rollback mode refers to performing a local rollback.

In one embodiment, the L2 cache 70100 is partitioned into multiple slices, each of which acts independently. In the speculative or transactional mode, data in a main memory (not shown) is always valid. Speculative data held in the L2 cache 70100 are not written back to the main memory. In the rollback mode, speculative data may be written back to the main memory, at which point the speculative data cannot be distinguished from committed data and the interval can not be rolled back if an error occurs. In addition to supporting a common caching functionality, the L2 cache 70100 is operatively controlled or programmed for running in the rollback mode. In one embodiment, operating features include, but are not limited to: an ability to store a same cache line (e.g., 128 bytes) of data multiple times in the cache (i.e., multi-versioned); Each such cache line having or provided with a generation ID tag (e.g., tag 1 (70105) and a tag T (70110) in FIG. 5-5-1 for identifying a version of data); Provide an ordering mechanism such that tags can be ordered from an oldest data to a newest data; Provide a mechanism for requesting and managing new tags and for "scrubbing" (i.e., filtering) the L2 cache 70100 to clean old tags. For example, the L2 cache 70100 includes multiple version of data (e.g., a first version (oldest version) 70130 of data tagged with "1" (70105), a newest version 70125 of data tagged with "T" (70110)) indicating an order, e.g., an ascending order, of the tags attached to the data. How to request and manage new tags are described below in detail.

FIG. 5-5-2 illustrates exemplary local rollback intervals 70200 and 70240 defined as instruction sequences according to one exemplary embodiment. In this exemplary embodiment, the sequences include various instructions including, but not limited to: an ADD instruction 70205, a LOAD instruction 70210, a STORE instruction 70215, a MULT instruction 70220, a DIV instruction 70225 and a SUB instruction 70230. A local rollback interval refers to a set of instructions that may be restarted upon detecting a soft error and for which the initial state at the sequence start can be recovered. Software (e.g., Operating System, etc.) or hardware (e.g., the control logic device 70120, a processor, etc.) determines a local rollback interval 1 (70200) to include instructions from the ADD instruction 70205 to the MULT instruction 70220. How to determine a local rollback interval is described below in detail. If no soft error occurs during the interval 1 (70200), the software or hardware decides that the interval 1 (70200) is successful and starts a new interval (e.g., an interval 2 (70240)). If a rollbackable soft error (i.e., soft error that allows instructions in the interval 1 (70200) to restart and/or rerun) occur, the software or hardware restarts and reruns instructions in the interval 1 (70200) from the beginning of the interval 1 (70200), e.g., the ADD instruction 70205, by using the control logic device 70120. If a non-rollbackable soft error (i.e., soft error that does not allow instructions in the interval 1 (70200) to restart and/or rerun), a processor core (e.g., CPU 70911 in FIG. 5-5-9) or the control logic device 70120 restarts and/or rerun instructions from a prior checkpoint.

In one embodiment, the software or hardware sets a length of the current interval so that an overflow of the L2 cache 70100 is unlikely to occur during the current interval. The length of the current interval depends on a size of the L2 cache 70100 and/or characteristics of an application workload being run.

In one embodiment, the control logic device 70120 communicates with the cache memory, e.g., the L2 cache. In a further embodiment, the control logic device 70120 is a memory management unit of the cache memory. In a further embodiment, the control logic device 70120 is implemented in a processor core. In an alternative embodiment, the control logic device 70120 is implemented is a separate hardware or software unit.

The following describes situations in which there is no I/O operation into and out of a node, including no exchange of messages between nodes. Checkpoints to disk or a stable storage device are still taken periodically, but at a reduced frequency. If the end of a current local rollback interval (e.g., an interval 1 (70200) in FIG. 5-5-2) is reached without a soft error, the current local rollback interval is successful and a new interval can be started. If a rollbackable soft error occurs during the current local rollback interval, an application or operation can be restarted from the beginning of that local interval and rerun. This restarting and rerunning can be performed without retrieving and/or restoring data from a previous checkpoint, which typically reads in data from a disk drive. If a non-rollbackable soft error (i.e., soft error not recoverable by local rollback) occurs during the local rollback interval, a restart from the previous checkpoint occurs, e.g., by bringing in data from a disk drive. An efficiency of the method steps described in FIG. 5-5-3 thus depends upon an overhead to set up the local rollback interval, a soft error rate, and a fraction of intervals that are rollbackable.

In one embodiment, certain types of soft errors cannot be recovered via local rollback under any conditions (i.e., are not rollbackable). Examples of such errors include one or more of: an uncorrectable ECC error in a main memory, as this uncorrectable ECC error may corrupt a state that is not backed up by the multi-versioning scheme; an unrecoverable soft error in a network, as this unrecoverable error may corrupt a state that can not be reinstated by rerunning. If such a non-rollbackable soft error occurs, the interval is not rollbackable. Therefore, according to one embodiment of the present invention, there are two classes of soft errors: potentially rollbackable and unconditionally not rollbackable. For purposes of description that follow, it is assumed that a soft error is potentially rollbackable.

At the start of each local rollback interval, each thread on each processor core stores its register state (including its program counter), e.g., in a buffer. Certain memory mapped registers (i.e., registers that have their specific addresses stored in known memory locations) outside the core that do not support the speculation (i.e., computing ahead or assuming future values) and need to be restored on a checkpoint are also saved, e.g., in a buffer. A new (speculation) generation ID tag "T" (e.g., a tag "T" bit or flag 70110 in FIG. 5-5-1) is allocated and associated with some or all of memory requests run by the core. This ID tag is recognized by the L2 cache to treat all or some of the data written with this ID tag to take precedence, e.g., to maintain semantics for overwriting all or some of previously written data. At the start of the interval, the L2 cache 70100 does not include any data with the tag "T" (70110) and all the data in the L2 cache have tags less than "T" (e.g., tag T−1, et seq.) (70110), as shown in FIG. 5-5-1, or has no tag "$T_0$" (70115) which a newest non-speculative tag (i.e., tag attached data created or requested in a normal cache mode (e.g., read and/or write)). Reads and writes to the L2 cache 70100 by a thread include a tag which will be "T" for a following interval. When a thread reads a cache line that is not in the L2 cache 70100, that line is brought into the L2 cache and given the non-speculative tag "$T_0$" (70115). This version of data (i.e., data tagged with "$T_0$" (70115)) is returned to the thread. If the line is in the L2 cache 70100, the data returned to the thread is a version with the newest tag, e.g., the tag "T" (70110). In one embodiment, the control logic device 70120 includes a counter that automatically increment a tag bit or flag, e.g., 0, 1, . . . , T−1, T, T+1.

When a cache line is written to the L2 cache, if a version of that line with the tag "T" (70110) does not exist in the L2 cache, a version with the tag "T" (70110) is created. If some version of the line exists in the L2 cache, the control logic device 70120 copies the newest version of that line into a version with the tag "T" (70110). If a version of the line does not exist in the L2 cache, the line is brought in from a main memory and given the tag "T" (70110). A write from a thread includes, without limitation, byte enables that indicate which bytes in a current write command are to be written. Those bytes with the byte enable set to a predetermined logic level (e.g., high or logic '1') are then written to a version with the tag "T" (70110). If a version of the line with the tag "T" (70110) already exists in the L2 cache 70100, that line is changed according to the byte enables.

At the end of a local rollback interval, if no soft error occurred, data associated with a current tag "T" (70110) is committed by changing a state of the tag from speculative to committed (i.e., finalized, approved and/or determined by a processor core). The L2 cache 70100 runs a continuous background scrub process that converts all occurrences of cache lines written with a tag that has committed status to non-speculative. The scrub process merges all or some of a committed version of a same cache memory address into a single version based on tag ordering and removes the versions it merged.

In one embodiment, the L2 cache 70100 is a set-associative cache with a certain number of cache lines per set. All versions of a cache line belong to a same set. When a new cache line, or new version of a cache line, is created in the L2 cache, some line(s) in that set may have to be written back to a main memory. In the speculative mode, non-committed, or speculative, versions are may not be allowed to be written to the main memory. In the rollback mode, non-committed versions can be written to the main memory, but an "overflow" bit in a control register in the L2 cache is set to 1 indicating that such a write has been done. At the start of a local rollback interval, all the overflow bits are set to 0.

In another embodiment, the overflow condition may cause a state change of a speculation generation ID (i.e., an ID of a cache line used in the speculative mode in which speculation the line was changed) in to a committed state in addition to or as an alternative to setting an overflow flag.

If a soft error occurs during a local rollback interval, this soft error triggers an interrupt that is delivered to at least one thread running on a node associated with the L2 cache 70100. Upon receiving such an interrupt, the thread issues a core-to-core interrupt (i.e., an interrupt that allow threads on arbitrary processor cores of an arbitrary computing node to be notified within a deterministic low latency (e.g., 10 clock cycles)) to all the other threads which instructs them to stop running the current interval. If at this time, all the overflow bits of the L2 cache are 0, then contents in the main memory have not been corrupted by data generated during this interval and the interval is rollbackable. If one of the overflow bits is 1, then the main memory has been corrupted by data in this interval, the interval is not rollbackable and rerunning is restarted from the most previous checkpoint.

If the interval is rollbackable, processor cores are re-initialized, all or some of the cache lines in the L2 associated with the tag "T" (70110) are invalidated, all or some of the memory mapped registers and thread registers are restored to their values at the start of the interval, and a running of the interval restarts. The control logic device 70120 invalidates cache lines associated with the tag "T" (70110) by changing a state of the tag "T" (70100) to invalid. The L2 cache background invalidation process initiates removal of occurrences of lines with invalid tags from the L2 cache 70100 in the rollbackable interval.

Recovering rollbackable soft errors can be performed in a way that is transparent to an application being run. At the beginning of a current interval, a kernel running on a thread can, in a coordinated fashion (i.e., synchronized with the control logic device 70120), set a timer interrupt (i.e., an interrupt associated with a particular timing) to occur at the end of the current interval. Since interrupt handlers are run in kernel, this timer interrupt is invisible to the application. When this interrupt occurs and no detectable soft error has occurred during the interval, preparations for the next interval are made, and the timer interrupt is reset. These preparations can be done even if a local rollback interval included an overflow event (since there was no soft error).

The following describes situation in which there is at least one I/O operation, for example, messaging traffic between nodes. If all nodes participate in a barrier synchronization at the start of a current interval, if there is no messaging activity at all during the interval (no data injected into a network or received from the network) on every node, if a rollbackable software error occurs during the interval on one or more nodes, then those nodes can rerun the interval and, if successful, enter the barrier (synchronization) for a next interval.

In one embodiment, nodes are unaware that a local rollback is being performed on another node somewhere else. If a node has a soft error that is non-rollbackable, then all other nodes may begin an operation from the previous checkpoint.

In another embodiment, software or the control logic device 70120 checks the at least one condition or state, which does not require barriers and that relaxes an assumption that no messaging activity occurs during a current interval. This checking of the at least one condition reduces an overhead and increases a fraction of rollbackable intervals. For example, a current interval will be rollbackable if no data that was generated during the current interval is injected into the network. Thus the current interval is rollbackable if the data injected into the network in the current interval were generated during previous intervals. Thus, packets arriving during a local rollback interval can be considered valid. Furthermore, if a node performs a local rollback within the L2 cache 70100, it will not inject the same messages (packets) twice, (i.e., once during a failed interval and again during a rerunning). Local rollback intervals can proceed independently on each node, without coordination from other nodes, unless there is a non-rollbackable interval, in which case an entire application may be restarted from a previous checkpoint.

In one embodiment, network traffic is handled by a hardware Message Unit (MU). The MU is responsible for putting messages, which are packetized, into the network and for receiving packets from the network and placing them in a main memory device. In one embodiment, the MU is similar to a DMA engine on IBM® Blue Gene®/P supercomputer described in detail in "Overview of the IBM Blue Gene/P project", IBM® Blue Gene® team, IBM J. RES. & DEV., Vol. 52, No. 1/2 January/March 2008, wholly incorporated by reference as if set forth herein. There may be message descriptors that are placed in an injection FIFO (i.e., a buffer or queue storing messages to be sent by the MU). In one embodiment, an injection FIFO is implemented as a circular buffer in a main memory.

The MU maintains memory mapped registers that include, without limitation, pointers to a start, head, tail and end of the injection FIFO. Processor cores inject messages by placing the descriptor in a main memory location pointed to by the tail, and then updating the tail to a next slot in the injection FIFO. The MU recognizes non-empty slots in the injection FIFO, pulls the descriptor at the head of the injection FIFO, and injects a packet or message into the network as indicated in the descriptor, which includes a length of the message, its starting address, its destination and other information indicating what further processing is to be performed with the message's packets upon a reception at a destination node. When all or some of the packets from a message have been injected, the MU advances the head pointer of the injection FIFO. Upon a reception, if the message is a "direct put", payload bytes of the packet are placed into a receiving node's main memory starting at an address indicated in the packet. (A "direct put" is a packet type that goes through the network and writes payload data into a receiving node's main memory.) If a packet belongs to a "memory FIFO" message (i.e., a message associated with a queue or circular buffer in a main memory of a receiving node), the packet is placed at the tail of a reception FIFO and then the MU updates the tail. In one embodiment, a reception FIFO is also implemented as a circular buffer in a main memory and the MU again has memory mapped registers pointing to the start, head, tail and end of the reception FIFO. Threads read packets at the head of the reception FIFO (if non-empty) and then advance the head pointer of the reception FIFO appropriately. The MU may also support "remote get" messages. (A "remote get" is a packet type that goes through the network and is deposited into the injection FIFO on a node A. Then, the MU causes the "remote get" message to be sent from the node A to some other node.) A payload of such "remote get" message is message descriptors that are put into the injection FIFO. Through the "remote get" message, one node can instruct another node to send data back to it, or to another node.

When the MU issues a read to the L2 cache 70100, it tags the read with a non-speculative tag (e.g., a tag "$T_0$" (70115) in FIG. 5-5-1). In the rollback mode, the L2 cache 70100 still returns the most recent version of data read. However, if that version was created in the current interval, as determined by a tag (e.g., the tag "T" (70110) in FIG. 5-5-1), then a "rollback read conflict" bit is set to high in the L2 cache 70100. (This "rollback read conflict" bit is initialized to 0 at the start of a local rollback interval.) The "rollback read conflict" bit indicates that data generated in the current interval is being read and/or indicates that the current interval is not rollbackable. If subsections (sublines) of an L2 cache line can be read, and if the L2 cache 70100 tracks writes on a subline basis, then the rollback read conflict bit is set when the MU reads the subline that a thread wrote to in the current interval. For example, if a cache line is 128 bytes, there may be 8 subsections (sublines) each of length 16 bytes. When a cache line is written speculatively, the control logic device 70120 marks that line having changed sublines, e.g., by using a flag or dirty bit. If a soft error occurs during the interval and/or if any rollback read conflict bit is set, then the interval cannot be rolled back (i.e., cannot be restarted).

In another embodiment, the conflict condition may cause a state change of the speculation ID to the committed state in addition to or as an alternative to setting a read conflict bit.

When the MU issues a write to the L2 cache 70100, it tags the write with a non-speculative ID (e.g., a tag "$T_0$" (70115) in FIG. 5-5-1). In the rollback mode, a non-speculative version of a cache line is written to the L2 cache 70100 and if there are any speculative versions of the cache line, all such speculative versions are updated. During this update, the L2 cache has an ability to track which subsections of the line were speculatively modified. When a cache line is written speculatively, the control logic device 70120 or the L2 cache 70100 marks which sublines are changed, e.g., by using a flag or dirty bit. If the non-speculative write (i.e., normal write) modifies a subline that has been speculatively written during a local rollback interval, a "write conflict" bit in the L2 cache 70100 is set to, for example, high or logic "1", and that interval is not rollbackable. A "write conflict" bit indicates that a normal write modifies speculative data (i.e., assumed data or data computed ahead) and/or that the current interval is not rollbackable. This "write conflict" bit also permits threads to see the latest effects or operations by the MU on a memory system. If no soft error occurs in the current interval, the speculative data can be promoted to non-speculative for a next interval. In addition, although a rollbackable soft error occurs, the control logic device 70120 promotes the speculative data to be non-speculative.

In another embodiment, the write conflict condition may cause a state change of the speculation ID to the committed state in addition to or as an alternative to setting a write conflict bit.

In one embodiment, the MU issues an atomic read-modify-write command. When a processor core accesses a main memory location with the read-modify-write command, the L2 cache 70100 is read and then modified and the modified contents are stored in the L2 cache. For example, message byte counters (i.e., counters that store the number of bytes in messages in a FIFO), which are initialized by an application, are stored in a main memory. After a payload of a "direct put" packet is written to the main memory, the MU issues the atomic read-modify-write command to an address of the byte counter to decrement the byte counter by the number of payload bytes in the packet. The L2 cache 70100 treats this command as both a read and a write command, checking for both read and write conflicts and updating versions.

In one embodiment, in order for the current interval to be rollbackable, certain conditions should be satisfied. One condition is that the MU cannot have started processing any descriptors that were injected into an injection FIFO during the interval. Violations of this "new descriptor injected" condition (i.e., a condition that a new message descriptor was injected into the injection FIFO during the current interval) can be checked by comparing current injection FIFO head pointers with those at the beginning of the interval and/or by tracking how many descriptors are injected during the interval. In a further embodiment, for each injection FIFO, the MU may count the number of descriptors injected.

In a further embodiment, during the current interval, a thread may have received packets from the reception FIFO and advanced the reception FIFO head pointer. Those packets will not be resent by another node, so in order for a local rollback to be successful, the thread should be able to reset the reception FIFO head pointer to what it was at the beginning of the interval so that packets in the reception FIFO can be "re-played". Since the reception FIFO is a circular buffer, and since the head pointer may have been advanced during the interval, it is possible that a newly arrived packet has overwritten a packet in the reception FIFO that should be re-played during the local rollback. In such a situation where an overwriting occurred during a current interval, the interval is not rollbackable. In one embodiment, there is provided messaging software that identifies when such an overwriting occurs. For example, if the head pointer is changed by an "advance_head" macro/inline or function (i.e., a function or code for advancing the head pointer), the "advance_head" function can increment a counter representing the number of bytes in the reception FIFO between an old head pointer (i.e., a head pointer at the beginning of the current interval) and a new head pointer (i.e., a head pointer at the present time). If that counter exceeds a "safe" value (i.e., a threshold value) that was determined at the start of the interval, then a write to a main memory location that invokes the reception FIFO overwriting condition occurs. Such a write may also be invoked via a system call (e.g., a call to a function handled by an Operating System (e.g., Linux™ of a computing node). The safe value can be calculated by reading the reception FIFO head and tail pointers at the beginning of the interval, by knowing a size of the FIFO, and/or by determining how many bytes of packets can be processed before reaching the reception FIFO head pointer.

The barrier(s) or interrupt(s) may be initiated by writing a memory mapped register (not shown) that triggers the barrier or interrupt handler inside a network (i.e., a network connecting processing cores, a main memory, and/or cache memory(s), etc.). If during a local rollback interval, a thread initiates a barrier and a soft error occurs on a node, then the interval is not rollbackable. In one embodiment, there is provided a mechanism that can track such barrier or interrupt, e.g., in a manner similar to the reception FIFO overwriting condition. In an alternative embodiment, hardware (with software cooperation) can set a flag bit in a memory mapped barrier register 70140 whenever a write occurs. This flag bit is initialized to 0 at the beginning of the interval. If the special bit is high, the interval cannot be rolled back. A memory mapped barrier register 70140 is a register outside a processor core but accessible by the processor core. When values in the memory mapped barrier register changes, the control logic device 70120 may cause a barrier or interrupt packet (i.e., packet indicating a barrier or interrupt occurrence) to be injected to the network. There may also be control registers that define how this barrier or interrupt packet is routed and what inputs triggers or creates this packet.

In one embodiment, an application being run uses a messaging software library (i.e., library functions described in the messaging software that is consistent with local rollbacks. The messaging software may monitor the reception FIFO overwriting condition (i.e., a state or condition indicating that an overwriting occurred in the reception FIFO during the current interval), the injection FIFO new descriptor injected condition (i.e., a state or condition that a new message descriptor was injected into the injection FIFO during the current interval), and the initiated interrupt/barrier condition (i.e., a state or condition that the barrier or interrupt is initiated by writing a memory mapped register). In addition, if a memory mapped I/O register 135 (i.e., a register describing status of I/O device(s) or being used to control such device(s)) is written during a local rollback interval, for example, when a FIFO is reconfigured by moving that FIFO, or resizing that FIFO, the interval cannot be rolled back. In a further embodiment, there is provided a mechanism that tracks a write to such memory mapped I/O register(s) and records change bits if condition(s) for local rollback is(are) violated. These change bits have to be cleared at the start of a local rollback interval and checked when soft errors occur.

Thus, at the beginning of a local rollback interval:

1. Threads, run by processing cores of a computing node, set the read and write conflict and overflow bits to 0.

2. Threads store the injection FIFO tail pointers and reception FIFO head pointers, compute and store the safe value and set the reception FIFO overwrite bit (i.e., a bit indicating an overwrite occurred in the reception FIFO during the interval) to 0, set the barrier/intrrupt bit (i.e., a bit indicating a barrier or interrupr is initated, e.g., by writing a memory mapped register, during the interval) to 0, and set the change bits (i.e., bits indicating something has been changed during the interval) to 0.

3. Threads initiate storing of states of their internal and/or external registers.

4. A new speculative ID tag (e.g., a tag "T" (70110) in FIG. 5-5-1) is generated and used for duration of the interval; and, 5. Threads begin running code in the interval.

If there is no detected soft error at the end of a current interval, the control logic device 120 runs a next interval. If an unconditionally not rollbackable soft error (i.e., non-rollbackable soft error) occurs during the interval, the control logic device 70120 or a processor core restarts an operation from a previous checkpoint. If a potentially rollbackable soft error occurs:

1. If the MU is not already stopped, the MU is stopped, thereby preventing new packets from entering a network (i.e., a network to which the MU is connected to) or being received from the network. (Typically, when the MU is stopped, it continues processing any packets currently in progress and then stops.)

2. Rollbackable conditions are checked: the rollback read and write conflict bits, or if the speculation ID is already in committed state, the injection FIFO new descriptor injected condition, the reception FIFO overwrite bits, the barrier/interrupt bit, and the change bits. If the interval is not rollbackable, the control logic device 70120 or a processor core restarts an operation from a previous checkpoint. If the interval is rollbackable, proceeding to the next step 3.

3. Processor cores are reinitialized, all or some of the cache lines in the L2 cache 70100 are invalidated (without writing back speculative data in the L2 cache 70100 to a main memory), and, all or some of the memory mapped registers and thread registers are restored to their values at the start of the current interval. The injection FIFO tail pointers are restored to their original values at the start of the current interval. The reception FIFO head pointers are restored to their original values at the start of the current interval. If the MU was already stopped, the MU is restarted; and, 4. Running of the current interval restarts.

In one embodiment, real-time interrupts such as messages from a control system (e.g., a unit controlling the HPC system), or interrupts initiated by the MU ("MU interrupt") occur. An MU interrupt may occur if a packet with an interrupt bit set high is placed in an injection or reception FIFO, if an amount of free space in a reception FIFO decreases below a threshold, or if an amount of free space in an injection FIFO increases above a threshold. For a (normal) injection FIFO, an interrupt occurs if the amount of free space in the injection FIFO increases above a threshold. For a remote get injection FIFO (i.e., a buffer or queue storing "remote get" message placed by the MU), an interrupt occurs if an amount of free space in the reception FIFO decreases below a threshold.

In one embodiment, the control logic device 70120 classifies an interval as non-rollbackable if any of these interrupts occurs. In an alternative embodiment, the control logic device 70120 increases a fraction of rollbackable intervals by appropriately handling these interrupts as described below. Control system interrupts or remote get threshold interrupts (i.e., interrupts initiated by the remote get injection FIFO due to an amount of free space lower than a threshold) may trigger software that is not easily rolled back. So if such an interrupt (e.g., control system interrupts and/or remote get threshold interrupt) occurs, the interval is not rollbackable.

All the other interrupts cause the messaging software to run a software routine, e.g., called "advance", that handles all the other interrupts. For example, for the reception FIFO interrupts (i.e., interrupts initiated by the reception FIFO because an amount of free space is below a threshold), the advance may pull packets from the reception FIFO. For the injection FIFO interrupt (i.e., an interrupt occurred because an amount of free space is above a threshold), the advance may inject new message descriptors into a previously full injection FIFO (i.e., a FIFO which was full at some earlier point in time; when the injection FIFO interrupt occurred, the FIFO was no longer full and a message descriptor may be injected). The advance can also be called when such interrupts do not occur, e.g., the advance may be called when an MPI (Messaging Passing Interface) application calls MPI_Wait. MPI refers to a language-independent communication protocol used to program parallel computers and is described in detail in http://www.mpi-forum.org/ or http://www.mcs.anl.gov/research/projects/mpi/. MPI_Wait refers to a function that waits for an MPI application to send or receive to complete its request.

Since the messaging software can correctly deal with asynchronous arrival of messages, the messaging software can process messages whenever they arrive. In a non-limiting example, suppose that an interrupt occurs during a local rollback interval and that the control logic device 70120 detects that the interrupt has occurred, e.g., by checking whether the barrier or interrupt bit is set to high ("1"), and that a rollbackable soft error occurs during the interval. In this example, when the interval is restarted, there may be at least as many packets in the reception FIFO as when the interrupt originally occurred. If the control logic device 70120 sets hardware interrupt registers (i.e., registers indicating interrupt occurrences) to re-trigger the interrupt, when the interval is restarted, this re-triggering will cause the advance to be called on one or more threads at, or near the beginning of the interval (if the interrupt is masked at the time). In either case, the packets in the reception FIFO will be processed and a condition causing the interrupt will eventually be cleared. If the advance is already in progress, when the interval starts, having interrupt bits set high (i.e., setting the hardware interrupt registers to a logic "1" for example) may cause the advance to be run a second time.

The L2 cache 7000 can be configured to run in different modes, including, without limitation, speculative, transactional, rollback and normal (i.e., normal caching function). If there is a mode change during an interval, the interval is not rollbackable.

In one embodiment, there is a single "domain" of tags in the L2 cache 70100. In this embodiment, a domain refers to a set of tags. In one embodiment, the software (e.g., Operating System, etc.) or the hardware (e.g., the control logic device, processors, etc.) performs the local rollback when the L2 cache supports a single domain of tags or multiple domains of tags. In the multiple domains of tags, tags are partitioned into different domains. For example, suppose that there are 128 tags that can be divided into up to 8 tag domains with 16 tags per domain. Reads and writes in different tag domains do not affect one another. For example, suppose that there are 16 (application) processor cores per node with 4 different processes each running on a set of 4 processor cores. Each set of cores could comprise a different tag domain. If there is a shared memory region between the 4 processes, which could comprise a fifth tag domain. Reads and writes by the MU are non-speculative (i.e., normal) and may be seen by every domain. Evaluations for local rollback may be satisfied by each tag domain. In particular, if the overflow, read and write conflict bits are set to high in a domain during a local rollback interval, then interval cannot be rolled back if any of the domains indicate non-rollbackable situation (e.g., the overflow bits are high).

FIG. 5-5-3 illustrates a flow chart including method steps for performing a local rollback (i.e., restart) in a parallel computing system including a plurality of computing nodes according to one embodiment of the present invention. A computing node includes at least one cache memory device and at least one processor. At step 70300, the software or hardware starts a current computational interval (e.g., an interval 1 (70200) in FIG. 5-5-2). At step 70305, processors (e.g., CPU 911 in FIG. 5-5-7) run(s) at least one instruction in the interval. At step 70310, while running the at least one instructions in the interval, the control logic device 70120 evaluates whether at least one unrecoverable condition occurs. The at least one unrecoverable condition includes, without limitation, the conflict bit set to high (logic "1")—an occurrence of a read or write conflict during the interval, the overflow bit being set to high—an occurrence of an overflow in the cache memory device during the interval, the barrier or interrupt bit being set to high—an occurrence of a barrier of interrupt during the interval, the reception FIFO overwrite bit being set to high—an occurrence of overwriting a FIFO, the injection FIFO new descriptor injected condition—an occurrence of an injection of data modified during the interval into a FIFO. If the at least one unrecoverable condition does not occur, at step 320, an interrupt handler evaluates whether an error occurs during the local rollback and/or the interval. The error that can be detected in the step 70320 may be a rollbackable error (i.e., an error that can be recovered by performing local rollback in the L2 cache 70100) because the unrecoverable condition has not occurred during the current interval. A non-rollbackable error is detected, e.g., by utilizing the uncorrectable error detecting capability of a parity bit scheme or ECC (Error Correcting Code). If the rollbackable error occurs, at steps 70325 and 70300, the control logic device 70120 restarts the running of the current interval. Otherwise, at step 70330, the software or hardware completes the running of the current interval and instructs the control logic device 70120 to commit changes occurred during the current interval. Then, the control goes to the step 70300 to run a next local rollback interval in the L2 cache 70100.

If, at step 70310, an unrecoverable condition occurs during the current interval, at step 70312, the control logic device 70120 commits changes made before the occurrence of the unrecoverable condition. At step 70315, the control logic device 70315 evaluates whether a minimum interval length is reached. The minimum interval length refers to the least number of instructions or the least amount of time that the control logic device 70120 spends to run a local rollback interval. If the minimum interval length is reached, at step 70330, the software or hardware ends the running of the current interval and instructs the control logic device 70120 to commit changes (in states of the processor) occurred during the minimum interval length. Then, the control returns to the step 70300 to run a next local rollback interval in the L2 cache 70100. Otherwise, if the minimum interval length is not reached, at step 70335, the software or hardware continues the running of the current interval until the minimum interval length is reached.

Continuing to step 70340, while running the current interval before reaching the minimum interval length, whether an error occurred or not can be detected. The error that can be detected in step 70340 may be non-recoverable soft error because an unrecoverable condition has been occurred during the current interval. If a non-recoverable error (i.e., an error that cannot be recovered by restarting the current interval) has not occurred until the minimum interval length is reached, at step 70330, the software or hardware ends the running of the current interval upon reaching the minimum interval length and commits changes occurred during the minimum interval length. Then, the control returns to the step 70300 to run a next local rollback interval. Otherwise, if a non-recoverable error occurs before reaching the minimum interval length, at step 70345, the software or hardware stops running the current interval even though the minimum interval length is not reached and the control is aborted 70345.

FIG. 5-5-4 illustrates a flow chart detailing the step 70300 described in FIG. 5-5-3 according to a further embodiment of the present invention. At step 70450, at the start of the current interval, the software or hardware stores states (e.g., register contents, program counter values, etc.) of a computing node's processor cores, e.g., in a buffer. At steps 70460-70470, the control logic device 70120 allocates and uses the newest generation ID tag (e.g., the tag "T" (70110) in FIG. 5-5-1) to versions of data created or accessed during the current interval.

FIG. 5-5-5 illustrates a method step supplementing the steps 70312 and/or 70330 described in FIG. 5-5-3 according to a further embodiment of the present invention. After the control logic device 70120 runs the step 70312 or step 70330 in FIG. 5-5-5, the software or hardware may run a step 70500 in FIG. 5-5-7. At the step 70500, the software or the processor(s) instructs the control logic device 120 to declare all or some of changes associated with the newest generation ID tag as permanent changes. In other words, at step 70500, the control logic device 70120 makes tentative changes in the state of the memory that occur in the current interval as permanent changes.

FIG. 5-5-6 illustrates a flow chart detailing the step 70325 described in FIG. 5-5-3 according to a further embodiment of the present invention. At step 70600, the software or processor(s) instructs the control logic device 70120 to declare all or some of changes associated with the newest generation ID tag as invalid. Consequently, the control logic device 70120 discards and/or invalidates all or some of changes associated with the newest generation ID tag. Then, at step 70610, the control logic device 70120 restores the stored states of the process cores from the buffer.

In one embodiment, at least one processor core performs method steps described in FIGS. 5-5-3-5-5-6. In another embodiment, the control logic device 70120 performs method steps described in FIGS. 5-5-3-5-5-6. In one embodiment, the method steps in FIGS. 5-5-3-5-5-6 and/or the control logic device 70120 are implemented in hardware or reconfigurable hardware, e.g., FPGA (Field Programmable Gate Array) or CPLD (Complex Programmable Control logic device Device), using a hardware description language (Verilog, VHDL, Handel-C, System C, etc.). In another embodiment, the method steps in FIGS. 5-5-3-5-5-6 and/or the control logic device 70120 are implemented in a semiconductor chip, e.g., ASIC (Application-Specific Integrated Circuit), using a semi-custom design methodology, i.e., designing a semiconductor chip using standard cells and a hardware description language. Thus, the hardware, reconfigurable hardware or the semiconductor chip operates the method steps described in FIGS. 5-5-3-5-5-6.

IEEE 754 describes floating point number arithmetic. Kahan, "IEEE Standard 754 for Binary Floating-Point Arithmetic," May 31, 1996, UC Berkeley Lecture Notes on the Status of IEEE 754, wholly incorporated by reference as if set forth herein, describes IEEE Standard 754 in detail.

According to IEEE Standard 754, to perform floating point number arithmetic, some or all floating point numbers are converted to binary numbers. However, the floating point number arithmetic does not need to follow IEEE or any particular standard. Table 1 illustrates IEEE single precision floating point format.

TABLE 1

| IEEE single precision floating point number format | | | | |
|---|---|---|---|---|
| Signed (S) | Exponent (E) | | Mantissa (M) | |
| 0 | 1 | 8 | 9 | 31 |

"Signed" bit indicates whether a floating point number is a positive (S=0) or negative (S=1) floating point number. For example, if the signed bit is 0, the floating point number is a positive floating point number. "Exponent" field (E) is represented by a power of two. For example, if a binary number is $10001.001001_2=1.0001001001_2\times2^4$, then E becomes $127+4=131_{10}=1000\_0011_2$. "Mantissa" field (M) represents fractional part of a floating point number.

For example, to add $2.5_{10}$ and $4.75_{10}$, $2.5_{10}$ is converted to 0x40200000 (in hexadecimal format) as follows:

Convert $2_{10}$ to a binary number $10_2$, e.g., by using binary division method.

Convert $0.5_{10}$ to a binary number $0.1_2$, e.g., by using multiplication method.

Calculate the exponent and mantissa fields: $10.1_2$ is normalized to $1.01_2\times2^1$. Then, the exponent field becomes $128_{10}$, i.e., 127+1, which is equal to $1000\_0000_2$. The mantissa field becomes $010\_0000\_0000\_0000\_0000_2$. By combining the signed bit, the exponent field and the mantissa field, a user can obtain $0100\_0000\_0010\_0000\_0000\_0000\_0000\_0000_2$=0x40200000.

Similarly, the user covert $4.75_{10}$ to 0x40980000.

Add 0x40200000 and 0x40980000 as follows:

Determine values of the fields.

i. $2.5_{10}$
- S: 0
- E: $1000\_0000_2$
- M: $1.01_2$ ii. $4.75_w$
- S: 0
- E: $1000\_0001_2$
- M: $1.0011_2$

Adjust a number with a smaller exponent to have a maximum exponent (i.e., largest exponent value among numbers; in this example, $1000\_0001_2$). In this Example, $2.5_{10}$ is adjusted to have $1000\_0001_2$ in the exponent field. Then, the mantissa field of $2.5_{10}$ becomes $0.101_2$.

Add the mantissa fields of the numbers. In this example, add $0.101_2$ and $1.0011_2$. Then, append the exponent field. Then, in this example, a result becomes $0100\_0000\_1110\_1000\_0000\_0000\_0000\_0000_2$.

Convert the result to a decimal number. In this example, the exponent field of the result is $1000\_0001_2=129_{10}$. By subtracting $127_{10}$ from $129_{10}$, the user obtains $2_{10}$. Thus, the result is represented by $1.1101_2 \times 2^2 = 111.01_2$. $111_2$ is equal to $7_{10}$. $0.01_2$ is equal to $0.25_{10}$. Thus, the user obtains $7.25_{10}$.

Although this example is based on single precision floating point numbers, the mechanism used in this example can be extended to double precision floating point numbers. A double precision floating number is represented by 64 bits, i.e., 1 bit for the signed bit, 11 bits for the exponent field and 52 bits for the mantissa field.

Traditionally, in a parallel computing system, floating point number additions in multiple computing node operations, e.g., via messaging, are done in part, e.g., by software. The additions require at per network hop a processor to first receive multiple network packets associated with multiple messages involved in a reduction operation. Then, the processor adds up floating point numbers included in the packets, and finally puts the results back into the network for processing at the next network hop. An example of the reduction operations is to find a summation of a plurality of floating point numbers contributed (i.e., provided) from a plurality of computing nodes. This software had large overhead, and could not utilize a high network bandwidth (e.g., 2 GB/s) of the parallel computing system.

Therefore, it is desirable to perform the floating point number additions in a collective logic device to reduce the overhead and/or to fully utilize the network bandwidth.

In one embodiment, the present disclosure illustrates performing floating point number additions in hardware, for example, to reduce the overhead and/or to fully utilize the network bandwidth.

FIG. 5-12-2 illustrates a collective logic device 260 for adding a plurality of floating point numbers in a parallel computing system (e.g., IBM® Blue Gene® Q). As shown in FIG. 5-12-2, the collective logic device 75260 comprises, without restriction, a front-end floating point logic device 75270, an integer ALU (Arithmetic Logic Unit) tree 75230, a back-end floating point logic device 75240. The front-end floating point logic device 75270 comprises, without limitation, a plurality of floating point number ("FP") shifters (e.g., FP shifter 75210) and at least one FP exponent max unit 75220. In one embodiment, the FP shifters 75210 are implemented by shift registers performing a left shift(s) and/or right shift(s). The at least one FP exponent max unit 75220 finds the largest exponent value among inputs 75200 which are a plurality of floating point numbers. In one embodiment, the FP exponent max unit 75220 includes a comparator to compare exponent fields of the inputs 75200. In one embodiment, the collective logic device 75260 receives the inputs 75200 from network links, computing nodes and/or I/O links. In one embodiment, the FP shifters 75210 and the FP exponent max unit 75220 receive the inputs 75200 in parallel from network links, computing nodes and/or I/O links. In another embodiment, the FP shifters 75210 and the FP exponent max unit 75220 receive the inputs 75200 sequentially, e.g., the FP shifters 75210 receives the inputs 75200 and forwards the inputs 75200 to the FP exponent max unit 75220. The ALU tree 75230 performs integer arithmetic and includes, without limitations, adders (e.g., an adder 75280). The adders may be known adders including, without limitation, carry look-ahead adders, full adders, half adders, carry-save adders, etc. This ALU tree 75230 is used for floating point arithmetic as well as integer arithmetic. In one embodiment, the ALU tree 75230 is divided by a plurality of layers. Multiple layers of the ALU tree 75230 are instantiated to do integer operations over (intermediate) inputs. These integer operations include, but are not limited to: integer signed and unsigned addition, max (i.e., finding a maximum integer number among a plurality of integer numbers), min (i.e., finding a minimum integer number among a plurality of integer numbers), etc.

In one embodiment, the back-end floating point logic device 75240 includes, without limitation, at least one shift register for performing normalization and/or shifting operation (e.g., a left shift, a right shift, etc.). In embodiment, the collective logic device 75260 further includes an arbiter device 75250. The arbiter device is described in detail below in conjunction with FIG. 5-12-3. In one embodiment, the collective logic device 75260 is fully pipelined. In other words, the collective logic device 75260 is divided by stages, and each stage concurrently operates according to at least one clock cycle.

In a further embodiment, the collective logic device 75260 is embedded and/or implemented in a 5-Dimensional torus network. FIG. 5-12-4 illustrates a 5-Dimensional torus network 75400. A torus network is a grid network where a node is connected to at least two neighbors along one or more dimensions. The network 75400 includes, without limitation, a plurality of computing nodes (e.g., a computing node 75410). The network 75400 may have at least 2 GB/s bandwidth. In a further embodiment, some or all of the computing nodes in the network 75400 includes at least one collective logic device 75260. The collective logic device 75260 can operate at a peak bandwidth of the network 75400.

FIG. 5-12-1 illustrates a flow chart for adding a plurality of floating point numbers in a parallel computing system. The parallel computing system may include a plurality of computing nodes. A computing node may include, without limitation, at least one processor and/or at least one memory device. At step 75100 in FIG. 5-12-1, the collective logic device 260 receives the inputs 75200 which include a plurality of floating point numbers ("first floating point numbers") from computing nodes or network links. At step 75105, the FP exponent max unit 75220 finds a maximum exponent (i.e., the largest exponent) of the first floating point numbers, e.g., by comparing exponents of the first floating point numbers. The FP exponent max unit 75220 broadcast the maximum exponent to the computing nodes. At step 75110, the front-end floating point logic device 75270 converts the first floating point numbers to integer numbers, e.g., by performing left shifting and/or right shifting the first floating point numbers according to differences between exponents of the first floating point numbers and the maximum exponent. Then, the front-end floating point logic device 75270 sends the integer numbers to the ALU tree 75230 which includes integer adders (e.g., an adder 75280). When sending the integer numbers, the front-end floating point logic device 75270 may also send extra bits representing plus(+) infinity, minus(−) infinity and/or a not-a-number (NAN). NAN indicates an invalid operation and may cause an exception.

At step 75120, the ALU tree 75230 adds the integer numbers and generates a summation of the integer values. Then, the ALU tree 75230 provides the summation to the back-end floating point logic device 75240. At step 75130, the back-end logic device 75240 converts the summation to a floating point number ("second floating point number"), e.g., by performing left shifting and/or right shifting according to the maximum exponent and/or the summation. The second floating point number is an output of adding the inputs 75200. This second floating point numbers is reproducible. In other words, upon receiving same inputs, the collective logic device 75260 produces same output(s). The outputs do not depend on an order of the inputs. Since an addition of integer numbers (converted from the floating point numbers) does not generate a different output based on an order of the addition, the collective logic device 75260 generates the same output(s) upon receiving same inputs regardless of an order of the received inputs.

In one embodiment, the collective logic device 75260 performs the method steps 75100-75130 in one pass. One pass refers that the computing nodes sends the inputs 75200 only once to the collective logic device 75260 and/or receives the output(s) only once from the collective logic device 75260.

In a further embodiment, in each computing node, besides at least 10 bidirectional links for the 5D torus network 75400, there is also at least one dedicated I/O link that is connected to at least one I/O node. Both the I/O link and the bidirectional links are inputs to the collective logic device 75260. In one embodiment, the collective logic device 75260 has at least 12 inputs. One or more of the inputs may come from a local computing node(s). In another embodiment, the collective logic device 75260 has at most 12 inputs. One or more of the inputs may come from a local computing node(s).

In a further embodiment, at least one computing node defines a plurality of collective class maps to select a set of inputs for a class. A class map defines a set of input and output links for a class. A class represents an index into the class map on at least one computing node and is specified, e.g., by at least one packet.

In another embodiment, the collective logic device 75260 performs the method steps 75100-75130 in at least two passes, i.e., the computing nodes sends (intermediate) inputs at least twice to the collective logic device 75260 and/or receives (intermediate) outputs at least twice from the collective logic device 75260. For example, in the first pass, the collective logic device 75260 obtains the maximum exponent of the first floating point numbers. Then, the collective logic device normalizes the first floating point numbers and converts them to integer numbers. In the second pass, the collective logic device 75260 adds the integer numbers and generates a summation of the integer numbers. Then, the collective logic device 75260 converts the summation to a floating point number called the second floating point number. When the collective logic device 75260 operates based on at least two passes, its latency may be at least twice larger than a latency based on one pass described above.

In one embodiment, the collective logic device 75260 performing method steps in FIG. 5-12-1 is implemented in hardware or reconfigurable hardware, e.g., FPGA (Field Programmable Gate Array) or CPLD (Complex Programmable Logic deviceDevice), using a hardware description language (Verilog, VHDL, Handel-C, or System C). In another embodiment, the collective logic device 75260 is implemented in a semiconductor chip, e.g., ASIC (Application-Specific Integrated Circuit), using a semi-custom design methodology, i.e., designing a chip using standard cells and a hardware description language. Thus, the hardware, reconfigurable hardware or the semiconductor chip may operate the method steps described in FIG. 5-12-1. In one embodiment, the collective logic device 75260 is implemented in a processor (e.g., IBM® PowerPC® processor, etc.) as a hardware unit.

Following describes an exemplary floating point number addition according to one exemplary embodiment. Suppose that the collective logic device 75260 receives two floating point numbers $A=2^1*1.5_{10}=3_{10}$ and $B=2^3*1.25_{10}=10_{10}$ as inputs. The collective logic device 75260 adds the number A and the number B as follows:

I. (corresponding to Step 75105 in FIG. 5-12-1) The collective logic device 75260 obtains the maximum exponent, e.g., by comparing exponent fields of each input. In this example, the maximum exponent is 3.

II. (corresponding to Step 75110 in FIG. 5-12-1) A floating point representation for the number A is 0x0018000000000000 (in hexadecimal notation)$=1.1_2\times2^1$. A floating point representation for the number B is 0x0034000000000000$=1.01_2\times2^3$. The collective logic device 75260 converts the floating point representations to integer representations as follows:

Remove the exponent field and sign bit in the floating point representations. Append a hidden bit (e.g., "1") in front of the mantissa field of the floating point representations.

Regarding the floating point number with the maximum exponent, shift left the mantissa field, e.g., by 6 bits. In this example, the floating point representation for the number B is converted to 0x0500000000000000 after steps a-b.

Regarding other floating point numbers, shift left the mantissa field, e.g., 6−the maximum exponent+their exponents. (Left-shifting by "x," where x is less than zero, is equivalent to right-shifting by |x|.) In this example, the floating point representation for the number A is converted to 0x0180000000000000 after left shifting by 4 bits, i.e., 6−3+1 bits.

Thus, when the number A is converted to an integer number, it becomes 0x0180000000000000. When the number B is converted, it becomes 0x0500000000000000. Note that the integer numbers comprise only the mantissa field. Also note that the most significant bit of the number B is two binary digits to the left (larger) than the most significant bit of the number A. This is exactly the difference between the two exponents (1 and 3). III. (corresponding to Step 75120 in FIG. 5-12-1) The two integer numbers are added. In this example, the result is 0x0680000000000000=0x0180000000000000+0x0500000000000000. IV. (corresponding to Step 75130 in FIG. 5-12-1) This result is then converted back to a floating point representation, taking into account the maximum exponent which has been passed through the collective logic device 75260 in parallel with the addition as follows:

Right shift the result, e.g., by 6 bits.

Remove the hidden bit.

Append a new exponent in the exponent field. The new exponent is calculated, e.g., by New exponent=the maximum exponent+4−leading bit number which is 1 in bit (0 to 3). In this example, the leading bit number is 4.

In this example, after steps 1-3, 0x0680000000000000 is converted to 0x003a000000000000$=2^3*1.625_{10}=13_{10}$, which is expected by adding $10_{10}$ and $3_{10}$.

In one embodiment, the collective logic device 75260 performs logical operations including, without limitation, logical AND, logical OR, logical XOR, etc. The collective logic device 75260 also performs integer operations including, without limitation, an unsigned and signed integer addition, min and max with an operand size from 32 bits to 4096 bits in units of $(32*2^n)$ bits, where n is a positive integer number. The collective logic device 75260 further performs floating point operations including, without limitation, a 64-bit floating point addition, min (i.e., finding a minimum floating point number among inputs) and max (finding a maximum floating point number among inputs). In one embodiment, the collective logic device 75260 performs floating point operations at a peak network link bandwidth of the network.

In one embodiment, the collective logic device 75260 performs a floating point addition as follows: First, some or all inputs are compared and the maximum exponent is obtained. Then, the mantissa field of each input is shifted according to the difference of its exponent and the maximum exponent. This shifting of each input results in a 64-bit integer number which is then passed through the integer ALU tree 75230 for doing an integer addition. A result of this integer addition is then converted back to a floating point number, e.g., by the back-end logic device 75240.

FIG. 5-12-3 illustrates an arbiter device 75250 in one embodiment. The arbiter device 75250 controls and manages the collective logic device 75260, e.g., by setting configuration bits for the collective logic device 75260. The configuration bits define, without limitation, how many FP shifters (e.g., an FP shifter 75210) are used to convert the inputs 75200 to integer numbers, how many adders (e.g., an adder 75280) are used to perform an addition of the integer numbers, etc. In this embodiment, an arbitration is done in two stages: first, three types of traffic (user 75310/system 75315/subcomm 75320) arbitrate among themselves; second, a main arbiter 75325 chooses between these three types (depending on which have data ready). The "user" type 75310 refers to a reduction of network traffic over all or some computing nodes. The "system" type 75315 refers to a reduction of network traffic over all or some computing nodes while providing security and/or reliability on the collective logic device. The "subcomm" type 75320 refers to a rectangular subset of all the computing nodes. However, the number of traffic types is not limited to these three traffic types. The first level of arbitration includes a tree of 2-to-1 arbitrations. Each 2-to-1 arbitration is round-robin, so that if there is only one input request, it will pass through to a next level of the tree 75240, but if multiple inputs are requesting, then one will be chosen which was not chosen last time. The second level of the arbitration is a single 3-to-1 arbiter, and also operates a round-robin fashion.

Once input requests has been chosen by an arbiter, those input requests are sent to appropriate senders (and/or the reception FIFO) 75330 and/or 75350. Once some or all of the senders grant permission, the main arbiter 75325 relays this grant to a particular sub-arbiter which has won and to each receiver (e.g., an injection FIFO 75300 and/or 75305). The main arbiter 75325 also drives correct configuration bits to the collective logic device 75260. The receivers will then provide their input data through the collective logic device 75260 and an output of the collective logic device 75260 is forwarded to appropriate sender(s).

Integer Operations

In one embodiment, the ALU tree 75230 is built with multiple levels of combining blocks. A combining block performs, at least, an unsigned 32-bit addition and/or 32-bit comparison. In a further embodiment, the ALU tree 75230 receives control signals for a sign (i.e., plus or minus), an overflow, and/or a floating point operation control. In one embodiment, the ADD tree 75230 receives at least two 32-bit integer inputs and at least one carry-in bit, and generates a 32-bit output and a carry-out bit. A block performing a comparison and/or selection receives at least two 32-bit integer inputs, and then selects one input depending on the control signals. In another embodiment, the ALU tree 75230 operates with 64-bit integer inputs/outputs, 128-bit integer inputs/outputs, 256-bit integer inputs/outputs, etc.

Floating Point Operations

In one embodiment, the collective logic device 75260 performs 64-bit double precision floating point operations. In one embodiment, at most 12 (e.g., 10 network links+1 I/O link+1 local computing node) floating point numbers can be combined, i.e., added. In an alternative embodiment, at least 12 floating point number are added.

A 64-bit floating point number format is illustrated in Table 2.

| IEEE double precision floating point number format | | | | |
|---|---|---|---|---|
| Signed (S) | Exponent (E) | | Mantissa (M) | |
| 0 | 1 | 11 | 12 | 63 |

In IEEE double precision floating point number format, there is a signed bit indicating whether a floating point number is an unsigned or signed number. The exponent field is 11 bits. The mantissa field is 52 bits.

In one embodiment, Table 3 illustrates a numerical value of a floating point number according to an exponent field value and a mantissa field value:

TABLE 3

| Exponent field binary | Exponent field value | Exponent (E) | Value |
|---|---|---|---|
| 11 . . . 11 | 2047 | | If M = 0, +/− Infinity<br>If M ! = 0, NaN |
| Non zero | 1 to 2046 | −1022 to 1023 | (−1)^S * 1.M * 2^E |
| 00 . . . 00 | 0 | zero or denormalized numbers | +/− 0, when x = 0;<br>(−1)^S * 0.M * 2^(−1022) |

If the exponent field is 2047 and the mantissa field is 0, a corresponding floating point number is plus or minus Infinity. If the exponent field is 2047 and the mantissa field is not 0, a corresponding floating point number is NaN (Not a Number). If the exponent field is between 1 and $2046_{10}$, a corresponding floating point number is $(-1)^S \times 0.M \times 2^E$. If the exponent field is 0 and the mantissa field is 0, a corresponding floating point number is 0. If the exponent field is 0 and the mantissa field is not 0, a corresponding floating point number is $(-1)^S \times 0.M \times 2^{-1022}$. In one embodiment, the collective logic device 75260 normalizes a floating point number according to Table. 3. For example, if S is 0, E is $2_{10}=10_2$ and M is $1000\_0000\_0000\_0000\_0000\_0000\_0000\_0000\_0000\_0000\_0000\_0000\_0000_2$, a corresponding floating number is normalized to $1.1000 \ldots 000 \times 2^2$.

In one embodiment, an addition of (+) infinity and (+) infinity generates (+) infinity, i.e., (+) Infinity+(+) Infinity=(+) Infinity. An addition of (−) infinity and (−) infinity generates (−) infinity, i.e., (−) Infinity+(−) Infinity=(−) Infinity. An addition of (+) infinity and (−) infinity generates NaN, i.e., (+) Infinity+(−) Infinity=NaN. Min or Max operation for (+) infinity and (+) infinity generates (+) infinity, i.e., MIN/MAX (+Infinity, +Infinity)=(+) infinity. Min or Max operation for (−) infinity and (−) infinity generates (−) infinity, i.e., MIN/MAX (−Infinity, −Infinity)=(−) infinity.

In one embodiment, the collective logic device 75260 does not distinguish between different NaNs. An NaN newly generated from the collective logic device 75260 may have the most significant fraction bit (the most significant mantissa bit) set, to indicate NaN.

Floating Point (FP) Min and Max

In one embodiment, an operand size in FP Min and Max operations is 64 bits. In another embodiment, an operand size in FP Min and Max operations is larger than 64 bits. The operand passes through the collective logic device 75260 without any shifting and/or normalization and thus reduces an overhead (e.g., the number of clock cycles to perform the FP Min and/or Max operations). Following describes the FP Min and Max operations according to one embodiment. Suppose that "I" be an integer representation (i.e., integer number) of bit patterns for 63 bits other than the sign bit. Given two floating point numbers A and B, if (Sign(A)=0 and Sign(B)=0, or both positive) then
  if (I(A)>I(B)), then A>B.

(If both A and B are positive numbers and if A's integer representation is larger than B's integer representation, A is larger than B.)

if (Sign(A)=0, and Sign(B)=1), then A>B.

(If A is a positive number and B is a negative number, A is larger than B.)

if (Sign(A)=1 and Sign(B)=1, both negative) then
  if (I(A)>I(B)), then A<B.

(If both A and B are negative numbers and if A's integer representation is larger than B's integer representation (i.e., |A|>|B|), A is smaller than B.)

Floating Point ADD

In one embodiment, operands are 64-bit double precision Floating point numbers. In one embodiment, the operands are 32 bits floating point numbers, 128 bits floating point numbers, 256 bits floating point numbers, 256 bits floating point numbers, etc. There is no reordering on injection FIFOs 75300-75305 and/or reception FIFOs 75330-75335.

In one embodiment, when a first half of the 64-bit floating point number is received, the exponent field of the floating point number is sent to the FP exponent max unit 75220 to get the maximum exponent for some or all the floating point numbers contributing to an addition of these floating point numbers. The maximum exponent is then used to convert each 64-bit floating point numbers to 64-bit integer numbers. The mantissa field of each floating point numbers has a precision of 53 bits, in the form of 1.x for regular numbers, and 0.x for denormalized numbers. The converted integer numbers reserve 5 most significant bits, i.e., 1 bit for a sign bit and 4 bits for guarding against overflow with up to 12 numbers being added together. The 53-bits mantissa field is converted into a 64-bit number in the following way. The left most 5 bits are zeros. The next bit is one if the floating point number is normalized and it is zero if the floating point number is denormalized. Next, the 53-bit mantissa field is appended and then 6 zeroes are appended. Finally, the 64-bit number is right-shifted by Emax−E, where Emax is the maximum exponent and E is a current exponent value of the 59-bit number. E is never greater than Emax, and so Emax−E is zero or positive. After this conversion, if the sign bit retained from the 64-bit floating point number, then the shifted number ("N") is converted to 2's complementary format ("N_new"), e.g., by N_new=(not N)+1, where "not N" may be implemented by a bitwise inverter. A resulting number (e.g., N_new or N) is then sent to the ALU tree 75230 with a least significant 32-bit word first. In a further embodiment, there are additional extra control bits to identify special conditions. In one embodiment, each control bit is binary. For example, if the NaN bit is 0, then it is not a NaN, and if it is 1, then it is a NaN. There are control bits for +Infinity and −Infinity as well.

The resulting numbers are added as signed integers with operand sizes of 64 bits, with a consideration to control bits for Infinity and NaN. A result of the addition is renormalized to a regular floating point format: (1) if a sign bit is set (i.e., negative sum), covert the result back from 2's complementary format using, e.g., K_new=not (K−1), where K_new is the converted result and K is the result before the converting; (2) Then, right or left shift K or K_new until the left-most bit of the final integer sum (i.e., an integer output of the ALU 75230) which is a '1' is in the $12^{th}$ bit position from the left of the integer sum. This '1' will be a "hidden" bit in the second floating point number (i.e., a final output of adding of floating point numbers). If the second floating point number is a denormalized number, shift right the second floating point number until the left-most '1' is in the $13^{th}$ position, and then shift to the right again, e.g., by the value of the maximum exponent. The resultant exponent is calculated as Emax+the amount it was right-shifted−6, for normalized floating point results. For denormalized floating point results, the exponent is set to the value according to the IEEE specification. A result of this renormalization is then sent on with most significant 64-bit word to computing nodes as a final result of the floating point addition.

Global Clock

There are a wide variety of inter-chip and intra-chip clock frequencies required for BG/Q. The processor frequency is 1.6 GHz and portions of the chip run at fractions of this speed, e.g., /2, /4, /8, or /16 of this clock. The high speed communication in BG/Q is accomplished by sending and receiving data between ASICs at 4Gb/s, or 2.5 times the target processor frequency of 1.6 GHz. All signaling between BG/Q ASICs is based on IBM Micro Electronic Division (IMD) High Speed I/O which accepts an input clock at ⅛ the datarate, or 500 MHz. The optical communication is at 8Gb/s but due to the need for DC balancing of the currents, this interface is 8b-10b encoded and runs at 10 Gb/s with an interface of 1 GBs/. The memory system is based on SDRAM-DDR3 at 1.333 Gb/s (667 MHz address frequency).

These frequencies are generated on the BQC chip through Phase Locked Loops. The PLLs are driven from a single global 100 MHz clock.

The BG/P clock network uses over 10,000 1-10 PECL clock redrive buffers to distribute the signal derived from a single source to the up to 36 racks or beyond. There are 7 layers to the clock tree. The first 3 layers exist on the 1->10 clock fanout cards on each rack, connected with max 5*m* differential cables. The next 4 layers exist on the service and node or I/O boards themselves. For a 96-rack BG/Q system, IBM has designed an 8-layer LVPECL clock redrive tree with slightly longer rack-to-rack cables. The service card contains circuitry to drop a clock pulse, with the number of clocks to be dropped and the spacing between dropped clocks variable. Glitch detection circuitry in BQC detects these clock glitches and uses them for tight synchronization. FIG. 7-0 shows an intra-rack clock fanout designed for the BG/Q 96 rack system with racks in a row on 5 foot pitch, and optional I/O racks at the end of each row.

While modern processing systems have clock frequencies in a multi-GHz range, this may result in communications paths between processors necessarily involving multiple clock cycles. Additionally, the clock frequencies in modern multiprocessor systems are not all exactly equal, as they are typically derived from multiple local oscillators that are each directly used by only a small fraction of the processors in the multiprocessor systems. Having all processors utilize the same clock may require that all modules in the system receive a single global clock signal, thereby requiring a global clock network. Both the lack of a global clock signal and the complexities of synchronization of chips when communication distances between chips are many cycles may result in an inability of modern systems to exactly synchronize.

Thus, in a further aspect, there is provided a system, method and computer program product for synchronizing a plurality of processors in a parallel computing system.

That is, in one aspect, there is a method, a system and a computer program product by which a global clock network can be enhanced along with innovative circuits inside receiving devices to enable global clock synchronization. By achieving the global clock synchronization, the multiprocessor system may enable exact reproducibility of processing of instructions. Thus, this global clock synchronization may assist to accurately reproduce processing results in a system-wide debugging mechanism.

This disclosure describes a method, system and a computer program product to generate and/or detect a global clock signal having a pulse width modification in one or more selected clock period(s). In the present disclosure, a global clock signal can be used as an absolute phase reference signal (i.e., a reference signal for a phase correction of a clock signal) as well as a clock signal to synchronize processors in the parallel computing system. A global clock signal can be used for a synchronized system with a resetting capability, network synchronization, pacing of parallel calculations and power management in a parallel computing system. This disclosure describes a clock signal with modulated clock pulse width used for a global synchronization signal. This disclosure also describes a method, system and a computer program product for generating a global synchronization signal (e.g., a signal 9545 in FIG. 7-1-4) based on the global clock signal with the pulse width modification. A global synchronization signal refers to a signal that can be used to notify a plurality of processors to synchronize, for example, to perform instructions, operations and others. In other words, the global synchronization signal can cause an interrupt signal to one or more of processors in a parallel computing system. A pulse width modulation refers to a technique for modifying one or more clock pulses in a clock signal. The parallel computer system may derive their processor clocks from the global clock signal having the pulse width modification. This disclosure also describes how a single clock signal can be used to enable processor synchronization in a parallel computing system.

FIG. 7-1-1 illustrates a system diagram for generating a global clock signal in which one or more clock pulse(s) has been modified in one embodiment. In FIG. 7-1-1, a clock generation circuit 9100 generates a global clock signal with pulse modification(s). The clock generation circuit 9100 includes, but is not limited to: an oscillator 9105, a clock synthesizer 9110, a clock divider and splitter 9115, a hardware module 9120, a flip flop 9125 and a clock splitter 9130. FIG. 7-1-6 illustrates a flow chart describing method steps that clock generation circuit 9100 operates. For clarity of explanation, the functional components of FIG. 7-1-1 are described with reference to method steps in FIG. 7-1-6. At step 9600 in FIG. 7-1-6, an oscillator (e.g., an oscillator 9105 in FIG. 7-1-1, a spread-spectrum VSS4 oscillator from Vectron™ International, Inc., and/or others) generates a stable fixed frequency signal (e.g., 25 MHz oscillating signal). At step 9610 in FIG. 7-1-6, a clock synthesizer (e.g., a clock synthesizer 9110 in FIG. 7-1-1, a CDCE62005 from Texas Instruments® Incorporated., hereinafter "TI", and/or others) generates a first clock signal based on the stable fixed frequency signal. For example, if the oscillator 9105 generates a 25 MHz oscillating signal, the clock synthesizer 9110 produces 400 MHz clock signal, e.g., by multiplying the 25 MHz oscillating signal. CDCE949 and CDCEL949 from TI are commercial products that perform clock signal synthesis (i.e., clock signal generation), clock signal multiplication (e.g., generating a 400 MHz clock signal from a 100 MHz clock signal), and clock signal division (e.g., generating a 200 MHz clock signal from a 400 MHz clock signal).

At step 9620 in FIG. 7-1-6, a clock divider/splitter (e.g., clock divider and splitter 9115 in FIG. 7-1-1, CDCE949 and CDCEL949 from TI, and/or others) divides a clock frequency of the first clock signal to generate a second clock signal, e.g., by dividing by "N", and splits the first clock signal and the second clock signal. Vakil, et al., "Low skew minimized clock splitter," U.S. Pat. No. 6,466,074, wholly incorporated by reference as if set forth herein, describes a clock splitter in detail. For example, as shown in FIG. 7-1-1, the clock divider and splitter 9115 receives a 400 MHz first clock signal from the clock synthesizer 9110 and outputs a 200 MHz second clock signal to a hardware module (e.g., an FPGA (Field Programmable Gate Array) or CPLD (Complex Programmable Logic Device) 9120 in FIG. 7-1-1) and outputs the 400 MHz first clock signal to a flip flop (e.g., D flip flop 9125 in FIG. 7-1-1).

At step 9630 in FIG. 7-1-6, the hardware module 9120 divides a clock frequency of the second clock signal to generate a third clock signal and performs a pulse width modulation on the third clock signal. The pulse width modulation changes a pulse width within a clock period in the third clock signal. In one embodiment, the hardware module is reconfigurable, i.e., the hardware module can be modified or updated by loading different code.

In one embodiment, a user configures the hardware module, e.g., through a hardware console (e.g., JTAG) by loading code written by a hardware description language (e.g., VHDL, Verilog, etc.). The hardware module 9120 may include, but is not limited to: a logical exclusive OR gate for narrowing a pulse width within a clock period in the third clock signal, a logical OR gate for widening a pulse width within a clock period in the third clock signal, and/or another logical exclusive OR gate for removing a pulse within a clock period within the second clock signal. The hardware module 9120 may also include a counter device to divide clock signal frequency and to determine a specific clock cycle to perform a pulse width modification.

FIG. 7-1-2*a* illustrates an example of removing a pulse within a clock period in a clock signal. In this example, the clock divider and splitter 9115 receives a 200 MHz first clock signal (9200) from the clock synthesizer 9110 and outputs a 100 MHz second clock signal (9205) to the hardware module 9120. The hardware module 9120 generates a pulse (9210), e.g., by counting the number of rising edges in the 100 MHz second clock signal (9205) and generating a pulse when the counting reaches a certain number (e.g., a determined number two). The pulse shown at 9210, also referred to as a gate pulse is used to determine which clock period in the 100 MHz second clock signal (9205) is going to be modified. In this example, there is a pulse (9210) at a location (9280) corresponding to the second pulse (9275) in the 100 MHz second clock signal (9205). The location (9280) of this pulse (9210) corresponds to the second pulse (9275) in the 100 MHz second clock signal (9205). Thus, it is determined that the second pulse (9275) is to be modified as shown at FIG. 7-1-2*a*. To remove the second pulse in the 100 MHz second clock signal (9205), the hardware module 9120 performs a logical exclusive OR operation between the 100 MHz second clock signal (9205) and the pulse (9210) and generates a pulse width modified clock signal (9215).

FIG. 7-1-2*b* illustrates an example of narrowing a pulse width within a clock period in the third clock signal. In this example, the clock divider and splitter 9115 receives a 400 MHZ first clock signal (9220) from the clock synthesizer 9110 and outputs a 200 MHz second clock signal (9225) to the hardware module 9120. The hardware module 120 generates a pulse (9230), e.g., by counting the number of rising edges in the 200 MHz second clock signal (9225) and generating a pulse when the counting reaches a certain number (e.g., a determined number 2). The hardware module 9120 also divides the clock frequency of the 200 MHz second clock signal (9225) to generate a 100 MHz third clock signal (9240). The pulse shown at 9230, also referred to as a gate pulse, is used to determine which clock period in the 100 MHz third clock signal (9240) is going to be modified. In this example, there is a pulse (9230) at a location (9285) corresponding to the second pulse (9290) in the 100 MHz third clock signal (9240). The location (9285) of this pulse (9230) corresponds to the second pulse (9290) in the 100 MHz third clock signal (9240). Thus, it is determined that the second pulse (9290) is to be modified as shown at FIG. 7-1-2*b*. To narrow the second pulse in the 100 MHz third clock signal (9240), the hardware module 9120 performs a logical exclusive OR operation between the 100 MHz third clock signal (9240) and the pulse (9230) and generates a pulse width modified clock signal (9245).

To widen a clock pulse in a clock signal, after generating the pulse (9230), the hardware module 9120 may shift the pulse (9230), e.g., shift left or right the pulse (9230) by a fraction of a clock cycle such as a quarter or half cycle of the 100 MHz third clock signal (9240) and perform a logical OR operation between the shifted pulse and the 100 MHz third clock signal (9240) to generate a pulse width modified clock signal.

Figures 0, 7:
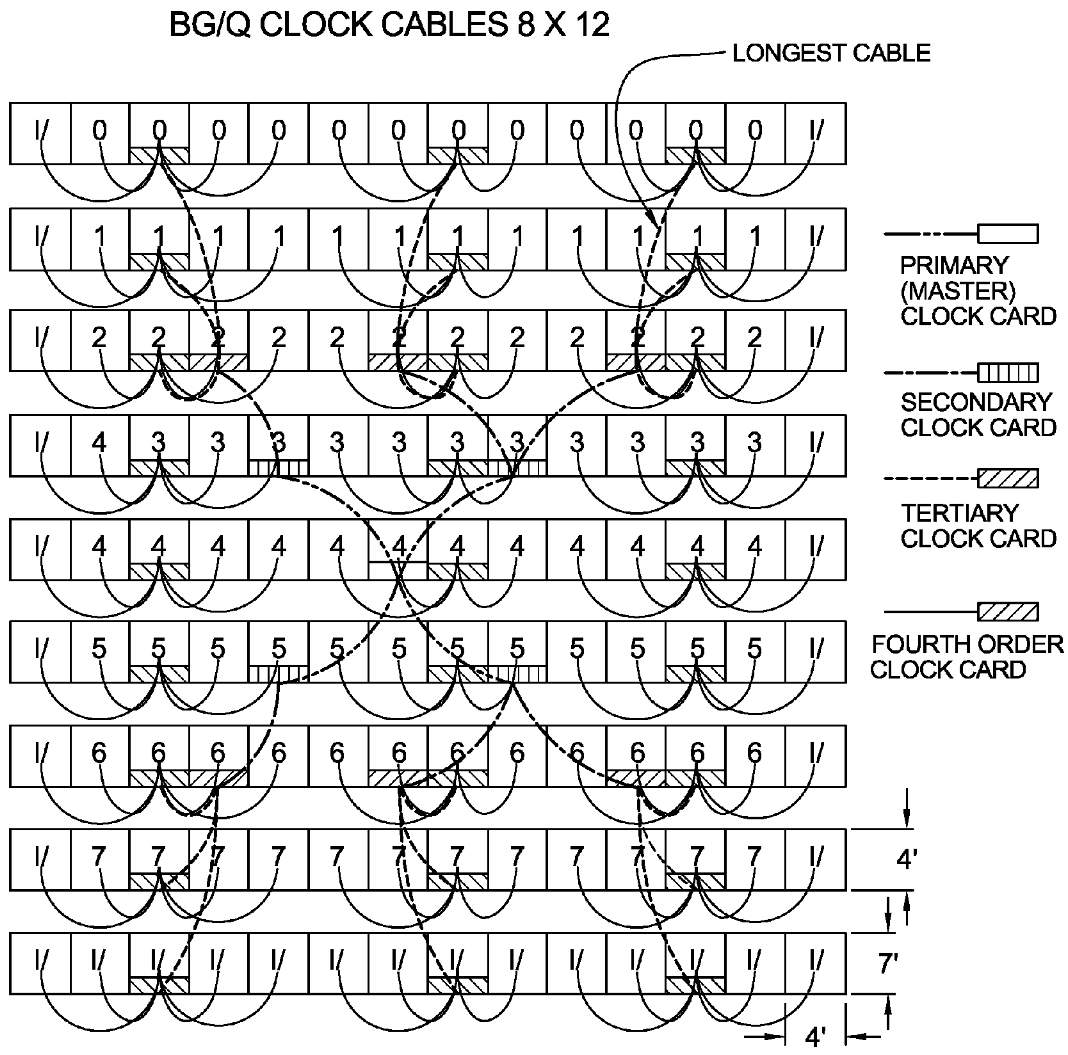
Figures 1, 7:
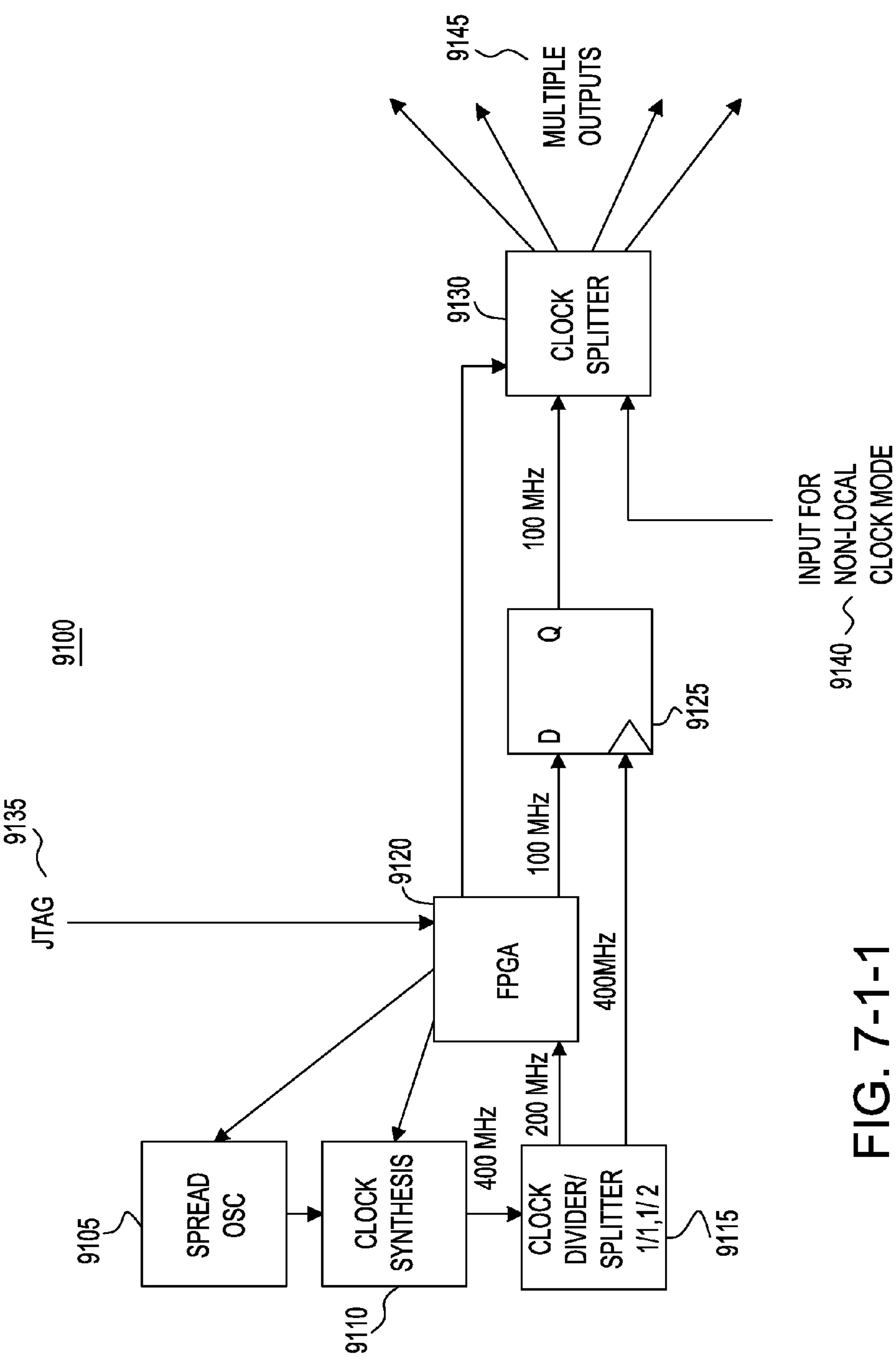
Figures 1, 2A, 7:
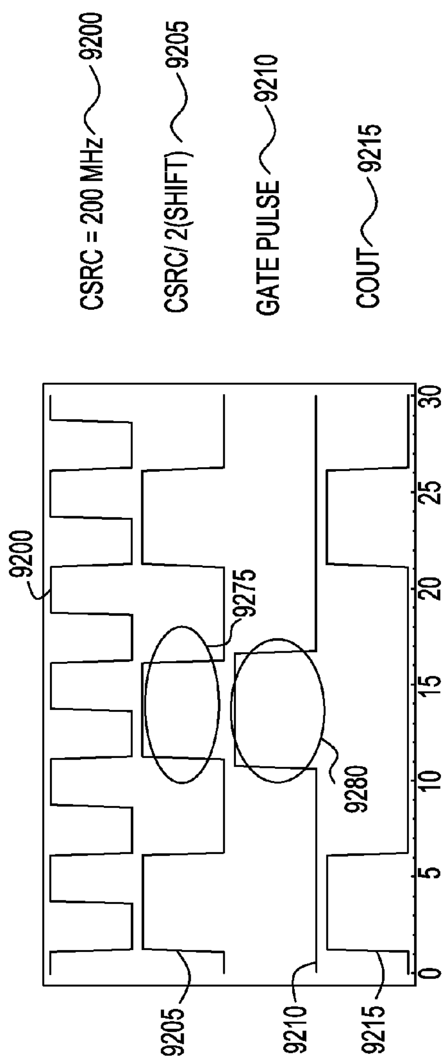
Figures 1, 2B, 7:
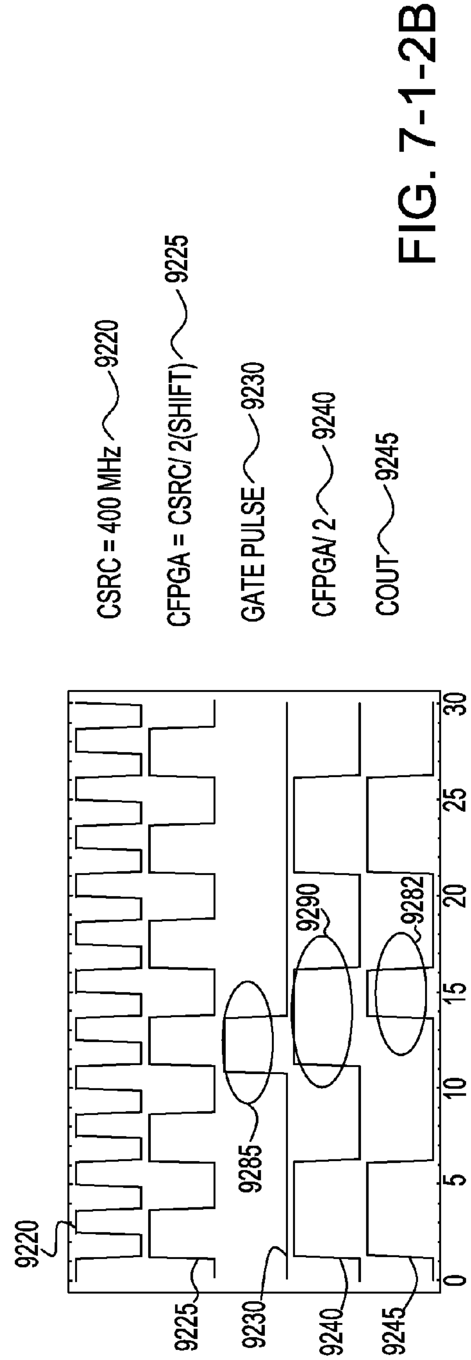
Figures 1, 2C, 7:
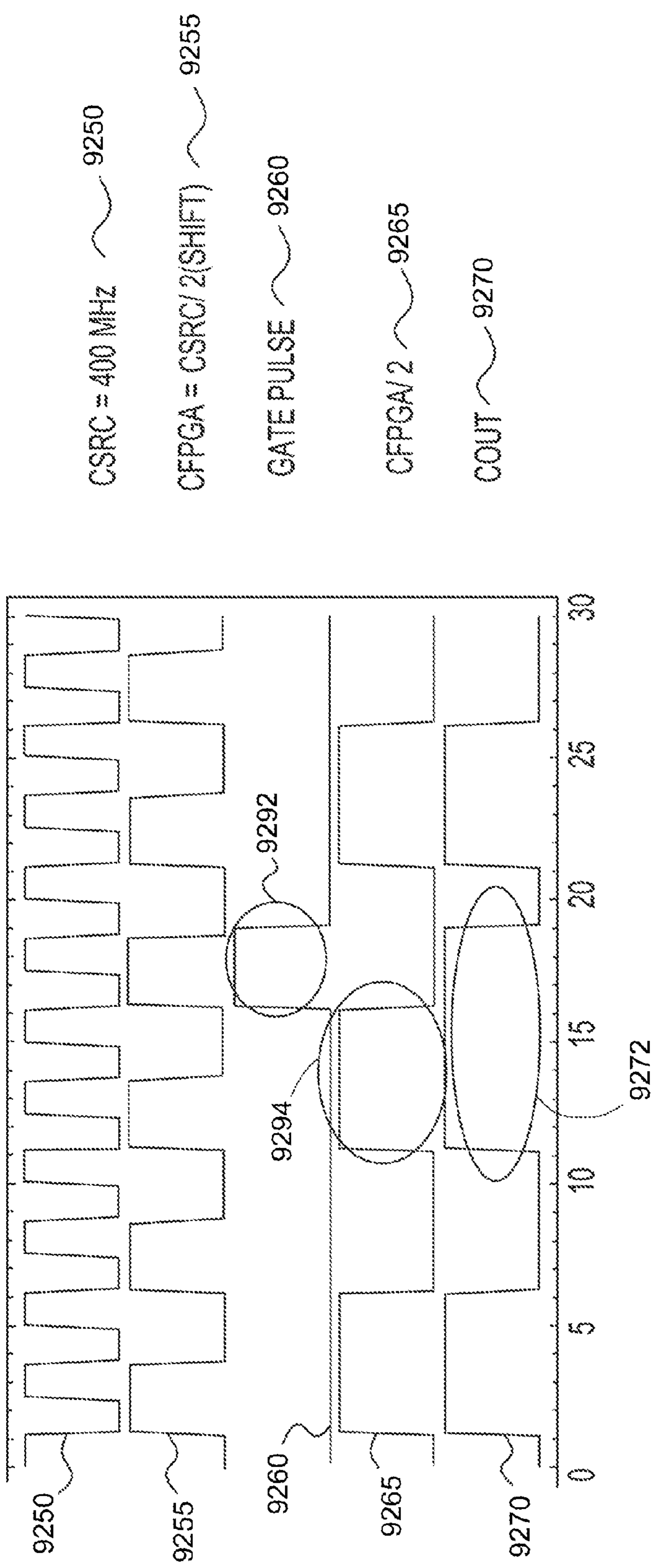
Figures 1, 3, 7:
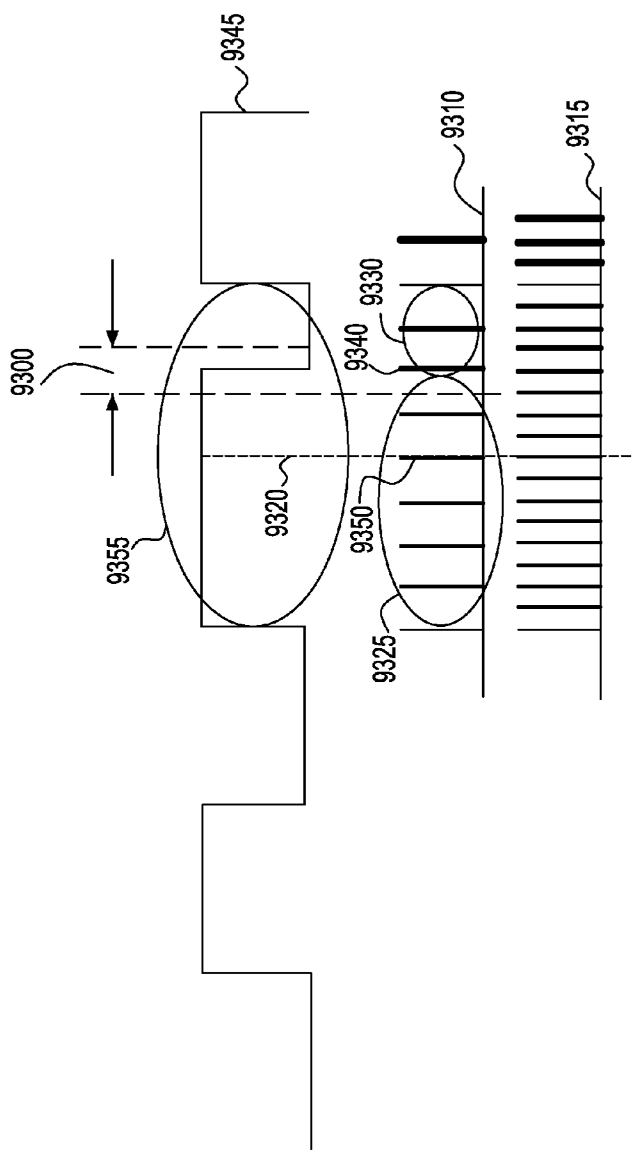
Figures 1, 4, 7:
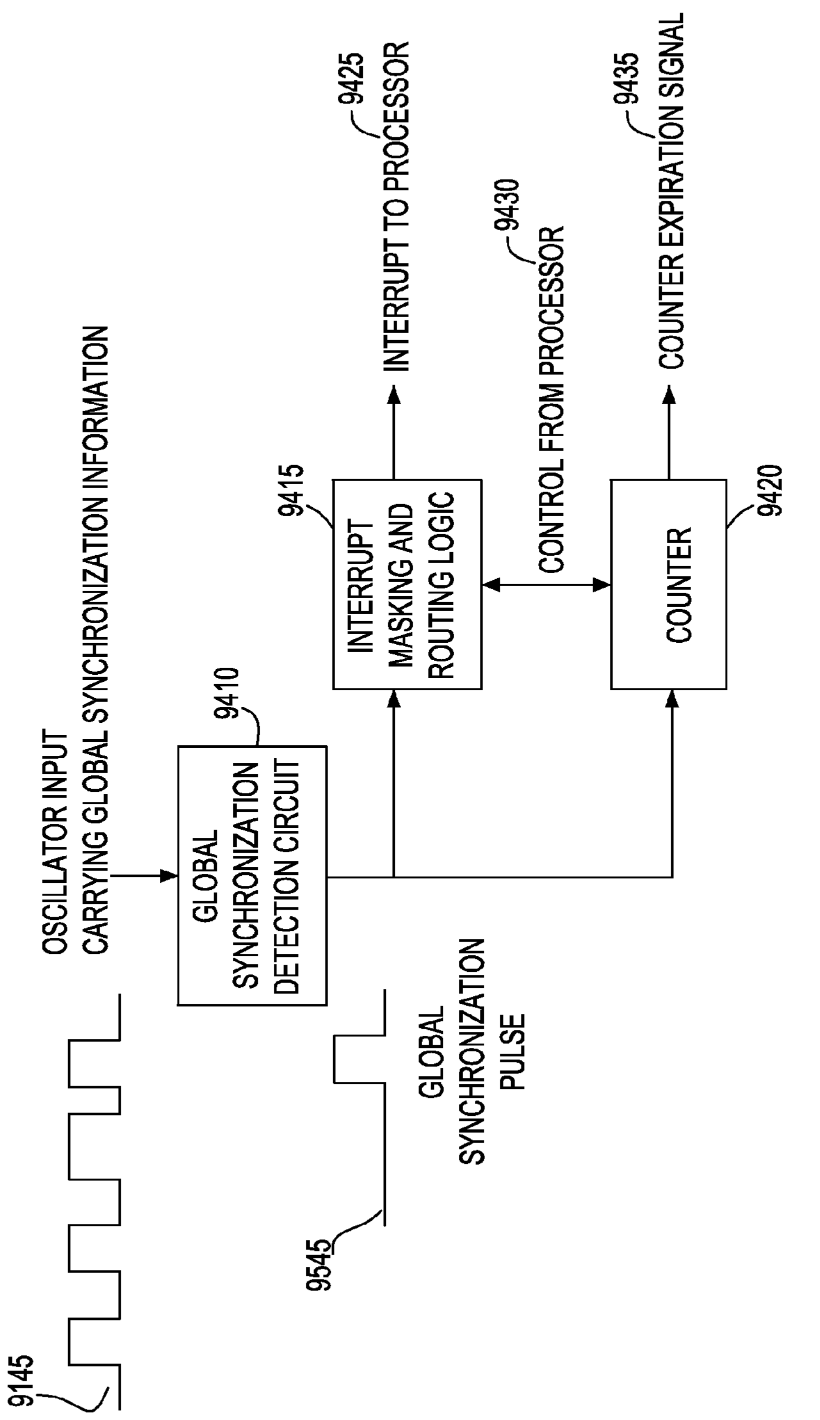
Figures 1, 5, 7:
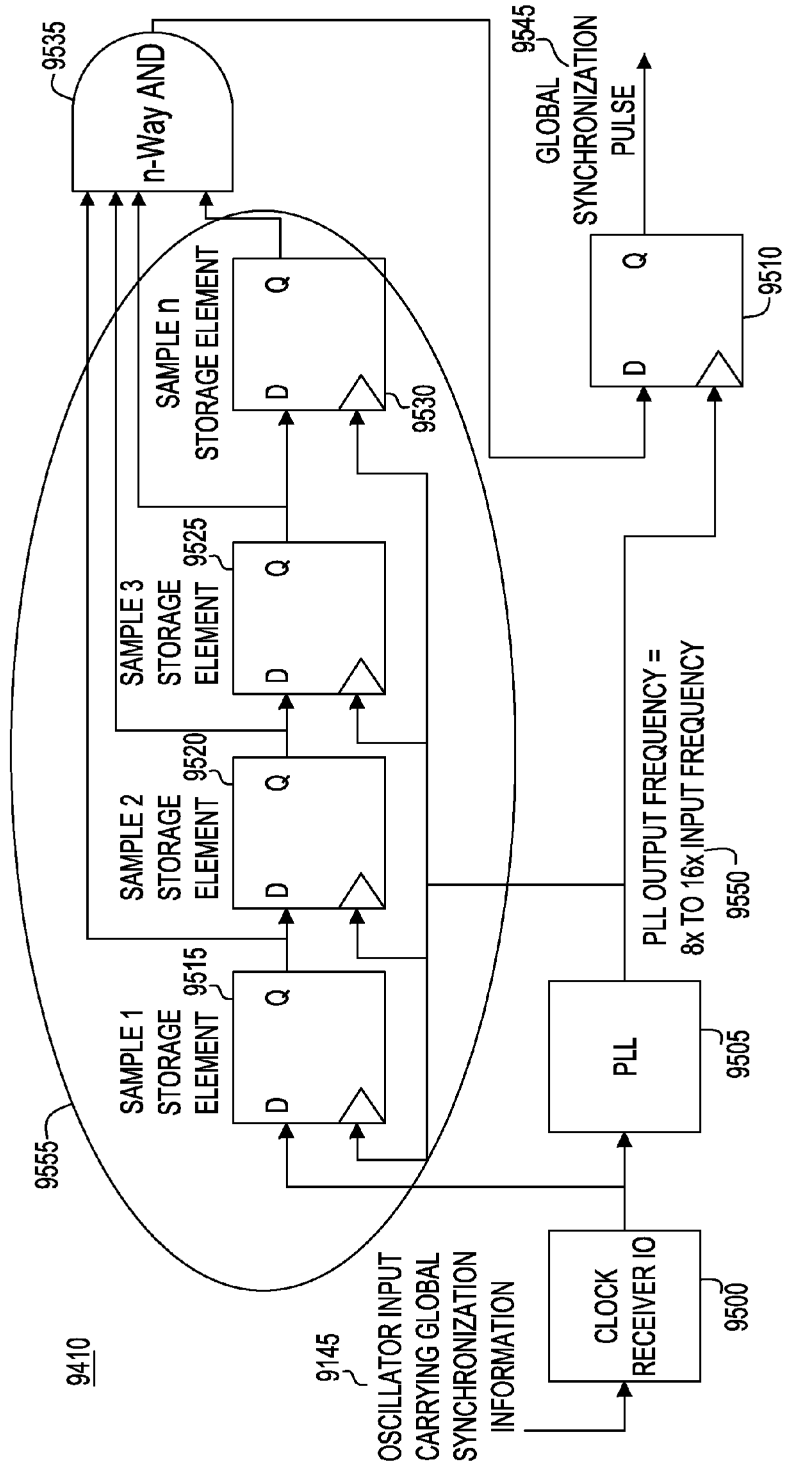
Figures 1, 6, 7:
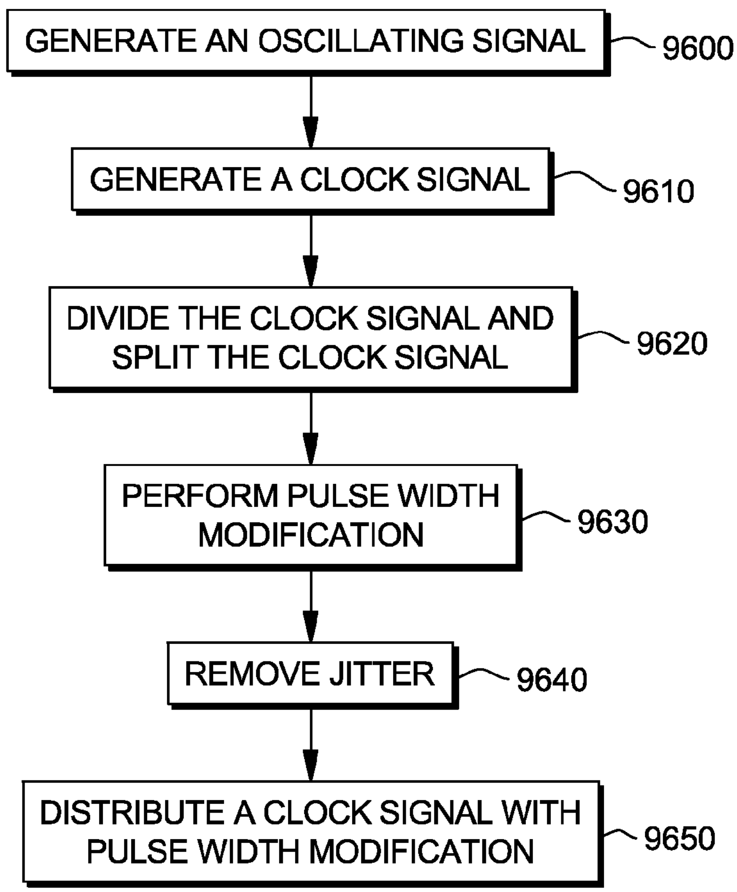
Figures 1, 2, 7:
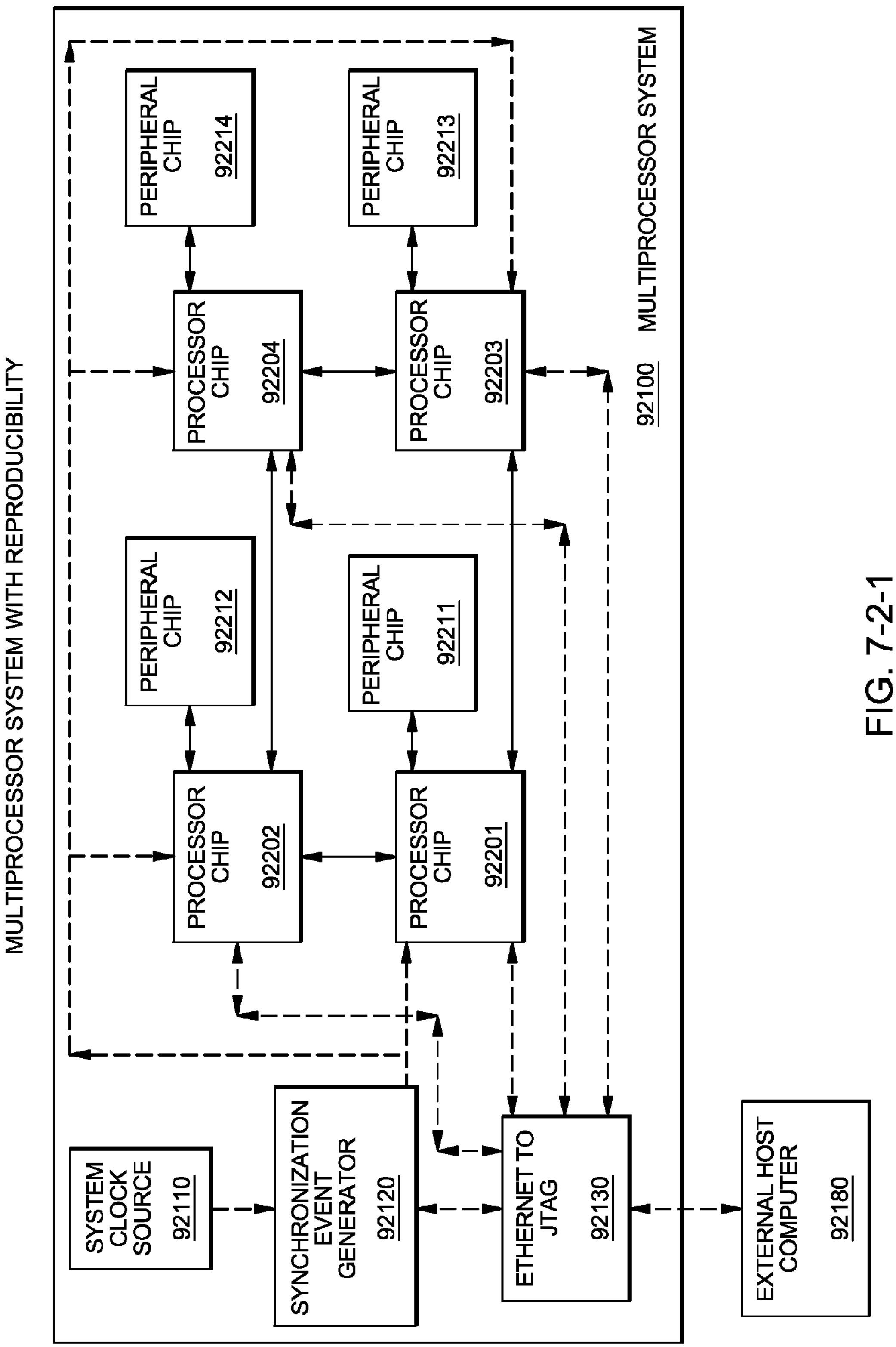
Figures 2, 7:
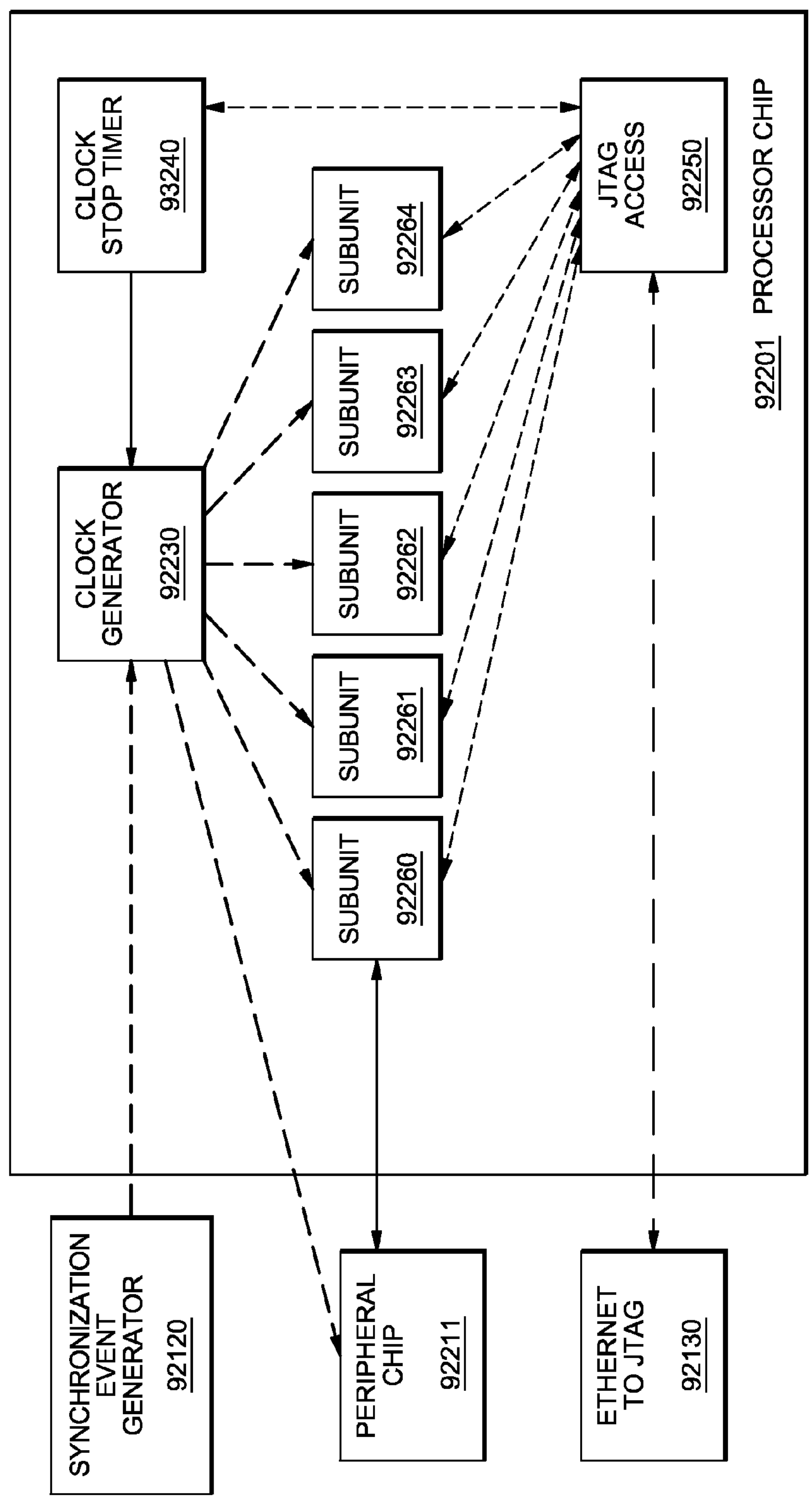
Figures 2, 3, 7:
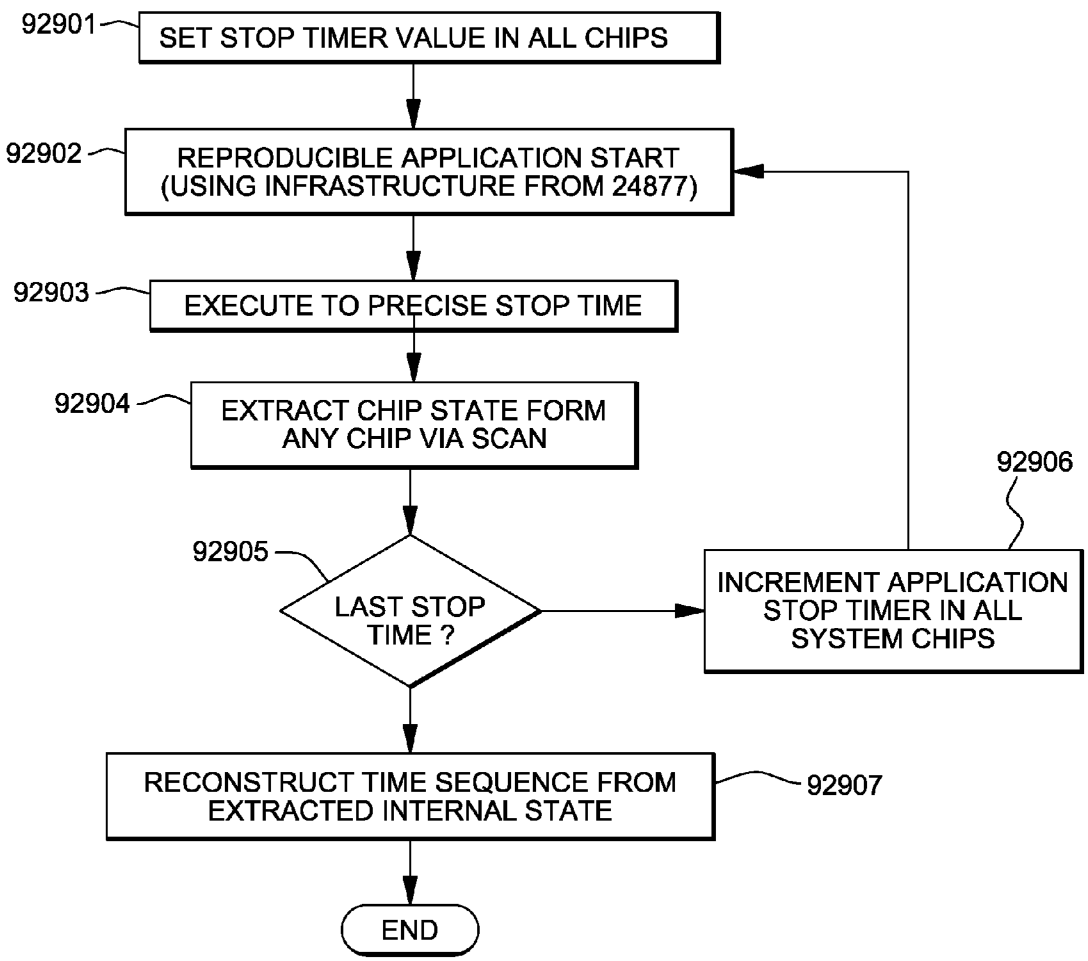
Figures 2, 4, 7:
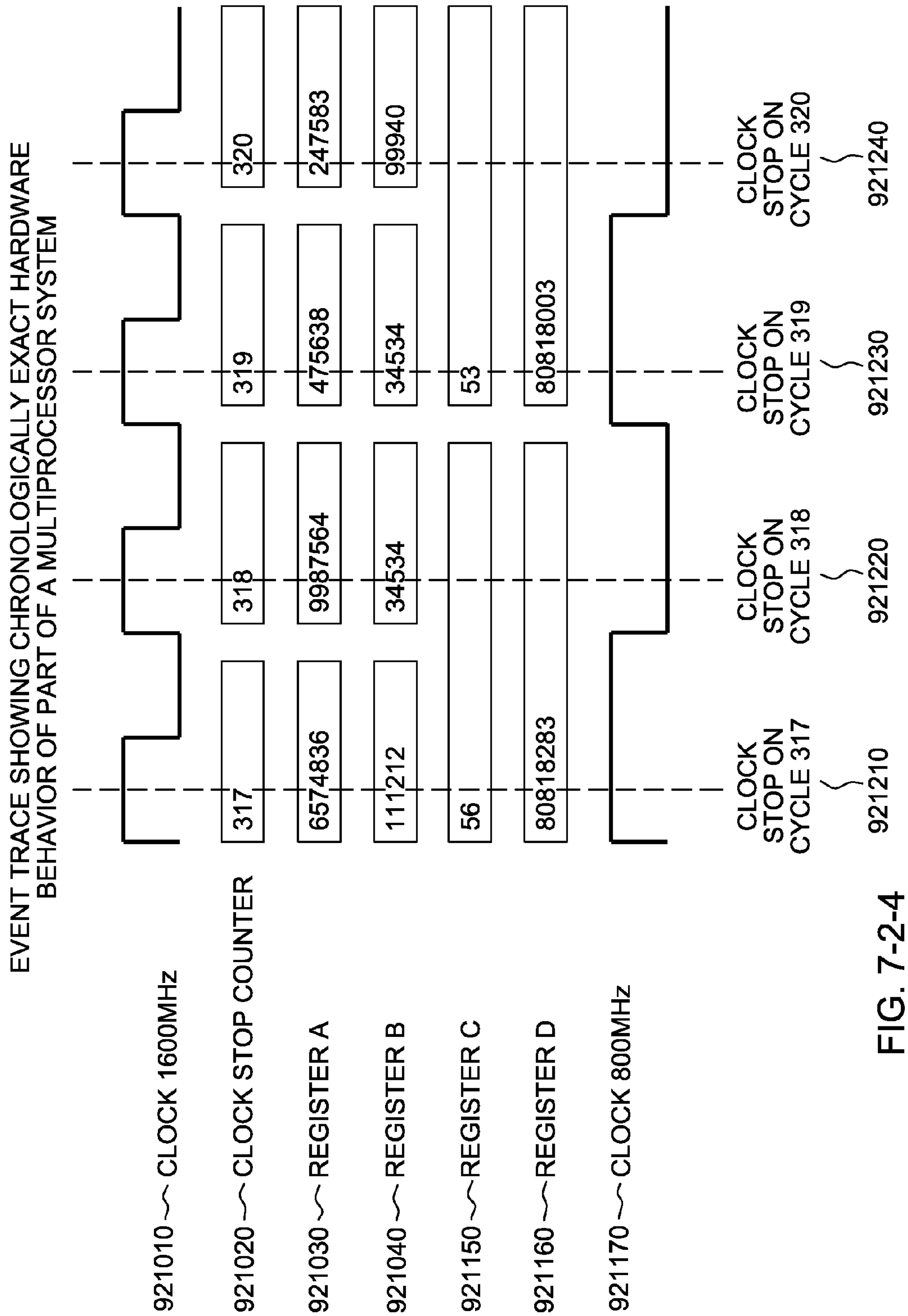
Figures 2, 5, 7:
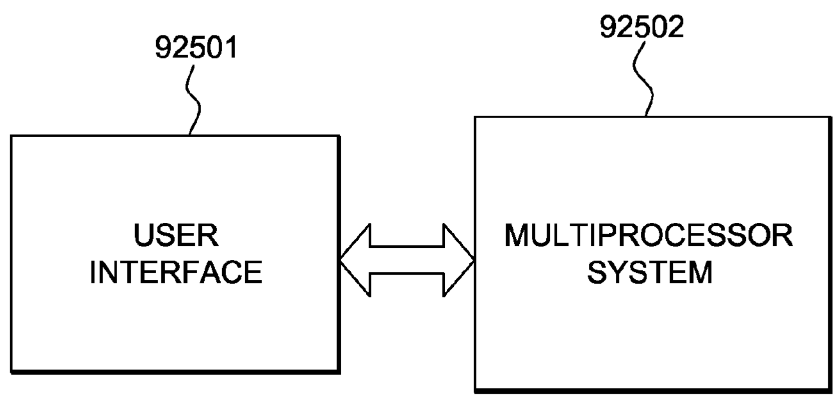
Figures 1, 3, 7:
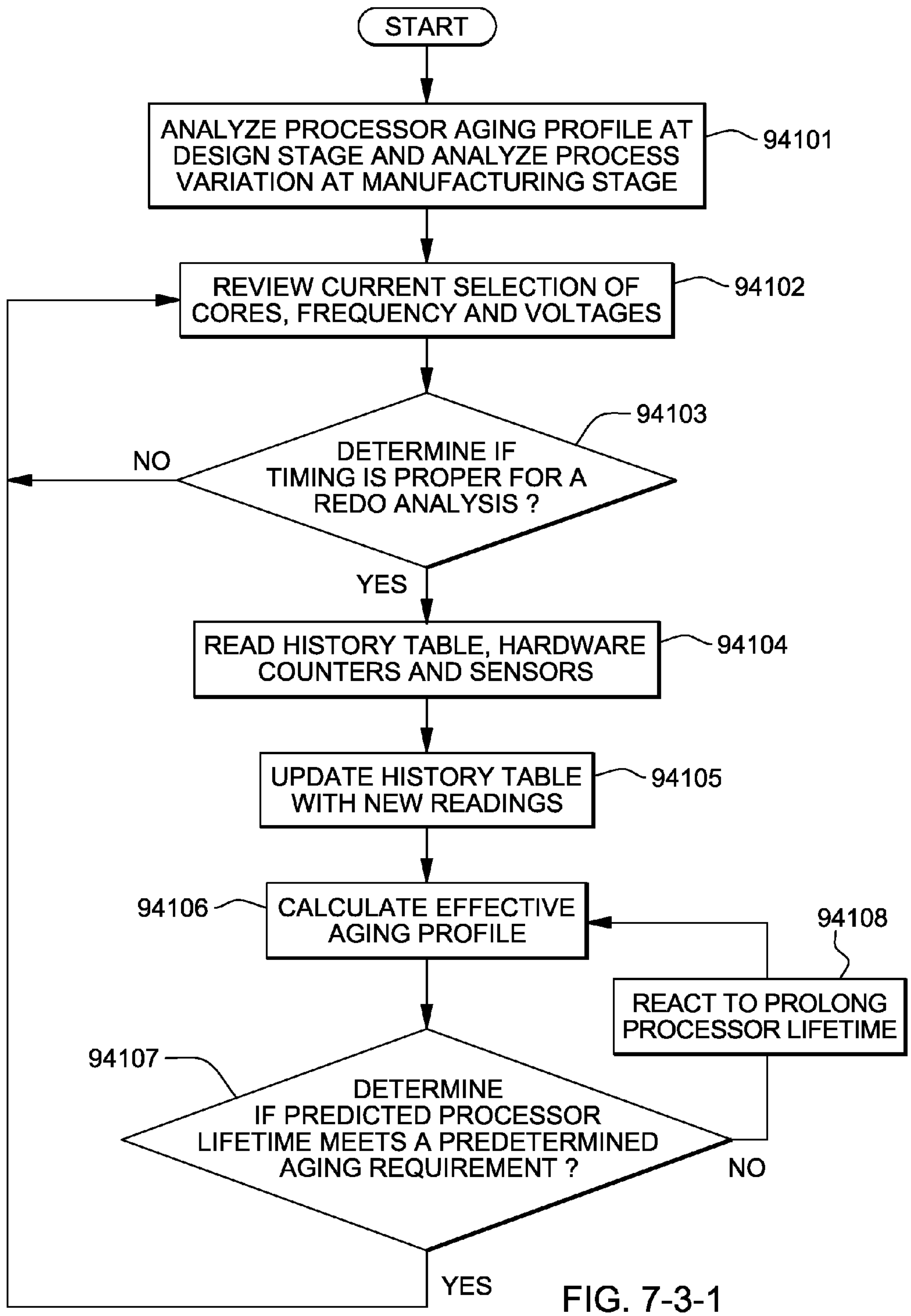
Figures 2, 3, 7:
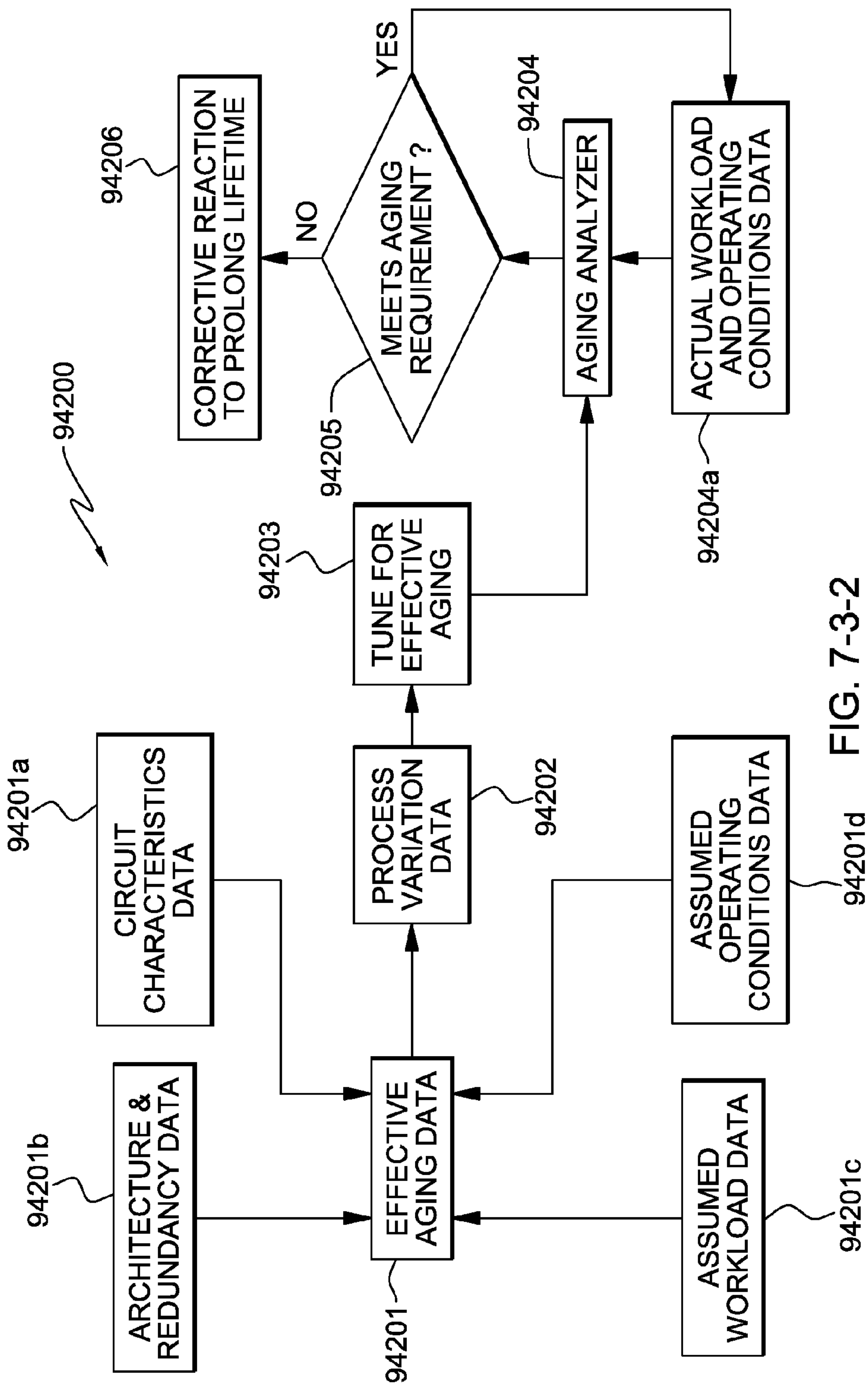
Figures 3, 7:
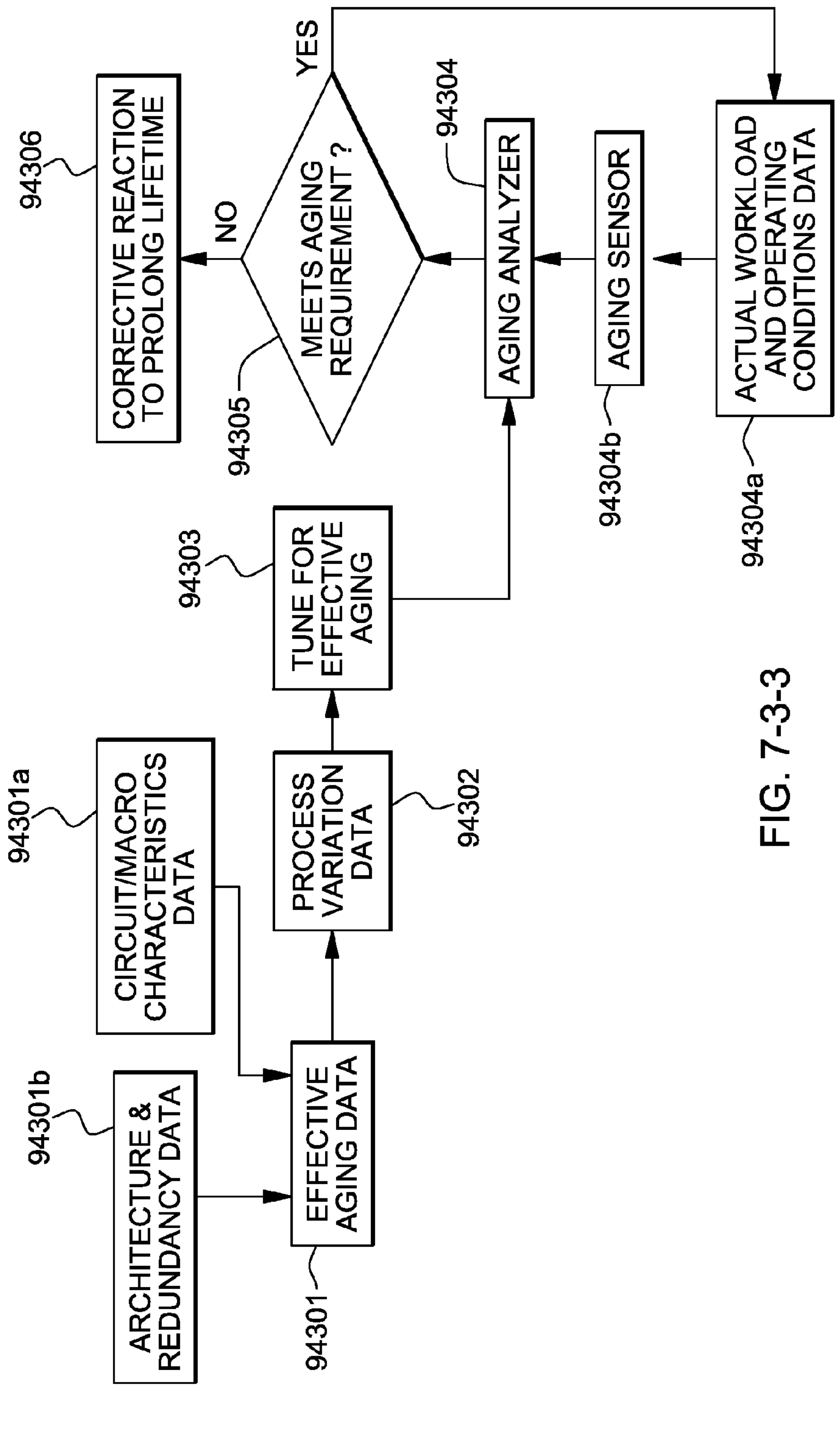
Figures 3, 4, 7:
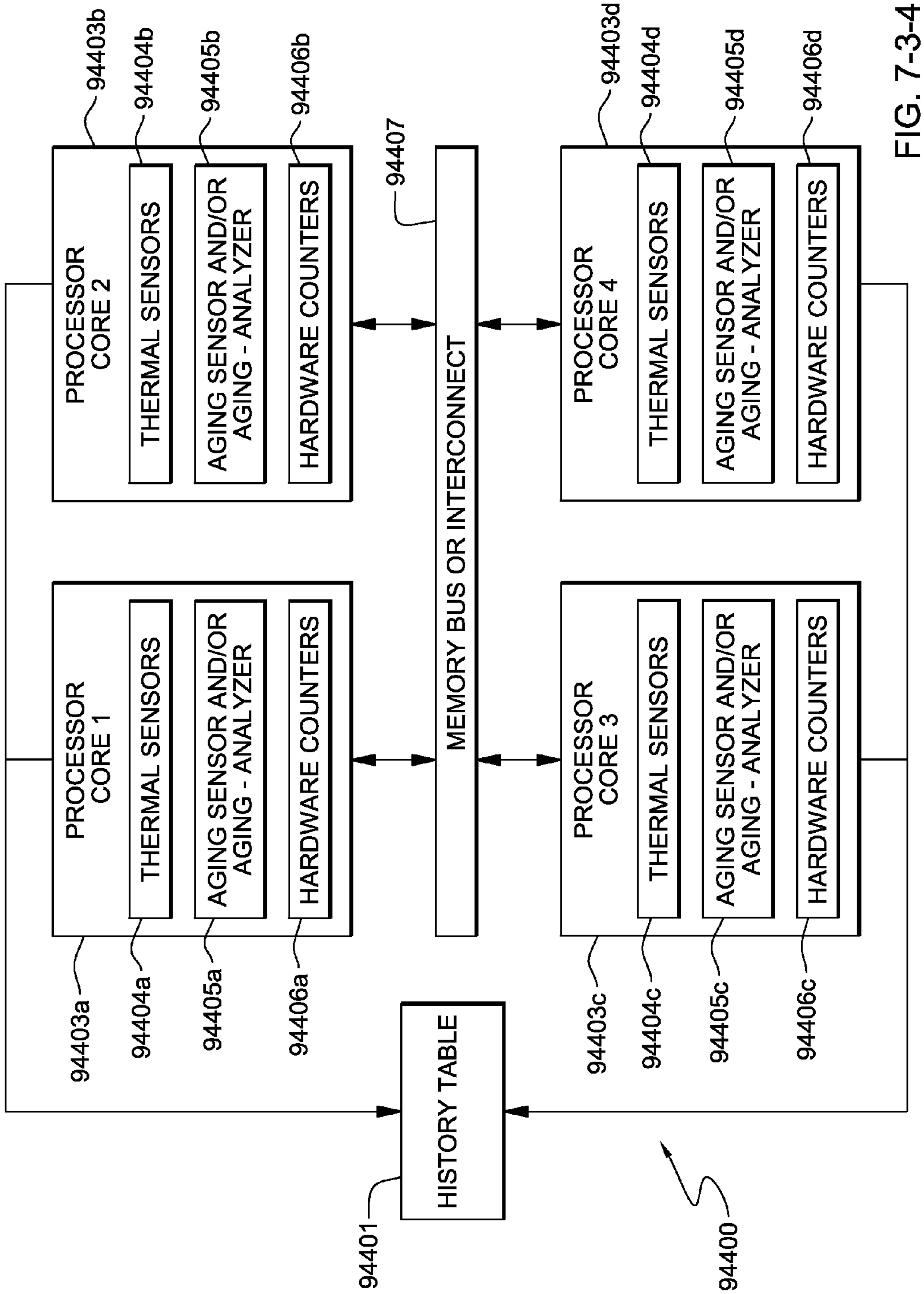
Figures 3, 6, 7:
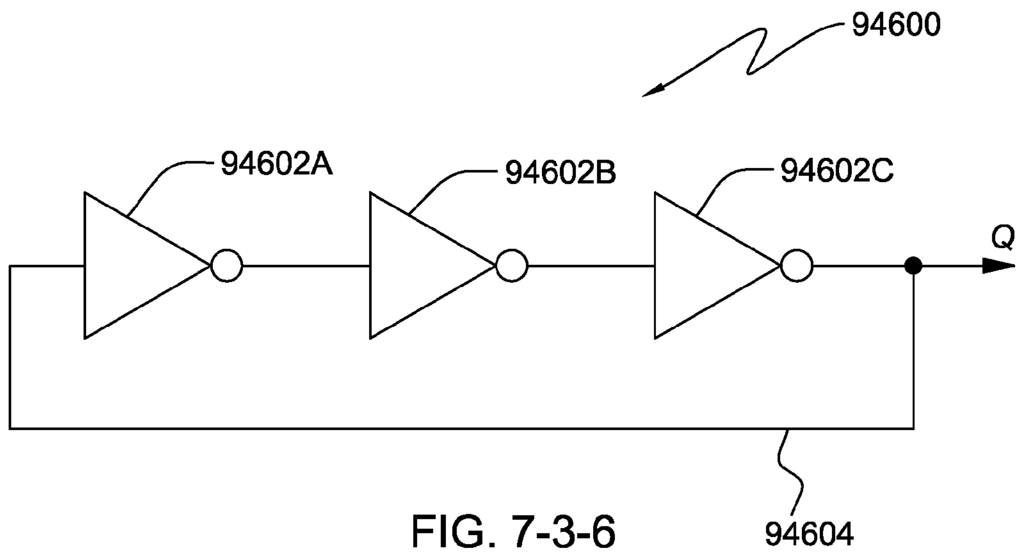
Figures 1, 4, 7:
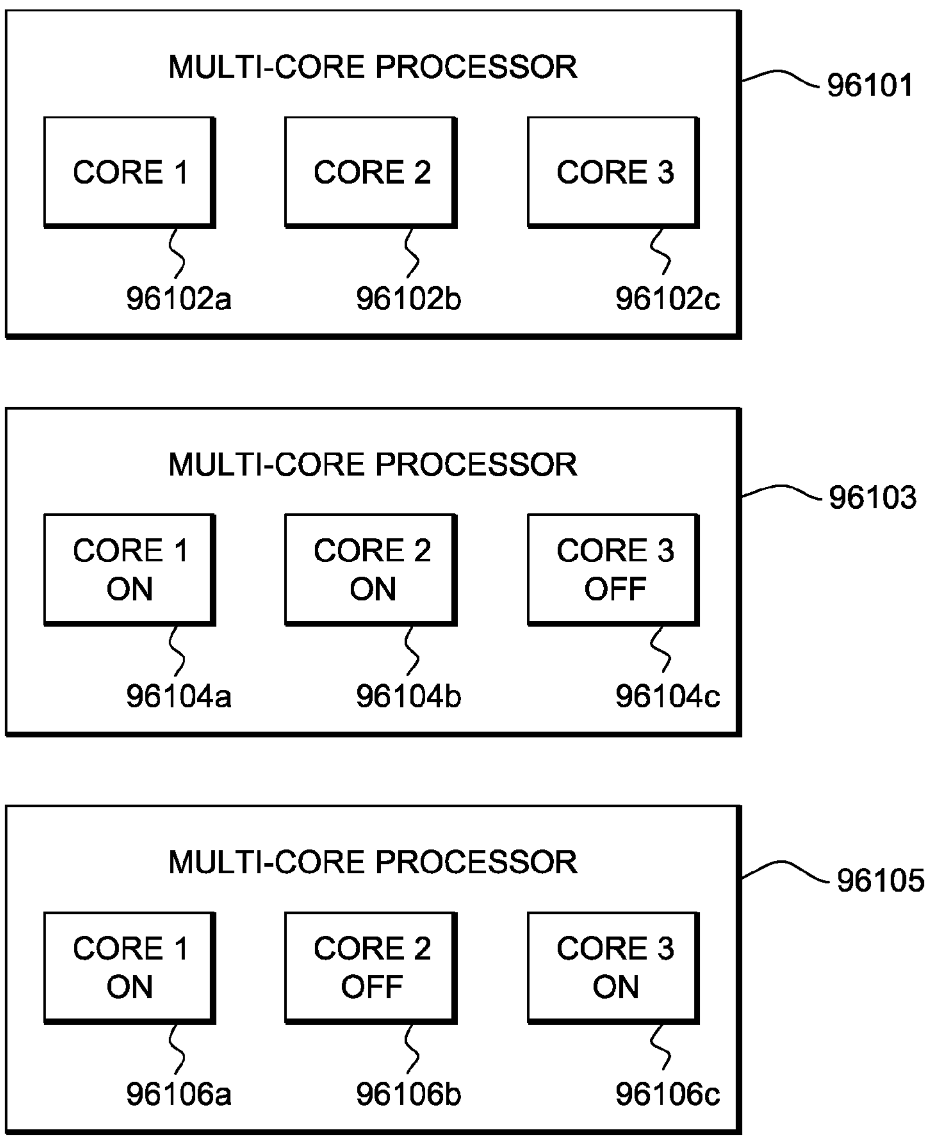
Figures 3, 4, 7:
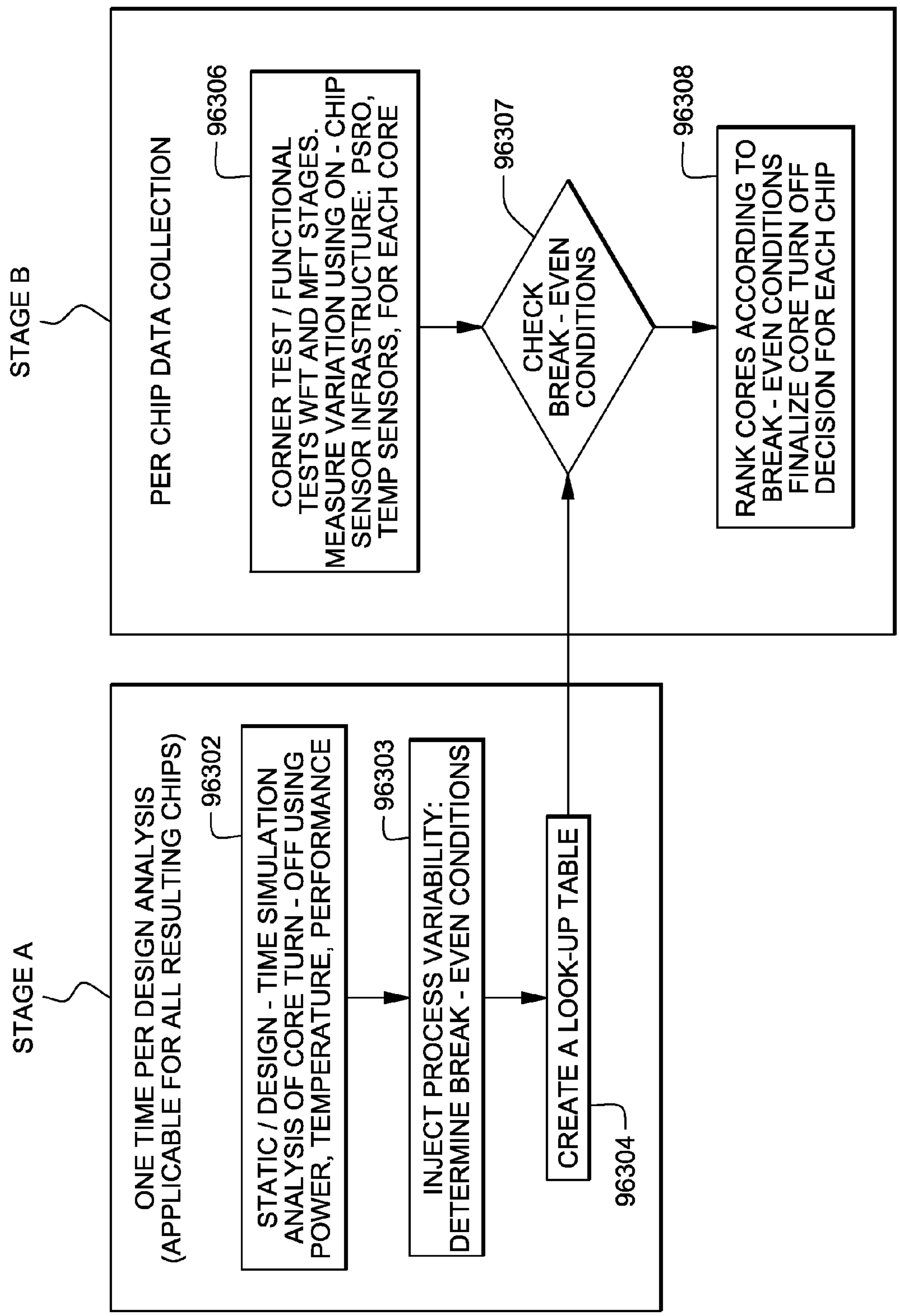
Figures 4, 5, 7:
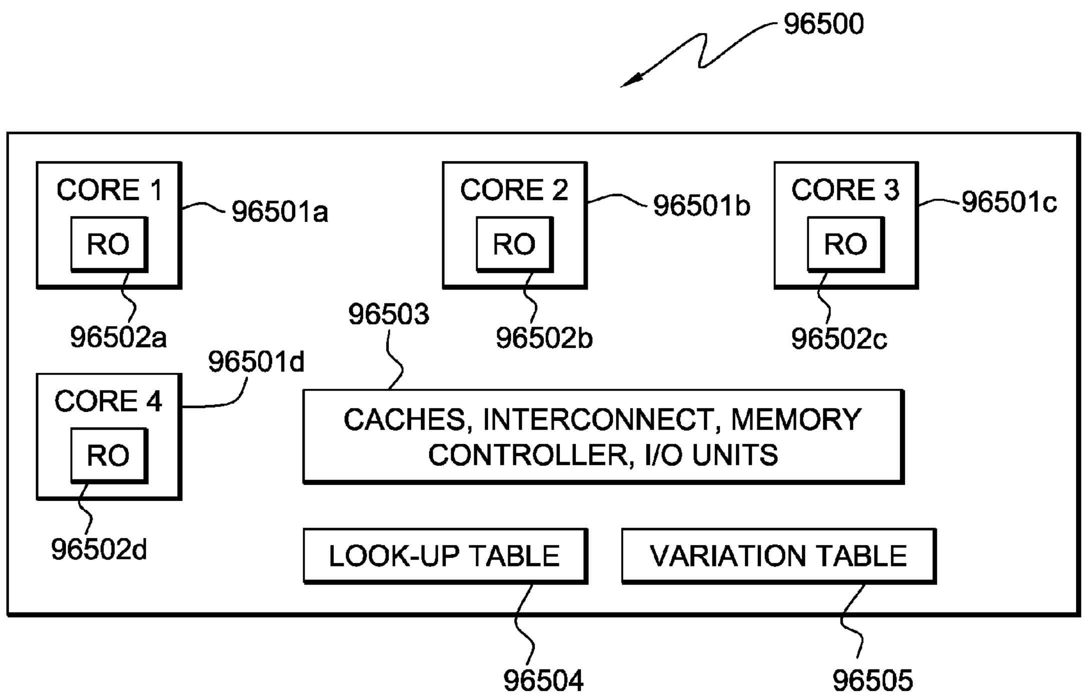
Figures 4, 6, 7:
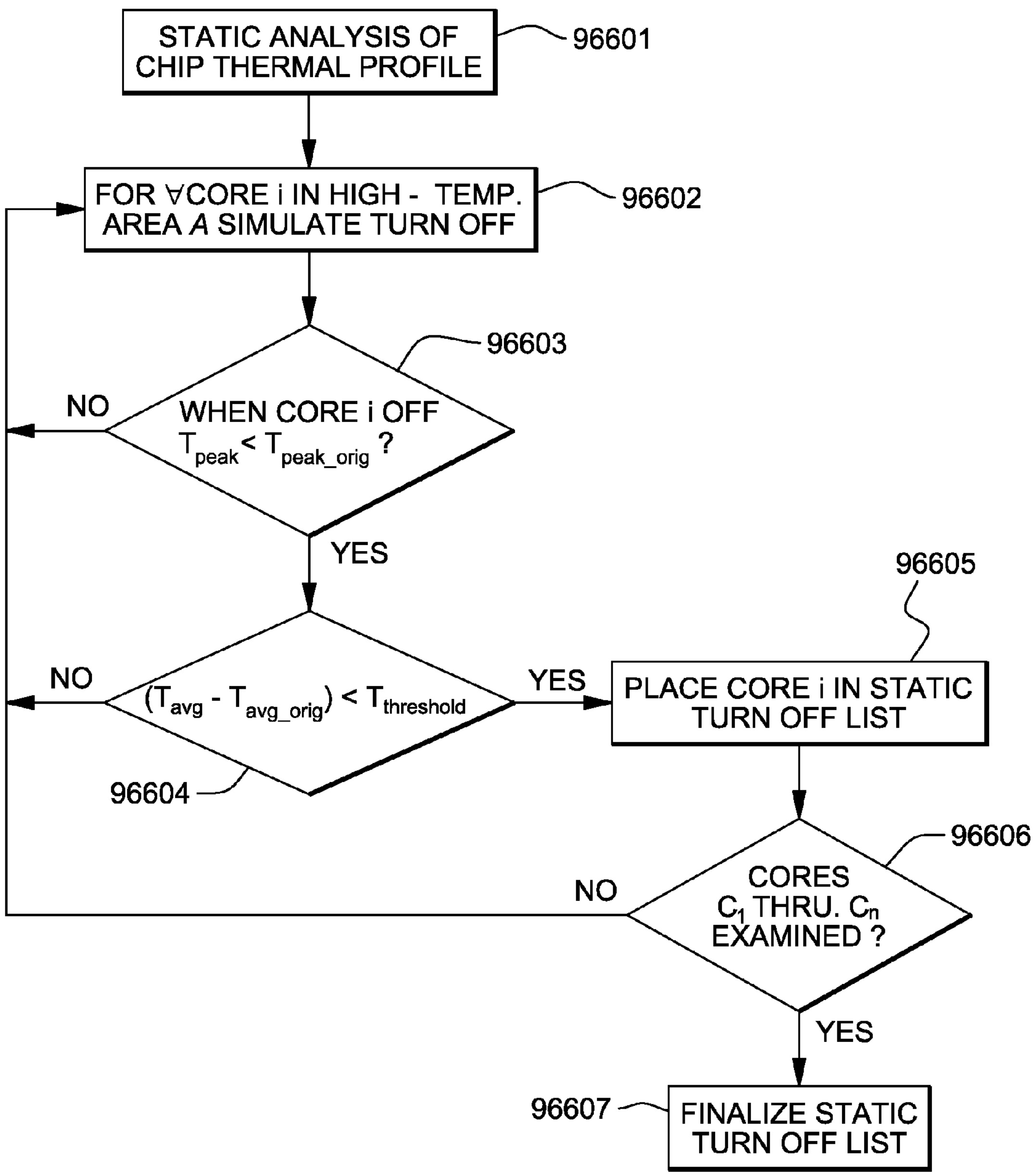
Figures 4, 7:
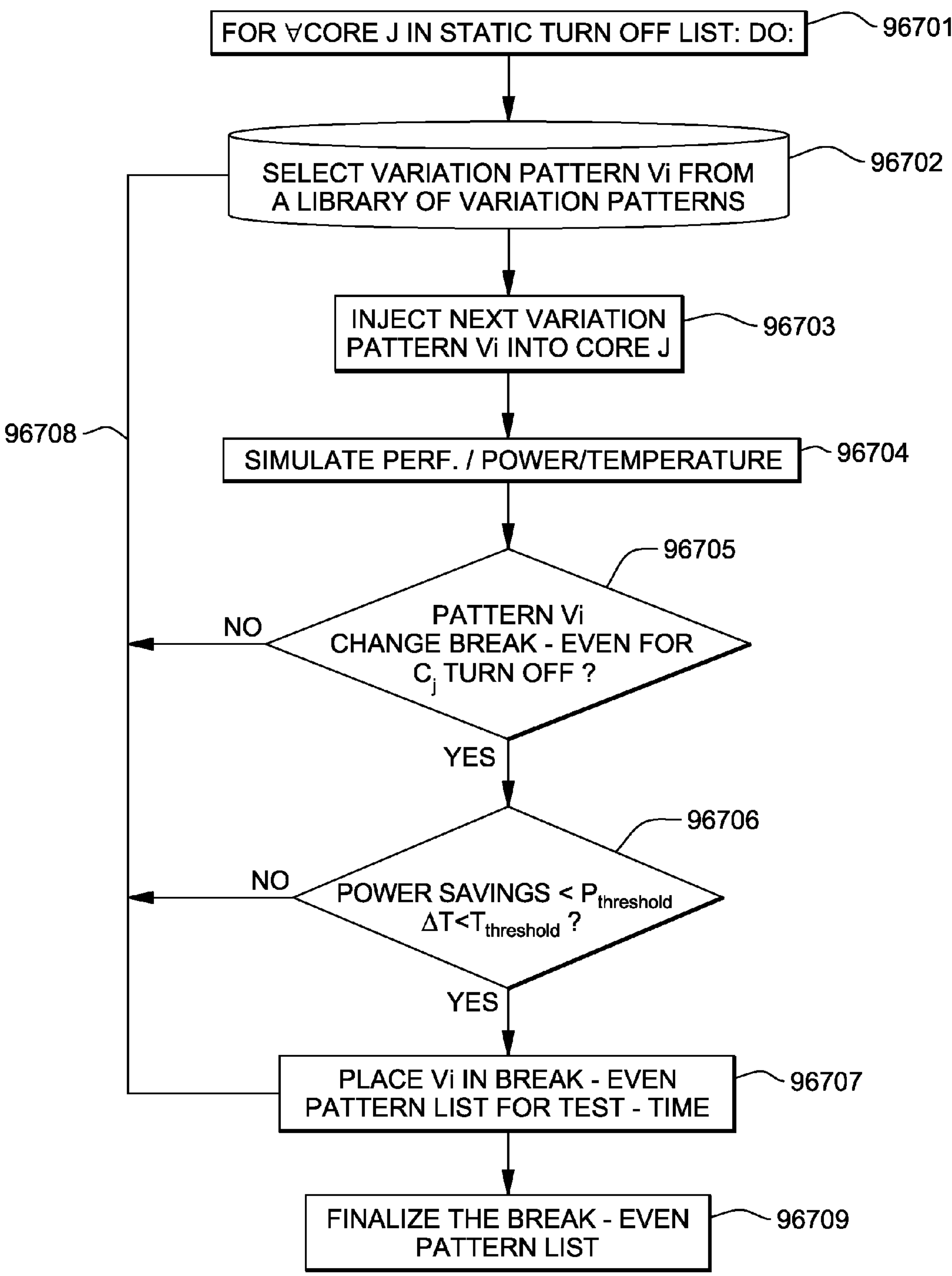

FIG. 7-1-2*c* illustrates an example of widening a pulse width within a clock period in the third clock signal. In this example, the clock divider and splitter 9115 receives a 400 MHZ first clock signal (9250) from the clock synthesizer 9110 and outputs a 200 MHz second clock signal (9255) to the hardware module 9120. The hardware module 9120 generates a pulse (9260), e.g., by counting the number of rising edges in the 200 MHz second clock signal (9255) and generating a pulse when the counting reaches a certain number (e.g., a determined number 2). The hardware module 9120 also divides the clock frequency of the 200 MHz second clock signal (9255) to generate a 100 MHz third clock signal (9265). The pulse shown at 9260, also referred to as a gate pulse, is used to determine which clock period in the 100 MHz third clock signal (9265) is going to be modified. In this example, there is a pulse (9260) at a location (9292) corresponding to the second pulse (9294) in the 100 MHz third clock signal (9265). The location (9292) of this pulse (9260) corresponds to the second pulse (9294) in the 100 MHz third clock signal (9265). Thus, it is determined that the second pulse (9294) is to be modified as shown at FIG. 7-1-2*c*. To widen the second pulse in the 100 MHz third clock signal (9265), the hardware module 9120 performs a logical OR operation between the 100 MHz third clock signal (9265) and the pulse (9260) and generates a pulse width modified clock signal (9270).

Referring again to FIG. 7-1-6, at step 640, a flip flop (e.g., a D flip flop 9125 in FIG. 7-1-1) receives a pulse width modified clock signal (e.g., a signal 9215 or signal 9245 in FIGS. 7-1-2*a*-7-1-2*b*) and filters the pulse width modified clock signal, e.g., by removing jitters in the pulse width modified clock signal. At step 9650, a clock splitter (e.g., a clock splitter 9130 in FIG. 7-1-1) receives the filtered clock signal from the flip flop 9125, an optional external clock signal from other sources 9140, and a selection signal for selecting the filtered clock signal or the external clock signal from the hardware module 9120. Then, the clock splitter outputs a selected signal (i.e., the filtered clock signal or the external clock signal) to a plurality of processors in a parallel computing system. The output signals 9145 from the clock splitter may have a same clock frequency, same phase and/or a same pulse width modification (i.e., having a same modification on a same pulse). It is noted that the external clock signal from another source 9140 need not be present. In that case, there is no need for a select to the clock splitter 9130. In one embodiment, the output signal 9145 (e.g., a pulse width modified clock signal) may reset the parallel computing system and/or a plurality of processors in the system as described below.

There may be diverse methods to modify clock pulse width. In one embodiment, a clock generation circuit (e.g., the circuit 9100 shown in FIG. 7-1-1) may receive a clock signal, e.g., a from a clock synthesizer 9110, and generate a pulse width modified clock signal, e.g., by using a counter device and a logic gate. By manipulating the value of the counter device, the clock generation circuit may generate the pulse width modified clock signal, e.g., every quarter clock cycle. In one embodiment, the hardware module 9120 divides a clock frequency of a clock signal (e.g., 400 MHz clock signal), e.g., by using a counter device for counting clock edges of the clock signal, extends or reduces a clock pulse width within a clock period of the frequency-divided clock signal (e.g., 100 MHz clock signal) and thus changes the clock period from 50% duty cycle to 75% duty cycle or 50% duty cycle to 25% duty cycle. In one embodiment, a clock period of a clock signal can have a pulse width modification which modifies a quarter clock period of the clock signal. Modifications by different clock periods and/or different clock duty cycles are possible and the present invention does not limit the modification to a specific amount.

For example, if the hardware module 9120 includes a decrementing counter device and an logical OR gate, by decrementing a value of the counter device from 3 to 0 every falling edge of the first clock signal 9250 (e.g., 400 MHz clock signal), the hardware module 9120 generates a second clock signal 9255 (e.g., 200 MHz clock signal) and a third clock signal 9265 (e.g., 100 MHz clock signal) as shown in FIG. 7-1-2*c*. The hardware module 120 generates the second clock signal 9255 whose clock frequency is 1/N of a clock frequency of the first clock signal 9250 where "N" is a positive integer number, e.g., by maintaining a high ("1") value when the value of the counter device is three and maintaining a low ("0") value when the value of the counter device is two, and so on. The hardware module 9120 generates a third clock signal 9265 whose clock frequency is 1/M of a clock frequency of the first clock signal 9250 where "M" is a positive integer number e.g., by maintaining a high ("1") value when the value of the counter device is three or two and maintaining a low ("0") value when the value of the counter device is one or zero. The hardware module 9120 generates a gate pulse 9260, for example, when the value of the counter device is 1, i.e., at the location 9292. Similarly, if the hardware module 9120 includes an incrementing counter device and a logical OR gate, by incrementing a value of the counter device from 0 to 3 every rising edge of the first clock signal 9250, the hardware module 9120 generates a second clock signal 9255 and a third clock signal 9265. By performing a logical OR operation between the second clock signal 9255 and the third clock signal 9265, the hardware module 9120 generates a pulse width modified clock pulse 9272 which widens a clock pulse width of a third clock signal 9265.

Referring to FIG. 7-1-2*b*, if the hardware module 9120 includes a decrementing counter device and a logical exclusive OR gate, the value of the counter device is decremented from 3 to 0 every falling edge of the first clock signal 9220, and the hardware module 9120 generates a second clock signal 9225 and a third clock signal 9240 based on the decremented value. For example, the hardware module 9120 generates the second signal 9255 whose clock frequency is 1/N of a clock frequency of the first clock signal 9220 where "N" is a positive integer number, e.g., by maintaining a high ("1") value when the value of the counter device is three and maintaining a low ("0") value when the value of the counter device is two, and so on. The hardware module 9120 generates a third clock signal 9240 whose clock frequency is 1/M of a clock frequency of the first clock signal 9220 where "M" is a positive integer number, e.g., by maintaining a high ("1") value when the value of the counter device is three or two and maintaining a low ("0") value when the value of the counter device is one or zero. The hardware module 9120 generates a gate pulse 9230, for example, when the value of the counter device is three, i.e., at the location 9285. Similarly, if the hardware module 9120 includes an incrementing counter device and a logical exclusive OR gate, the value of the counter device increments from 0 to 3 every rising edge of the first clock signal 9220, and the hardware module 9120 generates a second clock signal 9225 and a third clock signal 9240 based on the incremented value of the counter device. By performing a logical exclusive OR operation between the second clock signal 9225 and the third clock signal 9240 based on the incremented value of the counter device, the hardware module 9120 generates a pulse width modified clock pulse 282 which narrows a clock pulse width of a third clock signal 9240.

A choice of which edge to preserve (i.e., rising edge sensitive or falling edge sensitive) is independent of a choice of narrowing, removing or widening a clock pulse within a clock period in a clock signal.

FIG. 7-1-4 illustrates a system diagram for detecting a pulse width modified clock signal 9145 (e.g., a signal 9215 or signal 9245 in FIGS. 7-1-2*a*-7-1-2*b*) and generating a global synchronization pulse signal 9545 in one embodiment. A detection circuit 9410 detects the pulse width modified clock signal 9145 and generates the global synchronization pulse signal 9545. FIG. 7-1-5 illustrates a system diagram of the detection circuit 9410 in one embodiment. The circuit 9410 may include, but is not limited to an input buffer 9500, a PLL (Phase Locked Loop) or DLL (Delay Locked Loop) 9505, a series of latches 9555 comprising a plurality of flip flops (e.g., flip flops 9515, 9520, 9525, and 9530), a logical AND gate 9535 receiving a plurality of inputs (i.e., an output of the latches 9555) and a flip flop 9510 (e.g., D flip flop).

Upon receiving the pulse width modified clock signal 9145, the input buffer 9500 (e.g., a plurality of inverters) strengthens the pulse width modified clock signal, e.g., by increasing magnitude of the pulse width modified clock signal 9145. The input buffer 9500 provides the strengthened clock signal to the PLL or DLL or the like 9505 and to the latches 955. The PLL or DLL 9505 filters the strengthened clock signal and increases a clock frequency of the filtered clock signal (e.g., generates a clock signal which is 8 times or 16 times faster than the pulse width modified clock signal 9145). The PLL and/or DLL and/or the latches 9555 may be used for oversampling according to any other sampling rate. The PLL or DLL or the like 9505 provides the filter clock signal having the increased clock frequency to the latches 9555 and the flip flop 9510 for their clocking signals. The latches 9555 also receive the strengthened clock signal from the input buffer 9500, detect a clock pulse having a modification in the strengthened clock signal, and generate a global synchronization signal as shown in FIG. 7-1-3. The PLL or DLL or the like 9505 can be a rising edge sensitive or falling edge sensitive.

FIG. 7-1-3 illustrates an example for detecting a modified clock pulse in a pulse width modified clock signal and generating a global synchronization signal in one embodiment. Upon receiving a pulse width modified clock signal 9345, a user determines jitter of the signal 9345, e.g., by running the PLL or DLL 9505. For example, the user may determine that there is jitter 9300 in the signal 9145 after running PLL or DLL 9505. Crandford, Jr., et al., "Method and apparatus for determining jitter and pulse width from clock signal comparisons," U.S. Pat. No. 7,286,947, wholly incorporated by reference as if set forth herein, describes a method for determining jitter in a clock signal. Upon determining jitter in the signal 345, a user determines a sampling rate for the signal 9345. For example, if there is less than 7% jitter in the signal 9345 and a clock frequency of the signal 9345 is 100 MHz, the sampling rate may be 800 MHz or 1600 MHz to distinguish a clock pulse affected by the jitter and a clock pulse modified by the hardware module 9120. This sampling performed at a higher frequency than the signal 9345 is referred to herein as oversampling.

The latches 9555 perform this oversampling along with an oversampling frequency obtained from the PLL or DLL or the like 9505. The latches 9555 increase a sampling rate, e.g., by increasing the number of flip flops in it. The latches 9555 decrease a sampling rate, e.g., by decreasing the number of flip flops in it. For example, as shown in FIG. 7-1-3, if latches 9555 sample the signal 9345 at 8 times faster frequency than the signal 9345, there are 8 samples per a clock period. If there is no modified clock pulse within a clock period in the signal 9345, there may be an equal number of samples with the signal 9345 at a high level ("1") and at a low level ("0"). A sequence 9310 of samples shows samples sampled at an 8 times faster frequency than the signal 9345. A sequence 9315 of samples shows samples sampled at a 16 times faster frequency than the signal 9345. If a clock period 9355 in the signal 9345 does not have a modified clock pulse, the clock period 9355 might have a falling clock edge at a timing 9320 and might have same number of samples of the signal 9345 at high and low. However, since the clock period 9355 had a modified clock pulse, there are five samples of the clock period 9355 at high and there are three samples of the clock period 9355 at low. In one embodiment, the latches 9555 and the AND gate 9535 generates a global synchronization signal (e.g., a global synchronization signal 9545 in FIG. 7-1-4) whose pulse width is the same as modified pulse width. For example, in FIG. 7-1-3, the global synchronization signal may have a pulse whose width is the difference between a sample 9350 and a sample 9340. In another embodiment, the latches 9555 and the AND gate 9535 generate a global synchronization signal whose pulse width is larger or smaller than the modified pulse width. The number of inputs to the AND gate 9535 may determine the number of samples to be positive to trigger the global synchronization signal 9545.

In one embodiment, the detection circuit 9410 detects a widened clock pulse, e.g., as the latches 9555 receive "1"s which are extended to, for example, an extra quarter clock cycle. In other words, if the latches 9555 receive more "1"s than "0"s within a clock period, the detection circuit 9410 detects a widened clock pulse. In one embodiment, the detection circuit 9410 detects a narrowed clock pulse, e.g., as the latches 9555 receive "0"s which are extended to, for example, an extra quarter clock cycle. In other words, if the latches 9555 receive more "0"s than "1"s within a clock period, the detection circuit 9410 detects a narrowed clock pulse.

In one embodiment, a parallel computing system is implemented in a semiconductor chip (not shown) that includes a plurality of processors. There is at least one clock generation circuit 9100 and at least one detection circuit 9410 in the chip. These processors detect a pulse width modified clock signal, e.g., via the detection circuit 9410.

Returning to FIG. 7-1-5, the latches 9555 and the AND gate 9535 provide the generated global synchronization signal to the flip flop 9510 to align the generated global synchronization signal with the strengthened clock signal (i.e., an output signal of the input buffer 9500) or the filtered clock signal having the increased clock frequency (i.e., an output signal of the PLL or DLL 9505). Then, the flip flop 9510 outputs the aligned global synchronization signal to a logic 8415 and/or a counter 9420 as shown in FIG. 7-1-4. The logic 9415 masks (i.e., ignores) the aligned global synchronization signal or fires an interrupt signal 9425 to processors in response to the aligned global synchronization signal.

The counter 9420 delays a response to the aligned global synchronization signal, e.g., by forwarding the aligned global synchronization signal to processors when a value of the counter becomes a zero or a threshold value. In one embodiment, the counter 9420 can be programmed in a different or same way across semiconductor chips implementing parallel computing systems. The processor(s) controls the logic 9415 and/or the counter 9420. In one embodiment, a pulse width modification occurs repetitively. The global synchronization signal 9545 comes into the counter 9420 at a regular rate. By programming the counter 9420 that decrements or increments on every pulse on the global synchronization signal 9545, issuing an interrupt signal 9425 or the like to processors can be delayed until a value of the counter 9420 reaches zero or a threshold value. In other words, an action (e.g., interrupt 9425) to processors can be delayed for a predetermined time period, e.g., by configuring the value of the counter 9420.

In one embodiment, if a control (e.g., an instruction) from a processor writes a number "N" into the counter 9420, the counter 9420 may start decrementing on a receipt of every subsequent global synchronization signal. Once the counter 9420 expires (i.e. has decremented to 0), the counter 9420 generates a counter expiration signal 9435, that a subsequent logic can use for whatever purpose. For example, a purpose of the counter expiration signal is to trigger for a series of subsequent counters that provide a sequence for waking up the chip (i.e., a semiconductor chip having a plurality of processors) from a reset state.

The following describes an exemplary protocol that can be applied in FIG. 7-1-4:

(A semiconductor chip may have a plurality of processors. "gsync" interrupt refers to an interrupt signal (e.g., the interrupt signal 9425 in FIG. 7-1-4) caused by a global synchronization signal 9545. "gsync signal" refers to a global synchronization signal 9545.)

0. All semiconductor chips in a partition start with having a gsync interrupt masked (i.e. incoming gsync signals are ignored).

1. A single semiconductor chip in the partition (which can span from a single chip to all chips in a machine, e.g., IBM® Blue Gene L/P/Q) takes a lead role. This single semiconductor chip is referred herein to a "director" chip.

2. Software on the director chip clears any pending a gsync interrupt state (i.e., a state caused by the gsync interrupt) and then unmasks the gsync interrupt.

3. A next incoming gsync signal may thus trigger a gsync interrupt.

4. After taking this interrupt, the director chip waits for an appropriate delay and then communicates to all semiconductor chips in the partition to take the next gsync interrupt.

5. All semiconductor chips (including the director chip) clear any pending gsync interrupt and then unmask the gsync interrupt.

6. A next incoming gsync signal may thus trigger a gsync interrupt on all the chips.

7. All the chips wait an appropriate delay and then write the counter 9420 with a suitable number "N."

8. All the chips quiesce and go into reset in order to achieve a reproducible state.

9. If necessary, an external control system can even step in and take a step to achieve the reproducible state.

10. Upon an expiration of the counter 9420, i.e., when a value of the counter 9420 becomes zero, all the chips start a deterministic wake-up sequence that is run synchronously. All the chips may therefore be in a deterministic phase relationship with each other.

The "appropriate delay" in step 4 is intended to overcome jitter that is incurred between semiconductor chips in the machine. This delay represents an uncertainty in timing due to a chip-to-chip communication having a different distribution path from a (global) oscillating signal distribution path to each semiconductor chip.

If a gsync signal occurs with a period, for example, on a millisecond scale, and a corresponding jitter band across the machine (e.g., the worst uncertainty case in a gsync signal distribution+the worst latency case of a chip-to-chip communication) is, for example, 10s of microseconds, then it is sufficient for the director chip(s) to wait, e.g. 100 microseconds after its gsync signal from step 3 to ensure that all chips in the partition will be safely ignore an initial noise signal, and may be ready to the chip-to-chip communication of step 4 and to the step 5 before the next gsync signal (of step 6) arrives. This next gsync signal is indeed the same gsync signal for all the chips.

The "appropriate delay" in step 7 is to ensure that the counter 9420 is programmed once a current gsync signal (of step 6) is detected, so that decrementing a value of the counter 420 starts only on a subsequent gsync signal. However, depending on an implementation of the machine, this delay in step 7 may not be necessary, i.e. can be zero.

The "suitable number N" of step 7 may safely cover the reset state of steps 8 and 9, including any time span that may need to be incurred to give the external control system an opportunity to step in.

In one embodiment, the clock generation circuit 9100 preserves rising edges of the oscillating signal so that on-chip PLLs (e.g., PLL 9505 in FIG. 7-1-5) that may be sensitive to a rising edge positioning are unaffected by a particular implementation of the pulse width modulation, which can affect a positioning of falling edges.

An embodiment as now described herein arose in the context of the multiprocessor system that is described in more detail in the co-pending applications incorporated by reference herein.

Using Reproducibility to Debug a Multiprocessor System

If a multiprocessor system offers reproducibility, then a test case can be run multiple times and exactly the same behavior will occur in each run. This also holds true when there is a bug in the hardware logic design. In other words, a test case failing due to a bug will fail in the same fashion in every run of the test case. With reproducibility, in each run it is possible to precisely stop the execution of the program and examine the state of the system. Across multiple runs, by stopping at subsequent clock cycles and extracting the state information from the multiprocessor system, chronologically exact hardware behavior can be recorded. Such a so-called event trace usually greatly aids identifying the bug in the hardware logic design which causes the test case to fail. It can also be used to debug software.

Debugging the hardware logic may require analyzing the hardware behavior over many clock cycles. In this case, many runs of the test case are required to create the desired event trace. It is thus desirable if the time and effort overhead between runs is kept to a minimum. This includes the overhead before a run and the overhead to scan out the state after the run.

Aspects Allowing a Multiprocessor System to Offer Reproducibility

Below are described a set of aspects allowing a multiprocessor system to offer reproducibility.

Deterministic System Start State

Advantageously, the multiprocessor system is configured such that reproducibility-relevant initial states are set to a fixed value. The initial state of a state machine is an example of reproducibility-relevant initial state. If the initial state of a state machine differs across two runs, then the state machine will likely act differently across the two runs. The state of a state machine is typically recorded in a register array.

Various techniques are used to minimize the amount of state data to be set between runs and thus to reduce the overhead between reproducible runs. For example, each unit on a chip can use reset to reproducibly initialize much of its state, e.g. to set its state machines. This minimizes the number of unit states that have to be set by an external host or other external agent before or after reset.

Another example would be, having the test case program code and other initially-read contents of DRAM memory retained between runs. In other words, the DRAM memory unit need not be reset between runs and thus only some of the contents may need to be set before each run.

The remaining state data within the multiprocessor system should be explicitly set between runs. This state can be set by an external host computer as described below. The external host computer controls the operation of the multiprocessor system. For example, in FIG. 7-2-1, the multiprocessor system 92100 is controlled by the external host computer 92180. The external host computer 92180 uses Ethernet to communicate with the Ethernet to JTAG unit 92130 which has a JTAG interface into the processor chips 92201, 92202, 92203 and 92204. An example of box 92130 is described in FIG. 28 and related text in http://www.research.ibm.com/journal/rd49-23html "Packaging the Blue Gene/L supercomputer" P. Coteus, H. R. Bickford, T. M. Cipolla, P. G. Crumley, A. Gara, S. A. Hall, G. V. Kopcsay, A. P. Lanzetta, L. S. Mok, R. Rand, R. Swetz, T. Takken, P. La Rocca, C. Marroquin, P. R. Germann, and M. J. Jeanson ("Coteus et al."), the contents and disclosure of which are incorporated by reference as if fully set forth herein.

As illustrated in FIG. 7-2-2, the Ethernet to JTAG unit 92130 communicates via the industry-standard JTAG protocol with the JTAG access unit 92250 within the processor chip 92201. The JTAG access unit 92250 can read and write the state in the subunits 92260, 92261, 92262, 92263 and 92264 of the 92201 processor chip. An example of box 92250 is described in FIG. 1 and related text in http://w3.research.ibm.com/journal/rd49-23.html "Blue Gene/L computer chip: Control, test, and bring-up infrastructure" R. A. Haring, R. Bellofatto, A. A. Bright, P. G. Crumley, M. B. Dombrowa, S. M. Douskey, M. R. Ellaysky, B. Gopalsamy, D. Hoenicke, T. A. Liebsch, J. A. Marcella, and M. Ohmacht, the contents and disclosure of which are incorporated by reference as if fully set forth herein. As required, the external host computer 92180 can set the state of the subunit 92260 and other subunits within the multiprocessor system 92100.

A Single System Clock

To achieve system wide reproducibility, a single system clock drives the entire multiprocessor system. Such a single system clock and its distribution to chips in the system is described on page 227 section 'Clock Distribution' of Coteus et al.

The single system clock has little to no negative repercussions and thus also is used to drive the system in regular operation when reproducibility is not required. In FIG. 7-2-1, the multiprocessor system 92100 includes a single system clock source 92110. The single system clock is distributed to each processor chip in the system. In FIG. 7-2-1, the clock signal from system clock source 92110 passes through the synchronization event generator 92120 described further below. In FIG. 7-2-1, the clock signal drives the processor chips 92201, 92202, 92203 and 92204.

Within the clock distribution hardware of the preferred embodiment, the drift across processor chips across runs has been found to be too small to endanger reproducibility. In FIG. 7-2-1, the clock distribution hardware is illustrated as the dotted lines.

In the alternative, multiple clocks would drive different processing elements and would likely result in frequency drift that would break reproducibility. In the time of a realistic test case run, the frequencies of multiple clocks can drift over many cycles. For example, for a 1 GHz clock signal, the drift across multiple clocks must be well under 1 in a billion to not drift a cycle in a one second run.

System-Wide Phase Alignment

The single system clock described above allows for a system-wide phase alignment of all reproducibility-relevant clock signals within the multiprocessor system. Each processor chip uses the single system clock to drive its phase-lock-loop units and other units creating other clock frequencies used by the processor chip. An example of such a processor chip and other units is the IBM® BlueGene® node chip with its peripheral chips, such as DRAM memory chips.

In FIG. 7-2-1 and FIG. 7-2-2, the processor chip 92201 receives its incoming clock signal via the synchronization event generator 92120 described below. In FIG. 7-2-2 illustrating the 92201 processor chip, the incoming clock signal drives the clock generator 92230, which contains the units creating the clock frequencies used by the processor chip and its peripheral chips. The various clock signals from clock generator 92230 drive the various subunits 92260, 92261, 92262, 92263 and 92264 as well as the peripheral chip 92211.

The clock generator 92230 can be designed such that the phases of the system clock and the derived clock frequencies are all aligned. Please see the following paper for a similar clock generator with aligned phases: A. A. Bright, "Creating the Blue Gene/L Supercomputer from Low Power System-on-a-Chip ASICs," Digest of Technical Papers, 2005 IEEE International Solid-State Circuits Conference, or see FIG. 5 and associated text in http://www.research.ibm.com/journal/rd49-23.html "Blue Gene/L compute chip: Synthesis, timing, and physical design" A. A. Bright, R. A. Haring, M. B. Dombrowa, M. Ohmacht, D. Hoenicke, S. Singh, J. A. Marcella, R. F. Lembach, S. M. Douskey, M. R. Ellaysky, C. G. Zoellin, and A. Gara. The contents and disclosure of both articles are incorporated by reference as if fully set forth herein This alignment ensures that across runs there is the same phase relationship across clocks. This alignment across clocks thus enables reproducibility in a multiprocessor system.

With such a fixed phase relationship across runs, an action of a subsystem running on its clock occurs at a fixed time across runs as seen by any other clock. Thus with such a fixed phase relationship across runs, the interaction of subsystems under different clocks is the same across runs. For example, assume that clock generator 92230 drives subunit 92263 with 100 MHz and subunit 92264 with 200 MHz. Since clock generator 92230 aligns the 100 MHz and 200 MHz clocks, the interaction of subsystem 92263 with subunit 92264 is the same across runs. If the interaction of the two subsystems is the same across runs, the actions of each subunit can be the same across runs.

A more detailed system-wide phase alignment is described below in section '1.2.4 System-wide synchronization events.'

System-Wide Synchronization Events

The single system clock described above can carry synchronization events. In FIG. 7-2-1 illustrating the Multiprocessor system 92100, the synchronization event generator 92120 can add one or more synchronization events to the system clock from the system clock source 92110. The synchronization event generator 92120 is described in a "Global Synchronization of Parallel Processors Using Clock Pulse Width Modulation" U.S. Patent Application Ser. No. 61/293,499, filed Jan. 8, 2010 ("Global Sync") the contents and disclosure of which are incorporated by reference as if fully set forth herein. The external host computer 92180 uses the Ethernet-to-JTAG unit 92130 to control the synchronization event generator 92120 to insert one or more synchronization events onto the system clock.

The external host computer 92180 controls the operation of the multiprocessor system 92100. The external host computer 92180 uses a synchronization event to initiate the reset phase of the processor chips 92201, 92202, 92203, 92204 in the multiprocessor system 92100.

As described above, within a processor chip, the phases of the clocks are aligned. Thus like any other event on the system clock, the synchronization event occurs at a fixed time across runs with respect to any other clock. The synchronization event thus synchronizes all units in the multiprocessor system, whether they are driven by the system clock or by clocks derived from clock generator 92230.

The benefit of the above method can be understood by examining a less desirable alternative method. In the alternative, there is a separate network fanning out the reset to all chips in the system. If the clock and reset are on separate networks, then across runs the reset arrival times can be skewed and thus destroy reproducibility. For example, on a first run, reset might arrive 23 cycles earlier on one node than another. In a rerun, the difference might be 22 cycles.

The method of this disclosure as used in BG/Q is described below. Particular frequency values are stated, but the technique is not limited to those and can be generalized to other frequency values and other ratios between frequencies as a matter of design choice.

The single system clock source 92110 provides a 100 MHz signal, which is passed on by the synchronization event generator 92120. On the processor chip 92201, 33 MHz is the greatest common divisor of all on-chip clock frequencies, including the incoming 100 MHz system clock, the 1600 MHz processor cores and the 1633 MHz external DRAM chips. In FIG. 7-2-2, subunit 92261 could illustrate such a 1600 MHz processor chip. The peripheral chip 92211 could illustrate such 1633 MHz external DRAM chip and subunit 92260 could illustrate a memory controller subunit.

Per the above-mentioned 'GLOBAL SYNC . . . ' co-pending application on the synchronization event generator 92120, the incoming 100 MHz system clock is internally divided-by-3 to 33 MHz and a fixed 33 MHz rising edge is selected from among 3 possible 100 MHz clock edges. The synchronization event generator 92120 generates synchronization events at a period that is a (large) multiple of the 33 MHz period. The large period between synchronization events ensure that at any moment there is at most one synchronization event in the entire system. Each synchronization event is a pulse width modulation of the outgoing 100 MHz system clock from the synchronization event generator 92120.

On the processor chip 92201, the incoming 100 MHz system clock is divided-by-3 to an on-chip 33 MHz clock signal. This on-chip 33 MHz signal is aligned to the incoming synchronization events which are at a period that is a (large) multiple of the 33 MHz period. Thus there is a system wide phase alignment across all chips for the 33 MHz clock on each chip. On the processor chip 92201, all clocks are aligned to the on-chip 33 MHz rising edge. Thus there is a system wide phase alignment across all chips for all clocks on each chip.

An application run involves a number of configuration steps. A reproducible application run may require one or more system-wide synchronization events for some of these steps. For example, on the processor chip 92201, the configuration steps: e.g. clock start, reset, and thread start, can each occur synchronized to an incoming synchronization event. Each step is thus synchronized and thus reproducible across all processor chips 92201-92204. On each processor chip, there is an option to delay a configuration step by a programmable number of synchronization events. This allows a configuration step to complete on different processor chips at different times. The delay is chosen to be longer than the longest time required on any of the chips for that configuration step. After the configuration step, due to the delay, between any pair of chips, there is the same fixed phase difference across runs. The exact phase difference value is typically not of much interest and typically differs across different pairs of chips.

Reproducibility of Component Execution

On each chip, each component or unit or subunit has a reproducible execution. As known to anyone skilled in the art, this reproducibility depends upon various aspects. Examples of such aspects include:

- each component having a respective consistent initial state as described above;
- coordinating reset across components;
- if a component has some internally irrelevant but externally visible non-deterministic behavior, this non-deterministic behavior should be prevented from causing non-deterministic behavior in another component. This might include:
  - the other component ignoring incoming signals during reset;
  - the component outputting fixed values on outgoing signals during reset.

Deterministic Chip Interfaces

Advantageously, to achieve reproducibility, within the multiprocessor system the interfaces across chips will be deterministic. In the multiprocessor system 92100 of FIG. 7-2-1, the 92202 processor chip 92202 has an interface with its peripheral chip 92212 as well with the process chips 92201 and 92204. In order to achieve deterministic interfaces, a number of features may be implemented.

These include the following alternatives. A given interface uses one of these or another alternative to achieve a deterministic interface. On a chip with multiple interfaces, each interface could use a different alternative:

- Interfaces across chips, such as high speed serialization network interfaces, often utilize asynchronous macros or subunits which can result in non-deterministic behavior. For example, for the processor chip 92201 in FIG. 7-2-1, the solid thick double-ended arrow could be such an interface to the processor chip 92202. The solid thin double-ended arrow could be such an interface to the peripheral chip 92211. The interface can be treated as a static component and not reset across runs and thus the incoming clock or clocks are left running across runs. This is done on both chips of the interface. By not resetting the macro and by leaving the clocks running, the macro will behave the same across runs. In particular, by not resetting the macro, the interface delay across chips remains the same across runs.

Alternatively, one can attempt to determine the interface delay within the asynchronous macro and then compensate for this delay from run to run by additionally delaying the communication by passing it through an adjustable shift register. (For explanation of shift register see http://en.wikipedia.org/wiki/Shift_register) The length of delay given by the shift register is chosen in each run such that the total delay given by the network interface plus the shift register is the same across runs. To achieve this, the shift register needs sufficient delay range to compensate for the variation across runs for the interface delay. This is typically the case when re-running on fixed hardware, as typical to debug the hardware design. If a hardware unit is replaced by an identical hardware unit across runs, then the delay shift register may or may not have sufficient delay to compensate for the interface delay. If sufficient, then this can be used to identify a failed hardware unit. This is done by comparing a run on the unknown hardware unit to a run on a known-good hardware unit.

Alternatively, interfaces across chips will be made synchronous, rather than asynchronous, with clocks that are deterministic and related by a fixed ratio to the system clock frequency. An example of such a synchronous interface follows. "SDRAM has a synchronous interface, meaning that it waits for a clock signal before responding to control inputs and is therefore synchronized with the computer's system bus." from http://en.wikipedia.org/wiki/Synchronous_dynamic_random_access_memory Zero-Impact Communication with the Multiprocessor System Communication with the multiprocessor system is designed to not break reproducibility. For example, all program input is stored within the multiprocessor system before the run. Such input is part of the deterministic start state described above. For example, output from a processor chip, such as printf( ) uses a message queue, such as described in http://en.wikipedia.org/wiki/Message_queue, also known as a "mailbox," which can be read by an outside system without impacting the processor chip operation in any way. In FIG. 7-2-2 of the processor chip 92201, the JTAG access unit 92250 can be used to read out the subunit 92262, which could serve as such a mailbox. As mentioned above, reproducibility means that the interaction of the subunit 92262 with the rest of the processor chip 92201 should not be affected by a read or no read from the JTAG access 92250. For example, subunit 92262 may be dual-ported, such that a read or write by JTAG access 92250 does not change the cycle-by-cycle read or writes from the rest of the processor chip 92201. Alternatively, JTAG access 92250, can be given low priority such that a read or write to subunit 92262 may be delayed and only satisfied when there are no requests from the rest of the processor chip 92201.

Precise Stopping of System State

One enabler of reproducible execution is the ability to precisely stop selected clocks. The precise stopping of the clocks may be designed into the chips and the multiprocessor system to accomplish this. As illustrated in FIG. 7-2-2, the embodiment here has a clock stop timer 93240 on the processor chip 92201. Before the run, the clock stop timer 93240 is set to a threshold value via the JTAG access 92250. The value is the instance of application execution of interest. For example, section '1.3 Recording the chronologically exact hardware behavior' describes how the value is set in each of multiple runs. Also before the run, the clock generator 92230 is configured to stop selected clocks upon input from the clock stop timer 93240. When the clock stop timer 93240 reaches the threshold value, it sends a signal to the clock generator 92230 which then halts the pre-selected clocks on the processor chip 92201. In FIG. 7-2-1, by having processor chips 92201, 92202, 92203, 92204 in the multiprocessor system 92100 follow this process, precise stopping can be achieved across the entire multiprocessor system 92100. This precise stopping can be thought of as a doomsday type clock for the entire system.

Selected clocks are not stopped. For example, as described in section '1.2.6 Deterministic Chip Interfaces', some subunits continue to run and are not reset across runs. As described in section '1.2.9 Scanning of system state', a unit is stopped in order to scan out its state. The clocks chosen to not be stopped are clocks that do not disturb the state of the units to be scanned. For example, the clocks to a DRAM peripheral chip do not change the values stored in the DRAM memory.

This technique of using a clock stop timer 93240 may be empirical. For example, when a run initially fails on some node, the timer can be examined for the current value C. If the failing condition is assumed to have happened within the last N cycles, then the desired event trace is from cycle C-N to cycle C. So on the first re-run, the clock stop timer is set to the value C-N, and the state at cycle C-N is captured. On the next re-run, the clock stop timer is set to the value C-N+1, and the state at cycle C-N+1 can be captured. And so on, until the state is captured from cycle C-N to cycle C.

Scanning of System State

After the clocks are stopped, as described above, the state of interest in the chip is advantageously extractable. An external host computer can scan out the state of latches, arrays and other storage elements in the multiprocessor system.

This is done using the same machinery described in section 1.2.1 which allows an external host computer to set the deterministic system start state before the beginning of the run. As illustrated in FIG. 7-2-1, the external host 92180 computer uses Ethernet to communicate with the Ethernet to JTAG unit 92130 which has a JTAG interface into the processor chips 92201, 92202, 92203 and 92204. As illustrated in FIG. 7-2-2 the Ethernet to JTAG unit 92130 communicates via the industry-standard JTAG protocol with the JTAG access unit 92250 within the processor chip 92201. The JTAG access unit 92250 can read and write the state in the subunits 92260, 92261, 92262, 92263 and 92264 of the processor chip 92201. As required, the external host computer 92180 can read the state of the subunit 92260 and other subunits within the multiprocessor system 92100.

Recording the Chronologically Exact Hardware Behavior

If a multiprocessor system offers reproducibility then a test case can be run multiple times and exactly the same behavior will occur in each run. This also holds true when there is a bug in the hardware logic design. In other words, a test case failing due to a bug will fail in the same fashion in every run of the test case. With reproducibility, in each run it is possible to precisely stop the execution of the program and examine the state of the system. Across multiple runs, by stopping at subsequent clock cycles and extracting the state information, the chronologically exact hardware behavior can be recorded. Such a so-called event trace typically makes it easy to identify the bug in the hardware logic design which is causing the test case to fail.

FIG. 7-2-3 shows a flowchart to record the chronologically reproducible hardware behavior of a multiprocessor system.

At 92901, a stop timer is set. At 92902, a reproducible application is started (using infrastructure from the "Global Sync" application cited above). At 92903, each segment of the reproducible application, which may include code on a plurality of processors, is run until it reaches the pre-set stop time. At 92904, the chip state is extracted responsive to a scan of many parallel components. At 92905, a list of stored values of stop times is checked. If there are unused stop times in the list, then the stop timer should be incremented at 92906 in components of the system and control returns to 92902.

When there are no more stored stop times, extracted system states are reviewable at 92907.

Roughly speaking, the multiprocessor system is composed of many thousands of state machines. A snapshot of these state machines can be MBytes or GBytes in size. Each bit in the snapshot basically says whether a transistor is 0 or 1 in that cycle. Some of the state machines may have bits that do not matter for the rest of the system. At least in a particular run, such bits might not be reproduced. Nevertheless, the snapshot can be considered "exact" for the purpose of reproducibility of the system.

The above technique may be pragmatic. For example, a MByte or GByte event trace may be conveniently stored on the a disk or other mass storage of the external host computer 92180. For example, the use of mass storage allows the event trace to include many cycles; and the external host computer can be programmed to only record a selected subset of the states of the multiprocessor system 92100.

The above technique can be used in a flexible fashion, responsive to the particular error situation. For instance, the technique need not require the multiprocessor system 92100 to continue execution after it has been stopped and scanned. Such continuation of execution might present implementation difficulties.

FIG. 7-2-4 shows a timing diagram illustrating reproducible operation with respect to registers of a system. A system clock is shown at 921010. Line 921170 shows a clock derived from the system clock. At 921020 the operation of a clock stop timer is illustrated. Line 921020 includes a rectangle 317-320 for each represented, numbered cycle of the clock stop timer. Clock stops for the timer are shown by vertical lines 921210, 921220, 921230, 921240, and they are offset within the clock cycles. Lines 921030, 921040, 921150, and 921160 show the operation of registers A, B, C, and D, respectively relevant to the clock cycles 921010 and 921170. Registers A and B change value at a frequency and at times determined by the system clock 921010. Registers C and D change value at a frequency determined by the derived clock 921170. These registers may be located within or associated with any unit of the multiprocessor system. It can be seen that registers change value in lock step, throughout the system. The values illustrated are arbitrary, for illustration purposes only. Register A is shown storing values 6574836, 9987564, 475638, and 247583 in four successive system clock cycles. Register B is shown storing values 111212, 34534, 34534, and 99940 in four successive system clock cycles. Register C is shown storing values 56 and 53 in two successive cycles of the derived clock 921170. Register D is shown storing values 80818283 and 80818003 in two successive cycles of the derived clock 921170. In each case, the register changes value at a precise time that depends on the system clock, no matter which unit within the system the register is associated with.

When the clockstop timer 93240 stops the clocks, all registers are stopped at the same time. This means a scan of the latch state is consistent with a single point in time, similar to the consistency in a VHDL simulation of the system. In the next run, with the clock stop timer 93240 set to the next cycle, the scanned out state of some registers will not have changed. For example, register in a slower clock domain will not have changed values unless the slow clock happens to cross over a rising edge. The tool creating the event traces from the extracted state of each run thus simply appends the extracted state from each run into the event trace.

FIG. 7-2-5 shows an overview with a user interface 92501 and a multiprocessor system 92502. All of the other figures can be understood as being implemented within box 92502. Via the user interface, a programmer or engineer can implement the sequence of operations of FIG. 7-2-3 for debugging the hardware or software of system 92502.

Referring to FIG. 6-1-1, a system 10 according to one embodiment of the invention for monitoring computing resources on a computer includes a computer 80020. The computer 80020 includes a data storage device 80022 and a software program 80024 stored in the data storage device 80022, for example, on a hard drive, or flash memory. The processor 80026 executes the program instructions from the program 80024. The computer 80020 is also connected to a data interface 80028 for entering data and a display 80029 for displaying information to a user. A monitoring module 80030 is part of the program 80024 and monitors specified computer resources using an external unit 80050 (interchangeably referred to as the wakeup unit herein) which is external to the processor. The external unit 80050 is configured to detect a specified condition, or in an alternative embodiment, a plurality of specified conditions. The external unit 80050 is configured by the program 80024 using a thread 80040 communicating with the external unit 80050 and the processor 80026. After configuring the external unit 80050, the program 80024 initiates a pause state for the thread 80040. The external unit 80050 waits to detect the specified condition. When the specified condition is detected by the external unit 80050, the thread 80040 is awakened from the pause state by the external unit.

Thus, the present invention increases application performance by reducing the performance cost of software blocked in a spin loop or similar blocking polling loop. In one embodiment of the invention, a processor core has four threads, but performs at most one integer instruction and one floating point instruction per processor cycle. Thus, a thread blocked in a polling loop is taking cycles from the other three threads in the core. The performance cost is especially high if the polled variable is L1-cached, since the frequency of the loop is highest. Similarly, the performance cost is high if a large number of L1-cached addresses are polled and thus take L1 space from other threads.

In the present invention, the WakeUp-assisted loop has a lower performance cost, compared to the software polling loop. In one embodiment of the invention, the external unit is embodied as a wakeup unit, the thread 80040 writes the base and enable mask of the address range to the WakeUp address compare (WAC) registers of the WakeUp unit. The thread then puts itself into a paused state. The WakeUp unit wakes up the thread when any of the addresses are written to. The awoken thread then reads the data value(s) of the address(es). If the exit condition is reached, the thread exits the polling loop. Otherwise a software program again configures the WakeUp unit and the thread again goes into a paused state, continuing the process as described above. In addition to address comparisons, the WakeUp unit can wake a thread on signals provided by the message unit (MU) or by the core-to-core (c2c) signals provided by the BIC.

Polling may be accomplished by the external unit or WakeUp unit when, for example, messaging software places one or more communication threads on a memory device. The communication thread learns of new work, i.e., a detected condition or event, by polling an address, which is accomplished by the WakeUp unit. If the memory device is only running the communication thread, then the WakeUp unit will wake the paused communication thread when the condition is detected. If the memory device is running an application thread, then the WakeUp unit, via a bus interface card (BIC), will interrupt the thread and the interrupt handler will start the communication thread. A thread can be woken by any specified event or a specified time interval.

The system of the present invention thereby, reduces the performance cost of a polling loop on a thread within a core having multiple threads. In addition, the system of the present invention includes the advantage of waking a thread only when a detected event or signal has occurred and thus, there is not a falsely woken up thread if a signal(s) has not occurred. For example, a thread may be woken up if a specified address or addresses have been written to by any of a number of threads on the chip. Thus, the exit condition of a polling loop will not be missed.

In another embodiment of the invention, an exit condition of a polling loop is checked by the awakened thread as actually occurring. Such reasons for a thread being woken even if a specified address(es) has not been written to, include, for example, false sharing of the same L1 cache line, or an L2 castout due to resource pressure.

Referring to FIG. 6-1-2, a method 80100 for monitoring and managing resources on a computer system according to an embodiment of the invention includes a computer system 80020. The method 80100 incorporates the embodiment of the invention shown in FIG. 6-1-1 of the system 80010. As in the system 80010, the computer system 80020 includes a computer program 80024 stored in the computer system 80020 in step 80104. A processor 80026 in the computer system 80020 processes instructions from the program 80024 in step 80108. The processor is provided with one or more threads in step 80112. An external unit is provided in step 80116 for monitoring specified computer resources and is external to the processor. The external unit is configured to detect a specified condition in step 80120 using the processor. The processor is configured for the pause state of thread in step 80124. The thread is normally in an active state and the thread executes a pause state for itself in step 80128. The external unit 80050 monitors specified computer resources which includes a specified condition in step 80132. The external unit detects the specified condition in step 80135. The external unit initiates the active state of the thread in step 80140 after detecting the specified condition in step 80136.

Referring to FIG. 6-1-3, a system 80200 according to the present invention, depicts an external WakeUp unit 80210 relationship to a processor 80220 and to level-1 cache (L1p unit) 80240. The processor 80220 include multiple cores 80222. Each of the cores 80222 of the processor 80220 has a WakeUp unit 80210. The WakeUp unit 80210 is configured and accessed using memory mapped I/O (MMIO), only from its own core. The system 80200 further includes a bus interface card (BIC) 80230, and a crossbar switch 80250.

In one embodiment of the invention, the WakeUp unit 80210 drives the signals wake_result0-3 80212, which are negated to produce an_ac_sleep_en0-3 80214. A processor 80220 thread 80040 (FIG. 6-1-1) wakes or activates on a rising edge of wake_result 80212. Thus, throughout the WakeUp unit 80210, a rising edge or value 1 indicates wake-up.

Referring to FIG. 6-1-4, a system 300 according to an embodiment of the invention includes the WakeUp unit 80210 supporting 32 wake sources. These consist of 12 WakeUp address compare (WAC) units, 4 wake signals from the message unit (MU), 8 wake signals from the BIC's core-to-core (c2c) signaling, 4 wake signals are GEA outputs 12-15, and 4 so-called convenience bits. These 4 bits are for software convenience and have no incoming signal. The other 28 sources can wake one or more threads. Software determines which sources wake which threads. In FIG. 6-1-2, each of the 4 threads has its own wake_enableX(0:31) register and wake_statusX(0:31) register, where X=0, 1, 2, 3, 80320-80326, respectively. The wake_statusX(0:31) register latches each wake_source signal. For each thread X, each bit of wake_statusX(0:31) is ANDed with the corresponding bit of wake_enableX(0:31). The result is ORed together to create the wake_resultX signal for each thread.

The 1-bits written to the wake_statusX_clear MMIO address clears individual bits in wake_statusX. Similarly, the 1-bits written to the wake_statusX_set MMIO address sets individual bits in wake_statusX. A use of setting status bits is verification of the software. This setting/clearing of individual status bits avoids "lost" incoming wake_source transitions across sw-read-modify-writes.

Referring to FIG. 6-1-5, in an embodiment of according to the invention, the WakeUp unit 80210 includes 12 address compare (WAC) units, allowing WakeUp on any of 12 address ranges. In other words, 3 WAC units per processor hardware thread 80040 (FIG. 6-1-1), though software is free to use the 12 WAC units differently across the 4 processor 220 threads 80040. For example, 1 processor 80220 thread 80040 could use all 12 WAC units. Each WAC unit has its own 2 registers accessible via MMIO. The register wac_base is set by software to the address of interest. The register wac_enable is set by software to the address bits of interest and thus allows a block-strided range of addresses to be matched.

The DAC1 or DAC2 event occurs only if the data address matches the value in the DAC1 register, as masked by the value in the DAC2 register. That is, the DAC1 register specifies an address value, and the DAC2 register specifies an address bit mask which determines which bit of the data address should participate in the comparison to the DAC1 value. For every bit set to 1 in the DAC2 register, the corresponding data address bit must match the value of the same bit position in the DAC1 register. For every bit set to 0 in the DAC2 register, the corresponding address bit comparison does not affect the result of the DAC event determination.

Of the 12 WAC units, the hardware functionality for unit wac3 is illustrated in FIG. 6-1-5. The 12 units wac0 to wac11 feed wake_status(0) to wake_status(11). FIG. 6-1-5 depicts the hardware to match bit 17 of the address.

In an example, a level-2 cache (L2) record for each L2 line in 17 bits may be implemented for which the processor has performed a cached-read on the line. On a store to the line, the L2 then sends an invalidate to each subscribed core 80222. The WakeUp unit snoops the stores by the local processor core and snoops the incoming invalidates.

The previous paragraph describes normal cached loads and stores. For the atomic L2 loads and stores, such as fetch-and-increment or store-add, the L2 sends invalidates for the corresponding normal address to the subscribed cores. The L2 also sends an invalidate to the core issuing the atomic operation, if that core was subscribed. In other words, if that core had a previous normal cached load on the address.

Thus each WakeUp WAC snoops all addressed stored to by the local processor. The unit also snoops all invalidate addresses given by the crossbar to the local processor. These invalidates and local stores are physical addresses. Thus software must translate the desired virtual address to a physical address to configure the WakeUp unit. The number of instructions taken for such address translation is typically much lower than the alternative of having the thread in a polling loop.

The WAC supports the full BGQ memory map. This allows a WAC to observe local processor loads or stores to MMIO. The local address snooped by WAC is exactly that output by the processor, which in turn is the physical address resolved by TLB within the processor. For example, WAC could implement a guard page on MMIO. In contrast to local processor stores, the incoming invalidates from L2 inherently only cover the 64 GB architected memory.

In an embodiment of the invention, the processor core allows a thread to put itself or another thread into a paused state. A thread in kernel mode puts itself into a paused state using a wait instruction or an equivalent instruction. A paused thread can be woken by a falling edge on an input signal into the processor 80220 core 80222. Each thread 0-3 has its own corresponding input signal. In order to ensure that a falling edge is not "lost", a thread can only be put into a paused state if its input is high. A thread can only be paused by instruction execution on the core or presumably by low-level configuration ring access. The WakeUp unit wakes a thread. The processor 80220 cores 80222 wake up a paused thread to handle enabled interrupts. After interrupt handling completes, the thread will go back into a paused state, unless the subsequent paused state is overriden by the handler. Thus, interrupts are transparently handled. The WakeUp unit allows a thread to wake any other thread, which can be kernel configured such that a user thread can or cannot wake a kernel thread.

The WakeUp unit may drive the signals such that a thread of the processor 80220 will wake on a rising edge. Thus, throughout the WakeUp unit, a rising edge or value 1 indicates wake-up. The WakeUp unit may support 32 wake sources. The wake sources may comprise 12 WakeUp address compare (WAC) units, 4 wake signals from the message unit (MU), 8 wake signals from the BIC's core-to-core (c2c) signaling, 4 wake signals are GEA outputs 12-15, and 4 so-called convenience bits. These 4 bits are for software convenience and have no incoming signal. The other 28 sources can wake one or more threads. Software determines which sources wake corresponding threads.

In one embodiment of the invention, a WakeUp unit includes 12 address compare (WAC) units, allowing WakeUp on any of 12 address ranges. Thus, 3 WAC units per A2 hardware thread, though software is free to use the 12 WAC units differently across the 4 A2 threads. For example, one A2 thread could use all 12 WAC units. Each WAC unit has its own two registers accessible via memory mapped I/O (MMIO). A register is set by software to a address of interest. The register is set by software to the address bits of interest and thus allows a block-strided range of addresses to be matched.

In another embodiment of the invention, data address compare (DAC) Debug Event Fields may include DAC1 or DAC2 event occurring only if the data address matches the value in the DAC1 register, as masked by the value in the DAC2 register. That is, the DAC1 register specifies an address value, and the DAC2 register specifies an address bit mask which determines which bit of the data address should participate in the comparison to the DAC1 value. For every bit set to 1 in the DAC2 register, the corresponding data address bit must match the value of the same bit position in the DAC1 register. For every bit set to 0 in the DAC2 register, the corresponding address bit comparison does not affect the result of the DAC event determination.

In another embodiment of the invention, an address compare on a wake signal, the WakeUp unit does not ensure that the thread wakes up after any and all corresponding memory has been invalidated in level-1 cache (L1). For example if a packet header includes a wake bit driving a wake source, the WakeUp unit does not ensure that the thread wakes up after the corresponding packet reception area has been invalidated in cache L1. In an example solution, the woken thread performs a data-cache-block-flush (dcbf) on the relevant addresses before reading them.

In another embodiment of the invention, a message unit (MU) provides 4 signals. The MU may be a direct memory access engine, such as MU 80100, with each MU including a DMA engine and Network Card interface in communication with a cross-bar switch (XBAR) switch XBAR switch, and chip I/O functionality. MU resources are divided into 17 groups. Each group is divided into 4 subgroups. The 4 signals into WakeUp corresponds to one fixed group. An A2 core must observe the other 16 network groups via BIC. A signal is an OR command of specified conditions. Each condition can be individually enabled. An OR of all subgroups is fed into BIC, so a core serving a group other than its own must go via the BIC. The BIC provides core-to-core (c2c) signals across the 17*4=68 threads. The BIC provides 8 signals as 4 signal pairs. Any of the 68 threads can signal any other thread. Within each pair: 1 signal is OR of signals from threads on core 16. If source needed, software interrogates BIC to identify which thread on core 16. One signal is OR from threads on cores 0-15. If source needed, software interrogates BIC to identify which thread on which core.

In another embodiment of the invention, the WakeUp unit uses software, for example, using library routines. Handling multiple wake sources may be similarly managed as interrupt handling and requires avoiding problems like livelock. In addition to simplifying user software, the use of library routines also has other advantages. For example, the library can provide an implementation which does not use WakeUp unit and thus measures the application performance gained by WakeUp unit.

In one embodiment of the invention using interrupt handlers, assuming a user thread is paused waiting to be woken up by WakeUp, the thread enters an interrupt handler which uses WakeUp. A possible software implementation has the handler at exit set a convenience bit to subsequently wake the user to indicate that the WakeUp has been used by system and that user should poll all potential user events of interest. The software can be programmed to either have the handler or the user reconfigure the WakeUp for subsequent user use.

In another embodiment of the invention, a thread can wake another thread. One techniques for a thread to wake another thread is across A2 cores. Other techniques include core-to-core (c2c) interrupts, using a polled address. A write by the user thread to an address can wake a kernel thread. The address must be in user space. Across the 4 threads within an A2 core, have at least 4 alternative technique techniques. Since software can write bit=1 to wake_status, the WakeUp unit allows a thread to wake one or more other threads. For this purpose, any wake_status bit can be used whose wake_source can be turned off. Alternatively, setting wake_status bit=1 and toggle wake_enable. This allows any bit to be used, regardless if wake_source can be turned off. For the above techniques, if the wake status bit is kernel use only, a user thread cannot use the above method to wake the kernel thread.

Thereby, the present invention, provides a wait instruction (initiating the pause state of the thread) in the processor, together with the external unit that initiates the thread to be woken (active state) upon detection of the specified condition.

Thus, preventing the thread from consuming resources needed by other threads in the processor until the pin is asserted. Thereby the present invention offloads the monitoring of computing resources, for example memory resources, from the processor to the external unit. Instead of having to poll a computing resource, a thread configures the external unit (or wakeup unit) with the information that it is waiting for, i.e., the occurrence of a specified condition, and initiates a pause state. The thread in pause state no longer consumes processor resources while it is in pause state. Subsequently, the external unit wakes the thread when the appropriate condition is detected. A variety of conditions can be monitored according to the present invention, including, writing to memory locations, the occurrence of interrupt conditions, reception of data from I/O devices, and expiration of timers.

In another embodiment of the invention, the system 80010 and method 80100 of the present invention may be used in a supercomputer system. The supercomputer system may be expandable to a specified amount of compute racks, each with predetermined compute nodes containing, for example, multiple processor cores. For example, each core may be associated to a quad-wide fused multiply-add SIMD floating point unit, producing 8 double precision operations per cycle, for a total of 128 floating point operations per cycle per compute chip. Cabled as a single system, the multiple racks can be partitioned into smaller systems by programming switch chips, which source and terminate the optical cables between midplanes.

Further, for example, each compute rack may consists of 2 sets of 80512 compute nodes. Each set may be packaged around a doubled-sided backplane, or midplane, which supports a five-dimensional torus of size 4×4×4×4×2 which is the communication network for the compute nodes which are packaged on 16 node boards. The tori network can be extended in 4 dimensions through link chips on the node boards, which redrive the signals optically with an architecture limit of 64 to any torus dimension. The signaling rate may be 10 Gb/s, 8/10 encoded), over about 20 meter multi-mode optical cables at 850 nm. As an example, a 96-rack system is connected as a 16×16×16×12×2 torus, with the last x2 dimension contained wholly on the midplane. For reliability reasons, small torus dimensions of 8 or less may be run as a mesh rather than a torus with minor impact to the aggregate messaging rate. One embodiment of a supercomputer platform contains four kinds of nodes: compute nodes (CN), I/O nodes (ION), login nodes (LN), and service nodes (SN).

The method of the present invention is generally implemented by a computer executing a sequence of program instructions for carrying out the steps of the method and may be embodied in a computer program product comprising media storing the program instructions. Although not required, the invention can be implemented via an application-programming interface (API), for use by a developer, and/or included within the network browsing software, which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations.

Other well known computing systems, environments, and/or configurations that may be suitable for use with the invention include, but are not limited to, personal computers (PCs), server computers, hand-held or laptop devices, multi-processor systems, microprocessor-based systems, programmable consumer electronics, network PCs, minicomputers, mainframe computers, and the like, as well as a supercomputing environment. The invention may also be practiced in distributed computing environments where tasks are performed by remote processing devices that are linked through a communications network or other data transmission medium. In a distributed computing environment, program modules may be located in both local and remote computer storage media including memory storage devices.

An exemplary system for implementing the invention includes a computer with components of the computer which may include, but are not limited to, a processing unit, a system memory, and a system bus that couples various system components including the system memory to the processing unit. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer may include a variety of computer readable media. Computer readable media can be any available media that can be accessed by computer and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer.

System memory may include computer storage media in the form of volatile and/or nonvolatile memory such as read only memory (ROM) and random access memory (RAM). A basic input/output system (BIOS), containing the basic routines that help to transfer information between elements within computer, such as during start-up, is typically stored in ROM. RAM typically contains data and/or program modules that are immediately accessible to and/or presently being operated on by processing unit. The computer may also include other removable/non-removable, volatile/nonvolatile computer storage media.

A computer may also operate in a networked environment using logical connections to one or more remote computers, such as a remote computer. The remote computer may be a personal computer, a server, a router, a network PC, a peer device or other common network node, and typically includes many or all of the elements described above relative to the computer. The present invention may apply to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

In another embodiment of the invention, to avoid race conditions, when using a WAC to reduce performance cost of polling, software use ensures two conditions are met such that no invalidates are missed for all the addresses of interest, the processor, and thus the WakeUp unit, is subscribed with the L2 slice to receive invalidates. The following pseudo-code meets the above conditions:

```
loop:
   configure WAC
   software read of all polled addresses
for each address whose value meets desired value, perform action.
if any address met desired value, goto loop:
   wait instruction pauses thread until woken by WakeUp unit
   goto loop.
```

In alternative embodiments the present invention may be implemented in mutli-processor core SMP, like BGQ, wherein each core may be single or multi-threaded. Also, implementation may include a single thread node polling IO device, wherein the polling thread can consume resources, e.g., a crossbar, used by the IO device.

In alternative embodiments the present invention may be implemented in mutli-processor core SMP, like BGQ, wherein each core may be single or multi-threaded. Also, implementation may include a single thread node polling IO device, wherein the polling thread can consume resources, e.g., a crossbar, used by the IO device.

In an additional aspect according to the invention a pause unit may only know if desired memory location was written to. The pause unit may not know if a desired value was written. When a false resume is possible, software has to check condition itself. The pause unit may not miss a resume condition. For example, with the correct software discipline, the WakeUp unit guarantees that a thread will be woken up if the specified address(es) has been written to by any of the other 67 hw threads on the chip. Such writing includes the L2 atomic operations. In other words, the exit condition of a polling loop will never be missed. For a variety of reasons, a thread may be woken even if an the specified address(es) has not been written to. An example is false sharing of the same L1 cache line. Another example is an L2 castout due to resource pressure. Thus an awakened thread software must check if the exit condition of the polling loop has indeed been reached.

In an alternative embodiment of the invention, a pause unit can serve multiple threads. The multiple threads may or may not be within a single processor core. This allows address-compare units and other resume condition hardware to be shared by multiple threads. Further, the threads in the present invention may include barrier, and ticket locks threads.

Also, in an embodiment of the invention, a transaction coming from the processor may be restricted to particular ttypes (memory operation types), for example, MESI shared memory protocol.

In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules which allocate the largest amount of memory or perform the most I/O requests. Hardware performance tools may be built into the system or added at a later point in time.

Currently, processors have minimal support for counting carious instruction types executed by a program. Typically, only a single group of instructions may be counted by a processor by using the internal hardware of the processor. This is not adequate for some applications, where users want to count many different instruction types simultaneously. In addition, there are certain metrics that are used to determine application performance (counting floating point instructions for example), that are not easily measured with current hardware. Using the floating point example, a user may need to count a variety of instructions, each having a different weight, to determine the number of floating point operations performed by the program A scalar floating point multiply would count as one FLOP, whereas a floating point multiply-add instruction would count as 2 FLOPS. Similarly, a quad-vector floating point add would count as 4 FLOPS, while a quad-vector floating point multiply-add would count as 8 FLOPS.

Thus, in a further aspect of the invention, there is provided methods, systems and computer program products for measuring a performance of a program running on a processing unit of a processing system. In one embodiment, the method comprises informing a logic unit of each instruction in the program that is executed by the processing unit, assigning a weight to said each instruction, assigning the instructions to a plurality of groups, and analyzing said plurality of groups to measure one or more metrics of the program.

In one embodiment, each instruction includes an operating code portion, and the assigning includes assigning the instructions to said groups based on the operating code portions of the instructions. In an embodiment, each instruction is one type of a given number of types, and the assigning includes assigning each type of instruction to a respective one of said plurality of groups. In an embodiment, these groups may be combined into a plurality of sets of the groups.

In an embodiment of the invention, to facilitate the counting of instructions, the processor informs an external logic unit of each instruction that is executed by the processor. The external unit then assigns a weight to each instruction, and assigns it to an opcode group. The user can combine opcode groups into a larger group for accumulation into a performance counter. This assignment of instructions to opcode groups makes measurement of key program metrics transparent to the user.

As shown and described herein with respect to FIG. 1-0, the 32 MB shared L2 is sliced into 16 units, each connecting to a slave port of the switch 60. Every physical address is mapped to one slice using a selection of programmable address bits or a XOR-based hash across all address bits. The L2-cache slices, the L1Ps and the L1-D caches of the A2s are hardware-coherent. A group of 4 slices is connected via a ring to one of the two DDR3 SDRAM controllers 78.

As described above, each processor includes four independent hardware threads sharing a single L1 cache with sixty-four byte line size. Each memory line is stored in a particular L2 cache slice, depending on the address mapping. The sixteen L2 slices effectively comprise a single L2 cache. Those skilled in the art will recognize that the invention may be embodied in different processor configurations.

FIG. 5-13-2 illustrates one of the processor units 8200 of system 8050. The processor unit includes a QPU 8210, an A 2 processor core 8220, and L1 cache, and a level 1 pre-fetch (L1P) 8230. The QPU has a 32B wide data path to the L1-cache of the A2 core, allowing it to load or store 32B per cycle from or into the L1-cache. Each core is directly connected to a private prefetch unit (level-1 prefetch, L1P) 8230, which accepts, decodes and dispatches all requests sent out by the A2 core. The store interface from the A2 core to the L1P is 32B wide and the load interface is 16B wide, both operating at processor frequency. The L1P implements a fully associative 32 entry prefetch buffer. Each entry can hold an L2 line of 128B size.

The L1P 8230 provides two prefetching schemes: a sequential prefetcher, as well as a list prefetcher. The list prefetcher tracks and records memory requests sent out by the core, and writes the sequence as a list to a predefined memory region. It can replay this list to initiate prefetches for repeated sequences of similar access patterns. The sequences do not have to be identical, as the list processing is tolerant to a limited number of additional or missing accesses. This automated learning mechanism allows a near perfect prefetch behavior for a set of important codes that show the required access behavior, as well as perfect prefetch behavior for codes that allow precomputation of the access list.

Each PU 8200 connects to a central low latency, high bandwidth crossbar switch 8240 via a master port. The central crossbar routes requests and write data from the master ports to the slave ports and read return data back to the masters. The write data path of each master and slave prot is 16B wide. The read data return port is 32B wide.

As mentioned above, currently, processors have minimal support for counting various instruction types executed by a program. Typically, only a single group of instructions may be counted by a processor by using the internal hardware of the processor. This is not adequate for some applications, where users want to count many different instruction types simultaneously. In addition, there are certain metrics that are used to determine application performance (counting floating point instructions for example) that are not easily measured with current hardware.

Embodiments of the invention provide methods, systems and computer program products for measuring a performance of a program running on a processing unit of a processing system. In one embodiment, the method comprises informing a logic unit of each instruction in the program that is executed by the processing unit, assigning a weight to said each instruction, assigning the instructions to a plurality of groups, and analyzing said plurality of groups to measure one or more metrics of the program.

With reference to FIG. 5-13-3, to facilitate the counting of instructions, the processor informs an external logic unit 8310 of each instruction that is executed by the processor. The external unit 8310 then assigns a weight to each instruction, and assigns it to an opcode group 8320. The user can combine opcode groups into a larger group 8330 for accumulation into a performance counter. This assignment of instructions to opcode groups makes measurement of key program metrics transparent to the user.

As one specific example of the present invention, FIG. 5-13-4 shows a circuit 8400 that may be used to count a variety of instructions, each having a different weight, to determine the number of floating point operations performed by the program. The circuit 8400 includes two flop select gates 8402, 8404 and two ops select gates 8406, 8410. Counters 8412, 8414 are used to count the number of outputs from the flop gates 8402, 8404, and the outputs of select gates 8406, 8410 are applied to reduce gates 8416, 8420. Thread compares 8422, 8424 receive thread inputs 8426, 8430 and the outputs of reduce gates 8416, 8420. Similarly, thread compares 8432, 8434 receive thread inputs 8426, 8430 and the outputs of flop counters 8412, 8414.

The implementation, in an embodiment, is hardware dependent. The processor runs at two times the speed of the counter, and because of this, the counter has to process two cycles of A2 data in one counter cycle. Hence, the two OPS0/1 and the two FLOPS0/1 are used in the embodiment of FIG. 5-13-4. If the counter were in the same clock domain as the processor, only a single OPS and a single FLOPS input would be needed. An OPS and a FLOPS are used because the A2 can execute one integer and one floating point operation per cycle, and the counter needs to keep up with these operations of the A2.

In one embodiment, the highest count that the A2 can produce is 9. This is because the maximum weight assigned to one FLOP is 8 (the highest possible weight this embodiment), and, in this implementation, all integer instructions have a weight of 1. This totals 9 (8 flop and 1 op) per A2 cycle. When this maximum count is multiplied by two clock cycles per counting cycle, the result is a maximum count of 18 per count cycle, and as a result, the counter has to be able to add from 0-18 every counting cycle. Also, because all integer instructions have a weight of 1, a reduce (logical OR) is done in the OP path, instead of weighting logic like on the FLOP path.

Boxes 8402/8404 perform the set selection logic. They pick which groups go into the counter for adding. The weighting of the incoming groups happens in the FLOP_CNT boxes 8412/8414. In an implementation, certain groups are hard coded to certain weights (e.g. FMA gets 2, quad fma gets 8). Other group weights are user programmable (DIV/SQRT), and some groups are hard coded to a weight of 1. The reduce block on the op path functions as an OR gate because, in this implementation, all integer instructions are counted as 1, and the groups are mutually exclusive since each instruction only goes into one group. In other embodiments, this reduce box can be as simple as an OR gate, or complex, where, for example, each input group has a programmable weight.

The Thread Compare boxes are gating boxes. With each instruction that is input to these boxes, the thread that is executing the instruction is recorded. A 4 bit mask vector is input to this block to select which threads to count. Incrementers 8436 and 8440 are used, in the embodiment shown in FIG. 5-13-4, because the value of the OP input is always 1 or 0. If there were higher weights on the op side, a full adder of appropriate size may be used. The muxes 8442 and 8444 are used to mux in other event information into the counter 8446. For opcode counting, in one embodiment, these muxes are not needed.

The outputs of thread compares 8422, 8424 are applied to and counted by incrementer 8436, and the outputs of thread compares 8432, 8434 are applied to and counted by incrementer 8440. The outputs of incrementers 8436, 8440 are passed to multiplexers 8442, 8444, and the outputs of the multiplexers are applied to six bit adder 8446. The output of six bit adder 8446 is transmitted to fourteen bit adder 8450, and the output of the fourteen bit adder is transmitted to counter register 8452.

There is further provided a method and system for enhancing barrier collective synchronization in message passing interface (MPI) applications with multiple processes running on a compute node for use in a massively parallel supercomputer, wherein the compute nodes may be connected by a fast interconnection network.

In known computer systems, a message passing interface barrier (MPI barrier) is an important collective synchronization operation used in parallel applications or parallel computing. Generally, MPI is a specification for an application programming interface which enables communications between multiple computers. In a blocking barrier, the progress of the process or a thread calling the operation is blocked until all the participating processes invoke the operation. Thus, the barrier ensures that a group of threads or processes, for example in the source code, stop progress until all of the concurrently running threads (or processes) progress to reach the barrier.

A non-blocking barrier can split a blocking barrier into two phases: an initiation phase, and a waiting phase, for waiting for the barrier completion. A process can do other work in-between the phases while the barrier progresses in the background.

The collection of the processes invoking the barrier operation is embodied in MPI using a communicator. The communicator stores the necessary state information for a barrier algorithm. An application can create as many communicators as needed depending on the availability of the resources. For a given number of processes, there could be exponential number of communicators resulting in exponential space requirements to store the state. In this context, it is important to have an efficient space bounded algorithm to ensure scalable implementations.

For example, on an exemplary supercomputer system, a barrier operation within a node can be designed via the fetch-and-increment atomic operations. To support an arbitrary communicator, an atomic data entity needs to be associated with the communicator. As discussed above, making every communicator contain this data item leads to storage space waste. In one approach to this problem, a single global data structure element is used for all the communicators. However, as discussed in further detail below, this is inefficient as concurrent operations are serialized when a single resource is available.

In one embodiment of a supercomputer, a node can have several processes and each process can have up to four hardware threads per core. MPI allows for concurrent operations initiated by different threads. However, each of these operations needs to use different communicators. The operations are serialized because there is only a single resource. For all the operations to progress concurrently it is imperative that separate resources need to be allocated to each of the communicators. This results in undesirable use of storage space.

One way of allocating counters is to allocate one counter for each communicator as different threads can only call collectives on different communicators as per the MPI standard. Then, the counter can be immediately located based on a communicator ID. However, a drawback of the above approach results in inferior utilization of memory space.

There is therefore a need for a method and system to allocate counters for communicators while enhancing efficiency of utilization of memory space. Further, there is a need for a method and system to use less memory space when allocating counters. It would also be desirable for a method and system to allocate counters for each communicator using the MPI standard, while reducing memory allocation usage.

Generally, in a blocking barrier, the progress of the process or a thread calling the operation will be blocked until all the participating processes invoked the operation. The collection of the processes invoking the barrier operation is embodied in message passing interface (MPI) using a communicator. The communicator stores the necessary state information for the barrier algorithm. The Barrier operation may use multiple processes/threads on a node. An MPI process may consist of more than one thread. In the text, the software driven processes or threads is used interchangebly where appropriate to explain the mechanisms referred herein.

Fast synchronization primitives on a supercomputer, for example, IBM® Blue Gene®, via the fetch-and-increment atomic mechanism can be used to optimize the MPI barrier collective call within a node with many processes. This intranode mechanism needs to be coupled with a network barrier for barrier across all the processes. A node can have several processes and each process can have many threads with a maximum limit, for example, of 64. For simultaneous transfers initiated by different threads, different atomic counters need to be used.

Referring to FIG. 6-2-1, a system 81010 and method according to one embodiment of the invention includes a mechanism wherein each communicator 81050 designates a master core in a multi-processor environment of a computer system 81020. FIG. 6-2-1 shows two processors 81026 for illustrative purposes, however, more processors may be used. Also, the illustrated processors 81026 are exemplary of processors or cores. One counter 81060 for each thread 81030 is allocated. A table 70 with a number of entries equal to the maximum number of threads 81030 is used by each of the counters 81060. The table 70 is populated with the thread entries. When a process thread 81030 initiates a collective of processors 81026, if it is a master core, it sets a table 70 entry with an ID number 81074 of an associated communicator 81050. Threads of non-master processes poll the entries of the master process to discover the counter to use for the collective. The counter is discovered by searching entries in the table 70. An advantage of the system 81010 is that space overhead is considerably reduced, as typically only a small number of communicators are used at a given time occupying the first few slots in the table.

Similarly, in another embodiment of the invention, the system above used for blocking communications can be extended to non-blocking communications. Instead of using a per thread resource allocation, a central pool of resources can be allocated. A master process or thread per communicator is responsible for claiming the resources from the pool and freeing the resources after their usage. The resources are allocated and freed in a safe manner as multiple concurrent communications can occur simultaneously. More specifically, as the resources are mapped to the different communications, care must be taken that no two communications get the same resource, otherwise, the operation is error prone. The process or thread participating in the resource allocation/de-allocation should use mechanisms such as locking to prevent such scenarios.

For a very large number of communicators, allocating one counter per communicator will pose severe scalability issues. Using such large number of counters results in a wastage of memory space, especially in a computer system that has limited memory per thread.

When blocking communications, one counter per thread is needed in a process, as that is the maximum number of active collective operations via MPI. In the present invention, the system 81010 includes a mechanism where each communicator 81050 designates a master core 81026 in the multi-processor environment. In the system 81010, there is one counter 81060 for each thread 81030, and each counter has a table 70 with a number of entries equal to the maximum number of threads. When a process thread 81030 initiates a collective of processors 81026, if it is the master core it sets the table 70 entry 81078 with the ID 81074 of the communicator 81050. Threads 81030 of non-master processes just poll the entries 81078 of the master process to discover the counter 81060 to use for the collective. Table 1 below further illustrates the basic mechanism of the system 81010.

In Table 1: #counters=#threads=64 on a super computer system; Processes or threads Ids={0, 1, 2, 3}; Running on cores={0, 1, 2, 3}; Communicator 1={0, 1, 2}; Master core=0; Communicator 2={1, 2, 3}; and Master core=1. Table entries are as below:

TABLE 1

| Communicator | Atomic Counter |
|---|---|
| Communicator 1 | Atomic Counter 1 |
| Communicator 2 | Atomic Counter 2 |
| Null | Null |
| Null | Null |

In Table 1 above, the counter is discovered by searching entries in the table, however, space overhead is considerably reduced. The searching power overhead for a computer is small, as typically only a small number of communicators are given time to occupy the first few slots in the table.

In another embodiment of the invention, for non-blocking communications, instead of using a per thread resource allocation, a central pool of resources is allocated. A master process or thread per communicator is responsible for claiming the resources from this pool and freeing the resources after their usage. However, it is important that the resources are allocated/freed in a safe manner as multiple concurrent communications can happen simultaneously.

Additionally, the mechanism/system 81010 according to the present invention may be applied to other collective operations needing finite amount of resources for their operation. The mechanisms applied in the present invention can also be applied to other collective operations such as an MPI operation, for example, MPI Allreduce. Such an operation as MPI_Allreduce performs a global reduce operation on the data provided by the application.

Similar to the Barrier operation with multiple processes/threads on a node, it also requires a shared pool of resources, in this context, a shared pool of memory buffers where the data can be reduced. The algorithm described in this application for resource sharing can be applied to shared the pool of memory buffers for MPI_Allreduce for different communicators.

Thereby, in the present invention, the system 81010 provides a mechanism where each communicator designates a master core in the multi-processor environment. One counter for each thread is allocated and has a table with number of entries equal to the maximum number of threads. When a process thread initiates a collective, if it is the master core, it sets the table entry with the ID of the communicator. Threads of non-master processes just poll the entries of the master process to discover the counter to use for the collective.

Referring to FIG. 6-2-2, a method 81100 according to the embodiment of the invention depicted in FIG. 6-2-1 includes in step 81104 providing a computer system. The computer system 81010 (FIG. 6-2-1) includes a data storage device 81022, a program 81024 stored in the data storage device and a multiplicity of processors 81026. Step 108 includes allocating a counter for each of a plurality of threads. Step 81112 includes providing a plurality of communicators for storing state information for a barrier algorithm, and each communicator designates a master core for each communicator. Step 81116 includes the master core configuring a table with a number of entries equal to a maximum number of threads, and setting table entries. The table entries include setting a table entry with an ID associated with a communicator when a process thread initiates a collective. Step 81124 includes determining the allocated counter by searching entries in the table using other cores, i.e., non-master cores. Step 81132 includes the threads of at least one non-master core polling the entries of the master core for determining the counter for use with the collective, and finishing operations. Step 81136 includes completing a barrier operation or an All_reduce operation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. 6-2-1-6-2-2 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Modern processors typically include multiple hardware threads, allowing for the concurrent execution of multiple software threads on a single processor. Due to silicon area and power constraints, it is not possible to have each hardware thread be completely independent from other threads. Each hardware thread shares resources with the other threads. For example, execution units (internal to the processor), and memory and 10 subsystems (external to the processor), are resources typically shared by each hardware thread. In many programs, at times a thread must wait for an action to occur external to the processor before continuing its program flow. For example, a thread may need to wait for a memory location to be updated by another processor, as in a barrier operation. Typically, for highest speed, the waiting thread would poll the address residing in memory, waiting for the thread to update it. This polling action takes resources away from other competing threads on the processor. In this example, the load/store unit of the processor would be utilized by the polling thread, at the expense of the other threads that share it.

The performance cost is especially high if the polled variable is L1-cached (primary cache), since the frequency of the loop is highest. Similarly, the performance cost is high if, for example, a large number of L1-cached addresses are polled, and thus take L1 space from other threads.

Multiple hardware threads in processors may also apply to high performance computing (HPC) or supercomputer systems and architectures such as IBM® BLUE GENE® parallel computer system, and to a novel massively parallel supercomputer scalable, for example, to 100 petaflops. Massively parallel computing structures (also referred to as "supercomputers") interconnect large numbers of compute nodes, generally, in the form of very regular structures, such as mesh, torus, and tree configurations. The conventional approach for the most cost/effective scalable computers has been to use standard processors configured in uni-processors or symmetric multiprocessor (SMP) configurations, wherein the SMPs are interconnected with a network to support message passing communications. Currently, these supercomputing machines exhibit computing performance achieving 1-3 petaflops.

There is therefore a need to increase application performance by reducing the performance loss of the application, for example, reducing the increased cost of software in a loop, for example, software may be blocked in a spin loop or similar blocking polling loop. Further, there is a need to reduce performance loss, i.e., consuming processor resources, caused by polling and the like to increase overall performance. It would also be desirable to provide a system and method for polling external conditions while minimizing consuming processor resources, and thus increasing overall performance.

Referring to FIG. 6-3-1, a system 82010 according to one embodiment of the invention for enhancing performance of a computer includes a computer 82020. The computer 82020 includes a data storage device 82022 and a software program 82024 stored in the data storage device 82022, for example, on a hard drive, or flash memory. A processor 82026 executes the program instructions from the program 82024. The computer 82020 is also connected to a data interface 82028 for entering data and a display 82029 for displaying information to a user. The processor 82026 initiates a pause state for a thread 82040 in the processor 82026 for waiting for receiving a specified condition. The specified condition may include detecting specified data, or in an alternative embodiment, a plurality of specified conditions. The thread 82040 in the processor 82026 is put into pause state while waiting for the specified condition. Thus, the thread 82040 does not consume resources needed by other threads in the processor while in pause state. A pin 82030 in the processor 82026 is configured to initiate the resumption of an active state of the thread 82040 from the pause state when the specified condition is detected. A logic circuit 82050 is external to the processor 82026 and monitors specified computer resources. The logic circuit 82050 is configured to detect the specified condition. The logic circuit 82050 activates the pin 82030 when the specified condition is detected by the logic circuit 82050. Upon activation, if the thread is in the pause state, the pin 82030 wakes the thread from the pause state, which thereby resumes its active state. If the pin is armed, the thread will not be put into the pause state upon request of a wait instruction by the thread. This ensures that no conditions are lost between the time the thread configures the logic circuit and the time initiates pause mode. For example, if the pin is in an armed state, i.e., the pin is set to return the threads to the active state; the pin prevents transitioning the thread into the pause state, thereby, the thread remains in an active state.

Thereby, the present invention executes the wait instruction 82034 (FIG. 6-3-1) requesting the pause state for the thread, depending on the value of the pin, the thread is allowed to go to the pause state or not. If the pin is in an armed state then the transition to the pause state is not allowed to occur, and if the pin in not in the armed state then the transition to pause state is granted. Thereby, the above mechanism prevents the thread from consuming resources needed by other threads in the processor until the pin is asserted. The logic circuit external to the processor can then be used to monitor for the action that the thread is waiting for (for example, a write to a certain memory address), and assert the pin, which in turn wakes the thread. Thus, for example, the present invention provides a mechanism for transitioning a polling thread into a pause state, until a pin on the processor is asserted. Thereby, the above mechanism allows the processor to service other threads during the time that the waiting thread's location has not been updated. More generally, the pin may be used to initiate waking of a thread for any action that occurs outside the processor.

Referring to FIG. 6-3-2, a method 82100 for enhancing performance of a computer system according to an embodiment of the invention includes providing a computer program in a computer system in step 82104. The method 82100 incorporates the embodiment of the invention shown in FIG. 6-3-1 of the system 82010. As in the system 82010, the computer system 82020 includes the computer program 82024 stored in the computer system 82020 in step 82104. A processor 82026 in the computer system 82020 processes instructions from the program 82024 in step 82108. The processor is provided with a pin in step 82112. A logic circuit 82050 is provided in step 82116 for monitoring specified computer resources which is external to the processor. The logic circuit 82050 is configured to detect a specified condition in step 82120 using the processor. The processor is configured for the pin in step 82124 such that the thread can be put into a pause state, and returned to an active state by the pin. The thread executes a wait instruction initiating the pause state for the thread in step 82128. The logic circuit 82050 monitors specified computer resources which includes a specified condition in step 82132. The logic circuit 82050 detects the specified condition in step 82136. The logic circuit 82050 activates the pin 82030 in step 82140 after detecting the specified condition in step 82136. The activated pin 82030 initiates the active state for the thread 82040.

Referring to FIG. 6-3-3, a system 82200 according to the present invention, depicts an external logic circuit 82210 relationship to a processor 82220 and to level-1 cache (L1p unit) 82240. The processor includes multiple hardware threads 82040. Each processor 82220 has a logic circuit unit 82110 (one processor 82220 is shown as representative of multiple processors). The logic circuit 82210 is configured and accessed using memory mapped I/O (MMIO). The system 82100 further includes an interrupt controller (BIC) 82130, and an L1 prefetcher unit 82150.

Thereby, the present invention offloads the monitoring of computing resources, for example memory resources, from the processor to the pin and logic circuit. Instead of having to poll a computing resource, a thread configures the logic circuit with the information that it is waiting for, i.e., the occurrence of a specified condition, and initiates a pause state. The thread in pause state no longer consumes processor resources while it is waiting for the external condition. Subsequently, the pin wakes the thread when the appropriate condition is detected by the logic circuit. A variety of conditions can be monitored according to the present invention, including, but not limited to, writing to memory locations, the occurrence of interrupt conditions, reception of data from I/O devices, and expiration of timers.

The method of the present invention is generally implemented by a computer executing a sequence of program instructions for carrying out the steps of the method and may be embodied in a computer program product comprising media storing the program instructions. Although not required, the invention can be implemented via an application-programming interface (API), for use by a developer, and/or included within the network browsing software, which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations.

Other well known computing systems, environments, and/or configurations that may be suitable for use with the invention include, but are not limited to, personal computers (PCs), server computers, hand-held or laptop devices, multi-processor systems, microprocessor-based systems, programmable consumer electronics, network PCs, minicomputers, mainframe computers, and the like, as well as a supercomputing environment. The invention may also be practiced in distributed computing environments where tasks are performed by remote processing devices that are linked through a communications network or other data transmission medium. In a distributed computing environment, program modules may be located in both local and remote computer storage media including memory storage devices.

In another embodiment of the invention, the system 82010 and method 82100 of the present invention may be used in a supercomputer system. The supercomputer system may be expandable to a specified amount of compute racks, each with predetermined compute nodes containing, for example, multiple A2 processor cores. For example, each core may be associated to a quad-wide fused multiply-add SIMD floating point unit, producing 8 double precision operations per cycle, for a total of 128 floating point operations per cycle per compute chip. Cabled as a single system, the multiple racks can be partitioned into smaller systems by programming switch chips, which source and terminate the optical cables between midplanes.

Further, for example, each compute rack may consists of 2 sets of 82512 compute nodes. Each set may be packaged around a doubled-sided backplane, or midplane, which supports a five-dimensional torus of size 4×4×4×4×2 which is the communication network for the compute nodes which are packaged on 16 node boards. The tori network can be extended in 4 dimensions through link chips on the node boards, which redrive the signals optically with an architecture limit of 64 to any torus dimension. The signaling rate may be 10 Gb/s, 8/10 encoded), over about 20 meter multi-mode optical cables at 850 nm. As an example, a 96-rack system is connected as a 16×16×16×12×2 torus, with the last x2 dimension contained wholly on the midplane. For reliability reasons, small torus dimensions of 8 or less may be run as a mesh rather than a torus with minor impact to the aggregate messaging rate. One embodiment of a supercomputer platform contains four kinds of nodes: compute nodes (CN), I/O nodes (ION), login nodes (LN), and service nodes (SN).

An exemplary system for implementing the invention includes a computer with components of the computer which may include, but are not limited to, a processing unit, a system memory, and a system bus that couples various system components including the system memory to the processing unit. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer may include a variety of computer readable media. Computer readable media can be any available media that can be accessed by computer and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer.

System memory may include computer storage media in the form of volatile and/or nonvolatile memory such as read only memory (ROM) and random access memory (RAM). A basic input/output system (BIOS), containing the basic routines that help to transfer information between elements within computer, such as during start-up, is typically stored in ROM. RAM typically contains data and/or program modules that are immediately accessible to and/or presently being operated on by processing unit. The computer may also include other removable/non-removable, volatile/nonvolatile computer storage media.

A computer may also operate in a networked environment using logical connections to one or more remote computers, such as a remote computer. The remote computer may be a personal computer, a server, a router, a network PC, a peer device or other common network node, and typically includes many or all of the elements described above relative to the computer. The present invention may apply to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

In an embodiment of the invention, the processor core allows a thread to put itself or another thread to into a pause state. A thread in kernel mode puts itself into a pause state using a wait instruction or an equivalent instruction. A paused thread can be woken by a falling edge on an input signal into the processor 82220 core 82222. Each thread 0-3 has its own corresponding input signal. In order to ensure that a falling edge is not "lost", a thread can only be put into a pause state if its input is high. A thread can only be put into a paused state by instruction execution on the core or presumably by low-level configuration ring access. The logic circuit wakes a thread. The processor 82220 cores 82222 wake up a paused thread to handle enabled interrupts. After interrupt handling completes, the thread will go back into a paused state, unless the subsequent pause state is overriden by the handler. Thus, interrupts are transparently handled. The logic circuit allows a thread to wake any other thread, which can be kernel configured such that a user thread can or cannot wake a kernel thread.

The logic circuit may drive the signals such that a thread of the processor 82220 will wake on a rising edge. Thus, throughout the logic circuit, a rising edge or value 1 indicates wake-up. The logic circuit may support 32 wake sources. The wake sources may comprise 12 WakeUp address compare (WAC) units, 4 wake signals from the message unit (MU), 8 wake signals from the BIC's core-to-core (c2c) signaling, 4 wake signals are GEA outputs 12-15, and 4 so-called convenience bits. These 4 bits are for software convenience and have no incoming signal. The other 28 sources can wake one or more threads. Software determines which sources wake corresponding threads.

In an embodiment of the invention, the thread pausing instruction sequence, includes:

1. Software setting bits to enable the allowed wakeup options for a thread. Enabling specific exceptions to interrupt the paused thread and resume execution. Each thread has a set of Wake Control bits which determine how the corresponding thread can be started after a pause state has been entered.

In an alternative embodiment of the invention, a pause unit can serve multiple threads. The multiple threads may or may not be within a single processor core. This allows address-compare units and other resume condition hardware to be shared by multiple threads. Further, the threads in the present invention may include barrier, and ticket locks threads.

Traditional operating systems rely on a MMU (memory management unit) to create mappings for applications. However, it is often desirable to create a hole between application heap and application stacks. The hole catches applications that may be using too much stack space, or buffer overruns.

Thus, there is further provided a system and a method for an operating system to create mappings for applications when the operating system cannot create a hole between application heap and application stacks.

A system and method is also provided for an operating system to create mappings as above when the operating system creates a static memory mapping at application startup, such as in a supercomputer. It would also be desirable to provide a system and method for an alternative to using a processor or debugger application or facility to perform a memory access check.

Referring to FIG. 6-4-1, a system 85100 according to the present invention, depicts an external wakeup unit 85110 relationship to a processor 85120, and to a memory device embodied as level-1 cache (L1p unit) 85140. The term processor is used interchangeably herein with core. Alternatively, multiple cores may be used wherein each of the cores 85120 has a wakeup unit 85110. The wakeup 85110 is configured and accessed using memory mapped I/O (MMIO) only from its own core. The system 85100 further includes a bus interface card (BIC) 85130, and a crossbar switch (not shown).

In one embodiment of the invention, the wakeup unit 85110 drives a hardware connection 85112 to the bus interface card (BIC) 85130 designated by the code OR(enabled WAC0-11). A processor 85120 thread 85440 (FIG. 6-4-4) wakes or activates on a rising edge. Thus, throughout the wakeup unit 85110, a rising edge or value 1 indicates wakeup. The wakeup unit 85110 sends an interrupt signal along connection 85112 to the BIC 85130, which is forwarded to the processor 85120. Alternatively, the wakeup unit 85110 may send an interrupt signal directly to the processor 85120.

Referring to FIG. 6-4-1, an input/output (I/O) line 65152 is a read/write memory I/O line (r/w MMIO) that allows the processor to go through L1P 85140 to program and/or configure the wakeup unit 85110. An input line 85154 into the wake up unit 85110 allows L1P 85140 memory accesses to be forwarded to the wake up unit 85110. The wake up unit 85110 is analyzing wakeup address compare (WAC) registers 85452 (shown in FIG. 6-4-4) to determine if accesses (loads and stores) happen in one of the ranges that are being watched with the WAC registers, and if one of the ranges is effected. If one of the ranges is effected the wake up unit 85110 will enable a bit resulting in an interrupt of the processor 85120. Thus, the wake up unit 85110 detects memory bus activity as a way of detecting guard page violations.

Referring to FIG. 6-4-2, a system 85200 includes a single process on a core 85214 with five threads. One thread is not scheduled onto a physical hardware thread (hwthread), and thus its guard page is not active. Guard pages are regions of memory that the operating system positions at the end of the application's stack (i.e., a location of computer memory), in order to prevent a stack overrun. An implicit range of memory covers the main thread, and explicit ranges of memory for each created thread. Contrary to known mechanisms, the system of the present invention only protects the main thread and the active application threads (i.e., if there is a thread that is not scheduled, it is not protected). When a different thread is activated on a core, the system deactivates the protection on the previously active thread and configures the core's memory watch support for the active thread.

The core 85214 of the system 85200 includes a main hardware (hw) thread 85220 having a used stack 85222, a growable stack 85224, and a guard page 85226. A first heap region 85230 includes a first stack hwthread 85232 and guard page 85234, and a third stack hwthread 85236 and a guard page 85238. A second heap region 85240 includes a stack pthread 85242 and a guard page 85244, and a second stack hwthread 85246 and a guard page 85248. The core 85214 further includes a read-write data segment 85250, and an application text and read-only data segment 85252.

Using the wakeup unit's 85110 registers 85452 (FIG. 6-4-4), one range is needed per hardware thread. This technique can be used in conjunction with the existing processor-based memory watch registers in order to attain the necessary protection. The wakeup unit 85110 ranges can be specified via a number of methods, including starting address and address mask, starting address and length, or starting and stopping addresses.

The guard pages have attributes which typically include the following features:

- A fault occurs when the stack overruns into the heap by the offending thread, (e.g., infinite recursion);
- A fault occurs when any thread accesses a structure in the heap and indexes too far into the stack (e.g., array overrun);
- Data detection, not prevention of data corruption;
- Catching read violations and write violations;
- Debug exceptions occur at critical priority;
- Data address of the violation may be detected, but is not required;
- Guard pages are typically aligned—usually to a 4kB boundary or better. The size of the guard page is typically a multiple of a 4kB pagesize;
- Only the kernel sets/moves guard pages;
- Applications can set the guard page size;
- Each thread has a separate guard region; and
- The kernel can coredump the correct process, to indicate which guard page was violated.

Thereby, instead of using the processor or debugger facilities to perform the memory access check, the system 85100 of the present invention uses the wakeup unit 85110. The wakeup unit 85110 detects memory accesses between the level-1 cache (L1p) and the level-2 cache (L2). If the L1p is fetching or storing data into the guard page region, the wakeup unit will send an interrupt to the wakeup unit's core.

Referring to FIG. 6-4-3, a method 85300 according to an embodiment of the invention includes, step 85304 providing a computer system 85420 (shown in FIG. 6-4-4). Using the wakeup unit 85110, the method 85300 detects access to a memory device in step 85308. The memory device may include level-1 cache (L-1), or include level-1 cache to level-2 cache (L-2) data transfers. The method invalidates memory ranges in the memory device using the operating system. In one embodiment of the invention, the memory ranges include L-1 cache memory ranges in the memory device corresponding to a guard page.

The following steps are used to create/reposition/resize a guard page for an embodiment of the invention:

1) Operating system 85424 invalidates L1 cache ranges corresponding to the guard page. This ensures that an L1 data read hit in the guard page will trigger a fault. In another embodiment of the invention, the above step may be eliminated;
2) Operating system 85424 selects one of the wakeup address compare (WAC) registers 85425;

3) Operating system 85424 sets up a WAC register 85452 to the guard page; and 4) Operating system 85424 configures the wakeup unit 85110 to interrupt on access.

Referring to FIG. 6-4-3, in step 85312 of the method 85300, the operating system invalidates level-1 cache ranges corresponding to a guard page using the operating system. The method 85300 configures the plurality of WAC registers to allow access to selected WAC registers in step 85316. In step 85320, one of the plurality of WAC registers is selected using the operating system. The method 85300 sets up a WAC register related to the guard page using the operating system in step 85324. The wakeup unit is configured to interrupt on access of the selected WAC register using the operating system 85424 (FIG. 6-4-4) in step 85328. In step 85332, the guard page is moved using the operating system 85424 when a top of a heap changes size. Step 85336 detects access of the memory device using the wakeup unit when a guard page is violated. Step 85340 generates an interrupt to the core using the wakeup unit 85110. Step 85344 queries the wakeup unit using the operating system 85424 when the interrupt is generated to determine the source of the interrupt. Step 85348 detects the activated WAC registers assigned to the violated guard page. Step 85352 initiates a response using the operating system after detecting the activated WAC registers.

According to the present invention, the WAC registers may be implemented as a base address and a bit mask. An alternative implementation could be a base address and length, or base starting address and base ending address. In step 85332, the operating system moves the guard page whenever the top of the heap changes size. Thus, in one embodiment of the invention, when a guard page is violated, the wakeup unit detects the memory access from L1p->L2 and generates an interrupt to the core 85120. The operating system 85424 takes control when the interrupt occurs and queries the wakeup unit 85110 to determine the source of the interrupt. Upon detecting the WAC registers 85452 assigned to the guard page that have been activated or tripped, the operating system 85424 then initiate a response, for example, delivering a signal, or terminating the application.

When a hardware thread changes the guard page of the main thread, it sends an interprocessor interrupt (IPI) to the main hwthread only if the main hwthread resides on a different processor 85120. Otherwise, the thread that caused the heap to change size can directly update the wakeup unit WAC registers. Alternatively, the operating system could ignore this optimization and always interrupt.

Unlike other supercomputer solutions, the data address compare (DAC) registers of the processor of the present invention are still available for debuggers to use and set. This enables the wakeup solution to be used in combination with the debugger.

Referring to FIG. 6-4-4, a system 85400 according to one embodiment of the invention for enhancing performance of a computer includes a computer 85420. The computer 85420 includes a data storage device 85422 and a software program 85424, for example, an operating system. The software program or operating system 85424 is stored in the data storage device 85422, which may include, for example, a hard drive, or flash memory. The processor 85120 executes the program instructions from the program 85424. The computer 85420 is also connected to a data interface 85428 for entering data and a display 85429 for displaying information to a user. The external wakeup unit 85110 includes a plurality of WAC registers 85452. The external unit 85110 is configured to detect a specified condition, or in an alternative embodiment, a plurality of specified conditions. The external unit 85110 may be configured by the program 85424. The external unit 85110 waits to detect the specified condition. When the specified condition is detected by the external unit 85110, a response is initiated.

In an alternative embodiment of the invention the memory device includes cache memory. The cache memory is positioned adjacent to and nearest the wakeup unit and between the processor and the wakeup unit. When the cache memory fetches data from a guard page or stores data into the guard page, the wakeup unit sends an interrupt to a core of the wakeup unit. Thus, the wakeup unit can be connected between selected levels of cache.

Referring to FIG. 6-4-5, in an embodiment of the invention, step 85316 shown in FIG. 6-4-3 continues to step 85502 of sub-method 85500 for invalidating a guard page range in all levels of cache between the wakeup unit and the processor. In step 85504 the method 85300 configures the plurality of WAC registers by selecting one of the WAC registers in step 85506 and setting up a WAC register in step 85508. The loop between steps, 85504, 85506 and 85508 is reiterated for "n" number of WAC registers. Step 85510 includes configuring the wakeup unit to interrupt on access of the selected WAC register.

Referring to FIG. 6-4-6, in an embodiment of the invention, step 85332 of the method 85300 shown in FIG. 6-4-3 continues to step 85602 of sub-method 85600 wherein an application requests memory from a kernel. In step 85604 the method 85300 ascertains if the main guard page is moved, if yes, the method proceeds to step 85606, if not, the method proceeds to step 85610 where the subprogram returns to the application. Step 85606 ascertains whether the application is running on the main thread core, if yes, the sub-method 85600 continues to step 85608 to configure WAC registers for the updated main thread's guard page. If the answer to step 85606 is no, the sub-method proceeds to step 85612 to send an interprocessor interrupt (IPI) to the main thread. Step 85614 include the main thread accepting the interrupt, and the sub-method 85600 continues to step 85608.

Referring to FIG. 6-4-7, in an embodiment of the invention, step 85336 of the method 85300 shown in FIG. 6-4-3 continues to step 85702 of sub-method 85700 for detecting memory violation of one of the WAC ranges for a guard page. Step 85704 includes generating an interrupt to the hwthread using the wakeup unit. Step 85706 includes querying the wakeup unit when the interrupt is generated. Step 85708 includes detecting the activated WAC registers. Step 85710 includes initiating a response after detecting the activated WAC registers.

Referring to FIG. 6-4-8, a high level method 85800 encompassing the embodiments of the invention described above includes step 85802 starting a program. Step 85804 includes setting up memory ranges of interest. While the program is running in step 85806, the program handles heap/stack movement in step 85808 by adjusting memory ranges in step 85804. Also, while the program is running in step 85806, the program handles access violations in step 85810. The access violations are handled by determining violation policy in step 85812. When the policy violation is determined in step 85812, the program can continue running in step 85806, or terminate in step 85816, or proceed to another step 85814 having an alternative policy for access violation.

IBM BLUEGENE™/L and P parallel computer systems use a separate collective network, such as the logical tree network disclosed in commonly assigned U.S. Pat. No. 7,650,434, for performing collective communication operations. The uplinks and downlinks between nodes in such a collective network needed to be carefully constructed to avoid deadlocks between nodes when communicating data. In a deadlock, packets cannot move due to the existence of a cycle in the resources required to move the packets. In networks these resources are typically buffer spaces in which to store packets.

If logical tree networks are constructed carelessly, then packets may not be able to move between nodes due to a lack of storage space in a buffer. For example, a packet (packet 1) stored in a downlink buffer for one logical tree may be waiting on another packet (packet 2) stored in an uplink buffer of another logical tree to vacate the buffer space. Furthermore, packet 2 may be waiting on a packet (packet 3) in a different downlink buffer to vacate its buffer space and packet 3 may be waiting for packet 1 to vacate its buffer space. Thus, none of the packets can move into an empty buffer space and a deadlock ensues. While there is prior art for constructing deadlock free routes in a torus for point-to-point packets (Dally "Deadlock-Free Message Routing in Multiprocessor Interconnection Networks" IEEE TRANSACTIONS ON COMPUTERS, VOL. C-36, NO. 5, MAY 1987 and Duato "A General Theory for Deadlock-Free Adaptive Routing Using a Mixed Set of Resources" IEEE TRANSACTIONS ON PARALLEL AND DISTRIBUTED SYSTEMS, VOL. 12, NO. 12, DECEMBER 2001), there are no specific rules for constructing deadlock free collective class routes in a torus network, nor is it obvious how to apply Duato's general rules in such a way to avoid deadlocks when constructing multiple virtual tree networks that are overlayed onto a torus network. If different collective operations are always separated by barrier operations (that do not use common buffer spaces with the collectives nor block on common hardware resources as the collectives), then the issue of deadlocks does not arise and class routes can be constructed in an arbitrary manner. However, this increases the time of the collective operations and therefore reduces performance.

Thus, there is a need in the art for a method and system for performing collective communication operations within a parallel computing network without the use of a separate collective network and in which multiple logical trees can be embedded (or overlayed) within a multiple dimension torus network in such a way as to avoid the possibility of deadlocks. Virtual channels (VCs) are often used to represent the buffer spaces used to store packets. It is further desirable to have several different logical trees using the same VC and thus sharing the same buffer spaces.

FIG. 6-5-1 is an example of a logical tree overlayed onto a multi-dimensional torus. For simplicity, the multi-dimensional torus shown is a two dimensional torus having X and Y dimensions. However, it is understood that a tree network may be embedded within a three dimensional torus having X, Y and Z dimensions and within a five dimensional torus having a, b, c, d and e dimensions. One embodiment of IBM's BlueGene™ parallel processing computing system, BlueGene/Q, employs a five dimensional torus.

The torus comprises a plurality of interconnected compute nodes 86102$_1$ to 86102$_n$. The structure of a compute node 86102 is shown in further detail in FIG. 6-5-2. The torus may be decomposed into one or more sub-rectangles. A subrectangle is at least a portion of the torus consisting of a contiguous set of nodes in a rectangular shape. In two dimensions, sub-rectangles may be either two-dimensional or one dimensional (a line in either the X or Y dimension). A subrectangle in d dimensions may be one-dimensional, two-dimensional, . . . , d-dimensional and for each dimension consists of nodes whose coordinate in that dimension is greater than or equal to some minimum value and less than or equal to some maximum value. Each subrectangle includes one or more compute nodes and can be arranged in a logical tree topology. One of the compute nodes within the tree topology functions as a 'root node' and the remaining nodes are leaf nodes or intermediate nodes. Leaf nodes do not have any incoming downtree logical links to them and only one outgoing uptree logical link. An intermediate node has at least one incoming logical link and one outgoing uptree logical link. A root node is an endpoint within the tree topology, with at least one incoming logical link and no uptree outgoing logical links. Packets follow the uptree links, and in one example of collective operations, are either combined or reduced as they move across the network. At the root node, the packets reverse direction and are broadcast down the tree, in the opposite direction of the uptree links. As shown in FIG. 6-5-1, compute node 86102$_6$ is a root node, 86102$_2$, 86102$_4$, 86102$_8$ and 86102$_{10}$ are leaf nodes and 86102$_3$ and 86102$_9$ are intermediate nodes. The arrows in FIG. 6-5-1 indicate uptree logical links, or the flow of packets up the tree towards the root node. In FIG. 6-5-1, packets move uptree first along the X dimension until reaching a predefined coordinate in the X dimension, which happens to be the middle of the subrectangle and then move uptree along the Y dimension until reaching a predefined coordinate in the Y dimension, which also happens to be the middle of the subrectangle. In this example, the root of the logical tree is at the node with the predefined coordinate of both the X and Y dimension. As shown in FIG. 6-5-1, the coordinates of the middle of the subrectangle are the same for both the X and Y dimensions in this example, but in general they need not be the same.

The compute nodes 86102 are interconnected to each other by one or more physical wires or links. To prevent deadlocks, a physical wire that functions as an uplink for a logical tree on a VC can never function as a downlink in any other virtual tree (or class route) on that same VC. Similarly, a physical wire that functions as a downlink for a particular class route on a VC can never function as an uplink in any other virtual tree on that same VC. Each class route is associated with its own unique tree network. In one embodiment of the IBM BlueGene parallel computing system, there are 16 class routes, and thus at least 16 different tree networks embedded within the multi-dimensional torus network that form the parallel computing system.

FIG. 6-5-2 shows a logical uptree consisting of the entire XY plane. In one embodiment of the invention, data packets are always routed towards the 'root node' 86202. The 'root node' 86202 resides at the intersection of one or more dimensions within the multidimensional network, and only at the 'root node' 86202 is the data packet allowed to move from the uptree directions to the downtree directions. Note that packet move in the X dimension until reaching a pre-determined coordinate in the X dimension. Upon reaching that predefined coordinate in the X dimension, the packets move in the Y dimension until reaching a predefined coordinate in the Y dimension, at which point they have reached the 'root node' 86202 of the logical tree. The predefined coordinates are the coordinates of the root node 86202.

FIG. 6-5-3 shows two non overlapping subrectangles, 'A' 86302 and B '86304 and their corresponding logical trees (shown by the arrows within each subrectangle). Each logical tree is constructed by routing packets in the same dimension order, first in the X dimension and then in the Y dimension. Also, each logical tree is constructed using the same predefined coordinate located at point 86308 for each dimension. The predefined coordinates are the coordinates of the node located at point 86308 and are the same coordinates as point 86202. In this example, the pre-determined coordinate for the X dimension located at point 86308 is not contained within subrectangle A 86302. Data packets are routed in the X dimension towards the pre-determined coordinate 86308 in the X dimension and then change direction from the X dimension to the Y dimension at the 'edge' 86306 of the subrectangle A 86302 and then routes towards root node 86309, which is the root node 86309 of subrectangle A 86302. The Y coordinate of the root node is the pre-determined coordinate 86308 of the Y dimension. For subrectangle B 86304, the predefined coordinates for both the X and Y dimensions are contained within subrectangle B 86304, so the data packets change dimension (or reach the root node) at the predefined coordinates, just as in the logical tree consisting of the full plane shown in FIG. 6-5-2. In one embodiment, all logical trees for all subrectangles use the same dimension order for routing packets and for each dimension all rectangles use the same predefined coordinate in that dimension. Packets route along the first dimension until reaching either the predefined coordinate for that dimension or reaching the edge of the subrectangle of that dimension. The packets then change dimension and route along the new dimension until reaching either the predefined coordinate for that new dimension or reaching the edge of the subrectangle of that new dimension. When this rule has been applied to all dimensions, the packets have reached the root of the logical tree for that subrectangle. Furthermore, if no hops are required in a dimension, that dimension may be skipped and the next dimension selected. For example, in a three-dimensional X, Y, Z cube, a subrectangle may involve only the X and Z dimensions (the Y coordinate is fixed for that sub-rectangle). If the dimension order rule for all sub-rectangles is X, then Y, then Z, then for this subrectangle the packets route X first then Z, i.e., the Y dimension is skipped.

While FIGS. 6-5-2 and 6-5-3 show sub-rectangles that fill the entire plane, one skilled in the art can recognize that this need not be the case in general., i.e., the sub-rectangles may be arbitrary sub-rectangles of any dimension, up to the dimensionality of the entire network. Furthermore, FIG. 6-5-3 shows non-overlapping sub-rectangles A and B that meet at 'edge' 86302. Although, in other embodiments the subrectangles may overlap in an arbitrary manner. If the multidimensional network is a torus, the torus may be cut into a mesh and the sub-rectangles are contiguous on the mesh (i.e., if the nodes of the torus in a dimension are numbered 0, 1, 2, . . . , N then the links from node 0 to N and N to 0 are not used in the construction of the subrectangles.)

As in BlueGene/L, the logical trees (class routes) can be defined by DCR registers programmed at each node. Each class route has a DCR containing a bit vector of uptree link inputs and one or more local contribution bits and a bit vector of uptree link outputs. If bit i is set in the input link DCR, then that means that an input is required on link i (or the local contribution). If bit i is set in the output link DCR, then uptree packets are sent out link i. At most one output link may be specified at each node. A leaf node has no input links, but does have a local input contribution. An intermediate link has both input links and an output link and may have a local contribution. A root node has only input links, and may have a local contribution. In one embodiment of the invention, all nodes in the tree have a local contribution bit set and the tree defines one or more sub-rectangles. Bits in the packet may specify which class route to use (class route id). As packets flow through the network, the network logic inspects the class route ids in the packets, reads the DCR registers for that class route id and determines the appropriate inputs and outputs for the packets. These DCRs may be programmed by the operating system so as to set routes in a predetermined manner. Note that the example trees in FIG. 6-5-2 and FIG. 6-5-3 are not binary trees, i.e., there are more than two inputs at some nodes in the logical trees.

In one embodiment, the predetermined manner is routing the data packet in direction of an 'e' dimension, and if routing the data packet in direction of the 'e' dimension is not possible (either because there are no hops to make in the e dimension, or if the predefined coordinate in the e dimension has been reached or if the edge of the subrectangle in the e-dimension has been reached), then routing the data packet in direction of an 'a' dimension, and if routing the data packet in direction of the 'a' dimension is not possible, then routing the data packet in direction of a 'b' dimension, and if routing the data packet in direction of the 'b' dimension is not possible, then routing the data packet in direction of a 'c' dimension, and if routing the data packet in direction of the 'c' dimension is not possible, then routing the data packet in direction of the 'd' dimension.

In one embodiment, routing between nodes occurs in an 'outside-in' manner with compute nodes communicating data packets along a subrectangle from the leaf nodes towards a predefined coordinate in each dimension (which may be the middle coordinate in that dimension) and changing dimension when the node is reached having either the predefined coordinate in that dimension or the end of the subrectangle is reached in a dimension, whichever comes first. Routing data from the 'outside" to the 'inside' until the root of the virtual tree is reached, and then broadcasting the packets down the virtual tree in the opposite direction in such a predetermined manner prevents communication deadlocks between the compute nodes.

In one embodiment, compute nodes arranged in a logical tree overlayed on to a multidimensional network are used to evaluate collective operations. Examples of collective operations include logical bitwise AND, OR and XOR operations, unsigned and signed integer ADD, MIN and MAX operations, and 64 bit floating point ADD, MIN and MAX operations. In one embodiment, the operation to be performed is specified by one or more OP code (operation code) bits specified in the packet header. In one embodiment, collective operations are performed in one of several modes, e.g., single node broadcast mode or "broadcast" mode, global reduce to a single node or "reduce" mode, and global all-reduce to a root node, then broadcast to all nodes or "all reduce" mode. These three modes are described in further detail below.

In the mode known as "ALL REDUCE", each compute node in the logical tree makes a local contribution to the data packet, i.e., each node contributes a data packet of its own data and performs a logic operation on the data stored in that data packet and data packets from all input links in the logical tree at that node before the "reduced" data packet is transmitted to the next node within the tree. This occurs until the data packet finally reaches the root node, e.g., $\mathbf{102}_6$. Movement from a leaf node or intermediate node towards a root node is known as moving 'uptree' or 'uplink'. The root node makes another local contribution (performs a logic operation on the data stored in the data packet) and then rebroadcasts the data packet down the tree to the all leaf and intermediate nodes within the tree network. Movement from a root node towards a leaf or intermediate node is known as moving 'downtree' or 'downlink'. The data packet broadcast from the root node to the leaf nodes contains final reduced data values, i.e., local contribution from all the nodes in the tree which are combined according to the prescribed OP code. As the data packet is broadcast downlink the leaf nodes do not make further local contributions to the data packet. Packets are also received at the nodes as they are broadcast down the tree, and every node receives exactly the same final reduced data values.

The mode known as "REDUCE" is exactly the same as "ALL REDUCE", except that the packets broadcast down the tree are not received at any compute node except for one which is specified as a destination node in the packet headers.

In the mode known as "BROADCAST", a node in the tree makes a local contribution to a data packet and communicates the data packet up the tree toward a root node, e.g., node 86102$_6$. The data packet may pass through one or more intermediate nodes to reach the root node, but the intermediate nodes do not make any local contributions or logical operations on the data packet. The root node receives the data packet and the root node also does not perform any logic operations on the data packet. The root node rebroadcasts the received data packet downlink to all of the nodes within the tree network.

In one embodiment, packet type bits in the header are used to specify ALL REDUCE, REDUCE or BROADCAST operation. In one embodiment, the topology of the tree network is determined by a collective logic device as shown in FIG. 6-5-4. The collective logic device determines which compute nodes can provide input to other compute nodes within the tree network. In a five-dimensional torus such as utilized by IBM's BlueGene™/Q parallel computing system, there are 11 input links into each compute node 86102, one input link for each of the +/−a to e dimensions and I/O input link and one local input. Each of these 11 input links and the local contribution from the compute node can be represented by one bit within a 12 bit vector. Based on the class route id in the packets, the collective logic uses a selection vector stored in a DCR register to determine which input links and local contribution are valid at a particular compute node. For example, if the selection vector is "100010000001" then the compute node 86102 receives inputs from its neighbor compute node along the '−a' dimension and the '−c' dimension. When the 12$^{th}$ bit or local is set, the compute node makes its own local contribution to the data packet by inputting its own packet. The collective logic then performs a logical operation on the data stored in all the input data packets. For an ALL REDUCE or REDUCE operation, the collective logic must wait until data packets from all the inputs have arrived before performing the logical operation and sending the packet along the tree. The collective logic also uses an output vector stored in a DCR register to determine which output links are valid between compute nodes 86102 within the tree network. In one embodiment, there are 11 possible output links from each compute node, one output link for each of the +/−a to e dimensions and one I/O link. For example, if the output vector is "00001000000" then the output is routed to the '−c' dimension. In one embodiment, the virtual channel (VC) is also stored in the packets, indicating which internal network storage buffers to use. Packets to be combined must specify the same class route id and the same VC. The software running on the nodes must ensure that for each VC the packets arriving at and being input at each node have consistent class route identifiers and OP codes. For contiguous sub-rectangles, the following software discipline across nodes is required in the use of collectives. For any two nodes that both participate in two class routes, the two nodes must participate in the same order. This is satisfied by typical applications, which use the same program code on all nodes. Each node uses its particular identity to drive its particular execution through the program code. Since the collective calls are ordered in the program code, they are ordered in the execution as required in the software discipline.

FIG. 6-5-4 illustrates a collective logic device 460 for adding a plurality of floating point numbers in a parallel computing system (e.g., IBM™ BlueGene™ L\P\Q). The collective logic device 86460 comprises, without restriction, a front-end floating point logic device 86470, an integer ALU (Arithmetic Logic Unit) tree 86430, a back-end floating point logic device 86440. The front-end floating point logic device 86470 comprises, without limitation, a plurality of floating point number ("FP") shifters (e.g., FP shifter 86410) and at least one FP exponent max unit 86420. In one embodiment, the FP shifters 86410 are implemented by shift registers performing a left shift(s) and/or right shift(s). The at least one FP exponent max unit 86420 finds the largest exponent value among inputs 86400 which are a plurality of floating point numbers. In one embodiment, the FP exponent max unit 86420 includes a comparator to compare exponent fields of the inputs 86400. In one embodiment, the collective logic device 86460 receives the inputs 86400 from network links, computing nodes and/or I/O links. In one embodiment, the FP shifters 86410 and the FP exponent max unit 86420 receive the inputs 86400 in parallel from network links, computing nodes and/or I/O links. In another embodiment, the FP shifters 86410 and the FP exponent max unit 86420 receive the inputs 86400 sequentially, e.g., the FP shifters 86410 receives the inputs 86400 and forwards the inputs 86400 to the FP exponent max unit 86420. The ALU tree 86430 performs integer arithmetic and includes, without limitations, adders (e.g., an adder 86480). The adders may be known adders including, without limitation, carry look-ahead adders, full adders, half adders, carry-save adders, etc. This ALU tree 86430 is used for floating point arithmetic as well as integer arithmetic. In one embodiment, the ALU tree 86430 is divided by a plurality of layers. Multiple layers of the ALU tree 86430 are instantiated to do integer operations over (intermediate) inputs. These integer operations include, but are not limited to: integer signed and unsigned addition, max (i.e., finding a maximum integer number among a plurality of integer numbers), min (i.e., finding a minimum integer number among a plurality of integer numbers), etc.

In one embodiment, the back-end floating point logic device 86440 includes, without limitation, at least one shift register for performing normalization and/or shifting operation (e.g., a left shift, a right shift, etc.). In embodiment, the collective logic device 86460 further includes an arbiter device 86450. The arbiter device is described in detail below in conjunction with FIG. 6-5-5. In one embodiment, the collective logic device 86460 is fully pipelined. In other words, the collective logic device 86460 is divided by stages, and each stage concurrently operates according to at least one clock cycle. In a further embodiment, the collective logic device 86460 is embedded and/or implemented in a 5-Dimensional torus network.

FIG. 6-5-5 illustrates an arbiter device 86450 in one embodiment. The arbiter device 86450 controls and manages the collective logic device 86460, e.g., by setting configuration bits for the collective logic device 86460. The configuration bits define, without limitation, how many FP shifters (e.g., an FP shifter 86410) are used to convert the inputs 86400 to integer numbers, how many adders (e.g., an adder 86480) are used to perform an addition of the integer numbers, etc. In this embodiment, an arbitration is done in two stages: first, three types of traffic (user, system, subcomm) arbitrate among themselves; second, a main arbiter 86525 chooses between these three types (depending on which have data ready). The "user" type refers to a reduction of network traffic over all or some computing nodes. The "system" type refers to a reduction of network traffic over all or some computing nodes while providing security and/or reliability on the collective logic device. The "subcomm" type refers to a rectangular subset of all the computing nodes. However, the number of traffic types is not limited to these three traffic types. The first level of arbitration includes a tree of 2-to-1 arbitrations. Each 2-to-1 arbitration is round-robin, so that if there is only one input request, it will pass through to a next level of the tree, but if multiple inputs are requesting, then one will be chosen which was not chosen last time. The second level of the arbitration is a single 3-to-larbiter, and also operates a round-robin fashion.

Once input requests has been chosen by an arbiter, those input requests are sent to appropriate senders (and/or the reception FIFO) 86530 and/or 86550. Once some or all of the senders grant permission, the main arbiter 86525 relays this grant to a particular sub-arbiter which has won and to each receiver (e.g., an injection FIFO 86500 and/or 86505). The main arbiter 86525 also drives correct configuration bits to the collective logic device 460. The receivers will then provide their input data through the collective logic device 86460 and an output of the collective logic device 86460 is forwarded to appropriate sender(s).

FIG. 6-5-6 is one embodiment of a network header 86600 for collective packets. In one embodiment, the network header 86600 comprises twelve bytes. Byte 86602 stores collective operation (OP) codes. Collective operation codes include bitwise AND, OR, and XOR operations, unsigned add, unsigned min, unsigned max, signed add, signed min, signed max, floating point add, floating point min, and floating point max operations.

Byte 86604 comprises collective class route bits. In one embodiment, there are four collective class route bits that provide 16 possible class routes (i.e., 2^4=16 class routes). Byte 86606 comprises bits that enable collective operations and determine the collective operations mode, i.e., "broadcast", "reduce" and "all reduce modes". In one embodiment, setting the first three bits (bits 0 to 2) of byte 86604 to '86110 indicates a system collective operation is to be carried out on the data packet. In one embodiment, setting bits 3 and 4 of byte 86606 indicates the collective mode. For example, setting bits 3 and 4 to '00' indicates broadcast mode, '11' indicates reduce, and '10' indicates all-reduce mode.

Bytes 86608, 86610, 86612 and 86614 comprise destination address bits for each dimension, a through e, within a 5-dimensional torus. In one embodiment, these address bits are only used when operating in "reduce" mode to address a destination node. In one embodiment, there are 6 address bits per dimension. Byte 86608 comprises 6 address bits for the 'a' dimension, byte 86610 comprises 6 address bits for the 'b' dimension and 2 address bits for the 'c' dimension, byte 86612 comprises 4 address bits for the 'c' dimension and 4 address bits for the 'd' dimension, and byte 86614 comprises 2 address bits for the 'd' dimension and 6 address bits for the 'e' dimension.

Parallel computer applications often use message passing to communicate between processors. Message passing utilities such as the Message Passing Interface (MPI) support two types of communication: point-to-point and collective. In point-to-point messaging, a processor sends a message to another processor that is ready to receive it. In a collective communication operation, however, many processors participate together in the communication operation.

Collective communication operations play a very important role in high performance computing. In collective communication, data are redistributed cooperatively among a group of processes. Sometimes the redistribution is accompanied by various types of computation on the data and it is the results of the computation that are redistributed. MPI, which is the de facto message passing programming model standard, defines a set of collective communication interfaces, including MPI_BARRIER, MPI_EBCAST, MPI_REDUCE, MPI_ALLREDUCE, MPI_ALLGATHER, MPI_ALLTOALL etc. These are application level interfaces and are more generally referred to as APIs. In MPI, collective communications are carried out on communicators which define the participating processes and a unique communication context.

Functionally, each collective communication is equivalent to a sequence of point-to-point communications, for which MPI defines MPI_SEND, MPI_RECEIVE and MPI_WAIT interfaces (and variants). MPI collective communication operations are implemented with a layered approach in which the collective communication routines handle semantic requirements and translate the collective communication function call into a sequence of SFND/RECV/WAIT operations according to the algorithms used. The point-to-point communication protocol layer guarantees reliable communication.

Collective communication operations can be synchronous or asynchronous. In a synchronous collective operation all processors have to reach the collective before any data movement happens on the network. For example, all processors need to make the collective API or function call before any data movement happens on the network. Synchronous collectives also ensure that all processors are participating in one or more collective operations that can be determined locally. In an asynchronous collective operation, there are no such restrictions and processors can start sending data as soon as the processors reach the collective operation. With asynchronous collective operations, several collectives can be happening simultaneously at the same time.

Asynchronous one-sided collectives that do not involve participation of the intermediate and destination processors are critical for achieving good performance in a number of programming paradigms. For example, in an async one-sided broadcast, the root initiates the broadcast and all destination processors receive the broadcast message without any intermediate nodes forwarding the broadcast message to other nodes.

The torus network supports both point to point operations and collective communication operations. The collective communication operations supported are barrier, broadcast, reduce and allreduce. For example, a broadcast put descriptor will place the broadcast payload on all the nodes in the class route (a predetermined route set up for a group of nodes in the MPI communicator). Similarly there are collective put reduce and broadcast operations. A remote get (with a reduce put payload can be broadcast) to all the nodes from where data will be reduced via the put descriptor.

FIG. 6-3-3 illustrates a set of components that support collective operations in a multi-node processing system. These components include a collective API 88302, language adapter 88304, executor 88306, and multisend interface 88310.

Each application or programming language may implement a collective API 88302 to invoke or call collective operation functions. A user application for example implemented in that application programming language then may make the appropriate function calls for the collective operations. Collective operations may be then performed via the API adaptor 88304 using its internal components such as an MPI communicator 88312, in addition to the other components in the collective framework, such as scheduler 88314, executor 88306, and multisend interface 88310.

Language adaptor 88304 interfaces the collective framework to a programming language. For example, a language adaptor such as for a message passing interface (MPI) has a communicator component 88312. Briefly, an MPI communicator is an object with a number of attributes and rules that govern its creation, use, and destruction. The communicator 88312 determines the scope and the "communication universe" in which a point-to-point or collective operation is to operate. Each communicator 88312 contains a group of valid participants and the source and destination of a message is identified by process rank within that group.

Executor 88306 may handle functionalities for specific optimizations such as pipelining, phase independence and multi-color routes. An executor may query a schedule on the list of tasks and execute the list of tasks returned by the scheduler 88314. Typically, each collective operations is assigned one executor.

The scheduler 88314 handles a functionality of collective operations and algorithms, and includes a set of steps in the collective algorithm that execute a collective operation. Scheduler 88314 may split a collective operation into phases. For example, a broadcast can be done through a spanning tree schedule where in each phase, a message is sent from one node to the next level of nodes in the spanning tree. In each phase, scheduler 88314 lists sources that will send a message to a processor and a list of tasks that need to be performed in that phase.

Multisend interface 88310 provides an interface to multisend 88316, which is a message passing backbone of a collective framework. Multisend functionality allows sending many messages at the same time, each message or a group of messages identified by a connection identifier. Multisend functionality also allows an application to multiplex data on this connection identifier.

As mentioned above, asynchronous one-sided collectives that do not involve participation of the intermediate and destination processors are critical for achieving good performance in a number of programming paradigms. For example, in an async one-sided broadcast, the root initiates the broadcast and all destination processors receive the broadcast message without any intermediate nodes forwarding the broadcast message to other nodes.

Embodiments of the present invention provide a method and system for one-sided asynchronous reduce operation. Embodiments of the invention use the remote get collective to implement one-sided operations. The compute node kernel (CNK) operating system allows each MPI task to map the virtual to physical addresses of all the other tasks in the booted partition. Moreover the remote-get and direct put descriptors take physical address of the input buffers.

Two specific example embodiments are described below. One embodiment, represented in FIG. 6-6-4, may be used when there is only one task per node; and a second embodiment, represented in FIG. 6-6-5, may be used when there is more than one task per node.

With reference to FIG. 6-6-4, at step 88402, each node sets up a base address table with an entry for the base address of the buffer to be reduced. At step 88404, the root of the collective injects a broadcast remote get descriptor whose payload is a put that reduces data back to the root node. The offset on each node must be the same from the address programmed in the base address table. This is common in PGAS runtimes where the same array index must be reduced on all the nodes. At step 88406, when the reduce operation completes, the root node has the sum of all the nodes in the communicator.

In the procedure illustrated in FIG. 6-6-5, at step 88502, each of the n tasks set up a base address table with an entry for the base address of the buffer to be reduced. At step 88504, the root of the collective injects a broadcast remote get descriptor whose payload is a put that reduces data back to the root node for task 0 on each node of the communicator. The offset on each node must be the same from the address programmed in the base address table. The root then injects a collective remote get for task 1 and the process is repeated till n tasks. As the remote gets are broadcast in a specific order, the reduce results will also complete in that order. At step 88506, after the n remote gets have completed, the root node can locally sum the n results and compute the final reduce across all the n tasks on all the nodes.

The prior art Blue Gene/L computer system structure can be described as a compute node core with an I/O node surface, where communication to the compute nodes is handled by the I/O nodes. In the compute node core, the compute nodes are arranged into both a logical tree structure and a multi-dimensional torus network. The logical tree network connects the compute nodes in a tree structure so that each node communicates with a parent and one or two children. The torus network logically connects the compute nodes in a three-dimensional lattice like structure that allows each compute node to communicate with its closest 6 neighbors in a section of the computer.

In the Blue Gene/Q system, the compute nodes comprise a multidimensional torus or mesh with N dimensions and that the I/O nodes also comprise a multidimensional torus or mesh with M dimensions. N and M may be different, e.g., for scientific computers, typically N>M. Compute nodes do not typically have I/O devices such as disks attached to them, while I/O nodes may be attached directly to disks, or to a storage area network.

Each node in a D dimensional torus has 2D links going out from it. For example, the BlueGene/L computer system (BG/L) and the BlueGene/P computer system (BG/P) have D=3. The I/O nodes in BG/L and BG/P do not communicate with one another over a torus network.

Also, in BG/L and BG/P, compute nodes communicate with I/O nodes via a separate collective network. To reduce costs, it is desirable to have a single network that supports point-point, collective, and I/O communications. Also, the compute and I/O nodes may be built using the same type of chips. Thus, for I/O nodes, when M<N, this means simply that some dimensions are not used, or wired, within the I/O torus. To provide connectivity between compute and I/O nodes, each chip has circuitry to support an extra bidirectional I/O link. Generally this I/O link is only used on a subset of the compute nodes. Each I/O node generally has its I/O link attached to a compute node. Optionally, each I/O node may also connect it's unused I/O torus links to a compute node.

In BG/L, point-to-point packets are routed by placing both the destination coordinates and "hint" bits in the packet header. There are two hint bits per dimension indicating whether the packet should be routed in the plus or minus direction; at most one hint bit per dimension may be set. As the packet routes through the network, the hint bit is set to zero as the packet exits a node whose next (neighbor) coordinate in that direction is the destination coordinate. Packets can only move in a direction if its hint bit is set in that direction. Upon reaching its destination, all hint bits are 0. On BG/L, BG/P and BG/Q, there is hardware support, called a hint bit calculator, to compute the best hint bit settings for when packets are injected into the network.

Thus, in a further aspect, a system and method for routing I/O packets between compute nodes and I/O nodes in a parallel computing system is provided. The invention may be implemented, in an embodiment, in a massively parallel computer architecture, referred to as a supercomputer, e.g., such as shown in FIG. 1-0. As a more specific example, the invention, in an embodiment, may be implemented in a massively parallel computer developed by the International Business Machines Corporation (IBM) under the name Blue Gene/Q.

The Blue Gene/Q platform contains four kinds of nodes: compute nodes (CN), I/O nodes (ION), login nodes (LN), and service nodes (SN). The CN and ION share the same compute ASIC.

In addition, associated with a prescribed plurality of processing nodes is a dedicated node that comprises a quad-processor with external memory, for handling of I/O communications to and from the compute nodes. Each I/O node has an operating system that can handle basic tasks and all the functions necessary for high performance real time code. The I/O nodes contain a software layer above the layer on the compute nodes for handling host communications. The choice of host will depend on the class of applications and their bandwidth and performance requirements.

In an embodiment, each compute node of the massively parallel computer architecture is connected to six neighboring nodes via six bi-directional torus links, as depicted in the three-dimensional torus sub-cube portion shown in FIG. 6-7-1. FIG. 6-7-1 also depicts a one dimensional I/O torus with two I/O nodes. FIG. 6-7-1 depicts three I/O links from three different compute nodes to two different I/O nodes. It is understood, however, that other architectures comprising more or fewer processing nodes in different torus configurations (i.e., different numbers of racks) may also be used/

The ASIC that powers the nodes is based on system-on-a-chip (s-o-c) technology and incorporates all of the functionality needed by the system. The nodes themselves are physically small allowing for a very high density of processing and optimizing cost/performance.

In the overall architecture of the multiprocessor computing node 50 implemented in a parallel computing system shown in FIG. 1-0, in one embodiment, the multiprocessor system implements the proven Blue Gene® architecture, and is implemented in a BlueGene/Q massively parallel computing system comprising, for example, 1024 compute node ASICs (BCQ), each including multiple processor cores.

A mechanism is provided whereby certain of the torus links on the I/O nodes can be configured in such a way that they are used as additional I/O links into and out of that I/O node; thus each I/O node may be attached to more than one compute node.

In one embodiment of the invention, in order to route I/O packets, there is a separate virtual channel (VC) and separate network injection and reception Fifos for I/O traffic. Each VC has its own internal network buffers; thus system packets use different internal buffers than user packets. All I/O packets use the system VC. The VC may also be used for kernel-to-kernel communication on the compute nodes, but this VC may not be used for user packets.

In addition, with reference to FIG. 6-7-2, the packet header has an additional toio bit. the hint bits and coordinates control the routing of the packet until all hint bits have been set to 0, i.e., when the packet reaches the compute node whose coordinates equal the destination in the packet. If the node is a compute node and the toio bit is 0, the packet is received at that node. If the node is a compute node and the toio bit is 1, the packet is sent over the I/O link and is received by the I/O node at the other end of the link. The last compute node in such a route is called the I/O exit node. The destination address in the packet is the address of the I/O exit node. In an embodiment, on the exit node, the packet is not placed into the memory of the node and need not be re-injected into the network. This reduces memory and processor utilization on the exit nodes.

The packet header also has additional ioreturn bits. When a packet is injected on an I/O node, if the ioreturn bits are not set, the packet is routed to another I/O node on the I/O torus using the hint bits and destination. If the ioreturn bits are set, they indicate which link the packet should be sent out on first. This may be the I/O link, or one of the other torus links that are not used for intra-I/O node routing.

When a packet with the ioreturn bits set arrives at a compute node (the I/O entrance node), the network logic has an I/O link hint bit calculator. If the hint bits in the header are 0, this hint bit calculator inspects the destination coordinates, and sets the hint bits appropriately. Then, if any hint bits are set, those hint bits are used to route the packet to its final compute node destination. If hint bits are already set in the packet when it arrives at the entrance node, those hint bits are used to route the packet to its final compute node destination. In an embodiment, on the entrance node, packets for different compute nodes are not placed into the memory of the entrance node and need not be re-injected into the network. This reduces memory and processor utilization on the entrance nodes.

On the I/O VC, within the compute or I/O torus packets are routed deterministically following rules referred to as the "bubble" rules. When a packet enters the I/O link from a compute node, the bubble rules are modified so that only one token is required to go on the I/O link (rather than two as in strict bubble rules). Similarly, when a packet with the ioreturn bits set is injected into the network, the packet only requires one, rather than the usual two tokens.

If the compute nodes are a mesh in a dimension, then the ioreturn bits can be used to increase bandwidth between compute and IO nodes. At the end of the mesh in a dimension, instead of wrapping a link back to another compute node, a link in that dimension may be connected instead to an I/O node. Such a compute node can inject packets with ioreturn bits set that indicate which link to use (connected to an I/O node). If a link hint bit calculator is attached to the node on the other end of the link, the packet can route to a different I/O node. However, with the mechanism described above. This extra link to the I/O nodes can only be used for packets injected at that compute node. This restriction could be avoided by having multiple toio bits in the packet, where the bit indicates which outgoing link to the I/O node should be used.

Further, in one aspect, a system and method are provided that relates to embedding global barrier and collective networks in a parallel computing system organized as a torus network, such as the BGQ platform shown in FIG. 6-8-1.

The Blue Gene/Q platform contains four kinds of nodes: compute nodes (CN), I/O nodes (ION), login nodes (LN), and service nodes (SN). The CN and ION share the same compute ASIC.

In addition, associated with a prescribed plurality of processing nodes is a dedicated node that comprises a quad-processor with external memory, for handling of I/O communications to and from the compute nodes. Each I/O node has an operating system that can handle basic tasks and all the functions necessary for high performance real time code. The I/O nodes contain a software layer above the layer on the compute nodes for handling host communications. The choice of host will depend on the class of applications and their bandwidth and performance requirements.

In an embodiment, each compute node of the massively parallel computer architecture is connected to six neighboring nodes via six bi-directional torus links, as depicted in the three-dimensional torus sub-cube portion shown at 90010 in FIG. 6-8-1. It is understood, however, that other architectures comprising more or fewer processing nodes in different torus configurations (i.e., different numbers of racks) may also be used.

The ASIC that powers the nodes is based on system-on-a-chip (s-o-c) technology and incorporates all of the functionality needed by the system. The nodes themselves are physically small allowing for a very high density of processing and optimizing cost/performance.

The BG/Q network is a 5-dimensional (5-D) torus for the compute nodes. In a compute chip, besides the 10 bidirectional links to support the 5-D torus, there is also a dedicated I/O link running at the same speed as the 10 torus links that can be connected to an I/O node.

The BG/Q torus network originally supports 3 kind of packet types: (1) point-to-point DATA packets from 32 bytes to 544 bytes, including a 32 byte header and a 0 to 512 bytes payload in multiples of 32 bytes, as shown in FIG. 6-8-7; (2) 12 byte TOKEN_ACK (token and acknowledgement) packets, not shown; (3) 12 byte ACK_ONLY (acknowledgement only) packets, not shown.

FIG. 6-8-3 shows the messaging unit and the network logic block diagrams that may be used on a computer node in one embodiment of the invention. The torus network is comprised of (1) Injection fifos 90302, (2) reception fifos 90304, (3) receivers 90306, and (4) senders 90308. The injection fifos include: 10 normal fifos, 2 KB buffer space each; 2 loopback fifos, 2 KB each; 1 high priority and 1 system fifo, 4 KB each. The Reception fifos include: 10 normal fifos tied to individual receiver, 2 KB each; 2 loopback fifos, 2kB each; 1 high priority and 1 system fifo, 4 KB each. Also, in one embodiment, the torus network includes eleven receivers 90306 and eleven senders 90308.

The receiver logic diagram is shown in FIG. 6-8-4. Each receiver has four virtual channels (VC) with 4 KB of buffers: one dynamic VC 90402, one deterministic VC 90404, one high priority VC 90406, and one system VC 90408.

The sender logic block diagram is shown in FIG. 6-8-5. Each sender has an 8 KB retransmission fifo 90502. The DATA and TOKEN_ACK packets carry link level sequence number and are stored in the retransmission fifo. Both of these packets will get acknowledgement back via either TOKEN_ACK or ACK_ONLY packets on the reverse link when they are successfully transmitted over electrical or optical cables. If there is a link error, then the acknowledgement will not be received and a timeout mechanism will lead to re-transmissions of these packets until they are successfully received by the receiver on the other end. The ACK_ONLY packets do not carry a sequence number and are sent over each link periodically.

To embed a collective network over the 5-D torus, a new collective DATA packet type is supported by the network logic. The collective DATA packet format shown in FIG. 6 is similar in structure to the point-to-point DATA packet format shown in FIG. 6-8-7. The packet type x"55" in byte 0 of the point-to-point DATA packet format is replaced by a new collective DATA packet type x"5A". The point-to-point routing bits in byte 1, 2 and 3 are replaced by collective operation code, collective word length and collective class route, respectively. The collective operation code field indicates one of the supported collective operations, such as binary AND, OR, XOR, unsigned integer ADD, MIN, MAX, signed integer ADD, MIN, MAX, as well as floating point ADD, MIN and MAX.

The collective word length indicates the operand size in units of $2^n*4$ bytes for signed and unsigned integer operations, while the floating point operand size is fixed to 8 byte (64 bit double precision floating point numbers). The collective class route identifies one of 16 class routes that are supported on the BG/Q machine. On a single node, the 16 classes are defined in Device Control Ring (DCR) control registers. Each class has 12 input bits identifying input ports, for the 11 receivers as well as the local input; and 12 output bits identifying output ports, for the 11 senders as well as the local output. In addition, each class definition also has 2 bits indicating whether the particular class is used as user Comm_World (e.g., all compute nodes in this class), user sub-communicators (e.g, a subset of compute nodes), or system Comm_World (e.g., all compute nodes, possibly with I/O nodes serving the compute partition also).

The algorithm for setting up dead-lock free collective classes is described in co-pending patent application YOR920090598US 1. An example of a collective network embedded in a 2-D torus network is shown in FIG. 6-8-13. Inputs from all nodes are combined along with the up-tree path, and end up on the root node. The result is then turned around at the root node and broadcasted down the virtual tree back to all contributing nodes.

In byte 3 of the collective DATA packet header, bit 3 to bit 4 defines a collective operation type which can be (1) broadcast, (2) all reduce or (3) reduce. Broadcast means one node broadcasts a message to all the nodes, there is no combining of data. In an all-reduce operation, each contributing nodes in a class contributes a message of the same length, the input message data in the data packet payload from all contributing nodes are combined according to the collective OP code, and the combined result is broadcasted back to all contributing nodes. The reduce operation is similar to all-reduce, but in a reduce operation, the combined result is received only by the target node, all other nodes will discard the broadcast they receive.

In the Blue Gene/Q compute chip (BQC) network logic, two additional collective injection fifos (one user+one system) and two collective reception fifos (one user+one system) are added for the collective network, as shown in FIGS. 6-8-3 at 90302 and 90304. A central collective logic block 90306 is also added. In each of the receivers, two collective virtual channels are added, as shown in FIGS. 6-8-4 at 90412 and 90414. Each receiver also has an extra collective data bus 90310 output to the central collective logic, as well as collective requests and grants (not shown) for arbitration. In the sender logic, illustrated in FIG. 6-8-5, the number of input data buses to the data mux 90504 is expanded by one extra data bus coming from the central collective logic block 90306. The central collective logic will select either the up tree or the down tree data path for each sender depending on the collective class map of the data packet. Additional request and grant signals from the cental collective logic block 90306 to each sender are not shown.

A diagram of the central collective logic block 306 is shown in FIG. 6-8-8. In an embodiment, there are two separate data paths 90802 and 90804, Path 90802 is for uptree combine, and patent 90804 for downtree broadcast. This allows full bandwidth collective operations without uptree and downtree intereference. The sender arbitration logic is, in an embodiment, modified to support the collective requests. The uptree combining operation for floating point number is further illustrated in co-pending patent application YOR920090578US 1.

When the torus network is routing point-to-point packets, priority is given to system packets. For example, when both user and system requests (either from receivers or from injection fifos) are presented to a sender, the network will give grant to one of the system requests. However, when the collective network is embedded into the torus network, there is a possibility of livelock because at each node, both system and user collective operations share up-tree and down-tree logic path, and each collective operation involve more than one node. For example, a continued stream of system packets going over a sender could block a down-tree user collective on the same node from progressing. This down-tree user collective class may include other nodes that happen to belong to another system collective class. Because the user down-tree collective already occupies the down-tree collective logic on those other nodes, the system collective on the same nodes then can not make progress. To avoid the potential livelock between the collective network traffic and the regular torus network traffic, the arbitration logic in both the central collective logic and the senders are modified.

In the central collective arbiter, shown in FIG. 6-8-9, the following arbitration priorities are implemented, (1) down tree system collective, highest priority, (2) down tree user collective, second priority, (3) up tree system collective, third priority, (4) up tree user collective, lowest priority.

In addition, the down-tree arbitration logic in the central collective block also implements a DCR programmable timeout, where if the request to a given sender does not make progress for a certain time, all requests to different senders and/or local reception fifo involved in the broadcast are cancelled and a new request/grant arbitration cycle will follow.

In the network sender, the arbitration logic priority is further modified as follows, in order of descending priority;

(1) round-robin between regular torus point-to-point system and collective; when collective is selected, priority is given to down tree requests;

(2) Regular torus point-to-point high priority VC;

(3) Regular torus point-to-point normal VCs (dynamic and deterministic).

On BlueGene/L and BlueGene/P, the global barrier network is a separate and independent network. The same network can be used for (1) global AND (global barrier) operations, or (2) global OR (global notification or global interrupt) operations. For each programmable global barrier bit on each local node, a global wired logical "OR" of all input bits from all nodes in a partition is implemented in hardware. The global AND operation is achieved by first "arming" the wire, in which case all nodes will program its own bit to '1'. After each node participating in the global AND (global barrier) operation has done "arming" its bit, a node then lowers its bit to '0' when the global barrier function is called. The global barrier bit will stay at '1' until all nodes have lowered their bits, therefore achieving a logical global AND operation. After a global barrier, the bit then needs to be re-armed. On the other hand, to do a global OR (for global notification or global interrupt operation), each node would initially lower its bit, then any one node could raise a global attention by programming its own bit to '1'.

To embed the global barrier and global interrupt network over the existing torus network, in one embodiment, a new GLOBAL_BARRIER packet type is used. This packet type, an example of which is shown in FIG. 6-8-10 at 91000, is also 12 bytes, including: 1 byte type, 3 byte barrier state, 1 byte acknowledged sequence number, 1 byte packet sequence number, 6 byte Reed-Solomon checking code. This packet is similar to the TOKEN_ACK packet and is also stored in the retransmission fifo and covered by an additional link-level CRC.

The logic addition includes each receiver's packet decoder (shown at 90416 in FIG. 8-6-4) decoding the GLOBAL_BARRIER packets, and sends the barrier state to the central global barrier logic, shown in FIG. 6-8-11, The central collective logic 91100 takes each receiver's input 24 bits, as well as memory mapped local node contribution, and then splits all inputs into 16 classes, with 3 bits per contributor per class. The class map definition are similar to those in the collectives, i.e, each class has 12 input enable bits, and 12 output enable bits. When all 12 output enable bits are zero, this indicates the current node is the root of the class, and the input enable bits are used as the output enable bits. Every bit of the 3 bits of the class of the 12 inputs are ANDed with the input enable, and the result bits are ORed together into a single 3 bit state for this particular class. The resulting 3 bits of the current class then gets replicated 12 times, 3 bits each for each output link. Each output link's 3 bits are then ANDed with the output enable bit, and the resulting 3 bits are then given to the corresponding sender or to the local barrier state.

Each class map (collective or global barrier) has 12 input bits and 12 output bits. When the bit is high or set to '1', the corresponding port is enabled. A typical class map will have multiple inputs bits set, but only one output bit set, indicating the up tree link. On the root node of a class, all output bits are set to zero, and the logic recognizes this and uses the input bits for outputs. Both collective and global barrier have separated up-tree logic and down-tree logic. When a class map is defined, except for the root node, all nodes will combine all enabled inputs and send to the one output port in an up-tree combine, then take the one up-tree port (defined by the output class bits) as the input of the down-tree broadcast, and broadcast the results to all other senders/local reception defined by the input class bits, i.e., the class map is defined for up-tree operation, and in the down-tree logic, the actual input and output ports (receivers and senders) are reversed. At the root of the tree, all output class bits are set to zero, the logic combines data (packet data for collective, global barrier state for global barrier) from all enabled input ports (receivers), reduces the combined logic to a single result, and then broadcast the result back to all the enabled outputs (senders) using the same input class bits, i.e., the result is turned around and broadcast back to all the input links.

FIG. 6-8-12 shows the detailed implementation of the up-tree and down-tree global barrier combining logic inside block 91100 (FIG. 6-8-11). The drawing is shown for one global barrier class c and one global barrier state bit j=3*c+k, where k=0, 1, 2. This logic is then replicated multiple times for each class c, and for every input bit k. In the up-tree path, each input bit (from receivers and local input global barrier control registers) is ANDed with up-tree input class enables for the corresponding input, the resulting bits is then OR reduced (91220, via a tree of OR gates or logically equivalent gates) into a single bit. This bit is then fanned out and ANDed with up-tree output class enables to form up_tree_output_state(i, j), where i is the output port number. Similarly, each input bit is also fanned out into the down-tree logic, but with the input and output class enables switched, i.e., down-tree input bits are enabled by up-tree output class map enables, and down-tree output bits down_tree_output_state(i, j) are enabled by up-tree input class map enables. On a normal node, a number of up-tree input enable bits are set to '1', while only one up-tree output class bit is set to '1'. On the root node of the global barrier tree, all output class map bits are set to '0', the up-tree state bit is then fed back directly to the down tree OR reduce logic 91240. Finally, the up-tree and down-tree state bits are ORed together for each sender and the local global barrier status:

Sender(i) global barrier state(j)=up_tree_output_state(i,j) OR down_tree_output_state(i,j);

Local global barrier status(j)=up_tree_output_state(i=last, j) OR down_tree_output_state(i=last,j);

On BlueGene/L and BlueGene/P, each global barrier is implemented by a single wire per node, the effective global barrier logic is a global OR of all input signals from all nodes. Because there is a physical limit of the largest machine, there is an upper bound for the signal propagation time, i.e., the round trip latency of a barrier from the furthest node going up-tree to the root that received the down-tree signal at the end of a barrier tree is limited, typically within about one microsecond. Thus a simple timer tick is implemented for each barrier, one will not enter the next barrier until a preprogrammed time has passed. This allows each signal wire on a node to be used as an independent barrier. However, on BlueGene/Q, when the global barrier is embedded in the torus network, because of the possibility of link errors on the high speed links, and the associated retransmission of packets in the presence of link errors, it is, in an embodiment, impossible to come up with a reliable timeout without making the barriers latency unnecessarily long. Therefore, one has to use multiple bits for a single barrier. In fact, each global barrier will require 3 status bits, the 3 byte barrier state in Blue Gene/Q therefore supports 8 barriers per physical link.

To initialize a barrier of a global barrier class, all nodes will first program its 3 bit barrier control registers to “100”, and it then waits for its own barrier state to become “100”, after which a different global barrier is called to insure all contributing nodes in this barrier class have reached the same initialized state. This global barrier can be either a control system software barrier when the first global barrier is being set up, or an existing global barrier in a different class that has already been initialized. Once the barrier of a class is set up, the software then can go through the following steps without any other barrier classes being involved. (1) From “100”, the local global barrier control for this class is set to “010”, and when the first bit of the 3 status bits reaches 0, the global barrier for this class is achieved. Because of the nature of the global OR operations, the 2nd bit of the global barrier status bit will reach ‘1’ either before or at the same time as the first bit going to ‘0’, i.e., when the $1^{st}$ bit is ‘0’, the global barrier status bits will be “010”, but it might have gone through an intermediate “110” state first. (2) For the second barrier, the global barrier control for this class is set from “010” to “001:, i.e., lower the second bit and raise the 3rd bit, and wait for the $2^{nd}$ bit of status to change from ‘1’ to ‘0’. (3) Similarly, the third barrier is done by setting the control state from “001” to “100”, and then waiting for the third bit to go low. After the $3^{rd}$ barrier, the whole sequence repeats.

An embedded global barrier requires 3 bits, but if configured as a global interrupt (global notification), then each of the 3 bit can be used separately, but every 3 notification bits share the same class map.

While the BG/Q network design supports all 5 dimensions labeled A, B, C, D, E symmetrically, in practice, the fifth E dimension, in one embodiment, is kept at 2 for BG/Q. This allows the doubling of the number of barriers by keeping one group of 8 barriers in the E=0 4-D torus plane, and the other group of 8 barriers in the E=1 plane. The barrier network processor memory interface therefore supports 16 barriers. Each node can set a 48 bit global barrier control register, and read another 48 bit barrier state register. There is a total of 16 class maps that can be programmed, one for each of 16 barriers. Each receiver carries a 24 bit barrier state, so does each sender. The central barrier logic takes all receiver inputs plus local contribution, divides them into 16 classes, then combines them into an OR of all inputs in each class, and the result is then sent to the torus senders. Whenever a sender detects that its local barrier state has changed the sender sends the new barrier state to the next receiver using the GLOBAL_BARRIER packet. This results in an effective OR of all inputs from all compute and I/O nodes within a given class map. Global barrier class maps can also go over the I/O link to create a global barrier among all compute nodes within a partition.

The above feature of doubling the class map is also used by the embedded collective logic. Normally, to support three collective types, i.e., user Comm_World, user sub_comm, and system, three virtual channels would be needed in each receiver. However, because the fifth dimension is a by 2 dimension on BG/Q, user COMM_WORLD can be mapped to one 4-D plane (e=0) and the system can be mapped to another 4-D plane (e=1). Because there are no physical links being shared, the user COMM_WORLD and system can share a virtual channel in the receiver, shown in FIG. 6-8-7 as collective VC 0, reducing buffers being used.

In one embodiment of the invention, because the $5^{th}$ dimension is 2, the class map is doubled from 8 to 16. For global barriers, class 0 and 8 will use the same receiver input bits, but different groups of the local inputs (48 bit local input is divided into 2 groups of 24 bits). Class i (0 to 7) and class i+8 (8 to 15) can not share any physical links, these class configuration control bits are under system control. With this doubling, each logic block in FIG. 12 is additionally replicated one more time, with the sender output in FIG. 6-8-12 further modified Sender(i) global barrier state(j)=up_tree_output_state_group0(i,j) OR down_tree_output_state_group0(i,j) OR up_tree_output_state_groupl(i,j) OR down_tree_output_state_groupl(i,j);

The local state has separate wires for each group (48 bit state, 2 groups of 24 bits) and is unchanged.

The 48 global barrier status bits also feed into an interrupt control block. Each of the 48 bits can be separately enabled or masked off for generating interrupts to the processors. When one bit in a 3 bit class is configured as a global interrupt, the corresponding global barrier control bit is first initialized to zero on all nodes, then the interrupt control block is programmed to enable interrupt when that particular global barrier status bit goes to high (‘1’). After this initial setup, any one of the nodes within the class could raise the bit by writing a ‘1’ into its global barrier control register at the specific bit position. Because the global barrier logic functions as a global OR of the control signal on all nodes, the ‘1’ will be propagated to all nodes in the same class, and trigger a global interrupt on all nodes. Optionally, one can also mask off the global interrupt and have a processor poll the global interrupt status instead.

On BlueGene/Q, while the global barrier and global interrupt network is implemented as a global OR of all global barrier state bits from all nodes (logic 91220 and 91240), it provides both global AND and global OR operations. Global AND is achieved by utilizing a ‘1’ to ‘0’ transition on a specific global barrier state bit, and global OR is achieved by utilizing a ‘0’ to ‘1’ transition. In practice, one can also implement the logic block 91220 and 91240 as AND reduces, where then global AND are achieved with ‘0’ to ‘1’ state transition and global OR with ‘1’ to ‘0’ transition. Any logically equivalent implementations to achieve the same global AND and global OR operations should be covered by this invention.

Cooling

Blue Gene/Q racks are indirect water cooled. The reason for water cooling is (1) to maintain the junction temperatures of the optical modules to below their max operating frequency of 55 C, and (2) to reduce infrastructure costs. The preferred embodiment is to use a serpentine water pipe which lies above the node card. Separable metal heat-spreaders lie between this pipe and the major heat producing devices. Compute cards are cooled with a heat-spreader on one side only, with backside DRAMs cooled by a combination of conduction and modest airflow which is required for the low power components.

Optical modules have a failure rate which is a strong function of temperature. The operating range is 20 C to 55 C, but highest reliability and lowest error rate is achieved if an even temperature at the low end of this range can be maintained. This favors indirect water cooling.

Using indirect water cooling in this manner requires control of the water temperature above dew point, to avoid condensation on the exposed water pipes. This indirect water cooling can result in dramatically reduced operating costs as the power to run larger chillers can be largely avoided. They will provide a 7.5 MW power and cooling upgrade for a 96-rack system, this would be an ideal time to also save dramatically on infrastructure costs by providing water not at the usual 6 C for air conditioning, but rather at the 18 C minimum temperature for indirect water cooling.

In a further aspect a system and method is provided to accurately predict a processor's operational lifetime by assessing the aging characteristics at the architecture level in an environment where process variation exists.

In light of the above, a method and a system of accurately estimating and adjusting for system-level aging are disclosed.

Even though the discussion below is relevant to a single-core, dual-core or a multi-core processor, for clarity purposes, the discussion below will generally refer to a multi-core processor (referred to hereinafter as processor).

Moreover, the term "core," as used in the discussion below, generally refers to any computing block or a processing unit, with data storing and data processing/computing capability, or any combination of the two.

Furthermore, the term "memory," as used in the discussion below, generally refers to any computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), flash memory, solid state memory, firmware or any type of media suitable for storing electronic instructions.

Additionally, the term "effective aging profile" as used in the discussion below, may be interchangeably used with the term "predicted operational lifetime."

Also, it should be noted that at the design stage, a certain clock-frequency target, a thermal design point and a voltage is provided. However, at the manufacturing stage, due to process variation, the processor and its components may have different threshold voltages that are different than those assumed earlier at the design stage. Consequently, the processor and its components may require different supply voltages in order to run at the targeted frequency. Moreover, in the context of process variation, existing aging analysis and prediction techniques often do not provide accurate results. As a result, the processor aging is not predicted or prevented properly causing longer down-time and less reliable processors.

Finally, all contents of U.S. Pat. Nos. 7,472,038 and 7,486,107 are hereby expressly incorporated by reference herein as if fully set forth herein.

FIG. 7-3-1 illustrates an exemplary embodiment of a general overview flowchart of a process to prolong processor operational lifetime. The process to prolong processor operational lifetime begins at step 94101 with an analysis of a processor aging profile at a design stage and a process variation analysis of the processor at a manufacturing stage.

The design stage data that may be relevant for this analysis may include, for example, architecture redundancy, circuit characteristics, target frequency and assumed switch factors. The manufacturing stage data that may be relevant for this analysis may include, for example, threshold voltages, as measured by aging sensors, and supply voltages, as determined by manufacturing tests. The design and manufacturing stage data may form the inputs for calculating effective aging for each core of the processor using an aging model, such as a Diffusion-Reaction (hereinafter DR) model or any of its derivative models or any other aging models for estimating the operating lifetime of a processor. Furthermore, different aging models can be used for different components/parts/structure/steps in the method or the system.

The calculation of effective aging may occur at the manufacturing facility after the processor has been manufactured. The data that is output from the calculation of effective aging for each core of the processor may be stored in a data structure, such as a history table, which may be stored in memory internal or external to the processor. In one embodiment, history table is table in which various kinds of information related to the calculation of effective aging profile are registered, stored, organized and capable of being retrieved from for later use by the processor or logic device.

A list and description of some exemplary known aging models may be found at http://www.iue.tuwien.ac.at/phd/wittmann/node10.html#SECTION00102000000000000000. Other exemplary known aging models are described in 'M. A. Alam and S. Mahapatra, "A Comprehensive Model of PMOS NBTI Degradation," Microelectronics Reliability, vol. 45, no. 2005, pp. 71-81, 2004' and 'S. Ogawa and N. Shiono, "Generalized Diffusion-Reaction Model for the Low-Field Charge-Buildup Instability at the Si—SiO2 Interface," Physical Review B, vol. 51, no. 7, pp. 4218-4230, 1995' and 'M. A. Alam, "A Critical Examination of the Mechanics of Dynamic NBTI for PMOSFETs," in *Proc. Int. Electron Devices Meeting* (*IEDM*), pp. 14.4.1-14.4.4, 2003.' All contents of all documents cited in this paragraph are hereby expressly incorporated by reference herein as if fully set forth herein.

At step 94102, a review of current selection of operating cores of the processor, their frequency and their voltages is done. This review is done in order to be later used for effective aging profile calculation.

At step 94103, a determination is made if the aging has exceeded the threshold for a redo analysis. This determination is made in order to determine if it is necessary to reconfigure the processor's current operating settings. It should be noted that different types of aging may have different indicators to trigger this determination. For example, while timing a measurement of signal propagation speed in transistors may be an adequate indicator for NBTI-induced aging, for other types of aging, such as EM, timing may not be the proper indicator.

Furthermore, it should be noted that this determination is architecture and technology dependent. For example, the redo analysis timing for a 45 nm processor architecture may be different for a 22 nm processor architecture. Regardless, if a determination is made that aging has not exceeded for a redo analysis i.e. none of the matching preexisting criteria that trigger the redo analysis are met, then the process loops to step 84102. Otherwise, the process continues to step 94104.

At step 94104, a reading of data stored in the history table occurs. This reading, the execution of which may be triggered by the core, may also include data from other sources such as hardware counters, thermal sensors and aging sensors. The data from this reading is received by the processor or like logic device.

At step 94105, an update is made to the history table, wherein the cells in the history table are populated with new data received from hardware counters, thermal sensors and aging sensors. The execution of this update may be triggered by the core.

At step 94106, an effective aging profile is calculated and stored in the history table with a corresponding time stamp. The execution of calculation of the effective aging profile may be triggered by a core to measure its own or other cores' effective aging profile. It is possible that after this calculation, the hardware counters and thermal sensors may be reset and the corresponding entries in the history table may be cleared in order to allow for subsequent storing of new information for the time interval beginning from after the current calculation until the next time when effective aging profile needs to be recalculated.

Moreover, at the time of recalculation of the effective aging profile, the history table may receive the data from the aging sensors from each core of the processor. These readings may provide an accurate estimate of how much aging has occurred to the aging sensor itself when it was exposed to the switching factors of 1.0. Accordingly, by using the temperature, variation, voltage and frequency information gathered from step 94101, and assuming switching factors of 1.0, the estimated aging rate of the aging sensor may be calculated. By comparing the estimated aging rate and the actual aging rate from measuring the aging sensor, coefficients in the aging model may be recalibrated in order to specifically account for process variation at that core. The effective aging profile calculation then may use, in one embodiment, the aging model with the calibrated coefficients, to recalculate the predicted operational lifetime for the core. The calculation may use information from history table that may include switching factors as measured by the hardware counters, the temperature as measured by thermal sensors, frequency and voltage and the previous predicted operational lifetime (and VT-shift) of the cores. The effective aging profile may also account for architecture redundancy.

Additionally, on a system that supports Dynamic Frequency and Voltage Scaling (DVFS), where frequencies and supply voltages of each core could change when going into less demanding tasks or idle state to save power, effective aging profile calculation may be recalculated in response to occurrence of these events, or the voltage/frequency states can be recorded and used later for recalculating effective aging profile.

Effective aging profile is calculated at pre-determined periods appropriate for the corresponding aging process. For example, effective aging profile may be calculated and updated once in a few days or any time period that is relevant for the operating/server and workload conditions. It is also possible to customize the update frequency interval.

The steps shown in the FIGS. 7-3-2 and 7-3-3 are interchangeable—in other embodiments the sequence can change, yet still refer to the contents of this disclosure in one embodiment, the step of factoring in on-chip variation can be done in Age analyzer stage (step 94101) or during the effective aging profile calculation (step 94106). Similarly architectural-characteristics and redundancy information can be factored in effective aging profile calculation stage (step 94106) or age analyzer stage (step 94101) in different embodiments.

Furthermore, the time period frequency at which effective aging profile may be calculated may relate to a change in the voltage, frequency or workload as detected by hardware counters or by thermal sensors, or as requested by a user when a system-level event such as rebooting, changing workload, Operating Systems (OS) context switch, OS-driven idle period, periodic maintenances or when frequency/voltage are changed by OS to conserve energy.

Current literature on transistor level aging models provides detailed dependencies for voltage, temperature and other parameters. For example, aging simulations are ran on a processor core using voltage of 1.0V, frequency of 2 Ghz and fixed temperature of 85° C., assuming switching factor of 1.0. The circuit characteristics, such as cycle-time constraint, threshold voltage, circuit types and circuit criticality, are known in advance since they are designed in advance.

During processor operation, the processor uses hardware counters, and aging and temperature sensors to capture data relating to the actual operating conditions and supply voltage. Next, the processor may supply this data to a software module or a logic circuit which calculates aging profile. In microprocessor architecture, often, aging profile is a vector that covers different types of components with different aging characteristics. In one embodiment, aging profile can be a vector. Yet, for sake of simplicity, we use value for the rest of the test and its use should not be construed as limiting. Thus, if the chip was actually running at 0.8V, frequency of 1.4 Ghz and varying temperatures between 60-85° C., the hardware counters measure switching factor to be 0.21. Because these conditions are different, and the processor has also been used for a while, thus already using up some life time, the aging profile metric has to be recalculated.

At step 94107, a determination is made if the processor's predicted operational lifetime meets a predetermined aging requirement. If a determination is made that the processor's predicted operational lifetime meets the predetermined aging requirement, then the process loops to step 94102. Otherwise, the process continues to step 94108.

At step 94108, a corrective reaction to prolong processor operational lifetime occurs and then the process loops to step 94106. An example of the corrective reaction may include, but not be limited to, any of the following: 1) an adjustment in the supply voltage while maintaining the same frequency, 2) an adjustment in the frequency with the same or lower supply voltage, 3) a reduction in the workload, such as an increase in the amount of idle time of the processor or a reduction in the number of operating cores, 4) a selective shut-down of cores that have short operational lifetimes and a performance of workload scheduling by using cores that have sufficiently long operational lifetimes, 5) a determination of whether task migration of application processing activity at one core in favor of another core is possible and if the workload requires less cores than the total number of cores on the processor, then whether one can schedule the cores to run the workload such that each core has sufficient time to rest and 6) a matching of the busiest or hottest tasks in the workload to the cores that have higher operational lifetime. The reactions above may be used individually or in combination in order to meet the processor's operational lifetime requirement. The determination of which corrective action to take may be pre-programmed in advance by a predetermined heuristic.

FIG. 7-3-2 symbolically illustrates an exemplary depiction of a flow diagram implementing the process of FIG. 7-3-1.

System 94200 includes effective aging data block 94201, process variation data block 94202, tune for effective aging block 94203, effective aging profile block 94204, determination of aging requirement block 94205 and reaction to prolong lifetime block 94206.

Block 94201 performs step 94101 depicted in FIG. 7-3-1. At design stage, when a processor's logic design has been completed, one can predict, based on ideal manufacturing conditions, without process variation, the aging profile of the processor, a circuit processor or a logic block by simulating operation for any items of interest and by taking into consideration certain technical characteristics related to the item of interest.

In one example, block 94201, which may be a logic circuit programmed to perform its function, receives data from inputs 94201*a-d* which relate to circuit characteristics, architecture redundancy, assumed workload data and assumed operating conditions, respectively. Data from inputs 94201*a-d* may be used for determining the aging profile (ideal processor operational lifetime) by calculating the effective aging for each core of the processor using an aging model. The formula and coefficients are stored in the history table for later use in calculating an effective aging profile when actual workload and operating conditions are available. Alternatively, the formula and coefficients may be stored in memory, internal or external to the processor, where the core or processor controller can have access to when they calculate the operational lifetime.

Data received from input 94201*a* is related to circuit and device characteristics such as the connectivity of logic/SRAM design, target cycle time, gate oxide thickness and capacitance and VT.

In one embodiment, data received from input 94201*b* is related to architecture characteristics and redundancy such as the duplication of critical components of a system with the intention of increasing reliability of the system as often done in the case of a backup or fail-safe. In a different embodiment, the architecture data and redundancy information are taken into account at the aging analyzer stage.

Data received from input 94201*c* is related to workload data such as assumed clock-gating factors and switching factors.

Data received from input 94201*d* is related to assumed operating conditions such as voltage, frequency and temperature.

The output of block 94201 (aging profile) is then input into block 94202 where it is compared to process variation data (expected core lifetime based on actual physical measuring of the core at the post-manufacturing stage). Process variation measurements may be done by determining VT using aging sensors or by applying different voltages to the processor and measuring the propagation speed of each component. Block 94202 may be a logic circuit programmed to perform its function. The output of block 94202 may then be passed to the processor's controller, which may then optimize the global chip lifetime based on core values.

The output of block 94202 is then fed into block 94203 where tuning for effective aging occurs. Since process variation and processor aging profile characteristics are not deterministic and have wafer and chip-level (or even finer-grain) characteristics, process variation data and the aging profile characteristics are fed into the effective aging profile unit to tune it for the specific processor. The design and manufacturing stage data may be used for calculating effective aging for each core of the processor using an aging model, for example, the DR model or other model. The calculation of effective aging may occur at the manufacturing facility after the processor has been manufactured. The data that is output from the calculation of effective aging for each core of the processor may be stored in a history table, which may be stored in memory internal or external to the processor. History table is table in which various kinds of information related to the calculation of effective aging profile are registered, stored, organized and capable of being retrieved from for later use. Block 94202 may be a logic circuit programmed to perform its function and be configured to store the calibrated formula and coefficients mentioned above.

Block 94204*a* performs steps 94102-94105 depicted in FIG. 7-3-1. During processor's operation, readings from the thermal sensors, aging sensors and hardware counters are automatically, frequently, routinely and continuously read and stored in the history table in order to be later used for effective aging profile calculation.

Block 94204 performs step 94106 depicted in FIG. 7-3-1. The execution of calculation of the effective aging profile may be triggered by a core to measure its own or other cores' effective aging profile. Block 94204 may be a logic circuit programmed to perform its function. Because the aging sensors are exposed to the fixed switching factor of 1.0, they ages faster than the actual core and its components. Therefore, the processor does not rely directly on aging sensor alone to predict the lifetime of its cores, but rather the aging sensor readings are used to estimate an accurate lifetime prediction through calculating the effective aging profile.

When it is time to recalculate effective aging profile, the history table reads the data output from aging sensors from each core of the processor. The aging sensor readings provide an accurate estimate of how much aging has occurred to the aging sensor when exposed to the switching factors of 1.0.

By using the temperature, voltage, frequency and process variation information from blocks 94201-94203, and assuming switching factors of 1.0, the estimated aging rate of the aging sensor may be calculated. By comparing the estimated aging rate and the actual aging rate from measuring of the aging sensor, recalibration of coefficients in the aging model, to tailor specifically to the processor to account for process variation, may be possible.

The effective aging profile calculation may then use the aging model with the calibrated coefficients, to recalculate the predicted operational lifetime for the core. The calculation may use the information from the history table that may include switching factor as measured by the hardware counters, the temperature as measured by thermal sensors, frequency and voltage and the previous predicted operational lifetime (and VT-shift) of the cores.

It is possible that after this calculation, the hardware counters and thermal sensors may be reset and the corresponding entries in the history table may be cleared in order to allow for new information storing for the time interval beginning from after the current calculation until the next time when effective aging profile needs to be recalculated. Also, if effective aging profile needs to be recalculated, data from aging sensors may be read and stored in the history table. The calculated effective aging profile may also be stored in history table for future use. A time stamp detailing when the reading is made may also be stored in the table in order to associate with each aging sensor reading.

Because aging is a slow process, the effective aging profile does not need to be calculated and updated frequently. For example, effective aging profile may be calculated and updated once in a few days. It is also possible to customize the update frequency interval.

Also, the time period frequency at which effective aging profile may be calculated may relate to a sudden change in the voltage, frequency or workload as detected by hardware counters or by thermal sensors, or as requested by a user when a system-level event such as rebooting, changing workload, Operating Systems (OS) context switch, OS-driven idle period, periodic maintenances or when frequency/voltage are changed by OS to conserve energy.

Upon calculation of the effective aging profile, block 94204 feeds block 94205 a data signal in the format of a number, a metric, a symbol or a variable. The execution of calculation of the aging requirement may be triggered by a core to measure its own or other cores' results. Block 94205 may be a logic circuit programmed to perform its function. Block 94205 performs step 94107 depicted in FIG. 7-3-1. If a determination is made if the processor's predicted operational lifetime meets a predetermined aging requirement, then the process loops to step 94204*a*. However, if a determination is made that the processor's predicted operational lifetime does not meet a predetermined aging requirement, then a signal to block 94206 is output.

Aging requirement comprises of a performance and a lifetime target, where the performance target may be a clock-frequency or sustained number of operations per second such as a number of Floating Point Operations per Seconds (FLOPS). The lifetime target may be the number of cores that can sustain the performance target for at least the period of time desired for the workload until the first failure. Block 94206 performs step 94108 depicted in FIG. 7-3-1. The execution of a corrective action may be triggered by a core to measure its own or other cores' results. Block 94206 may be a logic circuit programmed to perform its function. An example of the corrective reaction may include, but not be limited to, any of the following: 1) an adjustment in the supply voltage while maintaining the same frequency, 2) an adjustment in the frequency with the same or lower supply voltage, 3) a reduction in the workload, such as an increase in the amount of idle time of the processor or a reduction in the number of operating cores, 4) a selective shut-down of cores that have short operational lifetimes and a performance of workload scheduling by using cores that have sufficiently long operational lifetimes, 5) a determination of whether task migration of application processing activity at one core in favor of another core is possible and if the workload requires less cores than the total number of cores on the processor, then whether one can schedule the cores to run the workload such that each core has sufficient time to rest and 6) a matching of the busiest or hottest tasks in the workload to the cores that have higher operational lifetime. The reactions above may be used individually or in combination in order to meet the processor's operational lifetime requirement. The determination of which corrective action to take may be pre-programmed in advance by a predetermined heuristic.

FIG. 7-3-3 symbolically illustrates an exemplary depiction of a flow diagram implementing the process of FIG. 7-3-1. The implementation as depicted in FIG. 7-3-3 is similar to the implementation of FIG. 7-3-2. However, the main difference is presence of a structure known as an age-analyzer, which mimics each of the critical timing paths of the core and is exposed to the same workload conditions as the components that they measure. This is done in order that the difference between sensors and workload conditions of the measured components can be measured.

Furthermore, the term "workload-induced conditions" as discussed in reference to FIG. 7-3-3, may generally be characterized by, but not limited to, clock-gating factors, switching factors, voltage, frequency and temperature.

Additionally, because the numbers of bits in the core or within any of its components could be substantial, the hardware counters can be programmed to sample switching factors of only a subset of bits of the critical components or of components that are more prone to switching, or to compress the bits using functions, such as XOR, before computing their switching factors.

In one embodiment, block 94304*b* corresponds to steps performed by an age-analyzer which is constructed such that it mimics the operation of the core it is trying to predict the aging of. The age-analyzer captures critical information in terms of the architectural characteristics of the core, types of logic and such. Because the age-analyzer closely mimics the operation of the core, the age-analyzer provides a more direct prediction of aging from its reading and reduces the need for further computations of complicated models. The age-analyzer may include or make use of aging sensors.

In different embodiments architectural characteristics and redundancy information can be taken into account in different stages. In one embodiment, the architectural characteristics and redundancy information is factored in calculating the effective aging profile. In another embodiment, the architectural characteristics and redundancy information is factored in at the aging analyzer stage, but not in effective aging profile. Specifically, if a core has several pipeline stages and its critical path is likely to be limited by some of the stages that have a combination of VT devices, SRAM and wire capacitance, then the age-analyzer will have a component mimic each of the critical paths. For example, if a core has two critical paths, one consists of 40% high-VT transistors and 60% SRAM, and the other consists of 40% high-VT transistors and 60% wire, then the age-analyzer will be structured to have two structures, one consists of 40% high-VT transistors and 60% SRAM, and the other consists of 40% high-VT transistors and 60% wire.

The structure of the age-analyzer can also be designed to reflect redundancy present in the core wherein each of the core structures (main and spares) has a mimic in the age-analyzer. To closely mimic the workload conditions of the core, block 94304*b* is not receiving data from block 94304*a*. Rather, block 304*b* actually mimics the workload switching activities that are output from block 94304*a*. For example, if block 94304*a* outputs a signal with a switch factor of 0.4, then block 94304*b* is also forced to switch with factor 0.40 (switching 40% of times). By measuring the timing of each of the sensor structures in the age-analyzer, as exemplarily shown in FIG. 7-3-6, the age-analyzer tunes to the input aging profile vector of the core and provides a final aging profile indicating the overall aging profile of the core as well as information on which parts of the architecture are at aging risk. A core is considered not meeting its lifetime requirement in block 94305 if any of the age-analyzer structures indicate critical aging conditions, and there are no redundant or spare components present to extend the core's lifetime; in which block 94306 will perform step 94108 depicted in FIG. 7-3-1.

FIG. 7-3-4 graphically illustrates a functional block diagram of an exemplary embodiment of a structure of a system configured to implement the process of FIG. 7-3-1.

FIG. 7-3-4 shows a structure of a processor 94400, which includes four processor cores 94403*a-d*. Each of the processor cores 94403*a-d* is operably coupled to a memory bus or interconnect 94407, in order to exchange data among the cores and with main memory or other input/output units. Cores 94403*a-d* also correspondingly include four thermal sensors 94404*a-d*, four aging sensors and/or age-analyzers 94405*a-d*, and four hardware counters 94406*a-d*, all of which are operably coupled to history table 94401.

Although only one aging sensor and/or age-analyzer 94405*a-d* is shown in each core, aging sensors and/or age-analyzers 94405_a-d_ may include multiple instances and various implementations of age sensors and age-analyzers, internal or external to the core, customized for the circuit characteristic. In one embodiment, aging sensors and/or age-analyzers 94405_a-d_ may be placed in multiple locations that are critical in timing and thus most likely to run out of lifetime early. In another embodiment, aging sensors and/or age-analyzers 94405_a-d_ may comprise of multiple implementations of circuit blocks, such as inverter chains, SRAM, combinational logic chains, accumulators, MUXes, latches of different types, and multiple transistor types, such as high-VT transistors and low-VT transistors, stacked and non-stacked transistors. Additionally, even though only one thermal sensor and one hardware counter are shown within each core 94403_a-d_, thermal sensor 94404_a-d_ and hardware counters 94406_a-d_ could include multiple instances, customized for the component of interest within any or all cores 94403_a-d_.

Thermal sensors 94404_a-d_ are a type of hardware that may be implemented, for example, as a diode or a ring oscillator. Thermal sensors 94404_a-d_ collect temperatures for core components units or cores 94403_a-d_ that are more likely to have shorter operational lifetimes.

Aging sensors and/or age-analyzers 94405_a-d_ are a type of hardware that may be implemented, for example, as a ring oscillator. Aging sensors and/or age-analyzers 94405_a-d_ are exposed to the workload switching factor of 1.0 (switching every clock-cycle) or other fixed value. An initial reading of aging sensors and/or age-analyzers 94405_a-d_, while in the manufacturing stage, provides process variation profile, while subsequent readings help calculate VT shifting rate. Thus, by comparing the initial readings done at design stage and manufacturing stage (or any other previous readings) to the subsequent readings, aging can be predicted based how much threshold-voltage-shift (VT-shift) has occurred over time.

Hardware counters 94406_a-d_ are a type of hardware registers that keep count on events of interest within processor 94400. For example, types of hardware counters 94406_a-d_ that may be used include instruction and processor cycle counters, counters that count number of cycles a certain unit is used or counters that count how many bits are switched for a set of states in a certain unit over a period of time. Hardware counters 94406_a-d_ are used to collect information on switching factors of cores 94403_a-d_ or core components unit. In the interest of filtering information, hardware counters 94406_a-d_ may be customized and thus designed to collect only switching factors that represents the critical paths of cores 94403_a-d_ that are more likely to have shorter operational lifetimes.

Furthermore, because the numbers of bits in the core or in any of its components could be substantial, the hardware counters can be programmed to sample switching factors of only a subset of bits of the critical components or of components that are more prone to switching, or to compress the bits using functions, such as XOR, before computing their switching factors.

In this exemplary embodiment, at design stage of processor 94400, a certain clock-frequency target, a thermal design point and a voltage are assumed. However, at the manufacturing stage, due to process variation, multi-core processor 94400 and its components will have different threshold voltages that are different than those assumed earlier by the design stage. As a result, multi-core processor 94400 and its components will require different supply voltages among cores 94403_a-d_ and within cores 94403_a-d_ in order to run at the targeted frequency. The information from design stage, such as architecture redundancy, circuit characteristics, target frequency and assumed switch factors, and information from manufacturing stage, such as threshold voltages as measured by aging sensors and supply voltages as determined by manufacturing tests, form the inputs for calculating effective aging for each core 94403_a_-94403_d_ using the aging model. The calculation of effective aging may occur at the manufacturing facility after the processor has been manufactured. The data that is output from the calculation of effective aging for each core of the processor may be stored in a history table, which may be stored in memory internal or external to the processor.

In one embodiment, during operation of multi-core processor 94400, readings from thermal sensors 94404_a-d_, aging sensors and/or age-analyzers 94405_a-d_ and hardware counters 94406_a-d_ are automatically, frequently, routinely and continuously read and stored in history table 94401. In order to more efficiently store these readings, history table 94401 can store thermal sensors 94404_a-d_ readings in the form of average temperatures taken over a certain period of time, aging sensors and/or age-analyzers 94405_a-d_ readings in the form of VT and hardware counters 94406_a-d_ readings in the form of switch probability over time.

Since computer system using multi-processor 94400 may be shut-down or restarted, history table 94401 is adapted and configured to store its values by implementing history table 94401 in persistent storage such as memory. Due to possibility of data failure, a copy of history table 94401 may also be backed up in persistent storage such as memory.

When effective aging profile needs to be recalculated, data from aging sensors and/or age-analyzers 94405_a-d_ is read and stored in history table 94401 with a corresponding time stamp. The execution of calculation of the effective aging profile may be triggered by any of cores 94403_a-d_ to measure its own or other cores' effective aging profile.

Additionally, since aging is a slow process, the effective aging profile does not need to be calculated and updated frequently. For example, effective aging profile may be calculated and updated once in a few days. It is also possible to customize the update frequency interval.

Moreover, on a system that supports Dynamic Frequency and Voltage Scaling (DVFS), where frequencies and supply voltages of each core could change when going into less demanding tasks or idle state to save power, the effective aging profile calculation can be redone these changes happen, or the voltage/frequency states can be recorded and used later for recalculating effective aging profile.

Also, the time period frequency at which effective aging profile may be calculated may relate to a sudden change in the voltage, frequency or workload as detected by hardware counters or by thermal sensors, or as requested by a user when a system-level event such as rebooting, changing workload, Operating Systems (OS) context switch, OS-driven idle period, periodic maintenances or when frequency/voltage are changed by OS to conserve energy.

When it is time to recalculate effective aging profile, history table 94401 again reads data from aging sensors and/or age-analyzers 94405_a-d_ for each core 94403_a-d_. These readings provide an accurate estimate of how much aging has occurred to aging sensors and/or age-analyzers 94405-_d_ when they were exposed to the switching factors of 1.0.

By using the temperature, variation, voltage and frequency information from effective aging, and assuming switching factors of 1.0, one can calculate the estimated aging rate of aging sensors and/or age-analyzers 94405_a-d_. By comparing the estimated aging rate and the actual aging rate from the measuring output from aging sensors and/or age-analyzers 94405_a-d_, one can recalibrate the coefficients in the aging model to tailor specifically to the chip to account for process variation.

The effective aging profile calculation then uses the aging model with the calibrated coefficients, to recalculate the protected lifetime for the core. The calculation uses information from history table 94401 that include switching factor as measured by the hardware counters 94406*a-d*, the temperature as measured by thermal sensors 94404*a-d*, frequency and voltage and the previous predicted operational lifetime (and VT-shift) of the cores 94401*a-d*. The effective aging profile may also account for architecture redundancy.

It is possible that after this calculation, hardware counters 94406*a-d* and thermal sensors 94404*a-d* may be reset and the corresponding entries in history table 94401 may be cleared in order to allow for new information storing for the time interval beginning from after the current calculation until the next time when effective aging profile needs to be recalculated.

FIG. 7-3-5 symbolically illustrates an exemplary depiction of a history table. History table 94500 is a data structure which performs the function of a table in which various kinds of information related to the calculation of effective aging profile are registered, stored, organized and capable of being retrieved from for later use. In history table 94500, each row may correspond to some identification information of a core or a logic block from which data is being collected. History table 94500 may be stored in memory, which may be internal or external to the processor.

Each column within history table 94500 represents a type of data collected from a core or a logic block that is being monitored. Within history table 94500, 'Block name' column stores the identification data related to the monitored item of interest such as a core, a circuit or a logic block. 'Voltage' and 'Frequency' columns store values collected at runtime that describe the supplied voltage (VDD) and clock frequency of the measured item, respectively. 'Time stamp' column stores values of the time and date of when the time stamp value was measured. 'Switch factors' column stores probability values, which are measured from corresponding hardware counters of how often the bits switch in the measured item. 'Aging sensor reading' column stores values obtained from aging sensors and/or age-analyzers (see FIG. 7-3-4), which may be a number of trips made by the ring oscillator in a fixed period of time. This number may be translated to VT using a lookup table provided by simulations of the ring oscillator at the design stage. 'Thermal sensor reading' column stores values obtained from thermal sensors.

FIG. 7-3-6 symbolically illustrates an exemplary embodiment of a ring oscillator used, in one embodiment, as the aging sensor. FIG. 7-3-6 shows a structure of a ring oscillator 94600, which includes three inverters 94602*a-c* operably attached in a chain 94606. The output of last inverter 94602*c* is fed back into the first inverter 94602*a*.

Additionally, an aging sensor 94600 may be implemented using a number of different kinds of logic such as SRAM, ring oscillators, inverter chains, with different aging characteristics that sufficiently mimic the critical components of the processor cores, individually or using the aforementioned combinations. The process of tuning with a given aging profile number implies finding these representative combinations and generating the conditions that represent the aging profile number.

As mentioned, the term "core" generally refers to a digital and/or analog structure having a data storing and/or data processing capability, or any combination of the two. For example, a core may be embodied as a purely storage structure or a purely computing structure or a structure having some extent of both capabilities.

Also, the concept of turning off a core or "selective core turn-off" may be implemented by putting the core in a low-power mode, assigning the core with extremely low-power tasks, or cutting off the supply voltage or clock signal(s) to the core such that it is not usable.

Additionally, a "break-even" condition is a state of being at a particular time that facilitates the evaluation of the ability of a core to tolerate performance variation from its intended original design, i.e. as a result of administering tests that determine how much process variation it takes to change the static (non-time varying) decision of which core or set of cores to turn off.

Moreover, the term "variation," as used in the discussion below, generally refers to process variation, packaging, cooling, power delivery, power distribution and other similar types of variation.

The disclosed technology achieves higher performance and energy efficiency by intelligently selecting which cores to shut down (i.e. turn off or disable) in a multi-core architecture setting. The decision process for core shut down can be done randomly or through a fixed decision (such as always turn off core 1) without any basis for the decision beyond a selecting a fixed core for all chips. In this disclosure, we disclose a technique that optimizes system efficiency through the core shut down decisions—especially in the existence of on-chip variation among processing units.

The disclosed technique can be adjusted for different optimization criteria for different chips, though, for simplicity reasons, we focus on exemplary embodiments for energy efficiency and temperature characteristics. The technique of picking the optimal set of cores to turn off is applicable for multiple objective functions such as Temperature and Energy Efficiency (leakage reduction), which is more related to average temperature than peak temperature. In the case that the scheme is targeting thermal optimization, the technique focuses on (Tpeak, #neighbors) function where the static peak temperature among the processing units can be reduced while reducing the peak temperatures of maximum number of neighbors for the core turn-off candidate under consideration. However, in the case that the scheme is targeting for energy reduction, the same function is multiplied by a factor (Tavg*# neighbors component), which tracks for the average temperature reduction in the maximum number of neighbor cores and the static power dissipation is reduced significantly. By modifying the function in f($_{Tpeak}$, #neighbors) by ($_{Tavg}$*Area), we optimize for energy efficiency with the same technique.

FIG. 7-4-1 symbolically illustrates three exemplary scenarios of some the effects some selective core turn-off has on temperature and static power. FIG. 7-4-1 shows similar processors 96101, 96103 and 96105 running a similar workload.

Processor 96101 includes three cores 96102*a-c*, of which two, for example, are needed to process a certain workload.

Processor 96103 includes cores 96104*a-c*, of which two, for example, are needed to process a certain workload. Due to core scheduling, cores 96104*a* and 96104*b* are turned on and core 96104*c* is turned off. Since cores 96104*a* and 96104*b* are in close physical proximity to each other in the chip, due to their static power dissipation, cores 96104*a* and 96104*b* spatially heat up each other. Consequently, during operation, cores 96104*a* and 96104*b* in sum, consume more static power.

Processor 96105 includes cores 96106*a-c*, of which only two are needed to process a certain workload, for example. Due to a core scheduling, for example, cores 96106*a* and 96106*c* are turned on and core 96106*b* is turned off at a given point in time. Since core 96106*a* and 96106*c* are considered not in close physical proximity to each other, they do not spatially heat up each other as much. Consequently, during operation, cores 96106*a* and 96106*c* consume less static power.

It should be noted that although cores 96104*c* and 106*b* are turned off in their respective scenarios, core 96106*b*, due to its position between the turned on cores 96106*a* and 96106*c*, may be heated at a higher rate than core 96104*c*. Consequently, during operation, core 96106*b* may consume more static power than core 96104*c* in this exemplary scenario.

Exemplary scenarios, as illustrated in FIG. 7-4-1, become more complex when cores exhibit variation. For example, if core 96106*a*, due process variation, is significantly hotter than cores 96106*b* and 96106*c*, then turning off core 96106*b* is not the optimal choice for reducing static power. Thus, in the existence of variation, since processing units, such as cores, are not identical in terms performance, power and temperature characteristics, the process of selecting which core to turn off is important with performance, power, temperature, and reliability implications. As a result, the core turn-off decision is non-trivial and requires specialized techniques as explained in this disclosure.

One way to determine the optimal set of cores to turn off is by performing exhaustive tests on each processor after the processor is manufactured. By operating each core, measuring the static power and trying all the combinations of cores to turn on/off, the combination of which cores to turn on/off that exhibit the lowest power consumption may be found. However, this brute force method is overly time consuming and costly due to increased testing time in manufacturing and the costs associated with testing equipment and testing time. Furthermore, the costs become even more prohibitive when the number of cores increases to tens or even beyond hundreds and the number of cores to shut down is more than one.

FIG. 7-3-6 symbolically illustrates an exemplary embodiment of a ring oscillator that may be adapted to measure process variation for a core. In one exemplary embodiment, ring oscillator 94600 includes three or more serially connected inverters 94602*a-c* operably attached to form an inverter chain 94606. The output "Q" of last inverter 94602*c* is fed back as an input into the first inverter 94602*a*. Ring oscillator 94600 may be implemented using a number of different kinds of logic such as SRAM. While the variation measuring technique often relies on ring oscillators to quantify the amount of on-chip variation, alternative variation characterization techniques can also be used without compromising the variation measuring technique.

Ring oscillator 94600 may be adapted to measure variation for a respective core by counting how many times the output signal Q in ring oscillator 94600 changes from 0 to 1 and 1 to 0, in a fixed period of time such as within a clock cycle. Since faster transistors typically exhibit a higher rate of outflow of static power, higher counts in ring oscillator 94600 imply that the core consumes more static power.

Additionally, ring oscillator 94600 may be positioned within or outside of a core e.g., may be built as components on the SOC in proximity to the respective cores.

Moreover, ring oscillator 94600 may be a configured as a Phase-Shift Ring Oscillator (PSRO). Alternative designs of ring oscillator 94600 or other devices performing a similar function can also be incorporated in coordination with a PSRO or other variation sensing devices/structures.

FIG. 7-4-3 symbolically illustrates an exemplary depiction of a general overview flowchart of a process for turning off processor cores. In one embodiment, the process performs according to stages, i.e., referred to as Stages A and B. Steps 96302-96304 in Stage A are performed at the design stage of the processor (before a certain processor design is finalized); and steps 96306-96308 in Stage B are performed at and/or post the manufacturing stage for each processor. Thus, performance of steps within Stage A takes place prior to performance of steps within Stage B.

Also, in one embodiment, one or all steps within Stage A may be performed on a computer at a chip design facility where the processor chip is being designed.

Additionally, in one embodiment, one or all steps within Stage B may be performed by the processor itself or a computer attached to the processor at the manufacturing facility where the processor chip is being manufactured.

In step 96302, a static processor analysis is conducted and its analysis results may be output via a signal. This analysis is conducted by simulating on a computer the operation of the processor running a particular workload. Using the results of the simulation, the computer determines the optimal core or set of cores to turn off given the particular workload. Since this analysis may, in one embodiment, take into consideration some static thermal (e.g. detailed temperature values for individual processing units, macros, cores, temperature maps and such), power (e.g. static and dynamic power dissipation for macros, units or cores) and performance characteristics (e.g. data measured by performance counters, clock frequency, instructions per cycle and bytes per second and such) of the processor (by utilizing known thermal, power and performance models), the resulting processor configurations may be ranked, individually or in combination, by optimal thermal, power and/or performance characteristics. This data may be output as one or more signals for later use in subsequent steps such as step 303. This signal(s) may include data corresponding to a static list of processor cores to turn off.

Also, throughout execution of step 96302, the absence of variation is assumed.

Additionally, the simulation in step 96302 includes scenarios where the processor has various power modes to reduce power and/or to implement shut-down. Processor power modes are a range of operating modes that selectively shut down and/or reduce the voltage/frequency of parts or all of the processor in order to improve the power-energy efficiency. It is possible that power modes may include full shut down and/or drowsy modes of processing cores and cache structures.

In step 96303, at least one break-even condition is determined by utilizing data from step 96302 and data from a preexisting library of various variation patterns. This determination is done by simulating on a computer the occurrence of a particular variation pattern on the optimal core or set of cores to turn off given the particular workload employed in the analysis at step 96302. Consequently, a list of break-even conditions providing for a switch from one decision of the optimal core or set of cores to turn off (without the effects of variation) to another different set (with the effects of variation) is determined and output via a signal. This signal may be used by subsequent steps, such as step 96304.

Also, the simulation of the occurrence of a particular variation pattern on the optimal core or set of cores to turn off given the particular workload employed in the analysis at step 96302 may be conducted via a computational algorithm that relies on repeated injection of variation patterns. The variation patterns may be taken from preexisting library of variation patterns for a specific manufacturing site, manufacturing technology and relevant processor assumptions. In one embodiment, the injection algorithm also stores information from earlier runs of the chip under investigation to converge on most frequent variation patterns. While the variation can be largely due to process variation, the injection technique does not discriminate the source of variation and thus can effectively be used with other sources of variation such as packaging, cooling, power delivery, power distribution and such. In an embodiment where the same design is manufactured in a different technology node, or a different site, the preexisting libraries may be customized for these assumptions and thus, the static analysis in this stage will be targeted towards the specific manufacturing technology and site.

In step 96304, the output list of break-even conditions of step 96303 is used to create a data structure, such as a look-up table, where upon the input of the values of a variation of the core, the data structure will output an ordered list of cores to turn off in order to reduce power or to reduce temperature. For example, when using the ordered list, if the objective function is to reduce power and at most three cores could be turned off to still meet a certain performance target, the ordered list is sorted such that turning off the first three cores in the list will provide the optimal power configuration for the same performance.

The data structure, such as a look-up table, may be stored in memory internal or external to the processor. The content of the data structure may be registered, stored, organized and capable of being retrieved from for later use by the processor, a logic device, a resource manager, an initial configuration controller and/or a tester during the performance of step 96306.

In step 96306, during Wafer Final Test (WFT) and/or Module Final Test (MFT), the variation of each core is assessed using tester infrastructure, on-chip ring oscillator and/or a temperature sensor and stored in a memory (or a combination of any of these). In one embodiment, the measuring involves applying different supply voltages and clock frequencies to a core or all the cores in the processor and determining the signal counts output by the ring oscillator. Consequently, the measuring may provide values that represent variation for each core measured in ring oscillator counts. These values may be output as a signal used by subsequent steps, such as step 96307.

In step 96307, the process variation values obtained from step 96306 are used with look-up table data listing of cores to turn off obtained from step 96304 in order to automatically decide which core or set of cores to turn off in the processor. Since the on-chip variation patterns are different for different chips, the turn-off decisions that are unique to a certain processor may be stored within the processor or stored externally with reference to the processor's identification information. The actual decision of which core or set of cores to turn off may be implemented at the manufacturing stage by cutting off the frequency and/or voltage of the selected cores to turn off, or be made available to the systems for applying one of the aforementioned turn-off actions.

In step 96308, a list including a core or set of cores to turn off in the processor is finalized and may be output. In one embodiment, the content of the list may be ordered by corresponding core weights/ranks (i.e. cores may be ordered according to the energy or thermal benefit obtained from turning the selected cores off). Thus, a number of cores represented by a variable N and included in this list may be selected and subsequently turned off. Since the content of the list is ordered, a maximum benefit from the core shut down selection may be obtained. The variable N is a parameter which may be defined by a processor manufacturer based on a predetermined performance requirement and can be changed according to a desired number of cores to turn off. For example, the processor manufacturer may set variable N to 6 cores operating at 2 Ghz below 65 W power.

FIG. 7-4-4 symbolically shows an exemplary structure of the look-up table exemplarily referred to in FIG. 7-4-3. Look-up table 96400 includes two columns. The first column lists the break-even conditions and the second column lists the cores to turn off. Each row in look-up table 96400 represents a list of tests of variation conditions, where the input variable Count[core] represents variation for each core as characterized by a logic device such as a ring oscillator, e.g., ring oscillator counts obtained for a core in step 96306. If the break-even condition listed in the first column for a particular row is met, i.e. resolves TRUE, then the corresponding list of cores to turn off is specified in the same row is used for the corresponding processor.

In one embodiment, the first column of look-up table 96400 must cover all the possible combinations of process variations of the corresponding processor such that at least one row will be tested TRUE for every manufactured processor. For example, multiple rows within the first column may be tested TRUE when the processor layout is symmetric, such that turning off core on one end has the same effect of turning off a core from the other end. If more than one row is tested TRUE, then any of the rows that are tested TRUE may be selected i.e. any list of cores to turn off is specified in the any of the rows tested TRUE.

In some cases where some of the cores are non-functional (i.e. not able to operate according to the standards set by the manufacturer) and thus must be turned off, there are less choices from which remaining functional cores can be turned off since the non-functional cores must be turned off and their turn-off will affect the power and the choices for the remaining functional cores to turn off. Consequently, to make use of table 96400 when some of the cores must be mandatorily turned off due to their non-functionality, the disclosed technique changes the preexisting content of some cells within table 96400 to content corresponding to as if the non-functional cores have already been turned off. This occurs by allowing only the rows of table 96400 that have the non-functional cores turned off in the second column (Cores to turn off) to be used for look-up. Also, in one embodiment, conditions listed in the first column that involve disabling the non-functional cores must be removed. For example, in table 96400, if two cores should be turned off and if a core 3 has to be turned off due to its non-functionality in a particular processor, then only rows 2, 3, 4 and 6 (those rows that already have core 3 as one of the first two cores to be turned off) will be used for this processor. Thus, in order to determine which of the remaining cores should be turned off, the conditions that involves core 3 such as count[core 1]>count[core 3] and count[core 1]<=count[core 3] are removed from column 1, without using the actual counts or actual evaluation of core 3.

Also, look-up table 96400 may be stored in memory internal or external to the processor. The content of the data structure may be registered, stored, organized and capable of being retrieved from for later use by the processor, a logic device, a resource manager, an initial configuration controller and/or a tester during the performance of step 96306.

FIG. 7-4-5 illustrates a functional block diagram of an exemplary embodiment of a processor configured to implement the process of FIG. 7-4-3. In this embodiment, a processor 96500 includes four processor cores 96501*a-d*. Each of the processor cores is coupled to one of respective ring oscillators 96502*a-d*, however, in some cases where the core is large, more than one ring oscillators may be used. Because close-by transistors tend to exhibit similar behavior under variation, ring oscillators 96502*a-d* may be placed closed to, and often within, the core.

Processor 96500 also includes other units such as caches, interconnect, memory controller and Input/Output, collectively marked as Block 96503 that are typically found on a multiprocessor and SOC devices. Because Block 96503 may consume active and static power and may be affected by temperatures of the cores, as well as possibly heating up the cores due to their close proximity with one or more cores close-by, circuitry of Block 96503 may be used in the analysis referred to in FIG. 7-4-3 as step 96301.

Block 96504 is the logic circuit corresponding to the look-up table by referred to FIG. 7-4-3 in step 96304.

Block 96505 is the logic circuit corresponding to a variation table, storing values of ring oscillator readings referred to in FIG. 7-4-3 as step 96306. Data output from Blocks 96504 and 96505 may assist in implementation of step 96307 referred to in FIG. 7-4-3.

FIG. 7-4-6 symbolically illustrates the steps of an exemplary process for generating a static turn-off list. These steps are referred to as step 96302 in FIG. 7-4-3.

In step 96601, a static analysis of the processor's thermal profile is conducted. The static analysis is conducted in order to minimize the overhead associated with the static analysis without compromising accuracy. The static analysis includes a determination of the processor's thermally critical regions R where the average temperature of a region is higher than a predetermined threshold temperature, which is based on the analysis of the processor architecture and determined after extensive analysis at the design stage. The determination of the processor's thermally critical regions R occurs by computer simulation, whereby the processor's map-like physical layout is recursively separated into multiple sections. Next, the average temperature corresponding to a variable $T_{average}$ is calculated for each processor section and compared with the other processor sections as well as the whole processor's average temperature over a certain period of time. Next, a list of thermally critical regions Ri: {R1-RN} is provided. All the thermally critical regions R1-RN are evaluated in steps 96602-96607. Furthermore, each region Ri is defined by a number of cores (C1-CN) as well as mapping coordinates (x1, x2, y1, y2) on the layout of the chip. Upon determination of the thermally critical regions, the subsequently performed steps focus on regions Ri without doing the analysis exhaustively for every single core on the chip. Also, architectural criticality may be factored in this step where if, for example, Region 1 has operational significance for a particular processor architecture, then Region 1 can still be in the list or may be overwritten.

In step 96602, core turn-off is simulated for all cores in region R. Turn-off simulation may occur by selecting an $I^{th}$ core among M cores (e.g. $2^{nd}$ core out of 10 cores) where M is the total number of cores on the processor and I is a predetermined constant for the given number of cores/chip area such that I/M cores are neighboring cores from a region R (x1, x2, y1, y2) in the thermally critical regions. Consequently, for example, if N cores out of M should be turned off, then all the combinations of turning off N cores out of M cores are exhaustively simulated for the occurrence of various power and thermal scenarios on each combination until all the combinations are tried and the optimal combination is chosen.

In step 96603, a determination is made whether the peak temperature of a selected core I, which is turned off during simulation, is less than its peak original temperature. If not, then process loops back to step 96602. Otherwise, step 96604 is executed.

In step 96604, a determination is made whether the difference between the current average temperature and original average temperature is less than the threshold temperature. If not, then the process loops back to step 96602. Otherwise, step 96605 is executed.

In step 96605, information identifying the simulated core is placed in a static turn-off list. Static turn-off list is an ordered list wherein the listed cores are weighted/ranked according to the amount of energy efficiency and temperature improvement achievable through turning the listed cores off. In one embodiment, the weights may be based on AT where average AT would also indicate leakage and corresponding energy efficiency improvement i.e. the amount of temperature reduction (in terms of peak and/or average temperature) if a certain core is turned off. In one embodiment, the step of deciding how much power/temperature savings could be achieved by turning off a particular core can be extended to include the amount of static power reduction that translates to the level of temperature reduction. Consequently, if variation is lacking, then data from the performance of step 96605 can be subsequently used to assist in turn-off of any number of cores by selecting N cores out of this ordered list in order. While the static turn-off list may be subsequently partially overwritten by breakeven conditions (see for example FIG. 7-4-7), however, if the test-time measurements indicate that variation is below a predetermined variation $V^{th}$ threshold, the static turn-off list is still valid and can be used to turn off any number of cores on the chip for maximum energy efficiency (static power reduction) and/or thermal improvement. For example, in an embodiment where the main goal of the disclosed technology is energy efficiency optimization, the average power and total area are taken into account when the listed cores are weighted/ranked. Thus, it is possible that two different static turn-off lists can be simultaneously maintained and the core turn-off selection may be done according to a certain goal, which may or may not be determined at that time. Additionally, similar static turn-off lists can be generated for reliability and other objective functions that are of similar nature.

In step 96606, a determination is made as to whether all the cores in region R have been analyzed. If not, then the process loops back to step 96602. Otherwise, step 96607 is executed.

In step 96607, the content of static turn-off list is finalized. The static turn-off list may be output for use by step 96303 shown in FIG. 7-4-3.

FIG. 7-4-7 symbolically illustrates the steps of an exemplary process for injecting variation patterns into a static turn-off list. These steps are referred to as step 96303 in FIG. 7-4-3 and are simulated on a computer at the processor's design stage.

In step 96701, a core represented by a variable J from a listing of all cores listed in a static turn-off list is selected. The static turn-off list is provided from the performance of all steps symbolically shown in FIG. 7-4-6.

In step 96702, a process variation pattern is selected from a preexisting library of various variation patterns. The variation pattern is represented by variable Vi. The variation patterns may be taken from preexisting library of variation patterns for a specific manufacturing site, manufacturing technology and relevant processor assumptions. In one embodiment, the injection algorithm also stores information from earlier runs of the chip under investigation to converge on most frequent variation patterns. While the variation can be largely due to process variation, the injection technique does not discriminate the source of variation and thus can effectively be used with other sources of variation such as packaging, cooling, power delivery, power distribution and such. In an embodiment where the same design is manufactured in a different technology node, or a different site, the preexisting libraries may be customized for these assumptions and thus, the static analysis in this stage will be targeted towards the specific manufacturing technology and site. In one embodiment, the variation pattern may be selected from Block 96505 exemplarily shown in FIG. 7-4-5.

In step 96703, a variation pattern Vi is injected into core J via a computational algorithm during a power and/or temperature simulation.

In step 96704, a simulation of the occurrence of variation pattern Vi on core J takes place. This simulation may take into account various performance scenarios, workloads, power schemes and temperatures. Specifically, variation data may include lot/wafer/chip/core/unit level variation data that is relevant for the core under consideration. Given the core architecture characteristics/specifications, an injection of the variation pattern Vi into the corresponding operating specs of the processor occurs. As previously mentioned, the operating specifications can include certain workload characteristics, power modes, temperatures and other scenarios into account in order to do a realistic assessment of the impact of the variation on the processor.

In step 96705, a determination is made as to whether the performance results of step 704 on core J are different from those performance results corresponding to core J as determined by step 96607 shown in FIG. 7-4-6. If not, then the process loops back to step 96702. Otherwise, step 96706 is executed.

In step 96706, a determination is made as to whether the power and temperature values for core J result in maximum energy efficiency (static power reduction) and/or thermal improvement when executing a workload than those corresponding to core J when executing the same workload in step 96607 shown in FIG. 7-4-6. If not, then the process loops back to step 96702. Otherwise, step 96707 is executed.

In step 96707, process variation pattern Vi is placed in break-even pattern list, which may be stored in a data structure such as a look-up table 96400 shown in FIG. 7-4-4.

In Step 96709, the content of break-even pattern list is finalized. Thus, break-even pattern list per core for all variation patterns from the library of various variation patterns is provided resulting in a listing of break-even points per core such that if a core is above the specific variation level it gets assigned to the break-even pattern list. The break-even pattern list may be output via a signal for subsequent use.

Furthermore, as discussed above in reference to step 96308 in FIG. 7-4-3, a list including a core or set of cores to turn off in the processor is finalized and may be output. In one embodiment, the content of the list may be ordered by corresponding core weights/ranks (i.e. cores may be ordered according to the energy or thermal benefit obtained from turning the selected cores off). Thus, a number of cores represented by a variable N and included in this list may be selected and subsequently turned off. Since the content of the list is ordered, a maximum benefit from the core shut down selection may be obtained. The variable N is a parameter which may be defined by a processor manufacturer based on a predetermined performance requirement and can be changed according to a desired number of cores to turn off. For example, the processor manufacturer may set variable N to 6 cores operating at 2 Ghz below 65W power.

There are several methods to execute process in FIG. 7-4-7 and those skilled in the art of Computer Automated Design (CAD) can recognize these steps. In one method, known as the Monte Carlo Method, the process is similar to process shown in FIG. 7-4-6, but with variations assumptions randomly applied to the cores for random variations only. However, the systematic variations are factored in from analysis of the existing chips for the specific technology/site under investigation. For each set of the injected variations, the process of FIG. 7-4-6 is repeated to compute the power and temperature of the chip for each selection of cores to turn off. In the end, the break-even conditions are obtained by grouping range of variation conditions including systematic and random variations that result in the same selection of cores to turn off. In another method known as Simulated Annealing and can be implemented as Linear Programming, a large number of analyses are also done by starting from the resulting list from the process of FIG. 7-4-6 assuming no variation, and then incrementally injecting variations such that the break-even conditions are closer at every new analysis.

Power Distribution

Each midplane is individually powered from a bulk power supply formed of N+1 redundant, hot pluggable 440V (380V-480V) 3 phase AC power modules, with a single line cord with a plug. The rack contains an on-off switch. The 48V power and return are filtered to reduce electromagnetic emissions (EMI) and are isolated from low voltage ground to reduce noise, and are then distributed through a cable harness to the midplanes.

Following the bulk power are local, redundant DC-DC converters. The DC-DC converter is formed of two components. The first component, a high current, compact front-end module, will be direct soldered in N+1, or N+2, fashion at the point of load on each node and I/O board. Here N+2 redundancy is used for the highest current applications, and allows a fail without replacement strategy. The higher voltage, more complex, less reliable back-end power regulation modules will be on hot pluggable circuit cards (DCA for direct current assembly), 1+1 redundant, on each node and I/O board.

The 48V power is always on. To service a failed DCA board, the board is commanded off (to draw no power), its "hot" 48V cable is removed, and the DCA is then removed and replaced into a still running node or I/O board. There are thermal overrides to shutdown power as a "failsafe", otherwise local DC-DC power supplies on the node, link, and service cards are powered on by the service card under host control. Generally node cards are powered on at startup and powered down only for service. As a service card is required to run a rack, it is not necessary to hot plug a service card and so this card is replaced by manually powered off the bulk supplies using the circuit breaker built into the bulk power supply chassis.

The service port, clocks, link chips, fans, and temperature and voltage monitors are always active.

Power Management

A robust power management is provided to lower power usage that is based on clock gating. Processor chip internal clock gating is triggered in response to at least 3 inputs: (a) total midplane power (b) local DC-DC power on any of several voltage domains (c) critical device temperatures. The BG/Q control network senses this information and conveys it to the compute and I/O processors. The bulk power supplies create (a), the FPGA power supplies controllers in the DCAs provide (b), and local temperature sensors either read by the compute nodes, or read by external A-D converters each compute and I/O card, provide (c). As in BG/P, the local FPGA is heavily invested in this process through a direct, 2 wire link between BQC and Palimino.

System Software

As software is a critical component in any computer and is especially important in computers with new architectures, there is implemented a robust layered system of software that at the lowest level is very simple and efficient, yet sufficient to run most parallel applications.

For example, a control system is provided for controlling the following node types: Compute nodes dedicated to running user application, simple compute node kernel (CNK) I/O nodes (ION) run Linux and provide a more complete range of OS services—files, sockets, process launch, signaling, debugging, and termination; and, Service node performs system management services (e.g., heart beating, monitoring errors)—transparent to application software Compute Node Kernel (CNK) are adapted to perform and/or are provided with the following:

Binary Compatible with Linux System Calls; Leverage Linux runtime environments and tools;

Up to 64 Processes (MPI Tasks) per Node; SPMD and MIMD Support; Multi-Threading: optimized runtimes; Native POSIX Threading Library (NPTL); OpenMP via XL and Gnu Compilers; Thread-Level Speculation (TLS); System Programming Interfaces (SPI); Networks and DMA, Global Interrupts; Synchronization, Locking, Sleep/Wake; Performance Counters (UPC); MPI and OpenMP (XL, Gnu); Transactional Memory (TM); Speculative Multi-Threading (TLS); Shared and Persistent Memory; Scripting Environments (Python); Dynamic Linking, Demand Loading.

Firmware are adapted to perform and/or are provided with the following:

Boot, Configuration, Kernel Load; Control System Interface; Common RAS Event Handling for CNK & Linux.

Systems Software Overview

Three are 7 major software components: (1) CNK (Compute Node Kernel); (2) ION (I/O) node Linux; (3) run-time firmware; (4) control system; (5) messaging layer; (6) compilers; and (7) GNU compilers and toolchain.

1. The Compute Node Kernel (CNK) is a lightweight kernel running on each of the compute nodes focused on performance. Its primary characteristics are low noise, support of most glibc/Linux system calls with function shipping to I/O nodes. It supports processes a pthreads, allows user-mode access to hardware to high performance, and has a mode where applications incur no TLB misses.

2. I/O Node (ION) Linux provides the compatibility environment for CNK function shipping. An I/O proxy daemon (IOPROXY) performs the backend function shipped system calls on behalf of each compute node. A Control and I/O Daemon (CIOD) is provided that interacts with the control system to manage jobs. CIOD also provides a tools interface to allow debuggers such as TotalView to control and query the compute nodes.

3. The runtime firmware (RTF) is the layer below a kernel. That kernel could be the above described CNK or ION Linux, or other customer implemented kernel. RTF's primary characteristics are providing a common set of non-performance-critical services isolation the kernel from the underlying hardware and control system, and providing a uniform RAS delivery mechanism. As with CNK it is introduces little noise and is well suited to HPC application needs.

4. The control system consists of two components: the high-level control system, or MMCS (Midplane Monitoring Control System), and the low-level control system, or mcServer (machine controller). The control system is the software that boots and partitions the machine, interacts with a scheduler to run jobs, tracks and analyzes RAS events, and provides a unified graphical view of the machine state, RAS, and jobs. Enhancements include high availability failover and, in an alternative embodiment, a distributed componentized control system. The mcServer portion handles power supplies, interactions with the FPGAs on the compute cards, and in general is responsible for controlling the hardware. MMCS handles interactions with the database for maintaining persistent job information and machine state. MMCS is the component responsible for partitioning and interfacing to schedulers such as Load Leveler or SLURM. The control system relies on interactions with the kernel for RAS messages, but for the most part, other software components rely on the control system. The Blue Gene control system presents a simple, efficient, and unified interface to control a world leading number of compute nodes. In a single glance it provides the state of the machine and the status of running jobs. It provides a searchable database for analyzing previous jobs runs, failures, hardware replacement, RAS events, and more. The Blue Gene control and diagnostics allow concurrent maintenance on one part of the machine while running jobs on another part.

5. The Blue Gene messaging stack is designed to allow the user access to the full power of the hardware, while providing a robust and optimized environment for standard programs. The messaging stack exposes two levels of APIs. A lower level one called SPI (System Programmer Interface) is a minimalistic layer of software that allows hardware (message queues, counters, etc) manipulation from user space. Starting on BGP the SPI is a fully supported and documented layer for achieving maximum performance from the hardware. Built on the SPI layer, DCMF (Deep Computing Messaging Framework) supports high performance message passing and shared memory programming models, such as OpenMP, Global Arrays (GA), Charm++, UPC, and others. MPICH is built on top of DCMF.

6. XL compilers are among the industry's leaders in performance and standards compliance. These compilers perform optimizations specific to each embodiment. The compilers implement standards for C, C++, and FORTRAN. The compiler supports auto parallelization with OpenMP and includes high performance MASS/MASSV libraries and ESSL. They have additional performance enhancement for HPC features. The compiler supports SIMD instruction generation with detailed compiler listing support for tuning optimizations. One compiler, in alternative embodiment, includes support for transactional memory and speculative execution.

7. The GNU compiler libraries and GNU toolchain is implemented. An automated patch and build process is provided for the toolchain that makes installation easy and provides the customer with a complete source base for any modifications or patches desired. The patch enables C, C++, FORTRAN and GNU OpenMP (GOMP). The toolchain implements ANSI, POSIX, IEEE and ISO standards for C, C++, FORTRAN, and OpenMP. The C library supports numerous ANSI, IEEE and POSIX standards including IEEE POSIX 1003.1c-1995 pthreads interfaces. The GNU linker, assembler, and related utilities have become de facto standards on Linux platforms.

Other application and system libraries beyond standard Linux, runtimes, math libraries, and messaging libraries are provided. A user-level application checkpoint restore library facilitates the transformation of applications into ones that can recover from system failures. The multi-valued L2 cache provides an opportunity for hardware and software support for fine-grained (sub millisecond) transparent system rollback to increase MTBF contributions from soft-errors. Link checksum interfaces are provided that application can use to find faulty network links. Other system programming interfaces (SPI) and tool interfaces are provided.

Light Weight-Kernel

Compute Node Kernel (CNK) is written from scratch and is open source under the Common Public License (CPL). The primary goal of the kernel is to launch applications, map hardware features into user space, and provide an infrastructure requiring little additional user-kernel interaction. Application compatibility with Linux is also provided. The approach emulates Linux system calls by function shipping the majority of the work to an I/O node running Linux. Some job control system calls are implemented locally by CNK including mmap( ) and clone( ) This strategy allows access to shared memory, creation of threads, and dynamic linking in a manner that does not require restructuring glibc. For example, this allows python and other applications with dynamic linking requirements to work without modification.

Unlike Linux, memory is mapped with a set of static translation lookaside buffers (TLBs). This eliminates the cost of TLB misses and allows the calculation between virtual to physical addresses to be performed in user space. The DMA torus interfaces are made available to user space allowing communication libraries to send messages directly from the application without involving the kernel. The kernel, in conjunction with the hardware, implements secure limit registers that prevent the DMA from targeting memory outside the application. These constraints, along with the electrical partitioning of the torus, provide security between applications. Blue Gene hardware provides multiple, communication FIFO (First-In First-Out) data structures implemented by hardware for efficient messaging. The FIFOs are assigned to MPI tasks and threads providing dedicated resources per task.

CNK provides both a pure MPI programming model and a hybrid approach that allows MPI to be mixed with different shared memory programming models such as OpenMP, UPC (Unified Parallel C), or pthreads.

CNK provides support for SIMD execution, Transactional Memory (TM), and Speculative Execution (SE). CNK leverages BGQ's unique hardware support for TM and course-grained thread-level speculation execution. Subcontractor will provide significant compiler support and optimization for each of these execution environments. CNK works in unison with the compilers. In particular for SIMD execution, CNK saves and restores the requisite registers. A transaction can be initiated from user space. The hardware can be configured so that upon completion of a transaction, either CNK receives an interrupt and calls a signal in user code, or user code can check a statue register to determine the success or failure of the transaction. For speculation, CNK provides a software thread context per hardware thread. When the runtime wishes to initiate speculation, a kernel call activates the speculative thread, sets the appropriate TLB bits, and returns control to the speculative thread. If during the speculation a conflict occurs, CNK will handle the interrupt and logically terminate the speculative thread. Upon successful completion of the speculative code, the speculative state is saved, and CNK will return control to the thread that was running prior to the activation of the speculative thread.

BGQ further allows detailed fine-grained simultaneous monitoring of numerous performance metrics. CNK will provide a user-space mapping of control registers for managing 1024 performance counters in one embodiment. The counters can be configured in three modes: a distributed count mode, a detailed count mode, and a trace mode. The distributed count mode allows some counters from all of the cores to be monitored; in detailed mode, a large number of counters from a single core may be monitored. In trace mode, every instruction is recorded. Approximately 1500 cycles of instruction information can be traced in this mode. The distributed and detailed modes also apply to the L2.

For performance and scalability, CNK implements function shipping for I/O requests. The I/O function shipping mechanism is implemented in a manner similar to a remote procedure call. When an I/O request is made to CNK, CNK sends a message to a CIOD daemon running on the ION Linux, where a proxy performs the operation. Linux compatibility is enabled on the I/O node by careful management of the context in which the system call is performed. Rather than emulate Linux behavior, Subcontractor's approach is to minor the compute node environment on the I/O node with a process and corresponding threads. This allows CIOD to provide Linux semantics for the CNK process context including current working directory, file handles, locks, and user and group id security. The I/O function shipping also addresses scalability of the I/O subsystem. An I/O node further manages a number of compute nodes reducing the file-system clients and administration by two orders of magnitude.

Both CNK and the Linux kernel on the I/O node utilize a common runtime firmware (RTF) service layer for non-performance critical events. RAS events are emitted via this firmware layer to the control system over the secure control network. For space efficiency, RAS events are logged from CNK as encoded binary and decoded within the control system allowing the lightweight kernel a smaller memory footprint. RAS events are recorded in a database on the service node and are associated with specific hardware, a partition, and a job. The control system monitors the nodes, node boards, and service cards by externally polling the system without interacting with CNK or other software running on the node thereby providing monitoring with zero interference. Failing hardware can be detected even if a node becomes so unresponsive that even CNK and its firmware cannot act. In these situations the control system will produce RAS events on behalf of the nodes. This provides additional information over what a standard cluster can provide. By using the JTAG interface, the control system can obtain the state of the failing node.

In one embodiment, system software boots the I/O nodes as part of the initial boot of the partition. Once a partition is booted the system allows individual or groups of I/O nodes to be rebooted as desired. For simplification, compute nodes associated with the I/O node(s) are also rebooted. As this process happens in parallel it does not add to the ION reboot time. In normal operation, nodes are booted once to start the partition and then multiple jobs are run without further reboots. In a further embodiment, the I/O nodes are collected into racks and decoupled from compute nodes; however, enhancement enable support of reconfiguring partitions without rebooting the I/O nodes.

LN, ION and SN Linux OS:

The I/O Node (ION) Linux is an embedded Linux based on a standard enterprise Linux distribution. ION Linux, in one embodiment, may leverage the same runtime firmware used by CNK. This firmware layer is designed to provide consistent RAS from any kernel including CNK, Subcontractor's provided ION Linux, any customer built Linux, or other customer supplied operating system. In addition to RAS, the runtime firmware provides a common interface to the control system for configuration of networks and console output.

Job control may be provided through a Control and I/O Daemon (CIOD). CIOD accepts connections over the functional network from the control system on the service node. The control system may start, signal, debug, or end a job over this connection. The control system achieves scalability by a division of labor where the service node interacts in parallel with a relatively small set of IONs, which in term interact in parallel with the set of associated compute nodes.

Using this technique Blue Gene may efficiently perform job launch and control on 100,000s of nodes. Standard input (stdin), stdout, and stderr are multiplexed over the high-speed functional network. Debugging and related tools scale by running the debugger in parallel across the I/O nodes. The debugger and tools interface is documented. Tools may leverage the high-speed functional network and the compute capacity of the I/O nodes to perform and coordinate work.

Function shipping is provided through an I/O Proxy Daemon (IOPROXY) running on the ION. An IOPROXY daemon is responsible for each compute task. This IOPROXY shares the network connection to the compute nodes with CIOD and responds to requests from the compute nodes to perform system calls on behalf of the compute task. The IOPROXY creates threads to minor compute processes. Each IOPROXY process corresponds to a compute process and leverages Linux to track current working directory, file locks, user and group id, and any special context required by specific filesystems.

The IOPROXY avoids data copying by driving the network connection directly from user space. In one embodiment, this connection is over a collective network. Alternatively, hardware provides DMA support from user space alleviating the computational requirement for driving this network.

In one embodiment, the integrated 10 Gbps Ethernet is driven by a kernel network device driver. The Ethernet supports scatter-gather DMA with IPv4 checksum offload for TCP and UDP payloads. In an alternate embodiment, the external I/O is provided by a PCIe 2.0 adapter that is expected to provide similar or better offload capabilities.

Boot control of the I/O nodes is performed remotely from the service node using low-level Joint Test Action Group (JTAG) protocol. As with compute nodes, the I/O nodes are started remotely. Consistent with Blue Gene's design for reliability there is no local resident firmware or local storage; the booter and kernel are loaded over the network.

In one embodiment, the I/O nodes are integrated into the compute racks and are booted when a partition is configured. These I/O nodes may be rebooted either individually or in arbitrary subsets as desired. The I/O node reboot procedure may be performed between jobs. For simplification, compute nodes associated with the I/O node(s) are also rebooted. As this process happens in parallel it does not add to the ION reboot time. This discards any persistent data stored on the compute node.

In an alternative embodiment, reboot is similar, but the I/O nodes are in racks and are interconnected by an I/O torus. These I/O nodes will be booted independently of the compute racks, and will normally remain in operation until a maintenance window. It will be possible to reboot individual or sets of I/O nodes as allowed by the hardware. If an I/O node fails in a manner where the torus remains intact an administrator may choose to leave it down. Neither embodiment needs power cycling to reset nodes. The control system can send signals to the node via JTAG causing a reset.

System Administration:

System administration features include a centralized database that contains machine information such as hardware state, jobs, partitions, service actions, diagnostics, environmental readings, and RAS events. From the central database, an administrator can monitor machine activity. System administration is provided as a centralized service scalable to large (100,000s) number of nodes. The service provides the ability to debug jobs, initiate service actions, run diagnostics, view diagnostics results, view hardware status, kill jobs, free partitions, and other system administration tasks. All administrative tasks may be performed either by using the browser-based Navigator or from the command-line. The Navigator is customizable, in that it supports plug-in features whereby the administrator can provide site-specific graphs, reports, and notifications.

Most administrative tasks, such as service actions, running performance tests, or performing diagnostics, are parallel and can be run concurrently (at the same time on different partitions of the machine). For example, diagnostics could be run on one partition of the machine, while another partition is having a service action performed, while yet another partition of the machine is running a user application.

The database is used as a backing repository. The control system is designed so that the database does not become a bottleneck. Operations like system shutdown or reboot are not database-intensive operations. Once an operation is initiated only a few state transitions are logged in the database. RAS "storms" can cause significant database activity.

Petascale System Services:

The control system is designed to give a high degree of flexibility for creating and booting partitions, and launching and debugging jobs. The control system allows each partition to be booted with a partition-specific kernel. This customization, combined with partitioning features of the machine, allows different kernels to be used on different partitions at the same time. The choice of kernels is easily configured with commands and APIs provided by the control system. There is also support for different methods of job submission. Commonly, a single binary is run on all compute nodes of a partition. The control system also allows multiple binaries to run within a single partition. This is known as Multiple Program Multiple Data (MPMD). Another job launch paradigm is known as High-Throughput Computing (HTC) in which all the nodes of a partition can be running a different binary, and these binaries are each launched independently.

In one embodiment, security is based on access to the service node controlled by Linux accounts. Users who are given accounts on the service node can issue any command to the control system. In alternative embodiment, security and authentication in the control system are designed based on capabilities. A capability (known in some systems as a key) is a communicable, unforgettable token of authority. Users without access to the service node have the ability to launch and debug jobs from login nodes. More advanced tasks, such as running diagnostic suites or performing service actions, can be performed by system administrators on the service node. The security model provides a subset of service node commands to aid in debugging and collecting information about user jobs. One sample scenario might allow a user access to the service node, but only give them enough commands to view or change information about their partition and job.

Remote job launch is secured by the use of a challenge-response authorization protocol on login nodes, service nodes, and I/O nodes. Initiating a job from a login node may require a shared secret to authenticate with the service node. The secret is stored in a file on both the login node's and service node's local file system and can be of arbitrary length. A similar process occurs when initiating the job launch from the service node to I/O nodes. In this case a shared secret is randomly generated by the control system when the partition is booted. As part of the boot process, the secret is sent to each I/O node over the private service network. The I/O node software only allows remote connections who posses this shared secret and pass a challenge response.

Within the framework of a scheduler, interactive job launch can be prevented by the use of a control system plug-in. This plug-in is flexible enough to make portions of the machine available to interactive use, while denying requests the overlap with scheduler-controlled hardware resources.

The control system provides a comprehensive solution for resource management. An integral part is a database that stores four categories of data. There is a configuration database that is a representation of the hardware on the system, an operational database that is representation of partitions, jobs, and history, and an environmental and RAS database.

The configuration database has a complete and detailed layout of the racks, the node cards within those racks, and the cables that connect the racks. This physical layout of the machine is used as a base for performing resource management. For example, a request for a partition of 1,024 compute nodes in a fully connected torus requires referencing the physical layout stored in the configuration database. The configuration database also records the current status of the hardware. Even though hardware is present, it may currently be undergoing a service action. The configuration database is kept consistent with the state of the machine when hardware errors are detected (e.g., bulk power supply, fan, etc.) or service actions are in progress. This hardware is unavailable during the course of the service action and therefore is unavailable to a resource manager and is marked as such in the database. Additionally, certain RAS events may also indicate a hardware fail.

The operational database tracks the current use of the hardware. A resource manager uses the operational database to determine if a partition is available to boot. The same database also tracks where current jobs are running and can be used to ensure multiple jobs are not launched to the same partition and the same time.

The control system provides several mechanisms for users to allocate resources and run jobs. Users have access to mpirun, a command-line program that supports creating partitions, booting partitions, and running jobs. It can be used to run a job on a booted partition, boot a pre-created partition, or create a partition, or combinations of the above. Schedulers can us APIs to perform the above three actions, or can call mpirun at any stage in the management. Note, mpirun does not take into consideration the multi-user nature of the machine. For this reason, users may choose to use a centralized resource manager (or scheduler) to ensure that user requests are processed fairly, taking into consideration such factors as priority, advanced reservations, and job duration.

The scheduler APIs are a set of functions that can be used to extract the machine topology and status. Using these APIs, a scheduler can gather physical layout, hardware status, and operational state. Schedulers use this information to create partitions dynamically and run user jobs on those partitions. The control system provides polling and event-based categories of APIs. The event-based ones allow a “real-time” notification model, in which the scheduler gets the starting snapshot of the machine, and then registers to be notified in about any changes to hardware status or operational state. This notification model eliminates the need for the scheduler to poll for machine status changes.

Some classes of user requests may be satisfied by a simple scheduler that creates a set of static partitions and allocates sets of those predefined partitions to users. For more complex job loads, a dynamic allocator is available. It provides schedulers with topology-aware allocation strategies for finding requested resources. In this default strategy, the dynamic allocator finds the first available hardware that meets the requested size and shape, while minimizing the fragmentation of the hardware. The system also provides a plug-in architecture in which additional algorithms for resource allocation. The allocator plug-ins provide a fertile ground for collaboration in an open source community. Even with the dynamic allocator it is important to have a mechanism to avoid resource request collisions, which can be provided by a central resource manager.

RAS Software:

The software RAS strategy for Blue Gene is to limit the impact of failures, report RAS events in a consistent manner, persist events in a database, enable analysis of events, and alert administrators of conditions that require action.

The impact of hardware failures is limited through multiple techniques. One technique is redundant components, e.g., providing N+1 power modules. When a redundant component fails, an event is logged to indicate service should be scheduled. Another technique to limit the extent of a failure is to partition the system. The Blue Gene system allows flexibility in logically partitioning the machine so that multiple smaller jobs can be run simultaneously. These jobs are electrically isolated and users can not access or interfere with data flow on another partition. Failures are also isolated; a node failure only impacts its partition. Compute nodes are rebootable to recover from soft failures without rebooting the partition.

In one embodiment, there is provided the ability to reboot only a subset of the I/O nodes in a partition. This is an improvement on previous offerings because it allows a booted partition running ION Linux with existing Ethernet connections and mounted file systems to remain unaffected by a reboot of the compute nodes. This leads to improved stability of the I/O node complex, while providing the flexibility of either leaving the compute nodes booted across multiple jobs, or doing a reboot before each job starts.

The RAS architecture according to that embodiment defines the format of RAS Event descriptions, the APIs for reporting events, and the RAS handling framework. Events include a unique message id, location, severity, message, detailed description, and recommended service action(s). RAS Events are passed through a set of handlers in the Control System prior to being logged to expand the message from the compact binary format logged by CNK. This design reduces the kernel memory needed to log RAS messages.

The Environmental Monitor in MMCS generates events for anomalous environmental conditions such as over temperature, over current, etc. The low-level Control System generates events for errors with power supplies, temperature monitors, fan speeds, network configuration, chip initialization, etc. Concentrating the RAS handling in the Control System has resulted in a scalable and flexible RAS architecture. Message text, severity, codes, and recommended service actions, can be adapted based on the operational context (running jobs, diagnostics, service action) of the machine. This provides system operators, in each context, accurate and meaningful information upon an error event.

A diagnostic package is provided to check the hardware and isolate problems. The diagnostics harness supports the execution of individual test and test suites. A hardware checkup suite is provided to rapidly verify system health. To facilitate hardware replacement, a set of Service Action utilities are provided. A service-action-prepare step marks the hardware as under service in the database, gathers additional information for failure analysis, and powers off the necessary hardware. At this point a designated engineer can replace the hardware. The service-action-end step restores power to the hardware, runs diagnostics, and makes the hardware available by marking it active in the database. The diagnostics and service actions are executable from the command line or from the Navigator.

The Navigator RAS Event Log can be used to query, sort, and filter RAS events. The Navigator Health Center indicates to system administrators failure conditions needing attention. Software fixes are provided via efixes and are applied using the efix tool.

In alternative embodiment, RAS is more extensible to enable new system components to contribute RAS information and handlers without requiring a change to the RAS library. In addition, an Error Log Analysis plug-in framework will be added to improve problem isolation. The RAS components leverage the system capability-based security model. Separate capabilities are associated with the execution of Diagnostics and with Service Actions.

Apps Development Environment:

Subcontractor's delivered XL FORTRAN and XL C/C++ compilers are standards-based, highly optimized compilers. These compilers provide advanced optimization and utilize specific hardware features of any embodiment. The compilers are proprietary and fully supported by Subcontractor. The XL FORTRAN compiler provides implementation of FORTRAN 2003 (ISO/IEC 1539-1:2004, ISO/IEC TR 15580:2001(E), SO/IEC TR 15581:2001(E)).

For example, in one embodiment, the majority of the FORTRAN 2003 standard is supported, excepting parameterized derived types, but including object-oriented programming. In the alternative embodiment, FORTRAN 2003 is fully implemented. The XL C/C++ compiler provides full implementation for C (ANSI/ISO/IEC 9899:1999; ISO/IEC 9899:1999 Cor. 1:2001(E), ISO/IEC 9899:1999 Cor. 2:2004(E), ISO/IEC 9899:1999 Cor. 3:2007(E)) and C++(ANSI/ISO/IEC 14882:2003, ISO/IEC 9945-1:1990/IEEE POSIX 1003.1-1990; ANSI/ISO-IEC 9899-1990 C standard, with support for Amendment 1:1994). Both XL FORTRAN and XL C/C++ compilers also provide full implementation of OpenMP (OpenMP V2.5 in one embodiment, and OpenMP V3.0 for alternate embodiment). These compilers are an evolution of Subcontractor's XL compiler products for Linux on POWER, and benefit from functional, performance, and quality enhancements generated by the Linux on Power user base.

The XL compilers provide industry-leading optimization technology. Through compiler options and directives, programmers may select from a range of optimization levels (−O2, −O3, −O4, and −O5). These levels allow the user to select comprehensive low-level optimization up through more extensive whole-program optimization.

In one embodiment, optimization and tuning for the BGP architecture includes—qarch=450, which generates code for the single floating point unit (FPU), while—qarch=450d generates parallel instructions for the 450d Double Hummer dual FPU. The—qtune=450 option optimizes code for the 450 family of processors. The XL compiler family includes a set of built-in functions that are optimized for the POWER architecture. In addition, on the BGP, the XL compilers provide a set of built-in functions that are specifically optimized for the 450d's Double Hummer dual FPU.

IN the alternate embodiment, the XL compiler provides automatic SIMD vectorization to exploit the QPX unit, and automatic speculative parallelization to exploit the new hardware for speculative execution. The compiler also provides support for a variety of intrinsics and pragmas (SIMD intrinsics, Transactional Memory (TM) directives, and prefetching pragmas), which allow the user to directly exploit new hardware features.

Mathematical Acceleration Subsystem (MASS and MASSV) and ESSL libraries may additionally be provided. These libraries provide high performance scalar and vector functions that perform common mathematical computations. The libraries are tuned specifically to yield improved performance over standard mathematical library routines. Under higher levels of optimization, the XL compilers can identify patterns in code that can be replaced by calls to MASS subroutines. There is also provided the Basic Linear Algebra Subroutines (BLAS) set of high-performance linear algebraic functions. The compilers may be dependent on the GNU toolchain for linker, loader, and GNU C library. The GNU toolchain includes GNU OpenMP (GOMP).

As described with respect to the CNK, Blue Gene provides a rich program counting interface, i.e., BGQ allows detailed fine-grained simultaneous monitoring of numerous performance metrics. CNK will provide a user-space mapping of control registers for managing the 1024 performance counters. The counters can be configured in three modes. There is a distributed count mode, a detailed count mode, and a trace mode. The distributed count mode allows some counters from all of the cores to be monitored; in detailed mode, a large number of counters from a single core may be monitored. In trace mode, every instruction is recorded. Approximately 1500 cycles of instruction information can be traced in this mode. The distributed and detailed modes also apply to the L2.

The GNU autoconf tool is a popular configuration tool for software projects that must compile and cross-compile on multiple hardware and software platforms. Autoconf provides an open source, portable and flexible configuration infrastructure that is well understood in the software development community. For autoconf to be effective developers must understand and correctly utilize its function. While cross-compilation is straightforward, the build infrastructure for large software code bases can become complex. Often, a build has external dependencies beyond the control of the developer. To ameliorate situations where modifying the complex build infrastructure is not palatable, there is provided a solution to allow remote execution of binaries as required by autoconf.

There is further provided a comprehensive solution allowing the binaries to be run on a High Throughput Cluster (HTC) partition of an alternate embodiment, e.g., Sequoia, transparently to the autoconf environment. This solution provides an identically-matched environment on a CN rather than a closely-matched one on an ION.

Two performance toolkits may be supplied to support application tuning and enablement. The first toolkit, known as the High Performance Computing Toolkit (HPCT), is a suite of tools that focus on performance analysis, as opposed to tuning. These tools are designed for performance data collection in both their organization and presentation. The user is provided various views of the performance data. These views are correlated to the application's source code for improved user understanding. The toolkit is organized around five basic "dimensions" of performance relative to HPC applications: (1) CPU, (2) Memory, (3) Message-Passing with MPI, (4) Threading with OpenMP, and (5) File I/O. This five-dimensional framework was developed over years of working with scientists and engineers to provide a natural and intuitive means to manage the potentially large sets of performance data that is collected with large-scale applications.

The tool may use a visual abstraction of the application that allows the user to interact with it at the source level, but all instrumentation is performed on the binary executable. For example, the user can create instrumentation points based on either the specific type of information desired (e.g., all MPI-_Wait calls involving array foobar in function foo), or else can visually select portions of the source code to be instrumented. The framework collects these high-level specifications for instrumentation from the user, creates the appropriate binary coding of them, and inserts them into the existing binary executable. No recompilation of the application is performed. This preserves the integrity of the user's source code, which does not get altered in the HPCT framework.

In addition, the infrastructure for collecting the performance data is inherently scalable, since the specifics of the data collection are contained in the modified binary executable. In other words, this instrumented binary carries with it the "DNA" of the HPCT data collection framework wherever it executes, regardless of how many processors it runs on. The performance data is persistent and remains in a distributed filesystem for post-mortem analysis by the remainder of the HPCT.

The second toolkit, known as the High Productivity Computing Systems Toolkit (HPCST), is a framework dedicated to application tuning, as opposed to analysis. It is complementary to the HPCT in that it can be used in conjunction with it, and that it employs the same means of abstraction for its instrumentation needs. In particular, the HPCST consists of two main components: a Bottleneck Detection Engine (BDE) and a Solution Determination Engine (SDE). The BDE is a rule-based knowledge system that provides an automated means of finding performance bottlenecks. It can be used in two modes. In the first, an application can be tested for the presence of known bottleneck signatures as stored in a BDE-repository. These a-priori signatures are developed by expert users with a simple conditional grammar. The bottleneck signatures can be persistent and even community developed because the repository and grammar are open. The second mode of use for the BDE is by means of dynamic interrogation. The signature grammar is of sufficient power so as to allow users to ask very specific "questions" about the behavior of an application. This mode is an extremely powerful means for being able to understand large volumes of performance data, typically unsuitable for traditional methods of display (tables and charts). It provides a method of inserting human intelligence into the tuning effort in an automated and programmable manner. It is analogous to extracting information patterns from large scale databases.

The SDE component of the HPCST mines the results of the BDE and searches for underlying causes for any of the bottlenecks found by it. The overall process for the HPCST is to automatically determine the presence of bottlenecks via the BDE, and then further analyze those bottlenecks to find the underlying causes via the SDE. The user will then be presented with various results and logs that include specific measures of how to mitigate the bottlenecks that were found. The process can be iterated to further understand the application's performance behavior, and modified appropriately by the user.

Message Passing System:

The Blue Gene messaging stack exposes two levels of APIs. A lower level one called System Programmer Interface (SPI) is a minimalistic layer of software that allows hardware (message queues, counters, etc) manipulation from user space. Starting on BGP the SPI is a fully supported and documented layer for achieving maximum performance from the hardware. Built on the SPI layer, Deep Computing Messaging Framework (DCMF) supports high performance message passing and shared memory programming models, such as OpenMP, ARMCI, Charm++, UPC, and others. MPICH is built on top of DCMF.

Consistent with the high performance focus of Blue Gene, DCMF is available in user space and directly interacts with the messaging unit hardware. Kernel system calls are minimized. There is a single torus network on Sequoia and the messaging stack is designed to drive it at its maximum rate. DCMF is designed to take advantage of all of the links of a node as well as to choose the optimal network, torus or collective, for performing a given operation.

The messaging stack has been co-designed with CNK. As above, CNK has been designed with high performance applications in mind, and obviates the need for pinning memory for DMA. Short unexpected messages are handled by using temporary buffers. The messaging stack minimizes the amount of memory needed that grows with the number of MPI tasks. Most of this type of memory is required by the MPI specification, not by the messaging stack.

1. Eager connection list, 8 bytes*np per task . . . may be reduced to ~2 MB per task with a dynamic hash table.
2. Torus coordinates to rank map=4 bytes*np per node . . . this is stored in shared memory.
3. Shared memory communication—memory use depends on the number of tasks on a node.
4. The MPI standard defines several collective vector operations that require the user to allocate memory before the MPI collective is invoked:
   a. Alltoallv=4 vectors*np*sizeof(int)
   b. Allgathery=4 vectors*np*sizeof(int)
   c. Scattery=2 vectors*np*sizeof(int)
   d. Gathery=2 vectors*np*sizeof(int)

If the MPI specification is strictly followed, the amount of memory used for MPI vector collective operations will be large.

There are four potential areas that can affect the memory used for buffering. Eager connection list memory could be controlled by switching between the array which is faster and the hash table which is smaller. The memory used for rank map allocation can not be controlled by the user. The size of the shared memory FIFOS may be set by the user with an environment variable. User applications that use many ranks should be "well behaved" and not issue or not expect strict MPI specification compliance when issuing MPI vector collective operations.

The messaging stack takes advantage of shared memory to improve performance. By making each core's memory visible to other core on the node, the point-to-point shmem FIFOS would be smaller as the bulk of the data transfer is accomplished by a direct memcpy( ) by the receiver out of the sender's memory "non SMP" mode collectives require a local collective before, and sometimes after, the network collective. Also the cores would synchronize with shared memory and then the cores would directly access the input data to perform the operation and pipeline the result to the network collective phase.

Advantageously, the novel packaging and system management methods and apparatuses of the present invention support the aggregation of the computing nodes to unprecedented levels of scalability, supporting the computation of "Grand Challenge" problems in parallel computing, and addressing a large class of problems including those where the high performance computational kernel involves finite difference equations, dense or sparse equation solution or transforms, and that can be naturally mapped onto a multidimensional grid. Classes of problems for which the present invention is particularly well-suited are encountered in the field of molecular dynamics (classical and quantum) for life sciences and material sciences, computational fluid dynamics, astrophysics, Quantum Chromodynamics, pointer chasing, and others.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions runnable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, Net, Binary code) run by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the compute program product performs the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

The invention claimed is:

1. A massively parallel computing structure comprising:

a plurality of processing nodes interconnected by multiple independent networks, each processing node including a plurality of processing elements for performing computation or communication activity as required when performing parallel algorithm operations, a first of said multiple independent networks includes an n-dimensional torus network, n is an integer greater than 3, including communication links interconnecting said processing nodes for providing high-speed, low latency point-to-point and multicast packet communications among said processing nodes or independent partitioned subsets thereof;

and, said n-dimensional torus network for enabling point-to-point, all-to-all, collective (broadcast, reduce) and global barrier and notification functions among said processing nodes or independent partitioned subsets thereof, wherein combinations of said multiple independent networks interconnecting said processing nodes are collaboratively or independently utilized according to bandwidth and latency requirements of an algorithm for optimizing algorithm processing performance, wherein each said processing element is multi-way hardware threaded supporting transactional memory execution and thread level speculation, wherein said plurality of processing elements are configured to run speculative threads in parallel, wherein each processing element is further configured to:

communicate with a communications pathway, the pathway comprising a first level cache and a second level cache;

switch between at least two modes of using the first and second level caches, both modes allowing the first level cache and/or a prefetch unit to be operated in a speculation blind manner, wherein the at least two modes comprise:

a first mode where, responsive to a write from a speculative thread, at least one line corresponding to results is evicted from the first level cache and/or said prefetch unit and recorded in the second level cache; and a second mode where, responsive to a write from a speculative thread, the first level cache stores results, and wherein responsive to selection of the first mode, said processing element is configured to:

determine whether a speculative thread seeks to write;

upon a positive determination, write from the speculative thread through the first level cache to the second level cache;

evict a line from the first level cache and/or a prefetch unit corresponding to the writing; and resolve speculation downstream from the first level cache, wherein, subsequent to evicting a line, said processing element is further configured to:

determine if a speculative thread seeks to access an address corresponding to the line in the first level cache, and if so, retrieve an appropriate version of data from the second level cache.

2. The massively parallel computing structure as claimed in claim 1, wherein n is 5 to form interconnected processing nodes defining a 5-D torus network, said 5-D torus network is utilized to enable simultaneous computing and message communication activities among individual processing nodes and partitioned subsets of processing nodes according to bandwidth and latency requirements of an algorithm being performed.

3. The massively parallel computing structure as claimed in claim 2, wherein said 5-D network is utilized to enable simultaneous computing and message communication activities among individual processing nodes and independent parallel processing among one or more partitioned subsets of said plurality of processing nodes according to needs of a parallel algorithm.

4. The massively parallel computing structure as claimed in claim 2, wherein said 5-D network is utilized to enable dynamic switching between computing and message communication activities among individual processing nodes according to needs of a parallel algorithm.

5. The massively parallel computing structure as claimed in claim 2, wherein said 5-D network includes embedded virtual networks for enabling adaptive and deadlock free deterministic minimal-path routing of packets.

6. The massively parallel computing structure as claimed in claim 2, wherein each packet communicated includes a header including one or more fields for carrying information, one said field including error correction capability for improved bit-serial network communications.

7. The massively parallel computing structure as claimed in claim 6, wherein one said field of said packet header includes a defined number of bits representing possible output directions for routing packets at a processing node in said network, said bits being set to indicate a packet needs to progress in a corresponding direction to reach a processing node destination for reducing network contention.

8. The massively parallel computing structure as claimed in claim 1, further comprising: at least an Input/Output (I/O) node associated with plural processing nodes via an input/output communications link, wherein a second of said multiple independent networks includes an external high-speed network connecting each I/O node to other processing nodes.

9. The massively parallel computing structure as claimed in claim 8, wherein a third of said multiple independent networks includes an independent control network for providing low-level debug, diagnostic and configuration capabilities for all processing nodes or sub-sets of processing nodes in said computing structure.

10. The massively parallel computing structure as claimed in claim 9, wherein said low-level debug and inspection of internal processing elements of a processing node is conducted transparently to any software executing on that processing node via said third network.

11. The massively parallel computing structure as claimed in claim 9, wherein said third network comprises an Ethernet and/or a JTAG (Joint Test Action Group) standard control network interface that permits communication between an external control host system and said processing nodes to implement a separate control host barrier.

12. The massively parallel computing structure as claimed in claim 8, wherein sub-sets of said processing nodes are partitioned according to various logical network configurations for enabling independent processing among said processing nodes according to bandwidth and latency requirements of a parallel algorithm being processed.

13. The massively parallel computing structure as claimed in claim 12, further comprising a plurality of link devices for redriving signals over conductors interconnecting different mid-planes and, redirecting signals between different ports for enabling partitioning of multiple, logically separate computer systems.

14. The massively parallel computing structure as claimed in claim 13, wherein said link devices are configured for mapping communication and computing activities around any said midplanes determined as being faulty for servicing thereof without interfering with remaining system operations.

15. The massively parallel computing structure as claimed in claim 13, wherein one of said multiple independent networks includes an independent control network for controlling said link devices to program said partitioning.

16. The massively parallel computing structure as claimed in claim 13, further comprising:

high-speed, bi-directional serial links interconnecting said processing nodes for carrying signals in both directions concurrently on different wires; and, one or more of said link devices converting electrical signals to optical signals to drive said optical signals between compute midphanes, or between a compute midplane and an I/O midplane.

17. The massively parallel computing structure as claimed in claim 16, wherein each processing node ASIC further comprises a shared resource in a memory accessible by said processing elements configured for lock exchanges to prevent bottlenecks in said processing node.

18. The massively parallel computing structure as claimed in claim 1, wherein each processing node includes 16 or more processing elements each capable of individually or simultaneously working on any combination of computation or communication activity as required when performing particular classes of parallel algorithms.

19. The massively parallel computing structure as claimed in claim 18, wherein each processing element (core) includes a central processing unit (CPU) and one or more floating point processing units, said processing node further comprising a local embedded multi-level cache memory and a programmable prefetch engine incorporated into a lower level cache for prefetching data for a higher level cache, said pre-fetch engine performing a list-based prefetch.

20. The massively parallel computing structure as claimed in claim 18, wherein each 16 core processing node comprises a system-on-chip Application Specific Integrated Circuit (ASIC) enabling high packaging density and decreasing power utilization and cooling requirements.

21. The massively parallel computing structure as claimed in claim 1, wherein said computing structure comprises a predetermined plurality of ASIC processing nodes packaged on a circuit card, a plurality of circuit cards being configured on an indivisible midplane unit packaged within said computing structure.

22. The massively parallel computing structure as claimed in claim 1, wherein a circuit card is organized to comprise processing nodes logically connected as a 5-D hypercube.

23. The massively parallel computing structure as claimed in claim 1, further comprising a clock distribution system for providing clock signals distributed from a single clock source to every circuit card of a midplane unit at minimum jitter.

24. The massively parallel computing structure as claimed in claim 23, wherein said clock distribution system utilizes tunable redrive signals for enabling in phase clock distribution to all processing nodes of said computing structure and networked partitions thereof.

25. The massively parallel computing structure of claim 1, wherein, in the second mode, upon completion of a speculative thread, the first level cache and/or said prefetch unit is cleared and any data needed by other speculative threads are reloaded from the second level cache; and in the first mode, the first level cache and/or prefetch unit does not need to be cleared after completion of a speculative thread.

26. The massively parallel computing structure of claim 1, wherein said plurality of processing elements are configured to run a program code in parallel in accordance with a speculative execution; a processing element at said processing node being configured to:

enable a first thread to operate in accordance with a first mode of speculative execution and a second thread to operate in accordance with a second mode of speculative execution, the first and second modes of speculative execution being different from one another and concurrent, wherein the first and second modes of speculative execution are selected from amongst: said transactional memory (TM), said thread level speculation (TLS), and a rollback; and wherein said processing elements share a memory cache, said shared memory cache having a central control unit configured to:

assign identification numbers to software threads undergoing speculative execution, and manage speculation identification numbers with respect to a pool of possible speculation identification numbers by dividing the pool into domains, each domain corresponding to a respective mode of speculative execution.

27. The massively parallel computing structure of claim 26, wherein said central control unit is further configured to:

maintain a dynamic record of read accesses to the cache, the dynamic record comprising an indication of an encoding of a superset of speculative reading threads and access footprints of those processes within a cache line; said encoding of a superset of speculative reading threads and access footprints including a multi-bit field, each bit of said field representing a group of IDs, wherein an aggregate of all IDs is represented as the aggregate of all bits of this field; and a bit set in a field representing the cache line has been read by at least one ID of a corresponding group;

direct memory accesses for a same physical address from all the processors through a same memory addressing scheme of the control unit; and perform conflict checking for all the processing elements of the system using the record to locate potential conflicts.

28. The massively parallel computing structure of claim 26, wherein a processing element of a processing node is configured to:

determine a local rollback interval;

store state information of a processor in the individual processing node;

run at least one instruction in the local rollback interval;

associate an ID tag with versions of data stored in the shared cache memory device and using the ID tag to distinguish the versions of data stored in the cache memory device while running the instruction during the local rollback interval, the versions of data stored in the cache memory device during the local rollback interval including: speculative version of data and non-speculative version of data;

evaluate whether an unrecoverable condition occurs while running the at least one instruction during the local rollback interval;

check whether an error occurs during the local rollback interval; and upon the occurrence of the error and no occurrence of the unrecoverable condition, restore the stored state information of the processor in the individual processing node, and invalidating the speculative data;

restart the local rollback interval in the individual processing node in response to determining that the error occurs in the individual processing node and that the unrecoverable condition does not occur in the individual computing processing node during the local rollback interval, wherein the restarting the local rollback interval in the individual processing node avoids restoring data from a previous checkpoint;

evaluate whether a minimum interval length is reached in response to determining that the unrecoverable condition occurs, the minimum interval length referring to a least number of instructions or a least amount of time to run the local rollback interval;

continue a running of the local rollback interval until the minimum interval length is reached in response to determining that the minimum interval length is not reached; and commit one or more changes made before the occurrence of the unrecoverable condition in response to determining that the unrecoverable condition occurs and the minimum interval length is reached.

29. A scalable, massively parallel computing system comprising:

a plurality of processing nodes interconnected by independent networks, each processing node including one or more processing elements, said processing elements including one or more processor cores, and a direct memory access (DMA) for performing computation or communication activity as required when performing parallel algorithm operations;

a first independent network comprising an n-dimensional torus network, where n is an integer greater than 3, including communication links interconnecting said processing nodes in a manner optimized for providing high-speed, low latency point-to-point and multicast packet communications among said processing nodes or sub-sets of processing nodes of said network;

a plurality of Input/Output (I/O) nodes, a second independent network including an external high-speed network connecting each I/O node to other processing nodes;

wherein sub-sets of processing nodes are interconnected by divisible portions of said first and second networks for dynamically configuring one or more combinations of independent processing networks according to needs of one or more algorithms, wherein each of said configured independent processing networks is utilized to enable simultaneous collaborative processing for optimizing algorithm processing performance, and wherein each said processing element is multi-way hardware threaded supporting transactional memory execution and thread level speculation, wherein said one or more processing elements are configured to run speculative threads in parallel, wherein each processing element is further configured to:

communicate with a communications pathway, the pathway comprising a first level cache and a second level cache;

switch between at least two modes of using the first and second level caches, both modes allowing the first level cache and/or a prefetch unit to be operated in a speculation blind manner, and wherein the at least two modes comprise:

a first mode where, responsive to a write from a speculative thread, at least one line corresponding to results is evicted from the first level cache and/or said prefetch unit and recorded in the second level cache; and a second mode where, responsive to a write from a speculative thread, the first level cache stores results, wherein, in the second mode, upon completion of a speculative thread, the first level cache and/or said prefetch unit is cleared and any data needed by other speculative threads are reloaded from the second level cache; and in the first mode, the first level cache and/or prefetch unit does not need to be cleared after completion of a speculative thread, and wherein responsive to selection of the first mode, said processing element is configured to:

determine whether a speculative thread seeks to write;

upon a positive determination, write from the speculative thread through the first level cache to the second level cache;

evict a line from the first level cache and/or a prefetch unit corresponding to the writing; and resolve speculation downstream from the first level cache.

30. The scalable, massively parallel computing system as claimed in claim 29, wherein each processing node comprises a system-on-chip Application Specific Integrated Circuit (ASIC) comprising 16 processing elements each capable of individually or simultaneously working on any combination of computation or communication activity, or both, as required when performing particular classes of algorithms.

31. The scalable, massively parallel computing system of claim 29, wherein said one or more processing elements are configured to run a program code in parallel in accordance with a speculative execution; a processing element at said processing node being configured to:

enable a first thread to operate in accordance with a first mode of speculative execution and a second thread to operate in accordance with a second mode of speculative execution, the first and second modes of speculative execution being different from one another and concurrent, wherein the first and second modes of speculative execution are selected from amongst: said transactional memory (TM), said thread level speculation (TLS), and a rollback; and wherein said processing elements share a memory cache, said shared memory cache having a central control unit configured to:

assign identification numbers to software threads undergoing speculative execution, and manage speculation identification numbers with respect to a pool of possible speculation identification numbers by dividing the pool into domains, each domain corresponding to a respective mode of speculative execution.

32. The massively parallel computing system of claim 31, wherein said central control unit is further configured to:

maintain a dynamic record of read accesses to the cache, the dynamic record comprising an indication of an encoding of a superset of speculative reading threads and access footprints of those processes within a cache line; said encoding of a superset of speculative reading threads and access footprints including a multi-bit field, each bit of said field representing a group of IDs, wherein an aggregate of all IDs is represented as the aggregate of all bits of this field; and a bit set in a field representing the cache line has been read by at least one ID of a corresponding group;

direct memory accesses for a same physical address from all the processors through a same memory addressing scheme of the control unit; and perform conflict checking for all the processing elements of the system using the record to locate potential conflicts.

33. A massively parallel computing system comprising:

a plurality of processing nodes interconnected by multiple independent networks, each processing node comprising:

a system-on-chip Application Specific Integrated Circuit (ASIC) device comprising two or more processing elements each capable of performing computation or message passing operations, herein said processing elements of a processing node are configured to:

enable rapid coordination of processing and message passing activity at each said processing element, perform, at one or more processing elements, calculations needed by an algorithm, while another of said one or more processing element performs message passing activities for communicating with other processing nodes of an independent network, as required when performing particular classes of algorithms, wherein each said processing element is multi-way hardware threaded to support transactional memory execution and thread level speculation execution, wherein said two or more processing elements are configured to run speculative threads in parallel, and wherein each processing element is further configured to:

communicate with a communications pathway, the pathway comprising a first level cache and a second level cache;

switch between at least two modes of using the first and second level caches, both modes allowing the first level cache and/or a prefetch unit to be operated in a speculation blind manner, and wherein the at least two modes comprise:

a first mode where, responsive to a write from a speculative thread, at least one line corresponding to results is evicted from the first level cache and/or said prefetch unit and recorded in the second level cache; and a second mode where, responsive to a write from a speculative thread, the first level cache stores results, wherein, in the second mode, upon completion of a speculative thread, the first level cache and/or said prefetch unit is cleared and any data needed by other speculative threads are reloaded from the second level cache; and in the first mode, the first level cache and/or prefetch unit does not need to be cleared after completion of a speculative thread, and wherein responsive to selection of the first mode, said processing element is configured to:

determine whether a speculative thread seeks to write;

upon a positive determination, write from the speculative thread through the first level cache to the second level cache;

evict a line from the first level cache and/or a prefetch unit corresponding to the writing; and resolve speculation downstream from the first level cache.

34. The massively parallel computing system as claimed in claim 33, wherein a plurality of processing nodes are interconnected by links to form an independent n-dimensional torus network, wherein n>3, each processing node being connected by a plurality of links including links to all adjacent processing nodes;

and the computing system is enabled to be partitioned into multiple, logically separate computing systems.

35. The massively parallel computing system as claimed in claim 34, further providing, for said plurality of links, a function of redriving signals over cables between midplane devices that include a plurality of processing nodes, to improve the high speed shape and amplitude of the signals.

36. The massively parallel computing system as claimed in claim 34, further performing, for said plurality of links, a first type of signal redirection for removing one midplane from one logical direction along a defined axis of the computing system, and a second type of redirection that permits dividing the computing system into two halves or four quarters.

37. The massively parallel computing system as claimed in claim 33, further including:

a processing node coherence architecture accomplished with snoop with write-invalidate cache coherence protocol, interconnected via a global crossbar switch on each processing node; and, a fast interrupt mechanism to wake up a thread at sleep.

38. The massively parallel computing system as claimed in claim 33, wherein a processing node implements a first level cache and second level cache for supporting said transaction memory, and thread-level speculation.

39. The massively parallel computing system as claimed in claim 33, organized according to multi-mode processing node usages comprising: 1) a full virtual processing node mode, each of the processing elements (cores) will perform its own MPI (message passing interface) process independently; each core running four threads/process, and a sixteenth of a memory of the processing node, while coherence among the 64 processes within the processing node and across the processing nodes is maintained by MPI; and, 2) a full symmetric multiprocessor (SMP), one MPI task with 64 threads (4 threads per core) is running, using the whole processing node memory capacity; and, 3) a third mode called the mixed mode wherein 2, 4, 8, 16, or 32 processes are running 32, 16, 8, 4, and 2 threads, respectively.

40. The massively parallel computing system of claim 33, wherein said two or more processing elements are configured to run a program code in parallel in accordance with a speculative execution; a processing element at said processing node being configured to:

enable a first thread to operate in accordance with a first mode of speculative execution and a second thread to operate in accordance with a second mode of speculative execution, the first and second modes of speculative execution being different from one another and concurrent, wherein the first and second modes of speculative execution are selected from amongst: said transactional memory (TM), said thread level speculation (TLS), and a rollback; and wherein said processing elements share a memory cache, said shared memory cache having a central control unit configured to:

assign identification numbers to software threads undergoing speculative execution, and manage speculation identification numbers with respect to a pool of possible speculation identification numbers by dividing the pool into domains, each domain corresponding to a respective mode of speculative execution.

41. The massively parallel computing system of claim 40, wherein said central control unit is further configured to:

maintain a dynamic record of read accesses to the cache, the dynamic record comprising an indication of an encoding of a superset of speculative reading threads and access footprints of those processes within a cache line; said encoding of a superset of speculative reading threads and access footprints including a multi-bit field, each bit of said field representing a group of IDs, wherein an aggregate of all IDs is represented as the aggregate of all bits of this field; and a bit set in a field representing the cache line has been read by at least one ID of a corresponding group;

direct memory accesses for a same physical address from all the processors through a same memory addressing scheme of the control unit; and perform conflict checking for all the processing elements of the system using the record to locate potential conflicts.

* * * * *